United States Patent [19]

Ward et al.

[11] Patent Number: 5,006,990

[45] Date of Patent: Apr. 9, 1991

[54] METHOD AND APPARATUS FOR THE DESIGN AND CONSTRUCTION OF COMPOSITE PARTS

[75] Inventors: William E. Ward, Issaquah; Jack R. Gumm, Jr., Auburn, both of Wash.

[73] Assignee: The Boeing Company, Seattle, Wash.

[21] Appl. No.: 415,449

[22] Filed: Sep. 29, 1989

Related U.S. Application Data

[63] Continuation of Ser. No. 270,310, Nov. 10, 1988, abandoned, which is a continuation of Ser. No. 37,141, Apr. 10, 1987, Pat. No. 4,849,913.

[51] Int. Cl.[5] .............................................. G06F 15/46

[52] U.S. Cl. .................................... 364/768; 364/512

[58] Field of Search ................................ 364/191-193, 364/474.24, 474.09, 474.02, 468, 512, 300, 188, 189; 156/250, 252, 253, 256, 260, 264, 265, 58, 59, 64, 297, 378, 379.8

[56] References Cited

U.S. PATENT DOCUMENTS

| | | | |
|---|---|---|---|
| 4,534,813 | 8/1985 | Williamson et al. | 156/265 X |
| 4,554,635 | 11/1985 | Levine | 364/512 X |
| 4,654,805 | 3/1987 | Shoup | 364/167 X |
| 4,666,546 | 5/1987 | Treber | 156/264 |
| 4,697,240 | 9/1987 | Cedar et al. | 364/474 |

*Primary Examiner*—Joseph Ruggiero

*Attorney, Agent, or Firm*—Seed and Berry

[57] ABSTRACT

An improved system and method are designed to take engineering composite drawings released in a computer-aided design (CAD) data set, determine the attributes of each of a plurality of plies into its composite drawing, and pass the information on to using organizations. In preferred embodiments, the system logically determines the geometric definitions for each ply contained in a composite part and reports any errors to the user. Analysis of the physical properties of a part is also provided. Computation of the total part weight and centroid location is performed by the system. Additionally, the present invention creates detailed engineering models of each composite ply and passes information directly to manufacturing.

4 Claims, 51 Drawing Sheets

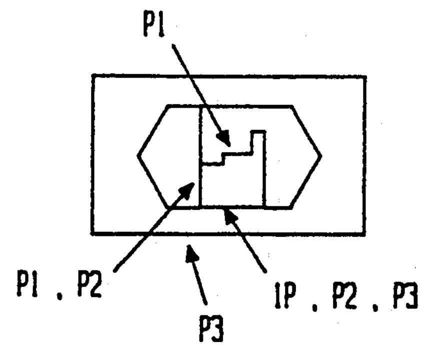
FIG.5B
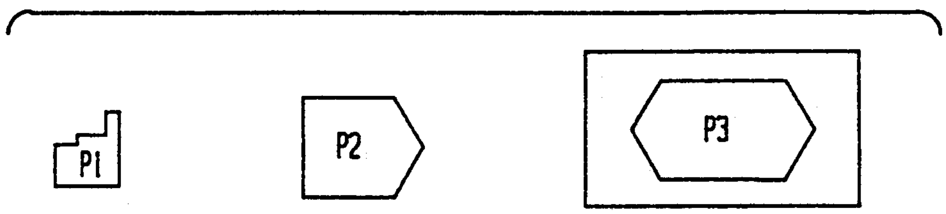
FIG.5C
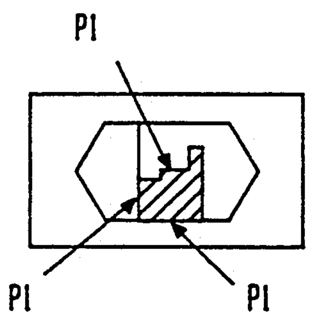
FIG.5D
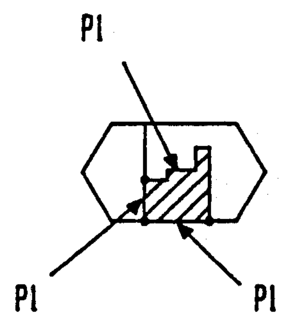
FIG.5E
FIG.5F
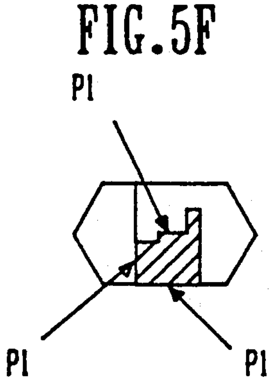
FIG.5G
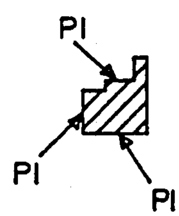

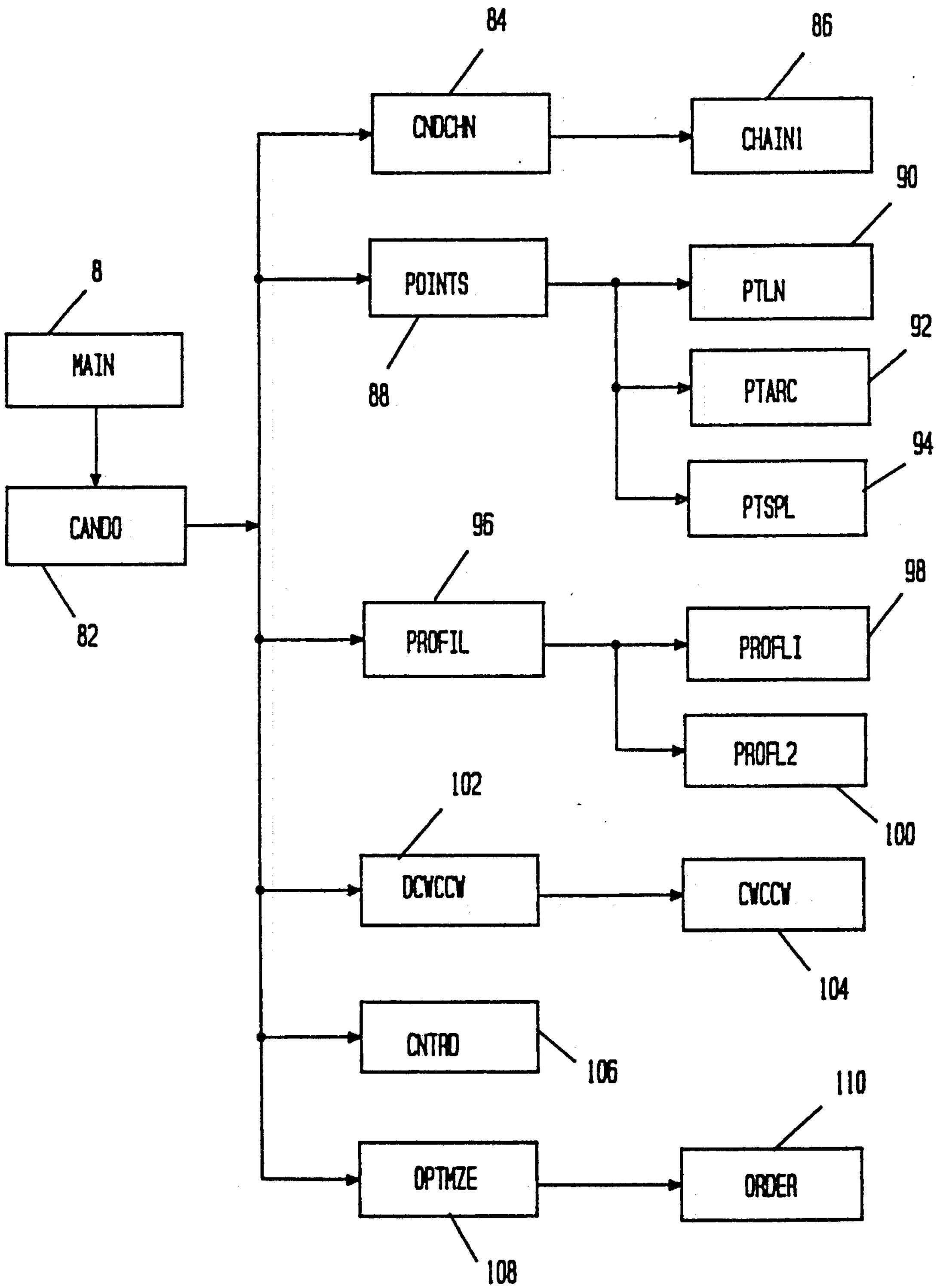
MAIN
8
CANDO
82
CNDCHN
84
CHAIN1
86
POINTS
88
PTLN
90
PTARC
92
PTSPL
94
PROFIL
96
PROFL1
98
PROFL2
100
DCWCCW
102
CWCCW
104
CNTRD
106
OPTMZE
108
ORDER
110

(L)

PART DEFINITION OUTPUT

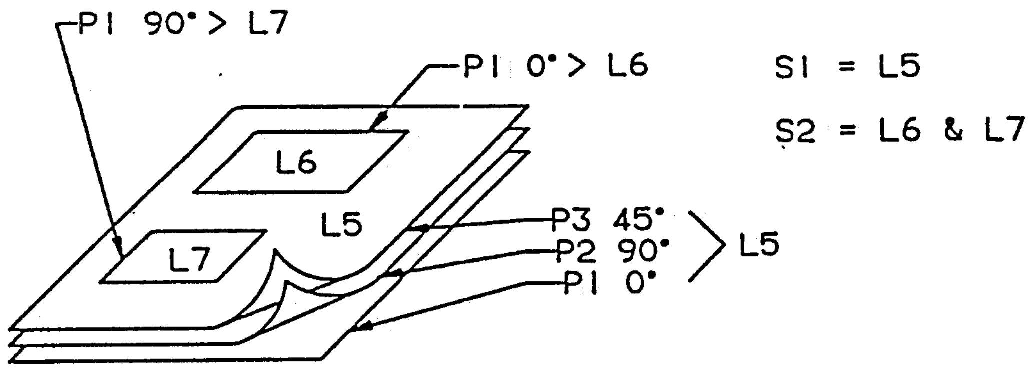
FIG. 14
FIG. 15B
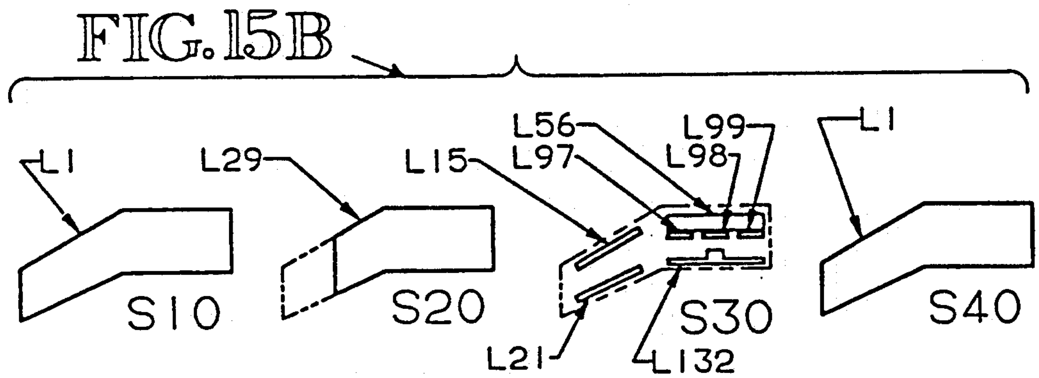
FIG. 16
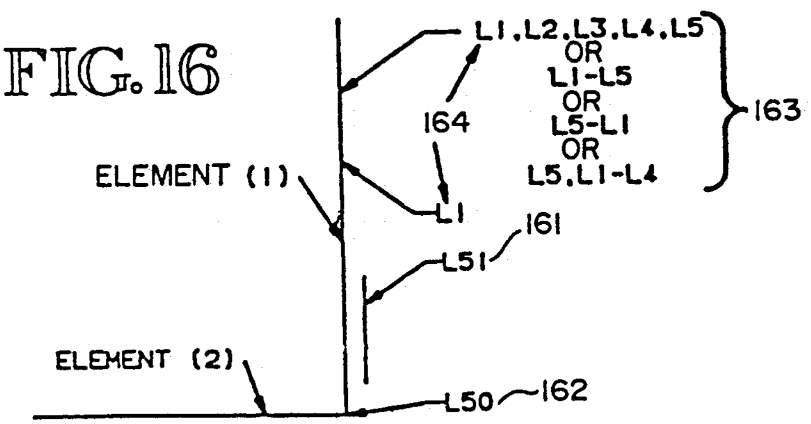

PLY TABLE:-101 PAGE 1

| SEQUENCE NUMBER [SXXX] | LAYUP NUMBER [LXXX] | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | 45° | P2 | | | | |
| | | -45° | P3 | | | | |
| | | 0° | P4 | | | | |
| S15 | L2 | 90° | P1 | 7201 | | | A |
| | | 0° | P2 | | | | |
| S20 | L29 | -45° | P1 | 7201 | | | |
| | | 45° | P2 | | | | |
| S30 | L15,L21 | 0° | P1 | 7202 | | | |
| | | 90° | P2 | | | | |
| | L56 | 0° | P1 | 60XX | | | |
| | L97,L98, L99 | 0° | P1 | 7202 | | | |
| | | 45° | P2 | | | | |
| | | -45° | P3 | | | | |
| | | 90° | P4 | | | | |
| | L132 | -45° | P1 | 7202 | | | |
| | | 45° | P2 | | | | |
| S40 | L1 | 90° | P1 | 7201 | | | |
| | | 45° | P2 | | | | |
| | | -45° | P3 | | | | |
| | | 0° | P4 | | | | |
| S31 | L32 | 22.5° | P1 | 50XX | | | A |
| | | | P1 | | | | |
| | | | P2 | | | | |
| | | | P3 | | | | |
| | | | P4 | | | | |
| | | | P5 | | | | |

PLY TABLE:-102 OPPOSITE PAGE 1
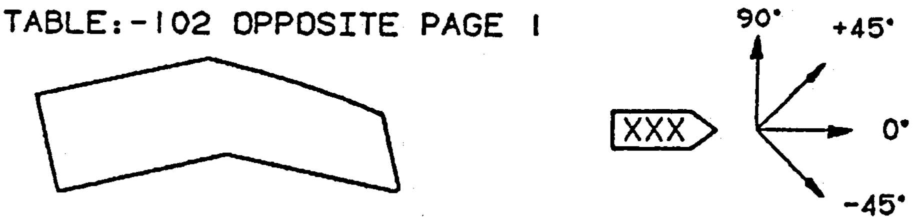
| SEQUENCE NUMBER [SXXX] | LAYUP NUMBER [LXXX] | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | -45° | P2 | | | | |
| | | 45° | P3 | | | | |
| | | 0° | P4 | | | | |
| S15 | L2 | 90° | P1 | 7201 | | | A |
| | | 0° | P2 | | | | |
| S20 | L29 | 45° | P1 | 7201 | | | |
| | | -45° | P2 | | | | |
| S30 | L15,L21 | 0° | P1 | 7202 | | | |
| | | 90° | P2 | | | | |
| | L56 | 0° | P1 | 60XX | | | |
| | L97,L98, L99 | 0° | P1 | 7202 | | | |
| | | -45° | P2 | | | | |
| | | 45° | P3 | | | | |
| | | 90° | P4 | | | | |
| | L132 | 45° | P1 | 7202 | | | |
| | | -45° | P2 | | | | |
| S40 | L1 | 90° | P1 | 7201 | | | |
| | | -45° | P2 | | | | |
| | | 45° | P3 | | | | |
| | | 0° | P4 | | | | |
| S31 | L32 | -22.5° | P1 | 50XX | | | A |
| | | | | | | | |
| | | | | | | | |
| | | | | | | | |
| | | | | | | | |
| | | | | | | | |

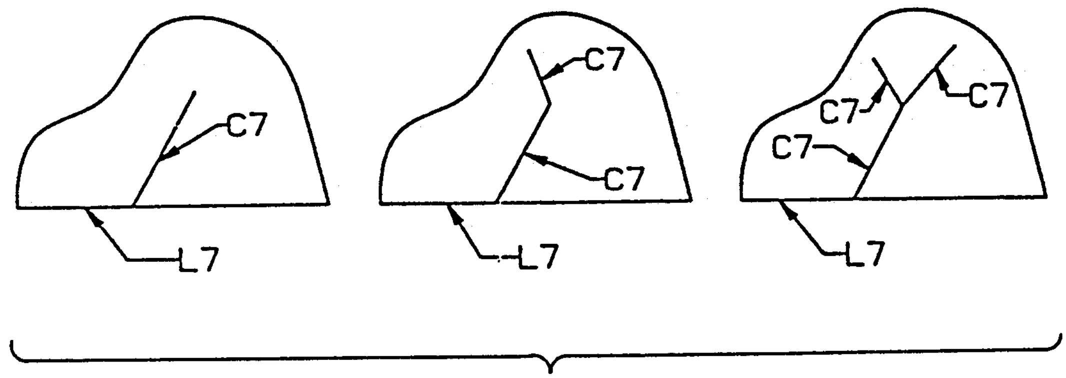
FIG. 17
FIG. 18
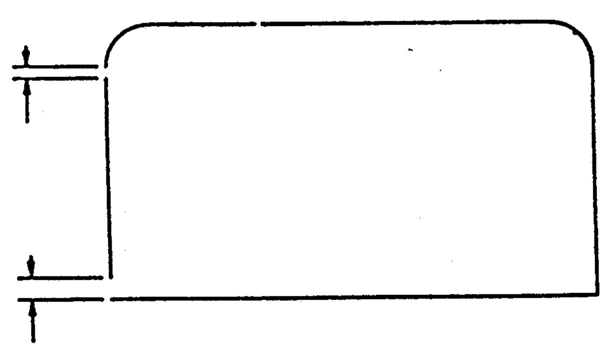

191

PLY TABLE:-102 OPPOSITE PAGE 1

| SEQUENCE NUMBER SXXX | LAYUP NUMBER LXXX | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | L XX | |
| | | -45° | P2 | | | | |
| | | 45° | P3 | | | | |
| | | 0° | P4 | | | | |
| S15 | L2 | 90° | P1 | 7201 | | | A |
| | | 0° | P2 | | | | |
| S20 | L29 | 45° | P1 | 7201 | | | |
| | | -45° | P2 | | | | |
| S30 | L15, L21 | 0° | P1 | 7202 | | | |
| | | 90° | P2 | | | | |
| | L56 | 0° | P1 | 7201 | | | |
| | L97, L98, L99 | 0° | P1 | 7202 | | | |
| | | -45° | P2 | | | | |
| | | 45° | P3 | | | | |
| | | 90° | P4 | | | | |
| | L132 | 45° | P1 | 7202 | | | |
| | | -45° | P2 | | | | |
| S40 | L1 | 90° | P1 | 7201 | | | |
| | | -45° | P2 | | | | |
| | | 45° | P3 | | | | |
| | | 0° | P4 | | | | |
| S31 | L32 | -22.5° | P1 | 7202 | | | A |

196

MATERIAL CODE ----------------------------

MATERIAL DESCRIPTION ----------------------------

MATERIAL DEFINITION ----------------------------

MATERIAL WIDTH ---------------------------- (in)

MATERIAL GRADE ----------------------------

MATERIAL STYLE ----------------------------

THICKNESS ---------------------------- t(in)

YOUNG'S MODULUS IN THE GRAIN DIRECTION ------------ $E_1$ (lb/in$^2$)

YOUNG'S MODULUS IN THE TRANSVERSE DIRECTION --------- $E_2$ (lb/in$^2$)

POISSON'S RATIO ---------------------------- $\nu_{12}$ (in/in)

SHEAR MODULUS IN THE 1-2 PLANE ------------------ $G_{12}$ (lb/in$^2$)

SHEAR MODULUS IN THE 1-3 PLANE ------------------ $G_{13}$ (lb/in$^2$)

SHEAR MODULUS IN THE 2-3 PLANE ------------------ $G_{23}$ (lb/in$^2$)

DENSITY ---------------------------- (lb/in$^3$)

COEFFICIENT OF THERMAL EXPANSION IN GRAIN DIRECTION ---- $\alpha_1$(in/in/°F)

COEFFICIENT OF THERMAL EXPANSION IN TRANSVERSE DIRECTION -- $\alpha_2$(in/in/°F)

MATERIAL DATE

SPECIFICATIONS DATE

WEIGHTS DATE

STRESS DATE

TECH STAFF APPROVAL DATE

FIG. 20

| | | | | | | | |
|---|---|---|---|---|---|---|---|
| 690 | 85 | 510TE0001ILYUP010102 | 14 | 664.337 | -0.000 | -12.108 | 7202 |
| 700 | 86 | 510TE0001ILYUP010102 | 15 | 931.679 | -0.000 | -12.000 | 7202 |
| 710 | 87 | 510TE0001ILYUP010102 | 16 | 675.929 | -0.000 | -12.110 | 7202 |
| 720 | 88 | 510TE0001ILYUP010102 | 5 | 931.679 | -0.000 | -12.000 | 7202 |
| 730 | 89 | 510TE0001ILYUP010102 | 17 | 931.679 | -0.000 | -12.000 | 7202 |
| 740 | 90 | 510TE0001ILYUP010101 | 5 | 931.679 | -0.000 | -12.000 | 7202 |
| 750 | 91 | 510TE0001ILYUP010102 | 18 | 687.395 | -0.000 | -12.111 | 7202 |
| 760 | 92 | 510TE0001ILYUP010101 | 25 | 931.679 | -0.000 | -12.000 | 7202 |
| 770 | 93 | 510TE0001ILYUP010102 | 19 | 931.679 | -0.000 | -12.000 | 7202 |
| 780 | 94 | 510TE0001ILYUP010102 | 20 | 475.740 | 0.000 | -12.164 | 7202 |
| 790 | 95 | 510TE0001ILYUP010102 | 17 | 931.679 | -0.000 | -12.000 | 7202 |
| | | TOTAL | | 46481.367 | | | |
| | | | MASS | | -0.000 | -12.044 | |

| MATERIAL | TOTAL AREA | TOTAL WEIGHT |
|---|---|---|
| 7250 | 931.679 | 0.391 |
| 7202 | 45549.691 | 18.876 |

FIG. 40

PLY TABLE:-101 PAGE 1

| SEQUENCE NUMBER SXXX | LAYUP NUMBER LXXX | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | 45° | P2 | | | | |
| | | -45° | P3 | | | | |
| | | 0° | P4 | | | | |
| S15 | L2 | 90° | P1 | 7201 | | | A |
| | | 0° | P2 | | | | |
| S20 | L29 | -45° | P1 | 7201 | | | |
| | | 45° | P2 | | | | |
| S30 | L15,L21 | 0° | P1 | 7202 | | | |
| | | 90° | P2 | | | | |
| | L56 | 0° | P1 | 60XX | | | |
| | L97,L98, L99 | 0° | P1 | 7202 | | | |
| | | 45° | P2 | | | | |
| | | -45° | P3 | | | | |
| | | 90° | P4 | | | | |
| | L132 | -45° | P1 | 7202 | | | |
| | | 45° | P2 | | | | |
| S40 | L1 | 90° | P1 | 7201 | | | |
| | | 45° | P2 | | | | |
| | | -45° | P3 | | | | |
| | | 0° | P4 | | | | |
| S31 | L32 | 22.5° | P1 | 50XX | | | A |
| | | | P1 | | | | |
| | | | P2 | | | | |
| | | | P3 | | | | |
| | | | P4 | | | | |
| | | | P5 | | | | |

PLY TABLE:-102 OPPOSITE PAGE 1

| SEQUENCE NUMBER [SXXX] | LAYUP NUMBER [LXXX] | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | -45° | P2 | | | | |
| | | 45° | P3 | | | | |
| | | 0° | P4 | | | | |
| S15 | L2 | 90° | P1 | 7201 | | | A |
| | | 0° | P2 | | | | |
| S20 | L29 | 45° | P1 | 7201 | | | |
| | | -45° | P2 | | | | |
| S30 | L15,L21 | 0° | P1 | 7202 | | | |
| | | 90° | P2 | | | | |
| | L56 | 0° | P1 | 60XX | | | |
| | L97,L98, L99 | 0° | P1 | 7202 | | | |
| | | -45° | P2 | | | | |
| | | 45° | P3 | | | | |
| | | 90° | P4 | | | | |
| | L132 | 45° | P1 | 7202 | | | |
| | | -45° | P2 | | | | |
| S40 | L1 | 90° | P1 | 7201 | | | |
| | | -45° | P2 | | | | |
| | | 45° | P3 | | | | |
| | | 0° | P4 | | | | |
| S31 | L32 | -22.5° | P1 | 50XX | | | A |

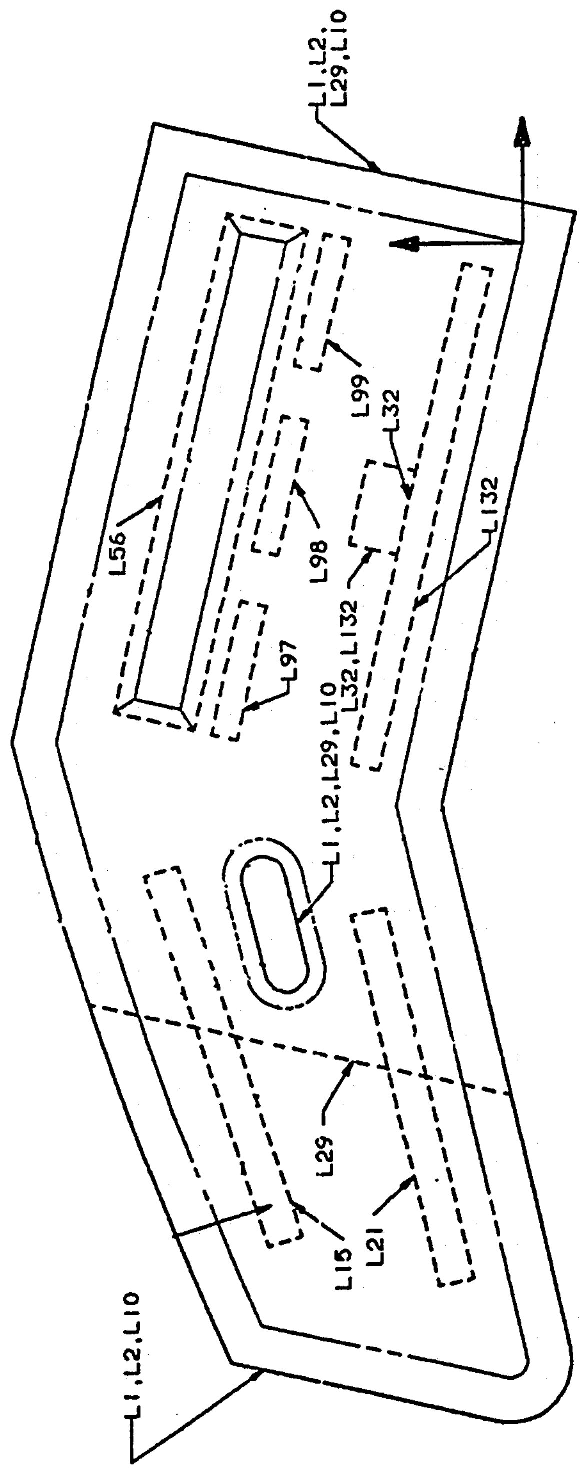
FIG. 42

PLY TABLE:-102 OPPOSITE PAGE 1

| SEQUENCE NUMBER [SXXX] | LAYUP NUMBER [LXXX] | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | -45° | P2 | | | | |
| | | 45° | P3 | | | | |
| | | 0° | P4 | | | | |
| S15 | L2 | 90° | P1 | 7201 | | | A |
| | | 0° | P2 | | | | |
| S20 | L29 | 45° | P1 | 7201 | | | |
| | | -45° | P2 | | | | |
| S30 | L15,L21 | 0° | P1 | 7202 | | | |
| | | 90° | P2 | | | | |
| | L56 | 0° | P1 | 60XX | | | |
| | L97,L98, L99 | 0° | P1 | 7202 | | | |
| | | -45° | P2 | | | | |
| | | 45° | P3 | | | | |
| | | 90° | P4 | | | | |
| | L132 | 45° | P1 | 7202 | | | |
| | | -45° | P2 | | | | |
| S40 | L1 | 90° | P1 | 7201 | | | |
| | | -45° | P2 | | | | |
| | | 45° | P3 | | | | |
| | | 0° | P4 | | | | |
| S31 | L32 | -22.5° | P1 | 50XX | | | A |

PLY TABLE:-101 PAGE 1

| SEQUENCE NUMBER [SXXX] | LAYUP NUMBER [LXXX] | TAPE FABRIC OR FABRIC WRAP ORIENTATION | PLY (P) NUMBER | MATERIAL | NOTES | SPLICE CONTROL | REV |
|---|---|---|---|---|---|---|---|
| S10 | L1 | 90° | P1 | 7201 | | XX | |
| | | 45° | P2 | | | | |
| | | -45° | P3 | | | | |
| | | 0° | P4 | | | | |
| S15 | L2 | 90° | P1 | 7201 | | | A |
| | | 0° | P2 | | | | |
| S20 | L29 | -45° | P1 | 7201 | | | |
| | | 45° | P2 | | | | |
| S30 | L15, L21 | 0° | P1 | 7202 | | | |
| | | 90° | P2 | | | | |
| | L56 | 0° | P1 | 60XX | | | |
| | L97, L98, L99 | 0° | P1 | 7202 | | | |
| | | 45° | P2 | | | | |
| | | -45° | P3 | | | | |
| | | 90° | P4 | | | | |
| | L132 | -45° | P1 | 7202 | | | |
| | | 45° | P2 | | | | |
| S40 | L1 | 90° | P1 | 7201 | | | |
| | | 45° | P2 | | | | |
| | | -45° | P3 | | | | |
| | | 0° | P4 | | | | |
| S31 | L32 | 22.5° | P1 | 50XX | | | A |
| | | | P1 | | | | |
| | | | P2 | | | | |
| | | | P3 | | | | |
| | | | P4 | | | | |
| | | | P5 | | | | |

COPYRIGHT (C) 1986 THE BOEING COMPANY
ALL RIGHTS RESERVED

SLIC VERSION 2.5
PIERCE TBLE FOR DASH # ( 1)
PT# 9 X= -172.621 Y= 315.030
LAYUP DEFINED FROM TOOL SIDE

| | SEQ | LAYUP | THICK | MATL | PLY ORIENTATONS |
|---|---|---|---|---|---|
| 1 | 20 | 6 | 0.0075 | 7250 | 45.0, |
| 2 | 30 | 13 | 0.0074 | 7202 | 90.0, |
| 3 | 40 | 14 | 0.0074 | 7202 | 90.0, |
| 4 | 50 | 175 | 0.0074 | 7202 | 45.0, |
| 5 | 60 | 16 | 0.0074 | 7202 | -45.0, |
| 6 | 70 | 24 | 0.0074 | 7202 | 4.5, |
| 7 | 80 | 33 | 0.0074 | 7202 | 4.5, |
| 8 | 90 | 35 | 0.0074 | 7202 | 45.0, |
| 9 | 100 | 36 | 0.0074 | 7202 | -45.0, |
| 10 | 110 | 71 | 0.0074 | 7202 | 4.5, |
| 11 | 120 | 83 | 0.0074 | 7202 | 4.5, |
| 12 | 130 | 61 | 0.0074 | 7202 | 45.0, |
| 13 | 150 | 62 | 0.0074 | 7202 | -45.0, |
| 14 | 210 | 106 | 0.0074 | 7202 | 45.0, |

```
ET = (EX * T)                           =  0.5397E+07
TOTAL THICKNESS                         = 0.5625 IN
LONGITUDINAL MODULUS (E1) EX            =  0.9595D+07 PSI
TRANSVERSE MODULUS   (E2) EY            =  0.4805D+07 PSI
SHEAR MODULUS        (G12) GXY          =  0.3655D+07 PSI
POISSON'S RATIO      (NU12) VXY         = .5572
POISSON'S RATIO      (NU21) VYX         = .2791
LONGITUDINAL C.T.E. ALPHA X             =  0.2851D-06 IN/IN/DE
TRANSVERSE C.T.E.   ALPHA Y             =  0.4811D-06 IN/IN/DE
APPARENT SHR C.T.E. ALPHA XY            = -0.4350D-07 IN/IN/DE
```

| A | B |
|---|---|
| B | D |

THE ELEMENTS IN THE STIFFNESS MATRIX ARE:

| | | | | | |
|---|---|---|---|---|---|
| 0.6391D+07 | 0.1783D+07 | 0.3778D+06 | 0.2342D+04 | 0.1541D+04 | 0.1018D+05 |
| 0.1783D+07 | 0.3201D+07 | 0.1947D+06 | 0.1541D+04 | 0.2183D+04 | 0.1017D+05 |
| 0.3778D+06 | 0.1947D+06 | 0.2056D+07 | 0.1018D+05 | 0.1017D+05 | 0.2056D+04 |
| 0.2342D+04 | 0.1541D+04 | 0.1018D+05 | 0.1481D+06 | 0.4485D+05 | 0.1127D+05 |
| 0.1541D+04 | 0.2183D+04 | 0.1017D+05 | 0.4485D+05 | 0.1078D+06 | 0.5839D+04 |
| 0.1018D+05 | 0.1017D+05 | 0.2056D+04 | 0.1127D+05 | 0.5839D+04 | 0.5194D+05 |

```
TOTAL PLYS BY ORIENTATION
  45.0 =   26  34.2%        TOTAL =   76
  90.0 =    4   5.3%
 -45.0 =   20  26.3%
   4.5 =   18  23.7%
   0.0 =    8  10.5%
```

FIG. 44 CONT.

METHOD AND APPARATUS FOR THE DESIGN AND CONSTRUCTION OF COMPOSITE PARTS

CROSS REFERENCE TO RELATED APPLICATION

This application is a continuation of U.S. application Ser. No. 270,310 filed Nov. 10, 1988, now abandoned, which is a continuation of Ser. No. 037,141 filed Apr. 10, 1987, now U.S. Pat. No. 4,849,913.

TECHNICAL FIELD

This invention relates to improved methods and systems for the design and construction of composite parts, and more particularly, to an automated system for integrating the design, analysis and manufacture of composite parts.

BACKGROUND ART

In certain applications, parts composed primarily of composite materials have significant advantages. A composite airplane wing, for example, can provide twice the life of a conventional metal wing with no increased weight, and, at the same time, provide increased operational capabilities.

Composite parts are fabricated using several layers of composite materials, or plies, that are assembled and cured to form a laminate. The composite material is commonly a fabric or tape that is comprised of fibers having a common orientation. Each layer of this material will have a set fiber orientation along an orientation axis with structural properties that vary in accordance with the relationship to the orientation axis.

The designer of a composite part can combine layers of this material in defined orientations to produce the desired structural properties for the part. Additional layers of material can be added at locations requiring increased strength and the layers can be oriented to maximize resistance in critical load directions.

Thus, each ply of material has several attributes that must be specified by the designer;

(1) the geometric boundary of perimeter shape of the ply must be defined;

(2) the orientation of the fibers for each ply must be defined;

(3) the position of the ply with respect to the other plies in the part (sometimes called the "stacking position") must be defined. A composite part, such as an airplane wing segment, for example, may be defined by more than 2,000 unique plies.

The design of composite parts is much more complex than designing parts to be fabricated from a homogeneous material, such as metal. Currently, the time required to design, iterate, analyze and program composite parts for fabrication is very high. Because of this complexity, neither human intervention nor manual input can assure that the part will be manufactured as designed.

DISCLOSURE OF THE INVENTION

It is an object of the present invention to provide a method and system for automatically generating a sequence book illustrating how to lay down plies during construction of a composite part.

It is another object of this invention to provide a method and system allowing improved structural interrogation of composite parts at various "pierce points."

It is a further object of this invention to provide an improved method and system for automatically feeding data on composite parts into a finite element modeler.

It is another object of this invention to provide an improved method and system for automatically calculating and tabulating the ply weights for individual plies of a composite part and the total weight and centroid of such parts.

It is another object of the invention to provide an improved method and system for reviewing cross sections of composite parts at selected locations and generating corresponding layer and thickness plots.

It is another object of this invention to provide an improved method and system for automatically generating tool paths to cut out the plies of a composite part from sheets of ply material.

It is another object of this invention to provide such an improved method and system which will interface with existing nesting products, such as PINS by Precision Nesting Systems, Inc., of Demarest, N.J.

These and other objects of the invention, which will become more apparent as the invention is described more fully below, are obtained by providing an improved system and method. In a preferred embodiment, a System Logic for Integrated Composites (SLIC) system is designed to take engineering composite drawings released in a computer-aided design (CAD) data set, determine the attributes of each of the plies into its composite drawing, and pass the information on to using organizations.

Not only does the information need to be released to all operations organizations, but it also needs to be communicated within engineering groups, such as stress analysis groups. SLIC bridges the gap between engineering, manufacturing, and quality assurance disciplines.

In preferred embodiments, such as SLIC, the system logically determines the geometric definitions for each ply contained in a composite part. If a ply is not completely defined, SLIC reports the error to the user. Automatic error checking assures the designer that the design is of the quality required to meet downstream operations data requirements.

Analysis of the physical properties of a part is also provided to the technical engineering staff. This analysis data may be passed directly from SLIC to NASTRAN, which is an engineering stress analysis system provided by The Mac Neal-Schwendler Corporation of Los Angeles, Calif. Computation of the total part weight and centroid location is performed by the system.

Additionally, SLIC creates detailed engineering models of each composite ply, based upon the complete composite design. SLIC interprets the design and passes it directly to manufacturing, thus automating the design/build process. Because SLIC forces the designer to correct all geometric definitions, there is a resultant savings in time and money because of reduced errors passed from engineering to manufacturing.

SLIC generates an enormous amount of valuable data that can save thousands of person-hours on a design and build project. Examples of useful data include pierce point data that presents the thickness and properties of the part at any specific location; creation of a table that defines the area, weight and centroid of each ply; a sequence book that supplies the geometry and the order in which the plies are to be placed on a cutting tool; a section view at any location on the part; and point-topoint information to drive numerical control machines in the factory. This information can be used to drive fabric cutters, such as a Gerber Knife, laser inspection machines, and other tools.

BRIEF DESCRIPTION OF THE DRAWINGS

FIG. 5B is an illustration of several unique ply shapes on a common drawing.

FIG. 5C is an illustration of the plies of FIG. 5B, as determined by visual interrogation.

FIG. 5D illustrates the plies of FIG. 5B with ply 1 highlighted.

FIG. 5E is an illustration of FIG. 5E after step 1 of the Build Ply logic has been applied.

FIG. 5F is an illustration of FIG. 5E after step 2 of the logic has been applied.

FIG. 5G is an illustration of FIG. 5F after step 3 of the logic has been applied.

FIG. 6 is a flow chart illustrating the operation of the Generate Ply Point Definition routine.

FIG. 14 is an isometric view illustrating a typical ply, layup, and sequence.

FIG. 16 is an illustration of arrowheads on elements in a composite drawing.

FIG. 17 is an illustration of relief cuts in a layup.

FIG. 18 is an illustration of duplicate elements, overlapping elements, and gaps between elements.

FIG. 20 is an illustration of a material definition sheet.

BEST MODE FOR CARRYING OUT THE INVENTION

A preferred embodiment of the present invention is implemented on an IBM 4381 Series computer using the MVS.XA Operating System in conjunction with CADAM Version II, Release 20.0, and above by means of a software system known as "System Logic for Integrated Composites," or "SLIC." An object code listing for SLIC is provided in Table I of this application. The CADAM system is available from Cadam, Inc., of Burbank, Calif. The SLIC system also calls routines from the "BCS LIB - Math/Stat/Utility Subprogram Library," available from Boeing Computer Services of Bellevue, Wash. SLIC calls the following routines (and any supporting routines) from BCS LIB: ISRCHV; ISRCH; KOMPRV; HGTIME; HGDATE; HQRWZERO; PROOT; HDGELE; MWGETP; and CHARFL.

Figure 51:
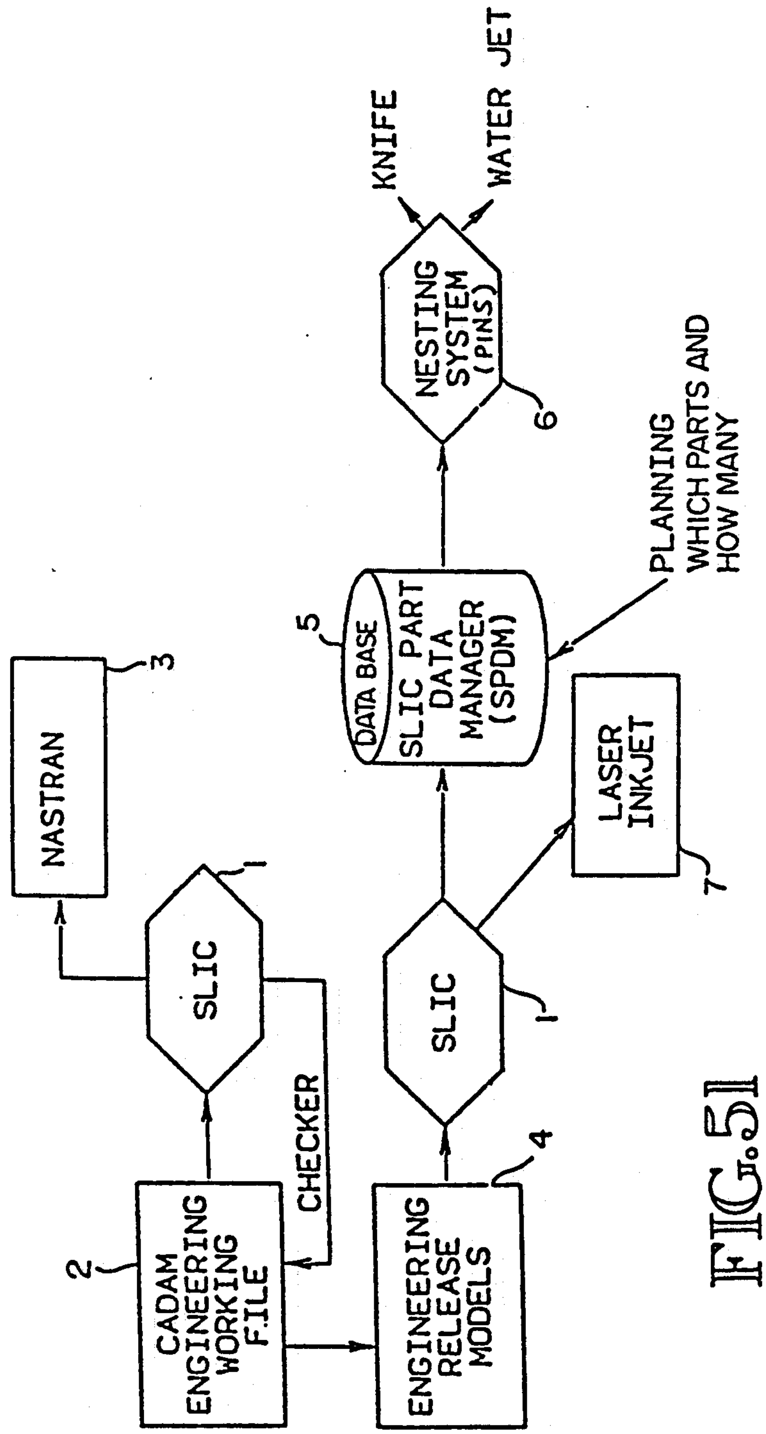
FIG. 51 is a flow chart illustrating the SLIC system as it interfaces with other systems.

The interface of SLIC with existing systems is illustrated in FIG. 51. SLIC 1 takes data from the CADAM Engineering Work File 2 and checks it for accuracy. Data from SLIC can be passed on to NASTRAN 3 for finite element analysis of composite parts. Composite part models 4 that have been released by engineering or other design groups are taken by SLIC and used to generate additional information, as discussed in more detail below. SLIC will calculate part information which is stored in a SLIC part data base manager 5, where it can be used by existing nesting systems, such as PINS 6. Data generated by SLIC can interface with a laser, inkjet or other numerical control equipment 7.

Figure 1:
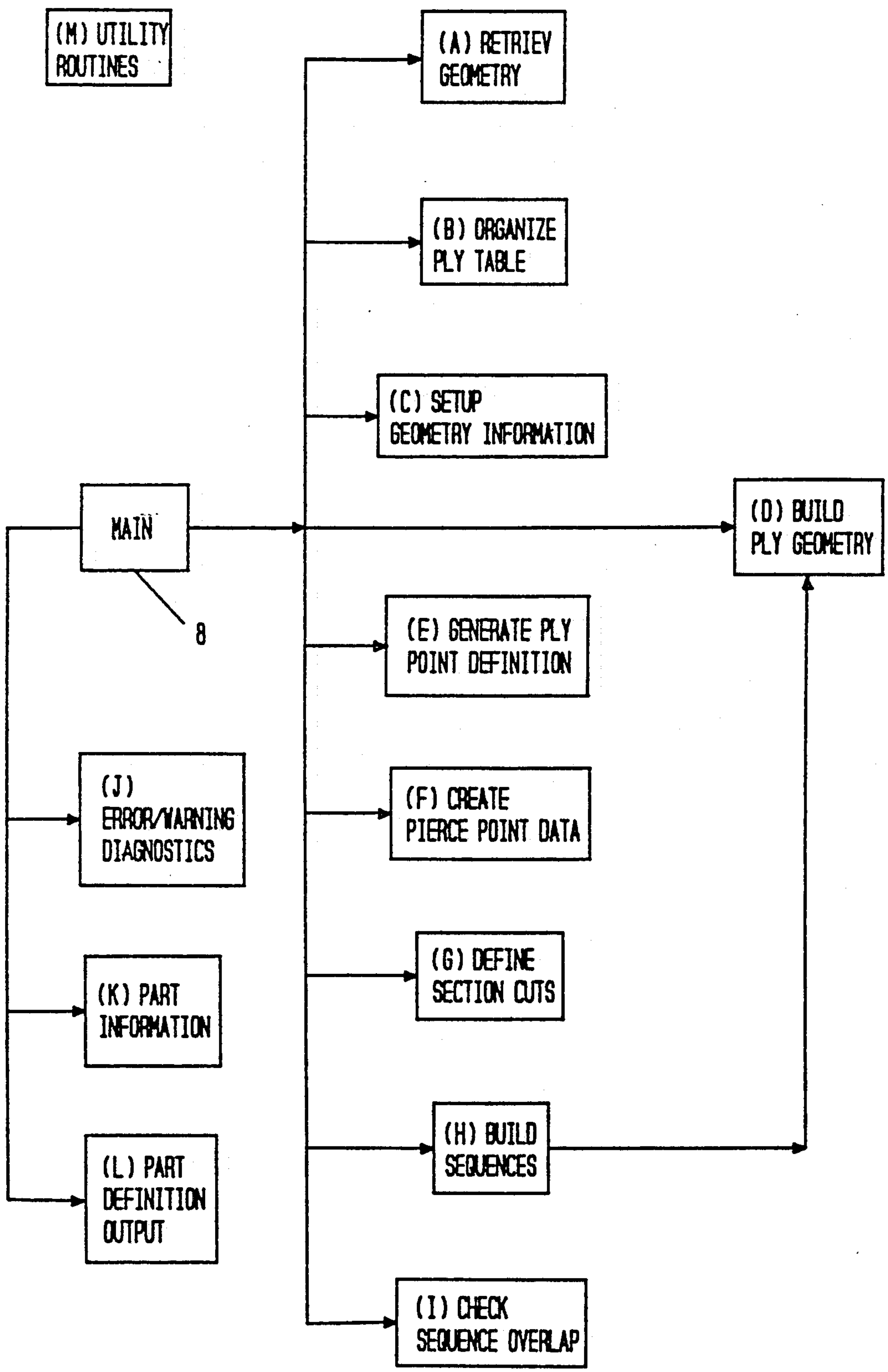
FIG. 1 is a flow diagram illustrating the operation of the routines within the SLIC system.
Figure 2:
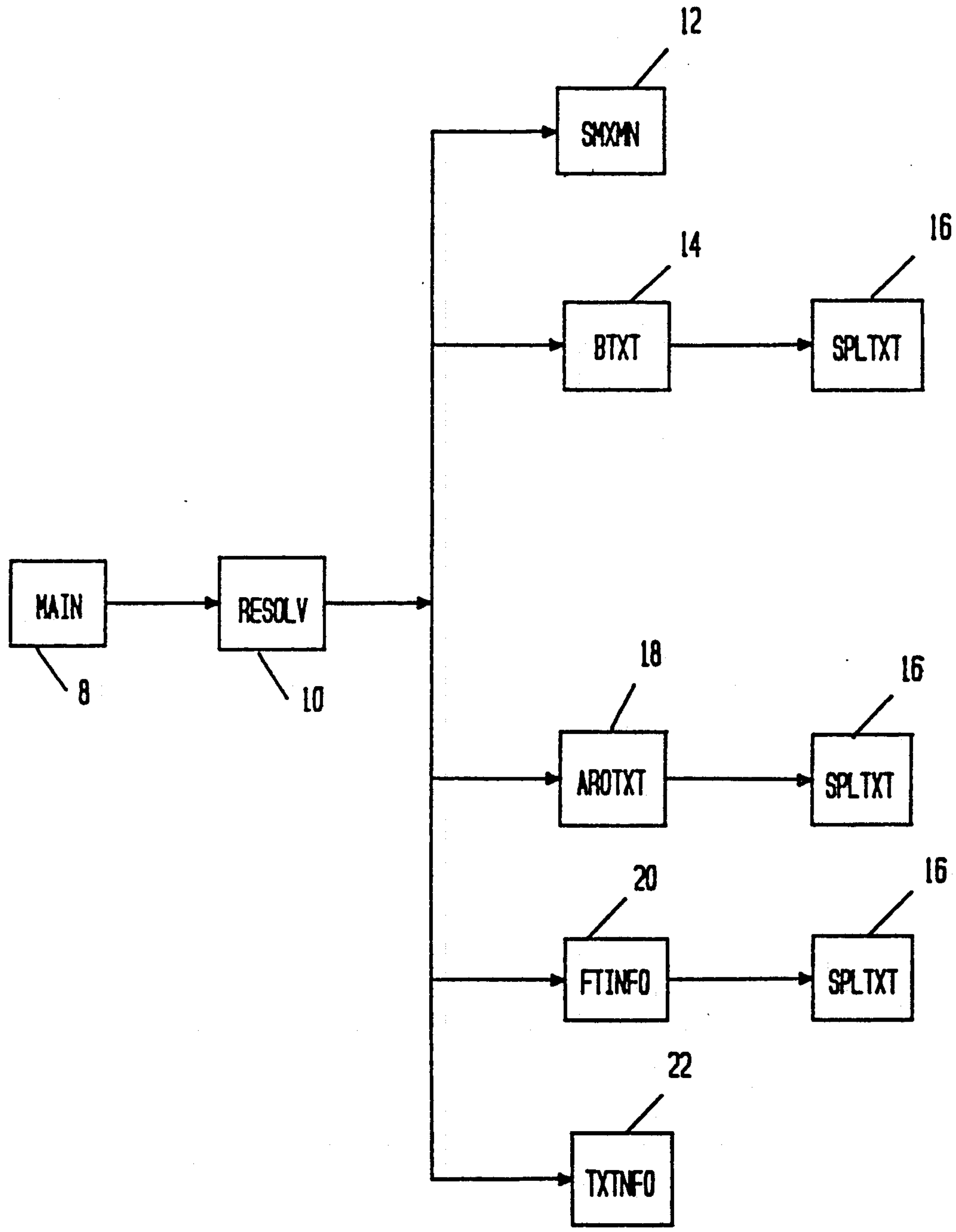
FIG. 2 is a flow diagram illustrating the operation of the Retrieve Geometry routine.
Figure 3:
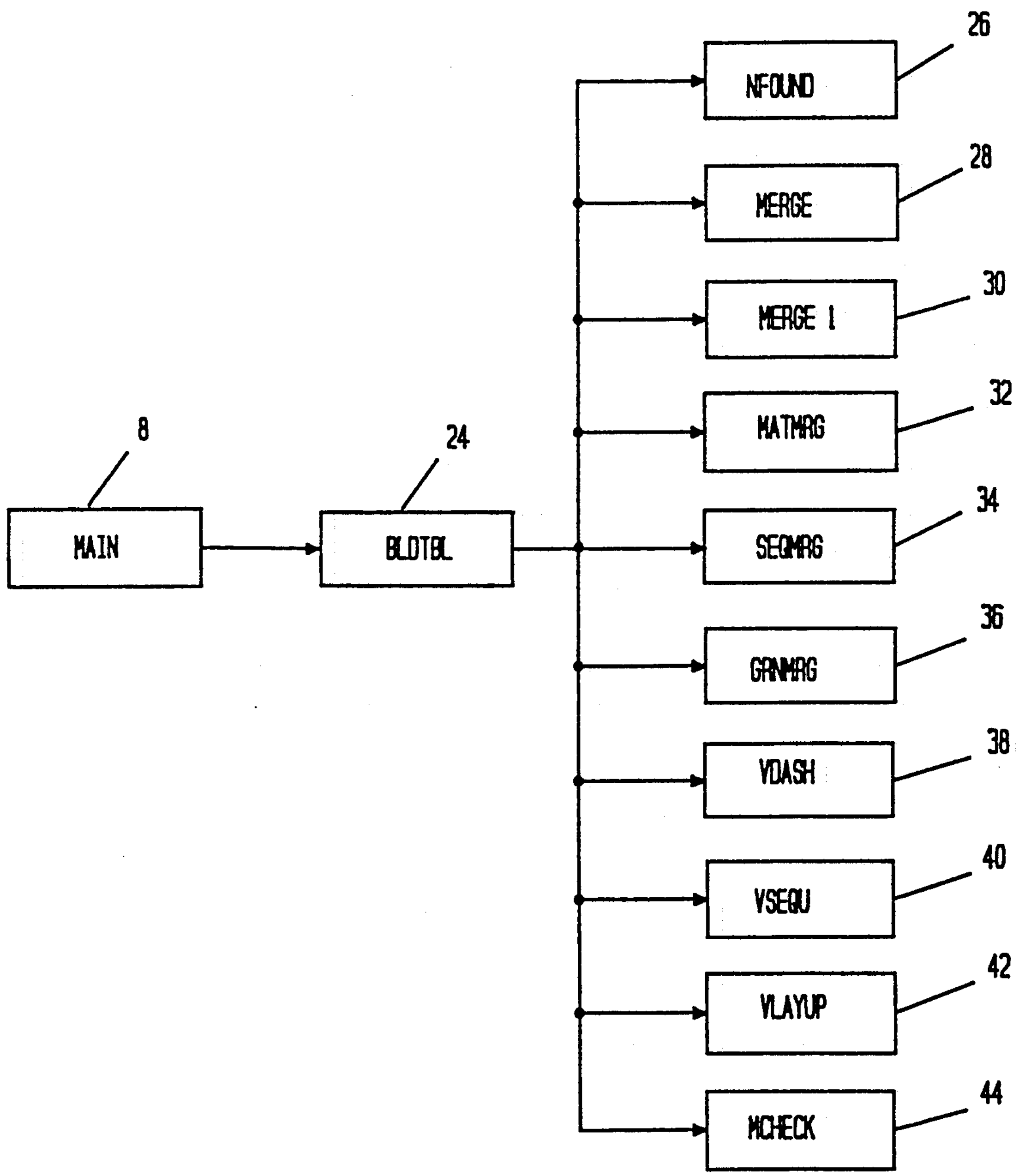
FIG. 3 is a flow diagram illustrating the operation of the Organize Ply Table routine.
Figure 4:
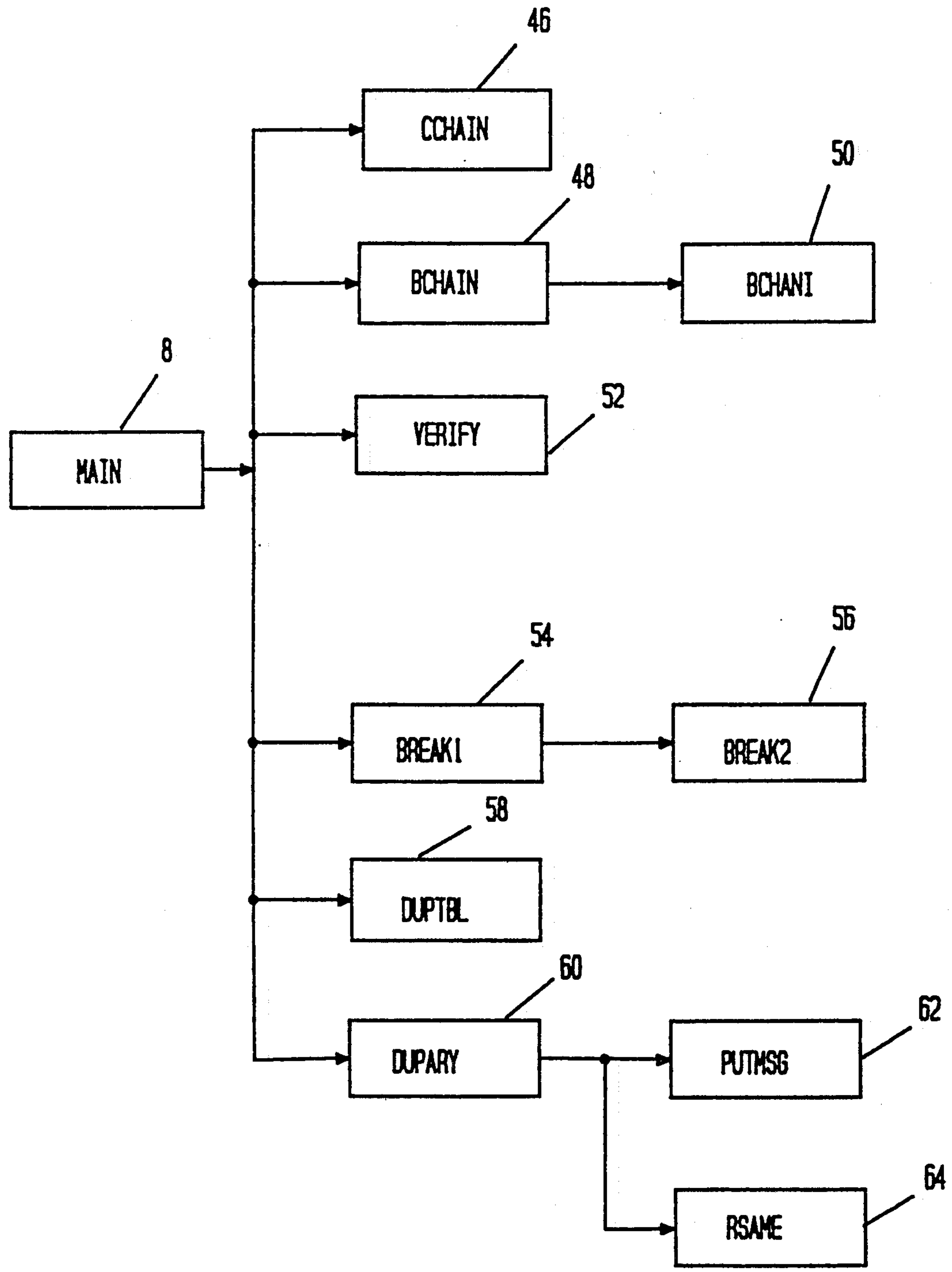
FIG. 4 is a flow diagram illustrating the operation of the Set Up Geometry Information routine.

The overall design and operation of SLIC is illustrated in the flow chart of FIG. 1. Function blocks of SLIC have been labeled A-M, with corresponding flow charts for each block illustrated in FIGS. 2-13. The Main routine 8 is the main routine for the entire SLIC system. This routine calls all of the driver routines described below. The total area and centroid of a part is calculated in the Main routine.

A. RETRIEVE GEOMETRY (FIG. 2)

These routines are used to retrieve and store geometry and text information. This information is formatted and used downstream by the various SLIC routines to output the required data. The information is stored in FORTRAN arrays.

Routine RESOLV (10)

SLIC interacts with the CADAM model retrieving and storing information. An understanding of this process can be found in the CADAM Geometry Interface Installation Guide. RESOLV contains several FORTRAN entry points which receive information, such as geometric and text data, from the CADAM model. This information is stored in several arrays to be used by SLIC.

Routine SMXMN (12)

This routine calculates the maximum and minimum XY values of a CADAM spline. The maximum and minimum values for each bay in the spline are also calculated. This information is used downstream by the break routines to determine if an element's end points break the spline.

Routine BTXT (14)

This routine analyzes text from the ply table, breaks it up, and places it in the proper arrays. The array information will be used in other routines to determine the proper format of the ply table.

Routine SPLTXT (16)

This routine splits up the text passed to it. If a dash (—) is found between two values, the range of numbers will be generated (i.e., L1-L4 will generate 1, 2, 3, 4). The numbers generated will be placed in a return array.

Routine AROTXT (18)

This routine breaks up the text found on CADAM arrow heads. Arrowheads are used to define the logical path of the geometry of the engineering drawing. Arrowheads are also used to define pierce points. This routine will determine what kind of information has been found and place it in the proper arrays.

Routine FTINFO (20)

This routine analyzes text in the sequence format model and stores the data in the proper arrays. This information will be used in the routines that build sequence pages. An explanation of the kind of text found in the sequence format models can be found in the Using SLIC section below.

Routine TXTNFO (22)

This routine analyzes and breaks up the attribute text found on the section cut lines. An explanation of section cuts can be found in the Using SLIC section below.

(B) ORGANIZE PLY TABLE (FIG. 3)

These routines will organize the standard ply table information in a format to be used in SLIC. If the information has been improperly defined, error messages will be generated.

Routine BLDTBL (24)

This routine is the driver routine for formatting or merging all of the information into standard ply tables. The location of notes is critical to the building of the table. Each dash number/page number note will determine the grouping for each ply table page. If a ply table information note is placed too far away from a dash number/page number note an ERROR message will be generated. This distance can vary depending on the width of the ply table page desired. A sample picture and a brief explanation of the ply table can be found in the Using SLIC section, below. The Users' Manual also defines the ERROR messages that may be generated by these routines.

The ply table is important to SLIC because it defines how the composite part is to be built on the tool.

Ply Table Note Definitions

The ply table notes for SLIC have been placed in a separate CADAM view to avoid confusion with notes in other views.

Ply Table: - 101 page 1

Ply Table: - 102 opposite page 1

This note is used to define each ply table page. The word "opposite" used in the second note shown tells SLIC that an opposite hand part is being defined.

S20. This note is used to define each sequence number.

L10. This note is used to define each layup number.

45. This note is used to define orientation associated with a layup number. The value of the orientation must be followed by a degree symbol.

7250. This note is used to define the material code. This note must be four numberic characters.

Routine NFOUND (26)

This routine will determine if no ply chart information was found in the CADAM models flagged for the SLIC run. For example, if sequence numbers are not defined or placed in the proper view, an ERROR message will be generated.

Routine MERGE (28)

This routine will merge the sequence numbers, orientations, and material codes into all the ply table pages. Once the information is merged it will be sorted in Y decending order.

Routine MERGE1 (30)

This routine will merge the layup numbers into all the ply table pages. Once the information is merged it will be sorted in Y Y descending order.

Routine MATMRG (32)

This routine will match or merge the material codes with the proper layup number for each ply table page.

Routine SEQMRG (34)

This routine will match or merge the sequence numbers with the proper layup number for each ply table page.

Routine GRNMRG (36)

This routine will match or merge the orientations with the proper layup number for each ply table page.

Routine VDASH (38)

This routine will verify that dash number information has been defined properly. For example, page 1 may have been used more than once for a given dash number. ERROR messages will be generated if errors are found.

Routine VSEQU (40)

This routine will verify the sequence information to make sure valid values have been obtained.

If a duplicate sequence of numbers for a dash number is found, an ERROR message will be generated.

Routine VLAYUP (42)

This routine will verify the layup information to make sure valid values have been obtained. If a duplicate layup for a dash is found, a WARNING message will be generated. If duplicate layup is found for a dash with different material and/or rotations, an ERROR message will be generated. If a layup number is defined in the same sequence, an ERROR message will also be generated.

Routine MCHECK (44)

This routine checks the material code defined to see if that material has been defined to SLIC. The actual material code properties are defined in a routine called DEFINE.

If a material is not defined in SLIC, then a message will be generated.

(C) SET UP GEOMETRY INFORMATION (FIG. 4)

The information received from the RETRIEVE routines (Section (A)) is put in the arrays in a random fashion. These routines organize the arrays and set up additional arrays so that processing of the data can be accomplished by other sections.

Routines CCHAIN (46), BCHAIN (48), BCHAN1 (50)

These routines will order the array that contains the elements into groups of chained sections. A pointer array is set up that points to each section of chained elements. A section is considered chained when the end points chain to more than one element or do not chain to any elements.

Routine VERIFY (52)

This routine will look at all the arrow heads and find the element that the arrow head lies on. Then the chained section the arrowhead belongs to is identified and stored in an array. This routine assumes that the elements have been chained into sections by the chain routines. It also assumes the array containing the arrowheads has been sorted so all the arrowheads that are in the same location are next to each other in the arrowhead array.

Routine BREAK1 (54), BREAK2 (56)

These routines look through all the elements in the element array and determine if an element is a breaker element. If it is, a flag is placed on it. A breaker element is defined as an element that has one of its endpoints that lies on another element. This routine is only called once. By looping through all the elements once and placing flags on them, the process of breaking elements in the BLDPLY logic section (D) is greatly reduced. This is because all the elements don't need to be checked for breaking each time, only the ones with flags placed on them by these routines.

Routines DUPTBL (58), DUPARY (60), PUTMSG (62), RSAME (64)

These routines set up an array that points to the section of arrowheads that define a ply. When the main routine builds a specific ply, this array is searched by routine DUPARY and all plys that have arrowheads that point to the same sections are determined to have the same geometry. This saves reprocessing the plies that are identical.

(D) BUILD PLY GEOMETRY (FIG. 5)

These routines are called to build the geometry definitions for each of the plies. When engineering drawings are designed on a computer, the mathematical definitions for the plies can be extracted automatically and used for processes that need the definitions, such as planning, quality, numerical control (NC), programming, and engineering organizations like weights and the technical staff. The problem then is to identify all and only the elements that define the ply boundaries.

Build Ply Geometry operates using a process that, given the original input of geometry and arrowheads placed at logical positions so a person can visually determine where a ply is defined, a ply definition of elements limited to the actual edge of the closed boundary will result, thus producing a definition that can be used for all the disciplines requiring the ply definition. The example is a simple example to illustrate the concept, but the process will work on very complex ply definitions.

Figure 5A:
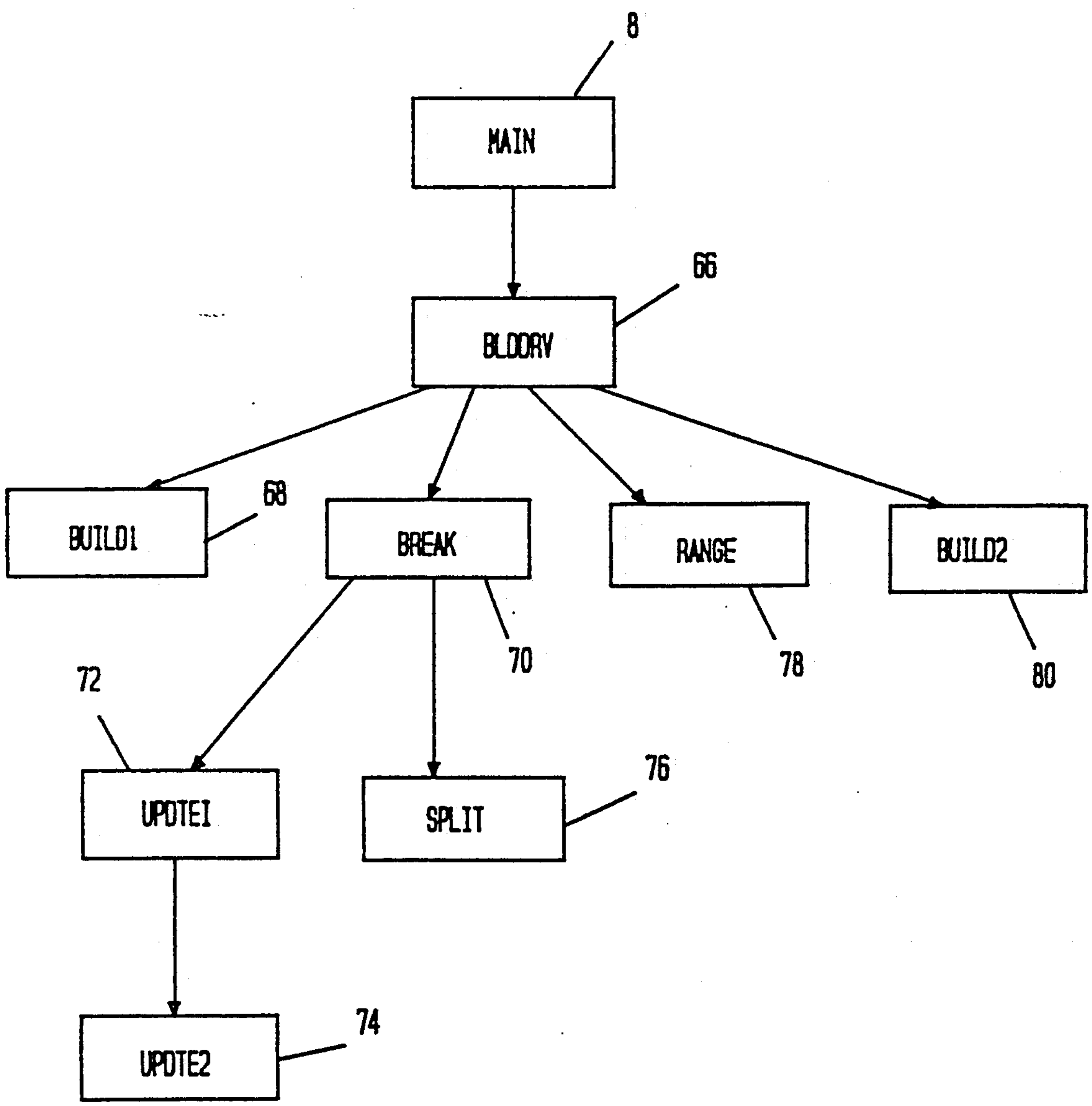
FIG. 5A is a flow diagram illustrating the operation of the Build Ply Geometry routine.
Figure 7:
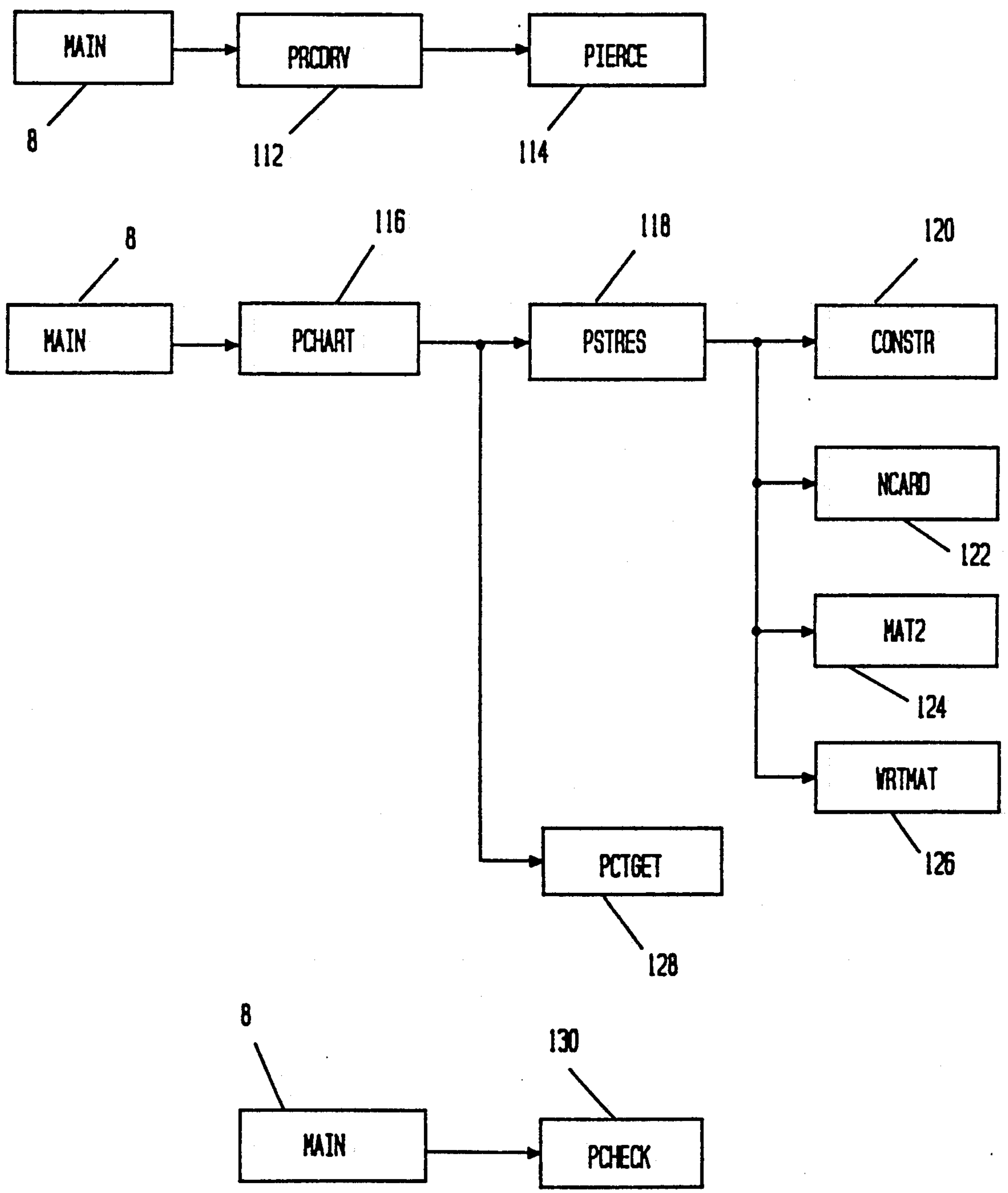
FIG. 7 is a flow chart illustrating the operation of the Create Pierce Point Definition routine.
Figure 8:
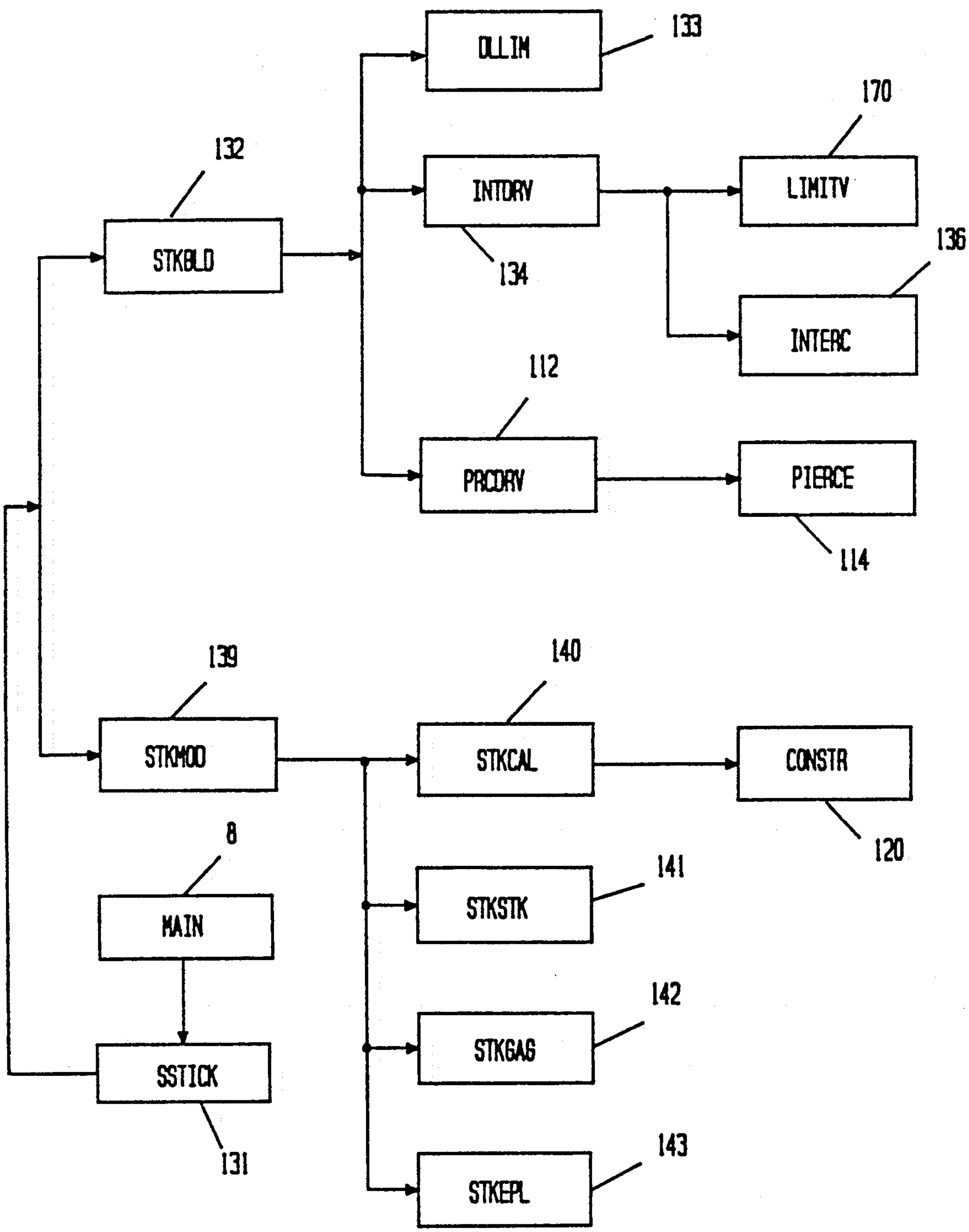
FIG. 8 is a flow chart illustrating the operation of the Define Section Cuts routine.
Figure 9:
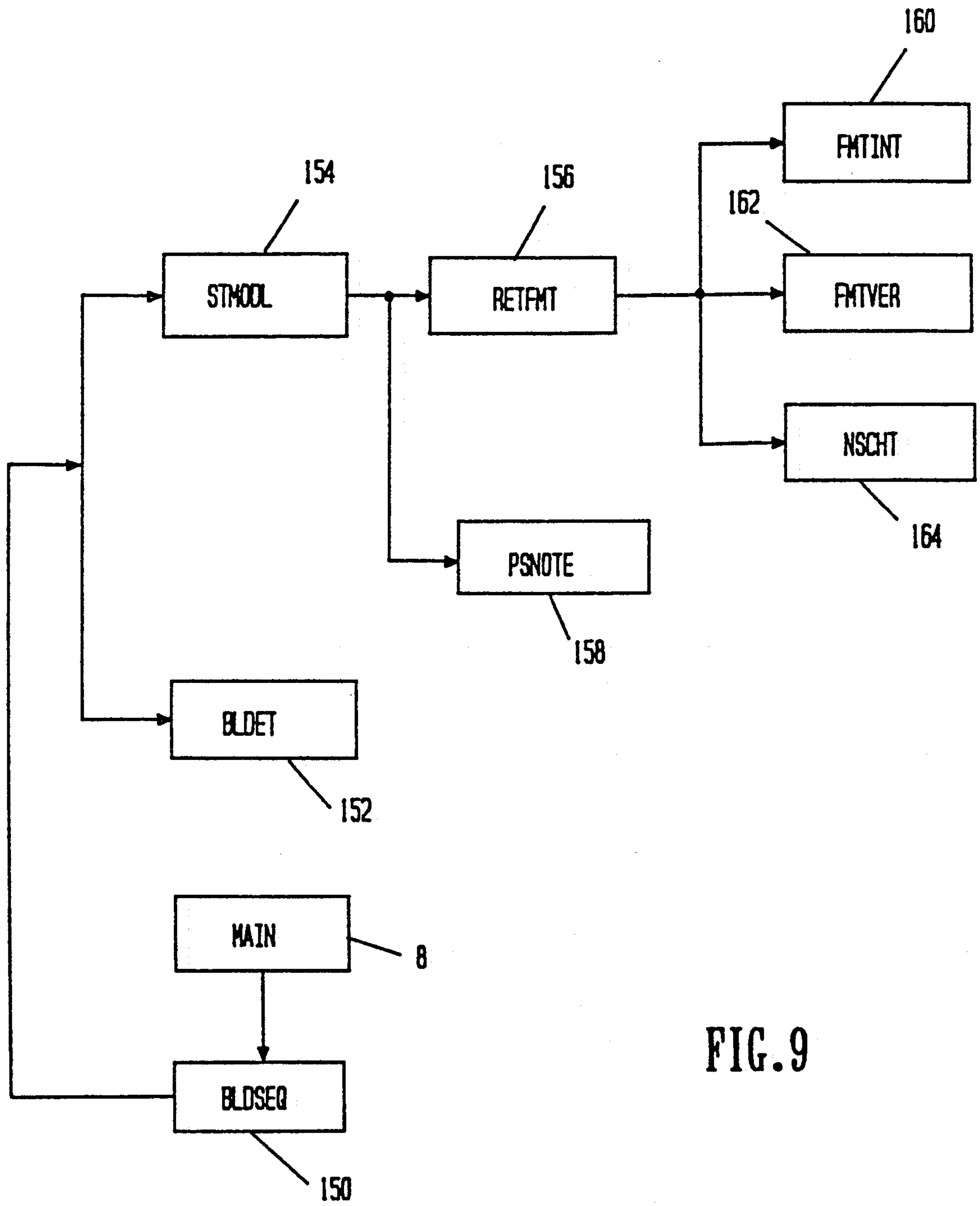
FIG. 9 is a flow chart illustrating the operation of the Build Sequences routine.
Figure 10:
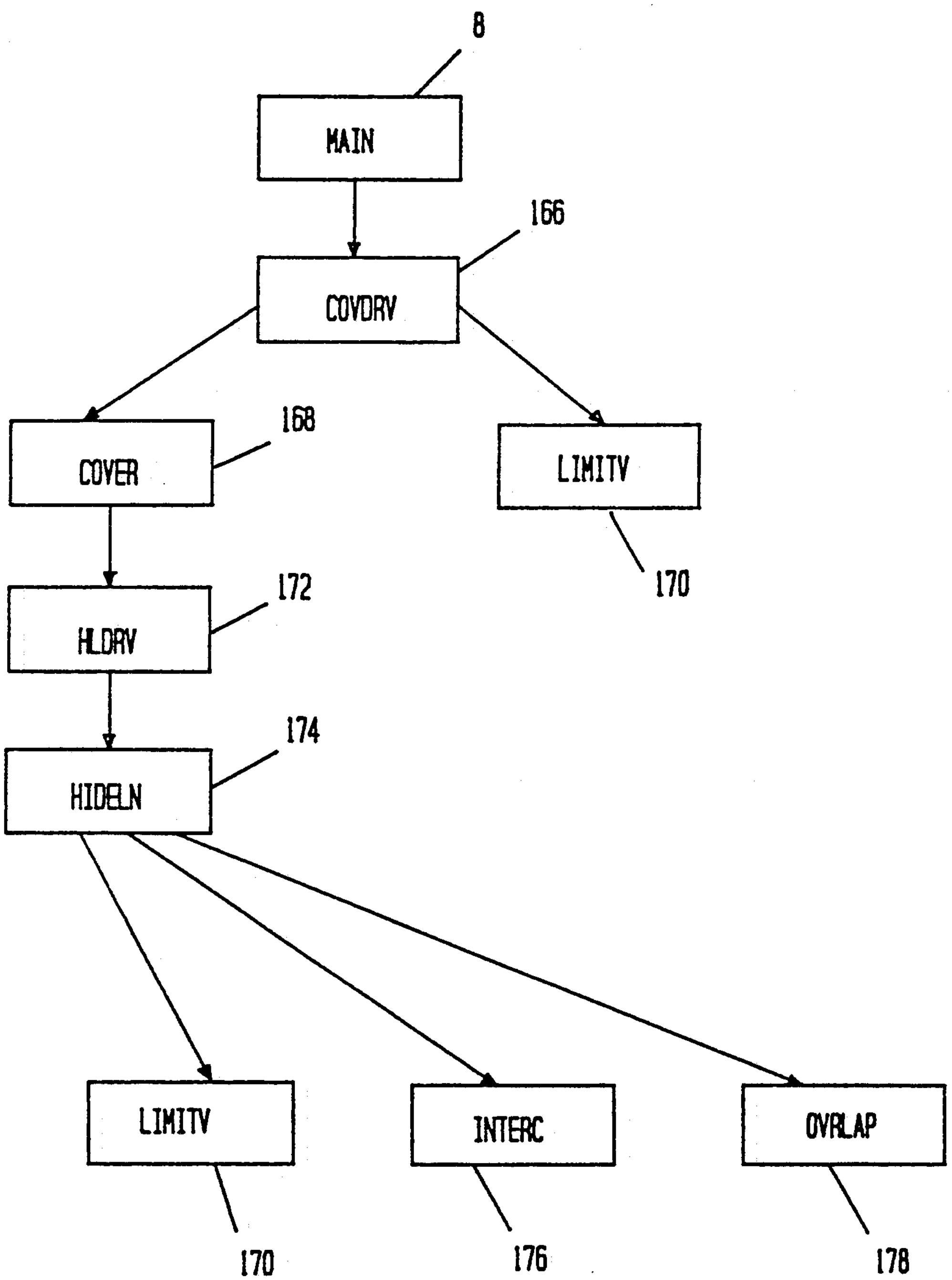
FIG. 10 is a flow chart illustrating the operation of the Sequence Overlap routine.
Figure 11:
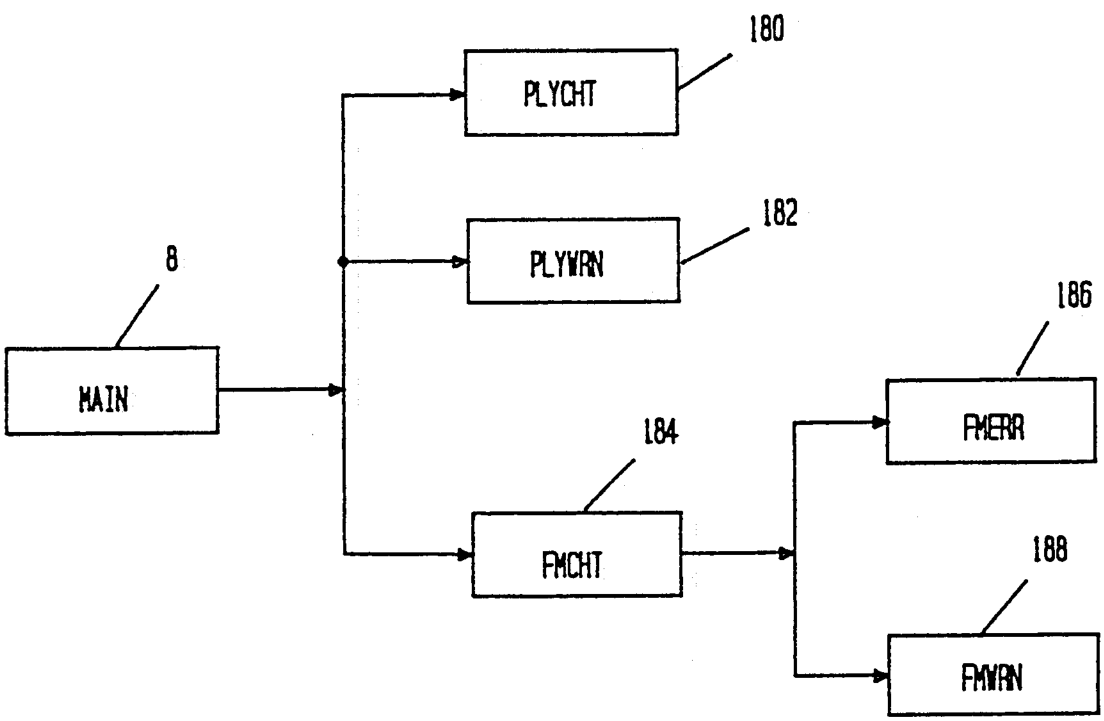
FIG. 11 is a flow chart illustrating the operation of the Error Diagnostic routine.
Figure 12:
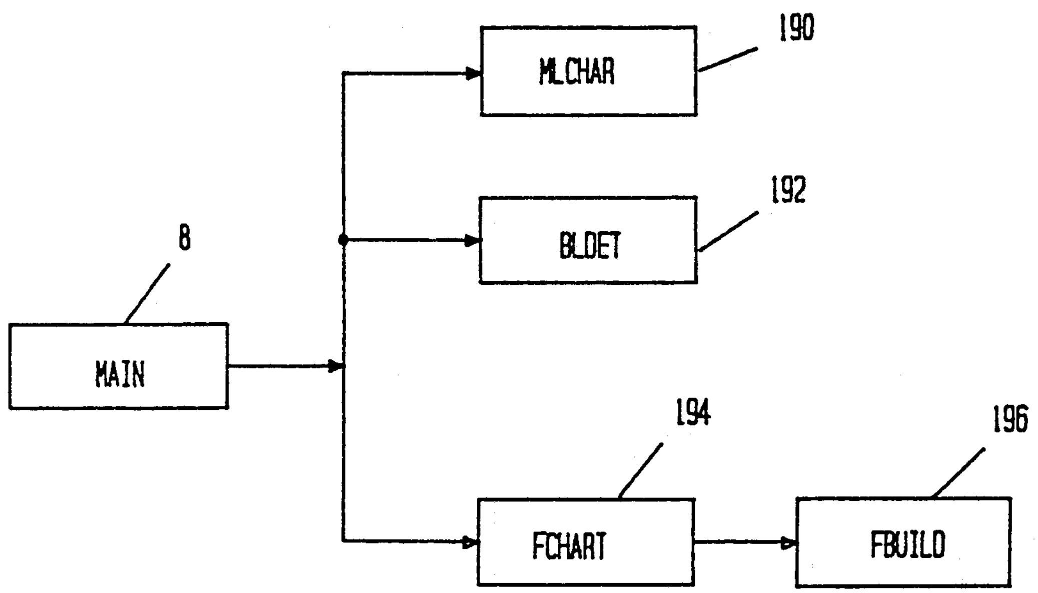
FIG. 12 is a flow chart illustrating the operation of the Part Information routine.
Figure 13:
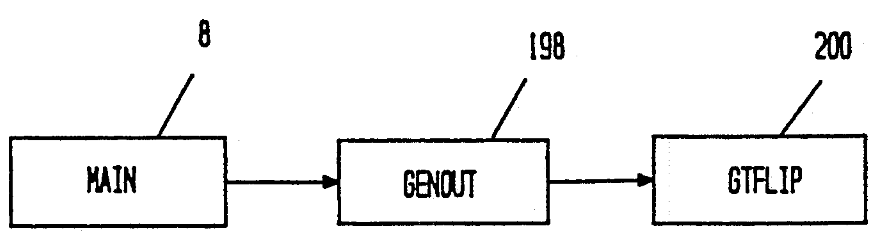
FIG. 13 is a flow chart illustrating the operation of the Part Definition Output routine.

FIG. 5B defines three unique ply shapes. FIG. 5C shows the ply definitions that would result from visual interrogation. The process for this invention will now be predented to illustrate the same results for ply 1 (FIG. 5D):

Step 1. The first step will identify each arrowhead for the ply with an element. Then those elements are chained together on each end point until the end point does not chain or chains to more than one element. This will result in the elements shown in FIG. 5E.

Step 2. Every element that is broken by the endpoint of another is then separated into two elements. For example: the vertical line will be broken (or divided) into two lines (FIG. 5F).

Step 3. The last step is almost identical to step 1 except because of the elements being broken the result will be a group of elements only defining ply 1 (FIG. 5G).

Several of the routines in the section are needed only to handle the arrays that are used in SLIC. The logic could be executed in various ways. The main routines for this section are BLDDRV, BUILD1, BREAK, BUILD2.

Routine BLDDRV (66)

This routine is the main driver for executing the build ply logic. The ply number that is to be built is passed in and an array of all the elements that make up the ply boundaries is returned. This routine assumes all the arrays have been set up previously by the Set Up Geometry routines described in section (C) above.

Routine BUILD1 (68)

This routine executes the first step of the build ply logic. All arrowheads for the specific ply are identified and connected to one of the elements in the model. Then the connecting elements to each end of the arrowhead elements are found until a branch or no chain is found. All these elements are placed in a table with pointers and flags to keep track of where they came from and what chained section they belong to. (See description of Step 1, FIG. 5E, above).

Routine BREAK (70)

This routine finds the elements that are to be broken and breaks the element by creating two elements in the table instead of one. The routine BREAK calls other routines that handle pointers and flags on the new elements. (See description of step 2, FIG. 5F, above).

Routine UPDTE1 (72), UPDTE2 (74), SPLIT (76), RANGE (78)

These routines are used for handling pointers and flags on elements. They are specific to the methods used to store the elements in the arrays and could be dependent on the various data array structures.

Routine BUILD2 (80)

This routine looks at the new sections that have been created by breaking elements. It determines what sections still have arrowheads on them and builds the final array of the elements making up the ply definition. It then passes the array back to the calling routine. (See description of step 3, FIG. 5G, above).

(E) GENERATE PLY POINT DEFINITION (FIG. 6)

This section of routines will generate strings of XY points that will define the shape of each layup or ply within a part. These points can be used for several applications, such as tracing or cutting the part on a numerical control machine.

Routine CANDO (82)

Routine CANDO is the main driver for generating the GOTO points for defining each layup or ply. This routine assumes the geometry for defining the plies has already been defined.

Routine CNDCHN (84)

This is the driver routine for routine CHAIN1. This routine will group all profile geometry together. If all geometry does not chain, the element end points where the chaining error is found will be tagged with a note.

At this point, the closed shapes have been grouped or chained together in their element form (lines, arcs, splines).

Routine CHAIN1 (86)

Routine CHAIN1 will chain the geometry by its end points. The array will be sorted in the order the geometry is chained. The first element to be chained should be at the top of the array. The array will be processed until the beginning point in the array is found again or until the end of the array is reached. If the end of the array is found before all the geometry chains, an ERROR message will be generated.

Routine POINTS (88)

This routine will break up the individual elements (lines, arcs, splines) into GOTO points. The GOTO points will be generated according to their chained order. The number of GOTO points generated is dependent on the cord height tolerance defined. Arrays will be set up to point to each set of GOTO points that define a profile or closed shape. The points stored in a GOTO point table will later be sent to routines to order the points in clockwise or counterclockwise order.

Routine PTLN (90)

Routine PTLN put the line end points into the GOTO point array.

Routine PTARC (92)

This routine breaks up the arc into GOTO points based upon the cutting cord height tolerance.

Routine PTSPL (94)

Routine PTSPL breaks up spline into GOTO points based upon the cutting cord height tolerance.

Routine PROFIL (96)

This routine will calculate the XMIN, XMAX, YMIN, YMAX of each of the closed shapes or profiles in the GOTO point table. The pointers to the largest pocket are moved to the beginning of the table that points to each profile. The largest profile is considered the outside profile. Routines will be called to make sure the smaller shapes are completely contained by the outside profile.

Routine PROFLL1 (98)

This routine will call pierce for the points on the internal cutouts to determine if all the cutouts are contained within the exterior profile.

Routine PROFL2 (100)

This routine will determine if internal cutouts overlap or are inside the other cutout (illegal cutout).

Routine DCWCCW (102)

DCWCCW is a driver routine for CWCCW. Each pocket's GOTO points will be passed to routine CWCCW to see if the points are going clockwise or counterclockwise. The outside profile should be ordered clockwise and the internal cutouts should be counterclockwise. If the internal pockets or outside profile are not ordered properly DCWCCW will reorder the GOTO points in their proper order.

Routine CWCCW (104)

CWCCW will analyze an array of XY points to determine if they are in clockwise or counterclockwise order and return the answer.

Routine CNTRD (106)

This routine will calculate the AREA1 and the CENTROID for a given set of points.

Formula: ABS (Summation X(I)*Y(I+1)=Y(1)*X(I+1))/2

Formula for CENTROID uses a trapezodial method.

This routine assumes the array of XY points close and the first and last points are the same in the array.

Routine OPTMZE (108)

Routine OPTMZE will optimize the GOTO points based upon the starting load point or XLOAD, YLOAD. The routine searches for the closest point in the internal and external profiles and reorders the GOTO points. This will maximize machine time by generating a more efficient tool path. Routine ORDER is called to reorder the GOTO points array.

Routine ORDER (110)

This routine is called by OPTMZE to reorder a string of XY GOTO points by passing the starting location to begin reordering.

(F) CREATE PIERCE POINT DEFINITION (FIG. 7)

These routines are used to determine all the plies a pierce point penetrates. Calculations of the laminate at the pierce point are also done. An explanation of pierce points found in the "Using SLIC" section below.

Routine PRCDRV (112)

This routine will take a string of points defining a ply and determine if a given point lies within the boundary definition or outside of it. It also handles internal cutouts. This routine is actually a driver for routine PIERCE.

Routine PIERCE (114)

This routine will determine if a point lies within a closed polygon shape. Routine PRCDRV determines if the polygon is a cutout or the outside boundary.

Routine PCHART (116)

This routine is the driver routine for calculating and creating information for each pierce point that was identified by the user.

Routine PSTRES (118)

Subroutine PSTRES creates the actual pierce chart or output data for each pierce point. It calls routines for calculating the information.

Routine CONSTR (120)

This routine computes the (A), (D), (B), (S) matrices for a laminate given the following information for each ply of material in the laminate: bias or grain direction, material properties, and location within the laminate. The calculation of the properties are based upon laminate plate theory.

Routine NCARD (122)

This routine prepares NASTRAN, PSHELL and MAT2 cards for interface to NASTRAN.

Routine MAT2 (124)

This routine prints out NASTRAN MAT2 cards.

Routine WRTMAT (126)

Subroutine WRTMAT will write out the material arrays. This routine is used to provide a standard output file for the material properties. It is called when a list of the properties are wanted for interface to other programs.

Routine PCTGET (128)

This routine will retrieve the array of all the plies a particular pointed pierced. This information is retrieved before PCHART calls PSTRES.

Routine PCHECK (130)

This routine will read in all the pierce point data into a pierce point array. This is done before the ply definitions are created. This routine also checks for duplicate point data.

(G) DEFINE SECTION CUTS (FIG. 8)

These routines will generate defined cross section cuts through a series of layups comprising a composite part. A brief explanation of section cuts can be found in the "Using SLIC" section below.

Routine SSTICK (131)

This routine is the driver routine for taking cross section cuts through the composite part. This routine will loop through each section cut line and then call other routines to generate the cross section data.

Routine STKBLD (132)

This routine builds an array of information for each ply that is cut by the section line cut. The distance and order of the cut will be stored.

Routine DLLIM (133)

This routine will determine the limits (XY minimums and maximums) of a line given its XY end points.

Routine INTDRV (134)

This routine finds all intersecting points for a section cut line, given strings of points defining the layup or ply.

Routine LIMITV (170)

This routine checks the limits (XY minimums and maximums) of two closed profiles to see if they overlap. This is the same routine called in the CHECK SEQUENCE OVERLAP logic described in section I below.

Routine INTERC (136)

This routine will calculate the intersection point for two lines. The point of intersection is returned. An alternate return will occur if the lines are parallel.

Routines PRCDRV (112) and PIERCE (114)

These routines create pierce point data, as explained in the CREATE PIERCE POINT DEFINITION, section F, above.

Routine STKMOD (139)

This mode is a driver routine for creating section cut drawings or CADAM models. Stick figures, gage data or thickness plots, and (E×T) models will be generated. This routine will create separate models for each section cut line.

Routine STKCAL (140)

This routine will calculate all the information to build a stick figure model. Each line of the stick figure will display the layup number, sequence number, orientation and material code of each layup cut.

Routine CONSTR (120)

This routine computes (A), (D), (B), (S) matrices for a laminate given the following information for each ply of material in the laminate: bias or grain direction, material properties, location within the laminate. The calculation of the properties is based upon laminate plate theory.

This routine computes the (A), (D), (B), (S) matrices for a laminate as well as the thermal load vectors AT, BT, DT. An average density PMO is also computed.

$$\text{Let } Q = \begin{pmatrix} Q11 & Q12 & 0 \\ Q21 & Q22 & 0 \\ 0 & 0 & Q33 \end{pmatrix}$$

where
$$Q11 = E1/(1-NU12*NU21)$$
$$Q22 = E2/(1-NU12*NU21)$$
$$Q12 = NU12*E2/(1-NU12*NU21)$$
$$Q66 = G12$$

Note that NU12*E2 = NU21*E1.

$$\text{Let } T = \begin{pmatrix} C*C & S*S & S*C \\ S*S & C*C & -S*C \\ -2SC & 2SC & C*C-S*S \end{pmatrix}$$

where
$$S = \text{Sin(theta)}$$
$$C = \text{Cos(theta)}$$

The transformed matrix is then:

Q-BAR = T-TRANSPOSE * Q * T $$\text{Let } S = \begin{pmatrix} G13 & 0 \\ 0 & G23 \end{pmatrix} \text{ and } TS = \begin{pmatrix} C & S \\ -S & C \end{pmatrix}$$

The transformed shear matrix is:

S-BAR = TS-TRANSPOSE * S * TS $$(A) = \underset{\text{ION}}{\overset{\text{SUM}}{\text{MAT}}}\text{Q-BAR} * (Z1 - Z0) \quad \text{over each layer - bottom to top}$$

$$(B) = \underset{\text{ION}}{\overset{\text{SUM}}{\text{MAT}}}\text{Q-BAR} * (Z1^2 - Z0^2)/2 \quad \text{over each layer - bottom to top}$$

$$(D) = \underset{\text{ION}}{\overset{\text{SUM}}{\text{MAT}}}\text{Q-BAR} * (Z1^3 - Z0^3)/3 \quad \text{over each layer - bottom to top}$$

$$(S) = \underset{\text{ION}}{\overset{\text{SUM}}{\text{MAT}}}\text{Q-BAR} * (Z1 - Z0) \quad \text{over each layer - bottom to top}$$

$$PMO = \underset{\text{ION}}{\overset{\text{SUM}}{\text{MAT}}}\text{RHO} * (Z1 - Z0) \quad \text{over each layer - bottom to top}$$

The average density is then PMO/total thickness.

The thermal expansion coefficients A1 and A2 are transformed to laminate coordinates by:

$$A-X = C*C*A1 + S*S*A2$$

$$A-Y = S*S*A1 + C*C*A2$$

$$0.5A-XY = 2*S*C*(A1-A2)$$

Let A-BAR denote the column vector of transformed coefficients. Then the thermal load vectors are computed by:

$$(AT) = \underset{\text{ION}}{\overset{\text{SUM}}{\text{MAT}}}\text{Q-BAR*A-BAR} * (Z1 - Z0)$$

over each layer - bottom to top

-continued $$(BT) = \underset{ION}{SUM}\ MATQ\text{-}BAR*A\text{-}BAR*(Z1^2 - Z0^2)/2$$

over each layer - bottom to top $$(DT) = \underset{ION}{SUM}\ MATQ\text{-}BAR*A\text{-}BAR*(Z1^3 - Z0^3)/3$$

over each layer - bottom to top

Routine STKSTK (141)

This routine takes all the information compiled in routine STKCAL and generates the actual stick figure model.

Routine STKGAG (142)

This routine will build S gage or thickness plot of the section cut. This will be built in the same model below the stick figure plot.

Routine STKEPL (143)

This routine will build the plot for modules of elasticity (E) and the modules of elasticity times thickness (E×T) along the section cut.

(H) BUILD SEQUENCES (FIG. 9)

These routines are used to build a book of all the ply sequences in a part. This book can be used by engineering for part visibility. Planning can also use the book for a planning tool.

Routine BLDSEQ (150)

This routine is the main driver for creating sequence drawings. A sequence model for each sequence within a given part/dash number will be generated.

Routine BLDET (152)

This routine will generate geometry defining each layup on a separate page for each layup. For sequence models all the layups for a given sequence will be generated and dittoed on the main drawing area.

Routine STMODL (154)

This routine will start a model with the proper root name and the sequence number inbedded in the name. The model started will be used by SLIC to write out the geometry and text information for the sequence being built.

Routine RETFMT (156)

This routine will call CADET to initialize the model to be used for that sequence. The routine will then look and see if a sequence format model has been created and, if so, load it into model common.

If CADET is called, format notes will be analyzed to see if special notes with the proper values have been placed in the sequence format model. An explanation of the sequence format model and the special notes required can be found in the "Using SLIC" section below.

Additional SLIC information will be placed on the NOSHOW page in view PV for each sequence drawing built.

Routine PSNOTE (158)

This routine will place text on the sequence model being created. This text is the page number, which will be incremented for each new page, and the sequence number which is obtained from the standard ply table information. The notes will be placed at the locations defined on the sequence format model by the special notes.

Routine FMTINT (160)

This routine will initialize the values for the format notes. If the format notes are not found, these values will not be updated, causing a sequence format model error.

Routine FMTVER (162)

This routine will verify if valid values on the special notes in the format models were defined. If invalid notes or values have been defined, an ERROR message will be generated.

An example format model and an explanation of the special notes can be found in the "Using SLIC" section below.

Routine NSCHT (164)

This routine will write out SLIC version number, data and time of run, and models flagged to create part. This chart will be placed on the NOSHOW page on every sequence page generated by SLIC. The CADAM group and user in which the models were flagged will also be given. This information will be used as accountability and traceability information.

(I) SEQUENCE OVERLAP (FIG. 10)

This segment of routines will look at all the shapes on a given sequence and determine if any of the shapes overlap. This is important to SLIC because the sequence has been improperly defined if overlap occurs.

Routine COVDRV (166)

This routine compares two shapes that can have internal cutouts and determines if they have any common overlapping or cover. The shapes are in the form of strings of XY points.

Initially the XY limits of the shapes will be checked to see if they overlap. Routines will be called to determine if the first shape completely covers, partially covers, or does not cover the second shape.

Routine COVER (168)

This routine takes two strings of ordered, closed-shaped XY points and determines if they have any common overlap or cover.

Information will be returned to tell how or if the first string overlaps the second string, and how or if the second string overlaps the first.

Routine LIMITV (170)

This routine checks the limits (XY minimums and maximums) of two closed profiles to see if they overlap.

Routine HLDRV (172)

This routine is the driver routine for routine HIDELN. This routine will compile how the lines in the first profile string relate to the lines in the second profile string. This information will be used down stream by routine COVER.

Routine HIDELN (174)

This routine will determine how a line is hidden or covered with respect to a string of points.

Routine INTERC (176)

This routine will calculate the intersection point for two lines.

The point of intersection is returned.

An alternate return will occur if the lines are parallel.

Routine OVRLAP (178)

This routine will determine how much of the first line is covered by the second line. The percentage of overlap is returned. It is assumed the two lines are parallel. The first check in the routine will determine if the lines are colinear.

(J) ERROR DIAGNOSTICS (FIG. 11)

These routines output various error and warning messages to an error file. The actual messages are generated in several routines which will be discussed in the various sections.

Routine PLYCHT (180)

This routine will write out the ply chart error messages to the error file. An example of the error file and an explanation of each message can be found in the "Using SLIC" section below.

Routine PLYWRN (182)

This routine will write out the ply chart warning messages to the error file. An example of the warning file and an explanation of each message can be found in the "Using SLIC" section below.

Routine FMCHT (184)

This routine is a driver routine for adding sequence format error and warning messages to the error file. An example of the error and warning messages and an explanation of each can be found in the "Using SLIC" section below.

Routine FMERR (186)

This routine will write out the format chart error messages to the error file.

Routine FMWRN (188)

This routine will write out the format chart warning messages to the error file.

(K) PART INFORMATION (FIG. 12)

These routines generate the layup (LYUP) and information (INFO) CADAM models or files. This information describes the part in detail by detailing each ply's weight, area, etc., as well as the geometric information of each ply.

Routine MLCHAR (190)

This routine will write out a chart of all the layup pages that are built in each CADAM file. A sample layup chart can be found in the "Using SLIC" section below.

Routine BLDET (192)

This routine will generate geometry defining each layup on a separate page for each layup. These pages are in a CADAM model or file. The designer can view the layup geometry to make sure that the desired results were obtained.

Routine FCHART (194)

Routine FCHART is the driver routine for formatting the part information and calling routine FBUILD to generate a chart to generate part information. This information is found in the CADAM INFO model or file. A sample INFO file and an explanation of its contents can be found in the "Using SLIC" section below.

Routine FBUILD (196)

Routine FBUILD will build the information chart for a part number. It is called "FCHART."

(L) PART DEFINITION OUTPUT (FIG. 13A)

These routines output a part definition or generic file of all the information about the part. This information can be used to feed to other programs, systems, machines, etc. An explanation of the routines and the generic output will be given.

Routine GENOUT (198)

This routine will loop through the part information and generate generic output for all the layups in the part. Opposite hand part XY points will be flipped.

Routine GTFLIP (200)

This routine will flip a string of XY points about the Y axis.

(M) UTILITIES ROUTINES (FIG. 13B)

These routines are utility routines that are used in several routines in SLIC.

Routine UNIT

This routine will unitize a vector (A, B, C).

Routine UNITD

This subroutine will unitize a vector in double precision. A, B, C=direction cosines.

Routine ICNTER

Returns the number of characters in a character string. The character count is determined by scanning the string from right to left for the first non-blank character.

Routine CONVTI

Converts an integer to a character string.

Routine MVCHRL

This routine uses the IBM "MOVE CHARACTER LONG" (MVCL) routine to transfer data from one storage location to another. The length is limited only by the MVCL instruction.

Routine PROJLN

This routine will determine if a point lies on a line.

Routine PROJAR

This routine will determine if a point lies on an arc.

Routine PROJSP

This routine will determine if a point lies on a spline.

Routine CMPRSS

This routine compresses a text array by eliminating all blanks.

Routine MODSRT

This routine will create the model name for the different models in SLIC. It can be modified by each installation for desired model names.

Routine LIMIT

This is a routine that determines if a point X, Y lies within the defined limits XY maximums and minimums.

Routine DEFINE

This routine defines the material properties for each of the material codes. If a material code is placed in the standard ply table and not defined by this routine, an error message will be generated by SLIC. An example of the information for each material that is input into SLIC can be found in the "Using SLIC" section below.

Routine GTPRM

This routine will read the parameter or PARM card on the SLIC execute step in the Job Control Language (JCL). A list and explanation of each option will be given.

SLIC PARM OPTIONS

When SLIC is executed, there are several options that can be specified. If no options are specified, SLIC will break apart the layup geometry and build LYUP model(s). This is a good method to use to debug geometry and arrowhead errors. The following are options that can be specified in the PARM field.

CHTOL

CHTOL is the chaining tolerance used to chain geometry and determine if arrowheads are on elements. The tolerance set in SLIC is 0.004. Example: Chaining tolerance=0.005. PARM="CHTOL=0.005" The default can also be changed and linked into SLIC in block data.

CUTOL

This parameter is the chord height tolerance used for breaking up arcs and splines into a string of points. The default in SLIC is 0.01. Example: Cutting tolerance=0.05 PARM="CUTOL=0.05" This default can also be changed and linked into SLIC in block data.

TABLE

This option will turn on the option for SLIC to read the ply table and create output charts in the INFO model(s). The remainder of the options all require this option to be turned on. Example: PARM="TABLE"

PIERCE

This will create pierce data in the PRCE model(s) if there are pierce points called out in the layup model(s).

Example: PARM="TABLE, PIERCE"

SEQUNC

SEQUNC will produce sequence drawings for the dash numbers that have a start sequence format. Example: PARM="TABLE, SEQUNC"

PLEFT

This option will cause pierce points to pierce the part in the left-hand coordinate system. Example: PARM="TABLE, PIERCE, PLEFT"

BPERCE

This will read pierce points from an input file and create NASTRAN cards for each of the pierce points. For an example of the input format, see the "Using SLIC" section below. Example: PARM="TABLE, BPERCE"

GENERIC

If this option is turned on, generic output will be generated. The generic output defines all the layups for the part. The output for the layups is unformatted, variable-length records. Example: PARM="TABLE, GENERIC"The DD card that must be allocated with this option is FT12F001, with the data set being a variable block, unformatted record.

plained and outlined. A method for executing SLIC is presented.

SLIC is an advanced application program for use by operators with training and experience in using CADAM systems.

OVERVIEW

Software Logic for Integrated Composites (SLIC) is a program written specifically for use with flat developed part definitions for composites. It is executed against models generated from the CADAM Graphics System. The program has access to CADAM models by use of CADCD and CADET, which are modules of the geometry interface package of CADAM.

SLIC reads a CADAM model or set of models and creates additional models that contain complete definitions for each part or layup separate from all other parts or layups. The program uses a function of CADAM called "detail pages." A new detail page is created for each indvidual part or layup geometry. CADAM has a limited amount of detail pages per model and a limited model size. Because of this, an additional model will be created when the SLIC model reaches 50 details or approximately 10K of model size. An error model is also created that contains diagnostics if arrowheads used for geometry definitions are not placed on elements. The error model also contains ply table errors, and a warning chart for possible errors.

Sequence of layup is controlled by a ply table. This table has been structured to allow rapid revision of the table and requires only that the sequences be numerically in order. The table itself may be out of order. This table will permit automatic generation and plotting of sequence drawings.

```
Example: FT12F001 DD DSN+&&GENERIC,DISP+(,PASS),VLO=SER=,
                  UNIT=3380,SPACE=(TRK,(5,5),
                  DCB=(RECFM=VBS,LRECI,=32752,BLKSIZE=32756)
```

The following is an explanation of the generic output and the read statements required to obtain the information for each layup.

GENERIC OUTPUT

```
LOGICAL *1 PART (20)
REAL *4   ROT(8),XLPT(2),CENTRD(2),RLIM(4),POINTS(2,1000)
INTEGER    IDASH,ISEQ,LAYUP,MCODE,IROT,NPTS
DIMENSION EMPNO(2),DATE(2),FMODEL(20,20)
READ (XX,END=1000)IFMOD, ((FMODEL(I,J),I=1,20),J=1,IFMOD),
*    IDASH,ISEQ,LAYUP,MCODE,IROT,
*    (ROT(I),I=1,IROT),AREA,WEIGHT,VOLUME,
*    (XLPT(I),I=1,2),(CENTRD(I),I=1,2),GRUP,
*    (EMPNO(1),I=1,2),(DATE(I)=1,2),VERSN,NPOC,NDLAY)
     DO 100 K = 1, NPOC
               READ (XX) ((RLIM(I),I=1,4),NPTS)
               READ (XX) ((POINTS(J,I,J=1,2),I=1,NPTS))
     100 CONTINUE
```

SLIC also permits pierce of the geometry at any interactively defined point(s). Through batch, any large number of points may be transmitted to a data set for printed output or interface with analysis programs such as NASTRAN. The pierce output data is described further in this document.

The profile for the layup is output first, followed by the cutouts.

All layups are in sequence order for the part.

USING SLIC

Introduction

This section provides the requirements and information to access and operate SLIC. An overview of the purpose of SLIC is given as well as an explanation of its operation. The requirements and logic used are ex- Upon satisfactory completion of a model which passes the SLIC checks, data can be passed to a SLIC Part Data Manager which permits the planning department to execute special manufacturing routines. These routines will interface with nesting software to nest parts with common materials and output centerline data for automatic knife cutting of composites.

DEFINITIONS

"Arrowhead text" means a specific CADAM element that allows text to be attached to an arrowhead.

"Chaining tolerance" means the tolerance between the end points of elements. SLIC uses a tolerance of +0.004. This tolerance can be easily modified.

"Elements" means the geometric entities on CADAM, such as lines, circles, ellipses, and splines.

A "layup" may consist of 1 to 8 plies, provided they have the same geometry, same material, and are mated. Grain direction of the plies which make up the layup may vary, but must be identified in the ply table. If the thickness of raw material, type of material, or geometry is not the same, the layup number must be different. If any other layup resides between geometrically and materially identical layups, these may be assigned the same layup identity, provided they reside in different sequences. The "layup" definition is shown in FIG. 14.

"Ply" means an individual piece of material. Several plies may be laid together to make a layup and/or a part.

"Sequence" may be synonymous with "level." An example of a sequence with one or more layups is shown in FIG. 15B.

Figure 19:
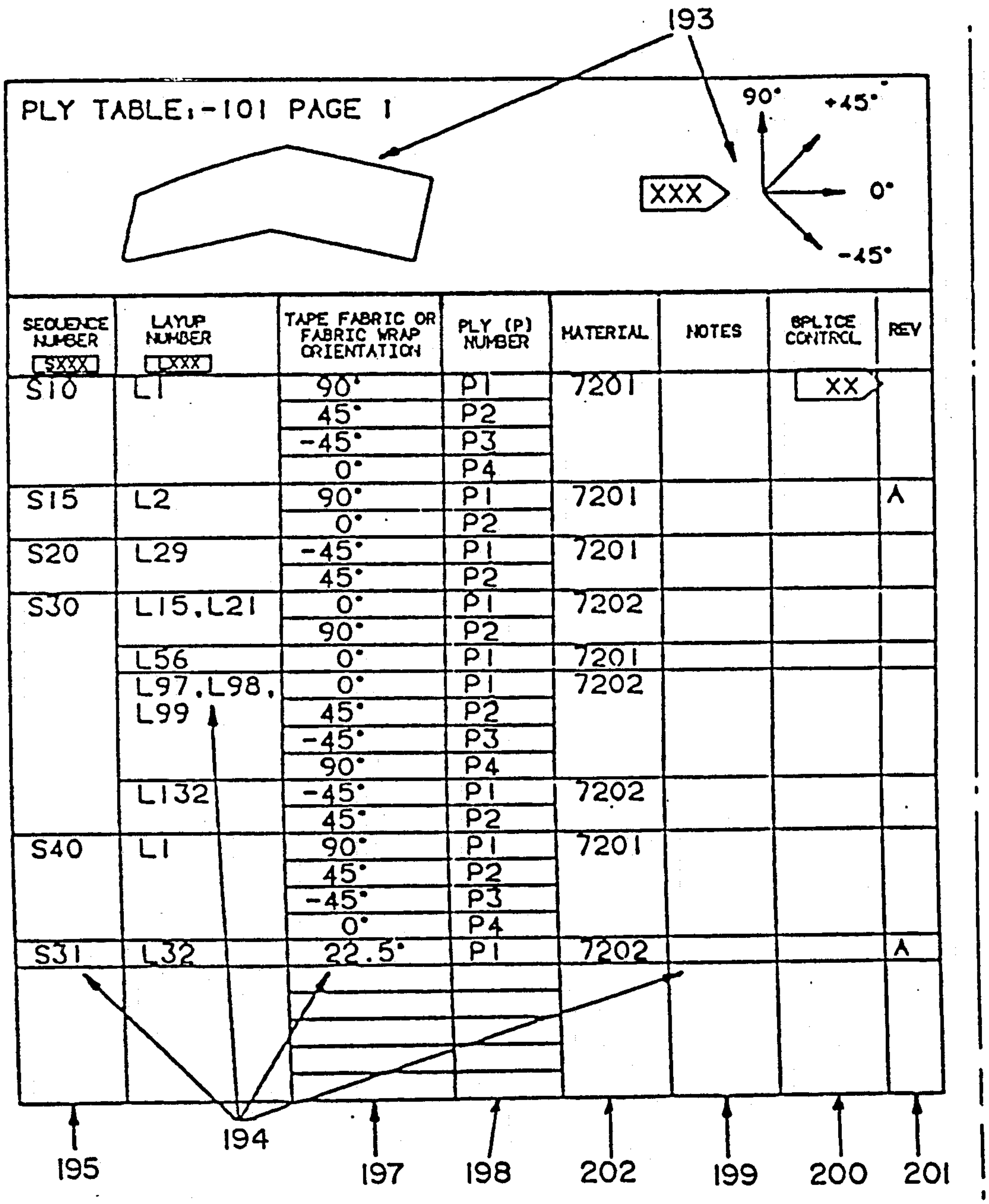
FIG. 19 is an illustration of a ply table from a CADAM Standard Library.
Figure 19:
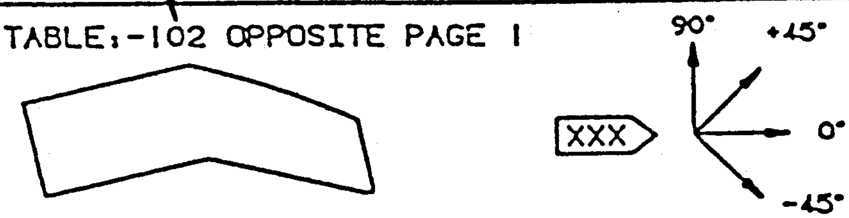

"Ply tables" are shown and clarified in FIG. 19.

INPUT REQUIREMENTS

CADAM Geometry Identification Rules

Figure 15:
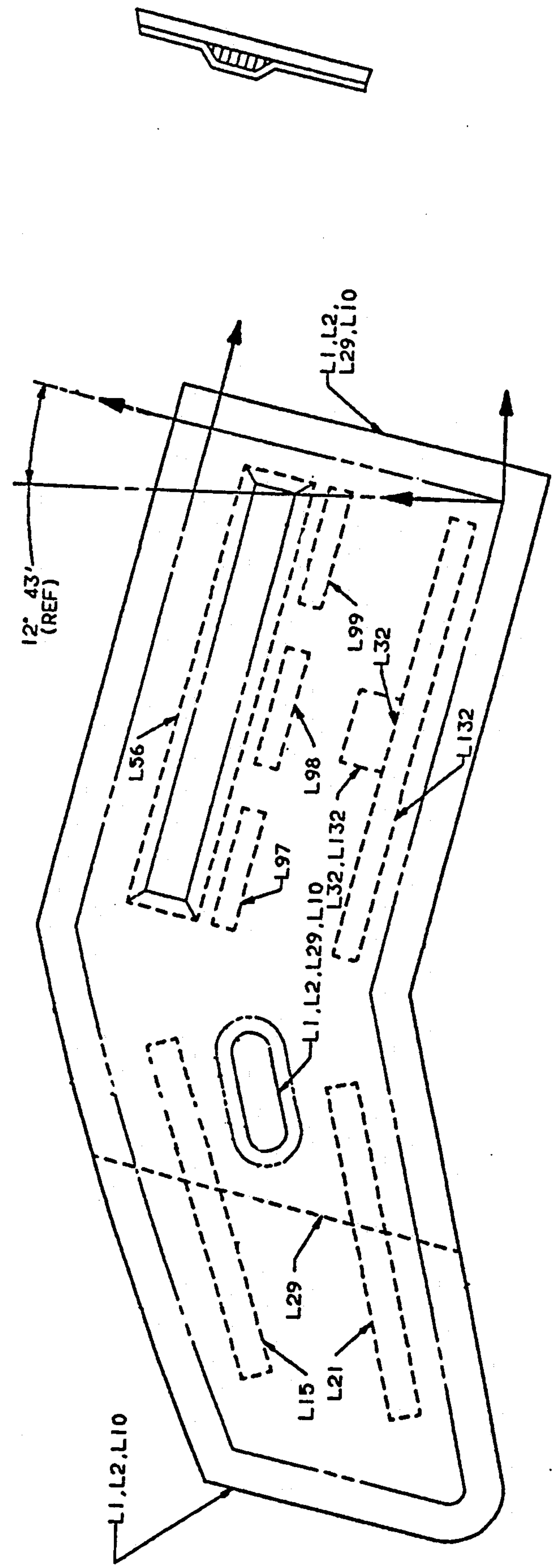
FIG. 15A is a drawing illustrating several sequences.
FIG. 15B is sample composite drawing.
Figure 15A:
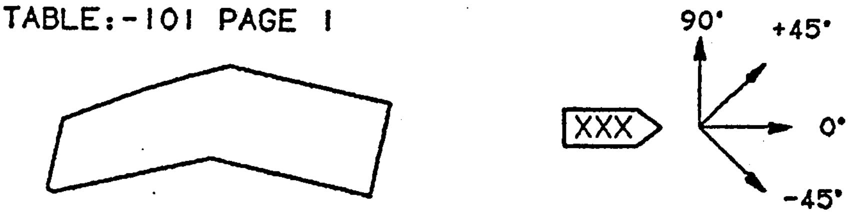

For the purpose of explanation and instruction of SLIC, a small composite is used as an example. The example design drawing is shown in FIG. 15A.

Note that the View PV axis corresponds with the desired 0° (3 o'clock) position of ply orientation. Positive angles are counterclockwise, and negative angles are clockwise from the 3 o'clock position. This correlation of the PV axis is critical for downstream output.

Define Layups in View PV

All layups must be defined in CADAM View PV. All other views are ignored for geometry. View PV was chosen as the view to use because SLIC presently deals only with 2-D projections or flat patterns of parts. For the merging of several models, the common view selected by SLIC is View PV.

PV Views Must Coordinate

SLIC can be executed on several models at a time. When more than one model is selected, the PV views in the models are overlaid on each other. Therefore, an element in one model that ends at a location and chains to another element in a different model must analyze the same in both models. The results of running SLIC on several models is as if all View PVs had been merged together. The detail page created for a layup may have elements copied from separate models. This multiple model capability allows unlimited part size. View PV may be input to any CADAM view scale. SLIC reads the full size values of the geometry.

Line Types

Elements defining layups must be solid or dashed line types. Phantom, Center, NC, or Break line types will be ignored by SLIC for layup definitions.

Arrowheads on Elements

When defining the edge of a layup, an arrow is used with text information. The end of the arrowhead must lie within 0.004 of the element defining the layup. To accomplish this, the terminal operator selects /ARW/ under Function Key MISC. To put the arrowhead on the element, the terminal operator selects the element and indicates, the second indicate will establish the tail. The text is then typed in, followed by a third indicate for the positioning of the text. See FIG. 16, reference number 161.

Arrowheads on End Points

Do not place identifying arrowheads on the end point of an element. SLIC gives an arrowhead error if placed on end points. See FIG. 16, reference number 162.

Layup Edges Must Be "ARROW/TEXT" Defined

The text defining layups must be created under MISC.Function/ARW/.arrowhead text. SLIC will not read standard text at the end of the arrows.

Valid Layup Callouts in "ARROW/TEXT"

The examples in FIG. 16, reference number 163, identify the element as belonging to layups 1 through 5.

Unique Layups

Layup numbers may be duplicated in the ply table, provided the duplicate layup number resides in a different sequence. For example, there can be only one geometric boundary definition for L1. SLIC provides no method for distinguishing different boundaries for the same L number. In FIG. 16, three identical layups (L97, L98 & L99) are shown (see reference number 164). Even though their internal geometry and material are the same, each must have a separate L number. Conversely, S10 and S40 both use L1.

Relief Cuts

Relief cuts (darts) will be arrow defined as "C#" as opposed to "I#." Each element of a cut must be arrow defined under this rule. See FIG. 17. This capability has not yet been implemented.

No Duplicate or Overlapping Elements

Multiple elements will cause the program to identify chaining errors. All elements must be relimited end to end and not be overlapped. Also, two identically duplicated elements will cause SLIC to report chaining errors. See FIG. 18.

Gaps Between Elements

Elements must connect with 0.004, or a chaining error will be identified by SLIC. See FIG. 18. This option can be changed for each installation.

Ply Table

The ply table is one of the most important parts of SLIC input. For accurate operation, this table must follow specific rules. FIG. 19 shows the ply table. The ply table is supplied and available in the CADAM Standard Library (STDLIB). The ply tables may reside as details of the model. It is recommended that all editing be accomplished in the CADAM Detail Function and be displayed as a DITTO(s).

Ply Table Drawing Sheet

The ply table may reside on any sheet or multiple sheets of a drawing, but must reside in CADAM AUX View 98 of that model. View 98 will not be used for any other purpose throughout the CADAM data base. Any models not requiring the SLIC ply tables will also not use View 98. The view used by your installation for ply tables can be modified in SLIC.

Part Numbers

Each part number (dash number of a drawing) must have its own ply table. This includes opposite parts. Geometry must be noted as opposite if the geometry is to be flipped. Any change to the ply table requires that the dash number be changed or that a new and additional ply table be generated appropriate to the change. See FIG. 19, reference number 191.

Ply Table Entries

The terminal operator may input notes to the ply table at the locations provided. Do not move the start location of the notes. Any individual note within a location must be continuous. The CADAM "$" may be used within the note where required. Commas and dashes are used as layup delimiters similar to geometry identification, as shown in FIG. 19, reference number 192.

Ply Table Part Sketch

A small sketch of the part shall be placed in the location shown at reference number 193. The rosette shall also be shown in this area. The rosette must not reside in View 98 with the table. View 99 is suggested for rosette placement. A note or ditto in View 98 which has a degree sign will be interpreted as a legitimate ply orientation and cause a SLIC error. See FIG. 19, reference number 194.

Sequence Numbers

The sequence numbers shall be originally entered in increments of ten (10). This permits additions during interactive process without renumbering the entire table. Note in FIG. 19 how sequence "S31" has been added without necessity of revising the table. SLIC will place the sequence between S30 and S40 for all output data. A sequence number may not be repeated without causing a SLIC error. The lowest numerical sequence is nearest the tool and progresses away from the tool. See reference number 195, FIG. 19.

Layup Numbers

Layup numbers may be repeated if the I# is used in different sequences. However, the number of plies and orientations must be the same if the L# is used more than once. This was noted in the paragraph on unique layups. See FIG. 19, reference number 196.

Ply Orientation

This column presents ply orientations within specific layups. For example, S30, L15 and L21 have unlike geometry but have the same material and orientation. Also, sequences S30, L15 and L56 have different rotations and material. SLIC provides for every hundredth of a degree (0.01°) of orientation relative to the rosette. The ply orientation is to be input and read from top to bottom, progressing away from the tool. See FIG. 19, reference number 197.

Ply Numbers

Ply numbers are input to this column 198. Ply numbers may not be repeated within a layup but may be repeated if the layup number differs. This column is not read by SLIC.

Notes

This space is provided for a flag note only. This space is not read by SLIC. See FIG. 19, reference number 199.

Splice Control

This space is provided for flag notes related to splice control only. This space is not read by SLIC. See FIG. 19, reference number 200.

Ply Table Revision

This column is provided to account for changes to the ply table. The revision letter should correspond with the drawing change letter under which the change was made. This space is not read by SLIC. See FIG. 19, reference number 201.

Material Callout

Materials are identified by a four-digit integer, as shown in FIG. 19, reference number 202. Each layup must have a material code which has been entered into the SLIC Part Data Manager database. The data about any given material must include the data shown in FIG. 20.

Material Definition

FIG. 20 shows the input required for full SLIC definition of the material. Materials which have not been entered with all of the required data will cause SLIC to report incorrect or no data. This data must be approved by appropriate technology staff representatives and defined to the SLIC program. Materials may include any composite sheet, tape, cloth, honeycomb, sheet metal, and bonding materials, such as glue or cements, which are to be manufactured by laminating, routing or 2 AXIS machining. Any material not defined will not be accounted for by the SLIC program. Undefined material codes will cause SLIC to generate an error message and stop further processing. For all composites, the data shall be in the cured conditions.

SLIC GEOMETRY LOGIC

Geometry Input Logic

This section explains the logic used by SLIC and the rules to be followed by the user for model preparation. The majority of model preparation is to use good drafting standards. Arrowheads should be placed on elements. Text defining layups is to be ARROW/TEXT, use proper cornering, etc. There are a few logic cases where some additional model preparation is necessary. The following rules are concerned with only one layup. Each layup in the part must follow the same rules. The examples use lines for explanations. All rules apply to lines, circles arcs, splines, offset splines and ellipses.

ARROW/TEXT and Chain Logic

Figure 21:
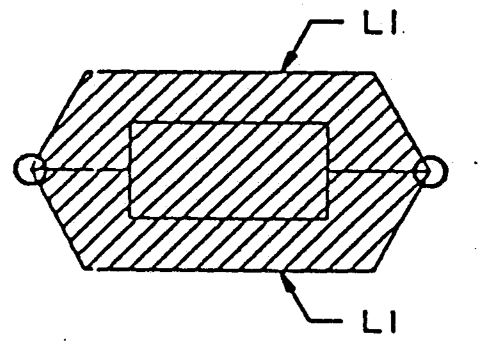
FIGS. 21-23 are illustrations of chain logic in the SLIC system.

SLIC requires every logical section of chained element to contain an arrowhead identifying the layup. This means that were more than one element chains to an end point, an arrowhead must be placed in the next section of the layup. An example is shown in FIG. 21.

Figure 22:
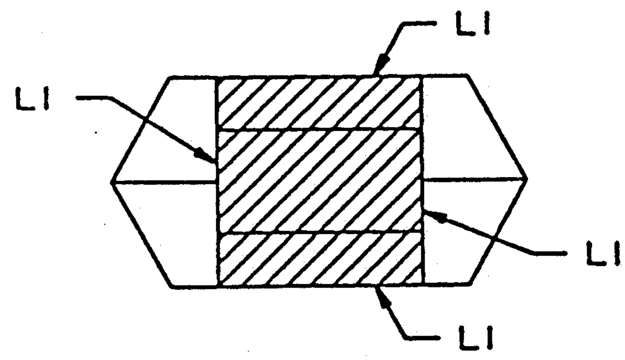

For the first arrow only, the top section will be identified by SLIC. To completely define the layup, an arrow must be placed somewhere on the section after the three elements chain at the circled points. SLIC will logically chain at end points. If the layup drops off before the end point of an element, an arrow must be used to identify the drop off. An example is shown in FIG. 22.

Figure 23:
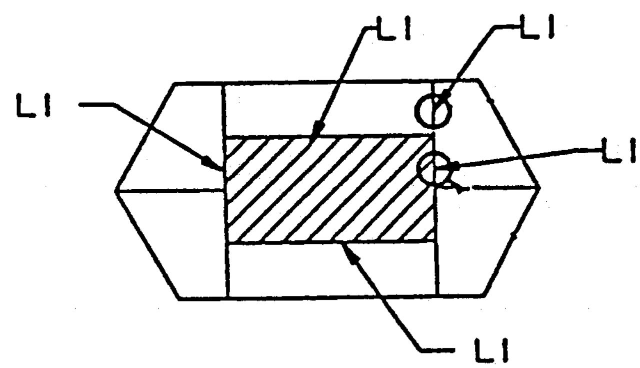
Figure 24:
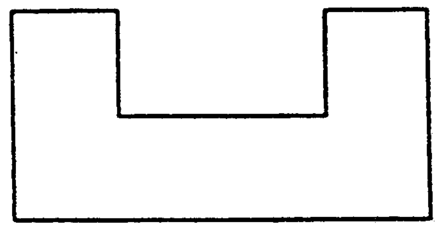
FIG. 24 illustrates a desired ply shape.
Figure 25:
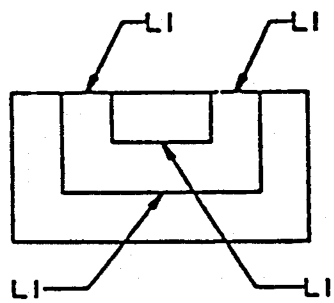
FIG. 25 illustrates a method of defining that ply shape using arrowheads and text callout.

The top and bottom arrows will identify the top and bottom sections. If the ply is to be the center section, the additional arrows are needed. Where drop-offs occur, the arrowhead location is placed on the section of element to be used. See FIG. 23.

It is acceptable to use more than one ARROW/TEXT callout on one element to produce the desired geometry.

Figure 26:
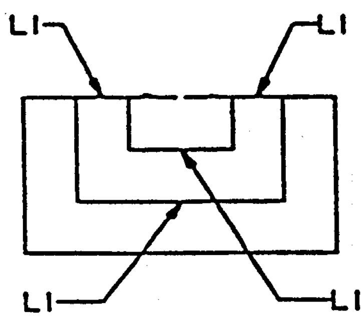
FIG. 26 illustrates an alternate method to produce the desired shape of FIG. 24.
Figure 27:
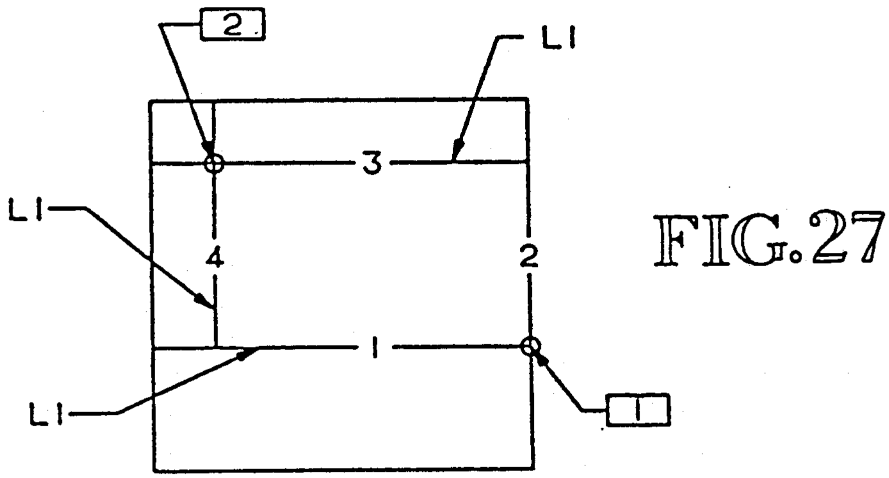
FIGS. 27-31 illustrate the logical operations to define ply elements using SLIC.
Figure 28:
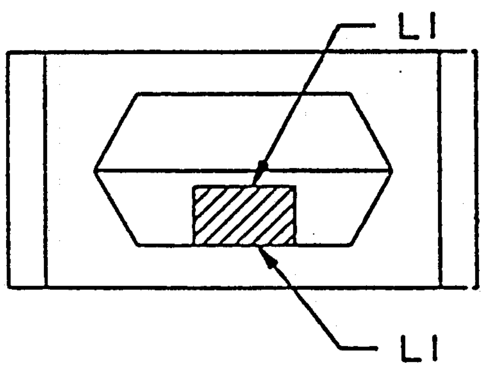

Another method to produce the desired geometry would be to use two elements, as shown in FIG. 26.

The logic for creating layup geometry breaks elements apart when an end point lies on the element to be broken. For example, in the first location, element 2 will be broken by element 1. At the second location, 3 and 4 cannot break each other because neither line has an end point on the other. To enable layup 1 to branch in the correct direction at location 2, either line 3 or 4 must be broken and relimited back to the other line. Only one of the lines should be done, not both.

Program Logic

This section is an explanation of the process SLIC uses to determine a layup. The explanation is given to help in debugging parts. There are three main steps which SLIC uses to determine where a layup is to be defined. The steps are the same for all layups.

(Step 1) For each layup, SLIC creates chained sections that go with each arrowhead. The section chains until it chains to more than one element or doesn't chain at all.

Figure 29:
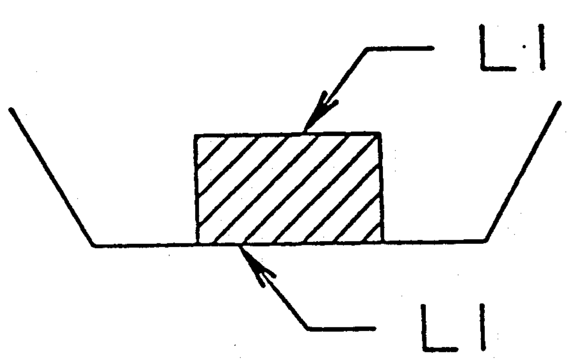

For the example in FIG. 29, there are only two elements. The end points are chained until an end point connects to more than one element. These intersecting elements are also placed in the table. After Step 1, the group would appear as shown.

Figure 30:
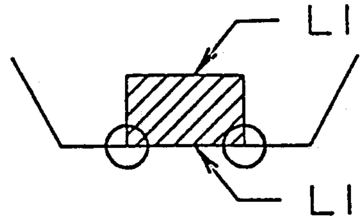

(Step 2) Every element that has the end point of another element on it is then broken into two elements. The table looks the same, except the bottom line is now three lines. It will be broken at the indicated points shown in FIG. 30.

Figure 31:
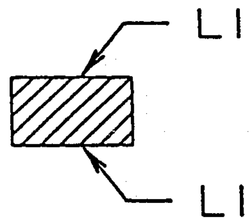

(Step 3) The chaining logic is again executed to build the final table. Now the layup can chain in the middle of the bottom element. The final group of chained elements is considered a layup and will be put on a detail page of the appropriate SLIC constructed model, as shown in FIG. 31.

The geometry for the layups is found on detail pages of a SLIC-constructed LAYUP model. Each detail page will contain the geometry defining that layup. Lines and arcs are created exactly the same as they are in the original model. Splines, offset splines, and ellipses are created with some differences.

Spline Creation

Splines

Splines are defined using the original defining points. Only that section of the spline needed for the layup geometry is created on the detail page. The defining spline points will actually be used for approximately six inches from the drop-off or to the end of the original parent spline. This is to allow the splines to be relimited for manufacturing excess purposes.

Offset Splines

Offset splines cannot be recreated as parent splines. Therefore, an offset must be created to carry the mathematical definition. SLIC will create the parent spline on the NOSHOW page and create the relimited offset spline on the show page.

Ellipses

Ellipses are converted into parent splines using the same CADAM logic for conversion of ellipses under the function key spline.

Flange Angle Splines

Flange angle splines are treated like normal splines. The splines created on the layup models do not carry flange angle data on this version of SLIC. This feature could be added if the need arises.

MODEL ARRANGEMENT

The type of part defined as well as the size of the part may dictate various drawing sheet arrangements. This section addresses some of these arrangement combinations.

Drawing Sheets

Figure 32:
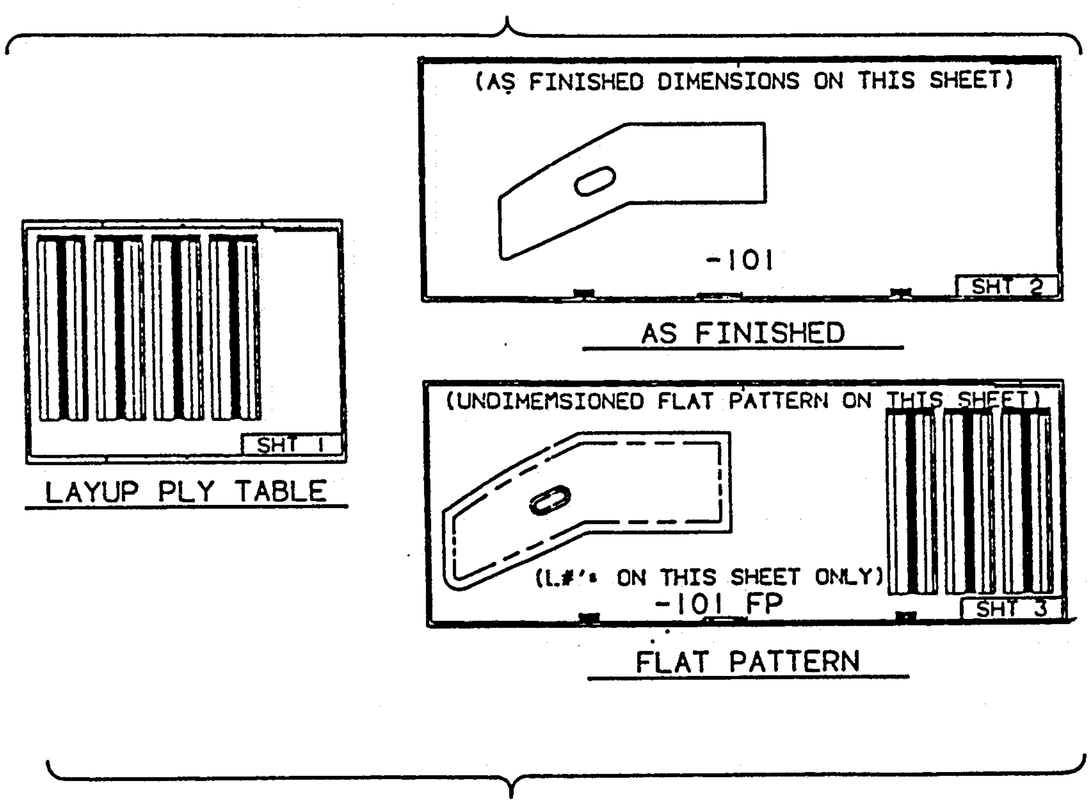
FIG. 32 illustrates a multi-sheet drawing of a ply.

SLIC can be executed against one or more sheets of a drawing. A single sheet drawing is depicted in FIG. 15. In this example, the primary geometry is in CADAM View PV and the ply table in View 98. FIG. 32 shows a multi-sheet drawing where one sheet is for the ply table, a second set is for the finished part, and a third sheet is for the flat pattern of the part. In this example, SLIC would be executed against sheets 1 and 3 only. Sheet 2 describes the finished part and does not define the layups.

Figure 33:
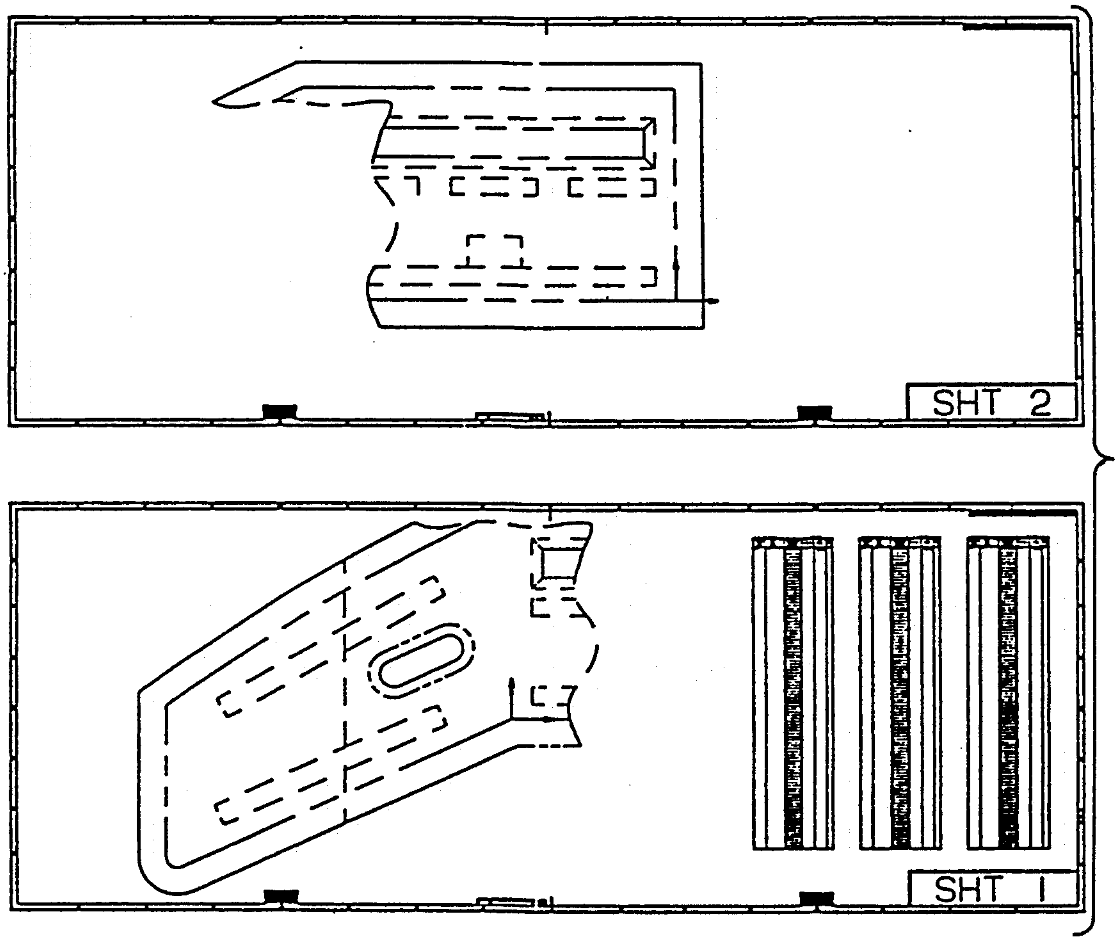
FIG. 33 illustrates another multi-sheet drawing of a ply.

FIG. 33 presents a multi-sheet drawing where the geometry is too large for placement on one sheet. To aid in sheet reduction, CADAM View PV may be scaled. Any combination of multi-sheet and CADAM multi-models within a sheet may be intermixed satisfactorily, provided all geometry and ply table rules are strictly adhered to.

Panels

Panels, whether flat or contoured, may be input as shown in FIG. 15. Note that manufacturing excess is provided around the outside edges. The amount of excess depends upon the manufacturing method and should be determined by planning during the design development.

Flat Patterns

Figure 34:
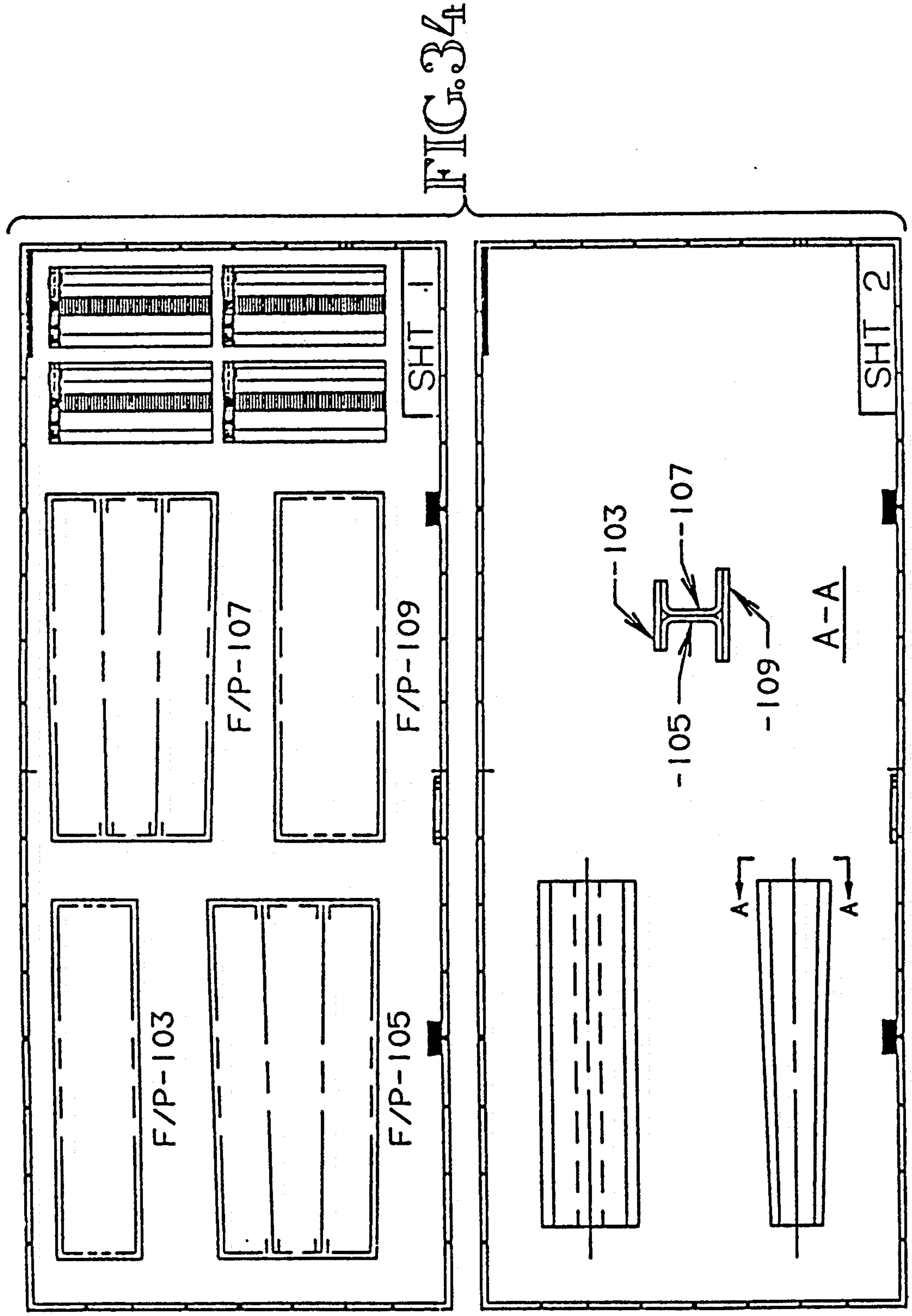
FIG. 34 illustrates several flat patterns for plies.

When flat patterns must be developed to produce parts similar to extrusions or sheet metal flat patterns, certain rules must be followed. The flat patterns must all reside in View PV of their drawing and include excess peripheral material for exterior edge trim. Also, each flat pattern must have a unique ply table. A ply table is not required for the assembly drawing of these layups. As with panels, the view containing the geometry may be scaled. Again, the flat panels do not require dimensioning. FIG. 34 presents this concept.

ERRORS

Executing SLIC will result in error reporting by creation of a model which reports arrowhead errors, ply table errors, format chart errors, format chart warnings, and a caution chart. In addition, SLIC will display geometric errors when it constructs layup geometry models.

Figure 35:
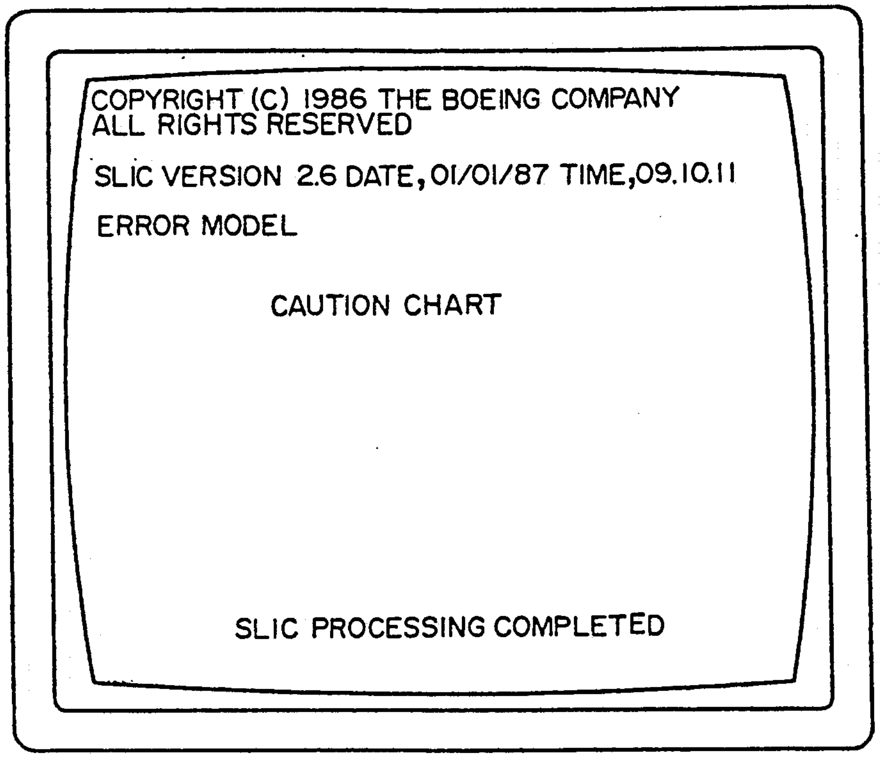
FIG. 35 illustrates an error model display for the SLIC system.

Upon execution of SLIC, a CADAM model will be generated which will modify the 11th through 14th model identification characters to read "EROR." When the user calls his model, the display may be as shown in FIG. 35. The figure shows the five potential error tables which may be generated. Any combination of the five presentations may display. If the heading is not displayed, errors of that kind do not exist. The time and date when SLIC was executed are updated, and this new model overwrites any previous Error Model with the same number. Upon completion of the job, the message "SLIC PROCESSING COMPLETED" will appear on the error model.

The terminal operator may select any of the five error tables shown while in the DETAIL function. The selection will determine which of the following tables will be presented.

Arrowhead Error Table

Figure 36:
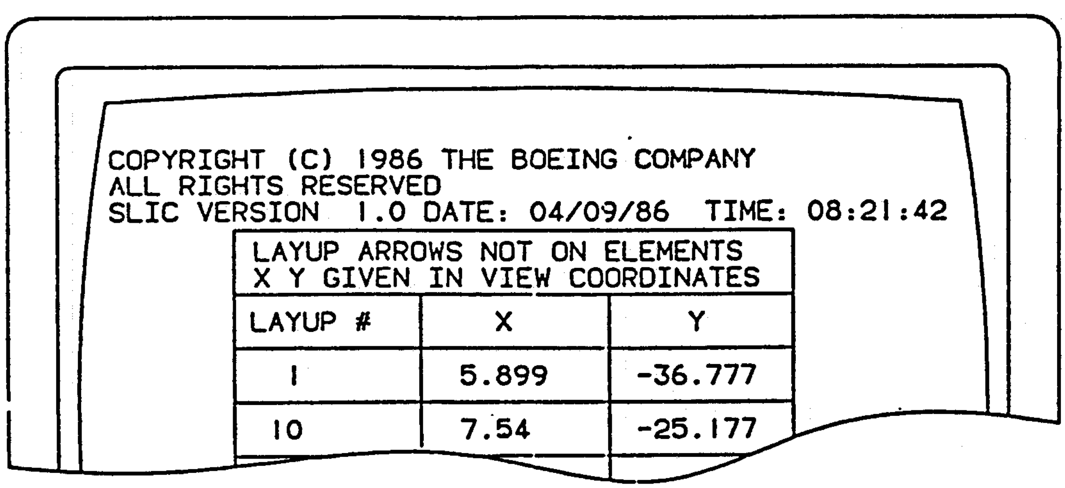
FIG. 36 illustrates the screen display for an arrowhead error table.

If arrowheads are not placed correctly on elements, their x-y location will be placed in the Arrowhead Error Table. If an arrowhead has several layups defined on it, only one of the layups will appear in the chart. This table will reside on a detail page of the error model constructed by the program. The detail page generated is shown in FIG. 36 and will be identified as noted.

Ply Table Errors

Figure 37:
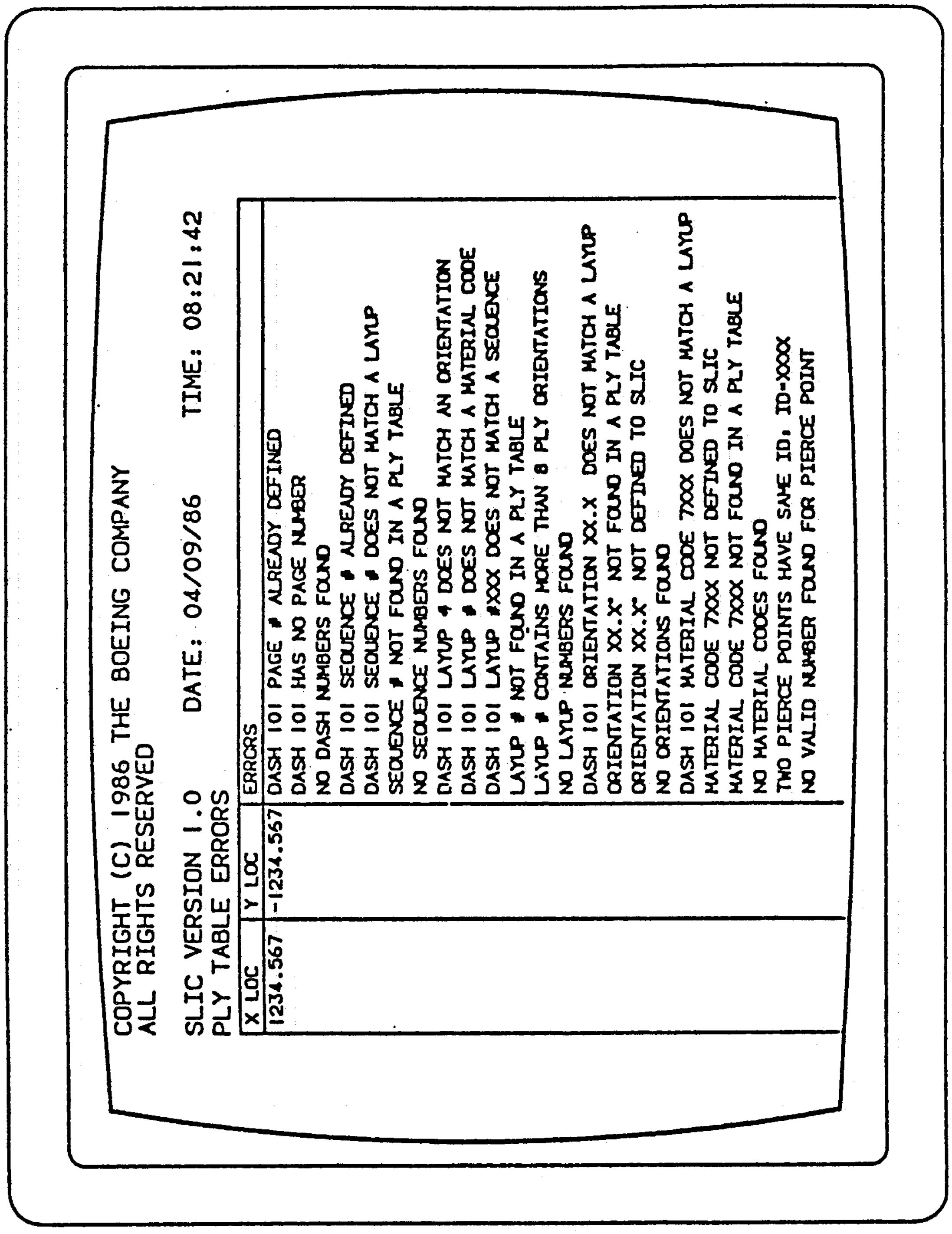
FIG. 37 illustrates a ply table error display.

Selection of ply table errors per FIG. 35 will display the table shown in FIG. 37. A brief description of the errors follows the figure.

Dash 101 Page # Already Defined

The same page number exists for the particular dash (part) number. If the dash number requires more than one ply table, the new table must have a different page number.

Dash 101 Has No Page Number

A dash number has been found without a page number attached.

No Dash Number Found

View 98 does not contain dash number callouts.

Dash 101 Sequence #XXX Already Defined

The sequence number appears more than once in the ply tables for a given dash number. This is not allowed for planning purposes.

Dash 101 Sequence # Does Not Match a Layup

The sequence number was unable to find associated layup numbers in the ply table. The layup note either has not been added or is placed in the ply table incorrectly.

Sequence 3 Is Not Found in a Ply Table

A sequence number was found, but it is not in the bounds of any ply table.

No Sequence Numbers Found

View 98 does not contain any sequence number callouts.

Dash 101 Layup #XXX Does Not Match an Orientation

The layup number was unable to find an orientation in the ply table to assign to it.

Dash 101 Layup #XXX Does Not Match Material

The layup number was unable to find an associated material code in the ply table.

Layup #XXX Not found in a Ply Table

A layup number was found but is not in the bounds of any ply table.

Layup #XXX Contains More Than 8 Ply Orientations

Manufacturing limitations presently require that a maximum of eight plies be related to a unique layup.

No Layup Numbers Found

View 98 does not contain layup number callouts.

Dash 101 Orientation XX.XX° Does Not Match a Layup

The orientation was unable to find a layup number in the ply table to assign to it.

Orientation XXX.XX Not Found in a Ply Table

The orientation is not identified in a ply table.

Orientation XX.XX Not Within Limits of SLIC

Presentations must be greater than or equal to −89.99° and less than or equal to 90.0°.

No Orientations Found

View 98 does not contain orientation callouts.

Dash 101 Material Code 70XX Does Not Match a Layup

The material code was unable to find a layup in the ply table to assign to it.

Material Code 70XX Not Defined

The material information per section 4.3 has not been input to the system.

Material Code 70XX Not Found in a Ply Table

A material code was found but is not in the bounds of any ply table.

No Material Codes Found

View 98 does not contain material code callouts.

Dash 101 Layup #XXX Already Defined, Same Sequence

A layup is defined more than once within the same sequence.

Dash 101 Sequence 20 Overlapping Plies: L1, L2

Layup 1 and layup 2 overlap each other on sequence 20. This error is not related to the ply table, but will be placed in the ply table error chart.

Unable to Chain

End points on the part geometry did not chain together on all the layups. This error is not related to the ply table, but will be placed in the ply table error chart.

Illegal Cutout

Cutouts were found within or overlapping other cutouts on the same layup. This error is not related to the ply table, but will be placed in the ply table error chart.

Exterior Undefined

Unable to find a profile for a given layup number that would contain all other profiles defined in that layup. This error is not related to the ply table, but will be placed in the ply table error chart.

No Geometry in View PV

Models were flagged for the SLIC run that do not contain geometry in view PV. This error is not related to the ply table, but will be placed in the ply table error chart.

No Arrowheads in View PV

Models were flagged for the SLIC run that do not contain arrowheads in View PV defining the plies. This error is not related to the ply table, but will be placed in the ply table error chart.

Two Pierce Points Have Same ID: ID+XXXX

Two pierce points have been called out on the CADAM drawing with the same ID, or value. The xy location on each point will be given so one of the values can be changed. This error is not related to the ply table, but will be placed in the ply table error chart.

No Valid Number Found for Pierce Point

A pierce point has been called out on the CADAM drawing without a numeric value attached. This error is not related to the ply table, but will be placed in the ply table error chart.

Caution Chart

Selection of the caution chart will provide a display which warns the user of potential problems.

Dash 101 Layup #XXX Already Defined

A layup number can be defined more than once in a ply table, as long as it occurs in separate sequence numbers. This is only a warning message for the user that did not want to revise a layup number.

Format Chart Errors

If the sequence format model is missing information, error messages will be generated on the Format Error Chart. See discussion of Sequence Format Models in this section for more information on SLIC sequence models.

SEQ # Not Found for Dash 101 Format

The SEQ # note was not found in View 99 of the Sequence Format Model.

PG # Not Found for Dash 101 Format

The PG 3 note was not found in View 99 of the Sequence Format Model.

Sheet # Not Found for Dash 101 Format

The sheet number note was not found in View 99 of the Sequence Format Model.

Rev Not Found for Dash 101 Format

The revision note was not found in View 99 of the Sequence Format Model.

Format Chart Warnings

The Format Warning Chart will have message warning of possible problems.

Format Model Not Found for Dash 101

The sequence option has been selected, but a sequence format model was not found for the given dash number. Sequence models will not be generated for this dash number.

Geometry Errors

Figure 38:
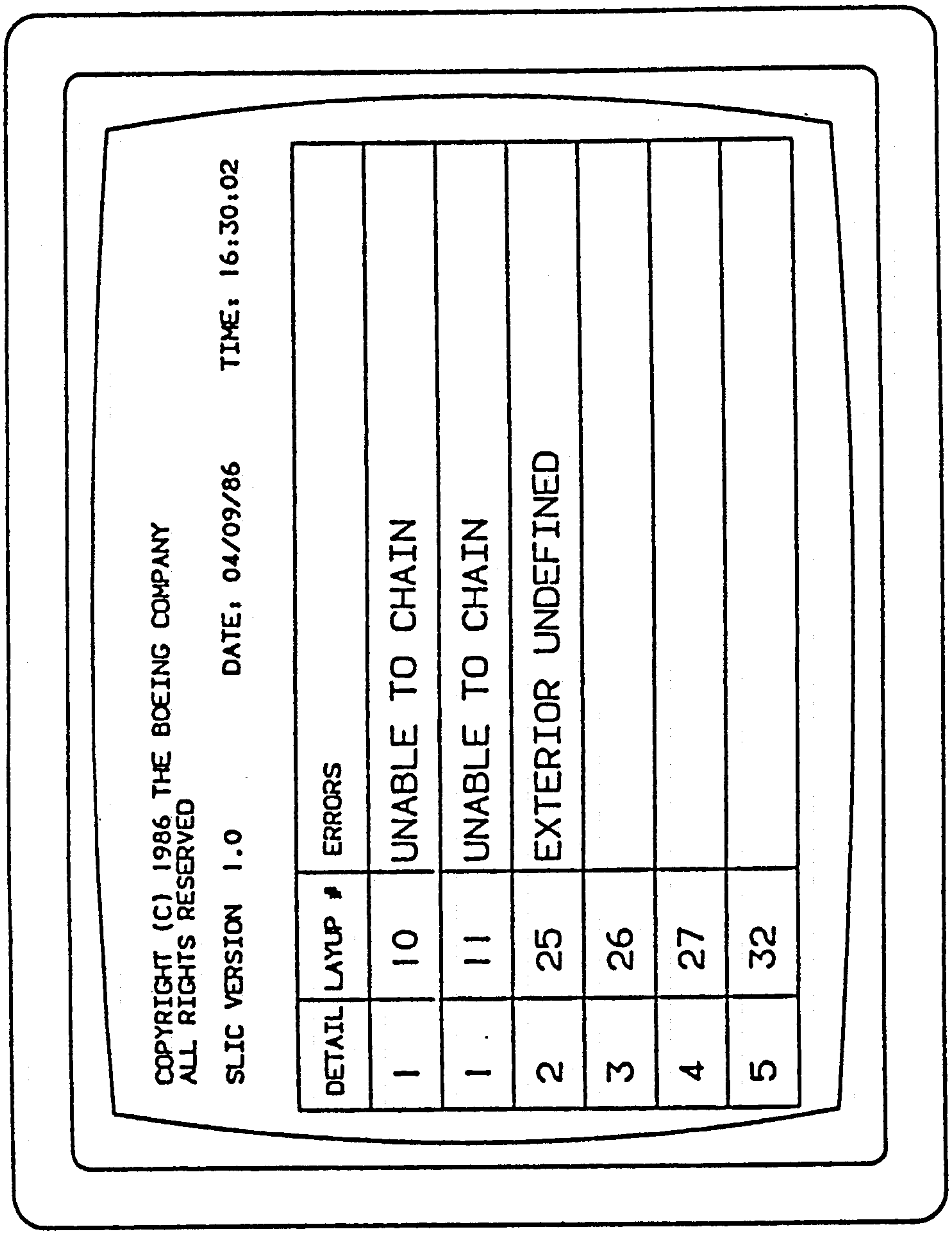
FIG. 38 illustrates the screen display for a layup.

When all ARROW/TEXT and ply table errors have been corrected, SLIC will produce one or more CADAM models as required to produce CADAM details, each defining the geometry of a unique layup. These details are full size and include geometry joined from multi-sheets to define the enire layup. A maximum of fifty details or the maximum CADAM model size identified at installation time are used and then a second model of details is created. The parent model identification will be used to identify these models, except that the 11th through 14th characters will be changed to "LYUP" and the 17th and 18th characters will identify the numerical identity of the model where multi-models are required for layup details. Selecting a LYUP model will display the table shown in FIG. 38.

This table reports each layup which resides in the model, which detail page it is on, and geometry errors. By displaying a detail which reports an error, it can be noted where the error resides so that it can be corrected on the parent model. Correcting the detail does not correct the parent model. The operator should note all errors, correct them on the parent model, and re-execute SLIC. Corrected and newly created LYUP models will overfile (replace) the previous LYUP models.

These cycles must continue until all errors are corrected. If any errors, whether ARROW/TEXT, ply table or LYUP, exist, the downstream output of SLIC will not be generated.

The LYUP models automatically contain plot data for plotting the error chart.

Sequence Overlap Errors

Figure 39:
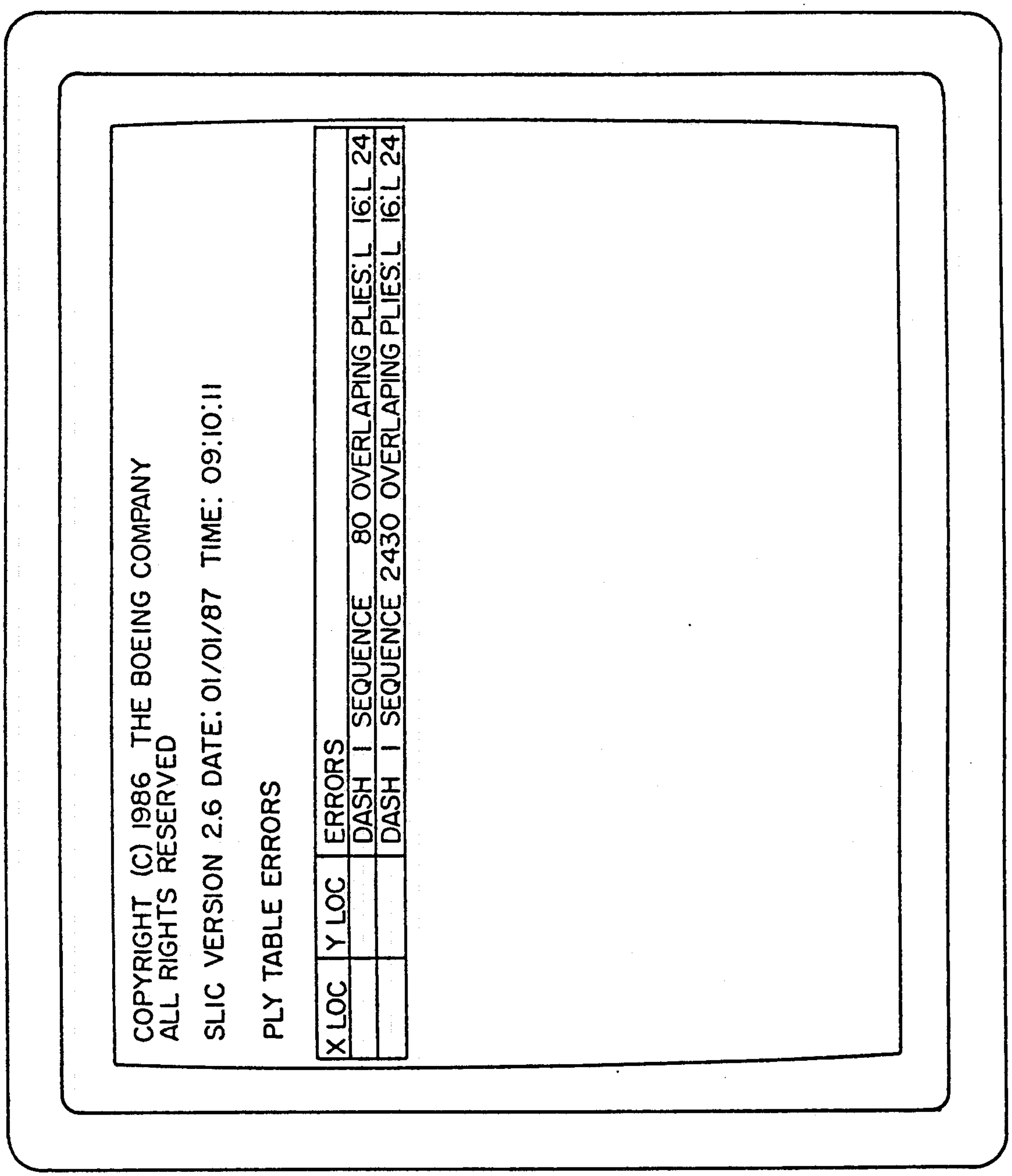
FIG. 39 illustrates the screen display for sequence overlap errors.

If L numbers on any given sequence overlap each other, an error will result. See FIG. 39.

TECHNOLOGY OUTPUT

SLIC will output a variety of data to support technology applications such as design, stress and weights. These include an output table which reports the sequences, layups and plies in proper order, including certain properties. This information table can report raw material requirements and properties or, with minor modifications of the design model, it can report this data for the finished part. A SLIC function called "PIERCE" permits interactive or batch pierce of the designed part and provides strength data about the part. The batch pierce will allow interface to programs such as NASTRAN.

Output Report

Once all errors have been corrected, as discussed in the Errors portion of this section, SLIC will construct a CADAM model which reports data about the designed part. This model is identified by revising the 11th through 14th identification characters to read "INFO." This information model is shown in FIG. 40.

Weights and Center of Gravity

Figure 41:
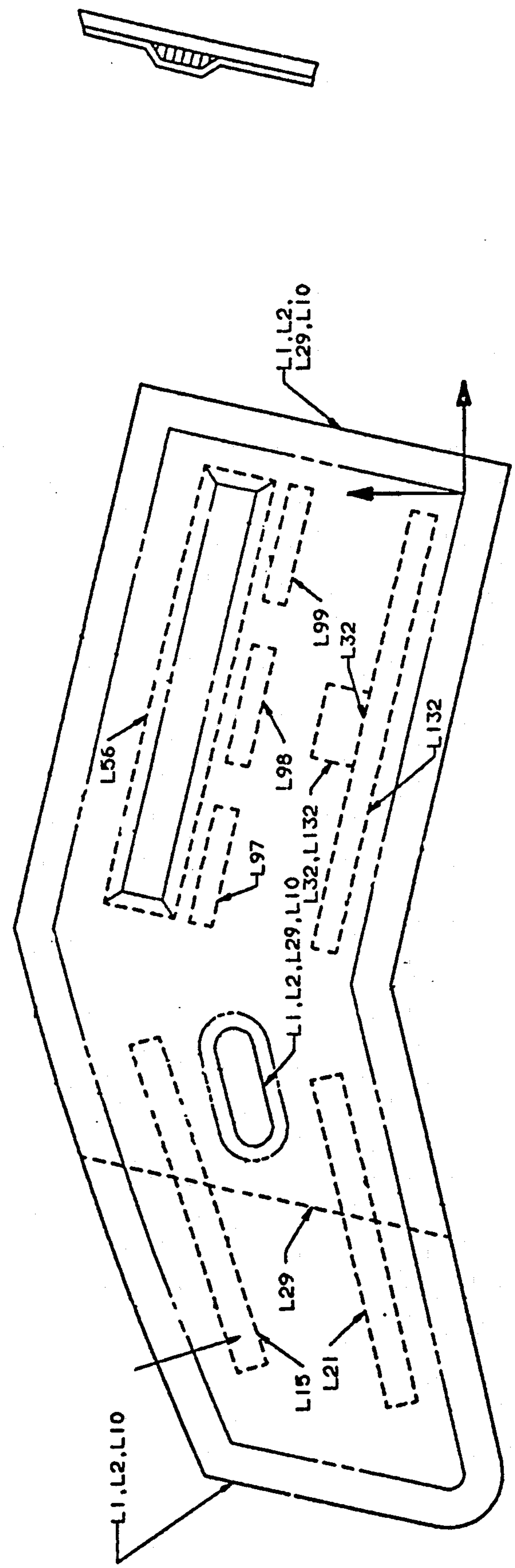
FIG. 41 illustrates a finished model part after the operation of SLIC.
Figure 41:
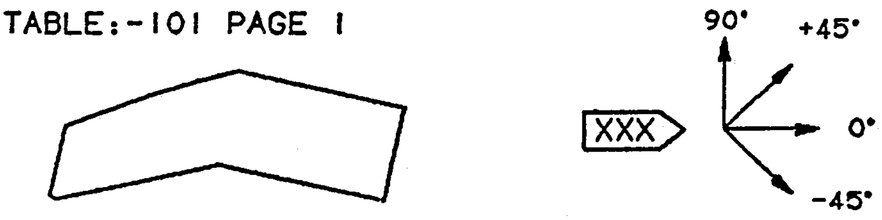
Figure 41:
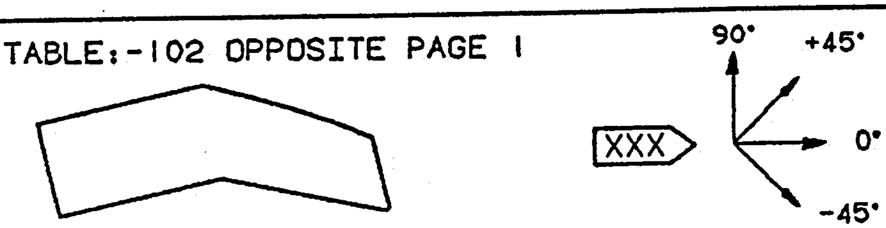

At this time, SLIC will report the weight and CG of the identified layup numbers. These data are included in the INFO model. Because the basic model may show excess material, the data may not relfect the weight and CG of the finished flat pattern. To obtain the data for an as-finished flat pattern, the user should first copy and file the model in the weights CADAM Group. Next, the excess material lines should be erased and the as-finished part periphery defined with solid lines. Next, the layup ARROW/TEXT for the periphery must point to these elements. Upon executing SLIC, the INFOR model will present data about the as-finished part. See FIG. 41.

Figure 40:
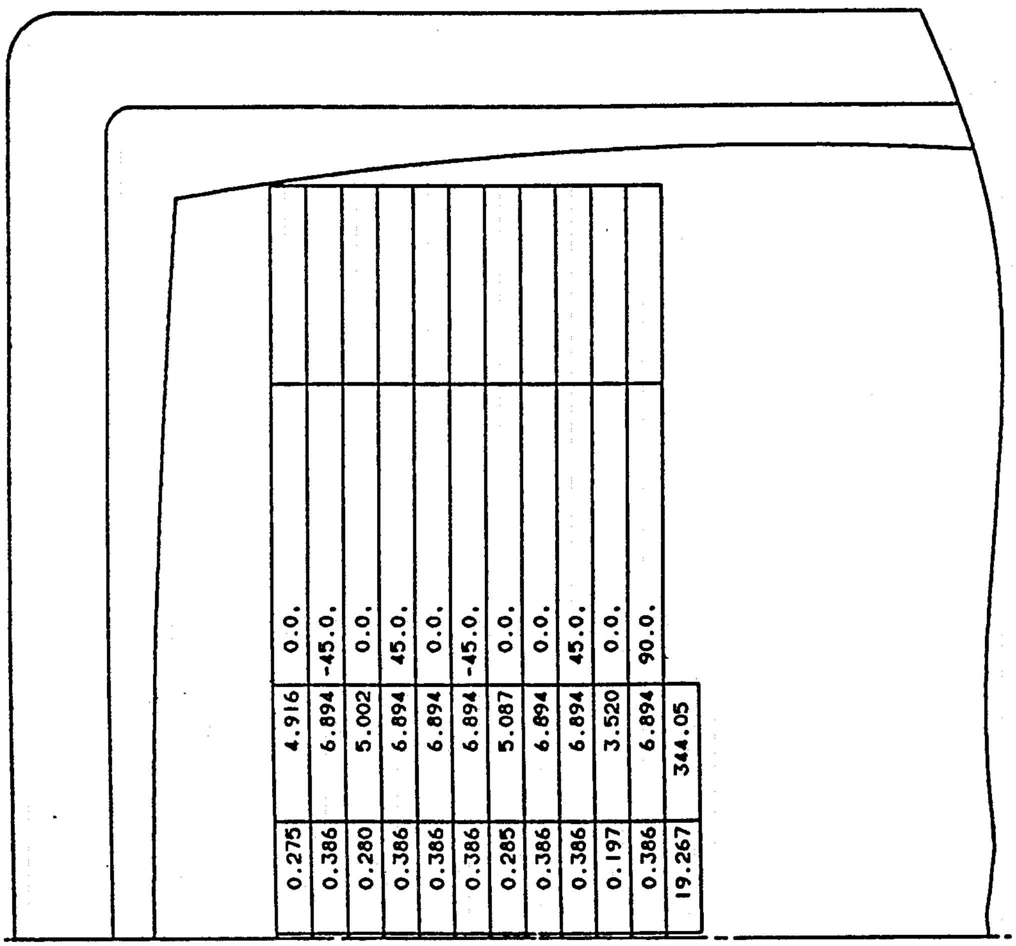
FIG. 40 illustrates the screen display for an information model.

FIG. 40 shows the original INFO model from the part as constructed in FIG. 15, which included excess peripheral material.

Pierce

SLIC will allow a pierce of the composite layups. There are two methods for pierce input and output. The methods are Interactive and Batch. For Pierce to execute, no errors can exist (see Errors portion of this section.)

Interactive Pierce

Figure 42:
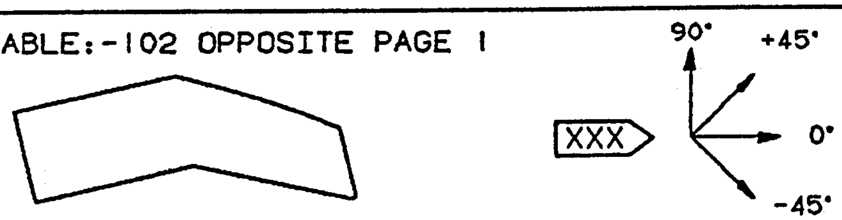
FIG. 42 illustrates an interactive point model.
Figure 42:
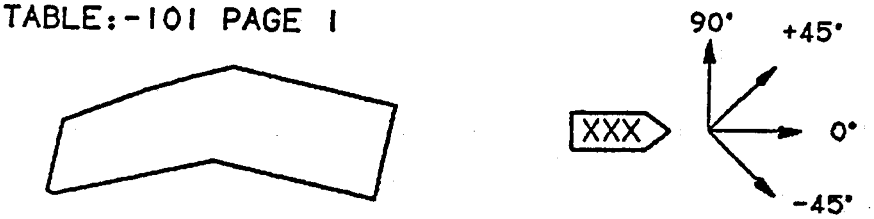

For interactive pierce, ARROW/TEXT must be used. FIG. 42 shows several pierce points on a drawing. These must be input on CADAM View PV and use ARROW/TEXT. Also, the text must be explicit. It must be keyed in "PIERCE POINT." The text contains the pierce point number followed by an optional local rotation. For example: "Pierce Point" will create properties of the laminate using the rotation values exactly as they are in the ply table. "Pierce Point 2,11" will create properties using the values in the ply table minus 11 degrees. This enables a user to calculate properties at various load direction angles on the laminate. A pierce point number may not be repeated.

Figure 43:
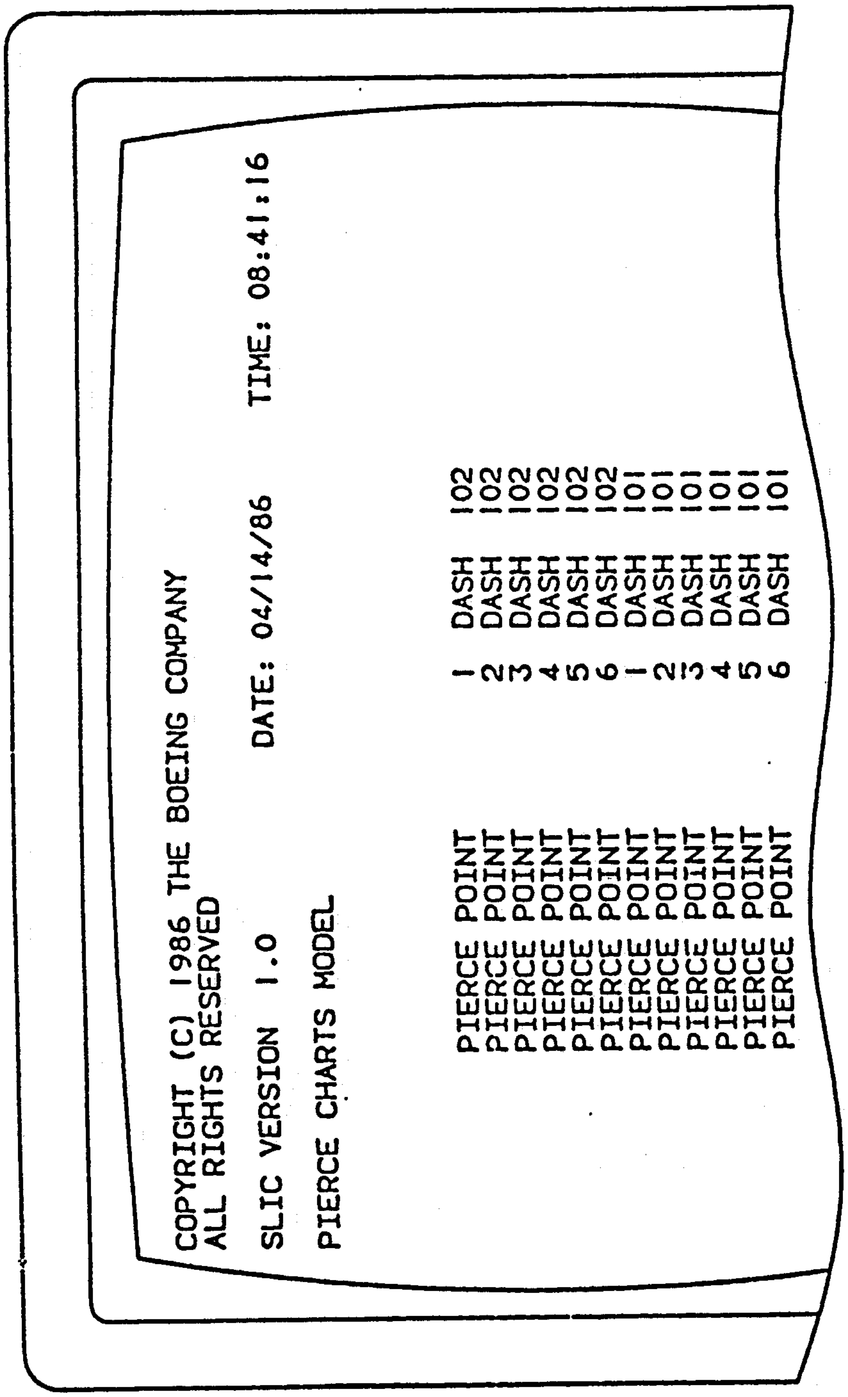
FIG. 43 illustrates screen displays when using a pierce model in the SLIC system.

To operate this SLIC capability, the CADAM model must filed with the pierce points and SLIC re-executed. This will produce a CADAM model where the 11th through 14th characters of the model identification are changed to "PRCE." This model will construct CADAM details of the pierce data. Upon selecting the PRCE model, the display in FIG. 43 will be presented. This model contains the plot data necessary to plot all the pierce charts.

Figure 44:
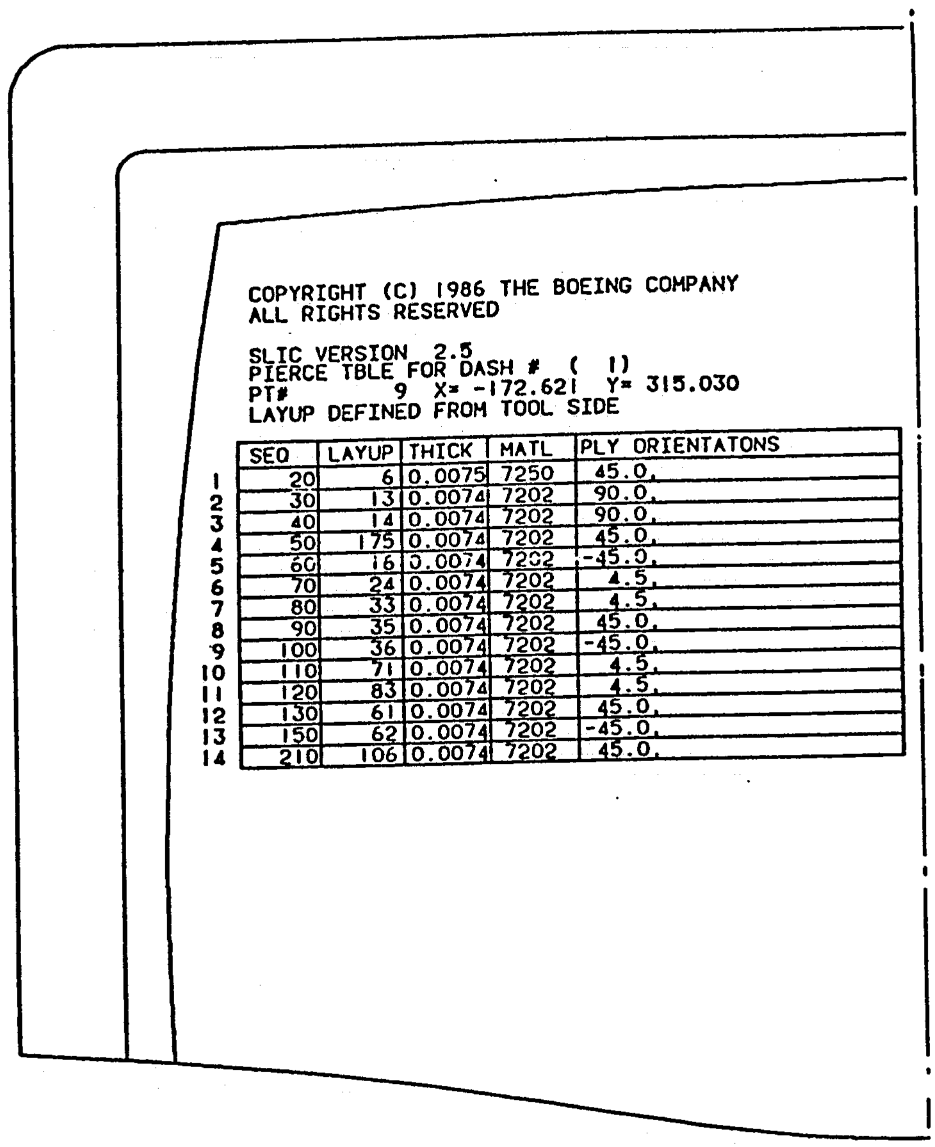
FIG. 44 illustrates a screen display for pierce points.

While in the detail function, the pierce point desired for review can be selected, and SLIC will display the appropriate data for that pierce point, as shown in FIG. 44.

The data presented by SLIC Pierce is totally dependent upon a model which has all errors corrected as discussed in this section and also upon approved input of material data per the Material Callout portion of this section.

Batch Pierce

The batch pierce option is available for generation of input cards to NASTRAN. This option is run batch from a TSO terminal. The user is required to supply:

(1) CADAM group and user.

(2) A list of models comprising the part.

(3) A list of pierce points.

The models should be verified that they are SLIC compatible.

Figure 45:
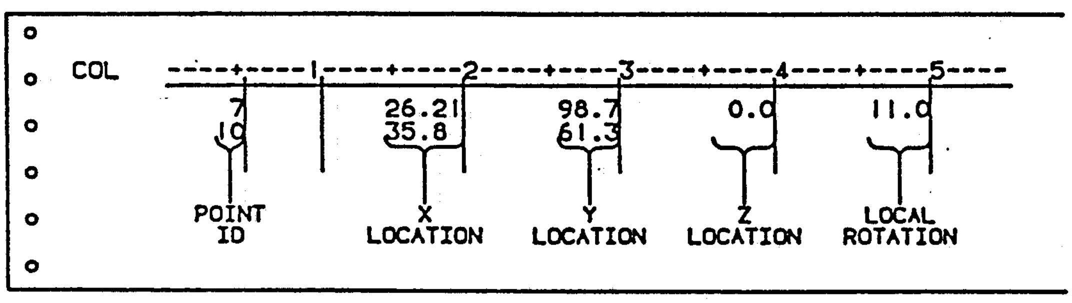
FIG. 45 illustrates a pierce point coordinate system printout.

The pierce points should be in the same coordinate system as the models. They are in the format shown in FIG. 45. The points are read in free field. If the local rotation is zero, it needs to be input as 0.0. The point ID is limited to 6 numeric digits.

Figure 46:
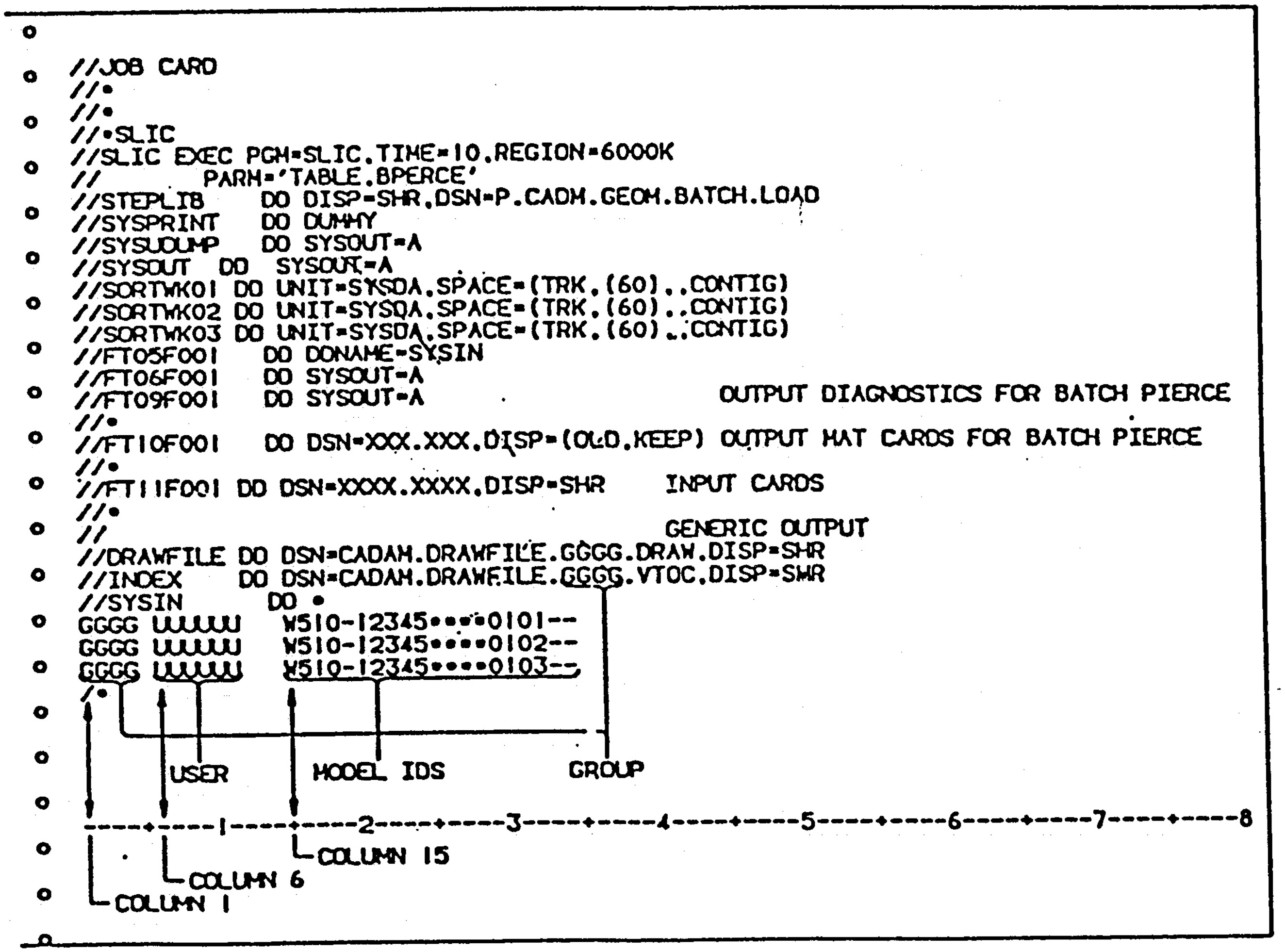
FIG. 46 illustrates proper drop job control language.

Job Control Language (JCL), as illustrated in FIG. 46, is submitted.

The input points are in file FT11F001. The diagnostic messages appear in file FT09F001. The NASTRAN input cards appear in file FT10F001.

PLEFT Option

This is an option in which all angles within the layup are multiplied by −1 before the properties are computed. This was done so that laminate properties could be taken directly from the SLIC model and input to a NASTRAN Finite Element Model.

Section Cuts

The SLIC program has the capability to generate section cuts through properly defined parts. The section cuts models produced contain both stick figures, plots of thickness, ply count, and moduli of the desired cut. In order to obtain this information option, attribute under FK/Group needs to be utilized to define the location of the desired section cut is desired; this can be on the same model as the part or a separate model. If a new model is created for this, the PV origins must be the same in both models. When assigning attribute data, three requirements exist:

(1) Attribute number 650 is assigned to all section cut lines.

(2) Part dash numbers must be assigned to all section cut attributes.

(3) User-defined identification numbers must be assigned to all section cut attributes.

The dash number and section cut identification number are input as attribute data and should be input per the CADAM user's manual. The only requirement on this attribute data is that it be put in as follows: "n,m."

n=integer defining unique section cut line.

m=integer defining part dash number. The direction (or perspective) of the section cut obeys the right-hand rule. A line cannot be used for a section line and geometry definition.

Figure 47:
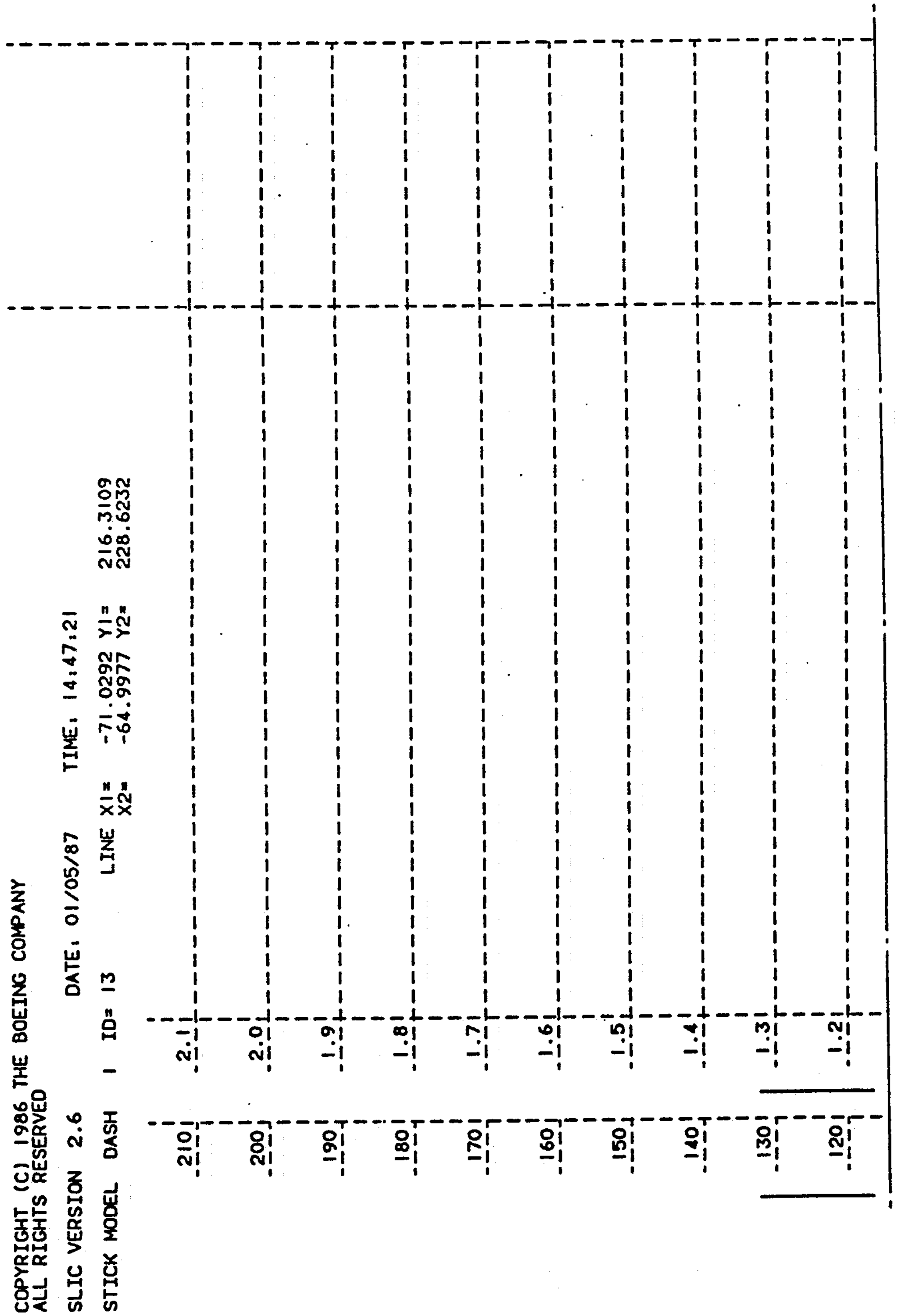
FIG. 47 illustrates the program output for section cuts.
Figure 47:
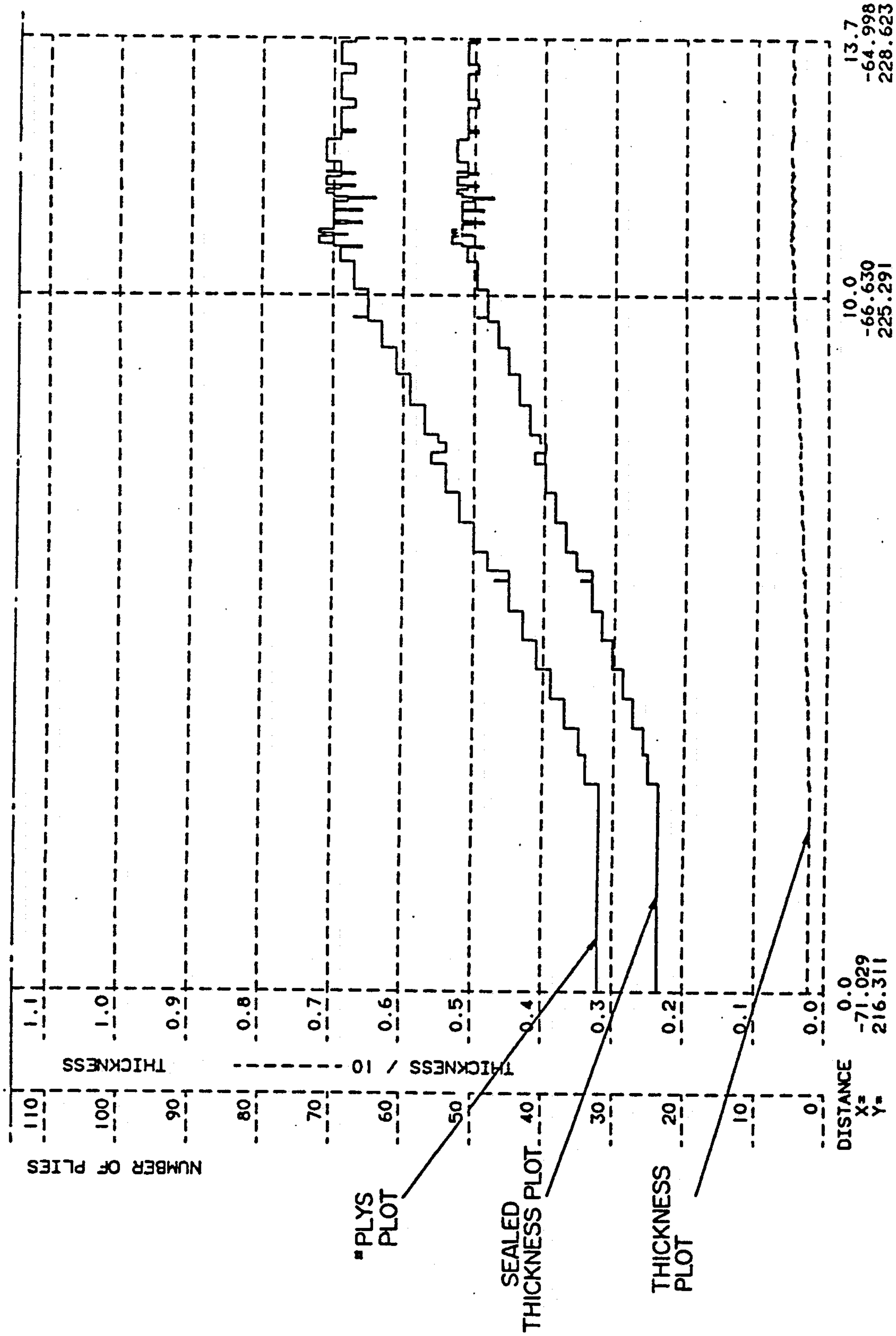

Upon execution of the section cut option, two models will be created for each cut line. One model will contain gauge data as in FIG. 47. The other model will contain E and E*T plots.

SEQUENCE DRAWINGS

Sequence Format Models

Figure 48:
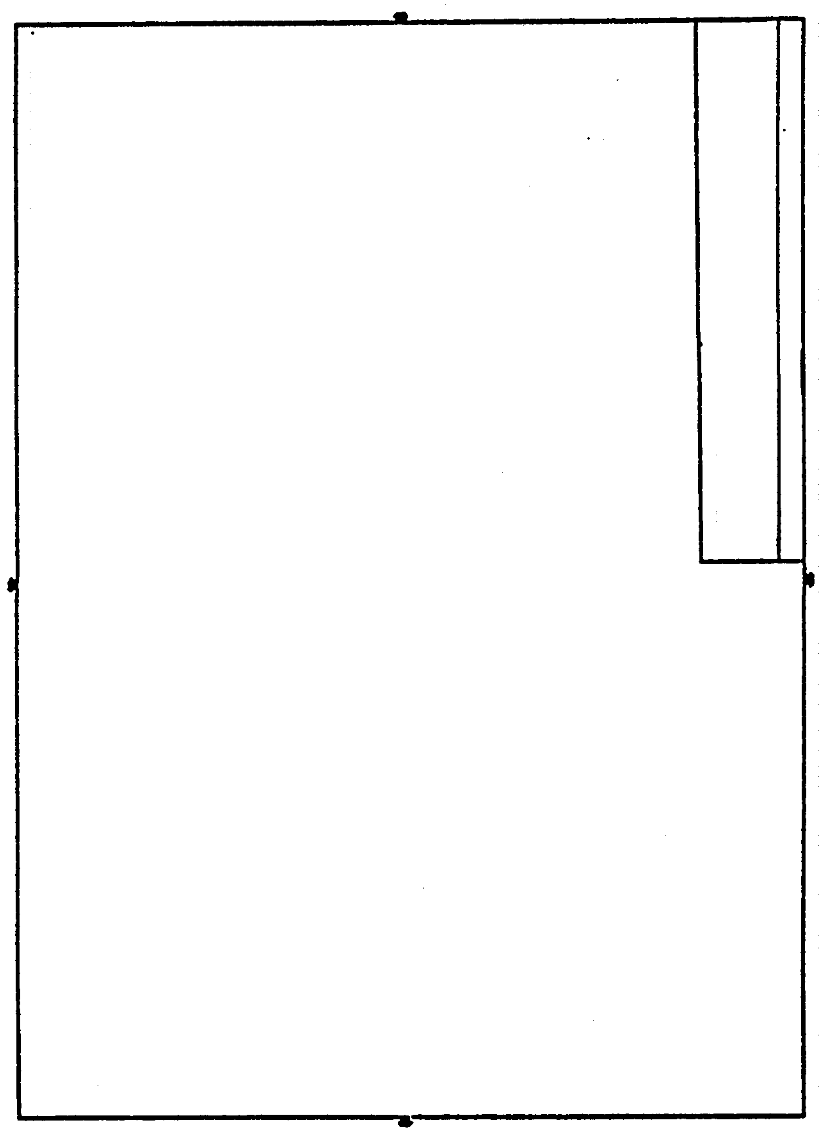
FIG. 48 illustrates a sequence picture page.

Sequence drawings are presented in the size furnished by the Sequence Format Model. The user creates the model which is copied into each SLIC-created sequence models when SLIC runs, as shown, for example, in FIG. 48.

The Start Format for the Sequence Format shall be obtained from the STDLIB. This format must be used with some explicit rules. The View PV Origin must correspond with the Origin of View PV of the parent model. For this document example, FIG. 15 shows this orientation.

The user shall then copy and transfer any peripheral geometry to View PV of the Sequence Format Model, View Scale PV, and/or the Format View, and move as required to obtain the proper orientation of the format to the picture. Add any location identifiers and change all picture lines to phantom or center, as desired. Any notes which are constant across all Sequence models may be added to this format.

Figure 49:
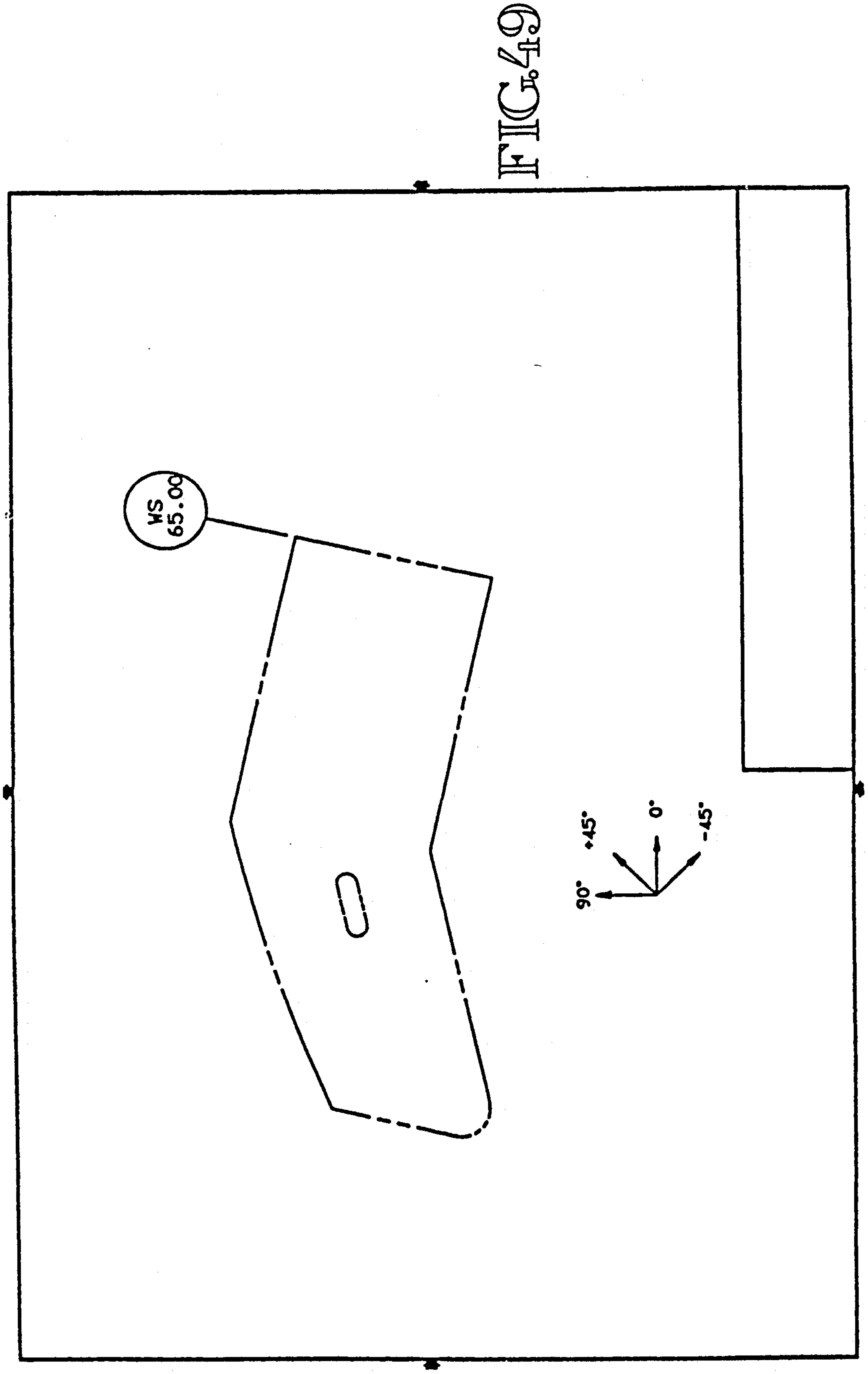
FIG. 49 illustrates a prepared sequence format model.

The Drawing Number, Sheet Number, and Revision Letter shall be edited. The Sequence number shall be NO-SHOwn. The page number shall be edited to contain the page number of the first Sequence Page. This note is then "NO-SHOwn." Do not erase these two entries as they are required by SLIC. The rosette shall be added where the user determines clarity is best served. Plot data should be added to this model at this time so that all picture models constructed by SLIC will include this data. See FIG. 49 for a Prepared Sequence Format Model.

Picture Format Model ID

The sequence format model will be filed by the operator. This model will be retrieved in SLIC when sequences are run. The user does not include this model in his run. SLIC will look for the model and run the sequences for the dash numbers for which a sequence format model exists. Because SLIC will look for the model, it is important that the sequence picture page model name be exact. The name will be as follows:

(1) The first through tenth characters shall contain the same characters as the parent model.

(2) The eleventh through fourteenth characters will be revised to read "SEQ0" (last character is zero).

(3) The fifteenth through eighteenth characters will be revised to designate dash number. The dash will always reside in the fifteenth character. A single digit dash number will have the number in the eighteenth character, leaving the sixteenth and seventeenth characters blank.

| | |
|---|---|
| Layup Numbers | L1 |
| Each Ply and Orientation | P1 = 90.0 |
| | P2 = 0.0 |

Sequence Output

Figure 50:
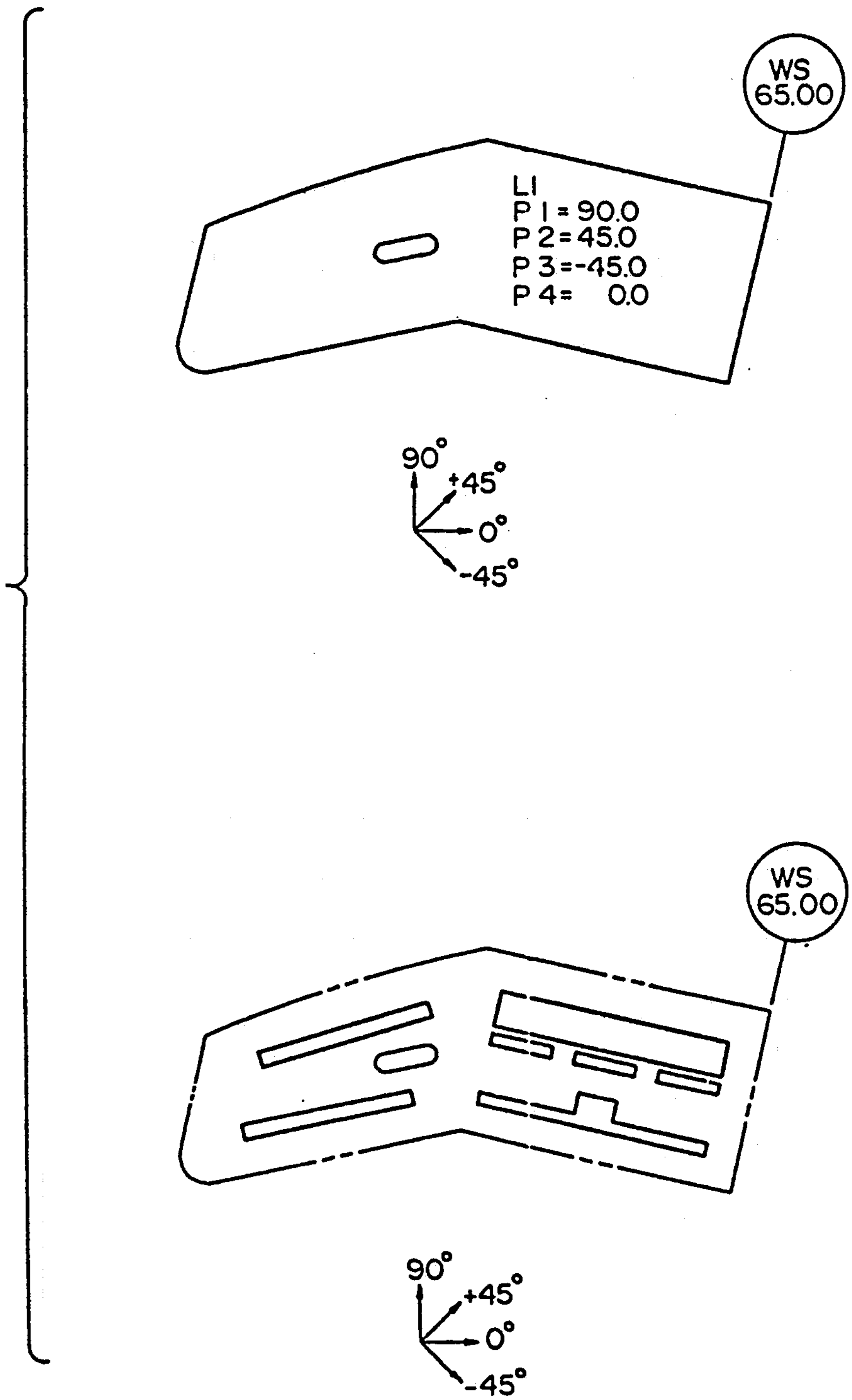
FIG. 50 illustrates sequence pages for SLIC sequence output.
Figure 50:
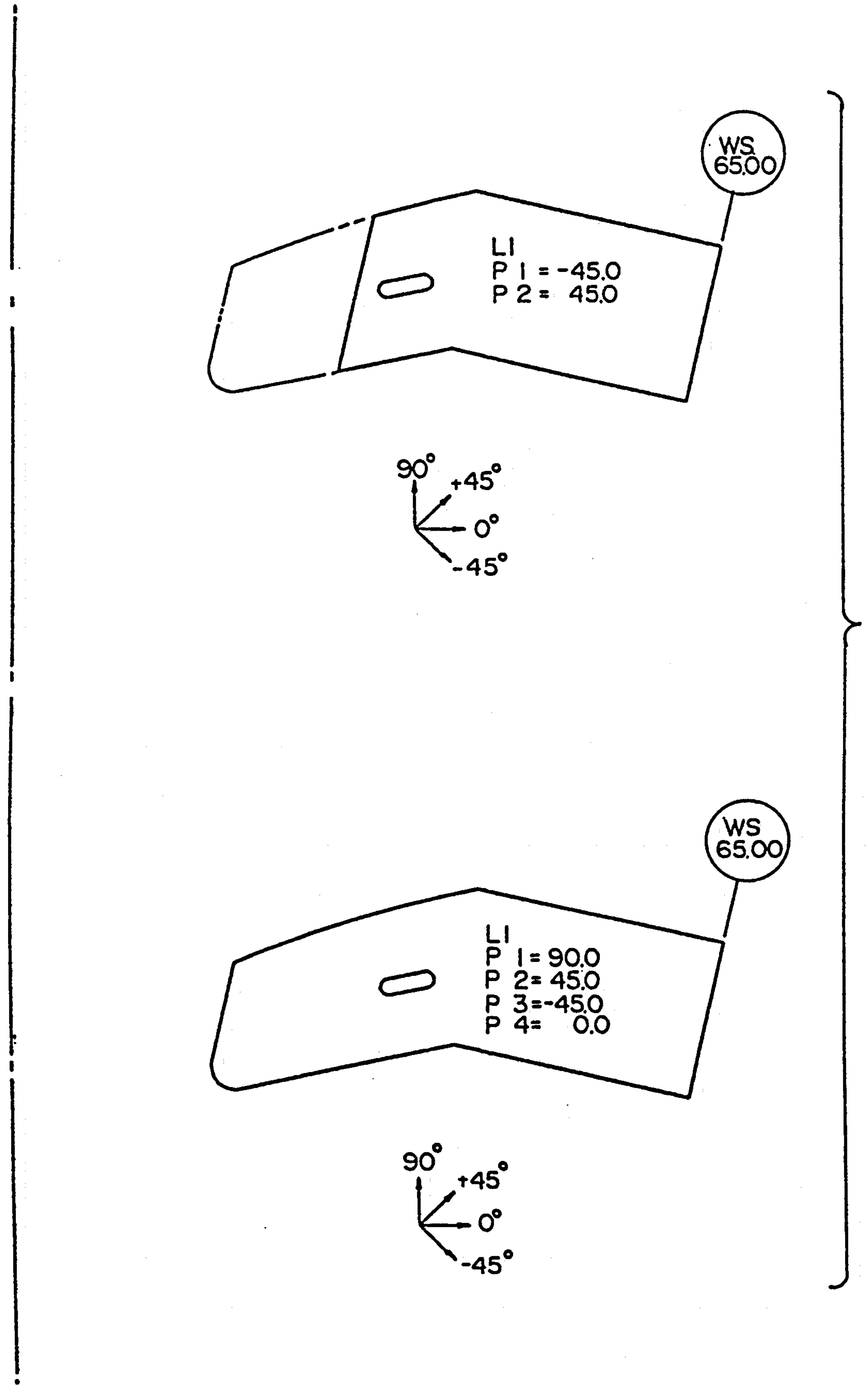

Upon executing Sequences, SLIC will construct Sequence page 2 and on, as shown in FIG. 50. These pages should be plotted and checked for errors. If geometry errors exist, they should be corrected on the parent sheets (geometry ply tables and formats) and Sequences re-executed.

Each layup of the sequence is presented by CADAM heavy lines as a CADAM DITTO. The layup will include:

| | |
|---|---|
| Example: 1234567890SEQ0,- , 1,– | |
| SLIC would generate models: | |
| 1234567890S002,03,01,– | |
| 1234567890S003,03,01,– | |
| 1234567890S004,03,01,– | etc. |

Due to space limitations, the data from one layup may overlie the data for another layup. The data may be moved on the detail page which represents the layup. If all sequence models do not get created, check CADAM drawfile size.

SLIC generates additional information on the NO-SHOW page of the sequences for traceability.

EXECUTING SLIC

The method an installation determines to run SLIC can vary. In order for SLIC to run the model IDs, group and user must be supplied to the JCL that runs SLIC. The following is a recommended method that allows a user the capability to run SLIC from a CADAM terminal and get results back in a short time period. This method requires a job to be set up in the IJPTABLE for submittal of SLIC.

In this case, three options exist from the terminal. The following are the required steps:

Access the user listing where the models reside.

Select /2/ on the menu.

Key in a VOLID. The operator may key in up to six characters to identify the job. Each operator should use caution not to repeat a VOLID to assure that two active tasks on the computer do not have the same ID. Once a job is complete on the system, a particular VOLID may be reused.

Select those CADAM models against which SLIC is to be executed. These models must be for a particular drawing set. One should not attempt to execute SLIC against unassociated models under a single VOLID.

Press the Y/N Key when all models have been selected. This removes the M on the left and actually places the VOLID on the models.

Select /MENU 1/.

Select /RETURN/ to access a CADAM model.

Select /DATA-M/.

Select /IJP/.

Display will provide three SLIC options. Select the desired SLIC program from the batch job table.

SLIC-WITHOUT PLY TABLE
SLIC-WITH PLY TABLE, PIERCE
SLIC-SEQUENCES

Select /SCHEDULE/ on the menu.

Key in the VOLID placed on the models.

Key in the name of the operator submitting the job.

Press the Y/N Function Key to begin execution.

Select /MENU 1/ to exit.

The operator may then proceed to other CADAM tasks and periodically check the user listing for the completion of the job. Depending on the size of the SLIC task, the completion of the job can take from a mere instant up to several minutes.

SLIC-WITHOUT PLY TABLE

This option will create models which describe ARROW/TEXT errors, and when no errors exist, models of each layup geometry entity for correction of geometric errors. This output is described in the Errors portions of this section.

SLIC-WITH PLY TABLE, PIERCE

This option executes all capabilities described in the Errors and Technology Output portions of this section.

SLIC-SEQUENCES

This option executes the capabilities described in the Sequence Drawings portion of this section.

Section Cuts

This option executes all capabilities described in the Technology Output portion of this section.

Although the present invention has been described herein primarily in terms of its embodiment in SLIC, it should be understood that the invention is not limited to this preferred embodiment, but rather includes all equivalent embodiments.

TABLE I

```
MEMBER NAME  CONVT
02C5E2C4  40404040  40400010  40400001  C3D6D5E5  E3C94040  00000000
000000C9  40404040  40404040  40404040  40404040  40404040  40404040
40404040  40404040  40404040  40404040  F0F0F0F0  F0F0F0F1*
02E3E7E3  40000000  40400038  40400001  47F0F00C  06C3D6D5  E5E3C900
90ECD00C  4510F05C  00000000  00000000  00000000  00000000  00000000
00000000  00000000  00000000  00000000  F0F0F0F0  F0F0F0F2*
02E3E7E3  40000038  40400038  40400001  00000000  00000000  00000000
00000000  00000000  00000000  00000000  00000000  00000000  18ED501E
000850E1  000418D1  98E1E00C  98561000  F0F0F0F0  F0F0F0F3*
02E3E7E3  40000070  40400038  40400001  58550000  4E50D09C  D207D0AC
D0A4DE07  D0ACD0A0  9540D0B0  4770D082  D203D0B0  D0B147F0  D0705850
D0B05056  000058DD  000498EC  D00C9601  F0F0F0F0  F0F0F0F4*
02E3E7E3  400000A8  40400008  40400001  D00F41F0  000007FE  40404040
40404040  40404040  40404040  40404040  40404040  40404040  40404040
40404040  40404040  40404040  40404040  F0F0F0F0  F0F0F0F5*
02E3E7E3  400000B8  40400008  40400001  40202020  20202120  40404040
40404040  40404040  40404040  40404040  40404040  40404040  40404040
40404040  40404040  40404040  40404040  F0F0F0F0  F0F0F0F6*
02E3E7E3  400000C8  40400001  40400001  40404040  40404040  40404040
40404040  40404040  40404040  40404040  40404040  40404040  40404040
40404040  40404040  40404040  40404040  F0F0F0F0  F0F0F0F7*
02C5D5C4  40404040  40404040  40404040  40404040  40404040  40404040
40404040  F1F5F6F6  F8F9F6F2  F0F140F0  F2F0F1F8  F7F0F9F8  40404040
40404040  40404040  40404040  40404040  F0F0F0F0  F0F0F0F8**

MEMBER NAME  MVCHRL
02C5E2C4  40404040  40400010  40400001  D4E5C3C8  D9D34040  00000000
00000020  40404040  40404040  40404040  40404040  40404040  40404040
40404040  40404040  40404040  40404040  F0F0F0F0  F0F0F0F1*
02E3E7E3  40000000  4040001E  40400001  90ECD00C  58210004  58310000
58410008  58330000  18530E24  98ECD00C  07FE4040  40404040  40404040
40404040  40404040  40404040  40404040  F0F0F0F0  F0F0F0F2*
02C5D5C4  40404040  40404040  40404040  40404040  40404040  40404040
40404040  F1F5F6F6  F8F9F6F2  F0F140F0  F2F0F1F8  F7F0F9F8  40404040
40404040  40404040  40404040  40404040  F0F0F0F0  F0F0F0F3**

MEMBER NAME  ICNTER
02C5E2C4  40404040  40400010  40400001  C9C3D5E3  C5D94040  00000000
00000034  40404040  40404040  40404040  40404040  40404040  40404040
40404040  40404040  40404040  40404040  F0F0F0F0  F0F0F0F1*
02E3E7E3  40000000  4040002C  40400001  90ECD00C  98231000  58430000
41524000  5B50F030  95405000  4770F020  4640F010  180498EF  D00C981C
D01807FE  40404040  40404040  40404040  F0F0F0F0  F0F0F0F2*
02E3E7E3  40000030  40400004  40400001  00000001  40404040  40404040
40404040  40404040  40404040  40404040  40404040  40404040  40404040
40404040  40404040  40404040  40404040  F0F0F0F0  F0F0F0F3*
02C5D5C4  40404040  40404040  40404040  40404040  40404040  40404040
40404040  F1F5F6F6  F8F9F6F2  F0F140F0  F2F0F1F8  F7F0F9F8  40404040
40404040  40404040  40404040  40404040  F0F0F0F0  F0F0F0F4**

MEMBER NAME  FSORT
02C5E2C4  40404040  40400030  40400001  C6E2D6D9  E3404040  00000000
00000194  C6D5C4C2  D3D5D240  02000000  40404040  C5F1F540  40404040
00000198  000000A4  40404040  40404040  F0F0F0F0  F0F0F0F1*
02C5E2C4  40404040  40400030  40400004  C5F3F540  40404040  00000240
000000BC  C6D5C4C2  D3D5D240  00000300  000000A8  C6C9D5C4  C2404040
01000300  40000005  40404040  40404040  F0F0F0F0  F0F0F0F2*
```

```
                                                                       PAGE 0002
02C5E2C4  40404040  40400030  40400006  C6E2C5D5  C4404040  000003A8
00000118  C6E2C7C5  E3404040  000004C0  0000017A  C6E2D7E4  E3404040
00000640  00000160  40404040  40404040  F0F0F0F0  F0F0F0F3*
02C5E2C4  40404040  40400020  40400009  E2E3D4D9  C5E7C9E3  000007A0
00000070  C4C1E3C1  40404040  00000810  00000070  40404040  40404040
40404040  40404040  40404040  40404040  F0F0F0F0  F0F0F0F4*
02E3E7E3  40000000  40400024  40400001  47F0F00A  05C6E2D6  D9E390EC
D00C50D0  F0284120  F0245020  D00858C0  F1900700  45D0F06C  40404040
40404040  40404040  40404040  40404040  F0F0F0F0  F0F0F0F5*
02E3E7E3  4000006C  40400038  40400001  98241000  5040C03C  D503C044
C0044770  D12C5020  C0504122  000C0700  47F0D06C  00000000  5020D078
4110D078  47F0D07C  00000000  58F0D068  F0F0F0F0  F0F0F0F6*
02E3E7E3  400000A4  40400038  40400001  05EF1210  4740D136  1A215020
C0545030  C0584133  000C0700  47F0D0A0  00000000  5030D0AC  4110D0AC
47F0D0B0  00000000  58F0D09C  05EF1210  F0F0F0F0  F0F0F0F7*
02E3E7E3  400000DC  40400038  40400001  4740D136  1A315030  C05CD203
D164C004  4110C048  41F0D0D4  47F0F048  00000114  00000000  80000828
00000000  00000000  00000000  00000000  F0F0F0F0  F0F0F0F8*
02E3E7E3  40000114  40400038  40400001  E2D6D9E3  40404040  00000000
00000000  00000000  00000000  00000048  00000000  00010000  00000000
00000000  0A2A5010  C04412FF  4770D140  F0F0F0F0  F0F0F0F9*
02E3E7E3  4000014C  40400038  40400001  47F0D14A  D203D164  C00847F0
D14AD203  D164C00C  47F0D14A  D203D164  C01047F0  D14A5810  C03CD203
1000D164  58D0D004  98ECD00C  41F00000  F0F0F0F0  F0F0F1F0**
02E3E7E3  40000184  40400002  40400001  07FE4040  40404040  40404040
40404040  40404040  40404040  40404040  40404040  40404040  40404040
40404040  40404040  40404040  40404040  F0F0F0F0  F0F0F1F1*
02E3E7E3  40000190  40400004  40400001  00000810  40404040  40404040
40404040  40404040  40404040  40404040  40404040  40404040  40404040
40404040  40404040  40404040  40404040  F0F0F0F0  F0F0F1F2*
02E3E7E3  40000198  40400020  40400003  47F0F008  03C5F1F5  90ECD00C
50D0F024  4120F020  5020D008  58C0F0A0  45D0F068  40404040  40404040
40404040  40404040  40404040  40404040  F0F0F0F0  F0F0F1F3*
02E3E7E3  40000200  40400032  40400003  1B004110  C01C0A02  4110C028
41000001  0A0158F0  C02841FF  0000D203  C028C004  5810C040  58D0D004
58ED000C  982CD01C  07FE4040  40404040  F0F0F0F0  F0F0F1F4*
02E3E7E3  40000238  40400004  40400003  00000810  40404040  40404040
40404040  40404040  40404040  40404040  40404040  40404040  40404040
40404040  40404040  40404040  40404040  F0F0F0F0  F0F0F1F5*
02E3E7E3  40000240  40400020  40400004  47F0F008  03C5F3F5  90ECD00C
50D0F024  4120F020  5020D008  58C0F0B8  45D0F068  40404040  40404040
40404040  40404040  40404040  40404040  F0F0F0F0  F0F0F1F6*
02E3E7E3  400002A8  40400038  40400004  58510000  5050C040  12554770
D0644100  00034110  C0200A02  47F0D06C  1B004110  C0200A02  4110C024
41000001  0A0158F0  C02441FF  0000D203  F0F0F0F0  F0F0F1F7*
02E3E7E3  400002E0  40400012  40400004  C024C004  58D0D004  58ED000C
982CD01C  07FE4040  40404040  40404040  40404040  40404040  40404040
40404040  40404040  40404040  40404040  F0F0F0F0  F0F0F1F8*
02E3E7E3  400002F8  40400004  40400004  00000810  40404040  40404040
40404040  40404040  40404040  40404040  40404040  40404040  40404040
40404040  40404040  40404040  40404040  F0F0F0F0  F0F0F1F9*
02E3E7E3  40000300  40400024  40400005  47F0F00A  05C6C9D5  C4C290EC

MEMBER NAME  FSORT
D00C50D0  F0284120  F0245020  D00858C0  F0A00700  45D0F06C  40404040
40404040  40404040  40404040  40404040  F0F0F0F0  F0F0F2F0**
02E3E7E3  4000036C  40400032  40400005  58210000  1B334150  00FE9540
20004780  D06A4133  00014122  00014650  D0525830  D0801803  58D0D004
98EFD00C  981CD018  07FE4040  40404040  F0F0F0F0  F0F0F2F1*
```

```
                                                                PAGE 0003
02E3E7E3  400003A0  40400008  40400005  00000810  FFFFFFFF  40404040
40404040  40404040  40404040  40404040  40404040  40404040  40404040
40404040  40404040  40404040  40404040  F0F0F0F0  F0F0F2F2*
02E3E7E3  400003A8  40400024  40400006  47F0F00A  05C6E2C5  D5C490EC
D00C50D0  F0284120  F0245020  D00858C0  F1100700  45D0F06C  40404040
40404040  40404040  40404040  40404040  F0F0F0F0  F0F0F2F3*
02E3E7E3  40000414  40400038  40400006  58210000  D2032000  C004D203
C01CC004  5830C020  D203C020  C004D203  C028C004  D203C030  C004D203
C034C004  D203C038  C004D203  C02CC004  F0F0F0F0  F0F0F2F4*
02E3E7E3  4000044C  40400038  40400006  D503C044  C0044780  D0CA4133
00005930  C0104770  D0A04110  C0184100  00010A01  4110C044  0A3ED203
C044C004  5830C018  D203C018  C004D203  F0F0F0F0  F0F0F2F5*
02E3E7E3  40000484  40400038  40400006  C024C004  41330000  12334770
D0D447F0  D0DED203  2000C008  47F0D0DE  D2032000  C00C47F0  D0DE58D0
D00498EC  D00C41F0  000007FE  00000810  F0F0F0F0  F0F0F2F6*
02E3E7E3  400004BC  40400004  40400006  00000000  40404040  40404040
40404040  40404040  40404040  40404040  40404040  40404040  40404040
40404040  40404040  40404040  40404040  F0F0F0F0  F0F0F2F7*
02E3E7E3  400004C0  40400024  40400007  47F0F00A  05C6E2C7  C5E390EC
D00C50D0  F0284120  F0245020  D00858C0  F1680700  45D0F06C  40404040
40404040  40404040  40404040  40404040  F0F0F0F0  F0F0F2F8*
02E3E7E3  4000052C  40400038  40400007  98241000  D203C034  C0045040
C03CD203  4000C004  D503C02C  C0084770  D070D203  4000D148  47F0D134
D503C044  C0044780  D1205833  00000630  F0F0F0F0  F0F0F2F9*
02E3E7E3  40000564  40400038  40400007  9140C018  4710D12A  D503C030
C0044770  D0A8D203  C030C008  D203C040  C0044100  00084110  C0280A02
5850D14C  4110C000  18F54100  00938900  F0F0F0F0  F0F0F3F0**
02E3E7E3  4000059C  40400038  40400007  00180A2F  4110C020  41000001
0A01D503  C034C004  4770D12A  41100001  0A2E5810  C0204111  00005910
C0104770  D1045840  C03CD203  4000D148  F0F0F0F0  F0F0F3F1*
02E3E7E3  400005D4  40400038  40400007  D203C02C  C0084100  00084110
C0240A02  47F0D134  D203C020  C0045850  C0404430  D1504100  00044110
C0240A02  47F0D134  D2034000  C00847F0  F0F0F0F0  F0F0F3F2*
02E3E7E3  4000060C  4040001A  40400007  D134D203  4000C00C  47F0D134
58D0D004  98ECD00C  41F00000  07FE4040  40404040  40404040  40404040
40404040  40404040  40404040  40404040  F0F0F0F0  F0F0F3F3*
02E3E7E3  40000628  40400012  40400007  00000810  FFFFFFFF  000007A0
D2002000  50004040  40404040  40404040  40404040  40404040  40404040
40404040  40404040  40404040  40404040  F0F0F0F0  F0F0F3F4*
02E3E7E3  40000640  40400024  40400008  47F0F00A  05C6E2D7  E4E390EC
D00C50D0  F0284120  F0245020  D00858C0  F1580700  45D0F06C  40404040
40404040  40404040  40404040  40404040  F0F0F0F0  F0F0F3F5*
02E3E7E3  400006AC  40400038  40400008  98241000  D203C034  C0045040
C03CD203  4000C004  D503C044  C0044780  D1029140  C0184710  D10CD503
C030C004  4770D116  D503C038  C0044770  F0F0F0F0  F0F0F3F6*
02E3E7E3  400006E4  40400038  40400008  D0BCD203  C038C008  5850D138
4110C000  18F54100  00938900  00180A2F  4110C01C  41000001  0A01D203
C01CC004  D503C034  C0044770  D10C4110  F0F0F0F0  F0F0F3F7*
02E3E7E3  4000071C  40400038  40400008  00010A2E  5020C040  4100000C
4110C028  0A025850  D1384110  C00018F5  41000093  89000018  0A2F4110
C01C4100  00010A01  D203C01C  C004D503  F0F0F0F0  F0F0F3F8*
02E3E7E3  40000754  40400038  40400008  C034C004  4770D10C  41100001
0A2E47F0  D124D203  4000C008  47F0D124  D2034000  C00C47F0  D124D203

MEMBER NAME  FSORT
4000C010  47F0D124  47F0D124  58D0D004  F0F0F0F0  F0F0F3F9*
02E3E7E3  4000078C  4040000A  40400008  98ECD00C  41F00000  07FE4040
40404040  40404040  40404040  40404040  40404040  40404040  40404040
40404040  40404040  40404040  40404040  F0F0F0F0  F0F0F4F0**
```

```
                                                                    PAGE 0004
02E3E7E3  40000798  40400008  40400008  00000810  000007A0  40404040
40404040  40404040  40404040  40404040  40404040  40404040  40404040
40404040  40404040  40404040  40404040  F0F0F0F0  F0F0F4F1*
02E3E7E3  400007A0  40400038  40400009  47F0F00E  08E2E3D4  D9C5E7C9
E30090EC  D00C05B0  58C0B054  9140C018  4710B024  5850B058  4110C000
18F54100  00938900  00180A2F  47F0B048  F0F0F0F0  F0F0F4F2*
02E3E7E3  400007D8  4040002A  40400009  D203C034  C008D503  C030C004
4770B040  1B004110  C01C0A02  47F0B048  1B004110  C0200A02  98ECD00C
07FE4040  40404040  40404040  40404040  F0F0F0F0  F0F0F4F3*
02E3E7E3  40000808  40400008  40400009  00000810  000007A0  40404040
40404040  40404040  40404040  40404040  40404040  40404040  40404040
40404040  40404040  40404040  40404040  F0F0F0F0  F0F0F4F4*
02E3E7E3  40000810  40400038  4040000A  00001770  00000000  00000001
00000002  00000003  00000004  00000000  00000000  00000000  00000000
00000000  00000000  00000000  00000000  F0F0F0F0  F0F0F4F5*
02E3E7E3  40000848  40400004  4040000A  00000000  40404040  40404040
40404040  40404040  40404040  40404040  40404040  40404040  40404040
40404040  40404040  40404040  40404040  F0F0F0F0  F0F0F4F6*
02E3E7E3  40000850  40400030  4040000A  00000000  00000000  8000085E
07000020  00000000  00000000  00000000  00000000  00000198  00000240
00030D40  FF4DC95D  40404040  40404040  F0F0F0F0  F0F0F4F7*
02D9D3C4  40404040  40400038  40404040  00010001  0C0000F8  00020001
1D00008C  1C0000C0  000A0001  0D000100  0C000190  000A0003  0C000238
000A0004  0C0002F8  000A0005  0C0003A0  F0F0F0F0  F0F0F4F8*
02D9D3C4  40404040  40400038  40404040  000A0006  0C0004B8  00090007
0C000630  000A0007  0C000628  00090008  0C00079C  000A0008  0C000798
00090009  0C00080C  000A0009  0C000808  F0F0F0F0  F0F0F4F9*
02D9D3C4  40404040  40400018  40404040  0003000A  0C000870  0004000A
0C000874  000A000A  08000859  40404040  40404040  40404040  40404040
40404040  40404040  40404040  40404040  F0F0F0F0  F0F0F5F0**
02C5D5C4  40404040  40404040  40404040  40404040  40404040  40404040
40404040  F1F5F6F6  F8F9F6F2  F0F140F0  F2F0F1F8  F7F0F9F8  40404040
40404040  40404040  40404040  40404040  F0F0F0F0  F0F0F5F1**

MEMBER NAME  MODSIZ30
02C5E2C4  40404040  40400020  40400001  D4D6C4E2  C9E94040  00000000
00000008  40404040  40404040  05000000  0001DCF8  40404040  40404040
40404040  40404040  40404040  40404040  F0F0F0F0  F0F0F0F1*
02E3E7E3  40000000  40400008  40400001  00007530  0000773E  40404040
40404040  40404040  40404040  40404040  40404040  40404040  40404040
40404040  40404040  40404040  40404040  F0F0F0F0  F0F0F0F2*
02C5D5C4  40404040  40404040  40404040  40404040  40404040  40404040
40404040  F1F5F6F6  F8F9F6F2  F0F140F0  F2F0F1F8  F7F0F9F8  40404040
40404040  40404040  40404040  40404040  F0F0F0F0  F0F0F0F3**

MEMBER NAME  AROTXT
02C5E2C4  40404040  40400010  40400001  C1D9D6E3  E7E34040  00000000
40000000  40404040  40404040  40404040  40404040  40404040  40404040
40404040  40404040  40404040  40404040  C1D9D6E3  F0F0F0F1*
02E3E7E3  40080000  40400038  40400001  47F0F00C  07C1D9D6  E3E7E340
90ECD00C  184D98CD  F0205040  D00450D0  400807FC  40404040  40404040
020A0803  18010A08  0318011A  2740D5D6  C1D9D6E3  F0F0F0F2*
02E3E7E3  40000038  40400038  40400001  40E5C1D3  C9C440D5  E4D4C2C5
D940C6D6  E4D5C440  C6D6D940  D7C9C5D9  C3C540D7  D6C9D5E3  18322202
06481401  22021A25  40C5D9D9  D6D940C9  C1D9D6E3  F0F0F0F3*
02E3E7E3  40000070  4040001E  40400001  D540C2C3  E2D3C9C2  40C9D540
C1D9D6E3  E7E340E2  E4C2D9D6  E4E3C9D5  C5224040  40404040  40404040
40404040  40404040  40404040  40404040  C1D9D6E3  F0F0F0F4*
02E3E7E3  40000090  40400038  40400001  40404040  40404040  F9404040
```

```
40404040  F0404040  40404040  60404040  40404040  D3404040  40404040
6B404040  40404040  E3404040  40404040  C1D9D6E3  F0F0F0F5*
02E3E7E3  400000C8  40400018  40400001  D7C9C5D9  C3C5D7D6  C9D5E340
40404040  40404040  40404040  40404040  40404040  40404040  40404040
40404040  40404040  40404040  40404040  C1D9D6E3  F0F0F0F6*
02E3E7E3  40000258  40400038  40400001  00000000  00000000  4F080000
00000000  00000000  00000000  00000000  00000001  00000001  00000002
00000003  00000004  0000000B  0000000C  C1D9D6E3  F0F0F0F7*
02C5E2C4  40404040  40400010  40400002  D7E3C1C2  D3C54040  05000000
40125768  40404040  40404040  40404040  40404040  40404040  40404040
40404040  40404040  40404040  40404040  C1D9D6E3  F0F0F0F8*
02E3E7E3  40000290  40400020  40400001  00000010  00000014  00000018
00000048  00000100  41100000  00000000  00000000  40404040  40404040
40404040  40404040  40404040  40404040  C1D9D6E3  F0F0F0F9*
02C5E2C4  40404040  40400010  40400003  D7D7D6C9  D5E34040  05000000
40013884  40404040  40404040  40404040  40404040  40404040  40404040
40404040  40404040  40404040  40404040  C1D9D6E3  F0F0F1F0**
02C5E2C4  40404040  40400010  40400004  D7C3C5D9  D9404040  05000000
40003844  40404040  40404040  40404040  40404040  40404040  40404040
40404040  40404040  40404040  40404040  C1D9D6E3  F0F0F1F1*
02C5E2C4  40404040  40400010  40400005  D6D7E3C9  D6D54040  05000000
40000020  40404040  40404040  40404040  40404040  40404040  40404040
40404040  40404040  40404040  40404040  C1D9D6E3  F0F0F1F2*
02C5E2C4  40404040  40400010  40400006  C6D3E340  40404040  02000000
40000000  40404040  40404040  40404040  40404040  40404040  40404040
40404040  40404040  40404040  40404040  C1D9D6E3  F0F0F1F3*
02E3E7E3  40000428  40400020  40400001  FFFFFFEC  00058600  000B0444
00108298  FFFFFFF0  FFFFFFBB  00000000  00000000  40404040  40404040
40404040  40404040  40404040  40404040  C1D9D6E3  F0F0F1F4*
02D9D3C4  40404040  40400038  40404040  00020001  0C000428  00020001
0C00042C  00020001  0C000430  00020001  0C000434  00030001  0C000438
00040001  0C00043C  00050001  0C000440  C1D9D6E3  F0F0F1F5*
02E3E7E3  40000448  40400004  40400001  00000000  40404040  40404040
40404040  40404040  40404040  40404040  40404040  40404040  40404040
40404040  40404040  40404040  40404040  C1D9D6E3  F0F0F1F6*
02C5E2C4  40404040  40400010  40400007  C9E2D9C3  C8404040  02000000
40000000  40404040  40404040  40404040  40404040  40404040  40404040
40404040  40404040  40404040  40404040  C1D9D6E3  F0F0F1F7*
02E3E7E3  40000450  40400004  40400001  00000000  40404040  40404040
40404040  40404040  40404040  40404040  40404040  40404040  40404040
40404040  40404040  40404040  40404040  C1D9D6E3  F0F0F1F8*
02C5E2C4  40404040  40400010  40400008  D4E5C3C8  D9404040  02000000
40000000  40404040  40404040  40404040  40404040  40404040  40404040
40404040  40404040  40404040  40404040  C1D9D6E3  F0F0F1F9*
02C5E2C4  40404040  40400010  40400009  C3D4D7D9  E2E24040  02000000

MEMBER NAME  AROTXT
40000000  40404040  40404040  40404040  40404040  40404040  40404040
40404040  40404040  40404040  40404040  C1D9D6E3  F0F0F2F0**
02C5E2C4  40404040  40400010  4040000A  C9C2C3D6  D47B4040  02000000
40000000  40404040  40404040  40404040  40404040  40404040  40404040
40404040  40404040  40404040  40404040  C1D9D6E3  F0F0F2F1*
02C5E2C4  40404040  40400010  4040000B  C9E2D9C3  C8E54040  02000000
40000000  40404040  40404040  40404040  40404040  40404040  40404040
40404040  40404040  40404040  40404040  C1D9D6E3  F0F0F2F2*
02C5E2C4  40404040  40400010  4040000C  D2D6D4D7  D9E54040  02000000
40000000  40404040  40404040  40404040  40404040  40404040  40404040
40404040  40404040  40404040  40404040  C1D9D6E3  F0F0F2F3*
02C5E2C4  40404040  40400010  4040000D  E2D7D3E3  E7E34040  02000000
```

```
                                                                    PAGE 0006
40000000  40404040  40404040  40404040  40404040  40404040  40404040
40404040  40404040  40404040  40404040  C1D9D6E3  F0F0F2F4*
02E3E7E3  40000458  4040001C  40400001  00000000  00000000  00000000
00000000  00000000  00000000  00000000  40404040  40404040  40404040
40404040  40404040  40404040  40404040  C1D9D6E3  F0F0F2F5*
02D9D3C4  40404040  40400038  40404040  00060001  1C000444  00070001
1C000458  00080001  1C00045C  00090001  1C000460  000A0001  1C000464
000B0001  1C000468  000C0001  1C00046C  C1D9D6E3  F0F0F2F6*
02E3E7E3  400002E4  40400004  40400001  000000C8  40404040  40404040
40404040  40404040  40404040  40404040  40404040  40404040  40404040
40404040  40404040  40404040  40404040  C1D9D6E3  F0F0F2F7*
02E3E7E3  40000480  40400038  40400001  5890D368  58A0D35C  58B0D358
5860D1AC  58F0D354  5800F008  4000D342  58F0D380  4110D084  05EF41E0
000415FE  4720D3D6  58EFD04C  07FE5820  C1D9D6E3  F0F0F2F8*
02E3E7E3  400004B8  40400038  40400001  D1F45A20  D1985020  D1E45920
D1C04730  D41C1882  58B0D1C0  4108D22F  5000D098  58F0D37C  4110D094
05EF5A80  D198198B  47C0D3F0  58B0D358  C1D9D6E3  F0F0F2F9*
02E3E7E3  400004F0  40400038  40400001  47F0D41C  1BFF58E0  D00007FE
58F0D360  5800F010  1BFF870F  D56E5800  D1F45900  D1A84750  D56E58F0
D3884110  D0A005EF  41E00004  15FE4720  C1D9D6E3  F0F0F3F0**
02E3E7E3  40000528  40400038  40400001  D45058EF  D05407FE  5800D1DC
12004780  D56E58F0  D3904110  D0B805EF  5800D208  12004730  D4D85800
A0455900  D20447A0  D4D85850  A0455A50  C1D9D6E3  F0F0F3F1*
02E3E7E3  40000560  40400038  40400001  D1985050  A04558F0  D3841800
45E0F004  00000000  00000028  45E0F008  04709004  45E0F008  04709008
45E0F010  58F0D384  45E0F000  00000000  C1D9D6E3  F0F0F3F2*
02E3E7E3  40000598  40400038  40400001  0000005F  5C40D1BC  45E0F134
00010000  0125A001  01000048  00000001  45E0F010  5820B010  5A20D198
5020B010  7820D344  89200004  7022B004  C1D9D6E3  F0F0F3F3*
02E3E7E3  400005D0  40400038  40400001  78209004  7022B008  78209008
7022B00C  7800D190  7002B010  58F0D378  4110D0CC  05EF41E0  000415FE
4720D522  58EFD05C  07FE5800  D1DC1200  C1D9D6E3  F0F0F3F4*
02E3E7E3  40000608  40400038  40400001  4770D534  1BFF58E0  D00007FE
5800D1F4  5B00D1DC  5000D1F0  58E0D1DC  410ED230  5000D0E0  58F0D364
4110D0E0  05EF5820  B0108920  00047800  C1D9D6E3  F0F0F3F5*
02E3E7E3  40000640  40400038  40400001  D1F87002  B0101BFF  58E0D000
07FE5800  D1985000  D1EC5800  D1945000  D2185800  D1885000  D22C5890
D1C858A0  D19858B0  D3545880  D3685800  C1D9D6E3  F0F0F3F6*
02E3E7E3  40000678  40400038  40400001  D1EC5900  D1F447C0  D5B65890
D36858A0  D35C58B0  D3581BFF  58E0D000  07FE58F0  D3784110  D0EC05EF
41E00004  15FE4720  D5D058EF  D06407FE  C1D9D6E3  F0F0F3F7*
02E3E7E3  400006B0  40400038  40400001  5800D1D4  12004770  D5EE5890
D36858A0  D35C58B0  D3581BFF  58E0D000  07FE5800  D2188609  D6685800
D22C8609  D67058F0  D3784110  D10005EF  C1D9D6E3  F0F0F3F8*
02E3E7E3  400006E8  40400038  40400001  41E00004  15FE4720  D61858EF
D06C07FE  5830D1D4  1B3A5030  D1E05930  D1DC4130  00014760  D6301B33

MEMBER NAME  AROTXT
5030D394  5800D1DC  5900D18C  41200001  C1D9D6E3  F0F0F3F9*
02E3E7E3  40000720  40400038  40400001  4780D646  1B221623  5020D398
8729D658  5800D194  5000D218  5800D398  8609D670  5800D194  5000D22C
5800D188  5000D218  5820D1D4  1A2A5020  C1D9D6E3  F0F0F4F0**
02E3E7E3  40000758  40400038  40400001  D2005830  D18C5030  D1F01879
5890D18C  18A318B2  410BD22F  5000D114  58F0D38C  4110D114  05EF50A0
D1F041E0  000415FE  4720D6B2  58EFD074  C1D9D6E3  F0F0F4F1*
02E3E7E3  40000790  40400038  40400001  07FE410B  D22F5000  D12C58F0
D38C4110  D12C05EF  50A0D1F0  41E00004  15FE4720  D6D858EF  D07C07FE
5990D224  41200001  4720D6E6  1B225990  C1D9D6E3  F0F0F4F2*
02E3E7E3  400007C8  40400038  40400001  D2284130  00014740  D6F41B33
```

```
                                                                      PAGE 0007
162319A9  41300001  4780D702  1B331423  8727D710  50A0D1F0  47F0D890
5800D224  120047A0  D72250A0  D1F047F0  C1D9D6E3  F0F0F4F3*
02E3E7E3  40000800  40400038  40400001  D75E5800  D2281200  47C0D734
50A0D1F0  47F0D75E  5AA0D198  410AD32F  5000D148  410BD22F  5000D14C
9280D14C  58F0D37C  4110D144  05EF5AB0  C1D9D6E3  F0F0F4F4*
02E3E7E3  40000838  40400038  40400001  D19847F0  D68C58B0  D35458A0
D1985890  D1C87800  D1F87000  D21C58F0  D3644110  D15005EF  5850B00C
1A5A5050  B00C2B00  7800D1F8  6A00D180  C1D9D6E3  F0F0F4F5*
02E3E7E3  40000870  40400038  40400001  6000D178  5820D17C  5020D210
4020D340  1C464105  B0045000  D16058F0  D37C4110  D15C05EF  78208004
18565C40  B00C7025  B0087820  80087025  C1D9D6E3  F0F0F4F6*
02E3E7E3  400008A8  40400038  40400001  B00C5800  D2188609  D8B05800
D22C8709  D8B02B00  7800D21C  6A00D180  6000D178  5830D17C  5030D39C
1A3A5030  D20C1802  1B0A5000  D1E87800  C1D9D6E3  F0F0F4F7*
02E3E7E3  400008E0  40400038  40400001  D21C7900  D1F847C0  D8101A2A
5020D20C  7800D21C  7900D1F8  47C0D826  5800D39C  1B0A5000  D1E87820
D1F87B20  D21C3022  7920D1C4  4780D884  C1D9D6E3  F0F0F4F8*
02E3E7E3  40000918  40400038  40400001  5880D20C  58B0D1E8  5890D354
5870D368  4080D340  5830900C  1A3A5030  900C1C26  41039004  5000D160
58F0D37C  4110D15C  05EF7820  70041836  C1D9D6E3  F0F0F4F9*
02E3E7E3  40000950  40400038  40400001  5C20900C  70239008  78207008
7023900C  878AD848  5880D368  58B0D354  5890D1C8  58B0D354  58A0D198
5890D1C8  5800D188  5000D22C  5800D194  C1D9D6E3  F0F0F5F0**
02E3E7E3  40000988  40400038  40400001  5000D218  47F0D8B8  5800D188
5000D218  188A58B0  D1F04108  D32F5000  D16C58F0  D37C4110  D16805EF
5A80D198  198B47C0  D8BE5880  D36858B0  C1D9D6E3  F0F0F5F1*
02E3E7E3  400009C0  40400038  40400001  D3545800  D1F05A00  D2005000
D1EC47F0  D5965890  D36858A0  D35C58B0  D35858F0  D3841800  45E0F004
00000006  00000065  45E0F010  58F0D384  C1D9D6E3  F0F0F5F2*
02E3E7E3  400009F8  40400038  40400001  45E0F034  05404040  F1F558A0
D00458E0  A00C58B0  A0185810  B0045820  D2145020  100018DA  92FFA00C
982CA01C  07FE9878  10045820  70005020  C1D9D6E3  F0F0F5F3*
02E3E7E3  40000A30  40400036  40400001  D2145820  10004130  20004150
00011B25  5020D370  5030D374  5030D084  58201008  41302000  41500004
1B255020  D3685030  D36C47F0  D3A04040  C1D9D6E3  F0F0F5F4*
02E3E7E3  40000020  40400008  40400001  00000A26  000000E0  40404040
40404040  40404040  40404040  40404040  40404040  40404040  40404040
40404040  40404040  40404040  40404040  C1D9D6E3  F0F0F5F5*
02E3E7E3  400000E0  40400004  40400001  00000A02  40404040  40404040
40404040  40404040  40404040  40404040  40404040  40404040  40404040
40404040  40404040  40404040  40404040  C1D9D6E3  F0F0F5F6*
02E3E7E3  4000012C  40400004  40400001  000004B6  40404040  40404040
40404040  40404040  40404040  40404040  40404040  40404040  40404040
40404040  40404040  40404040  40404040  C1D9D6E3  F0F0F5F7*
02D9D3C4  40404040  40400038  40404040  000D0001  1C000470  00010001
0C000574  00010001  0C000598  00010001  0C0009EC  00010001  0C000020
00010001  0C000024  00010001  0C0000E0  C1D9D6E3  F0F0F5F8*

MEMBER NAME  AROTXT
02E3E7E3  40000130  4040001C  40400001  000004F4  00000530  000009D2
00000602  000009D2  000006B0  000009D2  40404040  40404040  40404040
40404040  40404040  40404040  40404040  C1D9D6E3  F0F0F5F9*
02D9D3C4  40404040  40400038  40404040  00010001  0C00012C  00010001
0C000130  00010001  0C000134  00010001  0C000138  00010001  0C00013C
00010001  0C000140  00010001  0C000144  C1D9D6E3  F0F0F6F0**
02E3E7E3  4000014C  40400018  40400001  000006F8  000009D2  00000792
000009D2  000007B8  000009D2  40404040  40404040  40404040  40404040
40404040  40404040  40404040  40404040  C1D9D6E3  F0F0F6F1*
02E3E7E3  40000168  40400004  40400001  000002F4  40404040  40404040
```

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | C1D9D6E3 | F0F0F6F2* | |
| 02D9D3C4 | 40404040 | 40400038 | 40404040 | 00010001 | 0C000148 | 00010001 |
| 0C00014C | 00010001 | 0C000150 | 00010001 | 0C000154 | 00010001 | 0C000158 |
| 00010001 | 0C00015C | 00010001 | 0C000160 | C1D9D6E3 | F0F0F6F3* | |
| 02E3E7E3 | 4000016C | 4040000C | 40400001 | 00000310 | 800002D4 | 00000278 |
| 40404040 | 40404040 | 40404040 | 40404040 | 40404040 | 40404040 | 40404040 |
| 40404040 | 40404040 | 40404040 | 40404040 | C1D9D6E3 | F0F0F6F4* | |
| 02E3E7E3 | 4000017C | 40400010 | 40400001 | 800000D8 | 00000310 | 00000278 |
| 000000C8 | 40404040 | 40404040 | 40404040 | 40404040 | 40404040 | 40404040 |
| 40404040 | 40404040 | 40404040 | 40404040 | C1D9D6E3 | F0F0F6F5* | |
| 02D9D3C4 | 40404040 | 40400038 | 40404040 | 00010001 | 0C000168 | 00010001 |
| 0C00016C | 00010001 | 0C000170 | 00010001 | 0C000174 | 00010001 | 0C00017C |
| 00010001 | 0C000180 | 00010001 | 0C000184 | C1D9D6E3 | F0F0F6F6* | |
| 02E3E7E3 | 4000018C | 4040001C | 40400001 | 000002D4 | 00000288 | 800002BC |
| 00000310 | 000002D4 | 000000C0 | 00000424 | 40404040 | 40404040 | 40404040 |
| 40404040 | 40404040 | 40404040 | 40404040 | C1D9D6E3 | F0F0F6F7* | |
| 02D9D3C4 | 40404040 | 40400038 | 40404040 | 00010001 | 0C000188 | 00010001 |
| 0C00018C | 00010001 | 0C000190 | 00010001 | 0C000194 | 00010001 | 0C000198 |
| 00010001 | 0C00019C | 00010001 | 0C0001A0 | C1D9D6E3 | F0F0F6F8* | |
| 02E3E7E3 | 400001A8 | 40400018 | 40400001 | 800002E8 | 00000310 | 00000278 |
| 000002D4 | 000000B8 | 800002BC | 40404040 | 40404040 | 40404040 | 40404040 |
| 40404040 | 40404040 | 40404040 | 40404040 | C1D9D6E3 | F0F0F6F9* | |
| 02E3E7E3 | 400001C4 | 40400004 | 40400001 | 000002D0 | 40404040 | 40404040 |
| 40404040 | 40404040 | 40404040 | 40404040 | 40404040 | 40404040 | 40404040 |
| 40404040 | 40404040 | 40404040 | 40404040 | C1D9D6E3 | F0F0F7F0** | |
| 02D9D3C4 | 40404040 | 40400038 | 40404040 | 00010001 | 0C0001A4 | 00010001 |
| 0C0001A8 | 00010001 | 0C0001AC | 00010001 | 0C0001B0 | 00010001 | 0C0001B4 |
| 00010001 | 0C0001B8 | 00010001 | 0C0001BC | C1D9D6E3 | F0F0F7F1* | |
| 02E3E7E3 | 400001C8 | 4040001C | 40400001 | 800002D8 | 00000310 | 000002CC |
| 000002D4 | 000000B0 | 800002B4 | 00000310 | 40404040 | 40404040 | 40404040 |
| 40404040 | 40404040 | 40404040 | 40404040 | C1D9D6E3 | F0F0F7F2* | |
| 02D9D3C4 | 40404040 | 40400038 | 40404040 | 00010001 | 0C0001C4 | 00010001 |
| 0C0001C8 | 00010001 | 0C0001CC | 00010001 | 0C0001D0 | 00010001 | 0C0001D4 |
| 00010001 | 0C0001D8 | 00010001 | 0C0001DC | C1D9D6E3 | F0F0F7F3* | |
| 02E3E7E3 | 400001E4 | 40400010 | 40400001 | 000002CC | 000002D4 | 000000A8 |
| 800002BC | 40404040 | 40404040 | 40404040 | 40404040 | 40404040 | 40404040 |
| 40404040 | 40404040 | 40404040 | 40404040 | C1D9D6E3 | F0F0F7F4* | |
| 02E3E7E3 | 400001F8 | 4040000C | 40400001 | 00000278 | 000000A0 | 00000278 |
| 40404040 | 40404040 | 40404040 | 40404040 | 40404040 | 40404040 | 40404040 |
| 40404040 | 40404040 | 40404040 | 40404040 | C1D9D6E3 | F0F0F7F5* | |
| 02D9D3C4 | 40404040 | 40400038 | 40404040 | 00010001 | 0C0001E0 | 00010001 |
| 0C0001E4 | 00010001 | 0C0001E8 | 00010001 | 0C0001EC | 00010001 | 0C0001F0 |
| 00010001 | 0C0001F8 | 00010001 | 0C0001FC | C1D9D6E3 | F0F0F7F6* | |
| 02E3E7E3 | 40000204 | 40400008 | 40400001 | 00000278 | 80000304 | 40404040 |
| 40404040 | 40404040 | 40404040 | 40404040 | 40404040 | 40404040 | 40404040 |
| 40404040 | 40404040 | 40404040 | 40404040 | C1D9D6E3 | F0F0F7F7* | |
| 02E3E7E3 | 40000210 | 40400014 | 40400001 | 00000278 | 00000098 | 00000278 |

MEMBER NAME AROTXT

| | | | | | | |
|---|---|---|---|---|---|---|
| 00000278 | 80000308 | 40404040 | 40404040 | 40404040 | 40404040 | 40404040 |
| 40404040 | 40404040 | 40404040 | 40404040 | C1D9D6E3 | F0F0F7F8* | |
| 02D9D3C4 | 40404040 | 40400038 | 40404040 | 00010001 | 0C000200 | 00010001 |
| 0C000204 | 00010001 | 0C000208 | 00010001 | 0C000210 | 00010001 | 0C000214 |
| 00010001 | 0C000218 | 00010001 | 0C00021C | C1D9D6E3 | F0F0F7F9* | |
| 02E3E7E3 | 40000224 | 40400004 | 40400001 | 00000278 | 40404040 | 40404040 |
| 40404040 | 40404040 | 40404040 | 40404040 | 40404040 | 40404040 | 40404040 |
| 40404040 | 40404040 | 40404040 | 40404040 | C1D9D6E3 | F0F0F8F0** | |
| 02E3E7E3 | 4000022C | 40400014 | 40400001 | 80000000 | 00000410 | 000002D0 |

```
                                                                      PAGE 0009
800002D8  00000284  40404040  40404040  40404040  40404040  40404040
40404040  40404040  40404040  40404040  C1D9D6E3  F0F0F8F1*
02E3E7E3  40000244  40400008  40400001  80000420  00000278  40404040
40404040  40404040  40404040  40404040  40404040  40404040  40404040
40404040  40404040  40404040  40404040  C1D9D6E3  F0F0F8F2*
02D9D3C4  40404040  40400038  40404040  00010001  0C000220  00010001
0C000224  00010001  0C000230  00010001  0C000234  00010001  0C000238
00010001  0C00023C  00010001  0C000244  C1D9D6E3  F0F0F8F3*
02E3E7E3  40000250  40400004  40400001  80000090  40404040  40404040
40404040  40404040  40404040  40404040  40404040  40404040  40404040
40404040  40404040  40404040  40404040  C1D9D6E3  F0F0F8F4*
02E3E7E3  40000474  4040000C  40400001  00000000  00000000  00000000
40404040  40404040  40404040  40404040  40404040  40404040  40404040
40404040  40404040  40404040  40404040  C1D9D6E3  F0F0F8F5*
02D9D3C4  40404040  40400010  40404040  00010001  0C000248  00010001
0C000250  40404040  40404040  40404040  40404040  40404040  40404040
40404040  40404040  40404040  40404040  C1D9D6E3  F0F0F8F6*
02C5D5C4  40404040  40404040  40404040  40404040  40404040  40404040
00000A66  F1F5F7F3  F460C6D6  F34040F0  F2F0F2F8  F7F0F9F8  40F0F84B
F1F14BF4  F4404040  C1D9D6E3  E7E34040  C1D9D6E3  F0F0F8F7**

MEMBER NAME  BCHAN1
02C5E2C4  40404040  40400010  40400001  C2C3C8C1  D5F14040  00000000
40000000  40404040  40404040  40404040  40404040  40404040  40404040
40404040  40404040  40404040  40404040  C2C3C8C1  F0F0F0F1*
02E3E7E3  40000000  40400028  40400001  47F0F00C  07C2C3C8  C1D5F140
90ECD00C  184D98CD  F0205040  D00450D0  400807FC  40404040  40404040
40404040  40404040  40404040  40404040  C2C3C8C1  F0F0F0F2*
02E3E7E3  40000078  40400038  40400001  00000000  00000000  4F080000
00000000  00000000  00000001  00000001  00000002  00000003  00000004
00000005  00000006  0000000E  00000000  C2C3C8C1  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  C2C3C8C1  F0F0F0F4*
02E3E7E3  400000B0  40400004  40400001  00000000  40404040  40404040
40404040  40404040  40404040  40404040  40404040  40404040  40404040
40404040  40404040  40404040  40404040  C2C3C8C1  F0F0F0F5*
02E3E7E3  400000F0  40400008  40400001  00000000  00000000  40404040
40404040  40404040  40404040  40404040  40404040  40404040  40404040
40404040  40404040  40404040  40404040  C2C3C8C1  F0F0F0F6*
02E3E7E3  400000FC  40400004  40400001  00000000  40404040  40404040
40404040  40404040  40404040  40404040  40404040  40404040  40404040
40404040  40404040  40404040  40404040  C2C3C8C1  F0F0F0F7*
02E3E7E3  40000104  40400004  40400001  00000000  40404040  40404040
40404040  40404040  40404040  40404040  40404040  40404040  40404040
40404040  40404040  40404040  40404040  C2C3C8C1  F0F0F0F8*
02E3E7E3  40000154  40400038  40400001  5860D0CC  58A0D0C8  58B0D0D4
5800D060  5000D090  5800D108  5000D0E4  5800D110  5000D0F4  7800B004
7000D0EC  5800D114  5000D0F8  7800B008  C2C3C8C1  F0F0F0F9*
02E3E7E3  4000018C  40400038  40400001  7000D0F0  5800D118  5000D0FC
5800D11C  5000D104  5870D118  5880D114  5890D068  58B0D0DC  5990D0A4
4780D2D4  58586000  5050D0B8  58076000  C2C3C8C1  F0F0F1F0**
02E3E7E3  400001C4  40400038  40400001  5000D098  5C40D110  5050D0E8
18355A30  D10C2B00  7803B000  6A00D058  6000D050  5820D054  5920D0B0
4770D2D4  18255A20  D0E47842  B0007B40  C2C3C8C1  F0F0F1F1*
02E3E7E3  400001FC  40400038  40400001  D0EC3064  18255A20  D1147822
B0007B20  D0F03022  7020D0A0  7960A004  47A0D200  7920A004  47A0D200
47F0D2C0  5820D0E8  5A20D118  7842B000  C2C3C8C1  F0F0F1F2*
02E3E7E3  40000234  40400038  40400001  7B40D0EC  30645820  D0E85A20
```

```
                                                                      PAGE 0010
D11C7822  B0007B20  D0F03022  7020D0A0  7960A004  47A0D23C  7920A004
47A0D23C  47F0D2C0  5850D098  5C40D0F4  C2C3C8C1  F0F0F1F3*
02E3E7E3  4000026C  40400038  40400001  5050D100  18255A20  D0E47842
B0007B40  D0EC3064  18255A20  D0F87822  B0007B20  D0F03022  7020D0A0
7960A004  47A0D280  7920A004  47A0D280  C2C3C8C1  F0F0F1F4*
02E3E7E3  400002A4  40400038  40400001  47F0D2C0  5820D100  5A20D0FC
7842B000  7B40D0EC  30645820  D1005A20  D1047822  B0007B20  D0F03022
7020D0A0  7960A004  47A0D2BC  7920A004  C2C3C8C1  F0F0F1F5*
02E3E7E3  400002DC  40400038  40400001  47A0D2BC  47F0D2C0  47F0D2D4
58B0D0D4  5800D064  5000D090  1BFF58E0  D00007FE  5A90D068  5A70D108
5A80D108  5990D0B4  47C0D188  58B0D0D4  C2C3C8C1  F0F0F1F6*
02E3E7E3  40000314  40400038  40400001  1BFF58E0  D00007FE  58A0D004
58E0A00C  58B0A018  5810B01C  5820D090  50201000  18DA92FF  A00C982C
A01C07FE  987B1008  58207000  5020D094  C2C3C8C1  F0F0F1F7*
02E3E7E3  4000034C  40400038  40400001  58209000  5020D0B4  5820A000
5020D0A4  5820B000  5020D0B0  5870101C  58207000  5020D090  58201000
41302000  41500004  1B255020  D0D45030  C2C3C8C1  F0F0F1F8*
02E3E7E3  40000384  40400038  40400001  D0D85820  10044130  20004150
00041B25  5C40D080  1B255020  D0DC5030  D0E05820  100C4130  20004150
00041B25  5C40D070  1B255020  D0CC5030  C2C3C8C1  F0F0F1F9*
02E3E7E3  400003BC  40400006  40400001  D0D047F0  D12C4040  40404040

MEMBER NAME  BCHAN1
40404040  40404040  40404040  40404040  40404040  40404040  40404040
40404040  40404040  40404040  40404040  C2C3C8C1  F0F0F2F0**
02E3E7E3  40000020  4040000C  40400001  00000340  00000028  0000031C
40404040  40404040  40404040  40404040  40404040  40404040  40404040
40404040  40404040  40404040  40404040  C2C3C8C1  F0F0F2F1*
02E3E7E3  4000010C  40400038  40400001  00000000  00000000  00000000
00000000  00000000  00000000  00000000  00000000  00000000  0000000C
00000008  00000038  00000010  00000014  C2C3C8C1  F0F0F2F2*
02E3E7E3  40000144  40400010  40400001  00000018  00000000  00000000
00000000  40404040  40404040  40404040  40404040  40404040  40404040
40404040  40404040  40404040  40404040  C2C3C8C1  F0F0F2F3*
02D9D3C4  40404040  40400020  40404040  00020001  0C0000F0  00010001
0C000020  00010001  0C000024  00010001  0C000028  40404040  40404040
40404040  40404040  40404040  40404040  C2C3C8C1  F0F0F2F4*
02C5D5C4  40404040  40404040  40404040  40404040  40404040  40404040
000003C2  F1F5F7F3  F460C6D6  F34040F0  F2F0F2F8  F7F0F9F8  40F0F84B
F1F14BF4  F9404040  C2C3C8C1  D5F14040  C2C3C8C1  F0F0F2F5**

MEMBER NAME  BCHAIN
02C5E2C4  40404040  40400010  40400001  C2C3C8C1  C9D54040  00000000
40000000  40404040  40404040  40404040  40404040  40404040  40404040
40404040  40404040  40404040  40404040  C2C3C8C1  F0F0F0F1*
02E3E7E3  40000000  40400028  40400001  47F0F00C  07C2C3C8  C1C9D540
90ECD00C  184D98CD  F0205040  D00450D0  400807FC  40404040  40404040
40404040  40404040  40404040  40404040  C2C3C8C1  F0F0F0F2*
02E3E7E3  40000098  40400038  40400001  00000000  00000000  4E000000
00000000  4F080000  00000000  4E000000  80000000  00000001  00000002
00000003  00000004  00000005  00000006  C2C3C8C1  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  C2C3C8C1  F0F0F0F4*
02E3E7E3  400000D0  40400010  40400001  0000000D  0000000E  00000000
00000000  40404040  40404040  40404040  40404040  40404040  40404040
40404040  40404040  40404040  40404040  C2C3C8C1  F0F0F0F5*
02C5E2C4  40404040  40400010  40400003  C2C3C8C1  D5F14040  02000000
40000000  40404040  40404040  40404040  40404040  40404040  40404040
```

```
40404040  40404040  40404040  40404040  C2C3C8C1  F0F0F0F6*
02E3E7E3  40000118  40400008  40400001  00000000  00000000  40404040
40404040  40404040  40404040  40404040  40404040  40404040  40404040
40404040  40404040  40404040  40404040  C2C3C8C1  F0F0F0F7*
02E3E7E3  40000124  40400008  40400001  00000000  00000000  40404040
40404040  40404040  40404040  40404040  40404040  40404040  40404040
40404040  40404040  40404040  40404040  C2C3C8C1  F0F0F0F8*
02E3E7E3  400001BC  40400038  40400001  58B0D184  58A0D188  5890D18C
5880D190  5800D090  5000D0B8  5800D178  5000D108  5800D17C  5000D10C
50B0D118  50A0D130  5090D138  50B0D148  C2C3C8C1  F0F0F0F9*
02E3E7E3  400001F4  40400038  40400001  50A0D150  5090D158  58B0D100
58A0D0F0  5890D0F4  5850D0B8  5C40D178  18255A20  D09C5872  90005070
D0E41825  5A20D17C  58529000  5050D0C4  C2C3C8C1  F0F0F1F0**
02E3E7E3  4000022C  40400038  40400001  18251B27  5A20D090  5020D0C8
5920D090  4780D604  5920D094  4730D452  5C60D180  5070D120  18275A20
D1087842  B0007040  D1107040  D0E81827  C2C3C8C1  F0F0F1F1*
02E3E7E3  40000264  40400038  40400001  5A20D184  7822B000  7020D11C
7020D0EC  18275A20  D10C5020  D1242B00  7802B000  6A00D080  6000D070
5800D074  5000D0DC  5C40D180  5050D114  C2C3C8C1  F0F0F1F2*
02E3E7E3  4000029C  40400038  40400001  18255A20  D1085020  D1287B42
B0003044  18255A20  D1845020  D12C7B22  B0003022  7020D0D0  7940A004
47A0D2A8  7920A004  4750D2E4  5820D114  C2C3C8C1  F0F0F1F3*
02E3E7E3  400002D4  40400038  40400001  5A20D188  7840D110  7B42B000
30445820  D1145A20  D18C7820  D11C7B22  B0003022  7020D0D0  7940A004
47A0D2E0  7920A004  4750D2E4  47F0D348  C2C3C8C1  F0F0F1F4*
02E3E7E3  4000030C  40400038  40400001  58F0D0FC  4110D04C  05EF4120
00015720  D0BC1BFF  862FD348  5800D0D8  5700D08C  5000D07C  6820D078
6B20D088  5820D120  1A287022  B0005800  C2C3C8C1  F0F0F1F5*
02E3E7E3  40000344  40400038  40400001  D0D85700  D08C5000  D07C6820
D0786B20  D0885820  D1141A28  7022B000  5800D0D8  5A00D090  5000D0D8
47F0D604  5820D120  5A20D188  7842B000  C2C3C8C1  F0F0F1F6*
02E3E7E3  4000037C  40400038  40400001  7040D134  7040D0E8  5820D120
5A20D18C  7822B000  7020D13C  7020D0EC  58E0D124  2B00780E  B0006A00
D0806000  D0705800  D0745000  D0DC58E0  C2C3C8C1  F0F0F1F7*
02E3E7E3  400003B4  40400038  40400001  D1287B4E  B0003044  58E0D12C
7B2EB000  30227020  D0D07940  A00447A0  D3B27920  A0044750  D3EE5820
D1145A20  D1307840  D1347B42  B0003044  C2C3C8C1  F0F0F1F8*
02E3E7E3  400003EC  40400038  40400001  5820D114  5A20D138  7820D13C
7B22B000  30227020  D0D07940  A00447A0  D3EA7920  A0044750  D3EE47F0
D60458F0  D0FC4110  D04C05EF  41200001  C2C3C8C1  F0F0F1F9*
02E3E7E3  40000424  40400038  40400001  5720D0BC  1BFF862F  D6045800

MEMBER NAME  BCHAIN
D0D85700  D08C5000  D07C6820  D0786B20  D0885820  D1201A28  7022B000
5800D0D8  5700D08C  5000D07C  6820D078  C2C3C8C1  F0F0F2F0**
02E3E7E3  4000045C  40400038  40400001  6B20D088  5820D114  1A287022
B0005800  D0D85A00  D0905000  D0D847F0  D6045830  D0E45C20  D1805030
D1541843  5A40D108  7844B000  7040D140  C2C3C8C1  F0F0F2F1*
02E3E7E3  40000494  40400038  40400001  7040D0E8  18435A40  D1847824
B0007020  D14C7020  D0EC5A30  D10C2B00  7803B000  6A00D080  6000D070
5820D074  5020D0DC  5020D15C  5850D0C4  C2C3C8C1  F0F0F2F2*
02E3E7E3  400004CC  40400038  40400001  5C40D180  5050D144  18255A20
D1087862  B0007060  D1603B46  30441825  5A20D184  7862B000  7060D164
3B263022  7020D0D0  7940A004  47A0D4E4  C2C3C8C1  F0F0F2F3*
02E3E7E3  40000504  40400038  40400001  7920A004  4750D5A4  5820D144
5A20D188  7842B000  7040D16C  33447A40  D1403044  5820D144  5A20D18C
7822B000  7020D174  33227A20  D14C3022  C2C3C8C1  F0F0F2F4*
02E3E7E3  4000053C  40400038  40400001  7020D0D0  7940A004  47A0D528
7920A004  4750D5A4  5820D154  5A20D150  7842B000  7040D168  7040D0E8
```

```
5820D154  5A20D158  7822B000  7020D170  C2C3C8C1  F0F0F2F5*
02E3E7E3  40000574  40400038  40400001  7020D0EC  5800D15C  5000D0DC
7B40D160  30447B20  D1643022  7020D0D0  7940A004  47A0D578  7920A004
4750D5A4  7840D168  7B40D16C  30447820  C2C3C8C1  F0F0F2F6*
02E3E7E3  400005AC  40400038  40400001  D1707B20  D1743022  7020D0D0
7940A004  47A0D5A0  7920A004  4750D5A4  47F0D604  58F0D0FC  4110D04C
05EF4120  00015720  D0BC1BFF  862FD604  C2C3C8C1  F0F0F2F7*
02E3E7E3  400005E4  40400038  40400001  5800D0D8  5700D08C  5000D07C
6820D078  6B20D088  5820D154  1A287022  B0005800  D0D85700  D08C5000
D07C6820  D0786B20  D0885820  D1441A28  C2C3C8C1  F0F0F2F8*
02E3E7E3  4000061C  40400038  40400001  7022B000  5800D0D8  5A00D090
5000D0D8  5820D0B8  5A20D090  5020D0B8  5920D0E0  47C0D1E0  58B0D184
58A0D188  5890D18C  1BFF58E0  D00007FE  C2C3C8C1  F0F0F2F9*
02E3E7E3  40000654  40400038  40400001  58A0D004  58E0A00C  58B0A018
5810B004  5820D0C0  50201000  5830B00C  5840D0E0  50403000  5850B010
5860D0D8  50605000  18DA92FF  A00C982C  C2C3C8C1  F0F0F3F0**
02E3E7E3  4000068C  40400038  40400001  A01C07FE  987A1004  58207000
5020D0C0  58209000  5020D0E0  5820A000  5020D0D8  58201000  41302000
41500004  1B255C40  D0AC1B25  5020D100  C2C3C8C1  F0F0F3F1*
02E3E7E3  400006C4  4040002C  40400001  5030D104  5030D050  58201008
41302000  41500004  1B255C40  D0981B25  5020D0F4  5030D0F8  5030D058
47F0D194  40404040  40404040  40404040  C2C3C8C1  F0F0F3F2*
02E3E7E3  40000020  4040000C  40400001  00000690  00000028  00000654
40404040  40404040  40404040  40404040  40404040  40404040  40404040
40404040  40404040  40404040  40404040  C2C3C8C1  F0F0F3F3*
02E3E7E3  40000074  40400004  40400001  00000110  40404040  40404040
40404040  40404040  40404040  40404040  40404040  40404040  40404040
40404040  40404040  40404040  40404040  C2C3C8C1  F0F0F3F4*
02E3E7E3  4000007C  40400004  40400001  000000E8  40404040  40404040
40404040  40404040  40404040  40404040  40404040  40404040  40404040
40404040  40404040  40404040  40404040  C2C3C8C1  F0F0F3F5*
02E3E7E3  40000084  40400004  40400001  00000108  40404040  40404040
40404040  40404040  40404040  40404040  40404040  40404040  40404040
40404040  40404040  40404040  40404040  C2C3C8C1  F0F0F3F6*
02D9D3C4  40404040  40400038  40404040  00020001  0C000118  00030001
1C000124  00010001  0C000020  00010001  0C000024  00010001  0C000028
00010001  0C000074  00010001  0C00007C  C2C3C8C1  F0F0F3F7*
02E3E7E3  40000088  4040000C  40400001  000000E0  00000104  800000E4
40404040  40404040  40404040  40404040  40404040  40404040  40404040
40404040  40404040  40404040  40404040  C2C3C8C1  F0F0F3F8*
02E3E7E3  40000130  40400038  40400001  00000000  00000000  00000000
00000000  00000000  00000000  00000000  00000000  00000000  00000000

MEMBER NAME  BCHAIN
00000000  00000000  00000000  00000000  C2C3C8C1  F0F0F3F9*
02E3E7E3  40000168  40400038  40400001  00000000  00C00004  00000000
01B40005  00000000  00B00006  00000000  00880006  01A80006  00000000
00A80007  00940007  00980007  00000000  C2C3C8C1  F0F0F4F0**
02E3E7E3  400001A0  4040001C  40400001  0000000C  00000008  00000038
00000010  00000014  00000018  00000034  40404040  40404040  40404040
40404040  40404040  40404040  40404040  C2C3C8C1  F0F0F4F1*
02D9D3C4  40404040  40400020  40404040  00010001  0C000084  00010001
0C000088  00010001  0C00008C  00010001  0C000090  40404040  40404040
40404040  40404040  40404040  40404040  C2C3C8C1  F0F0F4F2*
02C5D5C4  40404040  40404040  40404040  40404040  40404040  40404040
000006F0  F1F5F7F3  F460C6D6  F34040F0  F2F0F2F8  F7F0F9F8  40F0F84B
F1F14BF5  F3404040  C2C3C8C1  C9D54040  C2C3C8C1  F0F0F4F3**

MEMBER NAME  GENOUT
```

| | | | | | | |
|---|---|---|---|---|---|---|
| 02C5E2C4 | 40404040 | 40400010 | 40400001 | C7C5D5D6 | E4E34040 | 00000000 |
| 40000000 | 40404040 | 40404040 | 40404040 | 40404040 | 40404040 | 40404040 |
| 40404040 | 40404040 | 40404040 | 40404040 | C7C5D5D6 | F0F0F0F1* | |
| 02E3E7E3 | 40000000 | 40400028 | 40400001 | 47F0F00C | 07C7C5D5 | D6E4E340 |
| 90ECD00C | 184D98CD | F0205040 | D00450D0 | 400807FC | 40404040 | 40404040 |
| 40404040 | 40404040 | 40404040 | 40404040 | C7C5D5D6 | F0F0F0F2* | |
| 02E3E7E3 | 400000B8 | 40400038 | 40400001 | 00000000 | 00000000 | 4F080000 |
| 00000000 | 00000000 | 00000000 | 00000001 | 00000002 | 00000003 | 00000004 |
| 00000005 | 00000006 | 00000008 | 0000000A | C7C5D5D6 | F0F0F0F3* | |
| 02E3E7E3 | 400000F0 | 40400028 | 40400001 | 0000000C | 0000000D | 00000010 |
| 00000014 | 00000015 | 00000016 | 00000058 | 00000BB8 | 00000000 | 00000000 |
| 40404040 | 40404040 | 40404040 | 40404040 | C7C5D5D6 | F0F0F0F4* | |
| 02C5E2C4 | 40404040 | 40400010 | 40400002 | C7D9E4D7 | 40404040 | 05000000 |
| 4000000C | 40404040 | 40404040 | 40404040 | 40404040 | 40404040 | 40404040 |
| 40404040 | 40404040 | 40404040 | 40404040 | C7C5D5D6 | F0F0F0F5* | |
| 02C5E2C4 | 40404040 | 40400010 | 40400003 | D9D4D6C4 | C5D34040 | 05000000 |
| 40000018 | 40404040 | 40404040 | 40404040 | 40404040 | 40404040 | 40404040 |
| 40404040 | 40404040 | 40404040 | 40404040 | C7C5D5D6 | F0F0F0F6* | |
| 02C5E2C4 | 40404040 | 40400010 | 40400004 | C6D4D6C4 | C5D34040 | 05000000 |
| 400001F8 | 40404040 | 40404040 | 40404040 | 40404040 | 40404040 | 40404040 |
| 40404040 | 40404040 | 40404040 | 40404040 | C7C5D5D6 | F0F0F0F7* | |
| 02C5E2C4 | 40404040 | 40400010 | 40400005 | D7D4C1E3 | D3404040 | 05000000 |
| 40001134 | 40404040 | 40404040 | 40404040 | 40404040 | 40404040 | 40404040 |
| 40404040 | 40404040 | 40404040 | 40404040 | C7C5D5D6 | F0F0F0F8* | |
| 02C5E2C4 | 40404040 | 40400010 | 40400006 | C4C5D9D6 | E3404040 | 02000000 |
| 40000000 | 40404040 | 40404040 | 40404040 | 40404040 | 40404040 | 40404040 |
| 40404040 | 40404040 | 40404040 | 40404040 | C7C5D5D6 | F0F0F0F9* | |
| 02E3E7E3 | 40004FE8 | 40400020 | 40400001 | 00003058 | 00000000 | FFFFFFFF |
| FFFFFFEB | FFFFFFA0 | 00001130 | 00000000 | 00000000 | 40404040 | 40404040 |
| 40404040 | 40404040 | 40404040 | 40404040 | C7C5D5D6 | F0F0F1F0** | |
| 02E3E7E3 | 4000500C | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C7C5D5D6 | F0F0F1F1* | |
| 02C5E2C4 | 40404040 | 40400010 | 40400007 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | C7C5D5D6 | F0F0F1F2* | |
| 02E3E7E3 | 40005014 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C7C5D5D6 | F0F0F1F3* | |
| 02E3E7E3 | 4000501C | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C7C5D5D6 | F0F0F1F4* | |
| 02D9D3C4 | 40404040 | 40400038 | 40404040 | 00010001 | 0C004FE8 | 00020001 |
| 0C004FEC | 00030001 | 0C004FF0 | 00040001 | 0C004FF4 | 00050001 | 0C004FF8 |
| 00050001 | 0C004FFC | 00060001 | 1C005000 | C7C5D5D6 | F0F0F1F5* | |
| 02C5E2C4 | 40404040 | 40400010 | 40400008 | C7E3C6D3 | C9D74040 | 02000000 |
| 40000000 | 40404040 | 40404040 | 40404040 | 40404040 | 40404040 | 40404040 |
| 40404040 | 40404040 | 40404040 | 40404040 | C7C5D5D6 | F0F0F1F6* | |
| 02E3E7E3 | 40005020 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C7C5D5D6 | F0F0F1F7* | |
| 02C5E2C4 | 40404040 | 40400010 | 40400009 | C8C7C4C1 | E3C54040 | 02000000 |
| 40000000 | 40404040 | 40404040 | 40404040 | 40404040 | 40404040 | 40404040 |
| 40404040 | 40404040 | 40404040 | 40404040 | C7C5D5D6 | F0F0F1F8* | |
| 02C5E2C4 | 40404040 | 40400010 | 4040000A | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | C7C5D5D6 | F0F0F1F9* | |
| 02E3E7E3 | 40005028 | 4040000C | 40400001 | 00000000 | 00000000 | 00000000 |

MEMBER NAME GENOUT

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | C7C5D5D6 | F0F0F2F0** | |
| 02E3E7E3 | 40000178 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C7C5D5D6 | F0F0F2F1* | |
| 02E3E7E3 | 400050B8 | 40400038 | 40400001 | 58A0C000 | 58B0C00C | 5890D0A8 |
| 5880D0C0 | 58F0C044 | 4110D04C | 05EF5090 | D1405090 | D10C58F0 | C0481800 |
| 45E0F018 | 0000000C | 45E0F01C | 0450B1A5 | C7C5D5D6 | F0F0F2F2* | |
| 02E3E7E3 | 400050F0 | 40400038 | 40400001 | 45E0F134 | 00020000 | 0120B015 |
| 01000014 | 00000001 | 020000D0 | 00000190 | 000000D0 | 00000014 | 45E0F024 |
| 5080C0C4 | 5800D0E0 | 5000C0C8 | 5080C074 | C7C5D5D6 | F0F0F2F3* | |
| 02E3E7E3 | 40005128 | 40400038 | 40400001 | 5880D0D0 | 58A0D0E0 | 58B0C038 |
| 5800D140 | 5900D144 | 47C0C15C | 47F0C66C | 185A5C40 | D1401825 | 5A20D0C0 |
| 7802B000 | 7000D108 | 58A0C0C0 | 58B0D0B4 | C7C5D5D6 | F0F0F2F4* | |
| 02E3E7E3 | 40005160 | 40400038 | 40400001 | 410BD150 | 5000D054 | 4100D150 |
| 5000D058 | 9280D058 | 58F0C034 | 4110D050 | 05EF5AB0 | D0B419BA | 47C0C178 |
| 58B0C038 | 58A0D0E0 | 5800D10C | 5900D144 | C7C5D5D6 | F0F0F2F5* | |
| 02E3E7E3 | 40005198 | 40400038 | 40400001 | 4730C204 | 5850D10C | 5C40C0C8 |
| 5050C0CC | 18255A20 | C0C47800 | D1087902 | B0004770 | C2041825 | 1A282B00 |
| 7802B000 | 6A00D098 | 6000D090 | 5830D094 | C7C5D5D6 | F0F0F2F6* | |
| 02E3E7E3 | 400051D0 | 40400038 | 40400001 | 89300002 | 4823D150 | 1A294023 |
| D1505800 | D10C1A09 | 5000D10C | 47F0C1A0 | 5850D10C | 1B595050 | D10C183A |
| 5C20D140 | 5030C070 | 1C4A5050 | C0985030 | C7C5D5D6 | F0F0F2F7* | |
| 02E3E7E3 | 40005208 | 40400038 | 40400001 | C0941803 | 5A00C07C | 5000C09C |
| 18035A00 | D0C05000 | C0781803 | 5A00D0C8 | 5000C0A0 | 18031A08 | 5000C0A4 |
| 18035A00 | C0805000 | C0A81803 | 5A00C084 | C7C5D5D6 | F0F0F2F8* | |
| 02E3E7E3 | 40005240 | 40400038 | 40400001 | 5000C0AC | 18035A00 | C0885000 |
| C0B01803 | 5A00D0D4 | 5000C0B4 | 18035A00 | C08C5000 | C0B85A30 | C0905030 |
| C0BC5890 | C0005880 | C0044100 | D14C5000 | C7C5D5D6 | F0F0F2F9* | |
| 02E3E7E3 | 40005278 | 40400038 | 40400001 | D05458E0 | C09C410E | B0005000 |
| D0589280 | D05858F0 | C0344110 | D05005EF | 4830D14C | 5030D148 | 4820D14E |
| 5020D11C | 1A235B20 | D0A85020 | D12858E0 | C7C5D5D6 | F0F0F3F0** | |
| 02E3E7E3 | 400052B0 | 40400038 | 40400001 | C0782B00 | 780EB000 | 6A00D098 |
| 6000D090 | 5820D094 | 10225020 | D12458E0 | C0A02B00 | 780EB000 | 6A00D098 |
| 6000D090 | 5800D094 | 5000D114 | 58E0C0A4 | C7C5D5D6 | F0F0F3F1* | |
| 02E3E7E3 | 400052E8 | 40400038 | 40400001 | 2B00780E | B0006A00 | D0986000 |
| D0905820 | D0945020 | D12C58E0 | C0A82B00 | 780EB000 | 6A00D098 | 6000D090 |
| 5850D094 | 1C4A58F0 | C0106825 | F0502B00 | C7C5D5D6 | F0F0F3F2* | |
| 02E3E7E3 | 40005320 | 40400038 | 40400001 | 38026A00 | D0986000 | D0905800 |
| D0945000 | D1305020 | D1188920 | 00025020 | C06C4802 | D1505000 | D1344802 |
| D1525900 | D0A84770 | C3725800 | D0A05000 | C7C5D5D6 | F0F0F3F3* | |
| 02E3E7E3 | 40005358 | 40400038 | 40400001 | D13458E0 | C06C5800 | D0A8400E |
| D15258E0 | C0AC410E | B0005000 | D05C58F0 | C0184110 | D05C05EF | 41009048 |
| 5000D06C | 58E0C0B0 | 410EB000 | 5000D070 | C7C5D5D6 | F0F0F3F4* | |
| 02E3E7E3 | 40005390 | 40400038 | 40400001 | 9280D070 | 58F0C034 | 4110D068 |
| 05EF58E0 | C078780E | B0003200 | 4730C3CE | 78209048 | 33027000 | 904858F0 |
| C0481800 | 45E0F018 | 0000000C | 45E0F01C | C7C5D5D6 | F0F0F3F5* | |
| 02E3E7E3 | 400053C8 | 40400034 | 40400001 | 0450D124 | 45E0F01C | 0450D114 |
| 45E0F01C | 0450D12C | 45E0F01C | 0450D130 | 45E0F01C | 0450D110 | 45E0F134 |
| 00010000 | 04709004 | 020000D0 | 40404040 | C7C5D5D6 | F0F0F3F6* | |
| 02D9D3C4 | 40404040 | 40400038 | 40404040 | 00070001 | 1C00501C | 00080001 |
| 1C005028 | 00090001 | 1C00502C | 000A0001 | 1C005030 | 00010001 | 08005105 |
| 00040001 | 08005109 | 00010001 | 0800510D | C7C5D5D6 | F0F0F3F7* | |
| 02E3E7E3 | 400053FC | 40400038 | 40400001 | 00000138 | 000000D0 | 00000004 |
| 5810C0B4 | 45E0F01C | 0471B000 | 5810C0B8 | 45E0F01C | 0471B000 | 5810C0BC |
| 45E0F01C | 0471B000 | 45E0F134 | 00010000 | C7C5D5D6 | F0F0F3F8* | |
| 02E3E7E3 | 40005434 | 40400038 | 40400001 | 04709040 | 01000002 | 00000004 |
| 45E0F134 | 00010000 | 04709048 | 01000002 | 00000004 | 45E0F01C | 04708000 |

```
MEMBER NAME  GENOUT
45E0F134  00010000  04708004  01000002  C7C5D5D6  F0F0F3F9*
02E3E7E3  4000546C  40400038  40400001  00000004  45E0F134  00010000
04509028  01000002  00000004  5820C008  45E0F01C  04702015  45E0F01C
0450D11C  45E0F01C  0450D134  45E0F024  C7C5D5D6  F0F0F4F0**
02E3E7E3  400054A4  40400038  40400001  5800C094  5A00D0C0  5000C04C
5850D148  5C40D0C0  5810D128  5C00D0D0  5010C058  5870D148  5C60D0D0
18355A30  D0B45A50  D0C05050  C0605850  C7C5D5D6  F0F0F4F1*
02E3E7E3  400054DC  40400038  40400001  C0585A50  D0B45050  C0681847
5A40D0B4  188418A3  5870C01C  5860C02C  5820C024  585A2000  58E0C060
580E2000  5000D120  5C40D0C0  18355A30  C7C5D5D6  F0F0F4F2*
02E3E7E3  40005514  40400038  40400001  D0B44103  70005000  D0744108
60005000  D07C58E0  C04C410E  B0005000  D08058F0  C0404110  D07405EF
58F0C048  45E0F018  0000000C  45E0F134  C7C5D5D6  F0F0F4F3*
02E3E7E3  4000554C  40400038  40400001  00010000  04709030  01000004
00000004  45E0F01C  0450D120  45E0F024  58F0C048  45E0F018  0000000C
45E0F134  00020000  04709050  01000002  C7C5D5D6  F0F0F4F4*
02E3E7E3  40005584  40400038  40400001  00000004  020000D0  00000148
000000D0  00000008  45E0F024  5800C060  5A00D0C0  5000C060  5AA0D0C0
5A80D0D0  5980C068  47C0C510  5880C004  C7C5D5D6  F0F0F4F5*
02E3E7E3  400055BC  40400038  40400001  58A0D0E0  5800C0BC  1A0A5000
C0BC5800  C0B81A0A  5000C0B8  5800C0B4  1A0A5000  C0B45800  C0B01A0A
5000C0B0  5800C0AC  1A0A5000  C0AC5800  C7C5D5D6  F0F0F4F6*
02E3E7E3  400055F4  40400038  40400001  C0A81A0A  5000C0A8  5800C0A4
1A0A5000  C0A45800  C0A01A0A  5000C0A0  5800C078  1A0A5000  C0785800
C09C1A0A  5000C09C  5820C094  1A2A5020  C7C5D5D6  F0F0F4F7*
02E3E7E3  4000562C  40400038  40400001  C0945920  C09847C0  C28A58A0
D0E05890  D0A85880  D0D05820  D10C1A29  5020D140  5020D10C  47F0C14C
58A0C000  58B0C00C  5890D0A8  5880D0C0  C7C5D5D6  F0F0F4F8*
02E3E7E3  40005664  40400038  40400001  1BFF58E0  D00007FE  58D0D004
58E0D00C  92FFD00C  982CD01C  07FE58C0  D048987B  10045820  70005020
D1005820  A0005020  D1385870  10185820  C7C5D5D6  F0F0F4F9*
02E3E7E3  4000569C  40400038  40400001  70005020  D1445820  10004130
20004150  00041B25  5C40D0AC  1B255020  C01C5030  C0205820  10084130
20004150  00041B25  5C40D0AC  1B255020  C7C5D5D6  F0F0F5F0**
02E3E7E3  400056D4  40400038  40400001  C0245030  C0285820  100C4130
20004150  00041B25  5C40D0B4  1B255020  C02C5030  C0305820  10144130
20004150  00041B25  5C40D0DC  1B255020  C7C5D5D6  F0F0F5F1*
02E3E7E3  4000570C  4040000A  40400001  C0385030  C03C47F0  C0D04040
40404040  40404040  40404040  40404040  40404040  40404040  40404040
40404040  40404040  40404040  40404040  C7C5D5D6  F0F0F5F2*
02E3E7E3  40000020  40400008  40400001  0000567E  00000028  40404040
40404040  40404040  40404040  40404040  40404040  40404040  40404040
40404040  40404040  40404040  40404040  C7C5D5D6  F0F0F5F3*
02D9D3C4  40404040  40400038  40404040  00010001  080053F9  00010001
080053FD  00010001  08005401  00010001  08005589  00010001  0800558D
00010001  08005591  00010001  0C000020  C7C5D5D6  F0F0F5F4*
02E3E7E3  40000028  40400004  40400001  0000566C  40404040  40404040
40404040  40404040  40404040  40404040  40404040  40404040  40404040
40404040  40404040  40404040  40404040  C7C5D5D6  F0F0F5F5*
02E3E7E3  40000070  4040000C  40400001  00004FE8  80003080  000000DC
40404040  40404040  40404040  40404040  40404040  40404040  40404040
40404040  40404040  40404040  40404040  C7C5D5D6  F0F0F5F6*
02E3E7E3  40000080  40400004  40400001  80000000  40404040  40404040
40404040  40404040  40404040  40404040  40404040  40404040  40404040
40404040  40404040  40404040  40404040  C7C5D5D6  F0F0F5F7*
02E3E7E3  40000088  4040000C  40400001  0000305C  80000138  000000E8
40404040  40404040  40404040  40404040  40404040  40404040  40404040
```

```
40404040  40404040  40404040  40404040  C7C5D5D6  F0F0F5F8*

MEMBER NAME  GENOUT
02D9D3C4  40404040  40400038  40404040  00010001  0C000024  00010001
0C000028  00010001  0C000070  00010001  0C000074  00010001  0C000078
00010001  0C000088  00010001  0C00008C  C7C5D5D6  F0F0F5F9*
02E3E7E3  40000098  40400004  40400001  80000000  40404040  40404040
40404040  40404040  40404040  40404040  40404040  40404040  40404040
40404040  40404040  40404040  40404040  C7C5D5D6  F0F0F6F0**
02E3E7E3  400000A0  40400004  40400001  00000148  40404040  40404040
40404040  40404040  40404040  40404040  40404040  40404040  40404040
40404040  40404040  40404040  40404040  C7C5D5D6  F0F0F6F1*
02E3E7E3  400000AC  40400008  40400001  000030A8  80003088  40404040
40404040  40404040  40404040  40404040  40404040  40404040  40404040
40404040  40404040  40404040  40404040  C7C5D5D6  F0F0F6F2*
02E3E7E3  40005034  40400038  40400001  00000000  00000000  00000000
00000000  00000000  00000000  00000000  00000000  00000000  00000000
00000000  00000000  00000054  00000018  C7C5D5D6  F0F0F6F3*
02E3E7E3  4000506C  40400038  40400001  00000040  00000028  00000030
00000034  00000000  00000000  00000000  00000000  00000000  00000000
00000000  00000000  00000000  00000000  C7C5D5D6  F0F0F6F4*
02E3E7E3  400050A4  40400014  40400001  00000000  00002EE0  00000000
00000000  00000000  40404040  40404040  40404040  40404040  40404040
40404040  40404040  40404040  40404040  C7C5D5D6  F0F0F6F5*
02D9D3C4  40404040  40400020  40404040  00010001  0C000090  00010001
0C0000A0  00010001  0C0000AC  00010001  0C0000B0  40404040  40404040
40404040  40404040  40404040  40404040  C7C5D5D6  F0F0F6F6*
02C5D5C4  40404040  40404040  40404040  40404040  40404040  40404040
00005716  F1F5F7F3  F460C6D6  F34040F0  F2F0F2F8  F7F0F9F8  40F0F84B
F1F14BF5  F8404040  C7C5D5D6  E4E34040  C7C5D5D6  F0F0F6F7**

MEMBER NAME  BLDDRV
02C5E2C4  40404040  40400010  40400001  C2D3C4C4  D9E54040  00000000
40000000  40404040  40404040  40404040  40404040  40404040  40404040
40404040  40404040  40404040  40404040  C2D3C4C4  F0F0F0F1*
02E3E7E3  40000000  40400028  40400001  47F0F00C  07C2D3C4  C4D9E540
90ECD00C  184D98CD  F0205040  D00450D0  400807FC  40404040  40404040
40404040  40404040  40404040  40404040  C2D3C4C4  F0F0F0F2*
02E3E7E3  40000100  4040002C  40400001  00000000  00000001  00000004
0000000B  0000000C  0000000E  00000014  0000002C  00000038  00000000
00000000  40404040  40404040  40404040  C2D3C4C4  F0F0F0F3*
02C5E2C4  40404040  40400010  40400002  C5D3D4E3  C2D34040  05000000
400D7D28  40404040  40404040  40404040  40404040  40404040  40404040
40404040  40404040  40404040  40404040  C2D3C4C4  F0F0F0F4*
02C5E2C4  40404040  40400010  40400003  C9D7D5E3  D9404040  05000000
4000EA68  40404040  40404040  40404040  40404040  40404040  40404040
40404040  40404040  40404040  40404040  C2D3C4C4  F0F0F0F5*
02C5E2C4  40404040  40400010  40400004  C2D9C5C1  D2404040  02000000
40000000  40404040  40404040  40404040  40404040  40404040  40404040
40404040  40404040  40404040  40404040  C2D3C4C4  F0F0F0F6*
02C5E2C4  40404040  40400010  40400005  C2E2D6D9  E3404040  02000000
40000000  40404040  40404040  40404040  40404040  40404040  40404040
40404040  40404040  40404040  40404040  C2D3C4C4  F0F0F0F7*
02C5E2C4  40404040  40400010  40400006  D4E5C3C8  D9404040  02000000
40000000  40404040  40404040  40404040  40404040  40404040  40404040
40404040  40404040  40404040  40404040  C2D3C4C4  F0F0F0F8*
02E3E7E3  40003528  40400020  40400001  00002D38  FFFFFFC8  000CD118
FFFFFFF4  0000EA64  00000000  00000000  00000000  40404040  40404040
40404040  40404040  40404040  40404040  C2D3C4C4  F0F0F0F9*
```

| | | | | | | |
|---|---|---|---|---|---|---|
| 02D9D3C4 | 40404040 | 40400038 | 40404040 | 00010001 | 0C003528 | 00020001 |
| 0C00352C | 00020001 | 0C003530 | 00030001 | 0C003534 | 00030001 | 0C003538 |
| 00040001 | 1C00353C | 00050001 | 1C003540 | C2D3C4C4 | F0F0F1F0** | |
| 02C5E2C4 | 40404040 | 40400010 | 40400007 | D9C1D5C7 | C5404040 | 02000000 |
| 40000000 | 40404040 | 40404040 | 40404040 | 40404040 | 40404040 | 40404040 |
| 40404040 | 40404040 | 40404040 | 40404040 | C2D3C4C4 | F0F0F1F1* | |
| 02C5E2C4 | 40404040 | 40400010 | 40400008 | C2E4C9D3 | C4F14040 | 02000000 |
| 40000000 | 40404040 | 40404040 | 40404040 | 40404040 | 40404040 | 40404040 |
| 40404040 | 40404040 | 40404040 | 40404040 | C2D3C4C4 | F0F0F1F2* | |
| 02C5E2C4 | 40404040 | 40400010 | 40400009 | C2E4C9D3 | C4F24040 | 02000000 |
| 40000000 | 40404040 | 40404040 | 40404040 | 40404040 | 40404040 | 40404040 |
| 40404040 | 40404040 | 40404040 | 40404040 | C2D3C4C4 | F0F0F1F3* | |
| 02E3E7E3 | 40003548 | 40400010 | 40400001 | 00000000 | 00000000 | 00000000 |
| 00000000 | 40404040 | 40404040 | 40404040 | 40404040 | 40404040 | 40404040 |
| 40404040 | 40404040 | 40404040 | 40404040 | C2D3C4C4 | F0F0F1F4* | |
| 02E3E7E3 | 4000355C | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C2D3C4C4 | F0F0F1F5* | |
| 02E3E7E3 | 40000150 | 40400038 | 40400001 | 00000031 | 00000004 | C6D34040 |
| C1404040 | 00000035 | 00000004 | C6D34040 | C1404040 | 00000029 | 00000004 |
| C6D34040 | C1404040 | 0000002D | 00000004 | C2D3C4C4 | F0F0F1F6* | |
| 02E3E7E3 | 40000188 | 40400008 | 40400001 | C6D34040 | C1404040 | 40404040 |
| 40404040 | 40404040 | 40404040 | 40404040 | 40404040 | 40404040 | 40404040 |
| 40404040 | 40404040 | 40404040 | 40404040 | C2D3C4C4 | F0F0F1F7* | |
| 02E3E7E3 | 40003570 | 40400038 | 40400001 | 5860C034 | 5870C00C | 5880C008 |
| 5890C004 | 58A0C02C | 58B0C000 | 5800D0DC | 5000D10C | 5000D118 | 5000D108 |
| 5800D0D8 | 5000D120 | 5850D114 | 5A50D124 | C2D3C4C4 | F0F0F1F8* | |
| 02E3E7E3 | 400035A8 | 40400038 | 40400001 | 5B50D0DC | 5830D124 | 5C40D0F8 |
| 5C20D0F8 | 18655870 | D0DC5880 | D1205890 | D0D818B3 | 58A0C004 | 1A875A90 |
| D0F84109 | D1305000 | D050410B | A0045000 | C2D3C4C4 | F0F0F1F9* | |
| 02E3E7E3 | 400035E0 | 40400038 | 40400001 | D0549280 | D05458F0 | C01C4110 |

MEMBER NAME BLDDRV

| | | | | | | |
|---|---|---|---|---|---|---|
| D04C05EF | 5AB0D0F8 | 19B647C0 | C0A45080 | D1205860 | C0345870 | C00C5880 |
| C0085890 | C00458A0 | C02C58B0 | C00058F0 | C2D3C4C4 | F0F0F2F0** | |
| 02E3E7E3 | 40003618 | 40400038 | 40400001 | C0184110 | D05805EF | 58F0C024 |
| 4110D06C | 05EF58F0 | C0144110 | D0A405EF | 58F0C020 | 4110D0C8 | 05EF58F0 |
| C0284110 | D0C805EF | 1BFF58E0 | D00007FE | C2D3C4C4 | F0F0F2F1* | |
| 02E3E7E3 | 40003650 | 40400038 | 40400001 | 58A0D004 | 58E0A00C | 58B0A018 |
| 5810B004 | 5820D10C | 50201000 | 5830B00C | 5840D118 | 50403000 | 18DA92FF |
| A00C982C | A01C07FE | 58C0D048 | 987B1004 | C2D3C4C4 | F0F0F2F2* | |
| 02E3E7E3 | 40003688 | 40400038 | 40400001 | 58207000 | 5020D10C | 58209000 |
| 5020D118 | 5820A000 | 5020D124 | 5820B000 | 5020D114 | 58201000 | 41302000 |
| 41500004 | 1B255C40 | D0EC1B25 | 5020C02C | C2D3C4C4 | F0F0F2F3* | |
| 02E3E7E3 | 400036C0 | 40400038 | 40400001 | 5030C030 | 5030D07C | 5030D0A4 |
| 5030D0C8 | 58201008 | 41302000 | 41500004 | 1B255C40 | D0E41B25 | 5020C034 |
| 5030C038 | 5030D084 | 5030D0AC | 47F0C048 | C2D3C4C4 | F0F0F2F4* | |
| 02E3E7E3 | 40000020 | 4040000C | 40400001 | 00003680 | 00000028 | 00003650 |
| 40404040 | 40404040 | 40404040 | 40404040 | 40404040 | 40404040 | 40404040 |
| 40404040 | 40404040 | 40404040 | 40404040 | C2D3C4C4 | F0F0F2F5* | |
| 02E3E7E3 | 40000070 | 40400004 | 40400001 | 00003528 | 40404040 | 40404040 |
| 40404040 | 40404040 | 40404040 | 40404040 | 40404040 | 40404040 | 40404040 |
| 40404040 | 40404040 | 40404040 | 40404040 | C2D3C4C4 | F0F0F2F6* | |
| 02D9D3C4 | 40404040 | 40400038 | 40404040 | 00060001 | 1C003544 | 00070001 |
| 1C003548 | 00080001 | 1C00354C | 00090001 | 1C003550 | 00010001 | 0C000020 |
| 00010001 | 0C000024 | 00010001 | 0C000028 | C2D3C4C4 | F0F0F2F7* | |
| 02E3E7E3 | 40000074 | 40400004 | 40400001 | 00000120 | 40404040 | 40404040 |
| 40404040 | 40404040 | 40404040 | 40404040 | 40404040 | 40404040 | 40404040 |
| 40404040 | 40404040 | 40404040 | 40404040 | C2D3C4C4 | F0F0F2F8* | |

```
                                                                              PAGE 0018
02E3E7E3   4000007C   4040001C   40400001   80000000   00000150   00000108
00000190   00000120   80000148   00000004   40404040   40404040   40404040
40404040   40404040   40404040   40404040   C2D3C4C4   F0F0F2F9*
02D9D3C4   40404040   40400038   40404040   00010001   0C000070   00010001
0C000074   00010001   0C000080   00010001   0C000084   00010001   0C000088
00010001   0C00008C   00010001   0C000090   C2D3C4C4   F0F0F3F0**
02E3E7E3   40000098   4040000C   40400001   00000000   000CD148   000CD144
40404040   40404040   40404040   40404040   40404040   40404040   40404040
40404040   40404040   40404040   40404040   C2D3C4C4   F0F0F3F1*
02E3E7E3   400000A8   40400004   40400001   00000134   40404040   40404040
40404040   40404040   40404040   40404040   40404040   40404040   40404040
40404040   40404040   40404040   40404040   C2D3C4C4   F0F0F3F2*
02E3E7E3   400000B0   4040000C   40400001   00000140   00000004   00000000
40404040   40404040   40404040   40404040   40404040   40404040   40404040
40404040   40404040   40404040   40404040   C2D3C4C4   F0F0F3F3*
02D9D3C4   40404040   40400038   40404040   00020001   0C000094   00020001
0C000098   00020001   0C00009C   00020001   0C0000A0   00010001   0C0000A8
00010001   0C0000B0   00030001   0C0000B4   C2D3C4C4   F0F0F3F4*
02E3E7E3   400000BC   40400010   40400001   00002D50   00000130   00000190
80000148   40404040   40404040   40404040   40404040   40404040   40404040
40404040   40404040   40404040   40404040   C2D3C4C4   F0F0F3F5*
02E3E7E3   400000D0   40400004   40400001   00000134   40404040   40404040
40404040   40404040   40404040   40404040   40404040   40404040   40404040
40404040   40404040   40404040   40404040   C2D3C4C4   F0F0F3F6*
02E3E7E3   400000D8   40400008   40400001   00000140   00002D50   40404040
40404040   40404040   40404040   40404040   40404040   40404040   40404040
40404040   40404040   40404040   40404040   C2D3C4C4   F0F0F3F7*
02D9D3C4   40404040   40400038   40404040   00030001   0C0000B8   00010001
0C0000BC   00010001   0C0000C0   00010001   0C0000C4   00010001   0C0000C8
00010001   0C0000D0   00010001   0C0000D8   C2D3C4C4   F0F0F3F8*
02E3E7E3   400000E0   40400010   40400001   00000130   0000EA64   00000190
80000148   40404040   40404040   40404040   40404040   40404040   40404040

MEMBER NAME  BLDDRV
40404040   40404040   40404040   40404040   C2D3C4C4   F0F0F3F9*
02E3E7E3   400000F4   4040000C   40400001   00000134   00002D50   80000130
40404040   40404040   40404040   40404040   40404040   40404040   40404040
40404040   40404040   40404040   40404040   C2D3C4C4   F0F0F4F0**
02D9D3C4   40404040   40400038   40404040   00010001   0C0000DC   00010001
0C0000E0   00030001   0C0000E4   00010001   0C0000E8   00010001   0C0000EC
00010001   0C0000F4   00010001   0C0000F8   C2D3C4C4   F0F0F4F1*
02E3E7E3   40003564   4040000C   40400001   00000000   00000000   00000000
40404040   40404040   40404040   40404040   40404040   40404040   40404040
40404040   40404040   40404040   40404040   C2D3C4C4   F0F0F4F2*
02D9D3C4   40404040   40400008   40404040   00010001   0C0000FC   40404040
40404040   40404040   40404040   40404040   40404040   40404040   40404040
40404040   40404040   40404040   40404040   C2D3C4C4   F0F0F4F3*
02C5D5C4   40404040   40404040   40404040   40404040   40404040   40404040
000036F8   F1F5F7F3   F460C6D6   F34040F0   F2F0F2F8   F7F0F9F8   40F0F84B
F1F24BF0   F3404040   C2D3C4C4   D9E54040   C2D3C4C4   F0F0F4F4**

MEMBER NAME  BLDET
02C5E2C4   40404040   40400010   40400001   C2D3C4C5   E3404040   00000000
40000000   40404040   40404040   40404040   40404040   40404040   40404040
40404040   40404040   40404040   40404040   C2D3C4C5   F0F0F0F1*
02E3E7E3   40000000   40400038   40400001   47F0F00C   07C2D3C4   C5E34040
90ECD00C   184D98CD   F0205040   D00450D0   400807FC   40404040   40404040
021A2C40   4040C5D9   D9D6D940   C9D540C5   C2D3C4C5   F0F0F0F2*
02E3E7E3   40000038   40400038   40400001   D3C5D4C5   D5E340E3   E8D7C540
```

```
                                                                   PAGE 0019
C9D540E2  E4C2D9D6  E4E3C9D5  C540C2D3  C4C5E30A  0A052202  1A1740C5
D9D9D6D9  40C9D540  C3C1D3D3  40E3D640  C2D3C4C5  F0F0F0F3*
02E3E7E3  40000070  40400038  40400001  C3C1C4D3  D522021A  1840C5D9
D9D6D940  C9D540C3  C1D3D340  E3D640C3  C1C4C3C9  D922021A  1840C5D9
D9D6D940  C9D540C3  C1D3D340  E3D640C3  C2D3C4C5  F0F0F0F4*
02E3E7E3  400000A8  40400038  40400001  C1C4C1D9  C322021A  1FC5D9D9
D6D940C9  D540C2D3  C4C5E340  6040C3C1  D3D340E3  D640E2D7  D3D6C6C6
22021A1F  C5D9D9D6  D940C9D5  40C2D3C4  C2D3C4C5  F0F0F0F5*
02E3E7E3  400000E0  40400038  40400001  C5E34060  40C3C1D3  D340E3D6
40C3C1C4  E2D7F422  021A1DC5  D9D9D6D9  40C9D540  C2D3C4C5  E3406040
C3C1D3D3  40E3D640  D5C1D4C5  22021A1F  C2D3C4C5  F0F0F0F6*
02E3E7E3  40000118  40400020  40400001  C5D9D9D6  D940C9D5  40C2D3C4
C5E34060  40C3C1D3  D340E3D6  40C3C1C4  D5E2C822  40404040  40404040
40404040  40404040  40404040  40404040  C2D3C4C5  F0F0F0F7*
02E3E7E3  40000238  40400038  40400001  00000000  00000000  4F080000
00000000  00000000  00000001  00000002  00000003  00000004  00000005
00000006  00000007  00000008  00000009  C2D3C4C5  F0F0F0F8*
02C5E2C4  40404040  40400010  40400002  40404040  40404040  05000000
40000640  40404040  40404040  40404040  40404040  40404040  40404040
40404040  40404040  40404040  40404040  C2D3C4C5  F0F0F0F9*
02E3E7E3  40000270  40400030  40400001  0000000B  0000000E  00000014
3E418937  41100000  41200000  41300000  41400000  41500000  41600000
00000000  00000000  40404040  40404040  C2D3C4C5  F0F0F1F0**
02C5E2C4  40404040  40400010  40400003  E2D7D3D7  E3E24040  05000000
40030D44  40404040  40404040  40404040  40404040  40404040  40404040
40404040  40404040  40404040  40404040  C2D3C4C5  F0F0F1F1*
02C5E2C4  40404040  40400010  40400004  D5C1D4C5  40404040  02000000
40000000  40404040  40404040  40404040  40404040  40404040  40404040
40404040  40404040  40404040  40404040  C2D3C4C5  F0F0F1F2*
02C5E2C4  40404040  40400010  40400005  E2D8D9E3  40404040  02000000
40000000  40404040  40404040  40404040  40404040  40404040  40404040
40404040  40404040  40404040  40404040  C2D3C4C5  F0F0F1F3*
02C5E2C4  40404040  40400010  40400006  C3C1C4D3  D5404040  02000000
40000000  40404040  40404040  40404040  40404040  40404040  40404040
40404040  40404040  40404040  40404040  C2D3C4C5  F0F0F1F4*
02C5E2C4  40404040  40400010  40400007  D4E5C3C8  D9404040  02000000
40000000  40404040  40404040  40404040  40404040  40404040  40404040
40404040  40404040  40404040  40404040  C2D3C4C5  F0F0F1F5*
02C5E2C4  40404040  40400010  40400008  C3C1C4C1  D9C34040  02000000
40000000  40404040  40404040  40404040  40404040  40404040  40404040
40404040  40404040  40404040  40404040  C2D3C4C5  F0F0F1F6*
02C5E2C4  40404040  40400010  40400009  C3C1C4C2  D9D24040  02000000
40000000  40404040  40404040  40404040  40404040  40404040  40404040
40404040  40404040  40404040  40404040  C2D3C4C5  F0F0F1F7*
02E3E7E3  40000FC0  40400020  40400001  FFFFFFFC  FFFFFFEC  00000000
00000000  00000000  00000000  00000000  00000000  40404040  40404040
40404040  40404040  40404040  40404040  C2D3C4C5  F0F0F1F8*
02D9D3C4  40404040  40400038  40404040  00020001  0C000FC0  00030001
0C000FC4  00040001  1C000FC8  00050001  1C000FCC  00060001  1C000FD0
00070001  1C000FD4  00080001  1C000FD8  C2D3C4C5  F0F0F1F9*
02C5E2C4  40404040  40400010  4040000A  C3C1C4C3  C9D94040  02000000

MEMBER NAME  BLDET
40000000  40404040  40404040  40404040  40404040  40404040  40404040
40404040  40404040  40404040  40404040  C2D3C4C5  F0F0F2F0**
02C5E2C4  40404040  40400010  4040000B  C3C1C4D5  E2C84040  02000000
40000000  40404040  40404040  40404040  40404040  40404040  40404040
40404040  40404040  40404040  40404040  C2D3C4C5  F0F0F2F1*
02C5E2C4  40404040  40400010  4040000C  C3C1C4E2  D7F44040  02000000
```

PAGE 0020

```
40000000  40404040  40404040  40404040  40404040  40404040  40404040
40404040  40404040  40404040  40404040  C2D3C4C5  F0F0F2F2*
02C5E2C4  40404040  40400010  4040000D  C9C2C3D6  D47B4040  02000000
40000000  40404040  40404040  40404040  40404040  40404040  40404040
40404040  40404040  40404040  40404040  C2D3C4C5  F0F0F2F3*
02E3E7E3  40000FE0  40400010  40400001  00000000  00000000  00000000
00000000  40404040  40404040  40404040  40404040  40404040  40404040
40404040  40404040  40404040  40404040  C2D3C4C5  F0F0F2F4*
02C5E2C4  40404040  40400010  4040000E  D9C5D3E2  D7D34040  02000000
40000000  40404040  40404040  40404040  40404040  40404040  40404040
40404040  40404040  40404040  40404040  C2D3C4C5  F0F0F2F5*
02C5E2C4  40404040  40400010  4040000F  E2D7D3D6  C6C64040  02000000
40000000  40404040  40404040  40404040  40404040  40404040  40404040
40404040  40404040  40404040  40404040  C2D3C4C5  F0F0F2F6*
02E3E7E3  40000FF4  4040000C  40400001  00000000  00000000  00000000
40404040  40404040  40404040  40404040  40404040  40404040  40404040
40404040  40404040  40404040  40404040  C2D3C4C5  F0F0F2F7*
02E3E7E3  40001004  40400004  40400001  00000000  40404040  40404040
40404040  40404040  40404040  40404040  40404040  40404040  40404040
40404040  40404040  40404040  40404040  C2D3C4C5  F0F0F2F8*
02E3E7E3  400010CC  40400038  40400001  58B0DF70  58A0DF74  5890DF78
5880D140  7800D144  7000D1BC  5800D114  5000D168  5800D120  5000DEE4
5800DF08  5000DEF4  5800DF1C  5000DEFC  C2D3C4C5  F0F0F2F9*
02E3E7E3  40001104  40400038  40400001  5080DF00  7800D144  33007000
DF245800  DF6C5000  DEEC50B0  DF2850A0  DF2C5090  DF305800  DF7C5000
DF3450B0  DF3850A0  DF3C5090  DF4050A0  C2D3C4C5  F0F0F3F0**
02E3E7E3  4000113C  40400038  40400001  DF4450B0  DF485090  DF4C5090
DF505800  DF805000  DF545800  DF7C5000  DF5850B0  DF5C5800  DF845000
DF6050A0  DF645800  DF885000  DF6858A0  C2D3C4C5  F0F0F3F1*
02E3E7E3  40001174  40400038  40400001  DF0458B0  DEB45890  DEC458E0
DEEC782E  B0007020  DEE87920  D1484780  C0A07920  D14C4780  C1687920
D1504780  C1CC7920  D1544780  C2FC7920  C2D3C4C5  F0F0F3F2*
02E3E7E3  400011AC  40400018  40400001  D1584780  C73C58F0  DEBC1800
45E0F004  00000006  00000028  40404040  40404040  40404040  40404040
40404040  40404040  40404040  40404040  C2D3C4C5  F0F0F3F3*
02D9D3C4  40404040  40400038  40404040  00090001  1C000FDC  000A0001
1C000FE0  000B0001  1C000FE4  000C0001  1C000FE8  000D0001  1C000FF4
000E0001  1C000FF8  000F0001  1C001004  C2D3C4C5  F0F0F3F4*
02E3E7E3  400011C4  40400038  40400001  5810DEEC  45E0F008  0471B000
45E0F010  47F0C73C  4100DE74  5000D0A0  58E0DF28  410EB000  5000D0A4
9280D0A4  58F0DE9C  4110D09C  05EF4100  C2D3C4C5  F0F0F3F5*
02E3E7E3  400011FC  40400038  40400001  DE7C5000  D0A058E0  DF2C410E
B0005000  D0A49280  D0A458F0  DE9C4110  D09C05EF  5800D1D4  1BFF870F
C1027820  DE743302  7000DE74  7820DE7C  C2D3C4C5  F0F0F3F6*
02E3E7E3  40001234  40400038  40400001  33027000  DE7C5800  D1841BFF
860FC126  58F0DE98  4110D0A8  05EF41E0  000415FE  4720C126  58EFD04C
07FE5800  D1841BFF  870FC14A  58F0DEA4  C2D3C4C5  F0F0F3F7*
02E3E7E3  4000126C  40400038  40400001  4110D0A8  05EF41E0  000415FE
4720C14A  58EFD054  07FE47F0  C73C58F0  DEBC1800  45E0F004  00000006
0000005B  45E0F010  47F0C73C  4100D828  C2D3C4C5  F0F0F3F8*
02E3E7E3  400012A4  40400038  40400001  5000D0A0  58E0DF30  410EB000
5000D0A4  9280D0A4  58F0DE9C  4110D09C  05EF58E0  DF34782E  B0007020

MEMBER NAME  BLDET
D83058F0  DEA84110  D0B005EF  41E00004  C2D3C4C5  F0F0F3F9*
02E3E7E3  400012DC  40400038  40400001  15FE4720  C1B058EF  D05C07FE
47F0C73C  58F0DEBC  45E0F004  00000006  00000076  45E0F010  47F0C73C
5800D1D4  1BFF860F  C2404100  DE745000  C2D3C4C5  F0F0F4F0**
02E3E7E3  40001314  40400038  40400001  D0A058E0  DF38410E  B0005000
```

```
                                                                    PAGE 0021
D0A49280  D0A458F0  DE9C4110  D09C05EF  4100DE7C  5000D0A0  58E0DF3C
410EB000  5000D0A4  9280D0A4  58F0DE9C  C2D3C4C5  F0F0F4F1*
02E3E7E3  4000134C  40400038  40400001  4110D09C  05EF4100  D8285000
D0A058E0  DF40410E  B0005000  D0A49280  D0A458F0  DE9C4110  D09C05EF
47F0C2C4  4100DE74  5000D0A0  58E0DF44  C2D3C4C5  F0F0F4F2*
02E3E7E3  40001384  40400038  40400001  410EB000  5000D0A4  9280D0A4
58F0DE9C  4110D09C  05EF7820  DE743302  7000DE74  4100DE7C  5000D0A0
58E0DF48  410EB000  5000D0A4  9280D0A4  C2D3C4C5  F0F0F4F3*
02E3E7E3  400013BC  40400038  40400001  58F0DE9C  4110D09C  05EF7820
DE7C3302  7000DE7C  4100D828  5000D0A0  58E0DF4C  410EB000  5000D0A4
9280D0A4  58F0DE9C  4110D09C  05EF7820  C2D3C4C5  F0F0F4F4*
02E3E7E3  400013F4  40400038  40400001  D8283302  7000D828  58F0DEA0
4110D0B4  05EF41E0  000415FE  4720C2DE  58EFD064  07FE47F0  C73C58F0
DEBC1800  45E0F004  00000006  00000092  C2D3C4C5  F0F0F4F5*
02E3E7E3  4000142C  40400038  40400001  45E0F010  47F0C73C  58E0DF50
2B00780E  B0006A00  D1086000  D1005850  D1045050  D1C458E0  DF542B00
780EB000  6A00D108  6000D100  5820D104  C2D3C4C5  F0F0F4F6*
02E3E7E3  40001464  40400038  40400001  1A255B20  D1145020  D19C58E0
DF582B00  780EB000  6A00D108  6000D100  5870D104  5070D198  5C60DF18
5070DEF8  18275A20  DEE42B00  78029000  C2D3C4C5  F0F0F4F7*
02E3E7E3  4000149C  40400038  40400001  6A00D108  6000D100  5840D104
5040D1B4  18275A20  D1302B00  78029000  6A00D108  6000D100  5800D104
5000D1B0  58E0DF5C  780EB000  7000D17C  C2D3C4C5  F0F0F4F8*
02E3E7E3  400014D4  40400038  40400001  58E0DF60  780EB000  7000D180
1A455B40  D1141824  1B255020  D1941834  5040D178  19454780  C4221813
1C085010  DED05850  DEE05860  DED01873  C2D3C4C5  F0F0F4F9*
02E3E7E3  4000150C  40400038  40400001  5890D114  58A0D114  18B25880
DE8C7820  D17C7B26  80043C22  7840D180  7B468008  3C443A24  7020DF8C
58F0DE94  4110D0C0  05EF7900  D15C4750  C2D3C4C5  F0F0F5F0**
02E3E7E3  40001544  40400038  40400001  C4165070  D17847F0  C4221B7A
1A65879A  C3E25070  D1785890  DEC458B0  DEB458A0  DF045880  D1405850
D1C45050  D1E05800  D1785000  D1C41B05  C2D3C4C5  F0F0F5F1*
02E3E7E3  4000157C  40400038  40400001  5000D190  58E0DF64  780EB000
7000D17C  58E0DF68  780EB000  7000D180  5A50D1B0  5050D1AC  18255050
D1741C48  18651878  189258A0  D11458B0  C2D3C4C5  F0F0F5F2*
02E3E7E3  400015B4  40400038  40400001  D19C5880  DE8C7820  D17C7B26
80043C22  7840D180  7B468008  3C443A24  7020DF8C  58F0DE94  4110D0C4
05EF3820  7000D188  199B4770  C4BA5090  C2D3C4C5  F0F0F5F3*
02E3E7E3  400015EC  40400038  40400001  D17447F0  C4D47920  D15C4750
C4CA5090  D17447F0  C4D41A67  879AC482  5090D174  5890DEC4  58B0DEB4
58A0DF04  5880D140  5800D110  5000D1A0  C2D3C4C5  F0F0F5F4*
02E3E7E3  40001624  40400038  40400001  18185C00  D1745010  DEDC1838
5C20D1C4  5840D114  5850D1A0  5870D110  188358A0  D14058B0  D1605890
DE8C1A54  5A70D130  18674107  D82C5000  C2D3C4C5  F0F0F5F5*
02E3E7E3  4000165C  40400038  40400001  D0A04108  90045000  D0A49280
D0A458F0  DE9C4110  D09C05EF  4107D1E0  5000D0A0  4108900C  5000D0A4
9280D0A4  58F0DE9C  4110D09C  05EF5800  C2D3C4C5  F0F0F5F6*
02E3E7E3  40001694  40400038  40400001  D1D4870B  C5767826  D82C3302
7006D82C  7826D1E0  33027006  D1E01A8A  5980DEDC  47C0C516  5050D1A0
5890DEC4  58B0DEB4  58A0DF04  5880D140  C2D3C4C5  F0F0F5F7*
02E3E7E3  400016CC  40400038  40400001  58F0DEB0  4110D0C8  05EF41E0
000415FE  4720C5AE  58EFD06C  07FE5800  D1B45B00  D1905000  D1CC5800
D1B05B00  D1905000  D1C85830  D1B45A30  C2D3C4C5  F0F0F5F8*

MEMBER NAME  BLDET
02E3E7E3  40001704  40400038  40400001  D1E05B30  D1141C28  58F0DE8C
7823F014  5820DEF8  5A20DEF4  7C229000  7020D1DC  5830D1AC  5B30D114
1C287823  F0145820  DEF85A20  DEFC7C22  C2D3C4C5  F0F0F5F9*
02E3E7E3  4000173C  40400038  40400001  90007020  D1D85820  DEF85A20
```

PAGE 0022

```
DF007822  90007020  D1E47920  D1BC4730  C6527920  DF244750  C65258F0
DE904110  D0D405EF  41E00004  15FE4720  C2D3C4C5  F0F0F6F0**
02E3E7E3  40001774  40400038  40400001  C64458EF  D07407FE  58F0DEC0
4110D0D8  05EF47F0  C73C58F0  DE904110  D0D405EF  41E00004  15FE4720
C66C58EF  D07C07FE  58F0DEAC  4110D0EC  C2D3C4C5  F0F0F6F1*
02E3E7E3  400017AC  40400038  40400001  05EF41E0  000415FE  4720C686
58EFD084  07FE5800  D1D41BFF  870FC69A  7800D1E4  33007000  D1E458F0
DECC4110  D0F405EF  41E00004  15FE4720  C2D3C4C5  F0F0F6F2*
02E3E7E3  400017E4  40400038  40400001  C6B458EF  D08C07FE  58F0DE90
4110D0D4  05EF41E0  000415FE  4720C6CE  58EFD094  07FE58F0  DEC04110
D0D805EF  47F0C73C  58F0DEBC  45E0F004  C2D3C4C5  F0F0F6F3*
02E3E7E3  4000181C  40400038  40400001  00000006  000000AE  45E0F010
47F0C73C  58F0DEBC  45E0F004  00000006  000000D1  45E0F010  47F0C73C
58F0DEBC  45E0F004  00000006  000000F4  C2D3C4C5  F0F0F6F4*
02E3E7E3  40001854  40400018  40400001  45E0F010  47F0C73C  58F0DEBC
45E0F004  00000006  00000115  40404040  40404040  40404040  40404040
40404040  40404040  40404040  40404040  C2D3C4C5  F0F0F6F5*
02D9D3C4  40404040  40400038  40404040  00010001  0C0011C0  00010001
0C001294  00010001  0C0012F8  00010001  0C001428  00010001  0C001820
00010001  0C001838  00010001  0C001850  C2D3C4C5  F0F0F6F6*
02E3E7E3  4000186C  40400038  40400001  45E0F010  47F0C73C  5820D168
5A20D114  5020D168  5800DF68  1A0A5000  DF685800  DF641A0A  5000DF64
5800DF60  1A0A5000  DF605800  DF5C1A0A  C2D3C4C5  F0F0F6F7*
02E3E7E3  400018A4  40400038  40400001  5000DF5C  5800DF58  1A0A5000
DF585800  DF541A0A  5000DF54  5800DF50  1A0A5000  DF505800  DF4C1A0A
5000DF4C  5800DF48  1A0A5000  DF485800  C2D3C4C5  F0F0F6F8*
02E3E7E3  400018DC  40400038  40400001  DF441A0A  5000DF44  5800DF40
1A0A5000  DF405800  DF3C1A0A  5000DF3C  5800DF38  1A0A5000  DF385800
DF341A0A  5000DF34  5800DF30  1A0A5000  C2D3C4C5  F0F0F6F9*
02E3E7E3  40001914  40400038  40400001  DF305800  DF2C1A0A  5000DF2C
5800DF28  1A0A5000  DF285800  DEEC1A0A  5000DEEC  5920D18C  47C0C046
58B0DF70  58A0DF74  5890DF78  5880D140  C2D3C4C5  F0F0F7F0**
02E3E7E3  4000194C  40400038  40400001  1BFF58E0  D00007FE  58D0D004
58E0D00C  92FFD00C  982CD01C  07FE58C0  D048987B  10045820  70005020
D18C5820  90005020  D1A45820  A0005020  C2D3C4C5  F0F0F7F1*
02E3E7E3  40001984  40400038  40400001  D1D45820  B0005020  D1845820
10004130  20004150  00041B25  5C40D13C  1B255020  DEB45030  DEB85820
10084130  20004150  00041B25  5C40D138  C2D3C4C5  F0F0F7F2*
02E3E7E3  400019BC  4040000E  40400001  1B255020  DEC45030  DEC847F0
DF944040  40404040  40404040  40404040  40404040  40404040  40404040
40404040  40404040  40404040  40404040  C2D3C4C5  F0F0F7F3*
02E3E7E3  40000020  40400008  40400001  00001966  00000138  40404040
40404040  40404040  40404040  40404040  40404040  40404040  40404040
40404040  40404040  40404040  40404040  C2D3C4C5  F0F0F7F4*
02E3E7E3  40000138  40400004  40400001  00001954  40404040  40404040
40404040  40404040  40404040  40404040  40404040  40404040  40404040
40404040  40404040  40404040  40404040  C2D3C4C5  F0F0F7F5*
02E3E7E3  40000180  40400010  40400001  00001138  0000125E  00001286
00001282  40404040  40404040  40404040  40404040  40404040  40404040
40404040  40404040  40404040  40404040  C2D3C4C5  F0F0F7F6*
02D9D3C4  40404040  40400038  40404040  00010001  0C001868  00010001
0C000020  00010001  0C000024  00010001  0C000138  00010001  0C000180
00010001  0C000184  00010001  0C000188  C2D3C4C5  F0F0F7F7*
02E3E7E3  40000190  4040001C  40400001  00001286  000012E8  000012EC

MEMBER NAME  BLDET
00001416  0000141A  000016E6  0000182C  40404040  40404040  40404040
40404040  40404040  40404040  40404040  C2D3C4C5  F0F0F7F8*
02D9D3C4  40404040  40400038  40404040  00010001  0C00018C  00010001
```

PAGE 0023

```
0C000190  00010001  0C000194  00010001  0C000198  00010001  0C00019C
00010001  0C0001A0  00010001  0C0001A4  C2D3C4C5  F0F0F7F9*
02E3E7E3  400001AC  4040001C  40400001  0000177C  00001844  000017A4
00001844  000017BE  0000185C  000017EC  40404040  40404040  40404040
40404040  40404040  40404040  40404040  C2D3C4C5  F0F0F8F0**
02D9D3C4  40404040  40400038  40404040  00010001  0C0001A8  00010001
0C0001AC  00010001  0C0001B0  00010001  0C0001B4  00010001  0C0001B8
00010001  0C0001BC  00010001  0C0001C0  C2D3C4C5  F0F0F8F1*
02E3E7E3  400001C8  40400010  40400001  00001814  00001806  00001844
00000268  40404040  40404040  40404040  40404040  40404040  40404040
40404040  40404040  40404040  40404040  C2D3C4C5  F0F0F8F2*
02E3E7E3  400001DC  40400010  40400001  80000000  00000FAC  80000FB4
80000960  40404040  40404040  40404040  40404040  40404040  40404040
40404040  40404040  40404040  40404040  C2D3C4C5  F0F0F8F3*
02D9D3C4  40404040  40400038  40404040  00010001  0C0001C4  00010001
0C0001C8  00010001  0C0001CC  00010001  0C0001D0  00010001  0C0001D4
00010001  0C0001E0  00010001  0C0001E4  C2D3C4C5  F0F0F8F4*
02E3E7E3  400001EC  4040001C  40400001  00000FAC  00000FB4  80000960
800010C4  800010C4  0000096C  000002D8  40404040  40404040  40404040
40404040  40404040  40404040  40404040  C2D3C4C5  F0F0F8F5*
02D9D3C4  40404040  40400038  40404040  00010001  0C0001E8  00010001
0C0001EC  00010001  0C0001F0  00010001  0C0001F4  00010001  0C0001F8
00010001  0C0001FC  00010001  0C000200  C2D3C4C5  F0F0F8F6*
02E3E7E3  40000208  4040001C  40400001  80000320  800002F0  000002F0
00000304  00000300  00000314  80000310  40404040  40404040  40404040
40404040  40404040  40404040  40404040  C2D3C4C5  F0F0F8F7*
02D9D3C4  40404040  40400038  40404040  00010001  0C000204  00010001
0C000208  00010001  0C00020C  00010001  0C000210  00010001  0C000214
00010001  0C000218  00010001  0C00021C  C2D3C4C5  F0F0F8F8*
02E3E7E3  40000224  40400010  40400001  000002F0  800002F0  000002F0
8000031C  40404040  40404040  40404040  40404040  40404040  40404040
40404040  40404040  40404040  40404040  C2D3C4C5  F0F0F8F9*
02E3E7E3  40001008  40400038  40400001  00000000  00000000  00000000
00000000  FFFFFFEC  00000000  00000000  00000000  00000000  00000000
00000000  00000000  00000000  00000038  C2D3C4C5  F0F0F9F0**
02E3E7E3  40001040  40400038  40400001  0000000C  0000001C  00000024
00000020  0000002C  00000010  00000018  00000000  00000000  00000000
00000000  00000000  00D8000D  00000000  C2D3C4C5  F0F0F9F1*
02E3E7E3  40001078  40400038  40400001  0000000D  00E4000F  00E8000F
00000000  0000000F  00F40011  00F80011  00000000  00000011  01040013
01080013  0000003C  00000044  0000004C  C2D3C4C5  F0F0F9F2*
02E3E7E3  400010B0  4040001C  40400001  00000054  0000005C  00000058
00000048  00000050  01340017  01380017  40404040  40404040  40404040
40404040  40404040  40404040  40404040  C2D3C4C5  F0F0F9F3*
02D9D3C4  40404040  40400028  40404040  00010001  0C000220  00010001
0C000224  00010001  0C000228  00010001  0C00022C  00010001  0C000230
40404040  40404040  40404040  40404040  C2D3C4C5  F0F0F9F4*
02C5D5C4  40404040  40404040  40404040  40404040  40404040  40404040
000019CA  F1F5F7F3  F460C6D6  F34040F0  F2F0F2F8  F7F0F9F8  40F0F84B
F1F24BF0  F7404040  C2D3C4C5  E3404040  C2D3C4C5  F0F0F9F5**

MEMBER NAME  BLDMFG
02C5E2C4  40404040  40400010  40400001  C2D3C4D4  C6C74040  00000000
40000000  40404040  40404040  40404040  40404040  40404040  40404040
40404040  40404040  40404040  40404040  C2D3C4D4  F0F0F0F1*
02E3E7E3  40000000  40400038  40400001  47F0F00C  07C2D3C4  D4C6C740
90ECD00C  184D98CD  F0205040  D00450D0  400807FC  40404040  40404040
021A3440  C5D9D9D6  D940C6D6  E4D5C440  C2D3C4D4  F0F0F0F2*
02E3E7E3  40000038  40400038  40400001  C9D540D7  D9D6C3C5  E2E2C9D5
```

```
                                                                    PAGE 0024
C740C1D9  D9D6E6C8  C5C1C4E2  40D6D940  D7D3E8E3  C1C2D3C5  40404022
021A0140  06481401  22021812  1A23405C  C2D3C4D4  F0F0F0F3*
02E3E7E3  40000070  40400038  40400001  5C5C5C40  E4D5C1C2  D3C540E3
D640C3C8  C1C9D540  C7C5D6D4  C5E3D9E8  405C5C5C  5C183222  02064814
01220218  121A1D40  5C5C5C5C  40C5E7E3  C2D3C4D4  F0F0F0F4*
02E3E7E3  400000A8  40400038  40400001  C5D9C9D6  D940E4D5  C4C5C6C9
D5C5C440  5C5C5C5C  18322202  18121A1A  405C5C5C  5C40E4D5  C1C2D3C5
40E3D640  D6D9C4C5  D9405C5C  5C5C1832  C2D3C4D4  F0F0F0F5*
02E3E7E3  400000E0  40400038  40400001  22021812  1A19405C  5C5C5C40
C9D3D3C5  C7C1D340  C3E4E3D6  E4E3405C  5C5C5C18  3222021A  0FD9C5C6
C9D3C540  C5D9D9D6  D9407E40  10031A0A  C2D3C4D4  F0F0F0F6*
02E3E7E3  40000118  40400038  40400001  40C9D540  C2D3C4D4  C6C72202
1A2F4040  C5D9D9D6  D940C9D5  40C140C3  C1C4C1D4  40D9D6E4  E3C9D5C5
40C9D540  C2D3C4D4  C6C740E2  E4C2D9D6  C2D3C4D4  F0F0F0F7*
02E3E7E3  40000150  40400038  40400001  E4E3C9D5  C522021A  2140D4D6
C4C5D340  C6E4D3D3  40D6D940  E5C9C5E6  61C4C5E3  C1C9D340  C6E4D3D3
4B401A0C  D4D6C4C5  D340E2D7  C1C3C57E  C2D3C4D4  F0F0F0F8*
02E3E7E3  40000188  40400013  40400001  10061A0C  4040D5C5  E7E340E5
C9C5E67E  10062240  40404040  40404040  40404040  40404040  40404040
40404040  40404040  40404040  40404040  C2D3C4D4  F0F0F0F9*
02E3E7E3  400004A8  40400038  40400001  00000000  00000000  4E000000
00000000  4F080000  00000000  4E000000  80000000  00000000  00000000
00000000  00000001  00000001  00000002  C2D3C4D4  F0F0F1F0**
02E3E7E3  400004E0  40400038  40400001  00000003  00000004  00000005
00000008  00000009  0000000A  0000000B  0000000C  0000000E  0000000F
00000010  00000014  00000015  00000018  C2D3C4D4  F0F0F1F1*
02E3E7E3  40000518  40400038  40400001  0000002A  0000002C  00000038
00000048  00000049  00000058  0000005D  00000070  00000080  00000098
00000BB8  401DF3B6  4029FBE7  403EF9DB  C2D3C4D4  F0F0F1F2*
02E3E7E3  40000550  40400018  40400001  41100000  4145BE77  414F70A4
41F00000  00000000  00000000  40404040  40404040  40404040  40404040
40404040  40404040  40404040  40404040  C2D3C4D4  F0F0F1F3*
02C5E2C4  40404040  40400010  40400002  D4E2C9E9  C5404040  05000000
4000000C  40404040  40404040  40404040  40404040  40404040  40404040
40404040  40404040  40404040  40404040  C2D3C4D4  F0F0F1F4*
02C5E2C4  40404040  40400010  40400003  E2E3C1C3  D2404040  05000000
40040744  40404040  40404040  40404040  40404040  40404040  40404040
40404040  40404040  40404040  40404040  C2D3C4D4  F0F0F1F5*
02C5E2C4  40404040  40400010  40400004  D7C3C5D9  D9404040  05000000
40003844  40404040  40404040  40404040  40404040  40404040  40404040
40404040  40404040  40404040  40404040  C2D3C4D4  F0F0F1F6*
02C5E2C4  40404040  40400010  40400005  D7D7D6C9  D5E34040  05000000
40013884  40404040  40404040  40404040  40404040  40404040  40404040
40404040  40404040  40404040  40404040  C2D3C4D4  F0F0F1F7*
02C5E2C4  40404040  40400010  40400006  E2C5D9D9  D6D94040  05000000
40000004  40404040  40404040  40404040  40404040  40404040  40404040
40404040  40404040  40404040  40404040  C2D3C4D4  F0F0F1F8*
02C5E2C4  40404040  40400010  40400007  C5D3D4E3  C2D34040  05000000
400D7D28  40404040  40404040  40404040  40404040  40404040  40404040
40404040  40404040  40404040  40404040  C2D3C4D4  F0F0F1F9*
02E3E7E3  40006230  40400020  40400001  00002688  00005F10  00000000

MEMBER NAME  BLDMFG
FFFFFFA8  FFFFFFBB  FFFFFFF0  00000000  FFFFFFC8  40404040  40404040
40404040  40404040  40404040  40404040  C2D3C4D4  F0F0F2F0**
02D9D3C4  40404040  40400038  40404040  00010001  0C006230  00010001
0C006234  00020001  0C006238  00030001  0C00623C  00040001  0C006240
00050001  0C006244  00060001  0C006248  C2D3C4D4  F0F0F2F1*
02C5E2C4  40404040  40400010  40400008  C9D7D5E3  D9404040  05000000
```

PAGE 0025

4000EA68 40404040 40404040 40404040 40404040 40404040 40404040
40404040 40404040 40404040 40404040 C2D3C4D4 F0F0F2F2*
02C5E2C4 40404040 40400010 40400009 C4C5E3C1 C2D34040 05000000
40015950 40404040 40404040 40404040 40404040 40404040 40404040
40404040 40404040 40404040 40404040 C2D3C4D4 F0F0F2F3*
02C5E2C4 40404040 40400010 4040000A C9C4E4D7 C5404040 05000000
40008CA4 40404040 40404040 40404040 40404040 40404040 40404040
40404040 40404040 40404040 40404040 C2D3C4D4 F0F0F2F4*
02C5E2C4 40404040 40400010 4040000B D9D4D6C4 C5D34040 05000000
40000018 40404040 40404040 40404040 40404040 40404040 40404040
40404040 40404040 40404040 40404040 C2D3C4D4 F0F0F2F5*
02E3E7E3 40006250 4040001C 40400001 000CD118 FFFFFFF4 0000EA64
FFFFFFC4 000147F0 FFFFFFF4 FFFFFFFF 40404040 40404040 40404040
40404040 40404040 40404040 40404040 C2D3C4D4 F0F0F2F6*
02D9D3C4 40404040 40400038 40404040 00070001 0C00624C 00070001
0C006250 00080001 0C006254 00080001 0C006258 00090001 0C00625C
00090001 0C006260 000A0001 0C006264 C2D3C4D4 F0F0F2F7*
02C5E2C4 40404040 40400010 4040000C C7D9E4D7 40404040 05000000
4000000C 40404040 40404040 40404040 40404040 40404040 40404040
40404040 40404040 40404040 40404040 C2D3C4D4 F0F0F2F8*
02C5E2C4 40404040 40400010 4040000D D6D7E3C9 D6D54040 05000000
40000020 40404040 40404040 40404040 40404040 40404040 40404040
40404040 40404040 40404040 40404040 C2D3C4D4 F0F0F2F9*
02C5E2C4 40404040 40400010 4040000E 40404040 40404040 05000000
400007D0 40404040 40404040 40404040 40404040 40404040 40404040
40404040 40404040 40404040 40404040 C2D3C4D4 F0F0F3F0**
02C5E2C4 40404040 40400010 4040000F D7E3C1C2 D3C54040 05000000
40125768 40404040 40404040 40404040 40404040 40404040 40404040
40404040 40404040 40404040 40404040 C2D3C4D4 F0F0F3F1*
02E3E7E3 4000626C 4040001C 40400001 00000000 00000000 FFFFFFFC
FFFFFFEC 00058600 000B0444 00108298 40404040 40404040 40404040
40404040 40404040 40404040 40404040 C2D3C4D4 F0F0F3F2*
02D9D3C4 40404040 40400038 40404040 000B0001 0C006268 000C0001
0C00626C 000D0001 0C006270 000E0001 0C006274 000F0001 0C006278
000F0001 0C00627C 000F0001 0C006280 C2D3C4D4 F0F0F3F3*
02C5E2C4 40404040 40400010 40400010 C2D3C4C5 E3404040 02000000
40000000 40404040 40404040 40404040 40404040 40404040 40404040
40404040 40404040 40404040 40404040 C2D3C4D4 F0F0F3F4*
02C5E2C4 40404040 40400010 40400011 C2E2D6D9 E3404040 02000000
40000000 40404040 40404040 40404040 40404040 40404040 40404040
40404040 40404040 40404040 40404040 C2D3C4D4 F0F0F3F5*
02C5E2C4 40404040 40400010 40400012 C3C1C4E2 E3404040 02000000
40000000 40404040 40404040 40404040 40404040 40404040 40404040
40404040 40404040 40404040 40404040 C2D3C4D4 F0F0F3F6*
02C5E2C4 40404040 40400010 40400013 C3C1D5C4 D6404040 02000000
40000000 40404040 40404040 40404040 40404040 40404040 40404040
40404040 40404040 40404040 40404040 C2D3C4D4 F0F0F3F7*
02C5E2C4 40404040 40400010 40400014 C4C9E3E3 D6404040 02000000
40000000 40404040 40404040 40404040 40404040 40404040 40404040
40404040 40404040 40404040 40404040 C2D3C4D4 F0F0F3F8*
02C5E2C4 40404040 40400010 40400015 C6E2D6D9 E3404040 02000000
40000000 40404040 40404040 40404040 40404040 40404040 40404040

MEMBER NAME BLDMFG 40404040 40404040 40404040 40404040 C2D3C4D4 F0F0F3F9*
02E3E7E3 40006288 4040001C 40400001 00111ED4 00000000 00000000
00000000 00000000 00000000 00000000 40404040 40404040 40404040
40404040 40404040 40404040 40404040 C2D3C4D4 F0F0F4F0**
02D9D3C4 40404040 40400038 40404040 000F0001 0C006284 000F0001

```
                                                                    PAGE 0026
0C006288  00100001  1C00628C  00110001  1C006290  00120001  1C006294
00130001  1C006298  00140001  1C00629C  C2D3C4D4  F0F0F4F1*
02C5E2C4  40404040  40400010  40400016  C6E2D7E4  E3404040  02000000
40000000  40404040  40404040  40404040  40404040  40404040  40404040
40404040  40404040  40404040  40404040  C2D3C4D4  F0F0F4F2*
02C5E2C4  40404040  40400010  40400017  D4E5C3C8  D9404040  02000000
40000000  40404040  40404040  40404040  40404040  40404040  40404040
40404040  40404040  40404040  40404040  C2D3C4D4  F0F0F4F3*
02C5E2C4  40404040  40400010  40400018  C2C3C8C1  C9D54040  02000000
40000000  40404040  40404040  40404040  40404040  40404040  40404040
40404040  40404040  40404040  40404040  C2D3C4D4  F0F0F4F4*
02C5E2C4  40404040  40400010  40400019  C2C5C7C4  C5E34040  02000000
40000000  40404040  40404040  40404040  40404040  40404040  40404040
40404040  40404040  40404040  40404040  C2D3C4D4  F0F0F4F5*
02C5E2C4  40404040  40400010  4040001A  C2D3C4C4  D9E54040  02000000
40000000  40404040  40404040  40404040  40404040  40404040  40404040
40404040  40404040  40404040  40404040  C2D3C4D4  F0F0F4F6*
02C5E2C4  40404040  40400010  4040001B  C2D3C4E3  C2D34040  02000000
40000000  40404040  40404040  40404040  40404040  40404040  40404040
40404040  40404040  40404040  40404040  C2D3C4D4  F0F0F4F7*
02C5E2C4  40404040  40400010  4040001C  C2D9C5C1  D2F14040  02000000
40000000  40404040  40404040  40404040  40404040  40404040  40404040
40404040  40404040  40404040  40404040  C2D3C4D4  F0F0F4F8*
02E3E7E3  400062A4  4040001C  40400001  00000000  00000000  00000000
00000000  00000000  00000000  00000000  40404040  40404040  40404040
40404040  40404040  40404040  40404040  C2D3C4D4  F0F0F4F9*
02D9D3C4  40404040  40400038  40404040  00150001  1C0062A0  00160001
1C0062A4  00170001  1C0062A8  00180001  1C0062AC  00190001  1C0062B0
001A0001  1C0062B4  001B0001  1C0062B8  C2D3C4D4  F0F0F5F0**
02C5E2C4  40404040  40400010  4040001D  C3C1C4C6  C9D34040  02000000
40000000  40404040  40404040  40404040  40404040  40404040  40404040
40404040  40404040  40404040  40404040  C2D3C4D4  F0F0F5F1*
02C5E2C4  40404040  40400010  4040001E  C3C1C4D5  E2C84040  02000000
40000000  40404040  40404040  40404040  40404040  40404040  40404040
40404040  40404040  40404040  40404040  C2D3C4D4  F0F0F5F2*
02C5E2C4  40404040  40400010  4040001F  C3C1C4E2  D7C34040  02000000
40000000  40404040  40404040  40404040  40404040  40404040  40404040
40404040  40404040  40404040  40404040  C2D3C4D4  F0F0F5F3*
02C5E2C4  40404040  40400010  40400020  C3C1C4E2  E4D74040  02000000
40000000  40404040  40404040  40404040  40404040  40404040  40404040
40404040  40404040  40404040  40404040  C2D3C4D4  F0F0F5F4*
02C5E2C4  40404040  40400010  40400021  C3C3C8C1  C9D54040  02000000
40000000  40404040  40404040  40404040  40404040  40404040  40404040
40404040  40404040  40404040  40404040  C2D3C4D4  F0F0F5F5*
02C5E2C4  40404040  40400010  40400022  C3C8C7D4  D6C44040  02000000
40000000  40404040  40404040  40404040  40404040  40404040  40404040
40404040  40404040  40404040  40404040  C2D3C4D4  F0F0F5F6*
02C5E2C4  40404040  40400010  40400023  C4E4D7C1  D9E84040  02000000
40000000  40404040  40404040  40404040  40404040  40404040  40404040
40404040  40404040  40404040  40404040  C2D3C4D4  F0F0F5F7*
02E3E7E3  400062C0  4040001C  40400001  00000000  00000000  00000000
00000000  00000000  00000000  00000000  40404040  40404040  40404040
40404040  40404040  40404040  40404040  C2D3C4D4  F0F0F5F8*

MEMBER NAME  BLDMFG
02D9D3C4  40404040  40400038  40404040  001C0001  1C0062BC  001D0001
1C0062C0  001E0001  1C0062C4  001F0001  1C0062C8  00200001  1C0062CC
00210001  1C0062D0  00220001  1C0062D4  C2D3C4D4  F0F0F5F9*
02C5E2C4  40404040  40400010  40400024  C4E4D7E3  C2D34040  02000000
```

PAGE 0027
40000000 40404040 40404040 40404040 40404040 40404040 40404040
40404040 40404040 40404040 40404040 C2D3C4D4 F0F0F6F0**
02C5E2C4 40404040 40400010 40400025 C5D5C4C4 C5E34040 02000000
40000000 40404040 40404040 40404040 40404040 40404040 40404040
40404040 40404040 40404040 40404040 C2D3C4D4 F0F0F6F1*
02C5E2C4 40404040 40400010 40400026 C8C7C4C1 E3C54040 02000000
40000000 40404040 40404040 40404040 40404040 40404040 40404040
40404040 40404040 40404040 40404040 C2D3C4D4 F0F0F6F2*
02C5E2C4 40404040 40400010 40400027 C8C7E3C9 D4C54040 02000000
40000000 40404040 40404040 40404040 40404040 40404040 40404040
40404040 40404040 40404040 40404040 C2D3C4D4 F0F0F6F3*
02C5E2C4 40404040 40400010 40400028 C9C2C3D6 D47B4040 02000000
40000000 40404040 40404040 40404040 40404040 40404040 40404040
40404040 40404040 40404040 40404040 C2D3C4D4 F0F0F6F4*
02C5E2C4 40404040 40400010 40400029 C9C3D5E3 C5D94040 02000000
40000000 40404040 40404040 40404040 40404040 40404040 40404040
40404040 40404040 40404040 40404040 C2D3C4D4 F0F0F6F5*
02C5E2C4 40404040 40400010 4040002A D4D3C3C8 C1D94040 02000000
40000000 40404040 40404040 40404040 40404040 40404040 40404040
40404040 40404040 40404040 40404040 C2D3C4D4 F0F0F6F6*
02E3E7E3 400062DC 4040001C 40400001 00000000 00000000 00000000
00000000 00000000 00000000 00000000 40404040 40404040 40404040
40404040 40404040 40404040 40404040 C2D3C4D4 F0F0F6F7*
02D9D3C4 40404040 40400038 40404040 00230001 1C0062D8 00240001
1C0062DC 00250001 1C0062E0 00260001 1C0062E4 00270001 1C0062E8
00280001 1C0062EC 00290001 1C0062F0 C2D3C4D4 F0F0F6F8*
02C5E2C4 40404040 40400010 4040002B D4D6C4E2 D9E34040 02000000
40000000 40404040 40404040 40404040 40404040 40404040 40404040
40404040 40404040 40404040 40404040 C2D3C4D4 F0F0F6F9*
02C5E2C4 40404040 40400010 4040002C D7D3E8C3 C8E34040 02000000
40000000 40404040 40404040 40404040 40404040 40404040 40404040
40404040 40404040 40404040 40404040 C2D3C4D4 F0F0F7F0**
02C5E2C4 40404040 40400010 4040002D D7D3E8E6 D9D54040 02000000
40000000 40404040 40404040 40404040 40404040 40404040 40404040
40404040 40404040 40404040 40404040 C2D3C4D4 F0F0F7F1*
02C5E2C4 40404040 40400010 4040002E D7D9C3C4 D9E54040 02000000
40000000 40404040 40404040 40404040 40404040 40404040 40404040
40404040 40404040 40404040 40404040 C2D3C4D4 F0F0F7F2*
02C5E2C4 40404040 40400010 4040002F D7D9C5C2 D9D24040 02000000
40000000 40404040 40404040 40404040 40404040 40404040 40404040
40404040 40404040 40404040 40404040 C2D3C4D4 F0F0F7F3*
02C5E2C4 40404040 40400010 40400030 E5C5D9C9 C6E84040 02000000
40000000 40404040 40404040 40404040 40404040 40404040 40404040
40404040 40404040 40404040 40404040 C2D3C4D4 F0F0F7F4*
02E3E7E3 400062F8 40400018 40400001 00000000 00000000 00000000
00000000 00000000 00000000 40404040 40404040 40404040 40404040
40404040 40404040 40404040 40404040 C2D3C4D4 F0F0F7F5*
02E3E7E3 400005C4 40400004 40400001 000000C8 40404040 40404040
40404040 40404040 40404040 40404040 40404040 40404040 40404040
40404040 40404040 40404040 40404040 C2D3C4D4 F0F0F7F6*
02E3E7E3 400060CC 40400030 40400001 00000025 00000004 C6D34040
C1404040 00000031 00000004 C6D34040 C1404040 00000035 00000004
C6D34040 C1404040 40404040 40404040 C2D3C4D4 F0F0F7F7*
02E3E7E3 40006104 40400010 40400001 00000000 00000000 00000000

MEMBER NAME BLDMFG
00000000 40404040 40404040 40404040 40404040 40404040 40404040
40404040 40404040 40404040 40404040 C2D3C4D4 F0F0F7F8*
02E3E7E3 40006140 40400038 40400001 40D9C5C3 D6D9C440 D3C5D5C7

```
                                                                    PAGE 0028
E3C87EF1  F66BE3E8  D7C57EC6  40404040  40404040  40E2D6D9  E340C6C9
C5D3C4E2  7E4DF16B  F46BC2C9  6BC16BF5  C2D3C4D4  F0F0F7F9*
02E3E7E3  40006178  40400038  40400001  6BF46BC2  C96BC16B  F96BF46B
C2C96BC1  5D404040  40404040  C3D6D7E8  D9C9C7C8  E3404DC3  5D40F1F9
F8F640E3  C8C540C2  D6C5C9D5  C740C3D6  C2D3C4D4  F0F0F8F0**
02E3E7E3  400061B0  40400038  40400001  D4D7C1D5  E85BC1D3  D340D9C9
C7C8E3E2  40D9C5E2  C5D9E5C5  C45B5BE2  D3C9C340  E5C5D9E2  C9D6D540
E7E7E7E7  40404040  40404040  4040C4C1  C2D3C4D4  F0F0F8F1*
02E3E7E3  400061E8  40400038  40400001  E3C57A40  E7E761E7  E761E7E7
40404040  40E3C9D4  C57A40E7  E77AE7E7  7AE7E740  5B5BC5D9  D9D6D940
D4D6C4C5  D3404040  40404040  40404040  C2D3C4D4  F0F0F8F2*
02E3E7E3  40006220  40400008  40400001  40404040  40404040  40404040
40404040  40404040  40404040  40404040  40404040  40404040  40404040
40404040  40404040  40404040  40404040  C2D3C4D4  F0F0F8F3*
02E3E7E3  40006334  40400038  40400001  5860C034  5880C024  5890C01C
58A0C010  58B0C004  5870D3C0  58F0C008  5800F008  5A00D3A0  5000D42C
5800D32C  5000D438  5800D328  5000D430  C2D3C4D4  F0F0F8F4*
02E3E7E3  4000636C  40400038  40400001  5800D32C  5000D44C  58F0C0B8
4110D0BC  05EF58F0  C0B44110  D0C005EF  4100B2DC  5000D0C8  4100B01C
5000D0CC  9280D0CC  58F0C078  4110D0C4  C2D3C4D4  F0F0F8F5*
02E3E7E3  400063A4  40400038  40400001  05EF4100  B2EF5000  D0C84100
B0245000  D0CC9280  D0CC58F0  C0784110  D0C405EF  4100B2C8  5000D0D4
58F0C078  4110D0D0  05EF7800  D3BC7000  C2D3C4D4  F0F0F8F6*
02E3E7E3  400063DC  40400038  40400001  B21C7800  D3307000  B2207800
D3BC7000  B2247800  D3307000  B22858F0  C0C84110  D0DC05EF  58F0C078
4110D0FC  05EF58F0  C0784110  D10805EF  C2D3C4D4  F0F0F8F7*
02E3E7E3  40006414  40400038  40400001  58F0C064  4110D114  05EF58F0
C0944110  D12005EF  41E00004  15FE4720  C20858EF  D04C07FE  58F0C0C0
4110D128  05EF5000  D4047800  D3B43300  C2D3C4D4  F0F0F8F8*
02E3E7E3  4000644C  40400038  40400001  7000C0FC  58F0C09C  4110D130
05EF41E0  000415FE  4720C23A  58EFD054  07FE5800  90385900  D3384130
000147C0  C24C1B33  58F0C054  5800F00C  C2D3C4D4  F0F0F8F9*
02E3E7E3  40006484  40400038  40400001  5900D338  41200001  4740C262
1B221623  8727C270  1BFF58E0  D00007FE  58F0C040  5800F00C  8707C286
58F0C088  4110D178  05EF58F0  C0405800  C2D3C4D4  F0F0F9F0**
02E3E7E3  400064BC  40400038  40400001  F00C8707  C38C5800  A0455900
D32C4120  00014780  C2A41B22  8727C2B4  58F0C040  5800F00C  8607C314
5800D334  58F0C018  5000F000  58F0C080  C2D3C4D4  F0F0F9F1*
02E3E7E3  400064F4  40400038  40400001  1B1105EF  41E00004  15FE4720
C2D858EF  D05C07FE  58F0C0CC  1B1105EF  58F0C0B0  4110D180  05EF41E0
000415FE  4720C2FA  58EFD064  07FE58F0  C2D3C4D4  F0F0F9F2*
02E3E7E3  4000652C  40400038  40400001  C06C4110  D19405EF  41E00004
15FE4720  C31458EF  D06C07FE  5800D44C  5900D32C  41200001  4780C326
1B228727  C33658F0  C0405800  F00C8607  C2D3C4D4  F0F0F9F3*
02E3E7E3  40006564  40400038  40400001  C38C58F0  C0801B11  05EF41E0
000415FE  4720C34E  58EFD074  07FE58F0  C0D04110  D17805EF  58F0C0B0
4110D180  05EF41E0  000415FE  4720C372  C2D3C4D4  F0F0F9F4*
02E3E7E3  4000659C  40400038  40400001  58EFD07C  07FE58F0  C06C4110
D19405EF  41E00004  15FE4720  C38C58EF  D08407FE  5800D338  5000800C
58F0C0A0  4110D1A4  05EF5800  D33858F0  C2D3C4D4  F0F0F9F5*
02E3E7E3  400065D4  40400038  40400001  C0285000  F00058F0  C07C4110
D1B405EF  58009038  5000D448  58F0C080  1B1105EF  41E00004  15FE4720
C3D458EF  D08C07FE  58F0C0DC  4110D1C8  C2D3C4D4  F0F0F9F6*
02E3E7E3  4000660C  40400038  40400001  05EF58F0  C0B04110  D18005EF
41E00004  15FE4720  C3F858EF  D09407FE  5800D3F8  12004780  C41C58F0

MEMBER NAME  BLDMFG
C06C4110  D19405EF  41E00004  15FE4720  C2D3C4D4  F0F0F9F7*
02E3E7E3  40006644  40400038  40400001  C41C58EF  D09C07FE  5860D338
```

```
58A0D344  18B75060  D45458F0  C0405800  F008860B  C44058F0  C0904110
D1D405EF  59A0D454  4780C426  5860C034  C2D3C4D4  F0F0F9F8*
02E3E7E3  4000667C  40400038  40400001  58A0C010  58B0C004  5800D454
5900D338  4770CBCC  5800A045  12004770  C4745800  D3F81200  4780C4F2
58F0C0BC  45E0F004  00000006  00000028  C2D3C4D4  F0F0F9F9*
02D9D3C4  40404040  40400038  40404040  002A0001  1C0062F4  002B0001
1C0062F8  002C0001  1C0062FC  002D0001  1C006300  002E0001  1C006304
002F0001  1C006308  00300001  1C00630C  C2D3C4D4  F0F1F0F0**
02E3E7E3  400066B4  40400038  40400001  45E0F010  5800A045  12004780
C4D45830  A0455C20  D3845880  D38458A0  D38418B3  5890C010  58F0C0BC
45E0F004  00000006  00000060  45E0F134  C2D3C4D4  F0F1F0F1*
02E3E7E3  400066EC  40400038  40400001  00010000  01289001  01000048
00000001  45E0F010  878AC4A8  5880C024  5890C01C  58A0C010  58B0C004
58F0C0BC  45E0F034  05404040  F2F358F0  C2D3C4D4  F0F1F0F2*
02E3E7E3  40006724  40400038  40400001  C0D84110  D1A405EF  58F0C08C
4110D1E0  05EF5800  90385B00  D4485000  D4005830  D4485A30  D3385C20
D3804103  90045000  D1F058F0  C0604110  C2D3C4D4  F0F1F0F3*
02E3E7E3  4000675C  40400038  40400001  D1E805EF  5800D338  5000600C
41039004  5000D1FC  58F0C0AC  4110D1FC  05EF5800  D3385000  D3FC58F0
C0A44110  D21005EF  58F0C014  5800F010  C2D3C4D4  F0F1F0F4*
02E3E7E3  40006794  40400038  40400001  12004780  C5A058F0  C0704110
D21405EF  5800D3D0  12004780  C58C58F0  C0BC45E0  F0340540  4040F2F5
5800D338  58F0C054  5000F008  5800D32C  C2D3C4D4  F0F1F0F5*
02E3E7E3  400067CC  40400038  40400001  5000F00C  5800D338  5000D418
5000D41C  5860D338  58B0C034  58A0C054  5890C004  5880C02C  5870C030
5830D41C  5C20D35C  5030C0F4  5963B00C  C2D3C4D4  F0F1F0F6*
02E3E7E3  40006804  40400038  40400001  4780C9DA  58F0C098  4110D220
05EF41E0  000415FE  4720C5F2  58EFD0A4  07FE5800  D3D85900  D42C4750
C60A5800  D3DC5900  D3504770  C63058F0  C2D3C4D4  F0F1F0F7*
02E3E7E3  4000683C  40400038  40400001  C0BC1800  45E0F004  00000006
00000156  45E0F008  0450D3D8  45E0F008  0450D3DC  45E0F010  5800D3D8
5900D42C  4750C648  5800D3DC  5900D350  C2D3C4D4  F0F1F0F8*
02E3E7E3  40006874  40400038  40400001  4770C652  58F0C0C4  4110D228
05EF5800  D3D85900  D42C4750  C66A5800  D3DC5900  D3504770  C67458F0
C0A44110  D21005EF  5060D3F0  5060D428  C2D3C4D4  F0F1F0F9*
02E3E7E3  400068AC  40400038  40400001  58E0C0F4  410EB004  5000D240
410EB008  5000D244  9280D244  58F0C084  4110D230  05EF58F0  C0801B11
05EF41E0  000415FE  4720C6B6  58EFD0AC  C2D3C4D4  F0F1F1F0**
02E3E7E3  400068E4  40400038  40400001  07FE5820  A00C5020  D4581842
1A468940  00035830  A00C1A36  89300004  4104A008  5000D26C  58F0C058
4103F004  5000D270  58F0C068  4110D248  C2D3C4D4  F0F1F1F1*
02E3E7E3  4000691C  40400038  40400001  05EF1322  5A20A00C  5020D40C
5800D328  5000D3E4  5800D444  120047C0  C7125800  D3345000  D3E458F0
C05C4110  D27C05EF  58F0C0A8  4110D294  C2D3C4D4  F0F1F1F2*
02E3E7E3  40006954  40400038  40400001  05EF5800  D4441200  47C0C73C
5800D334  58F0C018  5000F000  5800D444  120047C0  C7525820  D4448920
00025062  91F05820  D4581A26  5020C0F8  C2D3C4D4  F0F1F1F3*
02E3E7E3  4000698C  40400038  40400001  40209016  5800D40C  40009018
5800D418  12004780  C7B65820  D4188920  00025880  D34418B2  5870C00C
58389028  10335C20  D38C4103  70545000  C2D3C4D4  F0F1F1F4*
02E3E7E3  400069C4  40400038  40400001  D2CC4100  90165000  D2D09280
D2D058F0  C0784110  D2C805EF  5A80D344  198B47C0  C7845870  C0305880
C02C58B0  C0345800  D4181200  4780C8FE  C2D3C4D4  F0F1F1F5*
02E3E7E3  400069FC  40400038  40400001  58F0C014  5800F010  12004780
C8FE58F0  C0185800  F0001BFF  860FC8FE  5800C0F8  89000003  5000C0E8
5800D418  89000002  5000C0E4  5800D368  C2D3C4D4  F0F1F1F6*

MEMBER NAME  BLDMFG
02E3E7E3  40006A34  40400038  40400001  5000C0EC  5870D344  18BA58A0
```

| | | | | | | |
|---|---|---|---|---|---|---|
| C0145880 | C04858E0 | C0EC782E | A0087020 | 9204782E | A00C7020 | 920858E0 |
| C0E8410E | B0085000 | D2E058F0 | C0D44110 | C2D3C4D4 | F0F1F1F7* | |
| 02E3E7E3 | 40006A6C | 40400038 | 40400001 | D2D405EF | 5800D3EC | 5900D33C |
| 4770C8D6 | 188718A7 | 58B0C0E4 | 5870C00C | 58289028 | 10221852 | 5C40D38C |
| 2B007805 | 70086A00 | D3186000 | D3085830 | C2D3C4D4 | F0F1F1F8* | |
| 02E3E7E3 | 40006AA4 | 40400038 | 40400001 | D30C5030 | 920C5060 | 92102B00 |
| 7805700C | 6A00D318 | 6000D308 | 5830D30C | 50309214 | 50209218 | 58F0C074 |
| 4110D2EC | 05EF5800 | D3D01200 | 4780C8D2 | C2D3C4D4 | F0F1F1F9* | |
| 02E3E7E3 | 40006ADC | 40400038 | 40400001 | 5860C034 | 5880C024 | 5890C01C |
| 58A0C010 | 58B0C004 | 5870D3C0 | 58F0C0BC | 45E0F034 | 05404040 | F2F5878A |
| C8585880 | C04858A0 | C01458B0 | C0545870 | C2D3C4D4 | F0F1F2F0** | |
| 02E3E7E3 | 40006B14 | 40400038 | 40400001 | D3445A60 | D3385800 | C0EC5A00 |
| D3685000 | C0EC5960 | A01047C0 | C8165870 | C0305880 | C02C58A0 | C05458B0 |
| C0345860 | D3385800 | D4181200 | 4780C9A8 | C2D3C4D4 | F0F1F2F1* | |
| 02E3E7E3 | 40006B4C | 40400038 | 40400001 | 5800D444 | 5700D324 | 5000D314 |
| 6800D310 | 6B00D320 | 7000C0F0 | 5820D418 | 89200002 | 5850D444 | 5890D344 |
| 58A0D344 | 18B27840 | D4107860 | D3E05880 | C2D3C4D4 | F0F1F2F2* | |
| 02E3E7E3 | 40006B84 | 40400038 | 40400001 | C0045870 | C00C5860 | C0445839 |
| 80281033 | 5C20D38C | 5030C0E0 | 580065E0 | 5700D324 | 5000D314 | 6820D310 |
| 6B20D320 | 30227023 | 70387800 | C0F07003 | C2D3C4D4 | F0F1F2F3* | |
| 02E3E7E3 | 40006BBC | 40400038 | 40400001 | 703C1255 | 4770C9A4 | 70637014 |
| 70437028 | 7800D414 | 7003702C | 879AC95E | 5870C030 | 5880C02C | 5890C004 |
| 58A0C054 | 58B0C034 | 5860D338 | 58F0C0B0 | C2D3C4D4 | F0F1F2F4* | |
| 02E3E7E3 | 40006BF4 | 40400038 | 40400001 | 4110D180 | 05EF41E0 | 000415FE |
| 4720C9DA | 58EFD0B4 | 07FE5820 | D41C1A26 | 5020D41C | 5920B00C | 47C0C5C4 |
| 5860C034 | 5880C024 | 5890C01C | 58A0C010 | C2D3C4D4 | F0F1F2F5* | |
| 02E3E7E3 | 40006C2C | 40400038 | 40400001 | 58B0C004 | 5870D3C0 | 58F0C018 |
| 5800F000 | 8707CB90 | 5800B1F4 | 5900D338 | 4770CA70 | 5850A045 | 5A50D338 |
| 5050A045 | 5950D424 | 47A0CB90 | 58F0C0BC | C2D3C4D4 | F0F1F2F6* | |
| 02E3E7E3 | 40006C64 | 40400038 | 40400001 | 45E0F004 | 00000000 | 00000069 |
| 45E0F010 | 58F0C0BC | 45E0F000 | 00000000 | 00000094 | 5C40D384 | 45E0F134 |
| 00010000 | 0125A001 | 01000048 | 00000001 | C2D3C4D4 | F0F1F2F7* | |
| 02E3E7E3 | 40006C9C | 40400038 | 40400001 | 45E0F010 | 5800B1F8 | 5900D338 |
| 4770CAD0 | 5850A045 | 5A50D338 | 5050A045 | 5950D424 | 47A0CB90 | 58F0C0BC |
| 45E0F004 | 00000000 | 0000009A | 45E0F010 | C2D3C4D4 | F0F1F2F8* | |
| 02E3E7E3 | 40006CD4 | 40400038 | 40400001 | 58F0C0BC | 45E0F000 | 00000000 |
| 00000094 | 5C40D384 | 45E0F134 | 00010000 | 0125A001 | 01000048 | 00000001 |
| 45E0F010 | 5800B1FC | 5900D338 | 4770CB30 | C2D3C4D4 | F0F1F2F9* | |
| 02E3E7E3 | 40006D0C | 40400024 | 40400001 | 5850A045 | 5A50D338 | 5050A045 |
| 5950D424 | 47A0CB90 | 58F0C0BC | 45E0F004 | 00000000 | 000000BF | 40404040 |
| 40404040 | 40404040 | 40404040 | 40404040 | C2D3C4D4 | F0F1F3F0** | |
| 02D9D3C4 | 40404040 | 40400038 | 40404040 | 00010001 | 0C0066B0 | 00010001 |
| 0C0066E4 | 00010001 | 0C006848 | 00010001 | 0C006C6C | 00010001 | 0C006C80 |
| 00010001 | 0C006CCC | 00010001 | 0C006CE0 | C2D3C4D4 | F0F1F3F1* | |
| 02E3E7E3 | 40006D30 | 40400038 | 40400001 | 45E0F010 | 58F0C0BC | 45E0F000 |
| 00000000 | 00000094 | 5C40D384 | 45E0F134 | 00010000 | 0125A001 | 01000048 |
| 00000001 | 45E0F010 | 5800B200 | 5900D338 | C2D3C4D4 | F0F1F3F2* | |
| 02E3E7E3 | 40006D68 | 40400038 | 40400001 | 4770CB90 | 5850A045 | 5A50D338 |
| 5050A045 | 5950D424 | 47A0CB90 | 58F0C0BC | 45E0F004 | 00000000 | 000000E1 |
| 45E0F010 | 58F0C0BC | 45E0F000 | 00000000 | C2D3C4D4 | F0F1F3F3* | |
| 02E3E7E3 | 40006DA0 | 40400038 | 40400001 | 00000094 | 5C40D384 | 45E0F134 |
| 00010000 | 0125A001 | 01000048 | 00000001 | 45E0F010 | 58F0C0C4 | 4110D228 |
| 05EF5800 | D3385000 | D45458F0 | C0405800 | C2D3C4D4 | F0F1F3F4* | |
| 02E3E7E3 | 40006DD8 | 40400038 | 40400001 | F0088607 | CBB858F0 | C0904110 |
| D2F805EF | 5800D454 | 5900D338 | 4770CBCC | 1BFF58E0 | D00007FE | 58F0C0BC |
| 45E0F004 | 00000006 | 00000102 | 45E0F008 | C2D3C4D4 | F0F1F3F5* | |
| 02E3E7E3 | 40006E10 | 40400038 | 40400001 | 0450D454 | 45E0F010 | 58F0C0BC |

MEMBER NAME BLDMFG

| | | | | | | |
|---|---|---|---|---|---|---|
| 45E0F034 | 05404040 | F1F15860 | C0345880 | C0245890 | C01C58A0 | C01058B0 |
| C0045870 | D3C058F0 | C0BC1800 | 45E0F004 | C2D3C4D4 | F0F1F3F6* | |
| 02E3E7E3 | 40006E48 | 40400034 | 40400001 | 00000006 | 00000123 | 45E0F010 |
| 58F0C0BC | 45E0F034 | 05404040 | F1F558D0 | D00458E0 | D00C92FF | D00C982C |
| D01C07FE | 58C0D048 | 47F0C104 | 40404040 | C2D3C4D4 | F0F1F3F7* | |
| 02E3E7E3 | 40000020 | 40400008 | 40400001 | 00006E74 | 000001A0 | 40404040 |
| 40404040 | 40404040 | 40404040 | 40404040 | 40404040 | 40404040 | 40404040 |
| 40404040 | 40404040 | 40404040 | 40404040 | C2D3C4D4 | F0F1F3F8* | |
| 02D9D3C4 | 40404040 | 40400038 | 40404040 | 00010001 | 0C006D2C | 00010001 |
| 0C006D40 | 00010001 | 0C006D8C | 00010001 | 0C006DA0 | 00010001 | 0C006E08 |
| 00010001 | 0C006E4C | 00010001 | 0C000020 | C2D3C4D4 | F0F1F3F9* | |
| 02E3E7E3 | 400001A0 | 40400004 | 40400001 | 00006E62 | 40404040 | 40404040 |
| 40404040 | 40404040 | 40404040 | 40404040 | 40404040 | 40404040 | 40404040 |
| 40404040 | 40404040 | 40404040 | 40404040 | C2D3C4D4 | F0F1F4F0** | |
| 02E3E7E3 | 400001E8 | 40400018 | 40400001 | 00006230 | 00006438 | 00006438 |
| 0000646A | 000064A0 | 00006508 | 40404040 | 40404040 | 40404040 | 40404040 |
| 40404040 | 40404040 | 40404040 | 40404040 | C2D3C4D4 | F0F1F4F1* | |
| 02D9D3C4 | 40404040 | 40400038 | 40404040 | 00010001 | 0C000024 | 00010001 |
| 0C0001A0 | 00010001 | 0C0001E8 | 00010001 | 0C0001EC | 00010001 | 0C0001F0 |
| 00010001 | 0C0001F4 | 00010001 | 0C0001F8 | C2D3C4D4 | F0F1F4F2* | |
| 02E3E7E3 | 40000200 | 4040001C | 40400001 | 00006544 | 0000652A | 00006544 |
| 00006544 | 00006544 | 0000657E | 000065BC | 40404040 | 40404040 | 40404040 |
| 40404040 | 40404040 | 40404040 | 40404040 | C2D3C4D4 | F0F1F4F3* | |
| 02D9D3C4 | 40404040 | 40400038 | 40404040 | 00010001 | 0C0001FC | 00010001 |
| 0C000200 | 00010001 | 0C000204 | 00010001 | 0C000208 | 00010001 | 0C00020C |
| 00010001 | 0C000210 | 00010001 | 0C000214 | C2D3C4D4 | F0F1F4F4* | |
| 02E3E7E3 | 4000021C | 4040001C | 40400001 | 000065A2 | 000065BC | 000065BC |
| 000065BC | 00006604 | 00006604 | 00006628 | 40404040 | 40404040 | 40404040 |
| 40404040 | 40404040 | 40404040 | 40404040 | C2D3C4D4 | F0F1F4F5* | |
| 02D9D3C4 | 40404040 | 40400038 | 40404040 | 00010001 | 0C000218 | 00010001 |
| 0C00021C | 00010001 | 0C000220 | 00010001 | 0C000224 | 00010001 | 0C000228 |
| 00010001 | 0C00022C | 00010001 | 0C000230 | C2D3C4D4 | F0F1F4F6* | |
| 02E3E7E3 | 40000238 | 4040001C | 40400001 | 00006628 | 0000664C | 0000664C |
| 00006822 | 00006E26 | 000068E6 | 00006E26 | 40404040 | 40404040 | 40404040 |
| 40404040 | 40404040 | 40404040 | 40404040 | C2D3C4D4 | F0F1F4F7* | |
| 02D9D3C4 | 40404040 | 40400038 | 40404040 | 00010001 | 0C000234 | 00010001 |
| 0C000238 | 00010001 | 0C00023C | 00010001 | 0C000240 | 00010001 | 0C000244 |
| 00010001 | 0C000248 | 00010001 | 0C00024C | C2D3C4D4 | F0F1F4F8* | |
| 02E3E7E3 | 40000254 | 40400014 | 40400001 | 00006C0A | 00006E26 | 80005F34 |
| 80005F2C | 000004EC | 40404040 | 40404040 | 40404040 | 40404040 | 40404040 |
| 40404040 | 40404040 | 40404040 | 40404040 | C2D3C4D4 | F0F1F4F9* | |
| 02E3E7E3 | 4000026C | 40400008 | 40400001 | 80000000 | 000004E4 | 40404040 |
| 40404040 | 40404040 | 40404040 | 40404040 | 40404040 | 40404040 | 40404040 |
| 40404040 | 40404040 | 40404040 | 40404040 | C2D3C4D4 | F0F1F5F0** | |
| 02E3E7E3 | 40000278 | 40400004 | 40400001 | 80000014 | 40404040 | 40404040 |
| 40404040 | 40404040 | 40404040 | 40404040 | 40404040 | 40404040 | 40404040 |
| 40404040 | 40404040 | 40404040 | 40404040 | C2D3C4D4 | F0F1F5F1* | |
| 02D9D3C4 | 40404040 | 40400038 | 40404040 | 00010001 | 0C000250 | 00010001 |
| 0C000254 | 00010001 | 0C000258 | 00010001 | 0C00025C | 00010001 | 0C000260 |
| 00010001 | 0C000264 | 00010001 | 0C000270 | C2D3C4D4 | F0F1F5F2* | |
| 02E3E7E3 | 4000027C | 4040001C | 40400001 | 000004DC | 000005A0 | 00000000 |
| 000007D4 | 000005C0 | 000005F0 | 000005FC | 40404040 | 40404040 | 40404040 |
| 40404040 | 40404040 | 40404040 | 40404040 | C2D3C4D4 | F0F1F5F3* | |
| 02D9D3C4 | 40404040 | 40400038 | 40404040 | 000B0001 | 0C000278 | 00010001 |
| 0C00027C | 00010001 | 0C000280 | 000F0001 | 0C000284 | 000F0001 | 0C000288 |
| 00010001 | 0C00028C | 00010001 | 0C000290 | C2D3C4D4 | F0F1F5F4* | |
| 02E3E7E3 | 40000298 | 4040001C | 40400001 | 80005F11 | 000004E4 | 00000588 |
| 80000000 | 000004EC | 000060FC | 80000004 | 40404040 | 40404040 | 40404040 |

MEMBER NAME BLDMFG 40404040 40404040 40404040 40404040 C2D3C4D4 F0F1F5F5*
02D9D3C4 40404040 40400038 40404040 00010001 0C000294 00010001
0C000298 00010001 0C00029C 00010001 0C0002A0 000C0001 0C0002A4
00010001 0C0002A8 00010001 0C0002AC C2D3C4D4 F0F1F5F6*
02E3E7E3 400002B4 4040001C 40400001 00005F11 000060FC 80000588
00000538 80000538 00006190 8000053C 40404040 40404040 40404040
40404040 40404040 40404040 40404040 C2D3C4D4 F0F1F5F7*
02D9D3C4 40404040 40400038 40404040 000C0001 0C0002B0 00010001
0C0002B4 00010001 0C0002B8 00010001 0C0002BC 00010001 0C0002C0
00010001 0C0002C4 00010001 0C0002C8 C2D3C4D4 F0F1F5F8*
02E3E7E3 400002D0 4040001C 40400001 0000632C 00000558 000004CC
000005A4 00000548 00000544 00006190 40404040 40404040 40404040
40404040 40404040 40404040 40404040 C2D3C4D4 F0F1F5F9*
02D9D3C4 40404040 40400038 40404040 00010001 0C0002CC 00010001
0C0002D0 00010001 0C0002D4 00010001 0C0002D8 00010001 0C0002DC
00010001 0C0002E0 00010001 0C0002E4 C2D3C4D4 F0F1F6F0**
02E3E7E3 400002EC 4040001C 40400001 000004CC 000004CC 000004CC
000004CC 000004D8 000004E0 000004CC 40404040 40404040 40404040
40404040 40404040 40404040 40404040 C2D3C4D4 F0F1F6F1*
02D9D3C4 40404040 40400038 40404040 00010001 0C0002E8 00010001
0C0002EC 00010001 0C0002F0 00010001 0C0002F4 00010001 0C0002F8
00010001 0C0002FC 00010001 0C000300 C2D3C4D4 F0F1F6F2*
02E3E7E3 40000308 4040001C 40400001 000004CC 00000548 0000054C
800004CC 000026D1 800005EC 000004D0 40404040 40404040 40404040
40404040 40404040 40404040 40404040 C2D3C4D4 F0F1F6F3*
02D9D3C4 40404040 40400038 40404040 00010001 0C000304 00010001
0C000308 00010001 0C00030C 00010001 0C000310 00010001 0C000314
00010001 0C000318 00010001 0C00031C C2D3C4D4 F0F1F6F4*
02E3E7E3 40000324 4040001C 40400001 000004D0 000004D0 000004D0
800005DC 0000612C 00006134 000005DC 40404040 40404040 40404040
40404040 40404040 40404040 40404040 C2D3C4D4 F0F1F6F5*
02D9D3C4 40404040 40400038 40404040 00010001 0C000320 00010001
0C000324 00010001 0C000328 00010001 0C00032C 00010001 0C000330
00010001 0C000334 00010001 0C000338 C2D3C4D4 F0F1F6F6*
02E3E7E3 40000340 4040001C 40400001 80000550 00000004 00000000
00000004 80000000 00000004 00000000 40404040 40404040 40404040
40404040 40404040 40404040 40404040 C2D3C4D4 F0F1F6F7*
02D9D3C4 40404040 40400038 40404040 00010001 0C00033C 00010001
0C000340 00070001 0C000344 00070001 0C000348 00080001 0C00034C
00080001 0C000350 00070001 0C000354 C2D3C4D4 F0F1F6F8*
02E3E7E3 4000035C 4040001C 40400001 00000004 00000000 8000EA64
00000004 00000000 80000598 000004DC 40404040 40404040 40404040
40404040 40404040 40404040 40404040 C2D3C4D4 F0F1F6F9*
02D9D3C4 40404040 40400038 40404040 00070001 0C000358 00080001
0C00035C 00080001 0C000360 00080001 0C000364 00080001 0C000368
00080001 0C00036C 00010001 0C000370 C2D3C4D4 F0F1F7F0**
02E3E7E3 40000378 40400018 40400001 000005F4 800005E0 00000004
80000000 000060CC 000004E0 40404040 40404040 40404040 40404040
40404040 40404040 40404040 40404040 C2D3C4D4 F0F1F7F1*
02E3E7E3 40000394 40400004 40400001 00000520 40404040 40404040
40404040 40404040 40404040 40404040 40404040 40404040 40404040
40404040 40404040 40404040 40404040 C2D3C4D4 F0F1F7F2*
02D9D3C4 40404040 40400038 40404040 00010001 0C000374 00010001
0C000378 00010001 0C00037C 00080001 0C000380 00080001 0C000384
00010001 0C000388 00010001 0C00038C C2D3C4D4 F0F1F7F3*
02E3E7E3 40000398 40400004 40400001 800005A0 40404040 40404040
40404040 40404040 40404040 40404040 40404040 40404040 40404040
40404040 40404040 40404040 40404040 C2D3C4D4 F0F1F7F4*

MEMBER NAME BLDMFG

| | | | | | | |
|---|---|---|---|---|---|---|
| 02E3E7E3 | 400003A0 | 40400018 | 40400001 | 000005A0 | 000005E8 | 00000004 |
| 80000000 | 8000059C | 00006160 | 40404040 | 40404040 | 40404040 | 40404040 |
| 40404040 | 40404040 | 40404040 | 40404040 | C2D3C4D4 | F0F1F7F5* | |
| 02D9D3C4 | 40404040 | 40400038 | 40404040 | 00010001 | 0C000394 | 00010001 |
| 0C000398 | 00010001 | 0C0003A0 | 00010001 | 0C0003A4 | 000A0001 | 0C0003A8 |
| 000A0001 | 0C0003AC | 00010001 | 0C0003B0 | C2D3C4D4 | F0F1F7F6* | |
| 02E3E7E3 | 400003B8 | 4040001C | 40400001 | 00006140 | 80000570 | 00000578 |
| 8000057C | 000005FE | 800005D8 | 00000000 | 40404040 | 40404040 | 40404040 |
| 40404040 | 40404040 | 40404040 | 40404040 | C2D3C4D4 | F0F1F7F7* | |
| 02D9D3C4 | 40404040 | 40400038 | 40404040 | 00010001 | 0C0003B4 | 00010001 |
| 0C0003B8 | 00010001 | 0C0003BC | 00010001 | 0C0003C0 | 00010001 | 0C0003C4 |
| 00010001 | 0C0003C8 | 00010001 | 0C0003CC | C2D3C4D4 | F0F1F7F8* | |
| 02E3E7E3 | 400003D4 | 4040000C | 40400001 | 00000590 | 00014820 | 000005C8 |
| 40404040 | 40404040 | 40404040 | 40404040 | 40404040 | 40404040 | 40404040 |
| 40404040 | 40404040 | 40404040 | 40404040 | C2D3C4D4 | F0F1F7F9* | |
| 02E3E7E3 | 400003E4 | 40400014 | 40400001 | 80000000 | 00000000 | 00000590 |
| 00014820 | 000005C8 | 40404040 | 40404040 | 40404040 | 40404040 | 40404040 |
| 40404040 | 40404040 | 40404040 | 40404040 | C2D3C4D4 | F0F1F8F0** | |
| 02D9D3C4 | 40404040 | 40400038 | 40404040 | 00090001 | 0C0003D0 | 00010001 |
| 0C0003D4 | 00090001 | 0C0003D8 | 00010001 | 0C0003DC | 00090001 | 0C0003E8 |
| 00010001 | 0C0003EC | 00090001 | 0C0003F0 | C2D3C4D4 | F0F1F8F1* | |
| 02E3E7E3 | 400003F8 | 40400014 | 40400001 | 00000580 | 000005B0 | 000005B4 |
| 00000000 | 001082A0 | 40404040 | 40404040 | 40404040 | 40404040 | 40404040 |
| 40404040 | 40404040 | 40404040 | 40404040 | C2D3C4D4 | F0F1F8F2* | |
| 02E3E7E3 | 40000414 | 40400008 | 40400001 | 001082A4 | 800005E4 | 40404040 |
| 40404040 | 40404040 | 40404040 | 40404040 | 40404040 | 40404040 | 40404040 |
| 40404040 | 40404040 | 40404040 | 40404040 | C2D3C4D4 | F0F1F8F3* | |
| 02D9D3C4 | 40404040 | 40400038 | 40404040 | 00010001 | 0C0003F4 | 00010001 |
| 0C0003F8 | 00010001 | 0C0003FC | 00010001 | 0C000400 | 000F0001 | 0C000404 |
| 000F0001 | 0C000408 | 000F0001 | 0C000414 | C2D3C4D4 | F0F1F8F4* | |
| 02E3E7E3 | 4000041C | 4040001C | 40400001 | 00000000 | 00000590 | 00014820 |
| 000005C8 | 000005D0 | 80000584 | 00000004 | 40404040 | 40404040 | 40404040 |
| 40404040 | 40404040 | 40404040 | 40404040 | C2D3C4D4 | F0F1F8F5* | |
| 02D9D3C4 | 40404040 | 40400038 | 40404040 | 00010001 | 0C000418 | 00090001 |
| 0C00041C | 00010001 | 0C000420 | 00090001 | 0C000424 | 00010001 | 0C000428 |
| 00010001 | 0C00042C | 00010001 | 0C000430 | C2D3C4D4 | F0F1F8F6* | |
| 02E3E7E3 | 40000438 | 4040001C | 40400001 | 00000000 | 00000004 | 00000000 |
| 00000004 | 00000000 | 000005FE | 000005D8 | 40404040 | 40404040 | 40404040 |
| 40404040 | 40404040 | 40404040 | 40404040 | C2D3C4D4 | F0F1F8F7* | |
| 02D9D3C4 | 40404040 | 40400038 | 40404040 | 00070001 | 0C000434 | 00070001 |
| 0C000438 | 00030001 | 0C00043C | 00030001 | 0C000440 | 000A0001 | 0C000444 |
| 000A0001 | 0C000448 | 00010001 | 0C00044C | C2D3C4D4 | F0F1F8F8* | |
| 02E3E7E3 | 40000454 | 40400018 | 40400001 | 000005E4 | 0000059C | 000005BC |
| 00005F3C | 800005B8 | 000004E4 | 40404040 | 40404040 | 40404040 | 40404040 |
| 40404040 | 40404040 | 40404040 | 40404040 | C2D3C4D4 | F0F1F8F9* | |
| 02E3E7E3 | 40000470 | 40400008 | 40400001 | 80000000 | 00006114 | 40404040 |
| 40404040 | 40404040 | 40404040 | 40404040 | 40404040 | 40404040 | 40404040 |
| 40404040 | 40404040 | 40404040 | 40404040 | C2D3C4D4 | F0F1F9F0** | |
| 02D9D3C4 | 40404040 | 40400038 | 40404040 | 00010001 | 0C000450 | 00010001 |
| 0C000454 | 00010001 | 0C000458 | 00010001 | 0C00045C | 00010001 | 0C000460 |
| 00010001 | 0C000464 | 00010001 | 0C000468 | C2D3C4D4 | F0F1F9F1* | |
| 02E3E7E3 | 40000478 | 40400008 | 40400001 | 00000000 | 001082A0 | 40404040 |
| 40404040 | 40404040 | 40404040 | 40404040 | 40404040 | 40404040 | 40404040 |
| 40404040 | 40404040 | 40404040 | 40404040 | C2D3C4D4 | F0F1F9F2* | |
| 02E3E7E3 | 40000484 | 40400014 | 40400001 | 000005AC | 8000058C | 0000611C |
| 00000508 | 80000570 | 40404040 | 40404040 | 40404040 | 40404040 | 40404040 |
| 40404040 | 40404040 | 40404040 | 40404040 | C2D3C4D4 | F0F1F9F3* | |

| | | | | | | |
|---|---|---|---|---|---|---|
| 02D9D3C4 | 40404040 | 40400038 | 40404040 | 00010001 | 0C000474 | 000F0001 |

MEMBER NAME BLDMFG

| | | | | | | |
|---|---|---|---|---|---|---|
| 0C000478 | 000F0001 | 0C00047C | 00010001 | 0C000484 | 00010001 | 0C000488 |
| 00010001 | 0C00048C | 00010001 | 0C000490 | C2D3C4D4 | F0F1F9F4* | |
| 02E3E7E3 | 40000498 | 4040000C | 40400001 | 000004DC | 000005F4 | 80000594 |
| 40404040 | 40404040 | 40404040 | 40404040 | 40404040 | 40404040 | 40404040 |
| 40404040 | 40404040 | 40404040 | 40404040 | C2D3C4D4 | F0F1F9F5* | |
| 02E3E7E3 | 40006310 | 40400024 | 40400001 | 00000000 | 00000000 | 00000000 |
| 00000000 | 00000000 | 00000000 | 00000000 | 00000000 | 00000000 | 40404040 |
| 40404040 | 40404040 | 40404040 | 40404040 | C2D3C4D4 | F0F1F9F6* | |
| 02D9D3C4 | 40404040 | 40400020 | 40404040 | 00010001 | 0C000494 | 00010001 |
| 0C000498 | 00010001 | 0C00049C | 00010001 | 0C0004A0 | 40404040 | 40404040 |
| 40404040 | 40404040 | 40404040 | 40404040 | C2D3C4D4 | F0F1F9F7* | |
| 02C5D5C4 | 40404040 | 40404040 | 40404040 | 40404040 | 40404040 | 40404040 |
| 00006E7C | F1F5F7F3 | F460C6D6 | F34040F0 | F2F0F2F8 | F7F0F9F8 | 40F0F84B |
| F1F24BF1 | F3404040 | C2D3C4D4 | C6C74040 | C2D3C4D4 | F0F1F9F8** | |

MEMBER NAME BLDSEQ

| | | | | | | |
|---|---|---|---|---|---|---|
| 02C5E2C4 | 40404040 | 40400010 | 40400001 | C2D3C4E2 | C5D84040 | 00000000 |
| 40000000 | 40404040 | 40404040 | 40404040 | 40404040 | 40404040 | 40404040 |
| 40404040 | 40404040 | 40404040 | 40404040 | C2D3C4E2 | F0F0F0F1* | |
| 02E3E7E3 | 40000000 | 40400038 | 40400001 | 47F0F00C | 07C2D3C4 | E2C5D840 |
| 90ECD00C | 184D98CD | F0205040 | D00450D0 | 400807FC | 40404040 | 40404040 |
| 021A01D3 | 10040408 | 1A025BD7 | 10011A03 | C2D3C4E2 | F0F0F0F2* | |
| 02E3E7E3 | 40000038 | 4040000E | 40400001 | 407E400A | 06021C22 | 02066414 |
| 01224040 | 40404040 | 40404040 | 40404040 | 40404040 | 40404040 | 40404040 |
| 40404040 | 40404040 | 40404040 | 40404040 | C2D3C4E2 | F0F0F0F3* | |
| 02E3E7E3 | 400001B0 | 40400038 | 40400001 | 00000000 | 00000000 | 4F080000 |
| 00000000 | 00000000 | 00000000 | 00000000 | 00000001 | 00000001 | 00000002 |
| 00000003 | 00000004 | 00000005 | 00000006 | C2D3C4E2 | F0F0F0F4* | |
| 02E3E7E3 | 400001E8 | 40400038 | 40400001 | 00000007 | 00000008 | 0000000A |
| 0000000B | 0000000C | 00000010 | 00000011 | 00000016 | 0000001D | 00000029 |
| 0000002C | 00000035 | 00000038 | 00000041 | C2D3C4E2 | F0F0F0F5* | |
| 02C5E2C4 | 40404040 | 40400010 | 40400002 | C5D3D4E3 | C2D34040 | 05000000 |
| 400D7D28 | 40404040 | 40404040 | 40404040 | 40404040 | 40404040 | 40404040 |
| 40404040 | 40404040 | 40404040 | 40404040 | C2D3C4E2 | F0F0F0F6* | |
| 02E3E7E3 | 40000220 | 40400024 | 40400001 | 0000004D | 00000059 | 00000065 |
| 40122D0E | 4019999A | 402624DD | 41100000 | 00000000 | 00000000 | 40404040 |
| 40404040 | 40404040 | 40404040 | 40404040 | C2D3C4E2 | F0F0F0F7* | |
| 02C5E2C4 | 40404040 | 40400010 | 40400003 | C9D7D5E3 | D9404040 | 05000000 |
| 4000EA68 | 40404040 | 40404040 | 40404040 | 40404040 | 40404040 | 40404040 |
| 40404040 | 40404040 | 40404040 | 40404040 | C2D3C4E2 | F0F0F0F8* | |
| 02C5E2C4 | 40404040 | 40400010 | 40400004 | C4C5E3C1 | C2D34040 | 05000000 |
| 40015950 | 40404040 | 40404040 | 40404040 | 40404040 | 40404040 | 40404040 |
| 40404040 | 40404040 | 40404040 | 40404040 | C2D3C4E2 | F0F0F0F9* | |
| 02C5E2C4 | 40404040 | 40400010 | 40400005 | C9C4E4D7 | C5404040 | 05000000 |
| 40008CA4 | 40404040 | 40404040 | 40404040 | 40404040 | 40404040 | 40404040 |
| 40404040 | 40404040 | 40404040 | 40404040 | C2D3C4E2 | F0F0F1F0** | |
| 02C5E2C4 | 40404040 | 40400010 | 40400006 | C3C4E3C3 | D6D44040 | 05000000 |
| 4000008C | 40404040 | 40404040 | 40404040 | 40404040 | 40404040 | 40404040 |
| 40404040 | 40404040 | 40404040 | 40404040 | C2D3C4E2 | F0F0F1F1* | |
| 02E3E7E3 | 400003A0 | 40400020 | 40400001 | FFFFFFC8 | 000CD118 | FFFFFFF4 |
| 0000EA64 | FFFFFFC4 | 000147F0 | FFFFFFF4 | 00000000 | 40404040 | 40404040 |
| 40404040 | 40404040 | 40404040 | 40404040 | C2D3C4E2 | F0F0F1F2* | |
| 02D9D3C4 | 40404040 | 40400038 | 40404040 | 00020001 | 0C0003A0 | 00020001 |
| 0C0003A4 | 00030001 | 0C0003A8 | 00030001 | 0C0003AC | 00040001 | 0C0003B0 |
| 00040001 | 0C0003B4 | 00050001 | 0C0003B8 | C2D3C4E2 | F0F0F1F3* | |
| 02C5E2C4 | 40404040 | 40400010 | 40400007 | E5F9F940 | 40404040 | 05000000 |

```
                                                                          PAGE 0035
4000003C  40404040  40404040  40404040  40404040  40404040  40404040
40404040  40404040  40404040  40404040  C2D3C4E2  F0F0F1F4*
02C5E2C4  40404040  40400010  40400008  C2D3C4C5  E3404040  02000000
40000000  40404040  40404040  40404040  40404040  40404040  40404040
40404040  40404040  40404040  40404040  C2D3C4E2  F0F0F1F5*
02C5E2C4  40404040  40400010  40400009  C3C1C4D3  E3404040  02000000
40000000  40404040  40404040  40404040  40404040  40404040  40404040
40404040  40404040  40404040  40404040  C2D3C4E2  F0F0F1F6*
02C5E2C4  40404040  40400010  4040000A  C4C5D9D6  E3404040  02000000
40000000  40404040  40404040  40404040  40404040  40404040  40404040
40404040  40404040  40404040  40404040  C2D3C4E2  F0F0F1F7*
02C5E2C4  40404040  40400010  4040000B  C4C9E3E3  D6404040  02000000
40000000  40404040  40404040  40404040  40404040  40404040  40404040
40404040  40404040  40404040  40404040  C2D3C4E2  F0F0F1F8*
02C5E2C4  40404040  40400010  4040000C  D4E5C3C8  D9404040  02000000
40000000  40404040  40404040  40404040  40404040  40404040  40404040
40404040  40404040  40404040  40404040  C2D3C4E2  F0F0F1F9*
02C5E2C4  40404040  40400010  4040000D  C2C5C7C4  C5E34040  02000000

MEMBER NAME  BLDSEQ
40000000  40404040  40404040  40404040  40404040  40404040  40404040
40404040  40404040  40404040  40404040  C2D3C4E2  F0F0F2F0**
02E3E7E3  400003C0  4040001C  40400001  FFFFFFFC  00000000  00000000
00000000  00000000  00000000  00000000  40404040  40404040  40404040
40404040  40404040  40404040  40404040  C2D3C4E2  F0F0F2F1*
02E3E7E3  400003E0  40400004  40400001  00000000  40404040  40404040
40404040  40404040  40404040  40404040  40404040  40404040  40404040
40404040  40404040  40404040  40404040  C2D3C4E2  F0F0F2F2*
02D9D3C4  40404040  40400038  40404040  00060001  0C0003BC  00070001
0C0003C0  00080001  1C0003C4  00090001  1C0003C8  000A0001  1C0003CC
000B0001  1C0003D0  000C0001  1C0003D4  C2D3C4E2  F0F0F2F3*
02C5E2C4  40404040  40400010  4040000E  C2D3C4C4  D9E54040  02000000
40000000  40404040  40404040  40404040  40404040  40404040  40404040
40404040  40404040  40404040  40404040  C2D3C4E2  F0F0F2F4*
02C5E2C4  40404040  40400010  4040000F  C3C1C4E2  E4D74040  02000000
40000000  40404040  40404040  40404040  40404040  40404040  40404040
40404040  40404040  40404040  40404040  C2D3C4E2  F0F0F2F5*
02C5E2C4  40404040  40400010  40400010  C5D5C4C4  C5E34040  02000000
40000000  40404040  40404040  40404040  40404040  40404040  40404040
40404040  40404040  40404040  40404040  C2D3C4E2  F0F0F2F6*
02C5E2C4  40404040  40400010  40400011  C9C2C3D6  D47B4040  02000000
40000000  40404040  40404040  40404040  40404040  40404040  40404040
40404040  40404040  40404040  40404040  C2D3C4E2  F0F0F2F7*
02C5E2C4  40404040  40400010  40400012  E2E3D4D6  C4D34040  02000000
40000000  40404040  40404040  40404040  40404040  40404040  40404040
40404040  40404040  40404040  40404040  C2D3C4E2  F0F0F2F8*
02E3E7E3  400003E4  40400014  40400001  00000000  00000000  00000000
00000000  00000000  40404040  40404040  40404040  40404040  40404040
40404040  40404040  40404040  40404040  C2D3C4E2  F0F0F2F9*
02E3E7E3  4000043C  40400038  40400001  5870D378  5880D390  58B0D374
58A0D3DC  5890D3E0  5860D178  5800D188  5000B004  5800D17C  5000B008
5800D184  50007034  5060D220  5060D208  C2D3C4E2  F0F0F3F0**
02E3E7E3  40000474  40400038  40400001  7800D180  7000D33C  7800D180
7000D340  7800D180  7000D344  7800D180  7000D348  2B00780A  80006A00
D1706000  D1685830  D16C5030  D2102B00  C2D3C4E2  F0F0F3F1*
02E3E7E3  400004AC  40400038  40400001  78098000  6A00D170  6000D168
5820D16C  5020D21C  5030D23C  5020D240  58F0D3AC  4110D06C  05EF5800
D1885000  D1FC50A0  D3C45090  D3C85800  C2D3C4E2  F0F0F3F2*
02E3E7E3  400004E4  40400038  40400001  D3E45000  D3CC5800  D3E85000
```

```
                                                                                PAGE 0036
D3D05800  D3EC5000  D3D45800  D3F05000  D3D858B0  D3B858A0  D3685890
D36C5860  D37058E0  D3C42B00  780E8000  C2D3C4E2  F0F0F3F3*
02E3E7E3  4000051C  40400038  40400001  6A00D170  6000D168  5820D16C
5020D210  5800D178  5000D22C  122247A0  D4FA5800  D1845000  D22C58E0
D3C82B00  780E8000  6A00D170  6000D168  C2D3C4E2  F0F0F3F4*
02E3E7E3  40000554  40400038  40400001  5820D16C  5020D21C  58E0D3CC
2B00780E  80006A00  D1706000  D1685800  D16C5000  D2145800  D2105900
D23C4770  D7AE5800  D2201BFF  860FD7D6  C2D3C4E2  F0F0F3F5*
02E3E7E3  4000058C  40400038  40400001  5920D240  4770D78E  5800D188
5000D20C  5000D224  5850D214  5C40D1B0  41056004  5000D08C  41056008
5000D090  9280D090  58F0D39C  4110D07C  C2D3C4E2  F0F0F3F6*
02E3E7E3  400005C4  40400038  40400001  05EF58F0  D3981B11  05EF41E0
000415FE  4720D596  58EFD04C  07FE58F0  D3804110  D09405EF  58F0D37C
4110D098  05EF58F0  D3804110  D0B005EF  C2D3C4E2  F0F0F3F7*
02E3E7E3  400005FC  40400038  40400001  58E0D3D0  410E8000  5000D0BC
9280D0BC  58F0D38C  4110D0B4  05EF58F0  D3844110  D0C005EF  58F0D3A8
45E0F004  00000000  00000028  45E0F008  C2D3C4E2  F0F0F3F8*
02E3E7E3  40000634  40400038  40400001  0450D214  5800D188  5000D200
5830D194  5890D194  58A0D188  18B345E0  F0080450  D20045E0  F008047B

MEMBER NAME  BLDSEQ
D2A85830  D2001A3A  5030D200  1AB95930  C2D3C4E2  F0F0F3F9*
02E3E7E3  4000066C  40400028  40400001  D21847C0  D6065890  D36C58A0
D36858B0  D3B845E0  F01058F0  D3A81800  45E0F000  00000000  00000040
40404040  40404040  40404040  40404040  C2D3C4E2  F0F0F4F0**
02D9D3C4  40404040  40400038  40404040  000D0001  1C0003E0  000E0001
1C0003E4  000F0001  1C0003E8  00100001  1C0003EC  00110001  1C0003F0
00120001  1C0003F4  00010001  0C00062C  C2D3C4E2  F0F0F4F1*
02E3E7E3  40000694  40400038  40400001  45E0F00C  00000290  01200064
45E0F010  58E0D3D4  782E8000  7020D234  5800D22C  1BFF870F  D6783322
7020D234  5800D218  5900D188  4770D68C  C2D3C4E2  F0F0F4F2*
02E3E7E3  400006CC  40400038  40400001  5800D1B8  5000D228  5800D218
5900D18C  4770D6A0  5800D1C0  5000D228  5800D218  5900D190  4770D6B4
5800D1C4  5000D228  5800D218  5900D194  C2D3C4E2  F0F0F4F3*
02E3E7E3  40000704  40400038  40400001  4770D6C8  5800D1CC  5000D228
5800D218  5900D198  4770D6DC  5800D1D4  5000D228  5800D218  5900D19C
4770D6F0  5800D1D8  5000D228  5800D218  C2D3C4E2  F0F0F4F4*
02E3E7E3  4000073C  40400038  40400001  5900D1A0  4770D704  5800D1DC
5000D228  5800D218  5900D1A4  4770D718  5800D1E0  5000D228  58E0D3D8
410E8000  5000D0D0  58F0D3A0  4110D0CC  C2D3C4E2  F0F0F4F5*
02E3E7E3  40000774  40400038  40400001  05EF41E0  000415FE  4720D73E
58EFD054  07FE58F0  D3A44110  D11405EF  41E00004  15FE4720  D75858EF
D05C07FE  78207014  7A20701C  7020D344  C2D3C4E2  F0F0F4F6*
02E3E7E3  400007AC  40400038  40400001  78207018  7A207020  7020D348
58F0D388  4110D128  05EF41E0  000415FE  4720D78A  58EFD064  07FE47F0
D7D65800  D21C5000  D24058F0  D3AC4110  C2D3C4E2  F0F0F4F7*
02E3E7E3  400007E4  40400038  40400001  D13805EF  5800D220  1BFF860F
D7D647F0  D54C5800  D2105000  D23C5800  D21C5000  D24058F0  D3AC4110
D14805EF  5800D220  1BFF860F  D7D647F0  C2D3C4E2  F0F0F4F8*
02E3E7E3  4000081C  40400038  40400001  D54C5820  D1FC5A20  D1885020
D1FC5800  D3D81A0B  5000D3D8  5800D3D4  1A0B5000  D3D45800  D3D01A0B
5000D3D0  5800D3CC  1A0B5000  D3CC5800  C2D3C4E2  F0F0F4F9*
02E3E7E3  40000854  40400038  40400001  D3C81A0B  5000D3C8  5800D3C4
1A0B5000  D3C45920  D24447C0  D4CA58B0  D37458A0  D3DC5890  D3E05860
D1784120  00015720  D2201BFF  872FD84E  C2D3C4E2  F0F0F5F0**
02E3E7E3  4000088C  40400038  40400001  58F0D3AC  4110D158  05EF1BFF
58E0D000  07FE58D0  D00458E0  D00C92FF  D00C982C  D01C07FE  58701004
58207000  5020D244  58201000  41302000  C2D3C4E2  F0F0F5F1*
02E3E7E3  400008C4  40400018  40400001  41500004  1B255C40  D1BC1B25
```

```
                                                                        PAGE 0037
5020D390  5030D394  47F0D3F4  40404040  40404040  40404040  40404040
40404040  40404040  40404040  40404040  C2D3C4E2  F0F0F5F2*
02E3E7E3  40000020  40400008  40400001  000008B0  00000048  40404040
40404040  40404040  40404040  40404040  40404040  40404040  40404040
40404040  40404040  40404040  40404040  C2D3C4E2  F0F0F5F3*
02E3E7E3  40000048  40400004  40400001  0000089E  40404040  40404040
40404040  40404040  40404040  40404040  40404040  40404040  40404040
40404040  40404040  40404040  40404040  C2D3C4E2  F0F0F5F4*
02E3E7E3  40000094  4040000C  40400001  000005DE  000005DE  00000786
40404040  40404040  40404040  40404040  40404040  40404040  40404040
40404040  40404040  40404040  40404040  C2D3C4E2  F0F0F5F5*
02D9D3C4  40404040  40400038  40404040  00010001  0C000690  00010001
0C000698  00010001  0C000020  00010001  0C000024  00010001  0C000048
00010001  0C000094  00010001  0C000098  C2D3C4E2  F0F0F5F6*
02E3E7E3  400000A0  4040001C  40400001  00000786  000007A0  000007B8
000007D2  000007D2  00000264  00000258  40404040  40404040  40404040
40404040  40404040  40404040  40404040  C2D3C4E2  F0F0F5F7*
02D9D3C4  40404040  40400038  40404040  00010001  0C00009C  00010001
0C0000A0  00010001  0C0000A4  00010001  0C0000A8  00010001  0C0000AC
00010001  0C0000B0  00010001  0C0000B4  C2D3C4E2  F0F0F5F8*

MEMBER NAME  BLDSEQ
02E3E7E3  400000BC  40400018  40400001  000001D0  80000268  00000000
00000254  00014820  0000026C  40404040  40404040  40404040  40404040
40404040  40404040  40404040  40404040  C2D3C4E2  F0F0F5F9*
02E3E7E3  400000D8  40400008  40400001  80000000  800001D4  40404040
40404040  40404040  40404040  40404040  40404040  40404040  40404040
40404040  40404040  40404040  40404040  C2D3C4E2  F0F0F6F0**
02D9D3C4  40404040  40400038  40404040  00010001  0C0000B8  00010001
0C0000BC  00010001  0C0000C0  00040001  0C0000C4  00010001  0C0000C8
00040001  0C0000CC  00010001  0C0000D0  C2D3C4E2  F0F0F6F1*
02E3E7E3  400000E0  4040001C  40400001  00000000  00000254  00014820
0000026C  00000274  80000250  800001C4  40404040  40404040  40404040
40404040  40404040  40404040  40404040  C2D3C4E2  F0F0F6F2*
02D9D3C4  40404040  40400038  40404040  00010001  0C0000DC  00040001
0C0000E0  00010001  0C0000E4  00040001  0C0000E8  00010001  0C0000EC
00010001  0C0000F0  00010001  0C0000F4  C2D3C4E2  F0F0F6F3*
02E3E7E3  400000FC  4040001C  40400001  000001FC  00000374  80000000
00000374  000002F4  80000260  0000027C  40404040  40404040  40404040
40404040  40404040  40404040  40404040  C2D3C4E2  F0F0F6F4*
02E3E7E3  4000011C  40400004  40400001  000001C4  40404040  40404040
40404040  40404040  40404040  40404040  40404040  40404040  40404040
40404040  40404040  40404040  40404040  C2D3C4E2  F0F0F6F5*
02D9D3C4  40404040  40400038  40404040  00010001  0C0000F8  00010001
0C0000FC  00010001  0C000100  00010001  0C000108  00010001  0C00010C
00010001  0C000110  00010001  0C000114  C2D3C4E2  F0F0F6F6*
02E3E7E3  40000120  4040001C  40400001  00000270  00000230  0000022C
00000290  000001C4  000001C4  000001C4  40404040  40404040  40404040
40404040  40404040  40404040  40404040  C2D3C4E2  F0F0F6F7*
02D9D3C4  40404040  40400038  40404040  00010001  0C00011C  00010001
0C000120  00010001  0C000124  00010001  0C000128  00010001  0C00012C
00010001  0C000130  00010001  0C000134  C2D3C4E2  F0F0F6F8*
02E3E7E3  4000013C  4040001C  40400001  000001D0  000001D4  000001D4
000001C4  000001C4  00000230  00000234  40404040  40404040  40404040
40404040  40404040  40404040  40404040  C2D3C4E2  F0F0F6F9*
02D9D3C4  40404040  40400038  40404040  00010001  0C000138  00010001
0C00013C  00010001  0C000140  00010001  0C000144  00010001  0C000148
00010001  0C00014C  00010001  0C000150  C2D3C4E2  F0F0F7F0**
02E3E7E3  40000158  4040001C  40400001  800001C4  000001C8  000001C8
```

```
00000238  000001C8  80000280  00000010  40404040  40404040  40404040
40404040  40404040  40404040  40404040  C2D3C4E2  F0F0F7F1*
02D9D3C4  40404040  40400038  40404040  00010001  0C000154  00010001
0C000158  00010001  0C00015C  00010001  0C000160  00010001  0C000164
00010001  0C000168  00010001  0C00016C  C2D3C4E2  F0F0F7F2*
02E3E7E3  40000174  4040001C  40400001  0000038C  00000280  80000020
00000264  00000258  000001D4  80000268  40404040  40404040  40404040
40404040  40404040  40404040  40404040  C2D3C4E2  F0F0F7F3*
02D9D3C4  40404040  40400038  40404040  00070001  0C000170  00010001
0C000174  00010001  0C000178  00070001  0C00017C  00010001  0C000180
00010001  0C000184  00010001  0C000188  C2D3C4E2  F0F0F7F4*
02E3E7E3  40000190  4040001C  40400001  00000264  00000258  000001D8
80000268  00000264  00000258  000001DC  40404040  40404040  40404040
40404040  40404040  40404040  40404040  C2D3C4E2  F0F0F7F5*
02D9D3C4  40404040  40400038  40404040  00010001  0C00018C  00010001
0C000190  00010001  0C000194  00010001  0C000198  00010001  0C00019C
00010001  0C0001A0  00010001  0C0001A4  C2D3C4E2  F0F0F7F6*
02E3E7E3  400001AC  40400004  40400001  80000268  40404040  40404040
40404040  40404040  40404040  40404040  40404040  40404040  40404040
40404040  40404040  40404040  40404040  C2D3C4E2  F0F0F7F7*
02E3E7E3  400003F8  40400038  40400001  00000000  00000000  00000058

MEMBER NAME  BLDSEQ
00000040  00000028  00000000  00000000  00000000  00000000  00000000
00000000  00000060  00000064  00000068  C2D3C4E2  F0F0F7F8*
02E3E7E3  40000430  4040000C  40400001  00000098  00000080  00000084
40404040  40404040  40404040  40404040  40404040  40404040  40404040
40404040  40404040  40404040  40404040  C2D3C4E2  F0F0F7F9*
02D9D3C4  40404040  40400010  40404040  00010001  0C0001A8  00010001
0C0001AC  40404040  40404040  40404040  40404040  40404040  40404040
40404040  40404040  40404040  40404040  C2D3C4E2  F0F0F8F0**
02C5D5C4  40404040  40404040  40404040  40404040  40404040  40404040
000008DC  F1F5F7F3  F460C6D6  F34040F0  F2F0F2F8  F7F0F9F8  40F0F84B
F1F24BF2  F0404040  C2D3C4E2  C5D84040  C2D3C4E2  F0F0F8F1**

MEMBER NAME  BLDTBL
02C5E2C4  40404040  40400010  40400001  C2D3C4E3  C2D34040  00000000
40000000  40404040  40404040  40404040  40404040  40404040  40404040
40404040  40404040  40404040  40404040  C2D3C4E3  F0F0F0F1*
02E3E7E3  40000000  40400028  40400001  47F0F00C  07C2D3C4  E3C2D340
90ECD00C  184D98CD  F0205040  D00450D0  400807FC  40404040  40404040
40404040  40404040  40404040  40404040  C2D3C4E3  F0F0F0F2*
02E3E7E3  40000158  40400038  40400001  00000000  00000001  00000002
00000003  00000005  00000006  00000007  00000008  0000000C  00000014
00000018  00000048  00000058  40266666  C2D3C4E3  F0F0F0F3*
02C5E2C4  40404040  40400010  40400002  D7E3C1C2  D3C54040  05000000
40125768  40404040  40404040  40404040  40404040  40404040  40404040
40404040  40404040  40404040  40404040  C2D3C4E3  F0F0F0F4*
02E3E7E3  40000190  40400008  40400001  00000000  00000000  40404040
40404040  40404040  40404040  40404040  40404040  40404040  40404040
40404040  40404040  40404040  40404040  C2D3C4E3  F0F0F0F5*
02C5E2C4  40404040  40400010  40400003  E2E3C1C3  D2404040  05000000
40040744  40404040  40404040  40404040  40404040  40404040  40404040
40404040  40404040  40404040  40404040  C2D3C4E3  F0F0F0F6*
02C5E2C4  40404040  40400010  40400004  D7C3C5D9  D9404040  05000000
40003844  40404040  40404040  40404040  40404040  40404040  40404040
40404040  40404040  40404040  40404040  C2D3C4E3  F0F0F0F7*
02C5E2C4  40404040  40400010  40400005  C2E2D6D9  E3404040  02000000
40000000  40404040  40404040  40404040  40404040  40404040  40404040
```

| | | | | | | |
|---|---|---|---|---|---|---|
| 40404040 | 40404040 | 40404040 | 40404040 | C2D3C4E3 | F0F0F0F8* | |
| 02C5E2C4 | 40404040 | 40400010 | 40400006 | D4C5D9C7 | C5404040 | 02000000 |
| 40000000 | 40404040 | 40404040 | 40404040 | 40404040 | 40404040 | 40404040 |
| 40404040 | 40404040 | 40404040 | 40404040 | C2D3C4E3 | F0F0F0F9* | |
| 02E3E7E3 | 40000508 | 40400020 | 40400001 | FFFFFFEC | 00058600 | 000B0444 |
| 00108298 | FFFFFFA8 | FFFFFFBB | 00000000 | 00000000 | 40404040 | 40404040 |
| 40404040 | 40404040 | 40404040 | 40404040 | C2D3C4E3 | F0F0F1F0** | |
| 02D9D3C4 | 40404040 | 40400038 | 40404040 | 00020001 | 0C000508 | 00020001 |
| 0C00050C | 00020001 | 0C000510 | 00020001 | 0C000514 | 00030001 | 0C000518 |
| 00040001 | 0C00051C | 00050001 | 1C000520 | C2D3C4E3 | F0F0F1F1* | |
| 02C5E2C4 | 40404040 | 40400010 | 40400007 | E5C4C1E2 | C8404040 | 02000000 |
| 40000000 | 40404040 | 40404040 | 40404040 | 40404040 | 40404040 | 40404040 |
| 40404040 | 40404040 | 40404040 | 40404040 | C2D3C4E3 | F0F0F1F2* | |
| 02E3E7E3 | 40000528 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C2D3C4E3 | F0F0F1F3* | |
| 02C5E2C4 | 40404040 | 40400010 | 40400008 | E5E2C5D8 | E4404040 | 02000000 |
| 40000000 | 40404040 | 40404040 | 40404040 | 40404040 | 40404040 | 40404040 |
| 40404040 | 40404040 | 40404040 | 40404040 | C2D3C4E3 | F0F0F1F4* | |
| 02C5E2C4 | 40404040 | 40400010 | 40400009 | C7D9D5D4 | D9C74040 | 02000000 |
| 40000000 | 40404040 | 40404040 | 40404040 | 40404040 | 40404040 | 40404040 |
| 40404040 | 40404040 | 40404040 | 40404040 | C2D3C4E3 | F0F0F1F5* | |
| 02C5E2C4 | 40404040 | 40400010 | 4040000A | D4C1E3D4 | D9C74040 | 02000000 |
| 40000000 | 40404040 | 40404040 | 40404040 | 40404040 | 40404040 | 40404040 |
| 40404040 | 40404040 | 40404040 | 40404040 | C2D3C4E3 | F0F0F1F6* | |
| 02C5E2C4 | 40404040 | 40400010 | 4040000B | D4C3C8C5 | C3D24040 | 02000000 |
| 40000000 | 40404040 | 40404040 | 40404040 | 40404040 | 40404040 | 40404040 |
| 40404040 | 40404040 | 40404040 | 40404040 | C2D3C4E3 | F0F0F1F7* | |
| 02C5E2C4 | 40404040 | 40400010 | 4040000C | D4C5D9C7 | C5F14040 | 02000000 |
| 40000000 | 40404040 | 40404040 | 40404040 | 40404040 | 40404040 | 40404040 |
| 40404040 | 40404040 | 40404040 | 40404040 | C2D3C4E3 | F0F0F1F8* | |
| 02C5E2C4 | 40404040 | 40400010 | 4040000D | D5C6D6E4 | D5C44040 | 02000000 |
| 40000000 | 40404040 | 40404040 | 40404040 | 40404040 | 40404040 | 40404040 |
| 40404040 | 40404040 | 40404040 | 40404040 | C2D3C4E3 | F0F0F1F9* | |
| 02E3E7E3 | 40000530 | 4040001C | 40400001 | 00000000 | 00000000 | 00000000 |

MEMBER NAME BLDTBL

| | | | | | | |
|---|---|---|---|---|---|---|
| 00000000 | 00000000 | 00000000 | 00000000 | 40404040 | 40404040 | 40404040 |
| 40404040 | 40404040 | 40404040 | 40404040 | C2D3C4E3 | F0F0F2F0** | |
| 02D9D3C4 | 40404040 | 40400038 | 40404040 | 00060001 | 1C000524 | 00070001 |
| 1C000530 | 00080001 | 1C000534 | 00090001 | 1C000538 | 000A0001 | 1C00053C |
| 000B0001 | 1C000540 | 000C0001 | 1C000544 | C2D3C4E3 | F0F0F2F1* | |
| 02C5E2C4 | 40404040 | 40400010 | 4040000E | E2C5D8D4 | D9C74040 | 02000000 |
| 40000000 | 40404040 | 40404040 | 40404040 | 40404040 | 40404040 | 40404040 |
| 40404040 | 40404040 | 40404040 | 40404040 | C2D3C4E3 | F0F0F2F2* | |
| 02C5E2C4 | 40404040 | 40400010 | 4040000F | E5D3C1E8 | E4D74040 | 02000000 |
| 40000000 | 40404040 | 40404040 | 40404040 | 40404040 | 40404040 | 40404040 |
| 40404040 | 40404040 | 40404040 | 40404040 | C2D3C4E3 | F0F0F2F3* | |
| 02E3E7E3 | 4000054C | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | C2D3C4E3 | F0F0F2F4* | |
| 02E3E7E3 | 40000348 | 40400030 | 40400001 | 00000005 | 00000004 | C6D34040 |
| C1404040 | 00000009 | 00000004 | C6D34040 | C1404040 | 0000000D | 00000004 |
| C6D34040 | C1404040 | 40404040 | 40404040 | C2D3C4E3 | F0F0F2F5* | |
| 02E3E7E3 | 40000568 | 40400038 | 40400001 | 5830D4E4 | 5890D4F0 | 58A0D4E0 |
| 58B0D4F4 | 5880D14C | 5800B045 | 5000D17C | 58F0D520 | 4110D04C | 05EF5800 |
| A0141200 | 47C0D57A | 58F0D508 | 4110D054 | C2D3C4E3 | F0F0F2F6* | |
| 02E3E7E3 | 400005A0 | 40400038 | 40400001 | 05EF5800 | B0455900 | D17C47C0 |
| D58E1BFF | 58E0D000 | 07FE58F0 | D4FC4110 | D06405EF | 58F0D4FC | 4110D080 |

PAGE 0040

```
05EF58F0  D4FC4110  D09C05EF  5800B045  C2D3C4E3  F0F0F2F7*
02E3E7E3  400005D8  40400038  40400001  5900D17C  47C0D5C0  1BFF58E0
D00007FE  58F0D51C  4110D0B8  05EF5800  D1345000  D1785080  D5385080
D53C5830  D13458F0  D4E85890  F01818A8  C2D3C4E3  F0F0F2F8*
02E3E7E3  40000610  40400038  40400001  58B0D4E8  5990D178  47A0D5F8
47F0D6AC  5820D130  5020D188  58E0D538  5800D178  500ED188  18825890
D1781A83  18A91AA3  59A0B018  47C0D62C  C2D3C4E3  F0F0F2F9*
02E3E7E3  40000648  40400038  40400001  5080D188  5090D178  47F0D676
18795C60  D1585070  D530185A  5C40D158  5050D534  7827B014  7925B014
4780D658  5080D188  5090D178  47F0D676  C2D3C4E3  F0F0F3F0**
02E3E7E3  40000680  40400038  40400001  7827B018  7925B018  4780D670
5080D188  5090D178  47F0D676  189A47F0  D61258A0  D14C5890  B0185800
D1781A03  5000D178  58E0D53C  5800D188  C2D3C4E3  F0F0F3F1*
02E3E7E3  400006B8  40400038  40400001  500ED18C  5800D53C  1A0A5000
D53C5800  D5381A0A  5000D538  47F0D5EC  5830D4E4  5890D4F0  58A0D4E0
58B0D4F4  5880D14C  5800D134  5000D178  C2D3C4E3  F0F0F3F2*
02E3E7E3  400006F0  40400038  40400001  5000D180  5080D538  5080D53C
5830D134  58909058  18A858B0  D4F05990  D17847A0  D6EE47F0  D7AC5820
D1305020  D18858E0  D5385800  D178500E  C2D3C4E3  F0F0F3F3*
02E3E7E3  40000728  40400038  40400001  D3481882  5890D178  1A8318A9
1AA359A0  B05847C0  D7225080  D1885090  D17847F0  D76C1879  5C60D160
5070D530  185A5C40  D1605050  D5347827  C2D3C4E3  F0F0F3F4*
02E3E7E3  40000760  40400038  40400001  B0087925  B0084780  D74E5080
D1885090  D17847F0  D76C7827  B01C7925  B01C4780  D7665080  D1885090
D17847F0  D76C189A  47F0D708  58A0D14C  C2D3C4E3  F0F0F3F5*
02E3E7E3  40000798  40400038  40400001  5890B058  5800D178  1A035000
D17858E0  D53C5800  D188500E  D34C5800  D1801A03  5000D180  5800D53C
1A0A5000  D53C5800  D5381A0A  5000D538  C2D3C4E3  F0F0F3F6*
02E3E7E3  400007D0  40400038  40400001  47F0D6E2  5830D4E4  5890D4F0
58A0D4E0  58B0D4F4  5880D14C  5820D180  5B20D134  89200003  189818A8
18B25880  D4F45870  D4E85860  D4F05859  C2D3C4E3  F0F0F3F7*
02E3E7E3  40000808  40400038  40400001  D1885C40  D1585839  D3485C20
D1604105  70045000  D0D04109  D18C5000  D0D44103  60045000  D0D84109
D34C5000  D0DC58F0  D5144110  D0D005EF  C2D3C4E3  F0F0F3F8*
02E3E7E3  40000840  40400038  40400001  879AD7DE  5830D4E4  5890D4F0
58A0D4E0  58B0D4F4  5880D14C  5800D134  5000D178  5000D180  5080D538
```

MEMBER NAME BLDTBL

```
5080D53C  5830D134  5890A7E8  18A858B0  C2D3C4E3  F0F0F3F9*
02E3E7E3  40000878  40400038  40400001  D4E05990  D17847A0  D85E47F0
D91C5820  D1305020  D18858E0  D5385800  D178500E  D1881882  5890D178
1A8318A9  1AA359A0  B7E847C0  D8925080  C2D3C4E3  F0F0F4F0**
02E3E7E3  400008B0  40400038  40400001  D1885090  D17847F0  D8DC1879
5C60D158  5070D530  185A5C40  D1585050  D5347827  B7E47925  B7E44780
D8BE5080  D1885090  D17847F0  D8DC7827  C2D3C4E3  F0F0F4F1*
02E3E7E3  400008E8  40400038  40400001  B7E87925  B7E84780  D8D65080
D1885090  D17847F0  D8DC189A  47F0D878  58A0D14C  5890B7E8  5800D178
1A035000  D17858E0  D53C5800  D188500E  C2D3C4E3  F0F0F4F2*
02E3E7E3  40000920  40400038  40400001  D18C5800  D1801A03  5000D180
5800D53C  1A0A5000  D53C5800  D5381A0A  5000D538  47F0D852  5830D4E4
5890D4F0  58A0D4E0  58B0D4F4  5880D14C  C2D3C4E3  F0F0F4F3*
02E3E7E3  40000958  40400038  40400001  5820D180  5B20D134  89200003
189818A8  18B25880  D4F45870  D4E05860  D4F05859  D1885C40  D1585839
D3485C20  D1604105  77D45000  D0D04109  C2D3C4E3  F0F0F4F4*
02E3E7E3  40000990  40400038  40400001  D18C5000  D0D44103  60045000
D0D84109  D34C5000  D0DC58F0  D5244110  D0D005EF  879AD94E  5830D4E4
5890D4F0  58A0D4E0  58B0D4F4  5880D14C  C2D3C4E3  F0F0F4F5*
02E3E7E3  400009C8  40400038  40400001  5800D134  5000D178  5000D180
5080D538  5080D53C  5830D134  58F0D4E4  5890F018  18A858B0  D4E45990
```

```
D17847A0  D9D247F0  DA905820  D1305020  C2D3C4E3  F0F0F4F6*
02E3E7E3  40000A00  40400038  40400001  D18858E0  D5385800  D178500E
D1881882  5890D178  1A8318A9  1AA359A0  B01847C0  DA065080  D1885090
D17847F0  DA501879  5C60D158  5070D530  C2D3C4E3  F0F0F4F7*
02E3E7E3  40000A38  40400038  40400001  185A5C40  D1585050  D5347827
B0147925  B0144780  DA325080  D1885090  D17847F0  DA507827  B0187925
B0184780  DA4A5080  D1885090  D17847F0  C2D3C4E3  F0F0F4F8*
02E3E7E3  40000A70  40400038  40400001  DA50189A  47F0D9EC  58A0D14C
5890B018  5800D178  1A035000  D17858E0  D53C5800  D188500E  D18C5800
D1801A03  5000D180  5800D53C  1A0A5000  C2D3C4E3  F0F0F4F9*
02E3E7E3  40000AA8  40400038  40400001  D53C5800  D5381A0A  5000D538
47F0D9C6  5830D4E4  5890D4F0  58A0D4E0  58B0D4F4  5880D14C  5820D180
5B20D134  89200003  189818A8  18B25880  C2D3C4E3  F0F0F5F0**
02E3E7E3  40000AE0  40400038  40400001  D4F41873  5860D4F0  5859D188
5C40D158  5839D348  5C20D160  41057004  5000D0D0  4109D18C  5000D0D4
41036004  5000D0D8  4109D34C  5000D0DC  C2D3C4E3  F0F0F5F1*
02E3E7E3  40000B18  40400038  40400001  58F0D510  4110D0D0  05EF879A
DAC05830  D4E45890  D4F058A0  D4E058B0  D4F45880  D14C5800  B0451200
4730DB3A  58F0D50C  4110D0E8  05EF58F0  C2D3C4E3  F0F0F5F2*
02E3E7E3  40000B50  40400038  40400001  D5284110  D0F805EF  58F0D518
4110D108  05EF58F0  D4F84110  D11805EF  1BFF58E0  D00007FE  58A0D004
58E0A00C  58B0A018  5810B004  5820D18C  C2D3C4E3  F0F0F5F3*
02E3E7E3  40000B88  40400038  40400001  50201000  18DA92FF  A00C982C
A01C07FE  58701004  58207000  5020D18C  58201000  41302000  41500001
1B255C40  D15C1B25  5020D500  5030D504  C2D3C4E3  F0F0F5F4*
02E3E7E3  40000BC0  40400008  40400001  5030D100  47F0D540  40404040
40404040  40404040  40404040  40404040  40404040  40404040  40404040
40404040  40404040  40404040  40404040  C2D3C4E3  F0F0F5F5*
02E3E7E3  40000020  4040000C  40400001  00000B98  00000028  00000B74
40404040  40404040  40404040  40404040  40404040  40404040  40404040
40404040  40404040  40404040  40404040  C2D3C4E3  F0F0F5F6*
02E3E7E3  40000074  40400008  40400001  00000004  80000000  40404040
40404040  40404040  40404040  40404040  40404040  40404040  40404040
40404040  40404040  40404040  40404040  C2D3C4E3  F0F0F5F7*
02D9D3C4  40404040  40400038  40404040  000D0001  1C000548  000E0001
1C00054C  000F0001  1C000550  00010001  0C000020  00010001  0C000024
00010001  0C000028  00040001  0C000074  C2D3C4E3  F0F0F5F8*

MEMBER NAME  BLDTBL
02E3E7E3  4000007C  4040001C  40400001  00000004  00000000  00000004
80000000  00000004  00000000  000007D8  40404040  40404040  40404040
40404040  40404040  40404040  40404040  C2D3C4E3  F0F0F5F9*
02D9D3C4  40404040  40400038  40404040  00040001  0C000078  00020001
0C00007C  00020001  0C000080  00040001  0C000084  00040001  0C000088
00020001  0C00008C  00020001  0C000090  C2D3C4E3  F0F0F6F0**
02E3E7E3  40000098  4040001C  40400001  000007D4  0000015C  00000004
80000000  00000004  00000000  0005861C  40404040  40404040  40404040
40404040  40404040  40404040  40404040  C2D3C4E3  F0F0F6F1*
02D9D3C4  40404040  40400038  40404040  00020001  0C000094  00020001
0C000098  00010001  0C00009C  00040001  0C0000A0  00040001  0C0000A4
00020001  0C0000A8  00020001  0C0000AC  C2D3C4E3  F0F0F6F2*
02E3E7E3  400000B4  4040001C  40400001  00058618  00000160  00000004
80000000  00000004  00000000  000B0460  40404040  40404040  40404040
40404040  40404040  40404040  40404040  C2D3C4E3  F0F0F6F3*
02D9D3C4  40404040  40400038  40404040  00020001  0C0000B0  00020001
0C0000B4  00010001  0C0000B8  00040001  0C0000BC  00040001  0C0000C0
00020001  0C0000C4  00020001  0C0000C8  C2D3C4E3  F0F0F6F4*
02E3E7E3  400000D0  4040001C  40400001  000B045C  00000164  00000004
80000000  00000004  00000000  00000004  40404040  40404040  40404040
```

```
40404040  40404040  40404040  40404040  C2D3C4E3  F0F0F6F5*
02D9D3C4  40404040  40400038  40404040  00020001  0C0000CC  00020001
0C0000D0  00010001  0C0000D4  00040001  0C0000D8  00040001  0C0000DC
00020001  0C0000E0  00020001  0C0000E4  C2D3C4E3  F0F0F6F6*
02E3E7E3  400000EC  4040000C  40400001  00000000  00000004  80000000
40404040  40404040  40404040  40404040  40404040  40404040  40404040
40404040  40404040  40404040  40404040  C2D3C4E3  F0F0F6F7*
02E3E7E3  40000108  40400010  40400001  00000004  80000000  000007D8
000007D4  40404040  40404040  40404040  40404040  40404040  40404040
40404040  40404040  40404040  40404040  C2D3C4E3  F0F0F6F8*
02D9D3C4  40404040  40400038  40404040  00030001  0C0000E8  00030001
0C0000EC  00040001  0C0000F0  00040001  0C0000F4  00040001  0C000108
00040001  0C00010C  00020001  0C000110  C2D3C4E3  F0F0F6F9*
02E3E7E3  40000118  40400010  40400001  00000004  80000000  00000004
00000000  40404040  40404040  40404040  40404040  40404040  40404040
40404040  40404040  40404040  40404040  C2D3C4E3  F0F0F7F0**
02E3E7E3  4000012C  4040000C  40400001  800001B4  00000004  00000000
40404040  40404040  40404040  40404040  40404040  40404040  40404040
40404040  40404040  40404040  40404040  C2D3C4E3  F0F0F7F1*
02D9D3C4  40404040  40400038  40404040  00020001  0C000114  00040001
0C000118  00040001  0C00011C  00030001  0C000120  00030001  0C000124
00010001  0C00012C  00030001  0C000130  C2D3C4E3  F0F0F7F2*
02E3E7E3  40000138  4040001C  40400001  00000004  80000000  00000348
00000164  00000004  00000188  80000000  40404040  40404040  40404040
40404040  40404040  40404040  40404040  C2D3C4E3  F0F0F7F3*
02D9D3C4  40404040  40400038  40404040  00030001  0C000134  00040001
0C000138  00040001  0C00013C  00010001  0C000140  00010001  0C000144
00030001  0C000148  00010001  0C00014C  C2D3C4E3  F0F0F7F4*
02E3E7E3  40000554  40400014  40400001  00000000  00000000  00000000
00000000  00000000  40404040  40404040  40404040  40404040  40404040
40404040  40404040  40404040  40404040  C2D3C4E3  F0F0F7F5*
02D9D3C4  40404040  40400008  40404040  00030001  0C000150  40404040
40404040  40404040  40404040  40404040  40404040  40404040  40404040
40404040  40404040  40404040  40404040  C2D3C4E3  F0F0F7F6*
02C5D5C4  40404040  40404040  40404040  40404040  40404040  40404040
00000BC8  F1F5F7F3  F460C6D6  F34040F0  F2F0F2F8  F7F0F9F8  40F0F84B
F1F24BF2  F5404040  C2D3C4E3  C2D34040  C2D3C4E3  F0F0F7F7**

MEMBER NAME  BLOCK
02C5E2C4  40404040  40400010  40400001  E3D6D3C5  D9404040  00000000
4000000C  40404040  40404040  40404040  40404040  40404040  40404040
40404040  40404040  40404040  40404040  C2D3D2C4  F0F0F0F1*
02C5E2C4  40404040  40400010  40400002  D4E2C9E9  C5404040  00000000
4000000C  40404040  40404040  40404040  40404040  40404040  40404040
40404040  40404040  40404040  40404040  C2D3D2C4  F0F0F0F2*
02C5E2C4  40404040  40400010  40400003  D6D7E3C9  D6D54040  00000000
40000020  40404040  40404040  40404040  40404040  40404040  40404040
40404040  40404040  40404040  40404040  C2D3D2C4  F0F0F0F3*
02C5E2C4  40404040  40400010  40400004  C4E5C9C5  E6E24040  00000000
40000004  40404040  40404040  40404040  40404040  40404040  40404040
40404040  40404040  40404040  40404040  C2D3D2C4  F0F0F0F4*
02C5E2C4  40404040  40400010  40400005  C9E2C1E3  E3404040  00000000
40000004  40404040  40404040  40404040  40404040  40404040  40404040
40404040  40404040  40404040  40404040  C2D3D2C4  F0F0F0F5*
02E3E7E3  40000000  4040000C  40400001  3F28F5C3  3F10624E  3C10C6F8
40404040  40404040  40404040  40404040  40404040  40404040  40404040
40404040  40404040  40404040  40404040  C2D3D2C4  F0F0F0F6*
02E3E7E3  40000000  40400008  40400002  00004E20  00007530  40404040
40404040  40404040  40404040  40404040  40404040  40404040  40404040
```

PAGE 0043

```
40404040  40404040  40404040  40404040  C2D3D2C4  F0F0F0F7*
02E3E7E3  40000000  40400020  40400003  00000000  00000000  00000000
00000000  00000000  00000000  00000000  00000000  40404040  40404040
40404040  40404040  40404040  40404040  C2D3D2C4  F0F0F0F8*
02E3E7E3  40000000  40400004  40400004  F9F8F9F9  40404040  40404040
40404040  40404040  40404040  40404040  40404040  40404040  40404040
40404040  40404040  40404040  40404040  C2D3D2C4  F0F0F0F9*
02E3E7E3  40000000  40400004  40400005  0000028A  40404040  40404040
40404040  40404040  40404040  40404040  40404040  40404040  40404040
40404040  40404040  40404040  40404040  C2D3D2C4  F0F0F1F0**
02C5D5C4  40404040  40404040  40404040  40404040  40404040  40404040
40404040  F1F5F7F3  F460C6D6  F34040F0  F2F0F2F8  F7F0F9F8  40F0F84B
F1F24BF3  F1404040  C2D3D2C4  0001748E  C2D3D2C4  F0F0F1F1**

MEMBER NAME  BLOCK1
02C5E2C4  40404040  40400010  40400001  C3C4E3C3  D6D44040  00000000
4000008C  40404040  40404040  40404040  40404040  40404040  40404040
40404040  40404040  40404040  40404040  C2D3D2C4  F0F0F0F1*
02C5E2C4  40404040  40400010  40400002  E2E8D4E3  C2404040  00000000
40007D10  40404040  40404040  40404040  40404040  40404040  40404040
40404040  40404040  40404040  40404040  C2D3D2C4  F0F0F0F2*
02C5E2C4  40404040  40400010  40400003  C5D3C3D6  D4404040  00000000
40000004  40404040  40404040  40404040  40404040  40404040  40404040
40404040  40404040  40404040  40404040  C2D3D2C4  F0F0F0F3*
02C5E2C4  40404040  40400010  40400004  D7D4C1E3  D3404040  00000000
40001134  40404040  40404040  40404040  40404040  40404040  40404040
40404040  40404040  40404040  40404040  C2D3D2C4  F0F0F0F4*
02C5E2C4  40404040  40400010  40400005  C5D3D4E3  C2D34040  00000000
400D7D28  40404040  40404040  40404040  40404040  40404040  40404040
40404040  40404040  40404040  40404040  C2D3D2C4  F0F0F0F5*
02C5E2C4  40404040  40400010  40400006  E2D7D3D7  E3E24040  00000000
40030D44  40404040  40404040  40404040  40404040  40404040  40404040
40404040  40404040  40404040  40404040  C2D3D2C4  F0F0F0F6*
02C5E2C4  40404040  40400010  40400007  D7E3C1C2  D3C54040  00000000
40125768  40404040  40404040  40404040  40404040  40404040  40404040
40404040  40404040  40404040  40404040  C2D3D2C4  F0F0F0F7*
02C5E2C4  40404040  40400010  40400008  E2E3C1C3  D2404040  00000000
40040744  40404040  40404040  40404040  40404040  40404040  40404040
40404040  40404040  40404040  40404040  C2D3D2C4  F0F0F0F8*
02C5E2C4  40404040  40400010  40400009  C7D9E4D7  40404040  00000000
4000000C  40404040  40404040  40404040  40404040  40404040  40404040
40404040  40404040  40404040  40404040  C2D3D2C4  F0F0F0F9*
02C5E2C4  40404040  40400010  4040000A  D9D4D6C4  C5D34040  00000000
40000018  40404040  40404040  40404040  40404040  40404040  40404040
40404040  40404040  40404040  40404040  C2D3D2C4  F0F0F1F0**
02C5E2C4  40404040  40400010  4040000B  C6D4D6C4  C5D34040  00000000
400001F8  40404040  40404040  40404040  40404040  40404040  40404040
40404040  40404040  40404040  40404040  C2D3D2C4  F0F0F1F1*
02C5E2C4  40404040  40400010  4040000C  D7C3C5D9  D9404040  00000000
40003844  40404040  40404040  40404040  40404040  40404040  40404040
40404040  40404040  40404040  40404040  C2D3D2C4  F0F0F1F2*
02C5E2C4  40404040  40400010  4040000D  D7D7D6C9  D5E34040  00000000
40013884  40404040  40404040  40404040  40404040  40404040  40404040
40404040  40404040  40404040  40404040  C2D3D2C4  F0F0F1F3*
02C5E2C4  40404040  40400010  4040000E  E2C5D9D9  D6D94040  00000000
40000004  40404040  40404040  40404040  40404040  40404040  40404040
40404040  40404040  40404040  40404040  C2D3D2C4  F0F0F1F4*
02C5E2C4  40404040  40400010  4040000F  E5F9F940  40404040  00000000
4000003C  40404040  40404040  40404040  40404040  40404040  40404040
```

```
                                                                          PAGE 0044
40404040  40404040  40404040  40404040  C2D3D2C4  F0F0F1F5*
02C5E2C4  40404040  40400010  40400010  C6D4E3C5  D9D94040  00000000
40002D58  40404040  40404040  40404040  40404040  40404040  40404040
40404040  40404040  40404040  40404040  C2D3D2C4  F0F0F1F6*
02C5E2C4  40404040  40400010  40400011  E2D3C9D5  C5E24040  00000000
40001C24  40404040  40404040  40404040  40404040  40404040  40404040
40404040  40404040  40404040  40404040  C2D3D2C4  F0F0F1F7*
02E3E7E3  40000004  40400008  40400001  00000001  00000001  40404040
40404040  40404040  40404040  40404040  40404040  40404040  40404040
40404040  40404040  40404040  40404040  C2D3D2C4  F0F0F1F8*
02E3E7E3  40000010  40400004  40400001  00000006  40404040  40404040
40404040  40404040  40404040  40404040  40404040  40404040  40404040
40404040  40404040  40404040  40404040  C2D3D2C4  F0F0F1F9*
02E3E7E3  40000068  40400024  40400001  C1D3D340  00000000  00000000

MEMBER NAME  BLOCK1
00000000  00000000  00000000  00000000  00000000  00000000  40404040
40404040  40404040  40404040  40404040  C2D3D2C4  F0F0F2F0**
02E3E7E3  40000000  40400004  40400002  00001F40  40404040  40404040
40404040  40404040  40404040  40404040  40404040  40404040  40404040
40404040  40404040  40404040  40404040  C2D3D2C4  F0F0F2F1*
02E3E7E3  40000000  40400004  40400003  00000006  40404040  40404040
40404040  40404040  40404040  40404040  40404040  40404040  40404040
40404040  40404040  40404040  40404040  C2D3D2C4  F0F0F2F2*
02E3E7E3  40000000  40400004  40400005  00000000  40404040  40404040
40404040  40404040  40404040  40404040  40404040  40404040  40404040
40404040  40404040  40404040  40404040  C2D3D2C4  F0F0F2F3*
02E3E7E3  400CD144  40400004  40400005  00000000  40404040  40404040
40404040  40404040  40404040  40404040  40404040  40404040  40404040
40404040  40404040  40404040  40404040  C2D3D2C4  F0F0F2F4*
02E3E7E3  40000000  40400004  40400006  00000000  40404040  40404040
40404040  40404040  40404040  40404040  40404040  40404040  40404040
40404040  40404040  40404040  40404040  C2D3D2C4  F0F0F2F5*
02E3E7E3  40000000  40400004  40400007  00000000  40404040  40404040
40404040  40404040  40404040  40404040  40404040  40404040  40404040
40404040  40404040  40404040  40404040  C2D3D2C4  F0F0F2F6*
02E3E7E3  400007D4  40400004  40400007  00000000  40404040  40404040
40404040  40404040  40404040  40404040  40404040  40404040  40404040
40404040  40404040  40404040  40404040  C2D3D2C4  F0F0F2F7*
02E3E7E3  40058618  40400004  40400007  00000000  40404040  40404040
40404040  40404040  40404040  40404040  40404040  40404040  40404040
40404040  40404040  40404040  40404040  C2D3D2C4  F0F0F2F8*
02E3E7E3  400B045C  40400004  40400007  00000000  40404040  40404040
40404040  40404040  40404040  40404040  40404040  40404040  40404040
40404040  40404040  40404040  40404040  C2D3D2C4  F0F0F2F9*
02E3E7E3  401082A0  40400008  40400007  00000000  00000000  40404040
40404040  40404040  40404040  40404040  40404040  40404040  40404040
40404040  40404040  40404040  40404040  C2D3D2C4  F0F0F3F0**
02E3E7E3  40000000  40400004  40400008  00000000  40404040  40404040
40404040  40404040  40404040  40404040  40404040  40404040  40404040
40404040  40404040  40404040  40404040  C2D3D2C4  F0F0F3F1*
02E3E7E3  40000014  40400004  4040000A  40F24BF7  40404040  40404040
40404040  40404040  40404040  40404040  40404040  40404040  40404040
40404040  40404040  40404040  40404040  C2D3D2C4  F0F0F3F2*
02E3E7E3  40000190  40400004  4040000B  00000000  40404040  40404040
40404040  40404040  40404040  40404040  40404040  40404040  40404040
40404040  40404040  40404040  40404040  C2D3D2C4  F0F0F3F3*
02E3E7E3  40000000  40400004  4040000C  00000000  40404040  40404040
40404040  40404040  40404040  40404040  40404040  40404040  40404040
```

```
40404040  40404040  40404040  40404040  C2D3D2C4  F0F0F3F4*
02E3E7E3  40000000  40400004  4040000D  00000000  40404040  40404040
40404040  40404040  40404040  40404040  40404040  40404040  40404040
40404040  40404040  40404040  40404040  C2D3D2C4  F0F0F3F5*
02E3E7E3  40000000  40400004  4040000E  00000000  40404040  40404040
40404040  40404040  40404040  40404040  40404040  40404040  40404040
40404040  40404040  40404040  40404040  C2D3D2C4  F0F0F3F6*
02E3E7E3  40000030  40400004  4040000F  00000000  40404040  40404040
40404040  40404040  40404040  40404040  40404040  40404040  40404040
40404040  40404040  40404040  40404040  C2D3D2C4  F0F0F3F7*
02E3E7E3  40002580  40400004  40400010  00000000  40404040  40404040
40404040  40404040  40404040  40404040  40404040  40404040  40404040
40404040  40404040  40404040  40404040  C2D3D2C4  F0F0F3F8*
02E3E7E3  40002D54  40400004  40400010  00000000  40404040  40404040
40404040  40404040  40404040  40404040  40404040  40404040  40404040

MEMBER NAME  BLOCK1
40404040  40404040  40404040  40404040  C2D3D2C4  F0F0F3F9*
02E3E7E3  40001C20  40400004  40400011  00000000  40404040  40404040
40404040  40404040  40404040  40404040  40404040  40404040  40404040
40404040  40404040  40404040  40404040  C2D3D2C4  F0F0F4F0**
02C5D5C4  40404040  40404040  40404040  40404040  40404040  40404040
40404040  F1F5F7F3  F460C6D6  F34040F0  F2F0F2F8  F7F0F9F8  40F0F84B
F1F24BF3  F4404040  C2D3D2C4  0001748E  C2D3D2C4  F0F0F4F1**

MEMBER NAME  BLDRESOL
02C5E2C4  40404040  40400010  40400001  D9C5E2D6  D3E54040  00000000
40000000  40404040  40404040  40404040  40404040  40404040  40404040
40404040  40404040  40404040  40404040  D9C5E2D6  F0F0F0F1*
02E3E7E3  40000000  40400038  40400001  47F0F00C  07D9C5E2  D6D3E540
90ECD00C  9823F024  184D58D0  F02C9034  D00050D0  400807F2  40404040
40404040  40404040  021A1240  E2D7D3D7  D9C5E2D6  F0F0F0F2*
02E3E7E3  40000038  40400038  40400001  E3E240C1  D9D9C1E8  40C6E4D3
D322021A  1240E2C5  D3D4E3C2  40C1D9D9  C1E840C6  E4D3D322  021A2540
C5D9D9D6  D940C9D5  40C2C3E2  D3C9C240  D9C5E2D6  F0F0F0F3*
02E3E7E3  40000070  40400015  40400001  C9D540D9  C5E2D6D3  E540E2E4
C2D9D6E4  E3C9D5C5  22404040  40404040  40404040  40404040  40404040
40404040  40404040  40404040  40404040  D9C5E2D6  F0F0F0F4*
02E3E7E3  40000260  40400038  40400001  00000000  00000000  4E000000
00000000  4F080000  00000000  4E000000  80000000  41100000  00000000
41200000  00000000  42B40000  00000000  D9C5E2D6  F0F0F0F5*
02E3E7E3  40000298  40400038  40400001  00000000  00000000  00000000
00000001  00000001  00000002  00000003  00000004  00000005  00000006
00000007  00000008  00000009  0000000A  D9C5E2D6  F0F0F0F6*
02C5E2C4  40404040  40400010  40400002  C3C4E3C3  D6D44040  05000000
4000008C  40404040  40404040  40404040  40404040  40404040  40404040
40404040  40404040  40404040  40404040  D9C5E2D6  F0F0F0F7*
02E3E7E3  400002D0  40400038  40400001  0000000B  0000000C  00000010
00000014  00000018  00000020  0000002C  00000038  000003E8  00002710
41100000  41400000  00000000  00000000  D9C5E2D6  F0F0F0F8*
02C5E2C4  40404040  40400010  40400003  E2D7D3D7  E3E24040  05000000
40030D44  40404040  40404040  40404040  40404040  40404040  40404040
40404040  40404040  40404040  40404040  D9C5E2D6  F0F0F0F9*
02C5E2C4  40404040  40400010  40400004  E3D6D3C5  D9404040  05000000
4000000C  40404040  40404040  40404040  40404040  40404040  40404040
40404040  40404040  40404040  40404040  D9C5E2D6  F0F0F1F0**
02C5E2C4  40404040  40400010  40400005  C5D3D4E3  C2D34040  05000000
400D7D28  40404040  40404040  40404040  40404040  40404040  40404040
40404040  40404040  40404040  40404040  D9C5E2D6  F0F0F1F1*
```

```
02C5E2C4  40404040  40400010  40400006  D7E3C1C2  D3C54040  05000000
40125768  40404040  40404040  40404040  40404040  40404040  40404040
40404040  40404040  40404040  40404040  D9C5E2D6  F0F0F1F2*
02E3E7E3  400009C0  40400020  40400001  00000000  FFFFFFEC  00000000
FFFFFFC8  000CD118  FFFFFFEC  00058600  000B0444  40404040  40404040
40404040  40404040  40404040  40404040  D9C5E2D6  F0F0F1F3*
02D9D3C4  40404040  40400038  40404040  00020001  0C0009C0  00030001
0C0009C4  00040001  0C0009C8  00050001  0C0009CC  00050001  0C0009D0
00060001  0C0009D4  00060001  0C0009D8  D9C5E2D6  F0F0F1F4*
02C5E2C4  40404040  40400010  40400007  E5F9F840  40404040  05000000
40000004  40404040  40404040  40404040  40404040  40404040  40404040
40404040  40404040  40404040  40404040  D9C5E2D6  F0F0F1F5*
02C5E2C4  40404040  40400010  40400008  E5F9F940  40404040  05000000
4000003C  40404040  40404040  40404040  40404040  40404040  40404040
40404040  40404040  40404040  40404040  D9C5E2D6  F0F0F1F6*
02C5E2C4  40404040  40400010  40400009  C4E5C9C5  E6E24040  05000000
40000004  40404040  40404040  40404040  40404040  40404040  40404040
40404040  40404040  40404040  40404040  D9C5E2D6  F0F0F1F7*
02C5E2C4  40404040  40400010  4040000A  C9E2C1E3  E3404040  05000000
40000004  40404040  40404040  40404040  40404040  40404040  40404040
40404040  40404040  40404040  40404040  D9C5E2D6  F0F0F1F8*
02C5E2C4  40404040  40400010  4040000B  E2D3C9D5  C5E24040  05000000
40001C24  40404040  40404040  40404040  40404040  40404040  40404040
40404040  40404040  40404040  40404040  D9C5E2D6  F0F0F1F9*
02E3E7E3  400009E0  4040001C  40400001  00108298  00000000  FFFFFFFC

MEMBER NAME  BLDRESOL
00000000  00000000  FFFFFFE4  00001C20  40404040  40404040  40404040
40404040  40404040  40404040  40404040  D9C5E2D6  F0F0F2F0**
02D9D3C4  40404040  40400038  40404040  00060001  0C0009DC  00060001
0C0009E0  00070001  0C0009E4  00080001  0C0009E8  00090001  0C0009EC
000A0001  0C0009F0  000B0001  0C0009F4  D9C5E2D6  F0F0F2F1*
02E3E7E3  400009FC  40400004  40400001  00000000  40404040  40404040
40404040  40404040  40404040  40404040  40404040  40404040  40404040
40404040  40404040  40404040  40404040  D9C5E2D6  F0F0F2F2*
02E3E7E3  40000A04  40400004  40400001  00000000  40404040  40404040
40404040  40404040  40404040  40404040  40404040  40404040  40404040
40404040  40404040  40404040  40404040  D9C5E2D6  F0F0F2F3*
02E3E7E3  40000A0C  40400004  40400001  00000000  40404040  40404040
40404040  40404040  40404040  40404040  40404040  40404040  40404040
40404040  40404040  40404040  40404040  D9C5E2D6  F0F0F2F4*
02E3E7E3  40000A14  40400004  40400001  00000000  40404040  40404040
40404040  40404040  40404040  40404040  40404040  40404040  40404040
40404040  40404040  40404040  40404040  D9C5E2D6  F0F0F2F5*
02E3E7E3  40000A1C  40400004  40400001  00000000  40404040  40404040
40404040  40404040  40404040  40404040  40404040  40404040  40404040
40404040  40404040  40404040  40404040  D9C5E2D6  F0F0F2F6*
02E3E7E3  40000A24  40400004  40400001  00000000  40404040  40404040
40404040  40404040  40404040  40404040  40404040  40404040  40404040
40404040  40404040  40404040  40404040  D9C5E2D6  F0F0F2F7*
02E3E7E3  40000A2C  40400004  40400001  00000000  40404040  40404040
40404040  40404040  40404040  40404040  40404040  40404040  40404040
40404040  40404040  40404040  40404040  D9C5E2D6  F0F0F2F8*
02E3E7E3  40000A34  40400004  40400001  00000000  40404040  40404040
40404040  40404040  40404040  40404040  40404040  40404040  40404040
40404040  40404040  40404040  40404040  D9C5E2D6  F0F0F2F9*
02E3E7E3  40000A3C  40400004  40400001  00000000  40404040  40404040
40404040  40404040  40404040  40404040  40404040  40404040  40404040
40404040  40404040  40404040  40404040  D9C5E2D6  F0F0F3F0**
```

```
                                                                      PAGE 0047
02E3E7E3  40000A44  40400004  40400001  00000000  40404040  40404040
40404040  40404040  40404040  40404040  40404040  40404040  40404040
40404040  40404040  40404040  40404040  D9C5E2D6  F0F0F3F1*
02E3E7E3  40000A4C  40400004  40400001  00000000  40404040  40404040
40404040  40404040  40404040  40404040  40404040  40404040  40404040
40404040  40404040  40404040  40404040  D9C5E2D6  F0F0F3F2*
02E3E7E3  40000A54  40400004  40400001  00000000  40404040  40404040
40404040  40404040  40404040  40404040  40404040  40404040  40404040
40404040  40404040  40404040  40404040  D9C5E2D6  F0F0F3F3*
02E3E7E3  40000A5C  40400004  40400001  00000000  40404040  40404040
40404040  40404040  40404040  40404040  40404040  40404040  40404040
40404040  40404040  40404040  40404040  D9C5E2D6  F0F0F3F4*
02E3E7E3  40000A64  40400004  40400001  00000000  40404040  40404040
40404040  40404040  40404040  40404040  40404040  40404040  40404040
40404040  40404040  40404040  40404040  D9C5E2D6  F0F0F3F5*
02E3E7E3  40000A6C  40400004  40400001  00000000  40404040  40404040
40404040  40404040  40404040  40404040  40404040  40404040  40404040
40404040  40404040  40404040  40404040  D9C5E2D6  F0F0F3F6*
02E3E7E3  40000A74  40400004  40400001  00000000  40404040  40404040
40404040  40404040  40404040  40404040  40404040  40404040  40404040
40404040  40404040  40404040  40404040  D9C5E2D6  F0F0F3F7*
02C5E2C4  40404040  40400010  4040000C  C2E3E7E3  40404040  02000000
40000000  40404040  40404040  40404040  40404040  40404040  40404040
40404040  40404040  40404040  40404040  D9C5E2D6  F0F0F3F8*
02E3E7E3  40000A7C  40400004  40400001  00000000  40404040  40404040
40404040  40404040  40404040  40404040  40404040  40404040  40404040

MEMBER NAME  BLDRESOL
40404040  40404040  40404040  40404040  D9C5E2D6  F0F0F3F9*
02C5E2C4  40404040  40400010  4040000D  C4C3D6E2  40404040  02000000
40000000  40404040  40404040  40404040  40404040  40404040  40404040
40404040  40404040  40404040  40404040  D9C5E2D6  F0F0F4F0**
02C5E2C4  40404040  40400010  4040000E  C4E2C9D5  40404040  02000000
40000000  40404040  40404040  40404040  40404040  40404040  40404040
40404040  40404040  40404040  40404040  D9C5E2D6  F0F0F4F1*
02E3E7E3  40000A84  40400010  40400001  00000000  00000000  00000000
00000000  40404040  40404040  40404040  40404040  40404040  40404040
40404040  40404040  40404040  40404040  D9C5E2D6  F0F0F4F2*
02C5E2C4  40404040  40400010  4040000F  E4D5C9E3  40404040  02000000
40000000  40404040  40404040  40404040  40404040  40404040  40404040
40404040  40404040  40404040  40404040  D9C5E2D6  F0F0F4F3*
02E3E7E3  40000A98  40400004  40400001  00000000  40404040  40404040
40404040  40404040  40404040  40404040  40404040  40404040  40404040
40404040  40404040  40404040  40404040  D9C5E2D6  F0F0F4F4*
02E3E7E3  40000AA0  40400008  40400001  00000000  00000000  40404040
40404040  40404040  40404040  40404040  40404040  40404040  40404040
40404040  40404040  40404040  40404040  D9C5E2D6  F0F0F4F5*
02E3E7E3  40000AAC  40400004  40400001  00000000  40404040  40404040
40404040  40404040  40404040  40404040  40404040  40404040  40404040
40404040  40404040  40404040  40404040  D9C5E2D6  F0F0F4F6*
02E3E7E3  40000AB4  40400004  40400001  00000000  40404040  40404040
40404040  40404040  40404040  40404040  40404040  40404040  40404040
40404040  40404040  40404040  40404040  D9C5E2D6  F0F0F4F7*
02E3E7E3  40000ABC  40400004  40400001  00000000  40404040  40404040
40404040  40404040  40404040  40404040  40404040  40404040  40404040
40404040  40404040  40404040  40404040  D9C5E2D6  F0F0F4F8*
02C5E2C4  40404040  40400010  40400010  D4E5C3C8  D9404040  02000000
40000000  40404040  40404040  40404040  40404040  40404040  40404040
40404040  40404040  40404040  40404040  D9C5E2D6  F0F0F4F9*
```

```
                                                                PAGE 0048
02E3E7E3  40000AC4  40400004  40400001  00000000  40404040  40404040
40404040  40404040  40404040  40404040  40404040  40404040  40404040
40404040  40404040  40404040  40404040  D9C5E2D6  F0F0F5F0**
02C5E2C4  40404040  40400010  40400011  E2D4E7D4  D5404040  02000000
40000000  40404040  40404040  40404040  40404040  40404040  40404040
40404040  40404040  40404040  40404040  D9C5E2D6  F0F0F5F1*
02E3E7E3  40000ACC  4040000C  40400001  00000000  00000000  00000000
40404040  40404040  40404040  40404040  40404040  40404040  40404040
40404040  40404040  40404040  40404040  D9C5E2D6  F0F0F5F2*
02E3E7E3  40000ADC  40400004  40400001  00000000  40404040  40404040
40404040  40404040  40404040  40404040  40404040  40404040  40404040
40404040  40404040  40404040  40404040  D9C5E2D6  F0F0F5F3*
02E3E7E3  40000AE4  40400004  40400001  00000000  40404040  40404040
40404040  40404040  40404040  40404040  40404040  40404040  40404040
40404040  40404040  40404040  40404040  D9C5E2D6  F0F0F5F4*
02C5E2C4  40404040  40400010  40400012  C1D9D6E3  E7E34040  02000000
40000000  40404040  40404040  40404040  40404040  40404040  40404040
40404040  40404040  40404040  40404040  D9C5E2D6  F0F0F5F5*
02E3E7E3  40000AEC  40400004  40400001  00000000  40404040  40404040
40404040  40404040  40404040  40404040  40404040  40404040  40404040
40404040  40404040  40404040  40404040  D9C5E2D6  F0F0F5F6*
02E3E7E3  40000AF4  40400004  40400001  00000000  40404040  40404040
40404040  40404040  40404040  40404040  40404040  40404040  40404040
40404040  40404040  40404040  40404040  D9C5E2D6  F0F0F5F7*
02D9D3C4  40404040  40400038  40404040  000B0001  0C0009F8  000C0001
1C000A84  000D0001  1C000A88  000E0001  1C000A8C  000F0001  1C000AA0
00100001  1C000ACC  00110001  1C000AD0  D9C5E2D6  F0F0F5F8*

MEMBER NAME  BLDRESOL
02C5E2C4  40404040  40400010  40400013  C1E3E3D9  C9C24040  02000000
40000000  40404040  40404040  40404040  40404040  40404040  40404040
40404040  40404040  40404040  40404040  D9C5E2D6  F0F0F5F9*
02C5E2C4  40404040  40400010  40400014  C3C4E3C1  D9C34040  02000000
40000000  40404040  40404040  40404040  40404040  40404040  40404040
40404040  40404040  40404040  40404040  D9C5E2D6  F0F0F6F0**
02C5E2C4  40404040  40400010  40400015  C4C1D9C3  D6E24040  02000000
40000000  40404040  40404040  40404040  40404040  40404040  40404040
40404040  40404040  40404040  40404040  D9C5E2D6  F0F0F6F1*
02C5E2C4  40404040  40400010  40400016  C5D3D3C3  E5E34040  02000000
40000000  40404040  40404040  40404040  40404040  40404040  40404040
40404040  40404040  40404040  40404040  D9C5E2D6  F0F0F6F2*
02E3E7E3  40000AF8  40400010  40400001  00000000  00000000  00000000
00000000  40404040  40404040  40404040  40404040  40404040  40404040
40404040  40404040  40404040  40404040  D9C5E2D6  F0F0F6F3*
02C5E2C4  40404040  40400010  40400017  C5D3D5C1  D4C54040  02000000
40000000  40404040  40404040  40404040  40404040  40404040  40404040
40404040  40404040  40404040  40404040  D9C5E2D6  F0F0F6F4*
02E3E7E3  40000B0C  4040000C  40400001  00000000  00000000  00000000
40404040  40404040  40404040  40404040  40404040  40404040  40404040
40404040  40404040  40404040  40404040  D9C5E2D6  F0F0F6F5*
02C5E2C4  40404040  40400010  40400018  C6E3C9D5  C6D64040  02000000
40000000  40404040  40404040  40404040  40404040  40404040  40404040
40404040  40404040  40404040  40404040  D9C5E2D6  F0F0F6F6*
02E3E7E3  40000B1C  40400004  40400001  00000000  40404040  40404040
40404040  40404040  40404040  40404040  40404040  40404040  40404040
40404040  40404040  40404040  40404040  D9C5E2D6  F0F0F6F7*
02C5E2C4  40404040  40400010  40400019  C9C2C3D6  D47B4040  02000000
40000000  40404040  40404040  40404040  40404040  40404040  40404040
40404040  40404040  40404040  40404040  D9C5E2D6  F0F0F6F8*
```

```
02E3E7E3  40000B24  40400008  40400001  00000000  00000000  40404040
40404040  40404040  40404040  40404040  40404040  40404040  40404040
40404040  40404040  40404040  40404040  D9C5E2D6  F0F0F6F9*
02D9D3C4  40404040  40400038  40404040  00120001  1C000AF4  00130001
1C000AF8  00140001  1C000AFC  00150001  1C000B00  00160001  1C000B0C
00170001  1C000B10  00180001  1C000B24  D9C5E2D6  F0F0F7F0**
02C5E2C4  40404040  40400010  4040001A  D2D6D4D7  D9E54040  02000000
40000000  40404040  40404040  40404040  40404040  40404040  40404040
40404040  40404040  40404040  40404040  D9C5E2D6  F0F0F7F1*
02C5E2C4  40404040  40400010  4040001B  D9C5E3D9  C5E54040  02000000
40000000  40404040  40404040  40404040  40404040  40404040  40404040
40404040  40404040  40404040  40404040  D9C5E2D6  F0F0F7F2*
02C5E2C4  40404040  40400010  4040001C  E3E7E3D5  C6D64040  02000000
40000000  40404040  40404040  40404040  40404040  40404040  40404040
40404040  40404040  40404040  40404040  D9C5E2D6  F0F0F7F3*
02E3E7E3  40000B2C  4040000C  40400001  00000000  00000000  00000000
40404040  40404040  40404040  40404040  40404040  40404040  40404040
40404040  40404040  40404040  40404040  D9C5E2D6  F0F0F7F4*
02E3E7E3  40000B3C  40400008  40400001  00000000  00000000  40404040
40404040  40404040  40404040  40404040  40404040  40404040  40404040
40404040  40404040  40404040  40404040  D9C5E2D6  F0F0F7F5*
02E3E7E3  40000B48  40400004  40400001  00000000  40404040  40404040
40404040  40404040  40404040  40404040  40404040  40404040  40404040
40404040  40404040  40404040  40404040  D9C5E2D6  F0F0F7F6*
02E3E7E3  40000B50  40400004  40400001  00000000  40404040  40404040
40404040  40404040  40404040  40404040  40404040  40404040  40404040
40404040  40404040  40404040  40404040  D9C5E2D6  F0F0F7F7*
02E3E7E3  400008FC  40400028  40400001  00000000  00000000  00000000

MEMBER NAME  BLDRESOL
00000000  00000000  00000000  00000000  00000000  00000000  00000000
40404040  40404040  40404040  40404040  D9C5E2D6  F0F0F7F8*
02E3E7E3  40000B94  40400038  40400001  5880D93C  5890D948  58A0D944
1BFF58E0  D00007FE  5880D93C  5890D948  58A0D944  5800D220  5000D4BC
1BFF58E0  D00007FE  5880D93C  5890D948  D9C5E2D6  F0F0F7F9*
02E3E7E3  40000BCC  40400038  40400001  58A0D944  5800D214  5000D284
1BFF58E0  D00007FE  5880D93C  5890D948  58A0D944  1BFF58E0  D00007FE
5880D93C  5890D948  58A0D944  5800D210  D9C5E2D6  F0F0F8F0**
02E3E7E3  40000C04  40400038  40400001  58F0D95C  5000F000  58F0D960
5000F028  5800D224  5000D3A8  5800D220  5000D2B4  5800D2DC  12004770
DBCE5800  D2145000  D2B47800  D35858F0  D9C5E2D6  F0F0F8F1*
02E3E7E3  40000C3C  40400038  40400001  D9607000  F02458F0  DA444110
D06405EF  58F0DA44  4110D070  05EF58F0  DAA44110  D07C05EF  41E00004
15FE4720  DBE858EF  D04C07FE  5800D4E8  D9C5E2D6  F0F0F8F2*
02E3E7E3  40000C74  40400038  40400001  12004770  DBFA5800  D2145000
D2B45800  D4E81200  4770DC10  5800D21C  58F0D95C  5000F000  58F0D960
5800F034  1BFF860F  DC261BFF  58E0D000  D9C5E2D6  F0F0F8F3*
02E3E7E3  40000CAC  40400038  40400001  07FE58F0  DAA44110  D09405EF
41E00004  15FE4720  DC4058EF  D05407FE  5800D4E8  12004780  DC521BFF
58E0D000  07FE5800  D2145000  D2B458F0  D9C5E2D6  F0F0F8F4*
02E3E7E3  40000CE4  40400038  40400001  DA444110  D0AC05EF  5800D220
5000D3A8  5800D21C  58F0D960  5000F028  1BFF58E0  D00007FE  5880D93C
5890D948  58A0D944  1BFF58E0  D00007FE  D9C5E2D6  F0F0F8F5*
02E3E7E3  40000D1C  40400038  40400001  5880D93C  5890D948  58A0D944
1BFF58E0  D00007FE  5880D93C  5890D948  58A0D944  58F0D95C  5800F000
1BFF870F  DCCA1BFF  58E0D000  07FE58F0  D9C5E2D6  F0F0F8F6*
02E3E7E3  40000D54  40400038  40400001  D9605800  F0281BFF  870FDCE0
1BFF58E0  D00007FE  58F0DA88  4110D0B8  05EF5800  D34C5000  D34458F0
DA704110  D0C805EF  5800D4FC  58F0D968  D9C5E2D6  F0F0F8F7*
```

```
02E3E7E3  40000D8C  40400038  40400001  5900F000  4770DDA4  5800D4EC
12004770  DD1E1BFF  58E0D000  07FE58F0  DAB44110  D0F405EF  41E00004
15FE4720  DD3858EF  D05C07FE  58F0D970  D9C5E2D6  F0F0F8F8*
02E3E7E3  40000DC4  40400038  40400001  5830F000  5A30D220  5030F000
58F0D984  7820F004  5C20D258  58F0D96C  7023F004  58F0D984  7820F008
58F0D96C  7023F008  58F0D98C  7820F004  D9C5E2D6  F0F0F8F9*
02E3E7E3  40000DFC  40400038  40400001  58F0D96C  7023F00C  58F0D98C
7820F008  58F0D96C  7023F010  7820D86C  7023F014  7820D870  7023F018
1BFF58E0  D00007FE  5800D2B8  5900D230  D9C5E2D6  F0F0F9F0**
02E3E7E3  40000E34  40400038  40400001  4750DDB8  1BFF58E0  D00007FE
5830A038  5A30D220  5030A038  5C20D264  7800D270  7003A004  58F0D958
5800F008  5700D1F4  5000D1E4  6820D1E0  D9C5E2D6  F0F0F9F1*
02E3E7E3  40000E6C  40400038  40400001  6B20D1F0  7023A008  58F0D984
7820F004  7023A00C  7820F008  7023A010  58F0D98C  7820F004  7023A014
7820F008  7023A018  4103A01C  5000D104  D9C5E2D6  F0F0F9F2*
02E3E7E3  40000EA4  40400038  40400001  58F0DA44  4110D100  05EF1BFF
58E0D000  07FE5880  D93C5890  D94858A0  D9441BFF  58E0D000  07FE5880
D93C5890  D94858A0  D94458F0  D95C5800  D9C5E2D6  F0F0F9F3*
02E3E7E3  40000EDC  40400038  40400001  F0001BFF  870FDE64  1BFF58E0
D00007FE  58F0D960  5800F028  1BFF870F  DE7A1BFF  58E0D000  07FE5800
D2B85900  D2304750  DE8E1BFF  58E0D000  D9C5E2D6  F0F0F9F4*
02E3E7E3  40000F14  40400038  40400001  07FE58F0  D9847820  F0047A20
D2F458F0  D98C7020  F00458F0  D9847820  F00858F0  D98C7020  F00858F0
D9847820  F0047B20  D2F47020  D8607820  D9C5E2D6  F0F0F9F5*
02E3E7E3  40000F4C  40400038  40400001  F0087020  D86458F0  DA744110
D10C05EF  58F0DA74  4110D11C  05EF1BFF  58E0D000  07FE5880  D93C5890
D94858A0  D94458F0  D95C5800  F0001BFF  D9C5E2D6  F0F0F9F6*
02E3E7E3  40000F84  40400038  40400001  870FDF08  1BFF58E0  D00007FE
58F0D960  5800F028  1BFF870F  DF1E1BFF  58E0D000  07FE5800  D2B85900

MEMBER NAME  BLDRESOL
D2304750  DF321BFF  58E0D000  07FE5800  D9C5E2D6  F0F0F9F7*
02E3E7E3  40000FBC  40400038  40400001  D3B85B00  D2205000  D3BC5800
D2205000  D2845880  D2205890  D9EC5850  D9585800  D2841A08  5000D288
5830A038  1A385030  A0385C20  D2647800  D9C5E2D6  F0F0F9F8*
02E3E7E3  40000FF4  40400038  40400001  D2707003  A0045800  50085700
D1F45000  D1E46820  D1E06B20  D1F07023  A0085870  D2845C60  D24C1847
5A40D22C  78249000  7023A00C  5870D284  D9C5E2D6  F0F0F9F9*
02E3E7E3  4000102C  40400038  40400001  5C60D24C  18475A40  D23C7824
90007023  A0105870  D2885C60  D24C1847  5A40D22C  78249000  7023A014
5870D288  5C60D24C  18475A40  D23C7824  D9C5E2D6  F0F1F0F0**
02E3E7E3  40001064  40400038  40400001  90007023  A0184103  A01C5000
D10458F0  DA444110  D10005EF  5800D284  1A085000  D2845900  D3BC47C0
DF525880  D93C5890  D9481BFF  58E0D000  D9C5E2D6  F0F1F0F1*
02E3E7E3  4000109C  40400038  40400001  07FE5880  D93C5890  D94858A0
D94458F0  D95C5800  F0001BFF  870FC038  1BFF58E0  D00007FE  58F0D960
5800F028  1BFF870F  C04E1BFF  58E0D000  D9C5E2D6  F0F1F0F2*
02E3E7E3  400010D4  40400038  40400001  07FE5800  D2B85900  D2304750
C0621BFF  58E0D000  07FE5870  D3B85A70  D2205850  D3B85A50  D2245050
D4D45830  A0385A30  D2205030  A0385C20  D9C5E2D6  F0F1F0F3*
02E3E7E3  4000110C  40400038  40400001  D2647800  D2747003  A00458F0
D9585800  F0085700  D1F45000  D1E46820  D1E06B20  D1F07023  A0085C60
D24C5820  D22C1A27  58F0D9BC  7802F000  D9C5E2D6  F0F1F0F4*
02E3E7E3  40001144  40400038  40400001  7000D2A0  5800D23C  5000DAD4
18401A47  7804F000  7000D2A4  5830D24C  1A377803  F0007000  D2A858F0
DA184110  D12C05EF  7820D510  7C20D2A4  D9C5E2D6  F0F1F0F5*
02E3E7E3  4000117C  40400038  40400001  58F0D9EC  33227A22  F0005830
A0385C20  D2647023  A00C7820  D5107C20  D2A07A24  F0007023  A0105C40
D24C5820  D22C1A25  58F0D9BC  7802F000  D9C5E2D6  F0F1F0F6*
```

PAGE 0051

```
02E3E7E3  400011B4  40400038  40400001  7000D2A0  5800D23C  1A055000
DAD858E0  DAD8780E  F0007000  D2A45830  D24C1A35  7803F000  7000D2A8
58F0DA18  4110D12C  05EF5810  A0385C00  D9C5E2D6  F0F1F0F7*
02E3E7E3  400011EC  40400038  40400001  D2645010  DAD07820  D5107C20
D2A458F0  D9EC3322  7A22F000  58E0DAD0  702EA014  7820D510  7C20D2A0
58E0DAD8  58F0D9EC  7A2EF000  58E0DAD0  D9C5E2D6  F0F1F0F8*
02E3E7E3  40001224  40400038  40400001  702EA018  58208014  5A20D220
50208014  18025700  D1F45000  D1E46820  D1E06B20  D1F058E0  DAD0702E
A01C5800  D3B85700  D1F45000  D1E46820  D9C5E2D6  F0F1F0F9*
02E3E7E3  4000125C  40400038  40400001  D1E06B20  D1F058E0  DAD0702E
A0205820  902C5A20  D2205020  902C1802  5700D1F4  5000D1E4  6820D1E0
6B20D1F0  58E0DAD0  702EA024  410EA028  D9C5E2D6  F0F1F1F0**
02E3E7E3  40001294  40400038  40400001  5000D13C  58F0DA44  4110D138
05EF5800  80145B00  D2205000  80145800  D2205000  D28418A8  5890D99C
5880D9BC  5830D9EC  5850A014  5A50D220  D9C5E2D6  F0F1F1F1*
02E3E7E3  400012CC  40400038  40400001  5050A014  5C40D254  5870D284
5C60D24C  18275A20  D22C4105  A0045000  D1484102  30005000  D14C9280
D14C58F0  DA444110  D14405EF  5850A014  D9C5E2D6  F0F1F1F2*
02E3E7E3  40001304  40400038  40400001  5C40D254  5870D284  5C60D24C
18275A20  D22C4105  A00C5000  D1484102  80005000  D14C9280  D14C58F0
DA444110  D14405EF  5850A014  5C40D254  D9C5E2D6  F0F1F1F3*
02E3E7E3  4000133C  40400038  40400001  5820D284  89200002  4105A014
5000D154  41029000  5000D158  9280D158  58F0DA44  4110D150  05EF5800
D2845A00  D2205000  D2845900  D3B847C0  D9C5E2D6  F0F1F1F4*
02E3E7E3  40001374  40400038  40400001  C23C5880  D93C5890  D94858A0
D9445800  80145900  D26C47C0  C32A58F0  DAA01800  45E0F004  00000006
00000030  45E0F010  58F0DAA0  45E0F034  D9C5E2D6  F0F1F1F5*
02E3E7E3  400013AC  40400038  40400001  05404040  F4F45800  902C5900
D26847C0  C35A58F0  DAA01800  45E0F004  00000006  00000046  45E0F010
58F0DAA0  45E0F034  05404040  F4F45820  D9C5E2D6  F0F1F1F6*

MEMBER NAME  BLDRESOL
02E3E7E3  400013E4  40400038  40400001  D3B85A20  D2208920  000258F0
D99C7842  F0005820  D3388920  00027D42  F0005820  D3B85A20  D2248920
00027822  F0005820  D3348920  00027D22  D9C5E2D6  F0F1F1F7*
02E3E7E3  4000141C  40400038  40400001  F0005830  A0385C20  D2642B00
7803A01C  6A00D1E8  6000D1D8  5800D1DC  5000D4DC  2B007803  A0206A00
D1E86000  D1D85800  D1DC5000  D4D85810  D9C5E2D6  F0F1F1F8*
02E3E7E3  40001454  40400038  40400001  902C5C00  D2605010  DADC5800
D3385700  D1F45000  D1E46860  D1E06B60  D1F058E0  DADC706E  90045800
D3345700  D1F45000  D1E46860  D1E06B60  D9C5E2D6  F0F1F1F9*
02E3E7E3  4000148C  40400038  40400001  D1F058E0  DADC706E  9008704E
900C702E  90107800  D218700E  90145800  D3405900  D2284750  C43658E0
DADC7800  D510700E  90145830  D3385A30  D9C5E2D6  F0F1F2F0**
02E3E7E3  400014C4  40400038  40400001  D4DC5B30  D2205820  D3345B20
D3385A20  D2245020  D3505C20  D2544103  80045000  D15C58F0  DA484110
D15C05EF  5830902C  5C20D260  7800D380  D9C5E2D6  F0F1F2F1*
02E3E7E3  400014FC  40400038  40400001  70039018  7800D37C  7003901C
7800D388  70039020  7800D384  70039024  7800D218  70039028  7800D218
7003902C  1BFF58E0  D00007FE  5880D93C  D9C5E2D6  F0F1F2F2*
02E3E7E3  40001534  40400038  40400001  5890D948  58A0D944  58F0D95C
5800F000  1BFF870F  C4CC58F0  D9FC4110  D17805EF  58F0D960  5800F028
1BFF860F  C4E21BFF  58E0D000  07FE58F0  D9C5E2D6  F0F1F2F3*
02E3E7E3  4000156C  40400038  40400001  D9605800  F0341BFF  860FC4F8
1BFF58E0  D00007FE  58F0DA9C  4110D178  05EF1BFF  58E0D000  07FE5880
D93C5890  D94858A0  D94458F0  D95C5800  D9C5E2D6  F0F1F2F4*
02E3E7E3  400015A4  40400038  40400001  F0001BFF  870FC52C  1BFF58E0
D00007FE  58F0D960  5800F028  1BFF870F  C5421BFF  58E0D000  07FE5800
D2B85900  D2304750  C5561BFF  58E0D000  D9C5E2D6  F0F1F2F5*
```

```
                                                                            PAGE 0052
02E3E7E3  400015DC  40400038  40400001  07FE58F0  DA884110  D18405EF
58F0DAA8  4110D194  05EF6800  D1F82300  6000DAF8  58F0DA78  4110D1A4
05EF6000  DB006000  D5302B22  7820D2C0  D9C5E2D6  F0F1F2F6*
02E3E7E3  40001614  40400038  40400001  6C20DB00  6D20D208  6020D538
58F0D984  2B227820  F0046020  D8A02B22  7820F008  6020D8A8  58F0DA00
4110D1A8  05EF6000  DAF82B22  7820D300  D9C5E2D6  F0F1F2F7*
02E3E7E3  4000164C  40400038  40400001  6C20DAF8  6D20D200  6020D8C8
58F0DA04  4110D1A8  05EF6000  DAF82B22  7820D300  6C20DAF8  6D20D200
6020D8D0  6820DB00  6D20D200  6A20D538  D9C5E2D6  F0F1F2F8*
02E3E7E3  40001684  40400038  40400001  6020DAF8  58F0DA00  4110D1AC
05EF6000  DB002B22  7820D304  6C20DB00  6D20D200  6020D8D8  58F0DA04
4110D1B0  05EF6000  DB002B22  7820D304  D9C5E2D6  F0F1F2F9*
02E3E7E3  400016BC  40400038  40400001  6C20DB00  6D20D200  6020D8E0
4100D8B8  5000D1B4  9280D1B4  58F0DA00  4110D1B4  05EF7000  D3084100
D8B85000  D1B49280  D1B458F0  DA044110  D9C5E2D6  F0F1F3F0**
02E3E7E3  400016F4  40400038  40400001  D1B405EF  28407000  D35C2B00
7800D308  6000DAE0  6820D8C8  6C20DAE0  6A20D8A0  2B003804  6000DAE8
6840D8D8  6C40DAE8  2A247020  D3D46840  D9C5E2D6  F0F1F3F1*
02E3E7E3  4000172C  40400038  40400001  D8D06C40  DAE06A40  D8A86860
D8E06C60  DAE82A46  58F0D98C  7B20F004  30227B40  F0083044  7040D368
58F0D940  7920F004  47A0C6E8  7800D368  D9C5E2D6  F0F1F3F2*
02E3E7E3  40001764  40400038  40400001  58F0D940  7900F004  4750C700
6820D8B8  6A20D530  6020D8B8  6820D8C0  6A20D530  6020D8C0  58F0DA84
4110D1B8  05EF5830  A0385A30  D2205030  D9C5E2D6  F0F1F3F3*
02E3E7E3  4000179C  40400038  40400001  A0385C20  D2647800  D2747003
A00458F0  D9585800  F0085700  D1F45000  D1E46820  D1E06B20  D1F07023
A0087820  D7207023  A00C7820  D7247023  D9C5E2D6  F0F1F3F4*
02E3E7E3  400017D4  40400038  40400001  A0105840  D28C8940  00037824
D7187023  A0147824  D71C7023  A0185840  80145A40  D2205040  80141804
5700D1F4  5000D1E4  6820D1E0  6B20D1F0  D9C5E2D6  F0F1F3F5*
02E3E7E3  4000180C  40400038  40400001  7023A01C  5800D28C  5700D1F4

MEMBER NAME  BLDRESOL
5000D1E4  6800D1E0  6B00D1F0  7000DAF0  7800DAF0  7003A020  5840902C
5A40D220  5040902C  18045700  D1F45000  D9C5E2D6  F0F1F3F6*
02E3E7E3  40001844  40400038  40400001  D1E46820  D1E06B20  D1F07023
A0244103  A0285000  D13C58F0  DA444110  D13805EF  58008014  5B00D220
50008014  5800D220  5000D284  5880D28C  D9C5E2D6  F0F1F3F7*
02E3E7E3  4000187C  40400038  40400001  5890D220  58A0D93C  5850A014
1A595050  A0145C40  D2545820  D2848920  00034105  A0045000  D1484102
D7185000  D14C9280  D14C58F0  DA444110  D9C5E2D6  F0F1F3F8*
02E3E7E3  400018B4  40400038  40400001  D14405EF  5850A014  5C40D254
5820D284  89200003  4105A00C  5000D148  4102D538  5000D14C  9280D14C
58F0DA44  4110D144  05EF5850  A0145C40  D9C5E2D6  F0F1F3F9*
02E3E7E3  400018EC  40400038  40400001  D2545820  D2848920  00024105
A0145000  D1544102  D67C5000  D1589280  D15858F0  DA444110  D15005EF
5800D284  1A095000  D2841908  47C0C7FC  D9C5E2D6  F0F1F4F0**
02E3E7E3  40001924  40400038  40400001  5880D93C  5890D948  58A0D944
5850A038  5C40D264  2B007805  A01C6A00  D1E86000  D1D85830  D1DC2B00
7805A020  6A00D1E8  6000D1D8  5820D1DC  D9C5E2D6  F0F1F4F1*
02E3E7E3  4000195C  40400038  40400001  5850902C  5C40D260  7800D270
70059004  7820DAF0  3B207025  90087800  D2187005  900C7800  D2707005
90107800  D2187005  90147000  D5105020  D9C5E2D6  F0F1F4F2*
02E3E7E3  40001994  40400038  40400001  D3505C20  D2544103  80045000
D15C58F0  DA484110  D15C05EF  5830902C  5C20D260  7800D380  70039018
7800D37C  7003901C  7800D388  70039020  D9C5E2D6  F0F1F4F3*
02E3E7E3  400019CC  40400038  40400001  7800D384  70039024  7800D218
70039028  7800D218  7003902C  1BFF58E0  D00007FE  5880D93C  5890D948
58A0D944  1BFF58E0  D00007FE  5880D93C  D9C5E2D6  F0F1F4F4*
```

```
02E3E7E3  40001A04  40400038  40400001  5890D948  58A0D944  1BFF58E0
D00007FE  5880D93C  5890D948  58A0D944  5800D214  5000D328  1BFF58E0
D00007FE  5880D93C  5890D948  58A0D944  D9C5E2D6  F0F1F4F5*
02E3E7E3  40001A3C  40400038  40400001  1BFF58E0  D00007FE  5880D93C
5890D948  58A0D944  58F0D95C  5800F000  1BFF870F  C9DE1BFF  58E0D000
07FE5800  D3B41200  4770C9F0  1BFF58E0  D9C5E2D6  F0F1F4F6*
02E3E7E3  40001A74  40400038  40400001  D00007FE  58F0DA6C  4110D1CC
05EF1BFF  58E0D000  07FE5880  D93C5890  D94858A0  D9441BFF  58E0D000
07FE5880  D93C5890  D94858A0  D9441BFF  D9C5E2D6  F0F1F4F7*
02E3E7E3  40001AAC  40400038  40400001  58E0D000  07FE5880  D93C5890
D94858A0  D9441BFF  58E0D000  07FE5880  D93C5890  D94858A0  D9441BFF
58E0D000  07FE5880  D93C5890  D94858A0  D9C5E2D6  F0F1F4F8*
02E3E7E3  40001AE4  40400038  40400001  D9441BFF  58E0D000  07FE5880
D93C5890  D94858A0  D9445800  D2145000  D4BC1BFF  58E0D000  07FE5880
D93C5890  D94858A0  D9441BFF  58E0D000  D9C5E2D6  F0F1F4F9*
02E3E7E3  40001B1C  40400038  40400001  07FE5880  D93C5890  D94858A0
D9441BFF  58E0D000  07FE5880  D93C5890  D94858A0  D9441BFF  58E0D000
07FE5880  D93C5890  D94858A0  D9441BFF  D9C5E2D6  F0F1F5F0**
02E3E7E3  40001B54  40400038  40400001  58E0D000  07FE5880  D93C5890
D94858A0  D9441BFF  58E0D000  07FE5880  D93C5890  D94858A0  D9441BFF
58E0D000  07FE5880  D93C5890  D94858A0  D9C5E2D6  F0F1F5F1*
02E3E7E3  40001B8C  40400038  40400001  D9441BFF  58E0D000  07FE5880
D93C5890  D94858A0  D9441BFF  58E0D000  07FE58F0  DAA01800  45E0F004
00000006  0000005C  45E0F010  1BFF58E0  D9C5E2D6  F0F1F5F2*
02C5E2C4  40404040  40400010  40404040  C3C4E3E2  E3404040  01001BE4
40000001  40404040  40404040  40404040  40404040  40404040  40404040
40404040  40404040  40404040  40404040  D9C5E2D6  F0F1F5F3*
02E3E7E3  40001BC4  4040001E  40400001  D00007FE  58D0D004  58E0D00C
92FFD00C  982CD01C  07FE58C0  D04847F0  DB0C4040  40404040  40404040
40404040  40404040  40404040  40404040  D9C5E2D6  F0F1F5F4*
02E3E7E3  40001BE4  40400020  40400001  47F0F00C  07C3C4E3  E2E34040
90ECD00C  9823F020  58F0F01C  47F0F014  00000000  40404040  40404040

MEMBER NAME  BLDRESOL
40404040  40404040  40404040  40404040  D9C5E2D6  F0F1F5F5*
02D9D3C4  40404040  40400038  40404040  00190001  1C000B28  001A0001
1C000B2C  001B0001  1C000B30  001C0001  1C000B3C  00010001  0C00139C
00010001  0C0013CC  00010001  0C001BB8  D9C5E2D6  F0F1F5F6*
02E3E7E3  40001C08  40400016  40400001  00001C0C  58D0D004  58E0D00C
92FFD00C  982CD01C  07FE4040  40404040  40404040  40404040  40404040
40404040  40404040  40404040  40404040  D9C5E2D6  F0F1F5F7*
02E3E7E3  40001C04  40400004  40400001  00001C1E  40404040  40404040
40404040  40404040  40404040  40404040  40404040  40404040  40404040
40404040  40404040  40404040  40404040  D9C5E2D6  F0F1F5F8*
02E3E7E3  40001C1E  40400038  40400001  58C0D048  98781008  58207000
5020D4CC  58208000  5020D320  58201000  41302000  41500004  1B255020
DA345030  DA385820  10044130  20004150  D9C5E2D6  F0F1F5F9*
02C5E2C4  40404040  40400010  40404040  C3C4E3C4  E3D64040  01001C68
40000001  40404040  40404040  40404040  40404040  40404040  40404040
40404040  40404040  40404040  40404040  D9C5E2D6  F0F1F6F0**
02E3E7E3  40001C56  40400010  40400001  00041B25  5020DA08  5030DA0C
47F0DB0C  40404040  40404040  40404040  40404040  40404040  40404040
40404040  40404040  40404040  40404040  D9C5E2D6  F0F1F6F1*
02E3E7E3  40001C68  40400020  40400001  47F0F00C  07C3C4E3  C4E3D640
90ECD00C  9823F020  58F0F01C  47F0F014  00000000  40404040  40404040
40404040  40404040  40404040  40404040  D9C5E2D6  F0F1F6F2*
02E3E7E3  40001C8C  40400034  40400001  00001C90  58A0D004  58E0A00C
58B0A018  5810B014  5820D4BC  50201000  5830B018  5840D2B8  50403000
18DA92FF  A00C982C  A01C07FE  40404040  D9C5E2D6  F0F1F6F3*
```

```
02E3E7E3  40001C88  40400004  40400001  00001CC0  40404040  40404040
40404040  40404040  40404040  40404040  40404040  40404040  40404040
40404040  40404040  40404040  40404040  D9C5E2D6  F0F1F6F4*
02E3E7E3  40001CC0  40400038  40400001  58C0D048  987B1008  58207000
5020D318  78208000  7020D358  58209000  5020D4AC  5820A000  5020D4BC
5820B000  5020D2B8  58201000  41302000  D9C5E2D6  F0F1F6F5*
02C5E2C4  40404040  40400010  40404040  C3C4E3C2  C7C44040  01001D30
40000001  40404040  40404040  40404040  40404040  40404040  40404040
40404040  40404040  40404040  40404040  D9C5E2D6  F0F1F6F6*
02E3E7E3  40001CF8  40400038  40400001  41500004  1B255020  D9845030
D9885030  D10C5030  D11C5820  10044130  20004150  00041B25  5020D98C
5030D990  5030D110  5030D124  47F0DB20  D9C5E2D6  F0F1F6F7*
02E3E7E3  40001D30  40400020  40400001  47F0F00C  07C3C4E3  C2C7C440
90ECD00C  9823F020  58F0F01C  47F0F014  00000000  40404040  40404040
40404040  40404040  40404040  40404040  D9C5E2D6  F0F1F6F8*
02E3E7E3  40001D54  40400004  40400001  00001D58  40404040  40404040
40404040  40404040  40404040  40404040  40404040  40404040  40404040
40404040  40404040  40404040  40404040  D9C5E2D6  F0F1F6F9*
02D9D3C4  40404040  40400038  40404040  00010001  0C001C00  00010001
0C001C08  00010001  0C001C04  00010001  0C001C84  00010001  0C001C8C
00010001  0C001C88  00010001  0C001D4C  D9C5E2D6  F0F1F7F0**
02E3E7E3  40001D58  40400024  40400001  58A0D004  58E0A00C  58B0A018
5810B004  5820D284  50201000  18DA92FF  A00C982C  A01C07FE  40404040
40404040  40404040  40404040  40404040  D9C5E2D6  F0F1F7F1*
02E3E7E3  40001D50  40400004  40400001  00001D7C  40404040  40404040
40404040  40404040  40404040  40404040  40404040  40404040  40404040
40404040  40404040  40404040  40404040  D9C5E2D6  F0F1F7F2*
02C5E2C4  40404040  40400010  40404040  C3C4E3C5  C4E34040  01001D98
40000001  40404040  40404040  40404040  40404040  40404040  40404040
40404040  40404040  40404040  40404040  D9C5E2D6  F0F1F7F3*
02E3E7E3  40001D7C  40400038  40400001  58C0D048  98781000  58207000
5020D2DC  58208000  5020D284  47F0DB3C  47F0F00C  07C3C4E3  C5C4E340
90ECD00C  9823F020  58F0F01C  47F0F014  D9C5E2D6  F0F1F7F4*

MEMBER NAME  BLDRESOL
02E3E7E3  40001DB4  40400004  40400001  00000000  40404040  40404040
40404040  40404040  40404040  40404040  40404040  40404040  40404040
40404040  40404040  40404040  40404040  D9C5E2D6  F0F1F7F5*
02E3E7E3  40001DBC  40400028  40400001  00001DC0  58A0D004  58E0A00C
58B0A018  5810B010  5820D284  50201000  18DA92FF  A00C982C  A01C07FE
40404040  40404040  40404040  40404040  D9C5E2D6  F0F1F7F6*
02E3E7E3  40001DB8  40400004  40400001  00001DE4  40404040  40404040
40404040  40404040  40404040  40404040  40404040  40404040  40404040
40404040  40404040  40404040  40404040  D9C5E2D6  F0F1F7F7*
02C5E2C4  40404040  40400010  40404040  C3C4E3C2  E5E44040  01001E18
40000001  40404040  40404040  40404040  40404040  40404040  40404040
40404040  40404040  40404040  40404040  D9C5E2D6  F0F1F7F8*
02E3E7E3  40001DE4  40400038  40400001  58C0D048  987B1000  78207000
7020D290  78208000  7020D294  78209000  7020D298  7820A000  7020D29C
5820B000  5020D284  47F0DB58  47F0F00C  D9C5E2D6  F0F1F7F9*
02E3E7E3  40001E1C  4040001C  40400001  07C3C4E3  C2E5E440  90ECD00C
9823F020  58F0F01C  47F0F014  00000000  40404040  40404040  40404040
40404040  40404040  40404040  40404040  D9C5E2D6  F0F1F8F0**
02E3E7E3  40001E3C  40400038  40400001  00001E40  58A0D004  58E0A00C
58B0A018  5810B004  4820D280  40201000  5830B008  5840D3A8  50403000
5850B00C  5860D2B4  50605000  18DA92FF  D9C5E2D6  F0F1F8F1*
02E3E7E3  40001E74  40400008  40400001  A00C982C  A01C07FE  40404040
40404040  40404040  40404040  40404040  40404040  40404040  40404040
40404040  40404040  40404040  40404040  D9C5E2D6  F0F1F8F2*
```

```
                                                                              PAGE 0055
02E3E7E3  40001E38  40400004  40400001  00001E7C  40404040  40404040
40404040  40404040  40404040  40404040  40404040  40404040  40404040
40404040  40404040  40404040  40404040  D9C5E2D6  F0F1F8F3*
02D9D3C4  40404040  40400038  40404040  00010001  0C001D54  00010001
0C001D50  00010001  0C001DB4  00010001  0C001DBC  00010001  0C001DB8
00010001  0C001E34  00010001  0C001E3C  D9C5E2D6  F0F1F8F4*
02E3E7E3  40001E7C  40400038  40400001  58C0D048  987B1000  58207000
5020D2DC  48208000  4020D280  58209000  5020D3A8  5820A000  5020D2B4
58701020  78207000  7020D358  58201010  D9C5E2D6  F0F1F8F5*
02E3E7E3  40001EB4  40400038  40400001  41302000  41500004  1B255020
DA2C5030  DA305820  10144130  20004150  00041B25  5020D984  5030D988
5030D10C  5030D11C  58201018  41302000  D9C5E2D6  F0F1F8F6*
02E3E7E3  40001EEC  40400038  40400001  41500004  1B255020  D9745030
D9785030  D06C9280  D06C5820  101C4130  20004150  00041B25  5020D97C
5030D980  5030D078  9280D078  5030D0B4  D9C5E2D6  F0F1F8F7*
02C5E2C4  40404040  40400010  40404040  C3C4E3C5  E5E44040  01001F2C
40000001  40404040  40404040  40404040  40404040  40404040  40404040
40404040  40404040  40404040  40404040  D9C5E2D6  F0F1F8F8*
02E3E7E3  40001F24  40400028  40400001  9280D0B4  47F0DB6C  47F0F00C
07C3C4E3  C5E5E440  90ECD00C  9823F020  58F0F01C  47F0F014  00000000
40404040  40404040  40404040  40404040  D9C5E2D6  F0F1F8F9*
02E3E7E3  40001F50  40400016  40400001  00001F54  58D0D004  58E0D00C
92FFD00C  982CD01C  07FE4040  40404040  40404040  40404040  40404040
40404040  40404040  40404040  40404040  D9C5E2D6  F0F1F9F0**
02E3E7E3  40001F4C  40400004  40400001  00001F66  40404040  40404040
40404040  40404040  40404040  40404040  40404040  40404040  40404040
40404040  40404040  40404040  40404040  D9C5E2D6  F0F1F9F1*
02C5E2C4  40404040  40400010  40404040  C3C4E3C5  D5C44040  01001F7C
40000001  40404040  40404040  40404040  40404040  40404040  40404040
40404040  40404040  40404040  40404040  D9C5E2D6  F0F1F9F2*
02E3E7E3  40001F66  40400014  40400001  58C0D048  58701000  58207000
5020D2DC  47F0DC80  40404040  40404040  40404040  40404040  40404040
40404040  40404040  40404040  40404040  D9C5E2D6  F0F1F9F3*
02E3E7E3  40001F7C  40400020  40400001  47F0F00C  07C3C4E3  C5D5C440

MEMBER NAME  BLDRESOL
90ECD00C  9823F020  58F0F01C  47F0F014  00000000  40404040  40404040
40404040  40404040  40404040  40404040  D9C5E2D6  F0F1F9F4*
02E3E7E3  40001FA0  40400016  40400001  00001FA4  58D0D004  58E0D00C
92FFD00C  982CD01C  07FE4040  40404040  40404040  40404040  40404040
40404040  40404040  40404040  40404040  D9C5E2D6  F0F1F9F5*
02E3E7E3  40001F9C  40400004  40400001  00001FB6  40404040  40404040
40404040  40404040  40404040  40404040  40404040  40404040  40404040
40404040  40404040  40404040  40404040  D9C5E2D6  F0F1F9F6*
02C5E2C4  40404040  40400010  40404040  C3C4E3D3  D5404040  01001FEC
40000001  40404040  40404040  40404040  40404040  40404040  40404040
40404040  40404040  40404040  40404040  D9C5E2D6  F0F1F9F7*
02E3E7E3  40001FB6  40400034  40400001  58C0D048  58201000  41302000
41500004  1B255020  DA345030  DA385820  10044130  20004150  00041B25
5020DA08  5030DA0C  47F0DC94  40404040  D9C5E2D6  F0F1F9F8*
02E3E7E3  40001FEC  40400020  40400001  47F0F00C  07C3C4E3  D3D54040
90ECD00C  9823F020  58F0F01C  47F0F014  00000000  40404040  40404040
40404040  40404040  40404040  40404040  D9C5E2D6  F0F1F9F9*
02D9D3C4  40404040  40400038  40404040  00010001  0C001E38  00010001
0C001F48  00010001  0C001F50  00010001  0C001F4C  00010001  0C001F98
00010001  0C001FA0  00010001  0C001F9C  D9C5E2D6  F0F2F0F0**
02E3E7E3  40002010  40400028  40400001  00002014  58A0D004  58E0A00C
58B0A018  5810B008  5820D2B8  50201000  18DA92FF  A00C982C  A01C07FE
40404040  40404040  40404040  40404040  D9C5E2D6  F0F2F0F1*
```

| | | | | | | |
|---|---|---|---|---|---|---|
| 02E3E7E3 | 4000200C | 40400004 | 40400001 | 00002038 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F2F0F2* | |
| 02E3E7E3 | 40002038 | 40400038 | 40400001 | 58C0D048 | 58701008 | 58207000 |
| 5020D2B8 | 58201000 | 41302000 | 41500004 | 1B255020 | D9845030 | D9885030 |
| D10C5030 | D11C5820 | 10044130 | 20004150 | D9C5E2D6 | F0F2F0F3* | |
| 02C5E2C4 | 40404040 | 40400010 | 40404040 | C3C4E3D7 | E3404040 | 01002088 |
| 40000001 | 40404040 | 40404040 | 40404040 | 40404040 | 40404040 | 40404040 |
| 40404040 | 40404040 | 40404040 | 40404040 | D9C5E2D6 | F0F2F0F4* | |
| 02E3E7E3 | 40002070 | 40400038 | 40400001 | 00041B25 | 5020D98C | 5030D990 |
| 5030D110 | 5030D124 | 47F0DCA8 | 47F0F00C | 07C3C4E3 | D7E34040 | 90ECD00C |
| 9823F020 | 58F0F01C | 47F0F014 | 00000000 | D9C5E2D6 | F0F2F0F5* | |
| 02E3E7E3 | 400020AC | 40400028 | 40400001 | 000020B0 | 58A0D004 | 58E0A00C |
| 58B0A018 | 5810B004 | 5820D2B8 | 50201000 | 18DA92FF | A00C982C | A01C07FE |
| 40404040 | 40404040 | 40404040 | 40404040 | D9C5E2D6 | F0F2F0F6* | |
| 02E3E7E3 | 400020A8 | 40400004 | 40400001 | 000020D4 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F2F0F7* | |
| 02C5E2C4 | 40404040 | 40400010 | 40404040 | C3C4E3C3 | C9D94040 | 01002108 |
| 40000001 | 40404040 | 40404040 | 40404040 | 40404040 | 40404040 | 40404040 |
| 40404040 | 40404040 | 40404040 | 40404040 | D9C5E2D6 | F0F2F0F8* | |
| 02E3E7E3 | 400020D4 | 40400032 | 40400001 | 58C0D048 | 58701004 | 58207000 |
| 5020D2B8 | 58201000 | 41302000 | 41500004 | 1B255020 | D9845030 | D9885030 |
| D10C5030 | D11C47F0 | DE2E4040 | 40404040 | D9C5E2D6 | F0F2F0F9* | |
| 02E3E7E3 | 40002108 | 40400020 | 40400001 | 47F0F00C | 07C3C4E3 | C3C9D940 |
| 90ECD00C | 9823F020 | 58F0F01C | 47F0F014 | 00000000 | 40404040 | 40404040 |
| 40404040 | 40404040 | 40404040 | 40404040 | D9C5E2D6 | F0F2F1F0** | |
| 02E3E7E3 | 4000212C | 40400004 | 40400001 | 00002130 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F2F1F1* | |
| 02D9D3C4 | 40404040 | 40400038 | 40404040 | 00010001 | 0C002008 | 00010001 |
| 0C002010 | 00010001 | 0C00200C | 00010001 | 0C0020A4 | 00010001 | 0C0020AC |
| 00010001 | 0C0020A8 | 00010001 | 0C002124 | D9C5E2D6 | F0F2F1F2* | |
| 02E3E7E3 | 40002130 | 40400024 | 40400001 | 58A0D004 | 58E0A00C | 58B0A018 |
| 5810B008 | 5820D2B8 | 50201000 | 18DA92FF | A00C982C | A01C07FE | 40404040 |

MEMBER NAME BLDRESOL

| | | | | | | |
|---|---|---|---|---|---|---|
| 40404040 | 40404040 | 40404040 | 40404040 | D9C5E2D6 | F0F2F1F3* | |
| 02E3E7E3 | 40002128 | 40400004 | 40400001 | 00002154 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F2F1F4* | |
| 02E3E7E3 | 40002154 | 40400038 | 40400001 | 58C0D048 | 98781004 | 78207000 |
| 7020D2F4 | 58208000 | 5020D2B8 | 58201000 | 41302000 | 41500004 | 1B255020 |
| D9845030 | D9885030 | D10C5030 | D11C47F0 | D9C5E2D6 | F0F2F1F5* | |
| 02C5E2C4 | 40404040 | 40400010 | 40404040 | C3C4E3D4 | D7D34040 | 01002190 |
| 40000001 | 40404040 | 40404040 | 40404040 | 40404040 | 40404040 | 40404040 |
| 40404040 | 40404040 | 40404040 | 40404040 | D9C5E2D6 | F0F2F1F6* | |
| 02E3E7E3 | 4000218C | 40400002 | 40400001 | DE424040 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F2F1F7* | |
| 02E3E7E3 | 40002190 | 40400020 | 40400001 | 47F0F00C | 07C3C4E3 | D4D7D340 |
| 90ECD00C | 9823F020 | 58F0F01C | 47F0F014 | 00000000 | 40404040 | 40404040 |
| 40404040 | 40404040 | 40404040 | 40404040 | D9C5E2D6 | F0F2F1F8* | |
| 02E3E7E3 | 400021B4 | 40400038 | 40400001 | 000021B8 | 58A0D004 | 58E0A00C |
| 58B0A018 | 5810B004 | 5820D3B8 | 50201000 | 5830B008 | 7820D510 | 70203000 |
| 5840B00C | 5850D2B8 | 50504000 | 18DA92FF | D9C5E2D6 | F0F2F1F9* | |
| 02E3E7E3 | 400021EC | 40400008 | 40400001 | A00C982C | A01C07FE | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F2F2F0** | |

```
02E3E7E3  400021B0  40400004  40400001  000021F4  40404040  40404040
40404040  40404040  40404040  40404040  40404040  40404040  40404040
40404040  40404040  40404040  40404040  D9C5E2D6  F0F2F2F1*
02E3E7E3  400021F4  40400038  40400001  58C0D048  987B1004  58207000
5020D3B8  78208000  7020D510  58209000  5020D2B8  5820A000  5020D4C8
5820B000  5020D330  58201000  41302000  D9C5E2D6  F0F2F2F2*
02C5E2C4  40404040  40400010  40404040  C3C4E3E2  D7D34040  01002244
40000001  40404040  40404040  40404040  40404040  40404040  40404040
40404040  40404040  40404040  40404040  D9C5E2D6  F0F2F2F3*
02E3E7E3  4000222C  40400038  40400001  41500004  1B255C40  D2281B25
5020D9EC  5030D9F0  47F0DEE6  47F0F00C  07C3C4E3  E2D7D340  90ECD00C
9823F020  58F0F01C  47F0F014  00000000  D9C5E2D6  F0F2F2F4*
02E3E7E3  40002268  40400038  40400001  0000226C  58A0D004  58E0A00C
58B0A018  5810B000  5820D3B8  50201000  5830B01C  7820D510  70203000
5840B020  5850D338  50504000  5860B024  D9C5E2D6  F0F2F2F5*
02E3E7E3  400022A0  40400020  40400001  5870D334  50706000  5880B028
5890D2B8  50908000  18DA92FF  A00C982C  A01C07FE  40404040  40404040
40404040  40404040  40404040  40404040  D9C5E2D6  F0F2F2F6*
02E3E7E3  40002264  40400004  40400001  000022C0  40404040  40404040
40404040  40404040  40404040  40404040  40404040  40404040  40404040
40404040  40404040  40404040  40404040  40404040  40404040  40404040
02D9D3C4  40404040  40400038  40404040  D9C5E2D6  F0F2F2F7*
0C002128  00010001  0C0021AC  00010001  00010001  0C00212C  00010001
00010001  0C002260  00010001  0C002268  0C0021B4  00010001  0C0021B0
02E3E7E3  400022C0  40400038  40400001  D9C5E2D6  F0F2F2F8*
5020D3B8  58208000  5020D340  987B101C  58C0D048  987B1000  58207000
5020D338  58209000  5020D334  5820A000  78207000  7020D510  58208000
02E3E7E3  400022F8  40400038  40400001  D9C5E2D6  F0F2F2F9*
98781030  78207000  7020D2F8  78208000  5020D2B8  5820B000  5020D4C8
41500004  1B255C40  D2281B25  5020D9EC  7020D2FC  58201008  41302000
02E3E7E3  40002330  40400038  40400001  D9C5E2D6  F0F2F3F0**
41500004  1B255C40  D2281B25  5020D9BC  5030D9F0  5820100C  41302000
41500004  1B255020  D99C5030  D9A05820  5030D9C0  58201010  41302000
02C5E2C4  40404040  40400010  40404040  D9C5E2D6  F0F2F3F1*
40000001  40404040  40404040  40404040  C3C4E3E3  E7E34040  01002398
40404040  40404040  40404040  40404040  40404040  40404040  40404040
                                        D9C5E2D6  F0F2F3F2*
```

MEMBER NAME  BLDRESOL

```
02E3E7E3  40002368  4040002E  40400001  10144130  20004150  00041B25
5020DA8C  5030DA90  58201018  41302000  41500004  1B255020  DA945030
DA9847F0  C0164040  40404040  40404040  D9C5E2D6  F0F2F3F3*
02E3E7E3  40002398  40400020  40400001  47F0F00C  07C3C4E3  E3E7E340
90ECD00C  9823F020  58F0F01C  47F0F014  00000000  40404040  40404040
40404040  40404040  40404040  40404040  D9C5E2D6  F0F2F3F4*
02E3E7E3  400023BC  40400028  40400001  000023C0  58A0D004  58E0A00C
58B0A018  5810B008  5820D3B4  50201000  18DA92FF  A00C982C  A01C07FE
40404040  40404040  40404040  40404040  D9C5E2D6  F0F2F3F5*
02E3E7E3  400023B8  40400004  40400001  000023E4  40404040  40404040
40404040  40404040  40404040  40404040  40404040  40404040  40404040
40404040  40404040  40404040  40404040  D9C5E2D6  F0F2F3F6*
02E3E7E3  400023E4  40400038  40400001  58C0D048  987B1004  78207000
7020D2C0  58208000  5020D3B4  78209000  7020D494  7820A000  7020D498
58201000  41302000  41500004  1B255020  D9C5E2D6  F0F2F3F7*
02C5E2C4  40404040  40400010  40404040  C3C4E3E2  E4D74040  0100244C
40000001  40404040  40404040  40404040  40404040  40404040  40404040
40404040  40404040  40404040  40404040  D9C5E2D6  F0F2F3F8*
02E3E7E3  4000241C  40400038  40400001  DA4C5030  DA505030  D1809280
D1805820  10144130  20004150  00041B25  5020DA10  5030DA14  5030D178
5030D1CC  47F0C4A8  47F0F00C  07C3C4E3  D9C5E2D6  F0F2F3F9*
```

```
                                                                        PAGE 0058
02E3E7E3  40002454  40400018  40400001  E2E4D740  90ECD00C  9823F020
58F0F01C  47F0F014  00000000  40404040  40404040  40404040  40404040
40404040  40404040  40404040  40404040  D9C5E2D6  F0F2F4F0**
02E3E7E3  40002470  40400028  40400001  00002474  58A0D004  58E0A00C
58B0A018  5810B008  5820D3B4  50201000  18DA92FF  A00C982C  A01C07FE
40404040  40404040  40404040  40404040  D9C5E2D6  F0F2F4F1*
02E3E7E3  4000246C  40400004  40400001  00002498  40404040  40404040
40404040  40404040  40404040  40404040  40404040  40404040  40404040
40404040  40404040  40404040  40404040  D9C5E2D6  F0F2F4F2*
02E3E7E3  40002498  40400038  40400001  58C0D048  987B1004  78207000
7020D2C0  58208000  5020D3B4  78209000  7020D494  7820A000  7020D498
987B1018  58207000  5020D314  58208000  D9C5E2D6  F0F2F4F3*
02E3E7E3  400024D0  40400038  40400001  5020D3C8  58209000  5020D36C
5820A000  5020D33C  5820B000  5020D3A0  987B102C  58207000  5020D378
78208000  7020D3CC  58209000  5020D360  D9C5E2D6  F0F2F4F4*
02E3E7E3  40002508  40400038  40400001  7820A000  7020D4A4  7820B000
7020D524  98781040  78207000  7020D4F0  58208000  5020D4B8  58201000
41302000  41500004  1B255020  DA4C5030  D9C5E2D6  F0F2F4F5*
02C5E2C4  40404040  40400010  40404040  C3C4E3D5  E3C54040  0100256C
40000001  40404040  40404040  40404040  40404040  40404040  40404040
40404040  40404040  40404040  40404040  D9C5E2D6  F0F2F4F6*
02E3E7E3  40002540  40400038  40400001  DA505030  D1809280  D1805820
10144130  20004150  00041B25  5020DA10  5030DA14  5030D178  5030D1CC
47F0C4A8  47F0F00C  07C3C4E3  D5E3C540  D9C5E2D6  F0F2F4F7*
02E3E7E3  40002578  40400014  40400001  90ECD00C  9823F020  58F0F01C
47F0F014  00000000  40404040  40404040  40404040  40404040  40404040
40404040  40404040  40404040  40404040  D9C5E2D6  F0F2F4F8*
02D9D3C4  40404040  40400038  40404040  00010001  0C002264  00010001
0C0023B4  00010001  0C0023BC  00010001  0C0023B8  00010001  0C002468
00010001  0C002470  00010001  0C00246C  D9C5E2D6  F0F2F4F9*
02E3E7E3  40002590  40400028  40400001  00002594  58A0D004  58E0A00C
58B0A018  5810B004  5820D3B4  50201000  18DA92FF  A00C982C  A01C07FE
40404040  40404040  40404040  40404040  D9C5E2D6  F0F2F5F0**
02E3E7E3  4000258C  40400004  40400001  000025B8  40404040  40404040
40404040  40404040  40404040  40404040  40404040  40404040  40404040
40404040  40404040  40404040  40404040  D9C5E2D6  F0F2F5F1*
02E3E7E3  400025B8  40400038  40400001  58C0D048  987B1004  58207000

MEMBER NAME  BLDRESOL
5020D3B4  58209000  5020D354  7820A000  7020D3E0  7820B000  7020D520
58201000  41302000  41500004  1B255020  D9C5E2D6  F0F2F5F2*
02C5E2C4  40404040  40400010  40404040  C3C4E3C5  D7E24040  01002620
40000001  40404040  40404040  40404040  40404040  40404040  40404040
40404040  40404040  40404040  40404040  D9C5E2D6  F0F2F5F3*
02E3E7E3  400025F0  40400038  40400001  DA4C5030  DA505030  D1809280
D1805820  10084130  20004150  00041B25  5020DA10  5030DA14  5030D178
5030D1CC  47F0C4A8  47F0F00C  07C3C4E3  D9C5E2D6  F0F2F5F4*
02E3E7E3  40002628  40400018  40400001  C5D7E240  90ECD00C  9823F020
58F0F01C  47F0F014  00000000  40404040  40404040  40404040  40404040
40404040  40404040  40404040  40404040  D9C5E2D6  F0F2F5F5*
02E3E7E3  40002644  40400028  40400001  00002648  58A0D004  58E0A00C
58B0A018  5810B018  5820D2B8  50201000  18DA92FF  A00C982C  A01C07FE
40404040  40404040  40404040  40404040  D9C5E2D6  F0F2F5F6*
02E3E7E3  40002640  40400004  40400001  0000266C  40404040  40404040
40404040  40404040  40404040  40404040  40404040  40404040  40404040
40404040  40404040  40404040  40404040  D9C5E2D6  F0F2F5F7*
02E3E7E3  4000266C  40400038  40400001  58C0D048  987A100C  78207000
7020D300  78208000  7020D304  78209000  7020D2C0  5820A000  5020D2B8
58201000  41302000  41500004  1B255020  D9C5E2D6  F0F2F5F8*
```

```
                                                                PAGE 0059
02E3E7E3  400026A4  40400038  40400001  D9845030  D9885030  D10C5030
D11C5820  10044130  20004150  00041B25  5020D98C  5030D990  5030D110
5030D124  58201008  41302000  41500004  D9C5E2D6  F0F2F5F9*
02C5E2C4  40404040  40400010  40404040  C3C4E3C4  D6E34040  010026EC
40000001  40404040  40404040  40404040  40404040  40404040  40404040
40404040  40404040  40404040  40404040  D9C5E2D6  F0F2F6F0**
02E3E7E3  400026DC  4040000E  40400001  1B255020  D9945030  D99847F0
C50A4040  40404040  40404040  40404040  40404040  40404040  40404040
40404040  40404040  40404040  40404040  D9C5E2D6  F0F2F6F1*
02E3E7E3  400026EC  40400020  40400001  47F0F00C  07C3C4E3  C4D6E340
90ECD00C  9823F020  58F0F01C  47F0F014  00000000  40404040  40404040
40404040  40404040  40404040  40404040  D9C5E2D6  F0F2F6F2*
02E3E7E3  40002710  40400004  40400001  00002714  40404040  40404040
40404040  40404040  40404040  40404040  40404040  40404040  40404040
40404040  40404040  40404040  40404040  D9C5E2D6  F0F2F6F3*
02D9D3C4  40404040  40400038  40404040  00010001  0C002588  00010001
0C002590  00010001  0C00258C  00010001  0C00263C  00010001  0C002644
00010001  0C002640  00010001  0C002708  D9C5E2D6  F0F2F6F4*
02E3E7E3  40002714  40400024  40400001  58A0D004  58E0A00C  58B0A018
5810B008  5820D2B8  50201000  18DA92FF  A00C982C  A01C07FE  40404040
40404040  40404040  40404040  40404040  D9C5E2D6  F0F2F6F5*
02E3E7E3  4000270C  40400004  40400001  00002738  40404040  40404040
40404040  40404040  40404040  40404040  40404040  40404040  40404040
40404040  40404040  40404040  40404040  D9C5E2D6  F0F2F6F6*
02E3E7E3  40002738  40400038  40400001  58C0D048  98781004  78207000
7020D298  58208000  5020D2B8  58201000  41302000  41500004  1B255020
D9845030  D9885030  D10C5030  D11C47F0  D9C5E2D6  F0F2F6F7*
02C5E2C4  40404040  40400010  40404040  C3C4E3E3  D9C94040  01002774
40000001  40404040  40404040  40404040  40404040  40404040  40404040
40404040  40404040  40404040  40404040  D9C5E2D6  F0F2F6F8*
02E3E7E3  40002770  40400002  40400001  C9644040  40404040  40404040
40404040  40404040  40404040  40404040  40404040  40404040  40404040
40404040  40404040  40404040  40404040  D9C5E2D6  F0F2F6F9*
02E3E7E3  40002774  40400020  40400001  47F0F00C  07C3C4E3  E3D9C940
90ECD00C  9823F020  58F0F01C  47F0F014  00000000  40404040  40404040
40404040  40404040  40404040  40404040  D9C5E2D6  F0F2F7F0**
02E3E7E3  40002798  40400028  40400001  0000279C  58A0D004  58E0A00C
58B0A018  5810B00C  5820D2B8  50201000  18DA92FF  A00C982C  A01C07FE

MEMBER NAME  BLDRESOL
40404040  40404040  40404040  40404040  D9C5E2D6  F0F2F7F1*
02E3E7E3  40002794  40400004  40400001  000027C0  40404040  40404040
40404040  40404040  40404040  40404040  40404040  40404040  40404040
40404040  40404040  40404040  40404040  D9C5E2D6  F0F2F7F2*
02E3E7E3  400027C0  40400038  40400001  58C0D048  5870100C  58207000
5020D2B8  58201000  41302000  41500004  1B255020  D9845030  D9885030
D10C5030  D11C5820  10044130  20004150  D9C5E2D6  F0F2F7F3*
02C5E2C4  40404040  40400010  40404040  C3C4E3D9  C5C34040  01002828
40000001  40404040  40404040  40404040  40404040  40404040  40404040
40404040  40404040  40404040  40404040  D9C5E2D6  F0F2F7F4*
02E3E7E3  400027F8  4040002E  40400001  00041B25  5020D98C  5030D990
5030D110  5030D124  58201008  41302000  41500004  1B255020  D9945030
D99847F0  C9644040  40404040  40404040  D9C5E2D6  F0F2F7F5*
02E3E7E3  40002828  40400020  40400001  47F0F00C  07C3C4E3  D9C5C340
90ECD00C  9823F020  58F0F01C  47F0F014  00000000  40404040  40404040
40404040  40404040  40404040  40404040  D9C5E2D6  F0F2F7F6*
02E3E7E3  4000284C  40400028  40400001  00002850  58A0D004  58E0A00C
58B0A018  5810B00C  5820D2B8  50201000  18DA92FF  A00C982C  A01C07FE
40404040  40404040  40404040  40404040  D9C5E2D6  F0F2F7F7*
```

```
02E3E7E3  40002848  40400004  40400001  00002874  40404040  40404040
40404040  40404040  40404040  40404040  40404040  40404040  40404040
40404040  40404040  40404040  40404040  D9C5E2D6  F0F2F7F8*
02D9D3C4  40404040  40400038  40404040  00010001  0C002710  00010001
0C00270C  00010001  0C002790  00010001  0C002798  00010001  0C002794
00010001  0C002844  00010001  0C00284C  D9C5E2D6  F0F2F7F9*
02E3E7E3  40002874  40400038  40400001  58C0D048  987A1004  78207000
7020D2AC  78208000  7020D2B0  58209000  5020D2B8  58201000  41302000
41500004  1B255020  D9845030  D9885030  D9C5E2D6  F0F2F8F0**
02C5E2C4  40404040  40400010  40404040  C3C4E3D9  E5E34040  010028CC
40000001  40404040  40404040  40404040  40404040  40404040  40404040
40404040  40404040  40404040  40404040  D9C5E2D6  F0F2F8F1*
02E3E7E3  400028AC  40400038  40400001  D10C5030  D11C5820  10104130
20004150  00041B25  5020D9CC  5030D9D0  47F0C964  47F0F00C  07C3C4E3
D9E5E340  90ECD00C  9823F020  58F0F01C  D9C5E2D6  F0F2F8F2*
02E3E7E3  400028E4  40400008  40400001  47F0F014  00000000  40404040
40404040  40404040  40404040  40404040  40404040  40404040  40404040
40404040  40404040  40404040  40404040  D9C5E2D6  F0F2F8F3*
02E3E7E3  400028F0  40400016  40400001  000028F4  58D0D004  58E0D00C
92FFD00C  982CD01C  07FE4040  40404040  40404040  40404040  40404040
40404040  40404040  40404040  40404040  D9C5E2D6  F0F2F8F4*
02E3E7E3  400028EC  40400004  40400001  00002906  40404040  40404040
40404040  40404040  40404040  40404040  40404040  40404040  40404040
40404040  40404040  40404040  40404040  D9C5E2D6  F0F2F8F5*
02E3E7E3  40002906  40400038  40400001  58C0D048  58701008  78207000
7020D30C  58201000  41302000  41500004  1B255020  D9845030  D9885030
D10C5030  D11C5820  10044130  20004150  D9C5E2D6  F0F2F8F6*
02C5E2C4  40404040  40400010  40404040  C3C4E3C4  C9D44040  01002958
40000001  40404040  40404040  40404040  40404040  40404040  40404040
40404040  40404040  40404040  40404040  D9C5E2D6  F0F2F8F7*
02E3E7E3  4000293E  40400018  40400001  00041B25  5020D98C  5030D990
5030D110  5030D124  47F0C978  40404040  40404040  40404040  40404040
40404040  40404040  40404040  40404040  D9C5E2D6  F0F2F8F8*
02E3E7E3  40002958  40400020  40400001  47F0F00C  07C3C4E3  C4C9D440
90ECD00C  9823F020  58F0F01C  47F0F014  00000000  40404040  40404040
40404040  40404040  40404040  40404040  D9C5E2D6  F0F2F8F9*
02E3E7E3  4000297C  40400034  40400001  00002980  58A0D004  58E0A00C
58B0A018  5810B004  5820D328  50201000  5830B008  5840D2B8  50403000
18DA92FF  A00C982C  A01C07FE  40404040  D9C5E2D6  F0F2F9F0**

MEMBER NAME  BLDRESOL
02E3E7E3  40002978  40400004  40400001  000029B0  40404040  40404040
40404040  40404040  40404040  40404040  40404040  40404040  40404040
40404040  40404040  40404040  40404040  D9C5E2D6  F0F2F9F1*
02C5E2C4  40404040  40400010  40404040  C3C4E3C2  D9D24040  010029DC
40000001  40404040  40404040  40404040  40404040  40404040  40404040
40404040  40404040  40404040  40404040  D9C5E2D6  F0F2F9F2*
02E3E7E3  400029B0  40400038  40400001  58C0D048  987A1000  58207000
5020D2D8  58208000  5020D328  58209000  5020D2B8  5820A000  5020D4B4
47F0C98C  47F0F00C  07C3C4E3  C2D9D240  D9C5E2D6  F0F2F9F3*
02E3E7E3  400029E8  40400014  40400001  90ECD00C  9823F020  58F0F01C
47F0F014  00000000  40404040  40404040  40404040  40404040  40404040
40404040  40404040  40404040  40404040  D9C5E2D6  F0F2F9F4*
02D9D3C4  40404040  40400038  40404040  00010001  0C002848  00010001
0C0028E8  00010001  0C0028F0  00010001  0C0028EC  00010001  0C002974
00010001  0C00297C  00010001  0C002978  D9C5E2D6  F0F2F9F5*
02E3E7E3  40002A00  40400016  40400001  00002A04  58D0D004  58E0D00C
92FFD00C  982CD01C  07FE4040  40404040  40404040  40404040  40404040
40404040  40404040  40404040  40404040  D9C5E2D6  F0F2F9F6*
```

```
                                                                        PAGE 0061
02E3E7E3  400029FC  40400004  40400001  00002A16  40404040  40404040
40404040  40404040  40404040  40404040  40404040  40404040  40404040
40404040  40404040  40404040  40404040  D9C5E2D6  F0F2F9F7*
02E3E7E3  40002A16  40400038  40400001  58C0D048  987A1008  78207000
7020D30C  78208000  7020D3E4  78209000  7020D528  5820A000  5020D3B0
58201000  41302000  41500004  1B255020  D9C5E2D6  F0F2F9F8*
02C5E2C4  40404040  40400010  40404040  C3C4E3C1  D9D64040  01002A78
40000001  40404040  40404040  40404040  40404040  40404040  40404040
40404040  40404040  40404040  40404040  D9C5E2D6  F0F2F9F9*
02E3E7E3  40002A4E  40400028  40400001  D9DC5030  D9E05030  D1D49280
D1D45820  10044130  20004150  00041B25  5020D9E4  5030D9E8  47F0C9A8
40404040  40404040  40404040  40404040  D9C5E2D6  F0F3F0F0**
02E3E7E3  40002A78  40400020  40400001  47F0F00C  07C3C4E3  C1D9D640
90ECD00C  9823F020  58F0F01C  47F0F014  00000000  40404040  40404040
40404040  40404040  40404040  40404040  D9C5E2D6  F0F3F0F1*
02E3E7E3  40002A9C  40400028  40400001  00002AA0  58A0D004  58E0A00C
58B0A018  5810B008  5820D3B4  50201000  18DA92FF  A00C982C  A01C07FE
40404040  40404040  40404040  40404040  D9C5E2D6  F0F3F0F2*
02E3E7E3  40002A98  40400004  40400001  00002AC4  40404040  40404040
40404040  40404040  40404040  40404040  40404040  40404040  40404040
40404040  40404040  40404040  40404040  D9C5E2D6  F0F3F0F3*
02E3E7E3  40002AC4  40400038  40400001  58C0D048  987B1008  58207000
5020D3B4  98781018  78207000  7020D3E0  78208000  7020D520  58201000
41302000  41500004  1B255020  D9DC5030  D9C5E2D6  F0F3F0F4*
02E3E7E3  40002AFC  40400038  40400001  D9E05030  D1D49280  D1D45820
10044130  20004150  00041B25  5020D9E4  5030D9E8  5820100C  41302000
41500004  1B255020  DA105030  DA145030  D9C5E2D6  F0F3F0F5*
02E3E7E3  40002B34  40400038  40400001  D1785030  D1CC5820  10104130
20004150  00041B25  5020DA4C  5030DA50  5030D180  9280D180  58201014
41302000  41500004  1B255020  D9845030  D9C5E2D6  F0F3F0F6*
02C5E2C4  40404040  40400010  40404040  C3C4E3E2  C3E34040  01002B7C
40000001  40404040  40404040  40404040  40404040  40404040  40404040
40404040  40404040  40404040  40404040  D9C5E2D6  F0F3F0F7*
02E3E7E3  40002B6C  4040000E  40400001  D9885030  D10C5030  D11C47F0
C9BC4040  40404040  40404040  40404040  40404040  40404040  40404040
40404040  40404040  40404040  40404040  D9C5E2D6  F0F3F0F8*
02E3E7E3  40002B7C  40400020  40400001  47F0F00C  07C3C4E3  E2C3E340
90ECD00C  9823F020  58F0F01C  47F0F014  00000000  40404040  40404040
40404040  40404040  40404040  40404040  D9C5E2D6  F0F3F0F9*
02E3E7E3  40002BA0  40400004  40400001  00002BA4  40404040  40404040

MEMBER NAME  BLDRESOL
40404040  40404040  40404040  40404040  40404040  40404040  40404040
40404040  40404040  40404040  40404040  D9C5E2D6  F0F3F1F0**
02D9D3C4  40404040  40400038  40404040  00010001  0C0029F8  00010001
0C002A00  00010001  0C0029FC  00010001  0C002A94  00010001  0C002A9C
00010001  0C002A98  00010001  0C002B98  D9C5E2D6  F0F3F1F1*
02E3E7E3  40002BA4  40400012  40400001  58D0D004  58E0D00C  92FFD00C
982CD01C  07FE4040  40404040  40404040  40404040  40404040  40404040
40404040  40404040  40404040  40404040  D9C5E2D6  F0F3F1F2*
02E3E7E3  40002B9C  40400004  40400001  00002BB6  40404040  40404040
40404040  40404040  40404040  40404040  40404040  40404040  40404040
40404040  40404040  40404040  40404040  D9C5E2D6  F0F3F1F3*
02E3E7E3  40002BB6  40400038  40400001  58C0D048  58201000  41302000
41500004  1B255020  D9DC5030  D9E05030  D1D49280  D1D45820  10044130
20004150  00041B25  5020D9E4  5030D9E8  D9C5E2D6  F0F3F1F4*
02E3E7E3  40002BEE  40400038  40400001  58201008  41302000  41500004
1B255020  D9845030  D9885030  D10C5030  D11C5820  100C4130  20004150
00041B25  5020D98C  5030D990  5030D110  D9C5E2D6  F0F3F1F5*
```

PAGE 0062

```
02C5E2C4  40404040  40400010  40404040  C3C4E3C3  E4E34040  01002C44
40000001  40404040  40404040  40404040  40404040  40404040  40404040
40404040  40404040  40404040  40404040  D9C5E2D6  F0F3F1F6*
02E3E7E3  40002C26  40400038  40400001  5030D124  58201010  41302000
41500004  1B255020  D9945030  D99847F0  CA0247F0  F00C07C3  C4E3C3E4
E34090EC  D00C9823  F02058F0  F01C47F0  D9C5E2D6  F0F3F1F7*
02E3E7E3  40002C5E  40400006  40400001  F0140000  00004040  40404040
40404040  40404040  40404040  40404040  40404040  40404040  40404040
40404040  40404040  40404040  40404040  D9C5E2D6  F0F3F1F8*
02E3E7E3  40002C68  40400016  40400001  00002C6C  58D0D004  58E0D00C
92FFD00C  982CD01C  07FE4040  40404040  40404040  40404040  40404040
40404040  40404040  40404040  40404040  D9C5E2D6  F0F3F1F9*
02E3E7E3  40002C64  40400004  40400001  00002C7E  40404040  40404040
40404040  40404040  40404040  40404040  40404040  40404040  40404040
40404040  40404040  40404040  40404040  D9C5E2D6  F0F3F2F0**
02E3E7E3  40002C7E  40400038  40400001  58C0D048  98781008  78207000
7020D3DC  78208000  7020D49C  58201000  41302000  41500004  1B255020
D9DC5030  D9E05030  D1D49280  D1D45820  D9C5E2D6  F0F3F2F1*
02C5E2C4  40404040  40400010  40404040  C3C4E3C4  D3E34040  01002CD0
40000001  40404040  40404040  40404040  40404040  40404040  40404040
40404040  40404040  40404040  40404040  D9C5E2D6  F0F3F2F2*
02E3E7E3  40002CB6  40400018  40400001  10044130  20004150  00041B25
5020D9CC  5030D9D0  47F0CA16  40404040  40404040  40404040  40404040
40404040  40404040  40404040  40404040  D9C5E2D6  F0F3F2F3*
02E3E7E3  40002CD0  40400020  40400001  47F0F00C  07C3C4E3  C4D3E340
90ECD00C  9823F020  58F0F01C  47F0F014  00000000  40404040  40404040
40404040  40404040  40404040  40404040  D9C5E2D6  F0F3F2F4*
02E3E7E3  40002CF4  40400028  40400001  00002CF8  58A0D004  58E0A00C
58B0A018  5810B004  5820D3B4  50201000  18DA92FF  A00C982C  A01C07FE
40404040  40404040  40404040  40404040  D9C5E2D6  F0F3F2F5*
02E3E7E3  40002CF0  40400004  40400001  00002D1C  40404040  40404040
40404040  40404040  40404040  40404040  40404040  40404040  40404040
40404040  40404040  40404040  40404040  D9C5E2D6  F0F3F2F6*
02D9D3C4  40404040  40400038  40404040  00010001  0C002BA0  00010001
0C002B9C  00010001  0C002C60  00010001  0C002C68  00010001  0C002C64
00010001  0C002CEC  00010001  0C002CF4  D9C5E2D6  F0F3F2F7*
02E3E7E3  40002D1C  40400038  40400001  58C0D048  987B1004  58207000
5020D3B4  7820A000  7020D3E0  7820B000  7020D520  58201000  41302000
41500004  1B255020  D9DC5030  D9E05030  D9C5E2D6  F0F3F2F8*
02E3E7E3  40002D54  40400038  40400001  D1D49280  D1D45820  10084130
20004150  00041B25  5020DA10  5030DA14  5030D178  5030D1CC  5820100C

MEMBER NAME  BLDRESOL
41302000  41500004  1B255020  D9E45030  D9C5E2D6  F0F3F2F9*
02E3E7E3  40002D8C  40400038  40400001  D9E85820  10184130  20004150
00041B25  5020D9B4  5030D9B8  5820101C  41302000  41500004  1B255020
D9C45030  D9C85820  10204130  20004150  D9C5E2D6  F0F3F3F0**
02E3E7E3  40002DC4  40400038  40400001  00041B25  5020DA7C  5030DA80
58201024  41302000  41500004  1B255020  D9A45030  D9A85820  10284130
20004150  00041B25  5020D9AC  5030D9B0  D9C5E2D6  F0F3F3F1*
02C5E2C4  40404040  40400010  40404040  C3C4E3C2  D3D54040  01002E00
40000001  40404040  40404040  40404040  40404040  40404040  40404040
40404040  40404040  40404040  40404040  D9C5E2D6  F0F3F3F2*
02E3E7E3  40002DFC  40400024  40400001  47F0CA2A  47F0F00C  07C3C4E3
C2D3D540  90ECD00C  9823F020  58F0F01C  47F0F014  00000000  40404040
40404040  40404040  40404040  40404040  D9C5E2D6  F0F3F3F3*
02E3E7E3  40002E24  40400028  40400001  00002E28  58A0D004  58E0A00C
58B0A018  5810B004  5820D3B4  50201000  18DA92FF  A00C982C  A01C07FE
40404040  40404040  40404040  40404040  D9C5E2D6  F0F3F3F4*
```

```
02E3E7E3  40002E20  40400004  40400001  00002E4C  40404040  40404040
40404040  40404040  40404040  40404040  40404040  40404040  40404040
40404040  40404040  40404040  40404040  D9C5E2D6  F0F3F3F5*
02E3E7E3  40002E4C  40400038  40400001  58C0D048  987B1004  58207000
5020D3B4  78209000  7020D2F4  98781014  78207000  7020D3E0  78208000
7020D520  58201000  41302000  41500004  D9C5E2D6  F0F3F3F6*
02E3E7E3  40002E84  40400038  40400001  1B255020  D9DC5030  D9E05030
D1D49280  D1D45820  10084130  20004150  00041B25  5020DA10  5030DA14
5030D178  5030D1CC  58201010  41302000  D9C5E2D6  F0F3F3F7*
02C5E2C4  40404040  40400010  40404040  C3C4E3E3  E7D34040  01002ED0
40000001  40404040  40404040  40404040  40404040  40404040  40404040
40404040  40404040  40404040  40404040  D9C5E2D6  F0F3F3F8*
02E3E7E3  40002EBC  40400012  40400001  41500004  1B255020  D9E45030
D9E847F0  CA3E4040  40404040  40404040  40404040  40404040  40404040
40404040  40404040  40404040  40404040  D9C5E2D6  F0F3F3F9*
02E3E7E3  40002ED0  40400020  40400001  47F0F00C  07C3C4E3  E3E7D340
90ECD00C  9823F020  58F0F01C  47F0F014  00000000  40404040  40404040
40404040  40404040  40404040  40404040  D9C5E2D6  F0F3F4F0**
02E3E7E3  40002EF4  40400028  40400001  00002EF8  58A0D004  58E0A00C
58B0A018  5810B00C  5820D3B4  50201000  18DA92FF  A00C982C  A01C07FE
40404040  40404040  40404040  40404040  D9C5E2D6  F0F3F4F1*
02E3E7E3  40002EF0  40400004  40400001  00002F1C  40404040  40404040
40404040  40404040  40404040  40404040  40404040  40404040  40404040
40404040  40404040  40404040  40404040  D9C5E2D6  F0F3F4F2*
02E3E7E3  40002F1C  40400038  40400001  58C0D048  987B100C  58207000
5020D3B4  58208000  5020D4E0  7820A000  7020D3E0  7820B000  7020D520
58201000  41302000  41500004  1B255020  D9C5E2D6  F0F3F4F3*
02E3E7E3  40002F54  40400038  40400001  D9DC5030  D9E05030  D1D49280
D1D45820  10044130  20004150  00041B25  5020DA4C  5030DA50  5030D180
9280D180  58201008  41302000  41500004  D9C5E2D6  F0F3F4F4*
02E3E7E3  40002F8C  40400038  40400001  1B255020  D9E45030  D9E85820
10144130  20004150  00041B25  5020DA10  5030DA14  5030D178  5030D1CC
58201020  41302000  41500004  1B255020  D9C5E2D6  F0F3F4F5*
02C5E2C4  40404040  40400010  40404040  C3C4E3E2  E8D44040  01002FF4
40000001  40404040  40404040  40404040  40404040  40404040  40404040
40404040  40404040  40404040  40404040  D9C5E2D6  F0F3F4F6*
02E3E7E3  40002FC4  40400038  40400001  D9845030  D9885030  D10C5030
D11C5820  10244130  20004150  00041B25  5020D98C  5030D990  5030D110
5030D124  47F0CA52  47F0F00C  07C3C4E3  D9C5E2D6  F0F3F4F7*
02E3E7E3  40002FFC  40400018  40400001  E2E8D440  90ECD00C  9823F020
58F0F01C  47F0F014  00000000  40404040  40404040  40404040  40404040
40404040  40404040  40404040  40404040  D9C5E2D6  F0F3F4F8*

MEMBER NAME  BLDRESOL
02D9D3C4  40404040  40400038  40404040  00010001  0C002CF0  00010001
0C002E1C  00010001  0C002E24  00010001  0C002E20  00010001  0C002EEC
00010001  0C002EF4  00010001  0C002EF0  D9C5E2D6  F0F3F4F9*
02E3E7E3  40003018  40400028  40400001  0000301C  58A0D004  58E0A00C
58B0A018  5810B01C  5820D4BC  50201000  18DA92FF  A00C982C  A01C07FE
40404040  40404040  40404040  40404040  D9C5E2D6  F0F3F5F0**
02E3E7E3  40003014  40400004  40400001  00003040  40404040  40404040
40404040  40404040  40404040  40404040  40404040  40404040  40404040
40404040  40404040  40404040  40404040  D9C5E2D6  F0F3F5F1*
02E3E7E3  40003040  40400038  40400001  58C0D048  987B1008  78207000
7020D358  58208000  5020D348  58209000  5020D32C  5820A000  5020D2D0
5820B000  5020D4A8  5870101C  58207000  D9C5E2D6  F0F3F5F2*
02E3E7E3  40003078  40400038  40400001  5020D4BC  58201000  41302000
41500004  1B255020  D9DC5030  D9E05030  D1D49280  D1D45820  10044130
20004150  00041B25  5020D9CC  5030D9D0  D9C5E2D6  F0F3F5F3*
```

| | | | | | | |
|---|---|---|---|---|---|---|
| 02C5E2C4 | 40404040 | 40400010 | 40404040 | C3C4E3D7 | D3E34040 | 010030B4 |
| 40000001 | 40404040 | 40404040 | 40404040 | 40404040 | 40404040 | 40404040 |
| 40404040 | 40404040 | 40404040 | 40404040 | D9C5E2D6 | F0F3F5F4* | |
| 02E3E7E3 | 400030B0 | 40400024 | 40400001 | 47F0CA66 | 47F0F00C | 07C3C4E3 |
| D7D3E340 | 90ECD00C | 9823F020 | 58F0F01C | 47F0F014 | 00000000 | 40404040 |
| 40404040 | 40404040 | 40404040 | 40404040 | D9C5E2D6 | F0F3F5F5* | |
| 02E3E7E3 | 400030D8 | 40400016 | 40400001 | 000030DC | 58D0D004 | 58E0D00C |
| 92FFD00C | 982CD01C | 07FE4040 | 40404040 | 40404040 | 40404040 | 40404040 |
| 40404040 | 40404040 | 40404040 | 40404040 | D9C5E2D6 | F0F3F5F6* | |
| 02E3E7E3 | 400030D4 | 40400004 | 40400001 | 000030EE | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F3F5F7* | |
| 02E3E7E3 | 400030EE | 40400038 | 40400001 | 58C0D048 | 987B1004 | 78207000 |
| 7020D2C0 | 78208000 | 7020D358 | 78209000 | 7020D310 | 7820A000 | 7020D39C |
| 987B1018 | 78207000 | 7020D2C4 | 78208000 | D9C5E2D6 | F0F3F5F8* | |
| 02E3E7E3 | 40003126 | 40400038 | 40400001 | 7020D2C8 | 58209000 | 5020D4C4 |
| 5820A000 | 5020D4B0 | 7820B000 | 7020D2CC | 5870102C | 58207000 | 5020D324 |
| 58201000 | 41302000 | 41500004 | 1B255020 | D9C5E2D6 | F0F3F5F9* | |
| 02C5E2C4 | 40404040 | 40400010 | 40404040 | C3C4E3C7 | E2D54040 | 01003190 |
| 40000001 | 40404040 | 40404040 | 40404040 | 40404040 | 40404040 | 40404040 |
| 40404040 | 40404040 | 40404040 | 40404040 | D9C5E2D6 | F0F3F6F0** | |
| 02E3E7E3 | 4000315E | 40400030 | 40400001 | D98C5030 | D9905030 | D1105030 |
| D1245820 | 10144130 | 20004150 | 00041B25 | 5020D974 | 5030D978 | 5030D06C |
| 9280D06C | 47F0CA82 | 40404040 | 40404040 | D9C5E2D6 | F0F3F6F1* | |
| 02E3E7E3 | 40003190 | 40400020 | 40400001 | 47F0F00C | 07C3C4E3 | C7E2D540 |
| 90ECD00C | 9823F020 | 58F0F01C | 47F0F014 | 00000000 | 40404040 | 40404040 |
| 40404040 | 40404040 | 40404040 | 40404040 | D9C5E2D6 | F0F3F6F2* | |
| 02E3E7E3 | 400031B4 | 40400004 | 40400001 | 000031B8 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F3F6F3* | |
| 02D9D3C4 | 40404040 | 40400038 | 40404040 | 00010001 | 0C003010 | 00010001 |
| 0C003018 | 00010001 | 0C003014 | 00010001 | 0C0030D0 | 00010001 | 0C0030D8 |
| 00010001 | 0C0030D4 | 00010001 | 0C0031AC | D9C5E2D6 | F0F3F6F4* | |
| 02E3E7E3 | 400031B8 | 40400024 | 40400001 | 58A0D004 | 58E0A00C | 58B0A018 |
| 5810B008 | 5820D2B4 | 50201000 | 18DA92FF | A00C982C | A01C07FE | 40404040 |
| 40404040 | 40404040 | 40404040 | 40404040 | D9C5E2D6 | F0F3F6F5* | |
| 02E3E7E3 | 400031B0 | 40400004 | 40400001 | 000031DC | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F3F6F6* | |
| 02C5E2C4 | 40404040 | 40400010 | 40404040 | C3C4E3C5 | E2C54040 | 01003200 |
| 40000001 | 40404040 | 40404040 | 40404040 | 40404040 | 40404040 | 40404040 |
| 40404040 | 40404040 | 40404040 | 40404040 | D9C5E2D6 | F0F3F6F7* | |
| 02E3E7E3 | 400031DC | 40400038 | 40400001 | 58C0D048 | 98791000 | 78207000 |

MEMBER NAME BLDRESOL

| | | | | | | |
|---|---|---|---|---|---|---|
| 7020D3D0 | 58208000 | 5020D4E4 | 58209000 | 5020D2B4 | 47F0CA96 | 47F0F00C |
| 07C3C4E3 | C5E2C540 | 90ECD00C | 9823F020 | D9C5E2D6 | F0F3F6F8* | |
| 02E3E7E3 | 40003214 | 4040000C | 40400001 | 58F0F01C | 47F0F014 | 00000000 |
| 40404040 | 40404040 | 40404040 | 40404040 | 40404040 | 40404040 | 40404040 |
| 40404040 | 40404040 | 40404040 | 40404040 | D9C5E2D6 | F0F3F6F9* | |
| 02E3E7E3 | 40003224 | 40400028 | 40400001 | 00003228 | 58A0D004 | 58E0A00C |
| 58B0A018 | 5810B008 | 5820D2B4 | 50201000 | 18DA92FF | A00C982C | A01C07FE |
| 40404040 | 40404040 | 40404040 | 40404040 | D9C5E2D6 | F0F3F7F0** | |
| 02E3E7E3 | 40003220 | 40400004 | 40400001 | 0000324C | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F3F7F1* | |
| 02C5E2C4 | 40404040 | 40400010 | 40404040 | C3C4E3C7 | C6D54040 | 01003270 |
| 40000001 | 40404040 | 40404040 | 40404040 | 40404040 | 40404040 | 40404040 |
| 40404040 | 40404040 | 40404040 | 40404040 | D9C5E2D6 | F0F3F7F2* | |

```
02E3E7E3  4000324C  40400038  40400001  58C0D048  98791000  78207000
7020D3D0  58208000  5020D4E4  58209000  5020D2B4  47F0CAAA  47F0F00C
07C3C4E3  C7C6D540  90ECD00C  9823F020  D9C5E2D6  F0F3F7F3*
02E3E7E3  40003284  4040000C  40400001  58F0F01C  47F0F014  00000000
40404040  40404040  40404040  40404040  40404040  40404040  40404040
40404040  40404040  40404040  40404040  D9C5E2D6  F0F3F7F4*
02E3E7E3  40003294  40400028  40400001  00003298  58A0D004  58E0A00C
58B0A018  5810B008  5820D2B4  50201000  18DA92FF  A00C982C  A01C07FE
40404040  40404040  40404040  40404040  D9C5E2D6  F0F3F7F5*
02E3E7E3  40003290  40400004  40400001  000032BC  40404040  40404040
40404040  40404040  40404040  40404040  40404040  40404040  40404040
40404040  40404040  40404040  40404040  D9C5E2D6  F0F3F7F6*
02D9D3C4  40404040  40400038  40404040  00010001  0C0031B4  00010001
0C0031B0  00010001  0C00321C  00010001  0C003224  00010001  0C003220
00010001  0C00328C  00010001  0C003294  D9C5E2D6  F0F3F7F7*
02E3E7E3  400032BC  40400038  40400001  58C0D048  987A1000  78207000
7020D3D0  58208000  5020D4E4  58209000  5020D2B4  5820100C  41302000
41500001  1B255020  DAAC5030  DAB047F0  D9C5E2D6  F0F3F7F8*
02C5E2C4  40404040  40400010  40404040  C3C4E3C5  C6C54040  010032F8
40000001  40404040  40404040  40404040  40404040  40404040  40404040
40404040  40404040  40404040  40404040  D9C5E2D6  F0F3F7F9*
02E3E7E3  400032F4  40400002  40400001  CABE4040  40404040  40404040
40404040  40404040  40404040  40404040  40404040  40404040  40404040
40404040  40404040  40404040  40404040  D9C5E2D6  F0F3F8F0**
02E3E7E3  400032F8  40400020  40400001  47F0F00C  07C3C4E3  C5C6C540
90ECD00C  9823F020  58F0F01C  47F0F014  00000000  40404040  40404040
40404040  40404040  40404040  40404040  D9C5E2D6  F0F3F8F1*
02E3E7E3  4000331C  40400028  40400001  00003320  58A0D004  58E0A00C
58B0A018  5810B008  5820D2B4  50201000  18DA92FF  A00C982C  A01C07FE
40404040  40404040  40404040  40404040  D9C5E2D6  F0F3F8F2*
02E3E7E3  40003318  40400004  40400001  00003344  40404040  40404040
40404040  40404040  40404040  40404040  40404040  40404040  40404040
40404040  40404040  40404040  40404040  D9C5E2D6  F0F3F8F3*
02C5E2C4  40404040  40400010  40404040  C3C4E3F3  C4E24040  01003368
40000001  40404040  40404040  40404040  40404040  40404040  40404040
40404040  40404040  40404040  40404040  D9C5E2D6  F0F3F8F4*
02E3E7E3  40003344  40400038  40400001  58C0D048  98791000  78207000
7020D3D0  58208000  5020D4E4  58209000  5020D2B4  47F0CAD2  47F0F00C
07C3C4E3  F3C4E240  90ECD00C  9823F020  D9C5E2D6  F0F3F8F5*
02E3E7E3  4000337C  4040000C  40400001  58F0F01C  47F0F014  00000000
40404040  40404040  40404040  40404040  40404040  40404040  40404040
40404040  40404040  40404040  40404040  D9C5E2D6  F0F3F8F6*
02E3E7E3  4000338C  40400034  40400001  00003390  58A0D004  58E0A00C
58B0A018  5810B000  5820D3B8  50201000  5830B020  5840D2B8  50403000

MEMBER NAME  BLDRESOL
18DA92FF  A00C982C  A01C07FE  40404040  D9C5E2D6  F0F3F8F7*
02E3E7E3  40003388  40400004  40400001  000033C0  40404040  40404040
40404040  40404040  40404040  40404040  40404040  40404040  40404040
40404040  40404040  40404040  40404040  D9C5E2D6  F0F3F8F8*
02E3E7E3  400033C0  40400038  40400001  58C0D048  987B1000  58207000
5020D3B8  58208000  5020D2E4  58209000  5020D2BC  5820A000  5020D4F4
98781020  58207000  5020D2B8  58208000  D9C5E2D6  F0F3F8F9*
02E3E7E3  400033F8  40400038  40400001  5020D2E8  58201010  41302000
41500004  1B255C40  D2281B25  5020D9EC  5030D9F0  58201014  41302000
41500004  1B255C40  D2281B25  5020D9BC  D9C5E2D6  F0F3F9F0**
02E3E7E3  40003430  40400038  40400001  5030D9C0  58201018  41302000
41500004  1B255B20  D24C5020  D9F45030  D9F85820  101C4130  20004150
00041B25  5B20D250  5020DA3C  5030DA40  D9C5E2D6  F0F3F9F1*
```

PAGE 0066
02C5E2C4 40404040 40400010 40404040 C3C4E3C2 C3C24040 0100346C
40000001 40404040 40404040 40404040 40404040 40404040 40404040
40404040 40404040 40404040 40404040 D9C5E2D6 F0F3F9F2*
02E3E7E3 40003468 40400024 40400001 47F0CAE6 47F0F00C 07C3C4E3
C2C3C240 90ECD00C 9823F020 58F0F01C 47F0F014 00000000 40404040
40404040 40404040 40404040 40404040 D9C5E2D6 F0F3F9F3*
02D9D3C4 40404040 40400038 40404040 00010001 0C003290 00010001
0C003314 00010001 0C00331C 00010001 0C003318 00010001 0C003384
00010001 0C00338C 00010001 0C003388 D9C5E2D6 F0F3F9F4*
02E3E7E3 40003490 40400028 40400001 00003494 58A0D004 58E0A00C
58B0A018 5810B014 5820D2B8 50201000 18DA92FF A00C982C A01C07FE
40404040 40404040 40404040 40404040 D9C5E2D6 F0F3F9F5*
02E3E7E3 4000348C 40400004 40400001 000034B8 40404040 40404040
40404040 40404040 40404040 40404040 40404040 40404040 40404040
40404040 40404040 40404040 40404040 D9C5E2D6 F0F3F9F6*
02E3E7E3 400034B8 40400038 40400001 58C0D048 98781010 78207000
7020D38C 58208000 5020D2B8 58201000 41302000 41500004 1B255C40
D2281B25 5020D9EC 5030D9F0 58201004 D9C5E2D6 F0F3F9F7*
02E3E7E3 400034F0 40400038 40400001 41302000 41500004 1B255B20
D24C5020 DA1C5030 DA205820 10084130 20004150 00041B25 5B20D24C
5020DA24 5030DA28 5820100C 41302000 D9C5E2D6 F0F3F9F8*
02C5E2C4 40404040 40400010 40404040 C3C4E3D9 C5E54040 01003540
40000001 40404040 40404040 40404040 40404040 40404040 40404040
40404040 40404040 40404040 40404040 D9C5E2D6 F0F3F9F9*
02E3E7E3 40003528 40400016 40400001 41500004 1B255B20 D24C5020
DA545030 DA5847F0 CAE64040 40404040 40404040 40404040 40404040
40404040 40404040 40404040 40404040 D9C5E2D6 F0F4F0F0**
02E3E7E3 40003540 40400020 40400001 47F0F00C 07C3C4E3 D9C5E540
90ECD00C 9823F020 58F0F01C 47F0F014 00000000 40404040 40404040
40404040 40404040 40404040 40404040 D9C5E2D6 F0F4F0F1*
02E3E7E3 40003564 40400034 40400001 00003568 58A0D004 58E0A00C
58B0A018 5810B004 5820D3B8 50201000 5830B030 5840D2B8 50403000
18DA92FF A00C982C A01C07FE 40404040 D9C5E2D6 F0F4F0F2*
02E3E7E3 40003560 40400004 40400001 00003598 40404040 40404040
40404040 40404040 40404040 40404040 40404040 40404040 40404040
40404040 40404040 40404040 40404040 D9C5E2D6 F0F4F0F3*
02E3E7E3 40003598 40400038 40400001 58C0D048 987B1000 78207000
7020D3C4 58208000 5020D3B8 58209000 5020D2E4 5820A000 5020D2BC
5820B000 5020D4F4 987B1024 58207000 D9C5E2D6 F0F4F0F4*
02E3E7E3 400035D0 40400038 40400001 5020D500 78209000 7020D2C0
5820A000 5020D2B8 5820B000 5020D2E8 58201014 41302000 41500004
1B255C40 D2281B25 5020D9EC 5030D9F0 D9C5E2D6 F0F4F0F5*
02E3E7E3 40003608 40400038 40400001 58201018 41302000 41500004
1B255C40 D2281B25 5020D9BC 5030D9C0 5820101C 41302000 41500004
1B255B20 D24C5020 D9F45030 D9F85820 D9C5E2D6 F0F4F0F6*

MEMBER NAME BLDRESOL
02C5E2C4 40404040 40400010 40404040 C3C4E3D9 E4D34040 01003674
40000001 40404040 40404040 40404040 40404040 40404040 40404040
40404040 40404040 40404040 40404040 D9C5E2D6 F0F4F0F7*
02E3E7E3 40003640 40400032 40400001 10204130 20004150 00041B25
5B20D250 5020DA3C 5030DA40 58201028 41302000 41500004 1B255020
DA2C5030 DA3047F0 CAE64040 40404040 D9C5E2D6 F0F4F0F8*
02E3E7E3 40003674 40400020 40400001 47F0F00C 07C3C4E3 D9E4D340
90ECD00C 9823F020 58F0F01C 47F0F014 00000000 40404040 40404040
40404040 40404040 40404040 40404040 D9C5E2D6 F0F4F0F9*
02E3E7E3 40003698 40400004 40400001 0000369C 40404040 40404040
40404040 40404040 40404040 40404040 40404040 40404040 40404040
40404040 40404040 40404040 40404040 D9C5E2D6 F0F4F1F0**

| | | | | | | |
|---|---|---|---|---|---|---|
| 02D9D3C4 | 40404040 | 40400038 | 40404040 | 00010001 | 0C003488 | 00010001 |
| 0C003490 | 00010001 | 0C00348C | 00010001 | 0C00355C | 00010001 | 0C003564 |
| 00010001 | 0C003560 | 00010001 | 0C003690 | D9C5E2D6 | F0F4F1F1* | |
| 02E3E7E3 | 4000369C | 40400030 | 40400001 | 58A0D004 | 58E0A00C | 58B0A018 |
| 5810B000 | 5820D3B8 | 50201000 | 5830B020 | 5840D2B8 | 50403000 | 18DA92FF |
| A00C982C | A01C07FE | 40404040 | 40404040 | D9C5E2D6 | F0F4F1F2* | |
| 02E3E7E3 | 40003694 | 40400004 | 40400001 | 000036CC | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F4F1F3* | |
| 02E3E7E3 | 400036CC | 40400038 | 40400001 | 58C0D048 | 987B1000 | 58207000 |
| 5020D3B8 | 58208000 | 5020D2E4 | 58209000 | 5020D2BC | 5820A000 | 5020D4F4 |
| 987B1020 | 58207000 | 5020D2B8 | 58208000 | D9C5E2D6 | F0F4F1F4* | |
| 02E3E7E3 | 40003704 | 40400038 | 40400001 | 5020D3C0 | 58209000 | 5020D2EC |
| 5820A000 | 5020D2E8 | 5820B000 | 5020D2F0 | 58201010 | 41302000 | 41500004 |
| 1B255C40 | D2281B25 | 5020D9EC | 5030D9F0 | D9C5E2D6 | F0F4F1F5* | |
| 02E3E7E3 | 4000373C | 40400038 | 40400001 | 58201014 | 41302000 | 41500004 |
| 1B255C40 | D2281B25 | 5020D9BC | 5030D9C0 | 58201018 | 41302000 | 41500004 |
| 1B255B20 | D24C5020 | D9F45030 | D9F85820 | D9C5E2D6 | F0F4F1F6* | |
| 02C5E2C4 | 40404040 | 40400010 | 40404040 | C3C4E3F3 | C4C34040 | 01003790 |
| 40000001 | 40404040 | 40404040 | 40404040 | 40404040 | 40404040 | 40404040 |
| 40404040 | 40404040 | 40404040 | 40404040 | D9C5E2D6 | F0F4F1F7* | |
| 02E3E7E3 | 40003774 | 40400038 | 40400001 | 101C4130 | 20004150 | 00041B25 |
| 5B20D250 | 5020DA3C | 5030DA40 | 47F0CAE6 | 47F0F00C | 07C3C4E3 | F3C4C340 |
| 90ECD00C | 9823F020 | 58F0F01C | 47F0F014 | D9C5E2D6 | F0F4F1F8* | |
| 02E3E7E3 | 400037AC | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F4F1F9* | |
| 02E3E7E3 | 400037B4 | 40400028 | 40400001 | 000037B8 | 58A0D004 | 58E0A00C |
| 58B0A018 | 5810B014 | 5820D2B8 | 50201000 | 18DA92FF | A00C982C | A01C07FE |
| 40404040 | 40404040 | 40404040 | 40404040 | D9C5E2D6 | F0F4F2F0** | |
| 02E3E7E3 | 400037B0 | 40400004 | 40400001 | 000037DC | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F4F2F1* | |
| 02E3E7E3 | 400037DC | 40400038 | 40400001 | 58C0D048 | 987B100C | 78207000 |
| 7020D290 | 78208000 | 7020D294 | 58209000 | 5020D2B8 | 5820A000 | 5020D3A4 |
| 98781024 | 78207000 | 7020D300 | 78208000 | D9C5E2D6 | F0F4F2F2* | |
| 02E3E7E3 | 40003814 | 40400038 | 40400001 | 7020D304 | 58201000 | 41302000 |
| 41500004 | 1B255020 | D9845030 | D9885030 | D10C5030 | D11C5820 | 10044130 |
| 20004150 | 00041B25 | 5020D98C | 5030D990 | D9C5E2D6 | F0F4F2F3* | |
| 02E3E7E3 | 4000384C | 40400038 | 40400001 | 5030D110 | 5030D124 | 58201008 |
| 41302000 | 41500004 | 1B255020 | D9945030 | D9985820 | 101C4130 | 20004150 |
| 00041B25 | 5020D9DC | 5030D9E0 | 5030D1D4 | D9C5E2D6 | F0F4F2F4* | |
| 02C5E2C4 | 40404040 | 40400010 | 40404040 | C3C4E3D7 | D3D54040 | 010038A4 |
| 40000001 | 40404040 | 40404040 | 40404040 | 40404040 | 40404040 | 40404040 |
| 40404040 | 40404040 | 40404040 | 40404040 | D9C5E2D6 | F0F4F2F5* | |
| 02E3E7E3 | 40003884 | 4040001E | 40400001 | 9280D1D4 | 58201020 | 41302000 |

MEMBER NAME BLDRESOL

| | | | | | | |
|---|---|---|---|---|---|---|
| 41500004 | 1B255020 | D9E45030 | D9E847F0 | CAFA4040 | 40404040 | 40404040 |
| 40404040 | 40404040 | 40404040 | 40404040 | D9C5E2D6 | F0F4F2F6* | |
| 02E3E7E3 | 400038A4 | 40400020 | 40400001 | 47F0F00C | 07C3C4E3 | D7D3D540 |
| 90ECD00C | 9823F020 | 58F0F01C | 47F0F014 | 00000000 | 40404040 | 40404040 |
| 40404040 | 40404040 | 40404040 | 40404040 | D9C5E2D6 | F0F4F2F7* | |
| 02E3E7E3 | 400038C8 | 40400016 | 40400001 | 000038CC | 58D0D004 | 58E0D00C |
| 92FFD00C | 982CD01C | 07FE4040 | 40404040 | 40404040 | 40404040 | 40404040 |
| 40404040 | 40404040 | 40404040 | 40404040 | D9C5E2D6 | F0F4F2F8* | |
| 02E3E7E3 | 400038C4 | 40400004 | 40400001 | 000038DE | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F4F2F9* | |

```
02D9D3C4  40404040  40400038  40404040  00010001  0C003698  00010001
0C003694  00010001  0C0037AC  00010001  0C0037B4  00010001  0C0037B0
00010001  0C0038C0  00010001  0C0038C8  D9C5E2D6  F0F4F3F0**
02C5E2C4  40404040  40400010  40404040  C3C4E3F3  C4D74040  010038FC
40000001  40404040  40404040  40404040  40404040  40404040  40404040
40404040  40404040  40404040  40404040  D9C5E2D6  F0F4F3F1*
02E3E7E3  400038DE  40400038  40400001  58C0D048  58201000  41302000
41500004  1B255020  D9A45030  D9A847F0  CAFA47F0  F00C07C3  C4E3F3C4
D74090EC  D00C9823  F02058F0  F01C47F0  D9C5E2D6  F0F4F3F2*
02E3E7E3  40003916  40400006  40400001  F0140000  00004040  40404040
40404040  40404040  40404040  40404040  40404040  40404040  40404040
40404040  40404040  40404040  40404040  D9C5E2D6  F0F4F3F3*
02E3E7E3  40003920  40400028  40400001  00003924  58A0D004  58E0A00C
58B0A018  5810B004  5820D288  50201000  18DA92FF  A00C982C  A01C07FE
40404040  40404040  40404040  40404040  D9C5E2D6  F0F4F3F4*
02E3E7E3  4000391C  40400004  40400001  00003948  40404040  40404040
40404040  40404040  40404040  40404040  40404040  40404040  40404040
40404040  40404040  40404040  40404040  D9C5E2D6  F0F4F3F5*
02C5E2C4  40404040  40400010  40404040  C3C4E3F3  C4C44040  0100397C
40000001  40404040  40404040  40404040  40404040  40404040  40404040
40404040  40404040  40404040  40404040  D9C5E2D6  F0F4F3F6*
02E3E7E3  40003948  40400032  40400001  58C0D048  58701004  58207000
5020D288  58201000  41302000  41500004  1B255020  D9DC5030  D9E05030
D1D49280  D1D447F0  CAFA4040  40404040  D9C5E2D6  F0F4F3F7*
02E3E7E3  4000397C  40400020  40400001  47F0F00C  07C3C4E3  F3C4C440
90ECD00C  9823F020  58F0F01C  47F0F014  00000000  40404040  40404040
40404040  40404040  40404040  40404040  D9C5E2D6  F0F4F3F8*
02E3E7E3  400039A0  40400028  40400001  000039A4  58A0D004  58E0A00C
58B0A018  5810B008  5820D2B8  50201000  18DA92FF  A00C982C  A01C07FE
40404040  40404040  40404040  40404040  D9C5E2D6  F0F4F3F9*
02E3E7E3  4000399C  40400004  40400001  000039C8  40404040  40404040
40404040  40404040  40404040  40404040  40404040  40404040  40404040
40404040  40404040  40404040  40404040  D9C5E2D6  F0F4F4F0**
02E3E7E3  400039C8  40400038  40400001  58C0D048  98781004  78207000
7020D2F4  58208000  5020D2B8  58201000  41302000  41500004  1B255020
D9DC5030  D9E05030  D1D49280  D1D447F0  D9C5E2D6  F0F4F4F1*
02C5E2C4  40404040  40400010  40404040  C3C4E3F3  C4D34040  01003A04
40000001  40404040  40404040  40404040  40404040  40404040  40404040
40404040  40404040  40404040  40404040  D9C5E2D6  F0F4F4F2*
02E3E7E3  40003A00  40400002  40400001  CAFA4040  40404040  40404040
40404040  40404040  40404040  40404040  40404040  40404040  40404040
40404040  40404040  40404040  40404040  D9C5E2D6  F0F4F4F3*
02E3E7E3  40003A04  40400020  40400001  47F0F00C  07C3C4E3  F3C4D340
90ECD00C  9823F020  58F0F01C  47F0F014  00000000  40404040  40404040
40404040  40404040  40404040  40404040  D9C5E2D6  F0F4F4F4*
02D9D3C4  40404040  40400038  40404040  00010001  0C0038C4  00010001
0C003918  00010001  0C003920  00010001  0C00391C  00010001  0C003998

MEMBER NAME  BLDRESOL
00010001  0C0039A0  00010001  0C00399C  D9C5E2D6  F0F4F4F5*
02E3E7E3  40003A28  40400028  40400001  00003A2C  58A0D004  58E0A00C
58B0A018  5810B008  5820D2B8  50201000  18DA92FF  A00C982C  A01C07FE
40404040  40404040  40404040  40404040  D9C5E2D6  F0F4F4F6*
02E3E7E3  40003A24  40400004  40400001  00003A50  40404040  40404040
40404040  40404040  40404040  40404040  40404040  40404040  40404040
40404040  40404040  40404040  40404040  D9C5E2D6  F0F4F4F7*
02E3E7E3  40003A50  40400038  40400001  58C0D048  58701008  58207000
5020D2B8  58201000  41302000  41500004  1B255020  D9DC5030  D9E05030
D1D49280  D1D45820  10044130  20004150  D9C5E2D6  F0F4F4F8*
```

| | | | | | | |
|---|---|---|---|---|---|---|
| 02C5E2C4 | 40404040 | 40400010 | 40404040 | C3C4E3F3 | C4C14040 | 01003A98 |
| 40000001 | 40404040 | 40404040 | 40404040 | 40404040 | 40404040 | 40404040 |
| 40404040 | 40404040 | 40404040 | 40404040 | D9C5E2D6 | F0F4F4F9* | |
| 02E3E7E3 | 40003A88 | 40400030 | 40400001 | 00041B25 | 5020D9E4 | 5030D9E8 |
| 47F0CAFA | 47F0F00C | 07C3C4E3 | F3C4C140 | 90ECD00C | 9823F020 | 58F0F01C |
| 47F0F014 | 00000000 | 40404040 | 40404040 | D9C5E2D6 | F0F4F5F0** | |
| 02E3E7E3 | 40003ABC | 40400028 | 40400001 | 00003AC0 | 58A0D004 | 58E0A00C |
| 58B0A018 | 5810B008 | 5820D2B8 | 50201000 | 18DA92FF | A00C982C | A01C07FE |
| 40404040 | 40404040 | 40404040 | 40404040 | D9C5E2D6 | F0F4F5F1* | |
| 02E3E7E3 | 40003AB8 | 40400004 | 40400001 | 00003AE4 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F4F5F2* | |
| 02E3E7E3 | 40003AE4 | 40400038 | 40400001 | 58C0D048 | 58701008 | 58207000 |
| 5020D2B8 | 58201000 | 41302000 | 41500004 | 1B255020 | D9DC5030 | D9E05030 |
| D1D49280 | D1D45820 | 10044130 | 20004150 | D9C5E2D6 | F0F4F5F3* | |
| 02C5E2C4 | 40404040 | 40400010 | 40404040 | C3C4E3C8 | C2D74040 | 01003B2C |
| 40000001 | 40404040 | 40404040 | 40404040 | 40404040 | 40404040 | 40404040 |
| 40404040 | 40404040 | 40404040 | 40404040 | D9C5E2D6 | F0F4F5F4* | |
| 02E3E7E3 | 40003B1C | 40400030 | 40400001 | 00041B25 | 5020D9E4 | 5030D9E8 |
| 47F0CAFA | 47F0F00C | 07C3C4E3 | C8C2D740 | 90ECD00C | 9823F020 | 58F0F01C |
| 47F0F014 | 00000000 | 40404040 | 40404040 | D9C5E2D6 | F0F4F5F5* | |
| 02E3E7E3 | 40003B50 | 40400004 | 40400001 | 00003B54 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F4F5F6* | |
| 02D9D3C4 | 40404040 | 40400038 | 40404040 | 00010001 | 0C003A20 | 00010001 |
| 0C003A28 | 00010001 | 0C003A24 | 00010001 | 0C003AB4 | 00010001 | 0C003ABC |
| 00010001 | 0C003AB8 | 00010001 | 0C003B48 | D9C5E2D6 | F0F4F5F7* | |
| 02E3E7E3 | 40003B54 | 40400024 | 40400001 | 58A0D004 | 58E0A00C | 58B0A018 |
| 5810B000 | 5820D288 | 50201000 | 18DA92FF | A00C982C | A01C07FE | 40404040 |
| 40404040 | 40404040 | 40404040 | 40404040 | D9C5E2D6 | F0F4F5F8* | |
| 02E3E7E3 | 40003B4C | 40400004 | 40400001 | 00003B78 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F4F5F9* | |
| 02C5E2C4 | 40404040 | 40400010 | 40404040 | C3C4E3C7 | D9C44040 | 01003BA8 |
| 40000001 | 40404040 | 40404040 | 40404040 | 40404040 | 40404040 | 40404040 |
| 40404040 | 40404040 | 40404040 | 40404040 | D9C5E2D6 | F0F4F6F0** | |
| 02E3E7E3 | 40003B78 | 4040002E | 40400001 | 58C0D048 | 98781000 | 58207000 |
| 5020D288 | 58201004 | 41302000 | 41500004 | 1B255B20 | D2505020 | D9D45030 |
| D9D847F0 | CAFA4040 | 40404040 | 40404040 | D9C5E2D6 | F0F4F6F1* | |
| 02E3E7E3 | 40003BA8 | 40400020 | 40400001 | 47F0F00C | 07C3C4E3 | C7D9C440 |
| 90ECD00C | 9823F020 | 58F0F01C | 47F0F014 | 00000000 | 40404040 | 40404040 |
| 40404040 | 40404040 | 40404040 | 40404040 | D9C5E2D6 | F0F4F6F2* | |
| 02E3E7E3 | 40003BCC | 40400016 | 40400001 | 00003BD0 | 58D0D004 | 58E0D00C |
| 92FFD00C | 982CD01C | 07FE4040 | 40404040 | 40404040 | 40404040 | 40404040 |
| 40404040 | 40404040 | 40404040 | 40404040 | D9C5E2D6 | F0F4F6F3* | |
| 02E3E7E3 | 40003BC8 | 40400004 | 40400001 | 00003BE2 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F4F6F4* | |

MEMBER NAME BLDRESOL

| | | | | | | |
|---|---|---|---|---|---|---|
| 02E3E7E3 | 40003BE2 | 40400038 | 40400001 | 58C0D048 | 987B1000 | 58207000 |
| 5020D518 | 58208000 | 5020D51C | 58209000 | 5020D4A0 | 987A1018 | 58207000 |
| 5020D504 | 58208000 | 5020D50C | 5820100C | D9C5E2D6 | F0F4F6F5* | |
| 02E3E7E3 | 40003C1A | 40400038 | 40400001 | 41302000 | 41500004 | 1B255020 |
| DAC85030 | DACC5820 | 10104130 | 20004150 | 00041B25 | 5020DAB8 | 5030DABC |
| 58201014 | 41302000 | 41500004 | 1B255020 | D9C5E2D6 | F0F4F6F6* | |
| 02E3E7E3 | 40003C52 | 40400036 | 40400001 | DAC05030 | DAC45820 | 10204130 |
| 20004150 | 00041B25 | 5020DA5C | 5030DA60 | 58201024 | 41302000 | 41500004 |
| 1B255020 | DA645030 | DA6847F0 | CB0E4040 | D9C5E2D6 | F0F4F6F7* | |

```
02E3E7E3  40000024  40400004  40400001  00001BDA  40404040  40404040
40404040  40404040  40404040  40404040  40404040  40404040  40404040
40404040  40404040  40404040  40404040  D9C5E2D6  F0F4F6F8*
02E3E7E3  4000002C  40400004  40400001  00000088  40404040  40404040
40404040  40404040  40404040  40404040  40404040  40404040  40404040
40404040  40404040  40404040  40404040  D9C5E2D6  F0F4F6F9*
02E3E7E3  40000028  40400004  40400001  00001BC8  40404040  40404040
40404040  40404040  40404040  40404040  40404040  40404040  40404040
40404040  40404040  40404040  40404040  D9C5E2D6  F0F4F7F0**
02D9D3C4  40404040  40400038  40404040  00010001  0C003B50  00010001
0C003B4C  00010001  0C003BC4  00010001  0C003BCC  00010001  0C003BC8
00010001  0C000024  00010001  0C00002C  D9C5E2D6  F0F4F7F1*
02E3E7E3  400000D0  4040001C  40400001  00001088  00000C70  00001BAA
00000CC8  00001BAA  00000DC0  00000E24  40404040  40404040  40404040
40404040  40404040  40404040  40404040  D9C5E2D6  F0F4F7F2*
02D9D3C4  40404040  40400038  40404040  00010001  0C000028  00010001
0C0000D0  00010001  0C0000D4  00010001  0C0000D8  00010001  0C0000DC
00010001  0C0000E0  00010001  0C0000E4  D9C5E2D6  F0F4F7F3*
02E3E7E3  400000EC  40400008  40400001  000002C4  00000010  40404040
40404040  40404040  40404040  40404040  40404040  40404040  40404040
40404040  40404040  40404040  40404040  D9C5E2D6  F0F4F7F4*
02E3E7E3  400000F8  40400008  40400001  000002C4  00000018  40404040
40404040  40404040  40404040  40404040  40404040  40404040  40404040
40404040  40404040  40404040  40404040  D9C5E2D6  F0F4F7F5*
02E3E7E3  40000104  4040000C  40400001  00000308  000002A8  00000000
40404040  40404040  40404040  40404040  40404040  40404040  40404040
40404040  40404040  40404040  40404040  D9C5E2D6  F0F4F7F6*
02D9D3C4  40404040  40400038  40404040  00010001  0C0000E8  00010001
0C0000EC  00080001  0C0000F0  00010001  0C0000F8  00080001  0C0000FC
00010001  0C000104  00010001  0C000108  D9C5E2D6  F0F4F7F7*
02E3E7E3  40000110  4040001C  40400001  000002A8  000002AC  80000570
00000308  000002A8  00000002  000002A8  40404040  40404040  40404040
40404040  40404040  40404040  40404040  D9C5E2D6  F0F4F7F8*
02D9D3C4  40404040  40400038  40404040  00090001  0C00010C  00010001
0C000110  00010001  0C000114  00010001  0C000118  00010001  0C00011C
00010001  0C000120  00090001  0C000124  D9C5E2D6  F0F4F7F9*
02E3E7E3  4000012C  40400010  40400001  000002AC  80000570  000002C4
00000028  40404040  40404040  40404040  40404040  40404040  40404040
40404040  40404040  40404040  40404040  D9C5E2D6  F0F4F8F0**
02E3E7E3  40000140  4040000C  40400001  000003D4  00000548  00000580
40404040  40404040  40404040  40404040  40404040  40404040  40404040
40404040  40404040  40404040  40404040  D9C5E2D6  F0F4F8F1*
02D9D3C4  40404040  40400038  40404040  00010001  0C000128  00010001
0C00012C  00010001  0C000130  00010001  0C000134  00080001  0C000138
00010001  0C000140  00010001  0C000144  D9C5E2D6  F0F4F8F2*
02E3E7E3  4000014C  4040001C  40400001  80000368  000003CC  00000590
00000584  00000434  00000574  00000970  40404040  40404040  40404040
40404040  40404040  40404040  40404040  D9C5E2D6  F0F4F8F3*
02D9D3C4  40404040  40400038  40404040  00010001  0C000148  00010001

MEMBER NAME  BLDRESOL
0C00014C  00010001  0C000150  00010001  0C000154  00010001  0C000158
00010001  0C00015C  00010001  0C000160  D9C5E2D6  F0F4F8F4*
02E3E7E3  40000168  4040001C  40400001  00000970  00000970  00000970
00000970  80000368  00000970  00000574  40404040  40404040  40404040
40404040  40404040  40404040  40404040  D9C5E2D6  F0F4F8F5*
02D9D3C4  40404040  40400038  40404040  00010001  0C000164  00010001
0C000168  00010001  0C00016C  00010001  0C000170  00010001  0C000174
00010001  0C000178  00010001  0C00017C  D9C5E2D6  F0F4F8F6*
```

02E3E7E3 40000184 40400008 40400001 800008F4 000002E4 40404040
40404040 40404040 40404040 40404040 40404040 40404040 40404040
40404040 40404040 40404040 40404040 D9C5E2D6 F0F4F8F7*
02E3E7E3 40000190 40400004 40400001 800008FC 40404040 40404040
40404040 40404040 40404040 40404040 40404040 40404040 40404040
40404040 40404040 40404040 40404040 D9C5E2D6 F0F4F8F8*
02E3E7E3 4000019C 40400008 40400001 000008E8 80000340 40404040
40404040 40404040 40404040 40404040 40404040 40404040 40404040
40404040 40404040 40404040 40404040 D9C5E2D6 F0F4F8F9*
02E3E7E3 400001A8 40400004 40400001 000008E8 40404040 40404040
40404040 40404040 40404040 40404040 40404040 40404040 40404040
40404040 40404040 40404040 40404040 D9C5E2D6 F0F4F9F0**
02E3E7E3 400001B0 40400004 40400001 80000340 40404040 40404040
40404040 40404040 40404040 40404040 40404040 40404040 40404040
40404040 40404040 40404040 40404040 D9C5E2D6 F0F4F9F1*
02D9D3C4 40404040 40400038 40404040 00010001 0C000180 00010001
0C000184 00010001 0C000188 00010001 0C000190 00010001 0C00019C
00010001 0C0001A0 00010001 0C0001A8 D9C5E2D6 F0F4F9F2*
02E3E7E3 400001B4 40400010 40400001 00000328 0000032C 80000330
000002DC 40404040 40404040 40404040 40404040 40404040 40404040
40404040 40404040 40404040 40404040 D9C5E2D6 F0F4F9F3*
02E3E7E3 400001C8 40400008 40400001 800008FC 000002C4 40404040
40404040 40404040 40404040 40404040 40404040 40404040 40404040
40404040 40404040 40404040 40404040 D9C5E2D6 F0F4F9F4*
02E3E7E3 400001D4 40400008 40400001 80000000 000002B4 40404040
40404040 40404040 40404040 40404040 40404040 40404040 40404040
40404040 40404040 40404040 40404040 D9C5E2D6 F0F4F9F5*
02D9D3C4 40404040 40400038 40404040 00010001 0C0001B0 00010001
0C0001B4 00010001 0C0001B8 00010001 0C0001BC 00010001 0C0001C0
00010001 0C0001C8 00010001 0C0001CC D9C5E2D6 F0F4F9F6*
02E3E7E3 400001E0 40400004 40400001 80000000 40404040 40404040
40404040 40404040 40404040 40404040 40404040 40404040 40404040
40404040 40404040 40404040 40404040 D9C5E2D6 F0F4F9F7*
02E3E7E3 400001E8 40400018 40400001 000003D8 00000598 00000408
00000410 00000404 8000040C 40404040 40404040 40404040 40404040
40404040 40404040 40404040 40404040 D9C5E2D6 F0F4F9F8*
02E3E7E3 40000204 40400004 40400001 0000043C 40404040 40404040
40404040 40404040 40404040 40404040 40404040 40404040 40404040
40404040 40404040 40404040 40404040 D9C5E2D6 F0F4F9F9*
02D9D3C4 40404040 40400038 40404040 00010001 0C0001D8 00010001
0C0001E8 00010001 0C0001EC 00010001 0C0001F0 00010001 0C0001F4
00010001 0C0001F8 00010001 0C0001FC D9C5E2D6 F0F5F0F0**
02E3E7E3 4000020C 4040001C 40400001 000003A4 00000548 00000580
80000368 000003A4 000002A8 000002C8 40404040 40404040 40404040
40404040 40404040 40404040 40404040 D9C5E2D6 F0F5F0F1*
02D9D3C4 40404040 40400038 40404040 00010001 0C000204 00010001
0C00020C 00010001 0C000210 00010001 0C000214 00010001 0C000218
00010001 0C00021C 00010001 0C000220 D9C5E2D6 F0F5F0F2*
02E3E7E3 40000228 40400020 40400001 80000928 80000B80 800005C0
80000B80 80000B80 80000000 00000928 000007A8 40404040 40404040

MEMBER NAME BLDRESOL 40404040 40404040 40404040 40404040 D9C5E2D6 F0F5F0F3*
02D9D3C4 40404040 40400038 40404040 00010001 0C000224 00010001
0C000228 00010001 0C00022C 00010001 0C000230 00010001 0C000234
00010001 0C000238 00010001 0C000240 D9C5E2D6 F0F5F0F4*
02E3E7E3 40000248 4040000C 40400001 000005C8 00000708 80000314
40404040 40404040 40404040 40404040 40404040 40404040 40404040
40404040 40404040 40404040 40404040 D9C5E2D6 F0F5F0F5*

| | | | | | | |
|---|---|---|---|---|---|---|
| 02E3E7E3 | 40000258 | 40400004 | 40400001 | 0000043C | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F5F0F6* | |
| 02E3E7E3 | 40000B58 | 40400038 | 40400001 | 00000000 | 00000000 | 00000000 |
| 00000000 | 00000000 | 00000000 | 00000000 | 00000000 | 00000000 | 00000000 |
| 00000000 | 00000000 | 00000000 | 00000000 | D9C5E2D6 | F0F5F0F7* | |
| 02E3E7E3 | 40000B90 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D9C5E2D6 | F0F5F0F8* | |
| 02D9D3C4 | 40404040 | 40400028 | 40404040 | 00010001 | 0C000244 | 00010001 |
| 0C000248 | 00010001 | 0C00024C | 00010001 | 0C000250 | 00010001 | 0C000258 |
| 40404040 | 40404040 | 40404040 | 40404040 | D9C5E2D6 | F0F5F0F9* | |
| 02C5D5C4 | 40404040 | 40404040 | 40404040 | 40404040 | 40404040 | 40404040 |
| 00003C88 | F1F5F7F3 | F460C6D6 | F34040F0 | F2F0F2F8 | F7F0F9F8 | 40F0F84B |
| F1F24BF3 | F7404040 | D9C5E2D6 | D3E54040 | D9C5E2D6 | F0F5F1F0** | |

MEMBER NAME BREAK

| | | | | | | |
|---|---|---|---|---|---|---|
| 02C5E2C4 | 40404040 | 40400010 | 40400001 | C2D9C5C1 | D2404040 | 00000000 |
| 40000000 | 40404040 | 40404040 | 40404040 | 40404040 | 40404040 | 40404040 |
| 40404040 | 40404040 | 40404040 | 40404040 | C2D9C5C1 | F0F0F0F1* | |
| 02E3E7E3 | 40000000 | 40400038 | 40400001 | 47F0F00C | 07C2D9C5 | C1D24040 |
| 90ECD00C | 184D98CD | F0205040 | D00450D0 | 400807FC | 40404040 | 40404040 |
| 021A24C9 | D4D7D9D6 | D7C5D940 | C5D3C5D4 | C2D9C5C1 | F0F0F0F2* | |
| 02E3E7E3 | 40000038 | 4040001A | 40400001 | D5E340E3 | E8D7C540 | C6D6E4D5 |
| C440C9D5 | 40C2D9C5 | C1D24010 | 04224040 | 40404040 | 40404040 | 40404040 |
| 40404040 | 40404040 | 40404040 | 40404040 | C2D9C5C1 | F0F0F0F3* | |
| 02E3E7E3 | 40000150 | 40400038 | 40400001 | 00000000 | 00000000 | 4F080000 |
| 00000000 | 00000000 | 00000000 | 00000000 | 00000001 | 00000001 | 00000002 |
| 00000003 | 00000004 | 00000005 | 00000006 | C2D9C5C1 | F0F0F0F4* | |
| 02C5E2C4 | 40404040 | 40400010 | 40400002 | E2D7D3D7 | E3E24040 | 05000000 |
| 40030D44 | 40404040 | 40404040 | 40404040 | 40404040 | 40404040 | 40404040 |
| 40404040 | 40404040 | 40404040 | 40404040 | C2D9C5C1 | F0F0F0F5* | |
| 02E3E7E3 | 40000188 | 40400020 | 40400001 | 00000007 | 00000008 | 00000009 |
| 0000000B | 0000000E | 00000014 | 00000000 | 00000000 | 40404040 | 40404040 |
| 40404040 | 40404040 | 40404040 | 40404040 | C2D9C5C1 | F0F0F0F6* | |
| 02C5E2C4 | 40404040 | 40400010 | 40400003 | E2D7D3C9 | E3404040 | 02000000 |
| 40000000 | 40404040 | 40404040 | 40404040 | 40404040 | 40404040 | 40404040 |
| 40404040 | 40404040 | 40404040 | 40404040 | C2D9C5C1 | F0F0F0F7* | |
| 02E3E7E3 | 40000218 | 40400008 | 40400001 | FFFFFFEC | 00000000 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F0F8* | |
| 02C5E2C4 | 40404040 | 40400010 | 40400004 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | C2D9C5C1 | F0F0F0F9* | |
| 02E3E7E3 | 40000224 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F1F0** | |
| 02C5E2C4 | 40404040 | 40400010 | 40400005 | D7D9D6D1 | C1D94040 | 02000000 |
| 40000000 | 40404040 | 40404040 | 40404040 | 40404040 | 40404040 | 40404040 |
| 40404040 | 40404040 | 40404040 | 40404040 | C2D9C5C1 | F0F0F1F1* | |
| 02E3E7E3 | 40000230 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F1F2* | |
| 02C5E2C4 | 40404040 | 40400010 | 40400006 | D7D9D6D1 | D3D54040 | 02000000 |
| 40000000 | 40404040 | 40404040 | 40404040 | 40404040 | 40404040 | 40404040 |
| 40404040 | 40404040 | 40404040 | 40404040 | C2D9C5C1 | F0F0F1F3* | |
| 02C5E2C4 | 40404040 | 40400010 | 40400007 | D7D9D6D1 | E2D74040 | 02000000 |
| 40000000 | 40404040 | 40404040 | 40404040 | 40404040 | 40404040 | 40404040 |
| 40404040 | 40404040 | 40404040 | 40404040 | C2D9C5C1 | F0F0F1F4* | |

```
02C5E2C4  40404040  40400010  40400008  E4D7C4E3  C5F14040  02000000
40000000  40404040  40404040  40404040  40404040  40404040  40404040
40404040  40404040  40404040  40404040  C2D9C5C1  F0F0F1F5*
02E3E7E3  4000023C  40400010  40400001  00000000  00000000  00000000
00000000  40404040  40404040  40404040  40404040  40404040  40404040
40404040  40404040  40404040  40404040  C2D9C5C1  F0F0F1F6*
02E3E7E3  40000250  40400004  40400001  00000000  40404040  40404040
40404040  40404040  40404040  40404040  40404040  40404040  40404040
40404040  40404040  40404040  40404040  C2D9C5C1  F0F0F1F7*
02E3E7E3  400002AC  40400038  40400001  5800D10C  5000D1A4  5800D180
5000D1AC  5800D17C  5000D1A8  5800D124  5000D200  58B0D118  58B0D118
5800D1A4  1A0B5000  D1A45800  D1145000  C2D9C5C1  F0F0F1F8*
02E3E7E3  400002E4  40400038  40400001  D18C18AB  58B0D1D0  5890D1DC
5880D1C4  47F0D2DE  5800D198  1BFF870F  D2B458F0  D1F84110  D06805EF
5800D198  1BFF870F  D2C85800  D1A81A0A  C2D9C5C1  F0F0F1F9*
02E3E7E3  4000031C  40400038  40400001  5000D1A8  5800D18C  1BFF860F

MEMBER NAME  BREAK
D2D647F0  D2785800  D1085000  D18C5800  D1AC5000  D1805800  D1085000
D1985800  D1A45900  D18047C0  D2FE47F0  C2D9C5C1  F0F0F2F0**
02E3E7E3  40000354  40400038  40400001  D7385850  D1A45C40  D2085050
D2501825  5A20D134  7802B000  32004770  D31E47F0  D2785800  D18C1BFF
870FD336  18255A20  D20C7822  B0007020  C2D9C5C1  F0F0F2F1*
02E3E7E3  4000038C  40400038  40400001  D1B45800  D18C1BFF  870FD350
5820D250  5A20D210  7822B000  7020D1B8  5800D18C  1BFF860F  D36A5820
D2505A20  D1447822  B0007020  D1B45800  C2D9C5C1  F0F0F2F2*
02E3E7E3  400003C4  40400038  40400001  D18C1BFF  860FD384  5820D250
5A20D214  7822B000  7020D1B8  50A0D154  5800D214  5000D248  5800D218
5000D24C  5880D208  189A58B0  D14458A0  C2D9C5C1  F0F0F2F3*
02E3E7E3  400003FC  40400038  40400001  D1DC58E0  D248585E  A00058E0
D24C580E  A0005000  D1841835  5050D150  1C481825  5A20D124  18055A00
D20C5000  D2281805  5A00D210  5000D22C  C2D9C5C1  F0F0F2F4*
02E3E7E3  40000434  40400038  40400001  18051A0B  5000D230  18055A00
D2145000  D2341805  5A00D218  5000D238  18055A00  D21C5000  D23C5A50
D2205050  D24018A3  18B25890  D1D059A0  C2D9C5C1  F0F0F2F5*
02E3E7E3  4000046C  40400038  40400001  D1A44780  D69A2B00  780B9000
6A00D100  6000D0F8  5830D0FC  5030D168  5930D118  4780D480  5930D11C
4770D448  50A0D150  47F0D522  5930D120  C2D9C5C1  F0F0F2F6*
02E3E7E3  400004A4  40400024  40400001  4780D536  5930D124  4780D5B4
5930D128  4780D69A  58F0D1D8  45E0F004  00000006  00000028  40404040
40404040  40404040  40404040  40404040  C2D9C5C1  F0F0F2F7*
02D9D3C4  40404040  40400038  40404040  00020001  0C000218  00030001
1C000224  00040001  1C000230  00050001  1C00023C  00060001  1C000240
00070001  1C000244  00080001  1C000250  C2D9C5C1  F0F0F2F8*
02E3E7E3  400004C8  40400038  40400001  45E0F008  0450D168  45E0F010
47F0D69A  58E0D228  780E9000  7000D158  58E0D22C  780E9000  7000D160
58E0D230  780E9000  7000D15C  58E0D234  C2D9C5C1  F0F0F2F9*
02E3E7E3  40000500  40400038  40400001  780E9000  7000D164  58F0D1E8
4110D084  05EF50A0  D15041E0  000815FE  4720D4CE  58EFD04C  07FE47F0
D69A5880  D1C45890  D1DC58B0  D1D058A0  C2D9C5C1  F0F0F3F0**
02E3E7E3  40000538  40400038  40400001  D1185800  D1AC1A0A  5000D1AC
5800D114  5000D198  5800D150  5900D1A4  47A0D50A  5800D1A4  1A0A5000
D1A458F0  D1CC4110  D09805EF  5800D1A8  C2D9C5C1  F0F0F3F1*
02E3E7E3  40000570  40400038  40400001  1A0A5000  D1A847F0  D2A05880
D1C45890  D1DC58B0  D1D058A0  D11847F0  D2A0410B  90005000  D0D49280
D0D458F0  D1E44110  D0D005EF  50A0D150  C2D9C5C1  F0F0F3F2*
02E3E7E3  400005A8  40400038  40400001  41E00004  15FE4720  D56058EF
D05807FE  47F0D69A  5880D1C4  5890D1DC  58B0D1D0  58A0D118  5800D1AC
1A0A5000  D1AC5800  D1145000  D1985800  C2D9C5C1  F0F0F3F3*
```

```
02E3E7E3  400005E0  40400038  40400001  D1505900  D1A447A0  D59C5800
D1A41A0A  5000D1A4  58F0D1CC  4110D098  05EF5800  D1A81A0A  5000D1A8
47F0D2A0  58E0D238  2B00780E  90006A00  C2D9C5C1  F0F0F3F4*
02E3E7E3  40000618  40400038  40400001  D1006000  D0F85850  D0FC58E0
D23C2B00  780E9000  6A00D100  6000D0F8  5800D0FC  5000D174  58E0D240
2B00780E  90006A00  D1006000  D0F85870  C2D9C5C1  F0F0F3F5*
02E3E7E3  40000650  40400038  40400001  D0FC5C40  D1445C60  D2241827
5A20D200  410B9000  5000D0DC  58F0D1C0  4105F004  5000D0E0  58F0D1F0
4102F000  5000D0E8  58F0D1EC  4110D0D8  C2D9C5C1  F0F0F3F6*
02E3E7E3  40000688  40400038  40400001  05EF50A0  D15041E0  000415FE
4720D646  58EFD060  07FE47F0  D69A5880  D1C45890  D1DC58B0  D1D058A0
D1185800  D1AC1A0A  5000D1AC  5800D114  C2D9C5C1  F0F0F3F7*
02E3E7E3  400006C0  40400038  40400001  5000D198  5800D150  5900D1A4
47A0D682  5800D1A4  1A0A5000  D1A458F0  D1CC4110  D09805EF  5800D1A8
1A0A5000  D1A847F0  D2A05800  D2401A08  C2D9C5C1  F0F0F3F8*
02E3E7E3  400006F8  40400038  40400001  5000D240  5800D23C  1A085000
D23C5800  D2381A08  5000D238  5800D234  1A085000  D2345800  D2301A08

MEMBER NAME  BREAK
5000D230  5800D22C  1A085000  D22C5800  C2D9C5C1  F0F0F3F9*
02E3E7E3  40000730  40400038  40400001  D2281A08  5000D228  1AB85AA0
D11859A0  D18447C0  D41250A0  D15058A0  D1DC58B0  D1445890  D1185820
D1541A29  5020D154  5800D24C  1A0B5000  C2D9C5C1  F0F0F4F0**
02E3E7E3  40000768  40400038  40400001  D24C5800  D2481A0B  5000D248
5920D16C  47C0D3A6  5880D1C4  5890D1DC  58B0D1D0  58A0D118  47F0D2A0
1BFF58E0  D00007FE  58A0D004  58E0A00C  C2D9C5C1  F0F0F4F1*
02E3E7E3  400007A0  40400038  40400001  58B0A018  5810B004  5820D180
50201000  5830B00C  5840D1A0  50403000  5850B014  5860D16C  50605000
5870B020  5880D1B0  50807000  18DA92FF  C2D9C5C1  F0F0F4F2*
02E3E7E3  400007D8  40400038  40400001  A00C982C  A01C07FE  987B1004
58207000  5020D180  58209000  5020D1A0  987A1014  58207000  5020D16C
58208000  5020D17C  5820A000  5020D1B0  C2D9C5C1  F0F0F4F3*
02E3E7E3  40000810  40400038  40400001  58201000  41302000  41500004
1B255C40  D1401B25  5020D1D0  5030D1D4  5030D06C  5030D0A0  58201008
41302000  41500004  1B255C40  D13C1B25  C2D9C5C1  F0F0F4F4*
02E3E7E3  40000848  40400038  40400001  5020D1F0  5030D1F4  5030D0A8
58201010  41302000  41500004  1B255C40  D1281B25  5020D1DC  5030D1E0
5030D078  5030D0B0  5820101C  41302000  C2D9C5C1  F0F0F4F5*
02E3E7E3  40000880  4040001C  40400001  41500004  1B255C40  D1401B25
5020D1C4  5030D1C8  5030D0C8  47F0D254  40404040  40404040  40404040
40404040  40404040  40404040  40404040  C2D9C5C1  F0F0F4F6*
02E3E7E3  40000020  40400008  40400001  000007E0  00000058  40404040
40404040  40404040  40404040  40404040  40404040  40404040  40404040
40404040  40404040  40404040  40404040  C2D9C5C1  F0F0F4F7*
02E3E7E3  40000058  40400004  40400001  00000798  40404040  40404040
40404040  40404040  40404040  40404040  40404040  40404040  40404040
40404040  40404040  40404040  40404040  C2D9C5C1  F0F0F4F8*
02E3E7E3  400000A4  40400010  40400001  00000526  0000052A  00000526
000005B8  40404040  40404040  40404040  40404040  40404040  40404040
40404040  40404040  40404040  40404040  C2D9C5C1  F0F0F4F9*
02D9D3C4  40404040  40400038  40404040  00010001  0C0004C4  00010001
0C000020  00010001  0C000024  00010001  0C000058  00010001  0C0000A4
00010001  0C0000A8  00010001  0C0000AC  C2D9C5C1  F0F0F5F0**
02E3E7E3  400000B4  40400010  40400001  000005BC  0000069E  000006A2
0000020C  40404040  40404040  40404040  40404040  40404040  40404040
40404040  40404040  40404040  40404040  C2D9C5C1  F0F0F5F1*
02E3E7E3  400000C8  40400008  40400001  000001D8  000001FC  40404040
40404040  40404040  40404040  40404040  40404040  40404040  40404040
40404040  40404040  40404040  40404040  C2D9C5C1  F0F0F5F2*
```

```
02E3E7E3  400000D4  40400004  40400001  000001C4  40404040  40404040
40404040  40404040  40404040  40404040  40404040  40404040  40404040
40404040  40404040  40404040  40404040  C2D9C5C1  F0F0F5F3*
02D9D3C4  40404040  40400038  40404040  00010001  0C0000B0  00010001
0C0000B4  00010001  0C0000B8  00010001  0C0000BC  00010001  0C0000C0
00010001  0C0000C8  00010001  0C0000CC  C2D9C5C1  F0F0F5F4*
02E3E7E3  400000D8  4040001C  40400001  80000200  0000020C  000001B0
000001B8  000001B4  800001BC  000001A8  40404040  40404040  40404040
40404040  40404040  40404040  40404040  C2D9C5C1  F0F0F5F5*
02D9D3C4  40404040  40400038  40404040  00010001  0C0000D4  00010001
0C0000D8  00010001  0C0000DC  00010001  0C0000E0  00010001  0C0000E4
00010001  0C0000E8  00010001  0C0000EC  C2D9C5C1  F0F0F5F6*
02E3E7E3  400000F4  40400004  40400001  000001AC  40404040  40404040
40404040  40404040  40404040  40404040  40404040  40404040  40404040
40404040  40404040  40404040  40404040  C2D9C5C1  F0F0F5F7*
02E3E7E3  400000FC  40400004  40400001  000001D8  40404040  40404040
40404040  40404040  40404040  40404040  40404040  40404040  40404040
40404040  40404040  40404040  40404040  C2D9C5C1  F0F0F5F8*

MEMBER NAME  BREAK
02E3E7E3  40000104  40400004  40400001  000001F8  40404040  40404040
40404040  40404040  40404040  40404040  40404040  40404040  40404040
40404040  40404040  40404040  40404040  C2D9C5C1  F0F0F5F9*
02E3E7E3  4000010C  40400010  40400001  000001C4  0000020C  000001D0
000001E8  40404040  40404040  40404040  40404040  40404040  40404040
40404040  40404040  40404040  40404040  C2D9C5C1  F0F0F6F0**
02D9D3C4  40404040  40400038  40404040  00010001  0C0000F0  00010001
0C0000F4  00010001  0C0000FC  00010001  0C000104  00010001  0C00010C
00010001  0C000110  00010001  0C000114  C2D9C5C1  F0F0F6F1*
02E3E7E3  4000011C  40400004  40400001  00000200  40404040  40404040
40404040  40404040  40404040  40404040  40404040  40404040  40404040
40404040  40404040  40404040  40404040  C2D9C5C1  F0F0F6F2*
02E3E7E3  40000124  40400010  40400001  80000208  0000020C  80000000
0000020C  40404040  40404040  40404040  40404040  40404040  40404040
40404040  40404040  40404040  40404040  C2D9C5C1  F0F0F6F3*
02E3E7E3  4000013C  40400004  40400001  000001CC  40404040  40404040
40404040  40404040  40404040  40404040  40404040  40404040  40404040
40404040  40404040  40404040  40404040  C2D9C5C1  F0F0F6F4*
02E3E7E3  40000144  40400008  40400001  000001D0  800001E8  40404040
40404040  40404040  40404040  40404040  40404040  40404040  40404040
40404040  40404040  40404040  40404040  C2D9C5C1  F0F0F6F5*
02D9D3C4  40404040  40400038  40404040  00010001  0C000118  00010001
0C00011C  00010001  0C000124  00010001  0C000128  00010001  0C000130
00010001  0C00013C  00010001  0C000144  C2D9C5C1  F0F0F6F6*
02E3E7E3  40000254  40400038  40400001  00000000  00000000  00000000
00000038  0000000C  00000010  00000018  0000001C  00000020  00000024
0000002C  00000000  00000000  00000000  C2D9C5C1  F0F0F6F7*
02E3E7E3  4000028C  40400020  40400001  0104000D  00000000  0000000E
00F8000F  00000000  0000000F  0140000F  0130000F  40404040  40404040
40404040  40404040  40404040  40404040  C2D9C5C1  F0F0F6F8*
02D9D3C4  40404040  40400008  40404040  00010001  0C000148  40404040
40404040  40404040  40404040  40404040  40404040  40404040  40404040
40404040  40404040  40404040  40404040  C2D9C5C1  F0F0F6F9*
02C5D5C4  40404040  40404040  40404040  40404040  40404040  40404040
0000089C  F1F5F7F3  F460C6D6  F34040F0  F2F0F2F8  F7F0F9F8  40F0F84B
F1F24BF4  F6404040  C2D9C5C1  D2404040  C2D9C5C1  F0F0F7F0**

MEMBER NAME  BREAK1
02C5E2C4  40404040  40400010  40400001  C2D9C5C1  D2F14040  00000000
```

| | | | | | | |
|---|---|---|---|---|---|---|
| 40000000 | 40404040 | 40404040 | 40404040 | 40404040 | 40404040 | 40404040 |
| 40404040 | 40404040 | 40404040 | 40404040 | C2D9C5C1 | F0F0F0F1* | |
| 02E3E7E3 | 40000000 | 40400028 | 40400001 | 47F0F00C | 07C2D9C5 | C1D2F140 |
| 90ECD00C | 184D98CD | F0205040 | D00450D0 | 400807FC | 40404040 | 40404040 |
| 40404040 | 40404040 | 40404040 | 40404040 | C2D9C5C1 | F0F0F0F2* | |
| 02C5E2C4 | 40404040 | 40400010 | 40400002 | C5D3D4E3 | C2D34040 | 05000000 |
| 400D7D28 | 40404040 | 40404040 | 40404040 | 40404040 | 40404040 | 40404040 |
| 40404040 | 40404040 | 40404040 | 40404040 | C2D9C5C1 | F0F0F0F3* | |
| 02E3E7E3 | 40000088 | 40400034 | 40400001 | 00000000 | 00000000 | 00000001 |
| 00000002 | 00000003 | 00000004 | 00000005 | 00000006 | 0000002C | 00000038 |
| 41100000 | 00000000 | 00000000 | 40404040 | C2D9C5C1 | F0F0F0F4* | |
| 02C5E2C4 | 40404040 | 40400010 | 40400003 | C2D9C5C1 | D2F24040 | 02000000 |
| 40000000 | 40404040 | 40404040 | 40404040 | 40404040 | 40404040 | 40404040 |
| 40404040 | 40404040 | 40404040 | 40404040 | C2D9C5C1 | F0F0F0F5* | |
| 02E3E7E3 | 400000E8 | 4040000C | 40400001 | FFFFFFC8 | 000CD118 | 00000000 |
| 40404040 | 40404040 | 40404040 | 40404040 | 40404040 | 40404040 | 40404040 |
| 40404040 | 40404040 | 40404040 | 40404040 | C2D9C5C1 | F0F0F0F6* | |
| 02E3E7E3 | 400000F8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F0F7* | |
| 02E3E7E3 | 40000120 | 40400038 | 40400001 | 58A0D0C8 | 5890D084 | 5880D068 |
| 5870D08C | 5800D0F0 | 5000D0E4 | 5800D0F4 | 5000D0E8 | 5840D0EC | 185858B0 |
| D0D85804 | A0001200 | 4780D1D0 | 58E0D0E4 | C2D9C5C1 | F0F0F0F8* | |
| 02E3E7E3 | 40000158 | 40400038 | 40400001 | 583EA000 | 58E0D0E8 | 586EA000 |
| 5030D094 | 58B0D0C0 | 18395C20 | D0947800 | D0647003 | B0087823 | B00C7020 |
| D0B07823 | B0107020 | D0B458F0 | D0D04110 | C2D9C5C1 | F0F0F0F9* | |
| 02E3E7E3 | 40000190 | 40400038 | 40400001 | D04C05EF | 5800D09C | 8707D182 |
| 18395C20 | D0947800 | D0887003 | B0085800 | D09C8607 | D1C01839 | 5C20D094 |
| 7823B014 | 7020D0B0 | 7823B018 | 7020D0B4 | C2D9C5C1 | F0F0F1F0** | |
| 02E3E7E3 | 400001C8 | 40400038 | 40400001 | 58F0D0D0 | 4110D04C | 05EF5800 |
| D09C8707 | D1C01839 | 5C20D094 | 7800D088 | 7003B008 | 5820D094 | 1A285020 |
| D0941926 | 47C0D144 | 58B0D0D8 | 1A585800 | C2D9C5C1 | F0F0F1F1* | |
| 02E3E7E3 | 40000200 | 40400038 | 40400001 | D0E81A0B | 5000D0E8 | 5800D0E4 |
| 1A0B5000 | D0E41A4B | 5950D0A8 | 47C0D122 | 1BFF58E0 | D00007FE | 58A0D004 |
| 58E0A00C | 58B0A018 | 5810B004 | 5820D0A8 | C2D9C5C1 | F0F0F1F2* | |
| 02E3E7E3 | 40000238 | 40400038 | 40400001 | 50201000 | 18DA92FF | A00C982C |
| A01C07FE | 58701004 | 58207000 | 5020D0A8 | 58201000 | 41302000 | 41500004 |
| 1B255C40 | D0701B25 | 5020D0C8 | 5030D0CC | C2D9C5C1 | F0F0F1F3* | |
| 02E3E7E3 | 40000270 | 40400008 | 40400001 | 5030D050 | 47F0D0F8 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F1F4* | |
| 02E3E7E3 | 40000020 | 4040000C | 40400001 | 00000248 | 00000028 | 00000224 |
| 40404040 | 40404040 | 40404040 | 40404040 | 40404040 | 40404040 | 40404040 |
| 40404040 | 40404040 | 40404040 | 40404040 | C2D9C5C1 | F0F0F1F5* | |
| 02E3E7E3 | 40000074 | 40400004 | 40400001 | 000000D8 | 40404040 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F1F6* | |
| 02E3E7E3 | 4000007C | 40400004 | 40400001 | 000000D0 | 40404040 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F1F7* | |
| 02D9D3C4 | 40404040 | 40400038 | 40404040 | 00020001 | 0C0000E8 | 00020001 |
| 0C0000EC | 00030001 | 1C0000F8 | 00010001 | 0C000020 | 00010001 | 0C000024 |
| 00010001 | 0C000028 | 00010001 | 0C000074 | C2D9C5C1 | F0F0F1F8* | |
| 02E3E7E3 | 40000080 | 40400008 | 40400001 | 000000BC | 800000C4 | 40404040 |
| 40404040 | 40404040 | 40404040 | 40404040 | 40404040 | 40404040 | 40404040 |
| 40404040 | 40404040 | 40404040 | 40404040 | C2D9C5C1 | F0F0F1F9* | |
| 02E3E7E3 | 400000FC | 40400024 | 40400001 | 00000000 | 0000000C | 00000008 |

MEMBER NAME BREAK1

```
00000000  00000000  00000000  00000018  00000010  00000014  40404040
40404040  40404040  40404040  40404040  C2D9C5C1  F0F0F2F0**
02D9D3C4  40404040  40400018  40404040  00010001  0C00007C  00010001
0C000080  00010001  0C000084  40404040  40404040  40404040  40404040
40404040  40404040  40404040  40404040  C2D9C5C1  F0F0F2F1*
02C5D5C4  40404040  40404040  40404040  40404040  40404040  40404040
00000278  F1F5F7F3  F460C6D6  F34040F0  F2F0F2F8  F7F0F9F8  40F0F84B
F1F24BF5  F2404040  C2D9C5C1  D2F14040  C2D9C5C1  F0F0F2F2**

MEMBER NAME  BREAK2
02C5E2C4  40404040  40400010  40400001  C2D9C5C1  D2F24040  00000000
40000000  40404040  40404040  40404040  40404040  40404040  40404040
40404040  40404040  40404040  40404040  C2D9C5C1  F0F0F0F1*
02E3E7E3  40000000  40400038  40400001  47F0F00C  07C2D9C5  C1D2F240
90ECD00C  184D98CD  F0205040  D00450D0  400807FC  40404040  40404040
021A25C9  D4D7D9D6  D7C5D940  C5D3C5D4  C2D9C5C1  F0F0F0F2*
02E3E7E3  40000038  40400026  40400001  D5E340E3  E8D7C540  C6D6E4D5
C440C9D5  40C2D9C5  C1D2F240  10061A07  C5D3C5D4  C5D5E310  06224040
40404040  40404040  40404040  40404040  C2D9C5C1  F0F0F0F3*
02E3E7E3  40000100  40400038  40400001  00000000  00000000  4F080000
00000000  00000000  00000000  00000001  00000001  00000002  00000003
00000004  00000005  00000006  00000007  C2D9C5C1  F0F0F0F4*
02C5E2C4  40404040  40400010  40400002  C5D3D4E3  C2D34040  05000000
400D7D28  40404040  40404040  40404040  40404040  40404040  40404040
40404040  40404040  40404040  40404040  C2D9C5C1  F0F0F0F5*
02E3E7E3  40000138  4040001C  40400001  00000008  00000009  00000014
0000002C  00000038  00000000  00000000  40404040  40404040  40404040
40404040  40404040  40404040  40404040  C2D9C5C1  F0F0F0F6*
02C5E2C4  40404040  40400010  40400003  E2D7D3D7  E3E24040  05000000
40030D44  40404040  40404040  40404040  40404040  40404040  40404040
40404040  40404040  40404040  40404040  C2D9C5C1  F0F0F0F7*
02E3E7E3  400001A8  40400010  40400001  FFFFFFC8  000CD118  FFFFFFEC
00000000  40404040  40404040  40404040  40404040  40404040  40404040
40404040  40404040  40404040  40404040  C2D9C5C1  F0F0F0F8*
02C5E2C4  40404040  40400010  40400004  C9C2C3D6  D47B4040  02000000
40000000  40404040  40404040  40404040  40404040  40404040  40404040
40404040  40404040  40404040  40404040  C2D9C5C1  F0F0F0F9*
02E3E7E3  400001BC  40400004  40400001  00000000  40404040  40404040
40404040  40404040  40404040  40404040  40404040  40404040  40404040
40404040  40404040  40404040  40404040  C2D9C5C1  F0F0F1F0**
02C5E2C4  40404040  40400010  40400005  D7D9D6D1  C1D94040  02000000
40000000  40404040  40404040  40404040  40404040  40404040  40404040
40404040  40404040  40404040  40404040  C2D9C5C1  F0F0F1F1*
02C5E2C4  40404040  40400010  40400006  D7D9D6D1  D3D54040  02000000
40000000  40404040  40404040  40404040  40404040  40404040  40404040
40404040  40404040  40404040  40404040  C2D9C5C1  F0F0F1F2*
02C5E2C4  40404040  40400010  40400007  D7D9D6D1  E2D74040  02000000
40000000  40404040  40404040  40404040  40404040  40404040  40404040
40404040  40404040  40404040  40404040  C2D9C5C1  F0F0F1F3*
02E3E7E3  400001C4  40400010  40400001  00000000  00000000  00000000
00000000  40404040  40404040  40404040  40404040  40404040  40404040
40404040  40404040  40404040  40404040  C2D9C5C1  F0F0F1F4*
02E3E7E3  400001F4  40400038  40400001  5880D150  5800D0B0  5000D10C
5800D0BC  5000D0F8  5800D18C  5000D180  5800D190  5000D184  5800D0E0
5000D188  5890D0BC  58A0D17C  58B0D154  C2D9C5C1  F0F0F1F5*
02E3E7E3  4000022C  40400038  40400001  58E0D180  580EB000  12004780
D39C58E0  D184582E  B00058E0  D188580E  B0005000  D1245020  D0F458B0
D14858A0  D15C5890  D14C5800  D0F45900  C2D9C5C1  F0F0F1F6*
02E3E7E3  40000264  40400038  40400001  D1104780  D3885850  D0F45C40
```

D0E85050 D1742B00 7805B004 6A00D0A8 6000D0A0 5830D0A4 5030D114
5930D0BC 4780D27C 5930D0C0 4780D388 C2D9C5C1 F0F0F1F7*
02E3E7E3 4000029C 40400028 40400001 5930D0C4 4780D2BE 5930D0C8
4780D2EC 5930D0CC 4780D388 58F0D164 45E0F004 00000006 00000028
40404040 40404040 40404040 40404040 C2D9C5C1 F0F0F1F8*
02D9D3C4 40404040 40400038 40404040 00020001 0C0001A8 00020001
0C0001AC 00030001 0C0001B0 00040001 1C0001C4 00050001 1C0001C8
00060001 1C0001CC 00070001 1C0001D0 C2D9C5C1 F0F0F1F9*
02E3E7E3 400002C4 40400038 40400001 45E0F008 0450D114 45E0F008

MEMBER NAME BREAK2
0450D0F4 45E0F010 47F0D388 58E0D174 780EB00C 7000D0FC 780EB010
7000D104 780EB014 7000D100 780EB018 C2D9C5C1 F0F0F2F0**
02E3E7E3 400002FC 40400038 40400001 7000D108 58F0D16C 4110D068
05EF41E0 000815FE 4720D2BA 58EFD04C 07FE47F0 D38858E0 D174410E
B0045000 D0809280 D08058F0 D1684110 C2D9C5C1 F0F0F2F1*
02E3E7E3 40000334 40400038 40400001 D07C05EF 41E00004 15FE4720
D2E858EF D05807FE 47F0D388 58E0D174 2B00780E B01C6A00 D0A86000
D0A05870 D0A458E0 D1742B00 780EB020 C2D9C5C1 F0F0F2F2*
02E3E7E3 4000036C 40400038 40400001 6A00D0A8 6000D0A0 5800D0A4
5000D11C 58E0D174 2B00780E B0246A00 D0A86000 D0A05860 D0A41857
5C40D0E0 18365C20 D0E458E0 D174410E C2D9C5C1 F0F0F2F3*
02E3E7E3 400003A4 40400038 40400001 B0045000 D0884105 80045000
D08C4103 90045000 D09458F0 D1704110 D08405EF 41E00004 15FE4720
D37458EF D06007FE 47F0D388 5800D0B8 C2D9C5C1 F0F0F2F4*
02E3E7E3 400003DC 40400038 40400001 5000D10C 1BFF58E0 D00007FE
5820D0F4 5A20D0BC 5020D0F4 5920D124 47C0D1FE 58B0D154 58A0D17C
5890D0BC 5820D0F8 1A295020 D0F85800 C2D9C5C1 F0F0F2F5*
02E3E7E3 40000414 40400038 40400001 D1881A0A 5000D188 5800D184
1A0A5000 D1845800 D1801A0A 5000D180 5920D134 47C0D1CC 1BFF58E0
D00007FE 58A0D004 58E0A00C 58B0A018 C2D9C5C1 F0F0F2F6*
02E3E7E3 4000044C 40400038 40400001 5810B010 5820D10C 50201000
18DA92FF A00C982C A01C07FE 98791008 58207000 5020D134 58208000
5020D110 58209000 5020D10C 58201000 C2D9C5C1 F0F0F2F7*
02E3E7E3 40000484 40400038 40400001 41302000 41500004 1B255020
D15C5030 D1605030 D0685030 D07C5030 D0845820 10044130 20004150
00041B25 5C40D0C4 1B255020 D1545030 C2D9C5C1 F0F0F2F8*
02E3E7E3 400004BC 40400006 40400001 D15847F0 D1944040 40404040
40404040 40404040 40404040 40404040 40404040 40404040 40404040
40404040 40404040 40404040 40404040 C2D9C5C1 F0F0F2F9*
02E3E7E3 40000020 40400008 40400001 00000464 00000060 40404040
40404040 40404040 40404040 40404040 40404040 40404040 40404040
40404040 40404040 40404040 40404040 C2D9C5C1 F0F0F3F0**
02E3E7E3 40000060 40400004 40400001 00000440 40404040 40404040
40404040 40404040 40404040 40404040 40404040 40404040 40404040
40404040 40404040 40404040 40404040 C2D9C5C1 F0F0F3F1*
02E3E7E3 400000AC 40400010 40400001 0000031A 000003D8 0000031A
00000348 40404040 40404040 40404040 40404040 40404040 40404040
40404040 40404040 40404040 40404040 C2D9C5C1 F0F0F3F2*
02D9D3C4 40404040 40400038 40404040 00010001 0C0002C0 00010001
0C000020 00010001 0C000024 00010001 0C000060 00010001 0C0000AC
00010001 0C0000B0 00010001 0C0000B4 C2D9C5C1 F0F0F3F3*
02E3E7E3 400000BC 4040000C 40400001 000003D8 000003D4 000003D8
40404040 40404040 40404040 40404040 40404040 40404040 40404040
40404040 40404040 40404040 40404040 C2D9C5C1 F0F0F3F4*
02E3E7E3 400000CC 40400010 40400001 0000015C 00000164 00000160
80000168 40404040 40404040 40404040 40404040 40404040 40404040
40404040 40404040 40404040 40404040 C2D9C5C1 F0F0F3F5*
02D9D3C4 40404040 40400038 40404040 00010001 0C0000B8 00010001

0C0000BC 00010001 0C0000C0 00010001 0C0000C4 00010001 0C0000CC
00010001 0C0000D0 00010001 0C0000D4 C2D9C5C1 F0F0F3F6*
02E3E7E3 400000E0 40400004 40400001 80000000 40404040 40404040
40404040 40404040 40404040 40404040 40404040 40404040 40404040
40404040 40404040 40404040 40404040 C2D9C5C1 F0F0F3F7*
02E3E7E3 400000F0 40400004 40400001 0000017C 40404040 40404040
40404040 40404040 40404040 40404040 40404040 40404040 40404040
40404040 40404040 40404040 40404040 C2D9C5C1 F0F0F3F8*
02E3E7E3 400000F8 40400008 40400001 00000180 8000018C 40404040
40404040 40404040 40404040 40404040 40404040 40404040 40404040

MEMBER NAME BREAK2
40404040 40404040 40404040 40404040 C2D9C5C1 F0F0F3F9*
02E3E7E3 400001D4 40400020 40400001 00000000 00000000 0000000C
00000000 00000000 00000000 00000018 00000010 40404040 40404040
40404040 40404040 40404040 40404040 C2D9C5C1 F0F0F4F0**
02D9D3C4 40404040 40400020 40404040 00010001 0C0000D8 00010001
0C0000F0 00010001 0C0000F8 00010001 0C0000FC 40404040 40404040
40404040 40404040 40404040 40404040 C2D9C5C1 F0F0F4F1*
02C5D5C4 40404040 40404040 40404040 40404040 40404040 40404040
000004C2 F1F5F7F3 F460C6D6 F34040F0 F2F0F2F8 F7F0F9F8 40F0F84B
F1F24BF5 F6404040 C2D9C5C1 D2F24040 C2D9C5C1 F0F0F4F2**

MEMBER NAME BTXT
02C5E2C4 40404040 40400010 40400001 C2E3E7E3 40404040 00000000
40000000 40404040 40404040 40404040 40404040 40404040 40404040
40404040 40404040 40404040 40404040 C2E3E7E3 F0F0F0F1*
02E3E7E3 40000000 40400038 40400001 47F0F00C 07C2E3E7 E3404040
90ECD00C 184D98CD F0205040 D00450D0 400807FC 40404040 40404040
021A2F40 5C5C5C5C 5C4040C7 D9C1C9D5 C2E3E7E3 F0F0F0F2*
02E3E7E3 40000038 40400038 40400001 40E3C1C2 D3C540C8 C1E240D9
C5C1C3C8 C5C440C9 E3E240F1 F5F0F0F0 40D3C9D4 C9E32202 1A2E405C
5C5C5C5C 4040E2E3 C1C3D240 C1D9D9C1 C2E3E7E3 F0F0F0F3*
02E3E7E3 40000070 40400038 40400001 E840C8C1 E240D9C5 C1C3C8C5
C440C9E3 E240F3F0 F0F040D3 C9D4C9E3 22021A2C 405C5C5C 5C5C4040
C4C1E2C8 40C1D9D9 C1E840C8 C1E240D9 C2E3E7E3 F0F0F0F4*
02E3E7E3 400000A8 40400038 40400001 C5C1C3C8 C5C440C9 E3E240F1
F0F040D3 C9D4C9E3 22021A2E 405C5C5C 5C5C4040 E2C5D8E4 40C1D9D9
C1E840C8 C1E240D9 C5C1C3C8 C5C440C9 C2E3E7E3 F0F0F0F5*
02E3E7E3 400000E0 40400038 40400001 E3E240F1 F5F0F0F0 40D3C9D4
C9E32202 1A2F405C 5C5C5C5C 4040D7D3 D4C1E340 C1D9D9C1 E840C8C1
E240D9C5 C1C3C8C5 C440C9E3 E240F1F5 C2E3E7E3 F0F0F0F6*
02E3E7E3 40000118 40400038 40400001 F0F0F040 D3C9D4C9 E322021A
2C40C5D9 D9D6D97A 40C9D540 C2C3E2D3 C9C240D9 D6E4E3C9 D5C540C9
D540C2E3 E7E340E2 E4C2D9D6 E4E3C9D5 C2E3E7E3 F0F0F0F7*
02E3E7E3 40000150 40400002 40400001 C5224040 40404040 40404040
40404040 40404040 40404040 40404040 40404040 40404040 40404040
40404040 40404040 40404040 40404040 C2E3E7E3 F0F0F0F8*
02E3E7E3 40000158 40400038 40400001 F9404040 40404040 F0404040
40404040 E2404040 40404040 F9404040 40404040 F0404040 40404040
E2404040 40404040 C5404040 40404040 C2E3E7E3 F0F0F0F9*
02E3E7E3 40000190 40400038 40400001 D7C1C7C5 40404040 D6D7D7D6
E2C9E3C5 60404040 40404040 60404040 40404040 D7D3E8E3 C1C2D3C5
D3404040 40404040 F9404040 40404040 C2E3E7E3 F0F0F1F0**
02E3E7E3 400001C8 40400018 40400001 F0404040 40404040 D3404040
40404040 40404040 40404040 40404040 40404040 40404040 40404040
40404040 40404040 40404040 40404040 C2E3E7E3 F0F0F1F1*
02E3E7E3 40000488 40400038 40400001 4E000000 00000000 4E000000
80000000 00000000 00000000 00000001 00000002 00000003 00000004

```
00000005  00000008  00000009  0000000C  C2E3E7E3  F0F0F1F2*
02C5E2C4  40404040  40400010  40400002  D7E3C1C2  D3C54040  05000000
40125768  40404040  40404040  40404040  40404040  40404040  40404040
40404040  40404040  40404040  40404040  C2E3E7E3  F0F0F1F3*
02E3E7E3  400004C0  40400024  40400001  00000014  00000018  00000058
00000064  00000100  00000BB8  00003A98  00000000  00000000  40404040
40404040  40404040  40404040  40404040  C2E3E7E3  F0F0F1F4*
02C5E2C4  40404040  40400010  40400003  E2E3C1C3  D2404040  05000000
40040744  40404040  40404040  40404040  40404040  40404040  40404040
40404040  40404040  40404040  40404040  C2E3E7E3  F0F0F1F5*
02C5E2C4  40404040  40400010  40400004  D6D7E3C9  D6D54040  05000000
40000020  40404040  40404040  40404040  40404040  40404040  40404040
40404040  40404040  40404040  40404040  C2E3E7E3  F0F0F1F6*
02C5E2C4  40404040  40400010  40400005  C6D3E340  40404040  02000000
40000000  40404040  40404040  40404040  40404040  40404040  40404040
40404040  40404040  40404040  40404040  C2E3E7E3  F0F0F1F7*
02E3E7E3  40000CC0  40400020  40400001  FFFFFFEC  00058600  000B0444
00108298  FFFFFFA8  00000000  00000000  00000000  40404040  40404040
40404040  40404040  40404040  40404040  C2E3E7E3  F0F0F1F8*
02C5E2C4  40404040  40400010  40400006  C9E2D9C3  C8404040  02000000
40000000  40404040  40404040  40404040  40404040  40404040  40404040
40404040  40404040  40404040  40404040  C2E3E7E3  F0F0F1F9*
02E3E7E3  40000CE4  40400004  40400001  00000000  40404040  40404040

MEMBER NAME  BTXT
40404040  40404040  40404040  40404040  40404040  40404040  40404040
40404040  40404040  40404040  40404040  C2E3E7E3  F0F0F2F0**
02E3E7E3  40000CEC  40400004  40400001  00000000  40404040  40404040
40404040  40404040  40404040  40404040  40404040  40404040  40404040
40404040  40404040  40404040  40404040  C2E3E7E3  F0F0F2F1*
02D9D3C4  40404040  40400038  40404040  00020001  0C000CC0  00020001
0C000CC4  00020001  0C000CC8  00020001  0C000CCC  00030001  0C000CD0
00040001  0C000CD4  00050001  1C000CD8  C2E3E7E3  F0F0F2F2*
02C5E2C4  40404040  40400010  40400007  D4E5C3C8  D9404040  02000000
40000000  40404040  40404040  40404040  40404040  40404040  40404040
40404040  40404040  40404040  40404040  C2E3E7E3  F0F0F2F3*
02C5E2C4  40404040  40400010  40400008  C3D4D7D9  E2E24040  02000000
40000000  40404040  40404040  40404040  40404040  40404040  40404040
40404040  40404040  40404040  40404040  C2E3E7E3  F0F0F2F4*
02C5E2C4  40404040  40400010  40400009  C9C2C3D6  D47B4040  02000000
40000000  40404040  40404040  40404040  40404040  40404040  40404040
40404040  40404040  40404040  40404040  C2E3E7E3  F0F0F2F5*
02C5E2C4  40404040  40400010  4040000A  C9E2D9C3  C8E54040  02000000
40000000  40404040  40404040  40404040  40404040  40404040  40404040
40404040  40404040  40404040  40404040  C2E3E7E3  F0F0F2F6*
02C5E2C4  40404040  40400010  4040000B  D2D6D4D7  D9E54040  02000000
40000000  40404040  40404040  40404040  40404040  40404040  40404040
40404040  40404040  40404040  40404040  C2E3E7E3  F0F0F2F7*
02C5E2C4  40404040  40400010  4040000C  E2D7D3E3  E7E34040  02000000
40000000  40404040  40404040  40404040  40404040  40404040  40404040
40404040  40404040  40404040  40404040  C2E3E7E3  F0F0F2F8*
02E3E7E3  40000CF0  40400018  40400001  00000000  00000000  00000000
00000000  00000000  00000000  40404040  40404040  40404040  40404040
40404040  40404040  40404040  40404040  C2E3E7E3  F0F0F2F9*
02E3E7E3  400004E4  40400002  40400001  DB5A4040  40404040  40404040
40404040  40404040  40404040  40404040  40404040  40404040  40404040
40404040  40404040  40404040  40404040  C2E3E7E3  F0F0F3F0**
02E3E7E3  40000C5C  40400038  40400001  00000000  00000000  00000000
00000000  00000000  00000000  00000000  00000000  00000000  00000000
```

```
00000000  00000000  00000000  00000000  C2E3E7E3  F0F0F3F1*
02E3E7E3  40000C94  40400020  40400001  00000000  00000000  00000000
00000000  00000000  00000000  00000000  00000000  40404040  40404040
40404040  40404040  40404040  40404040  C2E3E7E3  F0F0F3F2*
02E3E7E3  40000D10  40400038  40400001  5840DAE0  5870DAFC  5890DAEC
58A0DAE8  58B0DAE4  5850D2F4  58F0DAF4  5800F00C  1BFF860F  DB5E1BFF
58E0D000  07FE58F0  DB144110  D0C405EF  C2E3E7E3  F0F0F3F3*
02E3E7E3  40000D48  40400038  40400001  41E00004  15FE4720  DB7858EF
D04C07FE  5820D320  5A20D2C0  5020D318  5920D2F0  4730DBC2  58A0D2F0
18B2410B  D33B5000  D0D858F0  DB104110  C2E3E7E3  F0F0F3F4*
02E3E7E3  40000D80  40400038  40400001  D0D405EF  5AB0D2C0  19BA47C0
DB9258A0  DAE858B0  DAE447F0  DBC21BFF  58E0D000  07FE58F0  DB0C4110
D0E005EF  41E00004  15FE4720  DBDC58EF  C2E3E7E3  F0F0F3F5*
02E3E7E3  40000DB8  40400038  40400001  D05407FE  58F0DB0C  4110D0F4
05EF41E0  000415FE  4720DBF6  58EFD05C  07FE5800  D3101200  4770DC0A
5800D30C  12004780  DCB05800  D3205B00  C2E3E7E3  F0F0F3F6*
02E3E7E3  40000DF0  40400034  40400001  D2C05000  D31C58F0  DAF84110
D10805EF  5820B018  5A20D2C0  5020B018  5920D2F8  47C0DC56  58F0DB18
45E0F004  00000006  00000028  40404040  C2E3E7E3  F0F0F3F7*
02D9D3C4  40404040  40400038  40404040  00060001  1C000CEC  00070001
1C000CF0  00080001  1C000CF4  00090001  1C000CF8  000A0001  1C000CFC
000B0001  1C000D00  000C0001  1C000D04  C2E3E7E3  F0F0F3F8*
02E3E7E3  40000E24  40400038  40400001  45E0F010  58F0DB18  45E0F034
05404040  F4F45830  B0185C20  D2E44103  B0045000  D11858F0  DB104110

MEMBER NAME   BTXT
D11405EF  58009008  5700D2B4  5000D2AC  C2E3E7E3  F0F0F3F9*
02E3E7E3  40000E5C  40400038  40400001  6820D2A8  6B20D2B0  5830B018
5C20D2E4  7023B004  7800D324  7003B008  78207004  7023B00C  78207008
7023B010  1BFF58E0  D00007FE  58F0DB0C  C2E3E7E3  F0F0F4F0**
02E3E7E3  40000E94  40400038  40400001  4110D120  05EF41E0  000415FE
4720DCCA  58EFD064  07FE5800  D3101200  4780DF70  5820D310  5A20D2C0
5020D310  4102D33B  5000D134  58F0DB20  C2E3E7E3  F0F0F4F1*
02E3E7E3  40000ECC  40400038  40400001  4110D134  05EF41E0  000415FE
4720DD02  58EFD06C  07FE4102  D33B5000  D14C58F0  DB204110  D14C05EF
41E00004  15FE4720  DD2458EF  D07407FE  C2E3E7E3  F0F0F4F2*
02E3E7E3  40000F04  40400038  40400001  5800D334  12004750  DE085800
D3381200  4730DE08  58F0DB24  4110D164  05EF5820  D32C8920  00025860
D2C05880  D2CC58A0  D2CC18B2  5890DAF0  C2E3E7E3  F0F0F4F3*
02E3E7E3  40000F3C  40400038  40400001  58209058  1A265020  90581925
47C0DD9A  5890DAEC  58A0DAE8  58B0DAE4  58F0DB18  45E0F004  00000006
0000005B  45E0F010  58F0DB18  45E0F034  C2E3E7E3  F0F0F4F4*
02E3E7E3  40000F74  40400038  40400001  05404040  F4F45830  90585C20
D2E84103  90045000  D17C58F0  DB104110  D17805EF  58F0DAEC  5800F008
5700D2B4  5000D2AC  6820D2A8  6B20D2B0  C2E3E7E3  F0F0F4F5*
02E3E7E3  40000FAC  40400038  40400001  58309058  5C20D2E8  70239004
7828D438  70239010  78207004  70239020  78207008  70239024  878ADD5C
5890DAEC  58A0DAE8  58B0DAE4  1BFF58E0  C2E3E7E3  F0F0F4F6*
02E3E7E3  40000FE4  40400038  40400001  D00007FE  58F0DB1C  4110D184
05EF41E0  000415FE  4720DE22  58EFD07C  07FE5800  D3101200  4770DE34
1BFF58E0  D00007FE  58F0DB0C  4110D19C  C2E3E7E3  F0F0F4F7*
02E3E7E3  4000101C  40400038  40400001  05EF41E0  000415FE  4720DE4E
58EFD084  07FE5800  D3101200  4770DE60  1BFF58E0  D00007FE  58F0DB24
4110D1B0  05EF58F0  DB1C4110  D1C405EF  C2E3E7E3  F0F0F4F8*
02E3E7E3  40001054  40400038  40400001  41E00004  15FE4720  DE8458EF
D08C07FE  5800D310  12004780  DE987820  D43C3302  7000D43C  58F0DB1C
4110D1DC  05EF41E0  000415FE  4720DEB2  C2E3E7E3  F0F0F4F9*
02E3E7E3  4000108C  40400038  40400001  58EFD094  07FE7800  D43C7000
D3287800  D2BC7000  D43C5800  D3101200  4780DED6  58F0DB24  4110D1F4
```

```
05EF5820  40145A20  D2C05020  40145920  C2E3E7E3  F0F0F5F0**
02E3E7E3  400010C4  40400038  40400001  D2EC47C0  DF0E58F0  DB181800
45E0F004  00000006  0000008D  45E0F010  58F0DB18  45E0F034  05404040
F4F45830  40145C20  D2E04103  40045000  C2E3E7E3  F0F0F5F1*
02E3E7E3  400010FC  40400038  40400001  D20C58F0  DB104110  D20805EF
58009008  5700D2B4  5000D2AC  6820D2A8  6B20D2B0  58304014  5C20D2E0
70234004  7800D328  70034008  78207004  C2E3E7E3  F0F0F5F2*
02E3E7E3  40001134  40400038  40400001  7023400C  78207008  70234010
7820D43C  70234014  1BFF58E0  D00007FE  58F0DB0C  4110D214  05EF41E0
000415FE  4720DF8A  58EFD09C  07FE5800  C2E3E7E3  F0F0F5F3*
02E3E7E3  4000116C  40400038  40400001  D3101200  4780C09C  5820D310
5A20D2C0  5020D310  4102D33B  5000D228  58F0DB20  4110D228  05EF41E0
000415FE  4720DFC2  58EFD0A4  07FE4102  C2E3E7E3  F0F0F5F4*
02E3E7E3  400011A4  40400038  40400001  D33B5000  D24058F0  DB204110
D24005EF  41E00004  15FE4720  DFE458EF  D0AC07FE  5800D334  12004750
DFF85800  D3381200  47C0C000  1BFF58E0  C2E3E7E3  F0F0F5F5*
02E3E7E3  400011DC  40400038  40400001  D00007FE  58F0DB24  4110D258
05EF5820  47E85A20  D2C05020  47E85920  D2F847C0  C04258F0  DB181800
45E0F004  00000006  000000BD  45E0F010  C2E3E7E3  F0F0F5F6*
02E3E7E3  40001214  40400038  40400001  58F0DB18  45E0F034  05404040
F4F45830  47E85C20  D2E44103  47D45000  D11858F0  DB104110  D11405EF
58009008  5700D2B4  5000D2AC  6820D2A8  C2E3E7E3  F0F0F5F7*
02E3E7E3  4000124C  40400038  40400001  6B20D2B0  583047E8  5C20D2E4
702347D4  7820D43C  702347D8  78207004  702347DC  78207008  702347E0
1BFF58E0  D00007FE  5800D320  5900D2CC  C2E3E7E3  F0F0F5F8*

MEMBER NAME  BTXT
02E3E7E3  40001284  40400038  40400001  4780C0B0  1BFF58E0  D00007FE
58A0D320  58B0D2C0  410BD33B  5000D26C  58F0DB20  4110D26C  05EF41E0
000415FE  4720C0DA  58EFD0B4  07FE410B  C2E3E7E3  F0F0F5F9*
02E3E7E3  400012BC  40400038  40400001  D33B5000  D28458F0  DB204110
D28405EF  41E00004  15FE4720  C0FC58EF  D0BC07FE  5800D334  120047A0
C10A47F0  C1145800  D3381200  47C0C124  C2E3E7E3  F0F0F6F0**
02E3E7E3  400012F4  40400038  40400001  58A0DAE8  58B0DAE4  1BFF58E0
D00007FE  5AB0D2C0  19BA47C0  C0B858A0  DAE858B0  DAE458F0  DAF84110
D29C05EF  5820A018  5A20D2C0  5020A018  C2E3E7E3  F0F0F6F1*
02E3E7E3  4000132C  40400038  40400001  5920D2F8  47C0C176  58F0DB18
45E0F004  00000006  000000EF  45E0F010  58F0DB18  45E0F034  05404040
F4F45830  A0185C20  D2E44103  A0045000  C2E3E7E3  F0F0F6F2*
02E3E7E3  40001364  40400038  40400001  D11858F0  DB104110  D11405EF
58009008  5700D2B4  5000D2AC  6820D2A8  6B20D2B0  5830A018  5C20D2E4
7023A004  7800D324  7003A008  78207004  C2E3E7E3  F0F0F6F3*
02E3E7E3  4000139C  40400038  40400001  7023A00C  78207008  7023A010
1BFF58E0  D00007FE  58A0DAE8  58B0DAE4  58F0DB18  45E0F004  00000006
00000122  45E0F010  1BFF58E0  D00007FE  C2E3E7E3  F0F0F6F4*
02E3E7E3  400013D4  40400038  40400001  58A0D004  58E0A00C  58B0A018
5810B004  5820D330  50201000  18DA92FF  A00C982C  A01C07FE  58C0D048
98781004  58207000  5020D330  58201000  C2E3E7E3  F0F0F6F5*
02E3E7E3  4000140C  40400030  40400001  41302000  41500001  1B255020
DB045030  DB085030  D0C45820  10084130  20004150  00041B25  5020DAFC
5030DB00  47F0DB30  40404040  40404040  C2E3E7E3  F0F0F6F6*
02E3E7E3  40000020  40400008  40400001  000013F8  000001E0  40404040
40404040  40404040  40404040  40404040  40404040  40404040  40404040
40404040  40404040  40404040  40404040  C2E3E7E3  F0F0F6F7*
02D9D3C4  40404040  40400038  40404040  00010001  0C000E20  00010001
0C000F64  00010001  0C0010D8  00010001  0C00120C  00010001  0C001340
00010001  0C0013C4  00010001  0C000020  C2E3E7E3  F0F0F6F8*
02E3E7E3  400001E0  40400004  40400001  000013D4  40404040  40404040
40404040  40404040  40404040  40404040  40404040  40404040  40404040
```

```
40404040  40404040  40404040  40404040  C2E3E7E3  F0F0F6F9*
02E3E7E3  40000228  40400018  40400001  000011E0  00000D58  00000D9A
00000DBC  000013A8  00000DD6  40404040  40404040  40404040  40404040
40404040  40404040  40404040  40404040  C2E3E7E3  F0F0F7F0**
02D9D3C4  40404040  40400038  40404040  00010001  0C000024  00010001
0C0001E0  00010001  0C000228  00010001  0C00022C  00010001  0C000230
00010001  0C000234  00010001  0C000238  C2E3E7E3  F0F0F7F1*
02E3E7E3  40000240  4040001C  40400001  000013A8  00000EAA  000013A8
00000EE2  000013B0  00000F04  000013B0  40404040  40404040  40404040
40404040  40404040  40404040  40404040  C2E3E7E3  F0F0F7F2*
02D9D3C4  40404040  40400038  40404040  00010001  0C00023C  00010001
0C000240  00010001  0C000244  00010001  0C000248  00010001  0C00024C
00010001  0C000250  00010001  0C000254  C2E3E7E3  F0F0F7F3*
02E3E7E3  4000025C  4040001C  40400001  00001002  000013A8  0000102E
000013A8  00001064  000013A8  00001092  40404040  40404040  40404040
40404040  40404040  40404040  40404040  C2E3E7E3  F0F0F7F4*
02D9D3C4  40404040  40400038  40404040  00010001  0C000258  00010001
0C00025C  00010001  0C000260  00010001  0C000264  00010001  0C000268
00010001  0C00026C  00010001  0C000270  C2E3E7E3  F0F0F7F5*
02E3E7E3  40000278  4040001C  40400001  000013A8  0000116A  000013A8
000011A2  000013B0  000011C4  000013B0  40404040  40404040  40404040
40404040  40404040  40404040  40404040  C2E3E7E3  F0F0F7F6*
02D9D3C4  40404040  40400038  40404040  00010001  0C000274  00010001
0C000278  00010001  0C00027C  00010001  0C000280  00010001  0C000284
00010001  0C000288  00010001  0C00028C  C2E3E7E3  F0F0F7F7*
02E3E7E3  40000294  40400010  40400001  000012BA  000013B0  000012DC

MEMBER NAME  BTXT
000013B0  40404040  40404040  40404040  40404040  40404040  40404040
40404040  40404040  40404040  40404040  C2E3E7E3  F0F0F7F8*
02E3E7E3  400002A8  4040000C  40400001  00000510  0000051C  80000500
40404040  40404040  40404040  40404040  40404040  40404040  40404040
40404040  40404040  40404040  40404040  C2E3E7E3  F0F0F7F9*
02D9D3C4  40404040  40400038  40404040  00010001  0C000290  00010001
0C000294  00010001  0C000298  00010001  0C00029C  00010001  0C0002A0
00010001  0C0002A8  00010001  0C0002AC  C2E3E7E3  F0F0F8F0**
02E3E7E3  400002B4  40400004  40400001  000004A0  40404040  40404040
40404040  40404040  40404040  40404040  40404040  40404040  40404040
40404040  40404040  40404040  40404040  C2E3E7E3  F0F0F8F1*
02E3E7E3  400002BC  40400018  40400001  800001D8  0000051C  000004A0
00000500  000004E4  800004F0  40404040  40404040  40404040  40404040
40404040  40404040  40404040  40404040  C2E3E7E3  F0F0F8F2*
02D9D3C4  40404040  40400038  40404040  00010001  0C0002B0  00010001
0C0002B4  00010001  0C0002BC  00010001  0C0002C0  00010001  0C0002C4
00010001  0C0002C8  00010001  0C0002CC  C2E3E7E3  F0F0F8F3*
02E3E7E3  400002D4  4040001C  40400001  0000051C  000004A0  00000500
000004E5  800004EC  0000051C  000004FC  40404040  40404040  40404040
40404040  40404040  40404040  40404040  C2E3E7E3  F0F0F8F4*
02D9D3C4  40404040  40400038  40404040  00010001  0C0002D0  00010001
0C0002D4  00010001  0C0002D8  00010001  0C0002DC  00010001  0C0002E0
00010001  0C0002E4  00010001  0C0002E8  C2E3E7E3  F0F0F8F5*
02E3E7E3  400002F0  40400008  40400001  80000504  000004C4  40404040
40404040  40404040  40404040  40404040  40404040  40404040  40404040
40404040  40404040  40404040  40404040  C2E3E7E3  F0F0F8F6*
02E3E7E3  400002FC  40400014  40400001  80000C5C  0000051C  000004A0
00000500  000001D0  40404040  40404040  40404040  40404040  40404040
40404040  40404040  40404040  40404040  C2E3E7E3  F0F0F8F7*
02D9D3C4  40404040  40400038  40404040  00010001  0C0002EC  00010001
0C0002F0  00010001  0C0002F4  00010001  0C0002FC  00010001  0C000300
```

```
00010001  0C000304  00010001  0C000308  C2E3E7E3  F0F0F8F8*
02E3E7E3  40000310  40400004  40400001  800004F0  40404040  40404040
40404040  40404040  40404040  40404040  40404040  40404040  40404040
40404040  40404040  40404040  40404040  C2E3E7E3  F0F0F8F9*
02E3E7E3  40000318  40400014  40400001  000004A0  000001C8  000004A0
000004A0  80000514  40404040  40404040  40404040  40404040  40404040
40404040  40404040  40404040  40404040  C2E3E7E3  F0F0F9F0**
02E3E7E3  40000330  40400004  40400001  000004A0  40404040  40404040
40404040  40404040  40404040  40404040  40404040  40404040  40404040
40404040  40404040  40404040  40404040  C2E3E7E3  F0F0F9F1*
02D9D3C4  40404040  40400038  40404040  00010001  0C00030C  00010001
0C000310  00010001  0C000318  00010001  0C00031C  00010001  0C000320
00010001  0C000324  00010001  0C000328  C2E3E7E3  F0F0F9F2*
02E3E7E3  40000334  4040001C  40400001  000001C0  000004A0  000004A0
80000518  0000051C  00000500  000001B8  40404040  40404040  40404040
40404040  40404040  40404040  40404040  C2E3E7E3  F0F0F9F3*
02D9D3C4  40404040  40400038  40404040  00010001  0C000330  00010001
0C000334  00010001  0C000338  00010001  0C00033C  00010001  0C000340
00010001  0C000344  00010001  0C000348  C2E3E7E3  F0F0F9F4*
02E3E7E3  40000350  4040000C  40400001  0000061C  8000050C  000004C8
40404040  40404040  40404040  40404040  40404040  40404040  40404040
40404040  40404040  40404040  40404040  C2E3E7E3  F0F0F9F5*
02E3E7E3  40000360  40400010  40400001  80000C5C  0000051C  000004A0
000001B0  40404040  40404040  40404040  40404040  40404040  40404040
40404040  40404040  40404040  40404040  C2E3E7E3  F0F0F9F6*
02D9D3C4  40404040  40400038  40404040  00010001  0C00034C  00010001
0C000350  00010001  0C000354  00010001  0C000358  00010001  0C000360

MEMBER NAME  BTXT
00010001  0C000364  00010001  0C000368  C2E3E7E3  F0F0F9F7*
02E3E7E3  40000370  4040001C  40400001  00000500  000004B4  800004F0
0000051C  000004A0  00000500  000001A8  40404040  40404040  40404040
40404040  40404040  40404040  40404040  C2E3E7E3  F0F0F9F8*
02D9D3C4  40404040  40400038  40404040  00010001  0C00036C  00010001
0C000370  00010001  0C000374  00010001  0C000378  00010001  0C00037C
00010001  0C000380  00010001  0C000384  C2E3E7E3  F0F0F9F9*
02E3E7E3  4000038C  4040001C  40400001  800004F0  0000051C  00000500
000001A0  0000061C  8000050C  0000051C  40404040  40404040  40404040
40404040  40404040  40404040  40404040  C2E3E7E3  F0F1F0F0**
02D9D3C4  40404040  40400038  40404040  00010001  0C000388  00010001
0C00038C  00010001  0C000390  00010001  0C000394  00010001  0C000398
00010001  0C00039C  00010001  0C0003A0  C2E3E7E3  F0F1F0F1*
02E3E7E3  400003A8  4040001C  40400001  000004A0  00000198  00000500
000004B4  800004F0  0000051C  000004A0  40404040  40404040  40404040
40404040  40404040  40404040  40404040  C2E3E7E3  F0F1F0F2*
02D9D3C4  40404040  40400038  40404040  00010001  0C0003A4  00010001
0C0003A8  00010001  0C0003AC  00010001  0C0003B0  00010001  0C0003B4
00010001  0C0003B8  00010001  0C0003BC  C2E3E7E3  F0F1F0F3*
02E3E7E3  400003C4  4040001C  40400001  00000190  00000500  000004AC
800004F0  0000051C  00000500  00000188  40404040  40404040  40404040
40404040  40404040  40404040  40404040  C2E3E7E3  F0F1F0F4*
02D9D3C4  40404040  40400038  40404040  00010001  0C0003C0  00010001
0C0003C4  00010001  0C0003C8  00010001  0C0003CC  00010001  0C0003D0
00010001  0C0003D4  00010001  0C0003D8  C2E3E7E3  F0F1F0F5*
02E3E7E3  400003E0  4040000C  40400001  0000061C  8000050C  000004C0
40404040  40404040  40404040  40404040  40404040  40404040  40404040
40404040  40404040  40404040  40404040  C2E3E7E3  F0F1F0F6*
02E3E7E3  400003F0  40400010  40400001  80000C5C  0000051C  000004A0
00000500  40404040  40404040  40404040  40404040  40404040  40404040
```

```
40404040  40404040  40404040  40404040  C2E3E7E3  F0F1F0F7*
02D9D3C4  40404040  40400038  40404040  00010001  0C0003DC  00010001
0C0003E0  00010001  0C0003E4  00010001  0C0003E8  00010001  0C0003F0
00010001  0C0003F4  00010001  0C0003F8  C2E3E7E3  F0F1F0F8*
02E3E7E3  40000400  40400008  40400001  00000180  800004F0  40404040
40404040  40404040  40404040  40404040  40404040  40404040  40404040
40404040  40404040  40404040  40404040  C2E3E7E3  F0F1F0F9*
02E3E7E3  4000040C  40400014  40400001  000004A0  00000178  000004A0
000004A0  80000514  40404040  40404040  40404040  40404040  40404040
40404040  40404040  40404040  40404040  C2E3E7E3  F0F1F1F0**
02D9D3C4  40404040  40400038  40404040  00010001  0C0003FC  00010001
0C000400  00010001  0C000404  00010001  0C00040C  00010001  0C000410
00010001  0C000414  00010001  0C000418  C2E3E7E3  F0F1F1F1*
02E3E7E3  40000424  4040001C  40400001  000004A0  00000170  000004A0
000004A0  80000518  0000051C  00000500  40404040  40404040  40404040
40404040  40404040  40404040  40404040  C2E3E7E3  F0F1F1F2*
02D9D3C4  40404040  40400038  40404040  00010001  0C00041C  00010001
0C000424  00010001  0C000428  00010001  0C00042C  00010001  0C000430
00010001  0C000434  00010001  0C000438  C2E3E7E3  F0F1F1F3*
02E3E7E3  40000440  4040000C  40400001  00000168  0000061C  8000050C
40404040  40404040  40404040  40404040  40404040  40404040  40404040
40404040  40404040  40404040  40404040  C2E3E7E3  F0F1F1F4*
02E3E7E3  40000450  40400010  40400001  000004A0  00000160  000004A0
000004A0  40404040  40404040  40404040  40404040  40404040  40404040
40404040  40404040  40404040  40404040  C2E3E7E3  F0F1F1F5*
02D9D3C4  40404040  40400038  40404040  00010001  0C00043C  00010001
0C000440  00010001  0C000444  00010001  0C000448  00010001  0C000450
00010001  0C000454  00010001  0C000458  C2E3E7E3  F0F1F1F6*

MEMBER NAME   BTXT
02E3E7E3  40000460  40400004  40400001  80000514  40404040  40404040
40404040  40404040  40404040  40404040  40404040  40404040  40404040
40404040  40404040  40404040  40404040  C2E3E7E3  F0F1F1F7*
02E3E7E3  40000468  40400018  40400001  000004A0  00000158  000004A0
000004A0  80000518  0000051C  40404040  40404040  40404040  40404040
40404040  40404040  40404040  40404040  C2E3E7E3  F0F1F1F8*
02D9D3C4  40404040  40400038  40404040  00010001  0C00045C  00010001
0C000460  00010001  0C000468  00010001  0C00046C  00010001  0C000470
00010001  0C000474  00010001  0C000478  C2E3E7E3  F0F1F1F9*
02E3E7E3  40000480  40400008  40400001  00000500  80000504  40404040
40404040  40404040  40404040  40404040  40404040  40404040  40404040
40404040  40404040  40404040  40404040  C2E3E7E3  F0F1F2F0**
02E3E7E3  40000D08  40400008  40400001  00000000  00000000  40404040
40404040  40404040  40404040  40404040  40404040  40404040  40404040
40404040  40404040  40404040  40404040  C2E3E7E3  F0F1F2F1*
02D9D3C4  40404040  40400018  40404040  00010001  0C00047C  00010001
0C000480  00010001  0C000484  40404040  40404040  40404040  40404040
40404040  40404040  40404040  40404040  C2E3E7E3  F0F1F2F2*
02C5D5C4  40404040  40404040  40404040  40404040  40404040  40404040
0000143C  F1F5F7F3  F460C6D6  F34040F0  F2F0F2F8  F7F0F9F8  40F0F84B
F1F34BF0  F0404040  C2E3E7E3  40404040  C2E3E7E3  F0F1F2F3**

MEMBER NAME   BUILD1
02C5E2C4  40404040  40400010  40400001  C2E4C9D3  C4F14040  00000000
40000000  40404040  40404040  40404040  40404040  40404040  40404040
40404040  40404040  40404040  40404040  C2E4C9D3  F0F0F0F1*
02E3E7E3  40000000  40400028  40400001  47F0F00C  07C2E4C9  D3C4F140
90ECD00C  184D98CD  F0205040  D00450D0  400807FC  40404040  40404040
40404040  40404040  40404040  40404040  C2E4C9D3  F0F0F0F2*
```

```
02E3E7E3  40000090  40400038  40400001  00000000  00000000  4E000000
00000000  4F080000  00000000  4E000000  80000000  00000000  00000001
00000002  00000003  00000004  00000005  C2E4C9D3  F0F0F0F3*
02E3E7E3  400000C8  4040002C  40400001  00000009  0000000A  0000000B
0000000D  0000000E  0000002C  00000038  41100000  41400000  00000000
00000000  40404040  40404040  40404040  C2E4C9D3  F0F0F0F4*
02E3E7E3  40000148  40400004  40400001  00000000  40404040  40404040
40404040  40404040  40404040  40404040  40404040  40404040  40404040
40404040  40404040  40404040  40404040  C2E4C9D3  F0F0F0F5*
02C5E2C4  40404040  40400010  40400002  D4E5C3C8  D9404040  02000000
40000000  40404040  40404040  40404040  40404040  40404040  40404040
40404040  40404040  40404040  40404040  C2E4C9D3  F0F0F0F6*
02E3E7E3  40000150  40400004  40400001  00000000  40404040  40404040
40404040  40404040  40404040  40404040  40404040  40404040  40404040
40404040  40404040  40404040  40404040  C2E4C9D3  F0F0F0F7*
02E3E7E3  40000158  40400008  40400001  00000000  00000000  40404040
40404040  40404040  40404040  40404040  40404040  40404040  40404040
40404040  40404040  40404040  40404040  C2E4C9D3  F0F0F0F8*
02E3E7E3  40000164  40400004  40400001  00000000  40404040  40404040
40404040  40404040  40404040  40404040  40404040  40404040  40404040
40404040  40404040  40404040  40404040  C2E4C9D3  F0F0F0F9*
02E3E7E3  4000016C  40400004  40400001  00000000  40404040  40404040
40404040  40404040  40404040  40404040  40404040  40404040  40404040
40404040  40404040  40404040  40404040  C2E4C9D3  F0F0F1F0**
02E3E7E3  40000174  40400004  40400001  00000000  40404040  40404040
40404040  40404040  40404040  40404040  40404040  40404040  40404040
40404040  40404040  40404040  40404040  C2E4C9D3  F0F0F1F1*
02E3E7E3  4000017C  40400004  40400001  00000000  40404040  40404040
40404040  40404040  40404040  40404040  40404040  40404040  40404040
40404040  40404040  40404040  40404040  C2E4C9D3  F0F0F1F2*
02E3E7E3  400001F0  40400038  40400001  58B0D088  58A0D0B8  50B0D0E0
50B0D0F4  50B0D0D8  5800D098  5000D160  5860D1B8  5870D08C  5890D1BC
58B0D14C  58A0D154  5880D120  2B007806  C2E4C9D3  F0F0F1F3*
02E3E7E3  40000228  40400038  40400001  80006A00  D0786000  D0685820
D06C5920  D0984770  D27E2B00  78098000  6A00D078  6000D068  5850D06C
5800D0F4  5A00D08C  5000D0F4  18305C20  C2E4C9D3  F0F0F1F4*
02E3E7E3  40000260  40400038  40400001  D0B45A30  D1605C40  D0B41825
5A20D160  4103A000  5000D050  4102B000  5000D054  9280D054  58F0D130
4110D04C  05EF5800  D0F45700  D0845000  C2E4C9D3  F0F0F1F5*
02E3E7E3  40000298  40400038  40400001  D0746820  D0706B20  D0807029
80005A70  D08C5A90  D0B85A60  D0B85970  D10047C0  D1FC58B0  D08858A0
D0B85800  D08C5000  D1045800  D1985000  C2E4C9D3  F0F0F1F6*
02E3E7E3  400002D0  40400038  40400001  D18850A0  D1845820  D1A05020
D17C5800  D19C5000  D1805800  D1A45000  D1785800  D0985000  D16050A0
D15C5800  D1A05000  D1945800  D1A85000  C2E4C9D3  F0F0F1F7*
02E3E7E3  40000308  40400038  40400001  D1905800  D1C05000  D18C5800
D1C45000  D1B4189A  18A258B0  D1445880  D12058E0  D18C2B00  780E8000
6A00D078  6000D068  5820D06C  5020D0F0  C2E4C9D3  F0F0F1F8*
02E3E7E3  40000340  40400038  40400001  58E0D1B4  2B00780E  80006A00
D0786000  D0685800  D06C5000  D0E85800  D0D81200  4780D352  5850D0D8
5C40D1A0  18355A30  D19C5923  B0004780  C2E4C9D3  F0F0F1F9*
02E3E7E3  40000378  40400038  40400001  D4FC5800  D0D85A00  D08C5000

MEMBER NAME  BUILD1
D0D85820  D0E05A20  D08C5850  D0D85C40  D1A01835  5A30D098  5023B000
5870D0F0  5C60D19C  18275A20  D09858F0  C2E4C9D3  F0F0F2F0**
02E3E7E3  400003B0  40400038  40400001  D1285852  F0001827  5A20D1A4
5832F000  1C291C49  5A30D098  5030D174  18255A20  D09818A2  58B0D134
5890D13C  5880D14C  5800D0E0  5A00D08C  C2E4C9D3  F0F0F2F1*
```

```
02E3E7E3  400003E8  40400038  40400001  5000D0E0  18505C40  D0B81825
5A20D098  4102B000  5000D05C  410A9000  5000D060  9280D060  58F0D130
4110D058  05EF5850  D0E05C40  D0B81825  C2E4C9D3  F0F0F2F2*
02E3E7E3  40000420  40400038  40400001  5A20D098  7802B000  7900D0C0
4770D492  5800D0F4  5A00D08C  5000D0F4  5850D0E0  5C40D15C  18255A20
D1642B00  7802B000  6A00D078  6000D068  C2E4C9D3  F0F0F2F3*
02E3E7E3  40000458  40400038  40400001  5850D06C  5800D0F4  5700D084
5000D074  6820D070  6B20D080  5870D0E0  5C60D15C  18275A20  D1647022
B0005830  D0F45C20  D0B45A30  D1605C40  C2E4C9D3  F0F0F2F4*
02E3E7E3  40000490  40400038  40400001  D0B41825  5A20D160  58F0D154
4103F000  5000D050  41028000  5000D054  9280D054  58F0D130  4110D04C
05EF5AA0  D0B859A0  D17447C0  D3B85880  C2E4C9D3  F0F0F2F5*
02E3E7E3  400004C8  40400038  40400001  D12058B0  D14458A0  D17C5890
D0B8185A  5C40D0D8  18255A20  D1785800  D0E05002  B000185A  5C40D0D8
18255A20  D1805800  D0F05002  B000185A  C2E4C9D3  F0F0F2F6*
02E3E7E3  40000500  40400038  40400001  5C40D0D8  18255A20  D1A85800
D0885002  B000185A  5C40D0D8  18251A2A  5800D088  5002B000  5850D0D8
5C40D1A0  18255A20  D0985852  B0005A50  C2E4C9D3  F0F0F2F7*
02E3E7E3  40000538  40400038  40400001  D0E85B50  D08C5C40  D1841825
5A20D1AC  7800D0BC  58F0D134  7002F000  5800D0D8  5700D084  5000D074
6820D070  6B20D080  58E0D18C  702E8000  C2E4C9D3  F0F0F2F8*
02E3E7E3  40000570  40400038  40400001  5850D0D8  5C40D1A0  18255A20
D1A85802  B0001200  4770D576  5850D0D8  5C40D194  18255A20  D1905800
D1045002  B0005830  D0D85C20  D1945A30  C2E4C9D3  F0F0F2F9*
02E3E7E3  400005A8  40400038  40400001  D1945823  B0005A20  D08C5850
D0D85C40  D1941835  5A30D194  5023B000  5820D104  5A20D08C  5020D104
5800D1B4  1A095000  D1B45800  D18C1A09  C2E4C9D3  F0F0F3F0**
02E3E7E3  400005E0  40400038  40400001  5000D18C  5920D100  47C0D2FE
58B0D088  58A0D0B8  1BFF58E0  D00007FE  58A0D004  58E0A00C  58B0A018
5810B014  5820D0E0  50201000  5830B01C  C2E4C9D3  F0F0F3F1*
02E3E7E3  40000618  40400038  40400001  5840D0F4  50403000  5850B02C
5860D0D8  50605000  18DA92FF  A00C982C  A01C07FE  987B1004  58207000
5020D0FC  58209000  5020D110  987B1014  C2E4C9D3  F0F0F3F2*
02E3E7E3  40000650  40400038  40400001  58207000  5020D0E0  58209000
5020D0F4  987B1024  58207000  5020D10C  58209000  5020D0D8  58701034
58207000  5020D100  58201000  41302000  C2E4C9D3  F0F0F3F3*
02E3E7E3  40000688  40400038  40400001  41500004  1B255C40  D0B01B25
5020D13C  5030D140  58201008  41302000  41500004  1B255C40  D0A81B25
5020D14C  5030D150  58201010  41302000  C2E4C9D3  F0F0F3F4*
02E3E7E3  400006C0  40400038  40400001  41500004  1B255C40  D0B01B25
5020D134  5030D138  58201018  41302000  41500004  1B255C40  D0A81B25
5020D154  5030D158  58201020  41302000  C2E4C9D3  F0F0F3F5*
02E3E7E3  400006F8  40400038  40400001  41500004  1B255C40  D0941B25
5020D128  5030D12C  58201028  41302000  41500004  1B255C40  D09C1B25
5020D144  5030D148  58201030  41302000  C2E4C9D3  F0F0F3F6*
02E3E7E3  40000730  40400018  40400001  41500004  1B255C40  D0B01B25
5020D120  5030D124  47F0D1C8  40404040  40404040  40404040  40404040
40404040  40404040  40404040  40404040  C2E4C9D3  F0F0F3F7*
02E3E7E3  40000020  4040000C  40400001  00000638  00000028  000005FC
40404040  40404040  40404040  40404040  40404040  40404040  40404040
40404040  40404040  40404040  40404040  C2E4C9D3  F0F0F3F8*
02E3E7E3  40000074  40400004  40400001  000000DC  40404040  40404040
40404040  40404040  40404040  40404040  40404040  40404040  40404040

MEMBER NAME  BUILD1
40404040  40404040  40404040  40404040  C2E4C9D3  F0F0F3F9*
02E3E7E3  4000007C  40400008  40400001  80000000  000000E0  40404040
40404040  40404040  40404040  40404040  40404040  40404040  40404040
40404040  40404040  40404040  40404040  C2E4C9D3  F0F0F4F0**
```

```
02E3E7E3  40000088  40400004  40400001  80000000  40404040  40404040
40404040  40404040  40404040  40404040  40404040  40404040  40404040
40404040  40404040  40404040  40404040  C2E4C9D3  F0F0F4F1*
02E3E7E3  40000184  40400038  40400001  00000000  00000000  00000024
00000000  00000000  00000000  00000000  00000000  00000000  00000000
00000000  00000000  00000000  00000000  C2E4C9D3  F0F0F4F2*
02E3E7E3  400001BC  40400034  40400001  00000000  00000034  0000000C
00000014  00000008  00000010  00000028  00000000  00000000  0000003C
0000005C  0000006C  00000070  40404040  C2E4C9D3  F0F0F4F3*
02D9D3C4  40404040  40400030  40404040  00020001  1C000158  00010001
0C000020  00010001  0C000024  00010001  0C000028  00010001  0C000074
00010001  0C000080  40404040  40404040  C2E4C9D3  F0F0F4F4*
02C5D5C4  40404040  40404040  40404040  40404040  40404040  40404040
00000748  F1F5F7F3  F460C6D6  F34040F0  F2F0F2F8  F7F0F9F8  40F0F84B
F1F34BF0  F6404040  C2E4C9D3  C4F14040  C2E4C9D3  F0F0F4F5**

MEMBER NAME  BUILD2
02C5E2C4  40404040  40400010  40400001  C2E4C9D3  C4F24040  00000000
40000000  40404040  40404040  40404040  40404040  40404040  40404040
40404040  40404040  40404040  40404040  C2E4C9D3  F0F0F0F1*
02E3E7E3  40000000  40400028  40400001  47F0F00C  07C2E4C9  D3C4F240
90ECD00C  184D98CD  F0205040  D00450D0  400807FC  40404040  40404040
40404040  40404040  40404040  40404040  C2E4C9D3  F0F0F0F2*
02C5E2C4  40404040  40400010  40400002  C2E2D6D9  E3404040  02000000
40000000  40404040  40404040  40404040  40404040  40404040  40404040
40404040  40404040  40404040  40404040  C2E4C9D3  F0F0F0F3*
02E3E7E3  40000098  40400030  40400001  00000000  00000000  00000001
00000001  00000002  00000005  0000000A  0000000E  00000014  00000038
00000000  00000000  40404040  40404040  C2E4C9D3  F0F0F0F4*
02E3E7E3  40000100  40400008  40400001  00000000  00000000  40404040
40404040  40404040  40404040  40404040  40404040  40404040  40404040
40404040  40404040  40404040  40404040  C2E4C9D3  F0F0F0F5*
02C5E2C4  40404040  40400010  40400003  D4E5C3C8  D9D34040  02000000
40000000  40404040  40404040  40404040  40404040  40404040  40404040
40404040  40404040  40404040  40404040  C2E4C9D3  F0F0F0F6*
02E3E7E3  4000010C  40400004  40400001  00000000  40404040  40404040
40404040  40404040  40404040  40404040  40404040  40404040  40404040
40404040  40404040  40404040  40404040  C2E4C9D3  F0F0F0F7*
02E3E7E3  40000114  40400004  40400001  00000000  40404040  40404040
40404040  40404040  40404040  40404040  40404040  40404040  40404040
40404040  40404040  40404040  40404040  C2E4C9D3  F0F0F0F8*
02E3E7E3  400000F0  40400010  40400001  00000001  00000004  C9D54040
C1404040  40404040  40404040  40404040  40404040  40404040  40404040
40404040  40404040  40404040  40404040  C2E4C9D3  F0F0F0F9*
02E3E7E3  40000150  40400038  40400001  58B0D0E4  5800D07C  5000D0B4
58F0D0D8  4110D04C  05EF5800  D07C5000  D0A05800  D1145000  D10C5800
D1185000  D1045800  D1205000  D1105800  C2E4C9D3  F0F0F1F0**
02E3E7E3  40000188  40400038  40400001  D1245000  D1085880  D0905890
D09458B0  D0DC58A0  D0E458E0  D110585E  A00058E0  D108587E  A0001C69
1C491827  5A20D0F0  18355A30  D0F05850  C2E4C9D3  F0F0F1F1*
02E3E7E3  400001C0  40400038  40400001  D0985860  D0785880  D0701893
58A0D094  18B25870  D0DC7809  70003200  4780D1BA  18868785  D1C247F0
D1DA879A  D1AE58A0  D0E458B0  D0DC5890  C2E4C9D3  F0F0F1F2*
02E3E7E3  400001F8  40400038  40400001  D0945880  D09047F0  D24858A0
D0E458B0  D0DC5890  D0945880  D09058E0  D108582E  A00058E0  D110583E
A0001852  1B535A50  D07C1C49  5050D0B8  C2E4C9D3  F0F0F1F3*
02E3E7E3  40000230  40400038  40400001  18595C40  D0B45A50  D10C1873
1C691847  5A40D10C  4105B000  5000D064  4104B000  5000D068  9280D068
58F0D0EC  4110D060  05EF5A20  D0B41B23  C2E4C9D3  F0F0F1F4*
```

```
02E3E7E3  40000268  40400038  40400001  5A20D07C  5020D0B4  5820D0A0
5A20D07C  5020D0A0  5800D108  1A085000  D1085800  D1101A08  5000D110
5920D0A8  47C0D176  58B0D0E4  5800D0B4  C2E4C9D3  F0F0F1F5*
02E3E7E3  400002A0  40400038  40400001  5B00D07C  5000D0AC  1BFF58E0
D00007FE  58A0D004  58E0A00C  58B0A018  5810B004  5820D0AC  50201000
5830B00C  5840D0A8  50403000  18DA92FF  C2E4C9D3  F0F0F1F6*
02E3E7E3  400002D8  40400038  40400001  A00C982C  A01C07FE  98791004
58207000  5020D0AC  58209000  5020D0A8  58201000  41302000  41500004
1B255C40  D08C1B25  5020D0DC  5030D0E0  C2E4C9D3  F0F0F1F7*
02E3E7E3  40000310  40400024  40400001  58201008  41302000  41500004
1B255C40  D0841B25  5020D0E4  5030D0E8  5030D054  47F0D128  40404040
40404040  40404040  40404040  40404040  C2E4C9D3  F0F0F1F8*
02E3E7E3  40000020  4040000C  40400001  000002E0  00000028  000002B0
40404040  40404040  40404040  40404040  40404040  40404040  40404040
40404040  40404040  40404040  40404040  C2E4C9D3  F0F0F1F9*
02E3E7E3  40000074  40400008  40400001  000000F0  000000A4  40404040

MEMBER NAME   BUILD2
40404040  40404040  40404040  40404040  40404040  40404040  40404040
40404040  40404040  40404040  40404040  C2E4C9D3  F0F0F2F0**
02E3E7E3  40000080  40400004  40400001  000000B8  40404040  40404040
40404040  40404040  40404040  40404040  40404040  40404040  40404040
40404040  40404040  40404040  40404040  C2E4C9D3  F0F0F2F1*
02D9D3C4  40404040  40400038  40404040  00020001  1C000100  00030001
1C000114  00010001  0C000020  00010001  0C000024  00010001  0C000028
00010001  0C000074  00010001  0C000078  C2E4C9D3  F0F0F2F2*
02E3E7E3  40000084  40400008  40400001  800000D0  000000E0  40404040
40404040  40404040  40404040  40404040  40404040  40404040  40404040
40404040  40404040  40404040  40404040  C2E4C9D3  F0F0F2F3*
02E3E7E3  40000090  40400004  40400001  80000000  40404040  40404040
40404040  40404040  40404040  40404040  40404040  40404040  40404040
40404040  40404040  40404040  40404040  C2E4C9D3  F0F0F2F4*
02E3E7E3  40000118  40400038  40400001  00000028  00000000  00000000
00000000  00000000  00000000  00000000  00000000  00000000  00000004
00000008  00000000  00000018  0000001C  C2E4C9D3  F0F0F2F5*
02D9D3C4  40404040  40400018  40404040  00010001  0C000080  00010001
0C000084  00010001  0C000088  40404040  40404040  40404040  40404040
40404040  40404040  40404040  40404040  C2E4C9D3  F0F0F2F6*
02C5D5C4  40404040  40404040  40404040  40404040  40404040  40404040
00000334  F1F5F7F3  F460C6D6  F34040F0  F2F0F2F8  F7F0F9F8  40F0F84B
F1F34BF1  F0404040  C2E4C9D3  C4F24040  C2E4C9D3  F0F0F2F7**

MEMBER NAME   CADLN1
02C5E2C4  40404040  40400010  40400001  C3C1C4D3  D5F14040  00000000
40000000  40404040  40404040  40404040  40404040  40404040  40404040
40404040  40404040  40404040  40404040  C3C1C4D3  F0F0F0F1*
02E3E7E3  40000000  40400028  40400001  47F0F00C  07C3C1C4  D3D5F140
90ECD00C  184D98CD  F0205040  D00450D0  400807FC  40404040  40404040
40404040  40404040  40404040  40404040  C3C1C4D3  F0F0F0F2*
02C5E2C4  40404040  40400010  40400002  C3C1C4D3  D5404040  02000000
40000000  40404040  40404040  40404040  40404040  40404040  40404040
40404040  40404040  40404040  40404040  C3C1C4D3  F0F0F0F3*
02E3E7E3  40000088  40400010  40400001  00000001  00000002  00000000
00000000  40404040  40404040  40404040  40404040  40404040  40404040
40404040  40404040  40404040  40404040  C3C1C4D3  F0F0F0F4*
02E3E7E3  400000C0  40400038  40400001  00000000  7800D070  7000D084
7800D078  7000D088  7800D074  7000D08C  7800D07C  7000D090  58F0D098
4110D054  05EF41E0  000415FE  4720D0D6  C3C1C4D3  F0F0F0F5*
02E3E7E3  400000F8  40400038  40400001  58EFD04C  07FE1BFF  58E0D000
```

| | | | | | | |
|---|---|---|---|---|---|---|
| 07FE58D0 | D00458E0 | D00C92FF | D00C982C | D01C07FE | 987A1000 | 78207000 |
| 7020D070 | 78208000 | 7020D078 | 78209000 | C3C1C4D3 | F0F0F0F6* | |
| 02E3E7E3 | 40000130 | 40400010 | 40400001 | 7020D074 | 7820A000 | 7020D07C |
| 47F0D09C | 40404040 | 40404040 | 40404040 | 40404040 | 40404040 | 40404040 |
| 40404040 | 40404040 | 40404040 | 40404040 | C3C1C4D3 | F0F0F0F7* | |
| 02E3E7E3 | 40000020 | 4040000C | 40400001 | 00000118 | 00000028 | 00000106 |
| 40404040 | 40404040 | 40404040 | 40404040 | 40404040 | 40404040 | 40404040 |
| 40404040 | 40404040 | 40404040 | 40404040 | C3C1C4D3 | F0F0F0F8* | |
| 02E3E7E3 | 40000074 | 40400010 | 40400001 | 000000FE | 000000FE | 000000AC |
| 800000B4 | 40404040 | 40404040 | 40404040 | 40404040 | 40404040 | 40404040 |
| 40404040 | 40404040 | 40404040 | 40404040 | C3C1C4D3 | F0F0F0F9* | |
| 02D9D3C4 | 40404040 | 40400038 | 40404040 | 00020001 | 1C0000C0 | 00010001 |
| 0C000020 | 00010001 | 0C000024 | 00010001 | 0C000028 | 00010001 | 0C000074 |
| 00010001 | 0C000078 | 00010001 | 0C00007C | C3C1C4D3 | F0F0F1F0** | |
| 02D9D3C4 | 40404040 | 40400008 | 40404040 | 00010001 | 0C000080 | 40404040 |
| 40404040 | 40404040 | 40404040 | 40404040 | 40404040 | 40404040 | 40404040 |
| 40404040 | 40404040 | 40404040 | 40404040 | C3C1C4D3 | F0F0F1F1* | |
| 02C5D5C4 | 40404040 | 40404040 | 40404040 | 40404040 | 40404040 | 40404040 |
| 00000140 | F1F5F7F3 | F460C6D6 | F34040F0 | F2F0F2F8 | F7F0F9F8 | 40F0F84B |
| F1F34BF1 | F5404040 | C3C1C4D3 | D5F14040 | C3C1C4D3 | F0F0F1F2** | |

MEMBER NAME CANDO

| | | | | | | |
|---|---|---|---|---|---|---|
| 02C5E2C4 | 40404040 | 40400010 | 40400001 | C3C1D5C4 | D6404040 | 00000000 |
| 40000000 | 40404040 | 40404040 | 40404040 | 40404040 | 40404040 | 40404040 |
| 40404040 | 40404040 | 40404040 | 40404040 | C3C1D5C4 | F0F0F0F1* | |
| 02E3E7E3 | 40000000 | 40400038 | 40400001 | 47F0F00C | 07C3C1D5 | C4D64040 |
| 90ECD00C | 184D98CD | F0205040 | D00450D0 | 400807FC | 40404040 | 40404040 |
| 021A1940 | C5D9D9D6 | D9407A40 | C7E3D7E3 | C3C1D5C4 | F0F0F0F2* | |
| 02E3E7E3 | 40000038 | 4040002A | 40400001 | E240C1D9 | D9C1E840 | C6E4D3D3 |
| 22021A19 | 40C5D9D9 | D6D9407A | 40C9D7D9 | D6C640C1 | D9D9C1E8 | 40C6E4D3 |
| D3224040 | 40404040 | 40404040 | 40404040 | C3C1D5C4 | F0F0F0F3* | |
| 02E3E7E3 | 40000160 | 40400038 | 40400001 | 00000000 | 00000000 | 00000001 |
| 00000002 | 00000003 | 00000004 | 0000000B | 0000000E | 00000014 | 00001388 |
| 00021054 | 40800000 | 40B504F4 | 00000000 | C3C1D5C4 | F0F0F0F4* | |
| 02C5E2C4 | 40404040 | 40400010 | 40400002 | E2D7D3D7 | E3E24040 | 05000000 |
| 40030D44 | 40404040 | 40404040 | 40404040 | 40404040 | 40404040 | 40404040 |
| 40404040 | 40404040 | 40404040 | 40404040 | C3C1D5C4 | F0F0F0F5* | |
| 02E3E7E3 | 40000198 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3C1D5C4 | F0F0F0F6* | |
| 02C5E2C4 | 40404040 | 40400010 | 40400003 | C3D5E3D9 | C4404040 | 02000000 |
| 40000000 | 40404040 | 40404040 | 40404040 | 40404040 | 40404040 | 40404040 |
| 40404040 | 40404040 | 40404040 | 40404040 | C3C1D5C4 | F0F0F0F7* | |
| 02E3E7E3 | 400001F0 | 4040000C | 40400001 | FFFFFFEC | 00000000 | 00000000 |
| 40404040 | 40404040 | 40404040 | 40404040 | 40404040 | 40404040 | 40404040 |
| 40404040 | 40404040 | 40404040 | 40404040 | C3C1D5C4 | F0F0F0F8* | |
| 02E3E7E3 | 40000200 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3C1D5C4 | F0F0F0F9* | |
| 02E3E7E3 | 40000208 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3C1D5C4 | F0F0F1F0** | |
| 02C5E2C4 | 40404040 | 40400010 | 40400004 | C3C1C4D9 | E5E34040 | 02000000 |
| 40000000 | 40404040 | 40404040 | 40404040 | 40404040 | 40404040 | 40404040 |
| 40404040 | 40404040 | 40404040 | 40404040 | C3C1D5C4 | F0F0F1F1* | |
| 02E3E7E3 | 40000210 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3C1D5C4 | F0F0F1F2* | |
| 02C5E2C4 | 40404040 | 40400010 | 40400005 | C3D5C4C3 | C8D54040 | 02000000 |

```
40000000  40404040  40404040  40404040  40404040  40404040  40404040
40404040  40404040  40404040  40404040  C3C1D5C4  F0F0F1F3*
02C5E2C4  40404040  40400010  40400006  C4C3E6C3  C3E64040  02000000
40000000  40404040  40404040  40404040  40404040  40404040  40404040
40404040  40404040  40404040  40404040  C3C1D5C4  F0F0F1F4*
02C5E2C4  40404040  40400010  40400007  C9C2C3D6  D47B4040  02000000
40000000  40404040  40404040  40404040  40404040  40404040  40404040
40404040  40404040  40404040  40404040  C3C1D5C4  F0F0F1F5*
02E3E7E3  40000218  40400010  40400001  00000000  00000000  00000000
00000000  40404040  40404040  40404040  40404040  40404040  40404040
40404040  40404040  40404040  40404040  C3C1D5C4  F0F0F1F6*
02C5E2C4  40404040  40400010  40400008  D6D7E3D4  E9C54040  02000000
40000000  40404040  40404040  40404040  40404040  40404040  40404040
40404040  40404040  40404040  40404040  C3C1D5C4  F0F0F1F7*
02C5E2C4  40404040  40400010  40400009  D7D6C9D5  E3E24040  02000000
40000000  40404040  40404040  40404040  40404040  40404040  40404040
40404040  40404040  40404040  40404040  C3C1D5C4  F0F0F1F8*
02E3E7E3  4000022C  4040000C  40400001  00000000  00000000  00000000
40404040  40404040  40404040  40404040  40404040  40404040  40404040
40404040  40404040  40404040  40404040  C3C1D5C4  F0F0F1F9*
02D9D3C4  40404040  40400038  40404040  00020001  0C0001F0  00030001

MEMBER NAME  CANDO
1C0001F4  00040001  1C000218  00050001  1C00021C  00060001  1C000220
00070001  1C00022C  00080001  1C000230  C3C1D5C4  F0F0F2F0**
02C5E2C4  40404040  40400010  4040000A  D7D9D6C6  C9D34040  02000000
40000000  40404040  40404040  40404040  40404040  40404040  40404040
40404040  40404040  40404040  40404040  C3C1D5C4  F0F0F2F1*
02E3E7E3  40000238  40400004  40400001  00000000  40404040  40404040
40404040  40404040  40404040  40404040  40404040  40404040  40404040
40404040  40404040  40404040  40404040  C3C1D5C4  F0F0F2F2*
02E3E7E3  40000260  40400038  40400001  5870D190  5880D1A0  5890D198
58A0D188  58B0D1BC  5860D1D4  5800D0F8  5000D15C  5000D13C  5800D10C
5000D1E4  5820D1F0  5020D1E8  4102B000  C3C1D5C4  F0F0F2F3*
02E3E7E3  40000298  40400038  40400001  5000D070  58F0D1B4  4110D070
05EF41E0  000415FE  4720D24E  58EFD04C  07FE4102  B0005000  D08058F0
D1CC4110  D08005EF  58F0D1D0  4110D0A8  C3C1D5C4  F0F0F2F4*
02E3E7E3  400002D0  40400038  40400001  05EF41E0  000815FE  4720D27A
58EFD054  07FE58F0  D1B84110  D0A805EF  41E00004  15FE4720  D29458EF
D06007FE  7800D0FC  7000D168  7000D16C  C3C1D5C4  F0F0F2F5*
02E3E7E3  40000308  40400038  40400001  7000D154  5800D13C  5900D104
4750D324  18365C20  D13C5850  D10C5860  D1185880  D1F458A0  D1D418B3
183A5C26  90001A35  18281A2A  41037000  C3C1D5C4  F0F0F2F6*
02E3E7E3  40000340  40400038  40400001  5000D0BC  41029000  5000D0C4
58F0D18C  4110D0BC  05EF7800  D1547B00  D1647000  D1547820  D1647C20
D1403322  7A20D168  7020D168  7820D164  C3C1D5C4  F0F0F2F7*
02E3E7E3  40000378  40400038  40400001  7C20D144  33227A20  D16C7020
D16C1A6A  878AD2C8  5880D1A0  58A0D188  58B0D1BC  5860D1D4  5820D1E4
1A261856  5C429000  5820D1E4  1A254102  C3C1D5C4  F0F0F2F8*
02E3E7E3  400003B0  40400038  40400001  70005000  D0BC58E0  D1F4410E
90005000  D0C458F0  D18C4110  D0BC05EF  7800D154  7A00D164  7000D154
7840D164  7C40D140  7A40D168  7820D164  C3C1D5C4  F0F0F2F9*
02E3E7E3  400003E8  40400038  40400001  7C20D144  7A20D16C  38047D00
D1547000  D1403802  7D00D154  7000D144  7800D140  7000D178  7800D144
7000D17C  7800D128  7000D170  7800D128  C3C1D5C4  F0F0F3F0**
02E3E7E3  40000420  40400038  40400001  7000D174  58F0D1B0  4110D0DC
05EF41E0  000415FE  4720D3D6  58EFD068  07FE5800  D1605900  D12047C0
D40658F0  D1C41800  45E0F004  00000006  C3C1D5C4  F0F0F3F1*
02E3E7E3  40000458  40400038  40400001  00000028  45E0F010  58F0D1C4
```

```
45E0F034  05404040  F4F458F0  D1C84110  D0E805EF  5800D13C  5A00D158
5000D158  5900D11C  4730D42C  1BFF58E0  C3C1D5C4  F0F0F3F2*
02E3E7E3  40000490  40400038  40400001  D00007FE  58F0D1C4  45E0F004
00000006  00000045  45E0F010  58F0D1C4  45E0F034  05404040  F4F45800
D1005000  D15C1BFF  58E0D000  07FE5800  C3C1D5C4  F0F0F3F3*
02E3E7E3  400004C8  40400038  40400001  D1045000  D15C1BFF  58E0D000
07FE5800  D1085000  D15C1BFF  58E0D000  07FE5800  D10C5000  D15C1BFF
58E0D000  07FE58A0  D00458E0  A00C58B0  C3C1D5C4  F0F0F3F4*
02E3E7E3  40000500  40400038  40400001  A0185810  B0045820  D1385020
10005830  B00C5840  D1505040  30005850  B0107820  D1547020  50005860
B0147840  D1407040  60005870  B0187860  C3C1D5C4  F0F0F3F5*
02E3E7E3  40000538  40400038  40400001  D1447060  70005880  B0205890
D1605090  80005810  B02C5820  D1585020  10005830  B0305840  D15C5040
300018DA  92FFA00C  982CA01C  07FE987B  C3C1D5C4  F0F0F3F6*
02E3E7E3  40000570  40400038  40400001  10045820  70005020  D1385820
90005020  D1507820  A0007020  D1547820  B0007020  D140987B  10187820
70007020  D1445820  90005020  D1609878  C3C1D5C4  F0F0F3F7*
02E3E7E3  400005A8  40400038  40400001  102C5820  70005020  D1585820
80005020  D15C5820  10004130  20004150  00041B25  5C40D114  1B255020
D1BC5030  D1C05820  10084130  20004150  C3C1D5C4  F0F0F3F8*
02E3E7E3  400005E0  40400038  40400001  00041B25  5C40D110  1B255020
D1A85030  D1AC5030  D0885820  101C4130  20004150  00041B25  5C40D104

MEMBER NAME  CANDO
1B255020  D1905030  D1945030  D0A05030  C3C1D5C4  F0F0F3F9*
02E3E7E3  40000618  40400038  40400001  D0A85030  D0E85820  10244130
20004150  00041B25  5C40D104  1B255020  D1985030  D19C5030  D07C9280
D07C5030  D0905030  D0B05030  D0F05820  C3C1D5C4  F0F0F4F0**
02E3E7E3  40000650  40400026  40400001  10284130  20004150  00041B25
5C40D10C  1B255020  D1A05030  D1A45030  D0B89280  D0B847F0  D1F84040
40404040  40404040  40404040  40404040  C3C1D5C4  F0F0F4F1*
02E3E7E3  40000020  40400008  40400001  0000056E  00000068  40404040
40404040  40404040  40404040  40404040  40404040  40404040  40404040
40404040  40404040  40404040  40404040  C3C1D5C4  F0F0F4F2*
02E3E7E3  40000068  40400004  40400001  000004F6  40404040  40404040
40404040  40404040  40404040  40404040  40404040  40404040  40404040
40404040  40404040  40404040  40404040  C3C1D5C4  F0F0F4F3*
02E3E7E3  400000B4  40400004  40400001  000002B6  40404040  40404040
40404040  40404040  40404040  40404040  40404040  40404040  40404040
40404040  40404040  40404040  40404040  C3C1D5C4  F0F0F4F4*
02D9D3C4  40404040  40400038  40404040  00090001  1C000234  000A0001
1C000238  00010001  0C000458  00010001  0C0004A0  00010001  0C000020
00010001  0C000024  00010001  0C000068  C3C1D5C4  F0F0F4F5*
02E3E7E3  400000B8  4040001C  40400001  000004B6  000002E2  000004C6
000004E6  000002FC  000004D6  0000043E  40404040  40404040  40404040
40404040  40404040  40404040  40404040  C3C1D5C4  F0F0F4F6*
02D9D3C4  40404040  40400038  40404040  00010001  0C0000B4  00010001
0C0000B8  00010001  0C0000BC  00010001  0C0000C0  00010001  0C0000C4
00010001  0C0000C8  00010001  0C0000CC  C3C1D5C4  F0F0F4F7*
02E3E7E3  400000D4  40400004  40400001  0000043E  40404040  40404040
40404040  40404040  40404040  40404040  40404040  40404040  40404040
40404040  40404040  40404040  40404040  C3C1D5C4  F0F0F4F8*
02E3E7E3  400000DC  40400008  40400001  000001A0  000001A4  40404040
40404040  40404040  40404040  40404040  40404040  40404040  40404040
40404040  40404040  40404040  40404040  C3C1D5C4  F0F0F4F9*
02E3E7E3  400000EC  40400004  40400001  000001A0  40404040  40404040
40404040  40404040  40404040  40404040  40404040  40404040  40404040
40404040  40404040  40404040  40404040  C3C1D5C4  F0F0F5F0**
02E3E7E3  400000F4  40400004  40400001  000001B8  40404040  40404040
```

```
40404040  40404040  40404040  40404040  40404040  40404040  40404040
40404040  40404040  40404040  40404040  C3C1D5C4  F0F0F5F1*
02E3E7E3  400000FC  40400008  40400001  000001A4  00000004  40404040
40404040  40404040  40404040  40404040  40404040  40404040  40404040
40404040  40404040  40404040  40404040  C3C1D5C4  F0F0F5F2*
02D9D3C4  40404040  40400038  40404040  00010001  0C0000D0  00010001
0C0000D4  00010001  0C0000DC  00010001  0C0000E0  00010001  0C0000EC
00010001  0C0000F4  00010001  0C0000FC  C3C1D5C4  F0F0F5F3*
02E3E7E3  40000104  40400004  40400001  00000000  40404040  40404040
40404040  40404040  40404040  40404040  40404040  40404040  40404040
40404040  40404040  40404040  40404040  C3C1D5C4  F0F0F5F4*
02E3E7E3  4000010C  40400004  40400001  800001C8  40404040  40404040
40404040  40404040  40404040  40404040  40404040  40404040  40404040
40404040  40404040  40404040  40404040  C3C1D5C4  F0F0F5F5*
02E3E7E3  40000114  40400004  40400001  000001C8  40404040  40404040
40404040  40404040  40404040  40404040  40404040  40404040  40404040
40404040  40404040  40404040  40404040  C3C1D5C4  F0F0F5F6*
02E3E7E3  4000011C  40400004  40400001  000001A4  40404040  40404040
40404040  40404040  40404040  40404040  40404040  40404040  40404040
40404040  40404040  40404040  40404040  C3C1D5C4  F0F0F5F7*
02E3E7E3  40000128  40400004  40400001  0000016C  40404040  40404040
40404040  40404040  40404040  40404040  40404040  40404040  40404040
40404040  40404040  40404040  40404040  C3C1D5C4  F0F0F5F8*

MEMBER NAME  CANDO
02E3E7E3  40000130  40400008  40400001  00000168  0000016C  40404040
40404040  40404040  40404040  40404040  40404040  40404040  40404040
40404040  40404040  40404040  40404040  C3C1D5C4  F0F0F5F9*
02D9D3C4  40404040  40400038  40404040  00020001  0C000100  00020001
0C000104  00010001  0C00010C  00010001  0C000114  00010001  0C00011C
00010001  0C000128  00010001  0C000130  C3C1D5C4  F0F0F6F0**
02E3E7E3  40000138  40400018  40400001  000001CC  000001A8  800001AC
000001E0  000001D8  8000018C  40404040  40404040  40404040  40404040
40404040  40404040  40404040  40404040  C3C1D5C4  F0F0F6F1*
02E3E7E3  40000154  40400004  40400001  0000019C  40404040  40404040
40404040  40404040  40404040  40404040  40404040  40404040  40404040
40404040  40404040  40404040  40404040  C3C1D5C4  F0F0F6F2*
02D9D3C4  40404040  40400038  40404040  00010001  0C000134  00010001
0C000138  00010001  0C00013C  00010001  0C000140  00010001  0C000144
00010001  0C000148  00010001  0C00014C  C3C1D5C4  F0F0F6F3*
02E3E7E3  4000015C  40400004  40400001  800001A4  40404040  40404040
40404040  40404040  40404040  40404040  40404040  40404040  40404040
40404040  40404040  40404040  40404040  C3C1D5C4  F0F0F6F4*
02E3E7E3  4000023C  40400024  40400001  00000008  00000000  00000000
00000000  00000000  00000000  00000038  0000003C  00000010  40404040
40404040  40404040  40404040  40404040  C3C1D5C4  F0F0F6F5*
02D9D3C4  40404040  40400010  40404040  00010001  0C000154  00010001
0C00015C  40404040  40404040  40404040  40404040  40404040  40404040
40404040  40404040  40404040  40404040  C3C1D5C4  F0F0F6F6*
02C5D5C4  40404040  40404040  40404040  40404040  40404040  40404040
00000676  F1F5F7F3  F460C6D6  F34040F0  F2F0F2F8  F7F0F9F8  40F0F84B
F1F34BF1  F9404040  C3C1D5C4  D6404040  C3C1D5C4  F0F0F6F7**

MEMBER NAME  CDTARC
02C5E2C4  40404040  40400010  40400001  C3C4E3C1  D9C34040  00000000
40000000  40404040  40404040  40404040  40404040  40404040  40404040
40404040  40404040  40404040  40404040  C3C4E3C1  F0F0F0F1*
02E3E7E3  40000000  40400028  40400001  47F0F00C  07C3C4E3  C1D9C340
90ECD00C  184D98CD  F0205040  D00450D0  400807FC  40404040  40404040
```

40404040 40404040 40404040 40404040 C3C4E3C1 F0F0F0F2*
02E3E7E3 40000088 40400038 40400001 4E000000 00000000 4E000000
80000000 00000001 00000002 00000003 00000004 00000005 00000006
00000007 00000008 00000009 0000000A C3C4E3C1 F0F0F0F3*
02C5E2C4 40404040 40400010 40400002 D7E3C1C2 D3C54040 05000000
40125768 40404040 40404040 40404040 40404040 40404040 40404040
40404040 40404040 40404040 40404040 C3C4E3C1 F0F0F0F4*
02E3E7E3 400000C0 40400020 40400001 0000000C 00000014 00000018
0000002C 00000038 41300000 00000000 00000000 40404040 40404040
40404040 40404040 40404040 40404040 C3C4E3C1 F0F0F0F5*
02C5E2C4 40404040 40400010 40400003 C5D3D4E3 C2D34040 05000000
400D7D28 40404040 40404040 40404040 40404040 40404040 40404040
40404040 40404040 40404040 40404040 C3C4E3C1 F0F0F0F6*
02C5E2C4 40404040 40400010 40400004 E5F9F840 40404040 05000000
40000004 40404040 40404040 40404040 40404040 40404040 40404040
40404040 40404040 40404040 40404040 C3C4E3C1 F0F0F0F7*
02C5E2C4 40404040 40400010 40400005 E5F9F940 40404040 05000000
4000003C 40404040 40404040 40404040 40404040 40404040 40404040
40404040 40404040 40404040 40404040 C3C4E3C1 F0F0F0F8*
02E3E7E3 40000108 40400020 40400001 FFFFFFEC 00058600 000B0444
00108298 FFFFFFC8 000CD118 00000000 FFFFFFFC 40404040 40404040
40404040 40404040 40404040 40404040 C3C4E3C1 F0F0F0F9*
02D9D3C4 40404040 40400038 40404040 00020001 0C000108 00020001
0C00010C 00020001 0C000110 00020001 0C000114 00030001 0C000118
00030001 0C00011C 00040001 0C000120 C3C4E3C1 F0F0F1F0**
02E3E7E3 40000128 40400004 40400001 00000000 40404040 40404040
40404040 40404040 40404040 40404040 40404040 40404040 40404040
40404040 40404040 40404040 40404040 C3C4E3C1 F0F0F1F1*
02E3E7E3 40000130 40400004 40400001 00000000 40404040 40404040
40404040 40404040 40404040 40404040 40404040 40404040 40404040
40404040 40404040 40404040 40404040 C3C4E3C1 F0F0F1F2*
02C5E2C4 40404040 40400010 40400006 E2D8D9E3 40404040 02000000
40000000 40404040 40404040 40404040 40404040 40404040 40404040
40404040 40404040 40404040 40404040 C3C4E3C1 F0F0F1F3*
02E3E7E3 40000138 40400004 40400001 00000000 40404040 40404040
40404040 40404040 40404040 40404040 40404040 40404040 40404040
40404040 40404040 40404040 40404040 C3C4E3C1 F0F0F1F4*
02C5E2C4 40404040 40400010 40400007 D4E5C3C8 D9404040 02000000
40000000 40404040 40404040 40404040 40404040 40404040 40404040
40404040 40404040 40404040 40404040 C3C4E3C1 F0F0F1F5*
02E3E7E3 40000140 40400008 40400001 00000000 00000000 40404040
40404040 40404040 40404040 40404040 40404040 40404040 40404040
40404040 40404040 40404040 40404040 C3C4E3C1 F0F0F1F6*
02E3E7E3 400000F4 40400014 40400001 00000000 00000000 00000000
00000000 00000000 40404040 40404040 40404040 40404040 40404040
40404040 40404040 40404040 40404040 C3C4E3C1 F0F0F1F7*
02E3E7E3 40000150 40400038 40400001 5840D0FC 5850D0F8 5860D0EC
5880D110 5890D108 58A0D100 58B0D0F0 5870D0B0 58005000 8707D158
1BFF58E0 D00007FE 58004028 8707D168 C3C4E3C1 F0F0F1F8*
02E3E7E3 40000188 40400038 40400001 1BFF58E0 D00007FE 5800D0C0
5900D080 4750D17C 1BFF58E0 D00007FE 5830B038 5A30D070 5030B038
5C20D0A8 7800D0AC 7003B004 58006008 C3C4E3C1 F0F0F1F9*
02E3E7E3 400001C0 40400038 40400001 5700D06C 5000D064 6820D060

MEMBER NAME CDTARC
6B20D068 7023B008 78209004 7023B00C 78409008 7040D120 7043B010
78408004 7043B014 78408008 7043B018 C3C4E3C1 F0F0F2F0**
02E3E7E3 400001F8 40400038 40400001 7840A004 7043B01C 7860A008
7063B020 3B247840 D1203B46 3C223C44 3A247020 D12058F0 D1184110

```
D04C05EF  7003B024  4103B028  5000D054  C3C4E3C1  F0F0F2F1*
02E3E7E3  40000230  40400038  40400001  58F0D11C  4110D050  05EF1BFF
58E0D000  07FE58D0  D00458E0  D00C92FF  D00C982C  D01C07FE  5870100C
58207000  5020D0C0  58201000  41302000  C3C4E3C1  F0F0F2F2*
02E3E7E3  40000268  40400038  40400001  41500004  1B255020  D1005030
D1045820  10044130  20004150  00041B25  5020D108  5030D10C  58201008
41302000  41500004  1B255020  D1105030  C3C4E3C1  F0F0F2F3*
02E3E7E3  400002A0  40400006  40400001  D11447F0  D1284040  40404040
40404040  40404040  40404040  40404040  40404040  40404040  40404040
40404040  40404040  40404040  40404040  C3C4E3C1  F0F0F2F4*
02E3E7E3  40000020  4040000C  40400001  00000254  00000028  00000242
40404040  40404040  40404040  40404040  40404040  40404040  40404040
40404040  40404040  40404040  40404040  C3C4E3C1  F0F0F2F5*
02E3E7E3  40000074  40400008  40400001  80000148  000000C4  40404040
40404040  40404040  40404040  40404040  40404040  40404040  40404040
40404040  40404040  40404040  40404040  C3C4E3C1  F0F0F2F6*
02D9D3C4  40404040  40400038  40404040  00050001  0C000124  00060001
1C000140  00070001  1C000144  00010001  0C000020  00010001  0C000024
00010001  0C000028  00010001  0C000074  C3C4E3C1  F0F0F2F7*
02E3E7E3  40000080  40400004  40400001  800000F4  40404040  40404040
40404040  40404040  40404040  40404040  40404040  40404040  40404040
40404040  40404040  40404040  40404040  C3C4E3C1  F0F0F2F8*
02E3E7E3  40000148  40400008  40400001  00000000  00000000  40404040
40404040  40404040  40404040  40404040  40404040  40404040  40404040
40404040  40404040  40404040  40404040  C3C4E3C1  F0F0F2F9*
02D9D3C4  40404040  40400010  40404040  00010001  0C000078  00010001
0C000080  40404040  40404040  40404040  40404040  40404040  40404040
40404040  40404040  40404040  40404040  C3C4E3C1  F0F0F3F0**
02C5D5C4  40404040  40404040  40404040  40404040  40404040  40404040
000002A6  F1F5F7F3  F460C6D6  F34040F0  F2F0F2F8  F7F0F9F8  40F0F84B
F1F34BF2  F4404040  C3C4E3C1  D9C34040  C3C4E3C1  F0F0F3F1**

MEMBER NAME   CCHAIN
02C5E2C4  40404040  40400010  40400001  C3C3C8C1  C9D54040  00000000
40000000  40404040  40404040  40404040  40404040  40404040  40404040
40404040  40404040  40404040  40404040  C3C3C8C1  F0F0F0F1*
02E3E7E3  40000000  40400028  40400001  47F0F00C  07C3C3C8  C1C9D540
90ECD00C  184D98CD  F0205040  D00450D0  400807FC  40404040  40404040
40404040  40404040  40404040  40404040  C3C3C8C1  F0F0F0F2*
02C5E2C4  40404040  40400010  40400002  E3D6D3C5  D9404040  05000000
4000000C  40404040  40404040  40404040  40404040  40404040  40404040
40404040  40404040  40404040  40404040  C3C3C8C1  F0F0F0F3*
02E3E7E3  40000080  40400034  40400001  00000000  00000000  00000001
00000001  00000002  00000003  00000004  00000005  00000006  0000000E
00000038  00000000  00000000  40404040  C3C3C8C1  F0F0F0F4*
02C5E2C4  40404040  40400010  40400003  D4E5C3C8  D9404040  02000000
40000000  40404040  40404040  40404040  40404040  40404040  40404040
40404040  40404040  40404040  40404040  C3C3C8C1  F0F0F0F5*
02E3E7E3  40000188  40400008  40400001  00000000  00000000  40404040
40404040  40404040  40404040  40404040  40404040  40404040  40404040
40404040  40404040  40404040  40404040  C3C3C8C1  F0F0F0F6*
02E3E7E3  40000194  40400008  40400001  00000000  00000000  40404040
40404040  40404040  40404040  40404040  40404040  40404040  40404040
40404040  40404040  40404040  40404040  C3C3C8C1  F0F0F0F7*
02E3E7E3  40000270  40400038  40400001  5890D170  5800D064  5000D0A0
5000D0BC  5820D1B4  5020D234  5800D1B0  5000D230  5800D1C0  5000D238
5800D1C4  5000D240  5800D080  5000D21C  C3C3C8C1  F0F0F0F8*
02E3E7E3  400002A8  40400038  40400001  5880D064  18A258B0  D1645800
D0A05000  D0B01850  5C40D080  18255A20  D1B47822  90007020  D0DC1825
```

5A20D1BC 78229000 7020D0E0 18255A20 C3C3C8C1 F0F0F0F9*
02E3E7E3 400002E0 40400038 40400001 D1B07822 90007020 D0E41825
5A20D1C0 5020D23C 78229000 7020D0D0 18255A20 D1C45020 D2447822
90007020 D0D45850 D0BC5C40 D1B41825 C3C3C8C1 F0F0F1F0**
02E3E7E3 40000318 40400038 40400001 5A20D070 5800D0A0 5002B000
7800D0D0 7000D228 7800D0D4 7000D22C 18A858B0 D1B45880 D1607840
D2287B40 D0DC3044 7820D22C 7B20D0E0 C3C3C8C1 F0F0F1F1*
02E3E7E3 40000350 40400038 40400001 30227020 D0A87940 80044730
D3987920 80044730 D39858B0 D16458A0 D2345880 D064185A 5C40D0BC
18255A20 D2305800 D0A05002 B000185A C3C3C8C1 F0F0F1F2*
02E3E7E3 40000388 40400038 40400001 5C40D0BC 18251A2A 5800D05C
5002B000 5820D0A0 1A285020 D0A05920 D09847C0 D38A1BFF 58E0D000
07FE5800 D0BC1A08 5000D0BC 47F0D28A C3C3C8C1 F0F0F1F3*
02E3E7E3 400003C0 40400038 40400001 5800D058 5000D0AC 5820D0A0
1A2A5020 D0C05920 D09847C0 D3B647F0 D7687800 D0E47000 D2105800
D1B05000 D17C50B0 D1807800 D0DC7000 C3C3C8C1 F0F0F1F4*
02E3E7E3 400003F8 40400038 40400001 D1FC5800 D1BC5000 D1847800
D0E07000 D2001872 5C60D080 18075A00 D1B05000 D1901807 1A0B5000
D1941807 5A00D1BC 5000D198 18575A50 C3C3C8C1 F0F0F1F5*
02E3E7E3 40000430 40400038 40400001 D1C01847 5A40D1C4 5050D1A4
5040D1A8 18341845 5850D198 5860D194 5870D190 18A258B0 D0807827
90007020 D2047920 D2104770 D4F07846 C3C3C8C1 F0F0F1F6*
02E3E7E3 40000468 40400038 40400001 90007040 D2087B40 D1FC3064
78259000 7020D20C 7B20D200 30227020 D0A87960 800447A0 D46E7920
80044750 D49A7844 90007B40 D1FC3064 C3C3C8C1 F0F0F1F7*
02E3E7E3 400004A0 40400038 40400001 78239000 7B20D200 30227020
D0A87960 800447A0 D4967920 80044750 D4BE47F0 D4F058E0 D1A4782E
90007020 D0C458E0 D1A8782E 90007020 C3C3C8C1 F0F0F1F8*
02E3E7E3 400004D8 40400038 40400001 D0C87800 D2047000 D0CC47F0
D4D67800 D2087000 D0C47800 D20C7000 D0C87800 D2047000 D0CC5800
D0AC1BFF 870FD4E4 47F0D768 50A0D0B8 C3C3C8C1 F0F0F1F9*
02E3E7E3 40000510 40400038 40400001 5800D060 5000D0AC 5AA0D064

MEMBER NAME CCHAIN
5800D1A8 1A0B5000 D1A85800 D1A41A0B 5000D1A4 1A3B1A4B 1A5B1A6B
1A7B59A0 D09847C0 D42E58B0 D1B458A0 C3C3C8C1 F0F0F2F0**
02E3E7E3 40000548 40400038 40400001 D0645800 D0AC1BFF 860FD530
47F0D768 5830D0BC 1B3A5030 D094193A 4750D6C8 7800D210 7000D1E0
5800D1B0 5000D184 5800D070 5000D17C C3C3C8C1 F0F0F2F1*
02E3E7E3 40000580 40400038 40400001 50B0D178 5800D080 5000D194
7800D1FC 7000D1D4 5800D1BC 5000D198 7800D200 7000D1D8 5800D1C0
5000D19C 5800D1C4 5000D1A4 1C2B5030 C3C3C8C1 F0F0F2F2*
02E3E7E3 400005B8 40400038 40400001 D1A85860 D1BC187B 5830D164
58B63000 185B5C40 D0805050 D1801825 5A20D1B0 7800D1E0 79029000
4770D6B8 18255A20 D1787842 90007B40 C3C3C8C1 F0F0F2F3*
02E3E7E3 400005F0 40400038 40400001 D1D43064 18255A20 D1BC7822
90007B20 D1D83022 7020D0A8 79608004 47A0D5F4 79208004 47A0D5F4
47F0D768 5820D180 5A20D1C0 78429000 C3C3C8C1 F0F0F2F4*
02E3E7E3 40000628 40400038 40400001 7B40D1D4 30645820 D1805A20
D1C47822 90007B20 D1D83022 7020D0A8 79608004 47A0D630 79208004
47A0D630 47F0D768 18275A20 D18458A2 C3C3C8C1 F0F0F2F5*
02E3E7E3 40000660 40400038 40400001 3000185A 5C40D194 5050D1A0
18255A20 D1787842 90007B40 D1D43064 18255A20 D1987822 90007B20
D1D83022 7020D0A8 79608004 47A0D67C C3C3C8C1 F0F0F2F6*
02E3E7E3 40000698 40400038 40400001 79208004 47A0D67C 47F0D768
5820D1A0 5A20D19C 78429000 7B40D1D4 30645820 D1A05A20 D1A47822
90007B20 D1D83022 7020D0A8 79608004 C3C3C8C1 F0F0F2F7*
02E3E7E3 400006D0 40400038 40400001 47A0D6B8 79208004 47A0D6B8
47F0D768 5A60D1B4 5A70D1B4 5970D1A8 47C0D59C 58B0D1B4 58A0D064

```
5830D0B8  5C20D080  5A30D070  4100D0E8  C3C3C8C1  F0F0F2F8*
02E3E7E3  40000708  40400038  40400001  5000D050  41039000  5000D054
9280D054  58F0D16C  4110D04C  05EF5850  D0C05C40  D0801825  5A20D070
41039000  5000D050  41029000  5000D054  C3C3C8C1  F0F0F2F9*
02E3E7E3  40000740  40400038  40400001  9280D054  58F0D16C  4110D04C
05EF4102  90005000  D0504100  D0E85000  D0549280  D05458F0  D16C4110
D04C05EF  5800D0C0  5000D0A0  7820D0C4  C3C3C8C1  F0F0F3F0**
02E3E7E3  40000778  40400038  40400001  7020D0DC  7820D0C8  7020D0E0
7820D0CC  7020D0E4  47F0D316  58B0D164  58A0D234  5880D064  7820D0DC
7020D0D0  7820D0E0  7020D0D4  58E0D23C  C3C3C8C1  F0F0F3F1*
02E3E7E3  400007B0  40400038  40400001  782E9000  7020D0DC  58E0D244
782E9000  7020D0E0  185A5C40  D0BC1825  5A20D230  5800D0A0  5002B000
185A5C40  D0BC1825  1A2A5800  D05C5002  C3C3C8C1  F0F0F3F2*
02E3E7E3  400007E8  40400038  40400001  B0007800  D0D07000  D2147800
D0D47000  D2185800  D1C45000  D1AC5830  D0A05C20  D0805030  D2205A30
D0705030  D22418A8  58B0D1B4  5880D160  C3C3C8C1  F0F0F3F3*
02E3E7E3  40000820  40400038  40400001  7840D214  7B40D0DC  30447820
D2187B20  D0E03022  7020D0A8  79408004  4730D87A  79208004  4730D87A
58B0D164  58A0D234  5880D064  185A5C40  C3C3C8C1  F0F0F3F4*
02E3E7E3  40000858  40400038  40400001  D0BC1825  5A20D230  5800D0A0
5002B000  185A5C40  D0BC1825  1A2A5800  D05C5002  B0005820  D0A01A28
5020D0A0  5920D098  47C0D86C  1BFF58E0  C3C3C8C1  F0F0F3F5*
02E3E7E3  40000890  40400038  40400001  D00007FE  5800D0BC  1A085000
D0BC47F0  D28A5800  D0585000  D0AC5820  D0A01A2A  5020D0C0  5920D098
47C0D898  47F0DCF6  7800D0E4  7000D1F8  C3C3C8C1  F0F0F3F6*
02E3E7E3  400008C8  40400038  40400001  5800D1B0  5000D17C  50B0D180
7800D0DC  7000D1E4  5800D1BC  5000D184  7800D0E0  7000D1E8  18725C60
D0801807  5A00D1B0  5000D190  18071A0B  C3C3C8C1  F0F0F3F7*
02E3E7E3  40000900  40400038  40400001  5000D194  18075A00  D1BC5000
D1981857  5A50D1C0  18475A40  D1C45050  D1A45040  D1A81834  18455850
D1985860  D1945870  D19018A2  58B0D080  C3C3C8C1  F0F0F3F8*
02E3E7E3  40000938  40400038  40400001  78279000  7020D1EC  7920D1F8
4770D9D2  78469000  7040D1F0  7B40D1E4  30647825  90007020  D1F47B20

MEMBER NAME  CCHAIN
D1E83022  7020D0A8  79608004  47A0D950  C3C3C8C1  F0F0F3F9*
02E3E7E3  40000970  40400038  40400001  79208004  4750D97C  78449000
7B40D1E4  30647823  90007B20  D1E83022  7020D0A8  79608004  47A0D978
79208004  4750D9A0  47F0D9D2  58E0D1A4  C3C3C8C1  F0F0F4F0**
02E3E7E3  400009A8  40400038  40400001  782E9000  7020D0C4  58E0D1A8
782E9000  7020D0C8  7800D1EC  7000D0CC  47F0D9B8  7800D1F0  7000D0C4
7800D1F4  7000D0C8  7800D1EC  7000D0CC  C3C3C8C1  F0F0F4F1*
02E3E7E3  400009E0  40400038  40400001  5800D0AC  1BFF870F  D9C647F0
DCF650A0  D0B85800  D0605000  D0AC5AA0  D0645800  D1A81A0B  5000D1A8
5800D1A4  1A0B5000  D1A41A3B  1A4B1A5B  C3C3C8C1  F0F0F4F2*
02E3E7E3  40000A18  40400038  40400001  1A6B1A7B  59A0D098  47C0D910
58B0D1B4  58A0D064  5800D0AC  1BFF860F  DA1247F0  DCF65830  D0BC1B3A
5030D094  193A4750  DBA27800  D1F87000  C3C3C8C1  F0F0F4F3*
02E3E7E3  40000A50  40400038  40400001  D1B85800  D1B05000  D1905800
D0705000  D17C50B0  D1785800  D0805000  D1987800  D1E47000  D1885800
D1BC5000  D19C7800  D1E87000  D18C5800  C3C3C8C1  F0F0F4F4*
02E3E7E3  40000A88  40400038  40400001  D1C05000  D1A01C2B  5030D1C8
5860D1BC  187B5830  D16458B6  3000185B  5C40D080  5050D184  18255A20
D1B07800  D1B87902  90004770  DB921825  C3C3C8C1  F0F0F4F5*
02E3E7E3  40000AC0  40400038  40400001  5A20D178  78429000  7B40D188
30641825  5A20D1BC  78229000  7B20D18C  30227020  D0A87960  800447A0
DACE7920  800447A0  DACE47F0  DCF65820  C3C3C8C1  F0F0F4F6*
02E3E7E3  40000AF8  40400038  40400001  D1845A20  D1C07842  90007B40
D1883064  5820D184  5A20D1C4  78229000  7B20D18C  30227020  D0A87960
```

```
800447A0  DB0A7920  800447A0  DB0A47F0  C3C3C8C1  F0F0F4F7*
02E3E7E3  40000B30  40400038  40400001  DCF61827  5A20D190  58A23000
185A5C40  D1985050  D1A81825  5A20D178  78429000  7B40D188  30641825
5A20D19C  78229000  7B20D18C  30227020  C3C3C8C1  F0F0F4F8*
02E3E7E3  40000B68  40400038  40400001  D0A87960  800447A0  DB567920
800447A0  DB5647F0  DCF65820  D1A85A20  D1A07842  90007B40  D1883064
5820D1A8  5A20D1AC  78229000  7B20D18C  C3C3C8C1  F0F0F4F9*
02E3E7E3  40000BA0  40400038  40400001  30227020  D0A87960  800447A0
DB927920  800447A0  DB9247F0  DCF65A60  D1B45A70  D1B45970  D1C847C0
DA7658B0  D1B458A0  D0645830  D0B85C20  C3C3C8C1  F0F0F5F0**
02E3E7E3  40000BD8  40400038  40400001  D0805A30  D0704100  D0E85000
D0504103  90005000  D0549280  D05458F0  D16C4110  D04C05EF  5850D0C0
5C40D080  18255A20  D0704103  90005000  C3C3C8C1  F0F0F5F1*
02E3E7E3  40000C10  40400038  40400001  D0504102  90005000  D0549280
D05458F0  D16C4110  D04C05EF  185B5C40  D0BC1825  5A20D070  58F0D164
5852F000  5830D0A0  5C20D080  5C40D080  C3C3C8C1  F0F0F5F2*
02E3E7E3  40000C48  40400038  40400001  5A30D070  18255A20  D07018A3
18B24100  D1205000  D050410B  90005000  D0549280  D05458F0  D16C4110
D04C05EF  410B9000  5000D050  4100D0E8  C3C3C8C1  F0F0F5F3*
02E3E7E3  40000C80  40400038  40400001  5000D054  9280D054  58F0D16C
4110D04C  05EF4100  D0E85000  D0504100  D1205000  D0549280  D05458F0
D16C4110  D04C05EF  5AB0D080  19BA47C0  C3C3C8C1  F0F0F5F4*
02E3E7E3  40000CB8  40400038  40400001  DC2E58B0  D1B458A0  D0645800
D0A01A0A  5000D0A0  5800D220  5A00D21C  5000D220  5820D224  5A20D21C
5020D224  41029000  5000D050  4100D0E8  C3C3C8C1  F0F0F5F5*
02E3E7E3  40000CF0  40400038  40400001  5000D054  9280D054  58F0D16C
4110D04C  05EF7820  D0C47020  D0DC7820  D0C87020  D0E07820  D0CC7020
D0E447F0  D7F858B0  D16458A0  D2345880  C3C3C8C1  F0F0F5F6*
02E3E7E3  40000D28  40400038  40400001  D064185A  5C40D0BC  18255A20
D2305800  D0A05002  B000185A  5C40D0BC  18251A2A  5800D05C  5002B000
5820D0A0  1A285020  D0A05920  D09847C0  C3C3C8C1  F0F0F5F7*
02E3E7E3  40000D60  40400038  40400001  DD421BFF  58E0D000  07FE5800
D0BC1A08  5000D0BC  47F0D28A  58A0D004  58E0A00C  58B0A018  5810B00C
5820D0BC  50201000  18DA92FF  A00C982C  C3C3C8C1  F0F0F5F8*

MEMBER NAME  CCHAIN
02E3E7E3  40000D98  40400038  40400001  A01C07FE  98791004  58207000
5020D098  58209000  5020D0BC  58201000  41302000  41500004  1B255C40
D07C1B25  5020D170  5030D174  58201008  C3C3C8C1  F0F0F5F9*
02E3E7E3  40000DD0  4040001C  40400001  41302000  41500004  1B255C40
D06C1B25  5020D164  5030D168  47F0D248  40404040  40404040  40404040
40404040  40404040  40404040  40404040  C3C3C8C1  F0F0F6F0**
02E3E7E3  40000020  4040000C  40400001  00000D9C  00000028  00000D78
40404040  40404040  40404040  40404040  40404040  40404040  40404040
40404040  40404040  40404040  40404040  C3C3C8C1  F0F0F6F1*
02E3E7E3  40000074  40400004  40400001  000000A8  40404040  40404040
40404040  40404040  40404040  40404040  40404040  40404040  40404040
40404040  40404040  40404040  40404040  C3C3C8C1  F0F0F6F2*
02E3E7E3  4000007C  40400004  40400001  80000000  40404040  40404040
40404040  40404040  40404040  40404040  40404040  40404040  40404040
40404040  40404040  40404040  40404040  C3C3C8C1  F0F0F6F3*
02E3E7E3  400001A0  40400038  40400001  00000000  00000000  00000000
00000000  00000000  00000000  00000000  00000000  00000000  00000000
00000000  00000000  00000000  00000000  C3C3C8C1  F0F0F6F4*
02E3E7E3  400001D8  40400038  40400001  00000008  0000000C  00000000
00000010  00000014  00000018  00000000  00000000  00000000  00000000
00000000  00000000  00000000  00000000  C3C3C8C1  F0F0F6F5*
02E3E7E3  40000210  40400038  40400001  00000000  00000000  00940007
00D80008  00000000  00A00009  012C0009  00A4000A  00A8000A  00AC000A
```

```
00B0000B  00B4000B  00B8000B  00F4000C  C3C3C8C1  F0F0F6F6*
02E3E7E3  40000248  40400028  40400001  00C0000C  00C4000C  00C8000D
00CC000D  00D0000D  00F0000E  0194000E  00DC000E  0124000F  0128000F
40404040  40404040  40404040  40404040  C3C3C8C1  F0F0F6F7*
02D9D3C4  40404040  40400030  40404040  00020001  0C000188  00030001
1C000194  00010001  0C000020  00010001  0C000024  00010001  0C000028
00010001  0C000074  40404040  40404040  C3C3C8C1  F0F0F6F8*
02C5D5C4  40404040  40404040  40404040  40404040  40404040  40404040
00000DEC  F1F5F7F3  F460C6D6  F34040F0  F2F0F2F8  F7F0F9F8  40F0F84B
F1F34BF2  F8404040  C3C3C8C1  C9D54040  C3C3C8C1  F0F0F6F9**

MEMBER NAME  CHAIN1
02C5E2C4  40404040  40400010  40400001  C3C8C1C9  D5F14040  00000000
40000000  40404040  40404040  40404040  40404040  40404040  40404040
40404040  40404040  40404040  40404040  C3C8C1C9  F0F0F0F1*
02E3E7E3  40000000  40400028  40400001  47F0F00C  07C3C8C1  C9D5F140
90ECD00C  184D98CD  F0205040  D00450D0  400807FC  40404040  40404040
40404040  40404040  40404040  40404040  C3C8C1C9  F0F0F0F2*
02E3E7E3  40000098  40400018  40400001  00000000  00000001  00000002
00000004  00000000  00000000  40404040  40404040  40404040  40404040
40404040  40404040  40404040  40404040  C3C8C1C9  F0F0F0F3*
02C5E2C4  40404040  40400010  40400002  D4E5C3C8  D9404040  02000000
40000000  40404040  40404040  40404040  40404040  40404040  40404040
40404040  40404040  40404040  40404040  C3C8C1C9  F0F0F0F4*
02E3E7E3  40000148  40400004  40400001  00000000  40404040  40404040
40404040  40404040  40404040  40404040  40404040  40404040  40404040
40404040  40404040  40404040  40404040  C3C8C1C9  F0F0F0F5*
02E3E7E3  40000150  40400008  40400001  00000000  00000000  40404040
40404040  40404040  40404040  40404040  40404040  40404040  40404040
40404040  40404040  40404040  40404040  C3C8C1C9  F0F0F0F6*
02E3E7E3  40000170  40400038  40400001  5890D120  58B0D12C  5880D074
5800D0B0  89000002  5000D0C8  5820D094  1A285020  D09C5830  D0981A38
5030D0A0  5840D0A8  1B485040  D0AC5850  C3C8C1C9  F0F0F0F7*
02E3E7E3  400001A8  40400038  40400001  D0988950  00025870  D0B08970
00021C68  1A577805  B0007000  D0BC8930  00025030  D1445870  D0B08970
00021C68  18531A57  7805B000  7000D0C0  C3C8C1C9  F0F0F0F8*
02E3E7E3  400001E0  40400038  40400001  5850D094  89500002  5870D0B0
89700002  1C681A57  7825B000  70209004  89200002  5020D140  5870D0B0
89700002  1C681852  1A577825  B0007020  C3C8C1C9  F0F0F0F9*
02E3E7E3  40000218  40400038  40400001  90081244  4780D4E2  5080D088
18631872  58A0D07C  5820D088  1A285020  D08C5020  D09018A2  78409004
5820D094  89200002  5850D0B0  89500002  C3C8C1C9  F0F0F1F0**
02E3E7E3  40000250  40400038  40400001  1C4A1A25  38247B22  B0003062
7960D0B8  4730D32E  78209008  5850D0B0  89500002  1C4A1825  1A277B22
B0003062  7960D0B8  4730D32E  50A0D090  C3C8C1C9  F0F0F1F1*
02E3E7E3  40000288  40400038  40400001  58A0D07C  5820D098  89200002
5850D0B0  89500002  5C40D090  1A257822  B0007020  90045850  D0B08950
00025C40  D0901825  1A267822  B0007020  C3C8C1C9  F0F0F1F2*
02E3E7E3  400002C0  40400038  40400001  90085800  D0905900  D08C4780
D4565850  D0B08950  00025C40  D08C1825  1A2A4102  B0005000  D0549280
D05458F0  D1284110  D04C05EF  5830D0B0  C3C8C1C9  F0F0F1F3*
02E3E7E3  400002F8  40400038  40400001  89300002  5C20D08C  1A3A5850
D0B08950  00025C40  D0901825  1A2A4103  B0005000  D05C4102  B0005000
D0609280  D06058F0  D1284110  D05805EF  C3C8C1C9  F0F0F1F4*
02E3E7E3  40000330  40400038  40400001  5850D0B0  89500002  5C40D090
18251A2A  4102B000  5000D068  58F0D128  4110D064  05EF47F0  D4565820
D0988920  00025850  D0B08950  00021C4A  C3C8C1C9  F0F0F1F5*
02E3E7E3  40000368  40400038  40400001  1A253824  7B22B000  30627960
D0B84730  D4447820  90085850  D0B08950  00021C4A  18251A26  7B22B000
```

```
30627960  D0B84730  D44450A0  D09058A0  C3C8C1C9  F0F0F1F6*
02E3E7E3  400003A0  40400038  40400001  D07C5820  D0948920  00025850
D0B08950  00025C40  D0901A25  7822B000  70209004  5850D0B0  89500002
5C40D090  18251A27  7822B000  70209008  C3C8C1C9  F0F0F1F7*
02E3E7E3  400003D8  40400038  40400001  5800D090  5900D08C  4780D456
5850D0B0  89500002  5C40D08C  18251A2A  4102B000  5000D054  9280D054
58F0D128  4110D04C  05EF5830  D0B08930  C3C8C1C9  F0F0F1F8*
02E3E7E3  40000410  40400038  40400001  00025C20  D08C1A3A  5850D0B0
89500002  5C40D090  18251A2A  4103B000  5000D05C  4102B000  5000D060
9280D060  58F0D128  4110D058  05EF5850  C3C8C1C9  F0F0F1F9*
02E3E7E3  40000448  40400038  40400001  D0B08950  00025C40  D0901825

MEMBER NAME  CHAIN1
1A2A4102  B0005000  D06858F0  D1284110  D06405EF  47F0D456  1AA859A0
D0A847C0  D21450A0  D09047F0  D4C27820  C3C8C1C9  F0F0F2F0**
02E3E7E3  40000480  40400038  40400001  90047B20  D0BC3022  7920D0B8
4730D47E  78209008  7B20D0C0  30227920  D0B84730  D47E47F0  D4B25800
D08C5000  D0885900  D0AC47C0  D2047820  C3C8C1C9  F0F0F2F1*
02E3E7E3  400004B8  40400038  40400001  90047B20  D0BC3022  7920D0B8
4730D4D0  78209008  7B20D0C0  30227920  D0B84730  D4D05800  D08C5000
D0B41BFF  58E0D000  07FE5800  D08C1B08  C3C8C1C9  F0F0F2F2*
02E3E7E3  400004F0  40400038  40400001  5000D0B4  47F0D4D8  5800D08C
5000D0B4  41F00004  58E0D000  07FE5080  D0B441F0  000458E0  D00007FE
58A0D004  58E0A00C  58B0A018  5810B00C  C3C8C1C9  F0F0F2F3*
02E3E7E3  40000528  40400038  40400001  5820D0B4  50201000  5830B010
5840D094  50403000  5850B014  5860D098  50605000  18DA92FF  A00C982C
A01C07FE  987B1004  58207000  5020D0B0  C3C8C1C9  F0F0F2F4*
02E3E7E3  40000560  40400038  40400001  58208000  5020D0A8  58209000
5020D0B4  5820A000  5020D094  5820B000  5020D098  98781018  78207000
7020D0B8  58201000  41302000  41500004  C3C8C1C9  F0F0F2F5*
02E3E7E3  40000598  4040002A  40400001  1B255C40  D0B01B25  5020D12C
5030D130  5820101C  41302000  41500004  1B255020  D1205030  D12447F0
D1484040  40404040  40404040  40404040  C3C8C1C9  F0F0F2F6*
02E3E7E3  40000020  4040000C  40400001  00000554  00000028  00000518
40404040  40404040  40404040  40404040  40404040  40404040  40404040
40404040  40404040  40404040  40404040  C3C8C1C9  F0F0F2F7*
02E3E7E3  40000074  40400010  40400001  000000F0  000000F4  80000000
000000F0  40404040  40404040  40404040  40404040  40404040  40404040
40404040  40404040  40404040  40404040  C3C8C1C9  F0F0F2F8*
02E3E7E3  40000088  40400008  40400001  80000000  000000F0  40404040
40404040  40404040  40404040  40404040  40404040  40404040  40404040
40404040  40404040  40404040  40404040  C3C8C1C9  F0F0F2F9*
02D9D3C4  40404040  40400038  40404040  00020001  1C000150  00010001
0C000020  00010001  0C000024  00010001  0C000028  00010001  0C000074
00010001  0C000078  00010001  0C000080  C3C8C1C9  F0F0F3F0**
02E3E7E3  40000094  40400004  40400001  800000F4  40404040  40404040
40404040  40404040  40404040  40404040  40404040  40404040  40404040
40404040  40404040  40404040  40404040  C3C8C1C9  F0F0F3F1*
02E3E7E3  4000015C  40400014  40400001  00000000  00000000  00000000
00000000  00000000  40404040  40404040  40404040  40404040  40404040
40404040  40404040  40404040  40404040  C3C8C1C9  F0F0F3F2*
02D9D3C4  40404040  40400010  40404040  00010001  0C00008C  00010001
0C000094  40404040  40404040  40404040  40404040  40404040  40404040
40404040  40404040  40404040  40404040  C3C8C1C9  F0F0F3F3*
02C5D5C4  40404040  40404040  40404040  40404040  40404040  40404040
000005C2  F1F5F7F3  F460C6D6  F34040F0  F2F0F2F8  F7F0F9F8  40F0F84B
F1F34BF3  F4404040  C3C8C1C9  D5F14040  C3C8C1C9  F0F0F3F4**

MEMBER NAME  CHECK
```

```
02C5E2C4  40404040  40400010  40400001  C3C8C5C3  D2404040  00000000
40000000  40404040  40404040  40404040  40404040  40404040  40404040
40404040  40404040  40404040  40404040  C3C8C5C3  F0F0F0F1*
02E3E7E3  40000000  40400028  40400001  47F0F00C  07C3C8C5  C3D24040
90ECD00C  184D98CD  F0205040  D00450D0  400807FC  40404040  40404040
40404040  40404040  40404040  40404040  C3C8C5C3  F0F0F0F2*
02C5E2C4  40404040  40400010  40400002  E3D6D3C5  D9404040  05000000
4000000C  40404040  40404040  40404040  40404040  40404040  40404040
40404040  40404040  40404040  40404040  C3C8C5C3  F0F0F0F3*
02E3E7E3  40000078  40400020  40400001  00000000  00000001  00000003
00000004  00000005  00000006  00000000  00000000  40404040  40404040
40404040  40404040  40404040  40404040  C3C8C5C3  F0F0F0F4*
02E3E7E3  400000A8  40400008  40400001  00000000  00000000  40404040
40404040  40404040  40404040  40404040  40404040  40404040  40404040
40404040  40404040  40404040  40404040  C3C8C5C3  F0F0F0F5*
02E3E7E3  400000B4  40400004  40400001  00000000  40404040  40404040
40404040  40404040  40404040  40404040  40404040  40404040  40404040
40404040  40404040  40404040  40404040  C3C8C5C3  F0F0F0F6*
02E3E7E3  400000C8  40400038  40400001  58A0D08C  58B0D084  58F0D080
7840F004  5890D050  5880D054  5090D070  7820A00C  7020D094  33227A20
B00C3062  39644730  D0E27820  B0107B20  C3C8C5C3  F0F0F0F7*
02E3E7E3  40000100  40400038  40400001  A0103062  396447C0  D15C7820
B0147020  D0987B20  D0943062  39644730  D1067820  B0187B20  A0103062
396447C0  D15C7820  A0147020  D09C3322  C3C8C5C3  F0F0F0F8*
02E3E7E3  40000138  40400038  40400001  7A20D098  30623964  4730D12C
7820B018  7B20A018  30623964  47C0D15C  7820B00C  7B20D09C  30623964
47C0D144  1BFF58E0  D00007FE  7820B010  C3C8C5C3  F0F0F0F9*
02E3E7E3  40000170  40400038  40400001  7B20A018  30623964  47C0D15C
1BFF58E0  D00007FE  5080D070  1BFF58E0  D00007FE  58A0D004  58E0A00C
58B0A018  5810B008  5820D070  50201000  C3C8C5C3  F0F0F1F0**
02E3E7E3  400001A8  40400038  40400001  18DA92FF  A00C982C  A01C07FE
58701008  58207000  5020D070  58201000  41302000  41500004  1B255020
D0845030  D0885820  10044130  20004150  C3C8C5C3  F0F0F1F1*
02E3E7E3  400001E0  40400010  40400001  00041B25  5020D08C  5030D090
47F0D0A0  40404040  40404040  40404040  40404040  40404040  40404040
40404040  40404040  40404040  40404040  C3C8C5C3  F0F0F1F2*
02E3E7E3  40000020  4040000C  40400001  000001B4  00000028  00000190
40404040  40404040  40404040  40404040  40404040  40404040  40404040
40404040  40404040  40404040  40404040  C3C8C5C3  F0F0F1F3*
02E3E7E3  400000BC  4040000C  40400001  00000000  00000000  00000000
40404040  40404040  40404040  40404040  40404040  40404040  40404040
40404040  40404040  40404040  40404040  C3C8C5C3  F0F0F1F4*
02D9D3C4  40404040  40400020  40404040  00020001  0C0000A8  00010001
0C000020  00010001  0C000024  00010001  0C000028  40404040  40404040
40404040  40404040  40404040  40404040  C3C8C5C3  F0F0F1F5*
02C5D5C4  40404040  40404040  40404040  40404040  40404040  40404040
000001F0  F1F5F7F3  F460C6D6  F34040F0  F2F0F2F8  F7F0F9F8  40F0F84B
F1F34BF3  F9404040  C3C8C5C3  D2404040  C3C8C5C3  F0F0F1F6**

MEMBER NAME  CHGMOD
02C5E2C4  40404040  40400010  40400001  C3C8C7D4  D6C44040  00000000
40000000  40404040  40404040  40404040  40404040  40404040  40404040
40404040  40404040  40404040  40404040  C3C8C7D4  F0F0F0F1*
02E3E7E3  40000000  40400038  40400001  47F0F00C  07C3C8C7  D4D6C440
90ECD00C  184D98CD  F0205040  D00450D0  400807FC  40404040  40404040
021A0FD9  C5C6C9D3  C540C5D9  D9D6D940  C3C8C7D4  F0F0F0F2*
02E3E7E3  40000038  40400011  40400001  7E401003  1A0A40C9  D540C3C8
C7D4D6C4  22404040  40404040  40404040  40404040  40404040  40404040
40404040  40404040  40404040  40404040  C3C8C7D4  F0F0F0F3*
```

```
02C5E2C4  40404040  40400010  40400002  D6D7E3C9  D6D54040  05000000
40000020  40404040  40404040  40404040  40404040  40404040  40404040
40404040  40404040  40404040  40404040  C3C8C7D4  F0F0F0F4*
02E3E7E3  40000100  4040001C  40400001  00000001  00000002  00000004
00000008  00000080  00000000  00000000  40404040  40404040  40404040
40404040  40404040  40404040  40404040  C3C8C7D4  F0F0F0F5*
02C5E2C4  40404040  40400010  40400003  C7D9E4D7  40404040  05000000
4000000C  40404040  40404040  40404040  40404040  40404040  40404040
40404040  40404040  40404040  40404040  C3C8C7D4  F0F0F0F6*
02C5E2C4  40404040  40400010  40400004  C3C1C4E2  E3404040  02000000
40000000  40404040  40404040  40404040  40404040  40404040  40404040
40404040  40404040  40404040  40404040  C3C8C7D4  F0F0F0F7*
02C5E2C4  40404040  40400010  40400005  D4E5C3C8  D9404040  02000000
40000000  40404040  40404040  40404040  40404040  40404040  40404040
40404040  40404040  40404040  40404040  C3C8C7D4  F0F0F0F8*
02C5E2C4  40404040  40400010  40400006  C3C1C4C6  C9D34040  02000000
40000000  40404040  40404040  40404040  40404040  40404040  40404040
40404040  40404040  40404040  40404040  C3C8C7D4  F0F0F0F9*
02C5E2C4  40404040  40400010  40400007  C3C1C4D5  E2C84040  02000000
40000000  40404040  40404040  40404040  40404040  40404040  40404040
40404040  40404040  40404040  40404040  C3C8C7D4  F0F0F1F0**
02C5E2C4  40404040  40400010  40400008  C9C2C3D6  D47B4040  02000000
40000000  40404040  40404040  40404040  40404040  40404040  40404040
40404040  40404040  40404040  40404040  C3C8C7D4  F0F0F1F1*
02C5E2C4  40404040  40400010  40400009  D4D6C4E2  D9E34040  02000000
40000000  40404040  40404040  40404040  40404040  40404040  40404040
40404040  40404040  40404040  40404040  C3C8C7D4  F0F0F1F2*
02E3E7E3  40000168  40400020  40400001  00000000  00000000  00000000
00000000  00000000  00000000  00000000  00000000  40404040  40404040
40404040  40404040  40404040  40404040  C3C8C7D4  F0F0F1F3*
02D9D3C4  40404040  40400038  40404040  00020001  0C000168  00030001
0C00016C  00040001  1C000170  00050001  1C000174  00060001  1C000178
00070001  1C00017C  00080001  1C000180  C3C8C7D4  F0F0F1F4*
02E3E7E3  40000188  40400038  40400001  58B0D11C  58A0D0B0  5890D0C4
59A0D0CC  4780D17A  50A0D0EC  58F0D118  5800F008  8609D166  58F0D128
4110D054  05EF5800  D0EC5900  D0B84780  C3C8C7D4  F0F0F1F5*
02E3E7E3  400001C0  40400038  40400001  D14C59A0  D0EC4770  D1E258F0
D1344110  D06005EF  58F0D124  4110D080  05EF4100  D1085000  D0904100
B0045000  D0949280  D09458F0  D1244110  C3C8C7D4  F0F0F1F6*
02E3E7E3  400001F8  40400038  40400001  D08C05EF  58F0D120  4110D098
05EF58F0  D12C4110  D0A405EF  41E00004  15FE4720  D1D058EF  D04C07FE
5800D0CC  1A0A5000  D0CC1BFF  58E0D000  C3C8C7D4  F0F0F1F7*
02E3E7E3  40000230  40400038  40400001  07FE58F0  D1301800  45E0F004
00000006  00000028  45E0F008  0450D0EC  45E0F010  58F0D130  45E0F034
05404040  F1F158A0  D00458E0  A00C58B0  C3C8C7D4  F0F0F1F8*
02E3E7E3  40000268  4040002A  40400001  A0185810  B0005820  D0CC5020
100018DA  92FFA00C  982CA01C  07FE5870  10005820  70005020  D0CC47F0
D1384040  40404040  40404040  40404040  C3C8C7D4  F0F0F1F9*
02E3E7E3  40000020  40400008  40400001  00000282  00000050  40404040

MEMBER NAME   CHGMOD
40404040  40404040  40404040  40404040  40404040  40404040  40404040
40404040  40404040  40404040  40404040  C3C8C7D4  F0F0F2F0**
02E3E7E3  40000050  40400004  40400001  0000025E  40404040  40404040
40404040  40404040  40404040  40404040  40404040  40404040  40404040
40404040  40404040  40404040  40404040  C3C8C7D4  F0F0F2F1*
02E3E7E3  4000009C  4040000C  40400001  00000220  00000220  00000104
40404040  40404040  40404040  40404040  40404040  40404040  40404040
40404040  40404040  40404040  40404040  C3C8C7D4  F0F0F2F2*
```

```
02D9D3C4  40404040  40400038  40404040  00090001  1C000184  00010001
0C000240  00010001  0C000020  00010001  0C000024  00010001  0C000050
00010001  0C00009C  00010001  0C0000A0  C3C8C7D4  F0F0F2F3*
02E3E7E3  400000A8  4040001C  40400001  0000013C  80000134  00000108
0000011C  00000128  00000120  0000012C  40404040  40404040  40404040
40404040  40404040  40404040  40404040  C3C8C7D4  F0F0F2F4*
02D9D3C4  40404040  40400038  40404040  00010001  0C0000A4  00010001
0C0000A8  00010001  0C0000AC  00010001  0C0000B0  00010001  0C0000B4
00010001  0C0000B8  00010001  0C0000BC  C3C8C7D4  F0F0F2F5*
02E3E7E3  400000C4  4040001C  40400001  00000138  00000140  80000142
00000108  00000124  80000000  0000010C  40404040  40404040  40404040
40404040  40404040  40404040  40404040  C3C8C7D4  F0F0F2F6*
02D9D3C4  40404040  40400038  40404040  00010001  0C0000C0  00010001
0C0000C4  00010001  0C0000C8  00010001  0C0000CC  00010001  0C0000D0
00010001  0C0000D4  00030001  0C0000D8  C3C8C7D4  F0F0F2F7*
02E3E7E3  400000E4  40400018  40400001  80000000  00000142  00000158
80000000  00000110  80000110  40404040  40404040  40404040  40404040
40404040  40404040  40404040  40404040  C3C8C7D4  F0F0F2F8*
02D9D3C4  40404040  40400030  40404040  00010001  0C0000DC  00010001
0C0000E8  00010001  0C0000EC  00030001  0C0000F0  00010001  0C0000F4
00010001  0C0000F8  40404040  40404040  C3C8C7D4  F0F0F2F9*
02C5D5C4  40404040  40404040  40404040  40404040  40404040  40404040
00000292  F1F5F7F3  F460C6D6  F34040F0  F2F0F2F8  F7F0F9F8  40F0F84B
F1F34BF4  F3404040  C3C8C7D4  D6C44040  C3C8C7D4  F0F0F3F0**

MEMBER NAME  CHORDY
02C5E2C4  40404040  40400010  40400001  C3C8D6D9  C4E84040  00000000
40000000  40404040  40404040  40404040  40404040  40404040  40404040
40404040  40404040  40404040  40404040  C3C8D6D9  F0F0F0F1*
02E3E7E3  40000000  40400028  40400001  47F0F00C  07C3C8D6  D9C4E840
90ECD00C  184D98CD  F0205040  D00450D0  400807FC  40404040  40404040
40404040  40404040  40404040  40404040  C3C8D6D9  F0F0F0F2*
02C5E2C4  40404040  40400010  40400002  C4E2D8D9  E3404040  02000000
40000000  40404040  40404040  40404040  40404040  40404040  40404040
40404040  40404040  40404040  40404040  C3C8D6D9  F0F0F0F3*
02E3E7E3  40000078  40400018  40400001  00000001  00000002  00000003
00000004  00000000  00000000  40404040  40404040  40404040  40404040
40404040  40404040  40404040  40404040  C3C8D6D9  F0F0F0F4*
02E3E7E3  400000B8  40400008  40400001  00000000  00000000  40404040
40404040  40404040  40404040  40404040  40404040  40404040  40404040
40404040  40404040  40404040  40404040  C3C8D6D9  F0F0F0F5*
02E3E7E3  400000D4  40400038  40400001  58B0D094  6820B018  6B20B008
6020D070  6840B020  6B40B010  6040D078  28042D02  6000D088  2C222C44
2A246020  D0A058F0  D0904110  D04C05EF  C3C8D6D9  F0F0F0F6*
02E3E7E3  4000010C  40400038  40400001  6000D080  1BFF58E0  D00007FE
58A0D004  58E0A00C  58B0A018  5810B004  6820D088  60201000  5820B008
6840D080  60402000  18DA92FF  A00C982C  C3C8D6D9  F0F0F0F7*
02E3E7E3  40000144  40400032  40400001  A01C07FE  98781004  68207000
6020D088  68208000  6020D080  58201000  41302000  41500008  1B255020
D0945030  D09847F0  D0AC4040  40404040  C3C8D6D9  F0F0F0F8*
02E3E7E3  40000020  4040000C  40400001  00000148  00000028  00000118
40404040  40404040  40404040  40404040  40404040  40404040  40404040
40404040  40404040  40404040  40404040  C3C8D6D9  F0F0F0F9*
02E3E7E3  40000074  40400004  40400001  800000C8  40404040  40404040
40404040  40404040  40404040  40404040  40404040  40404040  40404040
40404040  40404040  40404040  40404040  C3C8D6D9  F0F0F1F0**
02E3E7E3  400000C4  40400010  40400001  00000000  00000000  00000000
00000000  40404040  40404040  40404040  40404040  40404040  40404040
40404040  40404040  40404040  40404040  C3C8D6D9  F0F0F1F1*
```

```
02D9D3C4  40404040  40400028  40404040  00020001  1C0000B8  00010001
0C000020  00010001  0C000024  00010001  0C000028  00010001  0C000074
40404040  40404040  40404040  40404040  C3C8D6D9  F0F0F1F2*
02C5D5C4  40404040  40404040  40404040  40404040  40404040  40404040
00000176  F1F5F7F3  F460C6D6  F34040F0  F2F0F2F8  F7F0F9F8  40F0F84B
F1F34BF4  F7404040  C3C8D6D9  C4E84040  C3C8D6D9  F0F0F1F3**

MEMBER NAME  CONSTR
02C5E2C4  40404040  40400010  40400001  C3D6D5E2  E3D94040  00000000
40000000  40404040  40404040  40404040  40404040  40404040  40404040
40404040  40404040  40404040  40404040  C3D6D5E2  F0F0F0F1*
02E3E7E3  40000000  40400028  40400001  47F0F00C  07C3D6D5  E2E3D940
90ECD00C  184D98CD  F0205040  D00450D0  400807FC  40404040  40404040
40404040  40404040  40404040  40404040  C3D6D5E2  F0F0F0F2*
02E3E7E3  400000D8  40400038  40400001  00000000  00000000  37119799
812DEA11  3D68DB8B  AC710CB3  41100000  00000000  41200000  00000000
41300000  00000000  00000000  00000001  C3D6D5E2  F0F0F0F3*
02C5E2C4  40404040  40400010  40400002  D7D4C1E3  D3404040  05000000
40001134  40404040  40404040  40404040  40404040  40404040  40404040
40404040  40404040  40404040  40404040  C3D6D5E2  F0F0F0F4*
02E3E7E3  40000110  40400038  40400001  00000002  00000003  00000004
00000005  00000006  00000007  00000008  00000009  0000000A  0000000B
00000018  00000058  00000000  00000000  C3D6D5E2  F0F0F0F5*
02E3E7E3  400002C0  4040000C  40400001  FFFFFFA0  00001130  00000000
40404040  40404040  40404040  40404040  40404040  40404040  40404040
40404040  40404040  40404040  40404040  C3D6D5E2  F0F0F0F6*
02E3E7E3  400002D0  40400004  40400001  00000000  40404040  40404040
40404040  40404040  40404040  40404040  40404040  40404040  40404040
40404040  40404040  40404040  40404040  C3D6D5E2  F0F0F0F7*
02E3E7E3  400002D8  40400004  40400001  00000000  40404040  40404040
40404040  40404040  40404040  40404040  40404040  40404040  40404040
40404040  40404040  40404040  40404040  C3D6D5E2  F0F0F0F8*
02E3E7E3  400002E0  40400004  40400001  00000000  40404040  40404040
40404040  40404040  40404040  40404040  40404040  40404040  40404040
40404040  40404040  40404040  40404040  C3D6D5E2  F0F0F0F9*
02E3E7E3  400002E8  40400004  40400001  00000000  40404040  40404040
40404040  40404040  40404040  40404040  40404040  40404040  40404040
40404040  40404040  40404040  40404040  C3D6D5E2  F0F0F1F0**
02E3E7E3  400002F0  40400004  40400001  00000000  40404040  40404040
40404040  40404040  40404040  40404040  40404040  40404040  40404040
40404040  40404040  40404040  40404040  C3D6D5E2  F0F0F1F1*
02E3E7E3  400002F8  40400004  40400001  00000000  40404040  40404040
40404040  40404040  40404040  40404040  40404040  40404040  40404040
40404040  40404040  40404040  40404040  C3D6D5E2  F0F0F1F2*
02C5E2C4  40404040  40400010  40400003  C4C3D6E2  40404040  02000000
40000000  40404040  40404040  40404040  40404040  40404040  40404040
40404040  40404040  40404040  40404040  C3D6D5E2  F0F0F1F3*
02E3E7E3  40000300  40400004  40400001  00000000  40404040  40404040
40404040  40404040  40404040  40404040  40404040  40404040  40404040
40404040  40404040  40404040  40404040  C3D6D5E2  F0F0F1F4*
02C5E2C4  40404040  40400010  40400004  C4E2C9D5  40404040  02000000
40000000  40404040  40404040  40404040  40404040  40404040  40404040
40404040  40404040  40404040  40404040  C3D6D5E2  F0F0F1F5*
02E3E7E3  40000308  4040000C  40400001  00000000  00000000  00000000
40404040  40404040  40404040  40404040  40404040  40404040  40404040
40404040  40404040  40404040  40404040  C3D6D5E2  F0F0F1F6*
02C5E2C4  40404040  40400010  40400005  C8C4C7C5  D3C54040  02000000
40000000  40404040  40404040  40404040  40404040  40404040  40404040
40404040  40404040  40404040  40404040  C3D6D5E2  F0F0F1F7*
```

02E3E7E3 40000318 40400004 40400001 00000000 40404040 40404040
40404040 40404040 40404040 40404040 40404040 40404040 40404040
40404040 40404040 40404040 40404040 C3D6D5E2 F0F0F1F8*
02E3E7E3 40000320 40400004 40400001 00000000 40404040 40404040
40404040 40404040 40404040 40404040 40404040 40404040 40404040
40404040 40404040 40404040 40404040 C3D6D5E2 F0F0F1F9*
02E3E7E3 400001A0 40400008 40400001 42394BB8 348F53C5 40404040

MEMBER NAME CONSTR
40404040 40404040 40404040 40404040 40404040 40404040 40404040
40404040 40404040 40404040 40404040 C3D6D5E2 F0F0F2F0**
02E3E7E3 400003D4 40400038 40400001 58B0D100 58A0D0E4 6800D0B0
6000D190 182A5830 D0F05850 D1145860 D0F01873 188A18B2 58A0D298
5890D2E8 18355C27 90006800 D1906A03 C3D6D5E2 F0F0F2F1*
02E3E7E3 4000040C 40400038 40400001 A0586000 D1901AB8 1A7659B0
D14C47C0 D3D858B0 D10058A0 D0E46820 D1906D20 D0D02322 6020D188
50A0D120 5800D110 5000D30C 50B0D318 C3D6D5E2 F0F0F2F2*
02E3E7E3 40000444 40400038 40400001 185B5860 D11058B0 D0EC6860
D0B05890 D2C05880 D2C85870 D2D05840 D2A858E0 D318606E 9000606E
8000606E 700059B0 D1204100 00014780 C3D6D5E2 F0F0F2F3*
02E3E7E3 4000047C 40400038 40400001 D4581B00 5000D304 18365A30
D3181826 5A20D318 187A1883 18925850 D2A05830 D2B0197B 41200001
4780D482 1B225620 D3041BFF 862FD494 C3D6D5E2 F0F0F2F4*
02E3E7E3 400004B4 40400038 40400001 58F0D2B8 6068F000 60695000
60694000 60693000 1A961A86 877AD476 5870D2D0 5880D2C8 5890D2C0
5850D100 5800D318 1A055000 D3185820 C3D6D5E2 F0F0F2F5*
02E3E7E3 400004EC 40400038 40400001 D1201A2A 5020D120 192B47C0
D43A58B0 D1006800 D0B06000 D17050A0 D12C5800 D0F05000 D38C50B0
D390188A 5890D110 18AB58B0 D2986800 C3D6D5E2 F0F0F2F6*
02E3E7E3 40000524 40400038 40400001 D0B06000 D1F06800 D0B06000
D1F86800 D0B06000 D1D06800 D0B06000 D1E858E0 D38C58F0 D2E8583E
F0005030 D1305C20 D1145030 D3746823 C3D6D5E2 F0F0F2F7*
02E3E7E3 4000055C 40400038 40400001 B0206020 D2006843 B0186040
D3982C44 6863B010 2C466823 B0082D42 23446A40 D0C82D24 6020D1C0
28262D24 6020D1E0 6820D398 2C262D24 C3D6D5E2 F0F0F2F8*
02E3E7E3 40000594 40400038 40400001 6020D1C8 6020D1D8 58E0D390
58F0D2F0 680EF000 6D00D178 6000D150 58F0D2E0 4110D04C 05EF6000
D3986000 D15858F0 D2E44110 D04C05EF C3D6D5E2 F0F0F2F9*
02E3E7E3 400005CC 40400038 40400001 6000D3A0 6000D160 6820D398
2C226020 D3206020 D2506020 D2706840 D3A02C44 6040D328 6040D268
6040D258 6860D398 6C60D3A0 6060D280 C3D6D5E2 F0F0F3F0**
02E3E7E3 40000604 40400038 40400001 23066000 D2886860 D2886C60
D0D06060 D2606860 D2806C60 D0D06060 D2782B24 6020D290 50A0D31C
18696860 D0B05800 D31C1A06 5000D35C C3D6D5E2 F0F0F3F1*
02E3E7E3 4000063C 40400038 40400001 18065A00 D31C5000 D3641856
5880D31C 5890D358 58E0D364 606ED1E8 18751A78 18B51AB6 183A1A35
5880D35C 18936828 D1A06C29 D2306A27 C3D6D5E2 F0F0F3F2*
02E3E7E3 40000674 40400038 40400001 D1E86027 D1E81A86 879AD642
5890D358 5880D31C 5800D364 1A065000 D3641A56 195947C0 D6285820
D31C1A2A 5020D31C 192647C0 D60A58B0 C3D6D5E2 F0F0F3F3*
02E3E7E3 400006AC 40400038 40400001 D2985890 D1105880 D0E450A0
D3105090 D3005890 D35858B0 D1106860 D0B05800 D3001A0A 5000D314
182B5A20 D310183B 184B1852 18895890 C3D6D5E2 F0F0F3F4*
02E3E7E3 400006E4 40400038 40400001 D3106065 D1A01873 1A791863
5880D314 189A18B4 6828D230 18291A26 6C22D1E8 6A27D1A0 6027D1A0
1A8A879A D6D05890 D3105880 D3581A54 C3D6D5E2 F0F0F3F5*
02E3E7E3 4000071C 40400038 40400001 1A341938 47C0D6BE 5890D358
5800D310 1A0A5000 D3105820 D3001A2B 5020D300 192947C0 D6A258B0
D2985890 D1105880 D0E458E0 D374682E C3D6D5E2 F0F0F3F6*

02E3E7E3 40000754 40400038 40400001 B0282862 6C60D158 6C60D158
684EB030 28046C00 D1606C00 D1602A60 6060D208 28622B64 6C60D160
6C60D158 6060D210 6060D220 6C20D160 C3D6D5E2 F0F0F3F7*
02E3E7E3 4000078C 40400038 40400001 6C20D160 6C40D158 6C40D158
2A246020 D228682E B0406020 D3986C20 D1586C20 D158686E B0482846
6C40D160 28046C00 D1602A20 6020D250 C3D6D5E2 F0F0F3F8*
02E3E7E3 400007C4 40400038 40400001 6820D398 6C20D160 28026C00
D1606000 D3982806 6C00D158 6C00D158 6860D398 2A606060 D2586C20

MEMBER NAME CONSTR
D1586C40 D1582B24 6C20D0D0 6020D260 C3D6D5E2 F0F0F3F9*
02E3E7E3 400007FC 40400038 40400001 6820D1C0 6C20D250 6840D1D8
6C40D258 2A246840 D1F06C40 D2602A24 6020D268 6820D1C8 6C20D250
6840D1E0 6C40D258 2A246840 D1F86C40 C3D6D5E2 F0F0F4F0**
02E3E7E3 40000834 40400038 40400001 D2602A24 6020D270 6820D1D0
6C20D250 6840D1E8 6C40D258 2A246840 D2006C40 D2602A24 6020D278
58E0D374 684EB058 6820D188 2A246020 C3D6D5E2 F0F0F4F1*
02E3E7E3 4000086C 40400038 40400001 D1882344 2A426040 D1805080
D1202802 2B046000 D3682862 2C622804 2C046000 D3982300 2A066000
D3782C62 6060D3A0 6800D398 2C046820 C3D6D5E2 F0F0F4F2*
02E3E7E3 400008A4 40400038 40400001 D3A02B20 6020D380 6800D368
6000D338 28606000 D3406840 D3786040 D3486020 D3505090 D30C50A0
D318185A 186918A8 58B0D0EC 5890D2C0 C3D6D5E2 F0F0F4F3*
02E3E7E3 400008DC 40400038 40400001 5880D2C8 5870D2D0 5840D2B0
58E0D318 682ED260 28426C40 D3686A4E 9000604E 90002842 6C40D378
6D40D0D0 6A4E8000 604E8000 6C20D380 C3D6D5E2 F0F0F4F4*
02E3E7E3 40000914 40400038 40400001 6D20D0D8 6A2E7000 602E7000
59B0D120 41000001 4780D906 1B005000 D3041836 5A30D318 18265A20
D318187A 18831892 5860D2A0 5850D2A8 C3D6D5E2 F0F0F4F5*
02E3E7E3 4000094C 40400038 40400001 5830D2B8 197B4120 00014780
D9341B22 5620D304 1BFF862F D94E6828 D1E86C20 D3386A28 30006028
30006869 D1A02846 6C40D340 6A496000 C3D6D5E2 F0F0F4F6*
02E3E7E3 40000984 40400038 40400001 60496000 28466C40 D3486D40
D0D06A49 50006049 50002826 6C20D350 6D20D0D8 6A294000 60294000
5A90D110 5A80D110 877AD928 5870D2D0 C3D6D5E2 F0F0F4F7*
02E3E7E3 400009BC 40400038 40400001 5880D2C8 5890D2C0 5860D110
5850D100 5800D318 1A055000 D3185820 D1201A2A 5020D120 192B47C0
D8C058B0 D29858A0 D1005890 D1105880 C3D6D5E2 F0F0F4F8*
02E3E7E3 400009F4 40400038 40400001 D0E458E0 D374682E B0386C20
D3686800 D1702A02 6000D170 5820D12C 1A285020 D12C5800 D3901A0A
5000D390 5800D38C 5A00D0F0 5000D38C C3D6D5E2 F0F0F4F9*
02E3E7E3 40000A2C 40400038 40400001 5920D14C 47C0D4FA 58B0D100
58A0D0E4 6800D170 6D00D190 6000D170 182B5850 D358186B 188258A0
D1106840 D0B86860 D0B058B0 D2C85890 C3D6D5E2 F0F0F5F0**
02E3E7E3 40000A64 40400038 40400001 D2D05870 D2C05840 D2B06828
70002022 292447A0 DA566068 70006828 B0002022 292447A0 DA666068
B0006828 90002022 292447A0 DA766068 C3D6D5E2 F0F0F5F1*
02E3E7E3 40000A9C 40400038 40400001 90001828 1A25183A 1A381893
18B26840 D0C05860 D2A05850 D2A86829 60002022 292447A0 DA9E6069
60006829 40002022 292447A0 DAAE6069 C3D6D5E2 F0F0F5F2*
02E3E7E3 40000AD4 40400038 40400001 40006829 50002022 292447A0
DABE6069 5000879A DA8E5890 D2D058B0 D2C86840 D0B85860 D1005850
D3581A86 198A47C0 DA4658B0 D10058A0 C3D6D5E2 F0F0F5F3*
02E3E7E3 40000B0C 40400038 40400001 D0E4182B 5850D370 186B5870
D3881882 58A0D110 6840D0C0 6860D0B0 5840D2B8 18B81AB5 183A1A38
18931834 68293000 20222924 47A0DB20 C3D6D5E2 F0F0F5F4*
02E3E7E3 40000B44 40400038 40400001 60693000 879ADB10 8786DB04
58B0D100 58A0D0E4 5800D0E0 5000D13C 182B184B 5850D388 18725880
D370189A 58A0D110 18B71AB8 183A1A37 C3D6D5E2 F0F0F5F5*

```
02E3E7E3  40000B7C  40400038  40400001  18635830  D2B86806  30002200
4780DB68  5090D13C  876ADB5A  8774DB4C  58B0D100  58A0D0E4  5800D0E0
5000D134  5000D140  182B184B  1872188A  C3D6D5E2  F0F0F5F6*
02E3E7E3  40000BB4  40400038  40400001  58A0D110  6840D0B0  5890D2C0
5860D2C8  5850D2D0  69479000  41200001  4760DBAE  1B226947  60004130
00014760  DBBC1B33  16326947  50004120  C3D6D5E2  F0F0F5F7*
02E3E7E3  40000BEC  40400038  40400001  00014760  DBCC1B22  16231BFF
872FDBD8  5080D140  18B75AB0  D358183A  1A371863  5890D2A0  5850D2A8
5840D2B0  68269000  6026D1A0  68264000  C3D6D5E2  F0F0F5F8*

MEMBER NAME  CONSTR
02E3E7E3  40000C24  40400038  40400001  6026D1E8  68665000  6066D230
22664780  DC125080  D134876A  DBF05850  D2D05860  D2C85890  D2C05840
D1001A74  197A47C0  DBA058B0  D10058A0  C3D6D5E2  F0F0F5F9*
02E3E7E3  40000C5C  40400038  40400001  D0E45800  D1401200  4770DC48
1BFF58E0  D00007FE  58F0D2D8  5800F004  12004780  DC6058F0  D2F84110
D05005EF  58F0D2D8  5800F008  12004780  C3D6D5E2  F0F0F6F0**
02E3E7E3  40000C94  40400038  40400001  DC7858F0  D2F84110  D07005EF
5800D134  12004780  DC8C58F0  D2F84110  D09005EF  1BFF58E0  D00007FE
58A0D004  58E0A00C  58B0A018  5810B02C  C3D6D5E2  F0F0F6F1*
02E3E7E3  40000CCC  40400038  40400001  6820D170  60201000  5820B030
6840D190  60402000  5830B034  5840D13C  50403000  5850B038  5860D134
50605000  5870B03C  5880D140  50807000  C3D6D5E2  F0F0F6F2*
02E3E7E3  40000D04  40400038  40400001  18DA92FF  A00C982C  A01C07FE
987B1008  58207000  5020D14C  987B102C  68207000  6020D170  68208000
6020D190  58209000  5020D13C  5820A000  C3D6D5E2  F0F0F6F3*
02E3E7E3  40000D3C  40400038  40400001  5020D134  5820B000  5020D140
58201000  41302000  41500008  1B255020  D2F05030  D2F45820  10044130
20004150  00041B25  5020D2E8  5030D2EC  C3D6D5E2  F0F0F6F4*
02E3E7E3  40000D74  40400038  40400001  5820100C  41302000  41500004
1B255020  D2D85030  D2DC5820  10104130  20004150  00081B25  5B20D110
5020D2A0  5030D2A4  58201014  41302000  C3D6D5E2  F0F0F6F5*
02E3E7E3  40000DAC  40400038  40400001  41500008  1B255B20  D1105020
D2A85030  D2AC5820  10184130  20004150  00081B25  5B20D110  5020D2B0
5030D2B4  5820101C  41302000  41500008  C3D6D5E2  F0F0F6F6*
02E3E7E3  40000DE4  40400038  40400001  1B255B20  D1105020  D2B85030
D2BC5820  10204130  20004150  00081B25  5020D2C0  5030D2C4  5030D05C
58201024  41302000  41500008  1B255020  C3D6D5E2  F0F0F6F7*
02E3E7E3  40000E1C  40400028  40400001  D2C85030  D2CC5030  D09C5820
10284130  20004150  00081B25  5020D2D0  5030D2D4  5030D07C  47F0D3AC
40404040  40404040  40404040  40404040  C3D6D5E2  F0F0F6F8*
02E3E7E3  40000020  4040000C  40400001  00000D10  00000028  00000CBC
40404040  40404040  40404040  40404040  40404040  40404040  40404040
40404040  40404040  40404040  40404040  C3D6D5E2  F0F0F6F9*
02D9D3C4  40404040  40400038  40404040  00020001  0C0002C0  00020001
0C0002C4  00030001  1C000308  00040001  1C00030C  00050001  1C000320
00010001  0C000020  00010001  0C000024  C3D6D5E2  F0F0F7F0**
02E3E7E3  40000074  40400010  40400001  80000178  000001E8  00000114
00000114  40404040  40404040  40404040  40404040  40404040  40404040
40404040  40404040  40404040  40404040  C3D6D5E2  F0F0F7F1*
02E3E7E3  40000088  4040000C  40400001  000001C0  00000130  0000016C
40404040  40404040  40404040  40404040  40404040  40404040  40404040
40404040  40404040  40404040  40404040  C3D6D5E2  F0F0F7F2*
02D9D3C4  40404040  40400038  40404040  00010001  0C000028  00010001
0C000074  00010001  0C000078  00010001  0C00007C  00010001  0C000080
00010001  0C000088  00010001  0C00008C  C3D6D5E2  F0F0F7F3*
02E3E7E3  40000094  40400010  40400001  80000160  00000230  00000114
00000114  40404040  40404040  40404040  40404040  40404040  40404040
40404040  40404040  40404040  40404040  C3D6D5E2  F0F0F7F4*
```

```
02E3E7E3  400000A8  4040000C  40400001  000001C0  00000130  0000016C
40404040  40404040  40404040  40404040  40404040  40404040  40404040
40404040  40404040  40404040  40404040  C3D6D5E2  F0F0F7F5*
02D9D3C4  40404040  40400038  40404040  00010001  0C000090  00010001
0C000094  00010001  0C000098  00010001  0C00009C  00010001  0C0000A0
00010001  0C0000A8  00010001  0C0000AC  C3D6D5E2  F0F0F7F6*
02E3E7E3  400000B4  40400010  40400001  80000160  00000278  00000114
00000114  40404040  40404040  40404040  40404040  40404040  40404040
40404040  40404040  40404040  40404040  C3D6D5E2  F0F0F7F7*
02E3E7E3  400000C8  4040000C  40400001  000001C0  00000130  0000016C

MEMBER NAME  CONSTR
40404040  40404040  40404040  40404040  40404040  40404040  40404040
40404040  40404040  40404040  40404040  C3D6D5E2  F0F0F7F8*
02D9D3C4  40404040  40400038  40404040  00010001  0C0000B0  00010001
0C0000B4  00010001  0C0000B8  00010001  0C0000BC  00010001  0C0000C0
00010001  0C0000C8  00010001  0C0000CC  C3D6D5E2  F0F0F7F9*
02E3E7E3  400000D4  40400004  40400001  80000160  40404040  40404040
40404040  40404040  40404040  40404040  40404040  40404040  40404040
40404040  40404040  40404040  40404040  C3D6D5E2  F0F0F8F0**
02E3E7E3  40000324  40400038  40400001  00000000  00000000  00000000
00000000  00000000  00000000  00000000  00000000  00000000  00000000
00000000  00000000  00000000  00000000  C3D6D5E2  F0F0F8F1*
02E3E7E3  4000035C  40400038  40400001  00000000  00000000  00000000
00000000  00000000  00000000  00000000  00000000  00000000  00000048
00000000  00D40006  00000000  00000006  C3D6D5E2  F0F0F8F2*
02E3E7E3  40000394  40400038  40400001  01540007  00000030  08280008
00000000  01F00009  00000000  03240009  00000010  02B00009  00000000
0504000A  00000000  0160000A  00000000  C3D6D5E2  F0F0F8F3*
02E3E7E3  400003CC  40400008  40400001  021C000A  00000000  40404040
40404040  40404040  40404040  40404040  40404040  40404040  40404040
40404040  40404040  40404040  40404040  C3D6D5E2  F0F0F8F4*
02D9D3C4  40404040  40400010  40404040  00010001  0C0000D0  00010001
0C0000D4  40404040  40404040  40404040  40404040  40404040  40404040
40404040  40404040  40404040  40404040  C3D6D5E2  F0F0F8F5*
02C5D5C4  40404040  40404040  40404040  40404040  40404040  40404040
00000E44  F1F5F7F3  F460C6D6  F34040F0  F2F0F2F8  F7F0F9F8  40F0F84B
F1F34BF5  F1404040  C3D6D5E2  E3D94040  C3D6D5E2  F0F0F8F6**

MEMBER NAME  COVDRV
02C5E2C4  40404040  40400010  40400001  C3D6E5C4  D9E54040  00000000
40000000  40404040  40404040  40404040  40404040  40404040  40404040
40404040  40404040  40404040  40404040  C3D6E5C4  F0F0F0F1*
02E3E7E3  40000000  40400028  40400001  47F0F00C  07C3D6E5  C4D9E540
90ECD00C  184D98CD  F0205040  D00450D0  400807FC  40404040  40404040
40404040  40404040  40404040  40404040  C3D6E5C4  F0F0F0F2*
02C5E2C4  40404040  40400010  40400002  C3D6E5C5  D9404040  02000000
40000000  40404040  40404040  40404040  40404040  40404040  40404040
40404040  40404040  40404040  40404040  C3D6E5C4  F0F0F0F3*
02E3E7E3  400000B0  40400020  40400001  00000000  00000001  00000002
00000003  00000004  00000005  00000000  00000000  40404040  40404040
40404040  40404040  40404040  40404040  C3D6E5C4  F0F0F0F4*
02E3E7E3  40000110  40400008  40400001  00000000  00000000  40404040
40404040  40404040  40404040  40404040  40404040  40404040  40404040
40404040  40404040  40404040  40404040  C3D6E5C4  F0F0F0F5*
02E3E7E3  4000011C  40400004  40400001  00000000  40404040  40404040
40404040  40404040  40404040  40404040  40404040  40404040  40404040
40404040  40404040  40404040  40404040  C3D6E5C4  F0F0F0F6*
02C5E2C4  40404040  40400010  40400003  D3C9D4C9  E3E54040  02000000
```

```
40000000  40404040  40404040  40404040  40404040  40404040  40404040
40404040  40404040  40404040  40404040  C3D6E5C4  F0F0F0F7*
02E3E7E3  40000124  40400004  40400001  00000000  40404040  40404040
40404040  40404040  40404040  40404040  40404040  40404040  40404040
40404040  40404040  40404040  40404040  C3D6E5C4  F0F0F0F8*
02E3E7E3  4000012C  40400004  40400001  00000000  40404040  40404040
40404040  40404040  40404040  40404040  40404040  40404040  40404040
40404040  40404040  40404040  40404040  C3D6E5C4  F0F0F0F9*
02E3E7E3  400001B0  40400038  40400001  5880D0F4  58B0D0FC  58A0D110
5890D114  5800D088  5000D0CC  5800D0DC  5900D0E0  4780DBF0  5800D098
5000D170  187A5C60  D0DC5A70  D0985090  C3D6E5C4  F0F0F1F0**
02E3E7E3  400001E8  40400038  40400001  D174183A  5C20D0DC  1A395030
D178183A  5C20D0DC  5A30D118  5030D180  183A5C20  D0DC186A  1A63185A
5C40D0E0  5A50D098  183A5C20  D0E01849  C3D6E5C4  F0F0F1F1*
02E3E7E3  40000220  40400038  40400001  1A43183A  5C20D0E0  5A30D118
181A5C00  D0E0182A  1A214107  B0005000  D04C58E0  D178410E  B0005000
D05058E0  D180410E  B0005000  D0544106  C3D6E5C4  F0F0F1F2*
02E3E7E3  40000258  40400038  40400001  B0005000  D0584105  B0005000
D05C4104  B0005000  D0604103  B0005000  D0644102  B0005000  D06858F0
D1044110  D04C05EF  5800D0C8  12004770  C3D6E5C4  F0F0F1F3*
02E3E7E3  40000290  40400038  40400001  D2721BFF  58E0D000  07FE5850
D0DC5C40  D1745820  D1701A25  58528000  5C40D174  5A50D170  5830D0DC
5C20D174  5840D174  1A435830  D0E05C20  C3D6E5C4  F0F0F1F4*
02E3E7E3  400002C8  40400038  40400001  D1745860  D1701A63  58368000
5C20D174  5A30D170  5870D0E0  5C60D174  5820D174  1A2758F0  D0EC4105
F0005000  D0704104  80005000  D07458F0  C3D6E5C4  F0F0F1F5*
02E3E7E3  40000300  40400038  40400001  D0EC4103  F0005000  D0784102
80005000  D07C58F0  D0E84110  D07005EF  5800D0BC  5900D098  4770D308
1BFF58E0  D00007FE  5800D0BC  5900D090  C3D6E5C4  F0F0F1F6*
02E3E7E3  40000338  40400038  40400001  4780DC00  5800D0BC  5900D08C
4780D338  5800D0BC  5900D094  4780D770  5800D0BC  5900D09C  4780D9EC
5800D0C4  5900D08C  4780DBF0  5850D0E0  C3D6E5C4  F0F0F1F7*
02E3E7E3  40000370  40400038  40400001  5A50D08C  5820D0C4  1A255B20
D0905020  D0D85840  D0DC5A40  D08C5040  D0B45820  D0C01A24  5B20D090
5020D0D4  5050D0AC  5800D098  5000D144  C3D6E5C4  F0F0F1F8*
02E3E7E3  400003A8  40400038  40400001  5090D148  5800D098  5000D108
5090D10C  18341C2A  5030D14C  5090D138  18141C09  5010D150  5A30D098
5030D154  18351C2A  5030D158  5090D15C  C3D6E5C4  F0F0F1F9*
02E3E7E3  400003E0  40400038  40400001  18151C09  5010D160  5030D164

MEMBER NAME  COVDRV
1C495050  D1685A30  D0985030  D16C18BA  58A0D0EC  5890D0FC  187B5C60
D0DC5A70  D098183B  5C20D0DC  5A30D114  C3D6E5C4  F0F0F2F0**
02E3E7E3  40000418  40400038  40400001  5030D178  183B5C20  D0DC1863
5A60D118  185B5C40  D0DC1A5B  5840D158  5A40D114  5830D158  5A30D118
5820D158  1A2B4107  90005000  D04C58E0  C3D6E5C4  F0F0F2F1*
02E3E7E3  40000450  40400038  40400001  D178410E  90005000  D0504106
90005000  D0544105  90005000  D05858E0  D16C410E  90005000  D05C4104
90005000  D0604103  90005000  D0644102  C3D6E5C4  F0F0F2F2*
02E3E7E3  40000488  40400038  40400001  90005000  D06858F0  D1044110
D04C05EF  5800D0C8  12004780  D70E5850  D0DC5C40  D1481825  5A20D144
58528000  5C40D148  5A50D144  5830D0DC  C3D6E5C4  F0F0F2F3*
02E3E7E3  400004C0  40400038  40400001  5C20D148  18435A40  D1485860
D1605A60  D1445836  80005C20  D1485A30  D1445820  D1605A20  D1484105
A0005000  D0704104  80005000  D0744103  C3D6E5C4  F0F0F2F4*
02E3E7E3  400004F8  40400038  40400001  A0005000  D0784102  80005000
D07C58F0  D0E84110  D07005EF  5800D0BC  5900D08C  4770D508  58B0D0FC
58A0D110  5890D114  1BFF58E0  D00007FE  C3D6E5C4  F0F0F2F5*
02E3E7E3  40000530  40400038  40400001  5800D0BC  5900D090  4770D518
```

```
47F0DC00  5800D0BC  5900D094  4770D538  58B0D0FC  58A0D110  5890D114
1BFF58E0  D00007FE  5800D0BC  5900D098  C3D6E5C4  F0F0F2F6*
02E3E7E3  40000568  40400038  40400001  4780D70E  5800D0C0  5900D08C
4770D554  47F0DC00  5800D0B4  5000D0A8  5800D164  5A00D098  5000D11C
5800D164  5A00D114  5000D120  5800D164  C3D6E5C4  F0F0F2F7*
02E3E7E3  400005A0  40400038  40400001  5A00D118  5000D124  5800D164
1A0B5000  D1285800  D1685A00  D0985000  D12C5800  D1685A00  D1145000
D1305800  D1545000  D14058A0  D15058B0  C3D6E5C4  F0F0F2F8*
02E3E7E3  400005D8  40400038  40400001  D14C5850  D0EC184B  5A40D114
183B5A30  D118182B  5A20D110  58E0D140  410E9000  5000D04C  41049000
5000D050  41039000  5000D054  41029000  C3D6E5C4  F0F0F2F9*
02E3E7E3  40000610  40400038  40400001  5000D058  58E0D11C  410E9000
5000D05C  58E0D120  410E9000  5000D060  58E0D124  410E9000  5000D064
58E0D128  410E9000  5000D068  58F0D104  C3D6E5C4  F0F0F3F0**
02E3E7E3  40000648  40400038  40400001  4110D04C  05EF5800  D0C81200
4780D6D6  184A5A40  D1085834  80005C20  D10C1843  5A40D108  183A5A30
D10C58E0  D12C587E  80005C60  D10C1827  C3D6E5C4  F0F0F3F1*
02E3E7E3  40000680  40400038  40400001  5A20D108  41045000  5000D070
41038000  5000D074  41025000  5000D078  58E0D130  410E8000  5000D07C
58F0D0E8  4110D070  05EF5800  D0BC5900  C3D6E5C4  F0F0F3F2*
02E3E7E3  400006B8  40400038  40400001  D08C4770  D69A47F0  DC005800
D0BC5900  D0904770  D6AA47F0  DC005800  D0BC5900  D0944770  D6BA47F0
D70E5800  D0BC5900  D0984780  D6D65800  C3D6E5C4  F0F0F3F3*
02E3E7E3  400006F0  40400038  40400001  D0BC5900  D09C4770  D6D647F0
D70E5AA0  D1385AB0  D1105800  D1405A00  D1105000  D1405820  D0A85A20
D08C5020  D0A85920  D0D447C0  D5B658B0  C3D6E5C4  F0F0F3F4*
02E3E7E3  40000728  40400038  40400001  D0FC58A0  D1105890  D11447F0
DC0058A0  D0EC58B0  D1105800  D1685A00  D1145000  D1685800  D1641A0B
5000D164  5800D160  5A00D15C  5000D160  C3D6E5C4  F0F0F3F5*
02E3E7E3  40000760  40400038  40400001  5800D158  1A0B5000  D1585800
D16C1A0B  5000D16C  5820D0AC  5A20D08C  5020D0AC  5920D0D8  47C0D3DC
58B0D0FC  58A0D110  5890D114  47F0DBF0  C3D6E5C4  F0F0F3F6*
02E3E7E3  40000798  40400038  40400001  5800D0C4  5900D08C  4780DBF0
5800D0C0  5900D08C  4780DC00  5850D0E0  5A50D08C  5830D0C4  1A355B30
D0905820  D0DC5A20  D08C5020  D0B45840  C3D6E5C4  F0F0F3F7*
02E3E7E3  400007D0  40400038  40400001  D0C01A42  5B40D090  5040D0D4
5800D098  5000D108  5090D10C  18721C6A  5070D144  5090D138  18121C09
5010D148  5A70D098  5070D14C  18151C0A  C3D6E5C4  F0F0F3F8*
02E3E7E3  40000808  40400038  40400001  5010D150  1C295030  D1581C49
5050D154  18735880  D118189A  58A0D098  58B0D114  5800D150  1A0A5000

MEMBER NAME  COVDRV
D11C5800  D1501A0B  5000D120  5800D150  C3D6E5C4  F0F0F3F9*
02E3E7E3  40000840  40400038  40400001  1A085000  D1245800  D1501A09
5000D128  5800D154  1A0A5000  D12C5800  D1541A0B  5000D130  5800D14C
5000D140  5860D144  58A0D0B4  58B0D148  C3D6E5C4  F0F0F4F0**
02E3E7E3  40000878  40400038  40400001  5890D0FC  5880D0F4  5870D0EC
18465A40  D1141836  5A30D118  18265A20  D11058E0  D11C410E  90005000
D04C58E0  D120410E  90005000  D05058E0  C3D6E5C4  F0F0F4F1*
02E3E7E3  400008B0  40400038  40400001  D124410E  90005000  D05458E0
D128410E  90005000  D05858E0  D140410E  90005000  D05C4104  90005000
D0604103  90005000  D0644102  90005000  C3D6E5C4  F0F0F4F2*
02E3E7E3  400008E8  40400038  40400001  D06858F0  D1044110  D04C05EF
5800D0C8  12004780  D97A58E0  D12C583E  80005C20  D10C1843  5A40D108
185B5A50  D1085835  80005C20  D10C5A30  C3D6E5C4  F0F0F4F3*
02E3E7E3  40000920  40400038  40400001  D108182B  5A20D10C  41047000
5000D070  58E0D130  410E8000  5000D074  41037000  5000D078  41028000
5000D07C  58F0D0E8  4110D070  05EF5800  C3D6E5C4  F0F0F4F4*
02E3E7E3  40000958  40400038  40400001  D0BC5900  D08C4770  D93E47F0
```

```
D9AA5800  D0BC5900  D0904770  D94E47F0  DC005800  D0BC5900  D0944770
D95E47F0  D9AA5800  D0BC5900  D0984780  C3D6E5C4  F0F0F4F5*
02E3E7E3  40000990  40400038  40400001  D97A5800  D0BC5900  D09C4770
D97A47F0  DC005AB0  D1385A60  D1105800  D1405A00  D1105000  D1405AA0
D08C59A0  D0D447C0  D85C58B0  D0FC58A0  C3D6E5C4  F0F0F4F6*
02E3E7E3  400009C8  40400038  40400001  D1105890  D11447F0  DC0058B0
D11458A0  D0985890  D1105880  D1185870  D1585800  D1501A09  5000D150
5820D154  1A2B5020  D1541927  47C0D800  C3D6E5C4  F0F0F4F7*
02E3E7E3  40000A00  40400038  40400001  5880D0F4  58B0D0FC  58A0D110
5890D114  47F0DBF0  5800D0C0  5900D08C  4780DC00  5850D0DC  5A50D08C
5820D0C0  1A255B20  D0905020  D0D45050  C3D6E5C4  F0F0F4F8*
02E3E7E3  40000A38  40400038  40400001  D0AC5800  D0985000  D1085090
D10C1835  1C2A5030  D11C5090  D1201C49  5050D124  5A30D098  5030D128
58B0D0EC  5890D0FC  187A5C60  D0E05A70  C3D6E5C4  F0F0F4F9*
02E3E7E3  40000A70  40400038  40400001  D098183A  5C20D0E0  5A30D114
5030D178  183A5C20  D0E01863  5A60D118  185A5C40  D0E01A5A  5840D11C
5A40D114  5830D11C  5A30D118  5820D11C  C3D6E5C4  F0F0F5F0**
02E3E7E3  40000AA8  40400038  40400001  1A2A4107  90005000  D04C58E0
D178410E  90005000  D0504106  90005000  D0544105  90005000  D05858E0
D128410E  90005000  D05C4104  90005000  C3D6E5C4  F0F0F5F1*
02E3E7E3  40000AE0  40400038  40400001  D0604103  90005000  D0644102
90005000  D06858F0  D1044110  D04C05EF  5800D0C8  12004780  DBB05850
D0E05C40  D10C1825  5A20D108  58528000  C3D6E5C4  F0F0F5F2*
02E3E7E3  40000B18  40400038  40400001  5C40D10C  5A50D108  5830D0E0
5C20D10C  18435A40  D10C5860  D1245A60  D1085836  80005C20  D10C5A30
D1085820  D1245A20  D10C4105  B0005000  C3D6E5C4  F0F0F5F3*
02E3E7E3  40000B50  40400038  40400001  D0704104  80005000  D0744103
B0005000  D0784102  80005000  D07C58F0  D0E84110  D07005EF  5800D0BC
5900D08C  4770DB68  58B0D0FC  5890D114  C3D6E5C4  F0F0F5F4*
02E3E7E3  40000B88  40400038  40400001  1BFF58E0  D00007FE  5800D0BC
5900D090  4770DB78  47F0DC00  5800D0BC  5900D094  4770DB94  58B0D0FC
5890D114  1BFF58E0  D00007FE  5800D0BC  C3D6E5C4  F0F0F5F5*
02E3E7E3  40000BC0  40400038  40400001  5900D098  4780DBB0  5800D0BC
5900D09C  4770DBB0  47F0DC00  5800D124  5A00D120  5000D124  5800D11C
1A0A5000  D11C5800  D1281A0A  5000D128  C3D6E5C4  F0F0F5F6*
02E3E7E3  40000BF8  40400038  40400001  5820D0AC  5A20D08C  5020D0AC
5920D0D4  47C0DA40  58B0D0FC  5890D114  47F0DC00  5800D08C  5000D0CC
1BFF58E0  D00007FE  58B0D0FC  58A0D110  C3D6E5C4  F0F0F5F7*
02E3E7E3  40000C30  40400038  40400001  5890D114  5800D090  5000D0CC
1BFF58E0  D00007FE  58A0D004  58E0A00C  58B0A018  5810B014  5820D0DC
50201000  5830B01C  5840D0E0  50403000  C3D6E5C4  F0F0F5F8*

MEMBER NAME  COVDRV
02E3E7E3  40000C68  40400038  40400001  5850B024  5860D0CC  50605000
18DA92FF  A00C982C  A01C07FE  987B1004  58207000  5020D0B0  58209000
5020D0D0  987B1014  58207000  5020D0DC  C3D6E5C4  F0F0F5F9*
02E3E7E3  40000CA0  40400038  40400001  58208000  5020D0C0  58209000
5020D0E0  5820A000  5020D0C4  5820B000  5020D0CC  58201000  41302000
41500004  1B255C40  D0901B25  5020D0EC  C3D6E5C4  F0F0F6F0**
02E3E7E3  40000CD8  40400038  40400001  5030D0F0  58201008  41302000
41500004  1B255C40  D0901B25  5020D0F4  5030D0F8  58201010  41302000
41500004  1B255C40  D0981B25  5020D0FC  C3D6E5C4  F0F0F6F1*
02E3E7E3  40000D10  40400008  40400001  5030D100  47F0D188  40404040
40404040  40404040  40404040  40404040  40404040  40404040  40404040
40404040  40404040  40404040  40404040  C3D6E5C4  F0F0F6F2*
02E3E7E3  40000020  4040000C  40400001  00000C80  00000028  00000C44
40404040  40404040  40404040  40404040  40404040  40404040  40404040
40404040  40404040  40404040  40404040  C3D6E5C4  F0F0F6F3*
02E3E7E3  40000094  40400004  40400001  800000F0  40404040  40404040
```

40404040 40404040 40404040 40404040 40404040 40404040 40404040
40404040 40404040 40404040 40404040 C3D6E5C4 F0F0F6F4*
02E3E7E3 400000A8 40400004 40400001 800000E4 40404040 40404040
40404040 40404040 40404040 40404040 40404040 40404040 40404040
40404040 40404040 40404040 40404040 C3D6E5C4 F0F0F6F5*
02E3E7E3 40000130 40400038 40400001 00000000 00000000 00000010
00000008 0000000C 00000000 00000000 00000000 00000000 00000003
00E40003 006C0003 008C0004 00000004 C3D6E5C4 F0F0F6F6*
02E3E7E3 40000168 40400038 40400001 04E80005 00900006 00B00006
00000000 01480006 00000000 019C0008 00940008 00980008 009C0008
00A00008 00A40008 00A80008 00AC0008 C3D6E5C4 F0F0F6F7*
02E3E7E3 400001A0 40400010 40400001 00E80008 00B40008 00B80008
00BC0008 40404040 40404040 40404040 40404040 40404040 40404040
40404040 40404040 40404040 40404040 C3D6E5C4 F0F0F6F8*
02D9D3C4 40404040 40400038 40404040 00020001 1C000110 00030001
1C00012C 00010001 0C000020 00010001 0C000024 00010001 0C000028
00010001 0C000094 00010001 0C0000A8 C3D6E5C4 F0F0F6F9*
02C5D5C4 40404040 40404040 40404040 40404040 40404040 40404040
00000D18 F1F5F7F3 F460C6D6 F34040F0 F2F0F2F8 F7F0F9F8 40F0F84B
F1F34BF5 F8404040 C3D6E5C4 D9E54040 C3D6E5C4 F0F0F7F0**

MEMBER NAME COVSEQ
02C5E2C4 40404040 40400010 40400001 C3D6E5E2 C5D84040 00000000
40000000 40404040 40404040 40404040 40404040 40404040 40404040
40404040 40404040 40404040 40404040 C3D6E5E2 F0F0F0F1*
02E3E7E3 40000000 40400038 40400001 47F0F00C 07C3D6E5 E2C5D840
90ECD00C 184D98CD F0205040 D00450D0 400807FC 40404040 40404040
0218121A 05C4C1E2 C8401003 1A0A40E2 C3D6E5E2 F0F0F0F2*
02E3E7E3 40000038 40400030 40400001 C5D8E4C5 D5C3C540 10041A13
40D6E5C5 D9D3C1D7 C9D5C740 D7D3C9C5 E25ED310 041A026B D3100418
32220206 48140122 40404040 40404040 C3D6E5E2 F0F0F0F3*
02E3E7E3 400000E8 40400038 40400001 00000000 00000000 4F080000
00000000 00000000 00000001 00000002 00000003 00000004 00000015
00000016 00000048 00000000 00000000 C3D6E5E2 F0F0F0F4*
02E3E7E3 40000178 40400004 40400001 00000000 40404040 40404040
40404040 40404040 40404040 40404040 40404040 40404040 40404040
40404040 40404040 40404040 40404040 C3D6E5E2 F0F0F0F5*
02E3E7E3 40000180 40400004 40400001 00000000 40404040 40404040
40404040 40404040 40404040 40404040 40404040 40404040 40404040
40404040 40404040 40404040 40404040 C3D6E5E2 F0F0F0F6*
02C5E2C4 40404040 40400010 40400002 D4E5C3C8 D9404040 02000000
40000000 40404040 40404040 40404040 40404040 40404040 40404040
40404040 40404040 40404040 40404040 C3D6E5E2 F0F0F0F7*
02E3E7E3 40000188 40400004 40400001 00000000 40404040 40404040
40404040 40404040 40404040 40404040 40404040 40404040 40404040
40404040 40404040 40404040 40404040 C3D6E5E2 F0F0F0F8*
02E3E7E3 40000190 40400008 40400001 00000000 00000000 40404040
40404040 40404040 40404040 40404040 40404040 40404040 40404040
40404040 40404040 40404040 40404040 C3D6E5E2 F0F0F0F9*
02C5E2C4 40404040 40400010 40400003 C3D6E5C4 D9E54040 02000000
40000000 40404040 40404040 40404040 40404040 40404040 40404040
40404040 40404040 40404040 40404040 C3D6E5E2 F0F0F1F0**
02E3E7E3 4000019C 40400004 40400001 00000000 40404040 40404040
40404040 40404040 40404040 40404040 40404040 40404040 40404040
40404040 40404040 40404040 40404040 C3D6E5E2 F0F0F1F1*
02C5E2C4 40404040 40400010 40400004 C9C2C3D6 D47B4040 02000000
40000000 40404040 40404040 40404040 40404040 40404040 40404040
40404040 40404040 40404040 40404040 C3D6E5E2 F0F0F1F2*
02E3E7E3 400001A4 40400008 40400001 00000000 00000000 40404040

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | C3D6E5E2 | F0F0F1F3* | |
| 02E3E7E3 | 40000150 | 40400004 | 40400001 | 000000C8 | 40404040 | 40404040 |
| 40404040 | 40404040 | 40404040 | 40404040 | 40404040 | 40404040 | 40404040 |
| 40404040 | 40404040 | 40404040 | 40404040 | C3D6E5E2 | F0F0F1F4* | |
| 02E3E7E3 | 400001D4 | 40400038 | 40400001 | 58B0D148 | 5800D090 | 5000D0D4 |
| 50B0D168 | 5890D094 | 18AB58B0 | D1345820 | D0D41A29 | 5020D0C4 | 5920D104 |
| 4750D1A4 | 58B0D148 | 1BFF58E0 | D00007FE | C3D6E5E2 | F0F0F1F5* | |
| 02E3E7E3 | 4000020C | 40400038 | 40400001 | 185A5C40 | D0C41825 | 5A20D144 |
| 2B007802 | B0006A00 | D0886000 | D0805840 | D0845040 | D1005830 | D0C45030 |
| D0D41873 | 1C6A1827 | 5A20D144 | 185A1864 | C3D6E5E2 | F0F0F1F6* | |
| 02E3E7E3 | 40000244 | 40400038 | 40400001 | 187918A3 | 18B25880 | D1341AA7 |
| 1AB52B00 | 780B8000 | 6A00D088 | 6000D080 | 5890D084 | 19694780 | D20A50A0 |
| D0D447F0 | D20E47F0 | D1E658B0 | D13458A0 | C3D6E5E2 | F0F0F1F7* | |
| 02E3E7E3 | 4000027C | 40400038 | 40400001 | D1485890 | D0945820 | D0D41B29 |
| 5020D0D4 | 5920D0C4 | 4780D186 | 5850D0C4 | 5C40D168 | 18255A20 | D1544102 |
| B0005000 | D0549280 | D05458F0 | D1284110 | C3D6E5E2 | F0F0F1F8* | |
| 02E3E7E3 | 400002B4 | 40400038 | 40400001 | D04C05EF | 4800D108 | 5000D0EC |
| 4800D10A | 5000D0C8 | 5830D0C4 | 1A395030 | D0C45930 | D0D44730 | D1861853 |
| 1B591C4A | 5A50D158 | 5050D150 | 181A5C00 | C3D6E5E2 | F0F0F1F9* | |
| 02E3E7E3 | 400002EC | 40400038 | 40400001 | D0D45010 | D1601C2A | 18435A40 |

MEMBER NAME COVSEQ

| | | | | | | |
|---|---|---|---|---|---|---|
| D1541864 | 187358A0 | D1105890 | D1185880 | D1204106 | B0005000 | D0549280 |
| D05458F0 | D1284110 | D04C05EF | 4800D108 | C3D6E5E2 | F0F0F2F0** | |
| 02E3E7E3 | 40000324 | 40400038 | 40400001 | 5000D0F0 | 4800D10A | 5000D0CC |
| 58F0D13C | 4110D058 | 05EF58E0 | D1502B00 | 780EB000 | 6A00D088 | 6000D080 |
| 5800D084 | 5000D0DC | 18375A30 | D1582B00 | C3D6E5E2 | F0F0F2F1* | |
| 02E3E7E3 | 4000035C | 40400038 | 40400001 | 7803B000 | 6A00D088 | 6000D080 |
| 5800D084 | 5000D0E0 | 5800D0D8 | 12004780 | D3C25800 | D0F85A00 | D0945000 |
| D0F85900 | D0E847A0 | D3C21847 | 5A40D15C | C3D6E5E2 | F0F0F2F2* | |
| 02E3E7E3 | 40000394 | 40400038 | 40400001 | 2B007804 | B0006A00 | D0886000 |
| D0805830 | D0841033 | 5030D0D0 | 58F0D140 | 45E0F004 | 00000000 | 00000028 |
| 45E0F008 | 0450D0D0 | 45E0F008 | 0450D100 | C3D6E5E2 | F0F0F2F3* | |
| 02E3E7E3 | 400003CC | 40400038 | 40400001 | 45E0F008 | 0450D0DC | 45E0F008 |
| 0450D0E0 | 45E0F010 | 58F0D140 | 45E0F000 | 00000000 | 00000062 | 5890D094 |
| 58A0D094 | 58B0D0AC | 5880D12C | 185B5C40 | C3D6E5E2 | F0F0F2F4* | |
| 02E3E7E3 | 40000404 | 40400038 | 40400001 | D0F81839 | 1A3545E0 | F0080123 |
| 8000879A | D3985880 | D1205890 | D11858A0 | D11058B0 | D13445E0 | F0105A60 |
| D1485A70 | D1485970 | D16047C0 | D2A258B0 | C3D6E5E2 | F0F0F2F5* | |
| 02E3E7E3 | 4000043C | 40400038 | 40400001 | D13458A0 | D1485890 | D09447F0 |
| D22C58A0 | D00458E0 | A00C58B0 | A0185810 | B00C5820 | D0C05020 | 10005830 |
| B0145840 | D0E45040 | 30005850 | B0205860 | C3D6E5E2 | F0F0F2F6* | |
| 02E3E7E3 | 40000474 | 40400038 | 40400001 | D0F85060 | 500018DA | 92FFA00C |
| 982CA01C | 07FE987B | 10045820 | 70005020 | D1045820 | 90005020 | D0C0987A |
| 10145820 | 70005020 | D0E45820 | A0005020 | C3D6E5E2 | F0F0F2F7* | |
| 02E3E7E3 | 400004AC | 40400038 | 40400001 | D0F85820 | 10004130 | 20004150 |
| 00041B25 | 5C40D0A8 | 1B255020 | D1345030 | D1385820 | 10084130 | 20004150 |
| 00041B25 | 5C40D098 | 1B255020 | D1105030 | C3D6E5E2 | F0F0F2F8* | |
| 02E3E7E3 | 400004E4 | 40400038 | 40400001 | D1145030 | D0585820 | 10104130 |
| 20004150 | 00041B25 | 5C40D098 | 1B255020 | D1185030 | D11C5030 | D0605820 |
| 10184130 | 20004150 | 00041B25 | 5C40D0A0 | C3D6E5E2 | F0F0F2F9* | |
| 02E3E7E3 | 4000051C | 4040002E | 40400001 | 1B255020 | D1205030 | D1245030 |
| D0685820 | 101C4130 | 20004150 | 00011B25 | 5C40D0AC | 1B255020 | D12C5030 |
| D13047F0 | D16C4040 | 40404040 | 40404040 | C3D6E5E2 | F0F0F3F0** | |
| 02E3E7E3 | 40000020 | 40400008 | 40400001 | 00000486 | 00000068 | 40404040 |
| 40404040 | 40404040 | 40404040 | 40404040 | 40404040 | 40404040 | 40404040 |
| 40404040 | 40404040 | 40404040 | 40404040 | C3D6E5E2 | F0F0F3F1* | |
| 02E3E7E3 | 40000068 | 40400004 | 40400001 | 0000044A | 40404040 | 40404040 |

40404040 40404040 40404040 40404040 40404040 40404040 40404040
40404040 40404040 40404040 40404040 C3D6E5E2 F0F0F3F2*
02D9D3C4 40404040 40400038 40404040 00020001 1C000190 00030001
1C0001A4 00040001 1C0001A8 00010001 0C0003B8 00010001 0C0003EC
00010001 0C000020 00010001 0C000024 C3D6E5E2 F0F0F3F3*
02E3E7E3 400000B4 4040000C 40400001 00000108 00000170 80000000
40404040 40404040 40404040 40404040 40404040 40404040 40404040
40404040 40404040 40404040 40404040 C3D6E5E2 F0F0F3F4*
02E3E7E3 400000C4 40400004 40400001 00000128 40404040 40404040
40404040 40404040 40404040 40404040 40404040 40404040 40404040
40404040 40404040 40404040 40404040 C3D6E5E2 F0F0F3F5*
02E3E7E3 400000CC 40400004 40400001 0000014C 40404040 40404040
40404040 40404040 40404040 40404040 40404040 40404040 40404040
40404040 40404040 40404040 40404040 C3D6E5E2 F0F0F3F6*
02E3E7E3 400000D4 4040000C 40400001 00000154 00000130 00000158
40404040 40404040 40404040 40404040 40404040 40404040 40404040
40404040 40404040 40404040 40404040 C3D6E5E2 F0F0F3F7*
02D9D3C4 40404040 40400038 40404040 00010001 0C000068 00010001
0C0000B4 00010001 0C0000B8 00010001 0C0000C4 00010001 0C0000CC
00010001 0C0000D4 00010001 0C0000D8 C3D6E5E2 F0F0F3F8*
02E3E7E3 400000E0 40400008 40400001 00000134 80000140 40404040
40404040 40404040 40404040 40404040 40404040 40404040 40404040

MEMBER NAME COVSEQ
40404040 40404040 40404040 40404040 C3D6E5E2 F0F0F3F9*
02E3E7E3 400001AC 40400028 40400001 0000000C 00000058 00000000
00000000 00000054 00000010 00000008 00000000 00000000 00000000
40404040 40404040 40404040 40404040 C3D6E5E2 F0F0F4F0**
02D9D3C4 40404040 40400018 40404040 00010001 0C0000DC 00010001
0C0000E0 00010001 0C0000E4 40404040 40404040 40404040 40404040
40404040 40404040 40404040 40404040 C3D6E5E2 F0F0F4F1*
02C5D5C4 40404040 40404040 40404040 40404040 40404040 40404040
0000054A F1F5F7F3 F460C6D6 F34040F0 F2F0F2F8 F7F0F9F8 40F0F84B
F1F44BF0 F3404040 C3D6E5E2 C5D84040 C3D6E5E2 F0F0F4F2**

MEMBER NAME COVER
02C5E2C4 40404040 40400010 40400001 C3D6E5C5 D9404040 00000000
40000000 40404040 40404040 40404040 40404040 40404040 40404040
40404040 40404040 40404040 40404040 C3D6E5C5 F0F0F0F1*
02E3E7E3 40000000 40400038 40400001 47F0F00C 07C3D6E5 C5D94040
90ECD00C 184D98CD F0205040 D00450D0 400807FC 40404040 40404040
021A0C40 404040C3 D6C4C540 7E40F122 C3D6E5C5 F0F0F0F2*
02E3E7E3 40000038 40400038 40400001 021A0C40 404040C3 D6C4C540
7E40F222 021A0C40 404040C3 D6C4C540 7E40F322 021A0C40 404040C3
D6C4C540 7E40F422 021A0C40 404040C3 C3D6E5C5 F0F0F0F3*
02E3E7E3 40000070 40400038 40400001 D6C4C540 7E40F522 021A0C40
404040C3 D6C4C540 7E40F622 021A2A40 D3D6C7C9 C340C5D9 D9D6D940
C9D540D9 D6E4E3C9 D5C540C3 D6E5C5D9 C3D6E5C5 F0F0F0F4*
02E3E7E3 400000A8 40400038 40400001 6B40C6C9 D9E2E340 C3C8C5C3
D222021A 2B40C3C8 C5C3D240 D3D6C7C9 C340C9D5 40D9D6E4 E3C9D5C5
40C3D6E5 C5D96B40 D6D7E3C9 D6D5404D C3D6E5C5 F0F0F0F5*
02E3E7E3 400000E0 40400038 40400001 F361F55D 22021A2B 40C3C8C5
C3D240D3 D6C7C9C3 40C9D540 D9D6E4E3 C9D5C540 C3D6E5C5 D96B40D6
D7E3C9D6 D5404DF3 61F35D22 021A2B40 C3D6E5C5 F0F0F0F6*
02E3E7E3 40000118 4040002B 40400001 C3C8C5C3 D240D3D6 C7C9C340
C9D540D9 D6E4E3C9 D5C540C3 D6E5C5D9 6B40D6D7 E3C9D6D5 404DF461
F55D2240 40404040 40404040 40404040 C3D6E5C5 F0F0F0F7*
02C5E2C4 40404040 40400010 40400002 C8D3C4D9 E5404040 02000000
40000000 40404040 40404040 40404040 40404040 40404040 40404040

```
40404040  40404040  40404040  40404040  C3D6E5C5  F0F0F0F8*
02E3E7E3  400001C0  40400020  40400001  00000001  00000002  00000003
00000004  00000005  00000006  00000000  00000000  40404040  40404040
40404040  40404040  40404040  40404040  C3D6E5C5  F0F0F0F9*
02C5E2C4  40404040  40400010  40400003  C9C2C3D6  D47B4040  02000000
40000000  40404040  40404040  40404040  40404040  40404040  40404040
40404040  40404040  40404040  40404040  C3D6E5C5  F0F0F1F0**
02E3E7E3  40000208  4040000C  40400001  00000000  00000000  00000000
40404040  40404040  40404040  40404040  40404040  40404040  40404040
40404040  40404040  40404040  40404040  C3D6E5C5  F0F0F1F1*
02E3E7E3  40000218  40400004  40400001  00000000  40404040  40404040
40404040  40404040  40404040  40404040  40404040  40404040  40404040
40404040  40404040  40404040  40404040  C3D6E5C5  F0F0F1F2*
02E3E7E3  4000023C  40400038  40400001  58A0D0D0  58B0D0C8  5890D090
5880D084  58F0D0C0  4110D04C  05EF5800  D0AC8609  D2B45850  D0A85830
D0B01435  8639D2B4  5820D0B8  14258629  C3D6E5C5  F0F0F1F3*
02E3E7E3  40000274  40400038  40400001  D2B45840  D0A85830  D0B41434
8639D2A4  5820D0BC  14248629  D2A45800  D0A88609  D2A45820  D0B05020
D0E05830  D0BC1432  8639D2B4  5420D0B8  C3D6E5C5  F0F0F1F4*
02E3E7E3  400002AC  40400038  40400001  8629D1D4  5870D0B0  5860D0B4
18361437  8639D2D4  8679D228  5820D0B8  14265420  D0BC8629  D2B45820
D0B45020  D0EC5830  D0BC1432  8639D2A4  C3D6E5C5  F0F0F1F5*
02E3E7E3  400002E4  40400038  40400001  5420D0B8  8629D264  5800D0B4
8609D2C4  5800D0B8  8609D2E0  58F0D0C4  45E0F004  00000006  00000088
45E0F010  5080D098  1BFF58E0  D00007FE  C3D6E5C5  F0F0F1F6*
02E3E7E3  4000031C  40400038  40400001  58F0D0C0  4110D060  05EF5800
D0BC8609  D2E05800  D0A88609  D2E05820  D0B45020  D0F05830  D0B01432
8639D2D4  5420D0B8  8629D2D4  58F0D0C4  C3D6E5C5  F0F0F1F7*
02E3E7E3  40000354  40400038  40400001  45E0F004  00000006  000000B6
45E0F010  5080D098  1BFF58E0  D00007FE  58F0D0C0  4110D060  05EF5800
D0B08609  D2D45800  D0A88609  D2E058F0  C3D6E5C5  F0F0F1F8*
02E3E7E3  4000038C  40400038  40400001  D0C41800  45E0F004  00000006
000000E5  45E0F010  5080D098  1BFF58E0  D00007FE  58F0D0C0  4110D060
05EF5800  D0A88609  D2E05820  D0B05420  C3D6E5C5  F0F0F1F9*
02E3E7E3  400003C4  40400038  40400001  D0B48629  D2D458F0  D0C41800

MEMBER NAME  COVER
45E0F004  00000006  00000114  45E0F010  5080D098  1BFF58E0  D00007FE
5800D078  5000D098  1BFF58E0  D00007FE  C3D6E5C5  F0F0F2F0**
02E3E7E3  400003FC  40400038  40400001  5800D07C  5000D098  1BFF58E0
D00007FE  5800D080  5000D098  1BFF58E0  D00007FE  5080D098  1BFF58E0
D00007FE  5800D088  5000D098  1BFF58E0  C3D6E5C5  F0F0F2F1*
02E3E7E3  40000434  40400038  40400001  D00007FE  58A0D004  58E0A00C
58B0A018  5810B004  5820D0A0  50201000  5830B00C  5840D0A4  50403000
5850B010  5860D098  50605000  18DA92FF  C3D6E5C5  F0F0F2F2*
02E3E7E3  4000046C  40400038  40400001  A00C982C  A01C07FE  987A1004
58207000  5020D0A0  58209000  5020D0A4  5820A000  5020D098  58201000
41302000  41500004  1B255C40  D07C1B25  C3D6E5C5  F0F0F2F3*
02E3E7E3  400004A4  40400038  40400001  5020D0C8  5030D0CC  5030D04C
5030D068  58201008  41302000  41500004  1B255C40  D07C1B25  5020D0D0
5030D0D4  5030D054  5030D060  47F0D0F4  C3D6E5C5  F0F0F2F4*
02E3E7E3  40000020  40400008  40400001  00000474  00000148  40404040
40404040  40404040  40404040  40404040  40404040  40404040  40404040
40404040  40404040  40404040  40404040  C3D6E5C5  F0F0F2F5*
02D9D3C4  40404040  40400038  40404040  00020001  1C000208  00030001
1C00020C  00010001  0C000308  00010001  0C00035C  00010001  0C000398
00010001  0C0003D8  00010001  0C000020  C3D6E5C5  F0F0F2F6*
02E3E7E3  40000148  40400004  40400001  00000438  40404040  40404040
40404040  40404040  40404040  40404040  40404040  40404040  40404040
```

```
40404040  40404040  40404040  40404040  C3D6E5C5  F0F0F2F7*
02E3E7E3  40000198  40400004  40400001  000001E8  40404040  40404040
40404040  40404040  40404040  40404040  40404040  40404040  40404040
40404040  40404040  40404040  40404040  C3D6E5C5  F0F0F2F8*
02E3E7E3  400001A0  40400008  40400001  000001EC  800001F0  40404040
40404040  40404040  40404040  40404040  40404040  40404040  40404040
40404040  40404040  40404040  40404040  C3D6E5C5  F0F0F2F9*
02E3E7E3  400001AC  40400004  40400001  000001EC  40404040  40404040
40404040  40404040  40404040  40404040  40404040  40404040  40404040
40404040  40404040  40404040  40404040  C3D6E5C5  F0F0F3F0**
02E3E7E3  400001B4  40400008  40400001  000001E8  800001F0  40404040
40404040  40404040  40404040  40404040  40404040  40404040  40404040
40404040  40404040  40404040  40404040  C3D6E5C5  F0F0F3F1*
02D9D3C4  40404040  40400038  40404040  00010001  0C000024  00010001
0C000148  00010001  0C000198  00010001  0C0001A0  00010001  0C0001A4
00010001  0C0001AC  00010001  0C0001B4  C3D6E5C5  F0F0F3F2*
02E3E7E3  40000220  4040001C  40400001  00000000  00000000  00000000
00000000  00000000  005C0003  00000000  40404040  40404040  40404040
40404040  40404040  40404040  40404040  C3D6E5C5  F0F0F3F3*
02D9D3C4  40404040  40400008  40404040  00010001  0C0001B8  40404040
40404040  40404040  40404040  40404040  40404040  40404040  40404040
40404040  40404040  40404040  40404040  C3D6E5C5  F0F0F3F4*
02C5D5C4  40404040  40404040  40404040  40404040  40404040  40404040
000004DC  F1F5F7F3  F460C6D6  F34040F0  F2F0F2F8  F7F0F9F8  40F0F84B
F1F44BF0  F8404040  C3D6E5C5  D9404040  C3D6E5C5  F0F0F3F5**

MEMBER NAME   CNDCHN
02C5E2C4  40404040  40400010  40400001  C3D5C4C3  C8D54040  00000000
40000000  40404040  40404040  40404040  40404040  40404040  40404040
40404040  40404040  40404040  40404040  C3D5C4C3  F0F0F0F1*
02E3E7E3  40000000  40400038  40400001  47F0F00C  07C3D5C4  C3C8D540
90ECD00C  184D98CD  F0205040  D00450D0  400807FC  40404040  40404040
E4D5C1C2  D3C540E3  D640C3C8  C1C9D540  C3D5C4C3  F0F0F0F2*
02E3E7E3  40000130  40400038  40400001  00000000  00000000  00000001
00000001  00000002  00000003  00000005  00000006  00000008  0000000E
0000000F  0000083F  401DF3B6  4029FBE7  C3D5C4C3  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  C3D5C4C3  F0F0F0F4*
02E3E7E3  40000168  40400014  40400001  403EF9DB  40400000  41100000
00000000  00000000  40404040  40404040  40404040  40404040  40404040
40404040  40404040  40404040  40404040  C3D5C4C3  F0F0F0F5*
02C5E2C4  40404040  40400010  40400003  C3C1C4D7  E3404040  02000000
40000000  40404040  40404040  40404040  40404040  40404040  40404040
40404040  40404040  40404040  40404040  C3D5C4C3  F0F0F0F6*
02C5E2C4  40404040  40400010  40400004  D4E5C3C8  D9404040  02000000
40000000  40404040  40404040  40404040  40404040  40404040  40404040
40404040  40404040  40404040  40404040  C3D5C4C3  F0F0F0F7*
02E3E7E3  40000510  4040000C  40400001  00000000  00000000  00000000
40404040  40404040  40404040  40404040  40404040  40404040  40404040
40404040  40404040  40404040  40404040  C3D5C4C3  F0F0F0F8*
02C5E2C4  40404040  40400010  40400005  C3C1C4C3  C9D94040  02000000
40000000  40404040  40404040  40404040  40404040  40404040  40404040
40404040  40404040  40404040  40404040  C3D5C4C3  F0F0F0F9*
02E3E7E3  40000520  40400008  40400001  00000000  00000000  40404040
40404040  40404040  40404040  40404040  40404040  40404040  40404040
40404040  40404040  40404040  40404040  C3D5C4C3  F0F0F1F0**
02C5E2C4  40404040  40400010  40400006  C3C1C4E2  E4D74040  02000000
40000000  40404040  40404040  40404040  40404040  40404040  40404040
```

```
40404040  40404040  40404040  40404040  C3D5C4C3  F0F0F1F1*
02C5E2C4  40404040  40400010  40400007  C3C8C1C9  D5F14040  02000000
40000000  40404040  40404040  40404040  40404040  40404040  40404040
40404040  40404040  40404040  40404040  C3D5C4C3  F0F0F1F2*
02E3E7E3  4000052C  4040000C  40400001  00000000  00000000  00000000
40404040  40404040  40404040  40404040  40404040  40404040  40404040
40404040  40404040  40404040  40404040  C3D5C4C3  F0F0F1F3*
02E3E7E3  40000584  40400038  40400001  58B0D104  7800D138  7000D1A8
5800D0F8  5000D194  5800D11C  5000D170  5800D10C  5000D154  5800D110
5000D158  50B0D150  5800D168  5000D15C  C3D5C4C3  F0F0F1F4*
02E3E7E3  400005BC  40400038  40400001  5800D0FC  5000D17C  18205000
D1907800  D1347000  D1885800  D5445000  D53C5800  D5485000  D5405870
D510189B  18B258A0  D4EC5880  D4D85800  C3D5C4C3  F0F0F1F5*
02E3E7E3  400005F4  40400038  40400001  D17C5900  D1684750  D5CE50B0
D19047F0  D8C85850  D1505C40  D5145050  D52C1825  5A20D534  4102A000
5000D06C  58F0D4FC  4110D06C  05EF41E0  C3D5C4C3  F0F0F1F6*
02E3E7E3  4000062C  40400038  40400001  000415FE  4720D602  58EFD04C
07FE47F0  D8625800  D1005000  D19412BB  4780D80C  5850D150  5C40D514
18251A27  7802A000  7000D518  18255A20  C3D5C4C3  F0F0F1F7*
02E3E7E3  40000664  40400038  40400001  D51C7802  A0007000  D5205820
D1185860  D1181889  189258A0  D10458F0  D4D87840  F0041878  7820D518
7B29D1A4  30623964  4730D688  7820D520  C3D5C4C3  F0F0F1F8*
02E3E7E3  4000069C  40400038  40400001  7B29D1A8  30623964  4730D688
5070D174  5880D4D8  58A0D4EC  5890D104  5870D510  47F0D6D2  1A96878A
D64E5070  D1745880  D4D858A0  D4EC5890  C3D5C4C3  F0F0F1F9*
02E3E7E3  400006D4  40400038  40400001  D1045870  D5101AB9  183B8930

MEMBER NAME   CNDCHN
00035820  D52C1A27  4103D1A4  5000D090  4102A000  5000D094  9280D094
58F0D4E8  4110D08C  05EF47F0  D71A59B0  C3D5C4C3  F0F0F2F0**
02E3E7E3  4000070C  40400038  40400001  D1744780  D718182B  5B20D174
89200003  5020D16C  5830D174  89300003  5820D174  1A298920  00034103
D1A45000  D09C4102  D1A45000  D0A09280  C3D5C4C3  F0F0F2F1*
02E3E7E3  40000744  40400038  40400001  D0A058F0  D4E84110  D09805EF
1BB97800  D1987000  D5047800  D19C7000  D5085820  D1185860  D1181889
189258A0  D10458F0  D4D87840  F0041878  C3D5C4C3  F0F0F2F2*
02E3E7E3  4000077C  40400038  40400001  7820D504  7B29D1A4  30623964
4730D77C  7820D508  7B29D1A8  30623964  4730D77C  5070D174  5880D4D8
58A0D4EC  5890D104  5870D510  47F0D7C0  C3D5C4C3  F0F0F2F3*
02E3E7E3  400007B4  40400038  40400001  1A96878A  D7425070  D1745880
D4D858A0  D4EC5890  D1045870  D5101AB9  182B8920  00034102  D1A45000
D0904100  D1985000  D0949280  D09458F0  C3D5C4C3  F0F0F2F4*
02E3E7E3  400007EC  40400038  40400001  D4E84110  D08C05EF  47F0D8A0
59B0D174  4780D806  182B5B20  D1748920  00035020  D16C5830  D1748930
00035820  D1741A29  89200003  4103D1A4  C3D5C4C3  F0F0F2F5*
02E3E7E3  40000824  40400038  40400001  5000D09C  4102D1A4  5000D0A0
9280D0A0  58F0D4E8  4110D098  05EF1BB9  47F0D8A0  1AB9184B  89400003
5830D52C  1A374104  D1A45000  D0904103  C3D5C4C3  F0F0F2F6*
02E3E7E3  4000085C  40400038  40400001  A0005000  D0949280  D09458F0
D4E84110  D08C05EF  1AB9182B  89200003  4102D1A4  5000D090  4100D198
5000D094  9280D094  58F0D4E8  4110D08C  C3D5C4C3  F0F0F2F7*
02E3E7E3  40000894  40400038  40400001  05EF47F0  D8A058E0  D53C5800
D15058F0  D4E0500E  F00058E0  D5405800  D184500E  F0005800  D5405A00
D1185000  D5405800  D53C5A00  D1185000  C3D5C4C3  F0F0F2F8*
02E3E7E3  400008CC  40400038  40400001  D53C5800  D1781A09  5000D178
5800D15C  5B00D184  5000D15C  5800D17C  5A00D184  5000D17C  5800D150
5A00D184  5000D150  47F0D5BA  58B0D104  C3D5C4C3  F0F0F2F9*
02E3E7E3  40000904  40400038  40400001  5800D194  1BFF860F  D8DE1BFF
58E0D000  07FE185B  186B5870  D1085880  D11858A0  D1187808  D1A47000
```

| | | | | | | |
|---|---|---|---|---|---|---|
| D5247808 | D1A87000 | D52858B0 | D19089B0 | C3D5C4C3 | F0F0F3F0** | |
| 02E3E7E3 | 4000093C | 40400038 | 40400001 | 00031837 | 89300003 | 18937840 |
| D1887820 | D5247B29 | D1A43062 | 39644730 | D9367820 | D5287B29 | D1A83062 |
| 39644730 | D93647F0 | D950879A | D9125970 | C3D5C4C3 | F0F0F3F1* | |
| 02E3E7E3 | 40000974 | 40400038 | 40400001 | D1904770 | D94647F0 | D9AA1A56 |
| 1A8A1A76 | 47F0D8EE | 5840D190 | 1B461804 | 89000003 | 5000D16C | 18351A36 |
| 89300003 | 4108D1A4 | 5000D09C | 4103D1A4 | C3D5C4C3 | F0F0F3F2* | |
| 02E3E7E3 | 400009AC | 40400038 | 40400001 | 5000D0A0 | 9280D0A0 | 58F0D4E8 |
| 4110D098 | 05EF5970 | D1904770 | D99247F0 | D99C1824 | 5040D190 | 47F0D8EE |
| 58B0D104 | 5800D190 | 1B0B5000 | D19058B0 | C3D5C4C3 | F0F0F3F3* | |
| 02E3E7E3 | 400009E4 | 40400038 | 40400001 | D1045820 | D1908920 | 00035890 |
| D11818B2 | 4109D1A4 | 5000D0A4 | 4109D1A8 | 5000D0A8 | 58F0D4F8 | 4110D0A4 |
| 05EF41E0 | 000415FE | 4720D9E6 | 58EFD054 | C3D5C4C3 | F0F0F3F4* | |
| 02E3E7E3 | 40000A1C | 40400038 | 40400001 | 07FE4100 | D1A05000 | D0904109 |
| D1A45000 | D0949280 | D09458F0 | D4E84110 | D08C05EF | 58F0D4F4 | 4110D0EC |
| 05EF41E0 | 000415FE | 4720DA1E | 58EFD05C | C3D5C4C3 | F0F0F3F5* | |
| 02E3E7E3 | 40000A54 | 40400038 | 40400001 | 07FE58F0 | D4DC4110 | D0F005EF |
| 41E00004 | 15FE4720 | DA3858EF | D06407FE | 5A90D118 | 199B47C0 | D9BC58B0 |
| D10441F0 | 000458E0 | D00007FE | 58A0D004 | C3D5C4C3 | F0F0F3F6* | |
| 02E3E7E3 | 40000A8C | 40400038 | 40400001 | 58E0A00C | 58B0A018 | 5810B008 |
| 5820D178 | 50201000 | 18DA92FF | A00C982C | A01C07FE | 98791004 | 58207000 |
| 5020D168 | 58208000 | 5020D178 | 58201000 | C3D5C4C3 | F0F0F3F7* | |
| 02E3E7E3 | 40000AC4 | 40400038 | 40400001 | 41302000 | 41500004 | 1B255C40 |
| D11C1B25 | 5020D4EC | 5030D4F0 | 5820100C | 41302000 | 41500004 | 1B255C40 |
| D1081B25 | 5020D4E0 | 5030D4E4 | 47F0D54C | C3D5C4C3 | F0F0F3F8* | |
| 02E3E7E3 | 40000020 | 40400008 | 40400001 | 00000AAC | 00000038 | 40404040 |
| 40404040 | 40404040 | 40404040 | 40404040 | 40404040 | 40404040 | 40404040 |

MEMBER NAME CNDCHN

| | | | | | | |
|---|---|---|---|---|---|---|
| 40404040 | 40404040 | 40404040 | 40404040 | C3D5C4C3 | F0F0F3F9* | |
| 02D9D3C4 | 40404040 | 40400038 | 40404040 | 00020001 | 0C000510 | 00030001 |
| 1C000514 | 00040001 | 1C000520 | 00050001 | 1C00052C | 00060001 | 1C000530 |
| 00070001 | 1C000534 | 00010001 | 0C000020 | C3D5C4C3 | F0F0F4F0** | |
| 02E3E7E3 | 40000038 | 40400004 | 40400001 | 00000A88 | 40404040 | 40404040 |
| 40404040 | 40404040 | 40404040 | 40404040 | 40404040 | 40404040 | 40404040 |
| 40404040 | 40404040 | 40404040 | 40404040 | C3D5C4C3 | F0F0F4F1* | |
| 02E3E7E3 | 40000084 | 40400018 | 40400001 | 0000063A | 0000063E | 00000A1E |
| 00000A70 | 00000A56 | 00000A70 | 40404040 | 40404040 | 40404040 | 40404040 |
| 40404040 | 40404040 | 40404040 | 40404040 | C3D5C4C3 | F0F0F4F2* | |
| 02D9D3C4 | 40404040 | 40400038 | 40404040 | 00010001 | 0C000024 | 00010001 |
| 0C000038 | 00010001 | 0C000084 | 00010001 | 0C000088 | 00010001 | 0C00008C |
| 00010001 | 0C000090 | 00010001 | 0C000094 | C3D5C4C3 | F0F0F4F3* | |
| 02E3E7E3 | 4000009C | 40400008 | 40400001 | 00000A70 | 00000A70 | 40404040 |
| 40404040 | 40404040 | 40404040 | 40404040 | 40404040 | 40404040 | 40404040 |
| 40404040 | 40404040 | 40404040 | 40404040 | C3D5C4C3 | F0F0F4F4* | |
| 02E3E7E3 | 400000A8 | 40400014 | 40400001 | 000001A8 | 00000194 | 000001BC |
| 0000018C | 00000190 | 40404040 | 40404040 | 40404040 | 40404040 | 40404040 |
| 40404040 | 40404040 | 40404040 | 40404040 | C3D5C4C3 | F0F0F4F5* | |
| 02D9D3C4 | 40404040 | 40400038 | 40404040 | 00010001 | 0C000098 | 00010001 |
| 0C00009C | 00010001 | 0C0000A0 | 00010001 | 0C0000A8 | 00010001 | 0C0000AC |
| 00010001 | 0C0000B0 | 00010001 | 0C0000B4 | C3D5C4C3 | F0F0F4F6* | |
| 02E3E7E3 | 400000BC | 4040000C | 40400001 | 00000004 | 800001D0 | 00000150 |
| 40404040 | 40404040 | 40404040 | 40404040 | 40404040 | 40404040 | 40404040 |
| 40404040 | 40404040 | 40404040 | 40404040 | C3D5C4C3 | F0F0F4F7* | |
| 02E3E7E3 | 400000CC | 40400008 | 40400001 | 80000000 | 000001A4 | 40404040 |
| 40404040 | 40404040 | 40404040 | 40404040 | 40404040 | 40404040 | 40404040 |
| 40404040 | 40404040 | 40404040 | 40404040 | C3D5C4C3 | F0F0F4F8* | |
| 02E3E7E3 | 400000D8 | 40400004 | 40400001 | 80000000 | 40404040 | 40404040 |
| 40404040 | 40404040 | 40404040 | 40404040 | 40404040 | 40404040 | 40404040 |

```
40404040  40404040  40404040  40404040  C3D5C4C3  F0F0F4F9*
02E3E7E3  400000E4  4040000C  40400001  00000134  00000158  00000164
40404040  40404040  40404040  40404040  40404040  40404040  40404040
40404040  40404040  40404040  40404040  C3D5C4C3  F0F0F5F0**
02D9D3C4  40404040  40400038  40404040  00010001  0C0000B8  00020001
0C0000BC  00010001  0C0000C0  00010001  0C0000C4  00010001  0C0000D0
00010001  0C0000E4  00010001  0C0000E8  C3D5C4C3  F0F0F5F1*
02E3E7E3  400000F0  4040001C  40400001  00000160  00000028  00000134
00000134  00000134  00000134  0000013C  40404040  40404040  40404040
40404040  40404040  40404040  40404040  C3D5C4C3  F0F0F5F2*
02D9D3C4  40404040  40400038  40404040  00010001  0C0000EC  00010001
0C0000F0  00010001  0C0000F4  00010001  0C0000F8  00010001  0C0000FC
00010001  0C000100  00010001  0C000104  C3D5C4C3  F0F0F5F3*
02E3E7E3  4000010C  4040001C  40400001  00000144  00000134  00000134
00000164  00000168  80000134  800001D8  40404040  40404040  40404040
40404040  40404040  40404040  40404040  C3D5C4C3  F0F0F5F4*
02D9D3C4  40404040  40400038  40404040  00010001  0C000108  00010001
0C00010C  00010001  0C000110  00010001  0C000114  00010001  0C000118
00010001  0C00011C  00010001  0C000120  C3D5C4C3  F0F0F5F5*
02E3E7E3  40000128  40400008  40400001  00000140  800001D8  40404040
40404040  40404040  40404040  40404040  40404040  40404040  40404040
40404040  40404040  40404040  40404040  C3D5C4C3  F0F0F5F6*
02E3E7E3  40000538  40400038  40400001  00000000  00000000  00000000
00000000  00000014  00000038  00000000  00000018  00000000  00000000
00000000  00CC000F  00000000  00000004  C3D5C4C3  F0F0F5F7*
02E3E7E3  40000570  40400014  40400001  00000000  03A40011  03380012
0000000C  00000010  40404040  40404040  40404040  40404040  40404040
40404040  40404040  40404040  40404040  C3D5C4C3  F0F0F5F8*

MEMBER NAME  CNDCHN
02D9D3C4  40404040  40400018  40404040  00010001  0C000124  00010001
0C000128  00010001  0C00012C  40404040  40404040  40404040  40404040
40404040  40404040  40404040  40404040  C3D5C4C3  F0F0F5F9*
02C5D5C4  40404040  40404040  40404040  40404040  40404040  40404040
00000AFC  F1F5F7F3  F460C6D6  F34040F0  F2F0F2F8  F7F0F9F8  40F0F84B
F1F44BF1  F2404040  C3D5C4C3  C8D54040  C3D5C4C3  F0F0F6F0**

MEMBER NAME  CNTRD
02C5E2C4  40404040  40400010  40400001  C3D5E3D9  C4404040  00000000
40000000  40404040  40404040  40404040  40404040  40404040  40404040
40404040  40404040  40404040  40404040  C3D5E3D9  F0F0F0F1*
02E3E7E3  40000000  40400028  40400001  47F0F00C  07C3D5E3  D9C44040
90ECD00C  184D98CD  F0205040  D00450D0  400807FC  40404040  40404040
40404040  40404040  40404040  40404040  C3D5E3D9  F0F0F0F2*
02E3E7E3  40000078  40400038  40400001  41100000  00000000  00000000
00000000  41200000  00000000  41600000  00000000  00000000  00000001
00000002  00000006  41100000  41200000  C3D5E3D9  F0F0F0F3*
02E3E7E3  400000B0  40400008  40400001  00000000  00000000  40404040
40404040  40404040  40404040  40404040  40404040  40404040  40404040
40404040  40404040  40404040  40404040  C3D5E3D9  F0F0F0F4*
02E3E7E3  40000110  40400004  40400001  00000000  40404040  40404040
40404040  40404040  40404040  40404040  40404040  40404040  40404040
40404040  40404040  40404040  40404040  C3D5E3D9  F0F0F0F5*
02E3E7E3  40000134  40400038  40400001  58B0D0E8  5880D074  5820D0C0
89200002  5850D0AC  89500002  1C481A25  7822B000  7020D0E0  5820D0C4
89200002  5850D0AC  89500002  1C481A25  C3D5E3D9  F0F0F0F6*
02E3E7E3  4000016C  40400038  40400001  7822B000  7020D0E4  6800D058
6000D0D8  6000D0D0  6000D0C8  5870D0A8  1B781828  7800D0E0  7000D0F4
7800D0E4  7000D0F8  18925820  D0C08920  C3D5E3D9  F0F0F0F7*
```

```
02E3E7E3  400001A4  40400038  40400001  00025850  D0AC8950  00021C49
1A257842  B0007B40  D0F47040  D0985830  D0C08930  000218A9  1AA85850
D0AC8950  00021C4A  1A357803  B0007B00  C3D5E3D9  F0F0F0F8*
02E3E7E3  400001DC  40400038  40400001  D0F47000  D09C5830  D0C48930
00025850  D0AC8950  00021C49  1A357863  B0007B60  D0F87060  D0A05830
D0C48930  00025850  D0AC8950  00021C4A  C3D5E3D9  F0F0F0F9*
02E3E7E3  40000214  40400038  40400001  1A357823  B0007B20  D0F83C42
7040D0FC  2B003804  28406A40  D0D86040  D1007840  D09C3C46  7040D108
2B003804  28406860  D1002B64  6060D0D8  C3D5E3D9  F0F0F1F0**
02E3E7E3  4000024C  40400038  40400001  7840D09C  7A40D098  7040D100
7800D0FC  7B00D108  7000D0FC  7840D100  3C402B00  38042840  6A40D0C8
6040D0C8  7A20D0A0  7C20D0FC  2B003802  C3D5E3D9  F0F0F1F1*
02E3E7E3  40000284  40400038  40400001  28206A20  D0D06020  D0D0189A
19A747C0  D1766860  D0D86D60  D0606060  D0D86C60  D0686840  D0C82D46
2B227820  D0F42804  2A027000  D0B06840  C3D5E3D9  F0F0F1F2*
02E3E7E3  400002BC  40400038  40400001  D0D02D46  2B667860  D0F82804
2A067000  D0B46820  D0D82022  28026C00  D0507000  D0B81BFF  58E0D000
07FE58A0  D00458E0  A00C58B0  A0185810  C3D5E3D9  F0F0F1F3*
02E3E7E3  400002F4  40400038  40400001  B0147820  D0B87020  10005820
B0187840  D0B07040  20005830  B01C7860  D0B47060  300018DA  92FFA00C
982CA01C  07FE987B  10045820  70005020  C3D5E3D9  F0F0F1F4*
02E3E7E3  4000032C  40400038  40400001  D0AC5820  80005020  D0A85820
90005020  D0C05820  A0005020  D0C47820  B0007020  D0B89878  10187820
70007020  D0B07820  80007020  D0B45820  C3D5E3D9  F0F0F1F5*
02E3E7E3  40000364  4040001E  40400001  10004130  20004150  00041B25
5C40D0AC  1B255020  D0E85030  D0EC47F0  D10C4040  40404040  40404040
40404040  40404040  40404040  40404040  C3D5E3D9  F0F0F1F6*
02E3E7E3  40000020  4040000C  40400001  00000322  00000028  000002E6
40404040  40404040  40404040  40404040  40404040  40404040  40404040
40404040  40404040  40404040  40404040  C3D5E3D9  F0F0F1F7*
02E3E7E3  40000118  4040001C  40400001  00000000  00000000  00000000
00000000  00000000  00000000  00000000  40404040  40404040  40404040
40404040  40404040  40404040  40404040  C3D5E3D9  F0F0F1F8*
02D9D3C4  40404040  40400018  40404040  00010001  0C000020  00010001
0C000024  00010001  0C000028  40404040  40404040  40404040  40404040
40404040  40404040  40404040  40404040  C3D5E3D9  F0F0F1F9*
02C5D5C4  40404040  40404040  40404040  40404040  40404040  40404040

MEMBER NAME  CNTRD
00000382  F1F5F7F3  F460C6D6  F34040F0  F2F0F2F8  F7F0F9F8  40F0F84B
F1F44BF1  F7404040  C3D5E3D9  C4404040  C3D5E3D9  F0F0F2F0**

MEMBER NAME  CMPRSS
02C5E2C4  40404040  40400010  40400001  C3D4D7D9  E2E24040  00000000
40000000  40404040  40404040  40404040  40404040  40404040  40404040
40404040  40404040  40404040  40404040  C3D4D7D9  F0F0F0F1*
02E3E7E3  40000000  40400038  40400001  47F0F00C  07C3D4D7  D9E2E240
90ECD00C  184D98CD  F0205040  D00450D0  400807FC  40404040  40404040
021A2540  C5D9D9D6  D940C9D5  40C2C3E2  C3D4D7D9  F0F0F0F2*
02E3E7E3  40000038  40400019  40400001  D3C9C240  C9D540C3  D4D7D9E2
E240E2E4  C2D9D6E4  E3C9D5C5  22404040  40404040  40404040  40404040
40404040  40404040  40404040  40404040  C3D4D7D9  F0F0F0F3*
02E3E7E3  40000058  40400008  40400001  40404040  40404040  40404040
40404040  40404040  40404040  40404040  40404040  40404040  40404040
40404040  40404040  40404040  40404040  C3D4D7D9  F0F0F0F4*
02E3E7E3  400000D8  40400010  40400001  00000000  00000001  00000000
00000000  40404040  40404040  40404040  40404040  40404040  40404040
40404040  40404040  40404040  40404040  C3D4D7D9  F0F0F0F5*
02C5E2C4  40404040  40400010  40400002  D4E5C3C8  D9404040  02000000
```

| | | | | | | |
|---|---|---|---|---|---|---|
| 40000000 | 40404040 | 40404040 | 40404040 | 40404040 | 40404040 | 40404040 |
| 40404040 | 40404040 | 40404040 | 40404040 | C3D4D7D9 | F0F0F0F6* | |
| 02E3E7E3 | 40000100 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3D4D7D9 | F0F0F0F7* | |
| 02C5E2C4 | 40404040 | 40400010 | 40400003 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | C3D4D7D9 | F0F0F0F8* | |
| 02E3E7E3 | 40000108 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | C3D4D7D9 | F0F0F0F9* | |
| 02C5E2C4 | 40404040 | 40400010 | 40400004 | D2D6D4D7 | D9E54040 | 02000000 |
| 40000000 | 40404040 | 40404040 | 40404040 | 40404040 | 40404040 | 40404040 |
| 40404040 | 40404040 | 40404040 | 40404040 | C3D4D7D9 | F0F0F1F0** | |
| 02E3E7E3 | 40000114 | 40400038 | 40400001 | 00000000 | 00000000 | 5890D0AC |
| 58B0D0A0 | 5880D07C | 5870D078 | 5070D08C | 18A8410A | B0005000 | D05458F0 |
| D0B84110 | D05405EF | 41E00004 | 15FE4720 | C3D4D7D9 | F0F0F1F1* | |
| 02E3E7E3 | 4000014C | 40400038 | 40400001 | D0F458EF | D04C07FE | 5800D098 |
| 12004780 | D12C5800 | D08C5A00 | D07C5000 | D08C58E0 | D08C410E | 90005000 |
| D070410A | B0005000 | D0749280 | D07458F0 | C3D4D7D9 | F0F0F1F2* | |
| 02E3E7E3 | 40000184 | 40400038 | 40400001 | D0A84110 | D06C05EF | 5AA0D07C |
| 59A0D090 | 47C0D0D2 | 5800D08C | 12004770 | D14C41F0 | 000458E0 | D00007FE |
| 1BFF58E0 | D00007FE | 58F0D0B4 | 45E0F004 | C3D4D7D9 | F0F0F1F3* | |
| 02E3E7E3 | 400001BC | 40400038 | 40400001 | 00000006 | 00000028 | 45E0F010 |
| 1BFF58E0 | D00007FE | 58A0D004 | 58E0A00C | 58B0A018 | 5810B00C | 5820D08C |
| 50201000 | 18DA92FF | A00C982C | A01C07FE | C3D4D7D9 | F0F0F1F4* | |
| 02E3E7E3 | 400001F4 | 40400038 | 40400001 | 98791004 | 58207000 | 5020D090 |
| 58209000 | 5020D08C | 58201000 | 41302000 | 41500001 | 1B255020 | D0A05030 |
| D0A45820 | 10084130 | 20004150 | 00011B25 | C3D4D7D9 | F0F0F1F5* | |
| 02E3E7E3 | 4000022C | 4040000C | 40400001 | 5020D0AC | 5030D0B0 | 47F0D0BC |
| 40404040 | 40404040 | 40404040 | 40404040 | 40404040 | 40404040 | 40404040 |
| 40404040 | 40404040 | 40404040 | 40404040 | C3D4D7D9 | F0F0F1F6* | |
| 02E3E7E3 | 40000020 | 40400008 | 40400001 | 000001F4 | 00000060 | 40404040 |
| 40404040 | 40404040 | 40404040 | 40404040 | 40404040 | 40404040 | 40404040 |
| 40404040 | 40404040 | 40404040 | 40404040 | C3D4D7D9 | F0F0F1F7* | |
| 02E3E7E3 | 40000060 | 40400004 | 40400001 | 000001D0 | 40404040 | 40404040 |
| 40404040 | 40404040 | 40404040 | 40404040 | 40404040 | 40404040 | 40404040 |
| 40404040 | 40404040 | 40404040 | 40404040 | C3D4D7D9 | F0F0F1F8* | |
| 02E3E7E3 | 400000AC | 40400004 | 40400001 | 00000154 | 40404040 | 40404040 |
| 40404040 | 40404040 | 40404040 | 40404040 | 40404040 | 40404040 | 40404040 |
| 40404040 | 40404040 | 40404040 | 40404040 | C3D4D7D9 | F0F0F1F9* | |
| 02D9D3C4 | 40404040 | 40400038 | 40404040 | 00020001 | 1C000108 | 00030001 |

MEMBER NAME CMPRSS

| | | | | | | |
|---|---|---|---|---|---|---|
| 1C000114 | 00040001 | 1C000118 | 00010001 | 0C0001C0 | 00010001 | 0C000020 |
| 00010001 | 0C000024 | 00010001 | 0C000060 | C3D4D7D9 | F0F0F2F0** | |
| 02E3E7E3 | 400000B0 | 40400004 | 40400001 | 000001B4 | 40404040 | 40404040 |
| 40404040 | 40404040 | 40404040 | 40404040 | 40404040 | 40404040 | 40404040 |
| 40404040 | 40404040 | 40404040 | 40404040 | C3D4D7D9 | F0F0F2F1* | |
| 02E3E7E3 | 400000B8 | 40400018 | 40400001 | 000000DC | 00000058 | 000000DC |
| 000000DC | 800000F8 | 000000DC | 40404040 | 40404040 | 40404040 | 40404040 |
| 40404040 | 40404040 | 40404040 | 40404040 | C3D4D7D9 | F0F0F2F2* | |
| 02D9D3C4 | 40404040 | 40400038 | 40404040 | 00010001 | 0C0000AC | 00010001 |
| 0C0000B0 | 00010001 | 0C0000B8 | 00010001 | 0C0000BC | 00010001 | 0C0000C0 |
| 00010001 | 0C0000C4 | 00010001 | 0C0000C8 | C3D4D7D9 | F0F0F2F3* | |
| 02E3E7E3 | 400000D4 | 40400004 | 40400001 | 80000000 | 40404040 | 40404040 |
| 40404040 | 40404040 | 40404040 | 40404040 | 40404040 | 40404040 | 40404040 |
| 40404040 | 40404040 | 40404040 | 40404040 | C3D4D7D9 | F0F0F2F4* | |
| 02D9D3C4 | 40404040 | 40400008 | 40404040 | 00010001 | 0C0000CC | 40404040 |

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | C3D4D7D9 | F0F0F2F5* | |
| 02C5D5C4 | 40404040 | 40404040 | 40404040 | 40404040 | 40404040 | 40404040 |
| 00000238 | F1F5F7F3 | F460C6D6 | F34040F0 | F2F0F2F8 | F7F0F9F8 | 40F0F84B |
| F1F44BF2 | F1404040 | C3D4D7D9 | E2E24040 | C3D4D7D9 | F0F0F2F6** | |

MEMBER NAME CWCCW

| | | | | | | |
|---|---|---|---|---|---|---|
| 02C5E2C4 | 40404040 | 40400010 | 40400001 | C3E6C3C3 | E6404040 | 00000000 |
| 40000000 | 40404040 | 40404040 | 40404040 | 40404040 | 40404040 | 40404040 |
| 40404040 | 40404040 | 40404040 | 40404040 | C3E6C3C3 | F0F0F0F1* | |
| 02E3E7E3 | 40000000 | 40400038 | 40400001 | 47F0F00C | 07C3E6C3 | C3E64040 |
| 90ECD00C | 184D98CD | F0205040 | D00450D0 | 400807FC | 40404040 | 40404040 |
| 021A2B40 | C140F1F8 | F040C4C5 | C7D9C5C5 | C3E6C3C3 | F0F0F0F2* | |
| 02E3E7E3 | 40000038 | 40400038 | 40400001 | 40C1D5C7 | D3C540C6 | D6E4D5C4 |
| 40C9D540 | D9D6E4E3 | C9D5C540 | C3E6C3C3 | E64B2202 | 1A1C40E4 | D5C1C2D3 |
| C540E3D6 | 40D6D9C4 | C5D940D7 | D6C3D2C5 | C3E6C3C3 | F0F0F0F3* | |
| 02E3E7E3 | 40000070 | 40400014 | 40400001 | E340E740 | 7E400A0A | 061A0540 |
| E8407E40 | 0A0A0622 | 40404040 | 40404040 | 40404040 | 40404040 | 40404040 |
| 40404040 | 40404040 | 40404040 | 40404040 | C3E6C3C3 | F0F0F0F4* | |
| 02E3E7E3 | 400000F0 | 40400020 | 40400001 | 00000000 | 00000000 | 00000001 |
| 00000002 | 41100000 | 41200000 | 00000000 | 00000000 | 40404040 | 40404040 |
| 40404040 | 40404040 | 40404040 | 40404040 | C3E6C3C3 | F0F0F0F5* | |
| 02C5E2C4 | 40404040 | 40400010 | 40400002 | E2D8D9E3 | 40404040 | 02000000 |
| 40000000 | 40404040 | 40404040 | 40404040 | 40404040 | 40404040 | 40404040 |
| 40404040 | 40404040 | 40404040 | 40404040 | C3E6C3C3 | F0F0F0F6* | |
| 02E3E7E3 | 40000160 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3E6C3C3 | F0F0F0F7* | |
| 02C5E2C4 | 40404040 | 40400010 | 40400003 | C1D9C3D6 | E2404040 | 02000000 |
| 40000000 | 40404040 | 40404040 | 40404040 | 40404040 | 40404040 | 40404040 |
| 40404040 | 40404040 | 40404040 | 40404040 | C3E6C3C3 | F0F0F0F8* | |
| 02C5E2C4 | 40404040 | 40400010 | 40400004 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | C3E6C3C3 | F0F0F0F9* | |
| 02E3E7E3 | 40000168 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | C3E6C3C3 | F0F0F1F0** | |
| 02E3E7E3 | 40000178 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C3E6C3C3 | F0F0F1F1* | |
| 02E3E7E3 | 4000019C | 40400038 | 40400001 | 58A0D0D8 | 58B0D070 | 5880D0FC |
| 7800D078 | 33007000 | D10C58F0 | D0E44110 | D04C05EF | 7000D110 | 7000D098 |
| 7800D06C | 7000D094 | 7000D09C | 5800D0C0 | C3E6C3C3 | F0F0F1F2* | |
| 02E3E7E3 | 400001D4 | 40400038 | 40400001 | 1B0B5000 | D0B87820 | D07C7C20 |
| D1107020 | D1007020 | D1047020 | D1087020 | D0F4189B | 58B0D0E8 | 18A95AA0 |
| D070183A | 5A30D070 | 5990D0B8 | 4750D188 | C3E6C3C3 | F0F0F1F3* | |
| 02E3E7E3 | 4000020C | 40400038 | 40400001 | 5830D074 | 187A1C68 | 18275A20 |
| D0F87862 | B0001859 | 1C481825 | 5A20D0F8 | 38267B22 | B0007020 | D0A81827 |
| 1A287842 | B0007040 | D10C1825 | 1A287B42 | C3E6C3C3 | F0F0F1F4* | |
| 02E3E7E3 | 40000244 | 40400038 | 40400001 | B0007040 | D0B01853 | 1C481825 |
| 5A20D0F8 | 33667A62 | B0007060 | D0AC1825 | 1A287862 | B0007B60 | D10C7060 |
| D0B43C22 | 3C447040 | D10C3A24 | 7020D110 | C3E6C3C3 | F0F0F1F5* | |
| 02E3E7E3 | 4000027C | 40400038 | 40400001 | 58F0D0E0 | 4110D050 | 05EF7820 |
| D0A83D20 | 7020D0A8 | 3C227A20 | D10C7020 | D10C58F0 | D0E04110 | D05405EF |
| 7000D110 | 7800D0B0 | 7D00D110 | 7000D0B0 | C3E6C3C3 | F0F0F1F6* | |
| 02E3E7E3 | 400002B4 | 40400038 | 40400001 | 7820D0AC | 3C227840 | D0B43C44 |
| 7040D10C | 3A247020 | D11058F0 | D0E04110 | D05805EF | 7820D0AC | 3D207020 |
| D0AC3C22 | 7A20D10C | 7020D10C | 58F0D0E0 | C3E6C3C3 | F0F0F1F7* | |
| 02E3E7E3 | 400002EC | 40400038 | 40400001 | 4110D05C | 05EF7000 | D1107800 |

```
D0B47D00  D1107000  D0B458F0  D0E44110  D06005EF  7000D0D0  58F0D0E4
4110D064  05EF7000  D0D47800  D0B03200  C3E6C3C3  F0F0F1F8*
02E3E7E3  40000324  40400038  40400001  47A0D2AC  7800D100  7B00D0D0
7000D0D0  7800D0B4  320047A0  D2C27800  D1047B00  D0D47000  D0D47820
D0D47B20  D0D07020  D0C847A0  D2DA7A20  C3E6C3C3  F0F0F1F9*
02E3E7E3  4000035C  40400038  40400001  D1087020  D0C87800  D0C87900

MEMBER NAME   CWCCW
D09847C0  D3027800  D0C87900  D0F447A0  D3027820  D0F47B20  D0C87A20
D0947020  D0947800  D0C83200  47C0D324  C3E6C3C3  F0F0F2F0**
02E3E7E3  40000394  40400038  40400001  7800D0C8  7900D098  47A0D324
7800D09C  7A00D0C8  7000D09C  7800D0C8  7900D098  4770D344  58F0D0F0
45E0F004  00000006  00000028  45E0F010  C3E6C3C3  F0F0F2F1*
02E3E7E3  400003CC  40400038  40400001  189A59A0  D0B847C0  D17058A0
D0D858B0  D0707800  D0947900  D09C47C0  D36A5800  D0685000  D0BC7800
D09C7900  D09447C0  D37A50B0  D0BC7820  C3E6C3C3  F0F0F2F2*
02E3E7E3  40000404  40400038  40400001  D09C3022  7840D094  30443B24
30227840  D1007B40  D0783924  47A0D39E  130B5000  D0BC133B  5930D0BC
4770D3D4  58F0D0F0  45E0F004  00000006  C3E6C3C3  F0F0F2F3*
02E3E7E3  4000043C  40400014  40400001  00000057  180005E0  5800D0DC
5000E00C  45E0F00C  40404040  40404040  40404040  40404040  40404040
40404040  40404040  40404040  40404040  C3E6C3C3  F0F0F2F4*
02E3E7E3  40000454  40400038  40400001  04700002  45E0F010  1BFF58E0
D00007FE  58A0D004  58E0A00C  58B0A018  5810B00C  5820D0BC  50201000
18DA92FF  A00C982C  A01C07FE  98791004  C3E6C3C3  F0F0F2F5*
02E3E7E3  4000048C  40400038  40400001  58207000  5020D0C0  58209000
5020D0BC  58201000  41302000  41500004  1B255C40  D0741B25  5020D0E8
5030D0EC  58201008  41302000  41500004  C3E6C3C3  F0F0F2F6*
02E3E7E3  400004C4  4040000E  40400001  1B255020  D0D85030  D0DC47F0
D1144040  40404040  40404040  40404040  40404040  40404040  40404040
40404040  40404040  40404040  40404040  C3E6C3C3  F0F0F2F7*
02E3E7E3  40000020  40400008  40400001  00000488  00000088  40404040
40404040  40404040  40404040  40404040  40404040  40404040  40404040
40404040  40404040  40404040  40404040  C3E6C3C3  F0F0F2F8*
02E3E7E3  40000088  40400004  40400001  00000464  40404040  40404040
40404040  40404040  40404040  40404040  40404040  40404040  40404040
40404040  40404040  40404040  40404040  C3E6C3C3  F0F0F2F9*
02D9D3C4  40404040  40400038  40404040  00020001  1C000168  00030001
1C00016C  00040001  1C000178  00010001  0C0003C4  00010001  0C00043C
00010001  0C000020  00010001  0C000024  C3E6C3C3  F0F0F3F0**
02E3E7E3  400000D4  4040001C  40400001  80000194  80000198  80000194
80000198  80000194  80000130  80000134  40404040  40404040  40404040
40404040  40404040  40404040  40404040  C3E6C3C3  F0F0F3F1*
02D9D3C4  40404040  40400038  40404040  00010001  0C000088  00010001
0C0000D4  00010001  0C0000D8  00010001  0C0000DC  00010001  0C0000E0
00010001  0C0000E4  00010001  0C0000E8  C3E6C3C3  F0F0F3F2*
02E3E7E3  4000017C  40400020  40400001  00000000  00000004  00000008
00000000  00000000  00000000  00000000  00000000  40404040  40404040
40404040  40404040  40404040  40404040  C3E6C3C3  F0F0F3F3*
02D9D3C4  40404040  40400008  40404040  00010001  0C0000EC  40404040
40404040  40404040  40404040  40404040  40404040  40404040  40404040
40404040  40404040  40404040  40404040  C3E6C3C3  F0F0F3F4*
02C5D5C4  40404040  40404040  40404040  40404040  40404040  40404040
000004D2  F1F5F7F3  F460C6D6  F34040F0  F2F0F2F8  F7F0F9F8  40F0F84B
F1F44BF2  F5404040  C3E6C3C3  E6404040  C3E6C3C3  F0F0F3F5**

MEMBER NAME   DCWCCW
02C5E2C4  40404040  40400010  40400001  C4C3E6C3  C3E64040  00000000
40000000  40404040  40404040  40404040  40404040  40404040  40404040
```

| | | | | | | |
|---|---|---|---|---|---|---|
| 40404040 | 40404040 | 40404040 | 40404040 | C4C3E6C3 | F0F0F0F1* | |
| 02E3E7E3 | 40000000 | 40400038 | 40400001 | 47F0F00C | 07C4C3E6 | C3C3E640 |
| 90ECD00C | 184D98CD | F0205040 | D00450D0 | 400807FC | 40404040 | 40404040 |
| 021A2340 | E2E4D7C5 | D940E3C5 | E7E340C5 | C4C3E6C3 | F0F0F0F2* | |
| 02E3E7E3 | 40000038 | 40400017 | 40400001 | D9D9D6D9 | 40C9D540 | D9D6E4E3 |
| C9D5C540 | C4C3E6C3 | C3E62240 | 40404040 | 40404040 | 40404040 | 40404040 |
| 40404040 | 40404040 | 40404040 | 40404040 | C4C3E6C3 | F0F0F0F3* | |
| 02E3E7E3 | 40000050 | 40400020 | 40400001 | E4D5C1C2 | D3C540E3 | D640D6D9 |
| C4C5D940 | E4D5C1C2 | D3C540E3 | D640D6D9 | C4C5D940 | 40404040 | 40404040 |
| 40404040 | 40404040 | 40404040 | 40404040 | C4C3E6C3 | F0F0F0F4* | |
| 02C5E2C4 | 40404040 | 40400010 | 40400002 | C3E6C3C3 | E6404040 | 02000000 |
| 40000000 | 40404040 | 40404040 | 40404040 | 40404040 | 40404040 | 40404040 |
| 40404040 | 40404040 | 40404040 | 40404040 | C4C3E6C3 | F0F0F0F5* | |
| 02E3E7E3 | 40000178 | 40400038 | 40400001 | 00000000 | 00000000 | 00000001 |
| 00000001 | 00000002 | 00000003 | 00000004 | 00000008 | 0000000F | 401DF3B6 |
| 4029FBE7 | 403EF9DB | 00000000 | 00000000 | C4C3E6C3 | F0F0F0F6* | |
| 02E3E7E3 | 400001F8 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | C4C3E6C3 | F0F0F0F7* | |
| 02E3E7E3 | 40000204 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C4C3E6C3 | F0F0F0F8* | |
| 02C5E2C4 | 40404040 | 40400010 | 40400003 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | C4C3E6C3 | F0F0F0F9* | |
| 02E3E7E3 | 4000020C | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C4C3E6C3 | F0F0F1F0** | |
| 02C5E2C4 | 40404040 | 40400010 | 40400004 | C3C1C4E2 | E4D74040 | 02000000 |
| 40000000 | 40404040 | 40404040 | 40404040 | 40404040 | 40404040 | 40404040 |
| 40404040 | 40404040 | 40404040 | 40404040 | C4C3E6C3 | F0F0F1F1* | |
| 02C5E2C4 | 40404040 | 40400010 | 40400005 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | C4C3E6C3 | F0F0F1F2* | |
| 02E3E7E3 | 40000214 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | C4C3E6C3 | F0F0F1F3* | |
| 02E3E7E3 | 40000248 | 40400038 | 40400001 | 5890D18C | 58B0D194 | 58A0D124 |
| 5880D120 | 5800D108 | 5000D148 | 5800D164 | 5900D114 | 4780D3A4 | 5800D118 |
| 5000D140 | 5800D114 | 13005000 | D1B85800 | C4C3E6C3 | F0F0F1F4* | |
| 02E3E7E3 | 40000280 | 40400038 | 40400001 | D1CC5000 | D1C05800 | D1D05000 |
| D1C418BA | 58A0D194 | 58E0D1C0 | 587EA000 | 5070D154 | 58E0D1C4 | 580EA000 |
| 5000D168 | 18571C4B | 18251A28 | 78229000 | C4C3E6C3 | F0F0F1F5* | |
| 02E3E7E3 | 400002B8 | 40400038 | 40400001 | 7020D174 | 18351A3B | 78239000 |
| 7020D178 | 41029000 | 5000D05C | 58F0D188 | 4110D05C | 05EF5800 | D15C5900 |
| D1144780 | D37C5800 | D15C5900 | D1B84780 | C4C3E6C3 | F0F0F1F6* | |
| 02E3E7E3 | 400002F0 | 40400038 | 40400001 | D3325820 | D1688E20 | 00205D20 |
| D1185070 | D1601C6B | 18471A48 | 5860D114 | 5870D168 | 188458A0 | D11418B3 |
| 18575A50 | D1601835 | 1B3A4100 | D17C5000 | C4C3E6C3 | F0F0F1F7* | |
| 02E3E7E3 | 40000328 | 40400038 | 40400001 | D0704108 | 90005000 | D0749280 |
| D07458F0 | D1A44110 | D06C05EF | 18535C40 | D1241825 | 5A20D120 | 41089000 |
| 5000D070 | 41029000 | 5000D074 | 9280D074 | C4C3E6C3 | F0F0F1F8* | |
| 02E3E7E3 | 40000360 | 40400038 | 40400001 | 58F0D1A4 | 4110D06C | 05EF4102 |
| 90005000 | D0704100 | D17C5000 | D0749280 | D07458F0 | D1A44110 | D06C05EF |
| 5A80D124 | 1B7A876A | D2A858A0 | D19458B0 | C4C3E6C3 | F0F0F1F9* | |
| 02E3E7E3 | 40000398 | 40400038 | 40400001 | D1245880 | D12047F0 | D37C5800 |

MEMBER NAME DCWCCW

| | | | | | | |
|---|---|---|---|---|---|---|
| D1105000 | D1484100 | D1745000 | D0784100 | D1785000 | D07C58F0 | D1A84110 |

| | | | | | | |
|---|---|---|---|---|---|---|
| D07805EF | 41E00004 | 15FE4720 | D36458EF | C4C3E6C3 | F0F0F2F0** | |
| 02E3E7E3 | 400003D0 | 40400038 | 40400001 | D04C07FE | 47F0D37C | 58F0D1AC |
| 45E0F004 | 00000006 | 00000028 | 45E0F010 | 5820D140 | 5A20D114 | 5020D140 |
| 5800D1C4 | 1A0B5000 | D1C45800 | D1C01A0B | C4C3E6C3 | F0F0F2F1* | |
| 02E3E7E3 | 40000408 | 40400038 | 40400001 | 5000D1C0 | 5920D164 | 47C0D224 |
| 58B0D194 | 58A0D124 | 5880D120 | 58E0D1D4 | 587EB000 | 5070D154 | 58E0D1C8 |
| 580EB000 | 5000D168 | 18571C4A | 18281A25 | C4C3E6C3 | F0F0F2F2* | |
| 02E3E7E3 | 40000440 | 40400038 | 40400001 | 78229000 | 7020D174 | 183A1A35 |
| 78239000 | 7020D178 | 41029000 | 5000D05C | 58F0D188 | 4110D05C | 05EF5800 |
| D15C1200 | 4780D508 | 5820D114 | 13225920 | C4C3E6C3 | F0F0F2F3* | |
| 02E3E7E3 | 40000478 | 40400038 | 40400001 | D15C4780 | D4BE5820 | D1688E20 |
| 00205D20 | D1185070 | D1601C6A | 18471A48 | 5860D114 | 5870D168 | 188458A0 |
| D11418B3 | 18575A50 | D1601835 | 1B3A4100 | C4C3E6C3 | F0F0F2F4* | |
| 02E3E7E3 | 400004B0 | 40400038 | 40400001 | D17C5000 | D0704108 | 90005000 |
| D0749280 | D07458F0 | D1A44110 | D06C05EF | 18535C40 | D1241825 | 5A20D120 |
| 41089000 | 5000D070 | 41029000 | 5000D074 | C4C3E6C3 | F0F0F2F5* | |
| 02E3E7E3 | 400004E8 | 40400038 | 40400001 | 9280D074 | 58F0D1A4 | 4110D06C |
| 05EF4102 | 90005000 | D0704100 | D17C5000 | D0749280 | D07458F0 | D1A44110 |
| D06C05EF | 5A80D124 | 1B7A876A | D43458B0 | C4C3E6C3 | F0F0F2F6* | |
| 02E3E7E3 | 40000520 | 40400038 | 40400001 | D19458A0 | D1245880 | D12047F0 |
| D5085800 | D1105000 | D1484100 | D1745000 | D0C04100 | D1785000 | D0C458F0 |
| D1A84110 | D0C005EF | 41E00004 | 15FE4720 | C4C3E6C3 | F0F0F2F7* | |
| 02E3E7E3 | 40000558 | 40400038 | 40400001 | D4F058EF | D05407FE | 47F0D508 |
| 58F0D1AC | 45E0F004 | 00000006 | 00000028 | 45E0F010 | 5800D148 | 1BFF860F |
| D51A1BFF | 58E0D000 | 07FE41F0 | 000458E0 | C4C3E6C3 | F0F0F2F8* | |
| 02E3E7E3 | 40000590 | 40400038 | 40400001 | D00007FE | 58D0D004 | 58E0D00C |
| 92FFD00C | 982CD01C | 07FE987A | 10045820 | 70005020 | D14C5820 | 90005020 |
| D1645820 | 10004130 | 20004150 | 00041B25 | C4C3E6C3 | F0F0F2F9* | |
| 02E3E7E3 | 400005C8 | 40400038 | 40400001 | 5C40D118 | 1B255020 | D18C5030 |
| D1905820 | 10084130 | 20004150 | 00041B25 | 5C40D118 | 1B255020 | D1945030 |
| D1985820 | 10104130 | 20004150 | 00041B25 | C4C3E6C3 | F0F0F3F0** | |
| 02E3E7E3 | 40000600 | 40400012 | 40400001 | 5C40D120 | 1B255020 | D19C5030 |
| D1A047F0 | D1D84040 | 40404040 | 40404040 | 40404040 | 40404040 | 40404040 |
| 40404040 | 40404040 | 40404040 | 40404040 | C4C3E6C3 | F0F0F3F1* | |
| 02E3E7E3 | 40000020 | 40400008 | 40400001 | 000005A6 | 00000070 | 40404040 |
| 40404040 | 40404040 | 40404040 | 40404040 | 40404040 | 40404040 | 40404040 |
| 40404040 | 40404040 | 40404040 | 40404040 | C4C3E6C3 | F0F0F3F2* | |
| 02D9D3C4 | 40404040 | 40400038 | 40404040 | 00020001 | 1C0001F8 | 00030001 |
| 1C000214 | 00040001 | 1C000218 | 00050001 | 1C00021C | 00010001 | 0C0003E4 |
| 00010001 | 0C000570 | 00010001 | 0C000020 | C4C3E6C3 | F0F0F3F3* | |
| 02E3E7E3 | 40000070 | 40400004 | 40400001 | 00000594 | 40404040 | 40404040 |
| 40404040 | 40404040 | 40404040 | 40404040 | 40404040 | 40404040 | 40404040 |
| 40404040 | 40404040 | 40404040 | 40404040 | C4C3E6C3 | F0F0F3F4* | |
| 02E3E7E3 | 400000BC | 40400010 | 40400001 | 000003D4 | 000003D8 | 00000560 |
| 00000564 | 40404040 | 40404040 | 40404040 | 40404040 | 40404040 | 40404040 |
| 40404040 | 40404040 | 40404040 | 40404040 | C4C3E6C3 | F0F0F3F5* | |
| 02E3E7E3 | 400000D0 | 40400008 | 40400001 | 000001D8 | 000001E4 | 40404040 |
| 40404040 | 40404040 | 40404040 | 40404040 | 40404040 | 40404040 | 40404040 |
| 40404040 | 40404040 | 40404040 | 40404040 | C4C3E6C3 | F0F0F3F6* | |
| 02D9D3C4 | 40404040 | 40400038 | 40404040 | 00010001 | 0C000024 | 00010001 |
| 0C000070 | 00010001 | 0C0000BC | 00010001 | 0C0000C0 | 00010001 | 0C0000C4 |
| 00010001 | 0C0000C8 | 00010001 | 0C0000D0 | C4C3E6C3 | F0F0F3F7* | |
| 02E3E7E3 | 400000D8 | 40400008 | 40400001 | 800001CC | 00000194 | 40404040 |
| 40404040 | 40404040 | 40404040 | 40404040 | 40404040 | 40404040 | 40404040 |
| 40404040 | 40404040 | 40404040 | 40404040 | C4C3E6C3 | F0F0F3F8* | |
| 02E3E7E3 | 400000E4 | 40400004 | 40400001 | 80000000 | 40404040 | 40404040 |
| 40404040 | 40404040 | 40404040 | 40404040 | 40404040 | 40404040 | 40404040 |

MEMBER NAME DCWCCW

| | | | | | | |
|---|---|---|---|---|---|---|
| 40404040 | 40404040 | 40404040 | 40404040 | C4C3E6C3 | F0F0F3F9* | |
| 02E3E7E3 | 400000F0 | 40400014 | 40400001 | 0000017C | 00000198 | 000001A0 |
| 0000019C | 00000060 | 40404040 | 40404040 | 40404040 | 40404040 | 40404040 |
| 40404040 | 40404040 | 40404040 | 40404040 | C4C3E6C3 | F0F0F4F0** | |
| 02D9D3C4 | 40404040 | 40400038 | 40404040 | 00010001 | 0C0000D4 | 00010001 |
| 0C0000D8 | 00010001 | 0C0000DC | 00010001 | 0C0000F0 | 00010001 | 0C0000F4 |
| 00010001 | 0C0000F8 | 00010001 | 0C0000FC | C4C3E6C3 | F0F0F4F1* | |
| 02E3E7E3 | 40000104 | 4040001C | 40400001 | 0000017C | 0000017C | 0000017C |
| 0000017C | 00000184 | 0000018C | 0000017C | 40404040 | 40404040 | 40404040 |
| 40404040 | 40404040 | 40404040 | 40404040 | C4C3E6C3 | F0F0F4F2* | |
| 02D9D3C4 | 40404040 | 40400038 | 40404040 | 00010001 | 0C000100 | 00010001 |
| 0C000104 | 00010001 | 0C000108 | 00010001 | 0C00010C | 00010001 | 0C000110 |
| 00010001 | 0C000114 | 00010001 | 0C000118 | C4C3E6C3 | F0F0F4F3* | |
| 02E3E7E3 | 40000120 | 40400010 | 40400001 | 0000017C | 000001A0 | 000001A4 |
| 8000017C | 40404040 | 40404040 | 40404040 | 40404040 | 40404040 | 40404040 |
| 40404040 | 40404040 | 40404040 | 40404040 | C4C3E6C3 | F0F0F4F4* | |
| 02E3E7E3 | 40000138 | 4040000C | 40400001 | 0000017C | 00000198 | 000001A0 |
| 40404040 | 40404040 | 40404040 | 40404040 | 40404040 | 40404040 | 40404040 |
| 40404040 | 40404040 | 40404040 | 40404040 | C4C3E6C3 | F0F0F4F5* | |
| 02D9D3C4 | 40404040 | 40400038 | 40404040 | 00010001 | 0C00011C | 00010001 |
| 0C000120 | 00010001 | 0C000124 | 00010001 | 0C000128 | 00010001 | 0C00012C |
| 00010001 | 0C000138 | 00010001 | 0C00013C | C4C3E6C3 | F0F0F4F6* | |
| 02E3E7E3 | 40000144 | 4040001C | 40400001 | 0000019C | 00000050 | 0000017C |
| 0000017C | 0000017C | 0000017C | 00000184 | 40404040 | 40404040 | 40404040 |
| 40404040 | 40404040 | 40404040 | 40404040 | C4C3E6C3 | F0F0F4F7* | |
| 02D9D3C4 | 40404040 | 40400038 | 40404040 | 00010001 | 0C000140 | 00010001 |
| 0C000144 | 00010001 | 0C000148 | 00010001 | 0C00014C | 00010001 | 0C000150 |
| 00010001 | 0C000154 | 00010001 | 0C000158 | C4C3E6C3 | F0F0F4F8* | |
| 02E3E7E3 | 40000160 | 40400018 | 40400001 | 0000018C | 0000017C | 0000017C |
| 000001A0 | 000001A4 | 8000017C | 40404040 | 40404040 | 40404040 | 40404040 |
| 40404040 | 40404040 | 40404040 | 40404040 | C4C3E6C3 | F0F0F4F9* | |
| 02E3E7E3 | 40000220 | 40400028 | 40400001 | 00000000 | 00000000 | 00000000 |
| 00000000 | 00000000 | 00000000 | 00000010 | 00000014 | 00000018 | 0000000C |
| 40404040 | 40404040 | 40404040 | 40404040 | C4C3E6C3 | F0F0F5F0** | |
| 02D9D3C4 | 40404040 | 40400038 | 40404040 | 00010001 | 0C00015C | 00010001 |
| 0C000160 | 00010001 | 0C000164 | 00010001 | 0C000168 | 00010001 | 0C00016C |
| 00010001 | 0C000170 | 00010001 | 0C000174 | C4C3E6C3 | F0F0F5F1* | |
| 02C5D5C4 | 40404040 | 40404040 | 40404040 | 40404040 | 40404040 | 40404040 |
| 00000612 | F1F5F7F3 | F460C6D6 | F34040F0 | F2F0F2F8 | F7F0F9F8 | 40F0F84B |
| F1F44BF3 | F0404040 | C4C3E6C3 | C3E64040 | C4C3E6C3 | F0F0F5F2** | |

MEMBER NAME DEFINE

| | | | | | | |
|---|---|---|---|---|---|---|
| 02C5E2C4 | 40404040 | 40400010 | 40400001 | C4C5C6C9 | D5C54040 | 00000000 |
| 40000000 | 40404040 | 40404040 | 40404040 | 40404040 | 40404040 | 40404040 |
| 40404040 | 40404040 | 40404040 | 40404040 | C4C5C6C9 | F0F0F0F1* | |
| 02E3E7E3 | 40000000 | 40400028 | 40400001 | 47F0F00C | 07C4C5C6 | C9D5C540 |
| 90ECD00C | 184D98CD | F0205040 | D00450D0 | 400807FC | 40404040 | 40404040 |
| 40404040 | 40404040 | 40404040 | 40404040 | C4C5C6C9 | F0F0F0F2* | |
| 02E3E7E3 | 40000078 | 40400038 | 40400001 | 00000000 | 00000000 | 3B431BDE |
| 82D7B635 | 3C1853B3 | DC3AFEDA | 3C1AD7F2 | 9ABCAF48 | 3C573DD4 | 76E539AB |
| 3C5C4651 | F3E89A89 | 3C706847 | E7F61DFF | C4C5C6C9 | F0F0F0F3* | |
| 02E3E7E3 | 400000B0 | 40400038 | 40400001 | 3F126E97 | 8D4FDF3B | 3F147AE1 |
| 47AE147B | 3F1E4F76 | 5FD8ADAC | 3F1EB851 | EB851EB8 | 3F20C49B | A5E353F8 |
| 3F28F5C2 | 8F5C28F6 | 3F3126E9 | 78D4FDF4 | C4C5C6C9 | F0F0F0F4* | |
| 02E3E7E3 | 400000E8 | 40400038 | 40400001 | 3FAAAE29 | 7396D091 | 3FB1C432 |
| CA57A787 | 3FCCCCCC | CCCCCCCD | 3FE56041 | 89374BC7 | 3FE978D4 | FDF3B646 |
| 3FF5C28F | 5C28F5C3 | 4010A3D7 | 0A3D70A4 | C4C5C6C9 | F0F0F0F5* | |
| 02E3E7E3 | 40000120 | 40400038 | 40400001 | 401126E9 | 78D4FDF4 | 4012599E |
| D7C6FBD2 | 401C28F5 | C28F5C29 | 40333333 | 33333333 | 404CCCCC | CCCCCCCD |

```
40570A3D  70A3D70A  441C2100  00000000  C4C5C6C9  F0F0F0F6*
02E3E7E3  40000158  40400038  40400001  441C2200  00000000  441C5200
00000000  441C5D00  00000000  441CDF00  00000000  441CE000  00000000
441CE100  00000000  441CFD00  00000000  C4C5C6C9  F0F0F0F7*
02E3E7E3  40000190  40400038  40400001  441CFE00  00000000  441D4D00
00000000  441F4000  00000000  451D4C00  00000000  45493E00  00000000
457A1200  00000000  45927C00  00000000  C4C5C6C9  F0F0F0F8*
02E3E7E3  400001C8  40400038  40400001  45C35000  00000000  45E7EF00
00000000  46149970  00000000  462C4020  00000000  462F4D60  00000000
4630D400  00000000  46632EA0  00000000  C4C5C6C9  F0F0F0F9*
02E3E7E3  40000200  40400038  40400001  468DE820  00000000  471406F4
00000000  00000001  00000002  00000003  00000004  00000005  00000006
00000007  00000008  00000009  0000000A  C4C5C6C9  F0F0F1F0**
02C5E2C4  40404040  40400010  40400002  D7D4C1E3  D3404040  05000000
40001134  40404040  40404040  40404040  40404040  40404040  40404040
40404040  40404040  40404040  40404040  C4C5C6C9  F0F0F1F1*
02E3E7E3  40000238  40400010  40400001  0000000B  00000058  00000000
00000000  40404040  40404040  40404040  40404040  40404040  40404040
40404040  40404040  40404040  40404040  C4C5C6C9  F0F0F1F2*
02E3E7E3  40000250  40400038  40400001  FFFFFFA0  00001130  58B0D228
6860D180  6840D198  6820D1A0  5890D20C  6800D1E0  6000B060  6800D1B0
6000B068  6800D120  6000B070  6800D1A8  C4C5C6C9  F0F0F1F3*
02E3E7E3  40000288  40400038  40400001  6000B078  6800D1A8  6000B080
6800D1A8  6000B088  6800D0D8  6000B090  6800D058  6000B098  6800D060
6000B0A0  6800D128  6000B0A8  6800D098  C4C5C6C9  F0F0F1F4*
02E3E7E3  400002C0  40400038  40400001  6000B0B0  6800D1E0  6000B0B8
6800D1B0  6000B0C0  6800D120  6000B0C8  6800D1A8  6000B0D0  6800D1A8
6000B0D8  6800D1A8  6000B0E0  6800D0D8  C4C5C6C9  F0F0F1F5*
02E3E7E3  400002F8  40400038  40400001  6000B0E8  6800D058  6000B0F0
6800D060  6000B0F8  6800D130  6000B100  6800D098  6000B108  6800D1D8
6000B110  6800D1D8  6000B118  6800D0E8  C4C5C6C9  F0F0F1F6*
02E3E7E3  40000330  40400038  40400001  6000B120  6020B128  6020B130
6020B138  6800D0D8  6000B140  6800D068  6000B148  6800D068  6000B150
6800D140  6000B158  6800D0A0  6000B160  C4C5C6C9  F0F0F1F7*
02E3E7E3  40000368  40400038  40400001  6800D1B8  6000B168  6800D1B8
6000B170  6800D110  6000B178  6040B180  6040B188  6040B190  6800D0E0
6000B198  6800D080  6000B1A0  6800D078  C4C5C6C9  F0F0F1F8*
02E3E7E3  400003A0  40400038  40400001  6000B1A8  6800D148  6000B1B0
6800D088  6000B1B8  6800D1C0  6000B1C0  6800D1C0  6000B1C8  6800D110
6000B1D0  6040B1D8  6040B1E0  6040B1E8  C4C5C6C9  F0F0F1F9*
02E3E7E3  400003D8  40400038  40400001  6800D0F0  6000B1F0  6800D080

MEMBER NAME  DEFINE
6000B1F8  6800D078  6000B200  6800D150  6000B208  6800D0B0  6000B210
6800D188  6000B218  6800D188  6000B220  C4C5C6C9  F0F0F2F0**
02E3E7E3  40000410  40400038  40400001  6800D118  6000B228  6060B230
6060B238  6060B240  6800D0C0  6000B248  6800D050  6000B250  6800D050
6000B258  6800D160  6000B260  6800D090  C4C5C6C9  F0F0F2F1*
02E3E7E3  40000448  40400038  40400001  6000B268  6800D188  6000B270
6800D188  6000B278  6800D118  6000B280  6060B288  6060B290  6060B298
6800D0C8  6000B2A0  6800D050  6000B2A8  C4C5C6C9  F0F0F2F2*
02E3E7E3  40000480  40400038  40400001  6800D050  6000B2B0  6800D168
6000B2B8  6800D0A8  6000B2C0  6800D1D0  6000B2C8  6800D1D0  6000B2D0
6800D0D0  6000B2D8  6800D178  6000B2E0  C4C5C6C9  F0F0F2F3*
02E3E7E3  400004B8  40400038  40400001  6800D178  6000B2E8  6800D178
6000B2F0  6800D100  6000B2F8  6800D070  6000B300  6800D070  6000B308
6800D170  6000B310  6800D0B8  6000B318  C4C5C6C9  F0F0F2F4*
02E3E7E3  400004F0  40400038  40400001  6800D1D8  6000B320  6800D1D8
6000B328  6800D0E8  6000B330  6020B338  6020B340  6020B348  6800D0D8
```

```
6000B350  6800D068  6000B358  6800D068  C4C5C6C9  F0F0F2F5*
02E3E7E3  40000528  40400038  40400001  6000B360  6800D138  6000B368
6800D0A0  6000B370  6800D1C8  6000B378  6800D1B8  6000B380  6800D108
6000B388  6800D190  6000B390  6800D190  C4C5C6C9  F0F0F2F6*
02E3E7E3  40000560  40400038  40400001  6000B398  6800D190  6000B3A0
6800D0F8  6000B3A8  6800D078  6000B3B0  6800D080  6000B3B8  6800D158
6000B3C0  6800D0B0  6000B3C8  18A958F0  C4C5C6C9  F0F0F2F7*
02E3E7E3  40000598  40400024  40400001  D22C50A0  F0001BFF  58E0D000
07FE58D0  D00458E0  D00C92FF  D00C982C  D01C07FE  47F0D230  40404040
40404040  40404040  40404040  40404040  C4C5C6C9  F0F0F2F8*
02E3E7E3  40000020  4040000C  40400001  000005B8  00000028  000005A6
40404040  40404040  40404040  40404040  40404040  40404040  40404040
40404040  40404040  40404040  40404040  C4C5C6C9  F0F0F2F9*
02D9D3C4  40404040  40400028  40404040  00020001  0C000250  00020001
0C000254  00010001  0C000020  00010001  0C000024  00010001  0C000028
40404040  40404040  40404040  40404040  C4C5C6C9  F0F0F3F0**
02C5D5C4  40404040  40404040  40404040  40404040  40404040  40404040
000005BC  F1F5F7F3  F460C6D6  F34040F0  F2F0F2F8  F7F0F9F8  40F0F84B
F1F44BF3  F5404040  C4C5C6C9  D5C54040  C4C5C6C9  F0F0F3F1**

MEMBER NAME  DEROT
02C5E2C4  40404040  40400010  40400001  C4C5D9D6  E3404040  00000000
40000000  40404040  40404040  40404040  40404040  40404040  40404040
40404040  40404040  40404040  40404040  C4C5D9D6  F0F0F0F1*
02E3E7E3  40000000  40400028  40400001  47F0F00C  07C4C5D9  D6E34040
90ECD00C  184D98CD  F0205040  D00450D0  400807FC  40404040  40404040
40404040  40404040  40404040  40404040  C4C5D9D6  F0F0F0F2*
02E3E7E3  40000080  40400034  40400001  4E000000  00000000  4E000000
80000000  00000000  00000000  00000001  00000008  00000010  000003E8
42640000  00000000  00000000  40404040  C4C5D9D6  F0F0F0F3*
02C5E2C4  40404040  40400010  40400002  D4E5C3C8  D9404040  02000000
40000000  40404040  40404040  40404040  40404040  40404040  40404040
40404040  40404040  40404040  40404040  C4C5D9D6  F0F0F0F4*
02E3E7E3  400000E0  40400004  40400001  00000000  40404040  40404040
40404040  40404040  40404040  40404040  40404040  40404040  40404040
40404040  40404040  40404040  40404040  C4C5D9D6  F0F0F0F5*
02E3E7E3  400000E8  40400008  40400001  00000000  00000000  40404040
40404040  40404040  40404040  40404040  40404040  40404040  40404040
40404040  40404040  40404040  40404040  C4C5D9D6  F0F0F0F6*
02E3E7E3  400000FC  40400038  40400001  5850D0C4  5880D0B8  58A0D0CC
5870D07C  5860D070  5840D068  58F0D0C0  4110D04C  05EF5040  D090189A
58B0D078  7840D080  7860D06C  18364C39  C4C5D9D6  F0F0F0F7*
02E3E7E3  40000134  40400038  40400001  D09A5030  D0981233  4770D11C
47F0D166  5800D090  1A065000  D0901937  4770D138  5820D090  89200002
70628000  5970D098  4780D162  5800D098  C4C5D9D6  F0F0F0F8*
02E3E7E3  4000016C  40400038  40400001  5700D064  5000D05C  6820D058
6B20D060  3D245820  D0908920  00027022  8000879A  D1081BFF  58E0D000
07FE58A0  D00458E0  A00C58B0  A0185810  C4C5D9D6  F0F0F0F9*
02E3E7E3  400001A4  40400038  40400001  B0085820  D0905020  100018DA
92FFA00C  982CA01C  07FE5870  10085820  70005020  D0905820  10004130
20004150  00041B25  5020D0C4  5030D0C8  C4C5D9D6  F0F0F1F0**
02E3E7E3  400001DC  40400022  40400001  5030D054  9280D054  58201004
41302000  41500004  1B255020  D0B85030  D0BC47F0  D0D44040  40404040
40404040  40404040  40404040  40404040  C4C5D9D6  F0F0F1F1*
02E3E7E3  40000020  4040000C  40400001  000001BA  00000028  00000196
40404040  40404040  40404040  40404040  40404040  40404040  40404040
40404040  40404040  40404040  40404040  C4C5D9D6  F0F0F1F2*
02E3E7E3  40000074  40400008  40400001  000000A0  000000C4  40404040
40404040  40404040  40404040  40404040  40404040  40404040  40404040
```

| | | | | | | |
|---|---|---|---|---|---|---|
| 40404040 | 40404040 | 40404040 | 40404040 | C4C5D9D6 | F0F0F1F3* | |
| 02E3E7E3 | 400000F4 | 40400008 | 40400001 | 00000002 | 00000000 | 40404040 |
| 40404040 | 40404040 | 40404040 | 40404040 | 40404040 | 40404040 | 40404040 |
| 40404040 | 40404040 | 40404040 | 40404040 | C4C5D9D6 | F0F0F1F4* | |
| 02D9D3C4 | 40404040 | 40400030 | 40404040 | 00020001 | 1C0000E8 | 00010001 |
| 0C000020 | 00010001 | 0C000024 | 00010001 | 0C000028 | 00010001 | 0C000074 |
| 00010001 | 0C000078 | 40404040 | 40404040 | C4C5D9D6 | F0F0F1F5* | |
| 02C5D5C4 | 40404040 | 40404040 | 40404040 | 40404040 | 40404040 | 40404040 |
| 000001FE | F1F5F7F3 | F460C6D6 | F34040F0 | F2F0F2F8 | F7F0F9F8 | 40F0F84B |
| F1F44BF4 | F0404040 | C4C5D9D6 | E3404040 | C4C5D9D6 | F0F0F1F6** | |

MEMBER NAME DIST

| | | | | | | |
|---|---|---|---|---|---|---|
| 02C5E2C4 | 40404040 | 40400010 | 40400001 | C4C9E2E3 | 40404040 | 00000000 |
| 40000000 | 40404040 | 40404040 | 40404040 | 40404040 | 40404040 | 40404040 |
| 40404040 | 40404040 | 40404040 | 40404040 | C4C9E2E3 | F0F0F0F1* | |
| 02E3E7E3 | 40000000 | 40400028 | 40400001 | 47F0F00C | 07C4C9E2 | E3404040 |
| 90ECD00C | 184D98CD | F0205040 | D00450D0 | 400807FC | 40404040 | 40404040 |
| 40404040 | 40404040 | 40404040 | 40404040 | C4C9E2E3 | F0F0F0F2* | |
| 02C5E2C4 | 40404040 | 40400010 | 40400002 | C4E2D8D9 | E3404040 | 02000000 |
| 40000000 | 40404040 | 40404040 | 40404040 | 40404040 | 40404040 | 40404040 |
| 40404040 | 40404040 | 40404040 | 40404040 | C4C9E2E3 | F0F0F0F3* | |
| 02E3E7E3 | 40000078 | 4040001C | 40400001 | 00000000 | 00000001 | 00000002 |
| 00000003 | 00000004 | 00000000 | 00000000 | 40404040 | 40404040 | 40404040 |
| 40404040 | 40404040 | 40404040 | 40404040 | C4C9E2E3 | F0F0F0F4* | |
| 02E3E7E3 | 40000100 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | C4C9E2E3 | F0F0F0F5* | |
| 02E3E7E3 | 4000010C | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C4C9E2E3 | F0F0F0F6* | |
| 02E3E7E3 | 4000012C | 40400038 | 40400001 | 58A0D0DC | 58B0D0E4 | 5890D054 |
| 5880D050 | 5080D070 | 6800B008 | 6000D090 | 6860B010 | 6060D0A0 | 6840B018 |
| 6040D098 | 6820B020 | 6800A008 | 6000D0C0 | C4C9E2E3 | F0F0F0F7* | |
| 02E3E7E3 | 40000164 | 40400038 | 40400001 | 6800A010 | 6000D0C8 | 2B626060 |
| D0786B40 | D0906860 | D0902C62 | 6060D0F0 | 6800D098 | 6C00D0A0 | 6820D0F0 |
| 2B206020 | D0886860 | D0786C60 | D0C02804 | C4C9E2E3 | F0F0F0F8* | |
| 02E3E7E3 | 4000019C | 40400038 | 40400001 | 6C00D0C8 | 2A606A60 | D0886060 |
| D0F06820 | D0782C22 | 2C442A24 | 6020D0F8 | 58F0D0D8 | 4110D04C | 05EF6820 |
| D0F02D20 | 20226920 | D0B847A0 | D1B21BFF | C4C9E2E3 | F0F0F0F9* | |
| 02E3E7E3 | 400001D4 | 40400038 | 40400001 | 58E0D000 | 07FE5090 | D0701BFF |
| 58E0D000 | 07FE58A0 | D00458E0 | A00C58B0 | A0185810 | B00C5820 | D0705020 |
| 100018DA | 92FFA00C | 982CA01C | 07FE9878 | C4C9E2E3 | F0F0F1F0** | |
| 02E3E7E3 | 4000020C | 40400038 | 40400001 | 10086820 | 70006020 | D0B85820 |
| 80005020 | D0705820 | 10004130 | 20004150 | 00081B25 | 5020D0DC | 5030D0E0 |
| 58201004 | 41302000 | 41500008 | 1B255020 | C4C9E2E3 | F0F0F1F1* | |
| 02E3E7E3 | 40000244 | 4040000A | 40400001 | D0E45030 | D0E847F0 | D1044040 |
| 40404040 | 40404040 | 40404040 | 40404040 | 40404040 | 40404040 | 40404040 |
| 40404040 | 40404040 | 40404040 | 40404040 | C4C9E2E3 | F0F0F1F2* | |
| 02E3E7E3 | 40000020 | 4040000C | 40400001 | 0000020A | 00000028 | 000001E6 |
| 40404040 | 40404040 | 40404040 | 40404040 | 40404040 | 40404040 | 40404040 |
| 40404040 | 40404040 | 40404040 | 40404040 | C4C9E2E3 | F0F0F1F3* | |
| 02E3E7E3 | 40000074 | 40400004 | 40400001 | 80000120 | 40404040 | 40404040 |
| 40404040 | 40404040 | 40404040 | 40404040 | 40404040 | 40404040 | 40404040 |
| 40404040 | 40404040 | 40404040 | 40404040 | C4C9E2E3 | F0F0F1F4* | |
| 02E3E7E3 | 40000114 | 40400018 | 40400001 | 00000000 | 00000000 | 00000000 |
| 00000000 | 00000000 | 00000000 | 40404040 | 40404040 | 40404040 | 40404040 |
| 40404040 | 40404040 | 40404040 | 40404040 | C4C9E2E3 | F0F0F1F5* | |
| 02D9D3C4 | 40404040 | 40400028 | 40404040 | 00020001 | 1C000100 | 00010001 |
| 0C000020 | 00010001 | 0C000024 | 00010001 | 0C000028 | 00010001 | 0C000074 |

| | | | | | | |
|---|---|---|---|---|---|---|
| 40404040 | 40404040 | 40404040 | 40404040 | C4C9E2E3 | F0F0F1F6* | |
| 02C5D5C4 | 40404040 | 40404040 | 40404040 | 40404040 | 40404040 | 40404040 |
| 0000024E | F1F5F7F3 | F460C6D6 | F34040F0 | F2F0F2F8 | F7F0F9F8 | 40F0F84B |
| F1F44BF4 | F4404040 | C4C9E2E3 | 40404040 | C4C9E2E3 | F0F0F1F7** | |

MEMBER NAME DLLIM

| | | | | | | |
|---|---|---|---|---|---|---|
| 02C5E2C4 | 40404040 | 40400010 | 40400001 | C4D3D3C9 | D4404040 | 00000000 |
| 40000000 | 40404040 | 40404040 | 40404040 | 40404040 | 40404040 | 40404040 |
| 40404040 | 40404040 | 40404040 | 40404040 | C4D3D3C9 | F0F0F0F1* | |
| 02E3E7E3 | 40000000 | 40400028 | 40400001 | 47F0F00C | 07C4D3D3 | C9D44040 |
| 90ECD00C | 184D98CD | F0205040 | D00450D0 | 400807FC | 40404040 | 40404040 |
| 40404040 | 40404040 | 40404040 | 40404040 | C4D3D3C9 | F0F0F0F2* | |
| 02E3E7E3 | 40000078 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | C4D3D3C9 | F0F0F0F3* | |
| 02E3E7E3 | 400000A8 | 40400038 | 40400001 | 7800D058 | 7900D05C | 4750D0A0 |
| 7800D05C | 7000D06C | 7800D058 | 7000D068 | 47F0D0B0 | 7800D058 | 7000D06C |
| 7800D05C | 7000D068 | 7800D060 | 7900D064 | C4D3D3C9 | F0F0F0F4* | |
| 02E3E7E3 | 400000E0 | 40400038 | 40400001 | 4750D0D0 | 7800D064 | 7000D074 |
| 7800D060 | 7000D070 | 47F0D0E0 | 7800D060 | 7000D074 | 7800D064 | 7000D070 |
| 1BFF58E0 | D00007FE | 58A0D004 | 58E0A00C | C4D3D3C9 | F0F0F0F5* | |
| 02E3E7E3 | 40000118 | 40400038 | 40400001 | 58B0A018 | 5810B010 | 7820D06C |
| 70201000 | 5820B014 | 7840D068 | 70402000 | 5830B018 | 7860D074 | 70603000 |
| 5840B01C | 7800D070 | 70004000 | 18DA92FF | C4D3D3C9 | F0F0F0F6* | |
| 02E3E7E3 | 40000150 | 40400038 | 40400001 | A00C982C | A01C07FE | 987B1000 |
| 78207000 | 7020D058 | 78208000 | 7020D060 | 78209000 | 7020D05C | 7820A000 |
| 7020D064 | 7820B000 | 7020D06C | 98791014 | C4D3D3C9 | F0F0F0F7* | |
| 02E3E7E3 | 40000188 | 4040001C | 40400001 | 78207000 | 7020D068 | 78208000 |
| 7020D074 | 78209000 | 7020D070 | 47F0D080 | 40404040 | 40404040 | 40404040 |
| 40404040 | 40404040 | 40404040 | 40404040 | C4D3D3C9 | F0F0F0F8* | |
| 02E3E7E3 | 40000020 | 4040000C | 40400001 | 00000158 | 00000028 | 00000110 |
| 40404040 | 40404040 | 40404040 | 40404040 | 40404040 | 40404040 | 40404040 |
| 40404040 | 40404040 | 40404040 | 40404040 | C4D3D3C9 | F0F0F0F9* | |
| 02D9D3C4 | 40404040 | 40400018 | 40404040 | 00010001 | 0C000020 | 00010001 |
| 0C000024 | 00010001 | 0C000028 | 40404040 | 40404040 | 40404040 | 40404040 |
| 40404040 | 40404040 | 40404040 | 40404040 | C4D3D3C9 | F0F0F1F0** | |
| 02C5D5C4 | 40404040 | 40404040 | 40404040 | 40404040 | 40404040 | 40404040 |
| 000001A4 | F1F5F7F3 | F460C6D6 | F34040F0 | F2F0F2F8 | F7F0F9F8 | 40F0F84B |
| F1F44BF4 | F8404040 | C4D3D3C9 | D4404040 | C4D3D3C9 | F0F0F1F1** | |

MEMBER NAME DUPTBL

| | | | | | | |
|---|---|---|---|---|---|---|
| 02C5E2C4 | 40404040 | 40400010 | 40400001 | C4E4D7E3 | C2D34040 | 00000000 |
| 40000000 | 40404040 | 40404040 | 40404040 | 40404040 | 40404040 | 40404040 |
| 40404040 | 40404040 | 40404040 | 40404040 | C4E4D7E3 | F0F0F0F1* | |
| 02E3E7E3 | 40000000 | 40400028 | 40400001 | 47F0F00C | 07C4E4D7 | E3C2D340 |
| 90ECD00C | 184D98CD | F0205040 | D00450D0 | 400807FC | 40404040 | 40404040 |
| 40404040 | 40404040 | 40404040 | 40404040 | C4E4D7E3 | F0F0F0F2* | |
| 02E3E7E3 | 40000078 | 40400030 | 40400001 | 00000000 | 00000000 | 4F080000 |
| 00000000 | 00000000 | 00000001 | 00000002 | 00000003 | 0000000A | 0000000E |
| 00000000 | 00000000 | 40404040 | 40404040 | C4E4D7E3 | F0F0F0F3* | |
| 02E3E7E3 | 400000C8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C4E4D7E3 | F0F0F0F4* | |
| 02E3E7E3 | 400000D0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | C4E4D7E3 | F0F0F0F5* | |
| 02E3E7E3 | 40000100 | 40400038 | 40400001 | 5870D0A8 | 58B0D0A0 | 58A0D0D4 |
| 5890D0C0 | 5880D064 | 5080D08C | 18385080 | D084782A | 70002B00 | 38026A00 |
| D0586000 | D0505800 | D0545000 | D0941828 | C4E4D7E3 | F0F0F0F6* | |

```
02E3E7E3  40000138  40400038  40400001  5800D0B8  5000D0B0  186A1873
18A23842  5800D094  5900D08C  4770D13E  58F0D0A8  7866F000  39464770
D15A47F0  D1BC1859  5C40D08C  18251A29  C4E4D7E3  F0F0F0F7*
02E3E7E3  40000170  40400038  40400001  5082B000  5800D08C  1A085000
D08C47F0  D1201827  5A20D09C  18595C40  D08C1835  5A30D0C4  5023B000
182A1B27  18595C40  D08C1835  5A30D0C8  C4E4D7E3  F0F0F0F8*
02E3E7E3  400001A8  40400038  40400001  5023B000  18595C40  D08C1825
1A295800  D0605002  B0005800  D08C1A08  5000D08C  187A3846  2B003806
6A00D058  6000D050  5800D054  5000D094  C4E4D7E3  F0F0F0F9*
02E3E7E3  400001E0  40400038  40400001  47F0D120  1AA85A60  D0BC59A0
D09047C0  D1205070  D0845870  D0A858A0  D0D45820  D0845A20  D09C1859
5C40D08C  5830D0C4  1A355023  B0005820  C4E4D7E3  F0F0F1F0**
02E3E7E3  40000218  40400038  40400001  D0905B20  D0841A28  18595C40
D08C5830  D0C81A35  5023B000  18595C40  D08C1829  1A255800  D0605002
B0001BFF  58E0D000  07FE58A0  D00458E0  C4E4D7E3  F0F0F1F1*
02E3E7E3  40000250  40400038  40400001  A00C58B0  A0185810  B0105820
D08C5020  100018DA  92FFA00C  982CA01C  07FE987A  10045820  70005020
D0905820  80005020  D09C5820  A0005020  C4E4D7E3  F0F0F1F2*
02E3E7E3  40000288  40400038  40400001  D08C5820  10004130  20004150
00041B25  5C40D074  1B255020  D0A85030  D0AC5820  100C4130  20004150
00041B25  5C40D06C  1B255020  D0A05030  C4E4D7E3  F0F0F1F3*
02E3E7E3  400002C0  40400006  40400001  D0A447F0  D0D84040  40404040
40404040  40404040  40404040  40404040  40404040  40404040  40404040
40404040  40404040  40404040  40404040  C4E4D7E3  F0F0F1F4*
02E3E7E3  40000020  4040000C  40400001  0000026E  00000028  0000024A
40404040  40404040  40404040  40404040  40404040  40404040  40404040
40404040  40404040  40404040  40404040  C4E4D7E3  F0F0F1F5*
02E3E7E3  400000D8  40400028  40400001  00000000  00000000  00000028
00000038  0000000C  00000004  00000008  00000000  00000000  00000060
40404040  40404040  40404040  40404040  C4E4D7E3  F0F0F1F6*
02D9D3C4  40404040  40400018  40404040  00010001  0C000020  00010001
0C000024  00010001  0C000028  40404040  40404040  40404040  40404040
40404040  40404040  40404040  40404040  C4E4D7E3  F0F0F1F7*
02C5D5C4  40404040  40404040  40404040  40404040  40404040  40404040
000002C6  F1F5F7F3  F460C6D6  F34040F0  F2F0F2F8  F7F0F9F8  40F0F84B
F1F44BF5  F2404040  C4E4D7E3  C2D34040  C4E4D7E3  F0F0F1F8**

MEMBER NAME  DUPARY
02C5E2C4  40404040  40400010  40400001  C4E4D7C1  D9E84040  00000000
40000000  40404040  40404040  40404040  40404040  40404040  40404040
40404040  40404040  40404040  40404040  C4E4D7C1  F0F0F0F1*
02E3E7E3  40000000  40400028  40400001  47F0F00C  07C4E4D7  C1D9E840
90ECD00C  184D98CD  F0205040  D00450D0  400807FC  40404040  40404040
40404040  40404040  40404040  40404040  C4E4D7C1  F0F0F0F2*
02E3E7E3  40000108  40400038  40400001  4E000000  00000000  4E000000
80000000  00000000  00000000  00000001  00000002  00000003  00000004
00000008  0000000E  00000016  0000002A  C4E4D7C1  F0F0F0F3*
02C5E2C4  40404040  40400010  40400002  D6D7E3C9  D6D54040  05000000
40000020  40404040  40404040  40404040  40404040  40404040  40404040
40404040  40404040  40404040  40404040  C4E4D7C1  F0F0F0F4*
02E3E7E3  40000140  4040001C  40400001  401DF3B6  4029FBE7  403EF9DB
40800000  41100000  00000000  00000000  40404040  40404040  40404040
40404040  40404040  40404040  40404040  C4E4D7C1  F0F0F0F5*
02C5E2C4  40404040  40400010  40400003  40404040  40404040  05000000
400007D0  40404040  40404040  40404040  40404040  40404040  40404040
40404040  40404040  40404040  40404040  C4E4D7C1  F0F0F0F6*
02E3E7E3  400001B0  4040000C  40400001  00000000  FFFFFFFC  00000000
40404040  40404040  40404040  40404040  40404040  40404040  40404040
40404040  40404040  40404040  40404040  C4E4D7C1  F0F0F0F7*
```

```
02E3E7E3  400001C0  40400004  40400001  00000000  40404040  40404040
40404040  40404040  40404040  40404040  40404040  40404040  40404040
40404040  40404040  40404040  40404040  C4E4D7C1  F0F0F0F8*
02C5E2C4  40404040  40400010  40400004  D4E5C3C8  D9404040  02000000
40000000  40404040  40404040  40404040  40404040  40404040  40404040
40404040  40404040  40404040  40404040  C4E4D7C1  F0F0F0F9*
02E3E7E3  400001C8  40400004  40400001  00000000  40404040  40404040
40404040  40404040  40404040  40404040  40404040  40404040  40404040
40404040  40404040  40404040  40404040  C4E4D7C1  F0F0F1F0**
02C5E2C4  40404040  40400010  40400005  D9E2C1D4  C5404040  02000000
40000000  40404040  40404040  40404040  40404040  40404040  40404040
40404040  40404040  40404040  40404040  C4E4D7C1  F0F0F1F1*
02C5E2C4  40404040  40400010  40400006  C3C1C4E2  E4D74040  02000000
40000000  40404040  40404040  40404040  40404040  40404040  40404040
40404040  40404040  40404040  40404040  C4E4D7C1  F0F0F1F2*
02E3E7E3  400001D0  4040000C  40400001  00000000  00000000  00000000
40404040  40404040  40404040  40404040  40404040  40404040  40404040
40404040  40404040  40404040  40404040  C4E4D7C1  F0F0F1F3*
02C5E2C4  40404040  40400010  40400007  C3D6D5E5  E3C94040  02000000
40000000  40404040  40404040  40404040  40404040  40404040  40404040
40404040  40404040  40404040  40404040  C4E4D7C1  F0F0F1F4*
02C5E2C4  40404040  40400010  40400008  D7E4E3D4  E2C74040  02000000
40000000  40404040  40404040  40404040  40404040  40404040  40404040
40404040  40404040  40404040  40404040  C4E4D7C1  F0F0F1F5*
02E3E7E3  400001E0  4040000C  40400001  00000000  00000000  00000000
40404040  40404040  40404040  40404040  40404040  40404040  40404040
40404040  40404040  40404040  40404040  C4E4D7C1  F0F0F1F6*
02E3E7E3  400001F0  40400004  40400001  00000000  40404040  40404040
40404040  40404040  40404040  40404040  40404040  40404040  40404040
40404040  40404040  40404040  40404040  C4E4D7C1  F0F0F1F7*
02E3E7E3  400001A0  40400008  40400001  4040D340  40404040  40404040
40404040  40404040  40404040  40404040  40404040  40404040  40404040
40404040  40404040  40404040  40404040  C4E4D7C1  F0F0F1F8*
02E3E7E3  40000224  40400038  40400001  5800D0F0  5000D154  7800D0F4
7000D170  7800D0F4  7000D174  5800D158  5000D138  5820D1EC  5020D1E4
18A258B0  D1A05890  D1985880  D1C05870  C4E4D7C1  F0F0F1F9*
02E3E7E3  4000025C  40400038  40400001  D1385C60  D1EC5070  D1E81827

MEMBER NAME  DUPARY
5A20D1EC  5802B000  5900D0F8  4780D3FC  5800D138  5900D158  4780D2B6
185A5C40  D1585A50  D104183A  5C20D158  C4E4D7C1  F0F0F2F0**
02E3E7E3  40000294  40400038  40400001  18435A40  D1081837  5A30D104
18275A20  D1084105  B0005000  D05C4104  B0005000  D0604103  B0005000
D0644102  B0005000  D06858F0  D1AC4110  C4E4D7C1  F0F0F2F1*
02E3E7E3  400002CC  40400038  40400001  D05405EF  41200001  5720D13C
1BFF862F  D3FC58F0  D1BC4110  D07005EF  4100D17C  5000D07C  58F0D1A8
4110D078  05EF4100  D1705000  D0844100  C4E4D7C1  F0F0F2F2*
02E3E7E3  40000304  40400038  40400001  D1745000  D08858F0  D1B84110
D08405EF  41E00004  15FE4720  D2FC58EF  D04C07FE  7820D174  7B20D124
7020D174  185A5C40  D1381825  1A2A5800  C4E4D7C1  F0F0F2F3*
02E3E7E3  4000033C  40400038  40400001  D0F85002  B0005800  D1385700
D0EC5000  D0E46800  D0E06B00  D0E87000  D15058F0  D18C5800  F5E01000
5000D140  58F0D1C8  4110D0CC  05EF58F0  C4E4D7C1  F0F0F2F4*
02E3E7E3  40000374  40400038  40400001  D1885800  F00C1BFF  870FD3EC
5820D0F8  5840D0F8  5850D1F8  5860D1D4  5870D1F4  5880D1F0  18B27840
D1287860  D15058A0  D1905890  D1B07968  C4E4D7C1  F0F0F2F5*
02E3E7E3  400003AC  40400038  40400001  90004770  D3DC5800  D1541A04
5000D154  18208920  000250B2  A0007807  90003200  47A0D3C2  5830D154
89300002  5823A000  5830D154  89300002  C4E4D7C1  F0F0F2F6*
```

```
02E3E7E3  400003E4  40400038  40400001  13025003  A0005800  D1485700
D0EC5000  D0E46820  D0E06B20  D0E83B24  70259000  1AB41A56  1A761A86
59B0D16C  47C0D382  5880D1C0  5890D198  C4E4D7C1  F0F0F2F7*
02E3E7E3  4000041C  40400038  40400001  58B0D1A0  58A0D1E4  5820D138
5A20D0F8  5020D138  5920D144  47C0D232  1BFF58E0  D00007FE  58A0D004
58E0A00C  58B0A018  5810B004  5820D164  C4E4D7C1  F0F0F2F8*
02E3E7E3  40000454  40400038  40400001  50201000  5830B01C  5840D160
50403000  5850B020  5860D168  50605000  5870B024  5880D148  50807000
5890B028  5800D158  50009000  5810B030  C4E4D7C1  F0F0F2F9*
02E3E7E3  4000048C  40400038  40400001  5820D154  50201000  18DA92FF
A00C982C  A01C07FE  987B1004  58207000  5020D164  58209000  5020D16C
987B1014  58207000  5020D144  58209000  C4E4D7C1  F0F0F3F0**
02E3E7E3  400004C4  40400038  40400001  5020D160  5820A000  5020D168
5820B000  5020D148  98791028  58207000  5020D158  58209000  5020D154
58201000  41302000  41500004  1B255C40  C4E4D7C1  F0F0F3F1*
02E3E7E3  400004FC  40400038  40400001  D10C1B25  5020D1C0  5030D1C4
5030D054  58201008  41302000  41500004  1B255C40  D1101B25  5020D1B0
5030D1B4  58201010  41302000  41500004  C4E4D7C1  F0F0F3F2*
02E3E7E3  40000534  40400038  40400001  1B255C40  D1001B25  5020D1A0
5030D1A4  58201018  41302000  41500001  1B255C40  D1141B25  5020D198
5030D19C  5030D0D8  5820102C  41302000  C4E4D7C1  F0F0F3F3*
02E3E7E3  4000056C  40400012  40400001  41500004  1B255020  D1905030
D19447F0  D1FC4040  40404040  40404040  40404040  40404040  40404040
40404040  40404040  40404040  40404040  C4E4D7C1  F0F0F3F4*
02E3E7E3  40000020  40400004  40400001  000004A0  40404040  40404040
40404040  40404040  40404040  40404040  40404040  40404040  40404040
40404040  40404040  40404040  40404040  C4E4D7C1  F0F0F3F5*
02D9D3C4  40404040  40400038  40404040  00020001  0C0001B0  00030001
0C0001B4  00040001  1C0001D0  00050001  1C0001D4  00060001  1C0001E0
00070001  1C0001E4  00080001  1C0001F0  C4E4D7C1  F0F0F3F6*
02E3E7E3  40000024  40400008  40400001  00000028  00000440  40404040
40404040  40404040  40404040  40404040  40404040  40404040  40404040
40404040  40404040  40404040  40404040  C4E4D7C1  F0F0F3F7*
02E3E7E3  40000074  40400008  40400001  00000324  00000324  40404040
40404040  40404040  40404040  40404040  40404040  40404040  40404040
40404040  40404040  40404040  40404040  C4E4D7C1  F0F0F3F8*
02E3E7E3  40000080  40400004  40400001  0000018C  40404040  40404040
40404040  40404040  40404040  40404040  40404040  40404040  40404040

MEMBER NAME  DUPARY
40404040  40404040  40404040  40404040  C4E4D7C1  F0F0F3F9*
02E3E7E3  40000094  40400008  40400001  80000164  00000160  40404040
40404040  40404040  40404040  40404040  40404040  40404040  40404040
40404040  40404040  40404040  40404040  C4E4D7C1  F0F0F4F0**
02D9D3C4  40404040  40400038  40404040  00010001  0C000020  00010001
0C000024  00010001  0C000028  00010001  0C000074  00010001  0C000078
00010001  0C000080  00010001  0C000094  C4E4D7C1  F0F0F4F1*
02E3E7E3  4000009C  40400008  40400001  80000174  0000012C  40404040
40404040  40404040  40404040  40404040  40404040  40404040  40404040
40404040  40404040  40404040  40404040  C4E4D7C1  F0F0F4F2*
02E3E7E3  400000A8  40400004  40400001  80000174  40404040  40404040
40404040  40404040  40404040  40404040  40404040  40404040  40404040
40404040  40404040  40404040  40404040  C4E4D7C1  F0F0F4F3*
02E3E7E3  400000B4  40400010  40400001  00000118  00000130  00000144
00000140  40404040  40404040  40404040  40404040  40404040  40404040
40404040  40404040  40404040  40404040  C4E4D7C1  F0F0F4F4*
02D9D3C4  40404040  40400038  40404040  00010001  0C000098  00010001
0C00009C  00010001  0C0000A0  00010001  0C0000A8  00010001  0C0000B4
00010001  0C0000B8  00010001  0C0000BC  C4E4D7C1  F0F0F4F5*
```

```
02E3E7E3  400000C4  4040001C  40400001  000001A0  00000118  00000118
00000118  00000118  00000120  00000128  40404040  40404040  40404040
40404040  40404040  40404040  40404040  C4E4D7C1  F0F0F4F6*
02D9D3C4  40404040  40400038  40404040  00010001  0C0000C0  00010001
0C0000C4  00010001  0C0000C8  00010001  0C0000CC  00010001  0C0000D0
00010001  0C0000D4  00010001  0C0000D8  C4E4D7C1  F0F0F4F7*
02E3E7E3  400000E0  4040001C  40400001  00000118  00000118  00000144
00000148  80000118  00000190  00000168  40404040  40404040  40404040
40404040  40404040  40404040  40404040  C4E4D7C1  F0F0F4F8*
02D9D3C4  40404040  40400038  40404040  00010001  0C0000DC  00010001
0C0000E0  00010001  0C0000E4  00010001  0C0000E8  00010001  0C0000EC
00010001  0C0000F0  00010001  0C0000F4  C4E4D7C1  F0F0F4F9*
02E3E7E3  400000FC  40400004  40400001  00000160  40404040  40404040
40404040  40404040  40404040  40404040  40404040  40404040  40404040
40404040  40404040  40404040  40404040  C4E4D7C1  F0F0F5F0**
02E3E7E3  40000104  40400004  40400001  80000188  40404040  40404040
40404040  40404040  40404040  40404040  40404040  40404040  40404040
40404040  40404040  40404040  40404040  C4E4D7C1  F0F0F5F1*
02E3E7E3  400001F4  40400030  40400001  00000000  00000010  00000058
00000000  00000000  00000000  00000000  00000000  0000000C  00000068
00000060  0000005C  40404040  40404040  C4E4D7C1  F0F0F5F2*
02D9D3C4  40404040  40400018  40404040  00010001  0C0000F8  00010001
0C0000FC  00010001  0C000104  40404040  40404040  40404040  40404040
40404040  40404040  40404040  40404040  C4E4D7C1  F0F0F5F3*
02C5D5C4  40404040  40404040  40404040  40404040  40404040  40404040
0000057E  F1F5F7F3  F460C6D6  F34040F0  F2F0F2F8  F7F0F9F8  40F0F84B
F1F44BF5  F6404040  C4E4D7C1  D9E84040  C4E4D7C1  F0F0F5F4**

MEMBER NAME   ELMPNT
02C5E2C4  40404040  40400010  40400001  C5D3D4D7  D5E34040  00000000
40000000  40404040  40404040  40404040  40404040  40404040  40404040
40404040  40404040  40404040  40404040  C5D3D4D7  F0F0F0F1*
02E3E7E3  40000000  40400038  40400001  47F0F00C  07C5D3D4  D7D5E340
90ECD00C  184D98CD  F0205040  D00450D0  400807FC  40404040  40404040
021A335C  5C5C5C5C  5C5C5C5C  5C5C5C5C  C5D3D4D7  F0F0F0F2*
02E3E7E3  40000038  40400038  40400001  5C5C5C5C  5C5C5C5C  5C5C5C5C
5C5C5C5C  5C5C5C5C  5C5C5C5C  5C5C5C5C  5C5C5C5C  5C5C5C5C  5C5C1E1A
335C5C5C  5C5C5C5C  5C5C5C5C  5C5C5C40  C5D3D4D7  F0F0F0F3*
02E3E7E3  40000070  40400038  40400001  40C5D3C5  D4C5D5E3  404040E3
C1C2D3C5  40405C5C  5C5C5C5C  5C5C5C5C  5C5C5C5C  5C5C5C5C  1E1A335C
5C5C5C5C  5C5C5C5C  5C5C5C5C  5C5C5C5C  C5D3D4D7  F0F0F0F4*
02E3E7E3  400000A8  40400038  40400001  5C5C5C5C  5C5C5C5C  5C5C5C5C
5C5C5C5C  5C5C5C5C  5C5C5C5C  5C5C5C5C  5C5C5C5C  5C5C1E1A  21404040
40404040  40404040  40404040  C7C5D5C5  C5D3D4D7  F0F0F0F5*
02E3E7E3  400000E0  40400038  40400001  D9C9C340  7E40F140  7E40D3C9
D5C51E1A  23404040  40404040  40404040  40404040  C7C5D5C5  D9C9C340
7E40F240  7E40C3C9  D9C3D3C5  1E1A2040  C5D3D4D7  F0F0F0F6*
02E3E7E3  40000118  40400038  40400001  40404040  40404040  40404040
4040C7C5  D5C5D9C9  C3407E40  F3407E40  C1D9C31E  1A234040  40404040
40404040  40404040  40C7C5D5  C5D9C9C3  C5D3D4D7  F0F0F0F7*
02E3E7E3  40000150  40400038  40400001  407E40F4  407E40E2  D7D3C9D5
C51E1A24  40404040  40404040  40404040  404040C7  C5D5C5D9  C9C3407E
40F5407E  40C5D3D3  C9D7E2C5  1E1A335C  C5D3D4D7  F0F0F0F8*
02E3E7E3  40000188  40400038  40400001  5C5C5C5C  5C5C5C5C  5C5C5C5C
5C5C5C5C  5C5C5C5C  5C5C5C5C  5C5C5C5C  5C5C5C5C  5C5C5C5C  5C5C5C5C
5C5C5C5C  5C5C5C5C  5C5C1E1A  2E40C7C5  C5D3D4D7  F0F0F0F9*
02E3E7E3  400001C0  40400038  40400001  D5C5D9C9  C3404F40  D3E3404F
4040E74D  F15D404F  4040E84D  F15D404F  4040E74D  F25D404F  4040E84D
F25D401A  314F4040  40C3E740  404F4040  C5D3D4D7  F0F0F1F0**
```

```
02E3E7E3  400001F8  40400038  40400001  40C3E840  404FD9C1  C440C1E7
C9E24F40  C4C5E37B  404F40D4  C1D1D6D9  404F40D4  C9D5D6D9  404F1A0F
40F1F340  404F4040  40F1F440  40404F1E  C5D3D4D7  F0F0F1F1*
02E3E7E3  40000230  40400038  40400001  1A2E4040  40404040  4040404F
40404040  4F404040  40404040  4F404040  40404040  4F404040  40404040
4F404040  40404040  1A314F40  40404040  C5D3D4D7  F0F0F1F2*
02E3E7E3  40000268  40400038  40400001  40404F40  40404040  40404F40
40404040  4040404F  40404040  40404F40  40404040  40404F40  40404040
40404F1A  0F4F4040  40404F40  40404040  C5D3D4D7  F0F0F1F3*
02E3E7E3  400002A0  40400038  40400001  4040404F  22021A03  40404010
041A0440  404F4010  021A0140  04071A01  4F0A0702  1C1A0340  4F401003
1A034040  4F0A0702  1A014F0A  07021A01  C5D3D4D7  F0F0F1F4*
02E3E7E3  400002D8  40400038  40400001  4F0A0702  1A014F0A  07021A01
4F22021A  34404040  40E2D7D3  C9D5C540  C4C1E3C1  4040404F  40404040
40E74040  4040404F  40404040  40E84040  C5D3D4D7  F0F0F1F5*
02E3E7E3  40000310  40400036  40400001  40404F40  404040C1  40404040
4F1A0A40  404040C2  40404040  4F22021A  12404040  40404040  40404040
40404040  40404004  040A0B05  1C224040  C5D3D4D7  F0F0F1F6*
02E3E7E3  40000398  40400038  40400001  00000000  00000000  4F080000
00000000  00000000  00000001  00000002  00000003  00000004  00000005
00000006  00000007  00000008  00000009  C5D3D4D7  F0F0F1F7*
02E3E7E3  400003D0  4040001C  40400001  0000000A  0000000B  0000000C
0000000D  0000000E  00000000  00000000  40404040  40404040  40404040
40404040  40404040  40404040  40404040  C5D3D4D7  F0F0F1F8*
02E3E7E3  40000448  40400004  40400001  00000000  40404040  40404040
40404040  40404040  40404040  40404040  40404040  40404040  40404040
40404040  40404040  40404040  40404040  C5D3D4D7  F0F0F1F9*
02C5E2C4  40404040  40400010  40400002  C9C2C3D6  D47B4040  02000000

MEMBER NAME  ELMPNT
40000000  40404040  40404040  40404040  40404040  40404040  40404040
40404040  40404040  40404040  40404040  C5D3D4D7  F0F0F2F0**
02E3E7E3  40000450  40400004  40400001  00000000  40404040  40404040
40404040  40404040  40404040  40404040  40404040  40404040  40404040
40404040  40404040  40404040  40404040  C5D3D4D7  F0F0F2F1*
02E3E7E3  40000458  40400004  40400001  00000000  40404040  40404040
40404040  40404040  40404040  40404040  40404040  40404040  40404040
40404040  40404040  40404040  40404040  C5D3D4D7  F0F0F2F2*
02E3E7E3  4000049C  40400038  40400001  58A0D064  5880D114  58F0D110
45E0F004  00000006  00000028  45E0F010  50A0D0E0  5890D070  58B0D108
5870D0E0  5C60D130  18471A49  2B007804  C5D3D4D7  F0F0F2F3*
02E3E7E3  400004D4  40400038  40400001  B0006A00  D0586000  D0505830
D0545030  D0B81847  5A40D080  2B007804  B0006A00  D0586000  D0505800
D0545000  D0BC1847  5A40D090  7804B000  C5D3D4D7  F0F0F2F4*
02E3E7E3  4000050C  40400038  40400001  7000D0C0  18475A40  D1187804
B0007000  D0C81847  1A487804  B0007000  D0C41847  5A40D134  7804B000
7000D0CC  18475A40  D1387804  B0007000  C5D3D4D7  F0F0F2F5*
02E3E7E3  40000544  40400038  40400001  D0B01847  5A40D13C  7804B000
7000D0B4  18475A40  D1407804  B0007000  D0D81847  5A40D144  2B007804
B0006A00  D0586000  D0505800  D0545000  C5D3D4D7  F0F0F2F6*
02E3E7E3  4000057C  40400038  40400001  D0D01847  5A40D148  7804B000
7000D0E4  18475A40  D14C7804  B0007000  D0E858F0  D1101800  45E0F004
00000006  000002A5  45E0F008  0450D0E0  C5D3D4D7  F0F0F2F7*
02E3E7E3  400005B4  40400038  40400001  45E0F008  0450D0BC  45E0F008
0470D0C0  45E0F008  0470D0C8  45E0F008  0470D0C4  45E0F008  0470D0CC
45E0F008  0470D0B0  45E0F008  0470D0B4  C5D3D4D7  F0F0F2F8*
02E3E7E3  400005EC  40400038  40400001  45E0F008  0470D0D8  45E0F008
0450D0D0  45E0F008  0470D0E4  45E0F008  0470D0E8  18475A40  D15045E0
F0080474  B0001847  5A40D130  45E0F008  C5D3D4D7  F0F0F2F9*
```

| | | | | | | |
|---|---|---|---|---|---|---|
| 02E3E7E3 | 40000624 | 40400038 | 40400001 | 0474B000 | 45E0F010 | 5800D0D4 |
| 12004780 | D3AA1939 | 4770D3AA | 58F0D110 | 45E0F004 | 00000006 | 000002E6 |
| 45E0F010 | 2B007800 | D0B06A00 | D0586000 | C5D3D4D7 | F0F0F3F0** | |
| 02E3E7E3 | 4000065C | 40400038 | 40400001 | D0505870 | D0542B00 | 7800D0B4 |
| 6A00D058 | 6000D050 | 5800D054 | 5000D0A8 | 1C681807 | 1A095000 | D1201807 |
| 5A00D080 | 5000D124 | 18575A50 | D0901837 | C5D3D4D7 | F0F0F3F1* | |
| 02E3E7E3 | 40000694 | 40400038 | 40400001 | 5A30D118 | 18455850 | D1245860 |
| D120187A | 18B35890 | D10058F0 | D1101800 | 45E0F004 | 00000006 | 0000032A |
| 45E0F008 | 04769000 | 45E0F008 | 04759000 | C5D3D4D7 | F0F0F3F2* | |
| 02E3E7E3 | 400006CC | 40400038 | 40400001 | 45E0F008 | 04749000 | 45E0F008 |
| 047B9000 | 45E0F010 | 1AB81A48 | 1A581A68 | 1A7A5970 | D0A847C0 | D36258B0 |
| D1085890 | D0705820 | D0E01A2A | 5020D0E0 | C5D3D4D7 | F0F0F3F3* | |
| 02E3E7E3 | 40000704 | 40400038 | 40400001 | 5920D0DC | 47C0D17C | 1BFF58E0 |
| D00007FE | 58D0D004 | 58E0D00C | 92FFD00C | 982CD01C | 07FE987A | 10045820 |
| 70005020 | D0DC5820 | 90005020 | D0F05820 | C5D3D4D7 | F0F0F3F4* | |
| 02E3E7E3 | 4000073C | 40400038 | 40400001 | A0005020 | D0D45820 | 10004130 |
| 20004150 | 00041B25 | 5C40D098 | 1B255020 | D1085030 | D10C5820 | 10084130 |
| 20004150 | 00041B25 | 5C40D074 | 1B255020 | C5D3D4D7 | F0F0F3F5* | |
| 02E3E7E3 | 40000774 | 4040000A | 40400001 | D1005030 | D10447F0 | D1544040 |
| 40404040 | 40404040 | 40404040 | 40404040 | 40404040 | 40404040 | 40404040 |
| 40404040 | 40404040 | 40404040 | 40404040 | C5D3D4D7 | F0F0F3F6* | |
| 02E3E7E3 | 40000020 | 40400008 | 40400001 | 00000726 | 00000348 | 40404040 |
| 40404040 | 40404040 | 40404040 | 40404040 | 40404040 | 40404040 | 40404040 |
| 40404040 | 40404040 | 40404040 | 40404040 | C5D3D4D7 | F0F0F3F7* | |
| 02E3E7E3 | 40000348 | 40400004 | 40400001 | 00000714 | 40404040 | 40404040 |
| 40404040 | 40404040 | 40404040 | 40404040 | 40404040 | 40404040 | 40404040 |
| 40404040 | 40404040 | 40404040 | 40404040 | C5D3D4D7 | F0F0F3F8* | |
| 02D9D3C4 | 40404040 | 40400038 | 40404040 | 00020001 | 1C000458 | 00010001 |
| 0C0004B0 | 00010001 | 0C0005A8 | 00010001 | 0C000648 | 00010001 | 0C0006B8 |

MEMBER NAME ELMPNT

| | | | | | | |
|---|---|---|---|---|---|---|
| 00010001 | 0C000020 | 00010001 | 0C000024 | C5D3D4D7 | F0F0F3F9* | |
| 02E3E7E3 | 4000045C | 40400038 | 40400001 | 00000014 | 00000010 | 00000000 |
| 00000000 | 00000000 | 00000000 | 00000000 | 00000038 | 00000018 | 0000001C |
| 00000020 | 00000024 | 00000028 | 0000002C | C5D3D4D7 | F0F0F4F0** | |
| 02E3E7E3 | 40000494 | 40400008 | 40400001 | 00000030 | 00000034 | 40404040 |
| 40404040 | 40404040 | 40404040 | 40404040 | 40404040 | 40404040 | 40404040 |
| 40404040 | 40404040 | 40404040 | 40404040 | C5D3D4D7 | F0F0F4F1* | |
| 02D9D3C4 | 40404040 | 40400008 | 40404040 | 00010001 | 0C000348 | 40404040 |
| 40404040 | 40404040 | 40404040 | 40404040 | 40404040 | 40404040 | 40404040 |
| 40404040 | 40404040 | 40404040 | 40404040 | C5D3D4D7 | F0F0F4F2* | |
| 02C5D5C4 | 40404040 | 40404040 | 40404040 | 40404040 | 40404040 | 40404040 |
| 0000077E | F1F5F7F3 | F460C6D6 | F34040F0 | F2F0F2F8 | F7F0F9F8 | 40F0F84B |
| F1F54BF0 | F0404040 | C5D3D4D7 | D5E34040 | C5D3D4D7 | F0F0F4F3** | |

MEMBER NAME ELLCVT

| | | | | | | |
|---|---|---|---|---|---|---|
| 02C5E2C4 | 40404040 | 40400010 | 40400001 | C5D3D3C3 | E5E34040 | 00000000 |
| 40000000 | 40404040 | 40404040 | 40404040 | 40404040 | 40404040 | 40404040 |
| 40404040 | 40404040 | 40404040 | 40404040 | C5D3D3C3 | F0F0F0F1* | |
| 02E3E7E3 | 40000000 | 40400028 | 40400001 | 47F0F00C | 07C5D3D3 | C3E5E340 |
| 90ECD00C | 184D98CD | F0205040 | D00450D0 | 400807FC | 40404040 | 40404040 |
| 40404040 | 40404040 | 40404040 | 40404040 | C5D3D3C3 | F0F0F0F2* | |
| 02E3E7E3 | 40000088 | 40400038 | 40400001 | 00000000 | 00000000 | 4E000000 |
| 00000000 | 4F080000 | 00000000 | 4E000000 | 80000000 | 3FCCCCCC | CCCCCCCD |
| 41100000 | 00000000 | 42120000 | 00000000 | C5D3D3C3 | F0F0F0F3* | |
| 02E3E7E3 | 400000C0 | 4040002C | 40400001 | 00000000 | 00000001 | 00000002 |
| 00000004 | 00000005 | 00000006 | 00000007 | 00000008 | 00000009 | 00000000 |
| 00000000 | 40404040 | 40404040 | 40404040 | C5D3D3C3 | F0F0F0F4* | |
| 02E3E7E3 | 40000150 | 40400004 | 40400001 | 00000000 | 40404040 | 40404040 |

```
40404040  40404040  40404040  40404040  40404040  40404040  40404040
40404040  40404040  40404040  40404040  C5D3D3C3  F0F0F0F5*
02E3E7E3  40000158  40400004  40400001  00000000  40404040  40404040
40404040  40404040  40404040  40404040  40404040  40404040  40404040
40404040  40404040  40404040  40404040  C5D3D3C3  F0F0F0F6*
02C5E2C4  40404040  40400010  40400002  C4C3D6E2  40404040  02000000
40000000  40404040  40404040  40404040  40404040  40404040  40404040
40404040  40404040  40404040  40404040  C5D3D3C3  F0F0F0F7*
02E3E7E3  40000160  40400004  40400001  00000000  40404040  40404040
40404040  40404040  40404040  40404040  40404040  40404040  40404040
40404040  40404040  40404040  40404040  C5D3D3C3  F0F0F0F8*
02C5E2C4  40404040  40400010  40400003  C4E2C9D5  40404040  02000000
40000000  40404040  40404040  40404040  40404040  40404040  40404040
40404040  40404040  40404040  40404040  C5D3D3C3  F0F0F0F9*
02E3E7E3  40000168  40400008  40400001  00000000  00000000  40404040
40404040  40404040  40404040  40404040  40404040  40404040  40404040
40404040  40404040  40404040  40404040  C5D3D3C3  F0F0F1F0**
02C5E2C4  40404040  40400010  40400004  E2D8D9E3  40404040  02000000
40000000  40404040  40404040  40404040  40404040  40404040  40404040
40404040  40404040  40404040  40404040  C5D3D3C3  F0F0F1F1*
02C5E2C4  40404040  40400010  40400005  C4C1D9C3  D6E24040  02000000
40000000  40404040  40404040  40404040  40404040  40404040  40404040
40404040  40404040  40404040  40404040  C5D3D3C3  F0F0F1F2*
02E3E7E3  40000174  4040000C  40400001  00000000  00000000  00000000
40404040  40404040  40404040  40404040  40404040  40404040  40404040
40404040  40404040  40404040  40404040  C5D3D3C3  F0F0F1F3*
02E3E7E3  400001C8  40400038  40400001  5890D138  58A0D128  58B0D144
5860D09C  5850D0A4  5830D0B4  6800D088  23006000  D19058F0  D1544110
D04C05EF  6000D198  6840B020  6040D118  C5D3D3C3  F0F0F1F4*
02E3E7E3  40000200  40400038  40400001  6820B028  6020D0F8  2B246020
D1082022  6C20D090  6D20D198  6A20D080  28026A00  D0706000  D0605820
D0645020  D0CC1926  47A0D210  5060D0CC  C5D3D3C3  F0F0F1F5*
02E3E7E3  40000238  40400038  40400001  5800D0CC  1A065000  D0C85800
D0CC5700  D07C5000  D06C6820  D0686B20  D0786800  D1082D02  6000D100
6800D118  6000D0D0  5060D0C4  6800B008  C5D3D3C3  F0F0F1F6*
02E3E7E3  40000270  40400038  40400001  6000D168  6800B030  6000D160
6800B040  6000D170  6800B010  6000D180  6800B038  6000D178  6800B048
6000D188  18231845  18745880  D0C418B2  C5D3D3C3  F0F0F1F7*
02E3E7E3  400002A8  40400038  40400001  58A0D130  5840D128  5980D0C8
4770D298  6800D0F8  6000D0D0  58F0D140  4110D050  05EF6000  D19058F0
D14C4110  D05005EF  6000D198  6820D190  C5D3D3C3  F0F0F1F8*
02E3E7E3  400002E0  40400038  40400001  6C20D160  6A20D168  6840D198
6C40D170  2A24702B  90046820  D1906C20  D1786A20  D1806840  D1986C40
D1882A24  702B9008  6820D190  6C20D170  C5D3D3C3  F0F0F1F9*
02E3E7E3  40000318  40400038  40400001  6840D198  6C40D160  2B24702B

MEMBER NAME  ELLCVT
A0046820  D1906C20  D1886840  D1986C40  D1782B24  702BA008  782BA004
7020D190  3C22784B  A0083C44  3A247020  C5D3D3C3  F0F0F2F0**
02E3E7E3  40000350  40400038  40400001  D19458F0  D1504110  D05405EF
7000D198  2B447840  D1982B22  7820D190  2D24702B  A0042B22  782BA008
2D24702B  A0081986  4780D398  782B9004  C5D3D3C3  F0F0F2F1*
02E3E7E3  40000388  40400038  40400001  18281B26  89200003  7B229004
3C22784B  90087B42  90083C44  3A247020  D19058F0  D1504110  D05805EF
7000D194  18271B25  7800D194  70024000  C5D3D3C3  F0F0F2F2*
02E3E7E3  400003C0  40400038  40400001  6800D0D0  6A00D100  6000D0D0
1A861A75  1AB35980  D0C847C0  D28858A0  D12858B0  D1445820  D0C88920
00027800  D0987002  A0001BFF  58E0D000  C5D3D3C3  F0F0F2F3*
02E3E7E3  400003F8  40400038  40400001  07FE58A0  D00458E0  A00C58B0
```

```
A0185810  B0105820  D0C85020  100018DA  92FFA00C  982CA01C  07FE5870
10105820  70005020  D0C85820  10004130  C5D3D3C3  F0F0F2F4*
02E3E7E3  40000430  40400038  40400001  20004150  00081B25  5020D144
5030D148  58201004  41302000  41500004  1B255B20  D0B45020  D1385030
D13C5820  10084130  20004150  00041B25  C5D3D3C3  F0F0F2F5*
02E3E7E3  40000468  40400026  40400001  5B20D0B4  5020D130  5030D134
5820100C  41302000  41500004  1B255020  D1285030  D12C47F0  D1A04040
40404040  40404040  40404040  40404040  C5D3D3C3  F0F0F2F6*
02E3E7E3  40000020  4040000C  40400001  0000041E  00000028  000003FA
40404040  40404040  40404040  40404040  40404040  40404040  40404040
40404040  40404040  40404040  40404040  C5D3D3C3  F0F0F2F7*
02E3E7E3  40000074  40400004  40400001  800001B8  40404040  40404040
40404040  40404040  40404040  40404040  40404040  40404040  40404040
40404040  40404040  40404040  40404040  C5D3D3C3  F0F0F2F8*
02D9D3C4  40404040  40400038  40404040  00020001  1C000168  00030001
1C000174  00040001  1C000178  00050001  1C00017C  00010001  0C000020
00010001  0C000024  00010001  0C000028  C5D3D3C3  F0F0F2F9*
02E3E7E3  40000078  4040000C  40400001  800000F8  800001BC  800001B8
40404040  40404040  40404040  40404040  40404040  40404040  40404040
40404040  40404040  40404040  40404040  C5D3D3C3  F0F0F3F0**
02E3E7E3  40000180  40400038  40400001  00000000  00000000  00000000
00000000  00000000  00000000  00000000  00000000  00000000  00000000
00000000  00000000  00000000  00000000  C5D3D3C3  F0F0F3F1*
02E3E7E3  400001B8  40400010  40400001  00000000  00000000  00000000
00000000  40404040  40404040  40404040  40404040  40404040  40404040
40404040  40404040  40404040  40404040  C5D3D3C3  F0F0F3F2*
02D9D3C4  40404040  40400020  40404040  00010001  0C000074  00010001
0C000078  00010001  0C00007C  00010001  0C000080  40404040  40404040
40404040  40404040  40404040  40404040  C5D3D3C3  F0F0F3F3*
02C5D5C4  40404040  40404040  40404040  40404040  40404040  40404040
0000048E  F1F5F7F3  F460C6D6  F34040F0  F2F0F2F8  F7F0F9F8  40F0F84B
F1F54BF0  F4404040  C5D3D3C3  E5E34040  C5D3D3C3  F0F0F3F4**

MEMBER NAME  FBUILD
02C5E2C4  40404040  40400010  40400001  C6C2E4C9  D3C44040  00000000
40000000  40404040  40404040  40404040  40404040  40404040  40404040
40404040  40404040  40404040  40404040  C6C2E4C9  F0F0F0F1*
02E3E7E3  40000000  40400038  40400001  47F0F00C  07C6C2E4  C9D3C440
90ECD00C  184D98CD  F0205040  D00450D0  400807FC  40404040  40404040
02100422  02060414  0122020A  08031801  C6C2E4C9  F0F0F0F2*
02E3E7E3  40000038  40400038  40400001  0A080318  011A05C4  C1E2C840
10031A07  40D3C1E8  E4D74010  041A1B40  D5D6E340  C3C1D3D3  C5C440D6
E4E340C9  D540C7C5  D6D4C5E3  D9E81832  C6C2E4C9  F0F0F0F3*
02E3E7E3  40000070  40400038  40400001  22020648  14012202  0A05011A
016B2202  06061401  22021004  18011004  18020614  14011801  10041801
0A0A0318  010A0903  18010A09  03180110  C6C2E4C9  F0F0F0F4*
02E3E7E3  400000A8  40400038  40400001  0418010A  08031801  0A0A0318
01061814  01220206  84140122  020A0501  1A016B22  02060614  0122021A
07E3D6E3  C1D34040  0A0B0318  1A0A0803  C6C2E4C9  F0F0F0F5*
02E3E7E3  400000E0  40400038  40400001  18010A0A  03220206  3E140122
021A0AD4  C1E2E240  40404040  400A0903  18010A09  03180A22  02061E14
01220218  02100418  040A0B03  18050A08  C6C2E4C9  F0F0F0F6*
02E3E7E3  40000118  40400038  40400001  03220206  22140122  D4C1E3C5
D9C9C1D3  4040E3D6  E3C1D340  C1D9C5C1  4040E3D6  E3C1D340  E6C5C9C7
C8E34040  40404040  40404040  40404040  C6C2E4C9  F0F0F0F7*
02E3E7E3  40000150  40400038  40400001  40404040  40404040  40404040
40404040  40404040  40404040  C9D3D3C5  C7C1D340  C3E4E3D6  E4E34040
E4D5C1C2  D3C540E3  D640D6D9  C4C5D940  C6C2E4C9  F0F0F0F8*
02E3E7E3  40000188  40400038  40400001  C5E7E3C5  D9C9D6D9  40E4D5C4
```

```
C5C64B40  E4D5C1C2  D3C540E3  D640C3C8  C1C9D540  40404040  40404040
40404040  40404040  40404040  40404040  C6C2E4C9  F0F0F0F9*
02E3E7E3  400001C0  40400010  40400001  D6D7D740  40404040  40404040
40404040  40404040  40404040  40404040  40404040  40404040  40404040
40404040  40404040  40404040  40404040  C6C2E4C9  F0F0F1F0**
02E3E7E3  40000820  40400038  40400001  00000000  00000000  4E000000
00000000  4F080000  00000000  4E000000  80000000  00000000  00000000
00000000  00000001  00000001  00000002  C6C2E4C9  F0F0F1F1*
02E3E7E3  40000858  40400038  40400001  00000003  00000004  00000005
00000006  00000007  00000008  00000009  0000000A  0000000B  0000000C
0000000D  0000000E  0000000F  00000010  C6C2E4C9  F0F0F1F2*
02E3E7E3  40000890  40400038  40400001  00000014  00000016  00000018
0000001E  00000022  00000028  0000003E  00000048  00000049  00000058
0000005D  0000005E  00000070  00000075  C6C2E4C9  F0F0F1F3*
02E3E7E3  400008C8  40400038  40400001  00000076  0000007B  00000084
0000008F  00000098  000007D0  4010624E  40170A3D  401C28F6  40200000
402147AE  402288CE  40400000  40600000  C6C2E4C9  F0F0F1F4*
02E3E7E3  40000900  40400038  40400001  40800000  4095A858  40C3B646
4111999A  41126666  4114CCCD  41164DD3  41180000  411A9FBE  41200000
4121999A  4124CCCD  412620C5  41278106  C6C2E4C9  F0F0F1F5*
02E3E7E3  40000938  40400038  40400001  412A72B0  412BE354  4131A5E3
41348659  413EB852  4140D331  4141251C  41433333  41454E12  41459FFD
4148AC08  414F9DB2  414FDF3B  41587EFA  C6C2E4C9  F0F0F1F6*
02C5E2C4  40404040  40400010  40400002  C7D9E4D7  40404040  05000000
4000000C  40404040  40404040  40404040  40404040  40404040  40404040
40404040  40404040  40404040  40404040  C6C2E4C9  F0F0F1F7*
02E3E7E3  40000970  40400010  40400001  415E3D71  415FB1BA  00000000
00000000  40404040  40404040  40404040  40404040  40404040  40404040
40404040  40404040  40404040  40404040  C6C2E4C9  F0F0F1F8*
02C5E2C4  40404040  40400010  40400003  D9D4D6C4  C5D34040  05000000
40000018  40404040  40404040  40404040  40404040  40404040  40404040
40404040  40404040  40404040  40404040  C6C2E4C9  F0F0F1F9*
02C5E2C4  40404040  40400010  40400004  D7D4C1E3  D3404040  05000000

MEMBER NAME  FBUILD
40001134  40404040  40404040  40404040  40404040  40404040  40404040
40404040  40404040  40404040  40404040  C6C2E4C9  F0F0F2F0**
02C5E2C4  40404040  40400010  40400005  D7C3C5D9  D9404040  05000000
40003844  40404040  40404040  40404040  40404040  40404040  40404040
40404040  40404040  40404040  40404040  C6C2E4C9  F0F0F2F1*
02C5E2C4  40404040  40400010  40400006  D4E2C9E9  C5404040  05000000
4000000C  40404040  40404040  40404040  40404040  40404040  40404040
40404040  40404040  40404040  40404040  C6C2E4C9  F0F0F2F2*
02C5E2C4  40404040  40400010  40400007  C4C5D9D6  E3404040  02000000
40000000  40404040  40404040  40404040  40404040  40404040  40404040
40404040  40404040  40404040  40404040  C6C2E4C9  F0F0F2F3*
02C5E2C4  40404040  40400010  40400008  D4E5C3C8  D9404040  02000000
40000000  40404040  40404040  40404040  40404040  40404040  40404040
40404040  40404040  40404040  40404040  C6C2E4C9  F0F0F2F4*
02E3E7E3  40000EF8  40400020  40400001  00000000  FFFFFFFF  FFFFFFA0
00001130  FFFFFFBB  00000000  00000000  00000000  40404040  40404040
40404040  40404040  40404040  40404040  C6C2E4C9  F0F0F2F5*
02D9D3C4  40404040  40400038  40404040  00020001  0C000EF8  00030001
0C000EFC  00040001  0C000F00  00040001  0C000F04  00050001  0C000F08
00060001  0C000F0C  00070001  1C000F10  C6C2E4C9  F0F0F2F6*
02C5E2C4  40404040  40400010  40400009  C3C1C4D3  D5F14040  02000000
40000000  40404040  40404040  40404040  40404040  40404040  40404040
40404040  40404040  40404040  40404040  C6C2E4C9  F0F0F2F7*
02E3E7E3  40000F18  40400004  40400001  00000000  40404040  40404040
```

```
40404040  40404040  40404040  40404040  40404040  40404040  40404040
40404040  40404040  40404040  40404040  C6C2E4C9  F0F0F2F8*
02C5E2C4  40404040  40400010  4040000A  C3C1C4E2  D7C34040  02000000
40000000  40404040  40404040  40404040  40404040  40404040  40404040
40404040  40404040  40404040  40404040  C6C2E4C9  F0F0F2F9*
02C5E2C4  40404040  40400010  4040000B  C3C1C4E2  E4D74040  02000000
40000000  40404040  40404040  40404040  40404040  40404040  40404040
40404040  40404040  40404040  40404040  C6C2E4C9  F0F0F3F0**
02C5E2C4  40404040  40400010  4040000C  C3C8C1D9  C6D34040  02000000
40000000  40404040  40404040  40404040  40404040  40404040  40404040
40404040  40404040  40404040  40404040  C6C2E4C9  F0F0F3F1*
02C5E2C4  40404040  40400010  4040000D  C8C7C4C1  E3C54040  02000000
40000000  40404040  40404040  40404040  40404040  40404040  40404040
40404040  40404040  40404040  40404040  C6C2E4C9  F0F0F3F2*
02C5E2C4  40404040  40400010  4040000E  C8C7E3C9  D4C54040  02000000
40000000  40404040  40404040  40404040  40404040  40404040  40404040
40404040  40404040  40404040  40404040  C6C2E4C9  F0F0F3F3*
02C5E2C4  40404040  40400010  4040000F  C9C2C3D6  D47B4040  02000000
40000000  40404040  40404040  40404040  40404040  40404040  40404040
40404040  40404040  40404040  40404040  C6C2E4C9  F0F0F3F4*
02E3E7E3  40000F20  4040001C  40400001  00000000  00000000  00000000
00000000  00000000  00000000  00000000  40404040  40404040  40404040
40404040  40404040  40404040  40404040  C6C2E4C9  F0F0F3F5*
02D9D3C4  40404040  40400038  40404040  00080001  1C000F14  00090001
1C000F20  000A0001  1C000F24  000B0001  1C000F28  000C0001  1C000F2C
000D0001  1C000F30  000E0001  1C000F34  C6C2E4C9  F0F0F3F6*
02C5E2C4  40404040  40400010  40400010  C9C3D5E3  C5D94040  02000000
40000000  40404040  40404040  40404040  40404040  40404040  40404040
40404040  40404040  40404040  40404040  C6C2E4C9  F0F0F3F7*
02C5E2C4  40404040  40400010  40400011  D4D6C4E2  D9E34040  02000000
40000000  40404040  40404040  40404040  40404040  40404040  40404040
40404040  40404040  40404040  40404040  C6C2E4C9  F0F0F3F8*
02E3E7E3  40000F3C  40400008  40400001  00000000  00000000  40404040
40404040  40404040  40404040  40404040  40404040  40404040  40404040

MEMBER NAME  FBUILD
40404040  40404040  40404040  40404040  C6C2E4C9  F0F0F3F9*
02E3E7E3  400009F4  40400004  40400001  000000C8  40404040  40404040
40404040  40404040  40404040  40404040  40404040  40404040  40404040
40404040  40404040  40404040  40404040  C6C2E4C9  F0F0F4F0**
02E3E7E3  40000DD8  40400038  40400001  E2C5D840  4040D340  7B4040D4
D6C4C5D3  40C9C4C5  D5E34040  40404040  40404040  C4C5E340  4040C1D9
C5C14040  40404040  E740C2C1  D9404040  C6C2E4C9  F0F0F4F1*
02E3E7E3  40000E10  40400038  40400001  4040E8C2  C1D94040  40404040
D4C1E3D3  40E6C5C9  C7C8E340  4040E5D6  D3E4D4C5  40404040  40D6D9C9
C5D5E3C1  E3C9D6D5  E2404040  40404040  C6C2E4C9  F0F0F4F2*
02E3E7E3  40000E48  40400038  40400001  40404040  4040C5D9  D9D6D9E2
40404040  C3D6D7E8  D9C9C7C8  E3404DC3  5D40F1F9  F8F640E3  C8C540C2
D6C5C9D5  C740C3D6  D4D7C1D5  E85BC1D3  C6C2E4C9  F0F0F4F3*
02E3E7E3  40000E80  40400038  40400001  D340D9C9  C7C8E3E2  40D9C5E2
C5D9E5C5  C45B5BE2  D3C9C340  E5C5D9E2  C9D6D540  E7E7E7E7  40404040
40404040  4040C4C1  E3C57A40  E7E761E7  C6C2E4C9  F0F0F4F4*
02E3E7E3  40000EB8  40400038  40400001  E761E7E7  40404040  40E3C9D4
C57A40E7  E77AE7E7  7AE7E740  40404040  40404040  40404040  404040C4
C1E2C840  40604040  40404040  40404040  C6C2E4C9  F0F0F4F5*
02E3E7E3  40001004  40400038  40400001  5870DD48  58A0D6AC  5890D7A8
5880D6C8  5860D6E4  5820DD3C  58002008  5A00D70C  5000D82C  58F0DD64
4110D0D4  05EF58F0  DD604110  D0D805EF  C6C2E4C9  F0F0F4F6*
02E3E7E3  4000103C  40400038  40400001  4100DCE4  5000D0E0  4100D97C
```

| | | | | | | |
|---|---|---|---|---|---|---|
| 5000D0E4 | 9280D0E4 | 58F0DD44 | 4110D0DC | 05EF4100 | DCF75000 | D0E04100 |
| D9A45000 | D0E49280 | D0E458F0 | DD444110 | C6C2E4C9 | F0F0F4F7* | |
| 02E3E7E3 | 40001074 | 40400038 | 40400001 | D0DC05EF | 4100DCD0 | 5000D0EC |
| 58F0DD44 | 4110D0E8 | 05EF5800 | D69C5000 | DDF45060 | DDFC58E0 | DE1C782E |
| 70007020 | DDF82B00 | 38026A00 | D6606000 | C6C2E4C9 | F0F0F4F8* | |
| 02E3E7E3 | 400010AC | 40400038 | 40400001 | D6505830 | D6541033 | 5030D7C0 |
| 58F0DD68 | 45E0F004 | 00000000 | 00000028 | 45E0F008 | 0450D7C0 | 45E0F010 |
| 58F0DD68 | 45E0F000 | 00000000 | 0000002C | C6C2E4C9 | F0F0F4F9* | |
| 02E3E7E3 | 400010E4 | 40400038 | 40400001 | 45E0F00C | 00000A4C | 01200004 |
| 45E0F010 | 58F0DD5C | 4110D0F4 | 05EF41E0 | 000415FE | 4720DF3E | 58EFD04C |
| 07FE58F0 | DD444110 | D10405EF | 7800DDF8 | C6C2E4C9 | F0F0F5F0** | |
| 02E3E7E3 | 4000111C | 40400038 | 40400001 | 320047A0 | DF644100 | D8A05000 |
| D11458F0 | DD444110 | D11005EF | 4100DD16 | 5000D120 | 58F0DD44 | 4110D11C |
| 05EF5800 | D7DC8709 | DFC45800 | D67C5000 | C6C2E4C9 | F0F0F5F1* | |
| 02E3E7E3 | 40001154 | 40400038 | 40400001 | D8347800 | D6787000 | D8307000 |
| D83C7000 | D8407000 | D8387000 | D86C5800 | D6805000 | D8281828 | 5A20DDFC |
| 78227000 | 7020D9AC | 7800D678 | 7000D9B0 | C6C2E4C9 | F0F0F5F2* | |
| 02E3E7E3 | 4000118C | 40400038 | 40400001 | 7800D678 | 7000D9B4 | 58F0DD6C |
| 4110D128 | 05EF5000 | D7FC7800 | D7A03300 | 7000DE00 | 7000DE04 | 58F0DD58 |
| 4110D130 | 05EF41E0 | 000415FE | 4720DFFA | C6C2E4C9 | F0F0F5F3* | |
| 02E3E7E3 | 400011C4 | 40400038 | 40400001 | 58EFD054 | 07FE58F0 | DD584110 |
| D17805EF | 41E00004 | 15FE4720 | C01458EF | D05C07FE | 7800D78C | 7000D814 |
| 7800D7A4 | 33007000 | D8447800 | D7A47000 | C6C2E4C9 | F0F0F5F4* | |
| 02E3E7E3 | 400011FC | 40400038 | 40400001 | D8785800 | D7DC8709 | C03E5800 |
| D6805000 | D8505800 | D6745000 | D8647800 | DE207000 | D8487800 | DE047000 |
| D9747800 | D7787000 | D9785800 | D6745000 | C6C2E4C9 | F0F0F5F5* | |
| 02E3E7E3 | 40001234 | 40400038 | 40400001 | D8545800 | D8505000 | D7F05080 |
| DD88181A | 5C00D828 | 5010DDB0 | 18365C20 | D8505030 | DD841803 | 1A0A5000 |
| DDB81803 | 5A00D6BC | 5000DDBC | 18035A00 | C6C2E4C9 | F0F0F5F6* | |
| 02E3E7E3 | 4000126C | 40400038 | 40400001 | D68C5000 | DDC01803 | 5A00DD90 |
| 5000DDC4 | 18035A00 | D6D45000 | DDC81803 | 5A00DD94 | 5000DDCC | 18031A08 |
| 5000DD8C | 18035A00 | DD985000 | DDD01803 | C6C2E4C9 | F0F0F5F7* | |
| 02E3E7E3 | 400012A4 | 40400038 | 40400001 | 5A00D6C0 | 5000DDD4 | 18435A40 |
| DD9C5040 | DDD81803 | 5A00DDA0 | 5000DDDC | 18035A00 | DDA45000 | DDE01803 |
| 5A00DDA8 | 5000DDE4 | 18035A00 | DDAC5000 | C6C2E4C9 | F0F0F5F8* | |

MEMBER NAME FBUILD

| | | | | | | |
|---|---|---|---|---|---|---|
| 02E3E7E3 | 400012DC | 40400038 | 40400001 | DDE85040 | DDEC1A38 | 5030DDF0 |
| 186A5890 | D6E418A7 | 5880DD38 | 5870DD30 | 5800D854 | 5A00D680 | 5000D854 |
| 58F0DD5C | 4110D1C0 | 05EF41E0 | 000415FE | C6C2E4C9 | F0F0F5F9* | |
| 02E3E7E3 | 40001314 | 40400038 | 40400001 | 4720C14E | 58EFD064 | 07FE58E0 |
| DDB82B00 | 780EA000 | 6A00D660 | 6000D650 | 5800D654 | 5000D7F8 | 58E0DDBC |
| 2B00780E | A0006A00 | D6606000 | D6505800 | C6C2E4C9 | F0F0F6F0** | |
| 02E3E7E3 | 4000134C | 40400038 | 40400001 | D6545000 | D7E458E0 | DDC02B00 |
| 780EA000 | 6A00D660 | 6000D650 | 5800D654 | 5000D81C | 58E0DDC4 | 2B00780E |
| A0006A00 | D6606000 | D6505800 | D6545000 | C6C2E4C9 | F0F0F6F1* | |
| 02E3E7E3 | 40001384 | 40400038 | 40400001 | D7E058E0 | DDC8780E | A0007000 |
| D80858E0 | DDCC780E | A0007000 | D80C58E0 | DD8C2B00 | 780EA000 | 6A00D660 |
| 6000D650 | 5850D654 | 1C496825 | 70502B00 | C6C2E4C9 | F0F0F6F2* | |
| 02E3E7E3 | 400013BC | 40400038 | 40400001 | 38026A00 | D6606000 | D6505800 |
| D6545000 | D7E858F0 | DD5C4110 | D1D005EF | 41E00004 | 15FE4720 | C21858EF |
| D06C07FE | 58E0DDD0 | 410EA000 | 5000D1E0 | C6C2E4C9 | F0F0F6F3* | |
| 02E3E7E3 | 400013F4 | 40400038 | 40400001 | 58F0DD40 | 4110D1E0 | 05EF5800 |
| D7F45700 | D66C5000 | D65C6820 | D6586B20 | D66858E0 | DDD47C2E | A0007020 |
| D7D83222 | 4730C2E4 | 58E0DDD8 | 780EA000 | C6C2E4C9 | F0F0F6F4* | |
| 02E3E7E3 | 4000142C | 40400038 | 40400001 | 32004730 | C2E45800 | 80455900 |
| D82447A0 | C2E45850 | 80455A50 | D6805050 | 804558F0 | DD681800 | 45E0F004 |
| 00000000 | 00000032 | 5810DDDC | 45E0F008 | C6C2E4C9 | F0F0F6F5* | |
| 02E3E7E3 | 40001464 | 40400034 | 40400001 | 0471A000 | 5810DDE0 | 45E0F008 |

```
0471A000  45E0F008  0450D7C0  45E0F008  0450D7E4  45E0F010  58F0DD68
45E0F000  00000000  00000071  40404040  C6C2E4C9  F0F0F6F6*
02D9D3C4  40404040  40400038  40404040  000F0001  1C000F38  00100001
1C000F3C  00110001  1C000F40  00010001  0C0010C4  00010001  0C0010E0
00010001  0C0010E8  00010001  0C001458  C6C2E4C9  F0F0F6F7*
02E3E7E3  40001498  40400038  40400001  5C40D6DC  45E0F134  00010000
01258001  01000048  00000001  45E0F010  2B227820  D7D858E0  DD8C2B00
780EA000  6A00D660  6000D650  5830D654  C6C2E4C9  F0F0F6F8*
02E3E7E3  400014D0  40400038  40400001  1C296C23  70587020  D8702B44
38426C43  70387040  D87458E0  DDE4704E  A00058E0  DDE8702E  A0005800
D6805000  D7CC5800  D7F45000  D7EC5900  C6C2E4C9  F0F0F6F9*
02E3E7E3  40001508  40400038  40400001  D68C47C0  C3465800  D68C5000
D7EC5830  D7EC8930  00025820  D68C5860  D6905870  D6805880  D68C1893
18A258F0  DD681800  45E0F004  00000000  C6C2E4C9  F0F0F7F0**
02E3E7E3  40001540  40400038  40400001  00000077  45E0F008  047AD980
45E0F010  5800D7CC  1A065000  D80058F0  DD681800  45E0F000  00000000
0000007F  5810D7CC  45E0F134  00010000  C6C2E4C9  F0F0F7F1*
02E3E7E3  40001578  40400038  40400001  0121D881  0200099C  000009D0
00000850  00000001  45E0F010  5800D800  1A075000  D7CC87A8  C3625870
DD305880  DD3858A0  DD485890  D6E45860  C6C2E4C9  F0F0F7F2*
02E3E7E3  400015B0  40400038  40400001  D6AC58E0  DDEC2B00  780EA000
6A00D660  6000D650  5820D654  5020D7C4  12224780  C40A5800  D6705000
D8345800  D7C41200  4770C512  7800D7D8  C6C2E4C9  F0F0F7F3*
02E3E7E3  400015E8  40400038  40400001  7A00D830  7000D830  7840D83C
7C40D838  7820D808  7C20D874  3A427820  D8387A20  D8743D42  7040D83C
7840D840  7C40D838  7860D80C  7C60D874  C6C2E4C9  F0F0F7F4*
02E3E7E3  40001620  40400038  40400001  3A463D42  7040D840  7020D838
7800D86C  7A00D870  7000D86C  5820D680  5020D7B8  58E0DDF0  782EA000
18361873  5880D680  5890D828  18A23862  C6C2E4C9  F0F0F7F5*
02E3E7E3  40001658  40400038  40400001  7967D9A0  4770C4C6  50A0D7B8
5870DD30  5880DD38  58A0DD48  5890D6E4  18365C20  D7B87823  D9A47A20
D7D87023  D9A47823  D9A87A20  D8747023  C6C2E4C9  F0F0F7F6*
02E3E7E3  40001690  40400038  40400001  D9A847F0  C5121A76  87A8C488
50A0D7B8  5870DD30  5880DD38  58A0DD48  5890D6E4  5800D828  5A00D680
5000D828  5820DDB0  1A265020  DDB058E0  C6C2E4C9  F0F0F7F7*
02E3E7E3  400016C8  40400038  40400001  DD8C782E  A0007022  D9A07800

MEMBER NAME  FBUILD
D7D87002  D9A47800  D8747002  D9A858F0  DD704110  D1EC05EF  58F0DD68
45E0F004  00000000  00000085  45E0F008  C6C2E4C9  F0F0F7F8*
02E3E7E3  40001700  40400038  40400001  0450D7F8  45E0F008  0450D7E4
45E0F134  00010000  0120D95F  01000014  00000001  45E0F008  0450D7E0
45E0F008  0470D7D8  45E0F008  0470D808  C6C2E4C9  F0F0F7F9*
02E3E7E3  40001738  40400028  40400001  45E0F008  0470D80C  45E0F008
0450D7E8  45E0F008  0470D874  45E0F008  0470D870  45E0F00C  00000A52
40404040  40404040  40404040  40404040  C6C2E4C9  F0F0F8F0**
02D9D3C4  40404040  40400038  40404040  00010001  0C001494  00010001
0C001540  00010001  0C001568  00010001  0800157D  00010001  08001581
00010001  08001585  00010001  0C0016F8  C6C2E4C9  F0F0F8F1*
02E3E7E3  40001760  40400038  40400001  01200018  45E0F010  58F0DD68
45E0F000  00000000  000000BA  45E0F00C  00000AAB  01200084  45E0F010
4100D94F  5000D20C  58F0DD5C  4110D20C  C6C2E4C9  F0F0F8F2*
02E3E7E3  40001798  40400038  40400001  05EF41E0  000415FE  4720C5DA
58EFD074  07FE5800  D7C41200  4780C65C  5800D7C4  5900D680  4770C602
4100D950  5000D220  58F0DD44  4110D21C  C6C2E4C9  F0F0F8F3*
02E3E7E3  400017D0  40400038  40400001  05EF5800  D7C45900  D6844770
C6204100  D9505000  D22C58F0  DD444110  D22805EF  5800D7C4  5900D688
4770C63E  4100D950  5000D238  58F0DD44  C6C2E4C9  F0F0F8F4*
02E3E7E3  40001808  40400038  40400001  4110D234  05EF5800  D7C45900
```

```
D68C4770  C65C4100  D9505000  D24458F0  DD444110  D24005EF  58F0DD6C
4110D24C  05EF5000  D7FC4100  D9745000  C6C2E4C9  F0F0F8F5*
02E3E7E3  40001840  40400038  40400001  D2544100  D9785000  D25858F0
DD584110  D25405EF  41E00004  15FE4720  C69458EF  D07C07FE  7820D978
7B20D728  7020D978  58F0DD50  4110D29C  C6C2E4C9  F0F0F8F6*
02E3E7E3  40001878  40400038  40400001  05EF7800  D8487B00  D7287000
D8485800  D7F45900  D68C47C0  C8385840  D8545850  D6905860  D6905880
D68C58A0  D7F4195A  47C0C6E4  5040D854  C6C2E4C9  F0F0F8F7*
02E3E7E3  400018B0  40400038  40400001  47F0C838  58F0DD5C  4110D2AC
05EF41E0  000415FE  4720C6FE  58EFD084  07FE58F0  DD5C4110  D2BC05EF
41E00004  15FE4720  C71858EF  D08C07FE  C6C2E4C9  F0F0F8F8*
02E3E7E3  400018E8  40400038  40400001  5A40D680  5800D680  5000D7CC
182A1B25  5A20D680  5020D7EC  192847C0  C73A5080  D7EC5830  D7EC1A35
5B30D680  5030D7EC  18938990  00021825  C6C2E4C9  F0F0F8F9*
02E3E7E3  40001920  40400038  40400001  89200002  5870D680  18A258F0
DD681800  45E0F004  00000000  000000C0  45E0F008  047AD980  45E0F010
5800D7CC  1A065000  D80058F0  DD681800  C6C2E4C9  F0F0F9F0**
02E3E7E3  40001958  40400028  40400001  45E0F000  00000000  000000C8
5810D7CC  45E0F134  00010000  0121D881  0200099C  000009D0  00000850
40404040  40404040  40404040  40404040  C6C2E4C9  F0F0F9F1*
02D9D3C4  40404040  40400038  40404040  00010001  0C00175C  00010001
0C001774  00010001  0C00177C  00010001  0C001938  00010001  0C001960
00010001  08001975  00010001  08001979  C6C2E4C9  F0F0F9F2*
02E3E7E3  40001980  40400038  40400001  00000001  45E0F010  5800D800
1A075000  D7CC87A8  C75A58A0  D7F44100  D9385000  D2D04100  D8825000
D2D49280  D2D458F0  DD444110  D2CC05EF  C6C2E4C9  F0F0F9F3*
02E3E7E3  400019B8  40400038  40400001  58F0DD6C  4110D24C  05EF5000
D7FC4100  D9745000  D2544100  D9785000  D25858F0  DD584110  D25405EF
41E00004  15FE4720  C82058EF  D09407FE  C6C2E4C9  F0F0F9F4*
02E3E7E3  400019F0  40400038  40400001  7820D978  7B20D728  7020D978
5850D7EC  5A50D680  47F0C6D6  5870DD30  5880DD38  58A0DD48  5890D6E4
5860D6AC  5820D864  5A20D680  5020D864  C6C2E4C9  F0F0F9F5*
02E3E7E3  40001A28  40400038  40400001  5920D6D4  4750C8B6  5820D85C
5B20D7F0  5920D6C0  47C0C8B6  58F0DD54  4110D2D8  05EF41E0  000415FE
4720C88A  58EFD09C  07FE5800  D7D05900  C6C2E4C9  F0F0F9F6*
02E3E7E3  40001A60  40400038  40400001  D82C4730  C8B65870  DD4858A0
D6AC5890  D7A85880  D6C85860  D6E45800  D6705000  D7DC47F0  C9865820

MEMBER NAME  FBUILD
D7F05A20  D6805020  D7F05800  DDF01A09  C6C2E4C9  F0F0F9F7*
02E3E7E3  40001A98  40400038  40400001  5000DDF0  5800DDEC  1A095000
DDEC5800  DDE81A09  5000DDE8  5800DDE4  1A095000  DDE45800  DDE01A09
5000DDE0  5800DDDC  1A095000  DDDC5800  C6C2E4C9  F0F0F9F8*
02E3E7E3  40001AD0  40400038  40400001  DDD81A09  5000DDD8  5800DDD4
1A095000  DDD45800  DDD01A09  5000DDD0  5800DD8C  1A095000  DD8C5800
DDCC1A09  5000DDCC  5800DDC8  1A095000  C6C2E4C9  F0F0F9F9*
02E3E7E3  40001B08  40400038  40400001  DDC85800  DDC41A09  5000DDC4
5800DDC0  1A095000  DDC05800  DDBC1A09  5000DDBC  5800DDB8  1A095000
DDB85920  D85C47C0  C1285870  DD4858A0  C6C2E4C9  F0F1F0F0**
02E3E7E3  40001B40  40400038  40400001  D6AC5890  D7A85880  D6C85860
D6E45800  D67C5000  D7DC5800  D7DC8709  C9965800  D8348609  C9B85800
D8545700  D66C5000  D65C6820  D6586B20  C6C2E4C9  F0F1F0F1*
02E3E7E3  40001B78  40400038  40400001  D6687C20  D7287800  D7443A02
7000D804  5800D7DC  8709C9F0  5800D834  8709C9F0  5820D828  5A20D854
18025700  D66C5000  D65C6820  D6586B20  C6C2E4C9  F0F1F0F2*
02E3E7E3  40001BB0  40400038  40400001  D6687C20  D7287800  D75C3A02
7000D804  5800D7F0  5A00D680  5000D850  5800D854  5700D66C  5000D65C
6820D658  6B20D668  7C20D728  33227A20  C6C2E4C9  F0F1F0F3*
02E3E7E3  40001BE8  40400038  40400001  D77C7020  D8105800  D8348709
```

```
CB765800  D7DC8709  CB7658F0  DD5C4110  D2E005EF  41E00004  15FE4720
CA4858EF  D0A407FE  58F0DD68  45E0F004  C6C2E4C9  F0F1F0F4*
02E3E7E3  40001C20  40400038  40400001  00000000  000000CE  45E0F008
0470D830  45E0F008  0470D838  45E0F008  0470D86C  45E0F010  58F0DD68
45E0F000  00000000  000000E6  45E0F00C  C6C2E4C9  F0F1F0F5*
02E3E7E3  40001C58  40400038  40400001  00000A6A  01200041  45E0F010
58F0DD6C  4110D2F0  05EF5000  D7FC7800  D7743300  7000DE24  7800D810
7B00D71C  7000DE28  58F0DD58  4110D2F8  C6C2E4C9  F0F1F0F6*
02E3E7E3  40001C90  40400038  40400001  05EF41E0  000415FE  4720CAD2
58EFD0AC  07FE58F0  DD5C4110  D34005EF  41E00004  15FE4720  CAEC58EF
D0B407FE  58F0DD68  45E0F004  00000000  C6C2E4C9  F0F1F0F7*
02E3E7E3  40001CC8  40400038  40400001  000000EC  45E0F008  0470D83C
45E0F008  0470D840  45E0F010  58F0DD68  45E0F000  00000000  00000104
45E0F134  00010000  0120D89A  0100001E  C6C2E4C9  F0F1F0F8*
02E3E7E3  40001D00  40400038  40400001  00000001  45E0F010  58F0DD6C
4110D350  05EF5000  D7FC7800  D7643300  7000DE24  7800D810  7B00D72C
7000DE28  58F0DD58  4110D358  05EF41E0  C6C2E4C9  F0F1F0F9*
02E3E7E3  40001D38  40400038  40400001  000415FE  4720CB76  58EFD0BC
07FE58F0  DD504110  D3A005EF  58F0DD50  4110D3B0  05EF58F0  DD504110
D3C005EF  58F0DD50  4110D3D0  05EF58F0  C6C2E4C9  F0F1F1F0**
02E3E7E3  40001D70  40400038  40400001  DD504110  D3E005EF  58F0DD50
4110D3F0  05EF7800  D79C3300  7000DE24  58F0DD50  4110D400  05EF7800
D7983300  7000DE24  58F0DD50  4110D410  C6C2E4C9  F0F1F1F1*
02E3E7E3  40001DA8  40400038  40400001  05EF7800  D7703300  7000DE24
58F0DD50  4110D420  05EF7800  D7683300  7000DE24  58F0DD50  4110D430
05EF7800  D7383300  7000DE08  7000DE0C  C6C2E4C9  F0F1F1F2*
02E3E7E3  40001DE0  40400038  40400001  58F0DD50  4110D440  05EF58F0
DD504110  D45005EF  58F0DD50  4110D460  05EF5800  D7DC8609  CC6C7800
D7503300  7000DE24  58F0DD50  4110D470  C6C2E4C9  F0F1F1F3*
02E3E7E3  40001E18  40400038  40400001  05EF58F0  DD504110  D48005EF
58F0DD50  4110D490  05EF58F0  DD504110  D4A005EF  47F0CCD6  7800D76C
33007000  DE247800  D8107B00  D7287000  C6C2E4C9  F0F1F1F4*
02E3E7E3  40001E50  40400038  40400001  DE2858F0  DD504110  D4B005EF
7800D750  33007000  DE247800  D8107B00  D7307000  DE2858F0  DD504110
D4C005EF  7800D810  7B00D728  7000DE24  C6C2E4C9  F0F1F1F5*
02E3E7E3  40001E88  40400038  40400001  58F0DD50  4110D4D0  05EF58F0
DD504110  D4E005EF  58F0DD50  4110D4F0  05EF5800  D7DC8609  CCE61BFF
58E0D000  07FE7800  D76C3300  7000DE24  C6C2E4C9  F0F1F1F6*

MEMBER NAME  FBUILD
02E3E7E3  40001EC0  40400038  40400001  7800D810  7B00D728  7000DE28
58F0DD50  4110D500  05EF7800  D7503300  7000DE24  7800D810  7B00D730
7000DE2C  58F0DD50  4110D510  05EF58F0  C6C2E4C9  F0F1F1F7*
02E3E7E3  40001EF8  40400038  40400001  DD504110  D52005EF  58F0DD50
4110D530  05EF58F0  DD504110  D54005EF  5800D834  8609CD54  1BFF58E0
D00007FE  7820D810  7B20D74C  7020D814  C6C2E4C9  F0F1F1F8*
02E3E7E3  40001F30  40400038  40400001  7020D848  5820D828  5A20D680
18025700  D66C5000  D65C6840  D6586B40  D6687C40  D7283344  3A427040
D8107800  D7543300  7000D974  7B20D71C  C6C2E4C9  F0F1F1F9*
02E3E7E3  40001F68  40400038  40400001  7020D978  7800D758  33007000
DE107000  DE1858F0  DD504110  D55005EF  7800D848  7B00D728  7000D848
58F0DD50  4110D560  05EF7800  D8487B00  C6C2E4C9  F0F1F2F0**
02E3E7E3  40001FA0  40400038  40400001  D7287000  D8487800  D7543300
7000DE14  4100D978  5000D574  58F0DD58  4110D570  05EF41E0  000415FE
4720CE02  58EFD0C4  07FE7820  D9787B20  C6C2E4C9  F0F1F2F1*
02E3E7E3  40001FD8  40400038  40400001  D7287020  D9787800  DE107000
DD7C7800  DE147000  DD80185A  5C40D828  182A188A  189518A2  5870DD30
58F0DD50  4110D5B8  05EF7800  D8487B00  C6C2E4C9  F0F1F2F2*
02E3E7E3  40002010  40400038  40400001  D7287000  D8482B00  780AD9A0
```

| | | | | | | |
|---|---|---|---|---|---|---|
| 6A00D660 | 6000D650 | 5850D654 | 1C466805 | 70506A00 | D6606000 | D6505800 |
| D6545000 | D86858F0 | DD681800 | 45E0F004 | C6C2E4C9 | F0F1F2F3* | |
| 02E3E7E3 | 40002048 | 40400034 | 40400001 | 00000000 | 0000010A | 45E0F008 |
| 0450D868 | 45E0F008 | 047AD9A4 | 45E0F008 | 047AD9A8 | 45E0F010 | 58F0DD68 |
| 45E0F000 | 00000000 | 0000011A | 40404040 | C6C2E4C9 | F0F1F2F4* | |
| 02D9D3C4 | 40404040 | 40400038 | 40404040 | 00010001 | 0800197D | 00010001 |
| 0C001C24 | 00010001 | 0C001C50 | 00010001 | 0C001C58 | 00010001 | 0C001CC8 |
| 00010001 | 0C001CEC | 00010001 | 0C00204C | C6C2E4C9 | F0F1F2F5* | |
| 02E3E7E3 | 4000207C | 40400038 | 40400001 | 45E0F134 | 00010000 | 0120D89A |
| 01000022 | 00000001 | 45E0F010 | 4100D978 | 5000D5CC | 58F0DD58 | 4110D5C8 |
| 05EF41E0 | 000415FE | 4720CEE6 | 58EFD0CC | C6C2E4C9 | F0F1F2F6* | |
| 02E3E7E3 | 400020B4 | 40400038 | 40400001 | 07FE7820 | D9787B20 | D7287020 |
| D97887A8 | CE305870 | DD4858A0 | D6AC5890 | D7A85880 | D6C858F0 | DD504110 |
| D61005EF | 7800D740 | 33007000 | DE2458F0 | C6C2E4C9 | F0F1F2F7* | |
| 02E3E7E3 | 400020EC | 40400038 | 40400001 | DD504110 | D62005EF | 7800D718 |
| 33007000 | DE2458F0 | DD504110 | D63005EF | 58F0DD50 | 4110D640 | 05EF1BFF |
| 58E0D000 | 07FE58A0 | D00458E0 | A00C58B0 | C6C2E4C9 | F0F1F2F8* | |
| 02E3E7E3 | 40002124 | 40400038 | 40400001 | A0185810 | B0087820 | D8047020 |
| 10005820 | B00C5830 | D7DC5030 | 200018DA | 92FFA00C | 982CA01C | 07FE58C0 |
| D0489879 | 10045820 | 70005020 | D85C7820 | C6C2E4C9 | F0F1F2F9* | |
| 02E3E7E3 | 4000215C | 4040002E | 40400001 | 80007020 | D8045820 | 90005020 |
| D7DC5820 | 10004130 | 20004150 | 00041B25 | 5C40D6C4 | 1B255020 | DD485030 |
| DD4C47F0 | DE344040 | 40404040 | 40404040 | C6C2E4C9 | F0F1F3F0** | |
| 02E3E7E3 | 40000020 | 40400008 | 40400001 | 0000214A | 000001D0 | 40404040 |
| 40404040 | 40404040 | 40404040 | 40404040 | 40404040 | 40404040 | 40404040 |
| 40404040 | 40404040 | 40404040 | 40404040 | C6C2E4C9 | F0F1F3F1* | |
| 02E3E7E3 | 400001D0 | 40400004 | 40400001 | 0000211A | 40404040 | 40404040 |
| 40404040 | 40404040 | 40404040 | 40404040 | 40404040 | 40404040 | 40404040 |
| 40404040 | 40404040 | 40404040 | 40404040 | C6C2E4C9 | F0F1F3F2* | |
| 02E3E7E3 | 40000218 | 40400010 | 40400001 | 000011D0 | 0000110E | 0000110E |
| 000011CA | 40404040 | 40404040 | 40404040 | 40404040 | 40404040 | 40404040 |
| 40404040 | 40404040 | 40404040 | 40404040 | C6C2E4C9 | F0F1F3F3* | |
| 02D9D3C4 | 40404040 | 40400038 | 40404040 | 00010001 | 0C002078 | 00010001 |
| 0C000020 | 00010001 | 0C000024 | 00010001 | 0C0001D0 | 00010001 | 0C000218 |
| 00010001 | 0C00021C | 00010001 | 0C000220 | C6C2E4C9 | F0F1F3F4* | |
| 02E3E7E3 | 40000228 | 4040001C | 40400001 | 000011CA | 000011E4 | 000011FE |
| 0000131E | 0000131E | 000013E8 | 000013E8 | 40404040 | 40404040 | 40404040 |
| 40404040 | 40404040 | 40404040 | 40404040 | C6C2E4C9 | F0F1F3F5* | |
| 02D9D3C4 | 40404040 | 40400038 | 40404040 | 00010001 | 0C000224 | 00010001 |

MEMBER NAME FBUILD

| | | | | | | |
|---|---|---|---|---|---|---|
| 0C000228 | 00010001 | 0C00022C | 00010001 | 0C000230 | 00010001 | 0C000234 |
| 00010001 | 0C000238 | 00010001 | 0C00023C | C6C2E4C9 | F0F1F3F6* | |
| 02E3E7E3 | 40000244 | 4040001C | 40400001 | 000017AA | 000017AA | 00001864 |
| 00001864 | 000018CE | 000018CE | 000018E8 | 40404040 | 40404040 | 40404040 |
| 40404040 | 40404040 | 40404040 | 40404040 | C6C2E4C9 | F0F1F3F7* | |
| 02D9D3C4 | 40404040 | 40400038 | 40404040 | 00010001 | 0C000240 | 00010001 |
| 0C000244 | 00010001 | 0C000248 | 00010001 | 0C00024C | 00010001 | 0C000250 |
| 00010001 | 0C000254 | 00010001 | 0C000258 | C6C2E4C9 | F0F1F3F8* | |
| 02E3E7E3 | 40000260 | 4040001C | 40400001 | 000018E8 | 000019F0 | 000019F0 |
| 00001A5A | 00001A66 | 00001C18 | 00001D46 | 40404040 | 40404040 | 40404040 |
| 40404040 | 40404040 | 40404040 | 40404040 | C6C2E4C9 | F0F1F3F9* | |
| 02D9D3C4 | 40404040 | 40400038 | 40404040 | 00010001 | 0C00025C | 00010001 |
| 0C000260 | 00010001 | 0C000264 | 00010001 | 0C000268 | 00010001 | 0C00026C |
| 00010001 | 0C000270 | 00010001 | 0C000274 | C6C2E4C9 | F0F1F4F0** | |
| 02E3E7E3 | 4000027C | 4040001C | 40400001 | 00001CA2 | 00001CBC | 00001CBC |
| 00001CBC | 00001D46 | 00001D46 | 00001FD2 | 40404040 | 40404040 | 40404040 |
| 40404040 | 40404040 | 40404040 | 40404040 | C6C2E4C9 | F0F1F4F1* | |
| 02D9D3C4 | 40404040 | 40400038 | 40404040 | 00010001 | 0C000278 | 00010001 |

```
0C00027C  00010001  0C000280  00010001  0C000284  00010001  0C000288
00010001  0C00028C  00010001  0C000290  C6C2E4C9  F0F1F4F2*
02E3E7E3  40000298  40400018  40400001  00001FDE  000020B6  000020C2
80000B74  80000B4C  0000086C  40404040  40404040  40404040  40404040
40404040  40404040  40404040  40404040  C6C2E4C9  F0F1F4F3*
02E3E7E3  400002B4  40400008  40400001  80000000  0000085C  40404040
40404040  40404040  40404040  40404040  40404040  40404040  40404040
40404040  40404040  40404040  40404040  C6C2E4C9  F0F1F4F4*
02D9D3C4  40404040  40400038  40404040  00010001  0C000294  00010001
0C000298  00010001  0C00029C  00010001  0C0002A0  00010001  0C0002A4
00010001  0C0002A8  00010001  0C0002AC  C6C2E4C9  F0F1F4F5*
02E3E7E3  400002C0  4040001C  40400001  80000014  00000A6A  00000850
00000874  800001C8  0000085C  00000A6A  40404040  40404040  40404040
40404040  40404040  40404040  40404040  C6C2E4C9  F0F1F4F6*
02D9D3C4  40404040  40400038  40404040  00010001  0C0002B8  00030001
0C0002C0  00010001  0C0002C4  00010001  0C0002C8  00010001  0C0002CC
00010001  0C0002D0  00010001  0C0002D4  C6C2E4C9  F0F1F4F7*
02E3E7E3  400002DC  40400008  40400001  80000A4C  00000858  40404040
40404040  40404040  40404040  40404040  40404040  40404040  40404040
40404040  40404040  40404040  40404040  C6C2E4C9  F0F1F4F8*
02E3E7E3  400002E8  40400008  40400001  800001C0  00000874  40404040
40404040  40404040  40404040  40404040  40404040  40404040  40404040
40404040  40404040  40404040  40404040  C6C2E4C9  F0F1F4F9*
02E3E7E3  400002F4  4040000C  40400001  80000A6A  00000E58  800008D8
40404040  40404040  40404040  40404040  40404040  40404040  40404040
40404040  40404040  40404040  40404040  C6C2E4C9  F0F1F5F0**
02D9D3C4  40404040  40400038  40404040  00010001  0C0002D8  00010001
0C0002DC  00010001  0C0002E0  00010001  0C0002E8  00010001  0C0002EC
00010001  0C0002F4  00010001  0C0002F8  C6C2E4C9  F0F1F5F1*
02E3E7E3  40000300  4040001C  40400001  00000FD0  00000964  00000844
000009CC  000008E4  000008E0  00000E58  40404040  40404040  40404040
40404040  40404040  40404040  40404040  C6C2E4C9  F0F1F5F2*
02D9D3C4  40404040  40400038  40404040  00010001  0C0002FC  00010001
0C000300  00010001  0C000304  00010001  0C000308  00010001  0C00030C
00010001  0C000310  00010001  0C000314  C6C2E4C9  F0F1F5F3*
02E3E7E3  4000031C  4040001C  40400001  00000844  00000844  00000844
00000844  00000850  00000858  00000844  40404040  40404040  40404040
40404040  40404040  40404040  40404040  C6C2E4C9  F0F1F5F4*
02D9D3C4  40404040  40400038  40404040  00010001  0C000318  00010001
0C00031C  00010001  0C000320  00010001  0C000324  00010001  0C000328

MEMBER NAME  FBUILD
00010001  0C00032C  00010001  0C000330  C6C2E4C9  F0F1F5F5*
02E3E7E3  40000338  4040001C  40400001  00000844  000008E4  000008F0
80000844  00000FD0  00000954  00000844  40404040  40404040  40404040
40404040  40404040  40404040  40404040  C6C2E4C9  F0F1F5F6*
02D9D3C4  40404040  40400038  40404040  00010001  0C000334  00010001
0C000338  00010001  0C00033C  00010001  0C000340  00010001  0C000344
00010001  0C000348  00010001  0C00034C  C6C2E4C9  F0F1F5F7*
02E3E7E3  40000354  4040001C  40400001  000008CC  000008E4  000008E0
00000DD8  00000844  00000844  00000844  40404040  40404040  40404040
40404040  40404040  40404040  40404040  C6C2E4C9  F0F1F5F8*
02D9D3C4  40404040  40400038  40404040  00010001  0C000350  00010001
0C000354  00010001  0C000358  00010001  0C00035C  00010001  0C000360
00010001  0C000364  00010001  0C000368  C6C2E4C9  F0F1F5F9*
02E3E7E3  40000370  4040001C  40400001  00000844  00000850  00000858
00000844  00000844  000008E4  000008F0  40404040  40404040  40404040
40404040  40404040  40404040  40404040  C6C2E4C9  F0F1F6F0**
02D9D3C4  40404040  40400038  40404040  00010001  0C00036C  00010001
```

```
0C000370  00010001  0C000374  00010001  0C000378  00010001  0C00037C
00010001  0C000380  00010001  0C000384  C6C2E4C9  F0F1F6F1*
02E3E7E3  4000038C  4040001C  40400001  80000844  00000AAB  00000850
000008D0  800001B8  00000A52  00000850  40404040  40404040  40404040
40404040  40404040  40404040  40404040  C6C2E4C9  F0F1F6F2*
02D9D3C4  40404040  40400038  40404040  00010001  0C000388  00010001
0C00038C  00010001  0C000390  00010001  0C000394  00010001  0C000398
00010001  0C00039C  00010001  0C0003A0  C6C2E4C9  F0F1F6F3*
02E3E7E3  400003A8  40400008  40400001  00000898  800001B0  40404040
40404040  40404040  40404040  40404040  40404040  40404040  40404040
40404040  40404040  40404040  40404040  C6C2E4C9  F0F1F6F4*
02E3E7E3  400003B4  40400014  40400001  00000B54  800009C4  0000085C
000009EC  000009E8  40404040  40404040  40404040  40404040  40404040
40404040  40404040  40404040  40404040  C6C2E4C9  F0F1F6F5*
02D9D3C4  40404040  40400038  40404040  00010001  0C0003A4  00010001
0C0003A8  00010001  0C0003AC  00010001  0C0003B4  00010001  0C0003B8
00010001  0C0003BC  00010001  0C0003C0  C6C2E4C9  F0F1F6F6*
02E3E7E3  400003C8  40400014  40400001  000009C8  000009F0  00000A28
00000A50  80000B2F  40404040  40404040  40404040  40404040  40404040
40404040  40404040  40404040  40404040  C6C2E4C9  F0F1F6F7*
02E3E7E3  400003E0  40400008  40400001  00000850  0000088C  40404040
40404040  40404040  40404040  40404040  40404040  40404040  40404040
40404040  40404040  40404040  40404040  C6C2E4C9  F0F1F6F8*
02D9D3C4  40404040  40400038  40404040  00010001  0C0003C4  00010001
0C0003C8  00010001  0C0003CC  00010001  0C0003D0  00010001  0C0003D4
00010001  0C0003D8  00010001  0C0003E0  C6C2E4C9  F0F1F6F9*
02E3E7E3  400003E8  40400008  40400001  800001A8  00000888  40404040
40404040  40404040  40404040  40404040  40404040  40404040  40404040
40404040  40404040  40404040  40404040  C6C2E4C9  F0F1F7F0**
02E3E7E3  400003F4  40400008  40400001  80000198  00000888  40404040
40404040  40404040  40404040  40404040  40404040  40404040  40404040
40404040  40404040  40404040  40404040  C6C2E4C9  F0F1F7F1*
02E3E7E3  40000400  40400008  40400001  80000188  00000888  40404040
40404040  40404040  40404040  40404040  40404040  40404040  40404040
40404040  40404040  40404040  40404040  C6C2E4C9  F0F1F7F2*
02E3E7E3  4000040C  40400004  40400001  80000178  40404040  40404040
40404040  40404040  40404040  40404040  40404040  40404040  40404040
40404040  40404040  40404040  40404040  C6C2E4C9  F0F1F7F3*
02D9D3C4  40404040  40400038  40404040  00010001  0C0003E4  00010001
0C0003E8  00010001  0C0003EC  00010001  0C0003F4  00010001  0C0003F8
00010001  0C000400  00010001  0C000404  C6C2E4C9  F0F1F7F4*

MEMBER NAME  FBUILD
02E3E7E3  40000410  40400004  40400001  00000888  40404040  40404040
40404040  40404040  40404040  40404040  40404040  40404040  40404040
40404040  40404040  40404040  40404040  C6C2E4C9  F0F1F7F5*
02E3E7E3  40000418  4040000C  40400001  80000168  00000AAB  800008D0
40404040  40404040  40404040  40404040  40404040  40404040  40404040
40404040  40404040  40404040  40404040  C6C2E4C9  F0F1F7F6*
02E3E7E3  4000042C  4040000C  40400001  00000844  000009CC  000008E4
40404040  40404040  40404040  40404040  40404040  40404040  40404040
40404040  40404040  40404040  40404040  C6C2E4C9  F0F1F7F7*
02D9D3C4  40404040  40400038  40404040  00010001  0C00040C  00010001
0C000410  00010001  0C000418  00010001  0C00041C  00010001  0C000420
00010001  0C00042C  00010001  0C000430  C6C2E4C9  F0F1F7F8*
02E3E7E3  40000438  4040001C  40400001  000008E0  00000AAB  00000844
00000844  00000844  00000844  00000850  40404040  40404040  40404040
40404040  40404040  40404040  40404040  C6C2E4C9  F0F1F7F9*
02D9D3C4  40404040  40400038  40404040  00010001  0C000434  00010001
```

| | | | | | | |
|---|---|---|---|---|---|---|
| 0C000438 | 00010001 | 0C00043C | 00010001 | 0C000440 | 00010001 | 0C000444 |
| 00010001 | 0C000448 | 00010001 | 0C00044C | C6C2E4C9 | F0F1F8F0** | |
| 02E3E7E3 | 40000454 | 4040001C | 40400001 | 00000858 | 00000844 | 00000844 |
| 000008E4 | 000008F0 | 80000844 | 00000A14 | 40404040 | 40404040 | 40404040 |
| 40404040 | 40404040 | 40404040 | 40404040 | C6C2E4C9 | F0F1F8F1* | |
| 02D9D3C4 | 40404040 | 40400038 | 40404040 | 00010001 | 0C000450 | 00010001 |
| 0C000454 | 00010001 | 0C000458 | 00010001 | 0C00045C | 00010001 | 0C000460 |
| 00010001 | 0C000464 | 00010001 | 0C000468 | C6C2E4C9 | F0F1F8F2* | |
| 02E3E7E3 | 40000470 | 4040001C | 40400001 | 00000A18 | 00000A48 | 80000A18 |
| 00000AAB | 00000850 | 000008D0 | 80000160 | 40404040 | 40404040 | 40404040 |
| 40404040 | 40404040 | 40404040 | 40404040 | C6C2E4C9 | F0F1F8F3* | |
| 02D9D3C4 | 40404040 | 40400038 | 40404040 | 00010001 | 0C00046C | 00010001 |
| 0C000470 | 00010001 | 0C000474 | 00010001 | 0C000478 | 00010001 | 0C00047C |
| 00010001 | 0C000480 | 00010001 | 0C000484 | C6C2E4C9 | F0F1F8F4* | |
| 02E3E7E3 | 4000048C | 40400014 | 40400001 | 00000A52 | 00000850 | 00000898 |
| 80000158 | 00000898 | 40404040 | 40404040 | 40404040 | 40404040 | 40404040 |
| 40404040 | 40404040 | 40404040 | 40404040 | C6C2E4C9 | F0F1F8F5* | |
| 02E3E7E3 | 400004A4 | 4040000C | 40400001 | 80000000 | 000009A0 | 800009A4 |
| 40404040 | 40404040 | 40404040 | 40404040 | 40404040 | 40404040 | 40404040 |
| 40404040 | 40404040 | 40404040 | 40404040 | C6C2E4C9 | F0F1F8F6* | |
| 02D9D3C4 | 40404040 | 40400038 | 40404040 | 00010001 | 0C000488 | 00010001 |
| 0C00048C | 00010001 | 0C000490 | 00010001 | 0C000494 | 00010001 | 0C000498 |
| 00010001 | 0C00049C | 00010001 | 0C0004A8 | C6C2E4C9 | F0F1F8F7* | |
| 02E3E7E3 | 400004B0 | 4040001C | 40400001 | 00000A6A | 00000850 | 000008A8 |
| 80000150 | 00000A6A | 800008A8 | 00000FF4 | 40404040 | 40404040 | 40404040 |
| 40404040 | 40404040 | 40404040 | 40404040 | C6C2E4C9 | F0F1F8F8* | |
| 02D9D3C4 | 40404040 | 40400038 | 40404040 | 00010001 | 0C0004AC | 00010001 |
| 0C0004B0 | 00010001 | 0C0004B4 | 00010001 | 0C0004B8 | 00010001 | 0C0004BC |
| 00010001 | 0C0004C0 | 00010001 | 0C0004C4 | C6C2E4C9 | F0F1F8F9* | |
| 02E3E7E3 | 400004CC | 4040001C | 40400001 | 00000FF8 | 00000844 | 000009CC |
| 000008E4 | 000008E0 | 00000A6A | 00000844 | 40404040 | 40404040 | 40404040 |
| 40404040 | 40404040 | 40404040 | 40404040 | C6C2E4C9 | F0F1F9F0** | |
| 02D9D3C4 | 40404040 | 40400038 | 40404040 | 00010001 | 0C0004C8 | 00010001 |
| 0C0004CC | 00010001 | 0C0004D0 | 00010001 | 0C0004D4 | 00010001 | 0C0004D8 |
| 00010001 | 0C0004DC | 00010001 | 0C0004E0 | C6C2E4C9 | F0F1F9F1* | |
| 02E3E7E3 | 400004E8 | 4040001C | 40400001 | 00000844 | 00000844 | 00000844 |
| 00000850 | 00000858 | 00000844 | 00000844 | 40404040 | 40404040 | 40404040 |
| 40404040 | 40404040 | 40404040 | 40404040 | C6C2E4C9 | F0F1F9F2* | |
| 02D9D3C4 | 40404040 | 40400038 | 40404040 | 00010001 | 0C0004E4 | 00010001 |
| 0C0004E8 | 00010001 | 0C0004EC | 00010001 | 0C0004F0 | 00010001 | 0C0004F4 |
| 00010001 | 0C0004F8 | 00010001 | 0C0004FC | C6C2E4C9 | F0F1F9F3* | |
| 02E3E7E3 | 40000504 | 4040001C | 40400001 | 000008E4 | 000008F0 | 80000844 |

MEMBER NAME FBUILD

| | | | | | | |
|---|---|---|---|---|---|---|
| 00000A6A | 00000850 | 000008A8 | 80000148 | 40404040 | 40404040 | 40404040 |
| 40404040 | 40404040 | 40404040 | 40404040 | C6C2E4C9 | F0F1F9F4* | |
| 02D9D3C4 | 40404040 | 40400038 | 40404040 | 00010001 | 0C000500 | 00010001 |
| 0C000504 | 00010001 | 0C000508 | 00010001 | 0C00050C | 00010001 | 0C000510 |
| 00010001 | 0C000514 | 00010001 | 0C000518 | C6C2E4C9 | F0F1F9F5* | |
| 02E3E7E3 | 40000520 | 4040001C | 40400001 | 00000A6A | 8000089C | 00000FF4 |
| 00000FF8 | 00000844 | 000009CC | 000008E4 | 40404040 | 40404040 | 40404040 |
| 40404040 | 40404040 | 40404040 | 40404040 | C6C2E4C9 | F0F1F9F6* | |
| 02D9D3C4 | 40404040 | 40400038 | 40404040 | 00010001 | 0C00051C | 00010001 |
| 0C000520 | 00010001 | 0C000524 | 00010001 | 0C000528 | 00010001 | 0C00052C |
| 00010001 | 0C000530 | 00010001 | 0C000534 | C6C2E4C9 | F0F1F9F7* | |
| 02E3E7E3 | 4000053C | 4040001C | 40400001 | 000008E0 | 00000A6A | 00000844 |
| 00000844 | 00000844 | 00000844 | 00000850 | 40404040 | 40404040 | 40404040 |
| 40404040 | 40404040 | 40404040 | 40404040 | C6C2E4C9 | F0F1F9F8* | |
| 02D9D3C4 | 40404040 | 40400038 | 40404040 | 00010001 | 0C000538 | 00010001 |

```
0C00053C  00010001  0C000540  00010001  0C000544  00010001  0C000548
00010001  0C00054C  00010001  0C000550  C6C2E4C9  F0F1F9F9*
02E3E7E3  40000558  4040001C  40400001  00000858  00000844  00000844
000008E4  000008F0  80000844  00000A14  40404040  40404040  40404040
40404040  40404040  40404040  40404040  C6C2E4C9  F0F2F0F0**
02D9D3C4  40404040  40400038  40404040  00010001  0C000554  00010001
0C000558  00010001  0C00055C  00010001  0C000560  00010001  0C000564
00010001  0C000568  00010001  0C00056C  C6C2E4C9  F0F2F0F1*
02E3E7E3  40000574  4040001C  40400001  0000095C  00000A48  8000095C
00000A14  00000958  00000A48  80000958  40404040  40404040  40404040
40404040  40404040  40404040  40404040  C6C2E4C9  F0F2F0F2*
02D9D3C4  40404040  40400038  40404040  00010001  0C000570  00010001
0C000574  00010001  0C000578  00010001  0C00057C  00010001  0C000580
00010001  0C000584  00010001  0C000588  C6C2E4C9  F0F2F0F3*
02E3E7E3  40000590  4040001C  40400001  00000A14  00000950  00000A48
80000950  00000A14  0000094C  00000A48  40404040  40404040  40404040
40404040  40404040  40404040  40404040  C6C2E4C9  F0F2F0F4*
02D9D3C4  40404040  40400038  40404040  00010001  0C00058C  00010001
0C000590  00010001  0C000594  00010001  0C000598  00010001  0C00059C
00010001  0C0005A0  00010001  0C0005A4  C6C2E4C9  F0F2F0F5*
02E3E7E3  400005AC  4040001C  40400001  8000094C  00000A14  000009E4
00000A14  800009E0  00000A48  000009E4  40404040  40404040  40404040
40404040  40404040  40404040  40404040  C6C2E4C9  F0F2F0F6*
02D9D3C4  40404040  40400038  40404040  00010001  0C0005A8  00010001
0C0005AC  00010001  0C0005B0  00010001  0C0005B4  00010001  0C0005B8
00010001  0C0005BC  00010001  0C0005C0  C6C2E4C9  F0F2F0F7*
02E3E7E3  400005C8  4040001C  40400001  00000A48  800009E0  00000FF4
000009E4  00000FF4  800009E0  00000FF4  40404040  40404040  40404040
40404040  40404040  40404040  40404040  C6C2E4C9  F0F2F0F8*
02D9D3C4  40404040  40400038  40404040  00010001  0C0005C4  00010001
0C0005C8  00010001  0C0005CC  00010001  0C0005D0  00010001  0C0005D4
00010001  0C0005D8  00010001  0C0005DC  C6C2E4C9  F0F2F0F9*
02E3E7E3  400005E4  4040001C  40400001  000009E4  00000FF4  800009E0
00000FF4  000009E4  00000FF4  800009E0  40404040  40404040  40404040
40404040  40404040  40404040  40404040  C6C2E4C9  F0F2F1F0**
02D9D3C4  40404040  40400038  40404040  00010001  0C0005E0  00010001
0C0005E4  00010001  0C0005E8  00010001  0C0005EC  00010001  0C0005F0
00010001  0C0005F4  00010001  0C0005F8  C6C2E4C9  F0F2F1F1*
02E3E7E3  40000600  4040001C  40400001  00000FF4  000009E4  00000FF4
800009E0  00000FD8  000009E4  00000FD8  40404040  40404040  40404040
40404040  40404040  40404040  40404040  C6C2E4C9  F0F2F1F2*
02D9D3C4  40404040  40400038  40404040  00010001  0C0005FC  00010001
0C000600  00010001  0C000604  00010001  0C000608  00010001  0C00060C

MEMBER NAME  FBUILD
00010001  0C000610  00010001  0C000614  C6C2E4C9  F0F2F1F3*
02E3E7E3  4000061C  4040001C  40400001  800009E0  000008F4  000009E4
000008F4  800009E0  00000960  000009E4  40404040  40404040  40404040
40404040  40404040  40404040  40404040  C6C2E4C9  F0F2F1F4*
02D9D3C4  40404040  40400038  40404040  00010001  0C000618  00010001
0C00061C  00010001  0C000620  00010001  0C000624  00010001  0C000628
00010001  0C00062C  00010001  0C000630  C6C2E4C9  F0F2F1F5*
02E3E7E3  40000638  4040001C  40400001  00000960  800009E0  00000FF4
000009E4  00000FF4  800009E0  00000904  40404040  40404040  40404040
40404040  40404040  40404040  40404040  C6C2E4C9  F0F2F1F6*
02D9D3C4  40404040  40400038  40404040  00010001  0C000634  00010001
0C000638  00010001  0C00063C  00010001  0C000640  00010001  0C000644
00010001  0C000648  00010001  0C00064C  C6C2E4C9  F0F2F1F7*
02E3E7E3  40000654  4040001C  40400001  000009E4  00000904  800009E0
```

| | | | | | | |
|---|---|---|---|---|---|---|
| 00000918 | 000009E4 | 00000918 | 800009E0 | 40404040 | 40404040 | 40404040 |
| 40404040 | 40404040 | 40404040 | 40404040 | C6C2E4C9 | F0F2F1F8* | |
| 02D9D3C4 | 40404040 | 40400038 | 40404040 | 00010001 | 0C000650 | 00010001 |
| 0C000654 | 00010001 | 0C000658 | 00010001 | 0C00065C | 00010001 | 0C000660 |
| 00010001 | 0C000664 | 00010001 | 0C000668 | C6C2E4C9 | F0F2F1F9* | |
| 02E3E7E3 | 40000670 | 4040001C | 40400001 | 00000930 | 000009E4 | 00000930 |
| 800009E0 | 00000FF4 | 000009E0 | 00000FF4 | 40404040 | 40404040 | 40404040 |
| 40404040 | 40404040 | 40404040 | 40404040 | C6C2E4C9 | F0F2F2F0** | |
| 02D9D3C4 | 40404040 | 40400038 | 40404040 | 00010001 | 0C00066C | 00010001 |
| 0C000670 | 00010001 | 0C000674 | 00010001 | 0C000678 | 00010001 | 0C00067C |
| 00010001 | 0C000680 | 00010001 | 0C000684 | C6C2E4C9 | F0F2F2F1* | |
| 02E3E7E3 | 4000068C | 4040001C | 40400001 | 80000FF8 | 00000FF4 | 000009E4 |
| 00000FF4 | 80000FF8 | 00000904 | 000009E4 | 40404040 | 40404040 | 40404040 |
| 40404040 | 40404040 | 40404040 | 40404040 | C6C2E4C9 | F0F2F2F2* | |
| 02D9D3C4 | 40404040 | 40400038 | 40404040 | 00010001 | 0C000688 | 00010001 |
| 0C00068C | 00010001 | 0C000690 | 00010001 | 0C000694 | 00010001 | 0C000698 |
| 00010001 | 0C00069C | 00010001 | 0C0006A0 | C6C2E4C9 | F0F2F2F3* | |
| 02E3E7E3 | 400006A8 | 4040001C | 40400001 | 00000904 | 80000FF4 | 00000918 |
| 000009E4 | 00000918 | 80000FF4 | 00000930 | 40404040 | 40404040 | 40404040 |
| 40404040 | 40404040 | 40404040 | 40404040 | C6C2E4C9 | F0F2F2F4* | |
| 02D9D3C4 | 40404040 | 40400038 | 40404040 | 00010001 | 0C0006A4 | 00010001 |
| 0C0006A8 | 00010001 | 0C0006AC | 00010001 | 0C0006B0 | 00010001 | 0C0006B4 |
| 00010001 | 0C0006B8 | 00010001 | 0C0006BC | C6C2E4C9 | F0F2F2F5* | |
| 02E3E7E3 | 400006C4 | 4040001C | 40400001 | 000009E4 | 00000930 | 80000FF4 |
| 00000FF4 | 00000FF8 | 000008F4 | 80000FF8 | 40404040 | 40404040 | 40404040 |
| 40404040 | 40404040 | 40404040 | 40404040 | C6C2E4C9 | F0F2F2F6* | |
| 02D9D3C4 | 40404040 | 40400038 | 40404040 | 00010001 | 0C0006C0 | 00010001 |
| 0C0006C4 | 00010001 | 0C0006C8 | 00010001 | 0C0006CC | 00010001 | 0C0006D0 |
| 00010001 | 0C0006D4 | 00010001 | 0C0006D8 | C6C2E4C9 | F0F2F2F7* | |
| 02E3E7E3 | 400006E0 | 4040001C | 40400001 | 00000FF4 | 00000FFC | 000008F4 |
| 80000FFC | 00000904 | 00000FF8 | 00000930 | 40404040 | 40404040 | 40404040 |
| 40404040 | 40404040 | 40404040 | 40404040 | C6C2E4C9 | F0F2F2F8* | |
| 02D9D3C4 | 40404040 | 40400038 | 40404040 | 00010001 | 0C0006DC | 00010001 |
| 0C0006E0 | 00010001 | 0C0006E4 | 00010001 | 0C0006E8 | 00010001 | 0C0006EC |
| 00010001 | 0C0006F0 | 00010001 | 0C0006F4 | C6C2E4C9 | F0F2F2F9* | |
| 02E3E7E3 | 400006FC | 4040001C | 40400001 | 80000FF8 | 000008F4 | 00000FF8 |
| 000008F4 | 80000FFC | 00000FD8 | 00000FF8 | 40404040 | 40404040 | 40404040 |
| 40404040 | 40404040 | 40404040 | 40404040 | C6C2E4C9 | F0F2F3F0** | |
| 02D9D3C4 | 40404040 | 40400038 | 40404040 | 00010001 | 0C0006F8 | 00010001 |
| 0C0006FC | 00010001 | 0C000700 | 00010001 | 0C000704 | 00010001 | 0C000708 |
| 00010001 | 0C00070C | 00010001 | 0C000710 | C6C2E4C9 | F0F2F3F1* | |
| 02E3E7E3 | 40000718 | 4040001C | 40400001 | 00000FDC | 80000FFC | 00000FE0 |
| 00000A18 | 0000090C | 80000A18 | 00000FE0 | 40404040 | 40404040 | 40404040 |
| 40404040 | 40404040 | 40404040 | 40404040 | C6C2E4C9 | F0F2F3F2* | |

MEMBER NAME FBUILD

| | | | | | | |
|---|---|---|---|---|---|---|
| 02D9D3C4 | 40404040 | 40400038 | 40404040 | 00010001 | 0C000714 | 00010001 |
| 0C000718 | 00010001 | 0C00071C | 00010001 | 0C000720 | 00010001 | 0C000724 |
| 00010001 | 0C000728 | 00010001 | 0C00072C | C6C2E4C9 | F0F2F3F3* | |
| 02E3E7E3 | 40000734 | 40400010 | 40400001 | 00000A18 | 0000090C | 80000A18 |
| 00000FE4 | 40404040 | 40404040 | 40404040 | 40404040 | 40404040 | 40404040 |
| 40404040 | 40404040 | 40404040 | 40404040 | C6C2E4C9 | F0F2F3F4* | |
| 02E3E7E3 | 40000748 | 4040000C | 40400001 | 00000844 | 000008A0 | 000008E4 |
| 40404040 | 40404040 | 40404040 | 40404040 | 40404040 | 40404040 | 40404040 |
| 40404040 | 40404040 | 40404040 | 40404040 | C6C2E4C9 | F0F2F3F5* | |
| 02D9D3C4 | 40404040 | 40400038 | 40404040 | 00010001 | 0C000730 | 00010001 |
| 0C000734 | 00010001 | 0C000738 | 00010001 | 0C00073C | 00010001 | 0C000740 |
| 00010001 | 0C000748 | 00010001 | 0C00074C | C6C2E4C9 | F0F2F3F6* | |
| 02E3E7E3 | 40000754 | 4040001C | 40400001 | 000008E0 | 00000120 | 00000844 |

```
00000844  00000844  00000844  00000850  40404040  40404040  40404040
40404040  40404040  40404040  40404040  C6C2E4C9  F0F2F3F7*
02D9D3C4  40404040  40400038  40404040  00010001  0C000750  00010001
0C000754  00010001  0C000758  00010001  0C00075C  00010001  0C000760
00010001  0C000764  00010001  0C000768  C6C2E4C9  F0F2F3F8*
02E3E7E3  40000770  4040001C  40400001  00000858  00000844  00000844
000008E4  000008F0  80000844  00000F4C  40404040  40404040  40404040
40404040  40404040  40404040  40404040  C6C2E4C9  F0F2F3F9*
02D9D3C4  40404040  40400038  40404040  00010001  0C00076C  00010001
0C000770  00010001  0C000774  00010001  0C000778  00010001  0C00077C
00010001  0C000780  00010001  0C000784  C6C2E4C9  F0F2F4F0**
02E3E7E3  4000078C  40400010  40400001  00000A18  0000090C  80000A18
00000F50  40404040  40404040  40404040  40404040  40404040  40404040
40404040  40404040  40404040  40404040  C6C2E4C9  F0F2F4F1*
02E3E7E3  400007A0  4040000C  40400001  00000844  000008A0  000008E4
40404040  40404040  40404040  40404040  40404040  40404040  40404040
40404040  40404040  40404040  40404040  C6C2E4C9  F0F2F4F2*
02D9D3C4  40404040  40400038  40404040  00010001  0C000788  00010001
0C00078C  00010001  0C000790  00010001  0C000794  00010001  0C000798
00010001  0C0007A0  00010001  0C0007A4  C6C2E4C9  F0F2F4F3*
02E3E7E3  400007AC  4040001C  40400001  000008E0  00000A6A  00000844
00000844  00000844  00000844  00000850  40404040  40404040  40404040
40404040  40404040  40404040  40404040  C6C2E4C9  F0F2F4F4*
02D9D3C4  40404040  40400038  40404040  00010001  0C0007A8  00010001
0C0007AC  00010001  0C0007B0  00010001  0C0007B4  00010001  0C0007B8
00010001  0C0007BC  00010001  0C0007C0  C6C2E4C9  F0F2F4F5*
02E3E7E3  400007C8  4040001C  40400001  00000858  00000844  00000844
000008E4  000008F0  80000844  00000FE8  40404040  40404040  40404040
40404040  40404040  40404040  40404040  C6C2E4C9  F0F2F4F6*
02D9D3C4  40404040  40400038  40404040  00010001  0C0007C4  00010001
0C0007C8  00010001  0C0007CC  00010001  0C0007D0  00010001  0C0007D4
00010001  0C0007D8  00010001  0C0007DC  C6C2E4C9  F0F2F4F7*
02E3E7E3  400007E4  4040001C  40400001  000009E4  00000FE8  800009E0
00000FF4  000009E4  00000FF4  800009E0  40404040  40404040  40404040
40404040  40404040  40404040  40404040  C6C2E4C9  F0F2F4F8*
02D9D3C4  40404040  40400038  40404040  00010001  0C0007E0  00010001
0C0007E4  00010001  0C0007E8  00010001  0C0007EC  00010001  0C0007F0
00010001  0C0007F4  00010001  0C0007F8  C6C2E4C9  F0F2F4F9*
02E3E7E3  40000800  4040001C  40400001  00000FF4  000009E4  00000FF4
800009E0  0000090C  000009E4  0000090C  40404040  40404040  40404040
40404040  40404040  40404040  40404040  C6C2E4C9  F0F2F5F0**
02D9D3C4  40404040  40400038  40404040  00010001  0C0007FC  00010001
0C000800  00010001  0C000804  00010001  0C000808  00010001  0C00080C
00010001  0C000810  00010001  0C000814  C6C2E4C9  F0F2F5F1*
02E3E7E3  4000081C  40400004  40400001  800009E0  40404040  40404040

MEMBER NAME  FBUILD
40404040  40404040  40404040  40404040  40404040  40404040  40404040
40404040  40404040  40404040  40404040  C6C2E4C9  F0F2F5F2*
02E3E7E3  40000F44  40400038  40400001  00000000  00000000  00000000
00000000  00000000  00000000  00000000  00000038  0000002C  00000040
0000003C  00000020  00000024  00000030  C6C2E4C9  F0F2F5F3*
02E3E7E3  40000F7C  40400038  40400001  00000034  00000000  00000000
00000000  00000000  00000000  0000007C  05D4007E  05DC007E  05E8007F
05EC007F  0000007F  0838007F  05F40080  C6C2E4C9  F0F2F5F4*
02E3E7E3  40000FB4  40400038  40400001  05F80080  06540080  0B900081
089C0081  06640081  00000000  00000083  00000083  00000000  00000083
06380083  00000000  00000083  00000000  C6C2E4C9  F0F2F5F5*
02E3E7E3  40000FEC  40400018  40400001  00000060  413CD331  06440083
```

```
00000000  00000084  00000084  40404040  40404040  40404040  40404040
40404040  40404040  40404040  40404040  C6C2E4C9  F0F2F5F6*
02D9D3C4  40404040  40400010  40404040  00010001  0C000818  00010001
0C00081C  40404040  40404040  40404040  40404040  40404040  40404040
40404040  40404040  40404040  40404040  C6C2E4C9  F0F2F5F7*
02C5D5C4  40404040  40404040  40404040  40404040  40404040  40404040
0000218A  F1F5F7F3  F460C6D6  F34040F0  F2F0F2F8  F7F0F9F8  40F0F84B
F1F54BF0  F9404040  C6C2E4C9  D3C44040  C6C2E4C9  F0F2F5F8**

MEMBER NAME  FCHART
02C5E2C4  40404040  40400010  40400001  C6C3C8C1  D9E34040  00000000
40000000  40404040  40404040  40404040  40404040  40404040  40404040
40404040  40404040  40404040  40404040  C6C3C8C1  F0F0F0F1*
02E3E7E3  40000000  40400038  40400001  47F0F00C  07C6C3C8  C1D9E340
90ECD00C  184D98CD  F0205040  D00450D0  400807FC  40404040  40404040
021A15C9  D5C6D6D9  D4C1E3C9  D6D540C6  C6C3C8C1  F0F0F0F2*
02E3E7E3  40000038  40400038  40400001  D6D940C4  C1E2C840  1005180A
2202061E  14012202  1A2F4040  C5D9D9D6  D940C9D5  40C140C3  C1C4C1D4
40D9D6E4  E3C9D5C5  40C9D540  C6C3C8C1  C6C3C8C1  F0F0F0F3*
02E3E7E3  40000070  4040002E  40400001  D9E340E2  E4C2D9D6  E4E3C9D5
C522021A  0ED9C5C6  C9D3C540  C5D9D9D6  D97E4010  031A0A40  C9D540C6
C3C8C1D9  E3224040  40404040  40404040  C6C3C8C1  F0F0F0F4*
02E3E7E3  400000A0  40400020  40400001  D4D6C4C5  D3E240C6  D3C1C7C7
C5C440C6  D6D940E2  D3C9C340  D9E4D540  40404040  40404040  40404040
40404040  40404040  40404040  40404040  C6C3C8C1  F0F0F0F5*
02E3E7E3  40000378  40400038  40400001  00000000  00000000  4F080000
00000000  00000000  00000000  00000001  00000001  00000002  00000003
00000004  00000005  00000008  00000009  C6C3C8C1  F0F0F0F6*
02E3E7E3  400003B0  40400038  40400001  00000014  00000016  0000001B
0000001E  00000049  0000005D  00000070  00000080  00000098  00000BB8
401DF3B6  4029FBE7  4029FFD6  403D70A4  C6C3C8C1  F0F0F0F7*
02E3E7E3  400003E8  40400038  40400001  403EF9DB  40400000  40A41893
41100000  4110A7F0  41200000  4133D70A  413B70A4  4145BE77  414F70A4
4159999A  4165999A  41C00000  41CCCCCD  C6C3C8C1  F0F0F0F8*
02E3E7E3  40000420  4040000C  40400001  41F00000  00000000  00000000
40404040  40404040  40404040  40404040  40404040  40404040  40404040
40404040  40404040  40404040  40404040  C6C3C8C1  F0F0F0F9*
02C5E2C4  40404040  40400010  40400002  D9D4D6C4  C5D34040  05000000
40000018  40404040  40404040  40404040  40404040  40404040  40404040
40404040  40404040  40404040  40404040  C6C3C8C1  F0F0F1F0**
02C5E2C4  40404040  40400010  40400003  C6D4D6C4  C5D34040  05000000
400001F8  40404040  40404040  40404040  40404040  40404040  40404040
40404040  40404040  40404040  40404040  C6C3C8C1  F0F0F1F1*
02C5E2C4  40404040  40400010  40400004  C7D9E4D7  40404040  05000000
4000000C  40404040  40404040  40404040  40404040  40404040  40404040
40404040  40404040  40404040  40404040  C6C3C8C1  F0F0F1F2*
02C5E2C4  40404040  40400010  40400005  D6D7E3C9  D6D54040  05000000
40000020  40404040  40404040  40404040  40404040  40404040  40404040
40404040  40404040  40404040  40404040  C6C3C8C1  F0F0F1F3*
02C5E2C4  40404040  40400010  40400006  D4D6C4C9  D5C34040  05000000
40000024  40404040  40404040  40404040  40404040  40404040  40404040
40404040  40404040  40404040  40404040  C6C3C8C1  F0F0F1F4*
02C5E2C4  40404040  40400010  40400007  D4E2C9E9  C5404040  05000000
4000000C  40404040  40404040  40404040  40404040  40404040  40404040
40404040  40404040  40404040  40404040  C6C3C8C1  F0F0F1F5*
02C5E2C4  40404040  40400010  40400008  C1D9C3D6  E2404040  02000000
40000000  40404040  40404040  40404040  40404040  40404040  40404040
40404040  40404040  40404040  40404040  C6C3C8C1  F0F0F1F6*
02E3E7E3  40001550  40400020  40400001  00001488  FFFFFFFF  FFFFFFEB
```

```
00000000  00000000  FFFFFFFF  00000000  00000000  40404040  40404040
40404040  40404040  40404040  40404040  C6C3C8C1  F0F0F1F7*
02D9D3C4  40404040  40400038  40404040  00010001  0C001550  00020001
0C001554  00030001  0C001558  00040001  0C00155C  00050001  0C001560
00060001  0C001564  00070001  0C001568  C6C3C8C1  F0F0F1F8*
02C5E2C4  40404040  40400010  40400009  C3C1C4E2  E3404040  02000000
40000000  40404040  40404040  40404040  40404040  40404040  40404040
40404040  40404040  40404040  40404040  C6C3C8C1  F0F0F1F9*
02C5E2C4  40404040  40400010  4040000A  C4C9E3E3  D6404040  02000000

MEMBER NAME  FCHART
40000000  40404040  40404040  40404040  40404040  40404040  40404040
40404040  40404040  40404040  40404040  C6C3C8C1  F0F0F2F0**
02C5E2C4  40404040  40400010  4040000B  D4E5C3C8  D9404040  02000000
40000000  40404040  40404040  40404040  40404040  40404040  40404040
40404040  40404040  40404040  40404040  C6C3C8C1  F0F0F2F1*
02C5E2C4  40404040  40400010  4040000C  C2C5C7C4  C5E34040  02000000
40000000  40404040  40404040  40404040  40404040  40404040  40404040
40404040  40404040  40404040  40404040  C6C3C8C1  F0F0F2F2*
02E3E7E3  40001570  40400010  40400001  00000000  00000000  00000000
00000000  40404040  40404040  40404040  40404040  40404040  40404040
40404040  40404040  40404040  40404040  C6C3C8C1  F0F0F2F3*
02C5E2C4  40404040  40400010  4040000D  C3C1C4C6  C9D34040  02000000
40000000  40404040  40404040  40404040  40404040  40404040  40404040
40404040  40404040  40404040  40404040  C6C3C8C1  F0F0F2F4*
02C5E2C4  40404040  40400010  4040000E  C3C1C4D5  D7C44040  02000000
40000000  40404040  40404040  40404040  40404040  40404040  40404040
40404040  40404040  40404040  40404040  C6C3C8C1  F0F0F2F5*
02C5E2C4  40404040  40400010  4040000F  C3C1C4D5  E2C84040  02000000
40000000  40404040  40404040  40404040  40404040  40404040  40404040
40404040  40404040  40404040  40404040  C6C3C8C1  F0F0F2F6*
02E3E7E3  40001584  40400010  40400001  00000000  00000000  00000000
00000000  40404040  40404040  40404040  40404040  40404040  40404040
40404040  40404040  40404040  40404040  C6C3C8C1  F0F0F2F7*
02D9D3C4  40404040  40400038  40404040  00080001  1C00156C  00090001
1C001570  000A0001  1C001574  000B0001  1C001578  000C0001  1C001584
000D0001  1C001588  000E0001  1C00158C  C6C3C8C1  F0F0F2F8*
02C5E2C4  40404040  40400010  40400010  C3C1C4E2  D7C34040  02000000
40000000  40404040  40404040  40404040  40404040  40404040  40404040
40404040  40404040  40404040  40404040  C6C3C8C1  F0F0F2F9*
02C5E2C4  40404040  40400010  40400011  C3C1C4E2  E4D74040  02000000
40000000  40404040  40404040  40404040  40404040  40404040  40404040
40404040  40404040  40404040  40404040  C6C3C8C1  F0F0F3F0**
02C5E2C4  40404040  40400010  40400012  C5D5C4C4  C5E34040  02000000
40000000  40404040  40404040  40404040  40404040  40404040  40404040
40404040  40404040  40404040  40404040  C6C3C8C1  F0F0F3F1*
02C5E2C4  40404040  40400010  40400013  C6C2E4C9  D3C44040  02000000
40000000  40404040  40404040  40404040  40404040  40404040  40404040
40404040  40404040  40404040  40404040  C6C3C8C1  F0F0F3F2*
02C5E2C4  40404040  40400010  40400014  C8C7C4C1  E3C54040  02000000
40000000  40404040  40404040  40404040  40404040  40404040  40404040
40404040  40404040  40404040  40404040  C6C3C8C1  F0F0F3F3*
02C5E2C4  40404040  40400010  40400015  C8C7E3C9  D4C54040  02000000
40000000  40404040  40404040  40404040  40404040  40404040  40404040
40404040  40404040  40404040  40404040  C6C3C8C1  F0F0F3F4*
02C5E2C4  40404040  40400010  40400016  C9C2C3D6  D47B4040  02000000
40000000  40404040  40404040  40404040  40404040  40404040  40404040
40404040  40404040  40404040  40404040  C6C3C8C1  F0F0F3F5*
02E3E7E3  40001594  4040001C  40400001  00000000  00000000  00000000
```

00000000 00000000 00000000 00000000 40404040 40404040 40404040
40404040 40404040 40404040 40404040 C6C3C8C1 F0F0F3F6*
02D9D3C4 40404040 40400038 40404040 000F0001 1C001590 00100001
1C001594 00110001 1C001598 00120001 1C00159C 00130001 1C0015A0
00140001 1C0015A4 00150001 1C0015A8 C6C3C8C1 F0F0F3F7*
02C5E2C4 40404040 40400010 40400017 C9C3D5E3 C5D94040 02000000
40000000 40404040 40404040 40404040 40404040 40404040 40404040
40404040 40404040 40404040 40404040 C6C3C8C1 F0F0F3F8*
02C5E2C4 40404040 40400010 40400018 D4D6C4E2 D9E34040 02000000
40000000 40404040 40404040 40404040 40404040 40404040 40404040

MEMBER NAME FCHART
40404040 40404040 40404040 40404040 C6C3C8C1 F0F0F3F9*
02E3E7E3 400015B0 40400008 40400001 00000000 00000000 40404040
40404040 40404040 40404040 40404040 40404040 40404040 40404040
40404040 40404040 40404040 40404040 C6C3C8C1 F0F0F4F0**
02E3E7E3 400014B0 40400038 40400001 C3D6D7E8 D9C9C7C8 E3404DC3
5D40F1F9 F8F640E3 C8C540C2 D6C5C9D5 C740C3D6 D4D7C1D5 E85BC1D3
D340D9C9 C7C8E3E2 40D9C5E2 C5D9E5C5 C6C3C8C1 F0F0F4F1*
02E3E7E3 400014E8 40400038 40400001 C45B5BE2 D3C9C340 E5C5D9E2
C9D6D540 E7E7E7E7 40404040 40404040 4040C4C1 E3C57A40 E7E761E7
E761E7E7 40404040 40E3C9D4 C57A40E7 C6C3C8C1 F0F0F4F2*
02E3E7E3 40001520 40400028 40400001 E77AE7E7 7AE7E740 5B5BC9D5
C6D6D9D4 C1E3C9D6 D540D4D6 C4C5D340 40404040 40404040 40404040
40404040 40404040 40404040 40404040 C6C3C8C1 F0F0F4F3*
02E3E7E3 400015E8 40400038 40400001 58B0C000 58A0D2D4 5800D2D0
5000D37C 7800D334 33007000 C09058F0 C01C4110 D0A405EF 7D00D33C
7000D3A0 58F0C018 5800F008 5A00D314 C6C3C8C1 F0F0F4F4*
02E3E7E3 40001620 40400038 40400001 5000D3B4 59A0D3D0 47C0C0E4
1BFF58E0 D00007FE 58F0C058 4110D0A8 05EF58F0 C0544110 D0AC05EF
4100B084 5000D0B4 4100D418 5000D0B8 C6C3C8C1 F0F0F4F5*
02E3E7E3 40001658 40400038 40400001 9280D0B8 58F0C028 4110D0B0
05EF4100 B0975000 D0B44100 D4205000 D0B89280 D0B858F0 C0284110
D0B005EF 4100B070 5000D0C0 58F0C028 C6C3C8C1 F0F0F4F6*
02E3E7E3 40001690 40400038 40400001 4110D0BC 05EF50A0 D42850A0
D38858E0 C08C2B00 58F0C02C 780EF000 6A00D2C0 6000D2B8 5830D2BC
50A0D428 182A5800 D2E85000 C068184A C6C3C8C1 F0F0F4F7*
02E3E7E3 400016C8 40400038 40400001 5850D388 18635870 D2E81892
58A0C08C 58B0D2E8 2B0058F0 C02C780A F0006A00 D2C06000 D2B85880
D2BC1986 4780C1C2 18395B3B D420503B C6C3C8C1 F0F0F4F8*
02E3E7E3 40001700 40400038 40400001 D4241A54 5A70D2E8 5AB0D2E8
5097D420 18681A94 5AA0C078 5990D3D0 47C0C18C 5050D388 58B0C000
58A0D2D4 5830D388 89300003 5820D3D0 C6C3C8C1 F0F0F4F9*
02E3E7E3 40001738 40400038 40400001 5B23D420 1A2A5023 D4245800
D2C858F0 C0145000 F02150A0 D3A87820 D3583322 7020C070 7020C074
7800D348 33007000 C06C5800 D2E85000 C6C3C8C1 F0F0F5F0**
02E3E7E3 40001770 40400038 40400001 C07C58B0 C01458A0 C00C5890
C02C5880 C0005800 B0215A00 D2D45000 B02158F0 C0644110 D0C805EF
58F0C028 4110D0E8 05EF58F0 C0284110 C6C3C8C1 F0F0F5F1*
02E3E7E3 400017A8 40400038 40400001 D0F405EF 58F0C028 4110D100
05EF58F0 C0204110 D10C05EF 58F0C040 4110D118 05EF41E0 000415FE
4720C28A 58EFD04C 07FE58F0 C0484110 C6C3C8C1 F0F0F5F2*
02E3E7E3 400017E0 40400038 40400001 D12005EF 41E00004 15FE4720
C2A458EF D05407FE 7800D340 7000D39C 5890D2D4 58A0D2F0 58B0C008
410AB001 5000D168 58F0C060 4110D168 C6C3C8C1 F0F0F5F3*
02E3E7E3 40001818 40400038 40400001 05EF5000 D3B8410A B0015000
D18858F0 C0484110 D17005EF 41E00004 15FE4720 C2F058EF D05C07FE
7800D39C 7B00D324 7000D39C 5A90D2D4 C6C3C8C1 F0F0F5F4*
02E3E7E3 40001850 40400038 40400001 5AA0D2F0 5990B1A5 47C0C2B8

```
5890C02C  58A0C00C  58B0C014  7800D360  7000D394  7800D2CC  7000800C
7800C070  70008010  7800D2CC  70008014  C6C3C8C1  F0F0F5F5*
02E3E7E3  40001888  40400038  40400001  7800C074  70008018  7800D358
7000D3BC  58F0C060  4110D1B8  05EF5000  D39058F0  C0484110  D1C005EF
41E00004  15FE4720  C37058EF  D06407FE  C6C3C8C1  F0F0F5F6*
02E3E7E3  400018C0  40400038  40400001  58F0C034  1B1105EF  41E00004
15FE4720  C38858EF  D06C07FE  58E0C07C  585ED420  5C40C078  18355A30
D2E04103  90005000  D208410E  D4245000  C6C3C8C1  F0F0F5F7*
02E3E7E3  400018F8  40400038  40400001  D20C58F0  C0504110  D20805EF
58E0C07C  587ED420  5C60C078  18475A40  D2E82B00  78049000  6A00D2C0
6000D2B8  5830D2BC  10335030  D3A458F0  C6C3C8C1  F0F0F5F8*

MEMBER NAME  FCHART
02E3E7E3  40001930  40400038  40400001  C05C1800  45E0F004  00000000
00000028  45E0F008  0450D3A4  45E0F010  58F0C05C  45E0F000  00000000
00000045  45E0F134  00010000  0120D3DA  C6C3C8C1  F0F0F5F9*
02E3E7E3  40001968  40400038  40400001  0100001E  00000001  45E0F010
58F0C048  4110D218  05EF41E0  000415FE  4720C43E  58EFD074  07FE7820
D3947A20  D3987A20  D33C7B20  D32C7020  C6C3C8C1  F0F0F6F0**
02E3E7E3  400019A0  40400038  40400001  D39458F0  C04C4110  D26005EF
41E00004  15FE4720  C46C58EF  D07C07FE  58F0C024  4110D274  05EF41E0
000415FE  4720C486  58EFD084  07FE5800  C6C3C8C1  F0F0F6F1*
02E3E7E3  400019D8  40400038  40400001  D37C1BFF  870FC4A8  5800D3A8
5A00D2D4  5000D3A8  5800C07C  5A00D2E8  5000C07C  78208010  7B20D398
7B20D33C  70208010  78208018  7B20D398  C6C3C8C1  F0F0F6F2*
02E3E7E3  40001A10  40400038  40400001  7B20D33C  70208018  7820D398
7A20D3BC  7A20D33C  7020D3BC  5800D3A8  5900D388  47C0C4E8  47F0C586
41200001  5720D37C  1BFF862F  C52C58F0  C6C3C8C1  F0F0F6F3*
02E3E7E3  40001A48  40400038  40400001  C0444110  D28405EF  41E00004
15FE4720  C51058EF  D08C07FE  5800D374  5900D3B4  4750C52C  5800D378
5900D2EC  4780C52C  47F0C370  5800D2D4  C6C3C8C1  F0F0F6F4*
02E3E7E3  40001A80  40400038  40400001  5000D3D4  58F0C03C  4110D28C
05EF41E0  000415FE  4720C54E  58EFD094  07FE58F0  C0105800  F0081BFF
860FC566  58F0C038  4110D2AC  05EF5800  C6C3C8C1  F0F0F6F5*
02E3E7E3  40001AB8  40400038  40400001  D3D45900  D2E04780  C54E5800
D3D45900  D2D44780  C58247F0  C60447F0  C23258B0  C00058A0  D2D450A0
D3D458F0  C03C4110  D28C05EF  41E00004  C6C3C8C1  F0F0F6F6*
02E3E7E3  40001AF0  40400038  40400001  15FE4720  C5AC58EF  D09C07FE
58F0C010  5800F008  1BFF860F  C5C458F0  C0384110  D2AC05EF  5800D3D4
5900D2E0  4780C5AC  59A0D3D4  4770C604  C6C3C8C1  F0F0F6F7*
02E3E7E3  40001B28  40400038  40400001  1BFF58E0  D00007FE  58B0C000
58A0D2D4  58F0C05C  45E0F004  00000006  0000004B  45E0F010  1BFF58E0
D00007FE  58B0C000  58A0D2D4  58F0C05C  C6C3C8C1  F0F0F6F8*
02E3E7E3  40001B60  40400038  40400001  45E0F004  00000006  0000007E
45E0F008  0450D3D4  45E0F010  58F0C05C  45E0F034  05404040  F1F158D0
D00458E0  D00C92FF  D00C982C  D01C07FE  C6C3C8C1  F0F0F6F9*
02E3E7E3  40001B98  40400030  40400001  58C0D048  58701004  58207000
5020D3D0  58201000  41302000  41500004  1B255C40  D2F41B25  5020C02C
5030C030  47F0C098  40404040  40404040  C6C3C8C1  F0F0F7F0**
02E3E7E3  40000020  40400004  40400001  00001B98  40404040  40404040
40404040  40404040  40404040  40404040  40404040  40404040  40404040
40404040  40404040  40404040  40404040  C6C3C8C1  F0F0F7F1*
02D9D3C4  40404040  40400038  40404040  00160001  1C0015AC  00170001
1C0015B0  00180001  1C0015B4  00010001  0C00193C  00010001  0C001958
00010001  0C001B44  00010001  0C001B68  C6C3C8C1  F0F0F7F2*
02E3E7E3  40000024  40400004  40400001  000000C0  40404040  40404040
40404040  40404040  40404040  40404040  40404040  40404040  40404040
40404040  40404040  40404040  40404040  C6C3C8C1  F0F0F7F3*
02E3E7E3  400000C0  40400004  40400001  00001B86  40404040  40404040
```

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | C6C3C8C1 | F0F0F7F4* | |
| 02E3E7E3 | 40000108 | 40400014 | 40400001 | 00001550 | 000017DA | 000017DA |
| 000017F4 | 000017FC | 40404040 | 40404040 | 40404040 | 40404040 | 40404040 |
| 40404040 | 40404040 | 40404040 | 40404040 | C6C3C8C1 | F0F0F7F5* | |
| 02D9D3C4 | 40404040 | 40400038 | 40404040 | 00010001 | 0C000020 | 00010001 |
| 0C000024 | 00010001 | 0C0000C0 | 00010001 | 0C000108 | 00010001 | 0C00010C |
| 00010001 | 0C000110 | 00010001 | 0C000114 | C6C3C8C1 | F0F0F7F6* | |
| 02E3E7E3 | 4000011C | 4040001C | 40400001 | 00001840 | 0000184C | 000018C0 |
| 000018C0 | 000018D8 | 000018D8 | 0000198E | 40404040 | 40404040 | 40404040 |
| 40404040 | 40404040 | 40404040 | 40404040 | C6C3C8C1 | F0F0F7F7* | |
| 02D9D3C4 | 40404040 | 40400038 | 40404040 | 00010001 | 0C000118 | 00010001 |

MEMBER NAME FCHART

| | | | | | | |
|---|---|---|---|---|---|---|
| 0C00011C | 00010001 | 0C000120 | 00010001 | 0C000124 | 00010001 | 0C000128 |
| 00010001 | 0C00012C | 00010001 | 0C000130 | C6C3C8C1 | F0F0F7F8* | |
| 02E3E7E3 | 40000138 | 4040001C | 40400001 | 0000198E | 000019BC | 000019D6 |
| 000019D6 | 000019D6 | 00001A60 | 00001B30 | 40404040 | 40404040 | 40404040 |
| 40404040 | 40404040 | 40404040 | 40404040 | C6C3C8C1 | F0F0F7F9* | |
| 02D9D3C4 | 40404040 | 40400038 | 40404040 | 00010001 | 0C000134 | 00010001 |
| 0C000138 | 00010001 | 0C00013C | 00010001 | 0C000140 | 00010001 | 0C000144 |
| 00010001 | 0C000148 | 00010001 | 0C00014C | C6C3C8C1 | F0F0F8F0** | |
| 02E3E7E3 | 40000154 | 4040001C | 40400001 | 00001A9E | 00001A9E | 00001AFC |
| 00001AFC | 800015E0 | 800004E0 | 800004D8 | 40404040 | 40404040 | 40404040 |
| 40404040 | 40404040 | 40404040 | 40404040 | C6C3C8C1 | F0F0F8F1* | |
| 02D9D3C4 | 40404040 | 40400038 | 40404040 | 00010001 | 0C000150 | 00010001 |
| 0C000154 | 00010001 | 0C000158 | 00010001 | 0C00015C | 00010001 | 0C000160 |
| 00010001 | 0C000164 | 00010001 | 0C000168 | C6C3C8C1 | F0F0F8F2* | |
| 02E3E7E3 | 40000170 | 40400004 | 40400001 | 000003A8 | 40404040 | 40404040 |
| 40404040 | 40404040 | 40404040 | 40404040 | 40404040 | 40404040 | 40404040 |
| 40404040 | 40404040 | 40404040 | 40404040 | C6C3C8C1 | F0F0F8F3* | |
| 02E3E7E3 | 40000178 | 40400008 | 40400001 | 80000000 | 000003A0 | 40404040 |
| 40404040 | 40404040 | 40404040 | 40404040 | 40404040 | 40404040 | 40404040 |
| 40404040 | 40404040 | 40404040 | 40404040 | C6C3C8C1 | F0F0F8F4* | |
| 02E3E7E3 | 40000184 | 40400014 | 40400001 | 80000014 | 00000394 | 00000020 |
| 00000464 | 0000044C | 40404040 | 40404040 | 40404040 | 40404040 | 40404040 |
| 40404040 | 40404040 | 40404040 | 40404040 | C6C3C8C1 | F0F0F8F5* | |
| 02D9D3C4 | 40404040 | 40400038 | 40404040 | 00010001 | 0C00016C | 00010001 |
| 0C000170 | 00010001 | 0C00017C | 00020001 | 0C000184 | 00010001 | 0C000188 |
| 00060001 | 0C00018C | 00010001 | 0C000190 | C6C3C8C1 | F0F0F8F6* | |
| 02E3E7E3 | 40000198 | 4040001C | 40400001 | 00000470 | 0000048C | 00000498 |
| 80000000 | 000003A0 | 00000440 | 80000000 | 40404040 | 40404040 | 40404040 |
| 40404040 | 40404040 | 40404040 | 40404040 | C6C3C8C1 | F0F0F8F7* | |
| 02D9D3C4 | 40404040 | 40400038 | 40404040 | 00010001 | 0C000194 | 00010001 |
| 0C000198 | 00010001 | 0C00019C | 00010001 | 0C0001A0 | 00060001 | 0C0001A4 |
| 00010001 | 0C0001A8 | 00010001 | 0C0001AC | C6C3C8C1 | F0F0F8F8* | |
| 02E3E7E3 | 400001B4 | 4040001C | 40400001 | 000003A8 | 0000148C | 80000004 |
| 000003A8 | 00000014 | 80000004 | 00000000 | 40404040 | 40404040 | 40404040 |
| 40404040 | 40404040 | 40404040 | 40404040 | C6C3C8C1 | F0F0F8F9* | |
| 02D9D3C4 | 40404040 | 40400038 | 40404040 | 00040001 | 0C0001B0 | 00010001 |
| 0C0001B4 | 00010001 | 0C0001B8 | 00040001 | 0C0001BC | 00010001 | 0C0001C0 |
| 00060001 | 0C0001C4 | 00040001 | 0C0001C8 | C6C3C8C1 | F0F0F9F0** | |
| 02E3E7E3 | 400001D0 | 4040001C | 40400001 | 0000148C | 80000440 | 000003CC |
| 800003CC | 000003F0 | 00000404 | 00000388 | 40404040 | 40404040 | 40404040 |
| 40404040 | 40404040 | 40404040 | 40404040 | C6C3C8C1 | F0F0F9F1* | |
| 02D9D3C4 | 40404040 | 40400038 | 40404040 | 00060001 | 0C0001CC | 00010001 |
| 0C0001D0 | 00010001 | 0C0001D4 | 00010001 | 0C0001D8 | 00010001 | 0C0001DC |
| 00010001 | 0C0001E0 | 00010001 | 0C0001E4 | C6C3C8C1 | F0F0F9F2* | |
| 02E3E7E3 | 400001EC | 4040001C | 40400001 | 000003B8 | 000003DC | 000003D8 |

```
000000A0  00000388  00000388  00000388  40404040  40404040  40404040
40404040  40404040  40404040  40404040  C6C3C8C1  F0F0F9F3*
02D9D3C4  40404040  40400038  40404040  00010001  0C0001E8  00010001
0C0001EC  00010001  0C0001F0  00010001  0C0001F4  00010001  0C0001F8
00010001  0C0001FC  00010001  0C000200  C6C3C8C1  F0F0F9F4*
02E3E7E3  40000208  4040001C  40400001  00000388  00000394  0000039C
00000388  00000388  000003DC  000003E8  40404040  40404040  40404040
40404040  40404040  40404040  40404040  C6C3C8C1  F0F0F9F5*
02D9D3C4  40404040  40400038  40404040  00010001  0C000204  00010001
0C000208  00010001  0C00020C  00010001  0C000210  00010001  0C000214
00010001  0C000218  00010001  0C00021C  C6C3C8C1  F0F0F9F6*
02E3E7E3  40000224  40400004  40400001  80000388  40404040  40404040
40404040  40404040  40404040  40404040  40404040  40404040  40404040

MEMBER NAME  FCHART
40404040  40404040  40404040  40404040  C6C3C8C1  F0F0F9F7*
02E3E7E3  4000022C  40400018  40400001  800003B0  000003F8  0000045C
00000388  00000478  000003DC  40404040  40404040  40404040  40404040
40404040  40404040  40404040  40404040  C6C3C8C1  F0F0F9F8*
02D9D3C4  40404040  40400038  40404040  00010001  0C000220  00010001
0C000224  00010001  0C00022C  00010001  0C000230  00010001  0C000234
00010001  0C000238  00010001  0C00023C  C6C3C8C1  F0F0F9F9*
02E3E7E3  40000244  40400004  40400001  000003D8  40404040  40404040
40404040  40404040  40404040  40404040  40404040  40404040  40404040
40404040  40404040  40404040  40404040  C6C3C8C1  F0F1F0F0**
02E3E7E3  4000024C  40400018  40400001  00000388  00000388  00000388
00000388  00000394  0000039C  40404040  40404040  40404040  40404040
40404040  40404040  40404040  40404040  C6C3C8C1  F0F1F0F1*
02D9D3C4  40404040  40400038  40404040  00010001  0C000240  00010001
0C000244  00010001  0C00024C  00010001  0C000250  00010001  0C000254
00010001  0C000258  00010001  0C00025C  C6C3C8C1  F0F1F0F2*
02E3E7E3  40000264  4040001C  40400001  00000388  00000388  000003DC
000003E8  80000388  000014B0  800003D0  40404040  40404040  40404040
40404040  40404040  40404040  40404040  C6C3C8C1  F0F1F0F3*
02D9D3C4  40404040  40400038  40404040  00010001  0C000260  00010001
0C000264  00010001  0C000268  00010001  0C00026C  00010001  0C000270
00010001  0C000274  00010001  0C000278  C6C3C8C1  F0F1F0F4*
02E3E7E3  40000280  4040001C  40400001  000015BC  0000040C  00000388
00000450  000003DC  000003D8  000014B0  40404040  40404040  40404040
40404040  40404040  40404040  40404040  C6C3C8C1  F0F1F0F5*
02D9D3C4  40404040  40400038  40404040  00010001  0C00027C  00010001
0C000280  00010001  0C000284  00010001  0C000288  00010001  0C00028C
00010001  0C000290  00010001  0C000294  C6C3C8C1  F0F1F0F6*
02E3E7E3  4000029C  4040001C  40400001  00000388  00000388  00000388
00000388  00000394  0000039C  00000388  40404040  40404040  40404040
40404040  40404040  40404040  40404040  C6C3C8C1  F0F1F0F7*
02D9D3C4  40404040  40400038  40404040  00010001  0C000298  00010001
0C00029C  00010001  0C0002A0  00010001  0C0002A4  00010001  0C0002A8
00010001  0C0002AC  00010001  0C0002B0  C6C3C8C1  F0F1F0F8*
02E3E7E3  400002B8  40400010  40400001  00000388  000003DC  000003E8
80000388  40404040  40404040  40404040  40404040  40404040  40404040
40404040  40404040  40404040  40404040  C6C3C8C1  F0F1F0F9*
02E3E7E3  400002D0  4040000C  40400001  00000458  8000043C  000015BC
40404040  40404040  40404040  40404040  40404040  40404040  40404040
40404040  40404040  40404040  40404040  C6C3C8C1  F0F1F1F0**
02D9D3C4  40404040  40400038  40404040  00010001  0C0002B4  00010001
0C0002B8  00010001  0C0002BC  00010001  0C0002C0  00010001  0C0002C4
00010001  0C0002D0  00010001  0C0002D4  C6C3C8C1  F0F1F1F1*
02E3E7E3  400002DC  4040001C  40400001  00000454  00000388  000003BC
```

| | | | | | | |
|---|---|---|---|---|---|---|
| 000003DC | 000003D8 | 0000049A | 00000388 | 40404040 | 40404040 | 40404040 |
| 40404040 | 40404040 | 40404040 | 40404040 | C6C3C8C1 | F0F1F1F2* | |
| 02D9D3C4 | 40404040 | 40400038 | 40404040 | 00010001 | 0C0002D8 | 00010001 |
| 0C0002DC | 00010001 | 0C0002E0 | 00010001 | 0C0002E4 | 00010001 | 0C0002E8 |
| 00010001 | 0C0002EC | 00010001 | 0C0002F0 | C6C3C8C1 | F0F1F1F3* | |
| 02E3E7E3 | 400002F8 | 4040001C | 40400001 | 00000388 | 00000388 | 00000388 |
| 00000394 | 0000039C | 00000388 | 00000388 | 40404040 | 40404040 | 40404040 |
| 40404040 | 40404040 | 40404040 | 40404040 | C6C3C8C1 | F0F1F1F4* | |
| 02D9D3C4 | 40404040 | 40400038 | 40404040 | 00010001 | 0C0002F4 | 00010001 |
| 0C0002F8 | 00010001 | 0C0002FC | 00010001 | 0C000300 | 00010001 | 0C000304 |
| 00010001 | 0C000308 | 00010001 | 0C00030C | C6C3C8C1 | F0F1F1F5* | |
| 02E3E7E3 | 40000314 | 4040001C | 40400001 | 000003DC | 000003E8 | 80000388 |
| 0000038C | 0000038C | 0000038C | 0000038C | 40404040 | 40404040 | 40404040 |
| 40404040 | 40404040 | 40404040 | 40404040 | C6C3C8C1 | F0F1F1F6* | |

MEMBER NAME FCHART

| | | | | | | |
|---|---|---|---|---|---|---|
| 02D9D3C4 | 40404040 | 40400038 | 40404040 | 00010001 | 0C000310 | 00010001 |
| 0C000314 | 00010001 | 0C000318 | 00010001 | 0C00031C | 00010001 | 0C000320 |
| 00010001 | 0C000324 | 00010001 | 0C000328 | C6C3C8C1 | F0F1F1F7* | |
| 02E3E7E3 | 40000330 | 4040001C | 40400001 | 80000484 | 00001494 | 0000149C |
| 00000484 | 800003F4 | 00000434 | 80000438 | 40404040 | 40404040 | 40404040 |
| 40404040 | 40404040 | 40404040 | 40404040 | C6C3C8C1 | F0F1F1F8* | |
| 02D9D3C4 | 40404040 | 40400038 | 40404040 | 00010001 | 0C00032C | 00010001 |
| 0C000330 | 00010001 | 0C000334 | 00010001 | 0C000338 | 00010001 | 0C00033C |
| 00010001 | 0C000340 | 00010001 | 0C000344 | C6C3C8C1 | F0F1F1F9* | |
| 02E3E7E3 | 4000034C | 4040001C | 40400001 | 00000414 | 00000410 | 00000460 |
| 000003F4 | 000003F4 | 000003E0 | 0000041C | 40404040 | 40404040 | 40404040 |
| 40404040 | 40404040 | 40404040 | 40404040 | C6C3C8C1 | F0F1F2F0** | |
| 02D9D3C4 | 40404040 | 40400038 | 40404040 | 00010001 | 0C000348 | 00010001 |
| 0C00034C | 00010001 | 0C000350 | 00010001 | 0C000354 | 00010001 | 0C000358 |
| 00010001 | 0C00035C | 00010001 | 0C000360 | C6C3C8C1 | F0F1F2F1* | |
| 02E3E7E3 | 40000368 | 40400010 | 40400001 | 8000047C | 00000398 | 00000494 |
| 80000488 | 40404040 | 40404040 | 40404040 | 40404040 | 40404040 | 40404040 |
| 40404040 | 40404040 | 40404040 | 40404040 | C6C3C8C1 | F0F1F2F2* | |
| 02E3E7E3 | 400015B8 | 40400030 | 40400001 | 00000000 | 00000000 | 00000000 |
| 00000000 | 00000058 | 00000000 | 00000000 | 00000000 | 00000000 | 00000060 |
| 00000000 | 00000000 | 40404040 | 40404040 | C6C3C8C1 | F0F1F2F3* | |
| 02D9D3C4 | 40404040 | 40400028 | 40404040 | 00010001 | 0C000364 | 00010001 |
| 0C000368 | 00010001 | 0C00036C | 00010001 | 0C000370 | 00010001 | 0C000374 |
| 40404040 | 40404040 | 40404040 | 40404040 | C6C3C8C1 | F0F1F2F4* | |
| 02C5D5C4 | 40404040 | 40404040 | 40404040 | 40404040 | 40404040 | 40404040 |
| 00001BC8 | F1F5F7F3 | F460C6D6 | F34040F0 | F2F0F2F8 | F7F0F9F8 | 40F0F84B |
| F1F54BF1 | F6404040 | C6C3C8C1 | D9E34040 | C6C3C8C1 | F0F1F2F5** | |

MEMBER NAME FMCHT

| | | | | | | |
|---|---|---|---|---|---|---|
| 02C5E2C4 | 40404040 | 40400010 | 40400001 | C6D4C3C8 | E3404040 | 00000000 |
| 40000000 | 40404040 | 40404040 | 40404040 | 40404040 | 40404040 | 40404040 |
| 40404040 | 40404040 | 40404040 | 40404040 | C6D4C3C8 | F0F0F0F1* | |
| 02E3E7E3 | 40000000 | 40400028 | 40400001 | 47F0F00C | 07C6D4C3 | C8E34040 |
| 90ECD00C | 184D98CD | F0205040 | D00450D0 | 400807FC | 40404040 | 40404040 |
| 40404040 | 40404040 | 40404040 | 40404040 | C6D4C3C8 | F0F0F0F2* | |
| 02C5E2C4 | 40404040 | 40400010 | 40400002 | C6D4E3C5 | D9D94040 | 05000000 |
| 40002D58 | 40404040 | 40404040 | 40404040 | 40404040 | 40404040 | 40404040 |
| 40404040 | 40404040 | 40404040 | 40404040 | C6D4C3C8 | F0F0F0F3* | |
| 02E3E7E3 | 400000F0 | 4040002C | 40400001 | 00000000 | 00000000 | 00000001 |
| 00000002 | 00000032 | 0000003C | 00000048 | 41100000 | 41F00000 | 00000000 |
| 00000000 | 40404040 | 40404040 | 40404040 | C6D4C3C8 | F0F0F0F4* | |
| 02C5E2C4 | 40404040 | 40400010 | 40400003 | D7C3C5D9 | D9404040 | 05000000 |
| 40003844 | 40404040 | 40404040 | 40404040 | 40404040 | 40404040 | 40404040 |

```
40404040  40404040  40404040  40404040  C6D4C3C8  F0F0F0F5*
02C5E2C4  40404040  40400010  40400004  C4C9E3E3  D6404040  02000000
40000000  40404040  40404040  40404040  40404040  40404040  40404040
40404040  40404040  40404040  40404040  C6D4C3C8  F0F0F0F6*
02C5E2C4  40404040  40400010  40400005  C6D4C5D9  D9404040  02000000
40000000  40404040  40404040  40404040  40404040  40404040  40404040
40404040  40404040  40404040  40404040  C6D4C3C8  F0F0F0F7*
02C5E2C4  40404040  40400010  40400006  C6D4E6D9  D5404040  02000000
40000000  40404040  40404040  40404040  40404040  40404040  40404040
40404040  40404040  40404040  40404040  C6D4C3C8  F0F0F0F8*
02C5E2C4  40404040  40400010  40400007  C2C5C7C4  C5E34040  02000000
40000000  40404040  40404040  40404040  40404040  40404040  40404040
40404040  40404040  40404040  40404040  C6D4C3C8  F0F0F0F9*
02C5E2C4  40404040  40400010  40400008  C5D5C4C4  C5E34040  02000000
40000000  40404040  40404040  40404040  40404040  40404040  40404040
40404040  40404040  40404040  40404040  C6D4C3C8  F0F0F1F0**
02E3E7E3  40000140  40400020  40400001  FFFFFFC3  00002551  FFFFFFBB
00000000  00000000  00000000  00000000  00000000  40404040  40404040
40404040  40404040  40404040  40404040  C6D4C3C8  F0F0F1F1*
02D9D3C4  40404040  40400038  40404040  00020001  0C000140  00020001
0C000144  00030001  0C000148  00040001  1C00014C  00050001  1C000150
00060001  1C000154  00070001  1C000158  C6D4C3C8  F0F0F1F2*
02C5E2C4  40404040  40400010  40400009  D7D3E8C3  C8E34040  02000000
40000000  40404040  40404040  40404040  40404040  40404040  40404040
40404040  40404040  40404040  40404040  C6D4C3C8  F0F0F1F3*
02E3E7E3  40000160  40400038  40400001  00000000  58A0D118  58B0D11C
7800D0E8  7000D0FC  7800D0CC  7000D100  7800D0E8  7000D104  7800D0CC
7000D108  5800B02F  12004780  D1C458F0  C6D4C3C8  F0F0F1F4*
02E3E7E3  40000198  40400038  40400001  D1301B11  05EF41E0  000415FE
4720D186  58EFD04C  07FE58F0  D1284110  D09405EF  58F0D134  4110D09C
05EF41E0  000415FE  4720D1AA  58EFD054  C6D4C3C8  F0F0F1F5*
02E3E7E3  400001D0  40400038  40400001  07FE58F0  D1244110  D0B005EF
41E00004  15FE4720  D1C458EF  D05C07FE  5800B803  12004780  D22458F0
D1301B11  05EF41E0  000415FE  4720D1E6  C6D4C3C8  F0F0F1F6*
02E3E7E3  40000208  40400038  40400001  58EFD064  07FE58F0  D12C4110
D0C005EF  58F0D134  4110D09C  05EF41E0  000415FE  4720D20A  58EFD06C
07FE58F0  D1244110  D0B005EF  41E00004  C6D4C3C8  F0F0F1F7*
02E3E7E3  40000240  40400038  40400001  15FE4720  D22458EF  D07407FE
58F0D120  5800F045  12004780  D28658F0  D1301B11  05EF41E0  000415FE
4720D24A  58EFD07C  07FE58F0  D1381B11  C6D4C3C8  F0F0F1F8*
02E3E7E3  40000278  40400038  40400001  05EF58F0  D1344110  D09C05EF
41E00004  15FE4720  D26C58EF  D08407FE  58F0D124  4110D0B0  05EF41E0
000415FE  4720D286  58EFD08C  07FE1BFF  C6D4C3C8  F0F0F1F9*
02E3E7E3  400002B0  4040001C  40400001  58E0D000  07FE58D0  D00458E0

MEMBER NAME  FMCHT
D00C92FF  D00C982C  D01C07FE  47F0D13C  40404040  40404040  40404040
40404040  40404040  40404040  40404040  C6D4C3C8  F0F0F2F0**
02E3E7E3  40000020  4040000C  40400001  000002C8  00000028  000002B6
40404040  40404040  40404040  40404040  40404040  40404040  40404040
40404040  40404040  40404040  40404040  C6D4C3C8  F0F0F2F1*
02E3E7E3  40000074  4040000C  40400001  000001AE  000001EC  000001D2
40404040  40404040  40404040  40404040  40404040  40404040  40404040
40404040  40404040  40404040  40404040  C6D4C3C8  F0F0F2F2*
02D9D3C4  40404040  40400038  40404040  00080001  1C00015C  00090001
1C000160  00010001  0C000020  00010001  0C000024  00010001  0C000028
00010001  0C000074  00010001  0C000078  C6D4C3C8  F0F0F2F3*
02E3E7E3  40000080  4040001C  40400001  000001EC  000001EC  000001EC
0000020E  0000024C  00000232  0000024C  40404040  40404040  40404040
```

| | | | | | | |
|---|---|---|---|---|---|---|
| 40404040 | 40404040 | 40404040 | 40404040 | C6D4C3C8 | F0F0F2F4* | |
| 02D9D3C4 | 40404040 | 40400038 | 40404040 | 00010001 | 0C00007C | 00010001 |
| 0C000080 | 00010001 | 0C000084 | 00010001 | 0C000088 | 00010001 | 0C00008C |
| 00010001 | 0C000090 | 00010001 | 0C000094 | C6D4C3C8 | F0F0F2F5* | |
| 02E3E7E3 | 4000009C | 4040001C | 40400001 | 0000024C | 0000024C | 00000272 |
| 000002AE | 00000294 | 000002AE | 000002AE | 40404040 | 40404040 | 40404040 |
| 40404040 | 40404040 | 40404040 | 40404040 | C6D4C3C8 | F0F0F2F6* | |
| 02D9D3C4 | 40404040 | 40400038 | 40404040 | 00010001 | 0C000098 | 00010001 |
| 0C00009C | 00010001 | 0C0000A0 | 00010001 | 0C0000A4 | 00010001 | 0C0000A8 |
| 00010001 | 0C0000AC | 00010001 | 0C0000B0 | C6D4C3C8 | F0F0F2F7* | |
| 02E3E7E3 | 400000B8 | 4040001C | 40400001 | 000002AE | 00000000 | 80002580 |
| 000000F4 | 000000F4 | 000000F4 | 000000F4 | 40404040 | 40404040 | 40404040 |
| 40404040 | 40404040 | 40404040 | 40404040 | C6D4C3C8 | F0F0F2F8* | |
| 02D9D3C4 | 40404040 | 40400038 | 40404040 | 00010001 | 0C0000B4 | 00010001 |
| 0C0000B8 | 00020001 | 0C0000BC | 00020001 | 0C0000C0 | 00010001 | 0C0000C4 |
| 00010001 | 0C0000C8 | 00010001 | 0C0000CC | C6D4C3C8 | F0F0F2F9* | |
| 02E3E7E3 | 400000D4 | 4040001C | 40400001 | 80000120 | 00000124 | 0000012C |
| 00000120 | 8000010C | 00002584 | 80002D54 | 40404040 | 40404040 | 40404040 |
| 40404040 | 40404040 | 40404040 | 40404040 | C6D4C3C8 | F0F0F3F0** | |
| 02D9D3C4 | 40404040 | 40400038 | 40404040 | 00010001 | 0C0000D0 | 00010001 |
| 0C0000D4 | 00010001 | 0C0000D8 | 00010001 | 0C0000DC | 00010001 | 0C0000E0 |
| 00010001 | 0C0000E4 | 00020001 | 0C0000E8 | C6D4C3C8 | F0F0F3F1* | |
| 02D9D3C4 | 40404040 | 40400008 | 40404040 | 00020001 | 0C0000EC | 40404040 |
| 40404040 | 40404040 | 40404040 | 40404040 | 40404040 | 40404040 | 40404040 |
| 40404040 | 40404040 | 40404040 | 40404040 | C6D4C3C8 | F0F0F3F2* | |
| 02C5D5C4 | 40404040 | 40404040 | 40404040 | 40404040 | 40404040 | 40404040 |
| 000002CC | F1F5F7F3 | F460C6D6 | F34040F0 | F2F0F2F8 | F7F0F9F8 | 40F0F84B |
| F1F54BF2 | F2404040 | C6D4C3C8 | E3404040 | C6D4C3C8 | F0F0F3F3** | |

MEMBER NAME FMERR

| | | | | | | |
|---|---|---|---|---|---|---|
| 02C5E2C4 | 40404040 | 40400010 | 40400001 | C6D4C5D9 | D9404040 | 00000000 |
| 40000000 | 40404040 | 40404040 | 40404040 | 40404040 | 40404040 | 40404040 |
| 40404040 | 40404040 | 40404040 | 40404040 | C6D4C5D9 | F0F0F0F1* | |
| 02E3E7E3 | 40000000 | 40400038 | 40400001 | 47F0F00C | 07C6D4C5 | D9D94040 |
| 90ECD00C | 184D98CD | F0205040 | D00450D0 | 400807FC | 40404040 | 40404040 |
| 021A1C40 | C5D9D9D6 | D940C9D5 | 40C6D4C5 | C6D4C5D9 | F0F0F0F2* | |
| 02E3E7E3 | 40000038 | 40400038 | 40400001 | D9D9404D | E2E4D7C5 | D940E3C5 |
| E7E35D22 | C6D6D9D4 | C1E340C3 | C8C1D9E3 | 40C5D9D9 | D6D9E240 | 40404040 |
| C6D6D9D4 | C1E340C5 | D9D9D6D9 | 40D4C5E2 | C6D4C5D9 | F0F0F0F3* | |
| 02E3E7E3 | 40000070 | 40400020 | 40400001 | E2C1C7C5 | E2404040 | C6D6D9D4 |
| C1E340C3 | C8C1D9E3 | 40C5D9D9 | D6D9E240 | 40404040 | 40404040 | 40404040 |
| 40404040 | 40404040 | 40404040 | 40404040 | C6D4C5D9 | F0F0F0F4* | |
| 02E3E7E3 | 400002B8 | 40400038 | 40400001 | 00000000 | 00000001 | 00000003 |
| 00000004 | 00000013 | 00000015 | 0000003C | 00000049 | 00000078 | 401DF3B6 |
| 4029FBE7 | 403EF9DB | 40800000 | 41180000 | C6D4C5D9 | F0F0F0F5* | |
| 02C5E2C4 | 40404040 | 40400010 | 40400002 | D9D4D6C4 | C5D34040 | 05000000 |
| 40000018 | 40404040 | 40404040 | 40404040 | 40404040 | 40404040 | 40404040 |
| 40404040 | 40404040 | 40404040 | 40404040 | C6D4C5D9 | F0F0F0F6* | |
| 02E3E7E3 | 400002F0 | 40400034 | 40400001 | 41200000 | 41280000 | 412C0000 |
| 41300000 | 41400000 | 41473333 | 41480000 | 4154353F | 415C353F | 415E6666 |
| 42110000 | 00000000 | 00000000 | 40404040 | C6D4C5D9 | F0F0F0F7* | |
| 02C5E2C4 | 40404040 | 40400010 | 40400003 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | C6D4C5D9 | F0F0F0F8* | |
| 02E3E7E3 | 400003E0 | 40400008 | 40400001 | FFFFFFFF | 00000000 | 40404040 |
| 40404040 | 40404040 | 40404040 | 40404040 | 40404040 | 40404040 | 40404040 |
| 40404040 | 40404040 | 40404040 | 40404040 | C6D4C5D9 | F0F0F0F9* | |
| 02C5E2C4 | 40404040 | 40400010 | 40400004 | C3C1C4D3 | D5F14040 | 02000000 |
| 40000000 | 40404040 | 40404040 | 40404040 | 40404040 | 40404040 | 40404040 |

40404040 40404040 40404040 40404040 C6D4C5D9 F0F0F1F0**
02C5E2C4 40404040 40400010 40400005 C3C1C4E2 E4D74040 02000000
40000000 40404040 40404040 40404040 40404040 40404040 40404040
40404040 40404040 40404040 40404040 C6D4C5D9 F0F0F1F1*
02C5E2C4 40404040 40400010 40400006 C8C7C4C1 E3C54040 02000000
40000000 40404040 40404040 40404040 40404040 40404040 40404040
40404040 40404040 40404040 40404040 C6D4C5D9 F0F0F1F2*
02C5E2C4 40404040 40400010 40400007 C8C7E3C9 D4C54040 02000000
40000000 40404040 40404040 40404040 40404040 40404040 40404040
40404040 40404040 40404040 40404040 C6D4C5D9 F0F0F1F3*
02C5E2C4 40404040 40400010 40400008 C9C2C3D6 D47B4040 02000000
40000000 40404040 40404040 40404040 40404040 40404040 40404040
40404040 40404040 40404040 40404040 C6D4C5D9 F0F0F1F4*
02C5E2C4 40404040 40400010 40400009 C9C3D5E3 C5D94040 02000000
40000000 40404040 40404040 40404040 40404040 40404040 40404040
40404040 40404040 40404040 40404040 C6D4C5D9 F0F0F1F5*
02E3E7E3 400003EC 4040001C 40400001 00000000 00000000 00000000
00000000 00000000 00000000 00000000 40404040 40404040 40404040
40404040 40404040 40404040 40404040 C6D4C5D9 F0F0F1F6*
02D9D3C4 40404040 40400038 40404040 00020001 0C0003E0 00030001
1C0003EC 00040001 1C0003F0 00050001 1C0003F4 00060001 1C0003F8
00070001 1C0003FC 00080001 1C000400 C6D4C5D9 F0F0F1F7*
02E3E7E3 40000360 40400038 40400001 C3D6D7E8 D9C9C7C8 E3404DC3
5D40F1F9 F8F640E3 C8C540C2 D6C5C9D5 C740C3D6 D4D7C1D5 E85BC1D3
D340D9C9 C7C8E3E2 40D9C5E2 C5D9E5C5 C6D4C5D9 F0F0F1F8*
02E3E7E3 40000398 40400038 40400001 C45B5BE2 D3C9C340 E5C5D9E2
C9D6D540 E7E74BE7 40404040 40404040 4040C4C1 E3C57A40 E7E761E7
E761E7E7 40404040 4040E3C9 D4C57A40 C6D4C5D9 F0F0F1F9*
02E3E7E3 400003D0 40400008 40400001 E7E77AE7 E77AE7E7 40404040

MEMBER NAME FMERR
40404040 40404040 40404040 40404040 40404040 40404040 40404040
40404040 40404040 40404040 40404040 C6D4C5D9 F0F0F2F0**
02E3E7E3 4000041C 40400038 40400001 5880D350 58B0D354 5870D380
4100D318 5000D078 58F0D35C 4110D074 05EF58F0 D36C4110 D08005EF
58F0D368 4110D084 05EF7800 D27C3300 C6D4C5D9 F0F0F2F1*
02E3E7E3 40000454 40400038 40400001 7000D2BC 7800D284 33007000
D2987800 D2743300 7000D2A0 7800D26C 33007000 D2A47800 D2847000
D29C7800 D2687000 D2A87800 D2787000 C6D4C5D9 F0F0F2F2*
02E3E7E3 4000048C 40400038 40400001 D2B058F0 D3644110 D08805EF
41E00004 15FE4720 D41858EF D04C07FE 7800D26C 7000D2B0 7800D270
33007000 D38458F0 D3644110 D0D005EF C6D4C5D9 F0F0F2F3*
02E3E7E3 400004C4 40400038 40400001 41E00004 15FE4720 D44458EF
D05407FE 7800D264 7000D2B0 58F0D364 4110D118 05EF41E0 000415FE
4720D466 58EFD05C 07FE7800 D2A87000 C6D4C5D9 F0F0F2F4*
02E3E7E3 400004FC 40400038 40400001 D2AC58F0 D3604110 D16005EF
7800D2AC 7800D258 7000D2AC 58F0D360 4110D160 05EF7800 D2607000
D2B05800 D2C01200 4780D510 5890D22C C6D4C5D9 F0F0F2F5*
02E3E7E3 40000534 40400038 40400001 18A7410A B0005000 D17058F0
D3744110 D17005EF 5000D2B8 410AB000 5000D190 58F0D364 4110D178
05EF41E0 000415FE 4720D4DE 58EFD064 C6D4C5D9 F0F0F2F6*
02E3E7E3 4000056C 40400038 40400001 07FE7800 D2B07800 D2587000
D2B07800 D2AC7800 D2587000 D2AC58F0 D3604110 D16005EF 5A90D22C
5AA0D240 5990D2C0 47C0D4A6 58F0D360 C6D4C5D9 F0F0F2F7*
02E3E7E3 400005A4 40400038 40400001 4110D1C0 05EF58F0 D3604110
D1D005EF 7800D288 33007000 D38458F0 D3644110 D1E005EF 41E00004
15FE4720 D54858EF D06C07FE 1BFF58E0 C6D4C5D9 F0F0F2F8*
02E3E7E3 400005DC 40400038 40400001 D00007FE 58F0D370 45E0F004
00000006 00000028 45E0F010 1BFF58E0 D00007FE 58D0D004 58E0D00C

```
92FFD00C  982CD01C  07FE5870  10045820  C6D4C5D9  F0F0F2F9*
02E3E7E3  40000614  40400026  40400001  70005020  D2C05820  10004130
20004150  00011B25  5C40D240  1B255020  D3545030  D35847F0  D38C4040
40404040  40404040  40404040  40404040  C6D4C5D9  F0F0F3F0**
02E3E7E3  40000020  40400008  40400001  0000060E  00000090  40404040
40404040  40404040  40404040  40404040  40404040  40404040  40404040
40404040  40404040  40404040  40404040  C6D4C5D9  F0F0F3F1*
02E3E7E3  40000090  40400004  40400001  000005FC  40404040  40404040
40404040  40404040  40404040  40404040  40404040  40404040  40404040
40404040  40404040  40404040  40404040  C6D4C5D9  F0F0F3F2*
02E3E7E3  400000DC  4040000C  40400001  000004A8  000005E0  000004D4
40404040  40404040  40404040  40404040  40404040  40404040  40404040
40404040  40404040  40404040  40404040  C6D4C5D9  F0F0F3F3*
02D9D3C4  40404040  40400038  40404040  00090001  1C000404  00010001
0C0005EC  00010001  0C000020  00010001  0C000024  00010001  0C000090
00010001  0C0000DC  00010001  0C0000E0  C6D4C5D9  F0F0F3F4*
02E3E7E3  400000E8  4040001C  40400001  000005E0  000004F6  000005E0
0000056E  000005E0  000005D8  000005E0  40404040  40404040  40404040
40404040  40404040  40404040  40404040  C6D4C5D9  F0F0F3F5*
02D9D3C4  40404040  40400038  40404040  00010001  0C0000E4  00010001
0C0000E8  00010001  0C0000EC  00010001  0C0000F0  00010001  0C0000F4
00010001  0C0000F8  00010001  0C0000FC  C6D4C5D9  F0F0F3F6*
02E3E7E3  40000104  40400004  40400001  000002C4  40404040  40404040
40404040  40404040  40404040  40404040  40404040  40404040  40404040
40404040  40404040  40404040  40404040  C6D4C5D9  F0F0F3F7*
02E3E7E3  4000010C  40400018  40400001  80000014  800003D0  800003BC
0000034C  00000340  000002B8  40404040  40404040  40404040  40404040
40404040  40404040  40404040  40404040  C6D4C5D9  F0F0F3F8*
02D9D3C4  40404040  40400038  40404040  00010001  0C000100  00010001
0C000104  00020001  0C00010C  00010001  0C000110  00010001  0C000114

MEMBER NAME  FMERR
00010001  0C000118  00010001  0C00011C  C6D4C5D9  F0F0F3F9*
02E3E7E3  40000124  4040001C  40400001  000002D8  000002E0  000002DC
00000360  000002B8  000002B8  000002B8  40404040  40404040  40404040
40404040  40404040  40404040  40404040  C6D4C5D9  F0F0F4F0**
02D9D3C4  40404040  40400038  40404040  00010001  0C000120  00010001
0C000124  00010001  0C000128  00010001  0C00012C  00010001  0C000130
00010001  0C000134  00010001  0C000138  C6D4C5D9  F0F0F4F1*
02E3E7E3  40000140  4040001C  40400001  000002B8  000002BC  000002C0
000002B8  000002B8  000002E0  000002E4  40404040  40404040  40404040
40404040  40404040  40404040  40404040  C6D4C5D9  F0F0F4F2*
02D9D3C4  40404040  40400038  40404040  00010001  0C00013C  00010001
0C000140  00010001  0C000144  00010001  0C000148  00010001  0C00014C
00010001  0C000150  00010001  0C000154  C6D4C5D9  F0F0F4F3*
02E3E7E3  4000015C  4040001C  40400001  800002B8  00000414  00000340
000002B8  000002C8  000002E0  000002DC  40404040  40404040  40404040
40404040  40404040  40404040  40404040  C6D4C5D9  F0F0F4F4*
02D9D3C4  40404040  40400038  40404040  00010001  0C000158  00010001
0C00015C  00010001  0C000160  00010001  0C000164  00010001  0C000168
00010001  0C00016C  00010001  0C000170  C6D4C5D9  F0F0F4F5*
02E3E7E3  40000178  4040001C  40400001  00000078  000002B8  000002B8
000002B8  000002B8  000002BC  000002C0  40404040  40404040  40404040
40404040  40404040  40404040  40404040  C6D4C5D9  F0F0F4F6*
02D9D3C4  40404040  40400038  40404040  00010001  0C000174  00010001
0C000178  00010001  0C00017C  00010001  0C000180  00010001  0C000184
00010001  0C000188  00010001  0C00018C  C6D4C5D9  F0F0F4F7*
02E3E7E3  40000194  4040001C  40400001  000002B8  000002B8  000002E0
000002E4  800002B8  0000034C  00000340  40404040  40404040  40404040
```

| | | | | | | |
|---|---|---|---|---|---|---|
| 40404040 | 40404040 | 40404040 | 40404040 | C6D4C5D9 | F0F0F4F8* | |
| 02D9D3C4 | 40404040 | 40400038 | 40404040 | 00010001 | 0C000190 | 00010001 |
| 0C000194 | 00010001 | 0C000198 | 00010001 | 0C00019C | 00010001 | 0C0001A0 |
| 00010001 | 0C0001A4 | 00010001 | 0C0001A8 | C6D4C5D9 | F0F0F4F9* | |
| 02E3E7E3 | 400001B0 | 4040001C | 40400001 | 000002B8 | 000002CC | 000002E0 |
| 000002DC | 00000060 | 000002B8 | 000002B8 | 40404040 | 40404040 | 40404040 |
| 40404040 | 40404040 | 40404040 | 40404040 | C6D4C5D9 | F0F0F5F0** | |
| 02D9D3C4 | 40404040 | 40400038 | 40404040 | 00010001 | 0C0001AC | 00010001 |
| 0C0001B0 | 00010001 | 0C0001B4 | 00010001 | 0C0001B8 | 00010001 | 0C0001BC |
| 00010001 | 0C0001C0 | 00010001 | 0C0001C4 | C6D4C5D9 | F0F0F5F1* | |
| 02E3E7E3 | 400001CC | 4040001C | 40400001 | 000002B8 | 000002B8 | 000002BC |
| 000002C0 | 000002B8 | 000002B8 | 000002E0 | 40404040 | 40404040 | 40404040 |
| 40404040 | 40404040 | 40404040 | 40404040 | C6D4C5D9 | F0F0F5F2* | |
| 02D9D3C4 | 40404040 | 40400038 | 40404040 | 00010001 | 0C0001C8 | 00010001 |
| 0C0001CC | 00010001 | 0C0001D0 | 00010001 | 0C0001D4 | 00010001 | 0C0001D8 |
| 00010001 | 0C0001DC | 00010001 | 0C0001E0 | C6D4C5D9 | F0F0F5F3* | |
| 02E3E7E3 | 400001E8 | 40400018 | 40400001 | 000002E4 | 800002B8 | 00000328 |
| 0000033C | 0000032C | 8000033C | 40404040 | 40404040 | 40404040 | 40404040 |
| 40404040 | 40404040 | 40404040 | 40404040 | C6D4C5D9 | F0F0F5F4* | |
| 02E3E7E3 | 40000204 | 40400004 | 40400001 | 800002D0 | 40404040 | 40404040 |
| 40404040 | 40404040 | 40404040 | 40404040 | 40404040 | 40404040 | 40404040 |
| 40404040 | 40404040 | 40404040 | 40404040 | C6D4C5D9 | F0F0F5F5* | |
| 02D9D3C4 | 40404040 | 40400038 | 40404040 | 00010001 | 0C0001E4 | 00010001 |
| 0C0001E8 | 00010001 | 0C0001EC | 00010001 | 0C0001F0 | 00010001 | 0C0001F4 |
| 00010001 | 0C0001F8 | 00010001 | 0C0001FC | C6D4C5D9 | F0F0F5F6* | |
| 02E3E7E3 | 40000208 | 40400018 | 40400001 | 0000034C | 00000340 | 000002B8 |
| 00000348 | 000002E0 | 000002DC | 40404040 | 40404040 | 40404040 | 40404040 |
| 40404040 | 40404040 | 40404040 | 40404040 | C6D4C5D9 | F0F0F5F7* | |
| 02E3E7E3 | 40000224 | 40400004 | 40400001 | 000002B8 | 40404040 | 40404040 |
| 40404040 | 40404040 | 40404040 | 40404040 | 40404040 | 40404040 | 40404040 |
| 40404040 | 40404040 | 40404040 | 40404040 | C6D4C5D9 | F0F0F5F8* | |

MEMBER NAME FMERR

| | | | | | | |
|---|---|---|---|---|---|---|
| 02D9D3C4 | 40404040 | 40400038 | 40404040 | 00010001 | 0C000204 | 00010001 |
| 0C000208 | 00010001 | 0C00020C | 00010001 | 0C000210 | 00010001 | 0C000214 |
| 00010001 | 0C000218 | 00010001 | 0C00021C | C6D4C5D9 | F0F0F5F9* | |
| 02E3E7E3 | 40000228 | 4040001C | 40400001 | 000002B8 | 000002B8 | 000002B8 |
| 000002BC | 000002C0 | 000002B8 | 000002B8 | 40404040 | 40404040 | 40404040 |
| 40404040 | 40404040 | 40404040 | 40404040 | C6D4C5D9 | F0F0F6F0** | |
| 02D9D3C4 | 40404040 | 40400038 | 40404040 | 00010001 | 0C000224 | 00010001 |
| 0C000228 | 00010001 | 0C00022C | 00010001 | 0C000230 | 00010001 | 0C000234 |
| 00010001 | 0C000238 | 00010001 | 0C00023C | C6D4C5D9 | F0F0F6F1* | |
| 02E3E7E3 | 40000244 | 4040001C | 40400001 | 000002E0 | 000002E4 | 800002B8 |
| 00000328 | 00000338 | 00000328 | 8000033C | 40404040 | 40404040 | 40404040 |
| 40404040 | 40404040 | 40404040 | 40404040 | C6D4C5D9 | F0F0F6F2* | |
| 02D9D3C4 | 40404040 | 40400038 | 40404040 | 00010001 | 0C000240 | 00010001 |
| 0C000244 | 00010001 | 0C000248 | 00010001 | 0C00024C | 00010001 | 0C000250 |
| 00010001 | 0C000254 | 00010001 | 0C000258 | C6D4C5D9 | F0F0F6F3* | |
| 02E3E7E3 | 40000260 | 4040001C | 40400001 | 0000032C | 00000338 | 0000032C |
| 8000033C | 00000414 | 000002EC | 000002B8 | 40404040 | 40404040 | 40404040 |
| 40404040 | 40404040 | 40404040 | 40404040 | C6D4C5D9 | F0F0F6F4* | |
| 02D9D3C4 | 40404040 | 40400038 | 40404040 | 00010001 | 0C00025C | 00010001 |
| 0C000260 | 00010001 | 0C000264 | 00010001 | 0C000268 | 00010001 | 0C00026C |
| 00010001 | 0C000270 | 00010001 | 0C000274 | C6D4C5D9 | F0F0F6F5* | |
| 02E3E7E3 | 4000027C | 4040001C | 40400001 | 000002C8 | 000002E0 | 000002DC |
| 00000048 | 000002B8 | 000002B8 | 000002B8 | 40404040 | 40404040 | 40404040 |
| 40404040 | 40404040 | 40404040 | 40404040 | C6D4C5D9 | F0F0F6F6* | |
| 02D9D3C4 | 40404040 | 40400038 | 40404040 | 00010001 | 0C000278 | 00010001 |
| 0C00027C | 00010001 | 0C000280 | 00010001 | 0C000284 | 00010001 | 0C000288 |

| | | | | | | |
|---|---|---|---|---|---|---|
| 00010001 | 0C00028C | 00010001 | 0C000290 | C6D4C5D9 | F0F0F6F7* | |
| 02E3E7E3 | 40000298 | 4040001C | 40400001 | 000002B8 | 000002BC | 000002C0 |
| 000002B8 | 000002B8 | 000002E0 | 000002E4 | 40404040 | 40404040 | 40404040 |
| 40404040 | 40404040 | 40404040 | 40404040 | C6D4C5D9 | F0F0F6F8* | |
| 02D9D3C4 | 40404040 | 40400038 | 40404040 | 00010001 | 0C000294 | 00010001 |
| 0C000298 | 00010001 | 0C00029C | 00010001 | 0C0002A0 | 00010001 | 0C0002A4 |
| 00010001 | 0C0002A8 | 00010001 | 0C0002AC | C6D4C5D9 | F0F0F6F9* | |
| 02E3E7E3 | 400002B4 | 40400004 | 40400001 | 800002B8 | 40404040 | 40404040 |
| 40404040 | 40404040 | 40404040 | 40404040 | 40404040 | 40404040 | 40404040 |
| 40404040 | 40404040 | 40404040 | 40404040 | C6D4C5D9 | F0F0F7F0** | |
| 02E3E7E3 | 40000408 | 40400014 | 40400001 | 00000000 | 00000000 | 0000003D |
| 00000000 | 00000000 | 40404040 | 40404040 | 40404040 | 40404040 | 40404040 |
| 40404040 | 40404040 | 40404040 | 40404040 | C6D4C5D9 | F0F0F7F1* | |
| 02D9D3C4 | 40404040 | 40400010 | 40404040 | 00010001 | 0C0002B0 | 00010001 |
| 0C0002B4 | 40404040 | 40404040 | 40404040 | 40404040 | 40404040 | 40404040 |
| 40404040 | 40404040 | 40404040 | 40404040 | C6D4C5D9 | F0F0F7F2* | |
| 02C5D5C4 | 40404040 | 40404040 | 40404040 | 40404040 | 40404040 | 40404040 |
| 0000063A | F1F5F7F3 | F460C6D6 | F34040F0 | F2F0F2F8 | F7F0F9F8 | 40F0F84B |
| F1F54BF2 | F6404040 | C6D4C5D9 | D9404040 | C6D4C5D9 | F0F0F7F3** | |

MEMBER NAME FMTINT

| | | | | | | |
|---|---|---|---|---|---|---|
| 02C5E2C4 | 40404040 | 40400010 | 40400001 | C6D4E3C9 | D5E34040 | 00000000 |
| 40000000 | 40404040 | 40404040 | 40404040 | 40404040 | 40404040 | 40404040 |
| 40404040 | 40404040 | 40404040 | 40404040 | C6D4E3C9 | F0F0F0F1* | |
| 02E3E7E3 | 40000000 | 40400028 | 40400001 | 47F0F00C | 07C6D4E3 | C9D5E340 |
| 90ECD00C | 184D98CD | F0205040 | D00450D0 | 400807FC | 40404040 | 40404040 |
| 40404040 | 40404040 | 40404040 | 40404040 | C6D4E3C9 | F0F0F0F2* | |
| 02C5E2C4 | 40404040 | 40400010 | 40400002 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | C6D4E3C9 | F0F0F0F3* | |
| 02E3E7E3 | 40000080 | 40400014 | 40400001 | 00000001 | 00000004 | 00000063 |
| 00000000 | 00000000 | 40404040 | 40404040 | 40404040 | 40404040 | 40404040 |
| 40404040 | 40404040 | 40404040 | 40404040 | C6D4E3C9 | F0F0F0F4* | |
| 02E3E7E3 | 400000B0 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | C6D4E3C9 | F0F0F0F5* | |
| 02E3E7E3 | 4000009C | 40400004 | 40400001 | E7E7E7E7 | 40404040 | 40404040 |
| 40404040 | 40404040 | 40404040 | 40404040 | 40404040 | 40404040 | 40404040 |
| 40404040 | 40404040 | 40404040 | 40404040 | C6D4E3C9 | F0F0F0F6* | |
| 02E3E7E3 | 400000BC | 40400038 | 40400001 | 58B0D08C | 58A0D060 | 4100B004 |
| 5000D050 | 58F0D088 | 4110D04C | 05EF130A | 5000D070 | 130A4000 | D06E130A |
| 4000D06C | 1BFF58E0 | D00007FE | 58A0D004 | C6D4E3C9 | F0F0F0F7* | |
| 02E3E7E3 | 400000F4 | 40400038 | 40400001 | 58E0A00C | 58B0A018 | 5810B004 |
| 5820D070 | 50201000 | 5830B008 | 4840D06E | 40403000 | 5850B00C | 4860D06C |
| 40605000 | 18DA92FF | A00C982C | A01C07FE | C6D4E3C9 | F0F0F0F8* | |
| 02E3E7E3 | 4000012C | 40400036 | 40400001 | 98791004 | 58207000 | 5020D070 |
| 48208000 | 4020D06E | 48209000 | 4020D06C | 58201000 | 41302000 | 41500004 |
| 1B255020 | D08C5030 | D09047F0 | D0944040 | C6D4E3C9 | F0F0F0F9* | |
| 02E3E7E3 | 40000020 | 4040000C | 40400001 | 0000012C | 00000028 | 000000F0 |
| 40404040 | 40404040 | 40404040 | 40404040 | 40404040 | 40404040 | 40404040 |
| 40404040 | 40404040 | 40404040 | 40404040 | C6D4E3C9 | F0F0F1F0** | |
| 02E3E7E3 | 40000074 | 40400004 | 40400001 | 00000084 | 40404040 | 40404040 |
| 40404040 | 40404040 | 40404040 | 40404040 | 40404040 | 40404040 | 40404040 |
| 40404040 | 40404040 | 40404040 | 40404040 | C6D4E3C9 | F0F0F1F1* | |
| 02E3E7E3 | 4000007C | 40400004 | 40400001 | 8000009C | 40404040 | 40404040 |
| 40404040 | 40404040 | 40404040 | 40404040 | 40404040 | 40404040 | 40404040 |
| 40404040 | 40404040 | 40404040 | 40404040 | C6D4E3C9 | F0F0F1F2* | |
| 02D9D3C4 | 40404040 | 40400030 | 40404040 | 00020001 | 1C0000B0 | 00010001 |
| 0C000020 | 00010001 | 0C000024 | 00010001 | 0C000028 | 00010001 | 0C000074 |

```
00010001  0C00007C  40404040  40404040  C6D4E3C9  F0F0F1F3*
02C5D5C4  40404040  40404040  40404040  40404040  40404040  40404040
00000162  F1F5F7F3  F460C6D6  F34040F0  F2F0F2F8  F7F0F9F8  40F0F84B
F1F54BF3  F0404040  C6D4E3C9  D5E34040  C6D4E3C9  F0F0F1F4**

MEMBER NAME  FMTVER
02C5E2C4  40404040  40400010  40400001  C6D4E3E5  C5D94040  00000000
40000000  40404040  40404040  40404040  40404040  40404040  40404040
40404040  40404040  40404040  40404040  C6D4E3E5  F0F0F0F1*
02E3E7E3  40000000  40400038  40400001  47F0F00C  07C6D4E3  E5C5D940
90ECD00C  184D98CD  F0205040  D00450D0  400807FC  40404040  40404040
021A1940  E2C5D87B  40D5D6E3  40C6D6E4  C6D4E3E5  F0F0F0F2*
02E3E7E3  40000038  40400038  40400001  D5C440C6  D6D940C4  C1E2C840
10031A07  40C6D6D9  D4C1E322  021A18E2  C5D87B40  D5D6E340  C6D6E4D5
C440C6D6  D940C4C1  E2C84010  031A0740  C6D4E3E5  F0F0F0F3*
02E3E7E3  40000070  40400038  40400001  C6D6D9D4  C1E3183C  2202063C
14012202  1A1840D7  C77B40D5  D6E340C6  D6E4D5C4  40C6D6D9  40C4C1E2
C8401003  1A0740C6  D6D9D4C1  E322021A  C6D4E3E5  F0F0F0F4*
02E3E7E3  400000A8  40400038  40400001  17D7C77B  40D5D6E3  40C6D6E4
D5C440C6  D6D940C4  C1E2C840  10031A07  40C6D6D9  D4C1E318  3C22021A
1C40E2C8  C5C5E340  7B40D5D6  E340C6D6  C6D4E3E5  F0F0F0F5*
02E3E7E3  400000E0  40400038  40400001  E4D5C440  C6D6D940  C4C1E2C8
4010031A  0740C6D6  D9D4C1E3  22021A1B  E2C8C5C5  E3407B40  D5D6E340
C6D6E4D5  C440C6D6  D940C4C1  E2C84010  C6D4E3E5  F0F0F0F6*
02E3E7E3  40000118  40400038  40400001  031A0740  C6D6D9D4  C1E3183C
22021A18  40D9C5E5  40D5D6E3  40C6D6E4  D5C440C6  D6D940C4  C1E2C840
10031A07  40C6D6D9  D4C1E322  021A17D9  C6D4E3E5  F0F0F0F7*
02E3E7E3  40000150  40400038  40400001  C5E540D5  D6E340C6  D6E4D5C4
40C6D6D9  40C4C1E2  C8401003  1A0740C6  D6D9D4C1  E3183C22  021A2E40
C5D9D9D6  D97A40C9  D540C2C3  E2D3C9C2  C6D4E3E5  F0F0F0F8*
02E3E7E3  40000188  4040001E  40400001  40D9D6E4  E3C9D5C5  40C9D540
C6D4E3E5  C5D940E2  E4C2D9D6  E4E3C9D5  C5224040  40404040  40404040
40404040  40404040  40404040  40404040  C6D4E3E5  F0F0F0F9*
02E3E7E3  400001A8  40400008  40400001  E7E7E7E7  40404040  40404040
40404040  40404040  40404040  40404040  40404040  40404040  40404040
40404040  40404040  40404040  40404040  C6D4E3E5  F0F0F1F0**
02C5E2C4  40404040  40400010  40400002  C6D4E3C5  D9D94040  05000000
40002D58  40404040  40404040  40404040  40404040  40404040  40404040
40404040  40404040  40404040  40404040  C6D4E3E5  F0F0F1F1*
02E3E7E3  40000220  40400024  40400001  00000000  00000001  00000004
00000032  0000003C  00000063  000000A0  00000000  00000000  40404040
40404040  40404040  40404040  40404040  C6D4E3E5  F0F0F1F2*
02C5E2C4  40404040  40400010  40400003  C9C2C3D6  D47B4040  02000000
40000000  40404040  40404040  40404040  40404040  40404040  40404040
40404040  40404040  40404040  40404040  C6D4E3E5  F0F0F1F3*
02E3E7E3  40000268  4040000C  40400001  FFFFFFC3  00002551  00000000
40404040  40404040  40404040  40404040  40404040  40404040  40404040
40404040  40404040  40404040  40404040  C6D4E3E5  F0F0F1F4*
02C5E2C4  40404040  40400010  40400004  D2D6D4D7  D9E54040  02000000
40000000  40404040  40404040  40404040  40404040  40404040  40404040
40404040  40404040  40404040  40404040  C6D4E3E5  F0F0F1F5*
02E3E7E3  40000278  40400008  40400001  00000000  00000000  40404040
40404040  40404040  40404040  40404040  40404040  40404040  40404040
40404040  40404040  40404040  40404040  C6D4E3E5  F0F0F1F6*
02E3E7E3  40000284  40400038  40400001  5860D0C0  58A0D0B8  58B0D0BC
5880D080  5870D088  41006004  5000D054  58F0D0CC  4110D054  05EF41E0
000415FE  4720D10A  58EFD04C  07FE5800  C6D4E3E5  F0F0F1F7*
02E3E7E3  400002BC  40400038  40400001  D0A81200  4770D18A  5850B02F
5A50D074  5050B02F  19574730  D31658F0  D0C81800  45E0F004  00000006
```

```
00000028  45E0F008  0450D09C  45E0F010  C6D4E3E5  F0F0F1F8*
02E3E7E3  400002F4  40400038  40400001  58F0D0C8  45E0F004  00000000
00000050  45E0F008  0450D09C  45E0F010  58F0D0C8  45E0F000  00000000
00000079  1C4845E0  F1340001  00000125  C6D4E3E5  F0F0F1F9*
02E3E7E3  4000032C  40400038  40400001  A0010100  003C0000  000145E0

MEMBER NAME  FMTVER
F0105890  D0841399  5990D0A0  4770D20E  5850B02F  5A50D074  5050B02F
19574730  D31658F0  D0C81800  45E0F004  C6D4E3E5  F0F0F2F0**
02E3E7E3  40000364  40400008  40400001  00000006  0000007F  40404040
40404040  40404040  40404040  40404040  40404040  40404040  40404040
40404040  40404040  40404040  40404040  C6D4E3E5  F0F0F2F1*
02D9D3C4  40404040  40400038  40404040  00020001  0C000268  00020001
0C00026C  00030001  1C000278  00040001  1C00027C  00010001  0C0002E4
00010001  0C000300  00010001  0C00031C  C6D4E3E5  F0F0F2F2*
02E3E7E3  4000036C  40400038  40400001  45E0F008  0450D09C  45E0F010
58F0D0C8  45E0F004  00000000  000000A6  45E0F008  0450D09C  45E0F010
58F0D0C8  45E0F000  00000000  00000079  C6D4E3E5  F0F0F2F3*
02E3E7E3  400003A4  40400038  40400001  1C4845E0  F1340001  00000125
A0010100  003C0000  000145E0  F0104990  D0964770  D28A5850  B02F5A50
D0745050  B02F1957  4730D316  58F0D0C8  C6D4E3E5  F0F0F2F4*
02E3E7E3  400003DC  40400038  40400001  45E0F004  00000000  000000CE
45E0F008  0450D09C  45E0F010  58F0D0C8  45E0F004  00000000  000000F9
45E0F008  0450D09C  45E0F010  58F0D0C8  C6D4E3E5  F0F0F2F5*
02E3E7E3  40000414  40400038  40400001  45E0F000  00000000  00000079
1C4845E0  F1340001  00000125  A0010100  003C0000  000145E0  F0104990
D0944780  D29A1BFF  58E0D000  07FE5850  C6D4E3E5  F0F0F2F6*
02E3E7E3  4000044C  40400038  40400001  B02F5A50  D0745050  B02F1957
4730D316  58F0D0C8  45E0F004  00000000  00000125  45E0F008  0450D09C
45E0F010  58F0D0C8  45E0F004  00000000  C6D4E3E5  F0F0F2F7*
02E3E7E3  40000484  40400004  40400001  0000014C  40404040  40404040
40404040  40404040  40404040  40404040  40404040  40404040  40404040
40404040  40404040  40404040  40404040  C6D4E3E5  F0F0F2F8*
02D9D3C4  40404040  40400038  40404040  00010001  0C000368  00010001
0C000384  00010001  0C0003A0  00010001  0C0003E4  00010001  0C000400
00010001  0C00041C  00010001  0C000468  C6D4E3E5  F0F0F2F9*
02E3E7E3  40000488  40400038  40400001  45E0F008  0450D09C  45E0F010
58F0D0C8  45E0F000  00000000  00000079  1C4845E0  F1340001  00000125
A0010100  003C0000  000145E0  F0101BFF  C6D4E3E5  F0F0F3F0**
02E3E7E3  400004C0  40400038  40400001  58E0D000  07FE1BFF  58E0D000
07FE58F0  D0C81800  45E0F004  00000006  00000174  45E0F010  1BFF58E0
D00007FE  58D0D004  58E0D00C  92FFD00C  C6D4E3E5  F0F0F3F1*
02E3E7E3  400004F8  40400038  40400001  982CD01C  07FE987A  10045820
70005020  D0A04820  80004020  D0964820  90004020  D0945820  A0005020
D09C5820  10004130  20004150  00041B25  C6D4E3E5  F0F0F3F2*
02E3E7E3  40000530  4040000C  40400001  5020D0C0  5030D0C4  47F0D0D4
40404040  40404040  40404040  40404040  40404040  40404040  40404040
40404040  40404040  40404040  40404040  C6D4E3E5  F0F0F3F3*
02E3E7E3  40000020  40400008  40400001  000004FE  000001B0  40404040
40404040  40404040  40404040  40404040  40404040  40404040  40404040
40404040  40404040  40404040  40404040  C6D4E3E5  F0F0F3F4*
02E3E7E3  400001B0  40400004  40400001  000004EC  40404040  40404040
40404040  40404040  40404040  40404040  40404040  40404040  40404040
40404040  40404040  40404040  40404040  C6D4E3E5  F0F0F3F5*
02E3E7E3  400001FC  40400008  40400001  000002BA  000004CE  40404040
40404040  40404040  40404040  40404040  40404040  40404040  40404040
40404040  40404040  40404040  40404040  C6D4E3E5  F0F0F3F6*
02D9D3C4  40404040  40400038  40404040  00010001  0C000484  00010001
0C0004A0  00010001  0C0004DC  00010001  0C000020  00010001  0C000024
```

```
00010001  0C0001B0  00010001  0C0001FC  C6D4E3E5  F0F0F3F7*
02E3E7E3  40000208  40400014  40400001  00000224  000001A8  00000228
00000224  80000258  40404040  40404040  40404040  40404040  40404040
40404040  40404040  40404040  40404040  C6D4E3E5  F0F0F3F8*
02E3E7E3  40000280  40400004  40400001  00000000  40404040  40404040
40404040  40404040  40404040  40404040  40404040  40404040  40404040

MEMBER NAME  FMTVER
40404040  40404040  40404040  40404040  C6D4E3E5  F0F0F3F9*
02D9D3C4  40404040  40400030  40404040  00010001  0C000200  00010001
0C000208  00010001  0C00020C  00010001  0C000210  00010001  0C000214
00010001  0C000218  40404040  40404040  C6D4E3E5  F0F0F4F0**
02C5D5C4  40404040  40404040  40404040  40404040  40404040  40404040
0000053C  F1F5F7F3  F460C6D6  F34040F0  F2F0F2F8  F7F0F9F8  40F0F84B
F1F54BF3  F4404040  C6D4E3E5  C5D94040  C6D4E3E5  F0F0F4F1**

MEMBER NAME  FMWRN
02C5E2C4  40404040  40400010  40400001  C6D4E6D9  D5404040  00000000
40000000  40404040  40404040  40404040  40404040  40404040  40404040
40404040  40404040  40404040  40404040  C6D4E6D9  F0F0F0F1*
02E3E7E3  40000000  40400038  40400001  47F0F00C  07C6D4E6  D9D54040
90ECD00C  184D98CD  F0205040  D00450D0  400807FC  40404040  40404040
021A1C40  C5D9D9D6  D940C9D5  40C6D4E6  C6D4E6D9  F0F0F0F2*
02E3E7E3  40000038  40400038  40400001  D9D5404D  E2E4D7C5  D940E3C5
E7E35D22  C6D6D9D4  C1E340C3  C8C1D9E3  40E6C1D9  D5C9D5C7  E2404040
C6D6D9D4  C1E340E6  C1D9D5C9  D5C740D4  C6D4E6D9  F0F0F0F3*
02E3E7E3  40000070  40400020  40400001  C5E2E2C1  C7C5E240  C6D6D9D4
C1E340C3  C8C1D9E3  40E6C1D9  D5C9D5C7  E2404040  40404040  40404040
40404040  40404040  40404040  40404040  C6D4E6D9  F0F0F0F4*
02E3E7E3  400002B8  40400038  40400001  00000000  00000001  00000003
00000004  00000015  00000017  00000032  00000049  00000078  401DF3B6
4029FBE7  403EF9DB  40800000  41200000  C6D4E6D9  F0F0F0F5*
02C5E2C4  40404040  40400010  40400002  D9D4D6C4  C5D34040  05000000
40000018  40404040  40404040  40404040  40404040  40404040  40404040
40404040  40404040  40404040  40404040  C6D4E6D9  F0F0F0F6*
02E3E7E3  400002F0  40400030  40400001  41280000  412C0000  41300000
41400000  41473333  41480000  4154353F  415C353F  415E6666  42110000
00000000  00000000  40404040  40404040  C6D4E6D9  F0F0F0F7*
02C5E2C4  40404040  40400010  40400003  D4E5C3C8  D9404040  02000000
40000000  40404040  40404040  40404040  40404040  40404040  40404040
40404040  40404040  40404040  40404040  C6D4E6D9  F0F0F0F8*
02E3E7E3  400003D8  40400008  40400001  FFFFFFFF  00000000  40404040
40404040  40404040  40404040  40404040  40404040  40404040  40404040
40404040  40404040  40404040  40404040  C6D4E6D9  F0F0F0F9*
02C5E2C4  40404040  40400010  40400004  C3C1C4D3  D5F14040  02000000
40000000  40404040  40404040  40404040  40404040  40404040  40404040
40404040  40404040  40404040  40404040  C6D4E6D9  F0F0F1F0**
02C5E2C4  40404040  40400010  40400005  C3C1C4E2  E4D74040  02000000
40000000  40404040  40404040  40404040  40404040  40404040  40404040
40404040  40404040  40404040  40404040  C6D4E6D9  F0F0F1F1*
02C5E2C4  40404040  40400010  40400006  C8C7C4C1  E3C54040  02000000
40000000  40404040  40404040  40404040  40404040  40404040  40404040
40404040  40404040  40404040  40404040  C6D4E6D9  F0F0F1F2*
02C5E2C4  40404040  40400010  40400007  C8C7E3C9  D4C54040  02000000
40000000  40404040  40404040  40404040  40404040  40404040  40404040
40404040  40404040  40404040  40404040  C6D4E6D9  F0F0F1F3*
02C5E2C4  40404040  40400010  40400008  C9C2C3D6  D47B4040  02000000
40000000  40404040  40404040  40404040  40404040  40404040  40404040
40404040  40404040  40404040  40404040  C6D4E6D9  F0F0F1F4*
```

| | | | | | | |
|---|---|---|---|---|---|---|
| 02C5E2C4 | 40404040 | 40400010 | 40400009 | C9C3D5E3 | C5D94040 | 02000000 |
| 40000000 | 40404040 | 40404040 | 40404040 | 40404040 | 40404040 | 40404040 |
| 40404040 | 40404040 | 40404040 | 40404040 | C6D4E6D9 | F0F0F1F5* | |
| 02E3E7E3 | 400003E4 | 4040001C | 40400001 | 00000000 | 00000000 | 00000000 |
| 00000000 | 00000000 | 00000000 | 00000000 | 40404040 | 40404040 | 40404040 |
| 40404040 | 40404040 | 40404040 | 40404040 | C6D4E6D9 | F0F0F1F6* | |
| 02D9D3C4 | 40404040 | 40400038 | 40404040 | 00020001 | 0C0003D8 | 00030001 |
| 1C0003E4 | 00040001 | 1C0003E8 | 00050001 | 1C0003EC | 00060001 | 1C0003F0 |
| 00070001 | 1C0003F4 | 00080001 | 1C0003F8 | C6D4E6D9 | F0F0F1F7* | |
| 02E3E7E3 | 40000358 | 40400038 | 40400001 | C3D6D7E8 | D9C9C7C8 | E3404DC3 |
| 5D40F1F9 | F8F640E3 | C8C540C2 | D6C5C9D5 | C740C3D6 | D4D7C1D5 | E85BC1D3 |
| D340D9C9 | C7C8E3E2 | 40D9C5E2 | C5D9E5C5 | C6D4E6D9 | F0F0F1F8* | |
| 02E3E7E3 | 40000390 | 40400038 | 40400001 | C45B5BE2 | D3C9C340 | E5C5D9E2 |
| C9D6D540 | E7E74BE7 | 40404040 | 40404040 | 4040C4C1 | E3C57A40 | E7E761E7 |
| E761E7E7 | 40404040 | 4040E3C9 | D4C57A40 | C6D4E6D9 | F0F0F1F9* | |
| 02E3E7E3 | 400003C8 | 40400008 | 40400001 | E7E77AE7 | E77AE7E7 | 40404040 |

MEMBER NAME FMWRN

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | C6D4E6D9 | F0F0F2F0** | |
| 02E3E7E3 | 40000414 | 40400038 | 40400001 | 5880D348 | 58B0D34C | 5870D378 |
| 4100D310 | 5000D078 | 58F0D354 | 4110D074 | 05EF58F0 | D3644110 | D08005EF |
| 58F0D360 | 4110D084 | 05EF7800 | D2783300 | C6D4E6D9 | F0F0F2F1* | |
| 02E3E7E3 | 4000044C | 40400038 | 40400001 | 7000D2B8 | 7800D280 | 33007000 |
| D2947800 | D2703300 | 7000D29C | 7800D268 | 33007000 | D2A07800 | D2807000 |
| D2987800 | D2647000 | D2A47800 | D2747000 | C6D4E6D9 | F0F0F2F2* | |
| 02E3E7E3 | 40000484 | 40400038 | 40400001 | D2AC58F0 | D35C4110 | D08805EF |
| 41E00004 | 15FE4720 | D41058EF | D04C07FE | 7800D268 | 7000D2AC | 7800D26C |
| 33007000 | D37C58F0 | D35C4110 | D0D005EF | C6D4E6D9 | F0F0F2F3* | |
| 02E3E7E3 | 400004BC | 40400038 | 40400001 | 41E00004 | 15FE4720 | D43C58EF |
| D05407FE | 7800D260 | 7000D2AC | 58F0D35C | 4110D118 | 05EF41E0 | 000415FE |
| 4720D45E | 58EFD05C | 07FE7800 | D2A47000 | C6D4E6D9 | F0F0F2F4* | |
| 02E3E7E3 | 400004F4 | 40400038 | 40400001 | D2A858F0 | D3584110 | D16005EF |
| 7800D2A8 | 7B00D258 | 7000D2A8 | 58F0D358 | 4110D160 | 05EF7800 | D25C7000 |
| D2AC5800 | D2BC1200 | 4780D508 | 5890D22C | C6D4E6D9 | F0F0F2F5* | |
| 02E3E7E3 | 4000052C | 40400038 | 40400001 | 18A7410A | B0005000 | D17058F0 |
| D36C4110 | D17005EF | 5000D2B4 | 410AB000 | 5000D190 | 58F0D35C | 4110D178 |
| 05EF41E0 | 000415FE | 4720D4D6 | 58EFD064 | C6D4E6D9 | F0F0F2F6* | |
| 02E3E7E3 | 40000564 | 40400038 | 40400001 | 07FE7800 | D2AC7B00 | D2587000 |
| D2AC7800 | D2A87B00 | D2587000 | D2A858F0 | D3584110 | D16005EF | 5A90D22C |
| 5AA0D240 | 5990D2BC | 47C0D49E | 58F0D358 | C6D4E6D9 | F0F0F2F7* | |
| 02E3E7E3 | 4000059C | 40400038 | 40400001 | 4110D1C0 | 05EF58F0 | D3584110 |
| D1D005EF | 7800D284 | 33007000 | D37C58F0 | D35C4110 | D1E005EF | 41E00004 |
| 15FE4720 | D54058EF | D06C07FE | 1BFF58E0 | C6D4E6D9 | F0F0F2F8* | |
| 02E3E7E3 | 400005D4 | 40400038 | 40400001 | D00007FE | 58F0D368 | 45E0F004 |
| 00000006 | 00000028 | 45E0F010 | 1BFF58E0 | D00007FE | 58D0D004 | 58E0D00C |
| 92FFD00C | 982CD01C | 07FE5870 | 10045820 | C6D4E6D9 | F0F0F2F9* | |
| 02E3E7E3 | 4000060C | 40400026 | 40400001 | 70005020 | D2BC5820 | 10004130 |
| 20004150 | 00011B25 | 5C40D240 | 1B255020 | D34C5030 | D35047F0 | D3844040 |
| 40404040 | 40404040 | 40404040 | 40404040 | C6D4E6D9 | F0F0F3F0** | |
| 02E3E7E3 | 40000020 | 40400008 | 40400001 | 00000606 | 00000090 | 40404040 |
| 40404040 | 40404040 | 40404040 | 40404040 | 40404040 | 40404040 | 40404040 |
| 40404040 | 40404040 | 40404040 | 40404040 | C6D4E6D9 | F0F0F3F1* | |
| 02E3E7E3 | 40000090 | 40400004 | 40400001 | 000005F4 | 40404040 | 40404040 |
| 40404040 | 40404040 | 40404040 | 40404040 | 40404040 | 40404040 | 40404040 |
| 40404040 | 40404040 | 40404040 | 40404040 | C6D4E6D9 | F0F0F3F2* | |
| 02E3E7E3 | 400000DC | 4040000C | 40400001 | 000004A0 | 000005D8 | 000004CC |
| 40404040 | 40404040 | 40404040 | 40404040 | 40404040 | 40404040 | 40404040 |
| 40404040 | 40404040 | 40404040 | 40404040 | C6D4E6D9 | F0F0F3F3* | |

| | | | | | | |
|---|---|---|---|---|---|---|
| 02D9D3C4 | 40404040 | 40400038 | 40404040 | 00090001 | 1C0003FC | 00010001 |
| 0C0005E4 | 00010001 | 0C000020 | 00010001 | 0C000024 | 00010001 | 0C000090 |
| 00010001 | 0C0000DC | 00010001 | 0C0000E0 | C6D4E6D9 | F0F0F3F4* | |
| 02E3E7E3 | 400000E8 | 4040001C | 40400001 | 000005D8 | 000004EE | 000005D8 |
| 00000566 | 000005D8 | 000005D0 | 000005D8 | 40404040 | 40404040 | 40404040 |
| 40404040 | 40404040 | 40404040 | 40404040 | C6D4E6D9 | F0F0F3F5* | |
| 02D9D3C4 | 40404040 | 40400038 | 40404040 | 00010001 | 0C0000E4 | 00010001 |
| 0C0000E8 | 00010001 | 0C0000EC | 00010001 | 0C0000F0 | 00010001 | 0C0000F4 |
| 00010001 | 0C0000F8 | 00010001 | 0C0000FC | C6D4E6D9 | F0F0F3F6* | |
| 02E3E7E3 | 40000104 | 40400004 | 40400001 | 000002C4 | 40404040 | 40404040 |
| 40404040 | 40404040 | 40404040 | 40404040 | 40404040 | 40404040 | 40404040 |
| 40404040 | 40404040 | 40404040 | 40404040 | C6D4E6D9 | F0F0F3F7* | |
| 02E3E7E3 | 4000010C | 40400018 | 40400001 | 80000014 | 800003C8 | 800003B4 |
| 00000348 | 0000033C | 000002B8 | 40404040 | 40404040 | 40404040 | 40404040 |
| 40404040 | 40404040 | 40404040 | 40404040 | C6D4E6D9 | F0F0F3F8* | |
| 02D9D3C4 | 40404040 | 40400038 | 40404040 | 00010001 | 0C000100 | 00010001 |
| 0C000104 | 00020001 | 0C00010C | 00010001 | 0C000110 | 00010001 | 0C000114 |

MEMBER NAME FMWRN

| | | | | | | |
|---|---|---|---|---|---|---|
| 00010001 | 0C000118 | 00010001 | 0C00011C | C6D4E6D9 | F0F0F3F9* | |
| 02E3E7E3 | 40000124 | 4040001C | 40400001 | 000002D8 | 000002E0 | 000002DC |
| 00000358 | 000002B8 | 000002B8 | 000002B8 | 40404040 | 40404040 | 40404040 |
| 40404040 | 40404040 | 40404040 | 40404040 | C6D4E6D9 | F0F0F4F0** | |
| 02D9D3C4 | 40404040 | 40400038 | 40404040 | 00010001 | 0C000120 | 00010001 |
| 0C000124 | 00010001 | 0C000128 | 00010001 | 0C00012C | 00010001 | 0C000130 |
| 00010001 | 0C000134 | 00010001 | 0C000138 | C6D4E6D9 | F0F0F4F1* | |
| 02E3E7E3 | 40000140 | 4040001C | 40400001 | 000002B8 | 000002BC | 000002C0 |
| 000002B8 | 000002B8 | 000002E0 | 000002E4 | 40404040 | 40404040 | 40404040 |
| 40404040 | 40404040 | 40404040 | 40404040 | C6D4E6D9 | F0F0F4F2* | |
| 02D9D3C4 | 40404040 | 40400038 | 40404040 | 00010001 | 0C00013C | 00010001 |
| 0C000140 | 00010001 | 0C000144 | 00010001 | 0C000148 | 00010001 | 0C00014C |
| 00010001 | 0C000150 | 00010001 | 0C000154 | C6D4E6D9 | F0F0F4F3* | |
| 02E3E7E3 | 4000015C | 4040001C | 40400001 | 800002B8 | 0000040C | 0000033C |
| 000002B8 | 000002C8 | 000002E0 | 000002DC | 40404040 | 40404040 | 40404040 |
| 40404040 | 40404040 | 40404040 | 40404040 | C6D4E6D9 | F0F0F4F4* | |
| 02D9D3C4 | 40404040 | 40400038 | 40404040 | 00010001 | 0C000158 | 00010001 |
| 0C00015C | 00010001 | 0C000160 | 00010001 | 0C000164 | 00010001 | 0C000168 |
| 00010001 | 0C00016C | 00010001 | 0C000170 | C6D4E6D9 | F0F0F4F5* | |
| 02E3E7E3 | 40000178 | 4040001C | 40400001 | 00000078 | 000002B8 | 000002B8 |
| 000002B8 | 000002B8 | 000002BC | 000002C0 | 40404040 | 40404040 | 40404040 |
| 40404040 | 40404040 | 40404040 | 40404040 | C6D4E6D9 | F0F0F4F6* | |
| 02D9D3C4 | 40404040 | 40400038 | 40404040 | 00010001 | 0C000174 | 00010001 |
| 0C000178 | 00010001 | 0C00017C | 00010001 | 0C000180 | 00010001 | 0C000184 |
| 00010001 | 0C000188 | 00010001 | 0C00018C | C6D4E6D9 | F0F0F4F7* | |
| 02E3E7E3 | 40000194 | 4040001C | 40400001 | 000002B8 | 000002B8 | 000002E0 |
| 000002E4 | 800002B8 | 00000348 | 0000033C | 40404040 | 40404040 | 40404040 |
| 40404040 | 40404040 | 40404040 | 40404040 | C6D4E6D9 | F0F0F4F8* | |
| 02D9D3C4 | 40404040 | 40400038 | 40404040 | 00010001 | 0C000190 | 00010001 |
| 0C000194 | 00010001 | 0C000198 | 00010001 | 0C00019C | 00010001 | 0C0001A0 |
| 00010001 | 0C0001A4 | 00010001 | 0C0001A8 | C6D4E6D9 | F0F0F4F9* | |
| 02E3E7E3 | 400001B0 | 4040001C | 40400001 | 000002B8 | 000002CC | 000002E0 |
| 000002DC | 00000060 | 000002B8 | 000002B8 | 40404040 | 40404040 | 40404040 |
| 40404040 | 40404040 | 40404040 | 40404040 | C6D4E6D9 | F0F0F5F0** | |
| 02D9D3C4 | 40404040 | 40400038 | 40404040 | 00010001 | 0C0001AC | 00010001 |
| 0C0001B0 | 00010001 | 0C0001B4 | 00010001 | 0C0001B8 | 00010001 | 0C0001BC |
| 00010001 | 0C0001C0 | 00010001 | 0C0001C4 | C6D4E6D9 | F0F0F5F1* | |
| 02E3E7E3 | 400001CC | 4040001C | 40400001 | 000002B8 | 000002B8 | 000002BC |
| 000002C0 | 000002B8 | 000002B8 | 000002E0 | 40404040 | 40404040 | 40404040 |
| 40404040 | 40404040 | 40404040 | 40404040 | C6D4E6D9 | F0F0F5F2* | |

```
02D9D3C4  40404040  40400038  40404040  00010001  0C0001C8  00010001
0C0001CC  00010001  0C0001D0  00010001  0C0001D4  00010001  0C0001D8
00010001  0C0001DC  00010001  0C0001E0  C6D4E6D9  F0F0F5F3*
02E3E7E3  400001E8  40400018  40400001  000002E4  800002B8  00000324
00000338  00000328  80000338  40404040  40404040  40404040  40404040
40404040  40404040  40404040  40404040  C6D4E6D9  F0F0F5F4*
02E3E7E3  40000204  40400004  40400001  800002D0  40404040  40404040
40404040  40404040  40404040  40404040  40404040  40404040  40404040
40404040  40404040  40404040  40404040  C6D4E6D9  F0F0F5F5*
02D9D3C4  40404040  40400038  40404040  00010001  0C0001E4  00010001
0C0001E8  00010001  0C0001EC  00010001  0C0001F0  00010001  0C0001F4
00010001  0C0001F8  00010001  0C0001FC  C6D4E6D9  F0F0F5F6*
02E3E7E3  40000208  40400018  40400001  00000348  0000033C  000002B8
00000344  000002E0  000002DC  40404040  40404040  40404040  40404040
40404040  40404040  40404040  40404040  C6D4E6D9  F0F0F5F7*
02E3E7E3  40000224  40400004  40400001  000002B8  40404040  40404040
40404040  40404040  40404040  40404040  40404040  40404040  40404040
40404040  40404040  40404040  40404040  C6D4E6D9  F0F0F5F8*

MEMBER NAME  FMWRN
02D9D3C4  40404040  40400038  40404040  00010001  0C000204  00010001
0C000208  00010001  0C00020C  00010001  0C000210  00010001  0C000214
00010001  0C000218  00010001  0C00021C  C6D4E6D9  F0F0F5F9*
02E3E7E3  40000228  4040001C  40400001  000002B8  000002B8  000002B8
000002BC  000002C0  000002B8  000002B8  40404040  40404040  40404040
40404040  40404040  40404040  40404040  C6D4E6D9  F0F0F6F0**
02D9D3C4  40404040  40400038  40404040  00010001  0C000224  00010001
0C000228  00010001  0C00022C  00010001  0C000230  00010001  0C000234
00010001  0C000238  00010001  0C00023C  C6D4E6D9  F0F0F6F1*
02E3E7E3  40000244  4040001C  40400001  000002E0  000002E4  800002B8
00000324  00000334  00000324  80000338  40404040  40404040  40404040
40404040  40404040  40404040  40404040  C6D4E6D9  F0F0F6F2*
02D9D3C4  40404040  40400038  40404040  00010001  0C000240  00010001
0C000244  00010001  0C000248  00010001  0C00024C  00010001  0C000250
00010001  0C000254  00010001  0C000258  C6D4E6D9  F0F0F6F3*
02E3E7E3  40000260  4040001C  40400001  00000328  00000334  00000328
80000338  0000040C  000002EC  000002B8  40404040  40404040  40404040
40404040  40404040  40404040  40404040  C6D4E6D9  F0F0F6F4*
02D9D3C4  40404040  40400038  40404040  00010001  0C00025C  00010001
0C000260  00010001  0C000264  00010001  0C000268  00010001  0C00026C
00010001  0C000270  00010001  0C000274  C6D4E6D9  F0F0F6F5*
02E3E7E3  4000027C  4040001C  40400001  000002C8  000002E0  000002DC
00000048  000002B8  000002B8  000002B8  40404040  40404040  40404040
40404040  40404040  40404040  40404040  C6D4E6D9  F0F0F6F6*
02D9D3C4  40404040  40400038  40404040  00010001  0C000278  00010001
0C00027C  00010001  0C000280  00010001  0C000284  00010001  0C000288
00010001  0C00028C  00010001  0C000290  C6D4E6D9  F0F0F6F7*
02E3E7E3  40000298  4040001C  40400001  000002B8  000002BC  000002C0
000002B8  000002B8  000002E0  000002E4  40404040  40404040  40404040
40404040  40404040  40404040  40404040  C6D4E6D9  F0F0F6F8*
02D9D3C4  40404040  40400038  40404040  00010001  0C000294  00010001
0C000298  00010001  0C00029C  00010001  0C0002A0  00010001  0C0002A4
00010001  0C0002A8  00010001  0C0002AC  C6D4E6D9  F0F0F6F9*
02E3E7E3  400002B4  40400004  40400001  800002B8  40404040  40404040
40404040  40404040  40404040  40404040  40404040  40404040  40404040
40404040  40404040  40404040  40404040  C6D4E6D9  F0F0F7F0**
02E3E7E3  40000400  40400014  40400001  00000000  00000000  00000033
00000000  00000000  40404040  40404040  40404040  40404040  40404040
40404040  40404040  40404040  40404040  C6D4E6D9  F0F0F7F1*
```

```
02D9D3C4  40404040  40400010  40404040  00010001  0C0002B0  00010001
0C0002B4  40404040  40404040  40404040  40404040  40404040  40404040
40404040  40404040  40404040  40404040  C6D4E6D9  F0F0F7F2*
02C5D5C4  40404040  40404040  40404040  40404040  40404040  40404040
00000632  F1F5F7F3  F460C6D6  F34040F0  F2F0F2F8  F7F0F9F8  40F0F84B
F1F54BF3  F9404040  C6D4E6D9  D5404040  C6D4E6D9  F0F0F7F3**

MEMBER NAME  FPVAL
02C5E2C4  40404040  40400010  40400001  C6D7E5C1  D3404040  00000000
40000000  40404040  40404040  40404040  40404040  40404040  40404040
40404040  40404040  40404040  40404040  C6D7E5C1  F0F0F0F1*
02E3E7E3  40000000  40400038  40400001  47F0F00C  07C6D7E5  C1D34040
90ECD00C  184D98CD  F0205040  D00450D0  400807FC  40404040  40404040
021A23C5  D9D9D6D9  40C9D540  C2C3E2D3  C6D7E5C1  F0F0F0F2*
02E3E7E3  40000038  40400017  40400001  C9C240C9  D540C6D7  E5C1D340
E2E4C2D9  D6E4E3C9  D5C52240  40404040  40404040  40404040  40404040
40404040  40404040  40404040  40404040  C6D7E5C1  F0F0F0F3*
02E3E7E3  40000050  40400030  40400001  4E404040  40404040  4B404040
40404040  60404040  40404040  F9404040  40404040  F0404040  40404040
40404040  40404040  40404040  40404040  C6D7E5C1  F0F0F0F4*
02E3E7E3  400001A0  40400038  40400001  4E000000  00000000  4E000000
80000000  00000000  00000000  00000000  00000001  00000001  00000004
0000000A  00000014  0000003C  00000000  C6D7E5C1  F0F0F0F5*
02C5E2C4  40404040  40400010  40400002  C7C5E340  40404040  02000000
40000000  40404040  40404040  40404040  40404040  40404040  40404040
40404040  40404040  40404040  40404040  C6D7E5C1  F0F0F0F6*
02E3E7E3  400001D8  40400004  40400001  00000000  40404040  40404040
40404040  40404040  40404040  40404040  40404040  40404040  40404040
40404040  40404040  40404040  40404040  C6D7E5C1  F0F0F0F7*
02C5E2C4  40404040  40400010  40400003  C9E2D9C3  C8404040  02000000
40000000  40404040  40404040  40404040  40404040  40404040  40404040
40404040  40404040  40404040  40404040  C6D7E5C1  F0F0F0F8*
02C5E2C4  40404040  40400010  40400004  C6C9E7D7  C97B4040  02000000
40000000  40404040  40404040  40404040  40404040  40404040  40404040
40404040  40404040  40404040  40404040  C6D7E5C1  F0F0F0F9*
02C5E2C4  40404040  40400010  40400005  C9C2C3D6  D47B4040  02000000
40000000  40404040  40404040  40404040  40404040  40404040  40404040
40404040  40404040  40404040  40404040  C6D7E5C1  F0F0F1F0**
02C5E2C4  40404040  40400010  40400006  D2D6D4D7  D9E54040  02000000
40000000  40404040  40404040  40404040  40404040  40404040  40404040
40404040  40404040  40404040  40404040  C6D7E5C1  F0F0F1F1*
02E3E7E3  40000228  40400018  40400001  00000000  00000000  00000000
00000000  00000000  00000000  40404040  40404040  40404040  40404040
40404040  40404040  40404040  40404040  C6D7E5C1  F0F0F1F2*
02E3E7E3  40000208  40400004  40400001  000000F0  40404040  40404040
40404040  40404040  40404040  40404040  40404040  40404040  40404040
40404040  40404040  40404040  40404040  C6D7E5C1  F0F0F1F3*
02E3E7E3  40000244  40400038  40400001  58A0D1BC  5830D13C  5800D130
5000D168  5800D134  5000D16C  5000D170  5800D130  5000D178  5800D134
5000D174  5800D140  5000D160  5890D150  C6D7E5C1  F0F0F1F4*
02E3E7E3  4000027C  40400038  40400001  58B0D140  5990D160  4770D20C
47F0D418  58F0D1AC  4110D07C  05EF41E0  000415FE  4720D226  58EFD04C
07FE5800  D1645900  D1604780  D23647F0  C6D7E5C1  F0F0F1F5*
02E3E7E3  400002B4  40400038  40400001  D2445800  D1601A0B  5000D160
47F0D200  5800D160  5B00D140  5000D160  5860D168  5870D170  5880D16C
5890D174  58B0D178  5800D160  5A00D140  C6D7E5C1  F0F0F1F6*
02E3E7E3  400002EC  40400038  40400001  5000D160  58F0D1A8  4110D090
05EF58F0  D1B84110  D09C05EF  5080D16C  5090D174  50B0D178  41E00004
15FE4720  D2A058EF  D05407FE  58F0D1B8  C6D7E5C1  F0F0F1F7*
```

02E3E7E3 40000324 40400038 40400001 4110D0B4 05EF5080 D16C5090
D17450B0 D17841E0 000415FE 4720D2C6 58EFD05C 07FE5800 D18C1200
4750D2DA 5800D190 120047C0 D37A58F0 C6D7E5C1 F0F0F1F8*
02E3E7E3 4000035C 40400038 40400001 D1B84110 D0CC05EF 5080D16C
5090D174 50B0D178 41E00004 15FE4720 D30058EF D06407FE 5800D184
12004780 D3B858F0 D1B84110 D0E405EF C6D7E5C1 F0F0F1F9*
02E3E7E3 40000394 40400038 40400001 5080D16C 5090D174 50B0D178

MEMBER NAME FPVAL
41E00004 15FE4720 D33058EF D06C07FE 5800D184 12004780 D3BE58F0
D1B84110 D0FC05EF 5080D16C 5090D174 C6D7E5C1 F0F0F2F0**
02E3E7E3 400003CC 40400038 40400001 50B0D178 41E00004 15FE4720
D36058EF D07407FE 5800D184 12004780 D3B05080 D16C5090 D17450B0
D17847F0 D3C45800 D1345000 D1A01B22 C6D7E5C1 F0F0F2F1*
02E3E7E3 40000404 40400038 40400001 4320D15C 4220D1A3 18595C40
D1481825 5A20D1A0 18925B90 D1885A70 D1401BFF 876FD3AC 5A80D140
47F0D264 58B0D130 47F0D264 18B347F0 C6D7E5C1 F0F0F2F2*
02E3E7E3 4000043C 40400038 40400001 D2641863 47F0D264 5800D178
1BFF870F D3D85800 D1741300 5000D174 58F0D1B0 4110D114 05EF1800
5700D12C 5000D124 6840D120 6B40D128 C6D7E5C1 F0F0F2F3*
02E3E7E3 40000474 40400038 40400001 5800D174 5700D12C 5000D124
6820D120 6B20D128 38023D04 7000D17C 1BFF58E0 D00007FE 7800D138
7000D17C 1BFF58E0 D00007FE 58F0D1B4 C6D7E5C1 F0F0F2F4*
02E3E7E3 400004AC 40400038 40400001 45E0F004 00000006 00000028
45E0F010 58F0D1B4 45E0F034 05404040 F1F558A0 D00458E0 A00C58B0
A0185810 B0047820 D17C7020 100018DA C6D7E5C1 F0F0F2F5*
02E3E7E3 400004E4 40400038 40400001 92FFA00C 982CA01C 07FE5870
10047820 70007020 D17C5820 10004130 20004150 00011B25 5020D1BC
5030D1C0 5030D07C 5030D090 47F0D1C4 C6D7E5C1 F0F0F2F6*
02E3E7E3 40000020 40400008 40400001 000004EE 00000080 40404040
40404040 40404040 40404040 40404040 40404040 40404040 40404040
40404040 40404040 40404040 40404040 C6D7E5C1 F0F0F2F7*
02D9D3C4 40404040 40400038 40404040 00020001 1C000228 00030001
1C00022C 00040001 1C000230 00050001 1C000234 00060001 1C000238
00010001 0C0004B4 00010001 0C000020 C6D7E5C1 F0F0F2F8*
02E3E7E3 40000080 40400004 40400001 000004CA 40404040 40404040
40404040 40404040 40404040 40404040 40404040 40404040 40404040
40404040 40404040 40404040 40404040 C6D7E5C1 F0F0F2F9*
02E3E7E3 400000CC 40400018 40400001 000002A6 000004A8 00000320
000004A8 00000346 000004A8 40404040 40404040 40404040 40404040
40404040 40404040 40404040 40404040 C6D7E5C1 F0F0F3F0**
02D9D3C4 40404040 40400038 40404040 00010001 0C000024 00010001
0C000080 00010001 0C0000CC 00010001 0C0000D0 00010001 0C0000D4
00010001 0C0000D8 00010001 0C0000DC C6D7E5C1 F0F0F3F1*
02E3E7E3 400000E4 40400018 40400001 00000380 000004A8 000003B0
000004A8 000003E0 000004A8 40404040 40404040 40404040 40404040
40404040 40404040 40404040 40404040 C6D7E5C1 F0F0F3F2*
02E3E7E3 40000100 40400004 40400001 000001E0 40404040 40404040
40404040 40404040 40404040 40404040 40404040 40404040 40404040
40404040 40404040 40404040 40404040 C6D7E5C1 F0F0F3F3*
02D9D3C4 40404040 40400038 40404040 00010001 0C0000E0 00010001
0C0000E4 00010001 0C0000E8 00010001 0C0000EC 00010001 0C0000F0
00010001 0C0000F4 00010001 0C0000F8 C6D7E5C1 F0F0F3F4*
02E3E7E3 40000104 4040000C 40400001 000001CC 00000078 800001E4
40404040 40404040 40404040 40404040 40404040 40404040 40404040
40404040 40404040 40404040 40404040 C6D7E5C1 F0F0F3F5*
02E3E7E3 40000114 40400010 40400001 000001E0 800001DC 000001DC
000001C0 40404040 40404040 40404040 40404040 40404040 40404040
40404040 40404040 40404040 40404040 C6D7E5C1 F0F0F3F6*

```
02D9D3C4  40404040  40400038  40404040  00010001  0C000100  00010001
0C000104  00010001  0C000108  00010001  0C00010C  00010001  0C000114
00010001  0C000118  00010001  0C00011C  C6D7E5C1  F0F0F3F7*
02E3E7E3  40000124  4040001C  40400001  00000070  000001C0  000001C0
8000020C  000001DC  000001C0  00000068  40404040  40404040  40404040
40404040  40404040  40404040  40404040  C6D7E5C1  F0F0F3F8*
02D9D3C4  40404040  40400038  40404040  00010001  0C000120  00010001
0C000124  00010001  0C000128  00010001  0C00012C  00010001  0C000130

MEMBER NAME  FPVAL
00010001  0C000134  00010001  0C000138  C6D7E5C1  F0F0F3F9*
02E3E7E3  40000140  4040001C  40400001  000001C0  000001C0  80000210
000001DC  000001C0  00000060  000001C0  40404040  40404040  40404040
40404040  40404040  40404040  40404040  C6D7E5C1  F0F0F4F0**
02D9D3C4  40404040  40400038  40404040  00010001  0C00013C  00010001
0C000140  00010001  0C000144  00010001  0C000148  00010001  0C00014C
00010001  0C000150  00010001  0C000154  C6D7E5C1  F0F0F4F1*
02E3E7E3  4000015C  4040001C  40400001  000001C0  80000204  000001DC
000001C0  00000058  000001C0  000001C0  40404040  40404040  40404040
40404040  40404040  40404040  40404040  C6D7E5C1  F0F0F4F2*
02D9D3C4  40404040  40400038  40404040  00010001  0C000158  00010001
0C00015C  00010001  0C000160  00010001  0C000164  00010001  0C000168
00010001  0C00016C  00010001  0C000170  C6D7E5C1  F0F0F4F3*
02E3E7E3  40000178  4040001C  40400001  80000204  000001DC  000001C0
00000050  000001C0  000001C0  80000204  40404040  40404040  40404040
40404040  40404040  40404040  40404040  C6D7E5C1  F0F0F4F4*
02D9D3C4  40404040  40400038  40404040  00010001  0C000174  00010001
0C000178  00010001  0C00017C  00010001  0C000180  00010001  0C000184
00010001  0C000188  00010001  0C00018C  C6D7E5C1  F0F0F4F5*
02E3E7E3  40000194  40400008  40400001  000001C8  800001EC  40404040
40404040  40404040  40404040  40404040  40404040  40404040  40404040
40404040  40404040  40404040  40404040  C6D7E5C1  F0F0F4F6*
02D9D3C4  40404040  40400018  40404040  00010001  0C000190  00010001
0C000194  00010001  0C000198  40404040  40404040  40404040  40404040
40404040  40404040  40404040  40404040  C6D7E5C1  F0F0F4F7*
02C5D5C4  40404040  40404040  40404040  40404040  40404040  40404040
0000051C  F1F5F7F3  F460C6D6  F34040F0  F2F0F2F8  F7F0F9F8  40F0F84B
F1F54BF4  F3404040  C6D7E5C1  D3404040  C6D7E5C1  F0F0F4F8**

MEMBER NAME  FTINFO
02C5E2C4  40404040  40400010  40400001  C6E3C9D5  C6D64040  00000000
40000000  40404040  40404040  40404040  40404040  40404040  40404040
40404040  40404040  40404040  40404040  C6E3C9D5  F0F0F0F1*
02E3E7E3  40000000  40400038  40400001  47F0F00C  07C6E3C9  D5C6D640
90ECD00C  184D98CD  F0205040  D00450D0  400807FC  40404040  40404040
021A2D40  C5D9D9D6  D940C9D5  40C2C3E2  C6E3C9D5  F0F0F0F2*
02E3E7E3  40000038  40400021  40400001  D3C9C240  D9D6E4E3  C9D5C540
C9D540C6  E3C9D5C6  D640E2E4  C2D9D6E4  E3C9D5C5  22404040  40404040
40404040  40404040  40404040  40404040  C6E3C9D5  F0F0F0F3*
02E3E7E3  40000060  40400038  40400001  40404040  40404040  40404040
40404040  D9C5E540  40404040  E3404040  40404040  E2C8C5C5  E3404040
E2C5D87B  40404040  7B404040  40404040  C6E3C9D5  F0F0F0F4*
02E3E7E3  40000098  40400008  40400001  D7C77B40  40404040  40404040
40404040  40404040  40404040  40404040  40404040  40404040  40404040
40404040  40404040  40404040  40404040  C6E3C9D5  F0F0F0F5*
02E3E7E3  400001F8  40400038  40400001  00000000  00000000  4F080000
00000000  00000000  00000000  00000001  00000002  00000003  00000004
00000005  00000006  00000008  00000000  C6E3C9D5  F0F0F0F6*
02C5E2C4  40404040  40400010  40400002  E5F9F940  40404040  05000000
```

```
4000003C 40404040 40404040 40404040 40404040 40404040 40404040
40404040 40404040 40404040 40404040 C6E3C9D5 F0F0F0F7*
02E3E7E3 40000230 40400004 40400001 00000000 40404040 40404040
40404040 40404040 40404040 40404040 40404040 40404040 40404040
40404040 40404040 40404040 40404040 C6E3C9D5 F0F0F0F8*
02E3E7E3 40000418 40400008 40400001 FFFFFFFC 00000000 40404040
40404040 40404040 40404040 40404040 40404040 40404040 40404040
40404040 40404040 40404040 40404040 C6E3C9D5 F0F0F0F9*
02C5E2C4 40404040 40400010 40400003 D4E5C3C8 D9404040 02000000
40000000 40404040 40404040 40404040 40404040 40404040 40404040
40404040 40404040 40404040 40404040 C6E3C9D5 F0F0F1F0**
02E3E7E3 40000424 40400004 40400001 00000000 40404040 40404040
40404040 40404040 40404040 40404040 40404040 40404040 40404040
40404040 40404040 40404040 40404040 C6E3C9D5 F0F0F1F1*
02C5E2C4 40404040 40400010 40400004 C3D4D7D9 E2E24040 02000000
40000000 40404040 40404040 40404040 40404040 40404040 40404040
40404040 40404040 40404040 40404040 C6E3C9D5 F0F0F1F2*
02C5E2C4 40404040 40400010 40400005 C9C2C3D6 D47B4040 02000000
40000000 40404040 40404040 40404040 40404040 40404040 40404040
40404040 40404040 40404040 40404040 C6E3C9D5 F0F0F1F3*
02C5E2C4 40404040 40400010 40400006 C9E2D9C3 C8E54040 02000000
40000000 40404040 40404040 40404040 40404040 40404040 40404040
40404040 40404040 40404040 40404040 C6E3C9D5 F0F0F1F4*
02C5E2C4 40404040 40400010 40400007 E2D7D3E3 E7E34040 02000000
40000000 40404040 40404040 40404040 40404040 40404040 40404040
40404040 40404040 40404040 40404040 C6E3C9D5 F0F0F1F5*
02E3E7E3 4000042C 40400014 40400001 00000000 00000000 00000000
00000000 00000000 40404040 40404040 40404040 40404040 40404040
40404040 40404040 40404040 40404040 C6E3C9D5 F0F0F1F6*
02E3E7E3 40000444 40400038 40400001 5890D37C 58A0D384 58B0D378
5880D184 58F0D390 4110D074 05EF41E0 000415FE 4720D3CE 58EFD04C
07FE5800 D19C5900 D1784750 D45858F0 C6E3C9D5 F0F0F1F7*
02E3E7E3 4000047C 40400038 40400001 D3984110 D08405EF 41E00004
15FE4720 D3F458EF D05407FE 5800D1A4 12004780 D45858F0 D38C4110
D09C05EF 5800D19C 5900D178 4780D448 C6E3C9D5 F0F0F1F8*
02E3E7E3 400004B4 40400038 40400001 58F0D39C 4110D0A8 05EF7820
D2A87020 D3A03222 4780D448 2B003802 6A00D160 6000D158 5800D15C
5000B038 1BFF58E0 D00007FE 5800D170 C6E3C9D5 F0F0F1F9*
02E3E7E3 400004EC 40400038 40400001 5000B038 1BFF58E0 D00007FE

MEMBER NAME  FTINFO
5800D19C 5900D17C 4750D49A 58F0D398 4110D0BC 05EF41E0 000415FE
4720D47E 58EFD05C 07FE5800 D1A41200 C6E3C9D5 F0F0F2F0**
02E3E7E3 40000524 40400038 40400001 4780D49A 58F0D38C 4110D0D4
05EF1BFF 58E0D000 07FE5980 D19C4730 D4EE58F0 D3984110 D0E005EF
41E00004 15FE4720 D4BC58EF D06407FE C6E3C9D5 F0F0F2F1*
02E3E7E3 4000055C 40400038 40400001 5800D1A4 12004780 D4EE58F0
D39C4110 D0F805EF 2B007800 D2A86A00 D1606000 D1585800 D15C4000
B03C1BFF 58E0D000 07FE5800 D19C5900 C6E3C9D5 F0F0F2F2*
02E3E7E3 40000594 40400038 40400001 D17847A0 D5021BFF 58E0D000
07FE58F0 D3984110 D10C05EF 41E00004 15FE4720 D51C58EF D06C07FE
5800D1A4 12004770 D52E1BFF 58E0D000 C6E3C9D5 F0F0F2F3*
02E3E7E3 400005CC 40400038 40400001 07FE5800 D19C5900 D1784770
D54C58F0 D38C4110 D12405EF 1BFF58E0 D00007FE 5800D19C 5900D17C
4730D580 58F0D38C 4110D130 05EF4100 C6E3C9D5 F0F0F2F4*
02E3E7E3 40000604 40400038 40400001 D1AB5000 D1449280 D14458F0
D38C4110 D13C05EF 1BFF58E0 D00007FE 5800D19C 5900D180 47C0D594
1BFF58E0 D00007FE 4100D1AB 5000D150 C6E3C9D5 F0F0F2F5*
02E3E7E3 4000063C 40400038 40400001 9280D150 58F0D38C 4110D148
```

| | | | | | | |
|---|---|---|---|---|---|---|
| 05EF1BFF | 58E0D000 | 07FE58F0 | D3941800 | 45E0F004 | 00000006 | 00000028 |
| 45E0F010 | 1BFF58E0 | D00007FE | 58A0D004 | C6E3C9D5 | F0F0F2F6* | |
| 02E3E7E3 | 40000674 | 40400038 | 40400001 | 58E0A00C | 58B0A018 | 5810B004 |
| 5820D194 | 50201000 | 18DA92FF | A00C982C | A01C07FE | 98781004 | 58207000 |
| 5020D194 | 58201000 | 41302000 | 41500001 | C6E3C9D5 | F0F0F2F7* | |
| 02E3E7E3 | 400006AC | 40400038 | 40400001 | 1B255020 | D37C5030 | D3805030 |
| D0745820 | 10084130 | 20004150 | 00041B25 | 5020D384 | 5030D388 | 5030D0A4 |
| 9280D0A4 | 5030D0DC | 9280D0DC | 47F0D3A4 | C6E3C9D5 | F0F0F2F8* | |
| 02E3E7E3 | 40000020 | 40400004 | 40400001 | 00000694 | 40404040 | 40404040 |
| 40404040 | 40404040 | 40404040 | 40404040 | 40404040 | 40404040 | 40404040 |
| 40404040 | 40404040 | 40404040 | 40404040 | C6E3C9D5 | F0F0F2F9* | |
| 02D9D3C4 | 40404040 | 40400038 | 40404040 | 00020001 | 0C000418 | 00030001 |
| 1C00042C | 00040001 | 1C000430 | 00050001 | 1C000434 | 00060001 | 1C000438 |
| 00070001 | 1C00043C | 00010001 | 0C000660 | C6E3C9D5 | F0F0F3F0** | |
| 02E3E7E3 | 40000024 | 40400004 | 40400001 | 000000A0 | 40404040 | 40404040 |
| 40404040 | 40404040 | 40404040 | 40404040 | 40404040 | 40404040 | 40404040 |
| 40404040 | 40404040 | 40404040 | 40404040 | C6E3C9D5 | F0F0F3F1* | |
| 02E3E7E3 | 400000A0 | 40400004 | 40400001 | 00000670 | 40404040 | 40404040 |
| 40404040 | 40404040 | 40404040 | 40404040 | 40404040 | 40404040 | 40404040 |
| 40404040 | 40404040 | 40404040 | 40404040 | C6E3C9D5 | F0F0F3F2* | |
| 02E3E7E3 | 400000EC | 40400014 | 40400001 | 0000046E | 0000046E | 00000494 |
| 00000652 | 0000051E | 40404040 | 40404040 | 40404040 | 40404040 | 40404040 |
| 40404040 | 40404040 | 40404040 | 40404040 | C6E3C9D5 | F0F0F3F3* | |
| 02D9D3C4 | 40404040 | 40400038 | 40404040 | 00010001 | 0C000020 | 00010001 |
| 0C000024 | 00010001 | 0C0000A0 | 00010001 | 0C0000EC | 00010001 | 0C0000F0 |
| 00010001 | 0C0000F4 | 00010001 | 0C0000F8 | C6E3C9D5 | F0F0F3F4* | |
| 02E3E7E3 | 40000100 | 40400014 | 40400001 | 00000652 | 0000055C | 00000652 |
| 000005BC | 00000652 | 40404040 | 40404040 | 40404040 | 40404040 | 40404040 |
| 40404040 | 40404040 | 40404040 | 40404040 | C6E3C9D5 | F0F0F3F5* | |
| 02E3E7E3 | 40000118 | 40400008 | 40400001 | 00000234 | 00000248 | 40404040 |
| 40404040 | 40404040 | 40404040 | 40404040 | 40404040 | 40404040 | 40404040 |
| 40404040 | 40404040 | 40404040 | 40404040 | C6E3C9D5 | F0F0F3F6* | |
| 02D9D3C4 | 40404040 | 40400038 | 40404040 | 00010001 | 0C0000FC | 00010001 |
| 0C000100 | 00010001 | 0C000104 | 00010001 | 0C000108 | 00010001 | 0C00010C |
| 00010001 | 0C000110 | 00010001 | 0C000118 | C6E3C9D5 | F0F0F3F7* | |
| 02E3E7E3 | 40000120 | 4040001C | 40400001 | 8000023C | 00000248 | 00000210 |
| 00000098 | 0000023C | 00000218 | 80000244 | 40404040 | 40404040 | 40404040 |
| 40404040 | 40404040 | 40404040 | 40404040 | C6E3C9D5 | F0F0F3F8* | |
| 02D9D3C4 | 40404040 | 40400038 | 40404040 | 00010001 | 0C00011C | 00010001 |
| 0C000120 | 00010001 | 0C000124 | 00010001 | 0C000128 | 00010001 | 0C00012C |

MEMBER NAME FTINFO

| | | | | | | |
|---|---|---|---|---|---|---|
| 00010001 | 0C000130 | 00010001 | 0C000134 | C6E3C9D5 | F0F0F3F9* | |
| 02E3E7E3 | 4000013C | 40400008 | 40400001 | 00000228 | 00000000 | 40404040 |
| 40404040 | 40404040 | 40404040 | 40404040 | 40404040 | 40404040 | 40404040 |
| 40404040 | 40404040 | 40404040 | 40404040 | C6E3C9D5 | F0F0F4F0** | |
| 02E3E7E3 | 40000148 | 40400014 | 40400001 | 00000248 | 0000023C | 00000090 |
| 00000348 | 80000238 | 40404040 | 40404040 | 40404040 | 40404040 | 40404040 |
| 40404040 | 40404040 | 40404040 | 40404040 | C6E3C9D5 | F0F0F4F1* | |
| 02D9D3C4 | 40404040 | 40400038 | 40404040 | 00010001 | 0C000138 | 00010001 |
| 0C00013C | 00020001 | 0C000140 | 00010001 | 0C000148 | 00010001 | 0C00014C |
| 00010001 | 0C000150 | 00010001 | 0C000154 | C6E3C9D5 | F0F0F4F2* | |
| 02E3E7E3 | 4000015C | 4040001C | 40400001 | 00000248 | 00000210 | 00000088 |
| 0000023C | 0000021C | 80000244 | 00000228 | 40404040 | 40404040 | 40404040 |
| 40404040 | 40404040 | 40404040 | 40404040 | C6E3C9D5 | F0F0F4F3* | |
| 02D9D3C4 | 40404040 | 40400038 | 40404040 | 00010001 | 0C000158 | 00010001 |
| 0C00015C | 00010001 | 0C000160 | 00010001 | 0C000164 | 00010001 | 0C000168 |
| 00010001 | 0C00016C | 00010001 | 0C000170 | C6E3C9D5 | F0F0F4F4* | |
| 02E3E7E3 | 40000178 | 40400004 | 40400001 | 00000008 | 40404040 | 40404040 |

```
40404040 40404040 40404040 40404040 40404040 40404040 40404040
40404040 40404040 40404040 40404040 C6E3C9D5 F0F0F4F5*
02E3E7E3 40000180 40400018 40400001 00000248 00000210 00000080
0000023C 00000220 80000244 40404040 40404040 40404040 40404040
40404040 40404040 40404040 40404040 C6E3C9D5 F0F0F4F6*
02D9D3C4 40404040 40400038 40404040 00010001 0C000174 00020001
0C000178 00010001 0C000180 00010001 0C000184 00010001 0C000188
00010001 0C00018C 00010001 0C000190 C6E3C9D5 F0F0F4F7*
02E3E7E3 40000198 4040001C 40400001 00000248 0000023C 00000078
00000348 80000238 00000248 00000210 40404040 40404040 40404040
40404040 40404040 40404040 40404040 C6E3C9D5 F0F0F4F8*
02D9D3C4 40404040 40400038 40404040 00010001 0C000194 00010001
0C000198 00010001 0C00019C 00010001 0C0001A0 00010001 0C0001A4
00010001 0C0001A8 00010001 0C0001AC C6E3C9D5 F0F0F4F9*
02E3E7E3 400001B4 4040001C 40400001 00000070 0000023C 00000218
80000244 00000214 0000003A 80000068 40404040 40404040 40404040
40404040 40404040 40404040 40404040 C6E3C9D5 F0F0F5F0**
02D9D3C4 40404040 40400038 40404040 00010001 0C0001B0 00010001
0C0001B4 00010001 0C0001B8 00010001 0C0001BC 00010001 0C0001C0
00010001 0C0001C4 00020001 0C0001C8 C6E3C9D5 F0F0F5F1*
02E3E7E3 400001D0 40400020 40400001 00000214 0000003A 80000060
00000210 0000003A 80000000 00000214 0000003A 40404040 40404040
40404040 40404040 40404040 40404040 C6E3C9D5 F0F0F5F2*
02D9D3C4 40404040 40400038 40404040 00010001 0C0001CC 00010001
0C0001D0 00020001 0C0001D4 00010001 0C0001D8 00010001 0C0001DC
00020001 0C0001E0 00010001 0C0001E8 C6E3C9D5 F0F0F5F3*
02E3E7E3 400001F0 40400004 40400001 80000000 40404040 40404040
40404040 40404040 40404040 40404040 40404040 40404040 40404040
40404040 40404040 40404040 40404040 C6E3C9D5 F0F0F5F4*
02E3E7E3 40000440 40400004 40400001 00000000 40404040 40404040
40404040 40404040 40404040 40404040 40404040 40404040 40404040
40404040 40404040 40404040 40404040 C6E3C9D5 F0F0F5F5*
02D9D3C4 40404040 40400008 40404040 00020001 0C0001EC 40404040
40404040 40404040 40404040 40404040 40404040 40404040 40404040
40404040 40404040 40404040 40404040 C6E3C9D5 F0F0F5F6*
02C5D5C4 40404040 40404040 40404040 40404040 40404040 40404040
000006E4 F1F5F7F3 F460C6D6 F34040F0 F2F0F2F8 F7F0F9F8 40F0F84B
F1F54BF4 F7404040 C6E3C9D5 C6D64040 C6E3C9D5 F0F0F5F7**

MEMBER NAME  GAPLN
02C5E2C4 40404040 40400010 40400001 C7C1D7D3 D5404040 00000000
40000000 40404040 40404040 40404040 40404040 40404040 40404040
40404040 40404040 40404040 40404040 C7C1D7D3 F0F0F0F1*
02E3E7E3 40000000 40400028 40400001 47F0F00C 07C7C1D7 D3D54040
90ECD00C 184D98CD F0205040 D00450D0 400807FC 40404040 40404040
40404040 40404040 40404040 40404040 C7C1D7D3 F0F0F0F2*
02C5E2C4 40404040 40400010 40400002 E3D6D3C5 D9404040 05000000
4000000C 40404040 40404040 40404040 40404040 40404040 40404040
40404040 40404040 40404040 40404040 C7C1D7D3 F0F0F0F3*
02E3E7E3 400000C0 40400028 40400001 00000000 00000001 00000002
00000004 00000005 00000006 00000008 41200000 00000000 00000000
40404040 40404040 40404040 40404040 C7C1D7D3 F0F0F0F4*
02C5E2C4 40404040 40400010 40400003 C2E2D6D9 E3404040 02000000
40000000 40404040 40404040 40404040 40404040 40404040 40404040
40404040 40404040 40404040 40404040 C7C1D7D3 F0F0F0F5*
02C5E2C4 40404040 40400010 40400004 D7C9C5D9 C3C54040 02000000
40000000 40404040 40404040 40404040 40404040 40404040 40404040
40404040 40404040 40404040 40404040 C7C1D7D3 F0F0F0F6*
02E3E7E3 40000168 4040000C 40400001 00000000 00000000 00000000
```

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | C7C1D7D3 | F0F0F0F7* | |
| 02E3E7E3 | 40000178 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | C7C1D7D3 | F0F0F0F8* | |
| 02E3E7E3 | 40000120 | 40400038 | 40400001 | 00000001 | 00000004 | C6D34040 |
| C1404040 | 00000005 | 00000004 | C6D34040 | C1404040 | 00000001 | 00000004 |
| C6D34040 | C1404040 | 00000005 | 00000004 | C7C1D7D3 | F0F0F0F9* | |
| 02E3E7E3 | 40000158 | 40400008 | 40400001 | C6D34040 | C1404040 | 40404040 |
| 40404040 | 40404040 | 40404040 | 40404040 | 40404040 | 40404040 | 40404040 |
| 40404040 | 40404040 | 40404040 | 40404040 | C7C1D7D3 | F0F0F1F0** | |
| 02E3E7E3 | 400001B4 | 40400038 | 40400001 | 5830D154 | 5860D140 | 58B0D148 |
| 5800D0A4 | 5000D0D8 | 5800D0F4 | 5A00D09C | 5000D0F4 | 18505C40 | D0B05820 |
| D0A41A25 | 7800D0C4 | 7002B000 | 5850D0F4 | C7C1D7D3 | F0F0F1F1* | |
| 02E3E7E3 | 400001EC | 40400038 | 40400001 | 5C40D0B0 | 5820D0B0 | 1A257800 |
| D0CC7002 | B0005800 | D0F45A00 | D09C5000 | D0F41850 | 5C40D0B0 | 5820D0A4 |
| 1A257800 | D0C87002 | B0005850 | D0F45C40 | C7C1D7D3 | F0F0F1F2* | |
| 02E3E7E3 | 40000224 | 40400038 | 40400001 | D0B05820 | D0B01A25 | 7800D0D0 |
| 7002B000 | 58F0D144 | 4110D04C | 05EF7820 | D0C47B20 | D0C83022 | 7840D0CC |
| 7B40D0D0 | 30447040 | D0EC7920 | 600447A0 | C7C1D7D3 | F0F0F1F3* | |
| 02E3E7E3 | 4000025C | 40400038 | 40400001 | D24058F0 | D1444110 | D06005EF |
| 7800D0EC | 79006004 | 47A0D256 | 58F0D144 | 4110D074 | 05EF5800 | D0A45000 |
| D15C5800 | D0B05000 | D16C5870 | D1785880 | C7C1D7D3 | F0F0F1F4* | |
| 02E3E7E3 | 40000294 | 40400038 | 40400001 | D1885890 | D09C58A0 | D0A07848 |
| B0007040 | D1601859 | 5A50D09C | 5050D164 | 5C40D0B0 | 18255A20 | D0A47822 |
| B0007020 | D1683B42 | 30447827 | B0007020 | C7C1D7D3 | F0F0F1F5* | |
| 02E3E7E3 | 400002CC | 40400038 | 40400001 | D1701825 | 5A20D0B0 | 7862B000 |
| 7060D174 | 3B263022 | 7020D0E0 | 79406004 | 47A0D2CC | 79206004 | 4750D364 |
| 7820D160 | 7A20D168 | 7D20D0B4 | 7020D138 | C7C1D7D3 | F0F0F1F6* | |
| 02E3E7E3 | 40000304 | 40400038 | 40400001 | 7820D170 | 7A20D174 | 7D20D0B4 |
| 7020D13C | 58F0D150 | 4110D088 | 05EF5800 | D0D45900 | D09C4780 | D3645800 |
| D0D41200 | 4780D338 | 5800D0D8 | 5900D0A8 | C7C1D7D3 | F0F0F1F7* | |
| 02E3E7E3 | 4000033C | 40400038 | 40400001 | 4770D31C | 50A0D0D8 | 59A0D0D8 |
| 4770D32C | 1BFF58E0 | D00007FE | 5800D0AC | 5000D0D8 | 47F0D364 | 5800D0D8 |
| 5900D0AC | 4770D348 | 50A0D0D8 | 59A0D0D8 | C7C1D7D3 | F0F0F1F8* | |
| 02E3E7E3 | 40000374 | 40400038 | 40400001 | 4770D358 | 1BFF58E0 | D00007FE |
| 5800D0A8 | 5000D0D8 | 47F0D364 | 1A9A5A70 | D1785A80 | D1785990 | D0F447C0 |
| D2761BFF | 58E0D000 | 07FE58A0 | D00458E0 | C7C1D7D3 | F0F0F1F9* | |
| 02E3E7E3 | 400003AC | 40400038 | 40400001 | A00C58B0 | A0185810 | B0007820 |

MEMBER NAME GAPLN

| | | | | | | |
|---|---|---|---|---|---|---|
| D0C47020 | 10005820 | B0047840 | D0CC7040 | 20005830 | B0087860 | D0C87060 |
| 30005840 | B00C7800 | D0D07000 | 40005850 | C7C1D7D3 | F0F0F2F0** | |
| 02E3E7E3 | 400003E4 | 40400038 | 40400001 | B0145860 | D0F05060 | 50005870 |
| B01C5880 | D0F45080 | 70005890 | B0205800 | D0D85000 | 900018DA | 92FFA00C |
| 982CA01C | 07FE987B | 10007820 | 70007020 | C7C1D7D3 | F0F0F2F1* | |
| 02E3E7E3 | 4000041C | 40400038 | 40400001 | D0C47820 | 80007020 | D0CC7820 |
| 90007020 | D0C87820 | A0007020 | D0D0987A | 10145820 | 70005020 | D0F05820 |
| 90005020 | D0F45820 | A0005020 | D0D85820 | C7C1D7D3 | F0F0F2F2* | |
| 02E3E7E3 | 40000454 | 40400038 | 40400001 | 10104130 | 20004150 | 00041B25 |
| 5C40D0A0 | 1B255020 | D1545030 | D1585030 | D0885820 | 10184130 | 20004150 |
| 00041B25 | 5C40D0A0 | 1B255020 | D1485030 | C7C1D7D3 | F0F0F2F3* | |
| 02E3E7E3 | 4000048C | 40400012 | 40400001 | D14C5030 | D0545030 | D0685030 |
| D07C47F0 | D18C4040 | 40404040 | 40404040 | 40404040 | 40404040 | 40404040 |
| 40404040 | 40404040 | 40404040 | 40404040 | C7C1D7D3 | F0F0F2F4* | |
| 02E3E7E3 | 40000020 | 4040000C | 40400001 | 00000412 | 00000028 | 000003A6 |
| 40404040 | 40404040 | 40404040 | 40404040 | 40404040 | 40404040 | 40404040 |
| 40404040 | 40404040 | 40404040 | 40404040 | C7C1D7D3 | F0F0F2F5* | |
| 02E3E7E3 | 40000074 | 40400008 | 40400001 | 00000120 | 000000C8 | 40404040 |

```
40404040  40404040  40404040  40404040  40404040  40404040  40404040
40404040  40404040  40404040  40404040  C7C1D7D3  F0F0F2F6*
02D9D3C4  40404040  40400038  40404040  00020001  0C000168  00030001
1C00016C  00040001  1C000178  00010001  0C000020  00010001  0C000024
00010001  0C000028  00010001  0C000074  C7C1D7D3  F0F0F2F7*
02E3E7E3  40000080  40400010  40400001  000000D8  8000011C  00000150
000000C4  40404040  40404040  40404040  40404040  40404040  40404040
40404040  40404040  40404040  40404040  C7C1D7D3  F0F0F2F8*
02E3E7E3  40000094  4040000C  40400001  000000D8  8000011C  00000140
40404040  40404040  40404040  40404040  40404040  40404040  40404040
40404040  40404040  40404040  40404040  C7C1D7D3  F0F0F2F9*
02D9D3C4  40404040  40400038  40404040  00010001  0C000078  00010001
0C000080  00010001  0C000084  00010001  0C000088  00010001  0C00008C
00010001  0C000094  00010001  0C000098  C7C1D7D3  F0F0F3F0**
02E3E7E3  400000A0  40400004  40400001  000000C4  40404040  40404040
40404040  40404040  40404040  40404040  40404040  40404040  40404040
40404040  40404040  40404040  40404040  C7C1D7D3  F0F0F3F1*
02E3E7E3  400000A8  40400008  40400001  000000D8  8000011C  40404040
40404040  40404040  40404040  40404040  40404040  40404040  40404040
40404040  40404040  40404040  40404040  C7C1D7D3  F0F0F3F2*
02E3E7E3  400000B4  4040000C  40400001  00000118  00000160  800000FC
40404040  40404040  40404040  40404040  40404040  40404040  40404040
40404040  40404040  40404040  40404040  C7C1D7D3  F0F0F3F3*
02E3E7E3  40000184  40400030  40400001  00000000  00000000  00000000
00000000  00000000  00000000  00000000  00000010  00A80004  01E80004
01EC0004  0000000C  40404040  40404040  C7C1D7D3  F0F0F3F4*
02D9D3C4  40404040  40400038  40404040  00010001  0C00009C  00010001
0C0000A0  00010001  0C0000A8  00010001  0C0000AC  00010001  0C0000B4
00010001  0C0000B8  00010001  0C0000BC  C7C1D7D3  F0F0F3F5*
02C5D5C4  40404040  40404040  40404040  40404040  40404040  40404040
0000049E  F1F5F7F3  F460C6D6  F34040F0  F2F0F2F8  F7F0F9F8  40F0F84B
F1F54BF5  F2404040  C7C1D7D3  D5404040  C7C1D7D3  F0F0F3F6**

MEMBER NAME  GTFLIP
02C5E2C4  40404040  40400010  40400001  C7E3C6D3  C9D74040  00000000
40000000  40404040  40404040  40404040  40404040  40404040  40404040
40404040  40404040  40404040  40404040  C7E3C6D3  F0F0F0F1*
02E3E7E3  40000000  40400038  40400001  47F0F00C  07C7E3C6  D3C9D740
90ECD00C  184D98CD  F0205040  D00450D0  400807FC  40404040  40404040
021A3340  C5D9D9D6  D97A40D5  E4D4C2C5  C7E3C6D3  F0F0F0F2*
02E3E7E3  40000038  40400038  40400001  D940D6C6  40E3C5D4  D7C5D9C1
D9E840D7  D6C9D5E3  E240C5E7  C3C5C5C4  C5C440F1  F0F0F040  C9D51A0F
40D9D6E4  E3C9D5C5  40C7E3C6  D3C9D722  C7E3C6D3  F0F0F0F3*
02E3E7E3  400000E0  40400024  40400001  00000000  00000001  00000002
00000008  00000010  000003E8  00000000  00000000  00000000  40404040
40404040  40404040  40404040  40404040  C7E3C6D3  F0F0F0F4*
02E3E7E3  40000140  40400004  40400001  00000000  40404040  40404040
40404040  40404040  40404040  40404040  40404040  40404040  40404040
40404040  40404040  40404040  40404040  C7E3C6D3  F0F0F0F5*
02E3E7E3  40000148  40400004  40400001  00000000  40404040  40404040
40404040  40404040  40404040  40404040  40404040  40404040  40404040
40404040  40404040  40404040  40404040  C7E3C6D3  F0F0F0F6*
02C5E2C4  40404040  40400010  40400002  D4E5C3C8  D9404040  02000000
40000000  40404040  40404040  40404040  40404040  40404040  40404040
40404040  40404040  40404040  40404040  C7E3C6D3  F0F0F0F7*
02E3E7E3  40000150  40400004  40400001  00000000  40404040  40404040
40404040  40404040  40404040  40404040  40404040  40404040  40404040
40404040  40404040  40404040  40404040  C7E3C6D3  F0F0F0F8*
02C5E2C4  40404040  40400010  40400003  C9C2C3D6  D47B4040  02000000
```

```
40000000  40404040  40404040  40404040  40404040  40404040  40404040
40404040  40404040  40404040  40404040  C7E3C6D3  F0F0F0F9*
02C5E2C4  40404040  40400010  40400004  D4E5C3C8  D9D34040  02000000
40000000  40404040  40404040  40404040  40404040  40404040  40404040
40404040  40404040  40404040  40404040  C7E3C6D3  F0F0F1F0**
02E3E7E3  40000158  40400010  40400001  00000000  00000000  00000000
00000000  40404040  40404040  40404040  40404040  40404040  40404040
40404040  40404040  40404040  40404040  C7E3C6D3  F0F0F1F1*
02E3E7E3  40000188  40400038  40400001  5880D0E0  5890D0F4  58A0D0D8
58B0D0D0  5850D114  5800D0A8  5900D084  47C0D15A  58F0D0EC  45E0F004
00000006  00000028  45E0F010  58F0D0EC  C7E3C6D3  F0F0F1F2*
02E3E7E3  400001C0  40400038  40400001  45E0F034  05404040  F4F44100
B0045000  D0504100  80045000  D0549280  D05458F0  D0E84110  D04C05EF
5800D0A8  89000003  5000D0B8  41059000  C7E3C6D3  F0F0F1F3*
02E3E7E3  400001F8  40400038  40400001  5000D05C  4105A000  5000D060
9280D060  58F0D0F0  4110D058  05EF7800  D09C3200  47C0D1B4  1BFF58E0
D00007FE  5820D074  5870D07C  5880D074  C7E3C6D3  F0F0F1F4*
02E3E7E3  40000230  40400038  40400001  18A218B5  782B9000  3302700B
90001AA8  1AB759A0  D0A847C0  D1C45880  D0E058A0  D0D858B0  D0D05820
D0A88E20  00205D20  D0785870  D0A85C60  C7E3C6D3  F0F0F1F5*
02E3E7E3  40000268  40400038  40400001  D07C1847  5A40D0FC  5850D104
5860D074  18745880  D11458A0  D07418B3  4100D0BC  5000D068  41089000
5000D06C  9280D06C  58F0D0E8  4110D064  C7E3C6D3  F0F0F1F6*
02E3E7E3  400002A0  40400038  40400001  05EF4108  90005000  D0684107
90005000  D06C9280  D06C58F0  D0E84110  D06405EF  41079000  5000D068
4100D0BC  5000D06C  9280D06C  58F0D0E8  C7E3C6D3  F0F0F1F7*
02E3E7E3  400002D8  40400038  40400001  4110D064  05EF5A80  D07C1A75
876AD214  5880D0E0  58A0D0D8  58B0D0D0  5850D114  7820B004  33227840
B0083304  7000B004  7020B008  1BFF58E0  C7E3C6D3  F0F0F1F8*
02E3E7E3  40000310  40400038  40400001  D00007FE  58D0D004  58E0D00C
92FFD00C  982CD01C  07FE987B  10045820  70005020  D0A87820  90007020
D09C5820  10004130  20004150  00041B25  C7E3C6D3  F0F0F1F9*
02E3E7E3  40000348  40400038  40400001  5C40D078  1B255020  D0D85030

MEMBER NAME  GTFLIP
D0DC5820  10084130  20004150  00041B25  5020D0E0  5030D0E4  58201010
41302000  41500004  1B255C40  D0781B25  C7E3C6D3  F0F0F2F0**
02E3E7E3  40000380  40400022  40400001  5020D0F4  5030D0F8  58201014
41302000  41500004  1B255020  D0D05030  D0D447F0  D1184040  40404040
40404040  40404040  40404040  40404040  C7E3C6D3  F0F0F2F1*
02E3E7E3  40000020  40400008  40400001  00000326  00000070  40404040
40404040  40404040  40404040  40404040  40404040  40404040  40404040
40404040  40404040  40404040  40404040  C7E3C6D3  F0F0F2F2*
02E3E7E3  40000070  40400004  40400001  00000314  40404040  40404040
40404040  40404040  40404040  40404040  40404040  40404040  40404040
40404040  40404040  40404040  40404040  C7E3C6D3  F0F0F2F3*
02E3E7E3  400000BC  40400004  40400001  000000F0  40404040  40404040
40404040  40404040  40404040  40404040  40404040  40404040  40404040
40404040  40404040  40404040  40404040  C7E3C6D3  F0F0F2F4*
02D9D3C4  40404040  40400038  40404040  00020001  1C000158  00030001
1C00015C  00040001  1C000160  00010001  0C0001B4  00010001  0C000020
00010001  0C000024  00010001  0C000070  C7E3C6D3  F0F0F2F5*
02E3E7E3  400000C4  40400008  40400001  80000000  00000128  40404040
40404040  40404040  40404040  40404040  40404040  40404040  40404040
40404040  40404040  40404040  40404040  C7E3C6D3  F0F0F2F6*
02E3E7E3  400000D0  40400008  40400001  80000000  000000EC  40404040
40404040  40404040  40404040  40404040  40404040  40404040  40404040
40404040  40404040  40404040  40404040  C7E3C6D3  F0F0F2F7*
02E3E7E3  400000DC  40400004  40400001  80000000  40404040  40404040
```

```
40404040  40404040  40404040  40404040  40404040  40404040  40404040
40404040  40404040  40404040  40404040  C7E3C6D3  F0F0F2F8*
02E3E7E3  4000016C  4040001C  40400001  00000004  00000000  FFFFFFF8
00000000  00000000  00000000  0000000C  40404040  40404040  40404040
40404040  40404040  40404040  40404040  C7E3C6D3  F0F0F2F9*
02D9D3C4  40404040  40400018  40404040  00010001  0C0000BC  00010001
0C0000C8  00010001  0C0000D4  40404040  40404040  40404040  40404040
40404040  40404040  40404040  40404040  C7E3C6D3  F0F0F3F0**
02C5D5C4  40404040  40404040  40404040  40404040  40404040  40404040
000003A2  F1F5F7F3  F460C6D6  F34040F0  F2F0F2F8  F7F0F9F8  40F0F84B
F1F54BF5  F6404040  C7E3C6D3  C9D74040  C7E3C6D3  F0F0F3F1**

MEMBER NAME  GRNMRG
02C5E2C4  40404040  40400010  40400001  C7D9D5D4  D9C74040  00000000
40000000  40404040  40404040  40404040  40404040  40404040  40404040
40404040  40404040  40404040  40404040  C7D9D5D4  F0F0F0F1*
02E3E7E3  40000000  40400038  40400001  47F0F00C  07C7D9D5  D4D9C740
90ECD00C  184D98CD  F0205040  D00450D0  400807FC  40404040  40404040
020A0803  18010A08  0318011A  05C4C1E2  C7D9D5D4  F0F0F0F2*
02E3E7E3  40000038  40400038  40400001  C8401003  1A0740D3  C1E8E4D7
4010041A  1E40C4D6  C5E240D5  D6E340D4  C1E3C3C8  40C1D540  D6D9C9C5
D5E3C1E3  C9D6D518  3222020A  08031801  C7D9D5D4  F0F0F0F3*
02E3E7E3  40000070  40400038  40400001  0A080318  011A05C4  C1E2C840
10031A0D  40D6D9C9  C5D5E3C1  E3C9D6D5  400A0602  1A1740C4  D6C5E240
D5D6E340  D4C1E3C3  C840C140  D3C1E8E4  C7D9D5D4  F0F0F0F4*
02E3E7E3  400000A8  40400038  40400001  D7183222  02064814  0122020A
08031801  0A080318  011A0CD6  D9C9C5D5  E3C1E3C9  D6D5400A  08031A1E
40D5D6E3  40E6C9E3  C8C9D540  E3C8C540  C7D9D5D4  F0F0F0F5*
02E3E7E3  400000E0  40400038  40400001  D3C9D4C9  E3E240D6  C640E2D3
C9C31832  22020A08  0318010A  08031801  1A06D3C1  E8E4D740  10041A26
40C3D6D5  E3C1C9D5  E240D4D6  D9C540E3  C7D9D5D4  F0F0F0F6*
02E3E7E3  40000118  40400019  40400001  C8C1D540  F840D7D3  E840D6D9
C9C5D5E3  C1E3C9D6  D5E21832  22404040  40404040  40404040  40404040
40404040  40404040  40404040  40404040  C7D9D5D4  F0F0F0F7*
02E3E7E3  400001B8  40400038  40400001  00000000  00000000  4F080000
00000000  00000000  00000000  00000001  00000002  00000003  00000004
00000005  00000006  00000008  00000009  C7D9D5D4  F0F0F0F8*
02E3E7E3  400001F0  40400028  40400001  00000010  00000016  00000048
000003E8  00002328  40266666  40800000  42640000  00000000  00000000
40404040  40404040  40404040  40404040  C7D9D5D4  F0F0F0F9*
02C5E2C4  40404040  40400010  40400002  D4E5C3C8  D9404040  02000000
40000000  40404040  40404040  40404040  40404040  40404040  40404040
40404040  40404040  40404040  40404040  C7D9D5D4  F0F0F1F0**
02E3E7E3  40000288  40400004  40400001  00000000  40404040  40404040
40404040  40404040  40404040  40404040  40404040  40404040  40404040
40404040  40404040  40404040  40404040  C7D9D5D4  F0F0F1F1*
02E3E7E3  40000290  40400008  40400001  00000000  00000000  40404040
40404040  40404040  40404040  40404040  40404040  40404040  40404040
40404040  40404040  40404040  40404040  C7D9D5D4  F0F0F1F2*
02C5E2C4  40404040  40400010  40400003  C9C2C3D6  D47B4040  02000000
40000000  40404040  40404040  40404040  40404040  40404040  40404040
40404040  40404040  40404040  40404040  C7D9D5D4  F0F0F1F3*
02E3E7E3  4000029C  40400004  40400001  00000000  40404040  40404040
40404040  40404040  40404040  40404040  40404040  40404040  40404040
40404040  40404040  40404040  40404040  C7D9D5D4  F0F0F1F4*
02E3E7E3  400002A4  40400004  40400001  00000000  40404040  40404040
40404040  40404040  40404040  40404040  40404040  40404040  40404040
40404040  40404040  40404040  40404040  C7D9D5D4  F0F0F1F5*
02E3E7E3  40000234  40400004  40400001  000000C8  40404040  40404040
```

```
40404040  40404040  40404040  40404040  40404040  40404040  40404040
40404040  40404040  40404040  40404040  C7D9D5D4  F0F0F1F6*
02E3E7E3  4000026A  40400010  40400001  00000000  00000000  00000000
00000000  40404040  40404040  40404040  40404040  40404040  40404040
40404040  40404040  40404040  40404040  C7D9D5D4  F0F0F1F7*
02E3E7E3  40000388  40400038  40400001  58A0D150  58B0D164  5890D098
7800D0CC  7000D0F0  5090D10C  5800D1AC  5000D218  5850D174  5050D210
5050D214  5800D238  5000D21C  58E0D238  C7D9D5D4  F0F0F1F8*
02E3E7E3  400003C0  40400038  40400001  410EB000  5000D054  9280D054
58F0D158  4110D04C  05EF5820  D1705020  D1FC5800  D23C5000  D22058E0
D23C784E  B0007040  D2005800  D0B85000  C7D9D5D4  F0F0F1F9*
02E3E7E3  400003F8  40400038  40400001  D2045800  D1B05000  D22C5000

MEMBER NAME  GRNMRG
D2245800  D2405000  D22858E0  D240782E  A0007020  D20C3B42  7040D208
30647960  D0CC47C0  D4DC5990  D1184780  C7D9D5D4  F0F0F2F0**
02E3E7E3  40000430  40400038  40400001  D3285C40  D09C1A25  7B22B000
7940D094  41300001  4720D312  1B337920  D0F04120  00014720  D3201B22
14231BFF  862FD4DC  7800D20C  7900D200  C7D9D5D4  F0F0F2F1*
02E3E7E3  40000468  40400038  40400001  4730D410  5800D114  5900D0FC
4750D348  1BFF58E0  D00007FE  5800D114  1A095000  D1145840  D0B05A40
D2142B00  7804B000  6A00D088  6000D080  C7D9D5D4  F0F0F2F2*
02E3E7E3  400004A0  40400038  40400001  5830D084  10335030  D0F45830
D2045A30  D2142B00  7803B000  6A00D088  6000D080  5800D084  5000D100
58F0D16C  45E0F004  00000000  00000028  C7D9D5D4  F0F0F2F3*
02E3E7E3  400004D8  40400038  40400001  5810D21C  45E0F008  0471B000
5810D220  45E0F008  0471B000  45E0F008  0450D0F4  45E0F008  0450D100
45E0F010  58F0D16C  45E0F000  00000000  C7D9D5D4  F0F0F2F4*
02E3E7E3  40000510  40400038  40400001  000000AC  18A958B0  D0C05880
D15C185B  5C40D114  18391A35  45E0F008  01238000  879AD3E6  58A0D150
58B0D164  5890D098  45E0F010  47F0DBCC  C7D9D5D4  F0F0F2F5*
02E3E7E3  40000548  40400038  40400001  5800D114  5900D0FC  4750D424
1BFF58E0  D00007FE  5800D114  1A095000  D1145840  D2445A40  D2242B00
7804A000  6A00D088  6000D080  5830D084  C7D9D5D4  F0F0F2F6*
02E3E7E3  40000580  40400038  40400001  10335030  D0F458F0  D16C1800
45E0F004  00000000  0000006A  5830D1C0  5A30D224  45E0F008  0473A000
5810D228  45E0F008  0471A000  45E0F008  C7D9D5D4  F0F0F2F7*
02E3E7E3  400005B8  40400038  40400001  0450D0F4  5830D0B0  5A30D224
45E0F008  0473A000  45E0F010  58F0D16C  45E0F000  00000000  000000AC
18A958B0  D0C05880  D15C185B  5C40D114  C7D9D5D4  F0F0F2F8*
02E3E7E3  400005F0  40400038  40400001  18391A35  45E0F008  01238000
879AD4B2  58A0D150  58B0D164  5890D098  45E0F010  47F0DBCC  5090D0E4
5800D170  5000D190  5800D174  5000D188  C7D9D5D4  F0F0F2F9*
02E3E7E3  40000628  40400038  40400001  5800D0C8  13005000  D1B45800
D2485000  D1B85830  D10C5C20  D1B05030  D1C45800  D1745000  D1845000
D17C1803  5A00D0B8  5000D1D4  18035A00  C7D9D5D4  F0F0F3F0**
02E3E7E3  40000660  40400038  40400001  D0B05000  D1A41803  5A00D1C0
5000D1D8  5A30D0B8  5030D1DC  5800D23C  5000D194  5800D24C  5000D1E0
5800D238  5000D1E4  5800D23C  5000D1E8  C7D9D5D4  F0F0F3F1*
02E3E7E3  40000698  40400038  40400001  5800D1BC  5000D1EC  5800D238
5000D1F0  5800D23C  5000D1F4  5800D24C  5000D1F8  5860D174  5880D1B0
18A95890  D15058F0  D1584110  D05805EF  C7D9D5D4  F0F0F3F2*
02E3E7E3  400006D0  40400038  40400001  5800D090  5000D0F8  59A0D0E4
4780D618  7820D148  7020D18C  58E0D194  792EB000  4770D5EE  5850D0E4
1B5A5C40  D1881825  5A20D1A8  58E0D1E0  C7D9D5D4  F0F0F3F3*
02E3E7E3  40000708  40400038  40400001  410EB000  5000D068  4102B000
5000D06C  9280D06C  58F0D158  4110D064  05EF58E0  D1947800  D18C790E
B0004780  DB6058E0  D1E4410E  B0005000  C7D9D5D4  F0F0F3F4*
02E3E7E3  40000740  40400038  40400001  D0549280  D05458F0  D1584110
```

```
D04C05EF 5820D0E4 5020D0E8 58E0D1E8 782EB000 5830D17C 5A30D170
5870D10C 188A18A3 18B23862 5890D164 C7D9D5D4 F0F0F3F5*
02E3E7E3 40000778 40400038 40400001 1AB81AA6 5970D110 47C0D654
50B0D0E8 47F0D9A2 59B0D118 47C0D664 50B0D0E8 47F0D6B8 796A9000
4780D640 50B0D0E8 5890D150 58B0D164 C7D9D5D4 F0F0F3F6*
02E3E7E3 400007B0 40400038 40400001 58A0D098 5880D1B0 5800D0E8
5900D118 4730D6B8 18565C40 D0E81825 5A20D170 7822B000 58E0D1D4
7B2E9000 30427020 D11C7940 D0F04750 C7D9D5D4 F0F0F3F7*
02E3E7E3 400007E8 40400038 40400001 D9463222 4730D946 5890D150
58B0D164 58A0D098 5880D1B0 5800D090 4000D0E0 58E0D1A4 782E9000
7020D19C 322247C0 D6FE7C20 D0D47A20 C7D9D5D4 F0F0F3F8*
02E3E7E3 40000820 40400038 40400001 D0D02B00 38026A00 D0886000
D0805800 D0844000 D0E07800 D19C3200 47A0D728 7820D19C 7C20D0D4

MEMBER NAME  GRNMRG
7B20D0D0 2B003802 6A00D088 6000D080 C7D9D5D4 F0F0F3F9*
02E3E7E3 40000858 40400038 40400001 5800D084 4000D0E0 4800D0E0
5900D0C8 4730D740 4800D0E0 5900D1B4 4730D818 5800D114 5900D0FC
4750D760 58A0D150 58B0D164 5890D098 C7D9D5D4 F0F0F4F0**
02E3E7E3 40000890 40400038 40400001 1BFF58E0 D00007FE 5800D114
1A0A5000 D11458E0 D1B82B00 780EB000 6A00D088 6000D080 5830D084
10335030 D0F458E0 D1BC2B00 780EB000 C7D9D5D4 F0F0F4F1*
02E3E7E3 400008C8 40400038 40400001 6A00D088 6000D080 5800D084
5000D100 58F0D16C 45E0F004 00000000 000000B2 5810D1D8 45E0F008
04719000 5810D1DC 45E0F008 04719000 C7D9D5D4 F0F0F4F2*
02E3E7E3 40000900 40400020 40400001 5810D1A4 45E0F008 04719000
45E0F010 58F0D16C 45E0F000 00000000 000000AC 40404040 40404040
40404040 40404040 40404040 40404040 C7D9D5D4 F0F0F4F3*
02D9D3C4 40404040 40400038 40404040 00020001 1C000290 00030001
1C0002A4 00010001 0C0004D4 00010001 0C000510 00010001 0C000594
00010001 0C0005DC 00010001 0C0008E4 C7D9D5D4 F0F0F4F4*
02E3E7E3 40000920 40400038 40400001 189A58B0 D0C05880 D15C185B
5C40D114 18391A35 45E0F008 01238000 879AD7F2 5890D150 58B0D164
5880D1B0 45E0F010 5800D0F8 1A0A5000 C7D9D5D4 F0F0F4F5*
02E3E7E3 40000958 40400038 40400001 D0F84800 D0E01200 4770D834
5800D0C4 4000D0E0 5820D0F8 89200001 4800D0E0 4002D11E 5800D0F8
5900D0B0 47C0D908 5800D114 5900D0FC C7D9D5D4 F0F0F4F6*
02E3E7E3 40000990 40400038 40400001 4750D870 58A0D150 58B0D164
5890D098 1BFF58E0 D00007FE 5800D114 1A0A5000 D11458E0 D1EC2B00
780EB000 6A00D088 6000D080 5800D084 C7D9D5D4 F0F0F4F7*
02E3E7E3 400009C8 40400038 40400001 5000D100 58F0D16C 45E0F004
00000000 000000F1 5810D1F0 45E0F008 0471B000 5810D1F4 45E0F008
0471B000 45E0F008 0450D100 45E0F010 C7D9D5D4 F0F0F4F8*
02E3E7E3 40000A00 40400038 40400001 58F0D16C 45E0F000 00000000
000000AC 189A58B0 D0C05880 D15C185B 5C40D114 18391A35 45E0F008
01238000 879AD8E2 5890D150 58B0D164 C7D9D5D4 F0F0F4F9*
02E3E7E3 40000A38 40400038 40400001 5880D1B0 45E0F010 5820D10C
1A2A5020 D10C5800 D1DC1A08 5000D1DC 5800D1D8 1A085000 D1D85800
D1A41A08 5000D1A4 5800D1D4 1A085000 C7D9D5D4 F0F0F5F0**
02E3E7E3 40000A70 40400038 40400001 D1D45920 D1104730 D94647F0
D67058E0 D1F8410E B0005000 D07458F0 D1584110 D07005EF 5800D0F8
12004730 DB6058A0 D15058B0 D1645890 C7D9D5D4 F0F0F5F1*
02E3E7E3 40000AA8 40400038 40400001 D0985850 D10C5C40 D22C5050
D2305820 D2041A25 5020D234 7822A000 5850D0E4 5C40D210 5820D1FC
1A257922 B0004730 DA9458A0 D15058B0 C7D9D5D4 F0F0F5F2*
02E3E7E3 40000AE0 40400038 40400001 D1645890 D0985800 D1145900
D0FC4750 D9C21BFF 58E0D000 07FE5800 D1141A09 5000D114 5850D0E4
5C40D210 5860D0B0 1A652B00 7806B000 C7D9D5D4 F0F0F5F3*
02E3E7E3 40000B18 40400038 40400001 6A00D088 6000D080 5830D084
```

```
10335030  D0F45830  D2041A35  2B007803  B0006A00  D0886000  D0805800
D0845000  D10058F0  D16C1800  45E0F004  C7D9D5D4  F0F0F5F4*
02E3E7E3  40000B50  40400038  40400001  00000000  00000028  5830D218
1A3545E0  F0080473  B0005830  D1FC1A35  45E0F008  0473B000  45E0F008
0450D0F4  45E0F008  0450D100  45E0F010  C7D9D5D4  F0F0F5F5*
02E3E7E3  40000B88  40400038  40400001  58F0D16C  45E0F000  00000000
000000AC  18A958B0  D0C05880  D15C185B  5C40D114  18391A35  45E0F008
01238000  879ADA6A  58A0D150  58B0D164  C7D9D5D4  F0F0F5F6*
02E3E7E3  40000BC0  40400038  40400001  5890D098  45E0F010  47F0DBCC
5800D114  5900D0FC  4750DAA8  1BFF58E0  D00007FE  5800D114  1A095000
D1145840  D2445A40  D2302B00  7804A000  C7D9D5D4  F0F0F5F7*
02E3E7E3  40000BF8  40400038  40400001  6A00D088  6000D080  5830D084
10335030  D0F458F0  D16C1800  45E0F004  00000000  0000006A  5830D1C0
5A30D230  45E0F008  0473A000  5810D234  C7D9D5D4  F0F0F5F8*

MEMBER NAME  GRNMRG
02E3E7E3  40000C30  40400038  40400001  45E0F008  0471A000  45E0F008
0450D0F4  5830D0B0  5A30D230  45E0F008  0473A000  45E0F010  58F0D16C
45E0F000  00000000  000000AC  18A958B0  C7D9D5D4  F0F0F5F9*
02E3E7E3  40000C68  40400038  40400001  D0C05880  D15C185B  5C40D114
18391A35  45E0F008  01238000  879ADB36  58A0D150  58B0D164  5890D098
45E0F010  47F0DBCC  5820D0E4  1A2A5020  C7D9D5D4  F0F0F6F0**
02E3E7E3  40000CA0  40400038  40400001  D0E45800  D1F81A06  5000D1F8
5800D1F4  1A065000  D1F45800  D1F01A06  5000D1F0  5800D1EC  1A065000
D1EC5800  D17C1A06  5000D17C  5800D1E8  C7D9D5D4  F0F0F6F1*
02E3E7E3  40000CD8  40400038  40400001  1A065000  D1E85800  D1E41A06
5000D1E4  5800D1E0  1A065000  D1E05800  D1941A06  5000D194  5920D118
47C0D58E  58A0D150  58B0D164  5890D098  C7D9D5D4  F0F0F6F2*
02E3E7E3  40000D10  40400038  40400001  1BFF58E0  D00007FE  58A0D004
58E0A00C  58B0A018  5810B014  5820D114  50201000  18DA92FF  A00C982C
A01C07FE  987B1004  58207000  5020D110  C7D9D5D4  F0F0F6F3*
02E3E7E3  40000D48  40400038  40400001  58209000  5020D118  58701014
58207000  5020D114  58201000  41302000  41500004  1B255C40  D0AC1B25
5020D150  5030D154  58201008  41302000  C7D9D5D4  F0F0F6F4*
02E3E7E3  40000D80  40400034  40400001  41500004  1B255C40  D0BC1B25
5020D164  5030D168  58201010  41302000  41500001  1B255C40  D0C01B25
5020D15C  5030D160  47F0D250  40404040  C7D9D5D4  F0F0F6F5*
02E3E7E3  40000020  40400004  40400001  00000D3C  40404040  40404040
40404040  40404040  40404040  40404040  40404040  40404040  40404040
40404040  40404040  40404040  40404040  C7D9D5D4  F0F0F6F6*
02D9D3C4  40404040  40400038  40404040  00010001  0C00091C  00010001
0C0009D8  00010001  0C000A0C  00010001  0C000B54  00010001  0C000B94
00010001  0C000C18  00010001  0C000C60  C7D9D5D4  F0F0F6F7*
02E3E7E3  40000024  40400004  40400001  00000138  40404040  40404040
40404040  40404040  40404040  40404040  40404040  40404040  40404040
40404040  40404040  40404040  40404040  C7D9D5D4  F0F0F6F8*
02E3E7E3  40000138  40400004  40400001  00000D18  40404040  40404040
40404040  40404040  40404040  40404040  40404040  40404040  40404040
40404040  40404040  40404040  40404040  C7D9D5D4  F0F0F6F9*
02E3E7E3  40000184  40400018  40400001  000001E8  0000027C  80000000
000001F0  00000258  8000026A  40404040  40404040  40404040  40404040
40404040  40404040  40404040  40404040  C7D9D5D4  F0F0F7F0**
02D9D3C4  40404040  40400038  40404040  00010001  0C000020  00010001
0C000024  00010001  0C000138  00010001  0C000184  00010001  0C000188
00010001  0C000190  00010001  0C000194  C7D9D5D4  F0F0F7F1*
02E3E7E3  4000019C  40400004  40400001  000001F0  40404040  40404040
40404040  40404040  40404040  40404040  40404040  40404040  40404040
40404040  40404040  40404040  40404040  C7D9D5D4  F0F0F7F2*
02E3E7E3  400001A4  40400008  40400001  80000000  000001F0  40404040
```

```
40404040  40404040  40404040  40404040  40404040  40404040  40404040
40404040  40404040  40404040  40404040  C7D9D5D4  F0F0F7F3*
02E3E7E3  400001B0  40400004  40400001  80000258  40404040  40404040
40404040  40404040  40404040  40404040  40404040  40404040  40404040
40404040  40404040  40404040  40404040  C7D9D5D4  F0F0F7F4*
02E3E7E3  400002A8  40400038  40400001  00000024  00000058  00000000
00000000  00000000  00000000  00000000  00000000  00000000  00000000
00000000  00000000  00000000  00000000  C7D9D5D4  F0F0F7F5*
02E3E7E3  400002E0  40400038  40400001  00000040  00000020  00000018
00000000  00000000  00000068  0000000C  00000000  00000000  00000000
00000000  01F4000B  0214000B  00B0000B  C7D9D5D4  F0F0F7F6*
02E3E7E3  40000318  40400038  40400001  00000000  00B8000C  00000000
02B0000C  00D8000C  00DC000C  00D4000D  00F8000D  00000000  00FC000D
01F0000F  00000000  0000000F  00F00011  C7D9D5D4  F0F0F7F7*
02E3E7E3  40000350  40400038  40400001  00EC0011  00E80011  00000000

MEMBER NAME  GRNMRG
00F40012  01000012  01040012  02AC0013  02C40013  00000078  0000007C
00000028  00000014  00000060  00000098  C7D9D5D4  F0F0F7F8*
02D9D3C4  40404040  40400020  40404040  00010001  0C000198  00010001
0C00019C  00010001  0C0001A8  00010001  0C0001B0  40404040  40404040
40404040  40404040  40404040  40404040  C7D9D5D4  F0F0F7F9*
02C5D5C4  40404040  40404040  40404040  40404040  40404040  40404040
00000DB4  F1F5F7F3  F460C6D6  F34040F0  F2F0F2F8  F7F0F9F8  40F0F84B
F1F64BF0  F1404040  C7D9D5D4  D9C74040  C7D9D5D4  F0F0F8F0**

MEMBER NAME  GTPRM
02C5E2C4  40404040  40400010  40400001  C7E3D7D9  D4404040  00000000
40000000  40404040  40404040  40404040  40404040  40404040  40404040
40404040  40404040  40404040  40404040  C7E3D7D9  F0F0F0F1*
02E3E7E3  40000000  40400038  40400001  47F0F00C  07C7E3D7  D9D44040
90ECD00C  184D98CD  F0205040  D00450D0  400807FC  40404040  40404040
021E1A30  40404040  E3C8C540  C3C8D6D9  C7E3D7D9  F0F0F0F2*
02E3E7E3  40000038  40400038  40400001  C440C8C5  C9C7C8E3  40E3D6D3
C5D9C1D5  C3C540C2  C5C9D5C7  40E4E2C5  C440C9E2  40407E40  0A0C0622
021A3040  404040E3  C8C540C3  C8C1C9D5  C7E3D7D9  F0F0F0F3*
02E3E7E3  40000070  40400038  40400001  C9D5C740  E3D6D3C5  D9C1D5C3
C540C2C5  C9D5C740  E4E2C5C4  40C9E240  40404040  407E400A  0C062202
1A2D4040  4040C7C5  D5C5D9C9  C340D6E4  C7E3D7D9  F0F0F0F4*
02E3E7E3  400000A8  40400038  40400001  E3D7E4E3  40E6C9D3  D340C2C5
40C3D9C5  C1E3C5C4  40D6D540  E4D5C9E3  40F1F222  021A1940  404040E2
C5D8E4C5  D5C3C540  D6D7E3C9  D6D540C9  C7E3D7D9  F0F0F0F5*
02E3E7E3  400000E0  40400038  40400001  E240D6D5  22021A1D  40404040
C2C1E3C3  C840D7C9  C5D9C3C5  40D6D7E3  C9D6D540  C9E240D6  D522021A
1B404040  40D7D3E8  40E3C1C2  D3C54040  C7E3D7D9  F0F0F0F6*
02E3E7E3  40000118  40400038  40400001  D6D7E3C9  D6D540C9  E240D6D5
22021A17  40404040  D7C9C5D9  C3C540D6  D7E3C9D6  D540C9E2  40D6D522
021A1640  404040E2  E3C9C3D2  40D6D7E3  C7E3D7D9  F0F0F0F7*
02E3E7E3  40000150  40400038  40400001  C9D6D540  C9E240D6  D522021A
16404040  40D7D3C5  C6E340D6  D7E3C9D6  D540C9E2  40D6D522  021A2E40
404040E2  C5D8E4C5  D5C3C5E2  40E6C9D3  C7E3D7D9  F0F0F0F8*
02E3E7E3  40000188  4040001E  40400001  D340D5D6  E340C2C5  40E5C5D9
C9C6C9C5  C440C6D6  D940D6E5  C5D9D3C1  D7224040  40404040  40404040
40404040  40404040  40404040  40404040  C7E3D7D9  F0F0F0F9*
02E3E7E3  400001A8  40400038  40400001  D5D6E2C5  D8404040  D7D3C5C6
E3404040  E2E3C9C3  D2404040  D7C9C5D9  C3C54040  E3C1C2D3  C5404040
C2D7C5D9  C3C54040  E2C5D8E4  D5C34040  C7E3D7D9  F0F0F1F0**
02E3E7E3  400001E0  40400020  40400001  C7C5D5C5  D9C9C340  C3C8E3D6
D37E4040  C3E4E3D6  D37E4040  40404040  40404040  40404040  40404040
```

```
40404040  40404040  40404040  40404040  C7E3D7D9  F0F0F1F1*
02C5E2C4  40404040  40400010  40400002  D6D7E3C9  D6D54040  05000000
40000020  40404040  40404040  40404040  40404040  40404040  40404040
40404040  40404040  40404040  40404040  C7E3D7D9  F0F0F1F2*
02E3E7E3  400003B8  40400030  40400001  00000000  00000000  00000001
00000001  00000005  00000006  00000007  00000064  3F10624E  3F28F5C3
00000000  00000000  40404040  40404040  C7E3D7D9  F0F0F1F3*
02C5E2C4  40404040  40400010  40400003  E3D6D3C5  D9404040  05000000
4000000C  40404040  40404040  40404040  40404040  40404040  40404040
40404040  40404040  40404040  40404040  C7E3D7D9  F0F0F1F4*
02C5E2C4  40404040  40400010  40400004  C6D7E5C1  D3404040  02000000
40000000  40404040  40404040  40404040  40404040  40404040  40404040
40404040  40404040  40404040  40404040  C7E3D7D9  F0F0F1F5*
02C5E2C4  40404040  40400010  40400005  C3C8C1D9  C6D34040  02000000
40000000  40404040  40404040  40404040  40404040  40404040  40404040
40404040  40404040  40404040  40404040  C7E3D7D9  F0F0F1F6*
02C5E2C4  40404040  40400010  40400006  C9C2C3D6  D47B4040  02000000
40000000  40404040  40404040  40404040  40404040  40404040  40404040
40404040  40404040  40404040  40404040  C7E3D7D9  F0F0F1F7*
02C5E2C4  40404040  40400010  40400007  C9E2D9C3  C8E54040  02000000
40000000  40404040  40404040  40404040  40404040  40404040  40404040
40404040  40404040  40404040  40404040  C7E3D7D9  F0F0F1F8*
02C5E2C4  40404040  40400010  40400008  D4E6C7C5  E3D74040  02000000
40000000  40404040  40404040  40404040  40404040  40404040  40404040
40404040  40404040  40404040  40404040  C7E3D7D9  F0F0F1F9*
02E3E7E3  40000458  40400038  40400001  00000000  00000000  00000000

MEMBER NAME  GTPRM
00000000  00000000  00000000  00000000  58B0D25C  58A0D1C0  5890D1E0
58F0D264  4110D0A4  05EF41E0  000415FE  C7E3D7D9  F0F0F2F0**
02E3E7E3  40000490  40400038  40400001  4720D29A  58EFD04C  07FE58F0
D2704110  D0B405EF  58F0D26C  4110D0B8  05EF41E0  000415FE  4720D2BE
58EFD054  07FE5800  D1E81200  4780D2F4  C7E3D7D9  F0F0F2F1*
02E3E7E3  400004C8  40400038  40400001  5880D1E8  5A80D1CC  4108D1F3
5000D0D0  58F0D260  4110D0D0  05EF7800  B0003200  4770D2F4  7800D1DC
7000B000  58F0D26C  4110D0D8  05EF41E0  C7E3D7D9  F0F0F2F2*
02E3E7E3  40000500  40400038  40400001  000415FE  4720D30E  58EFD05C
07FE5800  D1E81200  4780D344  5880D1E8  5A80D1CC  4108D1F3  5000D0F0
58F0D260  4110D0F0  05EF7800  B0043200  C7E3D7D9  F0F0F2F3*
02E3E7E3  40000538  40400038  40400001  4770D344  7800D1D8  7000B004
58F0D26C  4110D0F8  05EF41E0  000415FE  4720D35E  58EFD064  07FE5800
D1E81200  4780D370  58F0D258  50A0F000  C7E3D7D9  F0F0F2F4*
02E3E7E3  40000570  40400038  40400001  58F0D26C  4110D110  05EF41E0
000415FE  4720D38A  58EFD06C  07FE5800  D1E81200  4780D39C  58F0D258
50A0F004  58F0D26C  4110D128  05EF41E0  C7E3D7D9  F0F0F2F5*
02E3E7E3  400005A8  40400038  40400001  000415FE  4720D3B6  58EFD074
07FE5800  D1E81200  4780D3C8  58F0D258  50A0F008  58F0D26C  4110D140
05EF41E0  000415FE  4720D3E2  58EFD07C  C7E3D7D9  F0F0F2F6*
02E3E7E3  400005E0  40400038  40400001  07FE5800  D1E81200  4780D3F4
58F0D258  50A0F00C  58F0D26C  4110D158  05EF41E0  000415FE  4720D40E
58EFD084  07FE5800  D1E81200  4780D420  C7E3D7D9  F0F0F2F7*
02E3E7E3  40000618  40400038  40400001  58F0D258  50A0F010  58F0D26C
4110D170  05EF41E0  000415FE  4720D43A  58EFD08C  07FE5800  D1E81200
4780D44C  58F0D258  50A0F014  58F0D26C  C7E3D7D9  F0F0F2F8*
02E3E7E3  40000650  40400038  40400001  4110D188  05EF41E0  000415FE
4720D466  58EFD094  07FE5800  D1E81200  4780D478  58F0D258  50A0F018
58F0D26C  4110D1A0  05EF41E0  000415FE  C7E3D7D9  F0F0F2F9*
02E3E7E3  40000688  4040002C  40400001  4720D492  58EFD09C  07FE5800
D1E81200  4780D4A4  58F0D258  50A0F01C  58F0D268  45E0F004  00000006
```

```
00000028  40404040  40404040  40404040  C7E3D7D9  F0F0F3F0**
02D9D3C4  40404040  40400038  40404040  00020001  0C000458  00030001
0C00045C  00040001  1C000460  00050001  1C000464  00060001  1C000468
00070001  1C00046C  00080001  1C000470  C7E3D7D9  F0F0F3F1*
02E3E7E3  400006B4  40400038  40400001  45E0F008  0470B000  45E0F010
58F0D268  45E0F004  00000006  00000060  45E0F008  0470B004  45E0F010
58F0D258  5800F000  8709D4FC  58F0D268  C7E3D7D9  F0F0F3F2*
02E3E7E3  400006EC  40400038  40400001  45E0F004  00000006  00000097
45E0F010  58F0D258  5800F004  8709D51C  58F0D268  45E0F004  00000006
000000C8  45E0F010  58F0D258  5800F008  C7E3D7D9  F0F0F3F3*
02E3E7E3  40000724  40400038  40400001  8709D53C  58F0D268  45E0F004
00000006  000000E5  45E0F010  58F0D258  5800F00C  8709D55C  58F0D268
45E0F004  00000006  00000106  45E0F010  C7E3D7D9  F0F0F3F4*
02E3E7E3  4000075C  40400038  40400001  58F0D258  5800F010  8709D57C
58F0D268  45E0F004  00000006  00000125  45E0F010  58F0D258  5800F014
8709D59C  58F0D268  45E0F004  00000006  C7E3D7D9  F0F0F3F5*
02E3E7E3  40000794  40400004  40400001  00000140  40404040  40404040
40404040  40404040  40404040  40404040  40404040  40404040  40404040
40404040  40404040  40404040  40404040  C7E3D7D9  F0F0F3F6*
02D9D3C4  40404040  40400038  40404040  00010001  0C0006B0  00010001
0C0006CC  00010001  0C0006F4  00010001  0C000714  00010001  0C000734
00010001  0C000754  00010001  0C000774  C7E3D7D9  F0F0F3F7*
02E3E7E3  40000798  40400038  40400001  45E0F010  58F0D258  5800F018
8709D5BC  58F0D268  45E0F004  00000006  0000015A  45E0F010  58F0D258
5800F01C  8709D5DC  58F0D268  45E0F004  C7E3D7D9  F0F0F3F8*
02E3E7E3  400007D0  4040002A  40400001  00000006  00000174  45E0F010
1BFF58E0  D00007FE  58D0D004  58E0D00C  92FFD00C  982CD01C  07FE47F0

MEMBER NAME  GTPRM
D2744040  40404040  40404040  40404040  C7E3D7D9  F0F0F3F9*
02E3E7E3  40000020  40400008  40400001  000007F6  00000200  40404040
40404040  40404040  40404040  40404040  40404040  40404040  40404040
40404040  40404040  40404040  40404040  C7E3D7D9  F0F0F4F0**
02E3E7E3  40000200  40400004  40400001  000007E4  40404040  40404040
40404040  40404040  40404040  40404040  40404040  40404040  40404040
40404040  40404040  40404040  40404040  C7E3D7D9  F0F0F4F1*
02E3E7E3  4000024C  40400008  40400001  0000049A  000006A4  40404040
40404040  40404040  40404040  40404040  40404040  40404040  40404040
40404040  40404040  40404040  40404040  C7E3D7D9  F0F0F4F2*
02D9D3C4  40404040  40400038  40404040  00010001  0C000794  00010001
0C0007B4  00010001  0C0007D4  00010001  0C000020  00010001  0C000024
00010001  0C000200  00010001  0C00024C  C7E3D7D9  F0F0F4F3*
02E3E7E3  40000254  4040001C  40400001  000004BE  000004F4  0000050E
00000544  0000055E  00000570  0000058A  40404040  40404040  40404040
40404040  40404040  40404040  40404040  C7E3D7D9  F0F0F4F4*
02D9D3C4  40404040  40400038  40404040  00010001  0C000250  00010001
0C000254  00010001  0C000258  00010001  0C00025C  00010001  0C000260
00010001  0C000264  00010001  0C000268  C7E3D7D9  F0F0F4F5*
02E3E7E3  40000270  4040001C  40400001  0000059C  000005B6  000005C8
000005E2  000005F4  0000060E  00000620  40404040  40404040  40404040
40404040  40404040  40404040  40404040  C7E3D7D9  F0F0F4F6*
02D9D3C4  40404040  40400038  40404040  00010001  0C00026C  00010001
0C000270  00010001  0C000274  00010001  0C000278  00010001  0C00027C
00010001  0C000280  00010001  0C000284  C7E3D7D9  F0F0F4F7*
02E3E7E3  4000028C  4040001C  40400001  0000063A  0000064C  00000666
00000678  00000692  000006A4  000003F4  40404040  40404040  40404040
40404040  40404040  40404040  40404040  C7E3D7D9  F0F0F4F8*
02D9D3C4  40404040  40400038  40404040  00010001  0C000288  00010001
0C00028C  00010001  0C000290  00010001  0C000294  00010001  0C000298
```

```
00010001  0C00029C  00010001  0C0002A0  C7E3D7D9  F0F0F4F9*
02E3E7E3  400002A8  4040001C  40400001  000003C4  000003D4  800001F8
800003F4  000003F4  000003C4  000001F0  40404040  40404040  40404040
40404040  40404040  40404040  40404040  C7E3D7D9  F0F0F5F0**
02D9D3C4  40404040  40400038  40404040  00010001  0C0002A4  00010001
0C0002A8  00010001  0C0002AC  00010001  0C0002B0  00010001  0C0002B4
00010001  0C0002B8  00010001  0C0002BC  C7E3D7D9  F0F0F5F1*
02E3E7E3  400002C4  4040000C  40400001  000003D4  000003CC  800003E8
40404040  40404040  40404040  40404040  40404040  40404040  40404040
40404040  40404040  40404040  40404040  C7E3D7D9  F0F0F5F2*
02E3E7E3  400002D4  40400010  40400001  80000000  000003F4  000003C4
000001E8  40404040  40404040  40404040  40404040  40404040  40404040
40404040  40404040  40404040  40404040  C7E3D7D9  F0F0F5F3*
02D9D3C4  40404040  40400038  40404040  00010001  0C0002C0  00010001
0C0002C4  00010001  0C0002C8  00010001  0C0002CC  00030001  0C0002D4
00010001  0C0002D8  00010001  0C0002DC  C7E3D7D9  F0F0F5F4*
02E3E7E3  400002E4  4040000C  40400001  000003D4  000003CC  800003E8
40404040  40404040  40404040  40404040  40404040  40404040  40404040
40404040  40404040  40404040  40404040  C7E3D7D9  F0F0F5F5*
02E3E7E3  400002F4  40400010  40400001  80000004  000003F4  000003C4
000001E0  40404040  40404040  40404040  40404040  40404040  40404040
40404040  40404040  40404040  40404040  C7E3D7D9  F0F0F5F6*
02D9D3C4  40404040  40400038  40404040  00010001  0C0002E0  00010001
0C0002E4  00010001  0C0002E8  00010001  0C0002EC  00030001  0C0002F4
00010001  0C0002F8  00010001  0C0002FC  C7E3D7D9  F0F0F5F7*
02E3E7E3  40000304  4040001C  40400001  000003D4  000003D0  800003E8
000003F4  000003C4  000001D8  000003D4  40404040  40404040  40404040
40404040  40404040  40404040  40404040  C7E3D7D9  F0F0F5F8*

MEMBER NAME  GTPRM
02D9D3C4  40404040  40400038  40404040  00010001  0C000300  00010001
0C000304  00010001  0C000308  00010001  0C00030C  00010001  0C000310
00010001  0C000314  00010001  0C000318  C7E3D7D9  F0F0F5F9*
02E3E7E3  40000320  4040001C  40400001  000003CC  800003E8  000003F4
000003C4  000001D0  000003D4  000003CC  40404040  40404040  40404040
40404040  40404040  40404040  40404040  C7E3D7D9  F0F0F6F0**
02D9D3C4  40404040  40400038  40404040  00010001  0C00031C  00010001
0C000320  00010001  0C000324  00010001  0C000328  00010001  0C00032C
00010001  0C000330  00010001  0C000334  C7E3D7D9  F0F0F6F1*
02E3E7E3  4000033C  4040001C  40400001  800003E8  000003F4  000003C4
000001C8  000003D4  000003C8  800003E8  40404040  40404040  40404040
40404040  40404040  40404040  40404040  C7E3D7D9  F0F0F6F2*
02D9D3C4  40404040  40400038  40404040  00010001  0C000338  00010001
0C00033C  00010001  0C000340  00010001  0C000344  00010001  0C000348
00010001  0C00034C  00010001  0C000350  C7E3D7D9  F0F0F6F3*
02E3E7E3  40000358  4040001C  40400001  000003F4  000003C4  000001C0
000003D4  000003CC  800003E8  000003F4  40404040  40404040  40404040
40404040  40404040  40404040  40404040  C7E3D7D9  F0F0F6F4*
02D9D3C4  40404040  40400038  40404040  00010001  0C000354  00010001
0C000358  00010001  0C00035C  00010001  0C000360  00010001  0C000364
00010001  0C000368  00010001  0C00036C  C7E3D7D9  F0F0F6F5*
02E3E7E3  40000374  4040001C  40400001  000003C4  000001B8  000003D4
000003C8  800003E8  000003F4  000003C4  40404040  40404040  40404040
40404040  40404040  40404040  40404040  C7E3D7D9  F0F0F6F6*
02D9D3C4  40404040  40400038  40404040  00010001  0C000370  00010001
0C000374  00010001  0C000378  00010001  0C00037C  00010001  0C000380
00010001  0C000384  00010001  0C000388  C7E3D7D9  F0F0F6F7*
02E3E7E3  40000390  4040001C  40400001  000001B0  000003D4  000003C8
800003E8  000003F4  000003C4  000001A8  40404040  40404040  40404040
```

```
40404040  40404040  40404040  40404040  C7E3D7D9  F0F0F6F8*
02D9D3C4  40404040  40400038  40404040  00010001  0C00038C  00010001
0C000390  00010001  0C000394  00010001  0C000398  00010001  0C00039C
00010001  0C0003A0  00010001  0C0003A4  C7E3D7D9  F0F0F6F9*
02E3E7E3  400003AC  4040000C  40400001  000003D4  000003C8  800003E8
40404040  40404040  40404040  40404040  40404040  40404040  40404040
40404040  40404040  40404040  40404040  C7E3D7D9  F0F0F7F0**
02D9D3C4  40404040  40400020  40404040  00010001  0C0003A8  00010001
0C0003AC  00010001  0C0003B0  00010001  0C0003B4  40404040  40404040
40404040  40404040  40404040  40404040  C7E3D7D9  F0F0F7F1*
02C5D5C4  40404040  40404040  40404040  40404040  40404040  40404040
000007FA  F1F5F7F3  F460C6D6  F34040F0  F2F0F2F8  F7F0F9F8  40F0F84B
F1F64BF0  F6404040  C7E3D7D9  D4404040  C7E3D7D9  F0F0F7F2**

MEMBER NAME  HIDELN
02C5E2C4  40404040  40400010  40400001  C8C9C4C5  D3D54040  00000000
40000000  40404040  40404040  40404040  40404040  40404040  40404040
40404040  40404040  40404040  40404040  C8C9C4C5  F0F0F0F1*
02E3E7E3  40000000  40400038  40400001  47F0F00C  07C8C9C4  C5D3D540
90ECD00C  184D98CD  F0205040  D00450D0  400807FC  40404040  40404040
021A3040  40C1D9D9  C1E840D6  E5C5D9C6  C8C9C4C5  F0F0F0F2*
02E3E7E3  40000038  40400024  40400001  D3D6E640  C9D540C8  C9C4C5D3
D54B4040  C3D6D5E3  C1C3E340  D7D9D6C7  D9C1D4D4  C5D9E222  40404040
40404040  40404040  40404040  40404040  C8C9C4C5  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  C8C9C4C5  F0F0F0F4*
02E3E7E3  40000200  40400034  40400001  00000000  00000000  00000001
00000002  00000003  00000004  00000008  0000000A  3F28F5C3  3FCCCCCD
40FEB852  00000000  00000000  40404040  C8C9C4C5  F0F0F0F5*
02C5E2C4  40404040  40400010  40400003  E4D5C9E3  40404040  02000000
40000000  40404040  40404040  40404040  40404040  40404040  40404040
40404040  40404040  40404040  40404040  C8C9C4C5  F0F0F0F6*
02C5E2C4  40404040  40400010  40400004  C7C1D7D3  D5404040  02000000
40000000  40404040  40404040  40404040  40404040  40404040  40404040
40404040  40404040  40404040  40404040  C8C9C4C5  F0F0F0F7*
02C5E2C4  40404040  40400010  40400005  D4E5C3C8  D9404040  02000000
40000000  40404040  40404040  40404040  40404040  40404040  40404040
40404040  40404040  40404040  40404040  C8C9C4C5  F0F0F0F8*
02C5E2C4  40404040  40400010  40400006  C9C2C3D6  D47B4040  02000000
40000000  40404040  40404040  40404040  40404040  40404040  40404040
40404040  40404040  40404040  40404040  C8C9C4C5  F0F0F0F9*
02C5E2C4  40404040  40400010  40400007  C9D5E3C5  D9C34040  02000000
40000000  40404040  40404040  40404040  40404040  40404040  40404040
40404040  40404040  40404040  40404040  C8C9C4C5  F0F0F1F0**
02C5E2C4  40404040  40400010  40400008  D3C9D4C9  E3E54040  02000000
40000000  40404040  40404040  40404040  40404040  40404040  40404040
40404040  40404040  40404040  40404040  C8C9C4C5  F0F0F1F1*
02C5E2C4  40404040  40400010  40400009  D6E5D9D3  C1D74040  02000000
40000000  40404040  40404040  40404040  40404040  40404040  40404040
40404040  40404040  40404040  40404040  C8C9C4C5  F0F0F1F2*
02E3E7E3  40000618  40400020  40400001  00000000  00000000  00000000
00000000  00000000  00000000  00000000  00000000  40404040  40404040
40404040  40404040  40404040  40404040  C8C9C4C5  F0F0F1F3*
02D9D3C4  40404040  40400038  40404040  00020001  0C000618  00030001
1C00061C  00040001  1C000620  00050001  1C000624  00060001  1C000628
00070001  1C00062C  00080001  1C000630  C8C9C4C5  F0F0F1F4*
02C5E2C4  40404040  40400010  4040000A  D7C9C5D9  C3C54040  02000000
40000000  40404040  40404040  40404040  40404040  40404040  40404040
```

```
40404040  40404040  40404040  40404040  C8C9C4C5  F0F0F1F5*
02C5E2C4  40404040  40400010  4040000B  D7D9D6D1  D3D54040  02000000
40000000  40404040  40404040  40404040  40404040  40404040  40404040
40404040  40404040  40404040  40404040  C8C9C4C5  F0F0F1F6*
02E3E7E3  40000638  4040000C  40400001  00000000  00000000  00000000
40404040  40404040  40404040  40404040  40404040  40404040  40404040
40404040  40404040  40404040  40404040  C8C9C4C5  F0F0F1F7*
02E3E7E3  400002C8  40400004  40400001  00000062  40404040  40404040
40404040  40404040  40404040  40404040  40404040  40404040  40404040
40404040  40404040  40404040  40404040  C8C9C4C5  F0F0F1F8*
02E3E7E3  4000066C  40400038  40400001  5860D5B8  58A0D5E0  5890D1A8
5870D1A0  5800D1B0  5000D204  7800D1A4  7000D270  5070D26C  7800D1E4
7000D248  7000D240  7800D1F4  7000D258  C8C9C4C5  F0F0F1F9*
02E3E7E3  400006A4  40400038  40400001  7000D250  7800D1E4  7900D1E8

MEMBER NAME  HIDELN
4730D65C  7800D1E8  7000D240  7800D1E4  7900D1E8  4750D670  7800D1E8
7000D248  7800D1F4  7900D1F8  4730D684  C8C9C4C5  F0F0F2F0**
02E3E7E3  400006DC  40400038  40400001  7800D1F8  7000D250  7800D1F4
7900D1F8  4750D698  7800D1F8  7000D258  7800D1E8  7B00D1E4  7000D1D8
7800D1F8  7B00D1F4  7000D1DC  7800D1A4  C8C9C4C5  F0F0F2F1*
02E3E7E3  40000714  40400038  40400001  7000D1E0  58F0D5BC  4110D06C
05EF5800  D2641B09  5000D210  5090D1D4  7820D1C4  7C20D1D8  7020D5FC
7020D5F0  7820D1C4  7C20D1DC  7020D600  C8C9C4C5  F0F0F2F2*
02E3E7E3  4000074C  40400038  40400001  7020D5F4  5880D1B4  58B0D1AC
5850D1D4  5C40D1B8  18251A28  7842A000  7040D1EC  18255A20  D1B87862
A0007060  D1FC5850  D1D41A59  5050D5F8  C8C9C4C5  F0F0F2F3*
02E3E7E3  40000784  40400038  40400001  5C40D1B8  18251A28  7822A000
7020D1F0  18255A20  D1B87802  A0007000  D2007040  D24C7040  D2447060
D25C7060  D2543942  4730D75C  7020D244  C8C9C4C5  F0F0F2F4*
02E3E7E3  400007BC  40400038  40400001  7800D1EC  7900D1F0  4750D770
7800D1F0  7000D24C  7800D1FC  7900D200  4730D784  7800D200  7000D254
7800D1FC  7900D200  4750D798  7800D200  C8C9C4C5  F0F0F2F5*
02E3E7E3  400007F4  40400038  40400001  7000D25C  58F0D5D0  4110D078
05EF5800  D20C1200  4780DAAC  5080D204  7860D1E4  7B60D1EC  30667820
D1F47B20  D1FC3022  7020D218  7840D1E8  C8C9C4C5  F0F0F2F6*
02E3E7E3  4000082C  40400038  40400001  7B40D1F0  30447040  D21C7820
D1F87B20  D2003022  7020D220  79606004  47A0D810  7800D218  79006004
47A0D810  79406004  47A0D810  79206004  C8C9C4C5  F0F0F2F7*
02E3E7E3  40000864  40400038  40400001  47A0D810  1BFF58E0  D00007FE
7860D1E4  7B60D1F0  30667820  D1F47B20  D2003022  7020D218  7840D1E8
7B40D1EC  30447040  D21C7820  D1F87B20  C8C9C4C5  F0F0F2F8*
02E3E7E3  4000089C  40400038  40400001  D1FC3022  7020D220  79606004
47A0D870  7800D218  79006004  47A0D870  79406004  47A0D870  79206004
47A0D870  1BFF58E0  D00007FE  5800D1B0  C8C9C4C5  F0F0F2F9*
02E3E7E3  400008D4  40400038  40400001  5000D204  4100D284  5000D0BC
4100D288  5000D0C0  9280D0C0  58F0D5CC  4110D09C  05EF41E0  000415FE
4720D8A6  58EFD04C  07FE58F0  D5DC4110  C8C9C4C5  F0F0F3F0**
02E3E7E3  4000090C  40400038  40400001  D0C405EF  41E00008  15FE4720
D8C058EF  D05407FE  47F0DAAC  58F0D5DC  4110D0D8  05EF41E0  000815FE
4720D8DE  58EFD060  07FE47F0  DAAC5800  C8C9C4C5  F0F0F3F1*
02E3E7E3  40000944  40400038  40400001  D1AC5000  D2041BFF  58E0D000
07FE1829  58F0D5C4  4110D0EC  05EF58F0  D5C44110  D0F805EF  7800D5FC
7000D5E8  7800D600  7000D5EC  5880D1BC  C8C9C4C5  F0F0F3F2*
02E3E7E3  4000097C  40400038  40400001  18B219B8  47C0D928  5070D234
19B847C0  D93247F0  D95E7820  D2747A20  D5E87020  D2747820  D2787A20
D5EC7020  D27858F0  D5D84110  D10405EF  C8C9C4C5  F0F0F3F3*
02E3E7E3  400009B4  40400038  40400001  1AB95990  D2344780  D91E58B0
D1AC5880  D1B41829  7800D5F0  7000D5E8  7800D5F4  7000D5EC  5880D1BC
```

```
18B219B8 47C0D988 5070D238 19B847C0 C8C9C4C5 F0F0F3F4*
02E3E7E3 400009EC 40400038 40400001 D99247F0 D9BE7820 D27C7B20
D5E87020 D27C7820 D2807B20 D5EC7020 D28058F0 D5D84110 D11405EF
1AB95990 D2384780 D97E58B0 D1AC5880 C8C9C4C5 F0F0F3F5*
02E3E7E3 40000A24 40400038 40400001 D1B45800 D2341200 4770D9DA
5800D238 12004780 DAAC59B0 D2344770 D9EA59B0 D2384780 DAAC59B0
D2344770 DA005800 D2381200 4770DA00 C8C9C4C5 F0F0F3F6*
02E3E7E3 40000A5C 40400038 40400001 50B0D204 5800D234 12004770
DA1659B0 D2384770 DA1650B0 D20459B0 D2044770 DA261BFF 58E0D000
07FE47F0 DAAC58F0 D5D44110 D12405EF C8C9C4C5 F0F0F3F7*
02E3E7E3 40000A94 40400038 40400001 7800D23C 32004780 DAAC7820
D23C7A20 D2707020 D2707920 D1C847C0 DA565080 D2045980 D2044770
DA661BFF 58E0D000 07FE5820 D26C1A29 C8C9C4C5 F0F0F3F8*
02E3E7E3 40000ACC 40400038 40400001 5020D26C 18328930 00037800
D2247003 D2847800 D22C7003 D2881A29 5020D26C 5920D268 47C0DA98

MEMBER NAME  HIDELN
47F0DB50 89200003 7800D228 7002D284 C8C9C4C5 F0F0F3F9*
02E3E7E3 40000B04 40400038 40400001 7800D230 7002D288 5800D5F8
5000D1D4 5900D210 47C0D6F8 5800D26C 12004780 DAD858F0 D5C04110
D15805EF 1BFF58E0 D00007FE 7820D1C0 C8C9C4C5 F0F0F4F0**
02E3E7E3 40000B3C 40400038 40400001 7C20D1D8 7020D604 7A20D1E4
7020D284 7820D1C0 7C20D1DC 7020D608 7A20D1F4 7020D288 58F0D5D8
4110D17C 05EF7820 D1E87B20 D6047020 C8C9C4C5 F0F0F4F1*
02E3E7E3 40000B74 40400038 40400001 D2847820 D1F87B20 D6087020
D28858F0 D5D84110 D18C05EF 5800D234 5900D1AC 4780DB44 5800D238
5900D1AC 4770DB48 5090D204 1BFF58E0 C8C9C4C5 F0F0F4F2*
02E3E7E3 40000BAC 40400038 40400001 D00007FE 58F0D5C8 45E0F004
00000006 00000028 45E0F010 58F0D5C8 45E0F034 05404040 F4F458A0
D00458E0 A00C58B0 A0185810 B0045820 C8C9C4C5 F0F0F4F3*
02E3E7E3 40000BE4 40400038 40400001 D2645020 10005830 B0087820
D1E47020 30005840 B00C7840 D1F47040 40005850 B0107860 D1E87060
50005860 B0147800 D1F87000 60005870 C8C9C4C5 F0F0F4F4*
02E3E7E3 40000C1C 40400038 40400001 B0185880 D2045080 700018DA
92FFA00C 982CA01C 07FE987B 10045820 70005020 D2647820 80007020
D1E47820 90007020 D1F47820 A0007020 C8C9C4C5 F0F0F4F5*
02E3E7E3 40000C54 40400038 40400001 D1E87820 B0007020 D1F85870
10185820 70005020 D2045820 10004130 20004150 00041B25 5C40D1AC
1B255020 D5E05030 D5E45030 D1045030 C8C9C4C5 F0F0F4F6*
02E3E7E3 40000C8C 40400012 40400001 D1145030 D1685030 D17C5030
D18C47F0 D60C4040 40404040 40404040 40404040 40404040 40404040
40404040 40404040 40404040 40404040 C8C9C4C5 F0F0F4F7*
02E3E7E3 40000020 40400008 40400001 00000C32 00000060 40404040
40404040 40404040 40404040 40404040 40404040 40404040 40404040
40404040 40404040 40404040 40404040 C8C9C4C5 F0F0F4F8*
02E3E7E3 40000060 40400004 40400001 00000BD2 40404040 40404040
40404040 40404040 40404040 40404040 40404040 40404040 40404040
40404040 40404040 40404040 40404040 C8C9C4C5 F0F0F4F9*
02E3E7E3 400000AC 40400004 40400001 00000906 40404040 40404040
40404040 40404040 40404040 40404040 40404040 40404040 40404040
40404040 40404040 40404040 40404040 C8C9C4C5 F0F0F5F0**
02D9D3C4 40404040 40400038 40404040 00090001 1C000634 000A0001
1C000638 000B0001 1C00063C 00010001 0C000BBC 00010001 0C000020
00010001 0C000024 00010001 0C000060 C8C9C4C5 F0F0F5F1*
02E3E7E3 400000B0 4040001C 40400001 00000A8A 00000920 00000924
00000B0C 0000093E 00000942 00000952 40404040 40404040 40404040
40404040 40404040 40404040 40404040 C8C9C4C5 F0F0F5F2*
02D9D3C4 40404040 40400038 40404040 00010001 0C0000AC 00010001
0C0000B0 00010001 0C0000B4 00010001 0C0000B8 00010001 0C0000BC
```

```
00010001  0C0000C0  00010001  0C0000C4  C8C9C4C5  F0F0F5F3*
02E3E7E3  400000CC  4040001C  40400001  00000238  0000023C  80000240
000002A8  000002A0  000002B8  000002B0  40404040  40404040  40404040
40404040  40404040  40404040  40404040  C8C9C4C5  F0F0F5F4*
02D9D3C4  40404040  40400038  40404040  00010001  0C0000C8  00010001
0C0000CC  00010001  0C0000D0  00010001  0C0000D4  00010001  0C0000D8
00010001  0C0000DC  00010001  0C0000E0  C8C9C4C5  F0F0F5F5*
02E3E7E3  400000E8  4040001C  40400001  000002AC  000002A4  000002BC
000002B4  8000026C  00000244  00000254  40404040  40404040  40404040
40404040  40404040  40404040  40404040  C8C9C4C5  F0F0F5F6*
02D9D3C4  40404040  40400038  40404040  00010001  0C0000E4  00010001
0C0000E8  00010001  0C0000EC  00010001  0C0000F0  00010001  0C0000F4
00010001  0C0000F8  00010001  0C0000FC  C8C9C4C5  F0F0F5F7*
02E3E7E3  40000104  40400018  40400001  00000248  00000258  0000024C
0000025C  00000250  00000260  40404040  40404040  40404040  40404040
40404040  40404040  40404040  40404040  C8C9C4C5  F0F0F5F8*

MEMBER NAME  HIDELN
02E3E7E3  40000120  40400008  40400001  80000000  000002E4  40404040
40404040  40404040  40404040  40404040  40404040  40404040  40404040
40404040  40404040  40404040  40404040  C8C9C4C5  F0F0F5F9*
02D9D3C4  40404040  40400038  40404040  00010001  0C000100  00010001
0C000104  00010001  0C000108  00010001  0C00010C  00010001  0C000110
00010001  0C000114  00010001  0C000118  C8C9C4C5  F0F0F6F0**
02E3E7E3  40000128  4040001C  40400001  00000244  00000254  00000248
80000258  000002E4  0000024C  0000025C  40404040  40404040  40404040
40404040  40404040  40404040  40404040  C8C9C4C5  F0F0F6F1*
02D9D3C4  40404040  40400038  40404040  00010001  0C000124  00010001
0C000128  00010001  0C00012C  00010001  0C000130  00010001  0C000134
00010001  0C000138  00010001  0C00013C  C8C9C4C5  F0F0F6F2*
02E3E7E3  40000144  4040001C  40400001  00000250  80000260  00000218
000002D4  800002E4  00000218  000002DC  40404040  40404040  40404040
40404040  40404040  40404040  40404040  C8C9C4C5  F0F0F6F3*
02D9D3C4  40404040  40400038  40404040  00010001  0C000140  00010001
0C000144  00010001  0C000148  00010001  0C00014C  00010001  0C000150
00010001  0C000154  00010001  0C000158  C8C9C4C5  F0F0F6F4*
02E3E7E3  40000160  40400004  40400001  800002E4  40404040  40404040
40404040  40404040  40404040  40404040  40404040  40404040  40404040
40404040  40404040  40404040  40404040  C8C9C4C5  F0F0F6F5*
02E3E7E3  40000168  4040000C  40400001  000002C4  000002D4  80000294
40404040  40404040  40404040  40404040  40404040  40404040  40404040
40404040  40404040  40404040  40404040  C8C9C4C5  F0F0F6F6*
02E3E7E3  40000178  4040000C  40400001  000002C4  000002DC  80000298
40404040  40404040  40404040  40404040  40404040  40404040  40404040
40404040  40404040  40404040  40404040  C8C9C4C5  F0F0F6F7*
02D9D3C4  40404040  40400038  40404040  00010001  0C00015C  00010001
0C000160  00010001  0C000168  00010001  0C00016C  00010001  0C000170
00010001  0C000178  00010001  0C00017C  C8C9C4C5  F0F0F6F8*
02E3E7E3  40000184  4040001C  40400001  00000244  00000254  00000248
00000258  0000024C  0000025C  00000250  40404040  40404040  40404040
40404040  40404040  40404040  40404040  C8C9C4C5  F0F0F6F9*
02D9D3C4  40404040  40400038  40404040  00010001  0C000180  00010001
0C000184  00010001  0C000188  00010001  0C00018C  00010001  0C000190
00010001  0C000194  00010001  0C000198  C8C9C4C5  F0F0F7F0**
02E3E7E3  400001A0  4040001C  40400001  00000260  0000029C  00000284
0000028C  00000288  80000290  00000244  40404040  40404040  40404040
40404040  40404040  40404040  40404040  C8C9C4C5  F0F0F7F1*
02D9D3C4  40404040  40400038  40404040  00010001  0C00019C  00010001
0C0001A0  00010001  0C0001A4  00010001  0C0001A8  00010001  0C0001AC
```

```
00010001  0C0001B0  00010001  0C0001B4  C8C9C4C5  F0F0F7F2*
02E3E7E3  400001BC  4040000C  40400001  00000254  00000248  00000258
40404040  40404040  40404040  40404040  40404040  40404040  40404040
40404040  40404040  40404040  40404040  C8C9C4C5  F0F0F7F3*
02E3E7E3  400001CC  40400010  40400001  000002C4  000002EC  000002CC
80000264  40404040  40404040  40404040  40404040  40404040  40404040
40404040  40404040  40404040  40404040  C8C9C4C5  F0F0F7F4*
02D9D3C4  40404040  40400038  40404040  00010001  0C0001B8  00010001
0C0001BC  00010001  0C0001C0  00010001  0C0001C4  00010001  0C0001CC
00010001  0C0001D0  00010001  0C0001D4  C8C9C4C5  F0F0F7F5*
02E3E7E3  400001E0  4040000C  40400001  000002C4  000002E4  80000294
40404040  40404040  40404040  40404040  40404040  40404040  40404040
40404040  40404040  40404040  40404040  C8C9C4C5  F0F0F7F6*
02E3E7E3  400001F0  4040000C  40400001  000002C4  000002E4  80000298
40404040  40404040  40404040  40404040  40404040  40404040  40404040
40404040  40404040  40404040  40404040  C8C9C4C5  F0F0F7F7*
02E3E7E3  40000648  40400024  40400001  00000000  00000000  00000000

MEMBER NAME  HIDELN
00000000  00000000  00000000  00000000  00000000  00000000  40404040
40404040  40404040  40404040  40404040  C8C9C4C5  F0F0F7F8*
02D9D3C4  40404040  40400038  40404040  00010001  0C0001D8  00010001
0C0001E0  00010001  0C0001E4  00010001  0C0001E8  00010001  0C0001F0
00010001  0C0001F4  00010001  0C0001F8  C8C9C4C5  F0F0F7F9*
02C5D5C4  40404040  40404040  40404040  40404040  40404040  40404040
00000C9E  F1F5F7F3  F460C6D6  F34040F0  F2F0F2F8  F7F0F9F8  40F0F84B
F1F64BF1  F1404040  C8C9C4C5  D3D54040  C8C9C4C5  F0F0F8F0**

MEMBER NAME  HLDRV
02C5E2C4  40404040  40400010  40400001  C8D3C4D9  E5404040  00000000
40000000  40404040  40404040  40404040  40404040  40404040  40404040
40404040  40404040  40404040  40404040  C8D3C4D9  F0F0F0F1*
02E3E7E3  40000000  40400028  40400001  47F0F00C  07C8D3C4  D9E54040
90ECD00C  184D98CD  F0205040  D00450D0  400807FC  40404040  40404040
40404040  40404040  40404040  40404040  C8D3C4D9  F0F0F0F2*
02E3E7E3  40000090  40400028  40400001  00000000  00000001  00000001
00000002  00000003  00000004  00000005  00000006  00000000  00000000
40404040  40404040  40404040  40404040  C8D3C4D9  F0F0F0F3*
02C5E2C4  40404040  40400010  40400002  C8C9C4C5  D3D54040  02000000
40000000  40404040  40404040  40404040  40404040  40404040  40404040
40404040  40404040  40404040  40404040  C8D3C4D9  F0F0F0F4*
02E3E7E3  400000E8  40400004  40400001  00000000  40404040  40404040
40404040  40404040  40404040  40404040  40404040  40404040  40404040
40404040  40404040  40404040  40404040  C8D3C4D9  F0F0F0F5*
02E3E7E3  400000F0  40400008  40400001  00000000  00000000  40404040
40404040  40404040  40404040  40404040  40404040  40404040  40404040
40404040  40404040  40404040  40404040  C8D3C4D9  F0F0F0F6*
02E3E7E3  400000FC  40400004  40400001  00000000  40404040  40404040
40404040  40404040  40404040  40404040  40404040  40404040  40404040
40404040  40404040  40404040  40404040  C8D3C4D9  F0F0F0F7*
02E3E7E3  40000108  40400038  40400001  58B0D0C0  58A0D068  5890D070
50A0B004  50A0B008  50A0B00C  50A0B010  50A0B014  50A0B018  5800D0B4
1B095000  D0AC1839  5890D06C  58A0D0CC  C8D3C4D9  F0F0F0F8*
02E3E7E3  40000140  40400038  40400001  18835A80  D0701873  5C60D0DC
18275A20  D07C7802  A0007000  D0981827  5A20D0DC  7802A000  7000D0A0
18585C40  D0DC1825  5A20D07C  7802A000  C8D3C4D9  F0F0F0F9*
02E3E7E3  40000178  40400038  40400001  7000D09C  18255A20  D0DC7802
A0007000  D0A458F0  D0C84110  D04C05EF  5800D0A8  5900D074  4770D178
5800D0A8  5900D074  4770D188  5090B008  C8D3C4D9  F0F0F1F0**
```

```
02E3E7E3  400001B0  40400038  40400001  5800D0A8  5900D074  4770D1A4
58A0D068  5890D070  1BFF58E0  D00007FE  5800D0A8  5900D070  4770D1B4
5090B004  5800D0A8  5900D078  4770D1C4  C8D3C4D9  F0F0F1F1*
02E3E7E3  400001E8  40400038  40400001  5090B00C  5800D0A8  5900D07C
4770D1D4  5090B010  5800D0A8  5900D080  4770D1E4  5090B014  5800D0A8
5900D084  4770D1F4  5090B018  18385980  C8D3C4D9  F0F0F1F2*
02E3E7E3  40000220  40400038  40400001  D0AC47C0  D11858A0  D0685890
D0701BFF  58E0D000  07FE58A0  D00458E0  A00C58B0  A0185810  B00C5820
D0B85020  100018DA  92FFA00C  982CA01C  C8D3C4D9  F0F0F1F3*
02E3E7E3  40000258  40400038  40400001  07FE987A  10045820  70005020
D0B45820  90005020  D0B85820  10004130  20004150  00041B25  5C40D074
1B255020  D0CC5030  D0D05820  10084130  C8D3C4D9  F0F0F1F4*
02E3E7E3  40000290  40400034  40400001  20004150  00041B25  5C40D074
1B255020  D0D45030  D0D85030  D04C5820  10104130  20004150  00041B25
5020D0C0  5030D0C4  47F0D0E0  40404040  C8D3C4D9  F0F0F1F5*
02E3E7E3  40000020  4040000C  40400001  0000025A  00000028  00000236
40404040  40404040  40404040  40404040  40404040  40404040  40404040
40404040  40404040  40404040  40404040  C8D3C4D9  F0F0F1F6*
02E3E7E3  40000078  40400010  40400001  000000E0  000000C0  000000C8
000000C4  40404040  40404040  40404040  40404040  40404040  40404040
40404040  40404040  40404040  40404040  C8D3C4D9  F0F0F1F7*
02D9D3C4  40404040  40400038  40404040  00020001  1C0000F0  00010001
0C000020  00010001  0C000024  00010001  0C000028  00010001  0C000078
00010001  0C00007C  00010001  0C000080  C8D3C4D9  F0F0F1F8*
02E3E7E3  40000088  40400008  40400001  000000CC  800000D0  40404040
40404040  40404040  40404040  40404040  40404040  40404040  40404040
40404040  40404040  40404040  40404040  C8D3C4D9  F0F0F1F9*
02E3E7E3  40000104  40400004  40400001  00000008  40404040  40404040

MEMBER NAME  HLDRV
40404040  40404040  40404040  40404040  40404040  40404040  40404040
40404040  40404040  40404040  40404040  C8D3C4D9  F0F0F2F0**
02D9D3C4  40404040  40400018  40404040  00010001  0C000084  00010001
0C000088  00010001  0C00008C  40404040  40404040  40404040  40404040
40404040  40404040  40404040  40404040  C8D3C4D9  F0F0F2F1*
02C5D5C4  40404040  40404040  40404040  40404040  40404040  40404040
000002C4  F1F5F7F3  F460C6D6  F34040F0  F2F0F2F8  F7F0F9F8  40F0F84B
F1F64BF1  F6404040  C8D3C4D9  E5404040  C8D3C4D9  F0F0F2F2**

MEMBER NAME  INTDRV
02C5E2C4  40404040  40400010  40400001  C9D5E3C4  D9E54040  00000000
40000000  40404040  40404040  40404040  40404040  40404040  40404040
40404040  40404040  40404040  40404040  C9D5E3C4  F0F0F0F1*
02E3E7E3  40000000  40400028  40400001  47F0F00C  07C9D5E3  C4D9E540
90ECD00C  184D98CD  F0205040  D00450D0  400807FC  40404040  40404040
40404040  40404040  40404040  40404040  C9D5E3C4  F0F0F0F2*
02C5E2C4  40404040  40400010  40400002  E3D6D3C5  D9404040  05000000
4000000C  40404040  40404040  40404040  40404040  40404040  40404040
40404040  40404040  40404040  40404040  C9D5E3C4  F0F0F0F3*
02E3E7E3  40000128  40400034  40400001  00000000  00000000  00000000
00000001  00000001  00000002  00000003  00000004  00000008  3FCCCCCD
41100000  00000000  00000000  40404040  C9D5E3C4  F0F0F0F4*
02C5E2C4  40404040  40400010  40400003  E4D5C9E3  40404040  02000000
40000000  40404040  40404040  40404040  40404040  40404040  40404040
40404040  40404040  40404040  40404040  C9D5E3C4  F0F0F0F5*
02E3E7E3  400001D8  40400008  40400001  00000000  00000000  40404040
40404040  40404040  40404040  40404040  40404040  40404040  40404040
40404040  40404040  40404040  40404040  C9D5E3C4  F0F0F0F6*
02E3E7E3  400001E4  40400008  40400001  00000000  00000000  40404040
```

40404040 40404040 40404040 40404040 40404040 40404040 40404040
40404040 40404040 40404040 40404040 C9D5E3C4 F0F0F0F7*
02E3E7E3 400001F0 40400004 40400001 00000000 40404040 40404040
40404040 40404040 40404040 40404040 40404040 40404040 40404040
40404040 40404040 40404040 40404040 C9D5E3C4 F0F0F0F8*
02C5E2C4 40404040 40400010 40400004 D4E5C3C8 D9404040 02000000
40000000 40404040 40404040 40404040 40404040 40404040 40404040
40404040 40404040 40404040 40404040 C9D5E3C4 F0F0F0F9*
02E3E7E3 400001F8 40400004 40400001 00000000 40404040 40404040
40404040 40404040 40404040 40404040 40404040 40404040 40404040
40404040 40404040 40404040 40404040 C9D5E3C4 F0F0F1F0**
02C5E2C4 40404040 40400010 40400005 C9D5E3C5 D9C34040 02000000
40000000 40404040 40404040 40404040 40404040 40404040 40404040
40404040 40404040 40404040 40404040 C9D5E3C4 F0F0F1F1*
02E3E7E3 40000200 40400008 40400001 00000000 00000000 40404040
40404040 40404040 40404040 40404040 40404040 40404040 40404040
40404040 40404040 40404040 40404040 C9D5E3C4 F0F0F1F2*
02C5E2C4 40404040 40400010 40400006 D3C9D4C9 E3E54040 02000000
40000000 40404040 40404040 40404040 40404040 40404040 40404040
40404040 40404040 40404040 40404040 C9D5E3C4 F0F0F1F3*
02C5E2C4 40404040 40400010 40400007 D7D9C3C4 D9E54040 02000000
40000000 40404040 40404040 40404040 40404040 40404040 40404040
40404040 40404040 40404040 40404040 C9D5E3C4 F0F0F1F4*
02C5E2C4 40404040 40400010 40400008 D7D9D6D1 D3D54040 02000000
40000000 40404040 40404040 40404040 40404040 40404040 40404040
40404040 40404040 40404040 40404040 C9D5E3C4 F0F0F1F5*
02E3E7E3 4000020C 40400014 40400001 00000000 00000000 00000000
00000000 00000000 40404040 40404040 40404040 40404040 40404040
40404040 40404040 40404040 40404040 C9D5E3C4 F0F0F1F6*
02E3E7E3 40000298 40400038 40400001 5860D110 5800D104 5000D16C
5060D134 5800D11C 5000D204 5800D120 5000D20C 5800D23C 5000D248
5800D238 5000D24C 5800D260 5000D250 C9D5E3C4 F0F0F1F7*
02E3E7E3 400002D0 40400038 40400001 5800D264 5000D254 5800D268
5000D258 5800D26C 5000D25C 5880D238 5890D120 58B0D1B4 58A0D1D0
5870D1C8 58E0D248 582E7000 5020D15C C9D5E3C4 F0F0F1F8*
02E3E7E3 40000308 40400038 40400001 58E0D24C 5A2E7000 5B20D114
5020D168 58E0D250 410EA000 5000D06C 58E0D254 410EA000 5000D070
58E0D258 410EA000 5000D074 58E0D25C C9D5E3C4 F0F0F1F9*
02E3E7E3 40000340 40400038 40400001 410EA000 5000D078 4100B004

MEMBER NAME INTDRV
5000D07C 4100B008 5000D080 4100B00C 5000D084 4100B010 5000D088
58F0D1E8 4110D06C 05EF5800 D1641200 C9D5E3C4 F0F0F2F0**
02E3E7E3 40000378 40400038 40400001 4770D364 5960D134 4770D364
1BFF58E0 D00007FE 5800D164 12004780 D6B45800 D1045000 D1885800
D1005000 D1605800 D15C5000 D1381830 C9D5E3C4 F0F0F2F1*
02E3E7E3 400003B0 40400038 40400001 1C291803 5A00D11C 5000D208
1A395030 D2105870 D16858B0 D1C058A0 D1F45880 D1DC5800 D1881A06
5000D188 5800D160 1BFF870F D3CA5800 C9D5E3C4 F0F0F2F2*
02E3E7E3 400003E8 40400038 40400001 D1005000 D16047F0 D68C5850
D1381A56 5050D13C 5C40D120 18355A30 D11C5030 D2141825 5A20D120
5020D218 41008004 5000D090 41008008 C9D5E3C4 F0F0F2F3*
02E3E7E3 40000420 40400038 40400001 5000D094 4100800C 5000D098
41008010 5000D09C 58E0D208 410EB000 5000D0A0 58E0D210 410EB000
5000D0A4 4103B000 5000D0A8 4102B000 C9D5E3C4 F0F0F2F4*
02E3E7E3 40000458 40400038 40400001 5000D0AC 58F0D1E4 4110D090
05EF41E0 000415FE 4720D44E 58EFD04C 07FE7800 D1747000 D19C7800
D1787000 D1A07800 80047000 D14C7800 C9D5E3C4 F0F0F2F5*
02E3E7E3 40000490 40400038 40400001 80087000 D1547800 800C7000

```
D1507800  80107000  D15858F0  D1F04110  D0B805EF  41E00008  15FE4720
D49858EF  D05407FE  47F0D68C  58E0D208  C9D5E3C4  F0F0F2F6*
02E3E7E3  400004C8  40400038  40400001  782EB000  7020D14C  7020D21C
58E0D210  782EB000  7020D154  7020D220  58E0D214  780EB000  7000D150
58E0D218  780EB000  7000D158  58F0D1F0  C9D5E3C4  F0F0F2F7*
02E3E7E3  40000500  40400038  40400001  4110D0B8  05EF41E0  000815FE
4720D4EE  58EFD060  07FE47F0  D68C5960  D1884770  D52A7840  D19C7B40
D21C3044  7820D1A0  7B20D220  30227020  C9D5E3C4  F0F0F2F8*
02E3E7E3  40000538  40400038  40400001  D18458F0  D1B07940  F00447A0
D52A58F0  D1B07920  F0044750  D68C5800  D10C5000  D1607820  800C7B20
80047020  D1407820  80107B20  80087020  C9D5E3C4  F0F0F2F9*
02E3E7E3  40000570  40400038  40400001  D1447800  D1087000  D14858F0
D1BC4110  D0CC05EF  7820D19C  7020D224  7020D194  7820D1A0  7020D228
7020D198  7800D108  7000D17C  7820D140  C9D5E3C4  F0F0F3F0**
02E3E7E3  400005A8  40400038  40400001  7C20D124  7020D1FC  7020D22C
7820D144  7C20D124  7020D200  7020D230  189658A0  D1C87820  D1947A20
D1FC7020  D1947820  D1987A20  D2007020  C9D5E3C4  F0F0F3F1*
02E3E7E3  400005E0  40400038  40400001  D19858F0  D1EC4110  D0D805EF
5990D164  4780D5A2  58A0D1F4  5800D164  5900D114  4770D5E4  7800D128
7000D17C  7800D224  7000D194  7800D228  C9D5E3C4  F0F0F3F2*
02E3E7E3  40000618  40400038  40400001  7000D198  7800D22C  7000D1FC
7800D230  7000D200  189658A0  D1C87820  D1947B20  D1FC7020  D1947820
D1987B20  D2007020  D19858F0  D1EC4110  C9D5E3C4  F0F0F3F3*
02E3E7E3  40000650  40400038  40400001  D0D805EF  5990D164  4780D60A
58A0D1F4  7800D17C  7900D128  4770D650  5800D164  5900D114  4770D66A
7800D17C  32004770  D6665800  D1645900  C9D5E3C4  F0F0F3F4*
02E3E7E3  40000688  40400038  40400001  D1144780  D66A47F0  D68C5800
D16C1A06  5000D16C  18208920  00034102  A0045000  D0F458F0  D1D84110
D0F005EF  5800D210  5A00D120  5000D210  C9D5E3C4  F0F0F3F5*
02E3E7E3  400006C0  40400038  40400001  5800D208  5A00D120  5000D208
5820D138  1A265020  D1381927  47C0D3AA  5870D1C8  58A0D1D0  58B0D1B4
5890D120  5880D238  5820D134  1A265020  C9D5E3C4  F0F0F3F6*
02E3E7E3  400006F8  40400038  40400001  D1345800  D25C1A08  5000D25C
5800D258  1A085000  D2585800  D2541A08  5000D254  5800D250  1A085000
D2505800  D24C1A09  5000D24C  5800D248  C9D5E3C4  F0F0F3F7*
02E3E7E3  40000730  40400038  40400001  1A095000  D2485920  D17047C0
D2D41BFF  58E0D000  07FE58A0  D00458E0  A00C58B0  A0185810  B00C5820
D1705020  10005830  B0145840  D18C5040  C9D5E3C4  F0F0F3F8*
02E3E7E3  40000768  40400038  40400001  30005850  B0205860  D16C5060
500018DA  92FFA00C  982CA01C  07FE987B  100C5820  70005020  D1705820

MEMBER NAME  INTDRV
90005020  D18C5870  10205820  70005020  C9D5E3C4  F0F0F3F9*
02E3E7E3  400007A0  40400038  40400001  D16C5820  10004130  20004150
00041B25  5020D1DC  5030D1E0  58201004  41302000  41500004  1B255C40
D1141B25  5020D1C8  5030D1CC  5030D0E4  C9D5E3C4  F0F0F4F0**
02E3E7E3  400007D8  40400038  40400001  58201008  41302000  41500004
1B255C40  D11C1B25  5020D1D0  5030D1D4  58201010  41302000  41500004
1B255C40  D1141B25  5020D1C0  5030D1C4  C9D5E3C4  F0F0F4F1*
02E3E7E3  40000810  40400038  40400001  5030D0DC  58201018  41302000
41500004  1B255020  D1B45030  D1B85820  101C4130  20004150  00041B25
5B20D120  5020D1F4  5030D1F8  47F0D270  C9D5E3C4  F0F0F4F2*
02E3E7E3  40000020  40400004  40400001  00000782  40404040  40404040
40404040  40404040  40404040  40404040  40404040  40404040  40404040
40404040  40404040  40404040  40404040  C9D5E3C4  F0F0F4F3*
02D9D3C4  40404040  40400038  40404040  00020001  0C0001D8  00030001
1C0001E4  00040001  1C000200  00050001  1C00020C  00060001  1C000210
00070001  1C000214  00080001  1C000218  C9D5E3C4  F0F0F4F4*
02E3E7E3  40000024  40400008  40400001  00000028  00000746  40404040
```

```
40404040  40404040  40404040  40404040  40404040  40404040  40404040
40404040  40404040  40404040  40404040  C9D5E3C4  F0F0F4F5*
02E3E7E3  40000074  40400014  40400001  00000476  000006B4  000004C0
000004C4  000004C4  40404040  40404040  40404040  40404040  40404040
40404040  40404040  40404040  40404040  C9D5E3C4  F0F0F4F6*
02D9D3C4  40404040  40400038  40404040  00010001  0C000020  00010001
0C000024  00010001  0C000028  00010001  0C000074  00010001  0C000078
00010001  0C00007C  00010001  0C000080  C9D5E3C4  F0F0F4F7*
02E3E7E3  40000088  4040000C  40400001  00000516  00000692  0000051A
40404040  40404040  40404040  40404040  40404040  40404040  40404040
40404040  40404040  40404040  40404040  C9D5E3C4  F0F0F4F8*
02E3E7E3  400000B4  40400004  40400001  8000018C  40404040  40404040
40404040  40404040  40404040  40404040  40404040  40404040  40404040
40404040  40404040  40404040  40404040  C9D5E3C4  F0F0F4F9*
02E3E7E3  400000D8  4040000C  40400001  0000019C  800001A0  000001C4
40404040  40404040  40404040  40404040  40404040  40404040  40404040
40404040  40404040  40404040  40404040  C9D5E3C4  F0F0F5F0**
02D9D3C4  40404040  40400038  40404040  00010001  0C000084  00010001
0C000088  00010001  0C00008C  00010001  0C000090  00010001  0C0000B4
00010001  0C0000D8  00010001  0C0000DC  C9D5E3C4  F0F0F5F1*
02E3E7E3  400000E4  4040001C  40400001  00000174  0000017C  00000178
80000180  00000168  0000016C  80000170  40404040  40404040  40404040
40404040  40404040  40404040  40404040  C9D5E3C4  F0F0F5F2*
02D9D3C4  40404040  40400038  40404040  00010001  0C0000E0  00010001
0C0000E4  00010001  0C0000E8  00010001  0C0000EC  00010001  0C0000F0
00010001  0C0000F4  00010001  0C0000F8  C9D5E3C4  F0F0F5F3*
02E3E7E3  40000100  40400004  40400001  000001BC  40404040  40404040
40404040  40404040  40404040  40404040  40404040  40404040  40404040
40404040  40404040  40404040  40404040  C9D5E3C4  F0F0F5F4*
02E3E7E3  40000108  40400004  40400001  000001B4  40404040  40404040
40404040  40404040  40404040  40404040  40404040  40404040  40404040
40404040  40404040  40404040  40404040  C9D5E3C4  F0F0F5F5*
02E3E7E3  40000110  4040000C  40400001  00000198  8000018C  00000148
40404040  40404040  40404040  40404040  40404040  40404040  40404040
40404040  40404040  40404040  40404040  C9D5E3C4  F0F0F5F6*
02E3E7E3  40000120  40400004  40400001  800001C4  40404040  40404040
40404040  40404040  40404040  40404040  40404040  40404040  40404040
40404040  40404040  40404040  40404040  C9D5E3C4  F0F0F5F7*
02E3E7E3  40000224  40400038  40400001  00000000  00000000  00000000
00000000  00000000  00000000  00000000  00000000  00000000  00000000
00000000  00000000  00000000  00000000  C9D5E3C4  F0F0F5F8*

MEMBER NAME   INTDRV
02E3E7E3  4000025C  40400038  40400001  00000000  00000010  0000000C
014C000B  0368000B  00EC000B  00000000  0000000C  00F0000C  00F4000C
00F8000C  00000014  00000018  0000001C  C9D5E3C4  F0F0F5F9*
02E3E7E3  40000294  40400004  40400001  00000020  40404040  40404040
40404040  40404040  40404040  40404040  40404040  40404040  40404040
40404040  40404040  40404040  40404040  C9D5E3C4  F0F0F6F0**
02D9D3C4  40404040  40400038  40404040  00010001  0C0000FC  00010001
0C000100  00010001  0C000108  00010001  0C000110  00010001  0C000114
00010001  0C000118  00010001  0C000120  C9D5E3C4  F0F0F6F1*
02C5D5C4  40404040  40404040  40404040  40404040  40404040  40404040
00000848  F1F5F7F3  F460C6D6  F34040F0  F2F0F2F8  F7F0F9F8  40F0F84B
F1F64BF2  F1404040  C9D5E3C4  D9E54040  C9D5E3C4  F0F0F6F2**

MEMBER NAME   INTERC
02C5E2C4  40404040  40400010  40400001  C9D5E3C5  D9C34040  00000000
40000000  40404040  40404040  40404040  40404040  40404040  40404040
```

```
40404040  40404040  40404040  40404040  C9D5E3C5  F0F0F0F1*
02E3E7E3  40000000  40400028  40400001  47F0F00C  07C9D5E3  C5D9C340
90ECD00C  184D98CD  F0205040  D00450D0  400807FC  40404040  40404040
40404040  40404040  40404040  40404040  C9D5E3C5  F0F0F0F2*
02C5E2C4  40404040  40400010  40400002  E3D6D3C5  D9404040  05000000
4000000C  40404040  40404040  40404040  40404040  40404040  40404040
40404040  40404040  40404040  40404040  C9D5E3C5  F0F0F0F3*
02E3E7E3  400000A0  4040001C  40400001  00000000  00000000  41100000
00000000  00000001  00000000  00000000  40404040  40404040  40404040
40404040  40404040  40404040  40404040  C9D5E3C5  F0F0F0F4*
02C5E2C4  40404040  40400010  40400003  C4E2D8D9  E3404040  02000000
40000000  40404040  40404040  40404040  40404040  40404040  40404040
40404040  40404040  40404040  40404040  C9D5E3C5  F0F0F0F5*
02C5E2C4  40404040  40400010  40400004  E4D5C9E3  C4404040  02000000
40000000  40404040  40404040  40404040  40404040  40404040  40404040
40404040  40404040  40404040  40404040  C9D5E3C5  F0F0F0F6*
02C5E2C4  40404040  40400010  40400005  C4C1D9C3  D6E24040  02000000
40000000  40404040  40404040  40404040  40404040  40404040  40404040
40404040  40404040  40404040  40404040  C9D5E3C5  F0F0F0F7*
02C5E2C4  40404040  40400010  40400006  C4C1D9E2  C9D54040  02000000
40000000  40404040  40404040  40404040  40404040  40404040  40404040
40404040  40404040  40404040  40404040  C9D5E3C5  F0F0F0F8*
02E3E7E3  400001E0  40400014  40400001  00000000  00000000  00000000
00000000  00000000  40404040  40404040  40404040  40404040  40404040
40404040  40404040  40404040  40404040  C9D5E3C5  F0F0F0F9*
02E3E7E3  40000214  40400038  40400001  58B0D08C  2B007800  D0946000
D1282B44  7840D0A4  6040D148  2B007800  D0986000  D1302B66  7860D0A8
6060D150  2B007800  D09C6000  D1382B00  C9D5E3C5  F0F0F1F0**
02E3E7E3  4000024C  40400038  40400001  7800D0AC  6000D158  2B007800
D0A06000  D1402B22  7820D0B0  2B466040  D0E06860  D1306B60  D1286060
D0F06860  D1286C60  D1506060  D1D06800  C9D5E3C5  F0F0F1F1*
02E3E7E3  40000284  40400038  40400001  D1306C00  D1486B00  D1D06000
D1006840  D1582B42  6040D0E8  6800D140  6B00D138  6000D0F8  6840D138
2C426040  D1D06800  D1406C00  D1586B00  C9D5E3C5  F0F0F1F2*
02E3E7E3  400002BC  40400038  40400001  D1D06000  D1086860  D0F06060
D1806860  D0E02366  6060D190  6840D0F8  6040D188  6820D0E8  23226020
D1986800  D0786000  D0C058F0  D1C04110  C9D5E3C5  F0F0F1F3*
02E3E7E3  400002F4  40400038  40400001  D04C05EF  58F0D1C0  4110D058
05EF6820  D1806C20  D1886840  D1906C40  D1982A24  6020D1D0  58F0D1C4
4110D064  05EF6000  D0D86820  D0E02C22  C9D5E3C5  F0F0F1F4*
02E3E7E3  4000032C  40400038  40400001  6840D0F0  2C442A24  6020D1D0
58F0D1BC  4110D068  05EF6000  D1D86000  D1706820  D0E82C22  6840D0F8
2C442A24  6020D1D0  58F0D1BC  4110D06C  C9D5E3C5  F0F0F1F5*
02E3E7E3  40000364  40400038  40400001  05EF6000  D1E02820  6000D1A0
6800D1E0  6900D1D8  47A0D358  6020D170  6800D080  23006000  D1D058F0
D1C44110  D07005EF  6000D1D8  58F0D1B8  C9D5E3C5  F0F0F1F6*
02E3E7E3  4000039C  40400038  40400001  2B227820  F0046D20  D1706020
D1D058F0  D1C84110  D07405EF  6000D1E0  28406B40  D1D86820  D1D86B20
D1E06800  D0D86900  D1E04120  00014740  C9D5E3C5  F0F0F1F7*
02E3E7E3  400003D4  40400038  40400001  D3B01B22  6860D1E0  23666960
D0D84130  00014740  D3C41B33  14236940  D0D84130  00014720  D3D41B33
6920D0D8  41400001  4740D3E2  1B441634  C9D5E3C5  F0F0F1F8*
02E3E7E3  4000040C  40400038  40400001  1623872B  D3F441F0  000458E0
D00007FE  6820D0E0  6C20D0F8  6840D0F0  6C40D0E8  2B246020  D1682022
58F0D1B8  2B447840  F0082924  47A0D426  C9D5E3C5  F0F0F1F9*
02E3E7E3  40000444  40400038  40400001  41F00004  58E0D000  07FE6840

MEMBER NAME  INTERC
D1006C40  D0F86820  D0F06C20  D1082B42  6D40D168  6820D0E0  6C20D108
```

```
6860D100  6C60D0E8  2B266D20  D1687040  C9D5E3C5  F0F0F2F0**
02E3E7E3  4000047C  40400038  40400001  D0B47020  D0B81BFF  58E0D000
07FE58A0  D00458E0  A00C58B0  A0185810  B0007820  D0947020  10005820
B0047840  D0A47040  20005830  B0087860  C9D5E3C5  F0F0F2F1*
02E3E7E3  400004B4  40400038  40400001  D0987060  30005840  B00C7800
D0A87000  40005850  B0107820  D09C7020  50005860  B0147840  D0AC7040
60005870  B0187860  D0A07060  70005880  C9D5E3C5  F0F0F2F2*
02E3E7E3  400004EC  40400038  40400001  B01C7800  D0B07000  80005890
B0207820  D0B47020  90005810  B0247840  D0B87040  100018DA  92FFA00C
982CA01C  07FE987B  10007820  70007020  C9D5E3C5  F0F0F2F3*
02E3E7E3  40000524  40400038  40400001  D0947820  80007020  D0A47820
90007020  D0987820  A0007020  D0A87820  B0007020  D09C987B  10147820
70007020  D0AC7820  80007020  D0A07820  C9D5E3C5  F0F0F2F4*
02E3E7E3  4000055C  4040001A  40400001  90007020  D0B07820  A0007020
D0B47820  B0007020  D0B847F0  D1EC4040  40404040  40404040  40404040
40404040  40404040  40404040  40404040  C9D5E3C5  F0F0F2F5*
02E3E7E3  40000020  4040000C  40400001  0000051A  00000028  0000048A
40404040  40404040  40404040  40404040  40404040  40404040  40404040
40404040  40404040  40404040  40404040  C9D5E3C5  F0F0F2F6*
02D9D3C4  40404040  40400038  40404040  00020001  0C0001E0  00030001
1C0001E4  00040001  1C0001E8  00050001  1C0001EC  00060001  1C0001F0
00010001  0C000020  00010001  0C000024  C9D5E3C5  F0F0F2F7*
02E3E7E3  40000074  4040001C  40400001  000001A8  000001B8  800000E8
000001B0  000001C0  800000E8  800001F8  40404040  40404040  40404040
40404040  40404040  40404040  40404040  C9D5E3C5  F0F0F2F8*
02D9D3C4  40404040  40400038  40404040  00010001  0C000028  00010001
0C000074  00010001  0C000078  00010001  0C00007C  00010001  0C000080
00010001  0C000084  00010001  0C000088  C9D5E3C5  F0F0F2F9*
02E3E7E3  40000090  40400010  40400001  800001F8  800001F8  800001F8
800001F8  40404040  40404040  40404040  40404040  40404040  40404040
40404040  40404040  40404040  40404040  C9D5E3C5  F0F0F3F0**
02E3E7E3  400001F4  40400020  40400001  00000000  00000000  00000000
00000000  00000000  00000000  00000000  00000000  40404040  40404040
40404040  40404040  40404040  40404040  C9D5E3C5  F0F0F3F1*
02D9D3C4  40404040  40400028  40404040  00010001  0C00008C  00010001
0C000090  00010001  0C000094  00010001  0C000098  00010001  0C00009C
40404040  40404040  40404040  40404040  C9D5E3C5  F0F0F3F2*
02C5D5C4  40404040  40404040  40404040  40404040  40404040  40404040
00000576  F1F5F7F3  F460C6D6  F34040F0  F2F0F2F8  F7F0F9F8  40F0F84B
F3F94BF5  F8404040  C9D5E3C5  D9C34040  C9D5E3C5  F0F0F3F3**

MEMBER NAME  LIMIT
02C5E2C4  40404040  40400010  40400001  D3C9D4C9  E3404040  00000000
40000000  40404040  40404040  40404040  40404040  40404040  40404040
40404040  40404040  40404040  40404040  D3C9D4C9  F0F0F0F1*
02E3E7E3  40000000  40400028  40400001  47F0F00C  07D3C9D4  C9E34040
90ECD00C  184D98CD  F0205040  D00450D0  400807FC  40404040  40404040
40404040  40404040  40404040  40404040  D3C9D4C9  F0F0F0F2*
02E3E7E3  40000078  40400014  40400001  00000000  00000001  3E20C49C
00000000  00000000  40404040  40404040  40404040  40404040  40404040
40404040  40404040  40404040  40404040  D3C9D4C9  F0F0F0F3*
02E3E7E3  400000B8  40400038  40400001  7840D058  58B0D050  58A0D054
386450B0  D06C7820  D0643A24  7920D074  47A0D0B8  1BFF58E0  D00007FE
7820D064  3B267920  D07047C0  D0CE1BFF  D3C9D4C9  F0F0F0F4*
02E3E7E3  400000F0  40400038  40400001  58E0D000  07FE7820  D0683A26
7920D07C  47A0D0E4  1BFF58E0  D00007FE  7820D068  3B267920  D07847C0
D0FA1BFF  58E0D000  07FE50A0  D06C1BFF  D3C9D4C9  F0F0F0F5*
02E3E7E3  40000128  40400038  40400001  58E0D000  07FE58A0  D00458E0
A00C58B0  A0185810  B0185820  D06C5020  100018DA  92FFA00C  982CA01C
```

07FE987B 10007820 70007020 D0747820 D3C9D4C9 F0F0F0F6*
02E3E7E3 40000160 40400036 40400001 80007020 D07C7820 90007020
D0707820 A0007020 D0787820 B0007020 D0649878 10147820 70007020
D0685820 80005020 D06C47F0 D0904040 D3C9D4C9 F0F0F0F7*
02E3E7E3 40000020 4040000C 40400001 00000152 00000028 0000012E
40404040 40404040 40404040 40404040 40404040 40404040 40404040
40404040 40404040 40404040 40404040 D3C9D4C9 F0F0F0F8*
02D9D3C4 40404040 40400018 40404040 00010001 0C000020 00010001
0C000024 00010001 0C000028 40404040 40404040 40404040 40404040
40404040 40404040 40404040 40404040 D3C9D4C9 F0F0F0F9*
02C5D5C4 40404040 40404040 40404040 40404040 40404040 40404040
00000196 F1F5F7F3 F460C6D6 F34040F0 F2F0F2F8 F7F0F9F8 40F0F84B
F4F04BF0 F2404040 D3C9D4C9 E3404040 D3C9D4C9 F0F0F1F0**

MEMBER NAME LIMITV
02C5E2C4 40404040 40400010 40400001 D3C9D4C9 E3E54040 00000000
40000000 40404040 40404040 40404040 40404040 40404040 40404040
40404040 40404040 40404040 40404040 D3C9D4C9 F0F0F0F1*
02E3E7E3 40000000 40400028 40400001 47F0F00C 07D3C9D4 C9E3E540
90ECD00C 184D98CD F0205040 D00450D0 400807FC 40404040 40404040
40404040 40404040 40404040 40404040 D3C9D4C9 F0F0F0F2*
02C5E2C4 40404040 40400010 40400002 E3D6D3C5 D9404040 05000000
4000000C 40404040 40404040 40404040 40404040 40404040 40404040
40404040 40404040 40404040 40404040 D3C9D4C9 F0F0F0F3*
02E3E7E3 40000078 40400010 40400001 00000000 00000001 00000000
00000000 40404040 40404040 40404040 40404040 40404040 40404040
40404040 40404040 40404040 40404040 D3C9D4C9 F0F0F0F4*
02E3E7E3 400000C0 40400038 40400001 00000000 58B0D058 58A0D050
5890D054 50A0D060 58F0D098 7840F004 33447040 D0647860 D0687B60
D0747820 D06C7B20 D0703964 41300001 D3C9D4C9 F0F0F0F5*
02E3E7E3 400000F8 40400038 40400001 4740D0D6 1B333924 41200001
4740D0E2 1B221623 862BD11A 7860D078 7B60D084 7820D07C 7B20D080
39644130 00014740 D1041B33 39244120 D3C9D4C9 F0F0F0F6*
02E3E7E3 40000130 40400038 40400001 00014740 D1101B22 1623862B
D11A5090 D0601BFF 58E0D000 07FE58A0 D00458E0 A00C58B0 A0185810
B0205820 D0605020 100018DA 92FFA00C D3C9D4C9 F0F0F0F7*
02E3E7E3 40000168 40400038 40400001 982CA01C 07FE987B 10007820
70007020 D0707820 80007020 D0687820 90007020 D0807820 A0007020
D0787820 B0007020 D074987A 10147820 D3C9D4C9 F0F0F0F8*
02E3E7E3 400001A0 40400022 40400001 70007020 D06C7820 80007020
D0847820 90007020 D07C5820 A0005020 D06047F0 D09C4040 40404040
40404040 40404040 40404040 40404040 D3C9D4C9 F0F0F0F9*
02E3E7E3 40000020 4040000C 40400001 0000016E 00000028 0000014A
40404040 40404040 40404040 40404040 40404040 40404040 40404040
40404040 40404040 40404040 40404040 D3C9D4C9 F0F0F1F0**
02D9D3C4 40404040 40400020 40404040 00020001 0C0000C0 00010001
0C000020 00010001 0C000024 00010001 0C000028 40404040 40404040
40404040 40404040 40404040 40404040 D3C9D4C9 F0F0F1F1*
02C5D5C4 40404040 40404040 40404040 40404040 40404040 40404040
000001C2 F1F5F7F3 F460C6D6 F34040F0 F2F0F2F8 F7F0F9F8 40F0F84B
F4F04BF0 F6404040 D3C9D4C9 E3E54040 D3C9D4C9 F0F0F1F2**

MEMBER NAME MAT2
02C5E2C4 40404040 40400010 40400001 D4C1E3F2 40404040 00000000
40000000 40404040 40404040 40404040 40404040 40404040 40404040
40404040 40404040 40404040 40404040 D4C1E3F2 F0F0F0F1*
02E3E7E3 40000000 40400038 40400001 47F0F00C 07D4C1E3 F2404040
90ECD00C 184D98CD F0205040 D00450D0 400807FC 40404040 40404040
021A08D4 C1E3F25C 40404010 08180806 D4C1E3F2 F0F0F0F2*

| | | | | | | |
|---|---|---|---|---|---|---|
| 02E3E7E3 | 40000038 | 40400038 | 40400001 | 030C1007 | 1A025CD4 | 10062202 |
| 1A025CD4 | 10060604 | 0C100722 | 021A025C | D4100606 | 040C1007 | 1A025CD5 |
| 10062202 | 1A025CD5 | 10060604 | 0C100722 | D4C1E3F2 | F0F0F0F3* | |
| 02E3E7E3 | 400000C0 | 40400024 | 40400001 | 00000000 | 00000000 | 00000000 |
| 00000001 | 00000002 | 00000003 | 00000018 | 00000000 | 00000000 | 40404040 |
| 40404040 | 40404040 | 40404040 | 40404040 | D4C1E3F2 | F0F0F0F4* | |
| 02E3E7E3 | 40000100 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3F2 | F0F0F0F5* | |
| 02C5E2C4 | 40404040 | 40400010 | 40400002 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | D4C1E3F2 | F0F0F0F6* | |
| 02E3E7E3 | 40000108 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3F2 | F0F0F0F7* | |
| 02E3E7E3 | 40000110 | 40400038 | 40400001 | 00000000 | 58A0D090 | 58B0D098 |
| 6860D050 | 5890D06C | 58F0D0A0 | 45E0F004 | 0000000A | 00000028 | 45E0F008 |
| 0450D074 | 45E0F008 | 0860B020 | 45E0F008 | D4C1E3F2 | F0F0F0F8* | |
| 02E3E7E3 | 40000148 | 40400038 | 40400001 | 0860B038 | 45E0F008 | 0860B050 |
| 45E0F008 | 0450D074 | 45E0F010 | 6960A008 | 41300001 | 4780D0FE | 1B336960 |
| A0104140 | 00014780 | D10C1B44 | 14436960 | D4C1E3F2 | F0F0F0F9* | |
| 02E3E7E3 | 40000180 | 40400038 | 40400001 | A0184130 | 00014780 | D11C1B33 |
| 14348639 | D1A458F0 | D0A01800 | 45E0F004 | 0000000A | 00000050 | 45E0F008 |
| 0450D074 | 45E0F008 | 0860B040 | 45E0F008 | D4C1E3F2 | F0F0F1F0** | |
| 02E3E7E3 | 400001B8 | 40400038 | 40400001 | 0860B058 | 45E0F008 | 0860B060 |
| 45E0F008 | 0860D080 | 45E0F008 | 0450D074 | 45E0F010 | 58F0D0A0 | 45E0F004 |
| 0000000A | 00000063 | 45E0F008 | 0450D074 | D4C1E3F2 | F0F0F1F1* | |
| 02E3E7E3 | 400001F0 | 40400038 | 40400001 | 45E0F008 | 0860A008 | 45E0F008 |
| 0860A010 | 45E0F008 | 0860A018 | 45E0F010 | 1BFF58E0 | D00007FE | 58F0D0A0 |
| 45E0F004 | 0000000A | 00000043 | 45E0F008 | D4C1E3F2 | F0F0F1F2* | |
| 02E3E7E3 | 40000228 | 40400038 | 40400001 | 0450D074 | 45E0F008 | 0860B040 |
| 45E0F008 | 0860B058 | 45E0F008 | 0860B060 | 45E0F008 | 0860D080 | 45E0F010 |
| 1BFF58E0 | D00007FE | 58D0D004 | 58E0D00C | D4C1E3F2 | F0F0F1F3* | |
| 02E3E7E3 | 40000260 | 40400038 | 40400001 | 92FFD00C | 982CD01C | 07FE987A |
| 10005820 | 70005020 | D0746820 | A0006020 | D0805820 | 10044130 | 20004150 |
| 00081B25 | 5B20D068 | 5020D098 | 5030D09C | D4C1E3F2 | F0F0F1F4* | |
| 02E3E7E3 | 40000298 | 4040001A | 40400001 | 58201008 | 41302000 | 41500008 |
| 1B255020 | D0905030 | D09447F0 | D0A44040 | 40404040 | 40404040 | 40404040 |
| 40404040 | 40404040 | 40404040 | 40404040 | D4C1E3F2 | F0F0F1F5* | |
| 02E3E7E3 | 40000020 | 40400008 | 40400001 | 0000026A | 00000070 | 40404040 |
| 40404040 | 40404040 | 40404040 | 40404040 | 40404040 | 40404040 | 40404040 |
| 40404040 | 40404040 | 40404040 | 40404040 | D4C1E3F2 | F0F0F1F6* | |
| 02E3E7E3 | 40000070 | 40400004 | 40400001 | 00000258 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3F2 | F0F0F1F7* | |
| 02D9D3C4 | 40404040 | 40400038 | 40404040 | 00020001 | 1C000110 | 00010001 |
| 0C000130 | 00010001 | 0C0001A0 | 00010001 | 0C0001E4 | 00010001 | 0C000220 |
| 00010001 | 0C000020 | 00010001 | 0C000024 | D4C1E3F2 | F0F0F1F8* | |
| 02D9D3C4 | 40404040 | 40400008 | 40404040 | 00010001 | 0C000070 | 40404040 |
| 40404040 | 40404040 | 40404040 | 40404040 | 40404040 | 40404040 | 40404040 |
| 40404040 | 40404040 | 40404040 | 40404040 | D4C1E3F2 | F0F0F1F9* | |
| 02C5D5C4 | 40404040 | 40404040 | 40404040 | 40404040 | 40404040 | 40404040 |

MEMBER NAME MAT2

| | | | | | | |
|---|---|---|---|---|---|---|
| 000002B2 | F1F5F7F3 | F460C6D6 | F34040F0 | F2F0F2F8 | F7F0F9F8 | 40F0F84B |
| F4F04BF1 | F0404040 | D4C1E3F2 | 40404040 | D4C1E3F2 | F0F0F2F0** | |

MEMBER NAME MATMRG

| | | | | | | |
|---|---|---|---|---|---|---|
| 02C5E2C4 | 40404040 | 40400010 | 40400001 | D4C1E3D4 | D9C74040 | 00000000 |

| | | | | | | |
|---|---|---|---|---|---|---|
| 40000000 | 40404040 | 40404040 | 40404040 | 40404040 | 40404040 | 40404040 |
| 40404040 | 40404040 | 40404040 | 40404040 | D4C1E3D4 | F0F0F0F1* | |
| 02E3E7E3 | 40000000 | 40400038 | 40400001 | 47F0F00C | 07D4C1E3 | D4D9C740 |
| 90ECD00C | 184D98CD | F0205040 | D00450D0 | 400807FC | 40404040 | 40404040 |
| 020A0803 | 18010A08 | 0318011A | 05C4C1E2 | D4C1E3D4 | F0F0F0F2* | |
| 02E3E7E3 | 40000038 | 40400038 | 40400001 | C8401003 | 1A0740D3 | C1E8E4D7 |
| 4010041A | 1F40C4D6 | C5E240D5 | D6E340D4 | C1E3C3C8 | 40C140D4 | C1E3C5D9 |
| C9C1D340 | C3D6C4C5 | 18322202 | 06481401 | D4C1E3D4 | F0F0F0F3* | |
| 02E3E7E3 | 40000070 | 40400038 | 40400001 | 22020A08 | 0318010A | 08031801 |
| 1A05C4C1 | E2C84010 | 031A0F40 | D4C1E3C5 | D9C9C1D3 | 40C3D6C4 | C5401004 |
| 1A1740C4 | D6C5E240 | D5D6E340 | D4C1E3C3 | D4C1E3D4 | F0F0F0F4* | |
| 02E3E7E3 | 400000A8 | 4040000C | 40400001 | C840C140 | D3C1E8E4 | D7183222 |
| 40404040 | 40404040 | 40404040 | 40404040 | 40404040 | 40404040 | 40404040 |
| 40404040 | 40404040 | 40404040 | 40404040 | D4C1E3D4 | F0F0F0F5* | |
| 02E3E7E3 | 40000120 | 40400038 | 40400001 | 00000000 | 00000000 | 4F080000 |
| 00000000 | 00000001 | 00000002 | 00000003 | 00000004 | 00000005 | 00000006 |
| 00000008 | 00000009 | 00000016 | 00000048 | D4C1E3D4 | F0F0F0F6* | |
| 02E3E7E3 | 40000158 | 4040000C | 40400001 | 40266666 | 00000000 | 00000000 |
| 40404040 | 40404040 | 40404040 | 40404040 | 40404040 | 40404040 | 40404040 |
| 40404040 | 40404040 | 40404040 | 40404040 | D4C1E3D4 | F0F0F0F7* | |
| 02C5E2C4 | 40404040 | 40400010 | 40400002 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D4C1E3D4 | F0F0F0F8* | |
| 02E3E7E3 | 400001A8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F0F9* | |
| 02E3E7E3 | 400001B0 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F1F0** | |
| 02C5E2C4 | 40404040 | 40400010 | 40400003 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | D4C1E3D4 | F0F0F1F1* | |
| 02E3E7E3 | 400001BC | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F1F2* | |
| 02E3E7E3 | 400001C4 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F1F3* | |
| 02E3E7E3 | 40000178 | 40400004 | 40400001 | 000000C8 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F1F4* | |
| 02E3E7E3 | 4000026C | 40400038 | 40400001 | 58A0D104 | 58B0D0F0 | 5890D078 |
| 5880D0C0 | 7800D0A0 | 7000D0B4 | 5090D0CC | 5800D11C | 5000D160 | 5800D120 |
| 5000D178 | 18605000 | D15C5840 | D1905040 | D4C1E3D4 | F0F0F1F5* | |
| 02E3E7E3 | 400002A4 | 40400038 | 40400001 | D1644104 | A0005000 | D0549280 |
| D05458F0 | D0F84110 | D04C05EF | 5800D124 | 5000D154 | 5830D194 | 5030D168 |
| 7843A000 | 7040D158 | 5850D128 | 5050D14C | D4C1E3D4 | F0F0F1F6* | |
| 02E3E7E3 | 400002DC | 40400038 | 40400001 | 5800D12C | 5000D174 | 5000D16C |
| 5800D198 | 5000D170 | 58E0D198 | 782EB000 | 7020D150 | 38643B62 | 30667960 |
| D0A047C0 | D3F43924 | 4730D31C | 5980D0D4 | D4C1E3D4 | F0F0F1F7* | |
| 02E3E7E3 | 40000314 | 40400038 | 40400001 | 47C0D808 | 5800D0D4 | 1A095000 |
| D0D45810 | D0901A16 | 2B007801 | A0006A00 | D0706000 | D0685870 | D06C1077 |
| 5070D0B8 | 1A562B00 | 7805A000 | 6A00D070 | D4C1E3D4 | F0F0F1F8* | |
| 02E3E7E3 | 4000034C | 40400038 | 40400001 | 6000D068 | 5800D06C | 5000D0C4 |
| 58F0D10C | 45E0F004 | 00000000 | 00000028 | 45E0F008 | 0474A000 | 45E0F008 |
| 0473A000 | 45E0F008 | 0450D0B8 | 45E0F008 | D4C1E3D4 | F0F0F1F9* | |
| 02E3E7E3 | 40000384 | 40400038 | 40400001 | 0450D0C4 | 45E0F010 | 58F0D10C |

MEMBER NAME MATMRG

45E0F000 00000000 0000006B 18A958B0 D09C5880 D0FC185B 5C40D0D4
18391A35 45E0F008 01238000 879AD2EE D4C1E3D4 F0F0F2F0**
02E3E7E3 400003BC 40400038 40400001 58A0D104 58B0D0F0 5890D078
5880D0C0 45E0F010 47F0D808 5980D0D4 47C0D808 5800D0D4 1A095000
D0D45840 D19C5A40 D16C2B00 7804B000 D4C1E3D4 F0F0F2F1*
02E3E7E3 400003F4 40400038 40400001 6A00D070 6000D068 5830D06C
10335030 D0B85830 D0905A30 D16C2B00 7803B000 6A00D070 6000D068
5800D06C 5000D0BC 58F0D10C 45E0F004 D4C1E3D4 F0F0F2F2*
02E3E7E3 4000042C 40400038 40400001 00000000 00000071 5830D1A0
5A30D16C 45E0F008 0473B000 5810D170 45E0F008 0471B000 45E0F008
0450D0B8 45E0F008 0450D0BC 45E0F010 D4C1E3D4 F0F0F2F3*
02E3E7E3 40000464 40400038 40400001 58F0D10C 45E0F000 00000000
0000006B 18A958B0 D09C5880 D0FC185B 5C40D0D4 18391A35 45E0F008
01238000 879AD3C6 58A0D104 58B0D0F0 D4C1E3D4 F0F0F2F4*
02E3E7E3 4000049C 40400038 40400001 5890D078 5880D0C0 45E0F010
47F0D808 5830D174 5A30D15C 5800D090 5000D17C 18205A20 D16C4103
A0005000 D05C4102 B0005000 D0609280 D4C1E3D4 F0F0F2F5*
02E3E7E3 400004D4 40400038 40400001 D06058F0 D0F84110 D05805EF
5990D0D8 4780D808 5820D07C 5020D0AC 5800D11C 5000D114 5850D0CC
5C40D12C 5050D130 18055A00 D1285000 D4C1E3D4 F0F0F2F6*
02E3E7E3 4000050C 40400038 40400001 D1385A50 D0905050 D13C5800
D1B05000 D1485830 D1AC5840 D1AC5850 D13C5860 D1381872 5880D120
5890D1A8 18BA58A0 D0F07820 D0E07929 D4C1E3D4 F0F0F2F7*
02E3E7E3 40000544 40400038 40400001 B0004770 D49E7820 D0E47924
B0004780 D6D04109 B0005000 D0549280 D05458F0 D0F84110 D04C05EF
5800D0CC 5A00D078 5000D0CC 5A50D12C D4C1E3D4 F0F0F2F8*
02E3E7E3 4000057C 40400038 40400001 5A60D12C 7823B000 7B26A000
30227920 D0B447C0 D6D05070 D0AC58A0 D10458B0 D0F05890 D0785880
D0C05870 D0CC5C60 D1745070 D1885840 D4C1E3D4 F0F0F2F9*
02E3E7E3 400005B4 40400038 40400001 D14C1A47 5040D18C 5870D0AC
5C60D178 5070D180 5830D154 1A375030 D1847824 B0007923 A0004730
D5F85980 D0D447C0 D8085800 D0D41A09 D4C1E3D4 F0F0F3F0**
02E3E7E3 400005EC 40400038 40400001 5000D0D4 5850D17C 1A572B00
7805A000 6A00D070 6000D068 5840D06C 10445040 D0B85840 D14C1A47
2B007804 A0006A00 D0706000 D0685800 D4C1E3D4 F0F0F3F1*
02E3E7E3 40000624 40400038 40400001 D06C5000 D0C458F0 D10C1800
45E0F004 00000000 00000028 5840D160 1A4745E0 F0080474 A00045E0
F0080473 A00045E0 F0080450 D0B845E0 D4C1E3D4 F0F0F3F2*
02E3E7E3 4000065C 4040001C 40400001 F0080450 D0C445E0 F01058F0
D10C1800 45E0F000 00000000 0000006B 40404040 40404040 40404040
40404040 40404040 40404040 40404040 D4C1E3D4 F0F0F3F3*
02D9D3C4 40404040 40400038 40404040 00020001 1C0001B0 00030001
1C0001C4 00010001 0C000364 00010001 0C000398 00010001 0C000430
00010001 0C000470 00010001 0C000638 D4C1E3D4 F0F0F3F4*
02E3E7E3 40000678 40400038 40400001 18A958B0 D09C5880 D0FC185B
5C40D0D4 18391A35 45E0F008 01238000 879AD5CA 58A0D104 58B0D0F0
5890D078 5880D0C0 45E0F010 47F0D808 D4C1E3D4 F0F0F3F5*
02E3E7E3 400006B0 40400038 40400001 5980D0D4 47C0D808 5800D0D4
1A095000 D0D45840 D19C5A40 D1882B00 7804B000 6A00D070 6000D068
5830D06C 10335030 D0B85830 D17C5A30 D4C1E3D4 F0F0F3F6*
02E3E7E3 400006E8 40400038 40400001 D1882B00 7803B000 6A00D070
6000D068 5800D06C 5000D0BC 58F0D10C 45E0F004 00000000 00000071
5830D1A0 5A30D188 45E0F008 0473B000 D4C1E3D4 F0F0F3F7*
02E3E7E3 40000720 40400038 40400001 5810D18C 45E0F008 0471B000
45E0F008 0450D0B8 45E0F008 0450D0BC 45E0F010 58F0D10C 45E0F000
00000000 0000006B 18A958B0 D09C5880 D4C1E3D4 F0F0F3F8*
02E3E7E3 40000758 40400038 40400001 D0FC185B 5C40D0D4 18391A35
45E0F008 01238000 879AD6A2 58A0D104 58B0D0F0 5890D078 5880D0C0

MEMBER NAME MATMRG

| | | | | | | |
|---|---|---|---|---|---|---|
| 45E0F010 | 47F0D808 | 58E0D148 | 410EB000 | D4C1E3D4 | F0F0F3F9* | |
| 02E3E7E3 | 40000790 | 40400038 | 40400001 | 5000D05C | 4105A000 | 5000D060 |
| 9280D060 | 58F0D0F8 | 4110D058 | 05EF5A70 | D0785800 | D1481A08 | 5000D148 |
| 1A381A48 | 1A985970 | D0D847C0 | D4865070 | D4C1E3D4 | F0F0F4F0** | |
| 02E3E7E3 | 400007C8 | 40400038 | 40400001 | D0AC58A0 | D10458B0 | D0F05890 |
| D0785880 | D0C05800 | D0CC5900 | D0D047A0 | D8085980 | D0D447C0 | D8085800 |
| D0D41A09 | 5000D0D4 | 5850D0CC | 5C40D174 | D4C1E3D4 | F0F0F4F1* | |
| 02E3E7E3 | 40000800 | 40400038 | 40400001 | 5860D19C | 1A652B00 | 7806B000 |
| 6A00D070 | 6000D068 | 5830D06C | 10335030 | D0B85830 | D17C1A35 | 2B007803 |
| B0006A00 | D0706000 | D0685800 | D06C5000 | D4C1E3D4 | F0F0F4F2* | |
| 02E3E7E3 | 40000838 | 40400038 | 40400001 | D0BC58F0 | D10C1800 | 45E0F004 |
| 00000000 | 00000071 | 5830D1A0 | 1A3545E0 | F0080473 | B0005830 | D14C1A35 |
| 45E0F008 | 0473B000 | 45E0F008 | 0450D0B8 | D4C1E3D4 | F0F0F4F3* | |
| 02E3E7E3 | 40000870 | 40400038 | 40400001 | 45E0F008 | 0450D0BC | 45E0F010 |
| 58F0D10C | 45E0F000 | 00000000 | 0000006B | 18A958B0 | D09C5880 | D0FC185B |
| 5C40D0D4 | 18391A35 | 45E0F008 | 01238000 | D4C1E3D4 | F0F0F4F4* | |
| 02E3E7E3 | 400008A8 | 40400038 | 40400001 | 879AD7DE | 58A0D104 | 58B0D0F0 |
| 5890D078 | 5880D0C0 | 45E0F010 | 1BFF58E0 | D00007FE | 58A0D004 | 58E0A00C |
| 58B0A018 | 5810B014 | 5820D0D4 | 50201000 | D4C1E3D4 | F0F0F4F5* | |
| 02E3E7E3 | 400008E0 | 40400038 | 40400001 | 18DA92FF | A00C982C | A01C07FE |
| 987B1004 | 58207000 | 5020D0D0 | 58209000 | 5020D0D8 | 58701014 | 58207000 |
| 5020D0D4 | 58201000 | 41302000 | 41500004 | D4C1E3D4 | F0F0F4F6* | |
| 02E3E7E3 | 40000918 | 40400038 | 40400001 | 1B255C40 | D08C1B25 | 5020D0F0 |
| 5030D0F4 | 58201008 | 41302000 | 41500004 | 1B255C40 | D0981B25 | 5020D104 |
| 5030D108 | 58201010 | 41302000 | 41500001 | D4C1E3D4 | F0F0F4F7* | |
| 02E3E7E3 | 40000950 | 40400014 | 40400001 | 1B255C40 | D09C1B25 | 5020D0FC |
| 5030D100 | 47F0D1B4 | 40404040 | 40404040 | 40404040 | 40404040 | 40404040 |
| 40404040 | 40404040 | 40404040 | 40404040 | D4C1E3D4 | F0F0F4F8* | |
| 02E3E7E3 | 40000020 | 40400008 | 40400001 | 000008EC | 000000B8 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F4F9* | |
| 02E3E7E3 | 400000B8 | 40400004 | 40400001 | 000008C8 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F5F0** | |
| 02D9D3C4 | 40404040 | 40400038 | 40404040 | 00010001 | 0C000674 | 00010001 |
| 0C00070C | 00010001 | 0C00074C | 00010001 | 0C000848 | 00010001 | 0C000888 |
| 00010001 | 0C000020 | 00010001 | 0C000024 | D4C1E3D4 | F0F0F5F1* | |
| 02E3E7E3 | 40000104 | 40400010 | 40400001 | 00000148 | 00000198 | 80000000 |
| 0000013C | 40404040 | 40404040 | 40404040 | 40404040 | 40404040 | 40404040 |
| 40404040 | 40404040 | 40404040 | 40404040 | D4C1E3D4 | F0F0F5F2* | |
| 02E3E7E3 | 40000118 | 40400004 | 40400001 | 80000000 | 40404040 | 40404040 |
| 40404040 | 40404040 | 40404040 | 40404040 | 40404040 | 40404040 | 40404040 |
| 40404040 | 40404040 | 40404040 | 40404040 | D4C1E3D4 | F0F0F5F3* | |
| 02E3E7E3 | 400001C8 | 40400038 | 40400001 | 00000000 | 00000000 | 00000000 |
| 00000020 | 00000058 | 00000024 | 00000010 | 00000018 | 00000000 | 00000000 |
| 00000000 | 00000000 | 00000000 | 00000000 | D4C1E3D4 | F0F0F5F4* | |
| 02E3E7E3 | 40000200 | 40400038 | 40400001 | 00000000 | 00000000 | 00000000 |
| 00000000 | 00000000 | 00000000 | 00000000 | 00000000 | 01FC0008 | 00000000 |
| 01A40009 | 01CC0009 | 00940009 | 00000000 | D4C1E3D4 | F0F0F5F5* | |
| 02E3E7E3 | 40000238 | 40400034 | 40400001 | 009C000A | 00000000 | 0208000A |
| 00B0000A | 00000078 | 0000007C | 00000028 | 00000014 | 0000000C | 000000B0 |
| 000000D0 | 000000D4 | 000000C8 | 40404040 | D4C1E3D4 | F0F0F5F6* | |
| 02D9D3C4 | 40404040 | 40400020 | 40404040 | 00010001 | 0C0000B8 | 00010001 |
| 0C000104 | 00010001 | 0C000108 | 00010001 | 0C000110 | 40404040 | 40404040 |
| 40404040 | 40404040 | 40404040 | 40404040 | D4C1E3D4 | F0F0F5F7* | |
| 02C5D5C4 | 40404040 | 40404040 | 40404040 | 40404040 | 40404040 | 40404040 |
| 00000964 | F1F5F7F3 | F460C6D6 | F34040F0 | F2F0F2F8 | F7F0F9F8 | 40F0F84B |
| F4F04BF1 | F4404040 | D4C1E3D4 | D9C74040 | D4C1E3D4 | F0F0F5F8** | |

MEMBER NAME MERGE

| | | | | | | |
|---|---|---|---|---|---|---|
| 02C5E2C4 | 40404040 | 40400010 | 40400001 | D4C5D9C7 | C5404040 | 00000000 |
| 40000000 | 40404040 | 40404040 | 40404040 | 40404040 | 40404040 | 40404040 |
| 40404040 | 40404040 | 40404040 | 40404040 | D4C5D9C7 | F0F0F0F1* | |
| 02E3E7E3 | 40000000 | 40400038 | 40400001 | 47F0F00C | 07D4C5D9 | C7C54040 |
| 90ECD00C | 184D98CD | F0205040 | D00450D0 | 400807FC | 40404040 | 40404040 |
| 021A1140 | C9D4D7D9 | D6D7C5D9 | 40C3D6C4 | D4C5D9C7 | F0F0F0F2* | |
| 02E3E7E3 | 40000038 | 40400038 | 40400001 | C5407E40 | 10031A09 | 40C9D540 |
| D4C5D9C7 | C522020A | 08031801 | 0A080318 | 011A09E2 | C5D8E4C5 | D5C3C540 |
| 10041A19 | 40D5D6E3 | 40C6D6E4 | D5C440C9 | D4C5D9C7 | F0F0F0F3* | |
| 02E3E7E3 | 40000070 | 40400038 | 40400001 | D540C140 | D7D3E840 | E3C1C2D3 |
| C5183222 | 02064814 | 0122020A | 08031801 | 0A080318 | 011A0CD6 | D9C9C5D5 |
| E3C1E3C9 | D6D5400A | 06021A19 | 40D5D6E3 | D4C5D9C7 | F0F0F0F4* | |
| 02E3E7E3 | 400000A8 | 40400038 | 40400001 | 40C6D6E4 | D5C440C9 | D540C140 |
| D7D3E840 | E3C1C2D3 | C5183222 | 020A0803 | 18010A08 | 0318011A | 0ED4C1E3 |
| C5D9C9C1 | D340C3D6 | C4C54010 | 041A1940 | D4C5D9C7 | F0F0F0F5* | |
| 02E3E7E3 | 400000E0 | 4040001B | 40400001 | D5D6E340 | C6D6E4D5 | C440C9D5 |
| 40C140D7 | D3E840E3 | C1C2D3C5 | 18322240 | 40404040 | 40404040 | 40404040 |
| 40404040 | 40404040 | 40404040 | 40404040 | D4C5D9C7 | F0F0F0F6* | |
| 02E3E7E3 | 40000188 | 40400038 | 40400001 | 00000000 | 00000000 | 4F080000 |
| 00000000 | 00000000 | 00000001 | 00000002 | 00000003 | 00000004 | 00000005 |
| 00000006 | 00000018 | 00000048 | 3F28F5C3 | D4C5D9C7 | F0F0F0F7* | |
| 02E3E7E3 | 400001C0 | 40400010 | 40400001 | 40800000 | 41580000 | 00000000 |
| 00000000 | 40404040 | 40404040 | 40404040 | 40404040 | 40404040 | 40404040 |
| 40404040 | 40404040 | 40404040 | 40404040 | D4C5D9C7 | F0F0F0F8* | |
| 02C5E2C4 | 40404040 | 40400010 | 40400002 | C2E2D6D9 | E3404040 | 02000000 |
| 40000000 | 40404040 | 40404040 | 40404040 | 40404040 | 40404040 | 40404040 |
| 40404040 | 40404040 | 40404040 | 40404040 | D4C5D9C7 | F0F0F0F9* | |
| 02E3E7E3 | 40000250 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F1F0** | |
| 02C5E2C4 | 40404040 | 40400010 | 40400003 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D4C5D9C7 | F0F0F1F1* | |
| 02E3E7E3 | 40000258 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | D4C5D9C7 | F0F0F1F2* | |
| 02C5E2C4 | 40404040 | 40400010 | 40400004 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | D4C5D9C7 | F0F0F1F3* | |
| 02E3E7E3 | 40000268 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F1F4* | |
| 02E3E7E3 | 40000270 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F1F5* | |
| 02E3E7E3 | 400001F4 | 40400004 | 40400001 | 000000C8 | 40404040 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F1F6* | |
| 02E3E7E3 | 4000020C | 40400038 | 40400001 | 00000001 | 00000004 | C6D34040 |
| C1404040 | 00000011 | 00000004 | C6D34040 | C1404040 | 00000015 | 00000004 |
| C6D34040 | C1404040 | 0000000D | 00000004 | D4C5D9C7 | F0F0F1F7* | |
| 02E3E7E3 | 40000244 | 40400008 | 40400001 | C6D34040 | C4404040 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F1F8* | |
| 02E3E7E3 | 40000310 | 40400038 | 40400001 | 58B0D168 | 7800D0BC | 7000D0FC |
| 5800D098 | 5000D0D0 | 5000D1D4 | 5800D19C | 5000D1E4 | 5800D18C | 5000D1E8 |
| 5800D194 | 5000D1EC | 5800D18C | 5000D1F0 | D4C5D9C7 | F0F0F1F9* | |

02E3E7E3 40000348 40400038 40400001 5800D194 5000D1F4 5800D19C

MEMBER NAME MERGE
5000D1F8 5000D1FC 5800D18C 5000D200 5800D194 5000D204 5800D1BC
5000D208 5800D0B4 5000D20C 5890D09C D4C5D9C7 F0F0F2F0**
02E3E7E3 40000380 40400038 40400001 58A0D0B4 5880D150 5850D0D0
1A595050 D0D05800 D20C1A0A 5000D20C 5800D208 1A0A5000 D2085800
D2041A0A 5000D204 5800D200 1A0A5000 D4C5D9C7 F0F0F2F1*
02E3E7E3 400003B8 40400038 40400001 D2005800 D1FC1A0A 5000D1FC
5800D1F8 1A0A5000 D1F85800 D1F41A0A 5000D1F4 5800D1F0 1A0A5000
D1F05800 D1EC1A0A 5000D1EC 5800D1E8 D4C5D9C7 F0F0F2F2*
02E3E7E3 400003F0 40400038 40400001 1A0A5000 D1E85800 D1E41A0A
5000D1E4 5950D108 47C0D30C 47F0D7B8 5820D098 5020D104 5800D1BC
5000D184 1C4A5050 D1C81835 5A30D0A8 D4C5D9C7 F0F0F2F3*
02E3E7E3 40000428 40400038 40400001 7803B000 7000D1C0 5800D194
5000D180 18351A30 7803B000 7000D1C4 5800D18C 5000D17C 18351A30
7803B000 7000D1B0 5830D1BC 18625870 D4C5D9C7 F0F0F2F4*
02E3E7E3 40000460 40400038 40400001 D1D05880 D1CC189A 58A0D09C
58B0D150 7809B000 7900D1C0 4770D3CA 7828B000 7020D1B8 7920D1C4
4750D3CA 7847B000 7040D1B4 38647B60 D4C5D9C7 F0F0F2F5*
02E3E7E3 40000498 40400038 40400001 D0C07960 D1B04730 D3CA7A40
D0C47940 D1B04750 D3CA1266 4780D3C8 18565C40 D1841825 5A20D180
7922B000 4730D3CA 186A5AA0 D09C1A73 D4C5D9C7 F0F0F2F6*
02E3E7E3 400004D0 40400038 40400001 1A831A93 59A0D0F0 47C0D370
5060D104 5880D150 58B0D168 58A0D0B4 5890D09C 5870D0D0 1A795070
D0D85800 D0A85000 D17C50A0 D1845800 D4C5D9C7 F0F0F2F7*
02E3E7E3 40000508 40400038 40400001 D0A85A00 D1C85000 D1885800
D18C5A00 D1C85000 D1905800 D1945A00 D1C85000 D1985800 D1C85A00
D19C5000 D1A01C6A 18275A20 D0A81847 D4C5D9C7 F0F0F2F8*
02E3E7E3 40000540 40400038 40400001 5A40D18C 18575A50 D1945A70
D19C1839 18671875 18845890 D0D818A2 5990D108 47C0D468 47F0D500
58E0D188 782EB000 792AB000 4770D4EA D4C5D9C7 F0F0F2F9*
02E3E7E3 40000578 40400038 40400001 58E0D190 782EB000 7B28B000
30227920 D0FC4730 D4EA58E0 D198782E B0007B27 B0003022 7920D0FC
4730D4EA 58E0D1A0 782EB000 7926B000 D4C5D9C7 F0F0F3F0**
02E3E7E3 400005B0 40400038 40400001 4770D4EA 5850D108 5C40D184
18255A20 D17C410A B0005000 D0604102 B0005000 D0649280 D06458F0
D15C4110 D05C05EF 5800D108 1B035000 D4C5D9C7 F0F0F3F1*
02E3E7E3 400005E8 40400038 40400001 D1081A93 5A60D0B4 5A70D0B4
5A80D0B4 5AA0D0B4 47F0D45C 5880D150 58A0D0B4 5890D09C 5800D104
12004730 D75C58F0 D0EC41E0 000315FE D4C5D9C7 F0F0F3F2*
02E3E7E3 40000620 40400038 40400001 4720D52E 89F00002 58EFD04C
07FE58B0 D16858F0 D1701800 45E0F004 00000006 00000028 45E0F008
0450D0EC 45E0F010 58F0D170 45E0F034 D4C5D9C7 F0F0F3F3*
02E3E7E3 40000658 40400038 40400001 05404040 F1F55800 D1005900
D0F44750 D56E47F0 D7C65800 D1001A09 5000D100 58E0D1E4 2B00780E
B0006A00 D0906000 D0885800 D08C5000 D4C5D9C7 F0F0F3F4*
02E3E7E3 40000690 40400038 40400001 D0E458F0 D1701800 45E0F004
00000000 0000004A 5810D1E8 45E0F008 0471B000 5810D1EC 45E0F008
0471B000 45E0F008 0450D0E4 45E0F010 D4C5D9C7 F0F0F3F5*
02E3E7E3 400006C8 40400038 40400001 58F0D170 45E0F000 00000000
00000080 18A958B0 D0B85880 D160185B 5C40D100 18391A35 45E0F008
01238000 879AD5E2 5880D150 58B0D168 D4C5D9C7 F0F0F3F6*
02E3E7E3 40000700 40400038 40400001 58A0D0B4 5890D09C 45E0F010
47F0D288 5800D100 5900D0F4 4750D620 47F0D7C6 5800D100 1A095000
D10058F0 D1701800 45E0F004 00000000 D4C5D9C7 F0F0F3F7*
02E3E7E3 40000738 40400038 40400001 00000086 5810D1F0 45E0F008
0471B000 5810D1F4 45E0F008 0471B000 5810D1F8 45E0F008 0471B000
45E0F010 58F0D170 45E0F000 00000000 D4C5D9C7 F0F0F3F8*

| | | | | | | |
|---|---|---|---|---|---|---|
| 02E3E7E3 | 40000770 | 40400004 | 40400001 | 00000080 | 40404040 | 40404040 |
| 40404040 | 40404040 | 40404040 | 40404040 | 40404040 | 40404040 | 40404040 |

MEMBER NAME MERGE

| | | | | | | |
|---|---|---|---|---|---|---|
| 40404040 | 40404040 | 40404040 | 40404040 | D4C5D9C7 | F0F0F3F9* | |
| 02D9D3C4 | 40404040 | 40400038 | 40404040 | 00020001 | 1C000258 | 00030001 |
| 1C00025C | 00040001 | 1C000270 | 00010001 | 0C000640 | 00010001 | 0C0006A0 |
| 00010001 | 0C0006D4 | 00010001 | 0C000738 | D4C5D9C7 | F0F0F4F0** | |
| 02E3E7E3 | 40000774 | 40400038 | 40400001 | 18A958B0 | D0B85880 | D160185B |
| 5C40D100 | 18391A35 | 45E0F008 | 01238000 | 879AD67E | 5880D150 | 58B0D168 |
| 58A0D0B4 | 5890D09C | 45E0F010 | 47F0D288 | D4C5D9C7 | F0F0F4F1* | |
| 02E3E7E3 | 400007AC | 40400038 | 40400001 | 5800D100 | 5900D0F4 | 4750D6BC |
| 47F0D7C6 | 5800D100 | 1A095000 | D10058E0 | D1FC2B00 | 780EB000 | 6A00D090 |
| 6000D088 | 5800D08C | 5000D0E0 | 58F0D170 | D4C5D9C7 | F0F0F4F2* | |
| 02E3E7E3 | 400007E4 | 40400038 | 40400001 | 45E0F004 | 00000000 | 000000C0 |
| 5810D200 | 45E0F008 | 0471B000 | 5810D204 | 45E0F008 | 0471B000 | 45E0F008 |
| 0450D0E0 | 45E0F010 | 58F0D170 | 45E0F000 | D4C5D9C7 | F0F0F4F3* | |
| 02E3E7E3 | 4000081C | 40400038 | 40400001 | 00000000 | 00000080 | 18A958B0 |
| D0B85880 | D160185B | 5C40D100 | 18391A35 | 45E0F008 | 01238000 | 879AD72E |
| 5880D150 | 58B0D168 | 58A0D0B4 | 5890D09C | D4C5D9C7 | F0F0F4F4* | |
| 02E3E7E3 | 40000854 | 40400038 | 40400001 | 45E0F010 | 47F0D288 | 5850D104 |
| 5C40D1BC | 18255A20 | D19C58E0 | D208410E | B0005000 | D06C4102 | 80005000 |
| D0709280 | D07058F0 | D15C4110 | D06805EF | D4C5D9C7 | F0F0F4F5* | |
| 02E3E7E3 | 4000088C | 40400038 | 40400001 | 18255A20 | D1BC58E0 | D20C410E |
| B0005000 | D06C4102 | 80005000 | D0709280 | D07058F0 | D15C4110 | D06805EF |
| 47F0D288 | 58B0D168 | 58F0D158 | 4110D074 | D4C5D9C7 | F0F0F4F6* | |
| 02E3E7E3 | 400008C4 | 40400038 | 40400001 | 05EF58B0 | D1681BFF | 58E0D000 |
| 07FE58A0 | D00458E0 | A00C58B0 | A0185810 | B00C5820 | D1085020 | 10005830 |
| B0185840 | D1005040 | 300018DA | 92FFA00C | D4C5D9C7 | F0F0F4F7* | |
| 02E3E7E3 | 400008FC | 40400038 | 40400001 | 982CA01C | 07FE987B | 10045820 |
| 70005020 | D0F05820 | 90005020 | D1085820 | A0005020 | D0EC5870 | 10185820 |
| 70005020 | D1005820 | 10004130 | 20004150 | D4C5D9C7 | F0F0F4F8* | |
| 02E3E7E3 | 40000934 | 40400038 | 40400001 | 00041B25 | 5C40D0AC | 1B255020 |
| D1505030 | D1545820 | 10084130 | 20004150 | 00041B25 | 5C40D0B0 | 1B255020 |
| D1685030 | D16C5030 | D07C5820 | 10144130 | D4C5D9C7 | F0F0F4F9* | |
| 02E3E7E3 | 4000096C | 4040001A | 40400001 | 20004150 | 00011B25 | 5C40D0B8 |
| 1B255020 | D1605030 | D16447F0 | D2104040 | 40404040 | 40404040 | 40404040 |
| 40404040 | 40404040 | 40404040 | 40404040 | D4C5D9C7 | F0F0F5F0** | |
| 02E3E7E3 | 40000020 | 40400008 | 40400001 | 00000902 | 00000100 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F5F1* | |
| 02E3E7E3 | 40000100 | 40400004 | 40400001 | 000008D2 | 40404040 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F5F2* | |
| 02E3E7E3 | 4000014C | 40400008 | 40400001 | 0000062E | 0000065E | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F5F3* | |
| 02D9D3C4 | 40404040 | 40400038 | 40404040 | 00010001 | 0C000770 | 00010001 |
| 0C0007EC | 00010001 | 0C000820 | 00010001 | 0C000020 | 00010001 | 0C000024 |
| 00010001 | 0C000100 | 00010001 | 0C00014C | D4C5D9C7 | F0F0F5F4* | |
| 02E3E7E3 | 40000154 | 4040000C | 40400001 | 00000710 | 000007AC | 000001B4 |
| 40404040 | 40404040 | 40404040 | 40404040 | 40404040 | 40404040 | 40404040 |
| 40404040 | 40404040 | 40404040 | 40404040 | D4C5D9C7 | F0F0F5F5* | |
| 02E3E7E3 | 40000164 | 40400008 | 40400001 | 80000000 | 000001A8 | 40404040 |
| 40404040 | 40404040 | 40404040 | 40404040 | 40404040 | 40404040 | 40404040 |
| 40404040 | 40404040 | 40404040 | 40404040 | D4C5D9C7 | F0F0F5F6* | |
| 02E3E7E3 | 40000170 | 4040000C | 40400001 | 80000000 | 0000020C | 000001A8 |
| 40404040 | 40404040 | 40404040 | 40404040 | 40404040 | 40404040 | 40404040 |
| 40404040 | 40404040 | 40404040 | 40404040 | D4C5D9C7 | F0F0F5F7* | |

```
02E3E7E3  40000180  40400004  40400001  000001B4  40404040  40404040
40404040  40404040  40404040  40404040  40404040  40404040  40404040
40404040  40404040  40404040  40404040  D4C5D9C7  F0F0F5F8*

MEMBER NAME  MERGE
02D9D3C4  40404040  40400038  40404040  00010001  0C000150  00010001
0C000154  00010001  0C000158  00010001  0C00015C  00010001  0C000168
00010001  0C000174  00010001  0C000178  D4C5D9C7  F0F0F5F9*
02E3E7E3  40000184  40400004  40400001  80000208  40404040  40404040
40404040  40404040  40404040  40404040  40404040  40404040  40404040
40404040  40404040  40404040  40404040  D4C5D9C7  F0F0F6F0**
02E3E7E3  40000274  40400038  40400001  00000000  00000000  00000000
00000000  00000000  00000000  0000000C  00000000  00000010  00000000
00000008  00000000  00000000  00000000  D4C5D9C7  F0F0F6F1*
02E3E7E3  400002AC  40400038  40400001  00000000  00000000  00000000
00000000  00000014  00000000  00800009  0084000A  00000024  00000020
013C000B  00000000  0000000B  00000000  D4C5D9C7  F0F0F6F2*
02E3E7E3  400002E4  4040002C  40400001  0104000D  00000000  00C4000E
00000000  00B8000E  0000000E  00D0000F  00D4000F  00C8000F  00CC000F
00D8000F  40404040  40404040  40404040  D4C5D9C7  F0F0F6F3*
02D9D3C4  40404040  40400010  40404040  00010001  0C000180  00010001
0C000184  40404040  40404040  40404040  40404040  40404040  40404040
40404040  40404040  40404040  40404040  D4C5D9C7  F0F0F6F4*
02C5D5C4  40404040  40404040  40404040  40404040  40404040  40404040
00000986  F1F5F7F3  F460C6D6  F34040F0  F2F0F2F8  F7F0F9F8  40F0F84B
F4F04BF1  F9404040  D4C5D9C7  C5404040  D4C5D9C7  F0F0F6F5**

MEMBER NAME  MERGE1
02C5E2C4  40404040  40400010  40400001  D4C5D9C7  C5F14040  00000000
40000000  40404040  40404040  40404040  40404040  40404040  40404040
40404040  40404040  40404040  40404040  D4C5D9C7  F0F0F0F1*
02E3E7E3  40000000  40400038  40400001  47F0F00C  07D4C5D9  C7C5F140
90ECD00C  184D98CD  F0205040  D00450D0  400807FC  40404040  40404040
020A0803  18010A08  0318011A  06D3C1E8  D4C5D9C7  F0F0F0F2*
02E3E7E3  40000038  40400029  40400001  E4D74010  041A1940  D5D6E340
C6D6E4D5  C440C9D5  40C140D7  D3E840E3  C1C2D3C5  18322202  06481401
22404040  40404040  40404040  40404040  D4C5D9C7  F0F0F0F3*
02E3E7E3  400000E0  40400038  40400001  00000000  00000000  4F080000
00000000  00000000  00000001  00000002  00000003  00000004  00000005
00000007  00000008  00000009  00000016  D4C5D9C7  F0F0F0F4*
02E3E7E3  40000118  40400018  40400001  00000048  00000058  3F28F5C3
41580000  00000000  00000000  40404040  40404040  40404040  40404040
40404040  40404040  40404040  40404040  D4C5D9C7  F0F0F0F5*
02C5E2C4  40404040  40400010  40400002  C2E2D6D9  E3404040  02000000
40000000  40404040  40404040  40404040  40404040  40404040  40404040
40404040  40404040  40404040  40404040  D4C5D9C7  F0F0F0F6*
02E3E7E3  400001A8  40400004  40400001  00000000  40404040  40404040
40404040  40404040  40404040  40404040  40404040  40404040  40404040
40404040  40404040  40404040  40404040  D4C5D9C7  F0F0F0F7*
02C5E2C4  40404040  40400010  40400003  D4E5C3C8  D9404040  02000000
40000000  40404040  40404040  40404040  40404040  40404040  40404040
40404040  40404040  40404040  40404040  D4C5D9C7  F0F0F0F8*
02E3E7E3  400001B0  4040000C  40400001  00000000  00000000  00000000
40404040  40404040  40404040  40404040  40404040  40404040  40404040
40404040  40404040  40404040  40404040  D4C5D9C7  F0F0F0F9*
02C5E2C4  40404040  40400010  40400004  C9C2C3D6  D47B4040  02000000
40000000  40404040  40404040  40404040  40404040  40404040  40404040
40404040  40404040  40404040  40404040  D4C5D9C7  F0F0F1F0**
02E3E7E3  400001C0  40400004  40400001  00000000  40404040  40404040
```

```
40404040  40404040  40404040  40404040  40404040  40404040  40404040
40404040  40404040  40404040  40404040  D4C5D9C7  F0F0F1F1*
02E3E7E3  400001C8  40400004  40400001  00000000  40404040  40404040
40404040  40404040  40404040  40404040  40404040  40404040  40404040
40404040  40404040  40404040  40404040  D4C5D9C7  F0F0F1F2*
02E3E7E3  40000148  40400004  40400001  000000C8  40404040  40404040
40404040  40404040  40404040  40404040  40404040  40404040  40404040
40404040  40404040  40404040  40404040  D4C5D9C7  F0F0F1F3*
02E3E7E3  40000164  40400038  40400001  00000001  00000004  C6D34040
C1404040  00000005  00000004  C6D34040  C1404040  00000019  00000004
C6D34040  C1404040  00000021  00000004  D4C5D9C7  F0F0F1F4*
02E3E7E3  4000019C  40400008  40400001  C6D34040  C4404040  40404040
40404040  40404040  40404040  40404040  40404040  40404040  40404040
40404040  40404040  40404040  40404040  D4C5D9C7  F0F0F1F5*
02E3E7E3  4000024C  40400038  40400001  58B0D158  7800D0B8  7000D0E8
5800D088  5000D0C8  5000D1C8  5800D1AC  5000D1D0  5800D1B8  5000D1D4
5800D18C  5000D1D8  5800D0A4  5000D1DC  D4C5D9C7  F0F0F1F6*
02E3E7E3  40000284  40400038  40400001  5800D1C4  5000D1E0  5880D08C
5890D0B4  58A0D140  5850D0C8  1A585050  D0C85800  D1E01A09  5000D1E0
5800D1DC  1A095000  D1DC5800  D1D81A09  D4C5D9C7  F0F0F1F7*
02E3E7E3  400002BC  40400038  40400001  5000D1D8  5800D1D4  1A095000
D1D45800  D1D01A09  5000D1D0  5950D0F4  47C0D278  47F0D596  5820D088
5020D0F0  5800D1AC  5000D178  1C495050  D4C5D9C7  F0F0F1F8*
02E3E7E3  400002F4  40400038  40400001  D1BC1835  5A30D098  7803B000
7000D1B0  18355A30  D1847803  B0007000  D1B45800  D18C5000  D1745800
D17C5000  D16C1835  1A307803  B0007000  D4C5D9C7  F0F0F1F9*
02E3E7E3  4000032C  40400038  40400001  D1A05800  D1B85000  D1705830

MEMBER NAME  MERGE1
D1AC1862  5870D17C  5880D184  5890D1C0  58A0D08C  58B0D140  7809B000
7900D1B0  4770D33A  7828B000  7020D1A8  D4C5D9C7  F0F0F2F0**
02E3E7E3  40000364  40400038  40400001  7920D1B4  4750D33A  7867B000
7960D1A0  4730D33A  38467A40  D0BC7940  D1A04750  D33A1266  4780D338
18565C40  D1781825  5A20D174  7922B000  D4C5D9C7  F0F0F2F1*
02E3E7E3  4000039C  40400038  40400001  4730D33A  186A5AA0  D08C1A73
1A831A93  59A0D0DC  47C0D2E8  5060D0F0  58A0D140  58B0D158  5890D0B4
5880D08C  5870D0C8  1A785070  D0D05800  D4C5D9C7  F0F0F2F2*
02E3E7E3  400003D4  40400038  40400001  D0985000  D16C5090  D1745800
D0985A00  D1BC5000  D1785800  D17C5A00  D1BC5000  D1805800  D1845A00
D1BC5000  D1885800  D18C5A00  D1BC5000  D4C5D9C7  F0F0F2F3*
02E3E7E3  4000040C  40400038  40400001  D1901C69  18275A20  D0981847
5A40D17C  18575A50  D1845A70  D18C1838  18671875  18845890  D0D018A2
5990D0F4  47C0D3D8  47F0D470  58E0D178  D4C5D9C7  F0F0F2F4*
02E3E7E3  40000444  40400038  40400001  782EB000  792AB000  4770D45A
58E0D180  782EB000  7B28B000  30227920  D0E84730  D45A58E0  D188782E
B0007B27  B0003022  7920D0E8  4730D45A  D4C5D9C7  F0F0F2F5*
02E3E7E3  4000047C  40400038  40400001  58E0D190  782EB000  7926B000
4770D45A  5850D0F4  5C40D174  18255A20  D16C410A  B0005000  D0504102
B0005000  D0549280  D05458F0  D14C4110  D4C5D9C7  F0F0F2F6*
02E3E7E3  400004B4  40400038  40400001  D04C05EF  5800D0F4  1B035000
D0F41A93  5A60D0B4  5A70D0B4  5A80D0B4  5AA0D0B4  47F0D3CC  58A0D140
5890D0B4  5880D08C  5800D0F0  12004730  D4C5D9C7  F0F0F2F7*
02E3E7E3  400004EC  40400038  40400001  D53A5800  D0EC5900  D0E04750
D49647F0  D5A45800  D0EC1A08  5000D0EC  58E0D1D0  2B00780E  B0006A00
D0806000  D0785800  D07C5000  D0E458F0  D4C5D9C7  F0F0F2F8*
02E3E7E3  40000524  40400038  40400001  D1601800  45E0F004  00000000
00000028  5810D1D4  45E0F008  0471B000  5810D1D8  45E0F008  0471B000
45E0F008  0450D0E4  45E0F010  58F0D160  D4C5D9C7  F0F0F2F9*
02E3E7E3  4000055C  40400038  40400001  45E0F000  00000000  0000005B
```

```
189818A8  58B0D0B0  5880D150  185B5C40  D0EC1839  1A3545E0  F0080123
8000879A  D50C58A0  D14058B0  D1585890  D4C5D9C7  F0F0F3F0**
02E3E7E3  40000594  40400038  40400001  D0B45880  D08C45E0  F01047F0
D2305850  D0F05C40  D1AC1825  5A20D0A4  58E0D1DC  410EB000  5000D05C
4102A000  5000D060  9280D060  58F0D14C  D4C5D9C7  F0F0F3F1*
02E3E7E3  400005CC  40400038  40400001  4110D058  05EF1825  5A20D1AC
58E0D1E0  410EB000  5000D05C  4102A000  5000D060  9280D060  58F0D14C
4110D058  05EF47F0  D23058B0  D15858F0  D4C5D9C7  F0F0F3F2*
02E3E7E3  40000604  40400038  40400001  D1484110  D06405EF  58B0D158
1BFF58E0  D00007FE  58A0D004  58E0A00C  58B0A018  5810B00C  5820D0F4
50201000  5830B014  5840D0EC  50403000  D4C5D9C7  F0F0F3F3*
02E3E7E3  4000063C  40400038  40400001  18DA92FF  A00C982C  A01C07FE
987B1004  58207000  5020D0DC  58209000  5020D0F4  58701014  58207000
5020D0EC  58201000  41302000  41500004  D4C5D9C7  F0F0F3F4*
02E3E7E3  40000674  40400038  40400001  1B255C40  D09C1B25  5020D140
5030D144  58201008  41302000  41500004  1B255C40  D0AC1B25  5020D158
5030D15C  5030D06C  58201010  41302000  D4C5D9C7  F0F0F3F5*
02E3E7E3  400006AC  40400018  40400001  41500001  1B255C40  D0B01B25
5020D150  5030D154  47F0D1E4  40404040  40404040  40404040  40404040
40404040  40404040  40404040  40404040  D4C5D9C7  F0F0F3F6*
02E3E7E3  40000020  40400008  40400001  00000648  00000068  40404040
40404040  40404040  40404040  40404040  40404040  40404040  40404040
40404040  40404040  40404040  40404040  D4C5D9C7  F0F0F3F7*
02E3E7E3  40000068  40400004  40400001  00000618  40404040  40404040
40404040  40404040  40404040  40404040  40404040  40404040  40404040
40404040  40404040  40404040  40404040  D4C5D9C7  F0F0F3F8*
02D9D3C4  40404040  40400038  40404040  00020001  1C0001B0  00030001
1C0001B4  00040001  1C0001C8  00010001  0C000530  00010001  0C000564

MEMBER NAME  MERGE1
00010001  0C000020  00010001  0C000024  D4C5D9C7  F0F0F3F9*
02E3E7E3  400000B4  40400004  40400001  0000011C  40404040  40404040
40404040  40404040  40404040  40404040  40404040  40404040  40404040
40404040  40404040  40404040  40404040  D4C5D9C7  F0F0F4F0**
02E3E7E3  400000BC  40400008  40400001  80000000  00000100  40404040
40404040  40404040  40404040  40404040  40404040  40404040  40404040
40404040  40404040  40404040  40404040  D4C5D9C7  F0F0F4F1*
02E3E7E3  400000C8  4040000C  40400001  80000000  00000164  00000100
40404040  40404040  40404040  40404040  40404040  40404040  40404040
40404040  40404040  40404040  40404040  D4C5D9C7  F0F0F4F2*
02E3E7E3  400000D8  40400008  40400001  0000011C  8000015C  40404040
40404040  40404040  40404040  40404040  40404040  40404040  40404040
40404040  40404040  40404040  40404040  D4C5D9C7  F0F0F4F3*
02E3E7E3  400001CC  40400038  40400001  00000000  00000000  00000000
00000000  00000000  00000000  00000020  00000000  00000024  00000000
00000010  00000000  00000000  00000000  D4C5D9C7  F0F0F4F4*
02E3E7E3  40000204  40400038  40400001  00000000  00000000  00000000
00000000  00000014  007C000A  0080000A  0000000C  0134000B  00000018
0000001C  00000000  00FC000D  00000000  D4C5D9C7  F0F0F4F5*
02E3E7E3  4000023C  40400010  40400001  00BC000E  00000000  00B0000E
0000000E  40404040  40404040  40404040  40404040  40404040  40404040
40404040  40404040  40404040  40404040  D4C5D9C7  F0F0F4F6*
02D9D3C4  40404040  40400038  40404040  00010001  0C000068  00010001
0C0000B4  00010001  0C0000C0  00010001  0C0000CC  00010001  0C0000D0
00010001  0C0000D8  00010001  0C0000DC  D4C5D9C7  F0F0F4F7*
02C5D5C4  40404040  40404040  40404040  40404040  40404040  40404040
000006C4  F1F5F7F3  F460C6D6  F34040F0  F2F0F2F8  F7F0F9F8  40F0F84B
F4F04BF2  F4404040  D4C5D9C7  C5F14040  D4C5D9C7  F0F0F4F8**
```

MEMBER NAME MCHECK

| | | | | | | |
|---|---|---|---|---|---|---|
| 02C5E2C4 | 40404040 | 40400010 | 40400001 | D4C3C8C5 | C3D24040 | 00000000 |
| 40000000 | 40404040 | 40404040 | 40404040 | 40404040 | 40404040 | 40404040 |
| 40404040 | 40404040 | 40404040 | 40404040 | D4C3C8C5 | F0F0F0F1* | |
| 02E3E7E3 | 40000000 | 40400038 | 40400001 | 47F0F00C | 07D4C3C8 | C5C3D240 |
| 90ECD00C | 184D98CD | F0205040 | D00450D0 | 400807FC | 40404040 | 40404040 |
| 020A0803 | 18010A08 | 0318011A | 05C4C1E2 | D4C3C8C5 | F0F0F0F2* | |
| 02E3E7E3 | 40000038 | 40400038 | 40400001 | C8401004 | 1A0740D3 | C1E8E4D7 |
| 4010041A | 0F40D4C1 | E3C5D9C9 | C1D340C3 | D6C4C540 | 10041A0C | 40D5D6E3 |
| 40C4C5C6 | C9D5C5C4 | 18322202 | 06481401 | D4C3C8C5 | F0F0F0F3* | |
| 02E3E7E3 | 40000070 | 40400001 | 40400001 | 22404040 | 40404040 | 40404040 |
| 40404040 | 40404040 | 40404040 | 40404040 | 40404040 | 40404040 | 40404040 |
| 40404040 | 40404040 | 40404040 | 40404040 | D4C3C8C5 | F0F0F0F4* | |
| 02E3E7E3 | 400000C8 | 40400038 | 40400001 | 00000000 | 00000000 | 4E000000 |
| 00000000 | 4F080000 | 00000000 | 4E000000 | 80000000 | 00000000 | 00000001 |
| 00000002 | 00000004 | 00000006 | 00000008 | D4C3C8C5 | F0F0F0F5* | |
| 02C5E2C4 | 40404040 | 40400010 | 40400002 | D7D4C1E3 | D3404040 | 05000000 |
| 40001134 | 40404040 | 40404040 | 40404040 | 40404040 | 40404040 | 40404040 |
| 40404040 | 40404040 | 40404040 | 40404040 | D4C3C8C5 | F0F0F0F6* | |
| 02E3E7E3 | 40000100 | 4040001C | 40400001 | 00000009 | 0000000A | 00000016 |
| 00000048 | 00000058 | 00000000 | 00000000 | 40404040 | 40404040 | 40404040 |
| 40404040 | 40404040 | 40404040 | 40404040 | D4C3C8C5 | F0F0F0F7* | |
| 02E3E7E3 | 40000158 | 4040000C | 40400001 | FFFFFFA0 | 00001130 | 00000000 |
| 40404040 | 40404040 | 40404040 | 40404040 | 40404040 | 40404040 | 40404040 |
| 40404040 | 40404040 | 40404040 | 40404040 | D4C3C8C5 | F0F0F0F8* | |
| 02C5E2C4 | 40404040 | 40400010 | 40400003 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | D4C3C8C5 | F0F0F0F9* | |
| 02E3E7E3 | 40000168 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C3C8C5 | F0F0F1F0** | |
| 02E3E7E3 | 40000170 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D4C3C8C5 | F0F0F1F1* | |
| 02E3E7E3 | 40000134 | 40400004 | 40400001 | 000000C8 | 40404040 | 40404040 |
| 40404040 | 40404040 | 40404040 | 40404040 | 40404040 | 40404040 | 40404040 |
| 40404040 | 40404040 | 40404040 | 40404040 | D4C3C8C5 | F0F0F1F2* | |
| 02E3E7E3 | 400001CC | 40400038 | 40400001 | 58B0D098 | 58A0D074 | 5890D104 |
| 5800D070 | 5000D0B8 | 50A0D0A4 | 5090D10C | 50B0D114 | 5090D0FC | 50B0D124 |
| 50B0D128 | 5800D140 | 5000D110 | 5800D144 | D4C3C8C5 | F0F0F1F3* | |
| 02E3E7E3 | 40000204 | 40400038 | 40400001 | 5000D130 | 5800D148 | 5000D134 |
| 5800D14C | 5000D138 | 5800D150 | 5000D13C | 189A18AB | 58B0D0F0 | 5800D0B8 |
| 12004780 | D20458E0 | D1102B00 | 780EB000 | D4C3C8C5 | F0F0F1F4* | |
| 02E3E7E3 | 4000023C | 40400038 | 40400001 | 6A00D060 | 6000D050 | 5820D054 |
| 5020D0B0 | 5920D0B8 | 4770D1F8 | 5850D0A4 | 1B595C40 | D1141825 | 5A20D10C |
| 7822B000 | 58E0D110 | 702EB000 | 5800D0B8 | D4C3C8C5 | F0F0F1F5* | |
| 02E3E7E3 | 40000274 | 40400038 | 40400001 | 5900D0B0 | 4780D368 | 5820D128 |
| 5A20D104 | 1842186A | 58B0D0E0 | 58A0D0E4 | 5850D0F0 | 6826B050 | 2B003802 |
| 6A00D060 | 6000D050 | 5870D054 | 2B007804 | D4C3C8C5 | F0F0F1F6* | |
| 02E3E7E3 | 400002AC | 40400038 | 40400001 | 50006A00 | D0606000 | D0505880 |
| D0541987 | 4770D25E | 18095700 | D06C5000 | D05C6820 | D0586B20 | D0687024 |
| 50001987 | 4770D26C | 5080D0B8 | 47F0D368 | D4C3C8C5 | F0F0F1F7* | |
| 02E3E7E3 | 400002E4 | 40400038 | 40400001 | 5A60D098 | 5A90D074 | 5990A000 |
| 47C0D21C | 5080D0B8 | 58B0D0F0 | 58A0D098 | 5890D074 | 5800D0C4 | 5900D0BC |
| 4750D29C | 47F0D3C2 | 5800D0C4 | 1A095000 | D4C3C8C5 | F0F0F1F8* | |
| 02E3E7E3 | 4000031C | 40400038 | 40400001 | D0C458E0 | D1302B00 | 780EB000 |
| 6A00D060 | 6000D050 | 5830D054 | 10335030 | D0B458E0 | D1342B00 | 780EB000 |
| 6A00D060 | 6000D050 | 5800D054 | 5000D0C0 | D4C3C8C5 | F0F0F1F9* | |
| 02E3E7E3 | 40000354 | 40400038 | 40400001 | 58F0D0F8 | 45E0F004 | 00000000 |

MEMBER NAME MCHECK

```
00000028  5810D138  45E0F008  0471B000  5810D13C  45E0F008  0471B000
45E0F008  0450D0B4  45E0F008  0450D0C0  D4C3C8C5  F0F0F2F0**
02E3E7E3  4000038C  40400038  40400001  45E0F008  0450D0B8  45E0F010
58F0D0F8  45E0F000  00000000  0000006B  18A958B0  D0945880  D0E8185B
5C40D0C4  18391A35  45E0F008  01238000  D4C3C8C5  F0F0F2F1*
02E3E7E3  400003C4  40400038  40400001  879AD33A  58B0D0F0  58A0D098
5890D074  45E0F010  5800D070  5000D0B8  58B0D0F0  58A0D098  5890D074
5820D0A4  1A295020  D0A45800  D13C1A0A  D4C3C8C5  F0F0F2F2*
02E3E7E3  400003FC  40400038  40400001  5000D13C  5800D138  1A0A5000
D1385800  D1341A0A  5000D134  5800D130  1A0A5000  D1305800  D1281A0A
5000D128  5800D110  1A0A5000  D1105920  D4C3C8C5  F0F0F2F3*
02E3E7E3  40000434  40400038  40400001  D0C847C0  D1B058B0  D09858A0
D0745890  D1041BFF  58E0D000  07FE58A0  D00458E0  A00C58B0  A0185810
B00C5820  D0C45020  100018DA  92FFA00C  D4C3C8C5  F0F0F2F4*
02E3E7E3  4000046C  40400038  40400001  982CA01C  07FE9879  10045820
70005020  D0C85820  90005020  D0C45820  10004130  20004150  00041B25
5C40D090  1B255020  D0F05030  D0F45820  D4C3C8C5  F0F0F2F5*
02E3E7E3  400004A4  4040001E  40400001  10084130  20004150  00011B25
5C40D094  1B255020  D0E85030  D0EC47F0  D1544040  40404040  40404040
40404040  40404040  40404040  40404040  D4C3C8C5  F0F0F2F6*
02E3E7E3  40000020  40400008  40400001  00000472  00000078  40404040
40404040  40404040  40404040  40404040  40404040  40404040  40404040
40404040  40404040  40404040  40404040  D4C3C8C5  F0F0F2F7*
02E3E7E3  40000078  40400004  40400001  0000044E  40404040  40404040
40404040  40404040  40404040  40404040  40404040  40404040  40404040
40404040  40404040  40404040  40404040  D4C3C8C5  F0F0F2F8*
02D9D3C4  40404040  40400038  40404040  00020001  0C000158  00020001
0C00015C  00030001  1C000170  00010001  0C000360  00010001  0C0003A4
00010001  0C000020  00010001  0C000024  D4C3C8C5  F0F0F2F9*
02E3E7E3  40000174  40400038  40400001  00000000  00000000  00000018
00000000  00000000  00000000  00000000  00000010  00000020  00000024
00000000  00000000  00000000  00000000  D4C3C8C5  F0F0F3F0**
02E3E7E3  400001AC  40400020  40400001  00000000  00000000  00000000
00000070  00000060  00000068  00000078  0000007C  40404040  40404040
40404040  40404040  40404040  40404040  D4C3C8C5  F0F0F3F1*
02D9D3C4  40404040  40400008  40404040  00010001  0C000078  40404040
40404040  40404040  40404040  40404040  40404040  40404040  40404040
40404040  40404040  40404040  40404040  D4C3C8C5  F0F0F3F2*
02C5D5C4  40404040  40404040  40404040  40404040  40404040  40404040
000004C2  F1F5F7F3  F460C6D6  F34040F0  F2F0F2F8  F7F0F9F8  40F0F84B
F4F04BF2  F9404040  D4C3C8C5  C3D24040  D4C3C8C5  F0F0F3F3**
```

MEMBER NAME MFGMAIN

```
02C5E2C4  40404040  40400010  40400001  D4C1C9D5  40404040  00000000
40000000  40404040  40404040  40404040  40404040  40404040  40404040
40404040  40404040  40404040  40404040  D4C1C9D5  F0F0F0F1*
02E3E7E3  40000000  40400038  40400001  47F0F00C  07D4C1C9  D5404040
90ECD00C  9823F020  5030D008  50D03004  07F24040  40404040  40404040
021A3840  40D4E2C9  E9C540E6  C1E240C4  D4C1C9D5  F0F0F0F2*
02E3E7E3  40000038  40400038  40400001  C5C6C9D5  C5C440D3  C1D9C7C5
D940E3C8  C1D540D4  E2C9E9C5  4B4040C3  C8C5C3D2  40C2D3D6  C3D240C4
C1E3C122  021A2640  C3D6D7E8  D9C9C7C8  D4C1C9D5  F0F0F0F3*
02E3E7E3  40000070  40400038  40400001  E3404DC3  5D40F1F9  F8F640E3
C8C540C2  D6C5C9D5  C740C3D6  D4D7C1D5  E81E1A15  40C1D3D3  40D9C9C7
C8E3E240  D9C5E2C5  D9E5C5C4  4B1E1E1A  D4C1C9D5  F0F0F0F4*
02E3E7E3  400000A8  40400038  40400001  0E40E2D3  C9C340E5  C5D9E2C9
D6D54014  041E1E22  02060414  01180106  02140418  01061414  01220218
```

```
121A2140  5C5C5C5C  40D5D640  C7C5D6D4  D4C1C9D5  F0F0F0F5*
02E3E7E3  400000E0  40400038  40400001  C5E3D9E8  40C9D540  E5C9C5E6
40D7E540  5C5C5C5C  18322202  06481401  22021812  1A23405C  5C5C5C40
D5D640C1  D9D9E6D6  C8C5C1C4  E240C9D5  D4C1C9D5  F0F0F0F6*
02E3E7E3  40000118  40400038  40400001  40E5C9C5  E640D7E5  405C5C5C
5C183222  021A10D9  C5E3D9C9  E5C540C5  D9D9D6D9  407E4010  031A0B40
C9D540D4  C6C7D4C1  C9D52202  1A0FD9C5  D4C1C9D5  F0F0F0F7*
02E3E7E3  40000150  40400026  40400001  C6C9D3C5  40C5D9D9  D6D9407E
4010031A  0B40C9D5  40D4C6C7  D4C1C9D5  22021A01  40064814  01224040
40404040  40404040  40404040  40404040  D4C1C9D5  F0F0F0F8*
02E3E7E3  40000178  40400020  40400001  E2D3C9C3  40D7D9D6  C3C5E2E2
C9D5C740  C3D6D4D7  D3C5E3C5  C4404040  40404040  40404040  40404040
40404040  40404040  40404040  40404040  D4C1C9D5  F0F0F0F9*
02E3E7E3  40000368  40400038  40400001  00000000  00000001  00000002
00000003  00000004  00000005  00000008  0000000C  00000010  00000014
00000018  00000019  0000002C  00000032  D4C1C9D5  F0F0F1F0**
02C5E2C4  40404040  40400010  40400002  C5D3D4E3  C2D34040  05000000
400D7D28  40404040  40404040  40404040  40404040  40404040  40404040
40404040  40404040  40404040  40404040  D4C1C9D5  F0F0F1F1*
02E3E7E3  400003A0  4040002C  40400001  00000038  0000003C  00000048
00000058  401DF3B6  4029FBE7  403EF9DB  41200000  414CCCCD  00000000
00000000  40404040  40404040  40404040  D4C1C9D5  F0F0F1F2*
02C5E2C4  40404040  40400010  40400003  D7E3C1C2  D3C54040  05000000
40125768  40404040  40404040  40404040  40404040  40404040  40404040
40404040  40404040  40404040  40404040  D4C1C9D5  F0F0F1F3*
02C5E2C4  40404040  40400010  40400004  E2E3C1C3  D2404040  05000000
40040744  40404040  40404040  40404040  40404040  40404040  40404040
40404040  40404040  40404040  40404040  D4C1C9D5  F0F0F1F4*
02E3E7E3  40000478  40400020  40400001  FFFFFFC8  000CD118  FFFFFFEC
00058600  000B0444  00108298  00111ED4  FFFFFFA8  40404040  40404040
40404040  40404040  40404040  40404040  D4C1C9D5  F0F0F1F5*
02D9D3C4  40404040  40400038  40404040  00020001  0C000478  00020001
0C00047C  00030001  0C000480  00030001  0C000484  00030001  0C000488
00030001  0C00048C  00030001  0C000490  D4C1C9D5  F0F0F1F6*
02C5E2C4  40404040  40400010  40400005  C7D9E4D7  40404040  05000000
4000000C  40404040  40404040  40404040  40404040  40404040  40404040
40404040  40404040  40404040  40404040  D4C1C9D5  F0F0F1F7*
02C5E2C4  40404040  40400010  40400006  D9D4D6C4  C5D34040  05000000
40000018  40404040  40404040  40404040  40404040  40404040  40404040
40404040  40404040  40404040  40404040  D4C1C9D5  F0F0F1F8*
02C5E2C4  40404040  40400010  40400007  C6D4D6C4  C5D34040  05000000
400001F8  40404040  40404040  40404040  40404040  40404040  40404040
40404040  40404040  40404040  40404040  D4C1C9D5  F0F0F1F9*
02C5E2C4  40404040  40400010  40400008  D7C3C5D9  D9404040  05000000

MEMBER NAME  MFGMAIN
40003844  40404040  40404040  40404040  40404040  40404040  40404040
40404040  40404040  40404040  40404040  D4C1C9D5  F0F0F2F0**
02C5E2C4  40404040  40400010  40400009  D7D7D6C9  D5E34040  05000000
40013884  40404040  40404040  40404040  40404040  40404040  40404040
40404040  40404040  40404040  40404040  D4C1C9D5  F0F0F2F1*
02C5E2C4  40404040  40400010  4040000A  E2C5D9D9  D6D94040  05000000
40000004  40404040  40404040  40404040  40404040  40404040  40404040
40404040  40404040  40404040  40404040  D4C1C9D5  F0F0F2F2*
02C5E2C4  40404040  40400010  4040000B  D6D7E3C9  D6D54040  05000000
40000020  40404040  40404040  40404040  40404040  40404040  40404040
40404040  40404040  40404040  40404040  D4C1C9D5  F0F0F2F3*
02E3E7E3  40000498  4040001C  40400001  00000000  FFFFFFFF  FFFFFFEB
FFFFFFBB  FFFFFFF0  00000000  00000000  40404040  40404040  40404040
```

| | | | | | | |
|---|---|---|---|---|---|---|
| 40404040 | 40404040 | 40404040 | 40404040 | D4C1C9D5 | F0F0F2F4* | |
| 02D9D3C4 | 40404040 | 40400038 | 40404040 | 00040001 | 0C000494 | 00050001 |
| 0C000498 | 00060001 | 0C00049C | 00070001 | 0C0004A0 | 00080001 | 0C0004A4 |
| 00090001 | 0C0004A8 | 000A0001 | 0C0004AC | D4C1C9D5 | F0F0F2F5* | |
| 02C5E2C4 | 40404040 | 40400010 | 4040000C | C6D4E3C5 | D9D94040 | 05000000 |
| 40002D58 | 40404040 | 40404040 | 40404040 | 40404040 | 40404040 | 40404040 |
| 40404040 | 40404040 | 40404040 | 40404040 | D4C1C9D5 | F0F0F2F6* | |
| 02C5E2C4 | 40404040 | 40400010 | 4040000D | D4E2C9E9 | C5404040 | 05000000 |
| 4000000C | 40404040 | 40404040 | 40404040 | 40404040 | 40404040 | 40404040 |
| 40404040 | 40404040 | 40404040 | 40404040 | D4C1C9D5 | F0F0F2F7* | |
| 02C5E2C4 | 40404040 | 40400010 | 4040000E | E2D3C9D5 | C5E24040 | 05000000 |
| 40001C24 | 40404040 | 40404040 | 40404040 | 40404040 | 40404040 | 40404040 |
| 40404040 | 40404040 | 40404040 | 40404040 | D4C1C9D5 | F0F0F2F8* | |
| 02C5E2C4 | 40404040 | 40400010 | 4040000F | C3C1C4C5 | E3404040 | 02000000 |
| 40000000 | 40404040 | 40404040 | 40404040 | 40404040 | 40404040 | 40404040 |
| 40404040 | 40404040 | 40404040 | 40404040 | D4C1C9D5 | F0F0F2F9* | |
| 02C5E2C4 | 40404040 | 40400010 | 40400010 | C3C1C4E2 | E3404040 | 02000000 |
| 40000000 | 40404040 | 40404040 | 40404040 | 40404040 | 40404040 | 40404040 |
| 40404040 | 40404040 | 40404040 | 40404040 | D4C1C9D5 | F0F0F3F0** | |
| 02E3E7E3 | 400004B4 | 4040001C | 40400001 | FFFFFFC3 | 00002551 | 00000000 |
| FFFFFFE4 | 00001C20 | 00000000 | 00000000 | 40404040 | 40404040 | 40404040 |
| 40404040 | 40404040 | 40404040 | 40404040 | D4C1C9D5 | F0F0F3F1* | |
| 02D9D3C4 | 40404040 | 40400038 | 40404040 | 000B0001 | 0C0004B0 | 000C0001 |
| 0C0004B4 | 000C0001 | 0C0004B8 | 000D0001 | 0C0004BC | 000E0001 | 0C0004C0 |
| 000E0001 | 0C0004C4 | 000F0001 | 1C0004C8 | D4C1C9D5 | F0F0F3F2* | |
| 02C5E2C4 | 40404040 | 40400010 | 40400011 | C6D4C3C8 | E3404040 | 02000000 |
| 40000000 | 40404040 | 40404040 | 40404040 | 40404040 | 40404040 | 40404040 |
| 40404040 | 40404040 | 40404040 | 40404040 | D4C1C9D5 | F0F0F3F3* | |
| 02C5E2C4 | 40404040 | 40400010 | 40400012 | C6E2C5D5 | C4404040 | 02000000 |
| 40000000 | 40404040 | 40404040 | 40404040 | 40404040 | 40404040 | 40404040 |
| 40404040 | 40404040 | 40404040 | 40404040 | D4C1C9D5 | F0F0F3F4* | |
| 02C5E2C4 | 40404040 | 40400010 | 40400013 | C7E3D7D9 | D4404040 | 02000000 |
| 40000000 | 40404040 | 40404040 | 40404040 | 40404040 | 40404040 | 40404040 |
| 40404040 | 40404040 | 40404040 | 40404040 | D4C1C9D5 | F0F0F3F5* | |
| 02C5E2C4 | 40404040 | 40400010 | 40400014 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D4C1C9D5 | F0F0F3F6* | |
| 02C5E2C4 | 40404040 | 40400010 | 40400015 | C2D3C4D4 | C6C74040 | 02000000 |
| 40000000 | 40404040 | 40404040 | 40404040 | 40404040 | 40404040 | 40404040 |
| 40404040 | 40404040 | 40404040 | 40404040 | D4C1C9D5 | F0F0F3F7* | |
| 02C5E2C4 | 40404040 | 40400010 | 40400016 | C2D3C4E2 | C5D84040 | 02000000 |
| 40000000 | 40404040 | 40404040 | 40404040 | 40404040 | 40404040 | 40404040 |
| 40404040 | 40404040 | 40404040 | 40404040 | D4C1C9D5 | F0F0F3F8* | |
| 02C5E2C4 | 40404040 | 40400010 | 40400017 | C3C1C4C6 | C9D34040 | 02000000 |
| 40000000 | 40404040 | 40404040 | 40404040 | 40404040 | 40404040 | 40404040 |

MEMBER NAME MFGMAIN

| | | | | | | |
|---|---|---|---|---|---|---|
| 40404040 | 40404040 | 40404040 | 40404040 | D4C1C9D5 | F0F0F3F9* | |
| 02E3E7E3 | 400004D0 | 4040001C | 40400001 | 00000000 | 00000000 | 00000000 |
| 00000000 | 00000000 | 00000000 | 00000000 | 40404040 | 40404040 | 40404040 |
| 40404040 | 40404040 | 40404040 | 40404040 | D4C1C9D5 | F0F0F4F0** | |
| 02D9D3C4 | 40404040 | 40400038 | 40404040 | 00100001 | 1C0004CC | 00110001 |
| 1C0004D0 | 00120001 | 1C0004D4 | 00130001 | 1C0004D8 | 00140001 | 1C0004DC |
| 00150001 | 1C0004E0 | 00160001 | 1C0004E4 | D4C1C9D5 | F0F0F4F1* | |
| 02C5E2C4 | 40404040 | 40400010 | 40400018 | C3C1C4E2 | E4D74040 | 02000000 |
| 40000000 | 40404040 | 40404040 | 40404040 | 40404040 | 40404040 | 40404040 |
| 40404040 | 40404040 | 40404040 | 40404040 | D4C1C9D5 | F0F0F4F2* | |
| 02C5E2C4 | 40404040 | 40400010 | 40400019 | C3C3C4C6 | E3E74040 | 02000000 |
| 40000000 | 40404040 | 40404040 | 40404040 | 40404040 | 40404040 | 40404040 |

```
40404040  40404040  40404040  40404040  D4C1C9D5  F0F0F4F3*
02C5E2C4  40404040  40400010  4040001A  C3D6E5E2  C5D84040  02000000
40000000  40404040  40404040  40404040  40404040  40404040  40404040
40404040  40404040  40404040  40404040  D4C1C9D5  F0F0F4F4*
02C5E2C4  40404040  40400010  4040001B  C4C5C6C9  D5C54040  02000000
40000000  40404040  40404040  40404040  40404040  40404040  40404040
40404040  40404040  40404040  40404040  D4C1C9D5  F0F0F4F5*
02C5E2C4  40404040  40400010  4040001C  C6C3C8C1  D9E34040  02000000
40000000  40404040  40404040  40404040  40404040  40404040  40404040
40404040  40404040  40404040  40404040  D4C1C9D5  F0F0F4F6*
02C5E2C4  40404040  40400010  4040001D  C7C5D5D6  E4E34040  02000000
40000000  40404040  40404040  40404040  40404040  40404040  40404040
40404040  40404040  40404040  40404040  D4C1C9D5  F0F0F4F7*
02C5E2C4  40404040  40400010  4040001E  C9C2C3D6  D47B4040  02000000
40000000  40404040  40404040  40404040  40404040  40404040  40404040
40404040  40404040  40404040  40404040  D4C1C9D5  F0F0F4F8*
02E3E7E3  400004EC  4040001C  40400001  00000000  00000000  00000000
00000000  00000000  00000000  00000000  40404040  40404040  40404040
40404040  40404040  40404040  40404040  D4C1C9D5  F0F0F4F9*
02D9D3C4  40404040  40400038  40404040  00170001  1C0004E8  00180001
1C0004EC  00190001  1C0004F0  001A0001  1C0004F4  001B0001  1C0004F8
001C0001  1C0004FC  001D0001  1C000500  D4C1C9D5  F0F0F5F0**
02C5E2C4  40404040  40400010  4040001F  D4D6C4E2  D9E34040  02000000
40000000  40404040  40404040  40404040  40404040  40404040  40404040
40404040  40404040  40404040  40404040  D4C1C9D5  F0F0F5F1*
02C5E2C4  40404040  40400010  40400020  D7C3C8C1  D9E34040  02000000
40000000  40404040  40404040  40404040  40404040  40404040  40404040
40404040  40404040  40404040  40404040  D4C1C9D5  F0F0F5F2*
02C5E2C4  40404040  40400010  40400021  D7C3C8C5  C3D24040  02000000
40000000  40404040  40404040  40404040  40404040  40404040  40404040
40404040  40404040  40404040  40404040  D4C1C9D5  F0F0F5F3*
02C5E2C4  40404040  40400010  40400022  E2E2E3C9  C3D24040  02000000
40000000  40404040  40404040  40404040  40404040  40404040  40404040
40404040  40404040  40404040  40404040  D4C1C9D5  F0F0F5F4*
02E3E7E3  40000508  40400010  40400001  00000000  00000000  00000000
00000000  40404040  40404040  40404040  40404040  40404040  40404040
40404040  40404040  40404040  40404040  D4C1C9D5  F0F0F5F5*
02E3E7E3  400003EC  40400004  40400001  000000C8  40404040  40404040
40404040  40404040  40404040  40404040  40404040  40404040  40404040
40404040  40404040  40404040  40404040  D4C1C9D5  F0F0F5F6*
02E3E7E3  4000052C  40400038  40400001  5860D2F4  5870D30C  5880D2E8
58A0D318  58B0D2FC  5890D22C  58F0D324  5820F004  5B20F000  5020F008
47A0D3D4  58F0D36C  45E0F004  00000006  D4C1C9D5  F0F0F5F7*
02E3E7E3  40000564  40400038  40400001  00000028  45E0F010  58F0D324
5800F008  120047A0  D3F058F0  D36C45E0  F0340540  4040F2F3  58F0D360
1B1105EF  58F0D36C  45E0F004  00000006  D4C1C9D5  F0F0F5F8*

MEMBER NAME   MFGMAIN
02E3E7E3  4000059C  40400038  40400001  00000064  5820D304  45E0F008
04702015  45E0F010  58F0D340  1B1105EF  58B0D308  58A0D300  18965880
D30458F0  D36C1800  45E0F000  10000005  D4C1C9D5  F0F0F5F9*
02E3E7E3  400005D4  40400004  40400001  000000BC  40404040  40404040
40404040  40404040  40404040  40404040  40404040  40404040  40404040
40404040  40404040  40404040  40404040  D4C1C9D5  F0F0F6F0**
02D9D3C4  40404040  40400038  40404040  001E0001  1C000504  001F0001
1C000508  00200001  1C00050C  00210001  1C000510  00220001  1C000514
00010001  0C000564  00010001  0C00059C  D4C1C9D5  F0F0F6F1*
02E3E7E3  400005D8  40400038  40400001  00000528  45E0F00C  00000408
01200004  45E0F00C  00000464  04700002  45E0F00C  0000040C  01200014
```

```
45E0F010  58F0D344  4110D054  05EF4100  D4C1C9D5  F0F0F6F2*
02E3E7E3  40000610  40400038  40400001  A0045000  D0644100  D2CC5000
D0689280  D06858F0  D3444110  D06005EF  58F0D334  4110D06C  05EF58F0
D3504110  D07805EF  5800D264  5900D1E0  D4C1C9D5  F0F0F6F3*
02E3E7E3  40000648  40400038  40400001  4780D49E  5800D264  5900D1D4
4780D4C4  47F0D8D8  58009008  5A00D1D4  50009008  5800B1A5  5A00D1D4
5000B1A5  58009008  5900D1D4  4770D4F2  D4C1C9D5  F0F0F6F4*
02E3E7E3  40000680  40400038  40400001  58F0D344  4110D084  05EF58F0
D3584110  D09005EF  5830B1A5  5C20D1E4  4103B1A4  5000D0A8  4100D268
5000D0AC  9280D0AC  58F0D344  4110D0A4  D4C1C9D5  F0F0F6F5*
02E3E7E3  400006B8  40400038  40400001  05EF5830  B1A55C20  D1F44103
B0015000  D0B458F0  D3444110  D0B005EF  58F0D330  1B1105EF  47F0D42E
5880D2E8  58A0D318  58B0D2FC  5890D22C  D4C1C9D5  F0F0F6F6*
02E3E7E3  400006F0  40400038  40400001  58F0D378  4110D0BC  05EF58F0
D3481B11  05EF58F0  D2E05800  F0385900  D1D44730  D5D05850  70455A50
D1D45050  70455950  D25447A0  D78C58F0  D4C1C9D5  F0F0F6F7*
02E3E7E3  40000728  40400038  40400001  D36C1800  45E0F004  00000000
000000CE  45E0F010  58F0D36C  45E0F000  00000000  000000F7  5C40D210
45E0F134  00010000  01257001  01000048  D4C1C9D5  F0F0F6F8*
02E3E7E3  40000760  40400038  40400001  00000001  45E0F010  5800600C
12004730  D6305850  70455A50  D1D45050  70455950  D25447A0  D78C58F0
D36C1800  45E0F004  00000000  000000FD  D4C1C9D5  F0F0F6F9*
02D9D3C4  40404040  40400038  40404040  00010001  0C0005D4  00010001
0C0005D8  00010001  0C0005E0  00010001  0C0005EC  00010001  0C0005F8
00010001  0C000734  00010001  0C000748  D4C1C9D5  F0F0F7F0**
02E3E7E3  40000798  40400038  40400001  45E0F010  58F0D36C  45E0F000
00000000  000000F7  5C40D210  45E0F134  00010000  01257001  01000048
00000001  45E0F010  58F0D2E0  5800F038  D4C1C9D5  F0F0F7F1*
02E3E7E3  400007D0  40400038  40400001  5900D1D4  41300001  47C0D646
1B335800  600C5900  D1D44120  00014740  D6581B22  16238629  D78C5800
A00C8709  D67058F0  D3644110  D0C405EF  D4C1C9D5  F0F0F7F2*
02E3E7E3  40000808  40400038  40400001  58F0D310  5800F010  5900D1D0
41200001  4720D686  1B228729  D69E58F0  D3145800  F0008609  D69E58F0
D3741B11  05EF58F0  D3105800  F0101200  D4C1C9D5  F0F0F7F3*
02E3E7E3  40000840  40400038  40400001  47C0D6B6  58F0D33C  4110D0CC
05EF58F0  D3145800  F0008609  D6FA5800  A0048709  D6FA5800  A00C8709
D6FA5800  A0088609  D6FA5800  70455900  D4C1C9D5  F0F0F7F4*
02E3E7E3  40000878  40400038  40400001  D1D04120  00014780  D6EC1B22
8729D6FA  58F0D34C  4110D0C4  05EF5800  A00C8709  D73658F0  D3145800
F0008609  D7365800  70455900  D1D04120  D4C1C9D5  F0F0F7F5*
02E3E7E3  400008B0  40400038  40400001  00014780  D7201B22  8729D736
5800A01C  8609D736  58F0D35C  4110D0D0  05EF5800  A0088609  D82658F0
D3704110  D0F405EF  58F0D344  4110D114  D4C1C9D5  F0F0F7F6*
02E3E7E3  400008E8  40400038  40400001  05EF58F0  D3444110  D12005EF
58F0D334  4110D06C  05EF58B0  D1E058F0  D3504110  D12C05EF  59B0D264
4780D76A  58B0D2FC  5800D264  5900D1D4  D4C1C9D5  F0F0F7F7*
02E3E7E3  40000920  40400038  40400001  4770D8D8  58F0D320  5800F02F

MEMBER NAME  MFGMAIN
5900D1D0  41200001  4720D7A2  1B225800  F8035900  D1D04130  00014720
D7B41B33  16325800  70455900  D1D04120  D4C1C9D5  F0F0F7F8*
02E3E7E3  40000958  40400038  40400001  00014720  D7C81B22  16238729
D7D658F0  D3381B11  05EF7800  D2243300  7000D388  7800D228  33007000
D38C58F0  D3544110  D13805EF  41E00004  D4C1C9D5  F0F0F7F9*
02E3E7E3  40000990  40400038  40400001  15FE4720  D80458EF  D04C07FE
58F0D350  4110D180  05EF5800  D2645900  D1E04780  D8045800  D2645900
D1D44770  D9125800  70451200  4730D93E  D4C1C9D5  F0F0F8F0**
02E3E7E3  400009C8  40400038  40400001  58F0D314  5800F000  8709D84A
58F0D36C  45E0F034  05404040  F2F35800  A0148709  D88E5800  A00C8709
```

```
D88E58F0  D3145800  F0008609  D88E5800  D4C1C9D5  F0F0F8F1*
02E3E7E3  40000A00  40400038  40400001  A0088609  D88E5800  70455900
D1D04120  00014780  D8801B22  8729D88E  58F0D37C  4110D18C  05EF5800
A0008709  D8CA5800  A00C8709  D8CA5800  D4C1C9D5  F0F0F8F2*
02E3E7E3  40000A38  40400038  40400001  70455900  D1D04120  00014780
D8B01B22  8729D8CA  58F0D314  5800F000  8609D8CA  58F0D368  4110D1B0
05EF58F0  D36C45E0  F0340540  404040F0  D4C1C9D5  F0F0F8F3*
02E3E7E3  40000A70  40400038  40400001  5880D2E8  58A0D318  58B0D2FC
5890D22C  58F0D36C  45E0F004  00000006  00000128  45E0F008  0450D264
45E0F010  58F0D36C  45E0F034  05404040  D4C1C9D5  F0F0F8F4*
02E3E7E3  40000AA8  40400038  40400001  F1F058F0  D36C1800  45E0F004
00000006  0000014B  45E0F008  0450D264  45E0F010  58F0D36C  45E0F034
05404040  F1F15830  70455C20  D2105890  D4C1C9D5  F0F0F8F5*
02E3E7E3  40000AE0  40400038  40400001  D21058A0  D21018B3  188758F0
D36C1800  45E0F004  00000006  0000016D  45E0F134  00010000  01298001
01000048  00000001  45E0F010  879AD952  D4C1C9D5  F0F0F8F6*
02E3E7E3  40000B18  4040002C  40400001  5880D2E8  58A0D318  58B0D2FC
5890D22C  58F0D36C  45E0F034  05404040  F2F358F0  D36C45E0  F0340540
404040F0  40404040  40404040  40404040  D4C1C9D5  F0F0F8F7*
02E3E7E3  40000B46  4040000E  40400001  58F0336C  45E0F040  18D347F0
D3944040  40404040  40404040  40404040  40404040  40404040  40404040
40404040  40404040  40404040  40404040  D4C1C9D5  F0F0F8F8*
02E3E7E3  40000020  40400008  40400001  00000B46  00000198  40404040
40404040  40404040  40404040  40404040  40404040  40404040  40404040
40404040  40404040  40404040  40404040  D4C1C9D5  F0F0F8F9*
02E3E7E3  40000198  40400004  40400001  00000B36  40404040  40404040
40404040  40404040  40404040  40404040  40404040  40404040  40404040
40404040  40404040  40404040  40404040  D4C1C9D5  F0F0F9F0**
02D9D3C4  40404040  40400038  40404040  00010001  0C000794  00010001
0C0007A8  00010001  0C000A8C  00010001  0C000AB8  00010001  0C000AF8
00010001  0C000020  00010001  0C000024  D4C1C9D5  F0F0F9F1*
02E3E7E3  400001E4  40400018  40400001  0000099C  0000099C  00000378
00000000  80000408  00000380  40404040  40404040  40404040  40404040
40404040  40404040  40404040  40404040  D4C1C9D5  F0F0F9F2*
02E3E7E3  40000200  40400008  40400001  80000000  0000040C  40404040
40404040  40404040  40404040  40404040  40404040  40404040  40404040
40404040  40404040  40404040  40404040  D4C1C9D5  F0F0F9F3*
02D9D3C4  40404040  40400038  40404040  00010001  0C000198  00010001
0C0001E4  00010001  0C0001E8  00010001  0C0001EC  00050001  0C0001F0
00010001  0C0001F4  00010001  0C0001F8  D4C1C9D5  F0F0F9F4*
02E3E7E3  40000208  4040001C  40400001  00000464  80000408  0000036C
000003FC  800003DC  0000038C  00000000  40404040  40404040  40404040
40404040  40404040  40404040  40404040  D4C1C9D5  F0F0F9F5*
02D9D3C4  40404040  40400038  40404040  00010001  0C000204  00010001
0C000208  00010001  0C00020C  00010001  0C000210  00010001  0C000214
00010001  0C000218  00010001  0C00021C  D4C1C9D5  F0F0F9F6*
02E3E7E3  40000224  4040001C  40400001  8000040C  0000036C  00000420
00000400  000003E4  800003F8  0000037C  40404040  40404040  40404040

MEMBER NAME  MFGMAIN
40404040  40404040  40404040  40404040  D4C1C9D5  F0F0F9F7*
02D9D3C4  40404040  40400038  40404040  00060001  0C000220  00010001
0C000224  00010001  0C000228  00010001  0C00022C  00010001  0C000230
00010001  0C000234  00010001  0C000238  D4C1C9D5  F0F0F9F8*
02E3E7E3  40000244  40400008  40400001  80000000  0000038C  40404040
40404040  40404040  40404040  40404040  40404040  40404040  40404040
40404040  40404040  40404040  40404040  D4C1C9D5  F0F0F9F9*
02E3E7E3  40000250  40400018  40400001  8000040C  00000004  80000000
00000004  80000000  800003D0  40404040  40404040  40404040  40404040
```

```
40404040  40404040  40404040  40404040  D4C1C9D5  F0F1F0F0**
02D9D3C4  40404040  40400038  40404040  00010001  0C00023C  00010001
0C000248  00010001  0C000250  00090001  0C000254  00090001  0C000258
00040001  0C00025C  00040001  0C000260  D4C1C9D5  F0F1F0F1*
02E3E7E3  40000268  4040001C  40400001  00000004  00000000  00000000
001082A0  001082A8  001082A4  00111EE8  40404040  40404040  40404040
40404040  40404040  40404040  40404040  D4C1C9D5  F0F1F0F2*
02D9D3C4  40404040  40400038  40404040  00010001  0C000264  00040001
0C000268  00040001  0C00026C  00030001  0C000270  00030001  0C000274
00030001  0C000278  00030001  0C00027C  D4C1C9D5  F0F1F0F3*
02E3E7E3  40000284  4040001C  40400001  00000004  80000000  00000370
000003E0  00000000  000007D4  000003E8  40404040  40404040  40404040
40404040  40404040  40404040  40404040  D4C1C9D5  F0F1F0F4*
02D9D3C4  40404040  40400038  40404040  00030001  0C000280  00080001
0C000284  00080001  0C000288  00010001  0C00028C  00010001  0C000290
00030001  0C000294  00030001  0C000298  D4C1C9D5  F0F1F0F5*
02E3E7E3  400002A0  4040001C  40400001  000003F4  000003D8  8000040C
00000378  00000408  80000000  00000380  40404040  40404040  40404040
40404040  40404040  40404040  40404040  D4C1C9D5  F0F1F0F6*
02D9D3C4  40404040  40400038  40404040  00010001  0C00029C  00010001
0C0002A0  00010001  0C0002A4  00010001  0C0002A8  00010001  0C0002AC
00010001  0C0002B0  00050001  0C0002B4  D4C1C9D5  F0F1F0F7*
02E3E7E3  400002BC  4040001C  40400001  00000464  80000004  0000036C
000003FC  800003F0  00000520  00000524  40404040  40404040  40404040
40404040  40404040  40404040  40404040  D4C1C9D5  F0F1F0F8*
02D9D3C4  40404040  40400038  40404040  00010001  0C0002B8  00010001
0C0002BC  00050001  0C0002C0  00010001  0C0002C4  00010001  0C0002C8
00010001  0C0002CC  00010001  0C0002D0  D4C1C9D5  F0F1F0F9*
02E3E7E3  400002D8  4040001C  40400001  00000368  00000394  000003B4
000003B0  00000178  00000368  00000368  40404040  40404040  40404040
40404040  40404040  40404040  40404040  D4C1C9D5  F0F1F1F0**
02D9D3C4  40404040  40400038  40404040  00010001  0C0002D4  00010001
0C0002D8  00010001  0C0002DC  00010001  0C0002E0  00010001  0C0002E4
00010001  0C0002E8  00010001  0C0002EC  D4C1C9D5  F0F1F1F1*
02E3E7E3  400002F4  4040001C  40400001  00000368  00000368  0000036C
00000374  00000368  00000368  000003B4  40404040  40404040  40404040
40404040  40404040  40404040  40404040  D4C1C9D5  F0F1F1F2*
02D9D3C4  40404040  40400038  40404040  00010001  0C0002F0  00010001
0C0002F4  00010001  0C0002F8  00010001  0C0002FC  00010001  0C000300
00010001  0C000304  00010001  0C000308  D4C1C9D5  F0F1F1F3*
02E3E7E3  40000310  4040001C  40400001  000003B8  80000368  00000370
000003FC  800003F0  00000004  00000000  40404040  40404040  40404040
40404040  40404040  40404040  40404040  D4C1C9D5  F0F1F1F4*
02D9D3C4  40404040  40400038  40404040  00010001  0C00030C  00010001
0C000310  00010001  0C000314  00010001  0C000318  00010001  0C00031C
00010001  0C000320  00040001  0C000324  D4C1C9D5  F0F1F1F5*
02E3E7E3  4000032C  4040001C  40400001  00000000  001082A0  001082A8
001082A4  00111EE8  00000000  80001C20  40404040  40404040  40404040
40404040  40404040  40404040  40404040  D4C1C9D5  F0F1F1F6*

MEMBER NAME  MFGMAIN
02D9D3C4  40404040  40400038  40404040  00040001  0C000328  00030001
0C00032C  00030001  0C000330  00030001  0C000334  00030001  0C000338
00030001  0C00033C  000E0001  0C000340  D4C1C9D5  F0F1F1F7*
02E3E7E3  40000348  4040001C  40400001  00000000  001082A0  001082A8
00111EE8  001082A4  00000004  80000000  40404040  40404040  40404040
40404040  40404040  40404040  40404040  D4C1C9D5  F0F1F1F8*
02D9D3C4  40404040  40400038  40404040  000E0001  0C000344  00030001
0C000348  00030001  0C00034C  00030001  0C000350  00030001  0C000354
```

```
00030001 0C000358 00040001 0C00035C D4C1C9D5 F0F1F1F9*
02E3E7E3 40000518 40400014 40400001 00000000 00000000 00000000
00000000 000006E0 40404040 40404040 40404040 40404040 40404040
40404040 40404040 40404040 40404040 D4C1C9D5 F0F1F2F0**
02D9D3C4 40404040 40400010 40404040 00040001 0C000360 00010001
0C000528 40404040 40404040 40404040 40404040 40404040 40404040
40404040 40404040 40404040 40404040 D4C1C9D5 F0F1F2F1*
02C5D5C4 40000000 40404040 40400001 40404040 40404040 40404040
00000B54 F1F5F7F3 F460C6D6 F34040F0 F2F0F2F8 F7F0F9F8 40F0F84B
F4F04BF3 F3404040 D4C1C9D5 40404040 D4C1C9D5 F0F1F2F2**

MEMBER NAME  MLCHAR
02C5E2C4 40404040 40400010 40400001 D4D3C3C8 C1D94040 00000000
40000000 40404040 40404040 40404040 40404040 40404040 40404040
40404040 40404040 40404040 40404040 D4D3C3C8 F0F0F0F1*
02E3E7E3 40000000 40400038 40400001 47F0F00C 07D4D3C3 C8C1D940
90ECD00C 184D98CD F0205040 D00450D0 400807FC 40404040 40404040
021A1D40 C5D9D9D6 D940C9D5 40D4D3C3 D4D3C3C8 F0F0F0F2*
02E3E7E3 40000038 40400011 40400001 C8C1D940 4DE2E4D7 C5D940E3
C5E7E35D 22404040 40404040 40404040 40404040 40404040 40404040
40404040 40404040 40404040 40404040 D4D3C3C8 F0F0F0F3*
02E3E7E3 40000238 40400038 40400001 00000000 00000001 00000002
00000003 00000004 00000016 0000002A 00000049 00000078 401DF3B6
4029FBE7 4029FFD6 403EF9DB 40800000 D4D3C3C8 F0F0F0F4*
02E3E7E3 40000270 40400038 40400001 41100000 4110C49C 41200000
4125C28F 41280000 41300000 41304189 41340000 41358106 413820C5
413B53F8 41433333 41480000 414B3333 D4D3C3C8 F0F0F0F5*
02C5E2C4 40404040 40400010 40400002 D9D4D6C4 C5D34040 05000000
40000018 40404040 40404040 40404040 40404040 40404040 40404040
40404040 40404040 40404040 40404040 D4D3C3C8 F0F0F0F6*
02E3E7E3 400002A8 40400010 40400001 415C353F 41A33333 00000000
00000000 40404040 40404040 40404040 40404040 40404040 40404040
40404040 40404040 40404040 40404040 D4D3C3C8 F0F0F0F7*
02C5E2C4 40404040 40400010 40400003 C1D9C3D6 E2404040 02000000
40000000 40404040 40404040 40404040 40404040 40404040 40404040
40404040 40404040 40404040 40404040 D4D3C3C8 F0F0F0F8*
02C5E2C4 40404040 40400010 40400004 C2E2D6D9 E3404040 02000000
40000000 40404040 40404040 40404040 40404040 40404040 40404040
40404040 40404040 40404040 40404040 D4D3C3C8 F0F0F0F9*
02C5E2C4 40404040 40400010 40400005 D4E5C3C8 D9404040 02000000
40000000 40404040 40404040 40404040 40404040 40404040 40404040
40404040 40404040 40404040 40404040 D4D3C3C8 F0F0F1F0**
02E3E7E3 400003A8 40400010 40400001 FFFFFFFF 00000000 00000000
00000000 40404040 40404040 40404040 40404040 40404040 40404040
40404040 40404040 40404040 40404040 D4D3C3C8 F0F0F1F1*
02C5E2C4 40404040 40400010 40400006 C3C1C4D3 D5F14040 02000000
40000000 40404040 40404040 40404040 40404040 40404040 40404040
40404040 40404040 40404040 40404040 D4D3C3C8 F0F0F1F2*
02C5E2C4 40404040 40400010 40400007 C3C1C4D5 D7C44040 02000000
40000000 40404040 40404040 40404040 40404040 40404040 40404040
40404040 40404040 40404040 40404040 D4D3C3C8 F0F0F1F3*
02C5E2C4 40404040 40400010 40400008 C3C1C4E2 E4D74040 02000000
40000000 40404040 40404040 40404040 40404040 40404040 40404040
40404040 40404040 40404040 40404040 D4D3C3C8 F0F0F1F4*
02C5E2C4 40404040 40400010 40400009 C8C7C4C1 E3C54040 02000000
40000000 40404040 40404040 40404040 40404040 40404040 40404040
40404040 40404040 40404040 40404040 D4D3C3C8 F0F0F1F5*
02E3E7E3 400003BC 40400014 40400001 00000000 00000000 00000000
00000000 00000000 40404040 40404040 40404040 40404040 40404040
```

40404040 40404040 40404040 40404040 D4D3C3C8 F0F0F1F6*
02D9D3C4 40404040 40400038 40404040 00020001 0C0003A8 00030001
1C0003AC 00040001 1C0003B0 00050001 1C0003BC 00060001 1C0003C0
00070001 1C0003C4 00080001 1C0003C8 D4D3C3C8 F0F0F1F7*
02C5E2C4 40404040 40400010 4040000A C8C7E3C9 D4C54040 02000000
40000000 40404040 40404040 40404040 40404040 40404040 40404040
40404040 40404040 40404040 40404040 D4D3C3C8 F0F0F1F8*
02C5E2C4 40404040 40400010 4040000B C9C2C3D6 D47B4040 02000000
40000000 40404040 40404040 40404040 40404040 40404040 40404040
40404040 40404040 40404040 40404040 D4D3C3C8 F0F0F1F9*
02C5E2C4 40404040 40400010 4040000C C9C3D5E3 C5D94040 02000000

MEMBER NAME MLCHAR 40000000 40404040 40404040 40404040 40404040 40404040 40404040
40404040 40404040 40404040 40404040 D4D3C3C8 F0F0F2F0**
02E3E7E3 400003D0 4040000C 40400001 00000000 00000000 00000000
40404040 40404040 40404040 40404040 40404040 40404040 40404040
40404040 40404040 40404040 40404040 D4D3C3C8 F0F0F2F1*
02E3E7E3 400002F0 40400038 40400001 00000001 00000002 C3C84040
C1404040 00000008 00000003 C3C84040 C1404040 C4C5E3C1 C9D340D3
C1E8E4D7 407B4040 C5D9D9D6 D9E24040 D4D3C3C8 F0F0F2F2*
02E3E7E3 40000328 40400038 40400001 C3D6D7E8 D9C9C7C8 E3404DC3
5D40F1F9 F8F640E3 C8C540C2 D6C5C9D5 C740C3D6 D4D7C1D5 E85BC1D3
D340D9C9 C7C8E3E2 40D9C5E2 C5D9E5C5 D4D3C3C8 F0F0F2F3*
02E3E7E3 40000360 40400038 40400001 C45B5BE2 D3C9C340 E5C5D9E2
C9D6D540 E7E74BE7 40404040 40404040 4040C4C1 E3C57A40 E7E761E7
E761E7E7 40404040 4040E3C9 D4C57A40 D4D3C3C8 F0F0F2F4*
02E3E7E3 40000398 40400008 40400001 E7E77AE7 E77AE7E7 40404040
40404040 40404040 40404040 40404040 40404040 40404040 40404040
40404040 40404040 40404040 40404040 D4D3C3C8 F0F0F2F5*
02E3E7E3 400003F0 40400038 40400001 5880D358 58B0D364 5870D394
4100D320 5000D070 58F0D36C 4110D06C 05EF58F0 D3804110 D07805EF
58F0D37C 4110D07C 05EF58F0 D3604110 D4D3C3C8 F0F0F2F6*
02E3E7E3 40000428 40400038 40400001 D08005EF 7800D258 33007000
D2947800 D2443300 7000D26C 7800D22C 33007000 D2747800 D2243300
7000D278 7800D248 7000D270 7800D23C D4D3C3C8 F0F0F2F7*
02E3E7E3 40000460 40400038 40400001 7000D27C 7800D250 7000D284
58F0D378 4110D094 05EF41E0 000415FE 4720D436 58EFD04C 07FE7800
D2347000 D2847800 D2403300 7000D294 D4D3C3C8 F0F0F2F8*
02E3E7E3 40000498 40400038 40400001 58F0D378 4110D0DC 05EF41E0
000415FE 4720D462 58EFD054 07FE7800 D27C7000 D28058F0 D3704110
D12405EF 7800D280 7B00D21C 7000D280 D4D3C3C8 F0F0F2F9*
02E3E7E3 400004D0 40400038 40400001 58F0D370 4110D124 05EF7800
D2307000 D2847800 D2383300 7000D294 5890D1EC 18A7410A B0005000
D13458F0 D3884110 D13405EF 5000D28C D4D3C3C8 F0F0F3F0**
02E3E7E3 40000508 40400038 40400001 410AB000 5000D154 58F0D378
4110D13C 05EF41E0 000415FE 4720D4DA 58EFD05C 07FE7800 D2847B00
D21C7000 D2847800 D2807B00 D21C7000 D4D3C3C8 F0F0F3F1*
02E3E7E3 40000540 40400038 40400001 D28058F0 D3704110 D12405EF
5A90D1EC 5AA0D200 5990D298 47C0D4A2 58F0D370 4110D184 05EF58F0
D3704110 D19405EF 58F0D370 4110D1A4 D4D3C3C8 F0F0F3F2*
02E3E7E3 40000578 40400038 40400001 05EF58F0 D3704110 D1B405EF
5800D1E8 5000D298 7820D27C 7B20D280 7A20D228 7020D290 7800D220
33007000 D39858F0 D35C4110 D1C405EF D4D3C3C8 F0F0F3F3*
02E3E7E3 400005B0 40400038 40400001 7D00D228 7000D288 58F0D374
4110D1C8 05EF41E0 000415FE 4720D582 58EFD064 07FE1BFF 58E0D000
07FE58F0 D3841800 45E0F004 00000006 D4D3C3C8 F0F0F3F4*
02E3E7E3 400005E8 40400038 40400001 00000028 45E0F010 5800D1E8
5000D298 1BFF58E0 D00007FE 58A0D004 58E0A00C 58B0A018 5810B004

```
5820D298  50201000  18DA92FF  A00C982C  D4D3C3C8  F0F0F3F5*
02E3E7E3  40000620  40400034  40400001  A01C07FE  58701004  58207000
5020D298  58201000  41302000  41500001  1B255C40  D2001B25  5020D364
5030D368  5030D088  47F0D3A0  40404040  D4D3C3C8  F0F0F3F6*
02E3E7E3  40000020  40400008  40400001  00000624  00000050  40404040
40404040  40404040  40404040  40404040  40404040  40404040  40404040
40404040  40404040  40404040  40404040  D4D3C3C8  F0F0F3F7*
02E3E7E3  40000050  40400004  40400001  00000600  40404040  40404040
40404040  40404040  40404040  40404040  40404040  40404040  40404040
40404040  40404040  40404040  40404040  D4D3C3C8  F0F0F3F8*
02D9D3C4  40404040  40400038  40404040  00090001  1C0003CC  000A0001
1C0003D0  000B0001  1C0003D4  000C0001  1C0003D8  00010001  0C0005E8

MEMBER NAME  MLCHAR
00010001  0C000020  00010001  0C000024  D4D3C3C8  F0F0F3F9*
02E3E7E3  4000009C  4040001C  40400001  00000486  000005DA  000004B2
000005DA  0000052A  000005DA  000005D2  40404040  40404040  40404040
40404040  40404040  40404040  40404040  D4D3C3C8  F0F0F4F0**
02D9D3C4  40404040  40400038  40404040  00010001  0C000050  00010001
0C00009C  00010001  0C0000A0  00010001  0C0000A4  00010001  0C0000A8
00010001  0C0000AC  00010001  0C0000B0  D4D3C3C8  F0F0F4F1*
02E3E7E3  400000B8  40400008  40400001  000005D2  00000248  40404040
40404040  40404040  40404040  40404040  40404040  40404040  40404040
40404040  40404040  40404040  40404040  D4D3C3C8  F0F0F4F2*
02E3E7E3  400000C4  40400014  40400001  80000014  80000398  80000384
000002F0  00000240  40404040  40404040  40404040  40404040  40404040
40404040  40404040  40404040  40404040  D4D3C3C8  F0F0F4F3*
02D9D3C4  40404040  40400038  40404040  00010001  0C0000B4  00010001
0C0000B8  00010001  0C0000BC  00020001  0C0000C4  00010001  0C0000C8
00010001  0C0000CC  00010001  0C0000D0  D4D3C3C8  F0F0F4F4*
02E3E7E3  400000DC  4040001C  40400001  00000250  800002E8  000002E4
000002D4  00000238  00000258  00000260  40404040  40404040  40404040
40404040  40404040  40404040  40404040  D4D3C3C8  F0F0F4F5*
02D9D3C4  40404040  40400038  40404040  00010001  0C0000D4  00010001
0C0000DC  00010001  0C0000E0  00010001  0C0000E4  00010001  0C0000E8
00010001  0C0000EC  00010001  0C0000F0  D4D3C3C8  F0F0F4F6*
02E3E7E3  400000F8  4040001C  40400001  0000025C  00000328  00000238
00000238  00000238  00000238  0000023C  40404040  40404040  40404040
40404040  40404040  40404040  40404040  D4D3C3C8  F0F0F4F7*
02D9D3C4  40404040  40400038  40404040  00010001  0C0000F4  00010001
0C0000F8  00010001  0C0000FC  00010001  0C000100  00010001  0C000104
00010001  0C000108  00010001  0C00010C  D4D3C3C8  F0F0F4F8*
02E3E7E3  40000114  4040001C  40400001  00000244  00000238  00000238
00000260  00000268  80000238  000002E4  40404040  40404040  40404040
40404040  40404040  40404040  40404040  D4D3C3C8  F0F0F4F9*
02D9D3C4  40404040  40400038  40404040  00010001  0C000110  00010001
0C000114  00010001  0C000118  00010001  0C00011C  00010001  0C000120
00010001  0C000124  00010001  0C000128  D4D3C3C8  F0F0F5F0**
02E3E7E3  40000130  4040001C  40400001  000002D4  00000238  0000024C
00000260  0000025C  00000310  00000238  40404040  40404040  40404040
40404040  40404040  40404040  40404040  D4D3C3C8  F0F0F5F1*
02D9D3C4  40404040  40400038  40404040  00010001  0C00012C  00010001
0C000130  00010001  0C000134  00010001  0C000138  00010001  0C00013C
00010001  0C000140  00010001  0C000144  D4D3C3C8  F0F0F5F2*
02E3E7E3  4000014C  4040001C  40400001  00000238  00000238  00000238
0000023C  00000244  00000238  00000238  40404040  40404040  40404040
40404040  40404040  40404040  40404040  D4D3C3C8  F0F0F5F3*
02D9D3C4  40404040  40400038  40404040  00010001  0C000148  00010001
0C00014C  00010001  0C000150  00010001  0C000154  00010001  0C000158
```

```
00010001  0C00015C  00010001  0C000160  D4D3C3C8  F0F0F5F4*
02E3E7E3  40000168  4040001C  40400001  00000260  00000268  80000238
000002BC  000002D0  000002C0  800002D0  40404040  40404040  40404040
40404040  40404040  40404040  40404040  D4D3C3C8  F0F0F5F5*
02D9D3C4  40404040  40400038  40404040  00010001  0C000164  00010001
0C000168  00010001  0C00016C  00010001  0C000170  00010001  0C000174
00010001  0C000178  00010001  0C00017C  D4D3C3C8  F0F0F5F6*
02E3E7E3  40000188  4040001C  40400001  80000250  000002E4  000002D4
00000238  000002DC  00000260  0000025C  40404040  40404040  40404040
40404040  40404040  40404040  40404040  D4D3C3C8  F0F0F5F7*
02D9D3C4  40404040  40400038  40404040  00010001  0C000180  00010001
0C000188  00010001  0C00018C  00010001  0C000190  00010001  0C000194
00010001  0C000198  00010001  0C00019C  D4D3C3C8  F0F0F5F8*

MEMBER NAME  MLCHAR
02E3E7E3  400001A8  4040001C  40400001  00000238  00000238  00000238
00000238  0000023C  00000244  00000238  40404040  40404040  40404040
40404040  40404040  40404040  40404040  D4D3C3C8  F0F0F5F9*
02D9D3C4  40404040  40400038  40404040  00010001  0C0001A0  00010001
0C0001A8  00010001  0C0001AC  00010001  0C0001B0  00010001  0C0001B4
00010001  0C0001B8  00010001  0C0001BC  D4D3C3C8  F0F0F6F0**
02E3E7E3  400001C4  4040001C  40400001  00000238  00000260  00000268
80000238  000002BC  000002CC  000002BC  40404040  40404040  40404040
40404040  40404040  40404040  40404040  D4D3C3C8  F0F0F6F1*
02D9D3C4  40404040  40400038  40404040  00010001  0C0001C0  00010001
0C0001C4  00010001  0C0001C8  00010001  0C0001CC  00010001  0C0001D0
00010001  0C0001D4  00010001  0C0001D8  D4D3C3C8  F0F0F6F2*
02E3E7E3  400001E0  4040001C  40400001  800002D0  000002C4  000002CC
000002C4  800002D0  000002C8  000002CC  40404040  40404040  40404040
40404040  40404040  40404040  40404040  D4D3C3C8  F0F0F6F3*
02D9D3C4  40404040  40400038  40404040  00010001  0C0001DC  00010001
0C0001E0  00010001  0C0001E4  00010001  0C0001E8  00010001  0C0001EC
00010001  0C0001F0  00010001  0C0001F4  D4D3C3C8  F0F0F6F4*
02E3E7E3  400001FC  4040001C  40400001  000002C8  800002D0  000002C0
000002CC  000002C0  800002D0  800003E8  40404040  40404040  40404040
40404040  40404040  40404040  40404040  D4D3C3C8  F0F0F6F5*
02D9D3C4  40404040  40400038  40404040  00010001  0C0001F8  00010001
0C0001FC  00010001  0C000200  00010001  0C000204  00010001  0C000208
00010001  0C00020C  00010001  0C000210  D4D3C3C8  F0F0F6F6*
02E3E7E3  40000218  4040001C  40400001  0000029C  000002A4  000002D8
00000270  00000270  00000264  000002AC  40404040  40404040  40404040
40404040  40404040  40404040  40404040  D4D3C3C8  F0F0F6F7*
02D9D3C4  40404040  40400038  40404040  00010001  0C000214  00010001
0C000218  00010001  0C00021C  00010001  0C000220  00010001  0C000224
00010001  0C000228  00010001  0C00022C  D4D3C3C8  F0F0F6F8*
02E3E7E3  40000234  40400004  40400001  800002E0  40404040  40404040
40404040  40404040  40404040  40404040  40404040  40404040  40404040
40404040  40404040  40404040  40404040  D4D3C3C8  F0F0F6F9*
02E3E7E3  400003DC  40400014  40400001  00000000  00000000  0000002B
00000000  00000000  40404040  40404040  40404040  40404040  40404040
40404040  40404040  40404040  40404040  D4D3C3C8  F0F0F7F0**
02D9D3C4  40404040  40400010  40404040  00010001  0C000230  00010001
0C000234  40404040  40404040  40404040  40404040  40404040  40404040
40404040  40404040  40404040  40404040  D4D3C3C8  F0F0F7F1*
02C5D5C4  40404040  40404040  40404040  40404040  40404040  40404040
00000654  F1F5F7F3  F460C6D6  F34040F0  F2F0F2F8  F7F0F9F8  40F0F84B
F4F04BF3  F8404040  D4D3C3C8  C1D94040  D4D3C3C8  F0F0F7F2**

MEMBER NAME  MODFUL
```

| | | | | | | |
|---|---|---|---|---|---|---|
| 02C5E2C4 | 40404040 | 40400010 | 40400001 | C3C1C4C6 | E4D34040 | 00000000 |
| 40000000 | 40404040 | 40404040 | 40404040 | 40404040 | 40404040 | 40404040 |
| 40404040 | 40404040 | 40404040 | 40404040 | C3C1C4C6 | F0F0F0F1* | |
| 02E3E7E3 | 40000000 | 40400038 | 40400001 | 47F0F00C | 07C3C1C4 | C6E4D340 |
| 90ECD00C | 9823F024 | 184D58D0 | F02C9034 | D00050D0 | 400807F2 | 40404040 |
| 40404040 | 40404040 | 021A2C40 | D4C5E2E2 | C3C1C4C6 | F0F0F0F2* | |
| 02E3E7E3 | 40000038 | 40400038 | 40400001 | C1C7C540 | 7E7E6E40 | D4D6C4C5 |
| D340C6E4 | D3D340E2 | E3C1D9E3 | C9D5C740 | C140D5C5 | E640D4D6 | C4C5D322 |
| 02100222 | 02060214 | 0122021A | 15D9C5E3 | C3C1C4C6 | F0F0F0F3* | |
| 02E3E7E3 | 40000070 | 40400021 | 40400001 | D9C9E5C5 | 40C6C9D3 | C540C5D9 |
| D9D6D940 | 7E401003 | 1A0A40C9 | D540D4D6 | C4C6E4D3 | 22404040 | 40404040 |
| 40404040 | 40404040 | 40404040 | 40404040 | C3C1C4C6 | F0F0F0F4* | |
| 02E3E7E3 | 40000098 | 40400008 | 40400001 | F0404040 | 40404040 | 40404040 |
| 40404040 | 40404040 | 40404040 | 40404040 | 40404040 | 40404040 | 40404040 |
| 40404040 | 40404040 | 40404040 | 40404040 | C3C1C4C6 | F0F0F0F5* | |
| 02C5E2C4 | 40404040 | 40400010 | 40400002 | D4D6C4C9 | D5C34040 | 05000000 |
| 40000024 | 40404040 | 40404040 | 40404040 | 40404040 | 40404040 | 40404040 |
| 40404040 | 40404040 | 40404040 | 40404040 | C3C1C4C6 | F0F0F0F6* | |
| 02E3E7E3 | 40000138 | 40400024 | 40400001 | 00000001 | 00000002 | 00000004 |
| 00000008 | 0000000A | 00000013 | 00000014 | 00000000 | 00000000 | 40404040 |
| 40404040 | 40404040 | 40404040 | 40404040 | C3C1C4C6 | F0F0F0F7* | |
| 02C5E2C4 | 40404040 | 40400010 | 40400003 | D6D7E3C9 | D6D54040 | 05000000 |
| 40000020 | 40404040 | 40404040 | 40404040 | 40404040 | 40404040 | 40404040 |
| 40404040 | 40404040 | 40404040 | 40404040 | C3C1C4C6 | F0F0F0F8* | |
| 02C5E2C4 | 40404040 | 40400010 | 40400004 | C3C1C4E2 | E3404040 | 02000000 |
| 40000000 | 40404040 | 40404040 | 40404040 | 40404040 | 40404040 | 40404040 |
| 40404040 | 40404040 | 40404040 | 40404040 | C3C1C4C6 | F0F0F0F9* | |
| 02C5E2C4 | 40404040 | 40400010 | 40400005 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | C3C1C4C6 | F0F0F1F0** | |
| 02C5E2C4 | 40404040 | 40400010 | 40400006 | C3C1C4C6 | C9D34040 | 02000000 |
| 40000000 | 40404040 | 40404040 | 40404040 | 40404040 | 40404040 | 40404040 |
| 40404040 | 40404040 | 40404040 | 40404040 | C3C1C4C6 | F0F0F1F1* | |
| 02C5E2C4 | 40404040 | 40400010 | 40400007 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | C3C1C4C6 | F0F0F1F2* | |
| 02E3E7E3 | 40000198 | 40400038 | 40400001 | FFFFFFFF | 00000000 | 00000000 |
| 00000000 | 00000000 | 00000000 | 5890D0F8 | 58B0D0B4 | 58F0D10C | 45E0F004 |
| 00000006 | 00000030 | 45E0F010 | 58A0D0A0 | C3C1C4C6 | F0F0F1F3* | |
| 02E3E7E3 | 400001D0 | 40400038 | 40400001 | 58F0D0FC | 5800F008 | 860BD146 |
| 58F0D108 | 4110D04C | 05EF59A0 | D0D04780 | D1305800 | D0D05900 | D0984770 |
| D1FA5800 | 90215A00 | D0985000 | 902158F0 | C3C1C4C6 | F0F0F1F4* | |
| 02E3E7E3 | 40000208 | 4040002C | 40400001 | D1044110 | D05805EF | 58F0D104 |
| 4110D064 | 05EF58F0 | D1044110 | D07005EF | 58F0D10C | 45E0F004 | 00000000 |
| 00000060 | 40404040 | 40404040 | 40404040 | C3C1C4C6 | F0F0F1F5* | |
| 02D9D3C4 | 40404040 | 40400038 | 40404040 | 00020001 | 0C000198 | 00030001 |
| 0C00019C | 00040001 | 1C0001A0 | 00050001 | 1C0001A4 | 00060001 | 1C0001A8 |
| 00070001 | 1C0001AC | 00010001 | 0C0001C4 | C3C1C4C6 | F0F0F1F6* | |
| 02E3E7E3 | 40000234 | 40400038 | 40400001 | 45E0F008 | 04509021 | 45E0F010 |
| 58F0D10C | 45E0F000 | 00000000 | 00000064 | 45E0F134 | 00010000 | 0120D0E6 |
| 01000002 | 00000001 | 45E0F010 | 58009021 | C3C1C4C6 | F0F0F1F7* | |
| 02E3E7E3 | 4000026C | 40400038 | 40400001 | 5900D0A8 | 47A0D1E6 | 4100D0E6 |
| 5000D080 | 58F0D104 | 4110D07C | 05EF58F0 | D1004110 | D08805EF | 41F00004 |
| 58E0D000 | 07FE58F0 | D10C1800 | 45E0F004 | C3C1C4C6 | F0F0F1F8* | |
| 02C5E2C4 | 40404040 | 40400010 | 40404040 | D4D6C4C6 | E4D34040 | 010002DC |
| 40000001 | 40404040 | 40404040 | 40404040 | 40404040 | 40404040 | 40404040 |
| 40404040 | 40404040 | 40404040 | 40404040 | C3C1C4C6 | F0F0F1F9* | |
| 02E3E7E3 | 400002A4 | 40400038 | 40400001 | 00000006 | 0000006A | 45E0F008 |

```
MEMBER NAME  MODFUL
0450D0D0  45E0F010  58F0D10C  45E0F034  05404040  F1F058D0  D00458E0
D00C92FF  D00C982C  D01C07FE  47F0D110  C3C1C4C6  F0F0F2F0**
02E3E7E3  400002DC  40400020  40400001  47F0F00C  07D4D6C4  C6E4D340
90ECD00C  9823F020  58F0F01C  47F0F014  00000000  40404040  40404040
40404040  40404040  40404040  40404040  C3C1C4C6  F0F0F2F1*
02E3E7E3  40000300  40400016  40400001  00000304  58D0D004  58E0D00C
92FFD00C  982CD01C  07FE4040  40404040  40404040  40404040  40404040
40404040  40404040  40404040  40404040  C3C1C4C6  F0F0F2F2*
02E3E7E3  400002FC  40400004  40400001  00000316  40404040  40404040
40404040  40404040  40404040  40404040  40404040  40404040  40404040
40404040  40404040  40404040  40404040  C3C1C4C6  F0F0F2F3*
02E3E7E3  40000316  40400004  40400001  47F0D110  40404040  40404040
40404040  40404040  40404040  40404040  40404040  40404040  40404040
40404040  40404040  40404040  40404040  C3C1C4C6  F0F0F2F4*
02E3E7E3  40000024  40400004  40400001  000002D8  40404040  40404040
40404040  40404040  40404040  40404040  40404040  40404040  40404040
40404040  40404040  40404040  40404040  C3C1C4C6  F0F0F2F5*
02E3E7E3  4000002C  40400004  40400001  000000A0  40404040  40404040
40404040  40404040  40404040  40404040  40404040  40404040  40404040
40404040  40404040  40404040  40404040  C3C1C4C6  F0F0F2F6*
02D9D3C4  40404040  40400038  40404040  00010001  0C000230  00010001
0C00024C  00010001  0C0002A8  00010001  0C0002F8  00010001  0C000300
00010001  0C0002FC  00010001  0C000024  C3C1C4C6  F0F0F2F7*
02E3E7E3  40000028  40400004  40400001  000002C6  40404040  40404040
40404040  40404040  40404040  40404040  40404040  40404040  40404040
40404040  40404040  40404040  40404040  C3C1C4C6  F0F0F2F8*
02E3E7E3  400000EC  40400018  40400001  0000013C  00000170  80000168
00000144  00000188  80000014  40404040  40404040  40404040  40404040
40404040  40404040  40404040  40404040  C3C1C4C6  F0F0F2F9*
02D9D3C4  40404040  40400038  40404040  00010001  0C00002C  00010001
0C000028  00010001  0C0000EC  00010001  0C0000F0  00010001  0C0000F4
00010001  0C0000F8  00010001  0C0000FC  C3C1C4C6  F0F0F3F0**
02E3E7E3  40000104  4040001C  40400001  00000150  00000174  80000000
00000140  00000160  8000001C  00000138  40404040  40404040  40404040
40404040  40404040  40404040  40404040  C3C1C4C6  F0F0F3F1*
02D9D3C4  40404040  40400038  40404040  00020001  0C000100  00010001
0C000104  00010001  0C000108  00020001  0C00010C  00010001  0C000110
00010001  0C000114  00020001  0C000118  C3C1C4C6  F0F0F3F2*
02E3E7E3  40000124  40400010  40400001  80000098  00000174  00000188
80000160  40404040  40404040  40404040  40404040  40404040  40404040
40404040  40404040  40404040  40404040  C3C1C4C6  F0F0F3F3*
02D9D3C4  40404040  40400028  40404040  00010001  0C00011C  00010001
0C000124  00010001  0C000128  00010001  0C00012C  00010001  0C000130
40404040  40404040  40404040  40404040  C3C1C4C6  F0F0F3F4*
02C5D5C4  40404040  40404040  40404040  40404040  40404040  40404040
0000031A  F1F5F7F3  F460C6D6  F34040F0  F2F0F2F8  F7F0F9F8  40F0F84B
F4F04BF4  F3404040  C3C1C4C6  E4D34040  C3C1C4C6  F0F0F3F5**

MEMBER NAME  MODSRT
02C5E2C4  40404040  40400010  40400001  D4D6C4E2  D9E34040  00000000
40000000  40404040  40404040  40404040  40404040  40404040  40404040
40404040  40404040  40404040  40404040  D4D6C4E2  F0F0F0F1*
02E3E7E3  40000000  40400038  40400001  47F0F00C  07D4D6C4  E2D9E340
90ECD00C  184D98CD  F0205040  D00450D0  400807FC  40404040  40404040
021A2440  C3C1D3D3  40E3D640  D4D6C4E2  D4D6C4E2  F0F0F0F2*
02E3E7E3  40000038  40400038  40400001  D9E340E6  C9E3C840  C9D4D7D9
D6D7C5D9  40D6D7E3  C9D6D522  02060A14  011A04C9  D5C6D606  04140110
02220206  14140122  02060A14  011A04C5  D4D6C4E2  F0F0F0F3*
```

| | | | | | | |
|---|---|---|---|---|---|---|
| 02E3E7E3 | 40000070 | 40400038 | 40400001 | D9D6D906 | 06140122 | 02061414 |
| 01220206 | 0A14011A | 04D7D9C3 | C5060414 | 01100222 | 02061414 | 01220206 |
| 0A14011A | 04D3E8E4 | D7060414 | 01100222 | D4D6C4E2 | F0F0F0F4* | |
| 02E3E7E3 | 400000A8 | 40400038 | 40400001 | 02061414 | 01220206 | 0A14011A |
| 01E21003 | 10021A02 | F0F10602 | 14012202 | 06141401 | 2202060A | 14011A05 |
| E2C5D8F0 | 60100306 | 02140122 | 02061414 | D4D6C4E2 | F0F0F0F5* | |
| 02E3E7E3 | 400000E0 | 4040002E | 40400001 | 01220206 | 0A14011A | 04E2E3C3 |
| D2100310 | 03220206 | 14140122 | 02060A14 | 011A04E2 | E3D9E210 | 03100322 |
| 02061414 | 01224040 | 40404040 | 40404040 | D4D6C4E2 | F0F0F0F6* | |
| 02E3E7E3 | 40000110 | 40400030 | 40400001 | F0404040 | 40404040 | F0404040 |
| 40404040 | F0404040 | 40404040 | F0404040 | 40404040 | F0404040 | 40404040 |
| F0404040 | 40404040 | 40404040 | 40404040 | D4D6C4E2 | F0F0F0F7* | |
| 02C5E2C4 | 40404040 | 40400010 | 40400002 | D9D4D6C4 | C5D34040 | 05000000 |
| 40000018 | 40404040 | 40404040 | 40404040 | 40404040 | 40404040 | 40404040 |
| 40404040 | 40404040 | 40404040 | 40404040 | D4D6C4E2 | F0F0F0F8* | |
| 02E3E7E3 | 400001F8 | 4040002C | 40400001 | 00000001 | 0000000A | 0000000C |
| 0000000D | 0000000F | 00000012 | 00000013 | 00000014 | 00000064 | 00000000 |
| 00000000 | 40404040 | 40404040 | 40404040 | D4D6C4E2 | F0F0F0F9* | |
| 02C5E2C4 | 40404040 | 40400010 | 40400003 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D4D6C4E2 | F0F0F1F0** | |
| 02E3E7E3 | 40000250 | 40400008 | 40400001 | FFFFFFFF | 00000000 | 40404040 |
| 40404040 | 40404040 | 40404040 | 40404040 | 40404040 | 40404040 | 40404040 |
| 40404040 | 40404040 | 40404040 | 40404040 | D4D6C4E2 | F0F0F1F1* | |
| 02C5E2C4 | 40404040 | 40400010 | 40400004 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | D4D6C4E2 | F0F0F1F2* | |
| 02E3E7E3 | 4000025C | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D4D6C4E2 | F0F0F1F3* | |
| 02E3E7E3 | 40000268 | 40400038 | 40400001 | 00000000 | 5880D114 | 58A0D110 |
| 58B0D120 | 5890D0BC | 5870D0E8 | 5860D0D8 | 58F0D0F0 | 41E00008 | 15FE4720 |
| D15C89F0 | 000258EF | D04C07FE | 58F0D128 | D4D6C4E2 | F0F0F1F4* | |
| 02E3E7E3 | 400002A0 | 40400038 | 40400001 | 45E0F004 | 00000006 | 00000028 |
| 45E0F010 | 58F0D128 | 45E0F034 | 05404040 | F1F558F0 | D1281800 | 45E0F004 |
| 00000000 | 00000050 | 45E0F134 | 00010000 | D4D6C4E2 | F0F0F1F5* | |
| 02E3E7E3 | 400002D8 | 40400038 | 40400001 | 0120A001 | 0100000A | 00000001 |
| 45E0F134 | 00010000 | 0120A00F | 01000004 | 00000001 | 45E0F008 | 0450D0EC |
| 45E0F010 | 58F0D128 | 45E0F000 | 00000000 | D4D6C4E2 | F0F0F1F6* | |
| 02E3E7E3 | 40000310 | 40400038 | 40400001 | 00000062 | 45E0F134 | 00010000 |
| 0120B001 | 01000014 | 00000001 | 45E0F010 | 5990D0EC | 47C0D206 | 4100B013 |
| 5000D074 | 58F0D11C | 4110D070 | 05EF1BFF | D4D6C4E2 | F0F0F1F7* | |
| 02E3E7E3 | 40000348 | 40400038 | 40400001 | 58E0D000 | 07FE58F0 | D1281800 |
| 45E0F004 | 00000000 | 00000068 | 45E0F134 | 00010000 | 0120A001 | 0100000A |
| 00000001 | 45E0F134 | 00010000 | 0120A00F | D4D6C4E2 | F0F0F1F8* | |
| 02E3E7E3 | 40000380 | 4040001C | 40400001 | 01000006 | 00000001 | 45E0F010 |
| 58F0D128 | 45E0F000 | 00000000 | 00000078 | 40404040 | 40404040 | 40404040 |
| 40404040 | 40404040 | 40404040 | 40404040 | D4D6C4E2 | F0F0F1F9* | |
| 02D9D3C4 | 40404040 | 40400038 | 40404040 | 00020001 | 0C000250 | 00030001 |

MEMBER NAME MODSRT

| | | | | | | |
|---|---|---|---|---|---|---|
| 1C00025C | 00040001 | 1C000268 | 00010001 | 0C0002A8 | 00010001 | 0C0002CC |
| 00010001 | 0C000310 | 00010001 | 0C00035C | D4D6C4E2 | F0F0F2F0** | |
| 02E3E7E3 | 4000039C | 40400038 | 40400001 | 45E0F134 | 00010000 | 0120B001 |
| 01000014 | 00000001 | 45E0F010 | 1BFF58E0 | D00007FE | 58F0D128 | 45E0F004 |
| 00000000 | 0000007E | 45E0F134 | 00010000 | D4D6C4E2 | F0F0F2F1* | |
| 02E3E7E3 | 400003D4 | 40400038 | 40400001 | 0120A001 | 0100000A | 00000001 |
| 45E0F134 | 00010000 | 0120A00F | 01000004 | 00000001 | 45E0F008 | 0450D0EC |
| 45E0F010 | 58F0D128 | 45E0F000 | 00000000 | D4D6C4E2 | F0F0F2F2* | |

```
02E3E7E3  4000040C  40400038  40400001  00000090  45E0F134  00010000
0120B001  01000014  00000001  45E0F010  197947A0  D3004100  B0135000
D08058F0  D11C4110  D07C05EF  1BFF58E0  D4D6C4E2  F0F0F2F3*
02E3E7E3  40000444  40400038  40400001  D00007FE  58F0D128  45E0F004
00000000  00000096  45E0F134  00010000  0120A001  0100000A  00000001
45E0F134  00010000  0120A00F  01000004  D4D6C4E2  F0F0F2F4*
02E3E7E3  4000047C  40400038  40400001  00000001  45E0F008  0450D0EC
45E0F010  58F0D128  45E0F000  00000000  000000A8  45E0F134  00010000
0120B001  01000014  00000001  45E0F010  D4D6C4E2  F0F0F2F5*
02E3E7E3  400004B4  40400038  40400001  5990D0EC  47C0D38E  4100B013
5000D08C  58F0D11C  4110D088  05EF1BFF  58E0D000  07FE58F0  D1281800
45E0F004  00000000  000000AE  45E0F134  D4D6C4E2  F0F0F2F6*
02E3E7E3  400004EC  40400030  40400001  00010000  0120A001  0100000A
00000001  45E0F008  0450D0FC  45E0F008  0450D100  180005E0  5800D118
5000E00C  45E0F00C  40404040  40404040  D4D6C4E2  F0F0F2F7*
02E3E7E3  40000520  40400028  40400001  01200002  45E0F010  58F0D128
45E0F000  00000000  000000C3  180005E0  5800D124  5000E00C  45E0F00C
40404040  40404040  40404040  40404040  D4D6C4E2  F0F0F2F8*
02E3E7E3  4000054C  40400038  40400001  01200014  45E0F010  5960D0FC
47C0D42E  4100B00C  5000D098  58F0D11C  4110D094  05EF5990  D0FC47C0
D4484100  B00D5000  D0A458F0  D11C4110  D4D6C4E2  F0F0F2F9*
02E3E7E3  40000584  40400038  40400001  D0A005EF  5990D100  47C0D462
4100B00F  5000D0B0  58F0D11C  4110D0AC  05EF1BFF  58E0D000  07FE58F0
D1281800  45E0F004  00000000  000000C9  D4D6C4E2  F0F0F3F0**
02D9D3C4  40404040  40400038  40404040  00010001  0C000398  00010001
0C0003C8  00010001  0C00040C  00010001  0C000454  00010001  0C000498
00010001  0C0004E4  00010001  0C000534  D4D6C4E2  F0F0F3F1*
02E3E7E3  400005BC  40400038  40400001  45E0F134  00010000  0120A001
0100000A  00000001  45E0F008  0450D0F8  45E0F134  00010000  0120A013
01000002  00000001  45E0F010  58F0D128  D4D6C4E2  F0F0F3F2*
02E3E7E3  400005F4  4040001C  40400001  45E0F000  00000000  000000DC
180005E0  5800D124  5000E00C  45E0F00C  40404040  40404040  40404040
40404040  40404040  40404040  40404040  D4D6C4E2  F0F0F3F3*
02E3E7E3  40000614  40400038  40400001  01200014  45E0F010  1BFF58E0
D00007FE  58F0D128  45E0F004  00000000  000000E2  45E0F134  00010000
0120A001  0100000A  00000001  45E0F008  D4D6C4E2  F0F0F3F4*
02E3E7E3  4000064C  40400038  40400001  0450D0F8  45E0F008  0450D0EC
45E0F010  58F0D128  45E0F000  00000000  000000F2  45E0F134  00010000
0120B001  01000014  00000001  45E0F010  D4D6C4E2  F0F0F3F5*
02E3E7E3  40000684  40400038  40400001  1BFF58E0  D00007FE  58F0D128
45E0F004  00000000  000000F8  45E0F134  00010000  0120A001  0100000A
00000001  45E0F008  0450D0F8  45E0F008  D4D6C4E2  F0F0F3F6*
02E3E7E3  400006BC  40400038  40400001  0450D0EC  45E0F010  58F0D128
45E0F000  00000000  00000108  45E0F134  00010000  0120B001  01000014
00000001  45E0F010  1BFF58E0  D00007FE  D4D6C4E2  F0F0F3F7*
02E3E7E3  400006F4  40400038  40400001  58D0D004  58E0D00C  92FFD00C
982CD01C  07FE987B  10005820  70005020  D0F05820  80005020  D0EC5820
90005020  D0F85820  A0005020  D0F45820  D4D6C4E2  F0F0F3F8*
02E3E7E3  4000072C  40400038  40400001  B0005020  D0FC9879  10145820
70005020  D1005820  10184130  20004150  00011B25  5020D114  5030D118

MEMBER NAME  MODSRT
5820101C  41302000  41500001  1B255020  D4D6C4E2  F0F0F3F9*
02E3E7E3  40000764  4040000A  40400001  D1205030  D12447F0  D12C4040
40404040  40404040  40404040  40404040  40404040  40404040  40404040
40404040  40404040  40404040  40404040  D4D6C4E2  F0F0F4F0**
02E3E7E3  40000020  40400008  40400001  00000706  00000140  40404040
40404040  40404040  40404040  40404040  40404040  40404040  40404040
40404040  40404040  40404040  40404040  D4D6C4E2  F0F0F4F1*
```

```
02D9D3C4  40404040  40400038  40404040  00010001  0C0005B8  00010001
0C0005FC  00010001  0C000630  00010001  0C000668  00010001  0C000698
00010001  0C0006D0  00010001  0C000020  D4D6C4E2  F0F0F4F2*
02E3E7E3  40000140  40400004  40400001  000006F4  40404040  40404040
40404040  40404040  40404040  40404040  40404040  40404040  40404040
40404040  40404040  40404040  40404040  D4D6C4E2  F0F0F4F3*
02E3E7E3  4000018C  40400018  40400001  0000029C  000002BE  0000034E
000003BC  00000448  000004D6  40404040  40404040  40404040  40404040
40404040  40404040  40404040  40404040  D4D6C4E2  F0F0F4F4*
02D9D3C4  40404040  40400038  40404040  00010001  0C000024  00010001
0C000140  00010001  0C00018C  00010001  0C000190  00010001  0C000194
00010001  0C000198  00010001  0C00019C  D4D6C4E2  F0F0F4F5*
02E3E7E3  400001A4  40400010  40400001  000005AA  00000624  0000068C
000001F8  40404040  40404040  40404040  40404040  40404040  40404040
40404040  40404040  40404040  40404040  D4D6C4E2  F0F0F4F6*
02E3E7E3  400001B8  40400008  40400001  80000138  000001F8  40404040
40404040  40404040  40404040  40404040  40404040  40404040  40404040
40404040  40404040  40404040  40404040  D4D6C4E2  F0F0F4F7*
02E3E7E3  400001C4  40400004  40400001  80000130  40404040  40404040
40404040  40404040  40404040  40404040  40404040  40404040  40404040
40404040  40404040  40404040  40404040  D4D6C4E2  F0F0F4F8*
02D9D3C4  40404040  40400038  40404040  00010001  0C0001A0  00010001
0C0001A4  00010001  0C0001A8  00010001  0C0001AC  00010001  0C0001B0
00010001  0C0001B8  00010001  0C0001BC  D4D6C4E2  F0F0F4F9*
02E3E7E3  400001C8  40400004  40400001  000001F8  40404040  40404040
40404040  40404040  40404040  40404040  40404040  40404040  40404040
40404040  40404040  40404040  40404040  D4D6C4E2  F0F0F5F0**
02E3E7E3  400001D0  40400008  40400001  80000128  000001F8  40404040
40404040  40404040  40404040  40404040  40404040  40404040  40404040
40404040  40404040  40404040  40404040  D4D6C4E2  F0F0F5F1*
02E3E7E3  400001DC  40400008  40400001  80000120  000001F8  40404040
40404040  40404040  40404040  40404040  40404040  40404040  40404040
40404040  40404040  40404040  40404040  D4D6C4E2  F0F0F5F2*
02E3E7E3  400001E8  40400008  40400001  80000118  000001F8  40404040
40404040  40404040  40404040  40404040  40404040  40404040  40404040
40404040  40404040  40404040  40404040  D4D6C4E2  F0F0F5F3*
02D9D3C4  40404040  40400038  40404040  00010001  0C0001C4  00010001
0C0001C8  00010001  0C0001D0  00010001  0C0001D4  00010001  0C0001DC
00010001  0C0001E0  00010001  0C0001E8  D4D6C4E2  F0F0F5F4*
02E3E7E3  400001F4  40400004  40400001  80000110  40404040  40404040
40404040  40404040  40404040  40404040  40404040  40404040  40404040
40404040  40404040  40404040  40404040  D4D6C4E2  F0F0F5F5*
02D9D3C4  40404040  40400010  40404040  00010001  0C0001EC  00010001
0C0001F4  40404040  40404040  40404040  40404040  40404040  40404040
40404040  40404040  40404040  40404040  D4D6C4E2  F0F0F5F6*
02C5D5C4  40404040  40404040  40404040  40404040  40404040  40404040
0000076E  F1F5F7F3  F460C6D6  F34040F0  F2F0F2F8  F7F0F9F8  40F0F84B
F4F04BF4  F7404040  D4D6C4E2  D9E34040  D4D6C4E2  F0F0F5F7**

MEMBER NAME  NCARD
02C5E2C4  40404040  40400010  40400001  D5C3C1D9  C4404040  00000000
40000000  40404040  40404040  40404040  40404040  40404040  40404040
40404040  40404040  40404040  40404040  D5C3C1D9  F0F0F0F1*
02E3E7E3  40000000  40400038  40400001  47F0F00C  07D5C3C1  D9C44040
90ECD00C  184D98CD  F0205040  D00450D0  400807FC  40404040  40404040
021A08D7  E2C8C5D3  D3404006  0210080A  D5C3C1D9  F0F0F0F2*
02E3E7E3  40000038  40400038  40400001  08041008  0A080110  080A0801
22021A08  D7E2C8C5  D3D34040  06021008  0A080410  080A0801  10080A08
0118081A  024ED710  061E1A02  4ED71006  D5C3C1D9  F0F0F0F3*
```

```
02E3E7E3  40000070  40400005  40400001  18101008  22404040  40404040
40404040  40404040  40404040  40404040  40404040  40404040  40404040
40404040  40404040  40404040  40404040  D5C3C1D9  F0F0F0F4*
02E3E7E3  40000108  40400038  40400001  00000000  00000000  41133333
00000000  41C00000  00000000  00000000  00000000  00000001  00000002
00000003  00000004  00000018  41100000  D5C3C1D9  F0F0F0F5*
02E3E7E3  40000140  40400010  40400001  41133333  41C00000  00000000
00000000  40404040  40404040  40404040  40404040  40404040  40404040
40404040  40404040  40404040  40404040  D5C3C1D9  F0F0F0F6*
02E3E7E3  40000188  40400004  40400001  00000000  40404040  40404040
40404040  40404040  40404040  40404040  40404040  40404040  40404040
40404040  40404040  40404040  40404040  D5C3C1D9  F0F0F0F7*
02E3E7E3  40000190  40400004  40400001  00000000  40404040  40404040
40404040  40404040  40404040  40404040  40404040  40404040  40404040
40404040  40404040  40404040  40404040  D5C3C1D9  F0F0F0F8*
02E3E7E3  40000198  40400004  40400001  00000000  40404040  40404040
40404040  40404040  40404040  40404040  40404040  40404040  40404040
40404040  40404040  40404040  40404040  D5C3C1D9  F0F0F0F9*
02E3E7E3  400001A0  40400004  40400001  00000000  40404040  40404040
40404040  40404040  40404040  40404040  40404040  40404040  40404040
40404040  40404040  40404040  40404040  D5C3C1D9  F0F0F1F0**
02E3E7E3  400001A8  40400004  40400001  00000000  40404040  40404040
40404040  40404040  40404040  40404040  40404040  40404040  40404040
40404040  40404040  40404040  40404040  D5C3C1D9  F0F0F1F1*
02E3E7E3  400001B0  40400004  40400001  00000000  40404040  40404040
40404040  40404040  40404040  40404040  40404040  40404040  40404040
40404040  40404040  40404040  40404040  D5C3C1D9  F0F0F1F2*
02E3E7E3  400001B8  40400004  40400001  00000000  40404040  40404040
40404040  40404040  40404040  40404040  40404040  40404040  40404040
40404040  40404040  40404040  40404040  D5C3C1D9  F0F0F1F3*
02C5E2C4  40404040  40400010  40400002  D4C1E3F2  40404040  02000000
40000000  40404040  40404040  40404040  40404040  40404040  40404040
40404040  40404040  40404040  40404040  D5C3C1D9  F0F0F1F4*
02E3E7E3  400001C0  40400004  40400001  00000000  40404040  40404040
40404040  40404040  40404040  40404040  40404040  40404040  40404040
40404040  40404040  40404040  40404040  D5C3C1D9  F0F0F1F5*
02C5E2C4  40404040  40400010  40400003  C9C2C3D6  D47B4040  02000000
40000000  40404040  40404040  40404040  40404040  40404040  40404040
40404040  40404040  40404040  40404040  D5C3C1D9  F0F0F1F6*
02E3E7E3  400001C8  40400008  40400001  00000000  00000000  40404040
40404040  40404040  40404040  40404040  40404040  40404040  40404040
40404040  40404040  40404040  40404040  D5C3C1D9  F0F0F1F7*
02E3E7E3  400001FC  40400038  40400001  5840D138  5850D120  5870D118
5880D110  5890D130  58A0D128  58B0D148  5860D178  7800D0C4  7000D0E8
5800B004  5900D0A8  41300001  4780D1BE  D5C3C1D9  F0F0F1F8*
02E3E7E3  40000234  40400038  40400001  1B335800  B0085900  D0A84120
00014780  D1D01B22  16231BFF  872FD1E0  5800D0A8  5000B010  5800D0E4
12004770  D1F25800  D0A85000  B0106800  D5C3C1D9  F0F0F1F9*
02E3E7E3  4000026C  40400038  40400001  D0986C00  D1087000  D0F86820

MEMBER NAME  NCARD
D1082C22  6C20D108  6D20D0A0  7020D0E0  6820D108  2C227020  D0EC5800
B0101200  4780D2F8  5800B00C  12004780  D5C3C1D9  F0F0F2F0**
02E3E7E3  400002A4  40400038  40400001  D29458F0  D1541800  45E0F004
0000000A  00000045  45E0F008  0450D0F0  45E0F008  0450B004  45E0F008
0860D108  45E0F008  0450B008  45E0F008  D5C3C1D9  F0F0F2F1*
02E3E7E3  400002DC  40400038  40400001  0470D0E8  45E0F008  0450B00C
45E0F008  0470D0E8  45E0F008  0450D0F0  45E0F008  0450D0F0  45E0F008
0450B010  45E0F010  5800B00C  12004770  D5C3C1D9  F0F0F2F2*
```

| | | | | | | |
|---|---|---|---|---|---|---|
| 02E3E7E3 | 40000314 | 40400038 | 40400001 | D2F458F0 | D1541800 | 45E0F004 |
| 0000000A | 00000045 | 45E0F008 | 0450D0F0 | 45E0F008 | 0450B004 | 45E0F008 |
| 0860D108 | 45E0F008 | 0450B008 | 45E0F008 | D5C3C1D9 | F0F0F2F3* | |
| 02E3E7E3 | 4000034C | 40400038 | 40400001 | 0470D0E8 | 45E0F008 | 0450D0F0 |
| 45E0F008 | 0450D0F0 | 45E0F008 | 0450B010 | 45E0F010 | 47F0D3E8 | 5800B008 |
| 12004770 | D30A5800 | D0A85000 | B00C5800 | D5C3C1D9 | F0F0F2F4* | |
| 02E3E7E3 | 40000384 | 40400038 | 40400001 | B00C1200 | 4780D360 | 58F0D154 |
| 45E0F004 | 0000000A | 00000028 | 45E0F008 | 0450D0F0 | 45E0F008 | 0450B004 |
| 45E0F008 | 0860D108 | 45E0F008 | 0450B008 | D5C3C1D9 | F0F0F2F5* | |
| 02E3E7E3 | 400003BC | 40400038 | 40400001 | 45E0F008 | 0470D0E8 | 45E0F008 |
| 0450B00C | 45E0F008 | 0470D0E8 | 45E0F010 | 5800B00C | 12004770 | D3E85800 |
| B0081200 | 4770D3A0 | 58F0D154 | 45E0F004 | D5C3C1D9 | F0F0F2F6* | |
| 02E3E7E3 | 400003F4 | 40400038 | 40400001 | 0000000A | 00000028 | 45E0F008 |
| 0450D0F0 | 45E0F008 | 0450B004 | 45E0F008 | 0860D108 | 45E0F010 | 5800B008 |
| 12004780 | D3E858F0 | D1541800 | 45E0F004 | D5C3C1D9 | F0F0F2F7* | |
| 02E3E7E3 | 4000042C | 40400038 | 40400001 | 0000000A | 00000028 | 45E0F008 |
| 0450D0F0 | 45E0F008 | 0450B004 | 45E0F008 | 0860D108 | 45E0F008 | 0450B008 |
| 45E0F008 | 0470D0E8 | 45E0F010 | 5800B004 | D5C3C1D9 | F0F0F2F8* | |
| 02E3E7E3 | 40000464 | 40400038 | 40400001 | 12004780 | D4465840 | D1681856 |
| 5870D0C0 | 18B51AB4 | 18371A35 | 189318A7 | 68298000 | 6D20D108 | 60298000 |
| 879AD408 | 8756D3FC | 5840D138 | 5850D120 | D5C3C1D9 | F0F0F2F9* | |
| 02E3E7E3 | 4000049C | 40400038 | 40400001 | 5870D118 | 5890D130 | 58A0D128 |
| 58B0D148 | 4100B004 | 5000D04C | 58F0D150 | 4110D04C | 05EF5800 | B0081200 |
| 4780D4C2 | 2B227820 | D0E01856 | 5870D0C0 | D5C3C1D9 | F0F0F3F0** | |
| 02E3E7E3 | 400004D4 | 40400038 | 40400001 | 5890D168 | 6840D090 | 28625880 |
| D1205840 | D1306045 | 400018B5 | 1AB91837 | 1A351893 | 18A76829 | 80002D26 |
| 60298000 | 879AD47E | 5890D168 | 8756D46E | D5C3C1D9 | F0F0F3F1* | |
| 02E3E7E3 | 4000050C | 40400038 | 40400001 | 5840D138 | 5850D120 | 5870D118 |
| 5880D110 | 5890D130 | 58A0D128 | 58B0D148 | 4100B008 | 5000D05C | 58F0D150 |
| 4110D05C | 05EF5800 | B00C1200 | 4780D558 | D5C3C1D9 | F0F0F3F2* | |
| 02E3E7E3 | 40000544 | 40400038 | 40400001 | 6800D090 | 6000A030 | 6800D090 |
| 6000A048 | 6800D090 | 6000A060 | 6800D090 | 6000A058 | 6800D090 | 6000A050 |
| 2B227820 | D0F85840 | D1741856 | 5870D180 | D5C3C1D9 | F0F0F3F3* | |
| 02E3E7E3 | 4000057C | 40400038 | 40400001 | 58A0D0C0 | 28625880 | D12818B5 |
| 1AB4183A | 1A351893 | 68298000 | 2D266029 | 8000879A | D5188756 | D50E5840 |
| D1385850 | D1205870 | D1185880 | D1105890 | D5C3C1D9 | F0F0F3F4* | |
| 02E3E7E3 | 400005B4 | 40400038 | 40400001 | D13058A0 | D12858B0 | D1484100 |
| B00C5000 | D06C58F0 | D1504110 | D06C05EF | 5800B010 | 12004770 | D56A1BFF |
| 58E0D000 | 07FE2B22 | 7820D0EC | 18565870 | D5C3C1D9 | F0F0F3F5* | |
| 02E3E7E3 | 400005EC | 40400038 | 40400001 | D0C05890 | D1682862 | 5880D118 |
| 68254000 | 23026005 | 400018B5 | 1AB91837 | 1A351893 | 18A76829 | 80002D26 |
| 23026009 | 8000879A | D5965890 | D1688756 | D5C3C1D9 | F0F0F3F6* | |
| 02E3E7E3 | 40000624 | 40400038 | 40400001 | D5805850 | D1205870 | D1185880 |
| D1105890 | D13058A0 | D12858B0 | D1484100 | B0105000 | D07C58F0 | D1504110 |
| D07C05EF | 1BFF58E0 | D00007FE | 58A0D004 | D5C3C1D9 | F0F0F3F7* | |
| 02E3E7E3 | 4000065C | 40400038 | 40400001 | 58E0A00C | 58B0A018 | 5810B024 |
| 6820D100 | 60201000 | 18DA92FF | A00C982C | A01C07FE | 987B1000 | 58207000 |
| 5020D0F0 | 98791024 | 68207000 | 6020D100 | D5C3C1D9 | F0F0F3F8* | |
| 02E3E7E3 | 40000694 | 40400038 | 40400001 | 68208000 | 6020D108 | 58209000 |
| 5020D0E4 | 58201004 | 41302000 | 41500004 | 1B255020 | D1485030 | D14C5820 |

MEMBER NAME NCARD

| | | | | | | |
|---|---|---|---|---|---|---|
| 10084130 | 20004150 | 00081B25 | 5B20D0C0 | D5C3C1D9 | F0F0F3F9* | |
| 02E3E7E3 | 400006CC | 40400038 | 40400001 | 5020D110 | 5030D114 | 5030D050 |
| 5820100C | 41302000 | 41500008 | 1B255B20 | D0C05020 | D1185030 | D11C5030 |
| D0805820 | 10104130 | 20004150 | 00081B25 | D5C3C1D9 | F0F0F4F0** | |
| 02E3E7E3 | 40000704 | 40400038 | 40400001 | 5B20D0C0 | 5020D120 | 5030D124 |
| 5030D060 | 58201014 | 41302000 | 41500008 | 1B255B20 | D0C05020 | D1285030 |
| D12C5030 | D0705820 | 10184130 | 20004150 | D5C3C1D9 | F0F0F4F1* | |

```
02E3E7E3  4000073C  40400038  40400001  00081B25  5020D130  5030D134
5030D054  5030D074  5820101C  41302000  41500008  1B255020  D1385030
D13C5030  D0845820  10204130  20004150  D5C3C1D9  F0F0F4F2*
02E3E7E3  40000774  40400014  40400001  00081B25  5020D140  5030D144
5030D064  47F0D184  40404040  40404040  40404040  40404040  40404040
40404040  40404040  40404040  40404040  D5C3C1D9  F0F0F4F3*
02E3E7E3  40000020  40400004  40400001  0000067C  40404040  40404040
40404040  40404040  40404040  40404040  40404040  40404040  40404040
40404040  40404040  40404040  40404040  D5C3C1D9  F0F0F4F4*
02D9D3C4  40404040  40400038  40404040  00020001  1C0001C8  00030001
1C0001CC  00010001  0C0002B4  00010001  0C000324  00010001  0C000398
00010001  0C0003F8  00010001  0C000430  D5C3C1D9  F0F0F4F5*
02E3E7E3  40000024  40400004  40400001  00000078  40404040  40404040
40404040  40404040  40404040  40404040  40404040  40404040  40404040
40404040  40404040  40404040  40404040  D5C3C1D9  F0F0F4F6*
02E3E7E3  40000078  40400004  40400001  00000658  40404040  40404040
40404040  40404040  40404040  40404040  40404040  40404040  40404040
40404040  40404040  40404040  40404040  D5C3C1D9  F0F0F4F7*
02E3E7E3  400000D0  40400004  40400001  80000178  40404040  40404040
40404040  40404040  40404040  40404040  40404040  40404040  40404040
40404040  40404040  40404040  40404040  D5C3C1D9  F0F0F4F8*
02E3E7E3  400000E0  40400004  40400001  80000178  40404040  40404040
40404040  40404040  40404040  40404040  40404040  40404040  40404040
40404040  40404040  40404040  40404040  D5C3C1D9  F0F0F4F9*
02E3E7E3  400000F0  40400004  40400001  80000178  40404040  40404040
40404040  40404040  40404040  40404040  40404040  40404040  40404040
40404040  40404040  40404040  40404040  D5C3C1D9  F0F0F5F0**
02E3E7E3  40000100  40400004  40400001  80000178  40404040  40404040
40404040  40404040  40404040  40404040  40404040  40404040  40404040
40404040  40404040  40404040  40404040  D5C3C1D9  F0F0F5F1*
02E3E7E3  400001D0  4040002C  40400001  00000000  00000000  00000000
00000000  00000048  00000000  00000000  00000030  00000008  00000000
00000010  40404040  40404040  40404040  D5C3C1D9  F0F0F5F2*
02D9D3C4  40404040  40400038  40404040  00010001  0C000020  00010001
0C000024  00010001  0C000078  00010001  0C0000D0  00010001  0C0000E0
00010001  0C0000F0  00010001  0C000100  D5C3C1D9  F0F0F5F3*
02C5D5C4  40404040  40404040  40404040  40404040  40404040  40404040
00000788  F1F5F7F3  F460C6D6  F34040F0  F2F0F2F8  F7F0F9F8  40F0F84B
F4F04BF5  F2404040  D5C3C1D9  C4404040  D5C3C1D9  F0F0F5F4**

MEMBER NAME  NFOUND
02C5E2C4  40404040  40400010  40400001  D5C6D6E4  D5C44040  00000000
40000000  40404040  40404040  40404040  40404040  40404040  40404040
40404040  40404040  40404040  40404040  D5C6D6E4  F0F0F0F1*
02E3E7E3  40000000  40400038  40400001  47F0F00C  07D5C6D6  E4D5C440
90ECD00C  184D98CD  F0205040  D00450D0  400807FC  40404040  40404040
D5D640D4  C1E3C5D9  C9C1D340  C3D6C4C5  D5C6D6E4  F0F0F0F2*
02E3E7E3  40000038  40400038  40400001  E240C6D6  E4D5C440  D5D640D6
D9C9C5D5  E3C1E3C9  D6D5E240  C6D6E4D5  C4404040  D5D640D3  C1E8E4D7
40D5E4D4  C2C5D9E2  40C6D6E4  D5C44040  D5C6D6E4  F0F0F0F3*
02E3E7E3  40000070  40400038  40400001  D5D640E2  C5D8E4C5  D5C3C540
D5E4D4C2  C5D9E240  C6D6E4D5  C4404040  40404040  D5D640C4  C1E2C840
D5E4D4C2  C5D9E240  C6D6E4D5  C4404040  D5C6D6E4  F0F0F0F4*
02C5E2C4  40404040  40400010  40400002  D7E3C1C2  D3C54040  05000000
40125768  40404040  40404040  40404040  40404040  40404040  40404040
40404040  40404040  40404040  40404040  D5C6D6E4  F0F0F0F5*
02E3E7E3  40000140  40400038  40400001  00000000  00000001  0000000C
00000013  00000014  00000015  00000016  00000017  00000018  00000019
00000048  00000058  00000000  00000000  D5C6D6E4  F0F0F0F6*
```

| | | | | | | |
|---|---|---|---|---|---|---|
| 02C5E2C4 | 40404040 | 40400010 | 40400003 | E2E3C1C3 | D2404040 | 05000000 |
| 40040744 | 40404040 | 40404040 | 40404040 | 40404040 | 40404040 | 40404040 |
| 40404040 | 40404040 | 40404040 | 40404040 | D5C6D6E4 | F0F0F0F7* | |
| 02C5E2C4 | 40404040 | 40400010 | 40400004 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D5C6D6E4 | F0F0F0F8* | |
| 02E3E7E3 | 400001D0 | 4040001C | 40400001 | FFFFFFEC | 00058600 | 000B0444 |
| 00108298 | FFFFFFA8 | 00000000 | 00000000 | 40404040 | 40404040 | 40404040 |
| 40404040 | 40404040 | 40404040 | 40404040 | D5C6D6E4 | F0F0F0F9* | |
| 02E3E7E3 | 40000178 | 40400004 | 40400001 | 000000C8 | 40404040 | 40404040 |
| 40404040 | 40404040 | 40404040 | 40404040 | 40404040 | 40404040 | 40404040 |
| 40404040 | 40404040 | 40404040 | 40404040 | D5C6D6E4 | F0F0F1F0** | |
| 02E3E7E3 | 40000188 | 40400038 | 40400001 | 40404040 | 40404040 | 40404040 |
| 40404040 | 40404040 | 40404040 | 40404040 | 40404040 | 40404040 | 40404040 |
| 40404040 | 40404040 | 40404040 | 40404040 | D5C6D6E4 | F0F0F1F1* | |
| 02E3E7E3 | 400001C0 | 40400010 | 40400001 | 40404040 | 40404040 | 40404040 |
| 40404040 | 40404040 | 40404040 | 40404040 | 40404040 | 40404040 | 40404040 |
| 40404040 | 40404040 | 40404040 | 40404040 | D5C6D6E4 | F0F0F1F2* | |
| 02E3E7E3 | 400001F0 | 40400038 | 40400001 | 5830D130 | 5860D12C | 5880D128 |
| 58B0D140 | 58A0D09C | 5890D0D0 | 5870D0A4 | 58008014 | 12004730 | D1BA5800 |
| D0D41A0A | 5000D0D4 | 19094730 | D3165850 | D5C6D6E4 | F0F0F1F3* | |
| 02E3E7E3 | 40000228 | 40400038 | 40400001 | D0D45C40 | D0C0182A | 1A254102 |
| B0005000 | D05058F0 | D13C4110 | D04C05EF | 5850D0D4 | 5C40D0C0 | 18271A25 |
| 4102B000 | 5000D05C | 58F0D13C | 4110D058 | D5C6D6E4 | F0F0F1F4* | |
| 02E3E7E3 | 40000260 | 40400038 | 40400001 | 05EF5800 | 87E81200 | 4730D210 |
| 5990D0D4 | 47C0D316 | 5800D0D4 | 1A0A5000 | D0D41850 | 5C40D0C0 | 182A1A25 |
| 4102B000 | 5000D050 | 58F0D13C | 4110D04C | D5C6D6E4 | F0F0F1F5* | |
| 02E3E7E3 | 40000298 | 40400038 | 40400001 | 05EF5850 | D0D45C40 | D0C01827 |
| 1A254102 | B0005000 | D06858F0 | D13C4110 | D06405EF | 58F0D138 | 5800F058 |
| 12004730 | D26A5990 | D0D447C0 | D3165800 | D5C6D6E4 | F0F0F1F6* | |
| 02E3E7E3 | 400002D0 | 40400038 | 40400001 | D0D41A0A | 5000D0D4 | 18505C40 |
| D0C0182A | 1A254102 | B0005000 | D05058F0 | D13C4110 | D04C05EF | 5850D0D4 |
| 5C40D0C0 | 18271A25 | 4102B000 | 5000D074 | D5C6D6E4 | F0F0F1F7* | |
| 02E3E7E3 | 40000308 | 40400038 | 40400001 | 58F0D13C | 4110D070 | 05EF5800 |
| 60181200 | 4730D2C0 | 5990D0D4 | 47C0D316 | 5800D0D4 | 1A0A5000 | D0D41850 |
| 5C40D0C0 | 182A1A25 | 4102B000 | 5000D050 | D5C6D6E4 | F0F0F1F8* | |
| 02E3E7E3 | 40000340 | 40400038 | 40400001 | 58F0D13C | 4110D04C | 05EF5850 |
| D0D45C40 | D0C01827 | 1A254102 | B0005000 | D08058F0 | D13C4110 | D07C05EF |
| 58003018 | 12004730 | D3165990 | D0D447C0 | D5C6D6E4 | F0F0F1F9* | |
| 02E3E7E3 | 40000378 | 40400038 | 40400001 | D3165800 | D0D41A0A | 5000D0D4 |

MEMBER NAME NFOUND

| | | | | | | |
|---|---|---|---|---|---|---|
| 18505C40 | D0C0182A | 1A254102 | B0005000 | D05058F0 | D13C4110 | D04C05EF |
| 5850D0D4 | 5C40D0C0 | 18271A25 | 4102B000 | D5C6D6E4 | F0F0F2F0** | |
| 02E3E7E3 | 400003B0 | 40400038 | 40400001 | 5000D08C | 58F0D13C | 4110D088 |
| 05EF1BFF | 58E0D000 | 07FE58A0 | D00458E0 | A00C58B0 | A0185810 | B0045820 |
| D0D45020 | 100018DA | 92FFA00C | 982CA01C | D5C6D6E4 | F0F0F2F1* | |
| 02E3E7E3 | 400003E8 | 4040002E | 40400001 | 07FE5870 | 10045820 | 70005020 |
| D0D45820 | 10004130 | 20004150 | 00011B25 | 5C40D0C0 | 1B255020 | D1405030 |
| D14447F0 | D1484040 | 40404040 | 40404040 | D5C6D6E4 | F0F0F2F2* | |
| 02E3E7E3 | 40000020 | 40400008 | 40400001 | 000003EA | 000000A8 | 40404040 |
| 40404040 | 40404040 | 40404040 | 40404040 | 40404040 | 40404040 | 40404040 |
| 40404040 | 40404040 | 40404040 | 40404040 | D5C6D6E4 | F0F0F2F3* | |
| 02D9D3C4 | 40404040 | 40400038 | 40404040 | 00020001 | 0C0001D0 | 00020001 |
| 0C0001D4 | 00020001 | 0C0001D8 | 00020001 | 0C0001DC | 00030001 | 0C0001E0 |
| 00040001 | 1C0001E4 | 00010001 | 0C000020 | D5C6D6E4 | F0F0F2F4* | |
| 02E3E7E3 | 400000A8 | 40400004 | 40400001 | 000003C6 | 40404040 | 40404040 |
| 40404040 | 40404040 | 40404040 | 40404040 | 40404040 | 40404040 | 40404040 |
| 40404040 | 40404040 | 40404040 | 40404040 | D5C6D6E4 | F0F0F2F5* | |

```
02E3E7E3  400000F4  40400004  40400001  00000168  40404040  40404040
40404040  40404040  40404040  40404040  40404040  40404040  40404040
40404040  40404040  40404040  40404040  D5C6D6E4  F0F0F2F6*
02E3E7E3  400000FC  40400008  40400001  80000188  00000154  40404040
40404040  40404040  40404040  40404040  40404040  40404040  40404040
40404040  40404040  40404040  40404040  D5C6D6E4  F0F0F2F7*
02E3E7E3  40000108  40400008  40400001  80000090  00000164  40404040
40404040  40404040  40404040  40404040  40404040  40404040  40404040
40404040  40404040  40404040  40404040  D5C6D6E4  F0F0F2F8*
02E3E7E3  40000114  40400004  40400001  80000070  40404040  40404040
40404040  40404040  40404040  40404040  40404040  40404040  40404040
40404040  40404040  40404040  40404040  D5C6D6E4  F0F0F2F9*
02D9D3C4  40404040  40400038  40404040  00010001  0C000024  00010001
0C0000A8  00010001  0C0000F4  00010001  0C0000FC  00010001  0C000100
00010001  0C000108  00010001  0C00010C  D5C6D6E4  F0F0F3F0**
02E3E7E3  40000118  40400004  40400001  00000158  40404040  40404040
40404040  40404040  40404040  40404040  40404040  40404040  40404040
40404040  40404040  40404040  40404040  D5C6D6E4  F0F0F3F1*
02E3E7E3  40000120  40400008  40400001  80000058  00000154  40404040
40404040  40404040  40404040  40404040  40404040  40404040  40404040
40404040  40404040  40404040  40404040  D5C6D6E4  F0F0F3F2*
02E3E7E3  4000012C  40400008  40400001  80000040  0000015C  40404040
40404040  40404040  40404040  40404040  40404040  40404040  40404040
40404040  40404040  40404040  40404040  D5C6D6E4  F0F0F3F3*
02E3E7E3  40000138  40400004  40400001  80000028  40404040  40404040
40404040  40404040  40404040  40404040  40404040  40404040  40404040
40404040  40404040  40404040  40404040  D5C6D6E4  F0F0F3F4*
02D9D3C4  40404040  40400038  40404040  00010001  0C000114  00010001
0C000118  00010001  0C000120  00010001  0C000124  00010001  0C00012C
00010001  0C000130  00010001  0C000138  D5C6D6E4  F0F0F3F5*
02C5D5C4  40404040  40404040  40404040  40404040  40404040  40404040
00000416  F1F5F7F3  F460C6D6  F34040F0  F2F0F2F8  F7F0F9F8  40F0F84B
F4F04BF5  F6404040  D5C6D6E4  D5C44040  D5C6D6E4  F0F0F3F6**

MEMBER NAME  NSCHT
02C5E2C4  40404040  40400010  40400001  D5E2C3C8  E3404040  00000000
40000000  40404040  40404040  40404040  40404040  40404040  40404040
40404040  40404040  40404040  40404040  D5E2C3C8  F0F0F0F1*
02E3E7E3  40000000  40400038  40400001  47F0F00C  07D5E2C3  C8E34040
90ECD00C  184D98CD  F0205040  D00450D0  400807FC  40404040  40404040
021A1BD4  D6C4C5D3  E240C6D3  C1C7C7C5  D5E2C3C8  F0F0F0F2*
02E3E7E3  40000038  40400038  40400001  C440C6D6  D940E2D3  C9C340D9
E4D51805  1A07C7D9  D6E4D77E  4014041A  086B40E4  E2C5D97E  40060214
041A086B  40C4C1E2  C87E4010  03183222  D5E2C3C8  F0F0F0F3*
02E3E7E3  40000070  40400038  40400001  02065014  0122021A  1C40C5D9
D9D6D940  C9D540D5  E2C3C8E3  404DE2E4  D7C5D940  E3C5E7E3  5D22021A
1F40C5D9  D9D6D940  C9D540D5  E2C3C8E3  D5E2C3C8  F0F0F0F4*
02E3E7E3  400000A8  40400011  40400001  7A40C3C1  D3D340E3  D640C3C1
C4D5E2C8  22404040  40404040  40404040  40404040  40404040  40404040
40404040  40404040  40404040  40404040  D5E2C3C8  F0F0F0F5*
02E3E7E3  400000C0  40400008  40400001  40404040  40404040  40404040
40404040  40404040  40404040  40404040  40404040  40404040  40404040
40404040  40404040  40404040  40404040  D5E2C3C8  F0F0F0F6*
02E3E7E3  40000270  40400038  40400001  00000000  00000001  00000003
00000004  00000005  00000014  00000015  00000016  0000001A  00000049
00000050  00000078  401DF3B6  4029FBE7  D5E2C3C8  F0F0F0F7*
02C5E2C4  40404040  40400010  40400002  D9D4D6C4  C5D34040  05000000
40000018  40404040  40404040  40404040  40404040  40404040  40404040
40404040  40404040  40404040  40404040  D5E2C3C8  F0F0F0F8*
```

```
02E3E7E3  400002A8  40400024  40400001  403EF9DB  40400000  41280000
41300000  41480000  41500000  415C353F  00000000  00000000  40404040
40404040  40404040  40404040  40404040  D5E2C3C8  F0F0F0F9*
02C5E2C4  40404040  40400010  40400003  C6D4D6C4  C5D34040  05000000
400001F8  40404040  40404040  40404040  40404040  40404040  40404040
40404040  40404040  40404040  40404040  D5E2C3C8  F0F0F1F0**
02C5E2C4  40404040  40400010  40400004  C7D9E4D7  40404040  05000000
4000000C  40404040  40404040  40404040  40404040  40404040  40404040
40404040  40404040  40404040  40404040  D5E2C3C8  F0F0F1F1*
02C5E2C4  40404040  40400010  40400005  D5C1D4C5  40404040  02000000
40000000  40404040  40404040  40404040  40404040  40404040  40404040
40404040  40404040  40404040  40404040  D5E2C3C8  F0F0F1F2*
02C5E2C4  40404040  40400010  40400006  D4E5C3C8  D9404040  02000000
40000000  40404040  40404040  40404040  40404040  40404040  40404040
40404040  40404040  40404040  40404040  D5E2C3C8  F0F0F1F3*
02C5E2C4  40404040  40400010  40400007  C3C1C4D5  E2C84040  02000000
40000000  40404040  40404040  40404040  40404040  40404040  40404040
40404040  40404040  40404040  40404040  D5E2C3C8  F0F0F1F4*
02C5E2C4  40404040  40400010  40400008  C3C1C4E2  E4D74040  02000000
40000000  40404040  40404040  40404040  40404040  40404040  40404040
40404040  40404040  40404040  40404040  D5E2C3C8  F0F0F1F5*
02C5E2C4  40404040  40400010  40400009  C8C7C4C1  E3C54040  02000000
40000000  40404040  40404040  40404040  40404040  40404040  40404040
40404040  40404040  40404040  40404040  D5E2C3C8  F0F0F1F6*
02E3E7E3  400003E8  40400020  40400001  FFFFFFFF  FFFFFFEB  00000000
00000000  00000000  00000000  00000000  00000000  40404040  40404040
40404040  40404040  40404040  40404040  D5E2C3C8  F0F0F1F7*
02D9D3C4  40404040  40400038  40404040  00020001  0C0003E8  00030001
0C0003EC  00040001  0C0003F0  00050001  1C0003F4  00060001  1C0003F8
00070001  1C0003FC  00080001  1C000400  D5E2C3C8  F0F0F1F8*
02C5E2C4  40404040  40400010  4040000A  C8C7E3C9  D4C54040  02000000
40000000  40404040  40404040  40404040  40404040  40404040  40404040
40404040  40404040  40404040  40404040  D5E2C3C8  F0F0F1F9*
02C5E2C4  40404040  40400010  4040000B  C9C2C3D6  D47B4040  02000000

MEMBER NAME  NSCHT
40000000  40404040  40404040  40404040  40404040  40404040  40404040
40404040  40404040  40404040  40404040  D5E2C3C8  F0F0F2F0**
02C5E2C4  40404040  40400010  4040000C  C9C3D5E3  C5D94040  02000000
40000000  40404040  40404040  40404040  40404040  40404040  40404040
40404040  40404040  40404040  40404040  D5E2C3C8  F0F0F2F1*
02E3E7E3  40000408  4040000C  40400001  00000000  00000000  00000000
40404040  40404040  40404040  40404040  40404040  40404040  40404040
40404040  40404040  40404040  40404040  D5E2C3C8  F0F0F2F2*
02E3E7E3  40000368  40400038  40400001  C3D6D7E8  D9C9C7C8  E3404DC3
5D40F1F9  F8F640E3  C8C540C2  D6C5C9D5  C740C3D6  D4D7C1D5  E85BC1D3
D340D9C9  C7C8E3E2  40D9C5E2  C5D9E5C5  D5E2C3C8  F0F0F2F3*
02E3E7E3  400003A0  40400038  40400001  C45B5BE2  D3C9C340  E5C5D9E2
C9D6D540  E7E74BE7  40404040  40404040  4040C4C1  E3C57A40  E7E761E7
E761E7E7  40404040  4040E3C9  D4C57A40  D5E2C3C8  F0F0F2F4*
02E3E7E3  400003D8  40400008  40400001  E7E77AE7  E77AE7E7  40404040
40404040  40404040  40404040  40404040  40404040  40404040  40404040
40404040  40404040  40404040  40404040  D5E2C3C8  F0F0F2F5*
02E3E7E3  4000041C  40400038  40400001  5860D328  5870D320  58B0D324
5850D1B8  5840D1BC  4100D2E8  5000D080  58F0D330  4110D07C  05EF58F0
D3404110  D08805EF  58F0D33C  4110D08C  D5E2C3C8  F0F0F2F6*
02E3E7E3  40000454  40400038  40400001  05EF7800  D1F83300  7000D220
7800D1F4  33007000  D2287800  D1F07000  D21058F0  D3384110  D09005EF
41E00004  15FE4720  D3C458EF  D04C07FE  D5E2C3C8  F0F0F2F7*
```

```
02E3E7E3  4000048C  40400038  40400001  58F0D32C  4110D0D8  05EF41E0
000415FE  4720D3DE  58EFD054  07FE7800  D1EC7000  D21058F0  D3441800
45E0F004  00000000  00000028  45E0F008  D5E2C3C8  F0F0F2F8*
02E3E7E3  400004C4  40400038  40400001  04706000  45E0F00C  00000004
04700002  45E0F008  0450D214  45E0F010  58F0D344  45E0F000  00000000
00000070  45E0F134  00010000  0120D22C  D5E2C3C8  F0F0F2F9*
02E3E7E3  400004FC  40400038  40400001  01000050  00000001  45E0F010
4100D22C  5000D0DC  58F0D348  4110D0DC  05EF5000  D21858F0  D3384110
D0E405EF  41E00004  15FE4720  D47058EF  D5E2C3C8  F0F0F3F0**
02E3E7E3  40000534  40400038  40400001  D05C07FE  7800D1E8  7000D210
18851894  58A0D1AC  4100D27C  5000D130  4109B001  5000D134  9280D134
58F0D330  4110D12C  05EF4100  D2905000  D5E2C3C8  F0F0F3F1*
02E3E7E3  4000056C  40400038  40400001  D13C58F0  D3304110  D13805EF
4100D291  5000D148  4108B1A4  5000D14C  9280D14C  58F0D330  4110D144
05EF58F0  D3384110  D15005EF  41E00004  D5E2C3C8  F0F0F3F2*
02E3E7E3  400005A4  40400038  40400001  15FE4720  D4E858EF  D06407FE
7800D210  7B00D1E4  7000D210  5AA0D1AC  5A80D1B8  5A90D1BC  59A0B1A5
47C0D480  58F0D32C  4110D198  05EF41E0  D5E2C3C8  F0F0F3F3*
02E3E7E3  400005DC  40400038  40400001  000415FE  4720D522  58EFD06C
07FE58F0  D3344110  D19C05EF  41E00004  15FE4720  D53C58EF  D07407FE
1BFF58E0  D00007FE  58F0D344  45E0F004  D5E2C3C8  F0F0F3F4*
02E3E7E3  40000614  40400008  40400001  00000006  00000076  40404040
40404040  40404040  40404040  40404040  40404040  40404040  40404040
40404040  40404040  40404040  40404040  D5E2C3C8  F0F0F3F5*
02D9D3C4  40404040  40400038  40404040  00090001  1C000404  000A0001
1C000408  000B0001  1C00040C  000C0001  1C000410  00010001  0C0004BC
00040001  0C0004CC  00010001  0C0004EC  D5E2C3C8  F0F0F3F6*
02E3E7E3  4000061C  40400038  40400001  45E0F010  1BFF58E0  D00007FE
58F0D344  45E0F004  00000006  00000096  45E0F010  1BFF58E0  D00007FE
58D0D004  58E0D00C  92FFD00C  982CD01C  D5E2C3C8  F0F0F3F7*
02E3E7E3  40000654  40400012  40400001  07FE5870  10005820  70005020
D21447F0  D3544040  40404040  40404040  40404040  40404040  40404040
40404040  40404040  40404040  40404040  D5E2C3C8  F0F0F3F8*
02E3E7E3  40000020  40400008  40400001  00000656  000000C8  40404040
40404040  40404040  40404040  40404040  40404040  40404040  40404040

MEMBER NAME  NSCHT
40404040  40404040  40404040  40404040  D5E2C3C8  F0F0F3F9*
02E3E7E3  400000C8  40400004  40400001  00000644  40404040  40404040
40404040  40404040  40404040  40404040  40404040  40404040  40404040
40404040  40404040  40404040  40404040  D5E2C3C8  F0F0F4F0**
02E3E7E3  40000114  4040000C  40400001  0000048C  0000060C  000004A6
40404040  40404040  40404040  40404040  40404040  40404040  40404040
40404040  40404040  40404040  40404040  D5E2C3C8  F0F0F4F1*
02D9D3C4  40404040  40400038  40404040  00010001  0C000618  00010001
0C000634  00010001  0C000020  00010001  0C000024  00010001  0C0000C8
00010001  0C000114  00010001  0C000118  D5E2C3C8  F0F0F4F2*
02E3E7E3  40000120  4040001C  40400001  000004A6  00000538  0000060C
000005B0  0000060C  000005EA  000005EA  40404040  40404040  40404040
40404040  40404040  40404040  40404040  D5E2C3C8  F0F0F4F3*
02D9D3C4  40404040  40400038  40404040  00010001  0C00011C  00010001
0C000120  00010001  0C000124  00010001  0C000128  00010001  0C00012C
00010001  0C000130  00010001  0C000134  D5E2C3C8  F0F0F4F4*
02E3E7E3  4000013C  4040000C  40400001  00000604  00000628  0000027C
40404040  40404040  40404040  40404040  40404040  40404040  40404040
40404040  40404040  40404040  40404040  D5E2C3C8  F0F0F4F5*
02E3E7E3  4000014C  40400010  40400001  80000014  800003D8  800003C4
000002E8  40404040  40404040  40404040  40404040  40404040  40404040
40404040  40404040  40404040  40404040  D5E2C3C8  F0F0F4F6*
```

```
02D9D3C4  40404040  40400038  40404040  00010001  0C000138  00010001
0C00013C  00010001  0C000140  00010001  0C000144  00020001  0C00014C
00010001  0C000150  00010001  0C000154  D5E2C3C8  F0F0F4F7*
02E3E7E3  4000015C  4040001C  40400001  000002D8  00000270  0000029C
000002A4  000002A0  00000368  00000270  40404040  40404040  40404040
40404040  40404040  40404040  40404040  D5E2C3C8  F0F0F4F8*
02D9D3C4  40404040  40400038  40404040  00010001  0C000158  00010001
0C00015C  00010001  0C000160  00010001  0C000164  00010001  0C000168
00010001  0C00016C  00010001  0C000170  D5E2C3C8  F0F0F4F9*
02E3E7E3  40000178  4040001C  40400001  00000270  00000270  00000270
00000274  00000278  00000270  00000270  40404040  40404040  40404040
40404040  40404040  40404040  40404040  D5E2C3C8  F0F0F5F0**
02D9D3C4  40404040  40400038  40404040  00010001  0C000174  00010001
0C000178  00010001  0C00017C  00010001  0C000180  00010001  0C000184
00010001  0C000188  00010001  0C00018C  D5E2C3C8  F0F0F5F1*
02E3E7E3  40000194  40400010  40400001  000002A4  000002A8  80000270
800002EC  40404040  40404040  40404040  40404040  40404040  40404040
40404040  40404040  40404040  40404040  D5E2C3C8  F0F0F5F2*
02E3E7E3  400001A8  4040000C  40400001  80000298  000002E8  000002D8
40404040  40404040  40404040  40404040  40404040  40404040  40404040
40404040  40404040  40404040  40404040  D5E2C3C8  F0F0F5F3*
02D9D3C4  40404040  40400038  40404040  00010001  0C000190  00010001
0C000194  00010001  0C000198  00010001  0C00019C  00010001  0C0001A0
00010001  0C0001A8  00010001  0C0001AC  D5E2C3C8  F0F0F5F4*
02E3E7E3  400001B4  4040001C  40400001  00000270  000002E0  000002A4
000002A0  000002F4  00000270  00000270  40404040  40404040  40404040
40404040  40404040  40404040  40404040  D5E2C3C8  F0F0F5F5*
02D9D3C4  40404040  40400038  40404040  00010001  0C0001B0  00010001
0C0001B4  00010001  0C0001B8  00010001  0C0001BC  00010001  0C0001C0
00010001  0C0001C4  00010001  0C0001C8  D5E2C3C8  F0F0F5F6*
02E3E7E3  400001D0  4040001C  40400001  00000270  00000270  00000274
00000278  00000270  00000270  000002A4  40404040  40404040  40404040
40404040  40404040  40404040  40404040  D5E2C3C8  F0F0F5F7*
02D9D3C4  40404040  40400038  40404040  00010001  0C0001CC  00010001
0C0001D0  00010001  0C0001D4  00010001  0C0001D8  00010001  0C0001DC
00010001  0C0001E0  00010001  0C0001E4  D5E2C3C8  F0F0F5F8*

MEMBER NAME  NSCHT
02E3E7E3  400001EC  4040000C  40400001  000002A8  80000270  00000284
40404040  40404040  40404040  40404040  40404040  40404040  40404040
40404040  40404040  40404040  40404040  D5E2C3C8  F0F0F5F9*
02E3E7E3  400001FC  40400008  40400001  80000000  00000274  40404040
40404040  40404040  40404040  40404040  40404040  40404040  40404040
40404040  40404040  40404040  40404040  D5E2C3C8  F0F0F6F0**
02E3E7E3  40000208  40400008  40400001  800000C0  00000280  40404040
40404040  40404040  40404040  40404040  40404040  40404040  40404040
40404040  40404040  40404040  40404040  D5E2C3C8  F0F0F6F1*
02E3E7E3  40000214  40400008  40400001  80000000  000002F0  40404040
40404040  40404040  40404040  40404040  40404040  40404040  40404040
40404040  40404040  40404040  40404040  D5E2C3C8  F0F0F6F2*
02D9D3C4  40404040  40400038  40404040  00010001  0C0001E8  00010001
0C0001EC  00010001  0C0001F0  00010001  0C0001F4  00010001  0C000200
00010001  0C000208  00010001  0C00020C  D5E2C3C8  F0F0F6F3*
02E3E7E3  4000021C  4040001C  40400001  000002D8  00000270  00000290
000002A4  000002A0  00000344  00000270  40404040  40404040  40404040
40404040  40404040  40404040  40404040  D5E2C3C8  F0F0F6F4*
02D9D3C4  40404040  40400038  40404040  00010001  0C000218  00010001
0C00021C  00010001  0C000220  00010001  0C000224  00010001  0C000228
00010001  0C00022C  00010001  0C000230  D5E2C3C8  F0F0F6F5*
```

```
02E3E7E3  40000238  4040001C  40400001  00000270  00000270  00000270
00000274  00000278  00000270  00000270  40404040  40404040  40404040
40404040  40404040  40404040  40404040  D5E2C3C8  F0F0F6F6*
02D9D3C4  40404040  40400038  40404040  00010001  0C000234  00010001
0C000238  00010001  0C00023C  00010001  0C000240  00010001  0C000244
00010001  0C000248  00010001  0C00024C  D5E2C3C8  F0F0F6F7*
02E3E7E3  40000254  40400018  40400001  000002A4  000002A8  80000270
800002D4  000002EC  800002D4  40404040  40404040  40404040  40404040
40404040  40404040  40404040  40404040  D5E2C3C8  F0F0F6F8*
02E3E7E3  40000414  40400008  40400001  00000000  00000000  40404040
40404040  40404040  40404040  40404040  40404040  40404040  40404040
40404040  40404040  40404040  40404040  D5E2C3C8  F0F0F6F9*
02D9D3C4  40404040  40400038  40404040  00010001  0C000250  00010001
0C000254  00010001  0C000258  00010001  0C00025C  00010001  0C000260
00010001  0C000264  00010001  0C000268  D5E2C3C8  F0F0F7F0**
02C5D5C4  40404040  40404040  40404040  40404040  40404040  40404040
00000666  F1F5F7F3  F460C6D6  F34040F0  F2F0F2F8  F7F0F9F8  40F0F84B
F4F14BF0  F0404040  D5E2C3C8  E3404040  D5E2C3C8  F0F0F7F1**

MEMBER NAME  OFFST
02C5E2C4  40404040  40400010  40400001  D6C6C6E2  E3404040  00000000
40000000  40404040  40404040  40404040  40404040  40404040  40404040
40404040  40404040  40404040  40404040  D6C6C6E2  F0F0F0F1*
02E3E7E3  40000000  40400028  40400001  47F0F00C  07D6C6C6  E2E34040
90ECD00C  184D98CD  F0205040  D00450D0  400807FC  40404040  40404040
40404040  40404040  40404040  40404040  D6C6C6E2  F0F0F0F2*
02C5E2C4  40404040  40400010  40400002  E4D5C9E3  C4404040  02000000
40000000  40404040  40404040  40404040  40404040  40404040  40404040
40404040  40404040  40404040  40404040  D6C6C6E2  F0F0F0F3*
02E3E7E3  40000080  40400028  40400001  00000000  00000000  41300000
00000000  41200000  00000000  00000002  00000003  00000000  00000000
40404040  40404040  40404040  40404040  D6C6C6E2  F0F0F0F4*
02E3E7E3  40000100  40400038  40400001  00000000  6800D058  6000D0B8
6820D060  6C20D090  6840D0C0  2C442C24  6840D068  6C40D0A0  6C40D0C0
2A246A20  D0B02302  6000D0C8  6820D060  D6C6C6E2  F0F0F0F5*
02E3E7E3  40000138  40400038  40400001  6C20D088  6840D0C0  2C442C24
6840D068  6C40D098  6C40D0C0  2A242802  6A00D0A8  6000D0D0  58F0D0D8
4110D04C  05EF1BFF  58E0D000  07FE58A0  D6C6C6E2  F0F0F0F6*
02E3E7E3  40000170  40400038  40400001  D00458E0  A00C58B0  A0185810
B0006820  D0C86020  10005820  B0046840  D0D06040  200018DA  92FFA00C
982CA01C  07FE987B  10006820  70006020  D6C6C6E2  F0F0F0F7*
02E3E7E3  400001A8  40400038  40400001  D0C86820  80006020  D0D06820
90006020  D0C06820  A0006020  D0886820  B0006020  D098987A  10146820
70006020  D0A86820  80006020  D0906820  D6C6C6E2  F0F0F0F8*
02E3E7E3  400001E0  40400012  40400001  90006020  D0A06820  A0006020
D0B047F0  D0DC4040  40404040  40404040  40404040  40404040  40404040
40404040  40404040  40404040  40404040  D6C6C6E2  F0F0F0F9*
02E3E7E3  40000020  4040000C  40400001  0000019E  00000028  0000016E
40404040  40404040  40404040  40404040  40404040  40404040  40404040
40404040  40404040  40404040  40404040  D6C6C6E2  F0F0F1F0**
02E3E7E3  40000074  4040000C  40400001  000000F0  000000F8  800000E0
40404040  40404040  40404040  40404040  40404040  40404040  40404040
40404040  40404040  40404040  40404040  D6C6C6E2  F0F0F1F1*
02D9D3C4  40404040  40400038  40404040  00020001  1C000100  00010001
0C000020  00010001  0C000024  00010001  0C000028  00010001  0C000074
00010001  0C000078  00010001  0C00007C  D6C6C6E2  F0F0F1F2*
02C5D5C4  40404040  40404040  40404040  40404040  40404040  40404040
000001F2  F1F5F7F3  F460C6D6  F34040F0  F2F0F2F8  F7F0F9F8  40F0F84B
F4F14BF0  F5404040  D6C6C6E2  E3404040  D6C6C6E2  F0F0F1F3**
```

MEMBER NAME OPTMZE

| | | | | | | |
|---|---|---|---|---|---|---|
| 02C5E2C4 | 40404040 | 40400010 | 40400001 | D6D7E3D4 | E9C54040 | 00000000 |
| 40000000 | 40404040 | 40404040 | 40404040 | 40404040 | 40404040 | 40404040 |
| 40404040 | 40404040 | 40404040 | 40404040 | D6D7E3D4 | F0F0F0F1* | |
| 02E3E7E3 | 40000000 | 40400028 | 40400001 | 47F0F00C | 07D6D7E3 | D4E9C540 |
| 90ECD00C | 184D98CD | F0205040 | D00450D0 | 400807FC | 40404040 | 40404040 |
| 40404040 | 40404040 | 40404040 | 40404040 | D6D7E3D4 | F0F0F0F2* | |
| 02C5E2C4 | 40404040 | 40400010 | 40400002 | E2D8D9E3 | 40404040 | 02000000 |
| 40000000 | 40404040 | 40404040 | 40404040 | 40404040 | 40404040 | 40404040 |
| 40404040 | 40404040 | 40404040 | 40404040 | D6D7E3D4 | F0F0F0F3* | |
| 02E3E7E3 | 400000A0 | 40400020 | 40400001 | 00000000 | 00000000 | 00000001 |
| 00000001 | 00000002 | 00000008 | 00000000 | 00000000 | 40404040 | 40404040 |
| 40404040 | 40404040 | 40404040 | 40404040 | D6D7E3D4 | F0F0F0F4* | |
| 02E3E7E3 | 40000120 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D6D7E3D4 | F0F0F0F5* | |
| 02C5E2C4 | 40404040 | 40400010 | 40400003 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D6D7E3D4 | F0F0F0F6* | |
| 02E3E7E3 | 4000012C | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D6D7E3D4 | F0F0F0F7* | |
| 02C5E2C4 | 40404040 | 40400010 | 40400004 | D6D9C4C5 | D9404040 | 02000000 |
| 40000000 | 40404040 | 40404040 | 40404040 | 40404040 | 40404040 | 40404040 |
| 40404040 | 40404040 | 40404040 | 40404040 | D6D7E3D4 | F0F0F0F8* | |
| 02E3E7E3 | 40000134 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D6D7E3D4 | F0F0F0F9* | |
| 02E3E7E3 | 40000198 | 40400038 | 40400001 | 5880D104 | 58B0D0FC | 58A0D08C |
| 5890D084 | 7800D07C | 7000D0CC | 7000D0D4 | 5990D0C0 | 4780D43C | 5800D0C0 |
| 5000D0A4 | 5800D088 | 5000D0A0 | 5800D124 | D6D7E3D4 | F0F0F1F0** | |
| 02E3E7E3 | 400001D0 | 40400038 | 40400001 | 5000D140 | 182A50A0 | D1445800 |
| D1245000 | D11450A0 | D11C5800 | D15C5000 | D14C5000 | D1345800 | D1605000 |
| D1481882 | 58B0D104 | 58A0D0FC | 5800D078 | D6D7E3D4 | F0F0F1F1* | |
| 02E3E7E3 | 40000208 | 40400038 | 40400001 | 5000D0B0 | 5800D0A0 | 5000D0BC |
| 5090D0E0 | 58E0D148 | 585EB000 | 5C40D08C | 18355A30 | D1247820 | D0CC7B23 |
| A0003C22 | 18255A20 | D08C7840 | D0D47B42 | D6D7E3D4 | F0F0F1F2* | |
| 02E3E7E3 | 40000240 | 40400038 | 40400001 | A0003C44 | 3A247020 | D16858F0 |
| D0F84110 | D04C05EF | 7000D0AC | 7803A000 | 7000D0D0 | 7802A000 | 7000D0D8 |
| 5800D0A0 | 5000D098 | 5800D134 | 5A00D124 | D6D7E3D4 | F0F0F1F3* | |
| 02E3E7E3 | 40000278 | 40400038 | 40400001 | 5000D138 | 5800D134 | 5A00D08C |
| 5000D13C | 5880D124 | 58A0D08C | 58E0D138 | 583EB000 | 18531A59 | 58E0D13C |
| 5A3EB000 | 1B391C2A | 1C4A5050 | D1281865 | D6D7E3D4 | F0F0F1F4* | |
| 02E3E7E3 | 400002B0 | 40400038 | 40400001 | 1A685840 | D0BC5850 | D0E01879 |
| 18865890 | D12818B3 | 5860D0FC | 5A70D084 | 78286000 | 7020D118 | 33227A20 |
| D0CC3C22 | 18391A3A | 78436000 | 7040D120 | D6D7E3D4 | F0F0F1F5* | |
| 02E3E7E3 | 400002E8 | 40400038 | 40400001 | 33447A40 | D0D43C44 | 3A247020 |
| D16858F0 | D0F84110 | D05005EF | 7000D16C | 38207000 | D0C47800 | D16C7900 |
| D0AC47A0 | D3107800 | D1187000 | D0D07800 | D6D7E3D4 | F0F0F1F6* | |
| 02E3E7E3 | 40000320 | 40400038 | 40400001 | D1207000 | D0D85840 | D0981857 |
| 7020D0AC | 5800D080 | 5000D0B0 | 1A8A879A | D2A05040 | D0BC5050 | D0E058B0 |
| D1045890 | D0845880 | D1245820 | D0981A29 | D6D7E3D4 | F0F0F1F7* | |
| 02E3E7E3 | 40000358 | 40400038 | 40400001 | 5020D098 | 5800D13C | 1A0A5000 |
| D13C5800 | D1381A0A | 5000D138 | 5920D0C0 | 47C0D268 | 58A0D0FC | 58B0D104 |
| 5890D084 | 5880D144 | 7800D0D0 | 7000D0CC | D6D7E3D4 | F0F0F1F8* | |
| 02E3E7E3 | 40000390 | 40400038 | 40400001 | 7800D0D8 | 7000D0D4 | 5800D0B0 |
| 1BFF870F | D4121878 | 5C60D0BC | 18275A20 | D1405852 | B0001837 | 1A385803 |
| B0005000 | D0B81C48 | 18355A30 | D1404103 | D6D7E3D4 | F0F0F1F9* | |

| | | | | | | |
|---|---|---|---|---|---|---|
| 02E3E7E3 | 400003C8 | 40400038 | 40400001 | A0005000 | D05458F0 | D1104110 |

MEMBER NAME OPTMZE

| | | | | | | |
|---|---|---|---|---|---|---|
| D05405EF | 4100D0F0 | 5000D064 | 58E0D148 | 410EB000 | 5000D068 | 9280D068 |
| 58F0D10C | 4110D060 | 05EF58E0 | D148410E | D6D7E3D4 | F0F0F2F0** | |
| 02E3E7E3 | 40000400 | 40400038 | 40400001 | B0005000 | D0644102 | B0005000 |
| D0689280 | D06858F0 | D10C4110 | D06005EF | 4102B000 | 5000D064 | 4100D0F0 |
| 5000D068 | 9280D068 | 58F0D10C | 4110D060 | D6D7E3D4 | F0F0F2F1* | |
| 02E3E7E3 | 40000438 | 40400038 | 40400001 | 05EF5800 | D1345A00 | D08C5000 |
| D1345800 | D1485A00 | D08C5000 | D1485820 | D0A01A29 | 5020D0A0 | 5920D0A4 |
| 47C0D1DC | 5880D104 | 58B0D0FC | 58A0D08C | D6D7E3D4 | F0F0F2F2* | |
| 02E3E7E3 | 40000470 | 40400038 | 40400001 | 5890D084 | 5850D078 | 5050D0B0 |
| 5800D124 | 5000D150 | 50A0D154 | 58E0D164 | 583E8000 | 5030D0A8 | 18731C6A |
| 5820D124 | 1A277820 | D0CC7B22 | B0003C22 | D6D7E3D4 | F0F0F2F3* | |
| 02E3E7E3 | 400004A8 | 40400038 | 40400001 | 182A1A27 | 7840D0D4 | 7B42B000 |
| 3C443A24 | 7020D168 | 58F0D0F8 | 4110D06C | 05EF7000 | D0AC5090 | D0E01843 |
| 1A4958E0 | D15C582E | 80005020 | D1581A32 | D6D7E3D4 | F0F0F2F4* | |
| 02E3E7E3 | 400004E0 | 40400038 | 40400001 | 1B391C2A | 18141C0A | 5010D114 |
| 18615A60 | D1241845 | 5850D0E0 | 18791886 | 5890D114 | 18B35860 | D0FC5A70 |
| D0847820 | D0CC7B28 | 60003C22 | 18391A3A | D6D7E3D4 | F0F0F2F5* | |
| 02E3E7E3 | 40000518 | 40400038 | 40400001 | 7840D0D4 | 7B436000 | 3C443A24 |
| 7020D168 | 58F0D0F8 | 4110D070 | 05EF7000 | D16C3820 | 7000D0C4 | 7800D16C |
| 7900D0AC | 47A0D52A | 18577020 | D0AC5840 | D6D7E3D4 | F0F0F2F6* | |
| 02E3E7E3 | 40000550 | 40400038 | 40400001 | D0801A8A | 879AD4DE | 5040D0B0 |
| 5050D0E0 | 5880D104 | 58B0D0FC | 5890D084 | 5800D0B0 | 1BFF860F | D5561BFF |
| 58E0D000 | 07FE5800 | D1585000 | D0B85850 | D6D7E3D4 | F0F0F2F7* | |
| 02E3E7E3 | 40000588 | 40400038 | 40400001 | D0A85C40 | D1545820 | D1501A25 |
| 4102B000 | 5000D054 | 58F0D110 | 4110D054 | 05EF1BFF | 58E0D000 | 07FE58D0 |
| D00458E0 | D00C92FF | D00C982C | D01C07FE | D6D7E3D4 | F0F0F2F8* | |
| 02E3E7E3 | 400005C0 | 40400038 | 40400001 | 98791004 | 58207000 | 5020D0E4 |
| 58209000 | 5020D0C0 | 58201000 | 41302000 | 41500004 | 1B255C40 | D0881B25 |
| 5020D0FC | 5030D100 | 58201008 | 41302000 | D6D7E3D4 | F0F0F2F9* | |
| 02E3E7E3 | 400005F8 | 40400018 | 40400001 | 41500004 | 1B255C40 | D0881B25 |
| 5020D104 | 5030D108 | 47F0D170 | 40404040 | 40404040 | 40404040 | 40404040 |
| 40404040 | 40404040 | 40404040 | 40404040 | D6D7E3D4 | F0F0F3F0** | |
| 02E3E7E3 | 40000020 | 4040000C | 40400001 | 000005C0 | 00000028 | 000005AE |
| 40404040 | 40404040 | 40404040 | 40404040 | 40404040 | 40404040 | 40404040 |
| 40404040 | 40404040 | 40404040 | 40404040 | D6D7E3D4 | F0F0F3F1* | |
| 02E3E7E3 | 40000074 | 40400008 | 40400001 | 80000190 | 80000190 | 40404040 |
| 40404040 | 40404040 | 40404040 | 40404040 | 40404040 | 40404040 | 40404040 |
| 40404040 | 40404040 | 40404040 | 40404040 | D6D7E3D4 | F0F0F3F2* | |
| 02D9D3C4 | 40404040 | 40400038 | 40404040 | 00020001 | 1C000120 | 00030001 |
| 1C000134 | 00040001 | 1C000138 | 00010001 | 0C000020 | 00010001 | 0C000024 |
| 00010001 | 0C000028 | 00010001 | 0C000074 | D6D7E3D4 | F0F0F3F3* | |
| 02E3E7E3 | 40000080 | 4040000C | 40400001 | 000000E0 | 80000108 | 000000B4 |
| 40404040 | 40404040 | 40404040 | 40404040 | 40404040 | 40404040 | 40404040 |
| 40404040 | 40404040 | 40404040 | 40404040 | D6D7E3D4 | F0F0F3F4* | |
| 02E3E7E3 | 40000090 | 4040000C | 40400001 | 80000000 | 80000190 | 80000190 |
| 40404040 | 40404040 | 40404040 | 40404040 | 40404040 | 40404040 | 40404040 |
| 40404040 | 40404040 | 40404040 | 40404040 | D6D7E3D4 | F0F0F3F5* | |
| 02E3E7E3 | 4000013C | 40400038 | 40400001 | 00000000 | 00000000 | 00000000 |
| 00000000 | 00000004 | 00000000 | 00000000 | 00000000 | 00000000 | 00000000 |
| 00000000 | 00000000 | 00000000 | 00000000 | D6D7E3D4 | F0F0F3F6* | |
| 02E3E7E3 | 40000174 | 40400024 | 40400001 | 00000000 | 00000000 | 00000000 |
| 00000000 | 00000010 | 00000014 | 0000000C | 0090000A | 0000000A | 40404040 |
| 40404040 | 40404040 | 40404040 | 40404040 | D6D7E3D4 | F0F0F3F7* | |
| 02D9D3C4 | 40404040 | 40400030 | 40404040 | 00010001 | 0C000078 | 00010001 |
| 0C000080 | 00010001 | 0C000084 | 00010001 | 0C000088 | 00010001 | 0C000094 |
| 00010001 | 0C000098 | 40404040 | 40404040 | D6D7E3D4 | F0F0F3F8* | |

```
02C5D5C4  40404040  40404040  40404040  40404040  40404040  40404040
00000610  F1F5F7F3  F460C6D6  F34040F0  F2F0F2F8  F7F0F9F8  40F0F84B

MEMBER NAME  OPTMZE
F4F14BF0  F9404040  D6D7E3D4  E9C54040  D6D7E3D4  F0F0F3F9**

MEMBER NAME  ONOFF
02C5E2C4  40404040  40400010  40400001  D6D5D6C6  C6404040  00000000
40000000  40404040  40404040  40404040  40404040  40404040  40404040
40404040  40404040  40404040  40404040  D6D5D6C6  F0F0F0F1*
02E3E7E3  40000000  40400038  40400001  47F0F00C  07D6D5D6  C6C64040
90ECD00C  184D98CD  F0205040  D00450D0  400807FC  40404040  40404040
021A2840  40C5D9D9  D6D940C9  D540D7D9  D6D5D6C6  F0F0F0F2*
02E3E7E3  40000038  40400038  40400001  D6D6E340  C2C3E2D3  C9C240D9
D6E4E3C9  D5C54B40  C3D6D5E5  407E400A  0C062202  1A2A4040  40404040
404040D5  E4D4C2C5  D940D6C6  40C4C5C7  D6D5D6C6  F0F0F0F3*
02E3E7E3  40000070  40400038  40400001  D9C5C540  C6D6D940  D7D6D3E8
D5D6D4C9  C1D34040  10031E1A  26404040  40404040  40404040  4040D6E4
E3D7E4E3  40C6D9D6  D440D7D9  D6D6E340  D6D5D6C6  F0F0F0F4*
02E3E7E3  400000A8  40400021  40400001  C6D6D3D3  D6E6E222  021A1040
404040C1  6BE46BE5  6BC3D6D5  E5404006  040A0C06  22404040  40404040
40404040  40404040  40404040  40404040  D6D5D6C6  F0F0F0F5*
02E3E7E3  40000190  40400038  40400001  00000000  00000000  3D68DB8B
AC710CB3  40199999  9999999A  41100000  00000000  41200000  00000000
41300000  00000000  41400000  00000000  D6D5D6C6  F0F0F0F6*
02E3E7E3  400001C8  40400038  40400001  41500000  00000000  41600000
00000000  3F28F5C3  00000000  00000000  00000001  00000002  00000003
00000004  00000005  00000006  00000007  D6D5D6C6  F0F0F0F7*
02C5E2C4  40404040  40400010  40400002  E3D6D3C5  D9404040  05000000
4000000C  40404040  40404040  40404040  40404040  40404040  40404040
40404040  40404040  40404040  40404040  D6D5D6C6  F0F0F0F8*
02E3E7E3  40000200  40400014  40400001  3F28F5C3  41100000  41200000
00000000  00000000  40404040  40404040  40404040  40404040  40404040
40404040  40404040  40404040  40404040  D6D5D6C6  F0F0F0F9*
02C5E2C4  40404040  40400010  40400003  D7D9D6D6  E3404040  02000000
40000000  40404040  40404040  40404040  40404040  40404040  40404040
40404040  40404040  40404040  40404040  D6D5D6C6  F0F0F1F0**
02C5E2C4  40404040  40400010  40400004  E4D5C9E3  C4404040  02000000
40000000  40404040  40404040  40404040  40404040  40404040  40404040
40404040  40404040  40404040  40404040  D6D5D6C6  F0F0F1F1*
02C5E2C4  40404040  40400010  40400005  C9C2C3D6  D47B4040  02000000
40000000  40404040  40404040  40404040  40404040  40404040  40404040
40404040  40404040  40404040  40404040  D6D5D6C6  F0F0F1F2*
02C5E2C4  40404040  40400010  40400006  E2D7C3D6  C5C44040  02000000
40000000  40404040  40404040  40404040  40404040  40404040  40404040
40404040  40404040  40404040  40404040  D6D5D6C6  F0F0F1F3*
02E3E7E3  40000458  40400014  40400001  00000000  00000000  00000000
00000000  00000000  40404040  40404040  40404040  40404040  40404040
40404040  40404040  40404040  40404040  D6D5D6C6  F0F0F1F4*
02E3E7E3  400004B0  40400038  40400001  5860D3C8  5850D128  5840D124
6800D0C8  6000D1E0  2B007800  D1946000  D1E82B00  7800D198  6000D1F0
2B007800  D1486000  D2002B00  7800D150  D6D5D6C6  F0F0F1F5*
02E3E7E3  400004E8  40400038  40400001  6000D210  2B007800  D1586000
D2282B00  7800D160  6000D238  2B007800  D1686000  D2682B00  7800D14C
6000D208  2B007800  D1546000  D2182B00  D6D5D6C6  F0F0F1F6*
02E3E7E3  40000520  40400038  40400001  7800D15C  6000D230  2B007800
D1646000  D2402B00  7800D18C  6000D260  58F0D398  4110D04C  05EF58F0
D3984110  D07005EF  6820D1A0  2C226840  D6D5D6C6  F0F0F1F7*
02E3E7E3  40000558  40400038  40400001  D1A82C44  2A246C20  D1006020
```

```
D2986820  D1A06C20  D1B06840  D1A86C40  D1B82A24  6C20D0E0  6C20D0F8
6020D290  6820D1A0  6C20D1C0  6840D1A8  D6D5D6C6  F0F0F1F8*
02E3E7E3  40000590  40400038  40400001  6C40D1C8  2A246C20  D0E06840
D1B02C44  2A246840  D1B82C44  2A246C20  D0F06020  D2886820  D1A06C20
D1D06840  D1A86C40  D1D82A24  6840D1E8  D6D5D6C6  F0F0F1F9*
02E3E7E3  400005C8  40400038  40400001  6C40D1A0  6860D1F0  6C60D1A8

MEMBER NAME  ONOFF
2A462B24  6840D1B0  6C40D1C0  2A246840  D1B86C40  D1C82A24  6C20D0E0
6C20D0E8  6020D280  6820D1B0  6C20D1D0  D6D5D6C6  F0F0F2F0**
02E3E7E3  40000600  40400038  40400001  6840D1B8  6C40D1D8  2A246840
D1E86C40  D1B06860  D1F06C60  D1B82A46  2B246C20  D0E06840  D1C02C44
2A246840  D1C82C44  2A246C20  D0E06020  D6D5D6C6  F0F0F2F1*
02E3E7E3  40000638  40400038  40400001  D2786820  D1C06C20  D1D06840
D1C86C40  D1D82A24  6840D1E8  6C40D1C0  6860D1F0  6C60D1C8  2A462B24
6C20D0E0  6C20D0D8  6020D270  7820D138  D6D5D6C6  F0F0F2F2*
02E3E7E3  40000670  40400038  40400001  33222B00  38022820  6020D3D0
6800D0E8  6C00D1A0  6000D3A8  6800D0E0  6C00D1B0  6000D3B0  6800D0E8
6C00D1A8  6000D3B8  6800D0E0  6C00D1B8  D6D5D6C6  F0F0F2F3*
02E3E7E3  400006A8  40400038  40400001  6000D3C0  58A0D114  18245040
D16C6800  D1E06900  D1084750  D5F647F0  D7885870  D12C1882  189A18B5
6840D1E0  18271B29  89200003  6862D268  D6D5D6C6  F0F0F2F4*
02E3E7E3  400006E0  40400038  40400001  20662964  47C0D620  5080D16C
47F0D62A  1B8A879A  D6045080  D16C58F0  D38C4110  D09405EF  6800D1F8
220047A0  D64E6800  D1F86900  D3D04750  D6D5D6C6  F0F0F2F5*
02E3E7E3  40000718  40400038  40400001  D64E47F0  D7926800  D0C06000
D258182A  50A0D144  18361876  18831892  58B0D16C  6848D328  6040D3A0
224447C0  D7606940  D0D847A0  D7602824  D6D5D6C6  F0F0F2F6*
02E3E7E3  40000750  40400038  40400001  2C242862  2C646060  D3D86C60
D1A02802  6C00D1B0  2A602804  6C00D1C0  2A066A00  D1D07000  D1746860
D3D86C60  D1A82802  6C00D1B8  2A602804  D6D5D6C6  F0F0F2F7*
02E3E7E3  40000788  40400038  40400001  6C00D1C8  2A606A60  D1D87060
D1782862  6C60D3A8  28046C00  D3B02A60  6A60D1C0  6060D248  6C20D3B8
6C40D3C0  2A246A20  D1C86020  D25058F0  D6D5D6C6  F0F0F2F8*
02E3E7E3  400007C0  40400038  40400001  D3904110  D0B405EF  6820D250
6C20D260  2B447840  D1742B42  6860D248  6C60D260  2B227820  D1782A26
7B40D194  30447B20  D1983022  7020D188  D6D5D6C6  F0F0F2F9*
02E3E7E3  400007F8  40400038  40400001  58F0D388  7940F004  4730D760
58F0D388  7920F004  4730D760  5090D144  5820D144  89200003  6802D328
6C00D0D8  7000D190  1BFF58E0  D00007FE  D6D5D6C6  F0F0F3F0**
02E3E7E3  40000830  40400038  40400001  1A87879A  D6685090  D1446800
D1F82200  4750D778  47F0D788  6800D1E0  6D00D0D0  6000D1E0  47F0D5E0
41F00004  58E0D000  07FE58F0  D3941800  D6D5D6C6  F0F0F3F1*
02E3E7E3  40000868  40400038  40400001  45E0F004  00000006  00000028
45E0F008  0860D1F8  45E0F010  58F0D394  45E0F004  00000006  00000057
45E0F008  0450D16C  45E0F010  188618A6  D6D5D6C6  F0F0F3F2*
02E3E7E3  400008A0  40400014  40400001  58B0D3CC  58F0D394  45E0F004
00000006  000000B0  40404040  40404040  40404040  40404040  40404040
40404040  40404040  40404040  40404040  D6D5D6C6  F0F0F3F3*
02D9D3C4  40404040  40400038  40404040  00020001  0C000458  00030001
1C00045C  00040001  1C000460  00050001  1C000464  00060001  1C000468
00010001  0C000870  00010001  0C00088C  D6D5D6C6  F0F0F3F4*
02E3E7E3  400008B4  40400038  40400001  45E0F008  0868D268  45E0F008
0868D328  45E0F008  0868D350  45E0F008  0860D1F8  45E0F010  878AD7D4
41F00004  58E0D000  07FE58A0  D00458E0  D6D5D6C6  F0F0F3F5*
02E3E7E3  400008EC  40400038  40400001  A00C58B0  A0185810  B0007820
D1947020  10005820  B0047840  D1987040  20005830  B0087860  D1487060
30005840  B00C7800  D14C7000  40005850  D6D5D6C6  F0F0F3F6*
02E3E7E3  40000924  40400038  40400001  B0107820  D1507020  50005860
```

B0147840 D1547040 60005870 B0187860 D1587060 70005880 B01C7800
D15C7000 80005890 B0207820 D1607020 D6D5D6C6 F0F0F3F7*
02E3E7E3 4000095C 40400038 40400001 90005810 B0247840 D1647040
10005820 B0287860 D1687060 20005830 B02C7800 D1907000 30005840
B0307820 D18C7020 400018DA 92FFA00C D6D5D6C6 F0F0F3F8*
02E3E7E3 40000994 40400038 40400001 982CA01C 07FE987B 10007820
70007020 D1947820 80007020 D1987820 90007020 D1487820 A0007020

MEMBER NAME ONOFF
D14C7820 B0007020 D150987B 10147820 D6D5D6C6 F0F0F3F9*
02E3E7E3 400009CC 40400038 40400001 70007020 D1547820 80007020
D1587820 90007020 D15C7820 A0007020 D1607820 B0007020 D1649879
10287820 70007020 D1687820 80007020 D6D5D6C6 F0F0F4F0**
02E3E7E3 40000A04 4040000E 40400001 D1907820 90007020 D18C47F0
D3E04040 40404040 40404040 40404040 40404040 40404040 40404040
40404040 40404040 40404040 40404040 D6D5D6C6 F0F0F4F1*
02E3E7E3 40000020 40400008 40400001 0000099A 000000D0 40404040
40404040 40404040 40404040 40404040 40404040 40404040 40404040
40404040 40404040 40404040 40404040 D6D5D6C6 F0F0F4F2*
02E3E7E3 400000D0 40400004 40400001 000008E6 40404040 40404040
40404040 40404040 40404040 40404040 40404040 40404040 40404040
40404040 40404040 40404040 40404040 D6D5D6C6 F0F0F4F3*
02E3E7E3 4000011C 40400010 40400001 000002D0 000002E0 000002F8
00000308 40404040 40404040 40404040 40404040 40404040 40404040
40404040 40404040 40404040 40404040 D6D5D6C6 F0F0F4F4*
02D9D3C4 40404040 40400038 40404040 00010001 0C0008B0 00010001
0C000020 00010001 0C000024 00010001 0C0000D0 00010001 0C00011C
00010001 0C000120 00010001 0C000124 D6D5D6C6 F0F0F4F5*
02E3E7E3 4000012C 4040001C 40400001 00000338 00000270 00000280
00000290 800002A0 000002D8 000002E8 40404040 40404040 40404040
40404040 40404040 40404040 40404040 D6D5D6C6 F0F0F4F6*
02D9D3C4 40404040 40400038 40404040 00010001 0C000128 00010001
0C00012C 00010001 0C000130 00010001 0C000134 00010001 0C000138
00010001 0C00013C 00010001 0C000140 D6D5D6C6 F0F0F4F7*
02E3E7E3 40000148 4040001C 40400001 00000300 00000310 00000338
00000278 00000288 00000298 800002A8 40404040 40404040 40404040
40404040 40404040 40404040 40404040 D6D5D6C6 F0F0F4F8*
02D9D3C4 40404040 40400038 40404040 00010001 0C000144 00010001
0C000148 00010001 0C00014C 00010001 0C000150 00010001 0C000154
00010001 0C000158 00010001 0C00015C D6D5D6C6 F0F0F4F9*
02E3E7E3 40000164 4040001C 40400001 0000023C 00000340 00000400
00000428 000003D0 00000370 000003A0 40404040 40404040 40404040
40404040 40404040 40404040 40404040 D6D5D6C6 F0F0F5F0**
02D9D3C4 40404040 40400038 40404040 00010001 0C000160 00010001
0C000164 00010001 0C000168 00010001 0C00016C 00010001 0C000170
00010001 0C000174 00010001 0C000178 D6D5D6C6 F0F0F5F1*
02E3E7E3 40000180 40400010 40400001 800002C8 00000318 00000320
80000328 40404040 40404040 40404040 40404040 40404040 40404040
40404040 40404040 40404040 40404040 D6D5D6C6 F0F0F5F2*
02E3E7E3 4000046C 40400038 40400001 00000000 00000000 00000000
00000000 00000000 00000000 00000000 00000000 00000000 00000000
00000000 00000008 00000030 00000000 D6D5D6C6 F0F0F5F3*
02E3E7E3 400004A4 4040000C 40400001 00000000 00000000 00000000
40404040 40404040 40404040 40404040 40404040 40404040 40404040
40404040 40404040 40404040 40404040 D6D5D6C6 F0F0F5F4*
02D9D3C4 40404040 40400028 40404040 00010001 0C00017C 00010001
0C000180 00010001 0C000184 00010001 0C000188 00010001 0C00018C
40404040 40404040 40404040 40404040 D6D5D6C6 F0F0F5F5*
02C5D5C4 40404040 40404040 40404040 40404040 40404040 40404040

```
00000A12  F1F5F7F3  F460C6D6  F34040F0  F2F0F2F8  F7F0F9F8  40F0F84B
F4F14BF1  F3404040  D6D5D6C6  C6404040  D6D5D6C6  F0F0F5F6**

MEMBER NAME  ORDER
02C5E2C4  40404040  40400010  40400001  D6D9C4C5  D9404040  00000000
40000000  40404040  40404040  40404040  40404040  40404040  40404040
40404040  40404040  40404040  40404040  D6D9C4C5  F0F0F0F1*
02E3E7E3  40000000  40400028  40400001  47F0F00C  07D6D9C4  C5D94040
90ECD00C  184D98CD  F0205040  D00450D0  400807FC  40404040  40404040
40404040  40404040  40404040  40404040  D6D9C4C5  F0F0F0F2*
02E3E7E3  400000A8  40400014  40400001  00000001  00000002  00000008
00000000  00000000  40404040  40404040  40404040  40404040  40404040
40404040  40404040  40404040  40404040  D6D9C4C5  F0F0F0F3*
02C5E2C4  40404040  40400010  40400002  D4E5C3C8  D9404040  02000000
40000000  40404040  40404040  40404040  40404040  40404040  40404040
40404040  40404040  40404040  40404040  D6D9C4C5  F0F0F0F4*
02E3E7E3  40003F60  40400004  40400001  00000000  40404040  40404040
40404040  40404040  40404040  40404040  40404040  40404040  40404040
40404040  40404040  40404040  40404040  D6D9C4C5  F0F0F0F5*
02C5E2C4  40404040  40400010  40400003  D4E5C3C8  D9D34040  02000000
40000000  40404040  40404040  40404040  40404040  40404040  40404040
40404040  40404040  40404040  40404040  D6D9C4C5  F0F0F0F6*
02E3E7E3  40003F68  40400008  40400001  00000000  00000000  40404040
40404040  40404040  40404040  40404040  40404040  40404040  40404040
40404040  40404040  40404040  40404040  D6D9C4C5  F0F0F0F7*
02E3E7E3  40003F80  40400038  40400001  58B0C000  58A0C014  5890D080
5880D084  5860C01C  5830C010  5800D09C  5900D098  4770C048  5090D09C
5990D09C  4770C058  1BFF58E0  D00007FE  D6D9C4C5  F0F0F0F8*
02E3E7E3  40003FB8  40400038  40400001  5980D09C  4770C0BE  5820D098
1B298920  00035020  D0A0410A  B0005000  D0504106  B0005000  D0549280
D05458F0  C00C4110  D04C05EF  5850D098  D6D9C4C5  F0F0F0F9*
02E3E7E3  40003FF0  40400038  40400001  5C40D088  18231A25  4102B000
5000D05C  410AB000  5000D060  9280D060  58F0C008  4110D058  05EF1BFF
58E0D000  07FE5820  D09C1B28  89200003  D6D9C4C5  F0F0F1F0**
02E3E7E3  40004028  40400038  40400001  5020D0A4  4100D0B0  5000D068
4106B000  5000D06C  9280D06C  58F0C00C  4110D064  05EF5820  D0985B20
D09C1A29  89200003  5020D0A8  5850D09C  D6D9C4C5  F0F0F1F1*
02E3E7E3  40004060  40400038  40400001  5C40D088  18231A25  410AB000
5000D074  4102B000  5000D078  9280D078  58F0C00C  4110D070  05EF5850
D0985B50  D09C1875  1A781857  5C40D088  D6D9C4C5  F0F0F1F2*
02E3E7E3  40004098  40400038  40400001  18231A25  4102B000  5000D068
4100D0B0  5000D06C  9280D06C  58F0C00C  4110D064  05EF5850  D0985C40
D0881823  1A254102  B0005000  D05C410A  D6D9C4C5  F0F0F1F3*
02E3E7E3  400040D0  40400038  40400001  B0005000  D0609280  D06058F0
C0084110  D05805EF  1BFF58E0  D00007FE  58A0D004  58E0A00C  58B0A018
5810B004  5820D098  50201000  5830B008  D6D9C4C5  F0F0F1F4*
02E3E7E3  40004108  40400038  40400001  5840D09C  50403000  18DA92FF
A00C982C  A01C07FE  58C0D048  98781004  58207000  5020D098  58208000
5020D09C  58201000  41302000  41500004  D6D9C4C5  F0F0F1F5*
02E3E7E3  40004140  40400014  40400001  1B255C40  D0841B25  5020C000
5030C004  47F0C020  40404040  40404040  40404040  40404040  40404040
40404040  40404040  40404040  40404040  D6D9C4C5  F0F0F1F6*
02E3E7E3  40000020  4040000C  40400001  0000411C  00000028  000040EC
40404040  40404040  40404040  40404040  40404040  40404040  40404040
40404040  40404040  40404040  40404040  D6D9C4C5  F0F0F1F7*
02E3E7E3  40000070  40400008  40400001  00003F60  000000C8  40404040
40404040  40404040  40404040  40404040  40404040  40404040  40404040
40404040  40404040  40404040  40404040  D6D9C4C5  F0F0F1F8*
02E3E7E3  4000007C  40400008  40400001  80000000  000000B0  40404040
```

```
40404040  40404040  40404040  40404040  40404040  40404040  40404040
40404040  40404040  40404040  40404040  D6D9C4C5  F0F0F1F9*
02D9D3C4  40404040  40400038  40404040  00020001  1C003F68  00030001

MEMBER NAME  ORDER
1C003F6C  00010001  0C000020  00010001  0C000024  00010001  0C000028
00010001  0C000070  00010001  0C000074  D6D9C4C5  F0F0F2F0**
02E3E7E3  40000088  40400008  40400001  80000000  000000CC  40404040
40404040  40404040  40404040  40404040  40404040  40404040  40404040
40404040  40404040  40404040  40404040  D6D9C4C5  F0F0F2F1*
02E3E7E3  40000094  40400008  40400001  80000000  000000D0  40404040
40404040  40404040  40404040  40404040  40404040  40404040  40404040
40404040  40404040  40404040  40404040  D6D9C4C5  F0F0F2F2*
02E3E7E3  400000A0  40400004  40400001  80000000  40404040  40404040
40404040  40404040  40404040  40404040  40404040  40404040  40404040
40404040  40404040  40404040  40404040  D6D9C4C5  F0F0F2F3*
02E3E7E3  40003F70  40400010  40400001  00000004  0000000C  00000010
00000014  40404040  40404040  40404040  40404040  40404040  40404040
40404040  40404040  40404040  40404040  D6D9C4C5  F0F0F2F4*
02D9D3C4  40404040  40400018  40404040  00010001  0C000080  00010001
0C00008C  00010001  0C000098  40404040  40404040  40404040  40404040
40404040  40404040  40404040  40404040  D6D9C4C5  F0F0F2F5*
02C5D5C4  40404040  40404040  40404040  40404040  40404040  40404040
00004154  F1F5F7F3  F460C6D6  F34040F0  F2F0F2F8  F7F0F9F8  40F0F84B
F4F14BF1  F8404040  D6D9C4C5  D9404040  D6D9C4C5  F0F0F2F6**

MEMBER NAME  OVRLAP
02C5E2C4  40404040  40400010  40400001  D6E5D9D3  C1D74040  00000000
40000000  40404040  40404040  40404040  40404040  40404040  40404040
40404040  40404040  40404040  40404040  D6E5D9D3  F0F0F0F1*
02E3E7E3  40000000  40400028  40400001  47F0F00C  07D6E5D9  D3C1D740
90ECD00C  184D98CD  F0205040  D00450D0  400807FC  40404040  40404040
40404040  40404040  40404040  40404040  D6E5D9D3  F0F0F0F2*
02E3E7E3  400000C8  40400038  40400001  00000000  00000000  4F080000
00000000  00000000  00000001  00000002  00000003  00000004  0000000C
41100000  41200000  41300000  41400000  D6E5D9D3  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  D6E5D9D3  F0F0F0F4*
02E3E7E3  40000100  40400008  40400001  00000000  00000000  40404040
40404040  40404040  40404040  40404040  40404040  40404040  40404040
40404040  40404040  40404040  40404040  D6E5D9D3  F0F0F0F5*
02C5E2C4  40404040  40400010  40400003  E2D8D9E3  40404040  02000000
40000000  40404040  40404040  40404040  40404040  40404040  40404040
40404040  40404040  40404040  40404040  D6E5D9D3  F0F0F0F6*
02C5E2C4  40404040  40400010  40400004  C2E2D6D9  E3404040  02000000
40000000  40404040  40404040  40404040  40404040  40404040  40404040
40404040  40404040  40404040  40404040  D6E5D9D3  F0F0F0F7*
02E3E7E3  400001F0  4040000C  40400001  00000000  00000000  00000000
40404040  40404040  40404040  40404040  40404040  40404040  40404040
40404040  40404040  40404040  40404040  D6E5D9D3  F0F0F0F8*
02E3E7E3  4000017C  40400038  40400001  00000005  00000004  C6D34040
C1404040  00000009  00000004  C6D34040  C1404040  00000005  00000004
C6D34040  C1404040  00000009  00000004  D6E5D9D3  F0F0F0F9*
02E3E7E3  400001B4  40400008  40400001  C6D34040  C1404040  40404040
40404040  40404040  40404040  40404040  40404040  40404040  40404040
40404040  40404040  40404040  40404040  D6E5D9D3  F0F0F1F0**
02E3E7E3  4000021C  40400038  40400001  5870D0D8  7800D0B0  7000D144
7860D0FC  7B60D100  7060D0E0  7840D0F0  7B40D0EC  7040D0E4  7820D0EC
```

```
7C20D100  7800D0F0  7C00D0FC  3B207020  D6E5D9D3  F0F0F1F1*
02E3E7E3  40000254  40400038  40400001  D0E87C60  D0F43804  7C00D104
3A603A62  30667060  D1E47820  D0E03C22  3C443A24  7020D1E8  58F0D1CC
4110D04C  05EF7000  D1EC7800  D1E47D00  D6E5D9D3  F0F0F1F2*
02E3E7E3  4000028C  40400038  40400001  D1EC7000  D12C7820  D0E07C20
D0F87840  D0E47C40  D1083A24  7A20D0E8  30227D20  D1EC7020  D1307860
D1047B60  D1087060  D0E07840  D0F87B40  D6E5D9D3  F0F0F1F3*
02E3E7E3  400002C4  40400038  40400001  D0F47040  D0E47820  D0F47C20
D1087800  D0F87C00  D1043B20  7020D0E8  7C60D0EC  38047C00  D0FC3A60
3A623066  7060D1E4  7820D0E0  3C223C44  D6E5D9D3  F0F0F1F4*
02E3E7E3  400002FC  40400038  40400001  3A247020  D1E858F0  D1CC4110
D05405EF  7000D1EC  7840D1E4  3D407820  D0E07C20  D0F07860  D0E47C60
D1003A26  7A20D0E8  30227D20  D1EC7800  D6E5D9D3  F0F0F1F5*
02E3E7E3  40000334  40400038  40400001  D12C58F0  D1C87900  F0044120
00014720  D3201B22  14227940  F0044130  00014720  D3301B33  14327920
F0044120  00014720  D3401B22  14238727  D6E5D9D3  F0F0F1F6*
02E3E7E3  4000036C  40400038  40400001  D34E1BFF  58E0D000  07FE7800
D0C87000  D1947800  D0EC7000  D1987800  D0FC7000  D19C7800  D0CC7000
D1A07800  D0F07000  D1A47800  D1007000  D6E5D9D3  F0F0F1F7*
02E3E7E3  400003A4  40400038  40400001  D1A87800  D0D07000  D1AC7800
D0F47000  D1B07800  D1047000  D1B47800  D0D47000  D1B87800  D0F87000
D1BC7800  D1087000  D1C058F0  D1D04110  D6E5D9D3  F0F0F1F8*
02E3E7E3  400003DC  40400038  40400001  D05C05EF  7820D0EC  7B20D0F0
30227840  D0FC7B40  D1003044  7040D14C  58F0D1C8  7920F004  47A0D3E6
58F0D1D0  4110D070  05EF7800  D14C58F0  D6E5D9D3  F0F0F1F9*
02E3E7E3  40000414  40400038  40400001  D1C87900  F00447A0  D40058F0

MEMBER NAME  OVRLAP
D1D04110  D08405EF  2B007800  D1946A00  D0A86000  D0A05890  D0A42B00
7800D1A0  6A00D0A8  6000D0A0  5880D0A4  D6E5D9D3  F0F0F2F0**
02E3E7E3  4000044C  40400038  40400001  2B007800  D1AC6A00  D0A86000
D0A058A0  D0A42B00  7800D1B8  6A00D0A8  6000D0A0  58B0D0A4  5990D0B4
41200001  4780D456  1B225990  D0B84130  D6E5D9D3  F0F0F2F1*
02E3E7E3  40000484  40400038  40400001  00014780  D4641B33  16235980
D0B44130  00014780  D4741B33  5980D0B8  41400001  4780D482  1B441634
14238727  D4921BFF  58E0D000  07FE59A0  D6E5D9D3  F0F0F2F2*
02E3E7E3  400004BC  40400038  40400001  D0B44120  00014780  D4A01B22
59A0D0B8  41300001  4780D4AE  1B331623  59B0D0B4  41300001  4780D4BE
1B3359B0  D0B84140  00014780  D4CC1B44  D6E5D9D3  F0F0F2F3*
02E3E7E3  400004F4  40400038  40400001  16341423  8727D4DC  1BFF58E0
D00007FE  7820D1A4  7020D1D4  7840D1B0  7040D1DC  3B247840  D1A87040
D1D87860  D1B47060  D1E03B46  3C223C44  D6E5D9D3  F0F0F2F4*
02E3E7E3  4000052C  40400038  40400001  3A247020  D1E458F0  D1CC4110
D09805EF  7000D1E8  7820D0EC  7B20D0F0  7840D0FC  7B40D100  3C223C44
3A247020  D1E458F0  D1CC4110  D09C05EF  D6E5D9D3  F0F0F2F5*
02E3E7E3  40000564  40400038  40400001  7000D1EC  7800D1E8  7D00D1EC
7000D144  7820D1E8  7B20D1EC  30227840  D0CC58F0  D1C87C40  F0043924
47A0D570  7800D0C8  7000D144  7800D1D4  D6E5D9D3  F0F0F2F6*
02E3E7E3  4000059C  40400038  40400001  7000D118  7800D1D8  7000D120
7800D1DC  7000D11C  7800D1E0  7000D124  1BFF58E0  D00007FE  58A0D004
58E0A00C  58B0A018  5810B000  7820D0EC  D6E5D9D3  F0F0F2F7*
02E3E7E3  400005D4  40400038  40400001  70201000  5820B004  7840D0FC
70402000  5830B008  7860D0F0  70603000  5840B00C  7800D100  70004000
5850B010  7820D0F4  70205000  5860B014  D6E5D9D3  F0F0F2F8*
02E3E7E3  4000060C  40400038  40400001  7840D104  70406000  5870B018
7860D0F8  70607000  5880B01C  7800D108  70008000  5890B020  7820D144
70209000  5810B024  7840D118  70401000  D6E5D9D3  F0F0F2F9*
02E3E7E3  40000644  40400038  40400001  5820B028  7860D120  70602000
5830B02C  7800D11C  70003000  5840B030  7820D124  70204000  18DA92FF
```

```
A00C982C  A01C07FE  987B1000  78207000  D6E5D9D3  F0F0F3F0**
02E3E7E3  4000067C  40400038  40400001  7020D0EC  78208000  7020D0FC
78209000  7020D0F0  7820A000  7020D100  7820B000  7020D0F4  987B1014
78207000  7020D104  78208000  7020D0F8  D6E5D9D3  F0F0F3F1*
02E3E7E3  400006B4  40400038  40400001  78209000  7020D108  7820A000
7020D144  7820B000  7020D118  98791028  78207000  7020D120  78208000
7020D11C  78209000  7020D124  47F0D1F4  D6E5D9D3  F0F0F3F2*
02E3E7E3  40000020  4040000C  40400001  00000674  00000028  000005C0
40404040  40404040  40404040  40404040  40404040  40404040  40404040
40404040  40404040  40404040  40404040  D6E5D9D3  F0F0F3F3*
02E3E7E3  40000074  4040000C  40400001  80000210  80000000  80000210
40404040  40404040  40404040  40404040  40404040  40404040  40404040
40404040  40404040  40404040  40404040  D6E5D9D3  F0F0F3F4*
02D9D3C4  40404040  40400038  40404040  00020001  0C0001F0  00030001
1C0001F4  00040001  1C0001F8  00010001  0C000020  00010001  0C000024
00010001  0C000028  00010001  0C000074  D6E5D9D3  F0F0F3F5*
02E3E7E3  40000080  40400020  40400001  80000000  0000017C  000000E0
000001BC  000000EC  800000E8  000001AC  000000DC  40404040  40404040
40404040  40404040  40404040  40404040  D6E5D9D3  F0F0F3F6*
02D9D3C4  40404040  40400038  40404040  00010001  0C00007C  00010001
0C000084  00010001  0C000088  00010001  0C00008C  00010001  0C000090
00010001  0C000094  00010001  0C000098  D6E5D9D3  F0F0F3F7*
02E3E7E3  400000A0  4040001C  40400001  000001BC  000000EC  800000E8
0000019C  000000DC  000001BC  000000EC  40404040  40404040  40404040
40404040  40404040  40404040  40404040  D6E5D9D3  F0F0F3F8*
02D9D3C4  40404040  40400038  40404040  00010001  0C00009C  00010001
0C0000A0  00010001  0C0000A4  00010001  0C0000A8  00010001  0C0000AC

MEMBER NAME  OVRLAP
00010001  0C0000B0  00010001  0C0000B4  D6E5D9D3  F0F0F3F9*
02E3E7E3  400000BC  4040000C  40400001  800000E8  8000020C  8000020C
40404040  40404040  40404040  40404040  40404040  40404040  40404040
40404040  40404040  40404040  40404040  D6E5D9D3  F0F0F4F0**
02E3E7E3  400001FC  40400020  40400001  00000000  00000000  00000000
00000000  00000000  00000000  00000000  00000000  40404040  40404040
40404040  40404040  40404040  40404040  D6E5D9D3  F0F0F4F1*
02D9D3C4  40404040  40400020  40404040  00010001  0C0000B8  00010001
0C0000BC  00010001  0C0000C0  00010001  0C0000C4  40404040  40404040
40404040  40404040  40404040  40404040  D6E5D9D3  F0F0F4F2*
02C5D5C4  40404040  40404040  40404040  40404040  40404040  40404040
000006EC  F1F5F7F3  F460C6D6  F34040F0  F2F0F2F8  F7F0F9F8  40F0F84B
F4F14BF2  F2404040  D6E5D9D3  C1D74040  D6E5D9D3  F0F0F4F3**

MEMBER NAME  PCHART
02C5E2C4  40404040  40400010  40400001  D7C3C8C1  D9E34040  00000000
40000000  40404040  40404040  40404040  40404040  40404040  40404040
40404040  40404040  40404040  40404040  D7C3C8C1  F0F0F0F1*
02E3E7E3  40000000  40400038  40400001  47F0F00C  07D7C3C8  C1D9E340
90ECD00C  184D98CD  F0205040  D00450D0  400807FC  40404040  40404040
021A19C4  C1E3C140  C3C1D4C5  40C6D9D6  D7C3C8C1  F0F0F0F2*
02E3E7E3  40000038  40400038  40400001  D440D4D6  C4C5D340  7E7E6E40
06141401  1A054040  D6D54006  0214041A  0440C1E3  40060214  0422021A
0DD7C9C5  D9C3C540  D7D6C9D5  E3401005  D7C3C8C1  F0F0F0F3*
02E3E7E3  40000070  40400038  40400001  1A074040  C4C1E2C8  40100418
0A220206  1E140122  021A0561  5CC5D6C6  22021A2F  4040C5D9  D9D6D940
C9D540C1  40C3C1C4  C1D440D9  D6E4E3C9  D7C3C8C1  F0F0F0F4*
02E3E7E3  400000A8  40400038  40400001  D5C540C9  D540D7C3  C8C1D9E3
40E2E4C2  D9D6E4E3  C9D5C522  021A0ED9  C5C6C9D3  C540C5D9  D9D6D97E
4010031A  0A40C9D5  40D7C3C8  C1D9E322  D7C3C8C1  F0F0F0F5*
```

```
02E3E7E3  400002F0  40400038  40400001  00000000  00000000  00000001
00000002  00000003  00000004  00000008  00000009  00000010  0000001E
00000049  00000058  0000005D  00000070  D7C3C8C1  F0F0F0F6*
02E3E7E3  40000328  40400038  40400001  00000080  00000098  00000BB8
401DF3B6  4029FBE7  4029FFD6  403EF9DB  40400000  41100000  41200000
41355C29  4145BE77  414F70A4  41555C29  D7C3C8C1  F0F0F0F7*
02E3E7E3  40000360  40400020  40400001  4159999A  418B3333  41C00000
41D40000  41F00000  42100000  00000000  00000000  40404040  40404040
40404040  40404040  40404040  40404040  D7C3C8C1  F0F0F0F8*
02C5E2C4  40404040  40400010  40400002  D9D4D6C4  C5D34040  05000000
40000018  40404040  40404040  40404040  40404040  40404040  40404040
40404040  40404040  40404040  40404040  D7C3C8C1  F0F0F0F9*
02C5E2C4  40404040  40400010  40400003  D6D7E3C9  D6D54040  05000000
40000020  40404040  40404040  40404040  40404040  40404040  40404040
40404040  40404040  40404040  40404040  D7C3C8C1  F0F0F1F0**
02C5E2C4  40404040  40400010  40400004  D7D4C1E3  D3404040  05000000
40001134  40404040  40404040  40404040  40404040  40404040  40404040
40404040  40404040  40404040  40404040  D7C3C8C1  F0F0F1F1*
02C5E2C4  40404040  40400010  40400005  C7D9E4D7  40404040  05000000
4000000C  40404040  40404040  40404040  40404040  40404040  40404040
40404040  40404040  40404040  40404040  D7C3C8C1  F0F0F1F2*
02C5E2C4  40404040  40400010  40400006  D4E2C9E9  C5404040  05000000
4000000C  40404040  40404040  40404040  40404040  40404040  40404040
40404040  40404040  40404040  40404040  D7C3C8C1  F0F0F1F3*
02C5E2C4  40404040  40400010  40400007  C1D9C3D6  E2404040  02000000
40000000  40404040  40404040  40404040  40404040  40404040  40404040
40404040  40404040  40404040  40404040  D7C3C8C1  F0F0F1F4*
02E3E7E3  40002A60  40400020  40400001  000029A0  FFFFFFFF  00000000
FFFFFFA0  00001130  00000000  00000000  00000000  40404040  40404040
40404040  40404040  40404040  40404040  D7C3C8C1  F0F0F1F5*
02D9D3C4  40404040  40400038  40404040  00010001  0C002A60  00020001
0C002A64  00030001  0C002A68  00040001  0C002A6C  00040001  0C002A70
00050001  0C002A74  00060001  0C002A78  D7C3C8C1  F0F0F1F6*
02C5E2C4  40404040  40400010  40400008  C3C1C4E2  E3404040  02000000
40000000  40404040  40404040  40404040  40404040  40404040  40404040
40404040  40404040  40404040  40404040  D7C3C8C1  F0F0F1F7*
02C5E2C4  40404040  40400010  40400009  C4C9E3E3  D6404040  02000000
40000000  40404040  40404040  40404040  40404040  40404040  40404040
40404040  40404040  40404040  40404040  D7C3C8C1  F0F0F1F8*
02C5E2C4  40404040  40400010  4040000A  D4E5C3C8  D9404040  02000000
40000000  40404040  40404040  40404040  40404040  40404040  40404040
40404040  40404040  40404040  40404040  D7C3C8C1  F0F0F1F9*
02C5E2C4  40404040  40400010  4040000B  C2C5C7C4  C5E34040  02000000

MEMBER NAME  PCHART
40000000  40404040  40404040  40404040  40404040  40404040  40404040
40404040  40404040  40404040  40404040  D7C3C8C1  F0F0F2F0**
02C5E2C4  40404040  40400010  4040000C  C3C1C4C6  C9D34040  02000000
40000000  40404040  40404040  40404040  40404040  40404040  40404040
40404040  40404040  40404040  40404040  D7C3C8C1  F0F0F2F1*
02C5E2C4  40404040  40400010  4040000D  C3C1C4D5  D7C44040  02000000
40000000  40404040  40404040  40404040  40404040  40404040  40404040
40404040  40404040  40404040  40404040  D7C3C8C1  F0F0F2F2*
02C5E2C4  40404040  40400010  4040000E  C3C1C4D5  E2C84040  02000000
40000000  40404040  40404040  40404040  40404040  40404040  40404040
40404040  40404040  40404040  40404040  D7C3C8C1  F0F0F2F3*
02E3E7E3  40002A80  4040001C  40400001  00000000  00000000  00000000
00000000  00000000  00000000  00000000  40404040  40404040  40404040
40404040  40404040  40404040  40404040  D7C3C8C1  F0F0F2F4*
```

```
02D9D3C4  40404040  40400038  40404040  00070001  1C002A7C  00080001
1C002A80  00090001  1C002A84  000A0001  1C002A88  000B0001  1C002A8C
000C0001  1C002A90  000D0001  1C002A94  D7C3C8C1  F0F0F2F5*
02C5E2C4  40404040  40400010  4040000F  C3C1C4E2  D7C34040  02000000
40000000  40404040  40404040  40404040  40404040  40404040  40404040
40404040  40404040  40404040  40404040  D7C3C8C1  F0F0F2F6*
02C5E2C4  40404040  40400010  40400010  C3C1C4E2  E4D74040  02000000
40000000  40404040  40404040  40404040  40404040  40404040  40404040
40404040  40404040  40404040  40404040  D7C3C8C1  F0F0F2F7*
02C5E2C4  40404040  40400010  40400011  C5D5C4C4  C5E34040  02000000
40000000  40404040  40404040  40404040  40404040  40404040  40404040
40404040  40404040  40404040  40404040  D7C3C8C1  F0F0F2F8*
02C5E2C4  40404040  40400010  40400012  C8C7C4C1  E3C54040  02000000
40000000  40404040  40404040  40404040  40404040  40404040  40404040
40404040  40404040  40404040  40404040  D7C3C8C1  F0F0F2F9*
02C5E2C4  40404040  40400010  40400013  C8C7E3C9  D4C54040  02000000
40000000  40404040  40404040  40404040  40404040  40404040  40404040
40404040  40404040  40404040  40404040  D7C3C8C1  F0F0F3F0**
02C5E2C4  40404040  40400010  40400014  C9C2C3D6  D47B4040  02000000
40000000  40404040  40404040  40404040  40404040  40404040  40404040
40404040  40404040  40404040  40404040  D7C3C8C1  F0F0F3F1*
02C5E2C4  40404040  40400010  40400015  C9C3D5E3  C5D94040  02000000
40000000  40404040  40404040  40404040  40404040  40404040  40404040
40404040  40404040  40404040  40404040  D7C3C8C1  F0F0F3F2*
02E3E7E3  40002A9C  4040001C  40400001  00000000  00000000  00000000
00000000  00000000  00000000  00000000  40404040  40404040  40404040
40404040  40404040  40404040  40404040  D7C3C8C1  F0F0F3F3*
02D9D3C4  40404040  40400038  40404040  000E0001  1C002A98  000F0001
1C002A9C  00100001  1C002AA0  00110001  1C002AA4  00120001  1C002AA8
00130001  1C002AAC  00140001  1C002AB0  D7C3C8C1  F0F0F3F4*
02C5E2C4  40404040  40400010  40400016  D4D6C4E2  D9E34040  02000000
40000000  40404040  40404040  40404040  40404040  40404040  40404040
40404040  40404040  40404040  40404040  D7C3C8C1  F0F0F3F5*
02C5E2C4  40404040  40400010  40400017  D7C3E3C7  C5E34040  02000000
40000000  40404040  40404040  40404040  40404040  40404040  40404040
40404040  40404040  40404040  40404040  D7C3C8C1  F0F0F3F6*
02C5E2C4  40404040  40400010  40400018  D7E2E3D9  C5E24040  02000000
40000000  40404040  40404040  40404040  40404040  40404040  40404040
40404040  40404040  40404040  40404040  D7C3C8C1  F0F0F3F7*
02E3E7E3  40002AB8  4040000C  40400001  00000000  00000000  00000000
40404040  40404040  40404040  40404040  40404040  40404040  40404040
40404040  40404040  40404040  40404040  D7C3C8C1  F0F0F3F8*
02E3E7E3  400029C0  40400038  40400001  C3D6D7E8  D9C9C7C8  E3404DC3
5D40F1F9  F8F640E3  C8C540C2  D6C5C9D5  C740C3D6  D4D7C1D5  E85BC1D3

MEMBER NAME  PCHART
D340D9C9  C7C8E3E2  40D9C5E2  C5D9E5C5  D7C3C8C1  F0F0F3F9*
02E3E7E3  400029F8  40400038  40400001  C45B5BE2  D3C9C340  E5C5D9E2
C9D6D540  E7E7E7E7  40404040  40404040  4040C4C1  E3C57A40  E7E761E7
E761E7E7  40404040  40E3C9D4  C57A40E7  D7C3C8C1  F0F0F4F0**
02E3E7E3  40002A30  40400028  40400001  E77AE7E7  7AE7E740  5B5BD7C9
C5D9C3C5  40C3C8C1  D9E3E240  D4D6C4C5  D3404040  40404040  40404040
40404040  40404040  40404040  40404040  D7C3C8C1  F0F0F4F1*
02E3E7E3  40002ACC  40400038  40400001  5880C004  58A0C014  58B0C000
5890D298  5860D22C  5850D250  7800D268  33007000  C06458F0  C01C4110
D09405EF  7D00D26C  7000D2C8  58F0C018  D7C3C8C1  F0F0F4F2*
02E3E7E3  40002B04  40400038  40400001  5870F008  1A755800  D2185000
D2A058F0  C05C4110  D09805EF  5800D2D4  12004730  C0CE1BFF  58E0D000
07FE58F0  C04C4110  D0A405EF  58F0C048  D7C3C8C1  F0F0F4F3*
```

```
02E3E7E3  40002B3C  40400038  40400001  4110D0A8  05EF4100  B07C5000
D0B04100  D3345000  D0B49280  D0B458F0  C0284110  D0AC05EF  4100B08F
5000D0B0  4100D33C  5000D0B4  9280D0B4  D7C3C8C1  F0F0F4F4*
02E3E7E3  40002B74  40400038  40400001  58F0C028  4110D0AC  05EF4100
B0685000  D0BC58F0  C0284110  D0B805EF  58F0C050  45E0F004  00000009
00000028  45E0F00C  00000000  01200014  D7C3C8C1  F0F0F4F5*
02E3E7E3  40002BAC  40400014  40400001  45E0F00C  00000414  04500002
45E0F00C  0000041C  40404040  40404040  40404040  40404040  40404040
40404040  40404040  40404040  40404040  D7C3C8C1  F0F0F4F6*
02D9D3C4  40404040  40400038  40404040  00150001  1C002AB4  00160001
1C002AB8  00170001  1C002ABC  00180001  1C002AC0  00010001  0C002B9C
00020001  0C002BA4  00010001  0C002BB0  D7C3C8C1  F0F0F4F7*
02E3E7E3  40002BC0  40400038  40400001  04500002  45E0F010  58F0C008
5800F008  8609C248  5800D210  5000D2B4  5800D2B4  5A00D218  5000D2B4
58F0C058  4110D0C4  05EF58F0  C0284110  D7C3C8C1  F0F0F4F8*
02E3E7E3  40002BF8  40400038  40400001  D0E405EF  58F0C028  4110D0F0
05EF58F0  C0204110  D0FC05EF  58F0C038  4110D108  05EF41E0  000415FE
4720C1CA  58EFD04C  07FE7800  D2907000  D7C3C8C1  F0F0F4F9*
02E3E7E3  40002C30  40400038  40400001  D2C07800  D2707000  B00C7800
D2883300  7000B010  7800D270  7000B014  7800D288  33007000  B0187800
D2947000  D2DC58F0  C0544110  D11005EF  D7C3C8C1  F0F0F5F0**
02E3E7E3  40002C68  40400038  40400001  5000D2BC  7800D274  33007000
C06458F0  C0404110  D11805EF  41E00004  15FE4720  C23058EF  D05407FE
58F0C02C  1B1105EF  41E00004  15FE4720  D7C3C8C1  F0F0F5F1*
02E3E7E3  40002CA0  40400038  40400001  C24858EF  D05C07FE  58F0C060
4110D160  05EF58F0  C0085800  F0088609  C3205800  D3441000  5000D2CC
58F0C050  45E0F004  00000000  0000005E  D7C3C8C1  F0F0F5F2*
02E3E7E3  40002CD8  40400038  40400001  45E0F008  0450D2E8  45E0F008
0450D2CC  45E0F010  58F0C050  45E0F000  00000000  0000007E  45E0F134
00010000  0120D2FA  0100001E  00000001  D7C3C8C1  F0F0F5F3*
02E3E7E3  40002D10  40400038  40400001  45E0F010  7800D27C  33007000
C06458F0  C0404110  D17005EF  41E00004  15FE4720  C2D858EF  D06407FE
7820D2C0  7A20D2C4  7A20D26C  7B20D264  D7C3C8C1  F0F0F5F4*
02E3E7E3  40002D48  40400038  40400001  7020D2C0  58F0C044  4110D1B8
05EF41E0  000415FE  4720C306  58EFD06C  07FE58F0  C0244110  D1CC05EF
41E00004  15FE4720  C32058EF  D07407FE  D7C3C8C1  F0F0F5F5*
02E3E7E3  40002D80  40400038  40400001  7820D2C4  7A20D2DC  7A20D26C
7020D2DC  7820B010  7B20D2C4  7B20D26C  7020B010  7820B018  7B20D2C4
7B20D26C  7020B018  5800D2A0  12004750  D7C3C8C1  F0F0F5F6*
02E3E7E3  40002DB8  40400038  40400001  C3DE58F0  C05C4110  D09805EF
58F0C008  5800F008  8609C248  58F0C03C  4110D1DC  05EF41E0  000415FE
4720C38A  58EFD07C  07FE5970  D2A84730  D7C3C8C1  F0F0F5F7*
02E3E7E3  40002DF0  40400038  40400001  C39E5960  D2AC4780  C39E47F0
C23058F0  C0344110  D1E405EF  41E00004  15FE4720  C3B858EF  D08407FE
58F0C030  4110D204  05EF5800  D2F05900  D7C3C8C1  F0F0F5F8*

MEMBER NAME  PCHART
02E3E7E3  40002E28  40400038  40400001  D2244780  C3B85800  D2F05900
D2184770  C47447F0  C17C58F0  C0085800  F0088709  C40058F0  C0501800
45E0F004  00000009  00000084  45E0F010  D7C3C8C1  F0F0F5F9*
02E3E7E3  40002E60  40400038  40400001  58F0C008  5800F008  8709C414
1BFF58E0  D00007FE  58F0C034  4110D1E4  05EF41E0  000415FE  4720C42E
58EFD08C  07FE58F0  C0304110  D20405EF  D7C3C8C1  F0F0F6F0**
02E3E7E3  40002E98  40400038  40400001  5800D2F0  5900D224  4780C42E
5800D2F0  5900D218  4770C474  1BFF58E0  D00007FE  58F0C050  45E0F004
00000006  0000008D  45E0F010  1BFF58E0  D7C3C8C1  F0F0F6F1*
02E3E7E3  40002ED0  40400038  40400001  D00007FE  58F0C050  45E0F004
00000006  000000C0  45E0F008  0450D2F0  45E0F010  58F0C050  45E0F034
05404040  F1F158D0  D00458E0  D00C92FF  D7C3C8C1  F0F0F6F2*
```

| | | | | | | |
|---|---|---|---|---|---|---|
| 02E3E7E3 | 40002F08 | 40400010 | 40400001 | D00C982C | D01C07FE | 58C0D048 |
| 47F0C06C | 40404040 | 40404040 | 40404040 | 40404040 | 40404040 | 40404040 |
| 40404040 | 40404040 | 40404040 | 40404040 | D7C3C8C1 | F0F0F6F3* | |
| 02E3E7E3 | 40000020 | 40400008 | 40400001 | 00002F10 | 000000E0 | 40404040 |
| 40404040 | 40404040 | 40404040 | 40404040 | 40404040 | 40404040 | 40404040 |
| 40404040 | 40404040 | 40404040 | 40404040 | D7C3C8C1 | F0F0F6F4* | |
| 02D9D3C4 | 40404040 | 40400038 | 40404040 | 00010001 | 0C002BBC | 00010001 |
| 0C002CD4 | 00010001 | 0C002CF8 | 00010001 | 0C002E58 | 00010001 | 0C002EC4 |
| 00010001 | 0C002EE0 | 00010001 | 0C000020 | D7C3C8C1 | F0F0F6F5* | |
| 02E3E7E3 | 400000E0 | 40400004 | 40400001 | 00002EFE | 40404040 | 40404040 |
| 40404040 | 40404040 | 40404040 | 40404040 | 40404040 | 40404040 | 40404040 |
| 40404040 | 40404040 | 40404040 | 40404040 | D7C3C8C1 | F0F0F6F6* | |
| 02E3E7E3 | 40000128 | 40400018 | 40400001 | 00002A60 | 00002C2A | 00002C2A |
| 00002C90 | 00002C90 | 00002CA8 | 40404040 | 40404040 | 40404040 | 40404040 |
| 40404040 | 40404040 | 40404040 | 40404040 | D7C3C8C1 | F0F0F6F7* | |
| 02D9D3C4 | 40404040 | 40400038 | 40404040 | 00010001 | 0C000024 | 00010001 |
| 0C0000E0 | 00010001 | 0C000128 | 00010001 | 0C00012C | 00010001 | 0C000130 |
| 00010001 | 0C000134 | 00010001 | 0C000138 | D7C3C8C1 | F0F0F6F8* | |
| 02E3E7E3 | 40000140 | 4040001C | 40400001 | 00002CA8 | 00002D38 | 00002D38 |
| 00002D66 | 00002D80 | 00002D80 | 00002D80 | 40404040 | 40404040 | 40404040 |
| 40404040 | 40404040 | 40404040 | 40404040 | D7C3C8C1 | F0F0F6F9* | |
| 02D9D3C4 | 40404040 | 40400038 | 40404040 | 00010001 | 0C00013C | 00010001 |
| 0C000140 | 00010001 | 0C000144 | 00010001 | 0C000148 | 00010001 | 0C00014C |
| 00010001 | 0C000150 | 00010001 | 0C000154 | D7C3C8C1 | F0F0F7F0** | |
| 02E3E7E3 | 4000015C | 4040001C | 40400001 | 00002DEA | 00002EB8 | 00002E18 |
| 00002E18 | 00002E8E | 00002E8E | 80002AC4 | 40404040 | 40404040 | 40404040 |
| 40404040 | 40404040 | 40404040 | 40404040 | D7C3C8C1 | F0F0F7F1* | |
| 02D9D3C4 | 40404040 | 40400038 | 40404040 | 00010001 | 0C000158 | 00010001 |
| 0C00015C | 00010001 | 0C000160 | 00010001 | 0C000164 | 00010001 | 0C000168 |
| 00010001 | 0C00016C | 00010001 | 0C000170 | D7C3C8C1 | F0F0F7F2* | |
| 02E3E7E3 | 40000178 | 40400018 | 40400001 | 00000424 | 000003B4 | 80000380 |
| 8000041C | 80000414 | 00000308 | 40404040 | 40404040 | 40404040 | 40404040 |
| 40404040 | 40404040 | 40404040 | 40404040 | D7C3C8C1 | F0F0F7F3* | |
| 02E3E7E3 | 40000194 | 40400008 | 40400001 | 80000000 | 00000304 | 40404040 |
| 40404040 | 40404040 | 40404040 | 40404040 | 40404040 | 40404040 | 40404040 |
| 40404040 | 40404040 | 40404040 | 40404040 | D7C3C8C1 | F0F0F7F4* | |
| 02D9D3C4 | 40404040 | 40400038 | 40404040 | 00010001 | 0C000174 | 00010001 |
| 0C000178 | 00010001 | 0C00017C | 00010001 | 0C000180 | 00010001 | 0C000184 |
| 00010001 | 0C000188 | 00010001 | 0C00018C | D7C3C8C1 | F0F0F7F5* | |
| 02E3E7E3 | 400001A0 | 4040001C | 40400001 | 80000014 | 00000300 | 00000394 |
| 000003AC | 00000398 | 000003B0 | 000003CC | 40404040 | 40404040 | 40404040 |
| 40404040 | 40404040 | 40404040 | 40404040 | D7C3C8C1 | F0F0F7F6* | |
| 02D9D3C4 | 40404040 | 40400038 | 40404040 | 00010001 | 0C000198 | 00020001 |
| 0C0001A0 | 00010001 | 0C0001A4 | 00010001 | 0C0001A8 | 00010001 | 0C0001AC |
| 00010001 | 0C0001B0 | 00010001 | 0C0001B4 | D7C3C8C1 | F0F0F7F7* | |
| 02E3E7E3 | 400001BC | 4040001C | 40400001 | 000003D8 | 800003FD | 00000304 |

MEMBER NAME PCHART

| | | | | | | |
|---|---|---|---|---|---|---|
| 00000390 | 80000000 | 00000308 | 000029A4 | 40404040 | 40404040 | 40404040 |
| 40404040 | 40404040 | 40404040 | 40404040 | D7C3C8C1 | F0F0F7F8* | |
| 02D9D3C4 | 40404040 | 40400038 | 40404040 | 00010001 | 0C0001B8 | 00010001 |
| 0C0001BC | 00010001 | 0C0001C0 | 00010001 | 0C0001C4 | 00010001 | 0C0001C8 |
| 00050001 | 0C0001CC | 00010001 | 0C0001D0 | D7C3C8C1 | F0F0F7F9* | |
| 02E3E7E3 | 400001D8 | 4040001C | 40400001 | 80000004 | 000003FD | 000029A4 |
| 80000390 | 00000328 | 80000328 | 000029C0 | 40404040 | 40404040 | 40404040 |
| 40404040 | 40404040 | 40404040 | 40404040 | D7C3C8C1 | F0F0F8F0** | |
| 02D9D3C4 | 40404040 | 40400038 | 40404040 | 00010001 | 0C0001D4 | 00050001 |
| 0C0001D8 | 00010001 | 0C0001DC | 00010001 | 0C0001E0 | 00010001 | 0C0001E4 |
| 00010001 | 0C0001E8 | 00010001 | 0C0001EC | D7C3C8C1 | F0F0F8F1* | |

```
02E3E7E3  400001F4  4040001C  40400001  8000032C  00002AC4  00000358
000002F0  0000039C  00000338  00000334  40404040  40404040  40404040
40404040  40404040  40404040  40404040  D7C3C8C1  F0F0F8F2*
02D9D3C4  40404040  40400038  40404040  00010001  0C0001F0  00010001
0C0001F4  00010001  0C0001F8  00010001  0C0001FC  00010001  0C000200
00010001  0C000204  00010001  0C000208  D7C3C8C1  F0F0F8F3*
02E3E7E3  40000210  4040001C  40400001  000029C0  000002F0  000002F0
000002F0  000002F0  000002F8  00000300  40404040  40404040  40404040
40404040  40404040  40404040  40404040  D7C3C8C1  F0F0F8F4*
02D9D3C4  40404040  40400038  40404040  00010001  0C00020C  00010001
0C000210  00010001  0C000214  00010001  0C000218  00010001  0C00021C
00010001  0C000220  00010001  0C000224  D7C3C8C1  F0F0F8F5*
02E3E7E3  4000022C  4040001C  40400001  000002F0  000002F0  00000338
00000340  800002F0  00000424  000003B4  40404040  40404040  40404040
40404040  40404040  40404040  40404040  D7C3C8C1  F0F0F8F6*
02D9D3C4  40404040  40400038  40404040  00010001  0C000228  00010001
0C00022C  00010001  0C000230  00010001  0C000234  00010001  0C000238
00010001  0C00023C  00010001  0C000240  D7C3C8C1  F0F0F8F7*
02E3E7E3  40000248  4040001C  40400001  000003C8  800003A4  00002AC4
000003A0  000002F0  00000314  00000338  40404040  40404040  40404040
40404040  40404040  40404040  40404040  D7C3C8C1  F0F0F8F8*
02D9D3C4  40404040  40400038  40404040  00010001  0C000244  00010001
0C000248  00010001  0C00024C  00010001  0C000250  00010001  0C000254
00010001  0C000258  00010001  0C00025C  D7C3C8C1  F0F0F8F9*
02E3E7E3  40000264  4040001C  40400001  00000334  000003DA  000002F0
000002F0  000002F0  000002F0  000002F8  40404040  40404040  40404040
40404040  40404040  40404040  40404040  D7C3C8C1  F0F0F9F0**
02D9D3C4  40404040  40400038  40404040  00010001  0C000260  00010001
0C000264  00010001  0C000268  00010001  0C00026C  00010001  0C000270
00010001  0C000274  00010001  0C000278  D7C3C8C1  F0F0F9F1*
02E3E7E3  40000280  4040001C  40400001  00000300  000002F0  000002F0
00000338  00000340  800002F0  000002F4  40404040  40404040  40404040
40404040  40404040  40404040  40404040  D7C3C8C1  F0F0F9F2*
02D9D3C4  40404040  40400038  40404040  00010001  0C00027C  00010001
0C000280  00010001  0C000284  00010001  0C000288  00010001  0C00028C
00010001  0C000290  00010001  0C000294  D7C3C8C1  F0F0F9F3*
02E3E7E3  4000029C  4040001C  40400001  000002F4  000002F4  000002F4
800003C0  000029AC  000029B4  000003C0  40404040  40404040  40404040
40404040  40404040  40404040  40404040  D7C3C8C1  F0F0F9F4*
02D9D3C4  40404040  40400038  40404040  00010001  0C000298  00010001
0C00029C  00010001  0C0002A0  00010001  0C0002A4  00010001  0C0002A8
00010001  0C0002AC  00010001  0C0002B0  D7C3C8C1  F0F0F9F5*
02E3E7E3  400002B8  4040001C  40400001  80000348  00000388  8000038C
00000364  00000360  000003A8  00000348  40404040  40404040  40404040
40404040  40404040  40404040  40404040  D7C3C8C1  F0F0F9F6*
02D9D3C4  40404040  40400038  40404040  00010001  0C0002B4  00010001
0C0002B8  00010001  0C0002BC  00010001  0C0002C0  00010001  0C0002C4

MEMBER NAME  PCHART
00010001  0C0002C8  00010001  0C0002CC  D7C3C8C1  F0F0F9F7*
02E3E7E3  400002D4  4040001C  40400001  00000348  0000033C  0000036C
800003BC  000002FC  000003D0  800003C4  40404040  40404040  40404040
40404040  40404040  40404040  40404040  D7C3C8C1  F0F0F9F8*
02D9D3C4  40404040  40400038  40404040  00010001  0C0002D0  00010001
0C0002D4  00010001  0C0002D8  00010001  0C0002DC  00010001  0C0002E0
00010001  0C0002E4  00010001  0C0002E8  D7C3C8C1  F0F0F9F9*
02E3E7E3  40002AC4  40400008  40400001  00000000  00000000  40404040
40404040  40404040  40404040  40404040  40404040  40404040  40404040
40404040  40404040  40404040  40404040  D7C3C8C1  F0F1F0F0**
```

```
02D9D3C4  40404040  40400008  40404040  00010001  0C0002EC  40404040
40404040  40404040  40404040  40404040  40404040  40404040  40404040
40404040  40404040  40404040  40404040  D7C3C8C1  F0F1F0F1*
02C5D5C4  40404040  40404040  40404040  40404040  40404040  40404040
00002F18  F1F5F7F3  F460C6D6  F34040F0  F2F0F2F8  F7F0F9F8  40F0F84B
F4F14BF2  F7404040  D7C3C8C1  D9E34040  D7C3C8C1  F0F1F0F2**

MEMBER NAME  PCHECK
02C5E2C4  40404040  40400010  40400001  D7C3C8C5  C3D24040  00000000
40000000  40404040  40404040  40404040  40404040  40404040  40404040
40404040  40404040  40404040  40404040  D7C3C8C5  F0F0F0F1*
02E3E7E3  40000000  40400038  40400001  47F0F00C  07D7C3C8  C5C3D240
90ECD00C  184D98CD  F0205040  D00450D0  400807FC  40404040  40404040
020A0803  18010A08  0318011A  25E3E6D6  D7C3C8C5  F0F0F0F2*
02E3E7E3  40000038  40400038  40400001  40D7C9C5  D9C3C540  D7D6C9D5
E3E240C8  C1E5C540  E2C1D4C5  40C9C47A  4040C9C4  7E401005  18142202
06481401  22020A08  0318010A  08031801  D7C3C8C5  F0F0F0F3*
02E3E7E3  40000070  40400038  40400001  1A254040  40404040  40404040
40E2C5C3  D6D5C440  D7D6C9D5  E3404040  40404040  7A4040C9  C47E4010
05181422  021A0F40  40D7C9C5  D9C3C540  D7C3C8C5  F0F0F0F4*
02E3E7E3  400000A8  4040001A  40400001  D7D6C9D5  E3401005  1A0F4040
C9E240C4  E4D7D3C9  C3C1E3C5  C4224040  40404040  40404040  40404040
40404040  40404040  40404040  40404040  D7C3C8C5  F0F0F0F5*
02E3E7E3  40000128  40400038  40400001  00000000  00000000  4E000000
00000000  4F080000  00000000  4E000000  80000000  00000000  00000001
00000001  00000002  00000003  00000004  D7C3C8C5  F0F0F0F6*
02C5E2C4  40404040  40400010  40400002  D7C3C5D9  D9404040  05000000
40003844  40404040  40404040  40404040  40404040  40404040  40404040
40404040  40404040  40404040  40404040  D7C3C8C5  F0F0F0F7*
02E3E7E3  40000160  40400014  40400001  0000000A  00000010  00000048
00000000  00000000  40404040  40404040  40404040  40404040  40404040
40404040  40404040  40404040  40404040  D7C3C8C5  F0F0F0F8*
02C5E2C4  40404040  40400010  40400003  D6D7E3C9  D6D54040  05000000
40000020  40404040  40404040  40404040  40404040  40404040  40404040
40404040  40404040  40404040  40404040  D7C3C8C5  F0F0F0F9*
02C5E2C4  40404040  40400010  40400004  C2E2D6D9  E3404040  02000000
40000000  40404040  40404040  40404040  40404040  40404040  40404040
40404040  40404040  40404040  40404040  D7C3C8C5  F0F0F1F0**
02C5E2C4  40404040  40400010  40400005  C9C2C3D6  D47B4040  02000000
40000000  40404040  40404040  40404040  40404040  40404040  40404040
40404040  40404040  40404040  40404040  D7C3C8C5  F0F0F1F1*
02C5E2C4  40404040  40400010  40400006  D3C4C6C9  D67B4040  02000000
40000000  40404040  40404040  40404040  40404040  40404040  40404040
40404040  40404040  40404040  40404040  D7C3C8C5  F0F0F1F2*
02E3E7E3  400001B8  40400018  40400001  FFFFFFBB  00000000  00000000
00000000  00000000  00000000  40404040  40404040  40404040  40404040
40404040  40404040  40404040  40404040  D7C3C8C5  F0F0F1F3*
02E3E7E3  40000188  40400004  40400001  000000C8  40404040  40404040
40404040  40404040  40404040  40404040  40404040  40404040  40404040
40404040  40404040  40404040  40404040  D7C3C8C5  F0F0F1F4*
02E3E7E3  4000019C  40400010  40400001  00000001  00000004  C6D34040
C1404040  40404040  40404040  40404040  40404040  40404040  40404040
40404040  40404040  40404040  40404040  D7C3C8C5  F0F0F1F5*
02E3E7E3  40000210  40400038  40400001  5890D104  58B0D0F0  58A0D08C
5870D0A4  5800D080  5000D0B8  58F0D0F4  5800F008  8707D22E  5800D088
5000D0C4  5820D09C  5860D09C  5870D090  D7C3C8C5  F0F0F1F6*
02E3E7E3  40000248  40400038  40400001  58A0D088  18B258F0  D1001800
45E0F000  1000000B  00000160  0000020C  45E0F008  0450D0C8  5880D08C
18388930  00021856  5C40D0C4  1A3545E0  D7C3C8C5  F0F0F1F7*
```

```
02E3E7E3  40000280  40400038  40400001  F0080473  90001A8A  198747C0
D1A845E0  F0080470  D0B4185B  5C40D0C4  18351A3B  45E0F008  04739000
45E0F010  5800D0C8  5700D07C  5000D06C  D7C3C8C5  F0F0F1F8*
02E3E7E3  400002B8  40400038  40400001  6820D068  6B20D078  185B5C40
D0C41835  5A30D094  70239000  5800D0C4  1A0A5000  D0C447F0  D18658B0
D0F058A0  D08C5870  D0A45800  D0C45B00  D7C3C8C5  F0F0F1F9*
02E3E7E3  400002F0  40400038  40400001  D0885000  D0C459A0  D0C447C0

MEMBER NAME  PCHECK
D23E1BFF  58E0D000  07FE58F0  D0F84110  D04C05EF  58E0D130  2B00780E
90006A00  D0706000  D0605800  D0645000  D7C3C8C5  F0F0F2F0**
02E3E7E3  40000328  40400038  40400001  D0BC5800  D09C5000  D10C5800
D1385000  D1245800  D13C5000  D1285800  D1405000  D12C188A  58A0B045
58E0D124  2B00780E  90006A00  D0706000  D7C3C8C5  F0F0F2F1*
02E3E7E3  40000360  40400038  40400001  D0605820  D0645020  D0CC5920
D0BC4780  D2B25020  D0BC47F0  D3F059A0  D0C047A0  D3A25AA0  D08858F0
D0FC1800  45E0F004  00000000  00000028  D7C3C8C5  F0F0F2F2*
02D9D3C4  40404040  40400038  40404040  00020001  0C0001B8  00030001
0C0001BC  00040001  1C0001C0  00050001  1C0001C4  00060001  1C0001C8
00010001  0C00025C  00010001  0C000260  D7C3C8C5  F0F0F2F3*
02E3E7E3  40000398  40400038  40400001  18785B70  D0885C60  D10C1837
5A30D11C  45E0F008  04739000  18375A30  D12045E0  F0080473  900045E0
F0080450  D0BC45E0  F01058F0  D0FC1800  D7C3C8C5  F0F0F2F4*
02E3E7E3  400003D0  40400038  40400001  45E0F000  00000000  0000005F
187A5C60  D0A045E0  F1340001  00000127  B0010100  00480000  000145E0
F01059A0  D0C047A0  D3A25AA0  D08858F0  D7C3C8C5  F0F0F2F5*
02E3E7E3  40000408  40400038  40400001  D0FC1800  45E0F004  00000000
00000065  5810D128  45E0F008  04719000  5810D12C  45E0F008  04719000
45E0F008  0450D0BC  45E0F010  58F0D0FC  D7C3C8C5  F0F0F2F6*
02E3E7E3  40000440  40400038  40400001  45E0F000  00000000  0000005F
185A5C40  D0A045E0  F1340001  00000125  B0010100  00480000  000145E0
F01058F0  D0F45800  F0081BFF  870FD3F0  D7C3C8C5  F0F0F2F7*
02E3E7E3  40000478  40400038  40400001  5800D084  5000D0B8  58F0D0FC
45E0F004  00000009  0000009C  45E0F008  0450D0BC  45E0F010  58F0D0FC
45E0F004  00000006  0000009C  45E0F008  D7C3C8C5  F0F0F2F8*
02E3E7E3  400004B0  40400038  40400001  0450D0BC  45E0F010  5A80D088
5800D12C  5A00D09C  5000D12C  5800D128  5A00D09C  5000D128  5800D124
5A00D09C  5000D124  5980D0C4  47C0D288  D7C3C8C5  F0F0F2F9*
02E3E7E3  400004E8  40400038  40400001  50A0B045  58A0D08C  5870D0A4
5800D0B8  8707D442  58F0D0FC  45E0F034  05404040  F2F31BFF  58E0D000
07FE58A0  D00458E0  A00C58B0  A0185810  D7C3C8C5  F0F0F3F0**
02E3E7E3  40000520  40400038  40400001  B0045820  D0C45020  100018DA
92FFA00C  982CA01C  07FE5870  10045820  70005020  D0C45820  10004130
20004150  00041B25  5C40D094  1B255020  D7C3C8C5  F0F0F3F1*
02E3E7E3  40000558  4040000E  40400001  D1045030  D1085030  D05447F0
D1484040  40404040  40404040  40404040  40404040  40404040  40404040
40404040  40404040  40404040  40404040  D7C3C8C5  F0F0F3F2*
02E3E7E3  40000020  40400008  40400001  00000536  000000C8  40404040
40404040  40404040  40404040  40404040  40404040  40404040  40404040
40404040  40404040  40404040  40404040  D7C3C8C5  F0F0F3F3*
02D9D3C4  40404040  40400038  40404040  00010001  0C000394  00010001
0C0003D8  00010001  0C000414  00010001  0C000448  00010001  0C00048C
00010001  0C0004A8  00010001  0C000020  D7C3C8C5  F0F0F3F4*
02E3E7E3  400000C8  40400004  40400001  00000512  40404040  40404040
40404040  40404040  40404040  40404040  40404040  40404040  40404040
40404040  40404040  40404040  40404040  D7C3C8C5  F0F0F3F5*
02E3E7E3  40000114  40400008  40400001  0000019C  00000150  40404040
40404040  40404040  40404040  40404040  40404040  40404040  40404040
40404040  40404040  40404040  40404040  D7C3C8C5  F0F0F3F6*
```

```
02E3E7E3  40000120  40400008  40400001  00000164  8000018C  40404040
40404040  40404040  40404040  40404040  40404040  40404040  40404040
40404040  40404040  40404040  40404040  D7C3C8C5  F0F0F3F7*
02E3E7E3  400001D4  40400038  40400001  00000000  00000000  00000000
00000000  00000008  0000000C  00000000  00000000  00000000  00000014
00000020  00000024  00000028  0000002C  D7C3C8C5  F0F0F3F8*
02E3E7E3  4000020C  40400004  40400001  000002DE  40404040  40404040
40404040  40404040  40404040  40404040  40404040  40404040  40404040

MEMBER NAME  PCHECK
40404040  40404040  40404040  40404040  D7C3C8C5  F0F0F3F9*
02D9D3C4  40404040  40400038  40404040  00010001  0C000024  00010001
0C0000C8  00010001  0C000114  00010001  0C000118  00010001  0C000120
00010001  0C000124  00010001  0C00020C  D7C3C8C5  F0F0F4F0**
02C5D5C4  40404040  40404040  40404040  40404040  40404040  40404040
00000566  F1F5F7F3  F460C6D6  F34040F0  F2F0F2F8  F7F0F9F8  40F0F84B
F4F14BF3  F2404040  D7C3C8C5  C3D24040  D7C3C8C5  F0F0F4F1**

MEMBER NAME  PCTGET
02C5E2C4  40404040  40400010  40400001  D7C3E3C7  C5E34040  00000000
40000000  40404040  40404040  40404040  40404040  40404040  40404040
40404040  40404040  40404040  40404040  D7C3E3C7  F0F0F0F1*
02E3E7E3  40000000  40400028  40400001  47F0F00C  07D7C3E3  C7C5E340
90ECD00C  184D98CD  F0205040  D00450D0  400807FC  40404040  40404040
40404040  40404040  40404040  40404040  D7C3E3C7  F0F0F0F2*
02E3E7E3  40000090  4040001C  40400001  00000000  00000001  00000002
00000004  00000010  00000000  00000000  40404040  40404040  40404040
40404040  40404040  40404040  40404040  D7C3E3C7  F0F0F0F3*
02C5E2C4  40404040  40400010  40400002  C6E2C7C5  E3404040  02000000
40000000  40404040  40404040  40404040  40404040  40404040  40404040
40404040  40404040  40404040  40404040  D7C3E3C7  F0F0F0F4*
02E3E7E3  400000D0  40400004  40400001  00000000  40404040  40404040
40404040  40404040  40404040  40404040  40404040  40404040  40404040
40404040  40404040  40404040  40404040  D7C3E3C7  F0F0F0F5*
02C5E2C4  40404040  40400010  40400003  D4E5C3C8  D9404040  02000000
40000000  40404040  40404040  40404040  40404040  40404040  40404040
40404040  40404040  40404040  40404040  D7C3E3C7  F0F0F0F6*
02C5E2C4  40404040  40400010  40400004  C9C2C3D6  D47B4040  02000000
40000000  40404040  40404040  40404040  40404040  40404040  40404040
40404040  40404040  40404040  40404040  D7C3E3C7  F0F0F0F7*
02E3E7E3  400000D8  4040000C  40400001  00000000  00000000  00000000
40404040  40404040  40404040  40404040  40404040  40404040  40404040
40404040  40404040  40404040  40404040  D7C3E3C7  F0F0F0F8*
02E3E7E3  40000104  40400038  40400001  58B0D0A8  58A0D06C  5890D0D4
5800D084  12004780  D0FA59A0  D0844780  D1445850  D0941A5A  5C40D078
5820D074  1A254109  B0005000  D0504102  D7C3E3C7  F0F0F0F9*
02E3E7E3  4000013C  40400038  40400001  B0005000  D0549280  D05458F0
D0B44110  D04C05EF  50A0D094  58E0D0D8  580EB000  5000D098  5809B000
5000D090  47F0D1AC  50A0D094  5800D074  D7C3E3C7  F0F0F1F0**
02E3E7E3  40000174  40400038  40400001  5000D0CC  5800D078  5000D0C8
5090D0D0  4109B000  5000D058  58F0D0B0  4110D058  05EF5800  D0841200
4750D244  5800D084  120047C0  D19058F0  D7C3E3C7  F0F0F1F1*
02E3E7E3  400001AC  40400038  40400001  D0B845E0  F0340540  4040F2F5
5820D0C4  5A20D0C8  5802B000  5000D098  58E0D0D0  580EB000  5000D090
5800D074  5000D0C0  5880D078  5800D094  D7C3E3C7  F0F0F1F2*
02E3E7E3  400001E4  40400038  40400001  5A00D06C  5000D094  18505C40
D0781825  5A20D074  4102B000  5000D058  58F0D0B0  4110D058  05EF5800
D0841200  47A0D1F0  47F0D244  5800D084  D7C3E3C7  F0F0F1F3*
02E3E7E3  4000021C  40400038  40400001  120047C0  D21058A0  D06C5890
```

D0D458F0 D0B845E0 F0340540 4040F2F5 18585C40 D0941825 5A20D0C4
5892B000 18785C60 D0941847 5A40D0C0 D7C3E3C7 F0F0F1F4*
02E3E7E3 40000254 40400038 40400001 58A4B000 5990D098 4780D23C
47F0D244 59A0D090 4780D1B8 58A0D06C 5890D0D4 5800D094 1B0A5000
D0941BFF 58E0D000 07FE58A0 D00458E0 D7C3E3C7 F0F0F1F5*
02E3E7E3 4000028C 40400038 40400001 A00C58B0 A0185810 B0045820
D0945020 10005830 B0085840 D0845040 300018DA 92FFA00C 982CA01C
07FE9878 10045820 70005020 D0945820 D7C3E3C7 F0F0F1F6*
02E3E7E3 400002C4 40400026 40400001 80005020 D0845820 10004130
20004150 00041B25 5C40D074 1B255020 D0A85030 D0AC47F0 D0DC4040
40404040 40404040 40404040 40404040 D7C3E3C7 F0F0F1F7*
02E3E7E3 40000020 4040000C 40400001 000002B6 00000028 00000286
40404040 40404040 40404040 40404040 40404040 40404040 40404040
40404040 40404040 40404040 40404040 D7C3E3C7 F0F0F1F8*
02E3E7E3 40000074 40400004 40400001 000000A0 40404040 40404040
40404040 40404040 40404040 40404040 40404040 40404040 40404040
40404040 40404040 40404040 40404040 D7C3E3C7 F0F0F1F9*
02E3E7E3 4000007C 40400004 40400001 80000000 40404040 40404040

MEMBER NAME PCTGET
40404040 40404040 40404040 40404040 40404040 40404040 40404040
40404040 40404040 40404040 40404040 D7C3E3C7 F0F0F2F0**
02E3E7E3 40000084 40400004 40400001 000000A0 40404040 40404040
40404040 40404040 40404040 40404040 40404040 40404040 40404040
40404040 40404040 40404040 40404040 D7C3E3C7 F0F0F2F1*
02D9D3C4 40404040 40400038 40404040 00020001 1C0000D8 00030001
1C0000DC 00040001 1C0000E0 00010001 0C000020 00010001 0C000024
00010001 0C000028 00010001 0C000074 D7C3E3C7 F0F0F2F2*
02E3E7E3 40000088 40400004 40400001 800000AC 40404040 40404040
40404040 40404040 40404040 40404040 40404040 40404040 40404040
40404040 40404040 40404040 40404040 D7C3E3C7 F0F0F2F3*
02E3E7E3 400000E4 40400020 40400001 00000000 00000000 00000008
00000000 00000000 00000000 00000014 00000018 40404040 40404040
40404040 40404040 40404040 40404040 D7C3E3C7 F0F0F2F4*
02D9D3C4 40404040 40400010 40404040 00010001 0C000084 00010001
0C000088 40404040 40404040 40404040 40404040 40404040 40404040
40404040 40404040 40404040 40404040 D7C3E3C7 F0F0F2F5*
02C5D5C4 40404040 40404040 40404040 40404040 40404040 40404040
000002EA F1F5F7F3 F460C6D6 F34040F0 F2F0F2F8 F7F0F9F8 40F0F84B
F4F14BF3 F6404040 D7C3E3C7 C5E34040 D7C3E3C7 F0F0F2F6**

MEMBER NAME PIERCE
02C5E2C4 40404040 40400010 40400001 D7C9C5D9 C3C54040 00000000
40000000 40404040 40404040 40404040 40404040 40404040 40404040
40404040 40404040 40404040 40404040 D7C9C5D9 F0F0F0F1*
02E3E7E3 40000000 40400038 40400001 47F0F00C 07D7C9C5 D9C3C540
90ECD00C 184D98CD F0205040 D00450D0 400807FC 40404040 40404040
021A2A40 40C5D9D9 D6D940C9 D540D7C9 D7C9C5D9 F0F0F0F2*
02E3E7E3 40000038 40400038 40400001 C5D9C3C5 40E3C8C5 40C6C9D9
E2E340C1 D5C440D3 C1E2E340 D7D6C9D5 E31A2540 40404040 4040D6C6
40E3C8C5 40C2D6E4 D5C4C1D9 E840C4D6 D7C9C5D9 F0F0F0F3*
02E3E7E3 40000070 4040000D 40400001 C5E240D5 D6E340D4 C1E3C3C8
22404040 40404040 40404040 40404040 40404040 40404040 40404040
40404040 40404040 40404040 40404040 D7C9C5D9 F0F0F0F4*
02C5E2C4 40404040 40400010 40400002 E3D6D3C5 D9404040 05000000
4000000C 40404040 40404040 40404040 40404040 40404040 40404040
40404040 40404040 40404040 40404040 D7C9C5D9 F0F0F0F5*
02E3E7E3 400000F0 40400018 40400001 00000000 00000000 00000001
00000002 00000000 00000000 40404040 40404040 40404040 40404040

```
40404040  40404040  40404040  40404040  D7C9C5D9  F0F0F0F6*
02C5E2C4  40404040  40400010  40400003  C9C2C3D6  D47B4040  02000000
40000000  40404040  40404040  40404040  40404040  40404040  40404040
40404040  40404040  40404040  40404040  D7C9C5D9  F0F0F0F7*
02E3E7E3  40000140  40400008  40400001  00000000  00000000  40404040
40404040  40404040  40404040  40404040  40404040  40404040  40404040
40404040  40404040  40404040  40404040  D7C9C5D9  F0F0F0F8*
02C5E2C4  40404040  40400010  40400004  D7D9D6D1  D3D54040  02000000
40000000  40404040  40404040  40404040  40404040  40404040  40404040
40404040  40404040  40404040  40404040  D7C9C5D9  F0F0F0F9*
02E3E7E3  4000014C  4040000C  40400001  00000000  00000000  00000000
40404040  40404040  40404040  40404040  40404040  40404040  40404040
40404040  40404040  40404040  40404040  D7C9C5D9  F0F0F1F0**
02E3E7E3  40000190  40400038  40400001  5880D0C4  5890D0C0  58B0D0D4
58A0D104  78008004  7000D0B4  78008008  7000D0B8  5800D070  5000D09C
58E0D108  784EB000  185A5C40  D0AC5820  D7C9C5D9  F0F0F1F1*
02E3E7E3  400001C8  40400038  40400001  D1001A25  7B42B000  304458E0
D10C782E  B000185A  5C40D0AC  182A1A25  7B22B000  30227020  D0A87940
900447A0  D17E7920  90044750  D1A258F0  D7C9C5D9  F0F0F1F2*
02E3E7E3  40000200  40400038  40400001  D0CC1800  45E0F004  00000006
00000028  45E0F010  58F0D0CC  45E0F034  05404040  F1F55800  D0705000
D0A05800  D0785000  D0885800  D1005000  D7C9C5D9  F0F0F1F3*
02E3E7E3  40000238  40400038  40400001  D0DC50A0  D0F05880  D0785820
D0881A28  5020D090  5020D0FC  5800D088  5900D0AC  4770D1E0  5080D090
5850D088  5C40D104  18355A30  D1005030  D7C9C5D9  F0F0F1F4*
02E3E7E3  40000270  40400038  40400001  D0E05A50  D1045050  D0F45870
D0905C60  D1041897  5A90D100  18475A40  D1045040  D0F84103  B0005000
D05C4105  B0005000  D0604109  B0005000  D7C9C5D9  F0F0F1F5*
02E3E7E3  400002A8  40400038  40400001  D0644104  B0005000  D0689280
D06858F0  D0D04110  D05805EF  41E00008  15FE4720  D25058EF  D04C07FE
7823B000  7020D0E8  7920D0B4  47A0D26C  D7C9C5D9  F0F0F1F6*
02E3E7E3  400002E0  40400038  40400001  7800D0B4  7909B000  4730D31E
7800D0E8  7900D0B4  47C0D284  7800D0B4  7909B000  4750D31E  7829B000
7020D0EC  7920D0E8  4770D298  47F0D31E  D7C9C5D9  F0F0F1F7*
02E3E7E3  40000318  40400038  40400001  7860D0EC  7B60D0E8  7060D08C
7840D0B4  7B40D0E8  58E0D0F4  782EB000  58E0D0F8  780EB000  3B023C40
3D463A24  7020D094  7920D0B8  4770D2D4  D7C9C5D9  F0F0F1F8*
02E3E7E3  40000350  40400038  40400001  47F0D354  58A0D07C  7800D0B4
7900D0E8  4780D2F0  7800D0B4  7900D0EC  4770D2F2  18A87800  D08C3200
47A0D302  183A1C28  13A37800  D0B87900  D7C9C5D9  F0F0F1F9*
02E3E7E3  40000388  40400038  40400001  D09447C0  D314183A  1C2813A3

MEMBER NAME  PIERCE
5800D0A0  1A0A5000  D0A05800  D0FC5000  D0885900  D0AC47C0  D1C25880
D0C45890  D0C058A0  D1045800  D0A01200  D7C9C5D9  F0F0F2F0**
02E3E7E3  400003C0  40400038  40400001  4780D34C  5800D07C  5000D09C
1BFF58E0  D00007FE  5880D0C4  5890D0C0  58A0D104  5800D078  5000D09C
1BFF58E0  D00007FE  58A0D004  58E0A00C  D7C9C5D9  F0F0F2F1*
02E3E7E3  400003F8  40400038  40400001  58B0A018  5810B004  5820D0AC
50201000  5830B00C  5840D09C  50403000  18DA92FF  A00C982C  A01C07FE
98791004  58207000  5020D0AC  58209000  D7C9C5D9  F0F0F2F2*
02E3E7E3  40000430  40400038  40400001  5020D09C  58201000  41302000
41500004  1B255C40  D07C1B25  5020D0D4  5030D0D8  58201008  41302000
41500004  1B255020  D0C45030  D0C85030  D7C9C5D9  F0F0F2F3*
02E3E7E3  40000468  40400006  40400001  D05847F0  D1104040  40404040
40404040  40404040  40404040  40404040  40404040  40404040  40404040
40404040  40404040  40404040  40404040  D7C9C5D9  F0F0F2F4*
02E3E7E3  40000020  40400008  40400001  00000420  00000080  40404040
40404040  40404040  40404040  40404040  40404040  40404040  40404040
```

```
40404040  40404040  40404040  40404040  D7C9C5D9  F0F0F2F5*
02E3E7E3  40000080  40400004  40400001  000003F0  40404040  40404040
40404040  40404040  40404040  40404040  40404040  40404040  40404040
40404040  40404040  40404040  40404040  D7C9C5D9  F0F0F2F6*
02E3E7E3  400000CC  40400004  40400001  000002D0  40404040  40404040
40404040  40404040  40404040  40404040  40404040  40404040  40404040
40404040  40404040  40404040  40404040  D7C9C5D9  F0F0F2F7*
02D9D3C4  40404040  40400038  40404040  00020001  0C000140  00030001
1C00014C  00040001  1C000150  00010001  0C00020C  00010001  0C000020
00010001  0C000024  00010001  0C000080  D7C9C5D9  F0F0F2F8*
02E3E7E3  400000D0  40400008  40400001  000003D4  000003D4  40404040
40404040  40404040  40404040  40404040  40404040  40404040  40404040
40404040  40404040  40404040  40404040  D7C9C5D9  F0F0F2F9*
02E3E7E3  400000E8  40400004  40400001  80000000  40404040  40404040
40404040  40404040  40404040  40404040  40404040  40404040  40404040
40404040  40404040  40404040  40404040  D7C9C5D9  F0F0F3F0**
02E3E7E3  4000015C  40400034  40400001  00000000  00000000  00000000
00000000  00000000  00000000  00000000  00000000  00000000  00000004
00000008  0000000C  00000010  40404040  D7C9C5D9  F0F0F3F1*
02D9D3C4  40404040  40400018  40404040  00010001  0C0000CC  00010001
0C0000D0  00010001  0C0000D4  40404040  40404040  40404040  40404040
40404040  40404040  40404040  40404040  D7C9C5D9  F0F0F3F2*
02C5D5C4  40404040  40404040  40404040  40404040  40404040  40404040
0000046E  F1F5F7F3  F460C6D6  F34040F0  F2F0F2F8  F7F0F9F8  40F0F84B
F4F14BF4  F0404040  D7C9C5D9  C3C54040  D7C9C5D9  F0F0F3F3**

MEMBER NAME  PLYCHT
02C5E2C4  40404040  40400010  40400001  D7D3E8C3  C8E34040  00000000
40000000  40404040  40404040  40404040  40404040  40404040  40404040
40404040  40404040  40404040  40404040  D7D3E8C3  F0F0F0F1*
02E3E7E3  40000000  40400038  40400001  47F0F00C  07D7D3E8  C3C8E340
90ECD00C  184D98CD  F0205040  D00450D0  400807FC  40404040  40404040
021A1C40  C5D9D9D6  D940C9D5  40D7C3C5  D7D3E8C3  F0F0F0F2*
02E3E7E3  40000038  40400030  40400001  D9D9404D  E2E4D7C5  D940E3C5
E7E35D22  D7D3E840  E3C1C2D3  C540C5D9  D9D6D9E2  D7D3E840  E3C1C2D3
C540C5D9  D9D6D9E2  40404040  40404040  D7D3E8C3  F0F0F0F3*
02E3E7E3  400002B0  40400038  40400001  00000000  00000001  00000003
00000004  00000010  0000001A  00000048  00000049  00000078  401DF3B6
4029FBE7  403EF9DB  40800000  41200000  D7D3E8C3  F0F0F0F4*
02C5E2C4  40404040  40400010  40400002  D7C3C5D9  D9404040  05000000
40003844  40404040  40404040  40404040  40404040  40404040  40404040
40404040  40404040  40404040  40404040  D7D3E8C3  F0F0F0F5*
02E3E7E3  400002E8  40400028  40400001  41280000  412C0000  41300000
41473333  41480000  415C353F  415E6666  42110000  00000000  00000000
40404040  40404040  40404040  40404040  D7D3E8C3  F0F0F0F6*
02C5E2C4  40404040  40400010  40400003  D9D4D6C4  C5D34040  05000000
40000018  40404040  40404040  40404040  40404040  40404040  40404040
40404040  40404040  40404040  40404040  D7D3E8C3  F0F0F0F7*
02C5E2C4  40404040  40400010  40400004  D4E5C3C8  D9404040  02000000
40000000  40404040  40404040  40404040  40404040  40404040  40404040
40404040  40404040  40404040  40404040  D7D3E8C3  F0F0F0F8*
02C5E2C4  40404040  40400010  40400005  C3C1C4D3  D5F14040  02000000
40000000  40404040  40404040  40404040  40404040  40404040  40404040
40404040  40404040  40404040  40404040  D7D3E8C3  F0F0F0F9*
02C5E2C4  40404040  40400010  40400006  C3C1C4E2  E4D74040  02000000
40000000  40404040  40404040  40404040  40404040  40404040  40404040
40404040  40404040  40404040  40404040  D7D3E8C3  F0F0F1F0**
02C5E2C4  40404040  40400010  40400007  C8C7C4C1  E3C54040  02000000
40000000  40404040  40404040  40404040  40404040  40404040  40404040
```

```
40404040 40404040 40404040 40404040 D7D3E8C3 F0F0F1F1*
02C5E2C4 40404040 40400010 40400008 C8C7E3C9 D4C54040 02000000
40000000 40404040 40404040 40404040 40404040 40404040 40404040
40404040 40404040 40404040 40404040 D7D3E8C3 F0F0F1F2*
02C5E2C4 40404040 40400010 40400009 C9C2C3D6 D47B4040 02000000
40000000 40404040 40404040 40404040 40404040 40404040 40404040
40404040 40404040 40404040 40404040 D7D3E8C3 F0F0F1F3*
02E3E7E3 400003E0 40400020 40400001 FFFFFFBB FFFFFFFF 00000000
00000000 00000000 00000000 00000000 00000000 40404040 40404040
40404040 40404040 40404040 40404040 D7D3E8C3 F0F0F1F4*
02D9D3C4 40404040 40400038 40404040 00020001 0C0003E0 00030001
0C0003E4 00040001 1C0003E8 00050001 1C0003EC 00060001 1C0003F0
00070001 1C0003F4 00080001 1C0003F8 D7D3E8C3 F0F0F1F5*
02C5E2C4 40404040 40400010 4040000A C9C3D5E3 C5D94040 02000000
40000000 40404040 40404040 40404040 40404040 40404040 40404040
40404040 40404040 40404040 40404040 D7D3E8C3 F0F0F1F6*
02E3E7E3 40000400 40400004 40400001 00000000 40404040 40404040
40404040 40404040 40404040 40404040 40404040 40404040 40404040
40404040 40404040 40404040 40404040 D7D3E8C3 F0F0F1F7*
02E3E7E3 40000340 40400038 40400001 4040E740 D3D6C340 4040E840
D3D6C340 40404040 C5D9D9D6 D9E24040 40404040 C3D6D7E8 D9C9C7C8
E3404DC3 5D40F1F9 F8F640E3 C8C540C2 D7D3E8C3 F0F0F1F8*
02E3E7E3 40000378 40400038 40400001 D6C5C9D5 C740C3D6 D4D7C1D5
E85BC1D3 D340D9C9 C7C8E3E2 40D9C5E2 C5D9E5C5 C45B5BE2 D3C9C340
E5C5D9E2 C9D6D540 E7E74BE7 40404040 D7D3E8C3 F0F0F1F9*
02E3E7E3 400003B0 40400028 40400001 40404040 4040C4C1 E3C57A40

MEMBER NAME  PLYCHT
E7E761E7 E761E7E7 40404040 4040E3C9 D4C57A40 E7E77AE7 E77AE7E7
40404040 40404040 40404040 40404040 D7D3E8C3 F0F0F2F0**
02E3E7E3 40000410 40400038 40400001 5880D37C 58B0D378 5870D260
4100D340 5000D078 58F0D380 4110D074 05EF58F0 D3904110 D08005EF
58F0D38C 4110D084 05EF7800 D2943300 D7D3E8C3 F0F0F2F1*
02E3E7E3 40000448 40400038 40400001 7000D2CC 7800D298 33007000
D2AC7800 D28C3300 7000D2B4 7800D288 33007000 D2B87800 D2987000
D2B07800 D2847000 D2BC7800 D2907000 D7D3E8C3 F0F0F2F2*
02E3E7E3 40000480 40400038 40400001 D2C458F0 D3884110 D08805EF
41E00004 15FE4720 D43458EF D04C07FE 7800D288 7000D2C4 58F0D388
4110D0D0 05EF41E0 000415FE 4720D456 D7D3E8C3 F0F0F2F3*
02E3E7E3 400004B8 40400038 40400001 58EFD054 07FE7800 D2807000
D2C458F0 D3884110 D11805EF 41E00004 15FE4720 D47858EF D05C07FE
7800D2BC 7000D2C0 58F0D384 4110D160 D7D3E8C3 F0F0F2F4*
02E3E7E3 400004F0 40400038 40400001 05EF7800 D2C07B00 D2787000
D2C058F0 D3844110 D16005EF 7800D27C 7000D2C4 5800B045 12004780
D5225890 D24C18A7 410AB001 5000D170 D7D3E8C3 F0F0F2F5*
02E3E7E3 40000528 40400038 40400001 58F0D398 4110D170 05EF5000
D2C8410A B0015000 D19058F0 D3884110 D17805EF 41E00004 15FE4720
D4F058EF D06407FE 7800D2C4 7B00D278 D7D3E8C3 F0F0F2F6*
02E3E7E3 40000560 40400038 40400001 7000D2C4 7800D2C0 7B00D278
7000D2C0 58F0D384 4110D160 05EF5A90 D24C5AA0 D2605990 B04547C0
D4B858F0 D3844110 D1C005EF 58F0D384 D7D3E8C3 F0F0F2F7*
02E3E7E3 40000598 40400038 40400001 4110D1D0 05EF58F0 D3844110
D1E005EF 58F0D384 4110D1F0 05EF7800 D29C3300 7000D3A0 58F0D388
4110D200 05EF41E0 000415FE 4720D56E D7D3E8C3 F0F0F2F8*
02E3E7E3 400005D0 40400038 40400001 58EFD06C 07FE1BFF 58E0D000
07FE58F0 D3941800 45E0F004 00000006 00000028 45E0F010 1BFF58E0
D00007FE 58D0D004 58E0D00C 92FFD00C D7D3E8C3 F0F0F2F9*
02E3E7E3 40000608 4040000A 40400001 982CD01C 07FE47F0 D3A84040
40404040 40404040 40404040 40404040 40404040 40404040 40404040
```

```
40404040  40404040  40404040  40404040  D7D3E8C3  F0F0F3F0**
02E3E7E3  40000020  40400008  40400001  0000060E  00000068  40404040
40404040  40404040  40404040  40404040  40404040  40404040  40404040
40404040  40404040  40404040  40404040  D7D3E8C3  F0F0F3F1*
02E3E7E3  40000068  40400004  40400001  000005FC  40404040  40404040
40404040  40404040  40404040  40404040  40404040  40404040  40404040
40404040  40404040  40404040  40404040  D7D3E8C3  F0F0F3F2*
02E3E7E3  400000B4  40400008  40400001  0000049C  000005DE  40404040
40404040  40404040  40404040  40404040  40404040  40404040  40404040
40404040  40404040  40404040  40404040  D7D3E8C3  F0F0F3F3*
02D9D3C4  40404040  40400038  40404040  00090001  1C0003FC  000A0001
1C000400  00010001  0C0005EC  00010001  0C000020  00010001  0C000024
00010001  0C000068  00010001  0C0000B4  D7D3E8C3  F0F0F3F4*
02E3E7E3  400000BC  4040001C  40400001  000004BE  000005DE  000004E0
000005DE  00000558  000005DE  000005D6  40404040  40404040  40404040
40404040  40404040  40404040  40404040  D7D3E8C3  F0F0F3F5*
02D9D3C4  40404040  40400038  40404040  00010001  0C0000B8  00010001
0C0000BC  00010001  0C0000C0  00010001  0C0000C4  00010001  0C0000C8
00010001  0C0000CC  00010001  0C0000D0  D7D3E8C3  F0F0F3F6*
02E3E7E3  400000D8  40400008  40400001  000005DE  000002BC  40404040
40404040  40404040  40404040  40404040  40404040  40404040  40404040
40404040  40404040  40404040  40404040  D7D3E8C3  F0F0F3F7*
02E3E7E3  400000E4  40400014  40400001  80000014  800003D0  800003BC
00000334  0000032C  40404040  40404040  40404040  40404040  40404040
40404040  40404040  40404040  40404040  D7D3E8C3  F0F0F3F8*
02D9D3C4  40404040  40400038  40404040  00010001  0C0000D4  00010001
0C0000D8  00010001  0C0000DC  00030001  0C0000E4  00010001  0C0000E8

MEMBER NAME  PLYCHT
00010001  0C0000EC  00010001  0C0000F0  D7D3E8C3  F0F0F3F9*
02E3E7E3  400000F8  4040001C  40400001  000002B0  000002D0  000002D8
000002D4  00000360  000002B0  000002B0  40404040  40404040  40404040
40404040  40404040  40404040  40404040  D7D3E8C3  F0F0F4F0**
02D9D3C4  40404040  40400038  40404040  00010001  0C0000F4  00010001
0C0000F8  00010001  0C0000FC  00010001  0C000100  00010001  0C000104
00010001  0C000108  00010001  0C00010C  D7D3E8C3  F0F0F4F1*
02E3E7E3  40000114  4040001C  40400001  000002B0  000002B0  000002B4
000002B8  000002B0  000002B0  000002D8  40404040  40404040  40404040
40404040  40404040  40404040  40404040  D7D3E8C3  F0F0F4F2*
02D9D3C4  40404040  40400038  40404040  00010001  0C000110  00010001
0C000114  00010001  0C000118  00010001  0C00011C  00010001  0C000120
00010001  0C000124  00010001  0C000128  D7D3E8C3  F0F0F4F3*
02E3E7E3  40000130  4040001C  40400001  000002DC  800002B0  00000334
0000032C  000002B0  000002C0  000002D8  40404040  40404040  40404040
40404040  40404040  40404040  40404040  D7D3E8C3  F0F0F4F4*
02D9D3C4  40404040  40400038  40404040  00010001  0C00012C  00010001
0C000130  00010001  0C000134  00010001  0C000138  00010001  0C00013C
00010001  0C000140  00010001  0C000144  D7D3E8C3  F0F0F4F5*
02E3E7E3  4000014C  4040001C  40400001  000002D4  00000058  000002B0
000002B0  000002B0  000002B0  000002B4  40404040  40404040  40404040
40404040  40404040  40404040  40404040  D7D3E8C3  F0F0F4F6*
02D9D3C4  40404040  40400038  40404040  00010001  0C000148  00010001
0C00014C  00010001  0C000150  00010001  0C000154  00010001  0C000158
00010001  0C00015C  00010001  0C000160  D7D3E8C3  F0F0F4F7*
02E3E7E3  40000168  4040001C  40400001  000002B8  000002B0  000002B0
000002D8  000002DC  800002B0  00000334  40404040  40404040  40404040
40404040  40404040  40404040  40404040  D7D3E8C3  F0F0F4F8*
02D9D3C4  40404040  40400038  40404040  00010001  0C000164  00010001
0C000168  00010001  0C00016C  00010001  0C000170  00010001  0C000174
```

```
00010001 0C000178 00010001 0C00017C D7D3E8C3 F0F0F4F9*
02E3E7E3 40000184 4040001C 40400001 0000032C 000002B0 000002C4
000002D8 000002D4 00000340 000002B0 40404040 40404040 40404040
40404040 40404040 40404040 40404040 D7D3E8C3 F0F0F5F0**
02D9D3C4 40404040 40400038 40404040 00010001 0C000180 00010001
0C000184 00010001 0C000188 00010001 0C00018C 00010001 0C000190
00010001 0C000194 00010001 0C000198 D7D3E8C3 F0F0F5F1*
02E3E7E3 400001A0 4040001C 40400001 000002B0 000002B0 000002B0
000002B4 000002B8 000002B0 000002B0 40404040 40404040 40404040
40404040 40404040 40404040 40404040 D7D3E8C3 F0F0F5F2*
02D9D3C4 40404040 40400038 40404040 00010001 0C00019C 00010001
0C0001A0 00010001 0C0001A4 00010001 0C0001A8 00010001 0C0001AC
00010001 0C0001B0 00010001 0C0001B4 D7D3E8C3 F0F0F5F3*
02E3E7E3 400001BC 4040001C 40400001 000002D8 000002DC 800002B0
00000314 00000328 00000318 80000328 40404040 40404040 40404040
40404040 40404040 40404040 40404040 D7D3E8C3 F0F0F5F4*
02D9D3C4 40404040 40400038 40404040 00010001 0C0001B8 00010001
0C0001BC 00010001 0C0001C0 00010001 0C0001C4 00010001 0C0001C8
00010001 0C0001CC 00010001 0C0001D0 D7D3E8C3 F0F0F5F5*
02E3E7E3 400001DC 4040001C 40400001 800002C8 00000334 0000032C
000002B0 00000330 000002D8 000002D4 40404040 40404040 40404040
40404040 40404040 40404040 40404040 D7D3E8C3 F0F0F5F6*
02D9D3C4 40404040 40400038 40404040 00010001 0C0001D4 00010001
0C0001DC 00010001 0C0001E0 00010001 0C0001E4 00010001 0C0001E8
00010001 0C0001EC 00010001 0C0001F0 D7D3E8C3 F0F0F5F7*
02E3E7E3 400001FC 4040001C 40400001 000002B0 000002B0 000002B0
000002B0 000002B4 000002B8 000002B0 40404040 40404040 40404040
40404040 40404040 40404040 40404040 D7D3E8C3 F0F0F5F8*

MEMBER NAME  PLYCHT
02D9D3C4 40404040 40400038 40404040 00010001 0C0001F4 00010001
0C0001FC 00010001 0C000200 00010001 0C000204 00010001 0C000208
00010001 0C00020C 00010001 0C000210 D7D3E8C3 F0F0F5F9*
02E3E7E3 40000218 4040001C 40400001 000002B0 000002D8 000002DC
800002B0 00000314 00000324 00000314 40404040 40404040 40404040
40404040 40404040 40404040 40404040 D7D3E8C3 F0F0F6F0**
02D9D3C4 40404040 40400038 40404040 00010001 0C000214 00010001
0C000218 00010001 0C00021C 00010001 0C000220 00010001 0C000224
00010001 0C000228 00010001 0C00022C D7D3E8C3 F0F0F6F1*
02E3E7E3 40000234 4040001C 40400001 80000328 0000031C 00000324
0000031C 80000328 00000320 00000324 40404040 40404040 40404040
40404040 40404040 40404040 40404040 D7D3E8C3 F0F0F6F2*
02D9D3C4 40404040 40400038 40404040 00010001 0C000230 00010001
0C000234 00010001 0C000238 00010001 0C00023C 00010001 0C000240
00010001 0C000244 00010001 0C000248 D7D3E8C3 F0F0F6F3*
02E3E7E3 40000250 4040001C 40400001 00000320 80000328 00000318
00000324 00000318 80000328 00000408 40404040 40404040 40404040
40404040 40404040 40404040 40404040 D7D3E8C3 F0F0F6F4*
02D9D3C4 40404040 40400038 40404040 00010001 0C00024C 00010001
0C000250 00010001 0C000254 00010001 0C000258 00010001 0C00025C
00010001 0C000260 00010001 0C000264 D7D3E8C3 F0F0F6F5*
02E3E7E3 4000026C 4040001C 40400001 000002F0 000002B0 000002C0
000002D8 000002D4 00000048 000002B0 40404040 40404040 40404040
40404040 40404040 40404040 40404040 D7D3E8C3 F0F0F6F6*
02D9D3C4 40404040 40400038 40404040 00010001 0C000268 00010001
0C00026C 00010001 0C000270 00010001 0C000274 00010001 0C000278
00010001 0C00027C 00010001 0C000280 D7D3E8C3 F0F0F6F7*
02E3E7E3 40000288 4040001C 40400001 000002B0 000002B0 000002B0
000002B4 000002B8 000002B0 000002B0 40404040 40404040 40404040
```

```
40404040  40404040  40404040  40404040  D7D3E8C3  F0F0F6F8*
02D9D3C4  40404040  40400038  40404040  00010001  0C000284  00010001
0C000288  00010001  0C00028C  00010001  0C000290  00010001  0C000294
00010001  0C000298  00010001  0C00029C  D7D3E8C3  F0F0F6F9*
02E3E7E3  400002A4  4040000C  40400001  000002D8  000002DC  800002B0
40404040  40404040  40404040  40404040  40404040  40404040  40404040
40404040  40404040  40404040  40404040  D7D3E8C3  F0F0F7F0**
02E3E7E3  40000404  4040000C  40400001  00000000  00000000  00000000
40404040  40404040  40404040  40404040  40404040  40404040  40404040
40404040  40404040  40404040  40404040  D7D3E8C3  F0F0F7F1*
02D9D3C4  40404040  40400020  40404040  00010001  0C0002A0  00010001
0C0002A4  00010001  0C0002A8  00010001  0C0002AC  40404040  40404040
40404040  40404040  40404040  40404040  D7D3E8C3  F0F0F7F2*
02C5D5C4  40404040  40404040  40404040  40404040  40404040  40404040
00000612  F1F5F7F3  F460C6D6  F34040F0  F2F0F2F8  F7F0F9F8  40F0F84B
F4F14BF4  F5404040  D7D3E8C3  C8E34040  D7D3E8C3  F0F0F7F3**

MEMBER NAME  PLYWRN
02C5E2C4  40404040  40400010  40400001  D7D3E8E6  D9D54040  00000000
40000000  40404040  40404040  40404040  40404040  40404040  40404040
40404040  40404040  40404040  40404040  D7D3E8E6  F0F0F0F1*
02E3E7E3  40000000  40400038  40400001  47F0F00C  07D7D3E8  E6D9D540
90ECD00C  184D98CD  F0205040  D00450D0  400807FC  40404040  40404040
021A1D40  C5D9D9D6  D940C9D5  40D7D3E8  D7D3E8E6  F0F0F0F2*
02E3E7E3  40000038  40400011  40400001  E6D9D540  4DE2E4D7  C5D940E3
C5E7E35D  22404040  40404040  40404040  40404040  40404040  40404040
40404040  40404040  40404040  40404040  D7D3E8E6  F0F0F0F3*
02E3E7E3  40000050  40400020  40400001  C3C1E4E3  C9D6D540  C3C8C1D9
E3404040  C3C1E4E3  C9D6D540  C3C8C1D9  E3404040  40404040  40404040
40404040  40404040  40404040  40404040  D7D3E8E6  F0F0F0F4*
02E3E7E3  400002B8  40400038  40400001  00000000  00000001  00000003
00000004  0000000D  0000001A  00000048  00000049  00000078  401DF3B6
4029FBE7  403EF9DB  40800000  41200000  D7D3E8E6  F0F0F0F5*
02C5E2C4  40404040  40400010  40400002  D9D4D6C4  C5D34040  05000000
40000018  40404040  40404040  40404040  40404040  40404040  40404040
40404040  40404040  40404040  40404040  D7D3E8E6  F0F0F0F6*
02E3E7E3  400002F0  40400028  40400001  41280000  412C0000  41300000
41473333  41480000  415C353F  415E6666  42110000  00000000  00000000
40404040  40404040  40404040  40404040  D7D3E8E6  F0F0F0F7*
02C5E2C4  40404040  40400010  40400003  D4E5C3C8  D9404040  02000000
40000000  40404040  40404040  40404040  40404040  40404040  40404040
40404040  40404040  40404040  40404040  D7D3E8E6  F0F0F0F8*
02C5E2C4  40404040  40400010  40400004  C3C1C4D3  D5F14040  02000000
40000000  40404040  40404040  40404040  40404040  40404040  40404040
40404040  40404040  40404040  40404040  D7D3E8E6  F0F0F0F9*
02E3E7E3  400003F0  4040000C  40400001  FFFFFFFF  00000000  00000000
40404040  40404040  40404040  40404040  40404040  40404040  40404040
40404040  40404040  40404040  40404040  D7D3E8E6  F0F0F1F0**
02C5E2C4  40404040  40400010  40400005  C3C1C4E2  E4D74040  02000000
40000000  40404040  40404040  40404040  40404040  40404040  40404040
40404040  40404040  40404040  40404040  D7D3E8E6  F0F0F1F1*
02C5E2C4  40404040  40400010  40400006  C8C7C4C1  E3C54040  02000000
40000000  40404040  40404040  40404040  40404040  40404040  40404040
40404040  40404040  40404040  40404040  D7D3E8E6  F0F0F1F2*
02C5E2C4  40404040  40400010  40400007  C8C7E3C9  D4C54040  02000000
40000000  40404040  40404040  40404040  40404040  40404040  40404040
40404040  40404040  40404040  40404040  D7D3E8E6  F0F0F1F3*
02C5E2C4  40404040  40400010  40400008  C9C2C3D6  D47B4040  02000000
40000000  40404040  40404040  40404040  40404040  40404040  40404040
```

40404040 40404040 40404040 40404040 D7D3E8E6 F0F0F1F4*
02C5E2C4 40404040 40400010 40400009 C9C3D5E3 C5D94040 02000000
40000000 40404040 40404040 40404040 40404040 40404040 40404040
40404040 40404040 40404040 40404040 D7D3E8E6 F0F0F1F5*
02E3E7E3 40000400 40400018 40400001 00000000 00000000 00000000
00000000 00000000 00000000 40404040 40404040 40404040 40404040
40404040 40404040 40404040 40404040 D7D3E8E6 F0F0F1F6*
02D9D3C4 40404040 40400038 40404040 00020001 0C0003F0 00030001
1C0003F4 00040001 1C000400 00050001 1C000404 00060001 1C000408
00070001 1C00040C 00080001 1C000410 D7D3E8E6 F0F0F1F7*
02E3E7E3 40000350 40400038 40400001 4040E740 D3D6C340 4040E840
D3D6C340 40404040 C5D9D9D6 D9E24040 40404040 C3D6D7E8 D9C9C7C8
E3404DC3 5D40F1F9 F8F640E3 C8C540C2 D7D3E8E6 F0F0F1F8*
02E3E7E3 40000388 40400038 40400001 D6C5C9D5 C740C3D6 D4D7C1D5
E85BC1D3 D340D9C9 C7C8E3E2 40D9C5E2 C5D9E5C5 C45B5BE2 D3C9C340
E5C5D9E2 C9D6D540 E7E74BE7 40404040 D7D3E8E6 F0F0F1F9*
02E3E7E3 400003C0 40400028 40400001 40404040 4040C4C1 E3C57A40

MEMBER NAME  PLYWRN
E7E761E7 E761E7E7 40404040 4040E3C9 D4C57A40 E7E77AE7 E77AE7E7
40404040 40404040 40404040 40404040 D7D3E8E6 F0F0F2F0**
02E3E7E3 40000428 40400038 40400001 5880D380 58B0D388 5870D264
4100D348 5000D078 58F0D384 4110D074 05EF58F0 D39C4110 D08005EF
58F0D398 4110D084 05EF7800 D2943300 D7D3E8E6 F0F0F2F1*
02E3E7E3 40000460 40400038 40400001 7000D2CC 7800D298 33007000
D2AC7800 D28C3300 7000D2B4 7800D288 33007000 D2B87800 D2987000
D2B07800 D2847000 D2BC7800 D2907000 D7D3E8E6 F0F0F2F2*
02E3E7E3 40000498 40400038 40400001 D2C458F0 D3944110 D08805EF
41E00004 15FE4720 D44458EF D04C07FE 7800D288 7000D2C4 58F0D394
4110D0D0 05EF41E0 000415FE 4720D466 D7D3E8E6 F0F0F2F3*
02E3E7E3 400004D0 40400038 40400001 58EFD054 07FE7800 D2807000
D2C458F0 D3944110 D11805EF 41E00004 15FE4720 D48858EF D05C07FE
7800D2BC 7000D2C0 58F0D390 4110D160 D7D3E8E6 F0F0F2F4*
02E3E7E3 40000508 40400038 40400001 05EF7800 D2C07B00 D2787000
D2C058F0 D3904110 D16005EF 7800D27C 7000D2C4 5800D2D0 12004780
D5325890 D24C18A7 410AB000 5000D170 D7D3E8E6 F0F0F2F5*
02E3E7E3 40000540 40400038 40400001 58F0D3A4 4110D170 05EF5000
D2C8410A B0005000 D19058F0 D3944110 D17805EF 41E00004 15FE4720
D50058EF D06407FE 7800D2C4 7B00D278 D7D3E8E6 F0F0F2F6*
02E3E7E3 40000578 40400038 40400001 7000D2C4 7800D2C0 7B00D278
7000D2C0 58F0D390 4110D160 05EF5A90 D24C5AA0 D2605990 D2D047C0
D4C858F0 D3904110 D1C005EF 58F0D390 D7D3E8E6 F0F0F2F7*
02E3E7E3 400005B0 40400038 40400001 4110D1D0 05EF58F0 D3904110
D1E005EF 58F0D390 4110D1F0 05EF7800 D29C3300 7000D3B0 58F0D394
4110D200 05EF41E0 000415FE 4720D57E D7D3E8E6 F0F0F2F8*
02E3E7E3 400005E8 40400038 40400001 58EFD06C 07FE1BFF 58E0D000
07FE58F0 D3A01800 45E0F004 00000006 00000028 45E0F010 1BFF58E0
D00007FE 58D0D004 58E0D00C 92FFD00C D7D3E8E6 F0F0F2F9*
02E3E7E3 40000620 40400032 40400001 982CD01C 07FE5870 10045820
70005020 D2D05820 10004130 20004150 00011B25 5C40D260 1B255020
D3885030 D38C47F0 D3B84040 40404040 D7D3E8E6 F0F0F3F0**
02E3E7E3 40000020 40400008 40400001 00000626 00000070 40404040
40404040 40404040 40404040 40404040 40404040 40404040 40404040
40404040 40404040 40404040 40404040 D7D3E8E6 F0F0F3F1*
02E3E7E3 40000070 40400004 40400001 00000614 40404040 40404040
40404040 40404040 40404040 40404040 40404040 40404040 40404040
40404040 40404040 40404040 40404040 D7D3E8E6 F0F0F3F2*
02E3E7E3 400000BC 4040000C 40400001 000004B4 000005F6 000004D6
40404040 40404040 40404040 40404040 40404040 40404040 40404040

```
40404040  40404040  40404040  40404040  D7D3E8E6  F0F0F3F3*
02D9D3C4  40404040  40400038  40404040  00090001  1C000414  00010001
0C000604  00010001  0C000020  00010001  0C000024  00010001  0C000070
00010001  0C0000BC  00010001  0C0000C0  D7D3E8E6  F0F0F3F4*
02E3E7E3  400000C8  4040001C  40400001  000005F6  000004F8  000005F6
00000570  000005F6  000005EE  000005F6  40404040  40404040  40404040
40404040  40404040  40404040  40404040  D7D3E8E6  F0F0F3F5*
02D9D3C4  40404040  40400038  40404040  00010001  0C0000C4  00010001
0C0000C8  00010001  0C0000CC  00010001  0C0000D0  00010001  0C0000D4
00010001  0C0000D8  00010001  0C0000DC  D7D3E8E6  F0F0F3F6*
02E3E7E3  400000E4  40400004  40400001  000002C4  40404040  40404040
40404040  40404040  40404040  40404040  40404040  40404040  40404040
40404040  40404040  40404040  40404040  D7D3E8E6  F0F0F3F7*
02E3E7E3  400000EC  40400018  40400001  80000014  800003E0  800003CC
0000033C  00000334  000002B8  40404040  40404040  40404040  40404040
40404040  40404040  40404040  40404040  D7D3E8E6  F0F0F3F8*
02D9D3C4  40404040  40400038  40404040  00010001  0C0000E0  00010001
0C0000E4  00020001  0C0000EC  00010001  0C0000F0  00010001  0C0000F4

MEMBER NAME  PLYWRN
00010001  0C0000F8  00010001  0C0000FC  D7D3E8E6  F0F0F3F9*
02E3E7E3  40000104  4040001C  40400001  000002D8  000002E0  000002DC
00000370  000002B8  000002B8  000002B8  40404040  40404040  40404040
40404040  40404040  40404040  40404040  D7D3E8E6  F0F0F4F0**
02D9D3C4  40404040  40400038  40404040  00010001  0C000100  00010001
0C000104  00010001  0C000108  00010001  0C00010C  00010001  0C000110
00010001  0C000114  00010001  0C000118  D7D3E8E6  F0F0F4F1*
02E3E7E3  40000120  4040001C  40400001  000002B8  000002BC  000002C0
000002B8  000002B8  000002E0  000002E4  40404040  40404040  40404040
40404040  40404040  40404040  40404040  D7D3E8E6  F0F0F4F2*
02D9D3C4  40404040  40400038  40404040  00010001  0C00011C  00010001
0C000120  00010001  0C000124  00010001  0C000128  00010001  0C00012C
00010001  0C000130  00010001  0C000134  D7D3E8E6  F0F0F4F3*
02E3E7E3  4000013C  4040001C  40400001  800002B8  0000033C  00000334
000002B8  000002C8  000002E0  000002DC  40404040  40404040  40404040
40404040  40404040  40404040  40404040  D7D3E8E6  F0F0F4F4*
02D9D3C4  40404040  40400038  40404040  00010001  0C000138  00010001
0C00013C  00010001  0C000140  00010001  0C000144  00010001  0C000148
00010001  0C00014C  00010001  0C000150  D7D3E8E6  F0F0F4F5*
02E3E7E3  40000158  4040001C  40400001  00000060  000002B8  000002B8
000002B8  000002B8  000002BC  000002C0  40404040  40404040  40404040
40404040  40404040  40404040  40404040  D7D3E8E6  F0F0F4F6*
02D9D3C4  40404040  40400038  40404040  00010001  0C000154  00010001
0C000158  00010001  0C00015C  00010001  0C000160  00010001  0C000164
00010001  0C000168  00010001  0C00016C  D7D3E8E6  F0F0F4F7*
02E3E7E3  40000174  4040001C  40400001  000002B8  000002B8  000002E0
000002E4  800002B8  0000033C  00000334  40404040  40404040  40404040
40404040  40404040  40404040  40404040  D7D3E8E6  F0F0F4F8*
02D9D3C4  40404040  40400038  40404040  00010001  0C000170  00010001
0C000174  00010001  0C000178  00010001  0C00017C  00010001  0C000180
00010001  0C000184  00010001  0C000188  D7D3E8E6  F0F0F4F9*
02E3E7E3  40000190  4040001C  40400001  000002B8  000002CC  000002E0
000002DC  00000350  000002B8  000002B8  40404040  40404040  40404040
40404040  40404040  40404040  40404040  D7D3E8E6  F0F0F5F0**
02D9D3C4  40404040  40400038  40404040  00010001  0C00018C  00010001
0C000190  00010001  0C000194  00010001  0C000198  00010001  0C00019C
00010001  0C0001A0  00010001  0C0001A4  D7D3E8E6  F0F0F5F1*
02E3E7E3  400001AC  4040001C  40400001  000002B8  000002B8  000002BC
000002C0  000002B8  000002B8  000002E0  40404040  40404040  40404040
```

```
40404040  40404040  40404040  40404040  D7D3E8E6  F0F0F5F2*
02D9D3C4  40404040  40400038  40404040  00010001  0C0001A8  00010001
0C0001AC  00010001  0C0001B0  00010001  0C0001B4  00010001  0C0001B8
00010001  0C0001BC  00010001  0C0001C0  D7D3E8E6  F0F0F5F3*
02E3E7E3  400001C8  40400018  40400001  000002E4  800002B8  0000031C
00000330  00000320  80000330  40404040  40404040  40404040  40404040
40404040  40404040  40404040  40404040  D7D3E8E6  F0F0F5F4*
02E3E7E3  400001E4  40400004  40400001  800002D0  40404040  40404040
40404040  40404040  40404040  40404040  40404040  40404040  40404040
40404040  40404040  40404040  40404040  D7D3E8E6  F0F0F5F5*
02D9D3C4  40404040  40400038  40404040  00010001  0C0001C4  00010001
0C0001C8  00010001  0C0001CC  00010001  0C0001D0  00010001  0C0001D4
00010001  0C0001D8  00010001  0C0001DC  D7D3E8E6  F0F0F5F6*
02E3E7E3  400001E8  40400018  40400001  0000033C  00000334  000002B8
00000338  000002E0  000002DC  40404040  40404040  40404040  40404040
40404040  40404040  40404040  40404040  D7D3E8E6  F0F0F5F7*
02E3E7E3  40000204  40400004  40400001  000002B8  40404040  40404040
40404040  40404040  40404040  40404040  40404040  40404040  40404040
40404040  40404040  40404040  40404040  D7D3E8E6  F0F0F5F8*

MEMBER NAME  PLYWRN
02D9D3C4  40404040  40400038  40404040  00010001  0C0001E4  00010001
0C0001E8  00010001  0C0001EC  00010001  0C0001F0  00010001  0C0001F4
00010001  0C0001F8  00010001  0C0001FC  D7D3E8E6  F0F0F5F9*
02E3E7E3  40000208  4040001C  40400001  000002B8  000002B8  000002B8
000002BC  000002C0  000002B8  000002B8  40404040  40404040  40404040
40404040  40404040  40404040  40404040  D7D3E8E6  F0F0F6F0**
02D9D3C4  40404040  40400038  40404040  00010001  0C000204  00010001
0C000208  00010001  0C00020C  00010001  0C000210  00010001  0C000214
00010001  0C000218  00010001  0C00021C  D7D3E8E6  F0F0F6F1*
02E3E7E3  40000224  4040001C  40400001  000002E0  000002E4  800002B8
0000031C  0000032C  0000031C  80000330  40404040  40404040  40404040
40404040  40404040  40404040  40404040  D7D3E8E6  F0F0F6F2*
02D9D3C4  40404040  40400038  40404040  00010001  0C000220  00010001
0C000224  00010001  0C000228  00010001  0C00022C  00010001  0C000230
00010001  0C000234  00010001  0C000238  D7D3E8E6  F0F0F6F3*
02E3E7E3  40000240  4040001C  40400001  00000324  0000032C  00000324
80000330  00000328  0000032C  00000328  40404040  40404040  40404040
40404040  40404040  40404040  40404040  D7D3E8E6  F0F0F6F4*
02D9D3C4  40404040  40400038  40404040  00010001  0C00023C  00010001
0C000240  00010001  0C000244  00010001  0C000248  00010001  0C00024C
00010001  0C000250  00010001  0C000254  D7D3E8E6  F0F0F6F5*
02E3E7E3  4000025C  4040001C  40400001  80000330  00000320  0000032C
00000320  80000330  00000420  000002F0  40404040  40404040  40404040
40404040  40404040  40404040  40404040  D7D3E8E6  F0F0F6F6*
02D9D3C4  40404040  40400038  40404040  00010001  0C000258  00010001
0C00025C  00010001  0C000260  00010001  0C000264  00010001  0C000268
00010001  0C00026C  00010001  0C000270  D7D3E8E6  F0F0F6F7*
02E3E7E3  40000278  4040001C  40400001  000002B8  000002C8  000002E0
000002DC  00000050  000002B8  000002B8  40404040  40404040  40404040
40404040  40404040  40404040  40404040  D7D3E8E6  F0F0F6F8*
02D9D3C4  40404040  40400038  40404040  00010001  0C000274  00010001
0C000278  00010001  0C00027C  00010001  0C000280  00010001  0C000284
00010001  0C000288  00010001  0C00028C  D7D3E8E6  F0F0F6F9*
02E3E7E3  40000294  4040001C  40400001  000002B8  000002B8  000002BC
000002C0  000002B8  000002B8  000002E0  40404040  40404040  40404040
40404040  40404040  40404040  40404040  D7D3E8E6  F0F0F7F0**
02D9D3C4  40404040  40400038  40404040  00010001  0C000290  00010001
0C000294  00010001  0C000298  00010001  0C00029C  00010001  0C0002A0
```

| | | | | | | |
|---|---|---|---|---|---|---|
| 00010001 | 0C0002A4 | 00010001 | 0C0002A8 | D7D3E8E6 | F0F0F7F1* | |
| 02E3E7E3 | 400002B0 | 40400008 | 40400001 | 000002E4 | 800002B8 | 40404040 |
| 40404040 | 40404040 | 40404040 | 40404040 | 40404040 | 40404040 | 40404040 |
| 40404040 | 40404040 | 40404040 | 40404040 | D7D3E8E6 | F0F0F7F2* | |
| 02E3E7E3 | 40000418 | 40400010 | 40400001 | 00000000 | 00000000 | 00000000 |
| 00000000 | 40404040 | 40404040 | 40404040 | 40404040 | 40404040 | 40404040 |
| 40404040 | 40404040 | 40404040 | 40404040 | D7D3E8E6 | F0F0F7F3* | |
| 02D9D3C4 | 40404040 | 40400018 | 40404040 | 00010001 | 0C0002AC | 00010001 |
| 0C0002B0 | 00010001 | 0C0002B4 | 40404040 | 40404040 | 40404040 | 40404040 |
| 40404040 | 40404040 | 40404040 | 40404040 | D7D3E8E6 | F0F0F7F4* | |
| 02C5D5C4 | 40404040 | 40404040 | 40404040 | 40404040 | 40404040 | 40404040 |
| 00000652 | F1F5F7F3 | F460C6D6 | F34040F0 | F2F0F2F8 | F7F0F9F8 | 40F0F84B |
| F4F14BF5 | F0404040 | D7D3E8E6 | D9D54040 | D7D3E8E6 | F0F0F7F5** | |

MEMBER NAME POINTS

| | | | | | | |
|---|---|---|---|---|---|---|
| 02C5E2C4 | 40404040 | 40400010 | 40400001 | D7D6C9D5 | E3E24040 | 00000000 |
| 40000000 | 40404040 | 40404040 | 40404040 | 40404040 | 40404040 | 40404040 |
| 40404040 | 40404040 | 40404040 | 40404040 | D7D6C9D5 | F0F0F0F1* | |
| 02E3E7E3 | 40000000 | 40400038 | 40400001 | 47F0F00C | 07D7D6C9 | D5E3E240 |
| 90ECD00C | 184D98CD | F0205040 | D00450D0 | 400807FC | 40404040 | 40404040 |
| 021A2640 | C9D5E5C1 | D3C9C440 | C7C5D5C5 | D7D6C9D5 | F0F0F0F2* | |
| 02E3E7E3 | 40000038 | 40400038 | 40400001 | D9C9C340 | E3E8D7C5 | 40C9D540 |
| D7D6C9D5 | E3E2406B | 40C7E37E | 400A0702 | 1A07C9D3 | D6C3407E | 40100322 |
| 021A2340 | C5D9D9D6 | D9407A40 | C3C8C1C9 | D7D6C9D5 | F0F0F0F3* | |
| 02E3E7E3 | 40000070 | 40400038 | 40400001 | D5C9D5C7 | 40C9D540 | D7D6C9D5 |
| E3E240D9 | D6E4E3C9 | D5C52202 | 1A2A40C5 | D9D9D6D9 | 7A40C7E3 | D7E3E240 |
| C1D9D9C1 | E840C6E4 | D3D340C9 | D540D7D6 | D7D6C9D5 | F0F0F0F4* | |
| 02E3E7E3 | 400000A8 | 4040000D | 40400001 | C9D5E3E2 | 40D9D6E4 | E3C9D5C5 |
| 22404040 | 40404040 | 40404040 | 40404040 | 40404040 | 40404040 | 40404040 |
| 40404040 | 40404040 | 40404040 | 40404040 | D7D6C9D5 | F0F0F0F5* | |
| 02E3E7E3 | 40000190 | 40400038 | 40400001 | 00000000 | 00000000 | 4F080000 |
| 00000000 | 00000001 | 00000002 | 00000003 | 00000004 | 00000005 | 00000007 |
| 00000008 | 00000009 | 0000000B | 0000000E | D7D6C9D5 | F0F0F0F6* | |
| 02C5E2C4 | 40404040 | 40400010 | 40400002 | D7E3D3D5 | 40404040 | 02000000 |
| 40000000 | 40404040 | 40404040 | 40404040 | 40404040 | 40404040 | 40404040 |
| 40404040 | 40404040 | 40404040 | 40404040 | D7D6C9D5 | F0F0F0F7* | |
| 02E3E7E3 | 400001C8 | 4040000C | 40400001 | 00021054 | 00000000 | 00000000 |
| 40404040 | 40404040 | 40404040 | 40404040 | 40404040 | 40404040 | 40404040 |
| 40404040 | 40404040 | 40404040 | 40404040 | D7D6C9D5 | F0F0F0F8* | |
| 02E3E7E3 | 40000238 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D7D6C9D5 | F0F0F0F9* | |
| 02C5E2C4 | 40404040 | 40400010 | 40400003 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D7D6C9D5 | F0F0F1F0** | |
| 02E3E7E3 | 40000244 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D6C9D5 | F0F0F1F1* | |
| 02C5E2C4 | 40404040 | 40400010 | 40400004 | D7E3C1D9 | C3404040 | 02000000 |
| 40000000 | 40404040 | 40404040 | 40404040 | 40404040 | 40404040 | 40404040 |
| 40404040 | 40404040 | 40404040 | 40404040 | D7D6C9D5 | F0F0F1F2* | |
| 02C5E2C4 | 40404040 | 40400010 | 40400005 | D7E3E2D7 | D3404040 | 02000000 |
| 40000000 | 40404040 | 40404040 | 40404040 | 40404040 | 40404040 | 40404040 |
| 40404040 | 40404040 | 40404040 | 40404040 | D7D6C9D5 | F0F0F1F3* | |
| 02E3E7E3 | 4000024C | 40400010 | 40400001 | 00000000 | 00000000 | 00000000 |
| 00000000 | 40404040 | 40404040 | 40404040 | 40404040 | 40404040 | 40404040 |
| 40404040 | 40404040 | 40404040 | 40404040 | D7D6C9D5 | F0F0F1F4* | |
| 02C5E2C4 | 40404040 | 40400010 | 40400006 | C9C2C3D6 | D47B4040 | 02000000 |
| 40000000 | 40404040 | 40404040 | 40404040 | 40404040 | 40404040 | 40404040 |

| | | | | | | |
|---|---|---|---|---|---|---|
| 40404040 | 40404040 | 40404040 | 40404040 | D7D6C9D5 | F0F0F1F5* | |
| 02E3E7E3 | 40000260 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D6C9D5 | F0F0F1F6* | |
| 02C5E2C4 | 40404040 | 40400010 | 40400007 | D7D9D6D1 | D3D54040 | 02000000 |
| 40000000 | 40404040 | 40404040 | 40404040 | 40404040 | 40404040 | 40404040 |
| 40404040 | 40404040 | 40404040 | 40404040 | D7D6C9D5 | F0F0F1F7* | |
| 02E3E7E3 | 40000268 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | D7D6C9D5 | F0F0F1F8* | |
| 02E3E7E3 | 400002DC | 40400038 | 40400001 | 5880D1A8 | 5890D184 | 58A0D0E8 |
| 50A0D120 | 5800D0F4 | 5000D204 | 5800D100 | 5000D20C | 5800D0F4 | 5000D1C0 |
| 5800D1DC | 5000D1C8 | 5800D100 | 5000D1CC | D7D6C9D5 | F0F0F1F9* | |
| 02E3E7E3 | 40000314 | 40400038 | 40400001 | 5000D214 | 5000D218 | 5800D21C |

MEMBER NAME POINTS

| | | | | | | |
|---|---|---|---|---|---|---|
| 5000D208 | 5800D220 | 5000D210 | 58B0D18C | 58E0D208 | 585EB000 | 5050D130 |
| 58E0D210 | 582EB000 | 18755C60 | D1DC1837 | D7D6C9D5 | F0F0F2F0** | |
| 02E3E7E3 | 4000034C | 40400038 | 40400001 | 5A30D0F4 | 2B007803 | 80006A00 |
| D0E06000 | D0D85800 | D0DC5000 | D14C1837 | 5A30D1F4 | 4100D168 | 5000D080 |
| 41038000 | 5000D084 | 9280D084 | 58F0D194 | D7D6C9D5 | F0F0F2F1* | |
| 02E3E7E3 | 40000384 | 40400038 | 40400001 | 4110D07C | 05EF5870 | D1585C60 |
| D1001847 | 5A40D0F4 | 41049000 | 5000D080 | 41038000 | 5000D084 | 9280D084 |
| 58F0D194 | 4110D07C | 05EF58E0 | D2085800 | D7D6C9D5 | F0F0F2F2* | |
| 02E3E7E3 | 400003BC | 40400038 | 40400001 | D158500E | B0001A0A | 5000D158 |
| 50A0D11C | 5800D218 | 5A00D0F4 | 5000D1E0 | 5C40D1DC | 18055A00 | D0F45000 |
| D1C41805 | 5A00D1E4 | 5000D1F8 | 18055A00 | D7D6C9D5 | F0F0F2F3* | |
| 02E3E7E3 | 400003F4 | 40400038 | 40400001 | D1E85000 | D1FC5A50 | D1EC5050 |
| D20018B2 | 58E0D1C4 | 2B00780E | 80006A00 | D0E06000 | D0D85820 | D0DC5020 |
| D154192A | 4780D3BC | 5920D0F0 | 4780D4FC | D7D6C9D5 | F0F0F2F4* | |
| 02E3E7E3 | 4000042C | 40400038 | 40400001 | 5920D0F4 | 4780D526 | 58F0D1B0 |
| 45E0F004 | 00000006 | 00000028 | 5850D130 | 5C40D1DC | 5830D0F4 | 1A3545E0 |
| F0080473 | 800045E0 | F0080450 | D13045E0 | D7D6C9D5 | F0F0F2F5* | |
| 02E3E7E3 | 40000464 | 40400038 | 40400001 | F01058F0 | D1B045E0 | F0340540 |
| 4040F1F5 | 58E0D1C4 | 410E8000 | 5000D08C | 58F0D180 | 4110D088 | 05EF41E0 |
| 000415FE | 4720D3E2 | 58EFD04C | 07FE58E0 | D7D6C9D5 | F0F0F2F6* | |
| 02E3E7E3 | 4000049C | 40400038 | 40400001 | D1E05820 | D15858F0 | D18C5B2E |
| F0005920 | D0F04750 | D5E25830 | D1301B3A | 5C20D1C8 | 5A30D1C0 | 2B007803 |
| 80006A00 | D0E06000 | D0D85820 | D0DC192A | D7D6C9D5 | F0F0F2F7* | |
| 02E3E7E3 | 400004D4 | 40400038 | 40400001 | 4770D5E2 | 5830D158 | 5B30D0F0 |
| 5850D158 | 5B50D0EC | 5050D140 | 5870D158 | 1B7A5070 | D1385C40 | D1CC1825 |
| 5A20D1C0 | 5020D1D0 | 41029000 | 5000D0A0 | D7D6C9D5 | F0F0F2F8* | |
| 02E3E7E3 | 4000050C | 40400038 | 40400001 | 9280D0A0 | 58F0D194 | 4110D098 |
| 05EF5C20 | D1CC1853 | 5A50D1C0 | 18435A40 | D1CC5C60 | D1CC1837 | 5A30D1C0 |
| 5030D1D4 | 18275A20 | D1CC4105 | 90005000 | D7D6C9D5 | F0F0F2F9* | |
| 02E3E7E3 | 40000544 | 40400038 | 40400001 | D0A84104 | 90005000 | D0AC4103 |
| 90005000 | D0B04102 | 90005000 | D0B49280 | D0B458F0 | D1B44110 | D0A405EF |
| 41E00008 | 15FE4720 | D4C458EF | D05407FE | D7D6C9D5 | F0F0F3F0** | |
| 02E3E7E3 | 4000057C | 40400038 | 40400001 | 47F0D5E2 | 58E0D1D0 | 410E9000 |
| 5000D080 | 58E0D1D4 | 410E9000 | 5000D084 | 9280D084 | 58F0D194 | 4110D07C |
| 05EF5800 | D1581B0A | 5000D158 | 47F0D5E2 | D7D6C9D5 | F0F0F3F1* | |
| 02E3E7E3 | 400005B4 | 40400038 | 40400001 | 58E0D1C4 | 410E8000 | 5000D08C |
| 58F0D198 | 4110D088 | 05EF41E0 | 000415FE | 4720D522 | 58EFD060 | 07FE47F0 |
| D5E258E0 | D1F82B00 | 780E8000 | 6A00D0E0 | D7D6C9D5 | F0F0F3F2* | |
| 02E3E7E3 | 400005EC | 40400038 | 40400001 | 6000D0D8 | 5830D0DC | 58E0D1FC |
| 2B00780E | 80006A00 | D0E06000 | D0D85850 | D0DC58E0 | D2002B00 | 780E8000 |
| 6A00D0E0 | 6000D0D8 | 5800D0DC | 5000D12C | D7D6C9D5 | F0F0F3F3* | |
| 02E3E7E3 | 40000624 | 40400038 | 40400001 | 5C20D1F0 | 5A30D1C0 | 5C40D1F4 |
| 18255A20 | D1C058E0 | D1C4410E | 80005000 | D0BC58F0 | D1A04103 | F0005000 |

```
D0C058F0  D1B84102  F0005000  D0CC58F0  D7D6C9D5  F0F0F3F4*
02E3E7E3  4000065C  4040002C  40400001  D19C4110  D0B805EF  41E00004
15FE4720  D5BC58EF  D06807FE  47F0D5E2  58F0D1B0  45E0F004  00000006
00000060  40404040  40404040  40404040  D7D6C9D5  F0F0F3F5*
02D9D3C4  40404040  40400038  40404040  00020001  1C000238  00030001
1C00024C  00040001  1C000250  00050001  1C000254  00060001  1C000268
00070001  1C00026C  00010001  0C000440  D7D6C9D5  F0F0F3F6*
02E3E7E3  40000688  40400038  40400001  45E0F010  58F0D1B0  45E0F034
05404040  F1F55800  D1301A0A  5000D130  5800D200  5A00D1DC  5000D200
5800D1FC  5A00D1DC  5000D1FC  5800D1F8  D7D6C9D5  F0F0F3F7*
02E3E7E3  400006C0  40400038  40400001  5A00D1DC  5000D1F8  5800D1C4
5A00D1DC  5000D1C4  5800D158  5900D110  47C0D64A  58F0D1B0  45E0F004
00000006  00000087  45E0F010  58F0D1B0  D7D6C9D5  F0F0F3F8*
02E3E7E3  400006F8  40400038  40400001  45E0F034  05404040  F4F45820
D11C1A2A  5020D11C  192B47C0  D34C58B0  D18C59A0  D1544770  D70E59A0

MEMBER NAME  POINTS
D14C4770  D70E5830  D1585B30  D0EC58E0  D7D6C9D5  F0F0F3F9*
02E3E7E3  40000730  40400038  40400001  D208585E  B0001875  1A7A5C40
D20C1825  5A20D204  41029000  5000D0A0  9280D0A0  58F0D194  4110D098
05EF5C20  D20C1853  5A50D204  18435A40  D7D6C9D5  F0F0F4F0**
02E3E7E3  40000768  40400038  40400001  D20C5C60  D20C1837  5A30D204
18275A20  D20C4105  90005000  D0A84104  90005000  D0AC4103  90005000
D0B04102  90005000  D0B49280  D0B458F0  D7D6C9D5  F0F0F4F1*
02E3E7E3  400007A0  40400038  40400001  D1B44110  D0A405EF  41E00008
15FE4720  D70058EF  D07007FE  47F0D70E  5800D158  1B0A5000  D15858E0
D208582E  B0001872  5C60D20C  18475A40  D7D6C9D5  F0F0F4F2*
02E3E7E3  400007D8  40400038  40400001  D2045870  D1581B7A  5C60D20C
18375A30  D2044104  90005000  D0804103  90005000  D0849280  D08458F0
D1944110  D07C05EF  13225A20  D15858E0  D7D6C9D5  F0F0F4F3*
02E3E7E3  40000810  40400038  40400001  D210502E  B0005820  D1201A2A
5020D120  5800D218  5A00D100  5000D218  5800D210  5A00D100  5000D210
5800D208  5A00D100  5000D208  5920D144  D7D6C9D5  F0F0F4F4*
02E3E7E3  40000848  40400038  40400001  47C0D278  1BFF58E0  D00007FE
58A0D004  58E0A00C  58B0A018  5810B024  5820D158  50201000  18DA92FF
A00C982C  A01C07FE  987B1004  58207000  D7D6C9D5  F0F0F4F5*
02E3E7E3  40000880  40400038  40400001  5020D128  58209000  5020D150
987B1014  58207000  5020D144  58209000  5020D15C  58701024  58207000
5020D158  58201000  41302000  41500004  D7D6C9D5  F0F0F4F6*
02E3E7E3  400008B8  40400038  40400001  1B255C40  D10C1B25  5020D1A8
5030D1AC  58201008  41302000  41500004  1B255C40  D1081B25  5020D1A0
5030D1A4  58201010  41302000  41500004  D7D6C9D5  F0F0F4F7*
02E3E7E3  400008F0  40400038  40400001  1B255C40  D0EC1B25  5020D18C
5030D190  58201018  41302000  41500004  1B255C40  D0F81B25  5020D1B8
5030D1BC  58201020  41302000  41500004  D7D6C9D5  F0F0F4F8*
02E3E7E3  40000928  4040001C  40400001  1B255C40  D0EC1B25  5020D184
5030D188  5030D090  5030D0C4  47F0D224  40404040  40404040  40404040
40404040  40404040  40404040  40404040  D7D6C9D5  F0F0F4F9*
02E3E7E3  40000020  40400008  40400001  00000878  000000B8  40404040
40404040  40404040  40404040  40404040  40404040  40404040  40404040
40404040  40404040  40404040  40404040  D7D6C9D5  F0F0F5F0**
02E3E7E3  400000B8  40400004  40400001  00000854  40404040  40404040
40404040  40404040  40404040  40404040  40404040  40404040  40404040
40404040  40404040  40404040  40404040  D7D6C9D5  F0F0F5F1*
02E3E7E3  40000104  4040000C  40400001  0000049A  00000678  0000057C
40404040  40404040  40404040  40404040  40404040  40404040  40404040
40404040  40404040  40404040  40404040  D7D6C9D5  F0F0F5F2*
02D9D3C4  40404040  40400038  40404040  00010001  0C000684  00010001
0C0006EC  00010001  0C000020  00010001  0C000024  00010001  0C0000B8
```

```
00010001  0C000104  00010001  0C000108  D7D6C9D5  F0F0F5F3*
02E3E7E3  40000110  4040001C  40400001  00000580  0000069A  000005DA
00000678  00000674  00000678  000007B8  40404040  40404040  40404040
40404040  40404040  40404040  40404040  D7D6C9D5  F0F0F5F4*
02D9D3C4  40404040  40400038  40404040  00010001  0C00010C  00010001
0C000110  00010001  0C000114  00010001  0C000118  00010001  0C00011C
00010001  0C000120  00010001  0C000124  D7D6C9D5  F0F0F5F5*
02E3E7E3  4000012C  4040000C  40400001  000007BC  000007C6  000001B8
40404040  40404040  40404040  40404040  40404040  40404040  40404040
40404040  40404040  40404040  40404040  D7D6C9D5  F0F0F5F6*
02E3E7E3  4000013C  40400008  40400001  80000000  00000220  40404040
40404040  40404040  40404040  40404040  40404040  40404040  40404040
40404040  40404040  40404040  40404040  D7D6C9D5  F0F0F5F7*
02E3E7E3  4000014C  4040000C  40400001  80000210  000001B8  00000228
40404040  40404040  40404040  40404040  40404040  40404040  40404040
40404040  40404040  40404040  40404040  D7D6C9D5  F0F0F5F8*

MEMBER NAME  POINTS
02D9D3C4  40404040  40400038  40404040  00010001  0C000128  00010001
0C00012C  00010001  0C000130  00010001  0C000134  00010001  0C000140
00010001  0C00014C  00010001  0C000150  D7D6C9D5  F0F0F5F9*
02E3E7E3  40000158  40400008  40400001  80000000  00000228  40404040
40404040  40404040  40404040  40404040  40404040  40404040  40404040
40404040  40404040  40404040  40404040  D7D6C9D5  F0F0F6F0**
02E3E7E3  4000016C  40400008  40400001  80000000  00000220  40404040
40404040  40404040  40404040  40404040  40404040  40404040  40404040
40404040  40404040  40404040  40404040  D7D6C9D5  F0F0F6F1*
02E3E7E3  40000180  40400004  40400001  00000210  40404040  40404040
40404040  40404040  40404040  40404040  40404040  40404040  40404040
40404040  40404040  40404040  40404040  D7D6C9D5  F0F0F6F2*
02E3E7E3  40000188  40400004  40400001  800001E4  40404040  40404040
40404040  40404040  40404040  40404040  40404040  40404040  40404040
40404040  40404040  40404040  40404040  D7D6C9D5  F0F0F6F3*
02E3E7E3  40000278  40400038  40400001  00000000  00000000  00000000
00000000  00000000  00000000  00000000  00000038  00000000  00000024
0000001C  00000020  0000002C  00000014  D7D6C9D5  F0F0F6F4*
02E3E7E3  400002B0  4040002C  40400001  00000000  00000005  00000000
00B00005  00000005  00000000  00D80006  00BC0006  00C00006  0000000C
00000010  40404040  40404040  40404040  D7D6C9D5  F0F0F6F5*
02D9D3C4  40404040  40400028  40404040  00010001  0C000154  00010001
0C00015C  00010001  0C000170  00010001  0C000180  00010001  0C000188
40404040  40404040  40404040  40404040  D7D6C9D5  F0F0F6F6*
02C5D5C4  40404040  40404040  40404040  40404040  40404040  40404040
00000944  F1F5F7F3  F460C6D6  F34040F0  F2F0F2F8  F7F0F9F8  40F0F84B
F4F14BF5  F6404040  D7D6C9D5  E3E24040  D7D6C9D5  F0F0F6F7**

MEMBER NAME  PRCDRV
02C5E2C4  40404040  40400010  40400001  D7D9C3C4  D9E54040  00000000
40000000  40404040  40404040  40404040  40404040  40404040  40404040
40404040  40404040  40404040  40404040  D7D9C3C4  F0F0F0F1*
02E3E7E3  40000000  40400028  40400001  47F0F00C  07D7D9C3  C4D9E540
90ECD00C  184D98CD  F0205040  D00450D0  400807FC  40404040  40404040
40404040  40404040  40404040  40404040  D7D9C3C4  F0F0F0F2*
02E3E7E3  40000088  40400014  40400001  00000000  00000001  00000002
00000000  00000000  40404040  40404040  40404040  40404040  40404040
40404040  40404040  40404040  40404040  D7D9C3C4  F0F0F0F3*
02E3E7E3  400000C0  40400004  40400001  00000000  40404040  40404040
40404040  40404040  40404040  40404040  40404040  40404040  40404040
40404040  40404040  40404040  40404040  D7D9C3C4  F0F0F0F4*
```

```
02E3E7E3  400000C8  40400004  40400001  00000000  40404040  40404040
40404040  40404040  40404040  40404040  40404040  40404040  40404040
40404040  40404040  40404040  40404040  D7D9C3C4  F0F0F0F5*
02C5E2C4  40404040  40400010  40400002  D7C9C5D9  C3C54040  02000000
40000000  40404040  40404040  40404040  40404040  40404040  40404040
40404040  40404040  40404040  40404040  D7D9C3C4  F0F0F0F6*
02E3E7E3  400000D0  40400004  40400001  00000000  40404040  40404040
40404040  40404040  40404040  40404040  40404040  40404040  40404040
40404040  40404040  40404040  40404040  D7D9C3C4  F0F0F0F7*
02E3E7E3  400000D8  40400004  40400001  00000000  40404040  40404040
40404040  40404040  40404040  40404040  40404040  40404040  40404040
40404040  40404040  40404040  40404040  D7D9C3C4  F0F0F0F8*
02E3E7E3  40000100  40400038  40400001  5830D0A8  58A0D098  58B0D0A0
5890D064  5800D060  5000D078  58E0D0C8  585EB000  5C40D0B8  5820D0B4
1A254102  A0005000  D04C58E0  D0CC410E  D7D9C3C4  F0F0F0F9*
02E3E7E3  40000138  40400038  40400001  B0005000  D05058F0  D0B04110
D04C05EF  5800D07C  5000D078  12004780  D1365990  D07C4770  D13E1BFF
58E0D000  07FE5990  D0804780  D1D45860  D7D9C3C4  F0F0F1F0**
02E3E7E3  40000170  40400038  40400001  D0D45870  D0D05880  D0685857
B0005C40  D0B81825  5A20D0B4  4102A000  5000D04C  4106B000  5000D050
58F0D0B0  4110D04C  05EF5800  D07C5900  D7D9C3C4  F0F0F1F1*
02E3E7E3  400001A8  40400038  40400001  D0684770  D18E5800  D0605000
D0785990  D07C4770  D19A5090  D0785990  D07C4770  D1A647F0  D1B25800
D07C5900  D0684770  D1BA1BFF  58E0D000  D7D9C3C4  F0F0F1F2*
02E3E7E3  400001E0  40400038  40400001  07FE1A89  5A60D0B8  5A70D0B8
5980D080  47C0D152  5800D068  5000D078  1BFF58E0  D00007FE  58A0D004
58E0A00C  58B0A018  5810B014  5820D078  D7D9C3C4  F0F0F1F3*
02E3E7E3  40000218  40400038  40400001  50201000  18DA92FF  A00C982C
A01C07FE  987A1008  58207000  5020D084  58209000  5020D080  5820A000
5020D078  58201000  41302000  41500004  D7D9C3C4  F0F0F1F4*
02E3E7E3  40000250  40400038  40400001  1B255020  D0A85030  D0AC5030
D0545820  10044130  20004150  00041B25  5C40D068  1B255020  D0985030
D09C5820  100C4130  20004150  00041B25  D7D9C3C4  F0F0F1F5*
02E3E7E3  40000288  40400012  40400001  5C40D068  1B255020  D0A05030
D0A447F0  D0D84040  40404040  40404040  40404040  40404040  40404040
40404040  40404040  40404040  40404040  D7D9C3C4  F0F0F1F6*
02E3E7E3  40000020  4040000C  40400001  00000228  00000028  00000204
40404040  40404040  40404040  40404040  40404040  40404040  40404040
40404040  40404040  40404040  40404040  D7D9C3C4  F0F0F1F7*
02E3E7E3  40000080  40400004  40400001  800000A4  40404040  40404040
40404040  40404040  40404040  40404040  40404040  40404040  40404040
40404040  40404040  40404040  40404040  D7D9C3C4  F0F0F1F8*
02E3E7E3  400000DC  40400024  40400001  00000004  00000008  00000000
00000000  00000000  0000000C  00000010  00000014  00000018  40404040
40404040  40404040  40404040  40404040  D7D9C3C4  F0F0F1F9*
02D9D3C4  40404040  40400028  40404040  00020001  1C0000D8  00010001

MEMBER NAME  PRCDRV
0C000020  00010001  0C000024  00010001  0C000028  00010001  0C000080
40404040  40404040  40404040  40404040  D7D9C3C4  F0F0F2F0**
02C5D5C4  40404040  40404040  40404040  40404040  40404040  40404040
0000029A  F1F5F7F3  F460C6D6  F34040F0  F2F0F2F8  F7F0F9F8  40F0F84B
F4F24BF0  F3404040  D7D9C3C4  D9E54040  D7D9C3C4  F0F0F2F1**

MEMBER NAME  PREBRK
02C5E2C4  40404040  40400010  40400001  D7D9C5C2  D9D24040  00000000
40000000  40404040  40404040  40404040  40404040  40404040  40404040
40404040  40404040  40404040  40404040  D7D9C5C2  F0F0F0F1*
02E3E7E3  40000000  40400028  40400001  47F0F00C  07D7D9C5  C2D9D240
```

```
90ECD00C  184D98CD  F0205040  D00450D0  400807FC  40404040  40404040
40404040  40404040  40404040  40404040  D7D9C5C2  F0F0F0F2*
02E3E7E3  40000078  4040001C  40400001  00000000  00000001  00000002
00000003  0000000E  00000000  00000000  40404040  40404040  40404040
40404040  40404040  40404040  40404040  D7D9C5C2  F0F0F0F3*
02E3E7E3  400000B8  40400004  40400001  00000000  40404040  40404040
40404040  40404040  40404040  40404040  40404040  40404040  40404040
40404040  40404040  40404040  40404040  D7D9C5C2  F0F0F0F4*
02E3E7E3  400000C0  40400004  40400001  00000000  40404040  40404040
40404040  40404040  40404040  40404040  40404040  40404040  40404040
40404040  40404040  40404040  40404040  D7D9C5C2  F0F0F0F5*
02E3E7E3  400000FC  40400038  40400001  7860D050  58A0D0A4  5800D054
5000D06C  5800D0CC  5000D0C4  5800D0D0  5000D0C8  5880D0BC  5890D0A0
58B0D090  58E0D0C4  585EB000  58E0D0C8  D7D9C5C2  F0F0F0F6*
02E3E7E3  40000134  40400038  40400001  587EB000  1C6A1C4A  18271A29
18351A39  189318B2  5880D098  70698000  879AD124  58B0D090  5890D0A0
5880D0BC  5820D06C  5A20D054  5020D06C  D7D9C5C2  F0F0F0F7*
02E3E7E3  4000016C  40400038  40400001  5800D0C8  1A085000  D0C85800
D0C41A08  5000D0C4  5920D07C  47C0D100  1BFF58E0  D00007FE  58D0D004
58E0D00C  92FFD00C  982CD01C  07FE9879  D7D9C5C2  F0F0F0F8*
02E3E7E3  400001A4  40400038  40400001  10045820  70005020  D0745820
90005020  D07C5820  10004130  20004150  00041B25  5C40D060  1B255020
D0985030  D09C5820  10084130  20004150  D7D9C5C2  F0F0F0F9*
02E3E7E3  400001DC  40400016  40400001  00041B25  5C40D05C  1B255020
D0905030  D09447F0  D0D44040  40404040  40404040  40404040  40404040
40404040  40404040  40404040  40404040  D7D9C5C2  F0F0F1F0**
02E3E7E3  40000020  4040000C  40400001  000001A2  00000028  00000190
40404040  40404040  40404040  40404040  40404040  40404040  40404040
40404040  40404040  40404040  40404040  D7D9C5C2  F0F0F1F1*
02E3E7E3  400000C8  40400034  40400001  00000008  00000038  00000000
00000000  00000000  00000000  00000004  0000000C  00000000  00000000
00000000  00000010  00000014  40404040  D7D9C5C2  F0F0F1F2*
02D9D3C4  40404040  40400018  40404040  00010001  0C000020  00010001
0C000024  00010001  0C000028  40404040  40404040  40404040  40404040
40404040  40404040  40404040  40404040  D7D9C5C2  F0F0F1F3*
02C5D5C4  40404040  40404040  40404040  40404040  40404040  40404040
000001F2  F1F5F7F3  F460C6D6  F34040F0  F2F0F2F8  F7F0F9F8  40F0F84B
F4F24BF0  F7404040  D7D9C5C2  D9D24040  D7D9C5C2  F0F0F1F4**
```

MEMBER NAME PROFIL

```
02C5E2C4  40404040  40400010  40400001  D7D9D6C6  C9D34040  00000000
40000000  40404040  40404040  40404040  40404040  40404040  40404040
40404040  40404040  40404040  40404040  D7D9D6C6  F0F0F0F1*
02E3E7E3  40000000  40400038  40400001  47F0F00C  07D7D9D6  C6C9D340
90ECD00C  184D98CD  F0205040  D00450D0  400807FC  40404040  40404040
C3D6D5C6  D3C9C3E3  C9D5C740  C5E7E3C5  D7D9D6C6  F0F0F0F2*
02E3E7E3  40000038  40400018  40400001  D9C9D6D9  E2404040  5C5C5C40
C3E4E340  D6E4E340  5C5C5C40  40404040  40404040  40404040  40404040
40404040  40404040  40404040  40404040  D7D9D6C6  F0F0F0F3*
02E3E7E3  40000188  40400038  40400001  00000000  00000000  00000001
00000001  00000002  00000003  00000004  00000008  0000000F  00000010
00000015  401DF3B6  4029FBE7  403EF9DB  D7D9D6C6  F0F0F0F4*
02E3E7E3  400001C0  40400008  40400001  00000000  00000000  40404040
40404040  40404040  40404040  40404040  40404040  40404040  40404040
40404040  40404040  40404040  40404040  D7D9D6C6  F0F0F0F5*
02E3E7E3  40000260  40400004  40400001  00000000  40404040  40404040
40404040  40404040  40404040  40404040  40404040  40404040  40404040
40404040  40404040  40404040  40404040  D7D9D6C6  F0F0F0F6*
02E3E7E3  40000268  40400004  40400001  00000000  40404040  40404040
```

```
40404040 40404040 40404040 40404040 40404040 40404040 40404040
40404040 40404040 40404040 40404040 D7D9D6C6 F0F0F0F7*
02C5E2C4 40404040 40400010 40400002 D4E5C3C8 D9404040 02000000
40000000 40404040 40404040 40404040 40404040 40404040 40404040
40404040 40404040 40404040 40404040 D7D9D6C6 F0F0F0F8*
02E3E7E3 40000270 40400004 40400001 00000000 40404040 40404040
40404040 40404040 40404040 40404040 40404040 40404040 40404040
40404040 40404040 40404040 40404040 D7D9D6C6 F0F0F0F9*
02C5E2C4 40404040 40400010 40400003 C3C1C4E2 E4D74040 02000000
40000000 40404040 40404040 40404040 40404040 40404040 40404040
40404040 40404040 40404040 40404040 D7D9D6C6 F0F0F1F0**
02C5E2C4 40404040 40400010 40400004 D7D9D6C6 D3F14040 02000000
40000000 40404040 40404040 40404040 40404040 40404040 40404040
40404040 40404040 40404040 40404040 D7D9D6C6 F0F0F1F1*
02C5E2C4 40404040 40400010 40400005 D7D9D6C6 D3F24040 02000000
40000000 40404040 40404040 40404040 40404040 40404040 40404040
40404040 40404040 40404040 40404040 D7D9D6C6 F0F0F1F2*
02E3E7E3 40000278 40400010 40400001 00000000 00000000 00000000
00000000 40404040 40404040 40404040 40404040 40404040 40404040
40404040 40404040 40404040 40404040 D7D9D6C6 F0F0F1F3*
02E3E7E3 400002F0 40400038 40400001 5890D210 58A0D220 58B0D218
5880D144 5080D178 5800D150 5000D238 5800D154 5000D23C 5800D258
5000D268 5800D15C 5000D26C 5800D280 D7D9D6C6 F0F0F1F4*
02E3E7E3 40000328 40400038 40400001 5000D270 5800D284 5000D274
5800D288 5000D278 5800D28C 5000D27C 5890D15C 58A0D154 58B0D220
5880D210 58E0D268 58F0D218 585EF000 D7D9D6C6 F0F0F1F5*
02E3E7E3 40000360 40400038 40400001 58E0D26C 582EF000 5B20D144
18751C6A 18375A30 D1507823 80007020 D1A47020 D1A01837 1A3A7823
80007020 D1B07020 D1AC1C4A 5050D244 D7D9D6C6 F0F0F1F6*
02E3E7E3 40000398 40400038 40400001 18355A30 D150184A 5870D244
18835890 D14458A0 D14418B2 5860D210 1A741A84 18577868 60007960
D1A447A0 D37C3826 7060D1A4 7960D1A0 D7D9D6C6 F0F0F1F7*
02E3E7E3 400003D0 40400038 40400001 47C0D388 7060D1A0 18255A20
D23C7842 60007940 D1B047A0 D3A03824 7040D1B0 7940D1AC 47C0D3AC
7040D1AC 879AD364 5880D210 58B0D220 D7D9D6C6 F0F0F1F8*
02E3E7E3 40000408 40400038 40400001 58A0D154 5890D15C 58E0D270
7800D1A4 700EB000 58E0D274 7800D1A0 700EB000 58E0D278 7800D1B0
700EB000 58E0D27C 7800D1AC 700EB000 D7D9D6C6 F0F0F1F9*
02E3E7E3 40000440 40400038 40400001 5820D178 5A20D144 5020D178

MEMBER NAME  PROFIL
5800D27C 1A095000 D27C5800 D2781A09 5000D278 5800D274 1A095000
D2745800 D2701A09 5000D270 5800D26C D7D9D6C6 F0F0F2F0**
02E3E7E3 40000478 40400038 40400001 1A0A5000 D26C5800 D2681A0A
5000D268 5920D19C 47C0D304 5890D210 58A0D220 58B0D218 5880D144
5080D1C0 5080D1BC 5080D1C8 5080D1C4 D7D9D6C6 F0F0F2F1*
02E3E7E3 400004B0 40400038 40400001 5980D19C 4780D6F4 5800D29C
5000D254 5830D298 5860D294 5870D290 5880D15C 5890D148 58A0D15C
58B0D220 7827B000 185A5C40 D1C01825 D7D9D6C6 F0F0F2F2*
02E3E7E3 400004E8 40400038 40400001 5A20D150 7922B000 47A0D4A8
5090D1C0 7826B000 18585C40 D1BC1825 5A20D154 7922B000 47C0D4C4
5090D1BC 7823B000 18585C40 D1C81825 D7D9D6C6 F0F0F2F3*
02E3E7E3 40000520 40400038 40400001 5A20D258 7922B000 47A0D4E0
5090D1C8 58E0D254 782EB000 18585C40 D1C41825 1A287922 B00047C0
D4FE5090 D1C45A90 D1445800 D2541A0A D7D9D6C6 F0F0F2F4*
02E3E7E3 40000558 40400038 40400001 5000D254 1A3A1A6A 1A7A5990
D19C47C0 D48C5890 D21058A0 D22058B0 D2185880 D1445800 D1C05900
D1BC4120 00014760 D53C1B22 5800D1C0 D7D9D6C6 F0F0F2F5*
02E3E7E3 40000590 40400038 40400001 5900D1C8 41300001 4760D54E
```

| | | | | | | |
|---|---|---|---|---|---|---|
| 1B331632 | 5800D1C0 | 5900D1C4 | 41200001 | 4760D562 | 1B221623 | 1BFF862F |
| D70C4100 | D1D45000 | D07058E0 | D258410E | D7D9D6C6 | F0F0F2F6* | |
| 02E3E7E3 | 400005C8 | 40400038 | 40400001 | B0005000 | D0749280 | D07458F0 |
| D2284110 | D06C05EF | 5850D1C0 | 5C40D154 | 5820D150 | 1A2558E0 | D258410E |
| B0005000 | D0704102 | B0005000 | D0749280 | D7D9D6C6 | F0F0F2F7* | |
| 02E3E7E3 | 40000600 | 40400038 | 40400001 | D07458F0 | D2284110 | D06C05EF |
| 4102B000 | 5000D070 | 4100D1D4 | 5000D074 | 9280D074 | 58F0D228 | 4110D06C |
| 05EF4100 | D1D45000 | D07C58E0 | D280410E | D7D9D6C6 | F0F0F2F8* | |
| 02E3E7E3 | 40000638 | 40400038 | 40400001 | A0005000 | D0809280 | D08058F0 |
| D2284110 | D07805EF | 5850D1C0 | 5C40D15C | 5820D150 | 1A2558E0 | D280410E |
| A0005000 | D07C4102 | A0005000 | D0809280 | D7D9D6C6 | F0F0F2F9* | |
| 02E3E7E3 | 40000670 | 40400038 | 40400001 | D08058F0 | D2284110 | D07805EF |
| 4102A000 | 5000D07C | 4100D1D4 | 5000D080 | 9280D080 | 58F0D228 | 4110D078 |
| 05EF58F0 | D2304110 | D08405EF | 41E00004 | D7D9D6C6 | F0F0F3F0** | |
| 02E3E7E3 | 400006A8 | 40400038 | 40400001 | 15FE4720 | D66458EF | D04C07FE |
| 58F0D234 | 4110D094 | 05EF41E0 | 000415FE | 4720D67E | 58EFD054 | 07FE5980 |
| D19C4780 | D6F45880 | D2805890 | D15058A0 | D7D9D6C6 | F0F0F3F1* | |
| 02E3E7E3 | 400006E0 | 40400038 | 40400001 | D15458B0 | D1485860 | D2105830 |
| D218185A | 5C483000 | 18251A29 | 78026000 | 7000D184 | 18251A2A | 78026000 |
| 7000D188 | 58F0D22C | 4110D0A8 | 05EF41E0 | D7D9D6C6 | F0F0F3F2* | |
| 02E3E7E3 | 40000718 | 40400038 | 40400001 | 000415FE | 4720D6D6 | 58EFD05C |
| 07FE7800 | D1847000 | D1F47800 | D1887000 | D1F85AB0 | D1441A8A | 59B0D19C |
| 47C0D69E | 5890D210 | 58A0D220 | 58B0D218 | D7D9D6C6 | F0F0F3F3* | |
| 02E3E7E3 | 40000750 | 40400038 | 40400001 | 5880D144 | 1BFF58E0 | D00007FE |
| 5800D1C0 | 5000D1E4 | 5800D1BC | 5000D1E8 | 5800D1C8 | 5000D1EC | 5800D1C4 |
| 5000D1F0 | 5800D1C0 | 5000D1FC | 5080D194 | D7D9D6C6 | F0F0F3F4* | |
| 02E3E7E3 | 40000788 | 40400038 | 40400001 | 5800D140 | 5000D190 | 5820D150 |
| 5830D150 | 5840D150 | 5850D15C | 5860D154 | 18B25876 | D1E01894 | 18A45889 |
| D1F81978 | 4770D768 | 19784770 | D77247F0 | D7D9D6C6 | F0F0F3F5* | |
| 02E3E7E3 | 400007C0 | 40400038 | 40400001 | D794879A | D75E5800 | D1901BFF |
| 870FD794 | 5800D194 | 5A00D144 | 5000D194 | 1A341AB4 | 5073D1F8 | 8764D756 |
| 5890D210 | 58A0D220 | 58B0D218 | 5880D144 | D7D9D6C6 | F0F0F3F6* | |
| 02E3E7E3 | 400007F8 | 40400038 | 40400001 | 5820D194 | 89200002 | 5870D150 |
| 5880D154 | 58A0D150 | 18B21869 | 5830D218 | 18585C47 | D1F81825 | 1A2A5892 |
| 30001859 | 1C481825 | 1A2A7802 | 60007000 | D7D9D6C6 | F0F0F3F7* | |
| 02E3E7E3 | 40000830 | 40400038 | 40400001 | D1A81825 | 1A287802 | 60007000 |
| D1B458F0 | D22C4110 | D0F005EF | 41E00004 | 15FE4720 | D80858EF | D06407FE |
| 7800D1A8 | 7000D1F4 | 7800D1B4 | 7000D1F8 | D7D9D6C6 | F0F0F3F8* | |
| 02E3E7E3 | 40000868 | 40400038 | 40400001 | 877AD7C4 | 5890D210 | 58A0D220 |
| 58B0D218 | 5880D144 | 41F00004 | 58E0D000 | 07FE41F0 | 000858E0 | D00007FE |

MEMBER NAME PROFIL

| | | | | | | |
|---|---|---|---|---|---|---|
| 58A0D004 | 58E0A00C | 58B0A018 | 5810B004 | D7D9D6C6 | F0F0F3F9* | |
| 02E3E7E3 | 400008A0 | 40400038 | 40400001 | 5820D18C | 50201000 | 5830B00C |
| 5840D19C | 50403000 | 18DA92FF | A00C982C | A01C07FE | 987A1004 | 58207000 |
| 5020D18C | 58209000 | 5020D19C | 58201000 | D7D9D6C6 | F0F0F4F0** | |
| 02E3E7E3 | 400008D8 | 40400038 | 40400001 | 41302000 | 41500004 | 1B255C40 |
| D1481B25 | 5020D210 | 5030D214 | 5030D084 | 5030D094 | 58201008 | 41302000 |
| 41500004 | 1B255C40 | D1481B25 | 5020D218 | D7D9D6C6 | F0F0F4F1* | |
| 02E3E7E3 | 40000910 | 40400034 | 40400001 | 5030D21C | 5030D08C | 5030D09C |
| 58201010 | 41302000 | 41500004 | 1B255C40 | D1501B25 | 5020D220 | 5030D224 |
| 5030D0A4 | 9280D0A4 | 47F0D2A0 | 40404040 | D7D9D6C6 | F0F0F4F2* | |
| 02E3E7E3 | 40000020 | 40400008 | 40400001 | 000008C0 | 00000050 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F4F3* | |
| 02E3E7E3 | 40000050 | 40400004 | 40400001 | 00000890 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F4F4* | |
| 02E3E7E3 | 4000009C | 40400004 | 40400001 | 000006B4 | 40404040 | 40404040 |

```
40404040  40404040  40404040  40404040  40404040  40404040  40404040
40404040  40404040  40404040  40404040  D7D9D6C6  F0F0F4F5*
02D9D3C4  40404040  40400038  40404040  00020001  1C000278  00030001
1C00027C  00040001  1C000280  00050001  1C000284  00010001  0C000020
00010001  0C000024  00010001  0C000050  D7D9D6C6  F0F0F4F6*
02E3E7E3  400000A0  4040001C  40400001  0000086C  000006CE  00000886
00000726  00000736  00000858  00000868  40404040  40404040  40404040
40404040  40404040  40404040  40404040  D7D9D6C6  F0F0F4F7*
02D9D3C4  40404040  40400038  40404040  00010001  0C00009C  00010001
0C0000A0  00010001  0C0000A4  00010001  0C0000A8  00010001  0C0000AC
00010001  0C0000B0  00010001  0C0000B4  D7D9D6C6  F0F0F4F8*
02E3E7E3  400000BC  40400004  40400001  000001A4  40404040  40404040
40404040  40404040  40404040  40404040  40404040  40404040  40404040
40404040  40404040  40404040  40404040  D7D9D6C6  F0F0F4F9*
02E3E7E3  400000C4  40400008  40400001  80000000  000001AC  40404040
40404040  40404040  40404040  40404040  40404040  40404040  40404040
40404040  40404040  40404040  40404040  D7D9D6C6  F0F0F5F0**
02E3E7E3  400000D0  40400004  40400001  80000000  40404040  40404040
40404040  40404040  40404040  40404040  40404040  40404040  40404040
40404040  40404040  40404040  40404040  D7D9D6C6  F0F0F5F1*
02E3E7E3  400000D8  40400004  40400001  000001DC  40404040  40404040
40404040  40404040  40404040  40404040  40404040  40404040  40404040
40404040  40404040  40404040  40404040  D7D9D6C6  F0F0F5F2*
02E3E7E3  400000E0  40400004  40400001  800001EC  40404040  40404040
40404040  40404040  40404040  40404040  40404040  40404040  40404040
40404040  40404040  40404040  40404040  D7D9D6C6  F0F0F5F3*
02E3E7E3  400000E8  40400004  40400001  000001DC  40404040  40404040
40404040  40404040  40404040  40404040  40404040  40404040  40404040
40404040  40404040  40404040  40404040  D7D9D6C6  F0F0F5F4*
02E3E7E3  400000F0  40400004  40400001  000001EC  40404040  40404040
40404040  40404040  40404040  40404040  40404040  40404040  40404040
40404040  40404040  40404040  40404040  D7D9D6C6  F0F0F5F5*
02E3E7E3  400000F8  40400004  40400001  000001D4  40404040  40404040
40404040  40404040  40404040  40404040  40404040  40404040  40404040
40404040  40404040  40404040  40404040  D7D9D6C6  F0F0F5F6*
02D9D3C4  40404040  40400038  40404040  00010001  0C0000B8  00010001
0C0000BC  00010001  0C0000C8  00010001  0C0000D8  00010001  0C0000E0
00010001  0C0000E8  00010001  0C0000F0  D7D9D6C6  F0F0F5F7*
02E3E7E3  400000FC  4040001C  40400001  000001D8  0000018C  000001A8
000001B8  000001B4  00000040  0000018C  40404040  40404040  40404040
40404040  40404040  40404040  40404040  D7D9D6C6  F0F0F5F8*

MEMBER NAME  PROFIL
02D9D3C4  40404040  40400038  40404040  00010001  0C0000F8  00010001
0C0000FC  00010001  0C000100  00010001  0C000104  00010001  0C000108
00010001  0C00010C  00010001  0C000110  D7D9D6C6  F0F0F5F9*
02E3E7E3  40000118  4040001C  40400001  0000018C  0000018C  0000018C
00000194  0000019C  0000018C  0000018C  40404040  40404040  40404040
40404040  40404040  40404040  40404040  D7D9D6C6  F0F0F6F0**
02D9D3C4  40404040  40400038  40404040  00010001  0C000114  00010001
0C000118  00010001  0C00011C  00010001  0C000120  00010001  0C000124
00010001  0C000128  00010001  0C00012C  D7D9D6C6  F0F0F6F1*
02E3E7E3  40000134  4040001C  40400001  000001B8  000001BC  8000018C
000001F8  00000204  0000018C  000001B0  40404040  40404040  40404040
40404040  40404040  40404040  40404040  D7D9D6C6  F0F0F6F2*
02D9D3C4  40404040  40400038  40404040  00010001  0C000130  00010001
0C000134  00010001  0C000138  00010001  0C00013C  00010001  0C000140
00010001  0C000144  00010001  0C000148  D7D9D6C6  F0F0F6F3*
02E3E7E3  40000150  4040001C  40400001  000001B8  000001B4  00000028
```

```
0000018C  0000018C  0000018C  0000018C  40404040  40404040  40404040
40404040  40404040  40404040  40404040  D7D9D6C6  F0F0F6F4*
02D9D3C4  40404040  40400038  40404040  00010001  0C00014C  00010001
0C000150  00010001  0C000154  00010001  0C000158  00010001  0C00015C
00010001  0C000160  00010001  0C000164  D7D9D6C6  F0F0F6F5*
02E3E7E3  4000016C  4040001C  40400001  00000194  0000019C  0000018C
0000018C  000001B8  000001BC  8000018C  40404040  40404040  40404040
40404040  40404040  40404040  40404040  D7D9D6C6  F0F0F6F6*
02D9D3C4  40404040  40400038  40404040  00010001  0C000168  00010001
0C00016C  00010001  0C000170  00010001  0C000174  00010001  0C000178
00010001  0C00017C  00010001  0C000180  D7D9D6C6  F0F0F6F7*
02E3E7E3  40000288  40400038  40400001  00000000  00000000  00000000
00000000  00000000  00000000  00000000  00000000  0000000C  0108000E
00000000  0000000F  00000000  01D4000F  D7D9D6C6  F0F0F6F8*
02E3E7E3  400002C0  40400030  40400001  0000000F  010C0010  01140010
01200011  00000014  00000018  0000001C  00000020  00000024  00000028
0000002C  00000030  40404040  40404040  D7D9D6C6  F0F0F6F9*
02D9D3C4  40404040  40400008  40404040  00010001  0C000184  40404040
40404040  40404040  40404040  40404040  40404040  40404040  40404040
40404040  40404040  40404040  40404040  D7D9D6C6  F0F0F7F0**
02C5D5C4  40404040  40404040  40404040  40404040  40404040  40404040
00000944  F1F5F7F3  F460C6D6  F34040F0  F2F0F2F8  F7F0F9F8  40F0F84B
F4F24BF1  F3404040  D7D9D6C6  C9D34040  D7D9D6C6  F0F0F7F1**

MEMBER NAME  PROFL1
02C5E2C4  40404040  40400010  40400001  D7D9D6C6  D3F14040  00000000
40000000  40404040  40404040  40404040  40404040  40404040  40404040
40404040  40404040  40404040  40404040  D7D9D6C6  F0F0F0F1*
02E3E7E3  40000000  40400038  40400001  47F0F00C  07D7D9D6  C6D3F140
90ECD00C  184D98CD  F0205040  D00450D0  400807FC  40404040  40404040
C3D6D5C6  D3C9C3E3  C9D5C740  C5E7E3C5  D7D9D6C6  F0F0F0F2*
02E3E7E3  40000038  40400008  40400001  D9C9D6D9  E2404040  40404040
40404040  40404040  40404040  40404040  40404040  40404040  40404040
40404040  40404040  40404040  40404040  D7D9D6C6  F0F0F0F3*
02E3E7E3  400000F0  40400030  40400001  00000000  00000000  00000001
00000001  00000002  00000003  00000015  401DF3B6  4029FBE7  403EF9DB
00000000  00000000  40404040  40404040  D7D9D6C6  F0F0F0F4*
02E3E7E3  40000150  40400004  40400001  00000000  40404040  40404040
40404040  40404040  40404040  40404040  40404040  40404040  40404040
40404040  40404040  40404040  40404040  D7D9D6C6  F0F0F0F5*
02C5E2C4  40404040  40400010  40400002  C3C1C4E2  E4D74040  02000000
40000000  40404040  40404040  40404040  40404040  40404040  40404040
40404040  40404040  40404040  40404040  D7D9D6C6  F0F0F0F6*
02E3E7E3  40000158  40400004  40400001  00000000  40404040  40404040
40404040  40404040  40404040  40404040  40404040  40404040  40404040
40404040  40404040  40404040  40404040  D7D9D6C6  F0F0F0F7*
02C5E2C4  40404040  40400010  40400003  D7C9C5D9  C3C54040  02000000
40000000  40404040  40404040  40404040  40404040  40404040  40404040
40404040  40404040  40404040  40404040  D7D9D6C6  F0F0F0F8*
02E3E7E3  40000160  40400008  40400001  00000000  00000000  40404040
40404040  40404040  40404040  40404040  40404040  40404040  40404040
40404040  40404040  40404040  40404040  D7D9D6C6  F0F0F0F9*
02E3E7E3  400001A0  40400038  40400001  58B0D118  58A0D12C  5890D0D8
5880D128  5870D150  5860D0C0  5800D0B0  5000D0FC  5837B000  58E0D154
580EB000  5000D100  5060D0E0  5080D13C  D7D9D6C6  F0F0F1F0**
02E3E7E3  400001D8  40400038  40400001  50A0D140  1C2A1A38  5030D130
5800D158  5000D148  5800D15C  5000D14C  18BA58A0  D1185890  D11058E0
D148585E  A0005050  D10458E0  D14C1825  D7D9D6C6  F0F0F1F1*
02E3E7E3  40000210  40400038  40400001  5A2EA000  5B20D0BC  18355050
```

| | | | | | | |
|---|---|---|---|---|---|---|
| D0E41C4B | 5A50D128 | 5050D138 | 5840D130 | 185B5870 | D1381883 | 58A0D0BC |
| 18B24104 | 90005000 | D0544107 | 90005000 | D7D9D6C6 | F0F0F1F2* | |
| 02E3E7E3 | 40000248 | 40400038 | 40400001 | D05C58F0 | D1244110 | D05405EF |
| 5960D0EC | 4780D272 | 5080D0E4 | 58A0D118 | 58B0D12C | 5800D0B8 | 5000D0FC |
| 5850D0E4 | 5C40D140 | 18355A30 | D13C1825 | D7D9D6C6 | F0F0F1F3* | |
| 02E3E7E3 | 40000280 | 40400038 | 40400001 | 5A20D140 | 41039000 | 5000D064 |
| 41029000 | 5000D068 | 58F0D120 | 4110D064 | 05EF41E0 | 000415FE | 4720D26E |
| 58EFD04C | 07FE47F0 | D27C1A75 | 878AD1FA | D7D9D6C6 | F0F0F1F4* | |
| 02E3E7E3 | 400002B8 | 40400038 | 40400001 | 5080D0E4 | 58A0D118 | 58B0D12C |
| 5820D0E0 | 5A20D0BC | 5020D0E0 | 5800D14C | 1A0B5000 | D14C5800 | D1481A0B |
| 5000D148 | 5920D0F8 | 47C0D1BE | 58B0D118 | D7D9D6C6 | F0F0F1F5* | |
| 02E3E7E3 | 400002F0 | 40400038 | 40400001 | 58A0D12C | 5890D0D8 | 5880D128 |
| 5870D150 | 5800D0FC | 8609D2D0 | 1BFF58E0 | D00007FE | 41F00004 | 58E0D000 |
| 07FE58D0 | D00458E0 | D00C92FF | D00C982C | D7D9D6C6 | F0F0F1F6* | |
| 02E3E7E3 | 40000328 | 40400038 | 40400001 | D01C07FE | 98791004 | 58207000 |
| 5020D0E8 | 58209000 | 5020D0F8 | 58201000 | 41302000 | 41500004 | 1B255C40 |
| D0C01B25 | 5020D110 | 5030D114 | 58201008 | D7D9D6C6 | F0F0F1F7* | |
| 02E3E7E3 | 40000360 | 4040001C | 40400001 | 41302000 | 41500004 | 1B255C40 |
| D0C01B25 | 5020D118 | 5030D11C | 47F0D160 | 40404040 | 40404040 | 40404040 |
| 40404040 | 40404040 | 40404040 | 40404040 | D7D9D6C6 | F0F0F1F8* | |
| 02E3E7E3 | 40000020 | 40400008 | 40400001 | 0000032C | 00000040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F1F9* | |
| 02E3E7E3 | 40000040 | 40400004 | 40400001 | 0000031A | 40404040 | 40404040 |

MEMBER NAME PROFL1

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | D7D9D6C6 | F0F0F2F0** | |
| 02E3E7E3 | 4000008C | 40400008 | 40400001 | 000002AE | 000002BC | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F2F1* | |
| 02E3E7E3 | 40000098 | 40400004 | 40400001 | 00000140 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F2F2* | |
| 02D9D3C4 | 40404040 | 40400038 | 40404040 | 00020001 | 1C000160 | 00030001 |
| 1C000164 | 00010001 | 0C000020 | 00010001 | 0C000024 | 00010001 | 0C000040 |
| 00010001 | 0C00008C | 00010001 | 0C000090 | D7D9D6C6 | F0F0F2F3* | |
| 02E3E7E3 | 400000A0 | 40400004 | 40400001 | 8000012C | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F2F4* | |
| 02E3E7E3 | 400000AC | 40400018 | 40400001 | 000000F4 | 00000108 | 00000110 |
| 0000010C | 00000028 | 000000F4 | 40404040 | 40404040 | 40404040 | 40404040 |
| 40404040 | 40404040 | 40404040 | 40404040 | D7D9D6C6 | F0F0F2F5* | |
| 02D9D3C4 | 40404040 | 40400038 | 40404040 | 00010001 | 0C000098 | 00010001 |
| 0C0000A0 | 00010001 | 0C0000AC | 00010001 | 0C0000B0 | 00010001 | 0C0000B4 |
| 00010001 | 0C0000B8 | 00010001 | 0C0000BC | D7D9D6C6 | F0F0F2F6* | |
| 02E3E7E3 | 400000C4 | 4040001C | 40400001 | 000000F4 | 000000F4 | 000000F4 |
| 000000FC | 00000104 | 000000F4 | 000000F4 | 40404040 | 40404040 | 40404040 |
| 40404040 | 40404040 | 40404040 | 40404040 | D7D9D6C6 | F0F0F2F7* | |
| 02D9D3C4 | 40404040 | 40400038 | 40404040 | 00010001 | 0C0000C0 | 00010001 |
| 0C0000C4 | 00010001 | 0C0000C8 | 00010001 | 0C0000CC | 00010001 | 0C0000D0 |
| 00010001 | 0C0000D4 | 00010001 | 0C0000D8 | D7D9D6C6 | F0F0F2F8* | |
| 02E3E7E3 | 400000E0 | 4040000C | 40400001 | 00000110 | 00000114 | 800000F4 |
| 40404040 | 40404040 | 40404040 | 40404040 | 40404040 | 40404040 | 40404040 |
| 40404040 | 40404040 | 40404040 | 40404040 | D7D9D6C6 | F0F0F2F9* | |
| 02E3E7E3 | 40000168 | 40400038 | 40400001 | 00000004 | 00000008 | 00000000 |
| 00000000 | 00000000 | 00000008 | 00000000 | 00A80009 | 00880009 | 008C0009 |
| 0000000C | 00000010 | 00000014 | 00000018 | D7D9D6C6 | F0F0F3F0** | |
| 02D9D3C4 | 40404040 | 40400020 | 40404040 | 00010001 | 0C0000DC | 00010001 |

| | | | | | | |
|---|---|---|---|---|---|---|
| 0C0000E0 | 00010001 | 0C0000E4 | 00010001 | 0C0000E8 | 40404040 | 40404040 |
| 40404040 | 40404040 | 40404040 | 40404040 | D7D9D6C6 | F0F0F3F1* | |
| 02C5D5C4 | 40404040 | 40404040 | 40404040 | 40404040 | 40404040 | 40404040 |
| 0000037C | F1F5F7F3 | F460C6D6 | F34040F0 | F2F0F2F8 | F7F0F9F8 | 40F0F84B |
| F4F24BF2 | F0404040 | D7D9D6C6 | D3F14040 | D7D9D6C6 | F0F0F3F2** | |

MEMBER NAME PROFL2

| | | | | | | |
|---|---|---|---|---|---|---|
| 02C5E2C4 | 40404040 | 40400010 | 40400001 | D7D9D6C6 | D3F24040 | 00000000 |
| 40000000 | 40404040 | 40404040 | 40404040 | 40404040 | 40404040 | 40404040 |
| 40404040 | 40404040 | 40404040 | 40404040 | D7D9D6C6 | F0F0F0F1* | |
| 02E3E7E3 | 40000000 | 40400038 | 40400001 | 47F0F00C | 07D7D9D6 | C6D3F240 |
| 90ECD00C | 184D98CD | F0205040 | D00450D0 | 400807FC | 40404040 | 40404040 |
| C9D3D3C5 | C7C1D340 | C3E4E3D6 | E4E34040 | D7D9D6C6 | F0F0F0F2* | |
| 02E3E7E3 | 400000E8 | 40400034 | 40400001 | 00000000 | 00000000 | 00000001 |
| 00000001 | 00000002 | 00000003 | 00000004 | 0000000E | 401DF3B6 | 4029FBE7 |
| 403EF9DB | 00000000 | 00000000 | 40404040 | D7D9D6C6 | F0F0F0F3* | |
| 02E3E7E3 | 40000158 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F0F4* | |
| 02E3E7E3 | 40000160 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F0F5* | |
| 02C5E2C4 | 40404040 | 40400010 | 40400002 | C3C1C4E2 | E4D74040 | 02000000 |
| 40000000 | 40404040 | 40404040 | 40404040 | 40404040 | 40404040 | 40404040 |
| 40404040 | 40404040 | 40404040 | 40404040 | D7D9D6C6 | F0F0F0F6* | |
| 02E3E7E3 | 40000168 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F0F7* | |
| 02C5E2C4 | 40404040 | 40400010 | 40400003 | D7C9C5D9 | C3C54040 | 02000000 |
| 40000000 | 40404040 | 40404040 | 40404040 | 40404040 | 40404040 | 40404040 |
| 40404040 | 40404040 | 40404040 | 40404040 | D7D9D6C6 | F0F0F0F8* | |
| 02E3E7E3 | 40000170 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D7D9D6C6 | F0F0F0F9* | |
| 02E3E7E3 | 4000021C | 40400038 | 40400001 | 58B0D0C8 | 5890D0DC | 5860D140 |
| 5800D0B0 | 5000D108 | 5800D0C0 | 5000D0E4 | 50B0D1B4 | 5060D1B8 | 5800D184 |
| 5000D170 | 5060D194 | 5800D1BC | 5000D154 | D7D9D6C6 | F0F0F1F0** | |
| 02E3E7E3 | 40000254 | 40400038 | 40400001 | 5800D1D0 | 5000D1DC | 5800D1D4 |
| 5000D1E0 | 188B5890 | D17858B0 | D12058A0 | D12858E0 | D1DC583E | A0005030 |
| D10C58E0 | D1E01823 | 5A2EA000 | 5B20D0BC | D7D9D6C6 | F0F0F1F1* | |
| 02E3E7E3 | 4000028C | 40400038 | 40400001 | 5020D0F8 | 5800D0C0 | 5000D0E8 |
| 5800D154 | 1A085000 | D17C5800 | D1541A06 | 5000D180 | 5800D154 | 5A00D184 |
| 5000D188 | 5800D154 | 1A095000 | D18C1C26 | D7D9D6C6 | F0F0F1F2* | |
| 02E3E7E3 | 400002C4 | 40400038 | 40400001 | 1A385030 | D1905800 | D1BC5000 |
| D1685090 | D1985800 | D1C05000 | D19C5800 | D1C45000 | D1A05800 | D1C85000 |
| D1A45800 | D1CC5000 | D1A85800 | D1D05000 | D7D9D6C6 | F0F0F1F3* | |
| 02E3E7E3 | 400002FC | 40400038 | 40400001 | D1AC5800 | D1D45000 | D1B05870 |
| D0BC5890 | D19458A0 | D17858B0 | D1305880 | D1285800 | D0E45900 | D0E84780 |
| D48A58E0 | D19C786E | B0007060 | D15858E0 | D7D9D6C6 | F0F0F1F4* | |
| 02E3E7E3 | 40000334 | 40400038 | 40400001 | D17C782E | B0003926 | 41300001 |
| 47C0D30E | 1B3358E0 | D1A0784E | B0007040 | D1603924 | 41200001 | 47A0D326 |
| 1B221423 | 1BFF862F | D35A58E0 | D180782E | D7D9D6C6 | F0F0F1F5* | |
| 02E3E7E3 | 4000036C | 40400038 | 40400001 | B0003926 | 41300001 | 47C0D342 |
| 1B333924 | 41200001 | 47A0D34E | 1B221423 | 1BFF862F | D35A47F0 | D48A58E0 |
| D1A4786E | B0007060 | D16C58E0 | D188782E | D7D9D6C6 | F0F0F1F6* | |
| 02E3E7E3 | 400003A4 | 40400038 | 40400001 | B0003926 | 41300001 | 47C0D37A |
| 1B3358E0 | D1A8784E | B0007040 | D1743924 | 41200001 | 47A0D392 | 1B221423 |
| 1BFF862F | D3C658E0 | D18C782E | B0003926 | D7D9D6C6 | F0F0F1F7* | |
| 02E3E7E3 | 400003DC | 40400038 | 40400001 | 41300001 | 47C0D3AE | 1B333924 |

```
41200001  47A0D3BA  1B221423  1BFF862F  D3C647F0  D48A58E0  D1AC585E
800058E0  D1B0580E  80005000  D0FC5820  D7D9D6C6  F0F0F1F8*
02E3E7E3  40000414  40400038  40400001  D10C5020  D0EC1C46  18355A30
D0C81853  5870D190  188258A0  D0BC58B0  D0F85890  D1204105  90005000
D0544107  90005000  D05C58F0  D13C4110  D7D9D6C6  F0F0F1F9*
02E3E7E3  4000044C  40400038  40400001  D05405EF  5800D0F4  12004780

MEMBER NAME  PROFL2
D4805080  D0EC58A0  D12858B0  D1205890  D1785880  D0C85800  D0B85000
D1085850  D0EC5C40  D1B81835  5A30D1B4  D7D9D6C6  F0F0F2F0**
02E3E7E3  40000484  40400038  40400001  18255A20  D1B84103  B0005000
D0644102  B0005000  D06858F0  D1384110  D06405EF  41E00004  15FE4720
D47C58EF  D04C07FE  47F0D500  1A76878A  D7D9D6C6  F0F0F2F1*
02E3E7E3  400004BC  40400038  40400001  D3FE5080  D0EC5880  D12858B0
D13058A0  D1785890  D1945870  D0BC5820  D0E81A27  5020D0E8  5800D198
1A095000  D1985800  D1B01A09  5000D1B0  D7D9D6C6  F0F0F2F2*
02E3E7E3  400004F4  40400038  40400001  5800D1AC  1A095000  D1AC5800
D1681A0A  5000D168  5800D1A8  1A0A5000  D1A85800  D1A41A0A  5000D1A4
5800D1A0  1A0A5000  D1A05800  D19C1A0A  D7D9D6C6  F0F0F2F3*
02E3E7E3  4000052C  40400038  40400001  5000D19C  5920D104  47C0D2E2
58A0D128  58B0D120  5890D178  5880D0C8  5820D0E4  5A20D0BC  5020D0E4
5800D154  1A095000  D1545800  D1E01A06  D7D9D6C6  F0F0F2F4*
02E3E7E3  40000564  40400038  40400001  5000D1E0  5800D1DC  1A065000
D1DC5920  D10447C0  D23A58B0  D0C85890  D0DC5800  D1088709  D55C41F0
000458E0  D00007FE  1BFF58E0  D00007FE  D7D9D6C6  F0F0F2F5*
02E3E7E3  4000059C  40400038  40400001  58D0D004  58E0D00C  92FFD00C
982CD01C  07FE987A  10045820  70005020  D0F05820  90005020  D1045820
10004130  20004150  00041B25  5C40D0C0  D7D9D6C6  F0F0F2F6*
02E3E7E3  400005D4  40400038  40400001  1B255020  D1205030  D1245820
10084130  20004150  00041B25  5C40D0C0  1B255020  D1285030  D12C5820
10104130  20004150  00041B25  5C40D0C8  D7D9D6C6  F0F0F2F7*
02E3E7E3  4000060C  4040000E  40400001  1B255020  D1305030  D13447F0
D1E44040  40404040  40404040  40404040  40404040  40404040  40404040
40404040  40404040  40404040  40404040  D7D9D6C6  F0F0F2F8*
02E3E7E3  40000020  40400008  40400001  000005AE  00000038  40404040
40404040  40404040  40404040  40404040  40404040  40404040  40404040
40404040  40404040  40404040  40404040  D7D9D6C6  F0F0F2F9*
02E3E7E3  40000038  40400004  40400001  0000059C  40404040  40404040
40404040  40404040  40404040  40404040  40404040  40404040  40404040
40404040  40404040  40404040  40404040  D7D9D6C6  F0F0F3F0**
02E3E7E3  40000084  40400008  40400001  000004B4  00000538  40404040
40404040  40404040  40404040  40404040  40404040  40404040  40404040
40404040  40404040  40404040  40404040  D7D9D6C6  F0F0F3F1*
02E3E7E3  40000090  40400004  40400001  00000134  40404040  40404040
40404040  40404040  40404040  40404040  40404040  40404040  40404040
40404040  40404040  40404040  40404040  D7D9D6C6  F0F0F3F2*
02D9D3C4  40404040  40400038  40404040  00020001  1C000170  00030001
1C000174  00010001  0C000020  00010001  0C000024  00010001  0C000038
00010001  0C000084  00010001  0C000088  D7D9D6C6  F0F0F3F3*
02E3E7E3  40000098  40400004  40400001  8000012C  40404040  40404040
40404040  40404040  40404040  40404040  40404040  40404040  40404040
40404040  40404040  40404040  40404040  D7D9D6C6  F0F0F3F4*
02E3E7E3  400000A4  40400018  40400001  000000EC  00000104  0000010C
00000108  00000028  000000EC  40404040  40404040  40404040  40404040
40404040  40404040  40404040  40404040  D7D9D6C6  F0F0F3F5*
02D9D3C4  40404040  40400038  40404040  00010001  0C000090  00010001
0C000098  00010001  0C0000A4  00010001  0C0000A8  00010001  0C0000AC
00010001  0C0000B0  00010001  0C0000B4  D7D9D6C6  F0F0F3F6*
02E3E7E3  400000BC  4040001C  40400001  000000EC  000000EC  000000EC
```

```
000000F4  000000FC  000000EC  000000EC  40404040  40404040  40404040
40404040  40404040  40404040  40404040  D7D9D6C6  F0F0F3F7*
02D9D3C4  40404040  40400038  40404040  00010001  0C0000B8  00010001
0C0000BC  00010001  0C0000C0  00010001  0C0000C4  00010001  0C0000C8
00010001  0C0000CC  00010001  0C0000D0  D7D9D6C6  F0F0F3F8*
02E3E7E3  400000D8  4040000C  40400001  0000010C  00000110  800000EC
40404040  40404040  40404040  40404040  40404040  40404040  40404040

MEMBER NAME  PROFL2
40404040  40404040  40404040  40404040  D7D9D6C6  F0F0F3F9*
02E3E7E3  40000178  40400038  40400001  00000008  00000000  00000000
00000000  00000000  00000000  00000000  01880008  00880008  008C0008
00000000  018C0009  00900009  00940009  D7D9D6C6  F0F0F4F0**
02E3E7E3  400001B0  40400038  40400001  00000010  00AC0009  00000000
0000000C  00000000  00B0000A  0000000A  00BC000B  00C4000B  0104000B
00C0000D  00CC000D  00C8000D  00D4000D  D7D9D6C6  F0F0F4F1*
02E3E7E3  400001E8  40400034  40400001  00D0000D  00E4000D  00E0000D
00000020  00000028  00000024  00000030  0000002C  00000014  00000018
00F8000F  010C000F  0108000F  40404040  D7D9D6C6  F0F0F4F2*
02D9D3C4  40404040  40400020  40404040  00010001  0C0000D4  00010001
0C0000D8  00010001  0C0000DC  00010001  0C0000E0  40404040  40404040
40404040  40404040  40404040  40404040  D7D9D6C6  F0F0F4F3*
02C5D5C4  40404040  40404040  40404040  40404040  40404040  40404040
0000061A  F1F5F7F3  F460C6D6  F34040F0  F2F0F2F8  F7F0F9F8  40F0F84B
F4F24BF2  F4404040  D7D9D6C6  D3F24040  D7D9D6C6  F0F0F4F4**

MEMBER NAME  PROJAR
02C5E2C4  40404040  40400010  40400001  D7D9D6D1  C1D94040  00000000
40000000  40404040  40404040  40404040  40404040  40404040  40404040
40404040  40404040  40404040  40404040  D7D9D6D1  F0F0F0F1*
02E3E7E3  40000000  40400028  40400001  47F0F00C  07D7D9D6  D1C1D940
90ECD00C  184D98CD  F0205040  D00450D0  400807FC  40404040  40404040
40404040  40404040  40404040  40404040  D7D9D6D1  F0F0F0F2*
02E3E7E3  40000098  40400038  40400001  41100000  00000000  41200000
00000000  00000000  00000000  00000000  00000001  00000002  00000003
00000004  00000005  00000006  00000007  D7D9D6D1  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  D7D9D6D1  F0F0F0F4*
02E3E7E3  400000D0  40400018  40400001  00000008  00000009  00000038
41100000  00000000  00000000  40404040  40404040  40404040  40404040
40404040  40404040  40404040  40404040  D7D9D6D1  F0F0F0F5*
02C5E2C4  40404040  40400010  40400003  C4E2D8D9  E3404040  02000000
40000000  40404040  40404040  40404040  40404040  40404040  40404040
40404040  40404040  40404040  40404040  D7D9D6D1  F0F0F0F6*
02C5E2C4  40404040  40400010  40400004  C4C1D9C3  D6E24040  02000000
40000000  40404040  40404040  40404040  40404040  40404040  40404040
40404040  40404040  40404040  40404040  D7D9D6D1  F0F0F0F7*
02E3E7E3  400001C0  4040000C  40400001  00000000  00000000  00000000
40404040  40404040  40404040  40404040  40404040  40404040  40404040
40404040  40404040  40404040  40404040  D7D9D6D1  F0F0F0F8*
02E3E7E3  400001D0  40400008  40400001  00000000  00000000  40404040
40404040  40404040  40404040  40404040  40404040  40404040  40404040
40404040  40404040  40404040  40404040  D7D9D6D1  F0F0F0F9*
02E3E7E3  400001F8  40400038  40400001  58A0D1A0  58B0D1AC  6800D070
23006000  D1C058F0  D1A84110  D04C05EF  6000D0F8  7860B044  7C60D0B4
2B003806  28606060  D1087820  B0487C20  D7D9D6D1  F0F0F1F0**
02E3E7E3  40000230  40400038  40400001  D0B42B00  38022820  6020D128
7820B04C  7C20D0B4  2B003802  28206020  D1107820  B0507C20  D0B42B00
```

```
38022820 6020D130 7820B054 7C20D0B4 D7D9D6D1 F0F0F1F1*
02E3E7E3 40000268 40400038 40400001 2B003802 28206020 D1007820
B0587C20 D0B42B00 38022820 6020D120 7820B05C 7C20D0B4 2B003802
28206020 D1407820 A0047C20 D0B42B00 D7D9D6D1 F0F0F1F2*
02E3E7E3 400002A0 40400038 40400001 38022820 6020D118 7840A008
7C40D0B4 2B003804 28406040 D1382B62 20666820 D1282B24 20226020
D17058F0 D1982B44 7840F004 6040D1B8 D7D9D6D1 F0F0F1F3*
02E3E7E3 400002D8 40400038 40400001 296447A0 D2C42924 47A0D2C4
1BFF58E0 D00007FE 6840D110 6B40D118 20446820 D1306B20 D1382022
6020D170 6940D1B8 47A0D2F4 6920D1B8 D7D9D6D1 F0F0F1F4*
02E3E7E3 40000310 40400038 40400001 47A0D2F4 1BFF58E0 D00007FE
6820D100 6B20D118 2C226840 D1206B40 D1382C44 2A246020 D1C058F0
D19C4110 D05005EF 28206B20 D1402022 D7D9D6D1 F0F0F1F5*
02E3E7E3 40000348 40400038 40400001 6920D1B8 47C0D330 1BFF58E0
D00007FE 6820D108 6B20D100 6020D0C8 6840D128 6B40D120 6040D0E0
2C222C44 2A246020 D1C058F0 D19C4110 D7D9D6D1 F0F0F1F6*
02E3E7E3 40000380 40400038 40400001 D05405EF 6000D1C8 6800D0C8
6D00D1C8 6000D0C8 6800D0E0 6D00D1C8 6000D0E0 6820D110 6B20D100
6020D0D0 6840D130 6B40D120 6040D0E8 D7D9D6D1 F0F0F1F7*
02E3E7E3 400003B8 40400038 40400001 2C222C44 2A246020 D1C058F0
D19C4110 D05805EF 6000D1C8 6800D0D0 6D00D1C8 6000D0D0 6800D0E8
6D00D1C8 6000D0E8 6820D118 6B20D100 D7D9D6D1 F0F0F1F8*
02E3E7E3 400003F0 40400038 40400001 6020D0D8 6840D138 6B40D120
6040D0F0 2C222C44 2A246020 D1C058F0 D19C4110 D05C05EF 6000D1C8
6800D0D8 6D00D1C8 6000D0D8 6800D0F0 D7D9D6D1 F0F0F1F9*
02E3E7E3 40000428 40400038 40400001 6D00D1C8 6000D0F0 58F0D1A8

MEMBER NAME  PROJAR
4110D060 05EF6000 D18058F0 D1A84110 D06405EF 6000D188 58F0D1A8
4110D068 05EF6000 D1906800 D0E02200 D7D9D6D1 F0F0F2F0**
02E3E7E3 40000460 40400038 40400001 47A0D44C 6820D078 6C20D0F8
6B20D180 6020D180 6800D0E8 220047A0 D4666820 D0786C20 D0F86B20
D1886020 D1886800 D0F02200 47A0D480 D7D9D6D1 F0F0F2F1*
02E3E7E3 40000498 40400038 40400001 6820D078 6C20D0F8 6B20D190
6020D190 6820D188 6B20D180 6020D150 6800D190 6B00D180 6000D158
222247A0 D4AC6840 D0786C40 D0F82A24 D7D9D6D1 F0F0F2F2*
02E3E7E3 400004D0 40400038 40400001 6020D150 6800D158 220047A0
D4C66820 D0786C20 D0F86A20 D1586020 D1586800 D1586900 D1504730
D4DC41F0 000458E0 D00007FE 1BFF58E0 D7D9D6D1 F0F0F2F3*
02E3E7E3 40000508 40400038 40400001 D00007FE 58D0D004 58E0D00C
92FFD00C 982CD01C 07FE5820 10004130 20004150 00041B25 5020D1A0
5030D1A4 58201004 41302000 41500004 D7D9D6D1 F0F0F2F4*
02E3E7E3 40000540 40400012 40400001 1B255B20 D0B05020 D1AC5030
D1B047F0 D1D04040 40404040 40404040 40404040 40404040 40404040
40404040 40404040 40404040 40404040 D7D9D6D1 F0F0F2F5*
02E3E7E3 40000020 4040000C 40400001 0000051E 00000028 0000050C
40404040 40404040 40404040 40404040 40404040 40404040 40404040
40404040 40404040 40404040 40404040 D7D9D6D1 F0F0F2F6*
02E3E7E3 40000074 40400008 40400001 800001E8 800001E8 40404040
40404040 40404040 40404040 40404040 40404040 40404040 40404040
40404040 40404040 40404040 40404040 D7D9D6D1 F0F0F2F7*
02D9D3C4 40404040 40400038 40404040 00020001 0C0001C0 00030001
1C0001C4 00040001 1C0001D0 00010001 0C000020 00010001 0C000024
00010001 0C000028 00010001 0C000074 D7D9D6D1 F0F0F2F8*
02E3E7E3 4000007C 40400018 40400001 800001E8 800001E8 800001E8
800000F0 800000F8 80000100 40404040 40404040 40404040 40404040
40404040 40404040 40404040 40404040 D7D9D6D1 F0F0F2F9*
02E3E7E3 400001DC 4040001C 40400001 00000000 00000000 00000000
00000000 00000000 00000000 00000000 40404040 40404040 40404040
```

```
40404040 40404040 40404040 40404040 D7D9D6D1 F0F0F3F0**
02D9D3C4 40404040 40400038 40404040 00010001 0C000078 00010001
0C00007C 00010001 0C000080 00010001 0C000084 00010001 0C000088
00010001 0C00008C 00010001 0C000090 D7D9D6D1 F0F0F3F1*
02C5D5C4 40404040 40404040 40404040 40404040 40404040 40404040
00000552 F1F5F7F3 F460C6D6 F34040F0 F2F0F2F8 F7F0F9F8 40F0F84B
F4F24BF2 F9404040 D7D9D6D1 C1D94040 D7D9D6D1 F0F0F3F2**

MEMBER NAME  PROJLN
02C5E2C4 40404040 40400010 40400001 D7D9D6D1 D3D54040 00000000
40000000 40404040 40404040 40404040 40404040 40404040 40404040
40404040 40404040 40404040 40404040 D7D9D6D1 F0F0F0F1*
02E3E7E3 40000000 40400028 40400001 47F0F00C 07D7D9D6 D1D3D540
90ECD00C 184D98CD F0205040 D00450D0 400807FC 40404040 40404040
40404040 40404040 40404040 40404040 D7D9D6D1 F0F0F0F2*
02C5E2C4 40404040 40400010 40400002 E3D6D3C5 D9404040 05000000
4000000C 40404040 40404040 40404040 40404040 40404040 40404040
40404040 40404040 40404040 40404040 D7D9D6D1 F0F0F0F3*
02E3E7E3 40000088 40400014 40400001 00000001 00000002 41100000
00000000 00000000 40404040 40404040 40404040 40404040 40404040
40404040 40404040 40404040 40404040 D7D9D6D1 F0F0F0F4*
02C5E2C4 40404040 40400010 40400003 C4E2D8D9 E3404040 02000000
40000000 40404040 40404040 40404040 40404040 40404040 40404040
40404040 40404040 40404040 40404040 D7D9D6D1 F0F0F0F5*
02E3E7E3 40000138 4040000C 40400001 00000000 00000000 00000000
40404040 40404040 40404040 40404040 40404040 40404040 40404040
40404040 40404040 40404040 40404040 D7D9D6D1 F0F0F0F6*
02E3E7E3 40000190 40400038 40400001 58B0D118 7860D074 7C60D068
2B003806 28606060 D0B87820 D07C7C20 D0682B00 38022820 6020D0C8
7820D078 7C20D068 2B003802 28206020 D7D9D6D1 F0F0F0F7*
02E3E7E3 400001C8 40400038 40400001 D0C07820 D0807C20 D0682B00
38022820 6020D0D0 7820B004 7C20D068 2B003802 28206020 D0F87840
B0087C40 D0682B00 38042840 6040D100 D7D9D6D1 F0F0F0F8*
02E3E7E3 40000200 40400038 40400001 2B626060 D1282066 6820D0C8
2B246020 D1302022 6020D0E8 58F0D110 2B447840 F0046040 D1202964
47A0D214 292447A0 D21441F0 000858E0 D7D9D6D1 F0F0F0F9*
02E3E7E3 40000238 40400038 40400001 D00007FE 6840D0C0 6B40D0F8
6040D138 20446820 D0D06B20 D1006020 D1402022 6020D0E8 6940D120
47A0D24E 6920D120 47A0D24E 41F00008 D7D9D6D1 F0F0F1F0**
02E3E7E3 40000270 40400038 40400001 58E0D000 07FE6820 D0B86B20
D0C02C22 6840D0C8 6B40D0D0 6040D148 2C442A24 6020D150 58F0D114
4110D04C 05EF6000 D1586820 D1282C22 D7D9D6D1 F0F0F1F1*
02E3E7E3 400002A8 40400038 40400001 6840D130 2C442A24 6020D150
58F0D114 4110D050 05EF6000 D1606820 D1382C22 6840D140 2C442A24
6020D150 58F0D114 4110D054 05EF2820 D7D9D6D1 F0F0F1F2*
02E3E7E3 400002E0 40400038 40400001 6A20D160 23226A20 D1582022
6920D120 47C0D2D4 1BFF58E0 D00007FE 6840D0C0 6B40D0B8 6860D0B8
6C60D0D0 6820D0C0 6C20D0C8 2B626820 D7D9D6D1 F0F0F1F3*
02E3E7E3 40000318 40400038 40400001 D1486C20 D0F82804 6C00D100
2A202A26 20226020 D1506820 D1482C22 2C442A24 6020D158 58F0D114
4110D058 05EF6820 D1502D20 6920D120 D7D9D6D1 F0F0F1F4*
02E3E7E3 40000350 40400038 40400001 47C0D334 1BFF58E0 D00007FE
41F00004 58E0D000 07FE58D0 D00458E0 D00C92FF D00C982C D01C07FE
987A1004 78207000 7020D074 78208000 D7D9D6D1 F0F0F1F5*
02E3E7E3 40000388 4040002E 40400001 7020D07C 78209000 7020D078
7820A000 7020D080 58201000 41302000 41500004 1B255020 D1185030
D11C47F0 D1684040 40404040 40404040 D7D9D6D1 F0F0F1F6*
02E3E7E3 40000020 4040000C 40400001 00000378 00000028 00000366
40404040 40404040 40404040 40404040 40404040 40404040 40404040
```

```
40404040  40404040  40404040  40404040  D7D9D6D1  F0F0F1F7*
02E3E7E3  40000074  4040000C  40400001  80000178  80000178  80000178
40404040  40404040  40404040  40404040  40404040  40404040  40404040
40404040  40404040  40404040  40404040  D7D9D6D1  F0F0F1F8*
02D9D3C4  40404040  40400038  40404040  00020001  0C000138  00030001
1C00013C  00010001  0C000020  00010001  0C000024  00010001  0C000028
00010001  0C000074  00010001  0C000078  D7D9D6D1  F0F0F1F9*
02E3E7E3  40000080  40400004  40400001  80000180  40404040  40404040

MEMBER NAME  PROJLN
40404040  40404040  40404040  40404040  40404040  40404040  40404040
40404040  40404040  40404040  40404040  D7D9D6D1  F0F0F2F0**
02E3E7E3  40000148  40400038  40400001  00000000  00000000  00000000
00000000  00000000  00000000  00000000  00000000  00000000  00000000
00000000  00000000  00000000  00000000  D7D9D6D1  F0F0F2F1*
02E3E7E3  40000180  40400010  40400001  00000000  00000000  00000000
00000000  40404040  40404040  40404040  40404040  40404040  40404040
40404040  40404040  40404040  40404040  D7D9D6D1  F0F0F2F2*
02D9D3C4  40404040  40400010  40404040  00010001  0C00007C  00010001
0C000080  40404040  40404040  40404040  40404040  40404040  40404040
40404040  40404040  40404040  40404040  D7D9D6D1  F0F0F2F3*
02C5D5C4  40404040  40404040  40404040  40404040  40404040  40404040
000003B6  F1F5F7F3  F460C6D6  F34040F0  F2F0F2F8  F7F0F9F8  40F0F84B
F4F24BF3  F3404040  D7D9D6D1  D3D54040  D7D9D6D1  F0F0F2F4**

MEMBER NAME  PROJSP
02C5E2C4  40404040  40400010  40400001  D7D9D6D1  E2D74040  00000000
40000000  40404040  40404040  40404040  40404040  40404040  40404040
40404040  40404040  40404040  40404040  D7D9D6D1  F0F0F0F1*
02E3E7E3  40000000  40400028  40400001  47F0F00C  07D7D9D6  D1E2D740
90ECD00C  184D98CD  F0205040  D00450D0  400807FC  40404040  40404040
40404040  40404040  40404040  40404040  D7D9D6D1  F0F0F0F2*
02E3E7E3  400000F8  40400038  40400001  00000000  00000000  4F080000
00000000  00000000  00000000  00000001  00000001  00000002  00000003
00000004  00000005  00000006  00000007  D7D9D6D1  F0F0F0F3*
02C5E2C4  40404040  40400010  40400002  E3D6D3C5  D9404040  05000000
4000000C  40404040  40404040  40404040  40404040  40404040  40404040
40404040  40404040  40404040  40404040  D7D9D6D1  F0F0F0F4*
02E3E7E3  40000130  40400010  40400001  00000008  00000009  00000000
00000000  40404040  40404040  40404040  40404040  40404040  40404040
40404040  40404040  40404040  40404040  D7D9D6D1  F0F0F0F5*
02C5E2C4  40404040  40400010  40400003  E4D5C9E3  40404040  02000000
40000000  40404040  40404040  40404040  40404040  40404040  40404040
40404040  40404040  40404040  40404040  D7D9D6D1  F0F0F0F6*
02C5E2C4  40404040  40400010  40400004  D3C9D4C9  E3404040  02000000
40000000  40404040  40404040  40404040  40404040  40404040  40404040
40404040  40404040  40404040  40404040  D7D9D6D1  F0F0F0F7*
02C5E2C4  40404040  40400010  40400005  D6D5D6C6  C6404040  02000000
40000000  40404040  40404040  40404040  40404040  40404040  40404040
40404040  40404040  40404040  40404040  D7D9D6D1  F0F0F0F8*
02C5E2C4  40404040  40400010  40400006  E2D4E7D4  D5404040  02000000
40000000  40404040  40404040  40404040  40404040  40404040  40404040
40404040  40404040  40404040  40404040  D7D9D6D1  F0F0F0F9*
02E3E7E3  400001A0  40400014  40400001  00000000  00000000  00000000
00000000  00000000  40404040  40404040  40404040  40404040  40404040
40404040  40404040  40404040  40404040  D7D9D6D1  F0F0F1F0**
02E3E7E3  400001B8  40400008  40400001  00000000  00000000  40404040
40404040  40404040  40404040  40404040  40404040  40404040  40404040
40404040  40404040  40404040  40404040  D7D9D6D1  F0F0F1F1*
```

| | | | | | | |
|---|---|---|---|---|---|---|
| 02E3E7E3 | 400001C4 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6D1 | F0F0F1F2* | |
| 02E3E7E3 | 400001CC | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6D1 | F0F0F1F3* | |
| 02E3E7E3 | 40000208 | 40400038 | 40400001 | 5880D194 | 5890D178 | 58A0D19C |
| 58B0D188 | 5830D1B0 | 2B007800 | A0046A00 | D0D86000 | D0D05800 | D0D45000 |
| D1447800 | A00C7000 | D1502B00 | 7800A008 | D7D9D6D1 | F0F0F1F4* | |
| 02E3E7E3 | 40000240 | 40400038 | 40400001 | 6A00D0D8 | 6000D0D0 | 5800D0D4 |
| 5000D140 | 7800A010 | 7000D14C | 7800A018 | 7000D158 | 7800A01C | 7000D154 |
| 7800A020 | 7000D160 | 7800A024 | 7000D15C | D7D9D6D1 | F0F0F1F5* | |
| 02E3E7E3 | 40000278 | 40400038 | 40400001 | 7820A014 | 7020D16C | 5800D0E0 |
| 5000D12C | 32224780 | D26E5800 | D0E85000 | D12C4100 | B0045000 | D0644100 |
| B0085000 | D06858F0 | D1804110 | D05405EF | D7D9D6D1 | F0F0F1F6* | |
| 02E3E7E3 | 400002B0 | 40400038 | 40400001 | 41200001 | 5720D128 | 1BFF872F |
| D29E1BFF | 58E0D000 | 07FE7840 | B0047040 | D1D83344 | 7A40800C | 30447820 |
| B0087020 | D1DC3322 | 7A208010 | 30227020 | D7D9D6D1 | F0F0F1F7* | |
| 02E3E7E3 | 400002E8 | 40400038 | 40400001 | D1347940 | 90044730 | D2DA7920 |
| 90044730 | D2DA1BFF | 58E0D000 | 07FE7840 | 80147B40 | D1D83044 | 78208018 |
| 7B20D1DC | 30227020 | D1347940 | 90044730 | D7D9D6D1 | F0F0F1F8* | |
| 02E3E7E3 | 40000320 | 40400038 | 40400001 | D30A7920 | 90044730 | D30A1BFF |
| 58E0D000 | 07FE5870 | D1445A70 | D0EC5070 | D1645800 | D1405000 | D13C7800 |
| D0E47000 | D1205970 | D1404730 | D4705070 | D7D9D6D1 | F0F0F1F9* | |
| 02E3E7E3 | 40000358 | 40400038 | 40400001 | D1241C63 | 5070D1B8 | 18075A00 |

MEMBER NAME PROJSP

| | | | | | | |
|---|---|---|---|---|---|---|
| D1AC5000 | D1C01857 | 5A50D1B4 | 18475A40 | D0F81827 | 5A20D108 | 18075A00 |
| D0F85000 | D1D05A70 | D1085070 | D1D41834 | D7D9D6D1 | F0F0F2F0** | |
| 02E3E7E3 | 40000390 | 40400038 | 40400001 | 18455850 | D1C05860 | D1245880 |
| D1B058A0 | D1D018B2 | 5890D1A4 | 5870D188 | 5800D12C | 1BFF870F | D3DA7805 |
| 90007000 | D1187804 | 90007000 | D11C58F0 | D7D9D6D1 | F0F0F2F1* | |
| 02E3E7E3 | 400003C8 | 40400038 | 40400001 | D17C4110 | D07005EF | 7820D11C |
| 7C20D16C | 33227A23 | 90007B20 | 70043022 | 7020D130 | 7820D118 | 7C20D16C |
| 7A2B9000 | 7B207008 | 30227020 | D13447F0 | D7D9D6D1 | F0F0F2F2* | |
| 02E3E7E3 | 40000400 | 40400038 | 40400001 | D3FA782A | 90007B20 | 70043022 |
| 7020D130 | 58E0D1D4 | 782E9000 | 7B207008 | 30227020 | D1347800 | D13058F0 |
| D1787900 | F0044730 | D44C7800 | D13458F0 | D7D9D6D1 | F0F0F2F3* | |
| 02E3E7E3 | 40000438 | 40400038 | 40400001 | D1787900 | F0044730 | D44C5060 |
| D1245880 | D1945890 | D17858A0 | D19C58B0 | D1885830 | D1B05800 | D1245000 |
| D1387800 | D0E47000 | D14841F0 | 000458E0 | D7D9D6D1 | F0F0F2F4* | |
| 02E3E7E3 | 40000470 | 40400038 | 40400001 | D00007FE | 5800D1D4 | 1A085000 |
| D1D41AA8 | 1AB81A38 | 1A481A58 | 5A60D0EC | 5960D13C | 47C0D384 | 5060D124 |
| 5880D194 | 5890D178 | 58A0D19C | 58B0D188 | D7D9D6D1 | F0F0F2F5* | |
| 02E3E7E3 | 400004A8 | 40400038 | 40400001 | 5830D1B0 | 5820D144 | 5020D124 |
| 5800D0F8 | 5000D1B8 | 5030D1C4 | 18535C40 | D1441805 | 5A00D0F8 | 5000D1BC |
| 18055A00 | D1085000 | D1C81805 | 5A00D1AC | D7D9D6D1 | F0F0F2F6* | |
| 02E3E7E3 | 400004E0 | 40400038 | 40400001 | 5000D1CC | 18055A00 | D1B45000 |
| D1D01A53 | 5050D1D4 | 18A218B3 | 5890D1A4 | 5880D188 | 58E0D1BC | 410E9000 |
| 5000D07C | 58F0D190 | 4110D07C | 05EF4100 | D7D9D6D1 | F0F0F2F7* | |
| 02E3E7E3 | 40000518 | 40400038 | 40400001 | 80045000 | D0644100 | 80085000 |
| D06858F0 | D1804110 | D05405EF | 41200001 | 5720D128 | 1BFF862F | D630187A |
| 5A70D0EC | 5C60D1C4 | 18575A50 | D1B81847 | D7D9D6D1 | F0F0F2F8* | |
| 02E3E7E3 | 40000550 | 40400038 | 40400001 | 5A40D108 | 18375A30 | D1AC1827 |
| 5A20D1B4 | 41008004 | 5000D098 | 41008008 | 5000D09C | 58E0D1BC | 410E9000 |
| 5000D0A0 | 58E0D1C8 | 410E9000 | 5000D0A4 | D7D9D6D1 | F0F0F2F9* | |
| 02E3E7E3 | 40000588 | 40400038 | 40400001 | 41059000 | 5000D0A8 | 41049000 |
| 5000D0AC | 58E0D1CC | 410E9000 | 5000D0B0 | 58E0D1D0 | 410E9000 | 5000D0B4 |
| 41039000 | 5000D0B8 | 41029000 | 5000D0BC | D7D9D6D1 | F0F0F3F0** | |

| | | | | | | |
|---|---|---|---|---|---|---|
| 02E3E7E3 | 400005C0 | 40400038 | 40400001 | 58E0D1D4 | 410E9000 | 5000D0C0 |
| 58F0D184 | 4110D098 | 05EF50A0 | D12441E0 | 000415FE | 4720D5C2 | 58EFD04C |
| 07FE5880 | D1945890 | D17858A0 | D19C58B0 | D7D9D6D1 | F0F0F3F1* | |
| 02E3E7E3 | 400005F8 | 40400038 | 40400001 | D1885830 | D1B05800 | D1245900 |
| D1444770 | D5F67800 | D1747900 | D1504730 | D5F61BFF | 58E0D000 | 07FE5800 |
| D1245900 | D1404770 | D6167800 | D1747900 | D7D9D6D1 | F0F0F3F2* | |
| 02E3E7E3 | 40000630 | 40400038 | 40400001 | D14C4750 | D6161BFF | 58E0D000 |
| 07FE5800 | D1245000 | D1387800 | D1747000 | D14841F0 | 000458E0 | D00007FE |
| 5800D1D4 | 1A0B5000 | D1D45800 | D1D01A0B | D7D9D6D1 | F0F0F3F3* | |
| 02E3E7E3 | 40000668 | 40400038 | 40400001 | 5000D1D0 | 5800D1CC | 1A0B5000 |
| D1CC5800 | D1C81A0B | 5000D1C8 | 5800D1BC | 1A0B5000 | D1BC5AA0 | D0EC59A0 |
| D14047C0 | D4D850A0 | D1245880 | D1945890 | D7D9D6D1 | F0F0F3F4* | |
| 02E3E7E3 | 400006A0 | 40400038 | 40400001 | D17858A0 | D19C58B0 | D1885830 |
| D1B01BFF | 58E0D000 | 07FE58A0 | D00458E0 | A00C58B0 | A0185810 | B0145820 |
| D1385020 | 10005830 | B0187820 | D1487020 | D7D9D6D1 | F0F0F3F5* | |
| 02E3E7E3 | 400006D8 | 40400038 | 40400001 | 300018DA | 92FFA00C | 982CA01C |
| 07FE987A | 100C5820 | 70005020 | D1685820 | 90005020 | D1387820 | A0007020 |
| D1485820 | 10004130 | 20004150 | 00041B25 | D7D9D6D1 | F0F0F3F6* | |
| 02E3E7E3 | 40000710 | 40400038 | 40400001 | 5020D188 | 5030D18C | 58201004 |
| 41302000 | 41500004 | 1B255020 | D1945030 | D1985820 | 10084130 | 20004150 |
| 00041B25 | 5C40D0FC | 1B255020 | D1A45030 | D7D9D6D1 | F0F0F3F7* | |
| 02E3E7E3 | 40000748 | 4040001C | 40400001 | D1A85820 | 10104130 | 20004150 |
| 00041B25 | 5020D19C | 5030D1A0 | 47F0D1E0 | 40404040 | 40404040 | 40404040 |
| 40404040 | 40404040 | 40404040 | 40404040 | D7D9D6D1 | F0F0F3F8* | |
| 02E3E7E3 | 40000020 | 4040000C | 40400001 | 000006E6 | 00000028 | 000006B6 |
| 40404040 | 40404040 | 40404040 | 40404040 | 40404040 | 40404040 | 40404040 |

MEMBER NAME PROJSP

| | | | | | | |
|---|---|---|---|---|---|---|
| 40404040 | 40404040 | 40404040 | 40404040 | D7D9D6D1 | F0F0F3F9* | |
| 02D9D3C4 | 40404040 | 40400038 | 40404040 | 00020001 | 0C0001A0 | 00030001 |
| 1C0001A4 | 00040001 | 1C0001A8 | 00050001 | 1C0001AC | 00060001 | 1C0001B8 |
| 00010001 | 0C000020 | 00010001 | 0C000024 | D7D9D6D1 | F0F0F4F0** | |
| 02E3E7E3 | 40000074 | 40400018 | 40400001 | 000005EA | 00000658 | 00000180 |
| 00000188 | 0000017C | 00000184 | 40404040 | 40404040 | 40404040 | 40404040 |
| 40404040 | 40404040 | 40404040 | 40404040 | D7D9D6D1 | F0F0F4F1* | |
| 02E3E7E3 | 40000094 | 40400004 | 40400001 | 80000150 | 40404040 | 40404040 |
| 40404040 | 40404040 | 40404040 | 40404040 | 40404040 | 40404040 | 40404040 |
| 40404040 | 40404040 | 40404040 | 40404040 | D7D9D6D1 | F0F0F4F2* | |
| 02D9D3C4 | 40404040 | 40400038 | 40404040 | 00010001 | 0C000028 | 00010001 |
| 0C000074 | 00010001 | 0C000078 | 00010001 | 0C00007C | 00010001 | 0C000080 |
| 00010001 | 0C000084 | 00010001 | 0C000088 | D7D9D6D1 | F0F0F4F3* | |
| 02E3E7E3 | 40000098 | 4040000C | 40400001 | 00000140 | 00000144 | 80000148 |
| 40404040 | 40404040 | 40404040 | 40404040 | 40404040 | 40404040 | 40404040 |
| 40404040 | 40404040 | 40404040 | 40404040 | D7D9D6D1 | F0F0F4F4* | |
| 02E3E7E3 | 400000A8 | 40400010 | 40400001 | 00000118 | 00000194 | 00000180 |
| 00000188 | 40404040 | 40404040 | 40404040 | 40404040 | 40404040 | 40404040 |
| 40404040 | 40404040 | 40404040 | 40404040 | D7D9D6D1 | F0F0F4F5* | |
| 02D9D3C4 | 40404040 | 40400038 | 40404040 | 00010001 | 0C000094 | 00010001 |
| 0C000098 | 00010001 | 0C00009C | 00010001 | 0C0000A0 | 00010001 | 0C0000A8 |
| 00010001 | 0C0000AC | 00010001 | 0C0000B0 | D7D9D6D1 | F0F0F4F6* | |
| 02E3E7E3 | 400000B8 | 40400008 | 40400001 | 0000017C | 80000184 | 40404040 |
| 40404040 | 40404040 | 40404040 | 40404040 | 40404040 | 40404040 | 40404040 |
| 40404040 | 40404040 | 40404040 | 40404040 | D7D9D6D1 | F0F0F4F7* | |
| 02E3E7E3 | 400000EC | 40400008 | 40400001 | 0000019C | 80000194 | 40404040 |
| 40404040 | 40404040 | 40404040 | 40404040 | 40404040 | 40404040 | 40404040 |
| 40404040 | 40404040 | 40404040 | 40404040 | D7D9D6D1 | F0F0F4F8* | |
| 02E3E7E3 | 400001D4 | 40400034 | 40400001 | 0000000C | 00000014 | 00000010 |
| 00000000 | 00000000 | 00000000 | 00000000 | 00000000 | 00000000 | 00000000 |
| 00000000 | 00000008 | 00B40008 | 40404040 | D7D9D6D1 | F0F0F4F9* | |

| | | | | | | |
|---|---|---|---|---|---|---|
| 02D9D3C4 | 40404040 | 40400028 | 40404040 | 00010001 | 0C0000B4 | 00010001 |
| 0C0000B8 | 00010001 | 0C0000BC | 00010001 | 0C0000EC | 00010001 | 0C0000F0 |
| 40404040 | 40404040 | 40404040 | 40404040 | D7D9D6D1 | F0F0F5F0** | |
| 02C5D5C4 | 40404040 | 40404040 | 40404040 | 40404040 | 40404040 | 40404040 |
| 00000764 | F1F5F7F3 | F460C6D6 | F34040F0 | F2F0F2F8 | F7F0F9F8 | 40F0F84B |
| F4F24BF3 | F7404040 | D7D9D6D1 | E2D74040 | D7D9D6D1 | F0F0F5F1** | |

MEMBER NAME PSNOTE

| | | | | | | |
|---|---|---|---|---|---|---|
| 02C5E2C4 | 40404040 | 40400010 | 40400001 | D7E2D5D6 | E3C54040 | 00000000 |
| 40000000 | 40404040 | 40404040 | 40404040 | 40404040 | 40404040 | 40404040 |
| 40404040 | 40404040 | 40404040 | 40404040 | D7E2D5D6 | F0F0F0F1* | |
| 02E3E7E3 | 40000000 | 40400038 | 40400001 | 47F0F00C | 07D7E2D5 | D6E3C540 |
| 90ECD00C | 184D98CD | F0205040 | D00450D0 | 400807FC | 40404040 | 40404040 |
| 02100422 | 02140422 | 021A1C40 | C5D9D9D6 | D7E2D5D6 | F0F0F0F2* | |
| 02E3E7E3 | 40000038 | 40400038 | 40400001 | D97A40E2 | E4D7C5D9 | 40E3C5E7 |
| E340C9D5 | 40D7E2D5 | D6E3C522 | 021A1740 | C5D9D9D6 | D97A40D4 | D6C4E5E4 |
| 40C9D540 | D7E2D5D6 | E3C52202 | 1A1840C5 | D7E2D5D6 | F0F0F0F3* | |
| 02E3E7E3 | 40000070 | 40400017 | 40400001 | D9D9D6D9 | 7A40C5D5 | C4D4E5E4 |
| 40C9D540 | D7E2D5D6 | E3C52240 | 40404040 | 40404040 | 40404040 | 40404040 |
| 40404040 | 40404040 | 40404040 | 40404040 | D7E2D5D6 | F0F0F0F4* | |
| 02C5E2C4 | 40404040 | 40400010 | 40400002 | C4E5C9C5 | E6E24040 | 05000000 |
| 40000004 | 40404040 | 40404040 | 40404040 | 40404040 | 40404040 | 40404040 |
| 40404040 | 40404040 | 40404040 | 40404040 | D7E2D5D6 | F0F0F0F5* | |
| 02E3E7E3 | 40000150 | 40400028 | 40400001 | 00000000 | 00000001 | 00000002 |
| 00000003 | 00000004 | 401DF3B6 | 4029FBE7 | 403EF9DB | 00000000 | 00000000 |
| 40404040 | 40404040 | 40404040 | 40404040 | D7E2D5D6 | F0F0F0F6* | |
| 02C5E2C4 | 40404040 | 40400010 | 40400003 | D4D6C4E5 | E4404040 | 02000000 |
| 40000000 | 40404040 | 40404040 | 40404040 | 40404040 | 40404040 | 40404040 |
| 40404040 | 40404040 | 40404040 | 40404040 | D7E2D5D6 | F0F0F0F7* | |
| 02E3E7E3 | 40000198 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D7E2D5D6 | F0F0F0F8* | |
| 02C5E2C4 | 40404040 | 40400010 | 40400004 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D7E2D5D6 | F0F0F0F9* | |
| 02C5E2C4 | 40404040 | 40400010 | 40400005 | C3C1C4E2 | E4D74040 | 02000000 |
| 40000000 | 40404040 | 40404040 | 40404040 | 40404040 | 40404040 | 40404040 |
| 40404040 | 40404040 | 40404040 | 40404040 | D7E2D5D6 | F0F0F1F0** | |
| 02E3E7E3 | 400001A4 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | D7E2D5D6 | F0F0F1F1* | |
| 02C5E2C4 | 40404040 | 40400010 | 40400006 | C5D5C4D4 | E5E44040 | 02000000 |
| 40000000 | 40404040 | 40404040 | 40404040 | 40404040 | 40404040 | 40404040 |
| 40404040 | 40404040 | 40404040 | 40404040 | D7E2D5D6 | F0F0F1F2* | |
| 02C5E2C4 | 40404040 | 40400010 | 40400007 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | D7E2D5D6 | F0F0F1F3* | |
| 02E3E7E3 | 400001B4 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | D7E2D5D6 | F0F0F1F4* | |
| 02E3E7E3 | 40000194 | 40400004 | 40400001 | 40404040 | 40404040 | 40404040 |
| 40404040 | 40404040 | 40404040 | 40404040 | 40404040 | 40404040 | 40404040 |
| 40404040 | 40404040 | 40404040 | 40404040 | D7E2D5D6 | F0F0F1F5* | |
| 02E3E7E3 | 400001C0 | 40400038 | 40400001 | 5890D110 | 58A0D124 | 58B0D114 |
| 58F0D134 | 45E0F004 | 00000000 | 00000028 | 45E0F008 | 0450D0F8 | 45E0F010 |
| 58F0D134 | 45E0F000 | 00000000 | 0000002C | D7E2D5D6 | F0F0F1F6* | |
| 02D9D3C4 | 40404040 | 40400038 | 40404040 | 00020001 | 0C000198 | 00030001 |
| 1C0001A4 | 00040001 | 1C0001A8 | 00050001 | 1C0001B4 | 00060001 | 1C0001B8 |
| 00070001 | 1C0001BC | 00010001 | 0C0001D8 | D7E2D5D6 | F0F0F1F7* | |

```
02E3E7E3  400001F8  40400038  40400001  45E0F008  0470D100  45E0F010
7800B004  7000D0F0  7800B008  7000D0F4  4100D10E  5000D074  58F0D120
4110D070  05EF58F0  D11C4110  D07C05EF  D7E2D5D6  F0F0F1F8*
02E3E7E3  40000230  40400038  40400001  41E00008  15FE4720  D1B858EF
D04C07FE  58F0D12C  4110D080  05EF41E0  000415FE  4720D1D2  58EFD058
07FE5800  D0F85A00  D0CC5000  D0F858F0  D7E2D5D6  F0F0F1F9*
02E3E7E3  40000268  40400038  40400001  D1341800  45E0F004  00000000

MEMBER NAME  PSNOTE
00000028  45E0F008  0450D0FC  45E0F010  58F0D134  45E0F000  00000000
0000002C  45E0F008  0470D100  45E0F010  D7E2D5D6  F0F0F2F0**
02E3E7E3  400002A0  40400038  40400001  7800A004  7000D0F0  7800A008
7000D0F4  58F0D12C  4110D080  05EF41E0  000415FE  4720D242  58EFD060
07FE58F0  D1301B11  05EF41E0  000415FE  D7E2D5D6  F0F0F2F1*
02E3E7E3  400002D8  40400038  40400001  4720D25A  58EFD068  07FE1BFF
58E0D000  07FE58F0  D1341800  45E0F004  00000006  00000030  45E0F010
1BFF58E0  D00007FE  58F0D134  45E0F004  D7E2D5D6  F0F0F2F2*
02E3E7E3  40000310  40400038  40400001  00000006  00000050  45E0F010
1BFF58E0  D00007FE  58F0D134  45E0F004  00000006  0000006B  45E0F010
1BFF58E0  D00007FE  58A0D004  58E0A00C  D7E2D5D6  F0F0F2F3*
02E3E7E3  40000348  40400038  40400001  58B0A018  5810B004  5820D0F8
50201000  5830B010  5840D104  50403000  18DA92FF  A00C982C  A01C07FE
987A1004  58207000  5020D0F8  58209000  D7E2D5D6  F0F0F2F4*
02E3E7E3  40000380  40400038  40400001  5020D0FC  5820A000  5020D104
58201000  41302000  41500004  1B255020  D1145030  D1185820  10084130
20004150  00041B25  5020D124  5030D128  D7E2D5D6  F0F0F2F5*
02E3E7E3  400003B8  40400004  40400001  47F0D138  40404040  40404040
40404040  40404040  40404040  40404040  40404040  40404040  40404040
40404040  40404040  40404040  40404040  D7E2D5D6  F0F0F2F6*
02E3E7E3  40000020  40400008  40400001  00000370  00000088  40404040
40404040  40404040  40404040  40404040  40404040  40404040  40404040
40404040  40404040  40404040  40404040  D7E2D5D6  F0F0F2F7*
02D9D3C4  40404040  40400038  40404040  00010001  0C0001F4  00010001
0C000274  00010001  0C000290  00010001  0C0002F8  00010001  0C000314
00010001  0C000330  00010001  0C000020  D7E2D5D6  F0F0F2F8*
02E3E7E3  40000088  40400004  40400001  00000340  40404040  40404040
40404040  40404040  40404040  40404040  40404040  40404040  40404040
40404040  40404040  40404040  40404040  D7E2D5D6  F0F0F2F9*
02E3E7E3  400000D4  40400018  40400001  00000240  00000308  00000308
0000025A  000002EA  000002CA  40404040  40404040  40404040  40404040
40404040  40404040  40404040  40404040  D7E2D5D6  F0F0F3F0**
02D9D3C4  40404040  40400038  40404040  00010001  0C000024  00010001
0C000088  00010001  0C0000D4  00010001  0C0000D8  00010001  0C0000DC
00010001  0C0000E0  00010001  0C0000E4  D7E2D5D6  F0F0F3F1*
02E3E7E3  400000EC  40400010  40400001  000002EA  000002E2  00000324
00000158  40404040  40404040  40404040  40404040  40404040  40404040
40404040  40404040  40404040  40404040  D7E2D5D6  F0F0F3F2*
02E3E7E3  40000100  4040000C  40400001  80000002  80000194  00000178
40404040  40404040  40404040  40404040  40404040  40404040  40404040
40404040  40404040  40404040  40404040  D7E2D5D6  F0F0F3F3*
02D9D3C4  40404040  40400038  40404040  00010001  0C0000E8  00010001
0C0000EC  00010001  0C0000F0  00010001  0C0000F4  00010001  0C0000F8
00020001  0C000100  00010001  0C000104  D7E2D5D6  F0F0F3F4*
02E3E7E3  4000010C  4040001C  40400001  0000017C  0000018C  00000160
00000168  00000164  00000188  00000150  40404040  40404040  40404040
40404040  40404040  40404040  40404040  D7E2D5D6  F0F0F3F5*
02D9D3C4  40404040  40400038  40404040  00010001  0C000108  00010001
0C00010C  00010001  0C000110  00010001  0C000114  00010001  0C000118
00010001  0C00011C  00010001  0C000120  D7E2D5D6  F0F0F3F6*
```

```
02E3E7E3  40000128  4040001C  40400001  00000150  00000150  00000150
00000154  0000015C  00000150  00000150  40404040  40404040  40404040
40404040  40404040  40404040  40404040  D7E2D5D6  F0F0F3F7*
02D9D3C4  40404040  40400038  40404040  00010001  0C000124  00010001
0C000128  00010001  0C00012C  00010001  0C000130  00010001  0C000134
00010001  0C000138  00010001  0C00013C  D7E2D5D6  F0F0F3F8*
02E3E7E3  40000144  4040000C  40400001  00000168  0000016C  80000150
40404040  40404040  40404040  40404040  40404040  40404040  40404040

MEMBER NAME  PSNOTE
40404040  40404040  40404040  40404040  D7E2D5D6  F0F0F3F9*
02D9D3C4  40404040  40400020  40404040  00010001  0C000140  00010001
0C000144  00010001  0C000148  00010001  0C00014C  40404040  40404040
40404040  40404040  40404040  40404040  D7E2D5D6  F0F0F4F0**
02C5D5C4  40404040  40404040  40404040  40404040  40404040  40404040
000003BC  F1F5F7F3  F460C6D6  F34040F0  F2F0F2F8  F7F0F9F8  40F0F84B
F4F24BF4  F2404040  D7E2D5D6  E3C54040  D7E2D5D6  F0F0F4F1**

MEMBER NAME  PSTRES
02C5E2C4  40404040  40400010  40400001  D7E2E3D9  C5E24040  00000000
40000000  40404040  40404040  40404040  40404040  40404040  40404040
40404040  40404040  40404040  40404040  D7E2E3D9  F0F0F0F1*
02E3E7E3  40000000  40400038  40400001  47F0F00C  07D7E2E3  D9C5E240
90ECD00C  184D98CD  F0205040  D00450D0  400807FC  40404040  40404040
021A1AD7  C9C5D9C3  C540E3C1  C2D3C540  D7E2E3D9  F0F0F0F2*
02E3E7E3  40000038  40400038  40400001  C6D6D940  C4C1E2C8  407B4040
4D10031A  025D5B1A  04D7E37B  4010081A  054040E7  7E400A08  031A0540
40E87E40  0A08031A  015B1A17  D3D6C1C4  D7E2E3D9  F0F0F0F3*
02E3E7E3  40000070  40400038  40400001  40C4C9D9  C5C3E3C9  D6D540C1
D5C7D3C5  407E400A  06021A01  5B1A1ED3  C1E8E4D7  40C4C5C6  C9D5C5C4
40C6D9D6  D440E3D6  D6D340E2  C9C4C55B  D7E2E3D9  F0F0F0F4*
02E3E7E3  400000A8  40400038  40400001  5B180222  02068414  0122021A
2C405C5C  5C5C5C5C  5C5C5C5C  5C5C5C5C  5C5C5C40  E6C1D9D5  C9D5C740
5C5C5C5C  5C5C5C5C  5C5C5C5C  5C5C5C5C  D7E2E3D9  F0F0F0F5*
02E3E7E3  400000E0  40400038  40400001  401E1A20  4040C9D5  E5C1D3C9
C440E2C5  D8E4C5D5  C3C9D5C7  40C6D6D9  40D7D6C9  D5E37B40  10061A0A
4040E2C5  D8E4C5D5  C3C51006  22021A14  D7E2E3D9  F0F0F0F6*
02E3E7E3  40000118  40400038  40400001  C4E4D7D3  C9C3C1E3  C540E2C5
D8E4C5D5  C3C54040  1005180A  2202061E  14012202  0A05011A  016B2202
06061401  22021003  18021005  18011005  D7E2E3D9  F0F0F0F7*
02E3E7E3  40000150  40400038  40400001  18010A06  04180110  04180206
18140118  0A220206  38140122  020A0501  1A016B22  02060614  0122021A
01400A06  021A0340  7E401004  18010A05  D7E2E3D9  F0F0F0F8*
02E3E7E3  40000188  40400038  40400001  011A016C  22020615  14012202
1A08E3D6  E3C1D340  7E401004  18322202  060C1401  22021A20  C5E3407E
404DC5E7  405C40E3  5D404040  40404040  D7E2E3D9  F0F0F0F9*
02E3E7E3  400001C0  40400038  40400001  40404040  40404040  40407E40
0C0B0418  1422021A  20E3D6E3  C1D340E3  C8C9C3D2  D5C5E2E2  40404040
40404040  40404040  4040407E  400A0604  D7E2E3D9  F0F0F1F0**
02E3E7E3  400001F8  40400038  40400001  18011A02  C9D51814  22021A20
D3D6D5C7  C9E3E4C4  C9D5C1D3  40D4D6C4  E4D3E4E2  404DC5F1  5D40C5E7
40407E40  0C0B041A  0440D7E2  C9181422  D7E2E3D9  F0F0F1F1*
02E3E7E3  40000230  40400038  40400001  021A20E3  D9C1D5E2  E5C5D9E2
C540D4D6  C4E4D3E4  E2404040  4DC5F25D  40C5E840  407E400C  0B041A04
40D7E2C9  18142202  1A20E2C8  C5C1D940  D7E2E3D9  F0F0F1F2*
02E3E7E3  40000268  40400038  40400001  D4D6C4E4  D3E4E240  40404040
404DC7F1  F25D40C7  E7E84040  7E400C0B  041A0440  D7E2C918  1422021A
20D7D6C9  E2E2D6D5  7DE240D9  C1E3C9D6  D7E2E3D9  F0F0F1F3*
02E3E7E3  400002A0  40400038  40400001  4040404D  D5E4F1F2  5D40E5E7
```

```
E840407E  400A0504  18142202  1A20D7D6  C9E2E2D6  D57DE240  D9C1E3C9
D6404040  4DD5E4F2  F15D40E5  E8E74040  D7E2E3D9  F0F0F1F4*
02E3E7E3  400002D8  40400038  40400001  7E400A05  04181422  021A20D3
D6D5C7C9  E3E4C4C9  D5C1D340  C34BE34B  C54B40C1  D3D7C8C1  4040E740
407E400C  0B041A0C  40C9D561  C9D561C4  D7E2E3D9  F0F0F1F5*
02E3E7E3  40000310  40400038  40400001  C5C740C6  22021A20  E3D9C1D5
E2E5C5D9  E2C540C3  4BE34BC5  4B404040  C1D3D7C8  C14040E8  40407E40
0C0B041A  0C40C9D5  61C9D561  C4C5C740  D7E2E3D9  F0F0F1F6*
02E3E7E3  40000348  40400038  40400001  C622021A  20C1D7D7  C1D9C5D5
E340E2C8  D940C34B  E34BC54B  40C1D3D7  C8C140E7  E840407E  400C0B04
1A0C40C9  D561C9D5  61C4C5C7  40C62202  D7E2E3D9  F0F0F1F7*
02E3E7E3  40000380  40400038  40400001  06341401  22021A29  E3C8C540
C5D3C5D4  C5D5E3E2  40C9D540  E3C8C540  E2E3C9C6  C6D5C5E2  E240D4C1
E3D9C9E7  40C1D9C5  7A181422  0204060C  D7E2E3D9  F0F0F1F8*
02E3E7E3  400003B8  4040000E  40400001  0B041803  1C180A22  02065A14
01224040  40404040  40404040  40404040  40404040  40404040  40404040
40404040  40404040  40404040  40404040  D7E2E3D9  F0F0F1F9*
02E3E7E3  400003C8  40400038  40400001  E3D6E3C1  D340D7D3  E8E240C2

MEMBER NAME  PSTRES
E840D6D9  C9C5D5E3  C1E3C9D6  D5404040  40404040  C140C25B  C240C440
40404040  40404040  40404040  40404040  D7E2E3D9  F0F0F2F0**
02E3E7E3  40000400  40400028  40400001  40404040  40404040  C9D5E5C1
D3C9C440  E2C5D8E4  C5D5C3C9  D5C74040  40404040  40404040  40404040
40404040  40404040  40404040  40404040  D7E2E3D9  F0F0F2F1*
02E3E7E3  40000E60  40400038  40400001  00000000  00000000  4E000000
00000000  4F080000  00000000  4E000000  80000000  41100000  00000000
00000000  00000000  00000000  00000001  D7E2E3D9  F0F0F2F2*
02E3E7E3  40000E98  40400038  40400001  00000001  00000002  00000003
00000004  00000005  00000006  00000007  00000008  0000000A  0000000B
0000000C  00000010  00000012  00000015  D7E2E3D9  F0F0F2F3*
02E3E7E3  40000ED0  40400038  40400001  00000018  00000019  0000001A
0000001E  0000002A  00000033  00000034  00000038  00000049  00000058
0000005A  00000064  00000083  00000084  D7E2E3D9  F0F0F2F4*
02E3E7E3  40000F08  40400038  40400001  00000098  000000AE  00061A80
0007A120  000927C0  3F2D0E56  3FE978D5  40147AE1  40189375  401DF3B6
401EB852  40200000  40210625  40266666  D7E2E3D9  F0F0F2F5*
02E3E7E3  40000F40  40400038  40400001  4029FBE7  403EF9DB  40400000
40591687  4082D0E5  40991687  40B78D50  40D91687  40F5C28F  40F74BC7
41100000  41102D0E  4111A5E3  411220C5  D7E2E3D9  F0F0F2F6*
02E3E7E3  40000F78  40400038  40400001  4112A3D7  4113A9FC  4113CED9
4114AC08  41160831  411620C5  41163D71  41170E56  41184DD3  411A20C5
411AB852  411D47AE  411EA7F0  411EE148  D7E2E3D9  F0F0F2F7*
02E3E7E3  40000FB0  40400038  40400001  4123AE14  41261893  413672B0
413ED0E5  4140CCCD  41474396  414F4BC7  4152E148  41555C29  4157126F
415BC28F  42640000  00000000  00000000  D7E2E3D9  F0F0F2F8*
02C5E2C4  40404040  40400010  40400002  D9D4D6C4  C5D34040  05000000
40000018  40404040  40404040  40404040  40404040  40404040  40404040
40404040  40404040  40404040  40404040  D7E2E3D9  F0F0F2F9*
02C5E2C4  40404040  40400010  40400003  D6D7E3C9  D6D54040  05000000
40000020  40404040  40404040  40404040  40404040  40404040  40404040
40404040  40404040  40404040  40404040  D7E2E3D9  F0F0F3F0**
02C5E2C4  40404040  40400010  40400004  E2E3C1C3  D2404040  05000000
40040744  40404040  40404040  40404040  40404040  40404040  40404040
40404040  40404040  40404040  40404040  D7E2E3D9  F0F0F3F1*
02C5E2C4  40404040  40400010  40400005  D7D7D6C9  D5E34040  05000000
40013884  40404040  40404040  40404040  40404040  40404040  40404040
40404040  40404040  40404040  40404040  D7E2E3D9  F0F0F3F2*
02C5E2C4  40404040  40400010  40400006  D7D4C1E3  D3404040  05000000
```

```
40001134  40404040  40404040  40404040  40404040  40404040  40404040
40404040  40404040  40404040  40404040  D7E2E3D9  F0F0F3F3*
02C5E2C4  40404040  40400010  40400007  C4C5D9D6  E3404040  02000000
40000000  40404040  40404040  40404040  40404040  40404040  40404040
40404040  40404040  40404040  40404040  D7E2E3D9  F0F0F3F4*
02E3E7E3  400021E0  40400020  40400001  00001688  FFFFFFFF  00000000
FFFFFFA8  FFFFFFF0  FFFFFFA0  00001130  00000000  40404040  40404040
40404040  40404040  40404040  40404040  D7E2E3D9  F0F0F3F5*
02E3E7E3  40002204  40400004  40400001  00000000  40404040  40404040
40404040  40404040  40404040  40404040  40404040  40404040  40404040
40404040  40404040  40404040  40404040  D7E2E3D9  F0F0F3F6*
02D9D3C4  40404040  40400038  40404040  00010001  0C0021E0  00020001
0C0021E4  00030001  0C0021E8  00040001  0C0021EC  00050001  0C0021F0
00060001  0C0021F4  00060001  0C0021F8  D7E2E3D9  F0F0F3F7*
02C5E2C4  40404040  40400010  40400008  D4E5C3C8  D9404040  02000000
40000000  40404040  40404040  40404040  40404040  40404040  40404040
40404040  40404040  40404040  40404040  D7E2E3D9  F0F0F3F8*
02C5E2C4  40404040  40400010  40400009  D5C3C1D9  C4404040  02000000
40000000  40404040  40404040  40404040  40404040  40404040  40404040

MEMBER NAME  PSTRES
40404040  40404040  40404040  40404040  D7E2E3D9  F0F0F3F9*
02C5E2C4  40404040  40400010  4040000A  C3C1C4D3  D5F14040  02000000
40000000  40404040  40404040  40404040  40404040  40404040  40404040
40404040  40404040  40404040  40404040  D7E2E3D9  F0F0F4F0**
02C5E2C4  40404040  40400010  4040000B  C3C1C4E2  E4D74040  02000000
40000000  40404040  40404040  40404040  40404040  40404040  40404040
40404040  40404040  40404040  40404040  D7E2E3D9  F0F0F4F1*
02C5E2C4  40404040  40400010  4040000C  C3C8C1D9  C6D34040  02000000
40000000  40404040  40404040  40404040  40404040  40404040  40404040
40404040  40404040  40404040  40404040  D7E2E3D9  F0F0F4F2*
02C5E2C4  40404040  40400010  4040000D  C3D6D5E2  E3D94040  02000000
40000000  40404040  40404040  40404040  40404040  40404040  40404040
40404040  40404040  40404040  40404040  D7E2E3D9  F0F0F4F3*
02C5E2C4  40404040  40400010  4040000E  C9C2C3D6  D47B4040  02000000
40000000  40404040  40404040  40404040  40404040  40404040  40404040
40404040  40404040  40404040  40404040  D7E2E3D9  F0F0F4F4*
02E3E7E3  40002208  4040001C  40400001  00000000  00000000  00000000
00000000  00000000  00000000  00000000  40404040  40404040  40404040
40404040  40404040  40404040  40404040  D7E2E3D9  F0F0F4F5*
02D9D3C4  40404040  40400038  40404040  00070001  1C002204  00080001
1C002208  00090001  1C00220C  000A0001  1C002210  000B0001  1C002214
000C0001  1C002218  000D0001  1C00221C  D7E2E3D9  F0F0F4F6*
02C5E2C4  40404040  40400010  4040000F  C9C3D5E3  C5D94040  02000000
40000000  40404040  40404040  40404040  40404040  40404040  40404040
40404040  40404040  40404040  40404040  D7E2E3D9  F0F0F4F7*
02C5E2C4  40404040  40400010  40400010  E6D9E3D4  C1E34040  02000000
40000000  40404040  40404040  40404040  40404040  40404040  40404040
40404040  40404040  40404040  40404040  D7E2E3D9  F0F0F4F8*
02E3E7E3  40002224  40400008  40400001  00000000  00000000  40404040
40404040  40404040  40404040  40404040  40404040  40404040  40404040
40404040  40404040  40404040  40404040  D7E2E3D9  F0F0F4F9*
02E3E7E3  40001940  40400030  40400001  E2C5D840  4040D3C1  E8E4D740
E3C8C9C3  D24040D4  C1E3D340  4040D7D3  E840D6D9  C9C5D5E3  C1E3C9D6
D5E24040  40404040  40404040  40404040  D7E2E3D9  F0F0F5F0**
02E3E7E3  40002140  40400038  40400001  C3D6D7E8  D9C9C7C8  E3404DC3
5D40F1F9  F8F640E3  C8C540C2  D6C5C9D5  C740C3D6  D4D7C1D5  E85BC1D3
D340D9C9  C7C8E3E2  40D9C5E2  C5D9E5C5  D7E2E3D9  F0F0F5F1*
02E3E7E3  40002178  40400038  40400001  C45B5BE2  D3C9C340  E5C5D9E2
```

```
C9D6D540 E7E7E7E7 40404040 40404040 40404040 40404040 40404040
40404040 40404040 40404040 40404040 D7E2E3D9 F0F0F5F2*
02E3E7E3 400021B0 40400028 40400001 40404040 40404040 40404040
40404040 40404040 40404040 40404040 40404040 40404040 40404040
40404040 40404040 40404040 40404040 D7E2E3D9 F0F0F5F3*
02E3E7E3 400022A0 40400038 40400001 5880C010 5890C000 5800DA60
5000DBFC 41009B00 5000D128 58F0C028 4110D124 05EF58E0 C0B05820
C01C580E 20001000 5000DBE4 5800DA8C D7E2E3D9 F0F0F5F4*
02E3E7E3 400022D8 40400038 40400001 5000C0A0 5800DAA8 5000C0A4
58E0DAA8 583E2000 89300004 2B007803 80046A00 DA486000 DA385800
DA3C5000 DBE87803 80087000 DBD87803 D7E2E3D9 F0F0F5F5*
02E3E7E3 40002310 40400038 40400001 800C7000 DBDC5800 DA705000
DC4C7803 80107000 DC6C58F0 C0401800 45E0F004 00000000 00000028
45E0F008 0450DBE4 45E0F008 0450DBE8 D7E2E3D9 F0F0F5F6*
02E3E7E3 40002348 40400038 40400001 45E0F008 0470DBD8 45E0F008
0470DBDC 45E0F008 0470DC6C 45E0F010 58F0C040 45E0F000 00000000
000000AC 45E0F00C 000010F8 012000AE D7E2E3D9 F0F0F5F7*
02E3E7E3 40002380 40400038 40400001 45E0F010 58F0C008 5800F008
1BFF860F C21C58F0 C0444110 D13005EF 5000DC1C 7800DBA8 33007000
C09C58F0 C0344110 D13805EF 41E00004 D7E2E3D9 F0F0F5F8*

MEMBER NAME  PSTRES
02E3E7E3 400023B8 40400038 40400001 15FE4720 C1E458EF D04C07FE
4100DD52 5000D184 410092B8 5000D188 9280D188 58F0C028 4110D180
05EF58F0 C0344110 D18C05EF 41E00004 D7E2E3D9 F0F0F5F9*
02E3E7E3 400023F0 40400038 40400001 15FE4720 C21C58EF D05407FE
5800DA64 5000DC64 58E0C0A4 58F0C01C 583EF000 89300004 2B007803
80046A00 DA486000 DA385820 DA3C5020 D7E2E3D9 F0F0F6F0**
02E3E7E3 40002428 40400038 40400001 DC041832 5A30DA64 5030DE50
18325A30 DAE85030 DE541832 5A30DAEC 5030DE58 5A20DAF0 5020DE5C
5800DA64 5000DC5C 7800DBA8 33007000 D7E2E3D9 F0F0F6F1*
02E3E7E3 40002460 40400038 40400001 DE487800 DB507000 DE4C7800
DB847000 DC505800 DA705000 DC007800 DA687000 90105800 DA705000
DBC05800 DA9C5000 C0807820 DB403322 D7E2E3D9 F0F0F6F2*
02E3E7E3 40002498 40400038 40400001 7020C07C 7020C090 7800DBB0
33007000 C0945800 C0B45000 C0845880 DA7C5890 C00C5800 DC5C5A00
DA705000 DC5C58F0 C0384110 D1D405EF D7E2E3D9 F0F0F6F3*
02E3E7E3 400024D0 40400038 40400001 41E00004 15FE4720 C30058EF
D05C07FE 58E0C084 58F0C01C 587EF000 5C60DACC 2B007807 900C6A00
DA486000 DA385830 DA3C5030 DC182B00 D7E2E3D9 F0F0F6F4*
02E3E7E3 40002508 40400038 40400001 78079010 6A00DA48 6000DA38
5800DA3C 5000DC08 2B007807 90186A00 DA486000 DA385850 DA3C5050
DC445C40 DACC5050 C08858F0 C0146825 D7E2E3D9 F0F0F6F5*
02E3E7E3 40002540 40400038 40400001 F0502B00 38026A00 DA486000
DA385800 DA3C5000 DC0C5800 DBC05900 DA704780 C4885930 DC244770
C48858F0 C0085800 F0081BFF 870FC3E4 D7E2E3D9 F0F0F6F6*
02E3E7E3 40002578 40400034 40400001 58F0C040 45E0F004 00000009
000000B2 45E0F008 0450DC04 45E0F008 0450DC18 45E0F010 58F0C040
45E0F004 00000006 000000B2 40404040 D7E2E3D9 F0F0F6F7*
02D9D3C4 40404040 40400038 40404040 000E0001 1C002220 000F0001
1C002224 00100001 1C002228 00010001 0C002334 00010001 0C002370
00010001 0C002378 00010001 0C002584 D7E2E3D9 F0F0F6F8*
02E3E7E3 400025AC 40400038 40400001 45E0F008 0450DC04 45E0F008
0450DC18 45E0F010 47F0C488 5800DBFC 1BFF860F C40858F0 C0344110
D1E405EF 41E00004 15FE4720 C40858EF D7E2E3D9 F0F0F6F9*
02E3E7E3 400025E4 40400038 40400001 D06407FE 5800DA6C 5000DBFC
58F0C040 45E0F004 00000000 00000115 45E0F008 0450DC18 45E0F010
58F0C040 45E0F000 00000000 00000131 D7E2E3D9 F0F0F7F0**
02E3E7E3 4000261C 40400038 40400001 45E0F134 00010000 0120DD7E
```

| | | | | | | |
|---|---|---|---|---|---|---|
| 0100001E | 00000001 | 45E0F010 | 58F0C044 | 4110D22C | 05EF5000 | DC1C58F0 |
| C0344110 | D23405EF | 41E00004 | 15FE4720 | D7E2E3D9 | F0F0F7F1* | |
| 02E3E7E3 | 40002654 | 40400038 | 40400001 | C47C58EF | D06C07FE | 7800DC50 |
| 7B00DB20 | 7000DC50 | 5800DC18 | 5000DC24 | 58F0C038 | 4110D27C | 05EF41E0 |
| 000415FE | 4720C4AA | 58EFD074 | 07FE58E0 | D7E2E3D9 | F0F0F7F2* | |
| 02E3E7E3 | 4000268C | 40400038 | 40400001 | C08458F0 | C01C583E | F0005C20 |
| DACC4103 | 90405000 | D28C58F0 | C0244110 | D28C05EF | 5820DC14 | 89200002 |
| 5020C08C | 18781892 | 7860DC6C | 7827DE5C | D7E2E3D9 | F0F0F7F3* | |
| 02E3E7E3 | 400026C4 | 40400038 | 40400001 | 3B267027 | DE5C8778 | C4E05890 |
| C00C7800 | DA687000 | DC705800 | DBC05900 | DA704770 | C51A7820 | DE605820 |
| DC008920 | 000358F0 | C0007022 | F00458E0 | D7E2E3D9 | F0F0F7F4* | |
| 02E3E7E3 | 400026FC | 40400038 | 40400001 | C08858F0 | C014680E | F0586000 |
| C0605800 | DC648900 | 00035000 | C0685800 | DC648900 | 00025000 | C06C5820 |
| DC008920 | 00035020 | C0705800 | C08C5000 | D7E2E3D9 | F0F0F7F5* | |
| 02E3E7E3 | 40002734 | 40400038 | 40400001 | C0781858 | 5870DA70 | 5880DA8C |
| 18927840 | DB405860 | C0005800 | DC641A07 | 5000DC64 | 5800C06C | 5A00DA7C |
| 5000C06C | 5830C068 | 1A385030 | C0681843 | D7E2E3D9 | F0F0F7F6* | |
| 02E3E7E3 | 4000276C | 40400038 | 40400001 | 2B227825 | DE5C6023 | 62E058F0 |
| C0085800 | F0181BFF | 870FC5B2 | 682462E0 | 6C20DA58 | 23026004 | 62E058E0 |
| C06C5800 | DC44500E | DE7C2B22 | 7820DC70 | D7E2E3D9 | F0F0F7F7* | |
| 02E3E7E3 | 400027A4 | 40400038 | 40400001 | 6A20C060 | 7020DC70 | 686462E0 |

MEMBER NAME PSTRES

| | | | | | | |
|---|---|---|---|---|---|---|
| 18782B22 | 78276004 | 29624770 | C5E87827 | 60083A24 | 70276008 | 2B227827 |
| 60042962 | 4770C5F8 | 47F0C61E | 8778C5D2 | D7E2E3D9 | F0F0F7F8* | |
| 02E3E7E3 | 400027DC | 40400038 | 40400001 | 5870DA70 | 5800DC00 | 1A075000 |
| DC005820 | C0701A28 | 5020C070 | 1A987062 | 60047042 | 60085870 | DA705A50 |
| DA7C5950 | C07847C0 | C56A5890 | C00C5880 | D7E2E3D9 | F0F0F7F9* | |
| 02E3E7E3 | 40002814 | 40400038 | 40400001 | DA7C5800 | DA705000 | DBF85800 |
| DC145000 | DC101908 | 47C0C650 | 5080DC10 | 5820DC10 | 89200002 | 5850DA80 |
| 5860DA70 | 18781892 | 58F0C040 | 45E0F004 | D7E2E3D9 | F0F0F8F0** | |
| 02E3E7E3 | 4000284C | 40400038 | 40400001 | 00000000 | 00000137 | 45E0F008 |
| 0477DE5C | 45E0F010 | 5800DBF8 | 1A055000 | DC2058F0 | C0401800 | 45E0F000 |
| 00000000 | 0000013F | 5810DBF8 | 45E0F134 | D7E2E3D9 | F0F0F8F1* | |
| 02E3E7E3 | 40002884 | 40400014 | 40400001 | 00010000 | 0121DCB7 | 02001020 |
| 00001048 | 00000E98 | 40404040 | 40404040 | 40404040 | 40404040 | 40404040 |
| 40404040 | 40404040 | 40404040 | 40404040 | D7E2E3D9 | F0F0F8F2* | |
| 02D9D3C4 | 40404040 | 40400038 | 40404040 | 00010001 | 0C0025A8 | 00010001 |
| 0C0025FC | 00010001 | 0C002618 | 00010001 | 0C002850 | 00010001 | 0C002878 |
| 00010001 | 0800288D | 00010001 | 08002891 | D7E2E3D9 | F0F0F8F3* | |
| 02E3E7E3 | 40002898 | 40400038 | 40400001 | 00000001 | 45E0F010 | 5800DC20 |
| 1A065000 | DBF88778 | C6645890 | C00C58F0 | C0085800 | F0081BFF | 860FC910 |
| 58F0C040 | 45E0F004 | 00000000 | 00000145 | D7E2E3D9 | F0F0F8F4* | |
| 02E3E7E3 | 400028D0 | 40400038 | 40400001 | 45E0F008 | 0450DC4C | 45E0F008 |
| 0450DC18 | 45E0F008 | 0450DC08 | 45E0F008 | 0470DC70 | 45E0F008 | 0450DC0C |
| 45E0F00C | 000010E0 | 01200018 | 45E0F010 | D7E2E3D9 | F0F0F8F5* | |
| 02E3E7E3 | 40002908 | 40400038 | 40400001 | 58F0C040 | 45E0F000 | 00000000 |
| 00000162 | 45E0F134 | 00010000 | 0120DD7E | 01000038 | 00000001 | 45E0F010 |
| 5800DC14 | 5A00DC4C | 5000DC4C | 58F0C044 | D7E2E3D9 | F0F0F8F6* | |
| 02E3E7E3 | 40002940 | 40400038 | 40400001 | 4110D298 | 05EF5000 | DC1C4100 |
| DE4C5000 | D2A458F0 | C0344110 | D2A005EF | 41E00004 | 15FE4720 | C78C58EF |
| D07C07FE | 7820DE4C | 7B20DB0C | 7020DE4C | D7E2E3D9 | F0F0F8F7* | |
| 02E3E7E3 | 40002978 | 40400038 | 40400001 | 5980DC14 | 47A0C910 | 5840DA80 |
| 5850DA80 | 5890DC14 | 194947C0 | C7B647F0 | C91058F0 | C0384110 | D2E805EF |
| 41E00004 | 15FE4720 | C7D058EF | D08407FE | D7E2E3D9 | F0F0F8F8* | |
| 02E3E7E3 | 400029B0 | 40400038 | 40400001 | 58F0C038 | 4110D2F8 | 05EF41E0 |
| 000415FE | 4720C7EA | 58EFD08C | 07FE5800 | DC5C5A00 | DA705000 | DC5C5800 |
| DA705000 | DBF81829 | 1B245A20 | DA705020 | D7E2E3D9 | F0F0F8F9* | |
| 02E3E7E3 | 400029E8 | 40400038 | 40400001 | DC101928 | 47C0C814 | 5080DC10 |

| | | | | | | |
|---|---|---|---|---|---|---|
| 5820DC10 | 1A245B20 | DA705020 | DC108920 | 00021834 | 89300002 | 5860DA70 |
| 18731892 | 58F0C040 | 45E0F004 | 00000000 | D7E2E3D9 | F0F0F9F0** | |
| 02E3E7E3 | 40002A20 | 40400038 | 40400001 | 00000168 | 45E0F008 | 0477DE5C |
| 45E0F010 | 5800DBF8 | 1A055000 | DC2058F0 | C0401800 | 45E0F000 | 00000000 |
| 00000170 | 5810DBF8 | 45E0F134 | 00010000 | D7E2E3D9 | F0F0F9F1* | |
| 02E3E7E3 | 40002A58 | 4040000C | 40400001 | 0121DCB7 | 02001020 | 00001048 |
| 40404040 | 40404040 | 40404040 | 40404040 | 40404040 | 40404040 | 40404040 |
| 40404040 | 40404040 | 40404040 | 40404040 | D7E2E3D9 | F0F0F9F2* | |
| 02D9D3C4 | 40404040 | 40400038 | 40404040 | 00010001 | 08002895 | 00010001 |
| 0C0028CC | 00010001 | 0C0028FC | 00010001 | 0C002914 | 00010001 | 0C002A20 |
| 00010001 | 0C002A48 | 00010001 | 08002A5D | D7E2E3D9 | F0F0F9F3* | |
| 02E3E7E3 | 40002A64 | 40400038 | 40400001 | 00000E98 | 00000001 | 45E0F010 |
| 5800DC20 | 1A065000 | DBF88778 | C8345890 | DC144100 | DD975000 | D30C4100 |
| DCB85000 | D3109280 | D31058F0 | C0284110 | D7E2E3D9 | F0F0F9F4* | |
| 02E3E7E3 | 40002A9C | 40400038 | 40400001 | D30805EF | 58F0C044 | 4110D314 |
| 05EF5000 | DC1C4100 | DE485000 | D31C4100 | DE4C5000 | D32058F0 | C0344110 |
| D31C05EF | 41E00004 | 15FE4720 | C8F858EF | D7E2E3D9 | F0F0F9F5* | |
| 02E3E7E3 | 40002AD4 | 40400038 | 40400001 | D09407FE | 7820DE4C | 7B20DB0C |
| 7020DE4C | 5840DC10 | 5A40DA70 | 47F0C7AC | 5890C00C | 5820DBC0 | 5A20DA70 |
| 5020DBC0 | 5800C084 | 5A00DA9C | 5000C084 | D7E2E3D9 | F0F0F9F6* | |
| 02E3E7E3 | 40002B0C | 40400038 | 40400001 | 5920DC48 | 47C0C2DA | 5880C010 |
| 5890C000 | 58F0C008 | 5800F008 | 1BFF860F | CAD85800 | DC5C5700 | DA545000 |

MEMBER NAME PSTRES

| | | | | | | |
|---|---|---|---|---|---|---|
| DA446820 | DA406B20 | DA507020 | C0A87B20 | D7E2E3D9 | F0F0F9F7* | |
| 02E3E7E3 | 40002B44 | 40400038 | 40400001 | DB407C20 | DB0C3322 | 7A20DB48 |
| 7020DC34 | 7800DB68 | 7000DC40 | 7800DBAC | 33007000 | DC547800 | DB6C3300 |
| 7000DC78 | 58F0C030 | 4110D364 | 05EF58F0 | D7E2E3D9 | F0F0F9F8* | |
| 02E3E7E3 | 40002B7C | 40400038 | 40400001 | C0304110 | D37405EF | 58F0C030 |
| 4110D384 | 05EF7800 | DB487000 | DC585800 | DA705000 | DBD45860 | DA705890 |
| DC5C58F0 | C0304110 | D39405EF | 7800DC58 | D7E2E3D9 | F0F0F9F9* | |
| 02E3E7E3 | 40002BB4 | 40400038 | 40400001 | 7B00DB0C | 7000DC58 | 5800DBD4 |
| 1A065000 | DBD41909 | 47C0C9C6 | 5890C000 | 7820C0A8 | 7C20DB0C | 7800DB3C |
| 3A027000 | DC3058F0 | C0304110 | D3A405EF | D7E2E3D9 | F0F1F0F0** | |
| 02E3E7E3 | 40002BEC | 40400038 | 40400001 | 7800DBA0 | 33007000 | C0B858F0 |
| C0304110 | D3B405EF | 58F0C030 | 4110D3C4 | 05EF7800 | DB9C3300 | 7000C0B8 |
| 58F0C030 | 4110D3D4 | 05EF7800 | DB943300 | D7E2E3D9 | F0F1F0F1* | |
| 02E3E7E3 | 40002C24 | 40400038 | 40400001 | 7000C0B8 | 58F0C030 | 4110D3E4 |
| 05EF7800 | DB903300 | 7000C0B8 | 58F0C030 | 4110D3F4 | 05EF5800 | DBFC1BFF |
| 870FCA78 | 1BFF58E0 | D00007FE | 58F0C030 | D7E2E3D9 | F0F1F0F2* | |
| 02E3E7E3 | 40002C5C | 40400038 | 40400001 | 4110D404 | 05EF58F0 | C0304110 |
| D41405EF | 7800DB44 | 33007000 | C0B858F0 | C0304110 | D42405EF | 7800DB60 |
| 33007000 | C0B87800 | DB283300 | 7000C0BC | D7E2E3D9 | F0F1F0F3* | |
| 02E3E7E3 | 40002C94 | 40400038 | 40400001 | 58F0C030 | 4110D434 | 05EF58F0 |
| C0344110 | D44405EF | 41E00004 | 15FE4720 | CAD858EF | D09C07FE | 58F0C03C |
| 4110D48C | 05EF6840 | 91706820 | 91886020 | D7E2E3D9 | F0F1F0F4* | |
| 02E3E7E3 | 40002CCC | 40400038 | 40400001 | C0B82D42 | 6040DCA0 | 68209180 |
| 68609168 | 28022D06 | 6000DCA8 | 2C402344 | 6A40DA58 | 2C646D60 | DCB06060 |
| DC806820 | C0B82C24 | 6D20DCB0 | 6020DC88 | D7E2E3D9 | F0F1F0F5* | |
| 02E3E7E3 | 40002D04 | 40400038 | 40400001 | 680091A8 | 6D00DCB0 | 6000DC90 |
| 58F0C048 | 4110D4CC | 05EF58F0 | C0085800 | F0081BFF | 870FCB5A | 58F0C02C |
| 4110D51C | 05EF1BFF | 58E0D000 | 07FE5800 | D7E2E3D9 | F0F1F0F6* | |
| 02E3E7E3 | 40002D3C | 40400038 | 40400001 | DC645700 | DA545000 | DA446800 |
| DA406B00 | DA507000 | DC747800 | DB703300 | 7000DC3C | 7800DB5C | 33007000 |
| C0AC58F0 | C0344110 | D54C05EF | 41E00004 | D7E2E3D9 | F0F1F0F7* | |
| 02E3E7E3 | 40002D74 | 40400038 | 40400001 | 15FE4720 | CBA058EF | D0A407FE |
| 7800DC3C | 7B00DB14 | 7000DC3C | 7800DB98 | 7000DC38 | 7800C0AC | 7000C07C |
| 5820DC00 | 89200003 | 5870DA8C | 5880DA8C | D7E2E3D9 | F0F1F0F8* | |
| 02E3E7E3 | 40002DAC | 40400038 | 40400001 | 18925860 | C0002B00 | 78076008 |

```
6A00DA48  6000DA38  5830DA3C  5030DC28  18035700  DA545000  DA446820
DA406B20  DA507D20  DC747C20  DBB47020  D7E2E3D9  F0F1F0F9*
02E3E7E3  40002DE4  40400038  40400001  DC2C58F0  C0401800  45E0F004
00000000  00000176  45E0F008  04776004  45E0F008  0450DC28  45E0F008
0470DC2C  45E0F010  58F0C040  45E0F000  D7E2E3D9  F0F1F1F0**
02E3E7E3  40002E1C  40400038  40400001  00000000  0000018D  45E0F134
00010000  0120DD7E  01000015  00000001  45E0F010  58F0C034  4110D594
05EF41E0  000415FE  4720CC76  58EFD0AC  D7E2E3D9  F0F1F1F1*
02E3E7E3  40002E54  40400038  40400001  07FE7800  DC3C7B00  DB147000
DC3C7800  DC387A00  DB147000  DC388778  CBD25880  C0105890  C0007800
DC307900  DC3847A0  CCAE7800  DC387000  D7E2E3D9  F0F1F1F2*
02E3E7E3  40002E8C  40400038  40400001  DC3058F0  C0401800  45E0F004
00000000  00000193  45E0F008  0450DC64  45E0F010  58F0C040  45E0F000
00000000  000001A3  45E0F134  00010000  D7E2E3D9  F0F1F1F3*
02E3E7E3  40002EC4  40400038  40400001  0120DD7E  0100000C  00000001
45E0F010  7800DB78  33007000  C0B858F0  C0344110  D5DC05EF  41E00004
15FE4720  CD1858EF  D0B407FE  7800C0AC  D7E2E3D9  F0F1F1F4*
02E3E7E3  40002EFC  40400038  40400001  7000DE48  7800DB8C  7000DE4C
6800DC80  6C00DCB0  7000DBCC  58F0C040  45E0F004  00000000  000001A9
45E0F008  0470DBCC  45E0F010  58F0C040  D7E2E3D9  F0F1F1F5*
02E3E7E3  40002F34  4040000C  40400001  45E0F000  00000000  0000037F
40404040  40404040  40404040  40404040  40404040  40404040  40404040
40404040  40404040  40404040  40404040  D7E2E3D9  F0F1F1F6*

MEMBER NAME  PSTRES
02D9D3C4  40404040  40400038  40404040  00010001  08002A61  00010001
08002A65  00010001  0C002DF4  00010001  0C002E20  00010001  0C002E9C
00010001  0C002EB8  00010001  0C002F20  D7E2E3D9  F0F1F1F7*
02E3E7E3  40002F40  40400038  40400001  45E0F134  00010000  0120DD7E
01000034  00000001  45E0F010  58F0C044  4110D624  05EF5000  DC1C4100
DE485000  D62C4100  DE4C5000  D63058F0  D7E2E3D9  F0F1F1F8*
02E3E7E3  40002F78  40400038  40400001  C0344110  D62C05EF  41E00004
15FE4720  CDB058EF  D0BC07FE  7820DE4C  7B20DB14  7020DE4C  58F0C040
45E0F004  00000000  000001D2  45E0F008  D7E2E3D9  F0F1F1F9*
02E3E7E3  40002FB0  40400038  40400001  0860DCB0  45E0F010  58F0C040
45E0F000  00000000  0000037F  45E0F134  00010000  0120DD7E  01000034
00000001  45E0F010  58F0C044  4110D674  D7E2E3D9  F0F1F2F0**
02E3E7E3  40002FE8  40400038  40400001  05EF5000  DC1C4100  DE485000
D67C4100  DE4C5000  D68058F0  C0344110  D67C05EF  41E00004  15FE4720
CE3858EF  D0C407FE  7820DE4C  7B20DB14  D7E2E3D9  F0F1F2F1*
02E3E7E3  40003020  40400038  40400001  7020DE4C  58F0C040  45E0F004
00000000  00000201  45E0F008  0860DC80  45E0F010  58F0C040  45E0F000
00000000  0000037F  45E0F134  00010000  D7E2E3D9  F0F1F2F2*
02E3E7E3  40003058  40400038  40400001  0120DD7E  01000034  00000001
45E0F010  58F0C044  4110D6C4  05EF5000  DC1C4100  DE485000  D6CC4100
DE4C5000  D6D058F0  C0344110  D6CC05EF  D7E2E3D9  F0F1F2F3*
02E3E7E3  40003090  40400038  40400001  41E00004  15FE4720  CEC058EF
D0CC07FE  7820DE4C  7B20DB14  7020DE4C  58F0C040  45E0F004  00000000
00000230  45E0F008  0860DC88  45E0F010  D7E2E3D9  F0F1F2F4*
02E3E7E3  400030C8  40400038  40400001  58F0C040  45E0F000  00000000
0000037F  45E0F134  00010000  0120DD7E  01000034  00000001  45E0F010
58F0C044  4110D714  05EF5000  DC1C4100  D7E2E3D9  F0F1F2F5*
02E3E7E3  40003100  40400038  40400001  DE485000  D71C4100  DE4C5000
D72058F0  C0344110  D71C05EF  41E00004  15FE4720  CF4858EF  D0D407FE
7820DE4C  7B20DB14  7020DE4C  58F0C040  D7E2E3D9  F0F1F2F6*
02E3E7E3  40003138  4040000C  40400001  45E0F004  00000000  0000025F
40404040  40404040  40404040  40404040  40404040  40404040  40404040
40404040  40404040  40404040  40404040  D7E2E3D9  F0F1F2F7*
02D9D3C4  40404040  40400038  40404040  00010001  0C002F3C  00010001
```

| | | | | | | |
|---|---|---|---|---|---|---|
| 0C002FA8 | 00010001 | 0C002FC4 | 00010001 | 0C003030 | 00010001 | 0C00304C |
| 00010001 | 0C0030B8 | 00010001 | 0C0030D4 | D7E2E3D9 | F0F1F2F8* | |
| 02E3E7E3 | 40003144 | 40400038 | 40400001 | 45E0F008 | 0860DC90 | 45E0F010 |
| 58F0C040 | 45E0F000 | 00000000 | 0000037F | 45E0F134 | 00010000 | 0120DD7E |
| 01000034 | 00000001 | 45E0F010 | 58F0C044 | D7E2E3D9 | F0F1F2F9* | |
| 02E3E7E3 | 4000317C | 40400038 | 40400001 | 4110D764 | 05EF5000 | DC1C4100 |
| DE485000 | D76C4100 | DE4C5000 | D77058F0 | C0344110 | D76C05EF | 41E00004 |
| 15FE4720 | CFD058EF | D0DC07FE | 7820DE4C | D7E2E3D9 | F0F1F3F0** | |
| 02E3E7E3 | 400031B4 | 40400038 | 40400001 | 7B20DB14 | 7020DE4C | 58F0C040 |
| 45E0F004 | 00000000 | 0000028E | 45E0F008 | 0860DCA0 | 45E0F010 | 58F0C040 |
| 45E0F000 | 00000000 | 0000037F | 45E0F134 | D7E2E3D9 | F0F1F3F1* | |
| 02E3E7E3 | 400031EC | 40400038 | 40400001 | 00010000 | 0120DD7E | 01000034 |
| 00000001 | 45E0F010 | 58F0C044 | 4110D7B4 | 05EF5000 | DC1C4100 | DE485000 |
| D7BC4100 | DE4C5000 | D7C058F0 | C0344110 | D7E2E3D9 | F0F1F3F2* | |
| 02E3E7E3 | 40003224 | 40400038 | 40400001 | D7BC05EF | 41E00004 | 15FE4720 |
| B05858EF | D0E407FE | 7820DE4C | 7B20DB14 | 7020DE4C | 58F0C040 | 45E0F004 |
| 00000000 | 000002B7 | 45E0F008 | 0860DCA8 | D7E2E3D9 | F0F1F3F3* | |
| 02E3E7E3 | 4000325C | 40400038 | 40400001 | 45E0F010 | 58F0C040 | 45E0F000 |
| 00000000 | 0000037F | 45E0F134 | 00010000 | 0120DD7E | 01000034 | 00000001 |
| 45E0F010 | 58F0C044 | 4110D804 | 05EF5000 | D7E2E3D9 | F0F1F3F4* | |
| 02E3E7E3 | 40003294 | 40400038 | 40400001 | DC1C4100 | DE485000 | D80C4100 |
| DE4C5000 | D81058F0 | C0344110 | D80C05EF | 41E00004 | 15FE4720 | B0E058EF |
| D0EC07FE | 7820DE4C | 7B20DB14 | 7020DE4C | D7E2E3D9 | F0F1F3F5* | |
| 02E3E7E3 | 400032CC | 4040002C | 40400001 | 58F0C040 | 45E0F004 | 00000000 |

MEMBER NAME PSTRES

| | | | | | | |
|---|---|---|---|---|---|---|
| 000002E0 | 45E0F008 | 08609150 | 45E0F010 | 58F0C040 | 45E0F000 | 00000000 |
| 0000037F | 40404040 | 40404040 | 40404040 | D7E2E3D9 | F0F1F3F6* | |
| 02D9D3C4 | 40404040 | 40400038 | 40404040 | 00010001 | 0C003140 | 00010001 |
| 0C00315C | 00010001 | 0C0031C8 | 00010001 | 0C0031E4 | 00010001 | 0C003250 |
| 00010001 | 0C00326C | 00010001 | 0C0032D8 | D7E2E3D9 | F0F1F3F7* | |
| 02E3E7E3 | 400032F8 | 40400038 | 40400001 | 45E0F134 | 00010000 | 0120DD7E |
| 01000034 | 00000001 | 45E0F010 | 58F0C044 | 4110D854 | 05EF5000 | DC1C4100 |
| DE485000 | D85C4100 | DE4C5000 | D86058F0 | D7E2E3D9 | F0F1F3F8* | |
| 02E3E7E3 | 40003330 | 40400038 | 40400001 | C0344110 | D85C05EF | 41E00004 |
| 15FE4720 | B16858EF | D0F407FE | 7820DE4C | 7B20DB14 | 7020DE4C | 58F0C040 |
| 45E0F004 | 00000000 | 00000315 | 45E0F008 | D7E2E3D9 | F0F1F3F9* | |
| 02E3E7E3 | 40003368 | 40400038 | 40400001 | 08609158 | 45E0F010 | 58F0C040 |
| 45E0F000 | 00000000 | 0000037F | 45E0F134 | 00010000 | 0120DD7E | 01000034 |
| 00000001 | 45E0F010 | 58F0C044 | 4110D8A4 | D7E2E3D9 | F0F1F4F0** | |
| 02E3E7E3 | 400033A0 | 40400038 | 40400001 | 05EF5000 | DC1C4100 | DE485000 |
| D8AC4100 | DE4C5000 | D8B058F0 | C0344110 | D8AC05EF | 41E00004 | 15FE4720 |
| B1F058EF | D0FC07FE | 7820DE4C | 7B20DB14 | D7E2E3D9 | F0F1F4F1* | |
| 02E3E7E3 | 400033D8 | 40400038 | 40400001 | 7020DE4C | 58F0C040 | 45E0F004 |
| 00000000 | 0000034A | 45E0F008 | 08609160 | 45E0F010 | 58F0C040 | 45E0F000 |
| 00000000 | 0000037F | 45E0F134 | 00010000 | D7E2E3D9 | F0F1F4F2* | |
| 02E3E7E3 | 40003410 | 40400038 | 40400001 | 0120DD7E | 01000034 | 00000001 |
| 45E0F010 | 58F0C044 | 4110D8F4 | 05EF5000 | DC1C4100 | DE485000 | D8FC4100 |
| DE4C5000 | D90058F0 | C0344110 | D8FC05EF | D7E2E3D9 | F0F1F4F3* | |
| 02E3E7E3 | 40003448 | 40400038 | 40400001 | 41E00004 | 15FE4720 | B27858EF |
| D10407FE | 7820DE4C | 7B20DB14 | 7020DE4C | 58F0C040 | 45E0F004 | 00000000 |
| 00000385 | 45E0F010 | 58F0C040 | 45E0F000 | D7E2E3D9 | F0F1F4F4* | |
| 02E3E7E3 | 40003480 | 40400038 | 40400001 | 00000000 | 0000037F | 45E0F134 |
| 00010000 | 0120DD7E | 01000034 | 00000001 | 45E0F010 | 58F0C044 | 4110D944 |
| 05EF5000 | DC1C4100 | DE485000 | D94C58F0 | D7E2E3D9 | F0F1F4F5* | |
| 02E3E7E3 | 400034B8 | 40400038 | 40400001 | C0344110 | D94C05EF | 41E00004 |
| 15FE4720 | B2F058EF | D10C07FE | 7800DB10 | 33007000 | DE4C5870 | DA8C5880 |
| DA8C5890 | DAA85860 | C00058F0 | C0401800 | D7E2E3D9 | F0F1F4F6* | |
| 02E3E7E3 | 400034F0 | 4040000C | 40400001 | 45E0F004 | 00000000 | 000003B4 |

```
40404040  40404040  40404040  40404040  40404040  40404040  40404040
40404040  40404040  40404040  40404040  D7E2E3D9  F0F1F4F7*
02D9D3C4  40404040  40400038  40404040  00010001  0C0032F4  00010001
0C003360  00010001  0C00337C  00010001  0C0033E8  00010001  0C003404
00010001  0C003470  00010001  0C003484  D7E2E3D9  F0F1F4F8*
02E3E7E3  400034FC  40400038  40400001  45E0F008  08676160  45E0F008
08676178  45E0F008  08676190  45E0F008  086761C0  45E0F008  086761D8
45E0F008  086761F0  45E0F010  58F0C040  D7E2E3D9  F0F1F4F9*
02E3E7E3  40003534  40400038  40400001  45E0F000  00000000  000003C0
45E0F134  00010000  0120DD7E  0100005A  00000001  45E0F010  58F0C044
4110D994  05EF5000  DC1C4100  DE485000  D7E2E3D9  F0F1F5F0**
02E3E7E3  4000356C  40400038  40400001  D99C4100  DE4C5000  D9A058F0
C0344110  D99C05EF  41E00004  15FE4720  B3B058EF  D11407FE  7820DE4C
7B20DB14  7020DE4C  8778B30A  5880C010  D7E2E3D9  F0F1F5F1*
02E3E7E3  400035A4  40400038  40400001  5890C000  5870DA8C  5880DA8C
5890DAA8  5860C000  58F0C040  45E0F004  00000000  000003B4  45E0F008
086761C0  45E0F008  086761D8  45E0F008  D7E2E3D9  F0F1F5F2*
02E3E7E3  400035DC  40400038  40400001  086761F0  45E0F008  08676220
45E0F008  08676238  45E0F008  08676250  45E0F010  58F0C040  45E0F000
00000000  000003C0  45E0F134  00010000  D7E2E3D9  F0F1F5F3*
02E3E7E3  40003614  40400038  40400001  0120DD7E  0100005A  00000001
45E0F010  58F0C044  4110D9E4  05EF5000  DC1C4100  DE485000  D9EC4100
DE4C5000  D9F058F0  C0344110  D9EC05EF  D7E2E3D9  F0F1F5F4*
02E3E7E3  4000364C  40400038  40400001  41E00004  15FE4720  B47C58EF
D11C07FE  7820DE4C  7B20DB14  7020DE4C  8778B3D8  5880C010  5890C000

MEMBER NAME  PSTRES
1BFF58E0  D00007FE  58A0D004  58E0A00C  D7E2E3D9  F0F1F5F5*
02E3E7E3  40003684  40400038  40400001  58B0A018  5810B008  5820DBE8
50201000  5830B00C  7820DC30  70203000  18DA92FF  A00C982C  A01C07FE
58C0D048  98791004  58207000  5020DC48  D7E2E3D9  F0F1F5F6*
02E3E7E3  400036BC  40400038  40400001  58208000  5020DBE8  78209000
7020DC30  58201000  41302000  41500004  1B255C40  DA7C1B25  5020C01C
5030C020  41100FFF  41B1C001  47F0C0C0  D7E2E3D9  F0F1F5F7*
02E3E7E3  40000020  40400008  40400001  000036AC  00000428  40404040
40404040  40404040  40404040  40404040  40404040  40404040  40404040
40404040  40404040  40404040  40404040  D7E2E3D9  F0F1F5F8*
02E3E7E3  40000428  40400004  40400001  0000367C  40404040  40404040
40404040  40404040  40404040  40404040  40404040  40404040  40404040
40404040  40404040  40404040  40404040  D7E2E3D9  F0F1F5F9*
02E3E7E3  40000470  40400004  40400001  000021E0  40404040  40404040
40404040  40404040  40404040  40404040  40404040  40404040  40404040
40404040  40404040  40404040  40404040  D7E2E3D9  F0F1F6F0**
02D9D3C4  40404040  40400038  40404040  00010001  0C0034F8  00010001
0C00353C  00010001  0C0035C4  00010001  0C003608  00010001  0C000020
00010001  0C000024  00010001  0C000428  D7E2E3D9  F0F1F6F1*
02E3E7E3  40000474  4040001C  40400001  000023C4  000023E2  000023FC
000023FC  000024E0  000024E0  000025E8  40404040  40404040  40404040
40404040  40404040  40404040  40404040  D7E2E3D9  F0F1F6F2*
02D9D3C4  40404040  40400038  40404040  00010001  0C000470  00010001
0C000474  00010001  0C000478  00010001  0C00047C  00010001  0C000480
00010001  0C000484  00010001  0C000488  D7E2E3D9  F0F1F6F3*
02E3E7E3  40000490  4040001C  40400001  000025E8  0000265C  0000265C
0000268A  0000268A  0000296C  0000296C  40404040  40404040  40404040
40404040  40404040  40404040  40404040  D7E2E3D9  F0F1F6F4*
02D9D3C4  40404040  40400038  40404040  00010001  0C00048C  00010001
0C000490  00010001  0C000494  00010001  0C000498  00010001  0C00049C
00010001  0C0004A0  00010001  0C0004A4  D7E2E3D9  F0F1F6F5*
02E3E7E3  400004AC  4040001C  40400001  000029B0  000029B0  000029CA
```

| | | | | | | |
|---|---|---|---|---|---|---|
| 000029CA | 00002AD8 | 00002AD8 | 00002CB8 | 40404040 | 40404040 | 40404040 |
| 40404040 | 40404040 | 40404040 | 40404040 | D7E2E3D9 | F0F1F6F6* | |
| 02D9D3C4 | 40404040 | 40400038 | 40404040 | 00010001 | 0C0004A8 | 00010001 |
| 0C0004AC | 00010001 | 0C0004B0 | 00010001 | 0C0004B4 | 00010001 | 0C0004B8 |
| 00010001 | 0C0004BC | 00010001 | 0C0004C0 | D7E2E3D9 | F0F1F6F7* | |
| 02E3E7E3 | 400004C8 | 4040001C | 40400001 | 00002CB8 | 00002D80 | 00002D80 |
| 00002E56 | 00002E56 | 00002EF8 | 00002EF8 | 40404040 | 40404040 | 40404040 |
| 40404040 | 40404040 | 40404040 | 40404040 | D7E2E3D9 | F0F1F6F8* | |
| 02D9D3C4 | 40404040 | 40400038 | 40404040 | 00010001 | 0C0004C4 | 00010001 |
| 0C0004C8 | 00010001 | 0C0004CC | 00010001 | 0C0004D0 | 00010001 | 0C0004D4 |
| 00010001 | 0C0004D8 | 00010001 | 0C0004DC | D7E2E3D9 | F0F1F6F9* | |
| 02E3E7E3 | 400004E4 | 4040001C | 40400001 | 00002F90 | 00002F90 | 00003018 |
| 00003018 | 000030A0 | 000030A0 | 00003128 | 40404040 | 40404040 | 40404040 |
| 40404040 | 40404040 | 40404040 | 40404040 | D7E2E3D9 | F0F1F7F0** | |
| 02D9D3C4 | 40404040 | 40400038 | 40404040 | 00010001 | 0C0004E0 | 00010001 |
| 0C0004E4 | 00010001 | 0C0004E8 | 00010001 | 0C0004EC | 00010001 | 0C0004F0 |
| 00010001 | 0C0004F4 | 00010001 | 0C0004F8 | D7E2E3D9 | F0F1F7F1* | |
| 02E3E7E3 | 40000500 | 4040001C | 40400001 | 00003128 | 000031B0 | 000031B0 |
| 00003238 | 00003238 | 000032C0 | 000032C0 | 40404040 | 40404040 | 40404040 |
| 40404040 | 40404040 | 40404040 | 40404040 | D7E2E3D9 | F0F1F7F2* | |
| 02D9D3C4 | 40404040 | 40400038 | 40404040 | 00010001 | 0C0004FC | 00010001 |
| 0C000500 | 00010001 | 0C000504 | 00010001 | 0C000508 | 00010001 | 0C00050C |
| 00010001 | 0C000510 | 00010001 | 0C000514 | D7E2E3D9 | F0F1F7F3* | |
| 02E3E7E3 | 4000051C | 4040001C | 40400001 | 00003348 | 00003348 | 000033D0 |
| 000033D0 | 00003458 | 00003458 | 000034D0 | 40404040 | 40404040 | 40404040 |
| 40404040 | 40404040 | 40404040 | 40404040 | D7E2E3D9 | F0F1F7F4* | |

MEMBER NAME PSTRES

| | | | | | | |
|---|---|---|---|---|---|---|
| 02D9D3C4 | 40404040 | 40400038 | 40404040 | 00010001 | 0C000518 | 00010001 |
| 0C00051C | 00010001 | 0C000520 | 00010001 | 0C000524 | 00010001 | 0C000528 |
| 00010001 | 0C00052C | 00010001 | 0C000530 | D7E2E3D9 | F0F1F7F5* | |
| 02E3E7E3 | 40000538 | 40400018 | 40400001 | 00003458 | 00003590 | 00003590 |
| 0000365C | 0000365C | 00000EA4 | 40404040 | 40404040 | 40404040 | 40404040 |
| 40404040 | 40404040 | 40404040 | 40404040 | D7E2E3D9 | F0F1F7F6* | |
| 02E3E7E3 | 40000554 | 40400004 | 40400001 | 80000014 | 40404040 | 40404040 |
| 40404040 | 40404040 | 40404040 | 40404040 | 40404040 | 40404040 | 40404040 |
| 40404040 | 40404040 | 40404040 | 40404040 | D7E2E3D9 | F0F1F7F7* | |
| 02D9D3C4 | 40404040 | 40400038 | 40404040 | 00010001 | 0C000534 | 00010001 |
| 0C000538 | 00010001 | 0C00053C | 00010001 | 0C000540 | 00010001 | 0C000544 |
| 00010001 | 0C000548 | 00010001 | 0C00054C | D7E2E3D9 | F0F1F7F8* | |
| 02E3E7E3 | 40000558 | 4040001C | 40400001 | 00002140 | 80000F08 | 0000227C |
| 00000FB4 | 00000E8C | 00001044 | 00000F24 | 40404040 | 40404040 | 40404040 |
| 40404040 | 40404040 | 40404040 | 40404040 | D7E2E3D9 | F0F1F7F9* | |
| 02D9D3C4 | 40404040 | 40400038 | 40404040 | 00020001 | 0C000554 | 00010001 |
| 0C000558 | 00010001 | 0C00055C | 00010001 | 0C000560 | 00010001 | 0C000564 |
| 00010001 | 0C000568 | 00010001 | 0C00056C | D7E2E3D9 | F0F1F8F0** | |
| 02E3E7E3 | 40000574 | 4040001C | 40400001 | 00000F20 | 00002140 | 00000E8C |
| 00000E8C | 00000E8C | 00000E8C | 00000E98 | 40404040 | 40404040 | 40404040 |
| 40404040 | 40404040 | 40404040 | 40404040 | D7E2E3D9 | F0F1F8F1* | |
| 02D9D3C4 | 40404040 | 40400038 | 40404040 | 00010001 | 0C000570 | 00010001 |
| 0C000574 | 00010001 | 0C000578 | 00010001 | 0C00057C | 00010001 | 0C000580 |
| 00010001 | 0C000584 | 00010001 | 0C000588 | D7E2E3D9 | F0F1F8F2* | |
| 02E3E7E3 | 40000590 | 4040001C | 40400001 | 00000EA0 | 00000E8C | 00000E8C |
| 00000F24 | 00000F30 | 80000E8C | 00000EE0 | 40404040 | 40404040 | 40404040 |
| 40404040 | 40404040 | 40404040 | 40404040 | D7E2E3D9 | F0F1F8F3* | |
| 02D9D3C4 | 40404040 | 40400038 | 40404040 | 00010001 | 0C00058C | 00010001 |
| 0C000590 | 00010001 | 0C000594 | 00010001 | 0C000598 | 00010001 | 0C00059C |
| 00010001 | 0C0005A0 | 00010001 | 0C0005A4 | D7E2E3D9 | F0F1F8F4* | |
| 02E3E7E3 | 400005B0 | 40400020 | 40400001 | 80000000 | 0000227C | 00000FA8 |

```
00000E8C  00000F0C  00000F24  00000F20  000010F8  40404040  40404040
40404040  40404040  40404040  40404040  D7E2E3D9  F0F1F8F5*
02D9D3C4  40404040  40400038  40404040  00010001  0C0005A8  00010001
0C0005B4  00010001  0C0005B8  00010001  0C0005BC  00010001  0C0005C0
00010001  0C0005C4  00010001  0C0005C8  D7E2E3D9  F0F1F8F6*
02E3E7E3  400005D0  4040001C  40400001  00000E8C  00000E8C  00000E8C
00000E8C  00000E98  00000EA0  00000E8C  40404040  40404040  40404040
40404040  40404040  40404040  40404040  D7E2E3D9  F0F1F8F7*
02D9D3C4  40404040  40400038  40404040  00010001  0C0005CC  00010001
0C0005D0  00010001  0C0005D4  00010001  0C0005D8  00010001  0C0005DC
00010001  0C0005E0  00010001  0C0005E4  D7E2E3D9  F0F1F8F8*
02E3E7E3  400005EC  4040001C  40400001  00000E8C  00000F24  00000F30
80000E8C  000011A6  00000E98  00000F04  40404040  40404040  40404040
40404040  40404040  40404040  40404040  D7E2E3D9  F0F1F8F9*
02D9D3C4  40404040  40400038  40404040  00010001  0C0005E8  00010001
0C0005EC  00010001  0C0005F0  00010001  0C0005F4  00010001  0C0005F8
00010001  0C0005FC  00010001  0C000600  D7E2E3D9  F0F1F9F0**
02E3E7E3  40000608  4040001C  40400001  80000420  0000225C  00000FB0
00000E8C  00000EC8  00000F40  00000F2C  40404040  40404040  40404040
40404040  40404040  40404040  40404040  D7E2E3D9  F0F1F9F1*
02D9D3C4  40404040  40400038  40404040  00010001  0C000604  00010001
0C000608  00010001  0C00060C  00010001  0C000610  00010001  0C000614
00010001  0C000618  00010001  0C00061C  D7E2E3D9  F0F1F9F2*
02E3E7E3  40000624  4040001C  40400001  00000408  00000E8C  00000E8C
00000E8C  00000E8C  00000E98  00000EA0  40404040  40404040  40404040
40404040  40404040  40404040  40404040  D7E2E3D9  F0F1F9F3*
02D9D3C4  40404040  40400038  40404040  00010001  0C000620  00010001
```

```
MEMBER NAME  PSTRES
0C000624  00010001  0C000628  00010001  0C00062C  00010001  0C000630
00010001  0C000634  00010001  0C000638  D7E2E3D9  F0F1F9F4*
02E3E7E3  40000640  4040001C  40400001  00000E8C  00000E8C  00000F40
00000F44  80000E8C  000011A6  80000EDC  40404040  40404040  40404040
40404040  40404040  40404040  40404040  D7E2E3D9  F0F1F9F5*
02D9D3C4  40404040  40400038  40404040  00010001  0C00063C  00010001
0C000640  00010001  0C000644  00010001  0C000648  00010001  0C00064C
00010001  0C000650  00010001  0C000654  D7E2E3D9  F0F1F9F6*
02E3E7E3  4000065C  4040001C  40400001  00002270  00001078  00000E8C
00001044  00000F40  00000F2C  000011A6  40404040  40404040  40404040
40404040  40404040  40404040  40404040  D7E2E3D9  F0F1F9F7*
02D9D3C4  40404040  40400038  40404040  00010001  0C000658  00010001
0C00065C  00010001  0C000660  00010001  0C000664  00010001  0C000668
00010001  0C00066C  00010001  0C000670  D7E2E3D9  F0F1F9F8*
02E3E7E3  40000678  4040001C  40400001  00000E8C  00000E8C  00000E8C
00000E8C  00000E98  00000EA0  00000E8C  40404040  40404040  40404040
40404040  40404040  40404040  40404040  D7E2E3D9  F0F1F9F9*
02D9D3C4  40404040  40400038  40404040  00010001  0C000674  00010001
0C000678  00010001  0C00067C  00010001  0C000680  00010001  0C000684
00010001  0C000688  00010001  0C00068C  D7E2E3D9  F0F2F0F0**
02E3E7E3  40000694  4040001C  40400001  00000E8C  00000F40  00000F44
80000E8C  000010E0  00000E98  00000ED0  40404040  40404040  40404040
40404040  40404040  40404040  40404040  D7E2E3D9  F0F2F0F1*
02D9D3C4  40404040  40400038  40404040  00010001  0C000690  00010001
0C000694  00010001  0C000698  00010001  0C00069C  00010001  0C0006A0
00010001  0C0006A4  00010001  0C0006A8  D7E2E3D9  F0F2F0F2*
02E3E7E3  400006B0  40400004  40400001  80000400  40404040  40404040
40404040  40404040  40404040  40404040  40404040  40404040  40404040
40404040  40404040  40404040  40404040  D7E2E3D9  F0F2F0F3*
02E3E7E3  400006B8  40400014  40400001  00001288  8000103C  000011A6
```

| | | | | | | |
|---|---|---|---|---|---|---|
| 80000EEC | 00002274 | 40404040 | 40404040 | 40404040 | 40404040 | 40404040 |
| 40404040 | 40404040 | 40404040 | 40404040 | D7E2E3D9 | F0F2F0F4* | |
| 02E3E7E3 | 400006D0 | 40400004 | 40400001 | 00000E8C | 40404040 | 40404040 |
| 40404040 | 40404040 | 40404040 | 40404040 | 40404040 | 40404040 | 40404040 |
| 40404040 | 40404040 | 40404040 | 40404040 | D7E2E3D9 | F0F2F0F5* | |
| 02D9D3C4 | 40404040 | 40400038 | 40404040 | 00010001 | 0C0006AC | 00010001 |
| 0C0006B0 | 00010001 | 0C0006B8 | 00010001 | 0C0006BC | 00010001 | 0C0006C0 |
| 00010001 | 0C0006C4 | 00010001 | 0C0006C8 | D7E2E3D9 | F0F2F0F6* | |
| 02E3E7E3 | 400006D4 | 4040001C | 40400001 | 00001044 | 00000F24 | 00000F20 |
| 000011A6 | 00000E8C | 00000E8C | 00000E8C | 40404040 | 40404040 | 40404040 |
| 40404040 | 40404040 | 40404040 | 40404040 | D7E2E3D9 | F0F2F0F7* | |
| 02D9D3C4 | 40404040 | 40400038 | 40404040 | 00010001 | 0C0006D0 | 00010001 |
| 0C0006D4 | 00010001 | 0C0006D8 | 00010001 | 0C0006DC | 00010001 | 0C0006E0 |
| 00010001 | 0C0006E4 | 00010001 | 0C0006E8 | D7E2E3D9 | F0F2F0F8* | |
| 02E3E7E3 | 400006F0 | 4040001C | 40400001 | 00000E8C | 00000E98 | 00000EA0 |
| 00000E8C | 00000E8C | 00000F24 | 00000F30 | 40404040 | 40404040 | 40404040 |
| 40404040 | 40404040 | 40404040 | 40404040 | D7E2E3D9 | F0F2F0F9* | |
| 02D9D3C4 | 40404040 | 40400038 | 40404040 | 00010001 | 0C0006EC | 00010001 |
| 0C0006F0 | 00010001 | 0C0006F4 | 00010001 | 0C0006F8 | 00010001 | 0C0006FC |
| 00010001 | 0C000700 | 00010001 | 0C000704 | D7E2E3D9 | F0F2F1F0** | |
| 02E3E7E3 | 4000070C | 4040001C | 40400001 | 80000E8C | 000011A6 | 00000E98 |
| 00000EE4 | 800003F8 | 000010E0 | 00000E98 | 40404040 | 40404040 | 40404040 |
| 40404040 | 40404040 | 40404040 | 40404040 | D7E2E3D9 | F0F2F1F1* | |
| 02D9D3C4 | 40404040 | 40400038 | 40404040 | 00010001 | 0C000708 | 00010001 |
| 0C00070C | 00010001 | 0C000710 | 00010001 | 0C000714 | 00010001 | 0C000718 |
| 00010001 | 0C00071C | 00010001 | 0C000720 | D7E2E3D9 | F0F2F1F2* | |
| 02E3E7E3 | 40000728 | 4040000C | 40400001 | 00000ED0 | 800003F0 | 00000ED0 |
| 40404040 | 40404040 | 40404040 | 40404040 | 40404040 | 40404040 | 40404040 |

MEMBER NAME PSTRES

| | | | | | | |
|---|---|---|---|---|---|---|
| 40404040 | 40404040 | 40404040 | 40404040 | D7E2E3D9 | F0F2F1F3* | |
| 02E3E7E3 | 40000738 | 4040000C | 40400001 | 80000000 | 000011A6 | 80000EE4 |
| 40404040 | 40404040 | 40404040 | 40404040 | 40404040 | 40404040 | 40404040 |
| 40404040 | 40404040 | 40404040 | 40404040 | D7E2E3D9 | F0F2F1F4* | |
| 02E3E7E3 | 4000074C | 40400008 | 40400001 | 00000E8C | 00001044 | 40404040 |
| 40404040 | 40404040 | 40404040 | 40404040 | 40404040 | 40404040 | 40404040 |
| 40404040 | 40404040 | 40404040 | 40404040 | D7E2E3D9 | F0F2F1F5* | |
| 02D9D3C4 | 40404040 | 40400038 | 40404040 | 00010001 | 0C000724 | 00010001 |
| 0C000728 | 00010001 | 0C00072C | 00010001 | 0C000730 | 00010001 | 0C00073C |
| 00010001 | 0C000740 | 00010001 | 0C00074C | D7E2E3D9 | F0F2F1F6* | |
| 02E3E7E3 | 40000754 | 4040001C | 40400001 | 00000F24 | 00000F20 | 000011A6 |
| 00000E8C | 00000E8C | 00000E8C | 00000E8C | 40404040 | 40404040 | 40404040 |
| 40404040 | 40404040 | 40404040 | 40404040 | D7E2E3D9 | F0F2F1F7* | |
| 02D9D3C4 | 40404040 | 40400038 | 40404040 | 00010001 | 0C000750 | 00010001 |
| 0C000754 | 00010001 | 0C000758 | 00010001 | 0C00075C | 00010001 | 0C000760 |
| 00010001 | 0C000764 | 00010001 | 0C000768 | D7E2E3D9 | F0F2F1F8* | |
| 02E3E7E3 | 40000770 | 4040001C | 40400001 | 00000E98 | 00000EA0 | 00000E8C |
| 00000E8C | 00000F24 | 00000F30 | 80000E8C | 40404040 | 40404040 | 40404040 |
| 40404040 | 40404040 | 40404040 | 40404040 | D7E2E3D9 | F0F2F1F9* | |
| 02D9D3C4 | 40404040 | 40400038 | 40404040 | 00010001 | 0C00076C | 00010001 |
| 0C000770 | 00010001 | 0C000774 | 00010001 | 0C000778 | 00010001 | 0C00077C |
| 00010001 | 0C000780 | 00010001 | 0C000784 | D7E2E3D9 | F0F2F2F0** | |
| 02E3E7E3 | 4000078C | 4040001C | 40400001 | 0000107C | 00000F90 | 000010A0 |
| 80000F90 | 0000107C | 00000F80 | 000010A0 | 40404040 | 40404040 | 40404040 |
| 40404040 | 40404040 | 40404040 | 40404040 | D7E2E3D9 | F0F2F2F1* | |
| 02D9D3C4 | 40404040 | 40400038 | 40404040 | 00010001 | 0C000788 | 00010001 |
| 0C00078C | 00010001 | 0C000790 | 00010001 | 0C000794 | 00010001 | 0C000798 |
| 00010001 | 0C00079C | 00010001 | 0C0007A0 | D7E2E3D9 | F0F2F2F2* | |
| 02E3E7E3 | 400007A8 | 4040001C | 40400001 | 80000F80 | 0000107C | 0000105C |

| | | | | | | |
|---|---|---|---|---|---|---|
| 000010A0 | 8000105C | 0000107C | 00001080 | 40404040 | 40404040 | 40404040 |
| 40404040 | 40404040 | 40404040 | 40404040 | D7E2E3D9 | F0F2F2F3* | |
| 02D9D3C4 | 40404040 | 40400038 | 40404040 | 00010001 | 0C0007A4 | 00010001 |
| 0C0007A8 | 00010001 | 0C0007AC | 00010001 | 0C0007B0 | 00010001 | 0C0007B4 |
| 00010001 | 0C0007B8 | 00010001 | 0C0007BC | D7E2E3D9 | F0F2F2F4* | |
| 02E3E7E3 | 400007C4 | 4040001C | 40400001 | 000010A0 | 80001080 | 0000107C |
| 00001068 | 0000107C | 8000105C | 00002298 | 40404040 | 40404040 | 40404040 |
| 40404040 | 40404040 | 40404040 | 40404040 | D7E2E3D9 | F0F2F2F5* | |
| 02D9D3C4 | 40404040 | 40400038 | 40404040 | 00010001 | 0C0007C0 | 00010001 |
| 0C0007C4 | 00010001 | 0C0007C8 | 00010001 | 0C0007CC | 00010001 | 0C0007D0 |
| 00010001 | 0C0007D4 | 00010001 | 0C0007D8 | D7E2E3D9 | F0F2F2F6* | |
| 02E3E7E3 | 400007E0 | 4040001C | 40400001 | 00001068 | 00002298 | 8000105C |
| 000010A0 | 00001068 | 000010A0 | 8000105C | 40404040 | 40404040 | 40404040 |
| 40404040 | 40404040 | 40404040 | 40404040 | D7E2E3D9 | F0F2F2F7* | |
| 02D9D3C4 | 40404040 | 40400038 | 40404040 | 00010001 | 0C0007DC | 00010001 |
| 0C0007E0 | 00010001 | 0C0007E4 | 00010001 | 0C0007E8 | 00010001 | 0C0007EC |
| 00010001 | 0C0007F0 | 00010001 | 0C0007F4 | D7E2E3D9 | F0F2F2F8* | |
| 02E3E7E3 | 400007FC | 4040001C | 40400001 | 00002298 | 00001068 | 00002298 |
| 8000105C | 00002298 | 00001068 | 00002298 | 40404040 | 40404040 | 40404040 |
| 40404040 | 40404040 | 40404040 | 40404040 | D7E2E3D9 | F0F2F2F9* | |
| 02D9D3C4 | 40404040 | 40400038 | 40404040 | 00010001 | 0C0007F8 | 00010001 |
| 0C0007FC | 00010001 | 0C000800 | 00010001 | 0C000804 | 00010001 | 0C000808 |
| 00010001 | 0C00080C | 00010001 | 0C000810 | D7E2E3D9 | F0F2F3F0** | |
| 02E3E7E3 | 40000818 | 4040001C | 40400001 | 8000105C | 00002298 | 00001068 |
| 00002298 | 8000105C | 00000F8C | 00000F5C | 40404040 | 40404040 | 40404040 |
| 40404040 | 40404040 | 40404040 | 40404040 | D7E2E3D9 | F0F2F3F1* | |
| 02D9D3C4 | 40404040 | 40400038 | 40404040 | 00010001 | 0C000814 | 00010001 |
| 0C000818 | 00010001 | 0C00081C | 00010001 | 0C000820 | 00010001 | 0C000824 |
| 00010001 | 0C000828 | 00010001 | 0C00082C | D7E2E3D9 | F0F2F3F2* | |

MEMBER NAME PSTRES

| | | | | | | |
|---|---|---|---|---|---|---|
| 02E3E7E3 | 40000834 | 4040001C | 40400001 | 00000F8C | 80000F4C | 00000F74 |
| 00000F54 | 00000F9C | 80000F54 | 00000FA4 | 40404040 | 40404040 | 40404040 |
| 40404040 | 40404040 | 40404040 | 40404040 | D7E2E3D9 | F0F2F3F3* | |
| 02D9D3C4 | 40404040 | 40400038 | 40404040 | 00010001 | 0C000830 | 00010001 |
| 0C000834 | 00010001 | 0C000838 | 00010001 | 0C00083C | 00010001 | 0C000840 |
| 00010001 | 0C000844 | 00010001 | 0C000848 | D7E2E3D9 | F0F2F3F4* | |
| 02E3E7E3 | 40000850 | 4040001C | 40400001 | 00000F1C | 00000FA4 | 80002298 |
| 00002298 | 0000229C | 00000FCC | 8000229C | 40404040 | 40404040 | 40404040 |
| 40404040 | 40404040 | 40404040 | 40404040 | D7E2E3D9 | F0F2F3F5* | |
| 02D9D3C4 | 40404040 | 40400038 | 40404040 | 00010001 | 0C00084C | 00010001 |
| 0C000850 | 00010001 | 0C000854 | 00010001 | 0C000858 | 00010001 | 0C00085C |
| 00010001 | 0C000860 | 00010001 | 0C000864 | D7E2E3D9 | F0F2F3F6* | |
| 02E3E7E3 | 4000086C | 4040001C | 40400001 | 00000F7C | 00000F58 | 00000E8C |
| 00000EB0 | 00000F40 | 00000F2C | 000003E8 | 40404040 | 40404040 | 40404040 |
| 40404040 | 40404040 | 40404040 | 40404040 | D7E2E3D9 | F0F2F3F7* | |
| 02D9D3C4 | 40404040 | 40400038 | 40404040 | 00010001 | 0C000868 | 00010001 |
| 0C00086C | 00010001 | 0C000870 | 00010001 | 0C000874 | 00010001 | 0C000878 |
| 00010001 | 0C00087C | 00010001 | 0C000880 | D7E2E3D9 | F0F2F3F8* | |
| 02E3E7E3 | 40000888 | 4040001C | 40400001 | 00000E8C | 00000E8C | 00000E8C |
| 00000E8C | 00000E98 | 00000EA0 | 00000E8C | 40404040 | 40404040 | 40404040 |
| 40404040 | 40404040 | 40404040 | 40404040 | D7E2E3D9 | F0F2F3F9* | |
| 02D9D3C4 | 40404040 | 40400038 | 40404040 | 00010001 | 0C000884 | 00010001 |
| 0C000888 | 00010001 | 0C00088C | 00010001 | 0C000890 | 00010001 | 0C000894 |
| 00010001 | 0C000898 | 00010001 | 0C00089C | D7E2E3D9 | F0F2F4F0** | |
| 02E3E7E3 | 400008A4 | 4040001C | 40400001 | 00000E8C | 00000F40 | 00000F44 |
| 80000E8C | 00001970 | 000012A8 | 0000108C | 40404040 | 40404040 | 40404040 |
| 40404040 | 40404040 | 40404040 | 40404040 | D7E2E3D9 | F0F2F4F1* | |
| 02D9D3C4 | 40404040 | 40400038 | 40404040 | 00010001 | 0C0008A0 | 00010001 |

0C0008A4 00010001 0C0008A8 00010001 0C0008AC 00010001 0C0008B0
00010001 0C0008B4 00010001 0C0008B8 D7E2E3D9 F0F2F4F2*
02E3E7E3 400008C0 4040001C 40400001 00001278 000017F0 00001850
000018B0 000018F8 000017D8 00001838 40404040 40404040 40404040
40404040 40404040 40404040 40404040 D7E2E3D9 F0F2F4F3*
02D9D3C4 40404040 40400038 40404040 00010001 0C0008BC 00010001
0C0008C0 00010001 0C0008C4 00010001 0C0008C8 00010001 0C0008CC
00010001 0C0008D0 00010001 0C0008D4 D7E2E3D9 F0F2F4F4*
02E3E7E3 400008DC 4040001C 40400001 00001898 000010C0 000010D8
00001014 00001008 80001018 00001970 40404040 40404040 40404040
40404040 40404040 40404040 40404040 D7E2E3D9 F0F2F4F5*
02D9D3C4 40404040 40400038 40404040 00010001 0C0008D8 00010001
0C0008DC 00010001 0C0008E0 00010001 0C0008E4 00010001 0C0008E8
00010001 0C0008EC 00010001 0C0008F0 D7E2E3D9 F0F2F4F6*
02E3E7E3 400008F8 4040001C 40400001 000012A8 0000108C 0000102C
00001000 00001004 0000100C 00001694 40404040 40404040 40404040
40404040 40404040 40404040 40404040 D7E2E3D9 F0F2F4F7*
02D9D3C4 40404040 40400038 40404040 00010001 0C0008F4 00010001
0C0008F8 00010001 0C0008FC 00010001 0C000900 00010001 0C000904
00010001 0C000908 00010001 0C00090C D7E2E3D9 F0F2F4F8*
02E3E7E3 40000914 4040001C 40400001 00001028 000010D8 000010A8
000010B0 000010B8 000010C8 000010D0 40404040 40404040 40404040
40404040 40404040 40404040 40404040 D7E2E3D9 F0F2F4F9*
02D9D3C4 40404040 40400038 40404040 00010001 0C000910 00010001
0C000914 00010001 0C000918 00010001 0C00091C 00010001 0C000920
00010001 0C000924 00010001 0C000928 D7E2E3D9 F0F2F5F0**
02E3E7E3 40000930 4040001C 40400001 000017D8 000017F0 00001850
000018B0 800018F8 0000102C 00001278 40404040 40404040 40404040
40404040 40404040 40404040 40404040 D7E2E3D9 F0F2F5F1*
02D9D3C4 40404040 40400038 40404040 00010001 0C00092C 00010001

MEMBER NAME PSTRES
0C000930 00010001 0C000934 00010001 0C000938 00010001 0C00093C
00010001 0C000940 00010001 0C000944 D7E2E3D9 F0F2F5F2*
02E3E7E3 4000094C 4040001C 40400001 000017F0 00001850 000018B0
000018F8 000017D8 00001838 00001898 40404040 40404040 40404040
40404040 40404040 40404040 40404040 D7E2E3D9 F0F2F5F3*
02D9D3C4 40404040 40400038 40404040 00010001 0C000948 00010001
0C00094C 00010001 0C000950 00010001 0C000954 00010001 0C000958
00010001 0C00095C 00010001 0C000960 D7E2E3D9 F0F2F5F4*
02E3E7E3 40000968 4040001C 40400001 000010C0 000010D8 80001008
0000228C 00001064 00000E8C 00000ED4 40404040 40404040 40404040
40404040 40404040 40404040 40404040 D7E2E3D9 F0F2F5F5*
02D9D3C4 40404040 40400038 40404040 00010001 0C000964 00010001
0C000968 00010001 0C00096C 00010001 0C000970 00010001 0C000974
00010001 0C000978 00010001 0C00097C D7E2E3D9 F0F2F5F6*
02E3E7E3 40000984 4040001C 40400001 00000F24 00000F20 000003C8
00000E8C 00000E8C 00000E8C 00000E8C 40404040 40404040 40404040
40404040 40404040 40404040 40404040 D7E2E3D9 F0F2F5F7*
02D9D3C4 40404040 40400038 40404040 00010001 0C000980 00010001
0C000984 00010001 0C000988 00010001 0C00098C 00010001 0C000990
00010001 0C000994 00010001 0C000998 D7E2E3D9 F0F2F5F8*
02E3E7E3 400009A0 4040001C 40400001 00000E98 00000EA0 00000E8C
00000E8C 00000F24 00000F30 80000E8C 40404040 40404040 40404040
40404040 40404040 40404040 40404040 D7E2E3D9 F0F2F5F9*
02D9D3C4 40404040 40400038 40404040 00010001 0C00099C 00010001
0C0009A0 00010001 0C0009A4 00010001 0C0009A8 00010001 0C0009AC
00010001 0C0009B0 00010001 0C0009B4 D7E2E3D9 F0F2F6F0**
02E3E7E3 400009BC 4040001C 40400001 0000225C 00001064 00000E8C

00000ECC 00000F24 00000F20 000011A6 40404040 40404040 40404040
40404040 40404040 40404040 40404040 D7E2E3D9 F0F2F6F1*
02D9D3C4 40404040 40400038 40404040 00010001 0Cu009B8 00010001
0C0009BC 00010001 0C0009C0 00010001 0C0009C4 00010001 0C0009C8
00010001 0C0009CC 00010001 0C0009D0 D7E2E3D9 F0F2F6F2*
02E3E7E3 400009D8 4040001C 40400001 00000E8C 00000E8C 00000E8C
00000E8C 00000E98 00000EA0 00000E8C 40404040 40404040 40404040
40404040 40404040 40404040 40404040 D7E2E3D9 F0F2F6F3*
02D9D3C4 40404040 40400038 40404040 00010001 0C0009D4 00010001
0C0009D8 00010001 0C0009DC 00010001 0C0009E0 00010001 0C0009E4
00010001 0C0009E8 00010001 0C0009EC D7E2E3D9 F0F2F6F4*
02E3E7E3 400009F4 4040001C 40400001 00000E8C 00000F24 00000F30
80000E8C 00000F60 00002298 00000E8C 40404040 40404040 40404040
40404040 40404040 40404040 40404040 D7E2E3D9 F0F2F6F5*
02D9D3C4 40404040 40400038 40404040 00010001 0C0009F0 00010001
0C0009F4 00010001 0C0009F8 00010001 0C0009FC 00010001 0C000A00
00010001 0C000A04 00010001 0C000A08 D7E2E3D9 F0F2F6F6*
02E3E7E3 40000A10 4040001C 40400001 00000EC0 00000F24 00000F20
000011A6 00000E8C 00000E8C 00000E8C 40404040 40404040 40404040
40404040 40404040 40404040 40404040 D7E2E3D9 F0F2F6F7*
02D9D3C4 40404040 40400038 40404040 00010001 0C000A0C 00010001
0C000A10 00010001 0C000A14 00010001 0C000A18 00010001 0C000A1C
00010001 0C000A20 00010001 0C000A24 D7E2E3D9 F0F2F6F8*
02E3E7E3 40000A2C 4040001C 40400001 00000E8C 00000E98 00000EA0
00000E8C 00000E8C 00000F24 00000F30 40404040 40404040 40404040
40404040 40404040 40404040 40404040 D7E2E3D9 F0F2F6F9*
02D9D3C4 40404040 40400038 40404040 00010001 0C000A28 00010001
0C000A2C 00010001 0C000A30 00010001 0C000A34 00010001 0C000A38
00010001 0C000A3C 00010001 0C000A40 D7E2E3D9 F0F2F7F0**
02E3E7E3 40000A48 4040000C 40400001 80000E8C 000011A6 80000EE8
40404040 40404040 40404040 40404040 40404040 40404040 40404040

MEMBER NAME PSTRES
40404040 40404040 40404040 40404040 D7E2E3D9 F0F2F7F1*
02E3E7E3 40000A5C 40400010 40400001 00000E8C 00001044 00000F24
00000F20 40404040 40404040 40404040 40404040 40404040 40404040
40404040 40404040 40404040 40404040 D7E2E3D9 F0F2F7F2*
02D9D3C4 40404040 40400038 40404040 00010001 0C000A44 00010001
0C000A48 00010001 0C000A4C 00010001 0C000A50 00010001 0C000A5C
00010001 0C000A60 00010001 0C000A64 D7E2E3D9 F0F2F7F3*
02E3E7E3 40000A6C 4040001C 40400001 000011A6 00000E8C 00000E8C
00000E8C 00000E8C 00000E98 00000EA0 40404040 40404040 40404040
40404040 40404040 40404040 40404040 D7E2E3D9 F0F2F7F4*
02D9D3C4 40404040 40400038 40404040 00010001 0C000A68 00010001
0C000A6C 00010001 0C000A70 00010001 0C000A74 00010001 0C000A78
00010001 0C000A7C 00010001 0C000A80 D7E2E3D9 F0F2F7F5*
02E3E7E3 40000A88 4040001C 40400001 00000E8C 00000E8C 00000F24
00000F30 80000E8C 000011A6 80000EE8 40404040 40404040 40404040
40404040 40404040 40404040 40404040 D7E2E3D9 F0F2F7F6*
02D9D3C4 40404040 40400038 40404040 00010001 0C000A84 00010001
0C000A88 00010001 0C000A8C 00010001 0C000A90 00010001 0C000A94
00010001 0C000A98 00010001 0C000A9C D7E2E3D9 F0F2F7F7*
02E3E7E3 40000AAC 4040001C 40400001 00000E8C 00001044 00000F24
00000F20 000011A6 00000E8C 00000E8C 40404040 40404040 40404040
40404040 40404040 40404040 40404040 D7E2E3D9 F0F2F7F8*
02D9D3C4 40404040 40400038 40404040 00010001 0C000AA0 00010001
0C000AAC 00010001 0C000AB0 00010001 0C000AB4 00010001 0C000AB8
00010001 0C000ABC 00010001 0C000AC0 D7E2E3D9 F0F2F7F9*
02E3E7E3 40000AC8 4040001C 40400001 00000E8C 00000E8C 00000E98

```
00000F30  80000E8C  000011A6  80000EE8  40404040  40404040  40404040
40404040  40404040  40404040  40404040  D7E2E3D9  F0F3F1F8*
02D9D3C4  40404040  40400038  40404040  00010001  0C000CB4  00010001
0C000CB8  00010001  0C000CBC  00010001  0C000CC0  00010001  0C000CC4
00010001  0C000CC8  00010001  0C000CCC  D7E2E3D9  F0F3F1F9*
02E3E7E3  40000CDC  4040001C  40400001  00000E8C  00001044  00000F24
00000F20  000011A6  00000E8C  00000E8C  40404040  40404040  40404040
40404040  40404040  40404040  40404040  D7E2E3D9  F0F3F2F0**
02D9D3C4  40404040  40400038  40404040  00010001  0C000CD0  00010001
0C000CDC  00010001  0C000CE0  00010001  0C000CE4  00010001  0C000CE8
00010001  0C000CEC  00010001  0C000CF0  D7E2E3D9  F0F3F2F1*
02E3E7E3  40000CF8  4040001C  40400001  00000E8C  00000E8C  00000E98
00000EA0  00000E8C  00000E8C  00000F24  40404040  40404040  40404040
40404040  40404040  40404040  40404040  D7E2E3D9  F0F3F2F2*
02D9D3C4  40404040  40400038  40404040  00010001  0C000CF4  00010001
0C000CF8  00010001  0C000CFC  00010001  0C000D00  00010001  0C000D04
00010001  0C000D08  00010001  0C000D0C  D7E2E3D9  F0F3F2F3*
02E3E7E3  40000D14  40400010  40400001  00000F30  80000E8C  000011A6
80000EE8  40404040  40404040  40404040  40404040  40404040  40404040
40404040  40404040  40404040  40404040  D7E2E3D9  F0F3F2F4*
02E3E7E3  40000D2C  4040000C  40400001  00000E8C  00001044  00000F24
40404040  40404040  40404040  40404040  40404040  40404040  40404040
40404040  40404040  40404040  40404040  D7E2E3D9  F0F3F2F5*
02D9D3C4  40404040  40400038  40404040  00010001  0C000D10  00010001
0C000D14  00010001  0C000D18  00010001  0C000D1C  00010001  0C000D20
00010001  0C000D2C  00010001  0C000D30  D7E2E3D9  F0F3F2F6*
02E3E7E3  40000D38  4040001C  40400001  00000F20  000011A6  00000E8C
00000E8C  00000E8C  00000E8C  00000E98  40404040  40404040  40404040
40404040  40404040  40404040  40404040  D7E2E3D9  F0F3F2F7*
02D9D3C4  40404040  40400038  40404040  00010001  0C000D34  00010001
0C000D38  00010001  0C000D3C  00010001  0C000D40  00010001  0C000D44
00010001  0C000D48  00010001  0C000D4C  D7E2E3D9  F0F3F2F8*
02E3E7E3  40000D54  4040001C  40400001  00000EA0  00000E8C  00000E8C
00000F24  00000F30  80000E8C  000011A6  40404040  40404040  40404040

MEMBER NAME  PSTRES
40404040  40404040  40404040  40404040  D7E2E3D9  F0F3F2F9*
02D9D3C4  40404040  40400038  40404040  00010001  0C000D50  00010001
0C000D54  00010001  0C000D58  00010001  0C000D5C  00010001  0C000D60
00010001  0C000D64  00010001  0C000D68  D7E2E3D9  F0F3F3F0**
02E3E7E3  40000D70  40400004  40400001  80000EE8  40404040  40404040
40404040  40404040  40404040  40404040  40404040  40404040  40404040
40404040  40404040  40404040  40404040  D7E2E3D9  F0F3F3F1*
02E3E7E3  40000D78  40400018  40400001  00000F28  00000E8C  00001044
00000F24  00000F20  000011A6  40404040  40404040  40404040  40404040
40404040  40404040  40404040  40404040  D7E2E3D9  F0F3F3F2*
02D9D3C4  40404040  40400038  40404040  00010001  0C000D6C  00010001
0C000D70  00010001  0C000D78  00010001  0C000D7C  00010001  0C000D80
00010001  0C000D84  00010001  0C000D88  D7E2E3D9  F0F3F3F3*
02E3E7E3  40000D90  4040001C  40400001  00000E8C  00000E8C  00000E8C
00000E8C  00000E98  00000EA0  00000E8C  40404040  40404040  40404040
40404040  40404040  40404040  40404040  D7E2E3D9  F0F3F3F4*
02D9D3C4  40404040  40400038  40404040  00010001  0C000D8C  00010001
0C000D90  00010001  0C000D94  00010001  0C000D98  00010001  0C000D9C
00010001  0C000DA0  00010001  0C000DA4  D7E2E3D9  F0F3F3F5*
02E3E7E3  40000DAC  40400018  40400001  00000E8C  00000F24  00000F30
80000E8C  000011A6  80000EF8  40404040  40404040  40404040  40404040
40404040  40404040  40404040  40404040  D7E2E3D9  F0F3F3F6*
02E3E7E3  40000DCC  40400004  40400001  00000E8C  40404040  40404040
```

```
40404040  40404040  40404040  40404040  40404040  40404040  40404040
40404040  40404040  40404040  40404040  D7E2E3D9  F0F3F3F7*
02D9D3C4  40404040  40400038  40404040  00010001  0C000DA8  00010001
0C000DAC  00010001  0C000DB0  00010001  0C000DB4  00010001  0C000DB8
00010001  0C000DBC  00010001  0C000DC0  D7E2E3D9  F0F3F3F8*
02E3E7E3  40000DD0  4040001C  40400001  00001044  00000F24  00000F20
000011A6  00000E8C  00000E8C  00000E8C  40404040  40404040  40404040
40404040  40404040  40404040  40404040  D7E2E3D9  F0F3F3F9*
02D9D3C4  40404040  40400038  40404040  00010001  0C000DCC  00010001
0C000DD0  00010001  0C000DD4  00010001  0C000DD8  00010001  0C000DDC
00010001  0C000DE0  00010001  0C000DE4  D7E2E3D9  F0F3F4F0**
02E3E7E3  40000DEC  4040001C  40400001  00000E8C  00000E98  00000EA0
00000E8C  00000E8C  00000F24  00000F30  40404040  40404040  40404040
40404040  40404040  40404040  40404040  D7E2E3D9  F0F3F4F1*
02D9D3C4  40404040  40400038  40404040  00010001  0C000DE8  00010001
0C000DEC  00010001  0C000DF0  00010001  0C000DF4  00010001  0C000DF8
00010001  0C000DFC  00010001  0C000E00  D7E2E3D9  F0F3F4F2*
02E3E7E3  40000E08  4040000C  40400001  80000E8C  000011A6  80000EF8
40404040  40404040  40404040  40404040  40404040  40404040  40404040
40404040  40404040  40404040  40404040  D7E2E3D9  F0F3F4F3*
02E3E7E3  40000E1C  40400010  40400001  00000E8C  00001044  00000F24
00000F20  40404040  40404040  40404040  40404040  40404040  40404040
40404040  40404040  40404040  40404040  D7E2E3D9  F0F3F4F4*
02D9D3C4  40404040  40400038  40404040  00010001  0C000E04  00010001
0C000E08  00010001  0C000E0C  00010001  0C000E10  00010001  0C000E1C
00010001  0C000E20  00010001  0C000E24  D7E2E3D9  F0F3F4F5*
02E3E7E3  40000E2C  4040001C  40400001  000011A6  00000E8C  00000E8C
00000E8C  00000E8C  00000E98  00000EA0  40404040  40404040  40404040
40404040  40404040  40404040  40404040  D7E2E3D9  F0F3F4F6*
02D9D3C4  40404040  40400038  40404040  00010001  0C000E28  00010001
0C000E2C  00010001  0C000E30  00010001  0C000E34  00010001  0C000E38
00010001  0C000E3C  00010001  0C000E40  D7E2E3D9  F0F3F4F7*
02E3E7E3  40000E48  40400014  40400001  00000E8C  00000E8C  00000F24
00000F30  80000E8C  40404040  40404040  40404040  40404040  40404040
40404040  40404040  40404040  40404040  D7E2E3D9  F0F3F4F8*

MEMBER NAME  PSTRES
02E3E7E3  4000222C  40400038  40400001  00000000  00000000  00000000
00000000  00000000  00000000  00000000  00000000  00000000  00000000
00000000  00000000  00000000  00000000  D7E2E3D9  F0F3F4F9*
02E3E7E3  40002264  40400038  40400001  00000000  00000000  00000000
00000000  00000000  097000C1  097400C1  097800C1  097C00C1  09C000C2
098400C2  00000014  00000020  098800C2  D7E2E3D9  F0F3F5F0**
02E3E7E3  4000229C  40400004  40400001  09C400C3  40404040  40404040
40404040  40404040  40404040  40404040  40404040  40404040  40404040
40404040  40404040  40404040  40404040  D7E2E3D9  F0F3F5F1*
02D9D3C4  40404040  40400030  40404040  00010001  0C000E44  00010001
0C000E48  00010001  0C000E4C  00010001  0C000E50  00010001  0C000E54
00010001  0C000E58  40404040  40404040  D7E2E3D9  F0F3F5F2*
02C5D5C4  40404040  40404040  40404040  40404040  40404040  40404040
000036F4  F1F5F7F3  F460C6D6  F34040F0  F2F0F2F8  F7F0F9F8  40F0F84B
F4F24BF4  F6404040  D7E2E3D9  C5E24040  D7E2E3D9  F0F3F5F3**

MEMBER NAME  PTARC
02C5E2C4  40404040  40400010  40400001  D7E3C1D9  C3404040  00000000
40000000  40404040  40404040  40404040  40404040  40404040  40404040
40404040  40404040  40404040  40404040  D7E3C1D9  F0F0F0F1*
02E3E7E3  40000000  40400038  40400001  47F0F00C  07D7E3C1  D9C34040
90ECD00C  184D98CD  F0205040  D00450D0  400807FC  40404040  40404040
```

```
021A37C5  D9D9D6D9  40C9D540  E2E4C2D9  D7E3C1D9  F0F0F0F2*
02E3E7E3  40000038  40400038  40400001  D6E4E3C9  D5C540D7  E3C1D9C3
40C4C9C4  40D5D6E3  40C3C8C1  C9D540C1  D5C440E2  C8D6E4D3  C440C8C1
E5C51A0F  C7D6E3D6  40D7D6C9  D5E3C5D9  D7E3C1D9  F0F0F0F3*
02E3E7E3  40000070  40400006  40400001  407E4010  05224040  40404040
40404040  40404040  40404040  40404040  40404040  40404040  40404040
40404040  40404040  40404040  40404040  D7E3C1D9  F0F0F0F4*
02E3E7E3  400000E8  40400038  40400001  00000000  00000000  4E000000
00000000  4F080000  00000000  4E000000  80000000  00000000  00000000
00000001  00000001  00000002  00000003  D7E3C1D9  F0F0F0F5*
02C5E2C4  40404040  40400010  40400002  E3D6D3C5  D9404040  05000000
4000000C  40404040  40404040  40404040  40404040  40404040  40404040
40404040  40404040  40404040  40404040  D7E3C1D9  F0F0F0F6*
02E3E7E3  40000120  4040002C  40400001  00000004  00000005  00000006
00000007  00000008  00000009  00000038  41100000  41200000  00000000
00000000  40404040  40404040  40404040  D7E3C1D9  F0F0F0F7*
02C5E2C4  40404040  40400010  40400003  C3D6E240  40404040  02000000
40000000  40404040  40404040  40404040  40404040  40404040  40404040
40404040  40404040  40404040  40404040  D7E3C1D9  F0F0F0F8*
02E3E7E3  400001C0  40400008  40400001  00000000  00000000  40404040
40404040  40404040  40404040  40404040  40404040  40404040  40404040
40404040  40404040  40404040  40404040  D7E3C1D9  F0F0F0F9*
02C5E2C4  40404040  40400010  40400004  E2C9D540  40404040  02000000
40000000  40404040  40404040  40404040  40404040  40404040  40404040
40404040  40404040  40404040  40404040  D7E3C1D9  F0F0F1F0**
02C5E2C4  40404040  40400010  40400005  E2D8D9E3  40404040  02000000
40000000  40404040  40404040  40404040  40404040  40404040  40404040
40404040  40404040  40404040  40404040  D7E3C1D9  F0F0F1F1*
02C5E2C4  40404040  40400010  40400006  C1D9C3D6  E2404040  02000000
40000000  40404040  40404040  40404040  40404040  40404040  40404040
40404040  40404040  40404040  40404040  D7E3C1D9  F0F0F1F2*
02E3E7E3  400001CC  40400014  40400001  00000000  00000000  00000000
00000000  00000000  40404040  40404040  40404040  40404040  40404040
40404040  40404040  40404040  40404040  D7E3C1D9  F0F0F1F3*
02C5E2C4  40404040  40400010  40400007  C9C2C3D6  D47B4040  02000000
40000000  40404040  40404040  40404040  40404040  40404040  40404040
40404040  40404040  40404040  40404040  D7E3C1D9  F0F0F1F4*
02E3E7E3  400001E4  40400004  40400001  00000000  40404040  40404040
40404040  40404040  40404040  40404040  40404040  40404040  40404040
40404040  40404040  40404040  40404040  D7E3C1D9  F0F0F1F5*
02E3E7E3  400001EC  40400004  40400001  00000000  40404040  40404040
40404040  40404040  40404040  40404040  40404040  40404040  40404040
40404040  40404040  40404040  40404040  D7E3C1D9  F0F0F1F6*
02E3E7E3  400001FC  40400038  40400001  5830D14C  5880D164  58A0D148
58B0D16C  5890D09C  5870D0B8  5860D0A8  78203004  7020D178  7B20B044
30227920  A0044730  D1D47820  30087B20  D7E3C1D9  F0F0F1F7*
02E3E7E3  40000234  40400038  40400001  B0483022  7920A004  4730D1D4
5800D098  5000D120  47F0D200  7820D178  7B20B04C  30227920  A0044730
D6187820  30087B20  B0503022  7920A004  D7E3C1D9  F0F0F1F8*
02E3E7E3  4000026C  40400038  40400001  4730D618  5800D090  5000D120
7800D0C4  33007000  D17C58F0  D1604110  D04C05EF  7000D0E8  7840B05C
7040D104  7800B054  7000D0EC  7800B058  D7E3C1D9  F0F0F1F9*
02E3E7E3  400002A4  40400038  40400001  7000D0F8  7800B044  7000D0F0

MEMBER NAME  PTARC
7800B048  7000D0FC  7800B04C  7000D0F4  7800B050  7000D100  7820A000
3D243322  7A20D0C4  7020D17C  58F0D160  D7E3C1D9  F0F0F2F0**
02E3E7E3  400002DC  40400038  40400001  4110D050  05EF7C00  D0C87000
D12C7820  D0F07B20  D0EC7020  D0D87840  D0FC7B40  D0F87040  D0DC3C22
```

```
3C443A24  7020D17C  58F0D15C  4110D054  D7E3C1D9  F0F0F2F1*
02E3E7E3  40000314  40400038  40400001  05EF7000  D1807800  D0D87D00
D1807000  D0D87800  D0DC7D00  D1807000  D0DC7820  D0F47B20  D0EC7020
D0E07840  D1007B40  D0F87040  D0E43C22  D7E3C1D9  F0F0F2F2*
02E3E7E3  4000034C  40400038  40400001  3C443A24  7020D17C  58F0D15C
4110D058  05EF7000  D1807800  D0E07D00  D1807000  D0E07800  D0E47D00
D1807000  D0E458F0  D1604110  D05C05EF  D7E3C1D9  F0F0F2F3*
02E3E7E3  40000384  40400038  40400001  7000D134  58F0D160  4110D060
05EF7000  D1387800  D0DC3200  47A0D338  7820D0C8  7C20D0E8  7B20D134
7020D134  7800D0E4  320047A0  D3527820  D7E3C1D9  F0F0F2F4*
02E3E7E3  400003BC  40400038  40400001  D0C87C20  D0E87B20  D1387020
D1387820  D1387B20  D1347020  D12847A0  D3707840  D0C87C40  D0E83A24
7020D128  7800D12C  7900D128  47A0D55E  D7E3C1D9  F0F0F2F5*
02E3E7E3  400003F4  40400038  40400001  7820D128  7D20D12C  7A20D0C4
2B003802  6A00D080  6000D070  5820D074  5020D110  18025700  D08C5000
D07C6840  D0786B40  D0887820  D1283D24  D7E3C1D9  F0F0F2F6*
02E3E7E3  4000042C  40400038  40400001  7020D108  5800D120  1BFF860F
D3C83322  7020D108  5800D120  1BFF860F  D3DA7800  D1387000  D11C5800
D1201BFF  870FD3EC  7800D134  7000D11C  D7E3C1D9  F0F0F2F7*
02E3E7E3  40000464  40400038  40400001  5820D110  1B2918A9  18B27800
D1087A00  D11C7000  D11C58F0  D1544110  D06405EF  38207C20  D1047A20
D0EC1857  5C40D130  18251A26  70228000  D7E3C1D9  F0F0F2F8*
02E3E7E3  4000049C  40400038  40400001  58F0D158  4110D064  05EF3820
7C20D104  7A20D0F8  18575C40  D1301825  1A277022  80005800  D1301A0A
5000D130  879AD3F6  58A0D148  58B0D16C  D7E3C1D9  F0F0F2F9*
02E3E7E3  400004D4  40400038  40400001  5890D09C  5800D120  1BFF870F
D4E458F0  D1544110  D06805EF  7820D104  3C207A20  D0EC1857  5C40D130
18261A25  70228000  58F0D158  4110D068  D7E3C1D9  F0F0F3F0**
02E3E7E3  4000050C  40400038  40400001  05EF7820  D1043C20  7A20D0F8
18575C40  D1301827  1A257022  80001857  5C40D130  18261A25  78228000
70203004  18575C40  D1301827  1A257822  D7E3C1D9  F0F0F3F1*
02E3E7E3  40000544  40400038  40400001  80007020  30085800  D1301A09
5000D130  1BFF58E0  D00007FE  58F0D154  4110D06C  05EF7820  D1043C20
7A20D0EC  18575C40  D1301826  1A257022  D7E3C1D9  F0F0F3F2*
02E3E7E3  4000057C  40400038  40400001  800058F0  D1584110  D06C05EF
7820D104  3C207A20  D0F81857  5C40D130  18271A25  70228000  18575C40
D1301826  1A257822  80007020  30041857  D7E3C1D9  F0F0F3F3*
02E3E7E3  400005B4  40400038  40400001  5C40D130  18271A25  78228000
70203008  5800D130  1A095000  D1301BFF  58E0D000  07FE5800  D1201BFF
860FD5BE  18575C40  D1301826  1A257800  D7E3C1D9  F0F0F3F4*
02E3E7E3  400005EC  40400038  40400001  D0F07002  80001857  5C40D130
18271A25  7800D0FC  70028000  18575C40  D1301826  1A257822  80007020
30041857  5C40D130  18271A25  78228000  D7E3C1D9  F0F0F3F5*
02E3E7E3  40000624  40400038  40400001  70203008  5800D130  1A095000
D13047F0  D6101857  5C40D130  18261A25  7800D0F4  70028000  18575C40
D1301827  1A257800  D1007002  80001857  D7E3C1D9  F0F0F3F6*
02E3E7E3  4000065C  40400038  40400001  5C40D130  18261A25  78228000
70203004  18575C40  D1301827  1A257822  80007020  30085800  D1301A09
5000D130  1BFF58E0  D00007FE  58F0D174  D7E3C1D9  F0F0F3F7*
02E3E7E3  40000694  40400038  40400001  45E0F004  00000006  00000028
45E0F008  0450D130  45E0F010  41F00004  58E0D000  07FE58A0  D00458E0
A00C58B0  A0185810  B00C5820  D1305020  D7E3C1D9  F0F0F3F8*
02E3E7E3  400006CC  40400038  40400001  100018DA  92FFA00C  982CA01C
07FE5870  100C5820  70005020  D1305820  10004130  20004150  00041B25

MEMBER NAME  PTARC
5020D14C  5030D150  58201004  41302000  D7E3C1D9  F0F0F3F9*
02E3E7E3  40000704  40400032  40400001  41500004  1B255B20  D0C05020
D16C5030  D1705820  10084130  20004150  00041B25  5C40D0A0  1B255020
```

D1645030 D16847F0 D1844040 40404040 D7E3C1D9 F0F0F4F0**
02E3E7E3 40000020 40400004 40400001 000006DA 40404040 40404040
40404040 40404040 40404040 40404040 40404040 40404040 40404040
40404040 40404040 40404040 40404040 D7E3C1D9 F0F0F4F1*
02D9D3C4 40404040 40400038 40404040 00020001 0C0001C0 00030001
1C0001CC 00040001 1C0001D0 00050001 1C0001D4 00060001 1C0001D8
00070001 1C0001EC 00010001 0C00069C D7E3C1D9 F0F0F4F2*
02E3E7E3 40000024 40400004 40400001 00000078 40404040 40404040
40404040 40404040 40404040 40404040 40404040 40404040 40404040
40404040 40404040 40404040 40404040 D7E3C1D9 F0F0F4F3*
02E3E7E3 40000078 40400004 40400001 000006B6 40404040 40404040
40404040 40404040 40404040 40404040 40404040 40404040 40404040
40404040 40404040 40404040 40404040 D7E3C1D9 F0F0F4F4*
02E3E7E3 400000C4 40400014 40400001 800001F4 800001F4 800001F4
800001F4 80000150 40404040 40404040 40404040 40404040 40404040
40404040 40404040 40404040 40404040 D7E3C1D9 F0F0F4F5*
02D9D3C4 40404040 40400038 40404040 00010001 0C000020 00010001
0C000024 00010001 0C000078 00010001 0C0000C4 00010001 0C0000C8
00010001 0C0000CC 00010001 0C0000D0 D7E3C1D9 F0F0F4F6*
02E3E7E3 400000D8 40400010 40400001 80000158 80000194 800001B0
800001AC 40404040 40404040 40404040 40404040 40404040 40404040
40404040 40404040 40404040 40404040 D7E3C1D9 F0F0F4F7*
02E3E7E3 400001F0 4040000C 40400001 00000000 00000000 00000000
40404040 40404040 40404040 40404040 40404040 40404040 40404040
40404040 40404040 40404040 40404040 D7E3C1D9 F0F0F4F8*
02D9D3C4 40404040 40400028 40404040 00010001 0C0000D4 00010001
0C0000D8 00010001 0C0000DC 00010001 0C0000E0 00010001 0C0000E4
40404040 40404040 40404040 40404040 D7E3C1D9 F0F0F4F9*
02C5D5C4 40404040 40404040 40404040 40404040 40404040 40404040
00000736 F1F5F7F3 F460C6D6 F34040F0 F2F0F2F8 F7F0F9F8 40F0F84B
F4F24BF5 F4404040 D7E3C1D9 C3404040 D7E3C1D9 F0F0F5F0**

MEMBER NAME PTLN

02C5E2C4 40404040 40400010 40400001 D7E3D3D5 40404040 00000000
40000000 40404040 40404040 40404040 40404040 40404040 40404040
40404040 40404040 40404040 40404040 D7E3D3D5 F0F0F0F1*
02E3E7E3 40000000 40400038 40400001 47F0F00C 07D7E3D3 D5404040
90ECD00C 184D98CD F0205040 D00450D0 400807FC 40404040 40404040
021A36C5 D9D9D6D9 40C9D540 E2E4C2D9 D7E3D3D5 F0F0F0F2*
02E3E7E3 40000038 40400038 40400001 D6E4E3C9 D5C540D7 E3D3D540
C4C9C440 D5D6E340 C3C8C1C9 D540C1D5 C440E2C8 D6E4D3C4 40C8C1E5
C51A1040 C7D6E3D6 40D7D6C9 D5E3C5D9 D7E3D3D5 F0F0F0F3*
02E3E7E3 40000070 40400006 40400001 407E4010 05224040 40404040
40404040 40404040 40404040 40404040 40404040 40404040 40404040
40404040 40404040 40404040 40404040 D7E3D3D5 F0F0F0F4*
02C5E2C4 40404040 40400010 40400002 E3D6D3C5 D9404040 05000000
4000000C 40404040 40404040 40404040 40404040 40404040 40404040
40404040 40404040 40404040 40404040 D7E3D3D5 F0F0F0F5*
02E3E7E3 400000C8 40400024 40400001 00000001 00000002 00000003
00000004 00000005 00000006 00000038 00000000 00000000 40404040
40404040 40404040 40404040 40404040 D7E3D3D5 F0F0F0F6*
02E3E7E3 40000100 40400008 40400001 00000000 00000000 40404040
40404040 40404040 40404040 40404040 40404040 40404040 40404040
40404040 40404040 40404040 40404040 D7E3D3D5 F0F0F0F7*
02E3E7E3 4000010C 40400004 40400001 00000000 40404040 40404040
40404040 40404040 40404040 40404040 40404040 40404040 40404040
40404040 40404040 40404040 40404040 D7E3D3D5 F0F0F0F8*
02C5E2C4 40404040 40400010 40400003 C9C2C3D6 D47B4040 02000000
40000000 40404040 40404040 40404040 40404040 40404040 40404040

```
40404040  40404040  40404040  40404040  D7E3D3D5  F0F0F0F9*
02E3E7E3  40000114  40400004  40400001  00000000  40404040  40404040
40404040  40404040  40404040  40404040  40404040  40404040  40404040
40404040  40404040  40404040  40404040  D7E3D3D5  F0F0F1F0**
02E3E7E3  4000011C  40400004  40400001  00000000  40404040  40404040
40404040  40404040  40404040  40404040  40404040  40404040  40404040
40404040  40404040  40404040  40404040  D7E3D3D5  F0F0F1F1*
02E3E7E3  40000128  40400038  40400001  5890D094  58A0D08C  58B0D09C
5880D0AC  5870D050  5860D05C  7820A004  7020D0A8  7B20B044  306258F0
D0887960  F0044730  D1367820  A0087B20  D7E3D3D5  F0F0F1F2*
02E3E7E3  40000160  40400038  40400001  B0483062  58F0D088  7960F004
4730D136  7840B04C  18585C40  D07C1826  1A257042  90007820  B0501858
5C40D07C  18281A25  70229000  7040A004  D7E3D3D5  F0F0F1F3*
02E3E7E3  40000198  40400038  40400001  7020A008  5800D07C  1A075000
D07C1BFF  58E0D000  07FE7820  D0A87B20  B04C3062  58F0D088  7960F004
4730D1A0  7820A008  7B20B050  306258F0  D7E3D3D5  F0F0F1F4*
02E3E7E3  400001D0  40400038  40400001  D0887960  F0044730  D1A07840
B0441858  5C40D07C  18261A25  70429000  7820B048  18585C40  D07C1828
1A257022  90007040  A0047020  A0085800  D7E3D3D5  F0F0F1F5*
02E3E7E3  40000208  40400038  40400001  D07C1A07  5000D07C  1BFF58E0
D00007FE  58F0D0A4  45E0F004  00000006  00000028  45E0F008  0450D07C
45E0F010  41F00004  58E0D000  07FE58A0  D7E3D3D5  F0F0F1F6*
02E3E7E3  40000240  40400038  40400001  D00458E0  A00C58B0  A0185810
B00C5820  D07C5020  100018DA  92FFA00C  982CA01C  07FE5870  100C5820
70005020  D07C5820  10004130  20004150  D7E3D3D5  F0F0F1F7*
02E3E7E3  40000278  40400038  40400001  00041B25  5020D08C  5030D090
58201004  41302000  41500004  1B255B20  D0685020  D09C5030  D0A05820
10084130  20004150  00041B25  5C40D054  D7E3D3D5  F0F0F1F8*
02E3E7E3  400002B0  4040000E  40400001  1B255020  D0945030  D09847F0
D0B04040  40404040  40404040  40404040  40404040  40404040  40404040
40404040  40404040  40404040  40404040  D7E3D3D5  F0F0F1F9*
02E3E7E3  40000020  40400008  40400001  00000262  00000078  40404040

MEMBER NAME  PTLN
40404040  40404040  40404040  40404040  40404040  40404040  40404040
40404040  40404040  40404040  40404040  D7E3D3D5  F0F0F2F0**
02E3E7E3  40000078  40400004  40400001  0000023E  40404040  40404040
40404040  40404040  40404040  40404040  40404040  40404040  40404040
40404040  40404040  40404040  40404040  D7E3D3D5  F0F0F2F1*
02E3E7E3  40000120  40400008  40400001  00000000  00000008  40404040
40404040  40404040  40404040  40404040  40404040  40404040  40404040
40404040  40404040  40404040  40404040  D7E3D3D5  F0F0F2F2*
02D9D3C4  40404040  40400030  40404040  00020001  0C000100  00030001
1C00011C  00010001  0C000224  00010001  0C000020  00010001  0C000024
00010001  0C000078  40404040  40404040  D7E3D3D5  F0F0F2F3*
02C5D5C4  40404040  40404040  40404040  40404040  40404040  40404040
000002BE  F1F5F7F3  F460C6D6  F34040F0  F2F0F2F8  F7F0F9F8  40F0F84B
F4F24BF5  F9404040  D7E3D3D5  40404040  D7E3D3D5  F0F0F2F4**

MEMBER NAME  PTSPL
02C5E2C4  40404040  40400010  40400001  D7E3E2D7  D3404040  00000000
40000000  40404040  40404040  40404040  40404040  40404040  40404040
40404040  40404040  40404040  40404040  D7E3E2D7  F0F0F0F1*
02E3E7E3  40000000  40400038  40400001  47F0F00C  07D7E3E2  D7D34040
90ECD00C  184D98CD  F0205040  D00450D0  400807FC  40404040  40404040
021A37C5  D9D9D6D9  40C9D540  E2E4C2D9  D7E3E2D7  F0F0F0F2*
02E3E7E3  40000038  40400038  40400001  D6E4E3C9  D5C540D7  E3E2D7D3
40C4C9C4  40D5D6E3  40C3C8C1  C9D540C1  D5C440E2  C8D6E4D3  C440C8C1
E5C51A0F  C7D6E3D6  40D7D6C9  D5E3C5D9  D7E3E2D7  F0F0F0F3*
```

| | | | | | | |
|---|---|---|---|---|---|---|
| 02E3E7E3 | 40000070 | 40400006 | 40400001 | 407E4010 | 05224040 | 40404040 |
| 40404040 | 40404040 | 40404040 | 40404040 | 40404040 | 40404040 | 40404040 |
| 40404040 | 40404040 | 40404040 | 40404040 | D7E3E2D7 | F0F0F0F4* | |
| 02E3E7E3 | 40000130 | 40400038 | 40400001 | 00000000 | 00000000 | 4F080000 |
| 00000000 | 00000000 | 00000000 | 00000001 | 00000002 | 00000003 | 00000004 |
| 00000005 | 00000006 | 00000008 | 41100000 | D7E3E2D7 | F0F0F0F5* | |
| 02C5E2C4 | 40404040 | 40400010 | 40400002 | E3D6D3C5 | D9404040 | 05000000 |
| 4000000C | 40404040 | 40404040 | 40404040 | 40404040 | 40404040 | 40404040 |
| 40404040 | 40404040 | 40404040 | 40404040 | D7E3E2D7 | F0F0F0F6* | |
| 02E3E7E3 | 40000168 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D7E3E2D7 | F0F0F0F7* | |
| 02E3E7E3 | 400001C8 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D7E3E2D7 | F0F0F0F8* | |
| 02C5E2C4 | 40404040 | 40400010 | 40400003 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D7E3E2D7 | F0F0F0F9* | |
| 02E3E7E3 | 400001D4 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7E3E2D7 | F0F0F1F0** | |
| 02E3E7E3 | 400001DC | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D7E3E2D7 | F0F0F1F1* | |
| 02C5E2C4 | 40404040 | 40400010 | 40400004 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | D7E3E2D7 | F0F0F1F2* | |
| 02E3E7E3 | 400001E8 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D7E3E2D7 | F0F0F1F3* | |
| 02C5E2C4 | 40404040 | 40400010 | 40400005 | E2D7C2D9 | C3D24040 | 02000000 |
| 40000000 | 40404040 | 40404040 | 40404040 | 40404040 | 40404040 | 40404040 |
| 40404040 | 40404040 | 40404040 | 40404040 | D7E3E2D7 | F0F0F1F4* | |
| 02E3E7E3 | 400001F0 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | D7E3E2D7 | F0F0F1F5* | |
| 02E3E7E3 | 40000220 | 40400038 | 40400001 | 5880D168 | 5890D150 | 58A0D154 |
| 58B0D170 | 2B007800 | 80046A00 | D0C06000 | D0B85820 | D0BC5020 | D1082B00 |
| 78008008 | 6A00D0C0 | 6000D0B8 | 5800D0BC | D7E3E2D7 | F0F0F1F6* | |
| 02E3E7E3 | 40000258 | 40400038 | 40400001 | 5000D104 | 7800800C | 7000D110 |
| 78008010 | 7000D10C | 78008014 | 7000D12C | 7820A004 | 7020D1A4 | 7B20B00C |
| 30227920 | 90044730 | D33E7820 | A0087B20 | D7E3E2D7 | F0F0F1F7* | |
| 02E3E7E3 | 40000290 | 40400038 | 40400001 | B0103022 | 79209004 | 4730D33E |
| 5800D0C8 | 5000D100 | 18A258B0 | D1801889 | 7800D0CC | 7000D120 | 7800D0EC |
| 7000D11C | 59A0D108 | 4770D254 | 7800D110 | D7E3E2D7 | F0F0F1F8* | |
| 02E3E7E3 | 400002C8 | 40400038 | 40400001 | 7000D120 | 59A0D104 | 4770D264 |
| 7800D10C | 7000D11C | 185A5C40 | D1881825 | 5A20D0DC | 4102B000 | 5000D054 |
| 9280D054 | 58F0D164 | 4110D04C | 05EF189A | D7E3E2D7 | F0F0F1F9* | |
| 02E3E7E3 | 40000300 | 40400038 | 40400001 | 5A90D0D0 | 18795C60 | D1881837 |

MEMBER NAME PTSPL

| | | | | | | |
|---|---|---|---|---|---|---|
| 5A30D0DC | 4103B000 | 5000D060 | 9280D060 | 58F0D164 | 4110D058 | 05EF1835 |
| 5A30D18C | 4103B000 | 5000D06C | 9280D06C | D7E3E2D7 | F0F0F2F0** | |
| 02E3E7E3 | 40000338 | 40400038 | 40400001 | 58F0D164 | 4110D064 | 05EF1837 |
| 5A30D18C | 4103B000 | 5000D078 | 9280D078 | 58F0D164 | 4110D070 | 05EF1835 |
| 5A30D188 | 4103B000 | 5000D084 | 9280D084 | D7E3E2D7 | F0F0F2F1* | |
| 02E3E7E3 | 40000370 | 40400038 | 40400001 | 58F0D164 | 4110D07C | 05EF58F0 |
| D17C4110 | D08805EF | 18A95990 | D10447C0 | D2345880 | D1685890 | D15058A0 |
| D15458B0 | D1707820 | B0147020 | A0047820 | D7E3E2D7 | F0F0F2F2* | |

```
02E3E7E3  400003A8  40400038  40400001  B0187020  A0081BFF  58E0D000
07FE7820  D1A47B20  B0143022  79209004  4730D49C  7820A008  7B20B018
30227920  90044730  D49C5800  D0D05000  D7E3E2D7  F0F0F2F3*
02E3E7E3  400003E0  40400038  40400001  D1005820  D1041A20  18725C60
D1881837  5A30D0DC  18475A40  D18C1857  5A50D188  5860D190  18751884
189318A2  58B0D180  5830D150  5BA0D0D0  D7E3E2D7  F0F0F2F4*
02E3E7E3  40000418  40400038  40400001  1A761A86  1A9659A0  D10847A0
D3B247F0  D4747800  D0CC7000  D1207800  D0EC7000  D11C59A0  D1084770
D3D27800  D1107000  D12059A0  D1044770  D7E3E2D7  F0F0F2F5*
02E3E7E3  40000450  40400038  40400001  D3E27800  D10C7000  D11C4109
B0005000  D0549280  D05458F0  D1644110  D04C05EF  185A5A50  D0D05C40
D1881825  5A20D0DC  4102B000  5000D060  D7E3E2D7  F0F0F2F6*
02E3E7E3  40000488  40400038  40400001  9280D060  58F0D164  4110D058
05EF4108  B0005000  D06C9280  D06C58F0  D1644110  D06405EF  18255A20
D18C4102  B0005000  D0789280  D07858F0  D7E3E2D7  F0F0F2F7*
02E3E7E3  400004C0  40400038  40400001  D1644110  D07005EF  4107B000
5000D084  9280D084  58F0D164  4110D07C  05EF58F0  D17C4110  D08805EF
47F0D39C  5880D168  5890D150  58A0D154  D7E3E2D7  F0F0F2F8*
02E3E7E3  400004F8  40400038  40400001  58B0D170  7820B00C  7020A004
7820B010  7020A008  1BFF58E0  D00007FE  58F0D178  45E0F004  00000006
00000028  45E0F008  0450D124  45E0F010  D7E3E2D7  F0F0F2F9*
02E3E7E3  40000530  40400038  40400001  41F00004  58E0D000  07FE58A0
D00458E0  A00C58B0  A0185810  B0105820  D1245020  100018DA  92FFA00C
982CA01C  07FE9879  10105820  70005020  D7E3E2D7  F0F0F3F0**
02E3E7E3  40000568  40400038  40400001  D1245820  90005020  D1285820
10004130  20004150  00041B25  5020D154  5030D158  58201004  41302000
41500004  1B255020  D1705030  D1745820  D7E3E2D7  F0F0F3F1*
02E3E7E3  400005A0  40400038  40400001  10084130  20004150  00041B25
5020D168  5030D16C  5820100C  41302000  41500004  1B255C40  D0D41B25
5020D15C  5030D160  5030D0B0  58201014  D7E3E2D7  F0F0F3F2*
02E3E7E3  400005D8  4040001C  40400001  41302000  41500004  1B255C40
D0E01B25  5020D180  5030D184  47F0D1A8  40404040  40404040  40404040
40404040  40404040  40404040  40404040  D7E3E2D7  F0F0F3F3*
02E3E7E3  40000020  40400008  40400001  0000055E  00000078  40404040
40404040  40404040  40404040  40404040  40404040  40404040  40404040
40404040  40404040  40404040  40404040  D7E3E2D7  F0F0F3F4*
02E3E7E3  40000078  40400004  40400001  0000053A  40404040  40404040
40404040  40404040  40404040  40404040  40404040  40404040  40404040
40404040  40404040  40404040  40404040  D7E3E2D7  F0F0F3F5*
02D9D3C4  40404040  40400038  40404040  00020001  0C0001C8  00030001
1C0001DC  00040001  1C0001F0  00050001  1C0001F4  00010001  0C000520
00010001  0C000020  00010001  0C000024  D7E3E2D7  F0F0F3F6*
02E3E7E3  400000C4  40400028  40400001  00000160  000001B8  80000000
00000160  000001C0  80000000  00000160  000001A8  80000000  00000160
40404040  40404040  40404040  40404040  D7E3E2D7  F0F0F3F7*
02D9D3C4  40404040  40400038  40404040  00010001  0C000078  00010001
0C0000C4  00010001  0C0000C8  00010001  0C0000D0  00010001  0C0000D4
00010001  0C0000DC  00010001  0C0000E0  D7E3E2D7  F0F0F3F8*
02E3E7E3  400000EC  40400024  40400001  000001B0  80000000  00000154
0000018C  80000000  000001B8  000001C0  0000018C  000001A8  40404040

MEMBER NAME  PTSPL
40404040  40404040  40404040  40404040  D7E3E2D7  F0F0F3F9*
02D9D3C4  40404040  40400038  40404040  00010001  0C0000E8  00010001
0C0000EC  00010001  0C0000F4  00010001  0C0000F8  00010001  0C000100
00010001  0C000104  00010001  0C000108  D7E3E2D7  F0F0F4F0**
02E3E7E3  40000110  40400018  40400001  000001B0  00000000  00000198
00000194  000001A4  00000178  40404040  40404040  40404040  40404040
40404040  40404040  40404040  40404040  D7E3E2D7  F0F0F4F1*
```

```
02E3E7E3  4000012C  40400004  40400001  8000019C  40404040  40404040
40404040  40404040  40404040  40404040  40404040  40404040  40404040
40404040  40404040  40404040  40404040  D7E3E2D7  F0F0F4F2*
02D9D3C4  40404040  40400038  40404040  00010001  0C00010C  00010001
0C000110  00020001  0C000114  00010001  0C000118  00010001  0C00011C
00010001  0C000120  00010001  0C000124  D7E3E2D7  F0F0F4F3*
02E3E7E3  40000200  40400020  40400001  00000014  0000000C  FFFFFFEC
00000000  00000000  00000000  00000000  00000000  40404040  40404040
40404040  40404040  40404040  40404040  D7E3E2D7  F0F0F4F4*
02D9D3C4  40404040  40400008  40404040  00010001  0C00012C  40404040
40404040  40404040  40404040  40404040  40404040  40404040  40404040
40404040  40404040  40404040  40404040  D7E3E2D7  F0F0F4F5*
02C5D5C4  40404040  40404040  40404040  40404040  40404040  40404040
000005F4  F1F5F7F3  F460C6D6  F34040F0  F2F0F2F8  F7F0F9F8  40F0F84B
F4F34BF0  F3404040  D7E3E2D7  D3404040  D7E3E2D7  F0F0F4F6**

MEMBER NAME  PUTMSG
02C5E2C4  40404040  40400010  40400001  D7E4E3D4  E2C74040  00000000
40000000  40404040  40404040  40404040  40404040  40404040  40404040
40404040  40404040  40404040  40404040  D7E4E3D4  F0F0F0F1*
02E3E7E3  40000000  40400038  40400001  47F0F00C  07D7E4E3  D4E2C740
90ECD00C  184D98CD  F0205040  D00450D0  400807FC  40404040  40404040
02100218  05100318  50220206  2A140122  D7E4E3D4  F0F0F0F2*
02E3E7E3  40000038  40400038  40400001  02100218  05100318  031A0FE4
D5C1C2D3  C540E3D6  40C3C8C1  C9D51832  22021002  18051003  18031A12
C5E7E3C5  D9C9D6D9  40E4D5C4  C5C6C9D5  D7E4E3D4  F0F0F0F3*
02E3E7E3  40000070  40400038  40400001  C5C41832  22021002  18051003
18031A0F  E4D5C1C2  D3C540E3  D640D6D9  C4C5D918  32220210  02180510
0318031A  0EC9D3D3  C5C7C1D3  40C3E4E3  D7E4E3D4  F0F0F0F4*
02E3E7E3  400000A8  40400006  40400001  D6E4E318  32224040  40404040
40404040  40404040  40404040  40404040  40404040  40404040  40404040
40404040  40404040  40404040  40404040  D7E4E3D4  F0F0F0F5*
02E3E7E3  40000100  40400020  40400001  00000000  00000001  00000002
00000003  00000004  0000002A  00000000  00000000  40404040  40404040
40404040  40404040  40404040  40404040  D7E4E3D4  F0F0F0F6*
02C5E2C4  40404040  40400010  40400002  C9C2C3D6  D47B4040  02000000
40000000  40404040  40404040  40404040  40404040  40404040  40404040
40404040  40404040  40404040  40404040  D7E4E3D4  F0F0F0F7*
02E3E7E3  40000138  40400004  40400001  00000000  40404040  40404040
40404040  40404040  40404040  40404040  40404040  40404040  40404040
40404040  40404040  40404040  40404040  D7E4E3D4  F0F0F0F8*
02E3E7E3  40000140  40400038  40400001  00000000  5880D088  58B0D064
58A0D054  5870D058  5860D05C  5800D080  1A0A5000  D0805800  D0781200
4780D0E0  59A0D078  4780D138  5970D078  D7E4E3D4  F0F0F0F9*
02E3E7E3  40000178  40400038  40400001  4780D190  5960D078  4780D1E8
5800D078  5900D060  4780D240  58F0D090  45E0F004  00000000  00000028
45E0F008  0450D074  45E0F008  0450D07C  D7E4E3D4  F0F0F1F0**
02E3E7E3  400001B0  40400038  40400001  45E0F010  58F0D090  45E0F000
00000000  00000032  189A185B  5C40D080  18391A35  45E0F008  01238000
879AD116  45E0F010  1BFF58E0  D00007FE  D7E4E3D4  F0F0F1F1*
02E3E7E3  400001E8  40400038  40400001  58F0D090  45E0F004  00000000
00000038  45E0F008  0450D074  45E0F008  0450D07C  45E0F010  58F0D090
45E0F000  00000000  00000032  189A185B  D7E4E3D4  F0F0F1F2*
02E3E7E3  40000220  40400038  40400001  5C40D080  18391A35  45E0F008
01238000  879AD16E  45E0F010  1BFF58E0  D00007FE  58F0D090  45E0F004
00000000  00000055  45E0F008  0450D074  D7E4E3D4  F0F0F1F3*
02E3E7E3  40000258  40400038  40400001  45E0F008  0450D07C  45E0F010
58F0D090  45E0F000  00000000  00000032  189A185B  5C40D080  18391A35
45E0F008  01238000  879AD1C6  45E0F010  D7E4E3D4  F0F0F1F4*
```

| | | | | | | |
|---|---|---|---|---|---|---|
| 02E3E7E3 | 40000290 | 40400018 | 40400001 | 1BFF58E0 | D00007FE | 58F0D090 |
| 45E0F004 | 00000000 | 00000075 | 40404040 | 40404040 | 40404040 | 40404040 |
| 40404040 | 40404040 | 40404040 | 40404040 | D7E4E3D4 | F0F0F1F5* | |
| 02D9D3C4 | 40404040 | 40400038 | 40404040 | 00020001 | 1C000140 | 00010001 |
| 0C00019C | 00010001 | 0C0001C0 | 00010001 | 0C0001F4 | 00010001 | 0C000218 |
| 00010001 | 0C00024C | 00010001 | 0C000270 | D7E4E3D4 | F0F0F1F6* | |
| 02E3E7E3 | 400002A8 | 40400038 | 40400001 | 45E0F008 | 0450D074 | 45E0F008 |
| 0450D07C | 45E0F010 | 58F0D090 | 45E0F000 | 00000000 | 00000032 | 189A185B |
| 5C40D080 | 18391A35 | 45E0F008 | 01238000 | D7E4E3D4 | F0F0F1F7* | |
| 02E3E7E3 | 400002E0 | 40400038 | 40400001 | 879AD21E | 45E0F010 | 1BFF58E0 |
| D00007FE | 58F0D090 | 45E0F004 | 00000000 | 00000092 | 45E0F008 | 0450D074 |
| 45E0F008 | 0450D07C | 45E0F010 | 58F0D090 | D7E4E3D4 | F0F0F1F8* | |
| 02E3E7E3 | 40000318 | 40400038 | 40400001 | 45E0F000 | 00000000 | 00000032 |
| 189A185B | 5C40D080 | 18391A35 | 45E0F008 | 01238000 | 879AD276 | 45E0F010 |
| 1BFF58E0 | D00007FE | 58A0D004 | 58E0A00C | D7E4E3D4 | F0F0F1F9* | |
| 02E3E7E3 | 40000350 | 40400038 | 40400001 | 58B0A018 | 5810B010 | 5820D080 |

MEMBER NAME PUTMSG

| | | | | | | |
|---|---|---|---|---|---|---|
| 50201000 | 18DA92FF | A00C982C | A01C07FE | 987B1000 | 58207000 | 5020D078 |
| 58208000 | 5020D074 | 58209000 | 5020D07C | D7E4E3D4 | F0F0F2F0** | |
| 02E3E7E3 | 40000388 | 4040002C | 40400001 | 58701010 | 58207000 | 5020D080 |
| 5820100C | 41302000 | 41500001 | 1B255C40 | D0641B25 | 5020D088 | 5030D08C |
| 47F0D094 | 40404040 | 40404040 | 40404040 | D7E4E3D4 | F0F0F2F1* | |
| 02E3E7E3 | 40000020 | 40400008 | 40400001 | 0000036C | 000000B0 | 40404040 |
| 40404040 | 40404040 | 40404040 | 40404040 | 40404040 | 40404040 | 40404040 |
| 40404040 | 40404040 | 40404040 | 40404040 | D7E4E3D4 | F0F0F2F2* | |
| 02E3E7E3 | 400000B0 | 40400004 | 40400001 | 00000348 | 40404040 | 40404040 |
| 40404040 | 40404040 | 40404040 | 40404040 | 40404040 | 40404040 | 40404040 |
| 40404040 | 40404040 | 40404040 | 40404040 | D7E4E3D4 | F0F0F2F3* | |
| 02D9D3C4 | 40404040 | 40400038 | 40404040 | 00010001 | 0C0002A4 | 00010001 |
| 0C0002C8 | 00010001 | 0C0002FC | 00010001 | 0C000320 | 00010001 | 0C000020 |
| 00010001 | 0C000024 | 00010001 | 0C0000B0 | D7E4E3D4 | F0F0F2F4* | |
| 02C5D5C4 | 40404040 | 40404040 | 40404040 | 40404040 | 40404040 | 40404040 |
| 000003B4 | F1F5F7F3 | F460C6D6 | F34040F0 | F2F0F2F8 | F7F0F9F8 | 40F0F84B |
| F4F34BF0 | F8404040 | D7E4E3D4 | E2C74040 | D7E4E3D4 | F0F0F2F5** | |

MEMBER NAME QUAD

| | | | | | | |
|---|---|---|---|---|---|---|
| 02C5E2C4 | 40404040 | 40400010 | 40400001 | D8E4C1C4 | 40404040 | 00000000 |
| 40000000 | 40404040 | 40404040 | 40404040 | 40404040 | 40404040 | 40404040 |
| 40404040 | 40404040 | 40404040 | 40404040 | D8E4C1C4 | F0F0F0F1* | |
| 02E3E7E3 | 40000000 | 40400028 | 40400001 | 47F0F00C | 07D8E4C1 | C4404040 |
| 90ECD00C | 184D98CD | F0205040 | D00450D0 | 400807FC | 40404040 | 40404040 |
| 40404040 | 40404040 | 40404040 | 40404040 | D8E4C1C4 | F0F0F0F2* | |
| 02E3E7E3 | 40000080 | 40400038 | 40400001 | 00000000 | 00000000 | 41100000 |
| 00000000 | 3CA7C5AC | 00000000 | 41400000 | 00000000 | 41200000 | 00000000 |
| 00000000 | 00000000 | 00000001 | 00000002 | D8E4C1C4 | F0F0F0F3* | |
| 02E3E7E3 | 400000B8 | 4040001C | 40400001 | 3CA7C5AC | 3D68DB8C | 41100000 |
| 41200000 | 41400000 | 00000000 | 00000000 | 40404040 | 40404040 | 40404040 |
| 40404040 | 40404040 | 40404040 | 40404040 | D8E4C1C4 | F0F0F0F4* | |
| 02C5E2C4 | 40404040 | 40400010 | 40400002 | C4E2D8D9 | E3404040 | 02000000 |
| 40000000 | 40404040 | 40404040 | 40404040 | 40404040 | 40404040 | 40404040 |
| 40404040 | 40404040 | 40404040 | 40404040 | D8E4C1C4 | F0F0F0F5* | |
| 02E3E7E3 | 40000120 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D8E4C1C4 | F0F0F0F6* | |
| 02E3E7E3 | 40000128 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D8E4C1C4 | F0F0F0F7* | |
| 02E3E7E3 | 4000013C | 40400038 | 40400001 | 58B0D0F8 | 58A0D088 | 5890D080 |

```
5090D0AC  6800D058  6000B008  6800D058  6000B010  6840D0C0  20446820
D0C82022  7020D0B8  7940D090  4730D19A  D8E4C1C4  F0F0F0F8*
02E3E7E3  40000174  40400038  40400001  7920D090  4730D15C  1BFF58E0
D00007FE  6820D0D0  6D20D0C8  23226020  D0D82222  4750D178  6920D060
47C0D180  1BFF58E0  D00007FE  50A0D0AC  D8E4C1C4  F0F0F0F9*
02E3E7E3  400001AC  40400038  40400001  182A8920  00036800  D0D86002
B0001BFF  58E0D000  07FE6820  D0C82C22  6840D070  6C40D0C0  6C40D0D0
2B246020  D0E847A0  D1BE1BFF  58E0D000  D8E4C1C4  F0F0F1F0**
02E3E7E3  400001E4  40400038  40400001  07FE6820  D0E82022  7920D094
4750D292  6820D0C8  2C226840  D0706C40  D0C06C40  D0D02B24  6020D108
58F0D100  4110D04C  05EF6820  D0C82A20  D8E4C1C4  F0F0F1F1*
02E3E7E3  4000021C  40400038  40400001  6840D078  6C40D0C0  2D242322
6020D0D8  22224750  D2266920  D0604730  D2265800  D0AC1A0A  5000D0AC
18208920  00036022  B0006820  D0C82C22  D8E4C1C4  F0F0F1F2*
02E3E7E3  40000254  40400038  40400001  6840D070  6C40D0C0  6C40D0D0
2B246020  D10858F0  D1004110  D05005EF  28206B20  D0C86840  D0786C40
D0C02D24  6020D0D8  22224750  D26A6920  D8E4C1C4  F0F0F1F3*
02E3E7E3  4000028C  40400038  40400001  D06047C0  D2721BFF  58E0D000
07FE5800  D0AC1A0A  5000D0AC  18208920  00036800  D0D86002  B0001BFF
58E0D000  07FE6840  D0786C40  D0C06820  D8E4C1C4  F0F0F1F4*
02E3E7E3  400002C4  40400038  40400001  D0C82D24  23226020  D0D82222
4750D2B4  6920D060  47C0D2BC  1BFF58E0  D00007FE  50A0D0AC  182A8920
00036800  D0D86002  B0001BFF  58E0D000  D8E4C1C4  F0F0F1F5*
02E3E7E3  400002FC  40400038  40400001  07FE58A0  D00458E0  A00C58B0
A0185810  B0006820  D0C06020  10005820  B0046840  D0C86040  20005830
B0086860  D0D06060  30005840  B0105850  D8E4C1C4  F0F0F1F6*
02E3E7E3  40000334  40400038  40400001  D0AC5050  400018DA  92FFA00C
982CA01C  07FE987B  10006820  70006020  D0C06820  80006020  D0C86820
90006020  D0D05870  10105820  70005020  D8E4C1C4  F0F0F1F7*
02E3E7E3  4000036C  4040001C  40400001  D0AC5820  100C4130  20004150
00081B25  5020D0F8  5030D0FC  47F0D114  40404040  40404040  40404040
40404040  40404040  40404040  40404040  D8E4C1C4  F0F0F1F8*
02E3E7E3  40000020  4040000C  40400001  00000346  00000028  000002FE
40404040  40404040  40404040  40404040  40404040  40404040  40404040
40404040  40404040  40404040  40404040  D8E4C1C4  F0F0F1F9*
02E3E7E3  40000074  40400008  40400001  80000130  80000130  40404040

MEMBER NAME  QUAD
40404040  40404040  40404040  40404040  40404040  40404040  40404040
40404040  40404040  40404040  40404040  D8E4C1C4  F0F0F2F0**
02E3E7E3  4000012C  40400010  40400001  00000000  00000000  00000000
00000000  40404040  40404040  40404040  40404040  40404040  40404040
40404040  40404040  40404040  40404040  D8E4C1C4  F0F0F2F1*
02D9D3C4  40404040  40400030  40404040  00020001  1C000128  00010001
0C000020  00010001  0C000024  00010001  0C000028  00010001  0C000074
00010001  0C000078  40404040  40404040  D8E4C1C4  F0F0F2F2*
02C5D5C4  40404040  40404040  40404040  40404040  40404040  40404040
00000388  F1F5F7F3  F460C6D6  F34040F0  F2F0F2F8  F7F0F9F8  40F0F84B
F4F34BF1  F2404040  D8E4C1C4  40404040  D8E4C1C4  F0F0F2F3**

MEMBER NAME  RANGE
02C5E2C4  40404040  40400010  40400001  D9C1D5C7  C5404040  00000000
40000000  40404040  40404040  40404040  40404040  40404040  40404040
40404040  40404040  40404040  40404040  D9C1D5C7  F0F0F0F1*
02E3E7E3  40000000  40400028  40400001  47F0F00C  07D9C1D5  C7C54040
90ECD00C  184D98CD  F0205040  D00450D0  400807FC  40404040  40404040
40404040  40404040  40404040  40404040  D9C1D5C7  F0F0F0F2*
02C5E2C4  40404040  40400010  40400002  C3C8C5C3  D2404040  02000000
40000000  40404040  40404040  40404040  40404040  40404040  40404040
```

| | | | | | | |
|---|---|---|---|---|---|---|
| 40404040 | 40404040 | 40404040 | 40404040 | D9C1D5C7 | F0F0F0F3* | |
| 02E3E7E3 | 400000A8 | 40400030 | 40400001 | 00000000 | 00000000 | 00000001 |
| 00000001 | 00000002 | 00000005 | 0000000D | 0000000E | 00000038 | 40E66666 |
| 00000000 | 00000000 | 40404040 | 40404040 | D9C1D5C7 | F0F0F0F4* | |
| 02C5E2C4 | 40404040 | 40400010 | 40400003 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D9C1D5C7 | F0F0F0F5* | |
| 02E3E7E3 | 40000148 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | D9C1D5C7 | F0F0F0F6* | |
| 02C5E2C4 | 40404040 | 40400010 | 40400004 | D4E5C3C8 | D9D34040 | 02000000 |
| 40000000 | 40404040 | 40404040 | 40404040 | 40404040 | 40404040 | 40404040 |
| 40404040 | 40404040 | 40404040 | 40404040 | D9C1D5C7 | F0F0F0F7* | |
| 02E3E7E3 | 40000158 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D9C1D5C7 | F0F0F0F8* | |
| 02E3E7E3 | 40000160 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | D9C1D5C7 | F0F0F0F9* | |
| 02E3E7E3 | 400001CC | 40400038 | 40400001 | 58B0D150 | 58A0D08C | 5800D0C0 |
| 5000D0D8 | 50A0D0B0 | 50B0D188 | 5800D14C | 5000D184 | 50B0D18C | 50B0D190 |
| 5800D19C | 5000D194 | 5800D1A0 | 5000D198 | D9C1D5C7 | F0F0F1F0** | |
| 02E3E7E3 | 40000204 | 40400038 | 40400001 | 5880D0A0 | 5890D148 | 18BA58A0 |
| D13058E0 | D194585E | A0005050 | D0C458E0 | D198587E | A0005070 | D0D01C68 |
| 5070D180 | 1C481827 | 1A291835 | 1A391893 | D9C1D5C7 | F0F0F1F1* | |
| 02E3E7E3 | 4000023C | 40400038 | 40400001 | 18A818B2 | 5880D128 | 78098000 |
| 32004780 | D22A47F0 | D242879A | D21C58A0 | D13058B0 | D08C5890 | D1485880 |
| D0A047F0 | D44658A0 | D13058B0 | D08C5890 | D9C1D5C7 | F0F0F1F2* | |
| 02E3E7E3 | 40000274 | 40400038 | 40400001 | D1485880 | D0A05800 | D1805A00 |
| D1585000 | D16C1858 | 5C40D0C4 | 18255A20 | D1581A59 | 5050D170 | 5850D180 |
| 1A595830 | D0D05B30 | D0C41813 | 1C085010 | D9C1D5C7 | F0F0F1F3* | |
| 02E3E7E3 | 400002AC | 40400038 | 40400001 | D1785870 | D0C41A7B | 1C681847 |
| 5A40D158 | 18341845 | 5850D170 | 5860D16C | 18725880 | D0C418AB | 58B0D0D0 |
| 5890D128 | 41069000 | 5000D04C | 41079000 | D9C1D5C7 | F0F0F1F4* | |
| 02E3E7E3 | 400002E4 | 40400038 | 40400001 | 5000D050 | 58F0D120 | 4110D04C |
| 05EF4120 | 00015720 | D0BC1BFF | 872FD2DC | 47F0D348 | 78259000 | 7020D15C |
| 32224780 | D2F67924 | 90004770 | D2F647F0 | D9C1D5C7 | F0F0F1F5* | |
| 02E3E7E3 | 4000031C | 40400038 | 40400001 | D3484107 | 90005000 | D0609280 |
| D06058F0 | D1244110 | D05805EF | 5800D178 | 5000D0DC | 41079000 | 5000D068 |
| 41039000 | 5000D06C | 9280D06C | 58F0D138 | D9C1D5C7 | F0F0F1F6* | |
| 02E3E7E3 | 40000354 | 40400038 | 40400001 | 4110D064 | 05EF4106 | 90005000 |
| D07458F0 | D1244110 | D07005EF | 878AD2B0 | 58A0D130 | 58B0D08C | 5890D148 |
| 5880D0A0 | 5800D0D0 | 1B0B5000 | D0D45800 | D9C1D5C7 | F0F0F1F7* | |
| 02E3E7E3 | 4000038C | 40400038 | 40400001 | D0805000 | D0C85090 | D13C5800 |
| D14C5A00 | D1905000 | D1545860 | D150187B | 5880D0C4 | 58B0D0D8 | 7840D0A4 |
| 18585C40 | D0A01825 | 5A20D148 | 58F0D128 | D9C1D5C7 | F0F0F1F8* | |
| 02E3E7E3 | 400003C4 | 40400038 | 40400001 | 7862F000 | 18981A97 | 18595C40 |
| D0A01835 | 5A30D148 | 7963F000 | 4770D40A | 39644750 | D40A5800 | D0C81BFF |
| 860FD3EC | 58E0D154 | 508EA000 | 5800D088 | D9C1D5C7 | F0F0F1F9* | |
| 02E3E7E3 | 400003FC | 40400038 | 40400001 | 5000D0C8 | 1AB7185B | 1C461835 |

MEMBER NAME RANGE

| | | | | | | |
|---|---|---|---|---|---|---|
| 5A30D158 | 5093A000 | 47F0D40A | 185B1C46 | 18255A20 | D14C5082 | A0001AB7 |
| 185B1C46 | 18255A20 | D1585092 | A0001889 | D9C1D5C7 | F0F0F2F0** | |
| 02E3E7E3 | 40000434 | 40400038 | 40400001 | 5990D0D4 | 47C0D38C | 50B0D0D8 |
| 58B0D08C | 5890D148 | 5880D0A0 | 5800D0C8 | 1BFF870F | D4465820 | D0D41A2B |
| 5850D0D8 | 5C40D188 | 18355A30 | D1845023 | D9C1D5C7 | F0F0F2F1* | |
| 02E3E7E3 | 4000046C | 40400038 | 40400001 | A0005820 | D0B01A2B | 5020D0B0 |
| 5800D190 | 5A00D150 | 5000D190 | 5800D198 | 5A00D150 | 5000D198 | 5800D194 |

| | | | | | | |
|---|---|---|---|---|---|---|
| 5A00D150 | 5000D194 | 5920D0C0 | 47C0D1EA | D9C1D5C7 | F0F0F2F2* | |
| 02E3E7E3 | 400004A4 | 40400038 | 40400001 | 58B0D150 | 58A0D08C | 5800D0D8 |
| 5000D0C0 | 1BFF58E0 | D00007FE | 58A0D004 | 58E0A00C | 58B0A018 | 5810B00C |
| 5820D0C0 | 50201000 | 18DA92FF | A00C982C | D9C1D5C7 | F0F0F2F3* | |
| 02E3E7E3 | 400004DC | 40400038 | 40400001 | A01C07FE | 98791004 | 58207000 |
| 5020D0CC | 58209000 | 5020D0C0 | 58201000 | 41302000 | 41500004 | 1B255C40 |
| D09C1B25 | 5020D128 | 5030D12C | 58201008 | D9C1D5C7 | F0F0F2F4* | |
| 02E3E7E3 | 40000514 | 4040001C | 40400001 | 41302000 | 41500004 | 1B255C40 |
| D0941B25 | 5020D130 | 5030D134 | 47F0D1A4 | 40404040 | 40404040 | 40404040 |
| 40404040 | 40404040 | 40404040 | 40404040 | D9C1D5C7 | F0F0F2F5* | |
| 02E3E7E3 | 40000020 | 4040000C | 40400001 | 000004E0 | 00000028 | 000004BC |
| 40404040 | 40404040 | 40404040 | 40404040 | 40404040 | 40404040 | 40404040 |
| 40404040 | 40404040 | 40404040 | 40404040 | D9C1D5C7 | F0F0F2F6* | |
| 02E3E7E3 | 4000007C | 40400008 | 40400001 | 800000E4 | 000000C8 | 40404040 |
| 40404040 | 40404040 | 40404040 | 40404040 | 40404040 | 40404040 | 40404040 |
| 40404040 | 40404040 | 40404040 | 40404040 | D9C1D5C7 | F0F0F2F7* | |
| 02D9D3C4 | 40404040 | 40400038 | 40404040 | 00020001 | 1C000148 | 00030001 |
| 1C00014C | 00040001 | 1C000160 | 00010001 | 0C000020 | 00010001 | 0C000024 |
| 00010001 | 0C000028 | 00010001 | 0C00007C | D9C1D5C7 | F0F0F2F8* | |
| 02E3E7E3 | 40000084 | 4040000C | 40400001 | 0000010C | 80000000 | 00000104 |
| 40404040 | 40404040 | 40404040 | 40404040 | 40404040 | 40404040 | 40404040 |
| 40404040 | 40404040 | 40404040 | 40404040 | D9C1D5C7 | F0F0F2F9* | |
| 02E3E7E3 | 40000094 | 40400008 | 40400001 | 80000000 | 000000C8 | 40404040 |
| 40404040 | 40404040 | 40404040 | 40404040 | 40404040 | 40404040 | 40404040 |
| 40404040 | 40404040 | 40404040 | 40404040 | D9C1D5C7 | F0F0F3F0** | |
| 02E3E7E3 | 400000A0 | 40400004 | 40400001 | 8000010C | 40404040 | 40404040 |
| 40404040 | 40404040 | 40404040 | 40404040 | 40404040 | 40404040 | 40404040 |
| 40404040 | 40404040 | 40404040 | 40404040 | D9C1D5C7 | F0F0F3F1* | |
| 02E3E7E3 | 40000164 | 40400038 | 40400001 | 00000000 | 00000000 | 00000000 |
| 00000034 | 00000008 | 00000014 | 00000000 | 00000004 | 00000000 | 00000000 |
| 00000000 | 00000000 | 00B80007 | 00000000 | D9C1D5C7 | F0F0F3F2* | |
| 02E3E7E3 | 4000019C | 40400030 | 40400001 | 007C0007 | 02180007 | 00000000 |
| 00A00008 | 00880008 | 008C0008 | 00000000 | 00A40009 | 01C00009 | 01C40009 |
| 00000018 | 0000001C | 40404040 | 40404040 | D9C1D5C7 | F0F0F3F3* | |
| 02D9D3C4 | 40404040 | 40400028 | 40404040 | 00010001 | 0C000080 | 00010001 |
| 0C000084 | 00010001 | 0C00008C | 00010001 | 0C000098 | 00010001 | 0C0000A0 |
| 40404040 | 40404040 | 40404040 | 40404040 | D9C1D5C7 | F0F0F3F4* | |
| 02C5D5C4 | 40404040 | 40404040 | 40404040 | 40404040 | 40404040 | 40404040 |
| 00000530 | F1F5F7F3 | F460C6D6 | F34040F0 | F2F0F2F8 | F7F0F9F8 | 40F0F84B |
| F4F34BF1 | F6404040 | D9C1D5C7 | C5404040 | D9C1D5C7 | F0F0F3F5** | |

MEMBER NAME RELSPL

| | | | | | | |
|---|---|---|---|---|---|---|
| 02C5E2C4 | 40404040 | 40400010 | 40400001 | D9C5D3E2 | D7D34040 | 00000000 |
| 40000000 | 40404040 | 40404040 | 40404040 | 40404040 | 40404040 | 40404040 |
| 40404040 | 40404040 | 40404040 | 40404040 | D9C5D3E2 | F0F0F0F1* | |
| 02E3E7E3 | 40000000 | 40400028 | 40400001 | 47F0F00C | 07D9C5D3 | E2D7D340 |
| 90ECD00C | 184D98CD | F0205040 | D00450D0 | 400807FC | 40404040 | 40404040 |
| 40404040 | 40404040 | 40404040 | 40404040 | D9C5D3E2 | F0F0F0F2* | |
| 02C5E2C4 | 40404040 | 40400010 | 40400002 | 40404040 | 40404040 | 05000000 |
| 40000640 | 40404040 | 40404040 | 40404040 | 40404040 | 40404040 | 40404040 |
| 40404040 | 40404040 | 40404040 | 40404040 | D9C5D3E2 | F0F0F0F3* | |
| 02E3E7E3 | 40000078 | 40400028 | 40400001 | 4E000000 | 00000000 | 4E000000 |
| 80000000 | 00000001 | 00000002 | 00000003 | 00000004 | 00000000 | 00000000 |
| 40404040 | 40404040 | 40404040 | 40404040 | D9C5D3E2 | F0F0F0F4* | |
| 02E3E7E3 | 400000B8 | 40400038 | 40400001 | FFFFFFFC | 58B0D090 | 5800D07C |
| 5700D05C | 5000D054 | 6820D050 | 6B20D058 | 5820D080 | 89200002 | 7022B640 |
| 5820D080 | 89200002 | 7800D088 | 7002B644 | D9C5D3E2 | F0F0F0F5* | |
| 02E3E7E3 | 400000F0 | 40400038 | 40400001 | 5800D078 | 5700D05C | 5000D054 |
| 6820D050 | 6B20D058 | 5820D080 | 89200002 | 7022B648 | 5820D080 | 89200002 |

```
7800D084  7002B64C  1BFF58E0  D00007FE  D9C5D3E2  F0F0F0F6*
02E3E7E3  40000128  40400038  40400001  58D0D004  58E0D00C  92FFD00C
982CD01C  07FE987B  10005820  70005020  D0805820  80005020  D07C5820
90005020  D0787820  A0007020  D0887820  D9C5D3E2  F0F0F0F7*
02E3E7E3  40000160  4040000A  40400001  B0007020  D08447F0  D0944040
40404040  40404040  40404040  40404040  40404040  40404040  40404040
40404040  40404040  40404040  40404040  D9C5D3E2  F0F0F0F8*
02E3E7E3  40000020  4040000C  40400001  0000013A  00000028  00000128
40404040  40404040  40404040  40404040  40404040  40404040  40404040
40404040  40404040  40404040  40404040  D9C5D3E2  F0F0F0F9*
02D9D3C4  40404040  40400020  40404040  00020001  0C0000B8  00010001
0C000020  00010001  0C000024  00010001  0C000028  40404040  40404040
40404040  40404040  40404040  40404040  D9C5D3E2  F0F0F1F0**
02C5D5C4  40404040  40404040  40404040  40404040  40404040  40404040
0000016A  F1F5F7F3  F460C6D6  F34040F0  F2F0F2F8  F7F0F9F8  40F0F84B
F4F34BF2  F1404040  D9C5D3E2  D7D34040  D9C5D3E2  F0F0F1F1**

MEMBER NAME  RETFMT
02C5E2C4  40404040  40400010  40400001  D9C5E3C6  D4E34040  00000000
40000000  40404040  40404040  40404040  40404040  40404040  40404040
40404040  40404040  40404040  40404040  D9C5E3C6  F0F0F0F1*
02E3E7E3  40000000  40400038  40400001  47F0F00C  07D9C5E3  C6D4E340
90ECD00C  184D98CD  F0205040  D00450D0  400807FC  40404040  40404040
021A20C6  D6D9D4C1  E340D4D6  C4C5D340  D9C5E3C6  F0F0F0F2*
02E3E7E3  40000038  40400038  40400001  D5D6E340  C6D6E4D5  C440C6D6
D940C4C1  E2C84010  03183222  02063214  0122021A  2C404040  E6C1D9D5
C9D5C77A  40C6D6D9  D4C1E340  D4D6C4C5  D9C5E3C6  F0F0F0F3*
02E3E7E3  40000070  40400018  40400001  D340D5D6  E340C6D6  E4D5C440
C6D6D940  C4C1E2C8  40100322  40404040  40404040  40404040  40404040
40404040  40404040  40404040  40404040  D9C5E3C6  F0F0F0F4*
02C5E2C4  40404040  40400010  40400002  D9D4D6C4  C5D34040  05000000
40000018  40404040  40404040  40404040  40404040  40404040  40404040
40404040  40404040  40404040  40404040  D9C5E3C6  F0F0F0F5*
02E3E7E3  400001A0  40400030  40400001  00000001  00000001  00000002
00000004  00000005  00000006  00000008  00000028  00000032  0000003C
00000000  00000000  40404040  40404040  D9C5E3C6  F0F0F0F6*
02C5E2C4  40404040  40400010  40400003  C7D9E4D7  40404040  05000000
4000000C  40404040  40404040  40404040  40404040  40404040  40404040
40404040  40404040  40404040  40404040  D9C5E3C6  F0F0F0F7*
02C5E2C4  40404040  40400010  40400004  E5F9F940  40404040  05000000
4000003C  40404040  40404040  40404040  40404040  40404040  40404040
40404040  40404040  40404040  40404040  D9C5E3C6  F0F0F0F8*
02C5E2C4  40404040  40400010  40400005  C6D4E3C5  D9D94040  05000000
40002D58  40404040  40404040  40404040  40404040  40404040  40404040
40404040  40404040  40404040  40404040  D9C5E3C6  F0F0F0F9*
02C5E2C4  40404040  40400010  40400006  D5C1D4C5  40404040  02000000
40000000  40404040  40404040  40404040  40404040  40404040  40404040
40404040  40404040  40404040  40404040  D9C5E3C6  F0F0F1F0**
02C5E2C4  40404040  40400010  40400007  C3C1C4C5  E3404040  02000000
40000000  40404040  40404040  40404040  40404040  40404040  40404040
40404040  40404040  40404040  40404040  D9C5E3C6  F0F0F1F1*
02C5E2C4  40404040  40400010  40400008  C3C1C4D7  E3404040  02000000
40000000  40404040  40404040  40404040  40404040  40404040  40404040
40404040  40404040  40404040  40404040  D9C5E3C6  F0F0F1F2*
02E3E7E3  40000238  40400020  40400001  FFFFFFFF  00000000  FFFFFFFC
FFFFFFC3  00002551  00000000  00000000  00000000  40404040  40404040
40404040  40404040  40404040  40404040  D9C5E3C6  F0F0F1F3*
02D9D3C4  40404040  40400038  40404040  00020001  0C000238  00030001
0C00023C  00040001  0C000240  00050001  0C000244  00050001  0C000248
```

| | | | | | | |
|---|---|---|---|---|---|---|
| 00060001 | 1C00024C | 00070001 | 1C000250 | D9C5E3C6 | F0F0F1F4* | |
| 02C5E2C4 | 40404040 | 40400010 | 40400009 | C3C1C4E2 | E3404040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F1F5* | |
| 02C5E2C4 | 40404040 | 40400010 | 4040000A | C5D9C1E2 | C5404040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F1F6* | |
| 02C5E2C4 | 40404040 | 40400010 | 4040000B | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F1F7* | |
| 02C5E2C4 | 40404040 | 40400010 | 4040000C | D5E2C3C8 | E3404040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F1F8* | |
| 02C5E2C4 | 40404040 | 40400010 | 4040000D | C3C1C4C6 | C9D34040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F1F9* | |
| 02C5E2C4 | 40404040 | 40400010 | 4040000E | C3C1C4D5 | D4C54040 | 02000000 |

MEMBER NAME RETFMT

| | | | | | | |
|---|---|---|---|---|---|---|
| 40000000 | 40404040 | 40404040 | 40404040 | 40404040 | 40404040 | 40404040 |
| 40404040 | 40404040 | 40404040 | 40404040 | D9C5E3C6 | F0F0F2F0** | |
| 02C5E2C4 | 40404040 | 40400010 | 4040000F | C6D4E3C9 | D5E34040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F2F1* | |
| 02E3E7E3 | 40000258 | 4040001C | 40400001 | 00000000 | 00000000 | 00000000 |
| 00000000 | 00000000 | 00000000 | 00000000 | 40404040 | 40404040 | 40404040 |
| 40404040 | 40404040 | 40404040 | 40404040 | D9C5E3C6 | F0F0F2F2* | |
| 02D9D3C4 | 40404040 | 40400038 | 40404040 | 00080001 | 1C000254 | 00090001 |
| 1C000258 | 000A0001 | 1C00025C | 000B0001 | 1C000260 | 000C0001 | 1C000264 |
| 000D0001 | 1C000268 | 000E0001 | 1C00026C | D9C5E3C6 | F0F0F2F3* | |
| 02C5E2C4 | 40404040 | 40400010 | 40400010 | C6D4E3E5 | C5D94040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F2F4* | |
| 02C5E2C4 | 40404040 | 40400010 | 40400011 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F2F5* | |
| 02C5E2C4 | 40404040 | 40400010 | 40400012 | D4D6C4E2 | D9E34040 | 02000000 |
| 40000000 | 40404040 | 40404040 | 40404040 | 40404040 | 40404040 | 40404040 |
| 40404040 | 40404040 | 40404040 | 40404040 | D9C5E3C6 | F0F0F2F6* | |
| 02E3E7E3 | 40000274 | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | D9C5E3C6 | F0F0F2F7* | |
| 02E3E7E3 | 40000228 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | D9C5E3C6 | F0F0F2F8* | |
| 02E3E7E3 | 40000280 | 40400038 | 40400001 | 5870D1C0 | 5890D1B4 | 58A0D1B8 |
| 5860D134 | 5830D138 | 5800D158 | 10005000 | D17058F0 | D1F44110 | D06405EF |
| 58F0D1D8 | 4110D084 | 05EF58F0 | D1D84110 | D9C5E3C6 | F0F0F2F9* | |
| 02E3E7E3 | 400002B8 | 40400038 | 40400001 | D09005EF | 58F0D1D0 | 4110D09C |
| 05EF58B0 | D12458F0 | D1E04110 | D0A805EF | 59B0D184 | 4780D242 | 5800D184 |
| 5900D11C | 4770D32E | 5800D160 | 5900D11C | D9C5E3C6 | F0F0F3F0** | |
| 02E3E7E3 | 400002F0 | 40400038 | 40400001 | 4770D2EC | 5880702F | 58F0D1E8 |
| 4110D0B4 | 05EF58F0 | D1CC4110 | D0C405EF | 41E00004 | 15FE4720 | D29458EF |
| D04C07FE | 58F0D1C4 | 4110D0CC | 05EF41E0 | D9C5E3C6 | F0F0F3F1* | |
| 02E3E7E3 | 40000328 | 40400038 | 40400001 | 000415FE | 4720D2AE | 58EFD054 |
| 07FE58F0 | D1C81B11 | 05EF58F0 | D1D44110 | D0D005EF | 41E00004 | 15FE4720 |
| D2D058EF | D05C07FE | 5800D158 | 10005000 | D9C5E3C6 | F0F0F3F2* | |
| 02E3E7E3 | 40000360 | 40400038 | 40400001 | D14C58F0 | D1EC4110 | D0DC05EF |
| 5980702F | 4750D3BC | 4800A03C | 5000D180 | 58F0D1F4 | 4110D0F0 | 05EF58F0 |

```
D1D84110  D08405EF  58F0D1D8  4110D090  D9C5E3C6  F0F0F3F3*
02E3E7E3  40000398  40400038  40400001  05EF58F0  D1E44110  D09C05EF
58F0D1DC  4110D110  05EF1BFF  58E0D000  07FE5820  78035A20  D11C5020
78031926  47C0D348  1BFF58E0  D00007FE  D9C5E3C6  F0F0F3F4*
02E3E7E3  400003D0  40400038  40400001  5800D158  10005000  D14C58F0
D1F01800  45E0F004  00000000  00000028  45E0F008  0450D14C  45E0F010
58F0D1F0  45E0F000  00000000  00000050  D9C5E3C6  F0F0F3F5*
02E3E7E3  40000408  40400038  40400001  18535C40  780345E0  F1340001
00000125  70010100  00320000  000145E0  F01058F0  D1F01800  45E0F004
00000006  00000056  45E0F008  0450D14C  D9C5E3C6  F0F0F3F6*
02E3E7E3  40000440  40400038  40400001  45E0F010  5800D118  5000D168
41F00004  58E0D000  07FE58A0  D00458E0  A00C58B0  A0185810  B0005820
D1585020  10005830  B0045840  D1645040  D9C5E3C6  F0F0F3F7*
02E3E7E3  40000478  40400038  40400001  30005850  B00C5860  D1685060
500018DA  92FFA00C  982CA01C  07FE987A  10005820  70005020  D1585820
80005020  D1645820  90005020  D1605820  D9C5E3C6  F0F0F3F8*
02E3E7E3  400004B0  4040000A  40400001  A0005020  D16847F0  D1F84040
40404040  40404040  40404040  40404040  40404040  40404040  40404040

MEMBER NAME  RETFMT
40404040  40404040  40404040  40404040  D9C5E3C6  F0F0F3F9*
02E3E7E3  40000020  40400004  40400001  00000492  40404040  40404040
40404040  40404040  40404040  40404040  40404040  40404040  40404040
40404040  40404040  40404040  40404040  D9C5E3C6  F0F0F4F0**
02D9D3C4  40404040  40400038  40404040  000F0001  1C000270  00100001
1C000274  00110001  1C000278  00120001  1C00027C  00010001  0C0003E8
00010001  0C000404  00010001  0C000434  D9C5E3C6  F0F0F4F1*
02E3E7E3  40000024  40400004  40400001  00000088  40404040  40404040
40404040  40404040  40404040  40404040  40404040  40404040  40404040
40404040  40404040  40404040  40404040  D9C5E3C6  F0F0F4F2*
02E3E7E3  40000088  40400004  40400001  00000456  40404040  40404040
40404040  40404040  40404040  40404040  40404040  40404040  40404040
40404040  40404040  40404040  40404040  D9C5E3C6  F0F0F4F3*
02E3E7E3  400000D4  40400014  40400001  0000031C  00000336  00000336
00000336  00000358  40404040  40404040  40404040  40404040  40404040
40404040  40404040  40404040  40404040  D9C5E3C6  F0F0F4F4*
02D9D3C4  40404040  40400038  40404040  00010001  0C000020  00010001
0C000024  00010001  0C000088  00010001  0C0000D4  00010001  0C0000D8
00010001  0C0000DC  00010001  0C0000E0  D9C5E3C6  F0F0F4F5*
02E3E7E3  400000E8  4040001C  40400001  00000358  000001B4  000001E4
000001F8  000001EC  00000200  00000208  40404040  40404040  40404040
40404040  40404040  40404040  40404040  D9C5E3C6  F0F0F4F6*
02D9D3C4  40404040  40400038  40404040  00010001  0C0000E4  00010001
0C0000E8  00010001  0C0000EC  00010001  0C0000F0  00010001  0C0000F4
00010001  0C0000F8  00010001  0C0000FC  D9C5E3C6  F0F0F4F7*
02E3E7E3  40000104  4040001C  40400001  000001D8  80000214  000001AC
000001F4  80000000  000001B8  00000230  40404040  40404040  40404040
40404040  40404040  40404040  40404040  D9C5E3C6  F0F0F4F8*
02D9D3C4  40404040  40400038  40404040  00010001  0C000100  00010001
0C000104  00010001  0C000108  00010001  0C00010C  00010001  0C000110
00030001  0C000114  00010001  0C000118  D9C5E3C6  F0F0F4F9*
02E3E7E3  40000120  4040001C  40400001  80000004  00000214  00000230
800001F4  000001A4  0000020C  80000204  40404040  40404040  40404040
40404040  40404040  40404040  40404040  D9C5E3C6  F0F0F5F0**
02D9D3C4  40404040  40400038  40404040  00010001  0C00011C  00030001
0C000120  00010001  0C000124  00010001  0C000128  00010001  0C00012C
00010001  0C000130  00010001  0C000134  D9C5E3C6  F0F0F5F1*
02E3E7E3  4000013C  4040001C  40400001  00000008  00000034  00000038
8000003A  000001A8  80000228  800001DC  40404040  40404040  40404040
```

```
40404040  40404040  40404040  40404040  D9C5E3C6  F0F0F5F2*
02D9D3C4  40404040  40400038  40404040  00010001  0C000138  00040001
0C00013C  00040001  0C000140  00040001  0C000144  00040001  0C000148
00010001  0C00014C  00010001  0C000150  D9C5E3C6  F0F0F5F3*
02E3E7E3  40000158  4040001C  40400001  000001DC  000001DC  800001A4
00000008  00000034  00000038  0000003A  40404040  40404040  40404040
40404040  40404040  40404040  40404040  D9C5E3C6  F0F0F5F4*
02D9D3C4  40404040  40400038  40404040  00010001  0C000154  00010001
0C000158  00010001  0C00015C  00010001  0C000160  00040001  0C000164
00040001  0C000168  00040001  0C00016C  D9C5E3C6  F0F0F5F5*
02E3E7E3  40000174  4040001C  40400001  800001D4  000001B0  000001E4
000001D4  000001EC  00000034  00000208  40404040  40404040  40404040
40404040  40404040  40404040  40404040  D9C5E3C6  F0F0F5F6*
02D9D3C4  40404040  40400038  40404040  00040001  0C000170  00010001
0C000174  00010001  0C000178  00010001  0C00017C  00010001  0C000180
00010001  0C000184  00040001  0C000188  D9C5E3C6  F0F0F5F7*
02E3E7E3  40000190  4040000C  40400001  0000003A  80000214  800001D4
40404040  40404040  40404040  40404040  40404040  40404040  40404040
40404040  40404040  40404040  40404040  D9C5E3C6  F0F0F5F8*

MEMBER NAME  RETFMT
02D9D3C4  40404040  40400020  40404040  00010001  0C00018C  00040001
0C000190  00010001  0C000194  00010001  0C000198  40404040  40404040
40404040  40404040  40404040  40404040  D9C5E3C6  F0F0F5F9*
02C5D5C4  40404040  40404040  40404040  40404040  40404040  40404040
000004BA  F1F5F7F3  F460C6D6  F34040F0  F2F0F2F8  F7F0F9F8  40F0F84B
F4F34BF2  F5404040  D9C5E3C6  D4E34040  D9C5E3C6  F0F0F6F0**

MEMBER NAME  ROOTER
02C5E2C4  40404040  40400010  40400001  D9D6D6E3  C5D94040  00000000
40000000  40404040  40404040  40404040  40404040  40404040  40404040
40404040  40404040  40404040  40404040  D9D6D6E3  F0F0F0F1*
02E3E7E3  40000000  40400028  40400001  47F0F00C  07D9D6D6  E3C5D940
90ECD00C  184D98CD  F0205040  D00450D0  400807FC  40404040  40404040
40404040  40404040  40404040  40404040  D9D6D6E3  F0F0F0F2*
02E3E7E3  40000078  40400020  40400001  00000000  00000000  00000000
00000000  00000001  00000002  00000000  00000000  40404040  40404040
40404040  40404040  40404040  40404040  D9D6D6E3  F0F0F0F3*
02E3E7E3  400000C0  40400004  40400001  00000000  40404040  40404040
40404040  40404040  40404040  40404040  40404040  40404040  40404040
40404040  40404040  40404040  40404040  D9D6D6E3  F0F0F0F4*
02E3E7E3  400000D0  40400038  40400001  58A0D098  6840D050  58B0D060
5870D058  5860D064  5850D068  5070D070  18971887  5070D07C  59B0D080
4750D106  6820A008  6920D088  41300001  D9D6D6E3  F0F0F0F5*
02E3E7E3  40000108  40400038  40400001  47A0D0E6  1B336920  D0904120
000147C0  D0F41B22  14238725  D0FE50B0  D07C1BFF  58E0D000  07FE6820
A0106920  D0884120  000147A0  D1181B22  D9D6D6E3  F0F0F0F6*
02E3E7E3  40000140  40400038  40400001  6920D090  41300001  47C0D126
1B331432  29244120  00014720  D1341B22  14238725  D13C188B  6860A008
6960D088  41200001  47A0D14E  1B226960  D9D6D6E3  F0F0F0F7*
02E3E7E3  40000178  40400038  40400001  D0904130  000147C0  D15C1B33
14322964  41200001  4720D16A  1B221423  8725D172  189B199B  41300001
4780D17E  1B33198B  41200001  4780D18A  D9D6D6E3  F0F0F0F8*
02E3E7E3  400001B0  40400038  40400001  1B221423  8625D1B6  199B4780
D1A65060  D07C50B0  D0701BFF  58E0D000  07FE50B0  D07C50B0  D0701BFF
58E0D000  07FE5060  D07C6960  A0104730  D9D6D6E3  F0F0F0F9*
02E3E7E3  400001E8  40400038  40400001  D1C650B0  D07C5060  D0701BFF
58E0D000  07FE58A0  D00458E0  A00C58B0  A0185810  B0105820  D07C5020
10005830  B0145840  D0705040  300018DA  D9D6D6E3  F0F0F1F0**
```

02E3E7E3 40000220 40400038 40400001 92FFA00C 982CA01C 07FE987B
10046820 70006020 D0886820 80006020 D0905820 90005020 D0805820
A0005020 D07C5820 B0005020 D0705820 D9D6D6E3 F0F0F1F1*
02E3E7E3 40000258 40400018 40400001 10004130 20004150 00081B25
5020D098 5030D09C 47F0D0A8 40404040 40404040 40404040 40404040
40404040 40404040 40404040 40404040 D9D6D6E3 F0F0F1F2*
02E3E7E3 40000020 4040000C 40400001 0000022A 00000028 000001FA
40404040 40404040 40404040 40404040 40404040 40404040 40404040
40404040 40404040 40404040 40404040 D9D6D6E3 F0F0F1F3*
02E3E7E3 400000C8 40400008 40400001 00000000 00000000 40404040
40404040 40404040 40404040 40404040 40404040 40404040 40404040
40404040 40404040 40404040 40404040 D9D6D6E3 F0F0F1F4*
02D9D3C4 40404040 40400018 40404040 00010001 0C000020 00010001
0C000024 00010001 0C000028 40404040 40404040 40404040 40404040
40404040 40404040 40404040 40404040 D9D6D6E3 F0F0F1F5*
02C5D5C4 40404040 40404040 40404040 40404040 40404040 40404040
00000270 F1F5F7F3 F460C6D6 F34040F0 F2F0F2F8 F7F0F9F8 40F0F84B
F4F34BF2 F9404040 D9D6D6E3 C5D94040 D9D6D6E3 F0F0F1F6**

MEMBER NAME RSAME
02C5E2C4 40404040 40400010 40400001 D9E2C1D4 C5404040 00000000
40000000 40404040 40404040 40404040 40404040 40404040 40404040
40404040 40404040 40404040 40404040 D9E2C1D4 F0F0F0F1*
02E3E7E3 40000000 40400028 40400001 47F0F00C 07D9E2C1 D4C54040
90ECD00C 184D98CD F0205040 D00450D0 400807FC 40404040 40404040
40404040 40404040 40404040 40404040 D9E2C1D4 F0F0F0F2*
02C5E2C4 40404040 40400010 40400002 E3D6D3C5 D9404040 05000000
4000000C 40404040 40404040 40404040 40404040 40404040 40404040
40404040 40404040 40404040 40404040 D9E2C1D4 F0F0F0F3*
02E3E7E3 40000078 40400024 40400001 00000000 00000001 00000001
0000000B 0000000C 0000000D 0000000E 00000000 00000000 40404040
40404040 40404040 40404040 40404040 D9E2C1D4 F0F0F0F4*
02E3E7E3 400000D8 40400008 40400001 00000000 00000000 40404040
40404040 40404040 40404040 40404040 40404040 40404040 40404040
40404040 40404040 40404040 40404040 D9E2C1D4 F0F0F0F5*
02E3E7E3 4000011C 40400038 40400001 58B0D0B4 58A0D0C4 5800D050
5000D078 5800D098 5900D09C 4780D118 1BFF58E0 D00007FE 5850D090
5830D094 1C4A1C2A 18051A0A 5000D0D4 D9E2C1D4 F0F0F0F6*
02E3E7E3 40000154 40400038 40400001 18055A00 D0C85000 D0D81805
5A00D0CC 5000D0DC 18655A60 D0D01853 1A5A1843 5A40D0C8 18035A00
D0CC5000 D0EC5A30 D0D05030 D0F01834 D9E2C1D4 F0F0F0F7*
02E3E7E3 4000018C 40400038 40400001 18451856 5860D0DC 5870D0D8
5880D0D4 5890D058 7828B000 7924B000 4780D18C 1BFF58E0 D00007FE
7827B000 7923B000 4780D1A0 1BFF58E0 D9E2C1D4 F0F0F0F8*
02E3E7E3 400001C4 40400038 40400001 D00007FE 7846B000 58E0D0EC
7B4EB000 30647825 B00058E0 D0F07B2E B0003022 7020D08C 58F0D0B0
7960F004 47C0D1D0 47F0D1DC 58F0D0B0 D9E2C1D4 F0F0F0F9*
02E3E7E3 400001FC 40400038 40400001 7920F004 47C0D1E4 1BFF58E0
D00007FE 1A5A1A6A 1A7A1A8A 5800D0F0 1A0A5000 D0F05800 D0EC1A0A
5000D0EC 1A3A1A4A 5A90D058 5990D098 D9E2C1D4 F0F0F1F0**
02E3E7E3 40000234 40400038 40400001 47C0D178 5800D054 5000D078
1BFF58E0 D00007FE 58A0D004 58E0A00C 58B0A018 5810B018 5820D078
50201000 18DA92FF A00C982C A01C07FE D9E2C1D4 F0F0F1F1*
02E3E7E3 4000026C 40400038 40400001 987B1004 58207000 5020D084
58208000 5020D090 58209000 5020D098 5820A000 5020D094 5820B000
5020D09C 58701018 58207000 5020D078 D9E2C1D4 F0F0F1F2*
02E3E7E3 400002A4 40400020 40400001 58201000 41302000 41500004
1B255C40 D0681B25 5020D0B4 5030D0B8 47F0D0F4 40404040 40404040
40404040 40404040 40404040 40404040 D9E2C1D4 F0F0F1F3*

```
02E3E7E3  40000020  4040000C  40400001  0000026C  00000028  00000248
40404040  40404040  40404040  40404040  40404040  40404040  40404040
40404040  40404040  40404040  40404040  D9E2C1D4  F0F0F1F4*
02E3E7E3  400000E4  40400038  40400001  00000000  00000000  00000038
00000034  0000002C  00000030  00000000  00000000  00000000  00000000
00000000  00000000  00000000  00000000  D9E2C1D4  F0F0F1F5*
02D9D3C4  40404040  40400020  40404040  00020001  0C0000D8  00010001
0C000020  00010001  0C000024  00010001  0C000028  40404040  40404040
40404040  40404040  40404040  40404040  D9E2C1D4  F0F0F1F6*
02C5D5C4  40404040  40404040  40404040  40404040  40404040  40404040
000002C4  F1F5F7F3  F460C6D6  F34040F0  F2F0F2F8  F7F0F9F8  40F0F84B
F4F34BF3  F3404040  D9E2C1D4  C5404040  D9E2C1D4  F0F0F1F7**

MEMBER NAME  SEQMRG
02C5E2C4  40404040  40400010  40400001  E2C5D8D4  D9C74040  00000000
40000000  40404040  40404040  40404040  40404040  40404040  40404040
40404040  40404040  40404040  40404040  E2C5D8D4  F0F0F0F1*
02E3E7E3  40000000  40400038  40400001  47F0F00C  07E2C5D8  D4D9C740
90ECD00C  184D98CD  F0205040  D00450D0  400807FC  40404040  40404040
020A0803  18010A08  0318011A  05C4C1E2  E2C5D8D4  F0F0F0F2*
02E3E7E3  40000038  40400038  40400001  C8401003  1A0A40E2  C5D8E4C5
D5C3C540  10041A17  40C4D6C5  E240D5D6  E340D4C1  E3C3C840  C140D3C1
E8E4D718  3222020A  08031801  0A080318  E2C5D8D4  F0F0F0F3*
02E3E7E3  40000070  40400038  40400001  011A05C4  C1E2C840  10031A07
40D3C1E8  E4D74010  041A1A40  C4D6C5E2  40D5D6E3  40D4C1E3  C3C840C1
40E2C5D8  E4C5D5C3  C5183222  02064814  E2C5D8D4  F0F0F0F4*
02E3E7E3  400000A8  40400002  40400001  01224040  40404040  40404040
40404040  40404040  40404040  40404040  40404040  40404040  40404040
40404040  40404040  40404040  40404040  E2C5D8D4  F0F0F0F5*
02E3E7E3  40000118  40400038  40400001  00000000  00000000  4F080000
00000000  00000000  00000001  00000002  00000003  00000004  00000005
00000006  00000008  00000009  00000016  E2C5D8D4  F0F0F0F6*
02E3E7E3  40000150  40400010  40400001  00000048  40266666  00000000
00000000  40404040  40404040  40404040  40404040  40404040  40404040
40404040  40404040  40404040  40404040  E2C5D8D4  F0F0F0F7*
02C5E2C4  40404040  40400010  40400002  D4E5C3C8  D9404040  02000000
40000000  40404040  40404040  40404040  40404040  40404040  40404040
40404040  40404040  40404040  40404040  E2C5D8D4  F0F0F0F8*
02E3E7E3  400001A0  40400004  40400001  00000000  40404040  40404040
40404040  40404040  40404040  40404040  40404040  40404040  40404040
40404040  40404040  40404040  40404040  E2C5D8D4  F0F0F0F9*
02E3E7E3  400001A8  40400008  40400001  00000000  00000000  40404040
40404040  40404040  40404040  40404040  40404040  40404040  40404040
40404040  40404040  40404040  40404040  E2C5D8D4  F0F0F1F0**
02C5E2C4  40404040  40400010  40400003  C9C2C3D6  D47B4040  02000000
40000000  40404040  40404040  40404040  40404040  40404040  40404040
40404040  40404040  40404040  40404040  E2C5D8D4  F0F0F1F1*
02E3E7E3  400001B4  40400004  40400001  00000000  40404040  40404040
40404040  40404040  40404040  40404040  40404040  40404040  40404040
40404040  40404040  40404040  40404040  E2C5D8D4  F0F0F1F2*
02E3E7E3  400001BC  40400004  40400001  00000000  40404040  40404040
40404040  40404040  40404040  40404040  40404040  40404040  40404040
40404040  40404040  40404040  40404040  E2C5D8D4  F0F0F1F3*
02E3E7E3  4000017C  40400004  40400001  000000C8  40404040  40404040
40404040  40404040  40404040  40404040  40404040  40404040  40404040
40404040  40404040  40404040  40404040  E2C5D8D4  F0F0F1F4*
02E3E7E3  4000027C  40400038  40400001  58A0D104  58B0D0F0  5890D07C
5880D0CC  7800D0A4  7000D0B8  5090D0D4  5800D134  5000D184  5800D138
5000D190  5000D180  5800D1AC  5000D188  E2C5D8D4  F0F0F1F5*
```

02E3E7E3 400002B4 40400038 40400001 58E0D1AC 410EA000 5000D054
9280D054 58F0D0F8 4110D04C 05EF5800 D13C5000 D1605800 D1B05000
D18C58E0 D1B0784E A0007040 D1645820 E2C5D8D4 F0F0F1F6*
02E3E7E3 400002EC 40400038 40400001 D1485020 D1685830 D1445030
D16C5030 D1785800 D1B45000 D17C58E0 D1B4782E B0007020 D1743322
3A247020 D1703062 7960D0A4 47C0D464 E2C5D8D4 F0F0F1F7*
02E3E7E3 40000324 40400038 40400001 5990D0DC 4780D2AA 89300001
1A237B42 B0007940 D0784130 00014720 D2941B33 7920D0B8 41200001
47C0D2A2 1B221423 1BFF862F D4647800 E2C5D8D4 F0F0F1F8*
02E3E7E3 4000035C 40400038 40400001 D1647900 D1744730 D3905980
D0D847C0 D9805800 D0D81A09 5000D0D8 5840D1B8 5A40D178 2B007804
B0006A00 D0706000 D0685830 D06C1033 E2C5D8D4 F0F0F1F9*
02E3E7E3 40000394 40400038 40400001 5030D0C0 5830D094 5A30D178

MEMBER NAME SEQMRG
2B007803 B0006A00 D0706000 D0685800 D06C5000 D0BC58F0 D10C1800
45E0F004 00000000 00000028 5830D140 E2C5D8D4 F0F0F2F0**
02E3E7E3 400003CC 40400038 40400001 5A30D178 45E0F008 0473B000
5810D17C 45E0F008 0471B000 45E0F008 0450D0C0 45E0F008 0450D0BC
45E0F010 58F0D10C 45E0F000 00000000 E2C5D8D4 F0F0F2F1*
02E3E7E3 40000404 40400038 40400001 000000A4 18A958B0 D0A05880
D0FC185B 5C40D0D8 18391A35 45E0F008 01238000 879AD362 58A0D104
58B0D0F0 5890D07C 5880D0CC 45E0F010 E2C5D8D4 F0F0F2F2*
02E3E7E3 4000043C 40400038 40400001 47F0D980 5980D0D8 47C0D980
5800D0D8 1A095000 D0D85840 D0945A40 D1802B00 7804A000 6A00D070
6000D068 5830D06C 10335030 D0C05830 E2C5D8D4 F0F0F2F3*
02E3E7E3 40000474 40400038 40400001 D1685A30 D1802B00 7803A000
6A00D070 6000D068 5800D06C 5000D0C8 58F0D10C 45E0F004 00000000
00000066 5810D188 45E0F008 0471A000 E2C5D8D4 F0F0F2F4*
02E3E7E3 400004AC 40400038 40400001 5810D18C 45E0F008 0471A000
45E0F008 0450D0C0 45E0F008 0450D0C8 45E0F010 58F0D10C 45E0F000
00000000 000000A4 18A958B0 D0A05880 E2C5D8D4 F0F0F2F5*
02E3E7E3 400004E4 40400038 40400001 D0FC185B 5C40D0D8 18391A35
45E0F008 01238000 879AD436 58A0D104 58B0D0F0 5890D07C 5880D0CC
45E0F010 47F0D980 5800D140 5000D19C E2C5D8D4 F0F0F2F6*
02E3E7E3 4000051C 40400038 40400001 18305A30 D1805800 D0945000
D1941820 5A20D178 4103A000 5000D05C 4102B000 5000D060 9280D060
58F0D0F8 4110D058 05EF5990 D0DC4780 E2C5D8D4 F0F0F2F7*
02E3E7E3 40000554 40400038 40400001 D9805820 D0805020 D0B05800
D1345000 D1145800 D13C5000 D1205800 D1485000 D1285800 D1445000
D1305800 D1C45000 D14C5800 D1C85000 E2C5D8D4 F0F0F2F8*
02E3E7E3 4000058C 40400038 40400001 D1505800 D1C45000 D1545800
D1C85000 D1585000 D15C1832 5860D1C0 5880D0D4 5890D138 18BA58A0
D0F07820 D0E87926 B0004770 D5227820 E2C5D8D4 F0F0F2F9*
02E3E7E3 400005C4 40400038 40400001 D0EC58E0 D14C792E B0004780
D5A84106 B0005000 D0549280 D05458F0 D0F84110 D04C05EF 18785A70
D07C5970 D0C447C0 D5781858 5C40D144 E2C5D8D4 F0F0F3F0**
02E3E7E3 400005FC 40400038 40400001 18255A20 D09458E0 D150410E
B0005000 D05C4102 A0005000 D0609280 D06058F0 D0F84110 D05805EF
47F0D854 58E0D154 782EB000 7020D124 E2C5D8D4 F0F0F3F1*
02E3E7E3 40000634 40400038 40400001 18575C40 D1441825 5A20D148
7B22A000 30427020 D0E47940 D0B847C0 D5DA3222 4750D5DA 18585C40
D1441825 5A20D094 58E0D158 410EB000 E2C5D8D4 F0F0F3F2*
02E3E7E3 4000066C 40400038 40400001 5000D05C 4102A000 5000D060
9280D060 58F0D0F8 4110D058 05EF47F0 D8541887 18575A50 D07C5050
D12C5950 D0C44730 D62C5C40 D1301825 E2C5D8D4 F0F0F3F3*
02E3E7E3 400006A4 40400038 40400001 5A20D128 7820D124 7B22A000
30427020 D0E47940 D0B84730 D61A5030 D0B05080 D0D447F0 D65E3222
47A0D62C 5030D0B0 5080D0D4 47F0D65E E2C5D8D4 F0F0F3F4*

```
02E3E7E3 400006DC 40400038 40400001 18585C40 D1301825 5A20D094
58E0D15C 410EB000 5000D05C 4102A000 5000D060 9280D060 58F0D0F8
4110D058 05EF47F0 D85458A0 D10458B0 E2C5D8D4 F0F0F3F5*
02E3E7E3 40000714 40400038 40400001 D0F05890 D07C5880 D0CC5870
D0B05C60 D1905070 D1A45840 D1601A47 5040D1A8 5870D0D4 5C60D16C
5070D198 5830D168 1A375030 D1A07824 E2C5D8D4 F0F0F3F6*
02E3E7E3 4000074C 40400038 40400001 A0007923 B0004730 D77C5980
D0D847C0 D9805800 D0D81A09 5000D0D8 5850D0B0 5C40D16C 5A50D1B8
2B007805 B0006A00 D0706000 D0685840 E2C5D8D4 F0F0F3F7*
02E3E7E3 40000784 40400038 40400001 D06C1044 5040D0C0 5840D194
1A472B00 7804B000 6A00D070 6000D068 5800D06C 5000D0BC 58F0D10C
45E0F004 00000000 00000028 5840D19C E2C5D8D4 F0F0F3F8*
02E3E7E3 400007BC 40400038 40400001 1A4745E0 F0080474 B00045E0
F0080473 B00045E0 F0080450 D0C045E0 F0080450 D0BC45E0 F01058F0

MEMBER NAME  SEQMRG
D10C1800 45E0F000 00000000 000000A4 E2C5D8D4 F0F0F3F9*
02D9D3C4 40404040 40400038 40404040 00020001 1C0001A8 00030001
1C0001BC 00010001 0C0003C4 00010001 0C000404 00010001 0C00049C
00010001 0C0004D8 00010001 0C0007B4 E2C5D8D4 F0F0F4F0**
02E3E7E3 400007F4 40400038 40400001 18A958B0 D0A05880 D0FC185B
5C40D0D8 18391A35 45E0F008 01238000 879AD74E 58A0D104 58B0D0F0
5890D07C 5880D0CC 45E0F010 47F0D980 E2C5D8D4 F0F0F4F1*
02E3E7E3 4000082C 40400038 40400001 5980D0D8 47C0D980 5800D0D8
1A095000 D0D85840 D1945A40 D1A42B00 7804A000 6A00D070 6000D068
5830D06C 10335030 D0C05830 D1685A30 E2C5D8D4 F0F0F4F2*
02E3E7E3 40000864 40400038 40400001 D1A42B00 7803A000 6A00D070
6000D068 5800D06C 5000D0C8 58F0D10C 45E0F004 00000000 00000066
5830D184 5A30D1A4 45E0F008 0473A000 E2C5D8D4 F0F0F4F3*
02E3E7E3 4000089C 40400038 40400001 5810D1A8 45E0F008 0471A000
45E0F008 0450D0C0 45E0F008 0450D0C8 45E0F010 58F0D10C 45E0F000
00000000 000000A4 18A958B0 D0A05880 E2C5D8D4 F0F0F4F4*
02E3E7E3 400008D4 40400038 40400001 D0FC185B 5C40D0D8 18391A35
45E0F008 01238000 879AD826 58A0D104 58B0D0F0 5890D07C 5880D0CC
45E0F010 47F0D980 5A30D07C 5800D15C E2C5D8D4 F0F0F4F5*
02E3E7E3 4000090C 40400038 40400001 1A095000 D15C5800 D1581A09
5000D158 5800D154 1A095000 D1545800 D1501A09 5000D150 5800D14C
1A095000 D14C1A69 5930D0DC 47C0D506 E2C5D8D4 F0F0F4F6*
02E3E7E3 40000944 40400038 40400001 5030D0B0 5080D0D4 58A0D104
58B0D0F0 5890D07C 5880D0CC 5800D0D4 5900D0C4 47A0D980 5850D0D4
1A595050 D0D45980 D0D847C0 D9805800 E2C5D8D4 F0F0F4F7*
02E3E7E3 4000097C 40400038 40400001 D0D81A09 5000D0D8 5C40D16C
5860D194 1A652B00 7806B000 6A00D070 6000D068 5830D06C 10035000
D0C05030 D0BC58F0 D10C1800 45E0F004 E2C5D8D4 F0F0F4F8*
02E3E7E3 400009B4 40400038 40400001 00000000 00000028 5830D19C
1A3545E0 F0080473 B0005830 D1681A35 45E0F008 0473B000 45E0F008
0450D0C0 45E0F008 0450D0BC 45E0F010 E2C5D8D4 F0F0F4F9*
02E3E7E3 400009EC 40400038 40400001 58F0D10C 45E0F000 00000000
000000A4 18A958B0 D0A05880 D0FC185B 5C40D0D8 18391A35 45E0F008
01238000 879AD956 58A0D104 58B0D0F0 E2C5D8D4 F0F0F5F0**
02E3E7E3 40000A24 40400038 40400001 5890D07C 5880D0CC 45E0F010
1BFF58E0 D00007FE 58A0D004 58E0A00C 58B0A018 5810B014 5820D0D8
50201000 18DA92FF A00C982C A01C07FE E2C5D8D4 F0F0F5F1*
02E3E7E3 40000A5C 40400038 40400001 987B1004 58207000 5020D0C4
58209000 5020D0DC 58701014 58207000 5020D0D8 58201000 41302000
41500004 1B255C40 D0901B25 5020D0F0 E2C5D8D4 F0F0F5F2*
02E3E7E3 40000A94 40400038 40400001 5030D0F4 58201008 41302000
41500004 1B255C40 D09C1B25 5020D104 5030D108 58201010 41302000
41500001 1B255C40 D0A01B25 5020D0FC E2C5D8D4 F0F0F5F3*
```

```
02E3E7E3  40000ACC  40400008  40400001  5030D100  47F0D1CC  40404040
40404040  40404040  40404040  40404040  40404040  40404040  40404040
40404040  40404040  40404040  40404040  E2C5D8D4  F0F0F5F4*
02E3E7E3  40000020  40400008  40400001  00000A5C  000000B0  40404040
40404040  40404040  40404040  40404040  40404040  40404040  40404040
40404040  40404040  40404040  40404040  E2C5D8D4  F0F0F5F5*
02E3E7E3  400000B0  40400004  40400001  00000A38  40404040  40404040
40404040  40404040  40404040  40404040  40404040  40404040  40404040
40404040  40404040  40404040  40404040  E2C5D8D4  F0F0F5F6*
02D9D3C4  40404040  40400038  40404040  00010001  0C0007F0  00010001
0C000888  00010001  0C0008C8  00010001  0C0009B8  00010001  0C0009F8
00010001  0C000020  00010001  0C000024  E2C5D8D4  F0F0F5F7*
02E3E7E3  400000FC  40400010  40400001  00000144  00000198  80000000
00000138  40404040  40404040  40404040  40404040  40404040  40404040
40404040  40404040  40404040  40404040  E2C5D8D4  F0F0F5F8*

MEMBER NAME  SEQMRG
02E3E7E3  40000110  40400004  40400001  80000000  40404040  40404040
40404040  40404040  40404040  40404040  40404040  40404040  40404040
40404040  40404040  40404040  40404040  E2C5D8D4  F0F0F5F9*
02E3E7E3  400001C0  40400038  40400001  00000000  00000000  00000000
00000000  00000000  00000000  00000000  00000000  00000000  00000020
00000058  00000024  0000000C  00000018  E2C5D8D4  F0F0F6F0**
02E3E7E3  400001F8  40400038  40400001  00000010  00000000  00000000
00000000  00000000  00000000  00000000  00000000  02340008  00000000
01DC0009  02040009  00940009  00000000  E2C5D8D4  F0F0F6F1*
02E3E7E3  40000230  40400038  40400001  009C000A  00000000  0260000A
00BC000A  00C0000A  00B8000B  00DC000B  00000000  00E0000B  01E8000D
00000000  00000078  0000007C  00000028  E2C5D8D4  F0F0F6F2*
02E3E7E3  40000268  40400014  40400001  00000014  000000B0  000000D0
000000D4  000000BC  40404040  40404040  40404040  40404040  40404040
40404040  40404040  40404040  40404040  E2C5D8D4  F0F0F6F3*
02D9D3C4  40404040  40400020  40404040  00010001  0C0000B0  00010001
0C0000FC  00010001  0C000100  00010001  0C000108  40404040  40404040
40404040  40404040  40404040  40404040  E2C5D8D4  F0F0F6F4*
02C5D5C4  40404040  40404040  40404040  40404040  40404040  40404040
00000AD4  F1F5F7F3  F460C6D6  F34040F0  F2F0F2F8  F7F0F9F8  40F0F84B
F4F34BF3  F8404040  E2C5D8D4  D9C74040  E2C5D8D4  F0F0F6F5**

MEMBER NAME  SFLIP
02C5E2C4  40404040  40400010  40400001  E2C6D3C9  D7404040  00000000
40000000  40404040  40404040  40404040  40404040  40404040  40404040
40404040  40404040  40404040  40404040  E2C6D3C9  F0F0F0F1*
02E3E7E3  40000000  40400028  40400001  47F0F00C  07E2C6D3  C9D74040
90ECD00C  184D98CD  F0205040  D00450D0  400807FC  40404040  40404040
40404040  40404040  40404040  40404040  E2C6D3C9  F0F0F0F2*
02E3E7E3  40000078  40400018  40400001  41100000  00000000  00000001
00000002  00000000  00000000  40404040  40404040  40404040  40404040
40404040  40404040  40404040  40404040  E2C6D3C9  F0F0F0F3*
02E3E7E3  400000D8  40400004  40400001  00000000  40404040  40404040
40404040  40404040  40404040  40404040  40404040  40404040  40404040
40404040  40404040  40404040  40404040  E2C6D3C9  F0F0F0F4*
02E3E7E3  400000E0  40400004  40400001  00000000  40404040  40404040
40404040  40404040  40404040  40404040  40404040  40404040  40404040
40404040  40404040  40404040  40404040  E2C6D3C9  F0F0F0F5*
02E3E7E3  400000E8  40400004  40400001  00000000  40404040  40404040
40404040  40404040  40404040  40404040  40404040  40404040  40404040
40404040  40404040  40404040  40404040  E2C6D3C9  F0F0F0F6*
02E3E7E3  400000F0  40400004  40400001  00000000  40404040  40404040
```

| | | | | | | |
|---|---|---|---|---|---|---|
| 40404040 | 40404040 | 40404040 | 40404040 | 40404040 | 40404040 | 40404040 |
| 40404040 | 40404040 | 40404040 | 40404040 | E2C6D3C9 | F0F0F0F7* | |
| 02E3E7E3 | 400000F8 | 40400038 | 40400001 | 5880D0C8 | 5890D0C0 | 58A0D0B8 |
| 58B0D0B0 | 6840D050 | 6860D078 | 28046B00 | D0706000 | D0782804 | 2B066000 |
| D0706820 | 90086020 | D0A06820 | 90106020 | E2C6D3C9 | F0F0F0F8* | |
| 02E3E7E3 | 40000130 | 40400038 | 40400001 | D0A86820 | 80086020 | 90086820 |
| 80106020 | 90106820 | D0A06020 | 80086820 | D0A86020 | 80106800 | D0802300 |
| 6000D080 | 6820B008 | 6020D090 | 6820B010 | E2C6D3C9 | F0F0F0F9* | |
| 02E3E7E3 | 40000168 | 40400038 | 40400001 | 6020D098 | 6820A008 | 23026000 |
| B0086820 | A0102302 | 6000B010 | 6820D090 | 23026000 | A0086820 | D0982302 |
| 6000A010 | 1BFF58E0 | D00007FE | 58A0D004 | E2C6D3C9 | F0F0F1F0** | |
| 02E3E7E3 | 400001A0 | 40400038 | 40400001 | 58E0A00C | 58B0A018 | 5810B010 |
| 6820D078 | 60201000 | 5820B014 | 6840D070 | 60402000 | 5830B018 | 6860D080 |
| 60603000 | 18DA92FF | A00C982C | A01C07FE | E2C6D3C9 | F0F0F1F1* | |
| 02E3E7E3 | 400001D8 | 40400038 | 40400001 | 98791010 | 68207000 | 6020D078 |
| 68208000 | 6020D070 | 68209000 | 6020D080 | 58201000 | 41302000 | 41500008 |
| 1B255020 | D0C05030 | D0C45820 | 10044130 | E2C6D3C9 | F0F0F1F2* | |
| 02E3E7E3 | 40000210 | 40400038 | 40400001 | 20004150 | 00081B25 | 5020D0C8 |
| 5030D0CC | 58201008 | 41302000 | 41500008 | 1B255020 | D0B05030 | D0B45820 |
| 100C4130 | 20004150 | 00081B25 | 5020D0B8 | E2C6D3C9 | F0F0F1F3* | |
| 02E3E7E3 | 40000248 | 40400008 | 40400001 | 5030D0BC | 47F0D0D0 | 40404040 |
| 40404040 | 40404040 | 40404040 | 40404040 | 40404040 | 40404040 | 40404040 |
| 40404040 | 40404040 | 40404040 | 40404040 | E2C6D3C9 | F0F0F1F4* | |
| 02E3E7E3 | 40000020 | 4040000C | 40400001 | 000001D8 | 00000028 | 0000019C |
| 40404040 | 40404040 | 40404040 | 40404040 | 40404040 | 40404040 | 40404040 |
| 40404040 | 40404040 | 40404040 | 40404040 | E2C6D3C9 | F0F0F1F5* | |
| 02D9D3C4 | 40404040 | 40400018 | 40404040 | 00010001 | 0C000020 | 00010001 |
| 0C000024 | 00010001 | 0C000028 | 40404040 | 40404040 | 40404040 | 40404040 |
| 40404040 | 40404040 | 40404040 | 40404040 | E2C6D3C9 | F0F0F1F6* | |
| 02C5D5C4 | 40404040 | 40404040 | 40404040 | 40404040 | 40404040 | 40404040 |
| 00000250 | F1F5F7F3 | F460C6D6 | F34040F0 | F2F0F2F8 | F7F0F9F8 | 40F0F84B |
| F4F34BF4 | F3404040 | E2C6D3C9 | D7404040 | E2C6D3C9 | F0F0F1F7** | |

MEMBER NAME SMXMN

| | | | | | | |
|---|---|---|---|---|---|---|
| 02C5E2C4 | 40404040 | 40400010 | 40400001 | E2D4E7D4 | D5404040 | 00000000 |
| 40000000 | 40404040 | 40404040 | 40404040 | 40404040 | 40404040 | 40404040 |
| 40404040 | 40404040 | 40404040 | 40404040 | E2D4E7D4 | F0F0F0F1* | |
| 02E3E7E3 | 40000000 | 40400028 | 40400001 | 47F0F00C | 07E2D4E7 | D4D54040 |
| 90ECD00C | 184D98CD | F0205040 | D00450D0 | 400807FC | 40404040 | 40404040 |
| 40404040 | 40404040 | 40404040 | 40404040 | E2D4E7D4 | F0F0F0F2* | |
| 02E3E7E3 | 40000138 | 40400038 | 40400001 | 00000000 | 00000000 | 00000001 |
| 00000001 | 00000002 | 00000003 | 00000004 | 00000005 | 3D68DB8C | 40FFF972 |
| 41100000 | 41200000 | 41300000 | 00000000 | E2D4E7D4 | F0F0F0F3* | |
| 02C5E2C4 | 40404040 | 40400010 | 40400002 | E4D5C9E3 | 40404040 | 02000000 |
| 40000000 | 40404040 | 40404040 | 40404040 | 40404040 | 40404040 | 40404040 |
| 40404040 | 40404040 | 40404040 | 40404040 | E2D4E7D4 | F0F0F0F4* | |
| 02E3E7E3 | 40000170 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2D4E7D4 | F0F0F0F5* | |
| 02C5E2C4 | 40404040 | 40400010 | 40400003 | C6D9E7D7 | D97B4040 | 02000000 |
| 40000000 | 40404040 | 40404040 | 40404040 | 40404040 | 40404040 | 40404040 |
| 40404040 | 40404040 | 40404040 | 40404040 | E2D4E7D4 | F0F0F0F6* | |
| 02C5E2C4 | 40404040 | 40400010 | 40400004 | E2D7C3D6 | C5C64040 | 02000000 |
| 40000000 | 40404040 | 40404040 | 40404040 | 40404040 | 40404040 | 40404040 |
| 40404040 | 40404040 | 40404040 | 40404040 | E2D4E7D4 | F0F0F0F7* | |
| 02C5E2C4 | 40404040 | 40400010 | 40400005 | E2D7D3D4 | C1E74040 | 02000000 |
| 40000000 | 40404040 | 40404040 | 40404040 | 40404040 | 40404040 | 40404040 |
| 40404040 | 40404040 | 40404040 | 40404040 | E2D4E7D4 | F0F0F0F8* | |
| 02E3E7E3 | 40000200 | 40400014 | 40400001 | 00000000 | 00000000 | 00000000 |

| | | | | | | |
|---|---|---|---|---|---|---|
| 00000000 | 00000000 | 40404040 | 40404040 | 40404040 | 40404040 | 40404040 |
| 40404040 | 40404040 | 40404040 | 40404040 | E2D4E7D4 | F0F0F0F9* | |
| 02E3E7E3 | 40000264 | 40400038 | 40400001 | 58B0D11C | 5800D110 | 5000D188 |
| 7800D1CC | 32004780 | D25A5800 | D1185000 | D1885800 | D1C81B0B | 5000D154 |
| 5800D210 | 5000D1F0 | 5800D218 | 5000D200 | E2D4E7D4 | F0F0F1F0** | |
| 02E3E7E3 | 4000029C | 40400038 | 40400001 | 18AB58B0 | D1E8183A | 5C20D20C |
| 18435A40 | D128189A | 5A90D11C | 18795C60 | D20C1807 | 5A00D128 | 5000D220 |
| 18835A80 | D2101807 | 5A00D210 | 5000D1FC | E2D4E7D4 | F0F0F1F1* | |
| 02E3E7E3 | 400002D4 | 40400038 | 40400001 | 18535A50 | D20C5050 | D2284104 |
| B0005000 | D04C58E0 | D220410E | B0005000 | D0504108 | B0005000 | D05458E0 |
| D1FC410E | B0005000 | D0584105 | B0005000 | E2D4E7D4 | F0F0F1F2* | |
| 02E3E7E3 | 4000030C | 40400038 | 40400001 | D05C58F0 | D1E04110 | D04C05EF |
| 18035A00 | D2145000 | D2201807 | 5A00D214 | 5000D230 | 5A30D218 | 5030D204 |
| 18275A20 | D2185020 | D20858E0 | D220410E | E2D4E7D4 | F0F0F1F3* | |
| 02E3E7E3 | 40000344 | 40400038 | 40400001 | B0005000 | D07058E0 | D230410E |
| B0005000 | D0744103 | B0005000 | D0784102 | B0005000 | D07C58E0 | D228410E |
| B0005000 | D08058F0 | D1E04110 | D07005EF | E2D4E7D4 | F0F0F1F4* | |
| 02E3E7E3 | 4000037C | 40400038 | 40400001 | 58F0D1E4 | 4110D094 | 05EF58F0 |
| D1E44110 | D0B405EF | 5800D188 | 1BFF870F | D62E7808 | B0007000 | D16058E0 |
| D1FC780E | B0007000 | D1647803 | B0007000 | E2D4E7D4 | F0F0F1F5* | |
| 02E3E7E3 | 400003B4 | 40400038 | 40400001 | D1707802 | B0007000 | D1747800 |
| D1147000 | D14C58F0 | D1D84110 | D0D405EF | 58F0D1D8 | 4110D0E0 | 05EF7800 |
| D1B07900 | D13047A0 | D3D07820 | D1707C20 | E2D4E7D4 | F0F0F1F6* | |
| 02E3E7E3 | 400003EC | 40400038 | 40400001 | D1CC3322 | 7A20D1A8 | 7020D1A8 |
| 7800D1B0 | 7900D134 | 47C0D3EE | 7820D174 | 7C20D1CC | 33227A20 | D1A87020 |
| D1A87800 | D1B07900 | D1304750 | D4547800 | E2D4E7D4 | F0F0F1F7* | |
| 02E3E7E3 | 40000424 | 40400038 | 40400001 | D1B07900 | D1344730 | D4547800 |
| D15C7C00 | D1407000 | D21C58F0 | D1DC4110 | D0EC05EF | 7820D21C | 3C207840 |
| D16C7C40 | D13C7C40 | D1B03A24 | 7A20D17C | E2D4E7D4 | F0F0F1F8* | |
| 02E3E7E3 | 4000045C | 40400038 | 40400001 | 32227820 | D13847A0 | D4443122 |
| 47F0D446 | 30227C20 | D1CC3322 | 7A20D1A8 | 7020D1A8 | 7800D1B4 | 7900D130 |
| 47A0D472 | 7820D170 | 7C20D1CC | 33227A20 | E2D4E7D4 | F0F0F1F9* | |
| 02E3E7E3 | 40000494 | 40400038 | 40400001 | D1AC7020 | D1AC7800 | D1B47900 |

MEMBER NAME SMXMN

| | | | | | | |
|---|---|---|---|---|---|---|
| D13447C0 | D4907820 | D1747C20 | D1CC3322 | 7A20D1AC | 7020D1AC | 7800D1B4 |
| 7900D130 | 4750D4F6 | 7800D1B4 | 7900D134 | E2D4E7D4 | F0F0F2F0** | |
| 02E3E7E3 | 400004CC | 40400038 | 40400001 | 4730D4F6 | 7800D15C | 7C00D140 |
| 7000D21C | 58F0D1DC | 4110D0F4 | 05EF7820 | D21C3C20 | 7840D16C | 7C40D13C |
| 7C40D1B4 | 3A247A20 | D17C3222 | 7820D138 | E2D4E7D4 | F0F0F2F1* | |
| 02E3E7E3 | 40000504 | 40400038 | 40400001 | 47A0D4E6 | 312247F0 | D4E83022 |
| 7C20D1CC | 33227A20 | D1AC7020 | D1AC7800 | D1C07900 | D13047A0 | D5127820 |
| D1607C20 | D1CC7A20 | D1B87020 | D1B87800 | E2D4E7D4 | F0F0F2F2* | |
| 02E3E7E3 | 4000053C | 40400038 | 40400001 | D1C07900 | D13447C0 | D52E7820 |
| D1647C20 | D1CC7A20 | D1B87020 | D1B87800 | D1C07900 | D1304750 | D5927800 |
| D1C07900 | D1344730 | D5927800 | D1587C00 | E2D4E7D4 | F0F0F2F3* | |
| 02E3E7E3 | 40000574 | 40400038 | 40400001 | D1407000 | D21C58F0 | D1DC4110 |
| D0FC05EF | 7820D21C | 3C207840 | D1687C40 | D13C7C40 | D1C03A24 | 7A20D178 |
| 32227820 | D13847A0 | D5843122 | 47F0D586 | E2D4E7D4 | F0F0F2F4* | |
| 02E3E7E3 | 400005AC | 40400038 | 40400001 | 30227C20 | D1CC7A20 | D1B87020 |
| D1B87800 | D1C47900 | D13047A0 | D5AE7820 | D1607C20 | D1CC7A20 | D1BC7020 |
| D1BC7800 | D1C47900 | D13447C0 | D5CA7820 | E2D4E7D4 | F0F0F2F5* | |
| 02E3E7E3 | 400005E4 | 40400038 | 40400001 | D1647C20 | D1CC7A20 | D1BC7020 |
| D1BC7800 | D1C47900 | D1304750 | D62E7800 | D1C47900 | D1344730 | D62E7800 |
| D1587C00 | D1407000 | D21C58F0 | D1DC4110 | E2D4E7D4 | F0F0F2F6* | |
| 02E3E7E3 | 4000061C | 40400038 | 40400001 | D10405EF | 7820D21C | 3C207840 |
| D1687C40 | D13C7C40 | D1C43A24 | 7A20D178 | 32227820 | D13847A0 | D6203122 |
| 47F0D622 | 30227C20 | D1CC7A20 | D1BC7020 | E2D4E7D4 | F0F0F2F7* | |
| 02E3E7E3 | 40000654 | 40400038 | 40400001 | D1BC59A0 | D11C4730 | D65A7800 |

```
D1A87000  D1907800  D1AC7000  D1947800  D1B87000  D1987800  D1BC7000
D19C47F0  D6AA7800  D1A87900  D19047C0  E2D4E7D4  F0F0F2F8*
02E3E7E3  4000068C  40400038  40400001  D66E7800  D1A87000  D1907800
D1AC7900  D19447A0  D6827800  D1AC7000  D1947800  D1B87900  D19847C0
D6967800  D1B87000  D1987800  D1BC7900  E2D4E7D4  F0F0F2F9*
02E3E7E3  400006C4  40400038  40400001  D19C47A0  D6AA7800  D1BC7000
D19C18A9  5990D154  47C0D27A  58B0D11C  1BFF58E0  D00007FE  58A0D004
58E0A00C  58B0A018  5810B00C  7820D194  E2D4E7D4  F0F0F3F0**
02E3E7E3  400006FC  40400038  40400001  70201000  5820B010  7840D19C
70402000  5830B014  7860D190  70603000  5840B018  7800D198  70004000
18DA92FF  A00C982C  A01C07FE  987B1004  E2D4E7D4  F0F0F3F1*
02E3E7E3  40000734  40400038  40400001  58207000  5020D1C8  78208000
7020D1CC  78209000  7020D194  7820A000  7020D19C  7820B000  7020D190
58701018  78207000  7020D198  58201000  E2D4E7D4  F0F0F3F2*
02E3E7E3  4000076C  4040001C  40400001  41302000  41500004  1B255C40
D12C1B25  5020D1E8  5030D1EC  47F0D23C  40404040  40404040  40404040
40404040  40404040  40404040  40404040  E2D4E7D4  F0F0F3F3*
02E3E7E3  40000020  4040000C  40400001  00000730  00000028  000006E8
40404040  40404040  40404040  40404040  40404040  40404040  40404040
40404040  40404040  40404040  40404040  E2D4E7D4  F0F0F3F4*
02E3E7E3  40000088  40400004  40400001  00000180  40404040  40404040
40404040  40404040  40404040  40404040  40404040  40404040  40404040
40404040  40404040  40404040  40404040  E2D4E7D4  F0F0F3F5*
02D9D3C4  40404040  40400038  40404040  00020001  1C000200  00030001
1C000204  00040001  1C000208  00050001  1C00020C  00010001  0C000020
00010001  0C000024  00010001  0C000028  E2D4E7D4  F0F0F3F6*
02E3E7E3  4000008C  4040000C  40400001  00000190  000001A0  800001A8
40404040  40404040  40404040  40404040  40404040  40404040  40404040
40404040  40404040  40404040  40404040  E2D4E7D4  F0F0F3F7*
02E3E7E3  400000AC  40400010  40400001  00000184  00000194  000001A4
800001AC  40404040  40404040  40404040  40404040  40404040  40404040
40404040  40404040  40404040  40404040  E2D4E7D4  F0F0F3F8*
02D9D3C4  40404040  40400038  40404040  00010001  0C000088  00010001
0C00008C  00010001  0C000090  00010001  0C000094  00010001  0C0000AC

MEMBER NAME  SMXMN
00010001  0C0000B0  00010001  0C0000B4  E2D4E7D4  F0F0F3F9*
02E3E7E3  400000BC  4040001C  40400001  00000180  00000190  000001A0
000001A8  000001D0  000001D8  000001D4  40404040  40404040  40404040
40404040  40404040  40404040  40404040  E2D4E7D4  F0F0F4F0**
02D9D3C4  40404040  40400038  40404040  00010001  0C0000B8  00010001
0C0000BC  00010001  0C0000C0  00010001  0C0000C4  00010001  0C0000C8
00010001  0C0000CC  00010001  0C0000D0  E2D4E7D4  F0F0F4F1*
02E3E7E3  400000D8  4040001C  40400001  800001DC  00000184  00000194
000001A4  000001AC  000001E0  000001E8  40404040  40404040  40404040
40404040  40404040  40404040  40404040  E2D4E7D4  F0F0F4F2*
02D9D3C4  40404040  40400038  40404040  00010001  0C0000D4  00010001
0C0000D8  00010001  0C0000DC  00010001  0C0000E0  00010001  0C0000E4
00010001  0C0000E8  00010001  0C0000EC  E2D4E7D4  F0F0F4F3*
02E3E7E3  400000F4  4040001C  40400001  000001E4  800001EC  00000188
00000198  80000174  0000018C  0000019C  40404040  40404040  40404040
40404040  40404040  40404040  40404040  E2D4E7D4  F0F0F4F4*
02D9D3C4  40404040  40400038  40404040  00010001  0C0000F0  00010001
0C0000F4  00010001  0C0000F8  00010001  0C0000FC  00010001  0C000100
00010001  0C000104  00010001  0C000108  E2D4E7D4  F0F0F4F5*
02E3E7E3  40000110  4040001C  40400001  80000174  000001D8  80000164
000001DC  80000164  000001E8  80000164  40404040  40404040  40404040
40404040  40404040  40404040  40404040  E2D4E7D4  F0F0F4F6*
02D9D3C4  40404040  40400038  40404040  00010001  0C00010C  00010001
```

```
0C000110  00010001  0C000114  00010001  0C000118  00010001  0C00011C
00010001  0C000120  00010001  0C000124  E2D4E7D4  F0F0F4F7*
02E3E7E3  4000012C  40400008  40400001  000001EC  80000164  40404040
40404040  40404040  40404040  40404040  40404040  40404040  40404040
40404040  40404040  40404040  40404040  E2D4E7D4  F0F0F4F8*
02E3E7E3  40000218  40400038  40400001  00000000  00000000  00000000
00000000  00000000  00000000  00E0000B  00000014  0000000C  00000008
00000010  00F4000B  0198000B  019C000B  E2D4E7D4  F0F0F4F9*
02E3E7E3  40000250  40400014  40400001  00000000  0154000B  00000000
0158000B  00000000  40404040  40404040  40404040  40404040  40404040
40404040  40404040  40404040  40404040  E2D4E7D4  F0F0F5F0**
02D9D3C4  40404040  40400018  40404040  00010001  0C000128  00010001
0C00012C  00010001  0C000130  40404040  40404040  40404040  40404040
40404040  40404040  40404040  40404040  E2D4E7D4  F0F0F5F1*
02C5D5C4  40404040  40404040  40404040  40404040  40404040  40404040
00000788  F1F5F7F3  F460C6D6  F34040F0  F2F0F2F8  F7F0F9F8  40F0F84B
F4F34BF4  F7404040  E2D4E7D4  D5404040  E2D4E7D4  F0F0F5F2**

MEMBER NAME  SPBRCK
02C5E2C4  40404040  40400010  40400001  E2D7C2D9  C3D24040  00000000
40000000  40404040  40404040  40404040  40404040  40404040  40404040
40404040  40404040  40404040  40404040  E2D7C2D9  F0F0F0F1*
02E3E7E3  40000000  40400028  40400001  47F0F00C  07E2D7C2  D9C3D240
90ECD00C  184D98CD  F0205040  D00450D0  400807FC  40404040  40404040
40404040  40404040  40404040  40404040  E2D7C2D9  F0F0F0F2*
02E3E7E3  40000278  40400038  40400001  3CA7C5AC  00000000  41300000
00000000  41200000  00000000  00000000  00000000  00000000  00000000
00000001  00000002  00000003  00000004  E2D7C2D9  F0F0F0F3*
02E3E7E3  400002B0  4040000C  40400001  3CA7C5AC  00000000  00000000
40404040  40404040  40404040  40404040  40404040  40404040  40404040
40404040  40404040  40404040  40404040  E2D7C2D9  F0F0F0F4*
02E3E7E3  40000480  40400004  40400001  00000000  40404040  40404040
40404040  40404040  40404040  40404040  40404040  40404040  40404040
40404040  40404040  40404040  40404040  E2D7C2D9  F0F0F0F5*
02C5E2C4  40404040  40400010  40400002  D8E4C1C4  40404040  02000000
40000000  40404040  40404040  40404040  40404040  40404040  40404040
40404040  40404040  40404040  40404040  E2D7C2D9  F0F0F0F6*
02E3E7E3  40000488  40400004  40400001  00000000  40404040  40404040
40404040  40404040  40404040  40404040  40404040  40404040  40404040
40404040  40404040  40404040  40404040  E2D7C2D9  F0F0F0F7*
02C5E2C4  40404040  40400010  40400003  E2C6D3C9  D7404040  02000000
40000000  40404040  40404040  40404040  40404040  40404040  40404040
40404040  40404040  40404040  40404040  E2D7C2D9  F0F0F0F8*
02E3E7E3  40000490  40400008  40400001  00000000  00000000  40404040
40404040  40404040  40404040  40404040  40404040  40404040  40404040
40404040  40404040  40404040  40404040  E2D7C2D9  F0F0F0F9*
02E3E7E3  4000049C  40400008  40400001  00000000  00000000  40404040
40404040  40404040  40404040  40404040  40404040  40404040  40404040
40404040  40404040  40404040  40404040  E2D7C2D9  F0F0F1F0**
02C5E2C4  40404040  40400010  40400004  E4D5C9E3  C4404040  02000000
40000000  40404040  40404040  40404040  40404040  40404040  40404040
40404040  40404040  40404040  40404040  E2D7C2D9  F0F0F1F1*
02E3E7E3  400004A8  40400004  40400001  00000000  40404040  40404040
40404040  40404040  40404040  40404040  40404040  40404040  40404040
40404040  40404040  40404040  40404040  E2D7C2D9  F0F0F1F2*
02C5E2C4  40404040  40400010  40400005  E5C1D3E4  C5404040  02000000
40000000  40404040  40404040  40404040  40404040  40404040  40404040
40404040  40404040  40404040  40404040  E2D7C2D9  F0F0F1F3*
02C5E2C4  40404040  40400010  40400006  C3C8D6D9  C4E84040  02000000
```

```
40000000  40404040  40404040  40404040  40404040  40404040  40404040
40404040  40404040  40404040  40404040  E2D7C2D9  F0F0F1F4*
02C5E2C4  40404040  40400010  40400007  D9D6D6E3  C5D94040  02000000
40000000  40404040  40404040  40404040  40404040  40404040  40404040
40404040  40404040  40404040  40404040  E2D7C2D9  F0F0F1F5*
02C5E2C4  40404040  40400010  40400008  E2D7C3D6  C5C44040  02000000
40000000  40404040  40404040  40404040  40404040  40404040  40404040
40404040  40404040  40404040  40404040  E2D7C2D9  F0F0F1F6*
02C5E2C4  40404040  40400010  40400009  E2E6C9E3  C3C84040  02000000
40000000  40404040  40404040  40404040  40404040  40404040  40404040
40404040  40404040  40404040  40404040  E2D7C2D9  F0F0F1F7*
02E3E7E3  400004B0  40400018  40400001  00000000  00000000  00000000
00000000  00000000  00000000  40404040  40404040  40404040  40404040
40404040  40404040  40404040  40404040  E2D7C2D9  F0F0F1F8*
02D9D3C4  40404040  40400038  40404040  00020001  1C000490  00030001
1C00049C  00040001  1C0004B0  00050001  1C0004B4  00060001  1C0004B8
00070001  1C0004BC  00080001  1C0004C0  E2D7C2D9  F0F0F1F9*
02C5E2C4  40404040  40400010  4040000A  E6C9E3C8  C9D54040  02000000

MEMBER NAME  SPBRCK
40000000  40404040  40404040  40404040  40404040  40404040  40404040
40404040  40404040  40404040  40404040  E2D7C2D9  F0F0F2F0**
02C5E2C4  40404040  40400010  4040000B  E6C9E3D6  E4E34040  02000000
40000000  40404040  40404040  40404040  40404040  40404040  40404040
40404040  40404040  40404040  40404040  E2D7C2D9  F0F0F2F1*
02E3E7E3  400004C8  40400008  40400001  00000000  00000000  40404040
40404040  40404040  40404040  40404040  40404040  40404040  40404040
40404040  40404040  40404040  40404040  E2D7C2D9  F0F0F2F2*
02E3E7E3  40000518  40400038  40400001  5840D478  5850D460  5860D458
58B0D480  58A0D278  5890D27C  5880D270  5870D28C  2B227820  40046020
D3C02B22  78204008  6020D3C8  2B227820  E2D7C2D9  F0F0F2F3*
02E3E7E3  40000550  40400038  40400001  B0046020  D3D02B22  7820B008
6020D3D8  2B227820  D2C46020  D3586020  D3882B22  78206004  6020D390
2B227820  60086020  D3982B22  78205004  E2D7C2D9  F0F0F2F4*
02E3E7E3  40000588  40400038  40400001  6020D3A0  2B227820  50086020
D3A82B00  7800D2AC  6000D310  2B007800  D2C86000  D3782B00  7800D2BC
6000D370  2B007800  D2C06000  D38059A0  E2D7C2D9  F0F0F2F5*
02E3E7E3  400005C0  40400038  40400001  D2984770  D5A858F0  D4744110
D04C05EF  6800D378  6000D350  6800D370  6000D360  6820D3C0  6020D430
6820D3C8  6020D438  6820D3D0  6020D440  E2D7C2D9  F0F0F2F6*
02E3E7E3  400005F8  40400038  40400001  6820D3D8  6020D448  5080D2B4
4100D430  5000D068  4100D440  5000D06C  4100D390  5000D070  4100D3A0
5000D074  58F0D498  4110D068  05EF4100  E2D7C2D9  F0F0F2F7*
02E3E7E3  40000630  40400038  40400001  D4385000  D08C4100  D4485000
D0904100  D3985000  D0944100  D3A85000  D09858F0  D4984110  D08C05EF
6820D258  6C20D2D0  6020D4D8  6860D378  E2D7C2D9  F0F0F2F8*
02E3E7E3  40000668  40400038  40400001  2C666060  D4B82C26  6840D260
6C40D2E0  6040D4E0  6C40D378  2A246A20  D2F06020  D4106820  D2586C20
D2D82C62  6840D260  6C40D2E8  28046C00  E2D7C2D9  F0F0F2F9*
02E3E7E3  400006A0  40400038  40400001  D3782A60  6A60D2F8  6060D418
6800D370  2C006000  D4C06860  D4D82C60  6060D4D8  6800D4E0  6C00D370
6860D4D8  2A606A60  D2F06060  D4206C20  E2D7C2D9  F0F0F3F0**
02E3E7E3  400006D8  40400038  40400001  D4C06C40  D3702A24  6A20D2F8
6020D428  4100D410  5000D0B0  4100D418  5000D0B4  58F0D488  4110D0B0
05EF4100  D4205000  D0B04100  D4285000  E2D7C2D9  F0F0F3F1*
02E3E7E3  40000710  40400038  40400001  D0B458F0  D4884110  D0B005EF
6820D4B8  6C20D378  6840D2D0  2C426860  D2E06C60  D4B82A46  6860D2F0
6C60D378  2A466A40  D3006040  D4306C20  E2D7C2D9  F0F0F3F2*
02E3E7E3  40000748  40400038  40400001  D2D86840  D2E86C40  D4B82A24
```

```
6840D2F8  6C40D378  2A246A20  D3086020  D4386820  D4C06C20  D3706840
D2D02C42  6860D2E0  6C60D4C0  2A466860  E2D7C2D9  F0F0F3F3*
02E3E7E3  40000780  40400038  40400001  D2F06C60  D3702A46  6A40D300
6040D440  6C20D2D8  6840D2E8  6C40D4C0  2A246840  D2F86C40  D3702A24
6A20D308  6020D448  6820D380  6C20D418  E2D7C2D9  F0F0F3F4*
02E3E7E3  400007B8  40400038  40400001  23226A20  D4306020  D3E06820
D3806C20  D4106A20  D4386020  D3E86840  D4406040  D4C86820  D3806C20
D4282322  2A246020  D3F06820  D4486020  E2D7C2D9  F0F0F3F5*
02E3E7E3  400007F0  40400038  40400001  D4D06860  D3806C60  D4202A62
6060D3F8  6040D3D0  6020D3D8  58B0D46C  6860D2D0  6C60D258  6060D4D8
6840D350  2C442C64  6820D2E0  6C20D260  E2D7C2D9  F0F0F3F6*
02E3E7E3  40000828  40400038  40400001  28026C00  D3502A60  6A60D2F0
6060D410  6860D2D8  6C60D258  6060D4E0  2C646840  D2E86C40  D2602804
6C00D350  2A606A60  D2F86060  D4186800  E2D7C2D9  F0F0F3F7*
02E3E7E3  40000860  40400038  40400001  D3602C00  6000D4E8  6860D4D8
2C606060  D4D82802  6C00D360  6820D4D8  2A206A20  D2F06020  D4206820
D4E06C20  D4E86C40  D3602A24  6A20D2F8  E2D7C2D9  F0F0F3F8*
02E3E7E3  40000898  40400038  40400001  6020D428  4100D410  5000D0B0
4100D418  5000D0B4  58F0D488  4110D0B0  05EF4100  D4205000  D0B04100

MEMBER NAME  SPBRCK
D4285000  D0B458F0  D4884110  D0B005EF  E2D7C2D9  F0F0F3F9*
02E3E7E3  400008D0  40400038  40400001  6820D380  6C20D418  23226A20
D4306020  D3E06820  D3806C20  D4106A20  D4386020  D3E86820  D3806C20
D4282322  6A20D440  6020D3F0  6820D380  E2D7C2D9  F0F0F4F0**
02E3E7E3  40000908  40400038  40400001  6C20D420  6A20D448  6020D3F8
6820D3F0  6B20D3E0  4770D902  58F0D49C  4110D0BC  05EF58F0  D4904110
D11005EF  6820D2D0  6C20D258  6C20D368  E2D7C2D9  F0F0F4F1*
02E3E7E3  40000940  40400038  40400001  6840D2D8  6C40D258  2B246020
D3286820  D2E06C20  D2606C20  D3686840  D2E86C40  D2602B24  6020D330
6820D2F0  6C20D368  6B20D2F8  6020D338  E2D7C2D9  F0F0F4F2*
02E3E7E3  40000978  40400038  40400001  58F0D468  4110D11C  05EF59A0
D2B04130  00014780  D9681B33  6820D3B0  6020D4A8  6840D3B8  6040D4B0
29244120  00014740  D9841B22  16238627  E2D7C2D9  F0F0F4F3*
02E3E7E3  400009B0  40400038  40400001  D9926040  D3B06020  D3B858F0
D4944110  D13005EF  5820D2A8  89200003  6802D3A8  6000D348  58F0D48C
4110D148  05EF5080  D2A45800  D2A01200  E2D7C2D9  F0F0F4F4*
02E3E7E3  400009E8  40400038  40400001  4770D9CE  58F0D4A0  4110D184
05EF59A0  D2A04770  D9E058F0  D4A44110  D1F005EF  5800D2A4  12004780
D7E45990  D2A44770  D9FE58B0  D4801BFF  E2D7C2D9  F0F0F4F5*
02E3E7E3  40000A20  40400038  40400001  58E0D000  07FE6800  D3B86000
D34858F0  D48C4110  D14805EF  50A0D294  5800D2A0  12004770  DA2858F0
D4A04110  D18405EF  59A0D2A0  4770DA3A  E2D7C2D9  F0F0F4F6*
02E3E7E3  40000A58  40400038  40400001  58F0D4A4  4110D1F0  05EF5800
D2A41200  4780D7E4  58B0D480  5990D2A4  4770DA58  1BFF58E0  D00007FE
1BFF58E0  D00007FE  58A0D004  58E0A00C  E2D7C2D9  F0F0F4F7*
02E3E7E3  40000A90  40400038  40400001  58B0A018  5810B008  7820D2C4
70201000  5820B014  7840D2AC  70402000  5830B018  7860D2C8  70603000
5840B01C  7800D2BC  70004000  5850B020  E2D7C2D9  F0F0F4F8*
02E3E7E3  40000AC8  40400038  40400001  7820D2C0  70205000  5860B02C
5870D29C  50706000  18DA92FF  A00C982C  A01C07FE  987B1008  78207000
7020D2C4  7820A000  7020D2AC  7820B000  E2D7C2D9  F0F0F4F9*
02E3E7E3  40000B00  40400038  40400001  7020D2C8  987B101C  78207000
7020D2BC  78208000  7020D2C0  58209000  5020D298  5870102C  58207000
5020D29C  58201000  41302000  41500004  E2D7C2D9  F0F0F5F0**
02E3E7E3  40000B38  40400038  40400001  1B255020  D4785030  D47C5820
10044130  20004150  00041B25  5020D480  5030D484  5820100C  41302000
41500004  1B255020  D4585030  D45C5820  E2D7C2D9  F0F0F5F1*
02E3E7E3  40000B70  40400038  40400001  10104130  20004150  00041B25
```

| | | | | | | |
|---|---|---|---|---|---|---|
| 5020D460 | 5030D464 | 58201028 | 41302000 | 41500004 | 1B255C40 | D27C1B25 |
| 5020D46C | 5030D470 | 5030D198 | 47F0D4F0 | E2D7C2D9 | F0F0F5F2* | |
| 02E3E7E3 | 40000020 | 4040000C | 40400001 | 00000AE8 | 00000028 | 00000A88 |
| 40404040 | 40404040 | 40404040 | 40404040 | 40404040 | 40404040 | 40404040 |
| 40404040 | 40404040 | 40404040 | 40404040 | E2D7C2D9 | F0F0F5F3* | |
| 02E3E7E3 | 40000074 | 40400008 | 40400001 | 000003E8 | 000003F8 | 40404040 |
| 40404040 | 40404040 | 40404040 | 40404040 | 40404040 | 40404040 | 40404040 |
| 40404040 | 40404040 | 40404040 | 40404040 | E2D7C2D9 | F0F0F5F4* | |
| 02D9D3C4 | 40404040 | 40400038 | 40404040 | 00090001 | 1C0004C4 | 000A0001 |
| 1C0004C8 | 000B0001 | 1C0004CC | 00010001 | 0C000020 | 00010001 | 0C000024 |
| 00010001 | 0C000028 | 00010001 | 0C000074 | E2D7C2D9 | F0F0F5F5* | |
| 02E3E7E3 | 4000007C | 40400014 | 40400001 | 000003B8 | 000003C8 | 000003A0 |
| 00000398 | 800003A8 | 40404040 | 40404040 | 40404040 | 40404040 | 40404040 |
| 40404040 | 40404040 | 40404040 | 40404040 | E2D7C2D9 | F0F0F5F6* | |
| 02E3E7E3 | 400000A0 | 40400008 | 40400001 | 00000380 | 000002F8 | 40404040 |
| 40404040 | 40404040 | 40404040 | 40404040 | 40404040 | 40404040 | 40404040 |
| 40404040 | 40404040 | 40404040 | 40404040 | E2D7C2D9 | F0F0F5F7* | |
| 02D9D3C4 | 40404040 | 40400038 | 40404040 | 00010001 | 0C000078 | 00010001 |
| 0C00007C | 00010001 | 0C000080 | 00010001 | 0C000084 | 00010001 | 0C000088 |
| 00010001 | 0C00008C | 00010001 | 0C0000A0 | E2D7C2D9 | F0F0F5F8* | |

MEMBER NAME SPBRCK

| | | | | | | |
|---|---|---|---|---|---|---|
| 02E3E7E3 | 400000A8 | 4040000C | 40400001 | 00000308 | 00000318 | 80000328 |
| 40404040 | 40404040 | 40404040 | 40404040 | 40404040 | 40404040 | 40404040 |
| 40404040 | 40404040 | 40404040 | 40404040 | E2D7C2D9 | F0F0F5F9* | |
| 02E3E7E3 | 400000C4 | 40400010 | 40400001 | 00000380 | 00000300 | 00000310 |
| 00000320 | 40404040 | 40404040 | 40404040 | 40404040 | 40404040 | 40404040 |
| 40404040 | 40404040 | 40404040 | 40404040 | E2D7C2D9 | F0F0F6F0** | |
| 02D9D3C4 | 40404040 | 40400038 | 40404040 | 00010001 | 0C0000A4 | 00010001 |
| 0C0000A8 | 00010001 | 0C0000AC | 00010001 | 0C0000B0 | 00010001 | 0C0000C4 |
| 00010001 | 0C0000C8 | 00010001 | 0C0000CC | E2D7C2D9 | F0F0F6F1* | |
| 02E3E7E3 | 400000D4 | 40400004 | 40400001 | 80000330 | 40404040 | 40404040 |
| 40404040 | 40404040 | 40404040 | 40404040 | 40404040 | 40404040 | 40404040 |
| 40404040 | 40404040 | 40404040 | 40404040 | E2D7C2D9 | F0F0F6F2* | |
| 02E3E7E3 | 400000E0 | 40400018 | 40400001 | 80000348 | 000002F8 | 00000308 |
| 00000318 | 00000328 | 00000300 | 40404040 | 40404040 | 40404040 | 40404040 |
| 40404040 | 40404040 | 40404040 | 40404040 | E2D7C2D9 | F0F0F6F3* | |
| 02D9D3C4 | 40404040 | 40400038 | 40404040 | 00010001 | 0C0000D0 | 00010001 |
| 0C0000D4 | 00010001 | 0C0000E0 | 00010001 | 0C0000E4 | 00010001 | 0C0000E8 |
| 00010001 | 0C0000EC | 00010001 | 0C0000F0 | E2D7C2D9 | F0F0F6F4* | |
| 02E3E7E3 | 400000F8 | 4040001C | 40400001 | 00000310 | 00000320 | 00000330 |
| 00000458 | 000003B8 | 000003C8 | 00000438 | 40404040 | 40404040 | 40404040 |
| 40404040 | 40404040 | 40404040 | 40404040 | E2D7C2D9 | F0F0F6F5* | |
| 02D9D3C4 | 40404040 | 40400038 | 40404040 | 00010001 | 0C0000F4 | 00010001 |
| 0C0000F8 | 00010001 | 0C0000FC | 00010001 | 0C000100 | 00010001 | 0C000104 |
| 00010001 | 0C000108 | 00010001 | 0C00010C | E2D7C2D9 | F0F0F6F6* | |
| 02E3E7E3 | 40000114 | 4040001C | 40400001 | 00000448 | 00000408 | 000003A8 |
| 000002DC | 00000388 | 00000378 | 000003B0 | 40404040 | 40404040 | 40404040 |
| 40404040 | 40404040 | 40404040 | 40404040 | E2D7C2D9 | F0F0F6F7* | |
| 02D9D3C4 | 40404040 | 40400038 | 40404040 | 00010001 | 0C000110 | 00010001 |
| 0C000114 | 00010001 | 0C000118 | 00010001 | 0C00011C | 00010001 | 0C000120 |
| 00010001 | 0C000124 | 00010001 | 0C000128 | E2D7C2D9 | F0F0F6F8* | |
| 02E3E7E3 | 40000130 | 4040001C | 40400001 | 000003E8 | 800003F8 | 00000408 |
| 00000390 | 80000380 | 00000350 | 00000358 | 40404040 | 40404040 | 40404040 |
| 40404040 | 40404040 | 40404040 | 40404040 | E2D7C2D9 | F0F0F6F9* | |
| 02D9D3C4 | 40404040 | 40400038 | 40404040 | 00010001 | 0C00012C | 00010001 |
| 0C000130 | 00010001 | 0C000134 | 00010001 | 0C000138 | 00010001 | 0C00013C |
| 00010001 | 0C000140 | 00010001 | 0C000144 | E2D7C2D9 | F0F0F7F0** | |
| 02E3E7E3 | 4000014C | 4040001C | 40400001 | 00000360 | 000003D8 | 800002D8 |

```
000003D8  00000378  00000388  000002D8  40404040  40404040  40404040
40404040  40404040  40404040  40404040  E2D7C2D9  F0F0F7F1*
02D9D3C4  40404040  40400038  40404040  00010001  0C000148  00010001
0C00014C  00010001  0C000150  00010001  0C000154  00010001  0C000158
00010001  0C00015C  00010001  0C000160  E2D7C2D9  F0F0F7F2*
02E3E7E3  40000168  4040001C  40400001  000002D0  800002BC  000002F8
00000308  00000318  00000328  00000300  40404040  40404040  40404040
40404040  40404040  40404040  40404040  E2D7C2D9  F0F0F7F3*
02D9D3C4  40404040  40400038  40404040  00010001  0C000164  00010001
0C000168  00010001  0C00016C  00010001  0C000170  00010001  0C000174
00010001  0C000178  00010001  0C00017C  E2D7C2D9  F0F0F7F4*
02E3E7E3  40000184  4040001C  40400001  00000310  00000320  00000330
00000370  00000428  00000408  000003A8  40404040  40404040  40404040
40404040  40404040  40404040  40404040  E2D7C2D9  F0F0F7F5*
02D9D3C4  40404040  40400038  40404040  00010001  0C000180  00010001
0C000184  00010001  0C000188  00010001  0C00018C  00010001  0C000190
00010001  0C000194  00010001  0C000198  E2D7C2D9  F0F0F7F6*
02E3E7E3  400001A0  4040001C  40400001  00000338  000002C8  800002DC
00000458  00000408  000003E8  000003F8  40404040  40404040  40404040
40404040  40404040  40404040  40404040  E2D7C2D9  F0F0F7F7*
02D9D3C4  40404040  40400038  40404040  00010001  0C00019C  00010001

MEMBER NAME  SPBRCK
0C0001A0  00010001  0C0001A4  00010001  0C0001A8  00010001  0C0001AC
00010001  0C0001B0  00010001  0C0001B4  E2D7C2D9  F0F0F7F8*
02E3E7E3  400001BC  40400004  40400001  000002C4  40404040  40404040
40404040  40404040  40404040  40404040  40404040  40404040  40404040
40404040  40404040  40404040  40404040  E2D7C2D9  F0F0F7F9*
02E3E7E3  400001C4  40400018  40400001  00000378  00000388  00000398
00000370  000002BC  000002CC  40404040  40404040  40404040  40404040
40404040  40404040  40404040  40404040  E2D7C2D9  F0F0F8F0**
02D9D3C4  40404040  40400038  40404040  00010001  0C0001B8  00010001
0C0001BC  00010001  0C0001C4  00010001  0C0001C8  00010001  0C0001CC
00010001  0C0001D0  00010001  0C0001D4  E2D7C2D9  F0F0F8F1*
02E3E7E3  400001DC  4040001C  40400001  000002F8  00000308  00000318
00000328  00000300  00000310  00000320  40404040  40404040  40404040
40404040  40404040  40404040  40404040  E2D7C2D9  F0F0F8F2*
02D9D3C4  40404040  40400038  40404040  00010001  0C0001D8  00010001
0C0001DC  00010001  0C0001E0  00010001  0C0001E4  00010001  0C0001E8
00010001  0C0001EC  00010001  0C0001F0  E2D7C2D9  F0F0F8F3*
02E3E7E3  400001F8  4040001C  40400001  00000330  000003B8  000003C8
000003A8  000002DC  00000438  00000448  40404040  40404040  40404040
40404040  40404040  40404040  40404040  E2D7C2D9  F0F0F8F4*
02D9D3C4  40404040  40400038  40404040  00010001  0C0001F4  00010001
0C0001F8  00010001  0C0001FC  00010001  0C000200  00010001  0C000204
00010001  0C000208  00010001  0C00020C  E2D7C2D9  F0F0F8F5*
02E3E7E3  40000214  4040001C  40400001  800003B0  00000458  00000370
00000428  00000388  000002CC  00000378  40404040  40404040  40404040
40404040  40404040  40404040  40404040  E2D7C2D9  F0F0F8F6*
02D9D3C4  40404040  40400038  40404040  00010001  0C000210  00010001
0C000214  00010001  0C000218  00010001  0C00021C  00010001  0C000220
00010001  0C000224  00010001  0C000228  E2D7C2D9  F0F0F8F7*
02E3E7E3  40000230  4040001C  40400001  000002F8  00000308  00000318
00000328  00000300  00000310  00000320  40404040  40404040  40404040
40404040  40404040  40404040  40404040  E2D7C2D9  F0F0F8F8*
02D9D3C4  40404040  40400038  40404040  00010001  0C00022C  00010001
0C000230  00010001  0C000234  00010001  0C000238  00010001  0C00023C
00010001  0C000240  00010001  0C000244  E2D7C2D9  F0F0F8F9*
02E3E7E3  4000024C  4040001C  40400001  00000330  000003F8  00000380
```

```
000003B0  000003B8  000003C8  000003A8  40404040  40404040  40404040
40404040  40404040  40404040  40404040  E2D7C2D9  F0F0F9F0**
02D9D3C4  40404040  40400038  40404040  00010001  0C000248  00010001
0C00024C  00010001  0C000250  00010001  0C000254  00010001  0C000258
00010001  0C00025C  00010001  0C000260  E2D7C2D9  F0F0F9F1*
02E3E7E3  40000268  40400010  40400001  000002DC  00000438  00000448
800003E8  40404040  40404040  40404040  40404040  40404040  40404040
40404040  40404040  40404040  40404040  E2D7C2D9  F0F0F9F2*
02E3E7E3  400004D0  40400038  40400001  00000000  00000000  00000000
00000000  00000000  00000000  00000000  00000000  00000000  00000000
00000000  00000000  00000000  00000000  E2D7C2D9  F0F0F9F3*
02E3E7E3  40000508  40400010  40400001  00000000  00000000  00000000
00000000  40404040  40404040  40404040  40404040  40404040  40404040
40404040  40404040  40404040  40404040  E2D7C2D9  F0F0F9F4*
02D9D3C4  40404040  40400028  40404040  00010001  0C000264  00010001
0C000268  00010001  0C00026C  00010001  0C000270  00010001  0C000274
40404040  40404040  40404040  40404040  E2D7C2D9  F0F0F9F5*
02C5D5C4  40404040  40404040  40404040  40404040  40404040  40404040
00000BA8  F1F5F7F3  F460C6D6  F34040F0  F2F0F2F8  F7F0F9F8  40F0F84B
F4F34BF5  F2404040  E2D7C2D9  C3D24040  E2D7C2D9  F0F0F9F6**

MEMBER NAME  SPCOEF
02C5E2C4  40404040  40400010  40400001  E2D7C3D6  C5C64040  00000000
40000000  40404040  40404040  40404040  40404040  40404040  40404040
40404040  40404040  40404040  40404040  E2D7C3D6  F0F0F0F1*
02E3E7E3  40000000  40400028  40400001  47F0F00C  07E2D7C3  D6C5C640
90ECD00C  184D98CD  F0205040  D00450D0  400807FC  40404040  40404040
40404040  40404040  40404040  40404040  E2D7C3D6  F0F0F0F2*
02E3E7E3  40000078  40400010  40400001  41200000  41300000  00000000
00000000  40404040  40404040  40404040  40404040  40404040  40404040
40404040  40404040  40404040  40404040  E2D7C3D6  F0F0F0F3*
02E3E7E3  400000B0  40400038  40400001  7860D050  7800D078  7C00D080
7000D068  7820D070  7B20D074  3C267840  D0787C40  D0803A24  7840D07C
7C40D080  38023A04  7000D060  7820D074  E2D7C3D6  F0F0F0F4*
02E3E7E3  400000E8  40400038  40400001  7B20D070  7C20D054  38467C40
D0683B24  7840D07C  7C40D080  38023B04  7000D064  7800D070  7000D06C
1BFF58E0  D00007FE  58A0D004  58E0A00C  E2D7C3D6  F0F0F0F5*
02E3E7E3  40000120  40400038  40400001  58B0A018  5810B014  7820D060
70201000  5820B018  7840D064  70402000  5830B01C  7860D068  70603000
5840B020  7800D06C  70004000  18DA92FF  E2D7C3D6  F0F0F0F6*
02E3E7E3  40000158  40400038  40400001  A00C982C  A01C07FE  987B1000
78207000  7020D070  78208000  7020D074  78209000  7020D078  7820A000
7020D07C  7820B000  7020D080  987A1014  E2D7C3D6  F0F0F0F7*
02E3E7E3  40000190  40400024  40400001  78207000  7020D060  78208000
7020D064  78209000  7020D068  7820A000  7020D06C  47F0D088  40404040
40404040  40404040  40404040  40404040  E2D7C3D6  F0F0F0F8*
02E3E7E3  40000020  4040000C  40400001  00000160  00000028  00000118
40404040  40404040  40404040  40404040  40404040  40404040  40404040
40404040  40404040  40404040  40404040  E2D7C3D6  F0F0F0F9*
02D9D3C4  40404040  40400018  40404040  00010001  0C000020  00010001
0C000024  00010001  0C000028  40404040  40404040  40404040  40404040
40404040  40404040  40404040  40404040  E2D7C3D6  F0F0F1F0**
02C5D5C4  40404040  40404040  40404040  40404040  40404040  40404040
000001B4  F1F5F7F3  F460C6D6  F34040F0  F2F0F2F8  F7F0F9F8  40F0F84B
F4F34BF5  F8404040  E2D7C3D6  C5C64040  E2D7C3D6  F0F0F1F1**

MEMBER NAME  SPCOED
02C5E2C4  40404040  40400010  40400001  E2D7C3D6  C5C44040  00000000
40000000  40404040  40404040  40404040  40404040  40404040  40404040
```

```
40404040  40404040  40404040  40404040  E2D7C3D6  F0F0F0F1*
02E3E7E3  40000000  40400028  40400001  47F0F00C  07E2D7C3  D6C5C440
90ECD00C  184D98CD  F0205040  D00450D0  400807FC  40404040  40404040
40404040  40404040  40404040  40404040  E2D7C3D6  F0F0F0F2*
02E3E7E3  40000078  40400018  40400001  41200000  00000000  41300000
00000000  00000000  00000000  40404040  40404040  40404040  40404040
40404040  40404040  40404040  40404040  E2D7C3D6  F0F0F0F3*
02E3E7E3  400000E0  40400038  40400001  6860D050  6800D0A0  6C00D0B0
6000D080  6820D090  6B20D098  2C266840  D0A06C40  D0B02A24  6840D0A8
6C40D0B0  28022A04  6000D070  6820D098  E2D7C3D6  F0F0F0F4*
02E3E7E3  40000118  40400038  40400001  6B20D090  6C20D058  28466C40
D0802B24  6840D0A8  6C40D0B0  28022B04  6000D078  6800D090  6000D088
1BFF58E0  D00007FE  58A0D004  58E0A00C  E2D7C3D6  F0F0F0F5*
02E3E7E3  40000150  40400038  40400001  58B0A018  5810B014  6820D070
60201000  5820B018  6840D078  60402000  5830B01C  6860D080  60603000
5840B020  6800D088  60004000  18DA92FF  E2D7C3D6  F0F0F0F6*
02E3E7E3  40000188  40400038  40400001  A00C982C  A01C07FE  987B1000
68207000  6020D090  68208000  6020D098  68209000  6020D0A0  6820A000
6020D0A8  6820B000  6020D0B0  987A1014  E2D7C3D6  F0F0F0F7*
02E3E7E3  400001C0  40400024  40400001  68207000  6020D070  68208000
6020D078  68209000  6020D080  6820A000  6020D088  47F0D0B8  40404040
40404040  40404040  40404040  40404040  E2D7C3D6  F0F0F0F8*
02E3E7E3  40000020  4040000C  40400001  00000190  00000028  00000148
40404040  40404040  40404040  40404040  40404040  40404040  40404040
40404040  40404040  40404040  40404040  E2D7C3D6  F0F0F0F9*
02D9D3C4  40404040  40400018  40404040  00010001  0C000020  00010001
0C000024  00010001  0C000028  40404040  40404040  40404040  40404040
40404040  40404040  40404040  40404040  E2D7C3D6  F0F0F1F0**
02C5D5C4  40404040  40404040  40404040  40404040  40404040  40404040
000001E4  F1F5F7F3  F460C6D6  F34040F0  F2F0F2F8  F7F0F9F8  40F0F84B
F4F44BF0  F3404040  E2D7C3D6  C5C44040  E2D7C3D6  F0F0F1F1**

MEMBER NAME  SPLIT
02C5E2C4  40404040  40400010  40400001  E2D7D3C9  E3404040  00000000
40000000  40404040  40404040  40404040  40404040  40404040  40404040
40404040  40404040  40404040  40404040  E2D7D3C9  F0F0F0F1*
02E3E7E3  40000000  40400038  40400001  47F0F00C  07E2D7D3  C9E34040
90ECD00C  184D98CD  F0205040  D00450D0  400807FC  40404040  40404040
021A2340  E2D7D3C9  E3406040  C4C9C440  E2D7D3C9  F0F0F0F2*
02E3E7E3  40000038  40400038  40400001  D5D6E340  C3C8C1C9  D540E3D6
40D7D9C5  E5C9D6E4  E2401002  10021002  22021A1F  40E2D7D3  C9E34060
40C4C9C4  40D5D6E3  40C3C8C1  C9D540E3  E2D7D3C9  F0F0F0F3*
02E3E7E3  40000070  40400038  40400001  D640D5C5  E7E34010  02100310
0222021A  1DE2E3D6  D740D6C3  C3E4D9C5  C440C9D5  40E2D7D3  C9E340D9
D6E4E3C9  D5C52202  1A1540C3  C8C5C3D2  E2D7D3C9  F0F0F0F4*
02E3E7E3  400000A8  40400010  40400001  40D3D6C7  C9C340C9  D540E2D7
D3C9E322  40404040  40404040  40404040  40404040  40404040  40404040
40404040  40404040  40404040  40404040  E2D7D3C9  F0F0F0F5*
02E3E7E3  40000188  40400038  40400001  00000000  00000000  4E000000
00000000  4F080000  00000000  4E000000  80000000  00000000  00000000
00000000  00000001  00000001  00000002  E2D7D3C9  F0F0F0F6*
02E3E7E3  400001C0  40400038  40400001  00000003  00000004  00000005
00000006  00000009  0000000A  0000000B  0000000C  0000000D  0000000E
0000002C  00000038  41100000  41400000  E2D7D3C9  F0F0F0F7*
02C5E2C4  40404040  40400010  40400002  E3D6D3C5  D9404040  05000000
4000000C  40404040  40404040  40404040  40404040  40404040  40404040
40404040  40404040  40404040  40404040  E2D7D3C9  F0F0F0F8*
02E3E7E3  400001F8  40400008  40400001  00000000  00000000  40404040
40404040  40404040  40404040  40404040  40404040  40404040  40404040
```

```
40404040  40404040  40404040  40404040  E2D7D3C9  F0F0F0F9*
02C5E2C4  40404040  40400010  40400003  C2E2D6D9  E3404040  02000000
40000000  40404040  40404040  40404040  40404040  40404040  40404040
40404040  40404040  40404040  40404040  E2D7D3C9  F0F0F1F0**
02C5E2C4  40404040  40400010  40400004  D4E5C3C8  D9404040  02000000
40000000  40404040  40404040  40404040  40404040  40404040  40404040
40404040  40404040  40404040  40404040  E2D7D3C9  F0F0F1F1*
02E3E7E3  40000320  4040000C  40400001  00000000  00000000  00000000
40404040  40404040  40404040  40404040  40404040  40404040  40404040
40404040  40404040  40404040  40404040  E2D7D3C9  F0F0F1F2*
02E3E7E3  40000330  40400008  40400001  00000000  00000000  40404040
40404040  40404040  40404040  40404040  40404040  40404040  40404040
40404040  40404040  40404040  40404040  E2D7D3C9  F0F0F1F3*
02C5E2C4  40404040  40400010  40400005  C9C2C3D6  D47B4040  02000000
40000000  40404040  40404040  40404040  40404040  40404040  40404040
40404040  40404040  40404040  40404040  E2D7D3C9  F0F0F1F4*
02E3E7E3  4000033C  40400004  40400001  00000000  40404040  40404040
40404040  40404040  40404040  40404040  40404040  40404040  40404040
40404040  40404040  40404040  40404040  E2D7D3C9  F0F0F1F5*
02C5E2C4  40404040  40400010  40400006  D7D9D6D1  C1D94040  02000000
40000000  40404040  40404040  40404040  40404040  40404040  40404040
40404040  40404040  40404040  40404040  E2D7D3C9  F0F0F1F6*
02E3E7E3  40000344  40400008  40400001  00000000  00000000  40404040
40404040  40404040  40404040  40404040  40404040  40404040  40404040
40404040  40404040  40404040  40404040  E2D7D3C9  F0F0F1F7*
02C5E2C4  40404040  40400010  40400007  D7D9D6D1  D3D54040  02000000
40000000  40404040  40404040  40404040  40404040  40404040  40404040
40404040  40404040  40404040  40404040  E2D7D3C9  F0F0F1F8*
02E3E7E3  40000350  4040000C  40400001  00000000  00000000  00000000
40404040  40404040  40404040  40404040  40404040  40404040  40404040
40404040  40404040  40404040  40404040  E2D7D3C9  F0F0F1F9*
02E3E7E3  40000278  40400030  40400001  00000035  00000004  C6D34040

MEMBER NAME  SPLIT
C1404040  00000029  00000004  C6D34040  C1404040  0000002D  00000004
C6D34040  C1404040  40404040  40404040  E2D7D3C9  F0F0F2F0**
02E3E7E3  40000438  40400038  40400001  5880D290  5890D268  58A0D2A0
58B0D284  5800D0F0  5000D1BC  5800D10C  5000D330  5800D134  5000D328
18505C40  D1485820  D10C1A25  7802B000  E2D7D3C9  F0F0F2F1*
02E3E7E3  40000470  40400038  40400001  7900D13C  4770D3C8  5800D0FC
5000D1BC  5800D184  5A00D100  5000D1B4  5800D148  5A00D100  5000D194
5820D37C  5020D32C  5850D148  5C40D328  E2D7D3C9  F0F0F2F2*
02E3E7E3  400004A8  40400038  40400001  5830D37C  1A357803  B0007900
D13847A0  D4245800  D1B05700  D0EC5000  D0DC6820  D0D86B20  D0E85850
D1485C40  D3281A25  7022B000  5850D148  E2D7D3C9  F0F0F2F3*
02E3E7E3  400004E0  40400038  40400001  5C40D328  5820D330  1A254102
B0005000  D0689280  D06858F0  D2784110  D06005EF  5830D1B4  5C20D134
5850D194  5C40D134  5A30D10C  18255A20  E2D7D3C9  F0F0F2F4*
02E3E7E3  40000518  40400038  40400001  D10C1893  18A2410A  B0005000
D0749280  D07458F0  D2784110  D06C05EF  410AB000  5000D07C  58F0D278
4110D078  05EF58F0  D2784110  D08405EF  E2D7D3C9  F0F0F2F5*
02E3E7E3  40000550  40400038  40400001  5AA0D134  19A947C0  D4665890
D26858A0  D2A05800  D1BC1BFF  870FD540  5850D148  5C40D328  5820D308
1A252B00  7802B000  6A00D0E0  6000D0D0  E2D7D3C9  F0F0F2F6*
02E3E7E3  40000588  40400038  40400001  5850D0D4  5050D19C  5800D1A8
5A00D100  5000D1A8  18305C20  D1305A30  D3305C40  D1305820  D3301A25
4103A000  5000D094  4102A000  5000D098  E2D7D3C9  F0F0F2F7*
02E3E7E3  400005C0  40400038  40400001  9280D098  58F0D278  4110D090
05EF5800  D1A85700  D0EC5000  D0DC6820  D0D86B20  D0E85850  D1485A50
```

```
D1005C40  D3285820  D3081A25  7022B000  E2D7D3C9  F0F0F2F8*
02E3E7E3  400005F8  40400038  40400001  5800D30C  5000D338  5800D2B0
5000D334  18305C20  D14C5A30  D30C5823  80005A20  D1005850  D14C5C40
D2B05830  D30C1A35  50238000  5830D14C  E2D7D3C9  F0F0F2F9*
02E3E7E3  40000630  40400038  40400001  5A30D100  18735C60  D2B01847
5A40D10C  18275A20  D30C5870  D1005880  D2B01894  18A318B2  5860D290
58296000  1A275029  6000582B  60001A27  E2D7D3C9  F0F0F3F0**
02E3E7E3  40000668  40400038  40400001  502B6000  1AA71AB8  1A9859A0
D16C47C0  D5A05880  D2905890  D26858A0  D2A058B0  D2845830  D14C5C20
D3345A30  D3385823  80005B20  D1005850  E2D7D3C9  F0F0F3F1*
02E3E7E3  400006A0  40400038  40400001  D14C5C40  D3345830  D3301A35
59238000  4770D6DE  5830D124  5030D33C  58F0D27C  7840F004  5850D148
5C40D328  5820D124  1A257042  B0005820  E2D7D3C9  F0F0F3F2*
02E3E7E3  400006D8  40400038  40400001  D2AC5020  D3407820  F0085870
D1485C60  D3285840  D2AC1A47  7024B000  5870D148  5A70D100  5C60D328
5840D334  1A477044  B0005870  D1485A70  E2D7D3C9  F0F0F3F3*
02E3E7E3  40000710  40400038  40400001  D1005C60  D3285840  D2B41A47
7024B000  5800D1BC  1BFF870F  DD865800  D17C5700  D0EC5000  D0DC6820
D0D86B20  D0E85850  D19C5C40  D1305860  E2D7D3C9  F0F0F3F4*
02E3E7E3  40000748  40400038  40400001  D3301A65  7026A000  1A357800
D1A47003  A0005800  D17C5700  D0EC5000  D0DC6820  D0D86B20  D0E85850
D1A85C40  D1305830  D3381A35  7023A000  E2D7D3C9  F0F0F3F5*
02E3E7E3  40000780  40400038  40400001  5850D1A8  5C40D130  1A257800
D1A47002  A00047F0  DD865850  D14C5C40  D3345820  D3301A25  58028000
5900D148  4780DA3E  5850D148  5B50D100  E2D7D3C9  F0F0F3F6*
02E3E7E3  400007B8  40400038  40400001  5050D1A0  5800D124  5000D348
5C40D328  5050D344  5820D124  1A257822  B0007020  D3545870  D1485C60
D3285820  D1241A27  7B22B000  30227920  E2D7D3C9  F0F0F3F7*
02E3E7E3  400007F0  40400038  40400001  90044730  D7645820  D2AC1A25
7822B000  5850D148  5C40D328  5820D2AC  1A257B22  B0003022  79209004
47C0D7B8  5820D334  5A20D344  7822B000  E2D7D3C9  F0F0F3F8*
02E3E7E3  40000828  40400038  40400001  7020D350  5850D148  5C40D328
5820D348  1A257B22  B0003022  79209004  4730D896  5820D2B4  5A20D344

MEMBER NAME  SPLIT
7822B000  5850D148  5C40D328  5820D2AC  E2D7D3C9  F0F0F3F9*
02E3E7E3  40000860  40400038  40400001  1A257B22  B0003022  79209004
4730D896  58F0D27C  7840F004  5850D148  5C40D328  5820D334  1A257042
B0007820  F0085850  D1485C40  D3285820  E2D7D3C9  F0F0F4F0**
02E3E7E3  40000898  40400038  40400001  D2B41A25  7022B000  5850D148
5A50D100  5C40D328  5820D348  1A257042  B0005820  D2AC5020  D34C5850
D1485A50  D1005C40  D3285830  D2AC1A35  E2D7D3C9  F0F0F4F1*
02E3E7E3  400008D0  40400038  40400001  7023B000  5800D1BC  1BFF870F
DD865800  D17C5700  D0EC5000  D0DC6820  D0D86B20  D0E85850  D19C5C40
D1305830  D3381A35  7023A000  1A257800  E2D7D3C9  F0F0F4F2*
02E3E7E3  40000908  40400038  40400001  D1A47002  A0005800  D17C5700
D0EC5000  D0DC6820  D0D86B20  D0E85850  D1A85C40  D1305820  D3301A25
7022A000  5850D1A8  5C40D130  5820D348  E2D7D3C9  F0F0F4F3*
02E3E7E3  40000940  40400038  40400001  1A257800  D1A47002  A00047F0
DD865850  D1485C40  D3285820  D3341A25  7820D350  7B22B000  30227920
90044730  D8DE5820  D2B45A20  D3447822  E2D7D3C9  F0F0F4F4*
02E3E7E3  40000978  40400038  40400001  B0005850  D1485C40  D3285820
D2B41A25  7B22B000  30227920  900447C0  D9265850  D1485C40  D3285820
D3341A25  7820D354  7B22B000  30227920  E2D7D3C9  F0F0F4F5*
02E3E7E3  400009B0  40400038  40400001  90044730  DA045820  D2AC5A20
D3447822  B0005850  D1485C40  D3285820  D2B41A25  7B22B000  30227920
90044730  DA0458F0  D27C7840  F0045850  E2D7D3C9  F0F0F4F6*
02E3E7E3  400009E8  40400038  40400001  D1485C40  D3285820  D3481A25
7042B000  5820D2AC  5020D358  7820F008  5850D148  5C40D328  5830D2AC
```

```
1A357023  B0005850  D1485A50  D1005C40  E2D7D3C9  F0F0F4F7*
02E3E7E3  40000A20  40400038  40400001  D3285830  D3341A35  7043B000
5850D148  5A50D100  5C40D328  5830D2B4  1A357023  B0005800  D1BC1BFF
870FDD86  5800D17C  5700D0EC  5000D0DC  E2D7D3C9  F0F0F4F8*
02E3E7E3  40000A58  40400038  40400001  6820D0D8  6B20D0E8  5850D19C
5C40D130  5830D330  1A357023  A0005830  D3481A35  7800D1A4  7003A000
5800D17C  5700D0EC  5000D0DC  6820D0D8  E2D7D3C9  F0F0F4F9*
02E3E7E3  40000A90  40400038  40400001  6B20D0E8  5850D1A8  5C40D130
5830D338  1A357023  A0005850  D1A85C40  D1301A25  7800D1A4  7002A000
47F0DD86  58F0D28C  45E0F004  00000006  E2D7D3C9  F0F0F5F0**
02E3E7E3  40000AC8  40400038  40400001  00000028  45E0F008  0450D100
45E0F008  0450D148  45E0F008  0450D14C  45E0F010  58F0D28C  45E0F034
05404040  F1F55850  D1485A50  D1045050  E2D7D3C9  F0F0F5F1*
02E3E7E3  40000B00  40400038  40400001  D1A05800  D1245000  D3605C40
D3285050  D35C5820  D1241A25  7822B000  7020D36C  5870D148  5C60D328
5820D124  1A277B22  B0003022  79209004  E2D7D3C9  F0F0F5F2*
02E3E7E3  40000B38  40400038  40400001  4730DAAA  5820D2AC  1A257822
B0005850  D1485C40  D3285820  D2AC1A25  7B22B000  30227920  900447C0
DAFE5820  D3345A20  D35C7822  B0007020  E2D7D3C9  F0F0F5F3*
02E3E7E3  40000B70  40400038  40400001  D3685850  D1485C40  D3285820
D3601A25  7B22B000  30227920  90044730  DBDC5820  D2B45A20  D35C7822
B0005850  D1485C40  D3285820  D2AC1A25  E2D7D3C9  F0F0F5F4*
02E3E7E3  40000BA8  40400038  40400001  7B22B000  30227920  90044730
DBDC58F0  D27C7840  F0045850  D1485C40  D3285820  D3601A25  7042B000
5820D2AC  5020D364  7820F008  5850D148  E2D7D3C9  F0F0F5F5*
02E3E7E3  40000BE0  40400038  40400001  5C40D328  5830D2AC  1A357023
B0005850  D1485A50  D1005C40  D3285830  D3341A35  7043B000  5850D148
5A50D100  5C40D328  5830D2B4  1A357023  E2D7D3C9  F0F0F5F6*
02E3E7E3  40000C18  40400038  40400001  B0005800  D1BC1BFF  870FDD86
5800D17C  5700D0EC  5000D0DC  6820D0D8  6B20D0E8  5850D19C  5C40D130
5830D330  1A357023  A0005830  D3601A35  E2D7D3C9  F0F0F5F7*
02E3E7E3  40000C50  40400038  40400001  7800D1A4  7003A000  5800D17C
5700D0EC  5000D0DC  6820D0D8  6B20D0E8  5850D1A8  5C40D130  5830D338
1A357023  A0005850  D1A85C40  D1301A25  E2D7D3C9  F0F0F5F8*

MEMBER NAME  SPLIT
02E3E7E3  40000C88  40400038  40400001  7800D1A4  7002A000  47F0DD86
5850D148  5C40D328  5820D334  1A257820  D3687B22  B0003022  79209004
4730DC24  5820D2B4  5A20D35C  7822B000  E2D7D3C9  F0F0F5F9*
02E3E7E3  40000CC0  40400038  40400001  5850D148  5C40D328  5820D2B4
1A257B22  B0003022  79209004  47C0DC6C  5850D148  5C40D328  5820D334
1A257820  D36C7B22  B0003022  79209004  E2D7D3C9  F0F0F6F0**
02E3E7E3  40000CF8  40400038  40400001  4730DD4A  5820D2AC  5A20D35C
7822B000  5850D148  5C40D328  5820D2B4  1A257B22  B0003022  79209004
4730DD4A  58F0D27C  7840F004  5850D148  E2D7D3C9  F0F0F6F1*
02E3E7E3  40000D30  40400038  40400001  5C40D328  5820D334  1A257042
B0007820  F0085850  D1485C40  D3285820  D2B41A25  7022B000  5850D148
5A50D100  5C40D328  5820D360  1A257042  E2D7D3C9  F0F0F6F2*
02E3E7E3  40000D68  40400038  40400001  B0005820  D2AC5020  D3705850
D1485A50  D1005C40  D3285830  D2AC1A35  7023B000  5800D1BC  1BFF870F
DD865800  D17C5700  D0EC5000  D0DC6820  E2D7D3C9  F0F0F6F3*
02E3E7E3  40000DA0  40400038  40400001  D0D86B20  D0E85850  D19C5C40
D1305830  D3381A35  7023A000  1A257800  D1A47002  A0005800  D17C5700
D0EC5000  D0DC6820  D0D86B20  D0E85850  E2D7D3C9  F0F0F6F4*
02E3E7E3  40000DD8  40400038  40400001  D1A85C40  D1305820  D3301A25
7022A000  5850D1A8  5C40D130  5820D360  1A257800  D1A47002  A00047F0
DD8658F0  D28C1800  45E0F004  00000006  E2D7D3C9  F0F0F6F5*
02E3E7E3  40000E10  40400004  40400001  00000055  40404040  40404040
40404040  40404040  40404040  40404040  40404040  40404040  40404040
```

```
40404040 40404040 40404040 40404040 E2D7D3C9 F0F0F6F6*
02D9D3C4 40404040 40400038 40404040 00020001 0C000320 00030001
1C000324 00040001 1C000330 00050001 1C000344 00060001 1C000350
00070001 1C000354 00010001 0C000AC8 E2D7D3C9 F0F0F6F7*
02E3E7E3 40000E14 40400038 40400001 45E0F008 0450D104 45E0F008
0450D148 45E0F008 0450D14C 45E0F010 58F0D28C 45E0F034 05404040
F1F55800 D2AC5000 D3785850 D14C5C40 E2D7D3C9 F0F0F6F8*
02E3E7E3 40000E4C 40400038 40400001 D3345820 D2AC1A25 58528000
5050D170 5870D14C 5C60D334 5820D2AC 1A275832 80005870 D14C5C60
D3345820 D3341A27 5A328000 5B30D100 E2D7D3C9 F0F0F6F9*
02E3E7E3 40000E84 40400038 40400001 5030D188 5820D304 5020D374
5870D148 5C60D328 5840D304 1A477804 B0003200 4780C432 5870D148
5C60D328 18421A47 7800D0F8 7004B000 E2D7D3C9 F0F0F7F0**
02E3E7E3 40000EBC 40400038 40400001 5870D148 5A70D100 5C60D328
1A277800 D0F87002 B0005870 D1485C60 D3285820 D3301A27 2B007802
B0006A00 D0E06000 D0D05800 D0D45000 E2D7D3C9 F0F0F7F1*
02E3E7E3 40000EF4 40400038 40400001 D1685870 D1485A70 D1005C60
D3285820 D3301A27 2B007802 B0006A00 D0E06000 D0D05800 D0D45000
D18C5800 D10C5000 D2C45800 D1345000 E2D7D3C9 F0F0F7F2*
02E3E7E3 40000F2C 40400038 40400001 D2BC5820 D1305020 D2C85800
D1345000 D2A85800 D3045000 D2CC5800 D30C5000 D2D45870 D19C5C60
D1305800 D30C1A07 5000D310 5800D10C E2D7D3C9 F0F0F7F3*
02E3E7E3 40000F64 40400038 40400001 1A075000 D3145800 D1245000
D2E85800 D2AC5000 D2F01A07 5000D318 5A70D124 5070D31C 18135C00
D1345010 D3205C40 D1345050 D2B85A50 E2D7D3C9 F0F0F7F4*
02E3E7E3 40000F9C 40400038 40400001 D1345050 D2C018A2 58B0D2A0
5890D270 5880D284 58E0D2C0 782E9000 7020D2FC 2B003802 6A00D0E0
6000D0D0 5820D0D4 5850D14C 5C40D2B0 E2D7D3C9 F0F0F7F5*
02E3E7E3 40000FD4 40400038 40400001 18355A30 D10C58F0 D2905A23
F0005B20 D1005020 D1805920 D1484770 C3625820 D2B85A20 D1307822
90007020 D1F05820 D2B85A20 D3007822 E2D7D3C9 F0F0F7F6*
02E3E7E3 4000100C 40400038 40400001 90007020 D1F45820 D0F45020
D1905830 D10C5860 D1085870 D1345880 D1685890 D10018A2 58B0D284
185A5A50 D1481C47 18255A20 D1247802 E2D7D3C9 F0F0F7F7*
02E3E7E3 40001044 40400038 40400001 B0007000 D158185A 5A50D148

MEMBER NAME  SPLIT
1C471825 5A20D2AC 7802B000 7000D160 185A5A50 D1481C47 18255A20
D2B07802 B0007000 D15C185A 5A50D148 E2D7D3C9 F0F0F7F8*
02E3E7E3 4000107C 40400038 40400001 1C471825 5A20D2B4 7802B000
7000D164 19894780 C0141986 4780C036 50A0D190 5880D284 5890D270
58B0D2A0 58A0D2C8 5800D168 5900D10C E2D7D3C9 F0F0F7F9*
02E3E7E3 400010B4 40400038 40400001 4780C0D0 5880D290 5890D268
58A0D2A0 58B0D284 47F0C2E6 58F0D29C 4110D09C 05EF50A0 D19041E0
000815FE 4720C032 58EFD04C 07FE47F0 E2D7D3C9 F0F0F8F0**
02E3E7E3 400010EC 40400038 40400001 C0BC185A 5A50D148 5C40D2A8
18251A23 4102B000 5000D0B4 9280D0B4 58F0D298 4110D0B0 05EF50A0
D19041E0 000415FE 4720C06E 58EFD058 E2D7D3C9 F0F0F8F1*
02E3E7E3 40001124 40400038 40400001 07FE47F0 C0BC5880 D2845890
D27058B0 D2A058A0 D2C85850 D1905A50 D1485C40 D2BC1825 5A20D304
7800D138 70028000 5800D190 5900D100 E2D7D3C9 F0F0F8F2*
02E3E7E3 4000115C 40400038 40400001 4770C0B8 58E0D2C0 782E9000
7A20D138 702E9000 47F0C37E 19A94770 C0CA50A0 D19047F0 C37E18A9
47F0DF7C 5820D2B8 5A20D308 2B007802 E2D7D3C9 F0F0F8F3*
02E3E7E3 40001194 40400038 40400001 90006A00 D0E06000 D0D05850
D0D45050 D1741C4A 5050D2E4 18255A20 D3047842 B0007040 D2D0187A
5C60D1A8 18275A20 D2C47942 B0004130 E2D7D3C9 F0F0F8F4*
02E3E7E3 400011CC 40400038 40400001 00014720 C11C1B33 58E0D310
782EB000 7020D2D8 181A5C00 D1A81861 5A60D2C4 7926B000 41200001
```

4780C142 1B221423 1BFF862F C334187A E2D7D3C9 F0F0F8F5*
02E3E7E3 40001204 40400038 40400001 5C60D1A8 18275A20 D2C47942
B0004130 00014740 C1641B33 181A5C00 D1A81861 5A60D2C4 7926B000
41200001 4780C17E 1B221423 1BFF862F E2D7D3C9 F0F0F8F6*
02E3E7E3 4000123C 40400038 40400001 C31A58E0 D314782E B0007020
D2E03924 41300001 4740C19E 1B33181A 5C00D1A8 18615A60 D2D47926
B0004120 00014780 C1B81B22 14231BFF E2D7D3C9 F0F0F8F7*
02E3E7E3 40001274 40400038 40400001 862FC31A 39244130 00014720
C1CC1B33 181A5C00 D1A81861 5A60D2D4 7926B000 41200001 4780C1E6
1B221423 1BFF862F C3341825 1A2A7842 E2D7D3C9 F0F0F8F8*
02E3E7E3 400012AC 40400038 40400001 B0007040 D2EC185A 5C40D1A8
18255A20 D1247942 B0004130 00014720 C2141B33 58E0D318 782EB000
7020D2F4 187A5C60 D1A81847 5A40D124 E2D7D3C9 F0F0F8F9*
02E3E7E3 400012E4 40400038 40400001 7924B000 41200001 4780C23A
1B221423 1BFF862F C334185A 5C40D1A8 18255A20 D2E87942 B0004130
00014740 C25C1B33 187A5C60 D1A81847 E2D7D3C9 F0F0F9F0**
02E3E7E3 4000131C 40400038 40400001 5A40D2E8 7924B000 41200001
4780C276 1B221423 1BFF862F C31A58E0 D31C782E B0007020 D2F83924
41300001 4740C296 1B33187A 5C60D1A8 E2D7D3C9 F0F0F9F1*
02E3E7E3 40001354 40400038 40400001 18475A40 D2F07924 B0004120
00014780 C2B01B22 14231BFF 862FC31A 39244130 00014720 C2C41B33
187A5C60 D1A81847 5A40D2F0 7924B000 E2D7D3C9 F0F0F9F2*
02E3E7E3 4000138C 40400038 40400001 41200001 4780C2DE 1B221423
1BFF862F C3345880 D2905890 D26858A0 D2A058B0 D28458F0 D28C1800
45E0F004 00000006 0000007E 45E0F010 E2D7D3C9 F0F0F9F3*
02E3E7E3 400013C4 40400038 40400001 58F0D28C 45E0F034 05404040
F1F55850 D1485C40 D2BC1825 5A20D2CC 7800D138 70028000 47F0C37E
5850D148 5A50D100 5C40D2BC 18255A20 E2D7D3C9 F0F0F9F4*
02E3E7E3 400013FC 40400038 40400001 D2CC7800 D1387002 800058E0
D2C0782E 90007A20 D138702E 900047F0 C37E5800 D1805900 D1484750
C37E7820 D2FC7A20 D13858E0 D2C0702E E2D7D3C9 F0F0F9F5*
02E3E7E3 40001434 40400038 40400001 90005880 D2845890 D27058B0
D2A058A0 D2C85800 D2C05A00 D1345000 D2C05820 D2B85A20 D1345020
D2B85920 D32047C0 DEF85880 D2905890 E2D7D3C9 F0F0F9F6*
02E3E7E3 4000146C 40400038 40400001 D26858A0 D2A058B0 D2845850
D14C5C40 D3345820 D3341A25 58028000 5900D100 4770C3E0 1BFF58E0

MEMBER NAME SPLIT
D00007FE 5830D14C 5C20D334 5840D378 E2D7D3C9 F0F0F9F7*
02E3E7E3 400014A4 40400038 40400001 1A435834 80005C20 D3285A30
D3305850 D14C5C40 D3345820 D3341A25 58F0D270 4103F000 5000D0C0
41028000 5000D0C8 9280D0C8 58F0D26C E2D7D3C9 F0F0F9F8*
02E3E7E3 400014DC 40400038 40400001 4110D0B8 05EF1BFF 58E0D000
07FE5800 D1345000 D2A81870 5C60D188 5850D170 5C40D134 18275A20
D1341835 5A30D134 189358A0 D13418B2 E2D7D3C9 F0F0F9F9*
02E3E7E3 40001514 40400038 40400001 7840D138 5870D270 18687869
70002B00 38066A00 D0E06000 D0D05820 D0D45850 D14C5C40 D2B01835
5A30D10C 5A236000 18825B80 D1005980 E2D7D3C9 F0F1F0F0**
02E3E7E3 4000154C 40400038 40400001 D1484750 C4C85980 D1484770
C4B858F0 D28C1800 45E0F004 00000006 0000009F 45E0F010 5980D148
4780C4C8 38263A24 70297000 879AC466 E2D7D3C9 F0F1F0F1*
02E3E7E3 40001584 40400038 40400001 5880D290 5890D268 58A0D2A0
58B0D284 1BFF58E0 D00007FE 58A0D004 58E0A00C 58B0A018 5810B000
5820D148 50201000 5830B004 5840D14C E2D7D3C9 F0F1F0F2*
02E3E7E3 400015BC 40400038 40400001 50403000 5850B014 5860D1A8
50605000 5870B024 5880D17C 50807000 5890B02C 5800D1B0 50009000
18DA92FF A00C982C A01C07FE 58C0D048 E2D7D3C9 F0F1F0F3*
02E3E7E3 400015F4 40400038 40400001 987B1000 58207000 5020D148
58208000 5020D14C 5820A000 5020D184 987B1014 58207000 5020D1A8

| | | | | | | |
|---|---|---|---|---|---|---|
| 58209000 | 5020D16C | 987B1024 | 58207000 | E2D7D3C9 | F0F1F0F4* | |
| 02E3E7E3 | 4000162C | 40400038 | 40400001 | 5020D17C | 78208000 | 7020D1A4 |
| 58209000 | 5020D1B0 | 58701034 | 58207000 | 5020D1B8 | 58201008 | 41302000 |
| 41500004 | 1B255C40 | D12C1B25 | 5020D284 | E2D7D3C9 | F0F1F0F5* | |
| 02E3E7E3 | 40001664 | 40400038 | 40400001 | 5030D288 | 58201010 | 41302000 |
| 41500004 | 1B255C40 | D1201B25 | 5020D2A0 | 5030D2A4 | 58201018 | 41302000 |
| 41500004 | 1B255C40 | D1101B25 | 5020D290 | E2D7D3C9 | F0F1F0F6* | |
| 02E3E7E3 | 4000169C | 40400038 | 40400001 | 5030D294 | 58201020 | 41302000 |
| 41500004 | 1B255020 | D27C5030 | D2805820 | 10304130 | 20004150 | 00041B25 |
| 5C40D12C | 1B255020 | D2705030 | D27447F0 | E2D7D3C9 | F0F1F0F7* | |
| 02E3E7E3 | 400016D4 | 40400002 | 40400001 | D3804040 | 40404040 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F1F0F8* | |
| 02E3E7E3 | 40000020 | 40400008 | 40400001 | 000015F0 | 000000B8 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F1F0F9* | |
| 02E3E7E3 | 400000B8 | 40400004 | 40400001 | 0000159C | 40404040 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F1F1F0** | |
| 02E3E7E3 | 40000100 | 40400008 | 40400001 | 000010B8 | 000010EA | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F1F1F1* | |
| 02D9D3C4 | 40404040 | 40400038 | 40404040 | 00010001 | 0C000E10 | 00010001 |
| 0C0013BC | 00010001 | 0C001568 | 00010001 | 0C000020 | 00010001 | 0C000024 |
| 00010001 | 0C0000B8 | 00010001 | 0C000100 | E2D7D3C9 | F0F1F1F2* | |
| 02E3E7E3 | 40000108 | 40400020 | 40400001 | 0000112A | 00001174 | 00001126 |
| 0000112A | 000001EC | 000002B0 | 80000000 | 000001EC | 40404040 | 40404040 |
| 40404040 | 40404040 | 40404040 | 40404040 | E2D7D3C9 | F0F1F1F3* | |
| 02D9D3C4 | 40404040 | 40400038 | 40404040 | 00010001 | 0C000104 | 00010001 |
| 0C000108 | 00010001 | 0C00010C | 00010001 | 0C000110 | 00010001 | 0C000114 |
| 00010001 | 0C000118 | 00010001 | 0C00011C | E2D7D3C9 | F0F1F1F4* | |
| 02E3E7E3 | 40000128 | 4040000C | 40400001 | 000002E8 | 80000000 | 000001EC |
| 40404040 | 40404040 | 40404040 | 40404040 | 40404040 | 40404040 | 40404040 |
| 40404040 | 40404040 | 40404040 | 40404040 | E2D7D3C9 | F0F1F1F5* | |
| 02E3E7E3 | 40000138 | 40400014 | 40400001 | 800002B0 | 000001EC | 000002B0 |
| 800002E8 | 000001E8 | 40404040 | 40404040 | 40404040 | 40404040 | 40404040 |
| 40404040 | 40404040 | 40404040 | 40404040 | E2D7D3C9 | F0F1F1F6* | |

MEMBER NAME SPLIT

| | | | | | | |
|---|---|---|---|---|---|---|
| 02D9D3C4 | 40404040 | 40400038 | 40404040 | 00010001 | 0C000124 | 00010001 |
| 0C000128 | 00010001 | 0C000130 | 00010001 | 0C000138 | 00010001 | 0C00013C |
| 00010001 | 0C000140 | 00010001 | 0C000144 | E2D7D3C9 | F0F1F1F7* | |
| 02E3E7E3 | 40000150 | 40400024 | 40400001 | 80000000 | 000002A8 | 00000210 |
| 00000218 | 00000214 | 8000021C | 000002A8 | 80000000 | 00000278 | 40404040 |
| 40404040 | 40404040 | 40404040 | 40404040 | E2D7D3C9 | F0F1F1F8* | |
| 02D9D3C4 | 40404040 | 40400038 | 40404040 | 00010001 | 0C000148 | 00010001 |
| 0C000154 | 00010001 | 0C000158 | 00010001 | 0C00015C | 00010001 | 0C000160 |
| 00010001 | 0C000164 | 00010001 | 0C000168 | E2D7D3C9 | F0F1F1F9* | |
| 02E3E7E3 | 40000174 | 40400004 | 40400001 | 000001C0 | 40404040 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F1F2F0** | |
| 02E3E7E3 | 4000017C | 40400008 | 40400001 | 000001EC | 80000000 | 40404040 |
| 40404040 | 40404040 | 40404040 | 40404040 | 40404040 | 40404040 | 40404040 |
| 40404040 | 40404040 | 40404040 | 40404040 | E2D7D3C9 | F0F1F2F1* | |
| 02E3E7E3 | 40000360 | 40400038 | 40400001 | 00000000 | 00000010 | 00000014 |
| 00000018 | 00000000 | 00000000 | 00000000 | 00000000 | 00000000 | 00000000 |
| 00000000 | 00000000 | 00000000 | 00000000 | E2D7D3C9 | F0F1F2F2* | |
| 02E3E7E3 | 40000398 | 40400038 | 40400001 | 00000000 | 00000000 | 00000000 |
| 00000000 | 00000000 | 00000000 | 00000000 | 00000000 | 00000030 | 00000028 |

```
00000024  00000008  016C0008  00000000  E2D7D3C9  F0F1F2F3*
02E3E7E3  400003D0  40400038  40400001  00000008  00000000  00000008
00000000  00F80009  00000000  00000009  0104000A  0120000B  011C000B
0194000B  00000000  0164000D  0000000D  E2D7D3C9  F0F1F2F4*
02E3E7E3  40000408  40400030  40400001  00000000  0160000E  0124000E
0128000F  012C000F  0148000F  014C000F  00000000  01DC000F  0000000F
00000000  00000034  40404040  40404040  E2D7D3C9  F0F1F2F5*
02D9D3C4  40404040  40400018  40404040  00010001  0C000170  00010001
0C000174  00010001  0C00017C  40404040  40404040  40404040  40404040
40404040  40404040  40404040  40404040  E2D7D3C9  F0F1F2F6*
02C5D5C4  40404040  40404040  40404040  40404040  40404040  40404040
000016D6  F1F5F7F3  F460C6D6  F34040F0  F2F0F2F8  F7F0F9F8  40F0F84B
F4F44BF0  F8404040  E2D7D3C9  E3404040  E2D7D3C9  F0F1F2F7**

MEMBER NAME  SPLMAX
02C5E2C4  40404040  40400010  40400001  E2D7D3D4  C1E74040  00000000
40000000  40404040  40404040  40404040  40404040  40404040  40404040
40404040  40404040  40404040  40404040  E2D7D3D4  F0F0F0F1*
02E3E7E3  40000000  40400028  40400001  47F0F00C  07E2D7D3  D4C1E740
90ECD00C  184D98CD  F0205040  D00450D0  400807FC  40404040  40404040
40404040  40404040  40404040  40404040  E2D7D3D4  F0F0F0F2*
02C5E2C4  40404040  40400010  40400002  D8E4C1C4  40404040  02000000
40000000  40404040  40404040  40404040  40404040  40404040  40404040
40404040  40404040  40404040  40404040  E2D7D3D4  F0F0F0F3*
02E3E7E3  40000088  40400034  40400001  41100000  00000000  00000000
00000000  00000001  00000002  00000003  00000008  41100000  41200000
41300000  00000000  00000000  40404040  E2D7D3D4  F0F0F0F4*
02E3E7E3  40000158  40400004  40400001  00000000  40404040  40404040
40404040  40404040  40404040  40404040  40404040  40404040  40404040
40404040  40404040  40404040  40404040  E2D7D3D4  F0F0F0F5*
02E3E7E3  40000188  40400038  40400001  58A0D07C  5860D070  7820D088
7C20D094  2B003802  28206020  D0D07820  D0847C20  D0982B00  38022820
6020D0D8  7820D080  7C20D09C  2B003802  E2D7D3D4  F0F0F0F6*
02E3E7E3  400001C0  40400038  40400001  28206020  D0E07840  D0A07820
D0987A20  D0947A20  D09C7A20  D0A05840  D0745040  D0BC7040  D0E87800
D06C7000  D0EC7020  D0F07800  D0807000  E2D7D3D4  F0F0F0F7*
02E3E7E3  400001F8  40400038  40400001  D0F458F0  D1304110  D04C05EF
5800D0B8  12004780  D25A6800  D1186000  D1381834  89300003  5850D0B8
89500003  18741883  189A18B5  1A761A8A  E2D7D3D4  F0F0F0F8*
02E3E7E3  40000230  40400038  40400001  6829D110  28422C42  6040D150
2C422B66  7860D094  2C646060  D1582B66  7860D098  6C60D150  6840D158
2A462B66  7860D09C  6C60D138  2A462B66  E2D7D3D4  F0F0F0F9*
02E3E7E3  40000268  40400038  40400001  7860D0A0  2A467048  D0E06C20
D0607028  D0E4879A  D2045070  D0BC7800  D0E87000  D0B07800  D0EC7000
D0C07800  D0E87000  D0B47800  D0EC7000  E2D7D3D4  F0F0F1F0**
02E3E7E3  400002A0  40400038  40400001  D0C45820  D0BC8920  00035880
D14C18B2  7868D0E0  7960D0B0  47C0D29C  7808D0E4  7000D0C0  7960D0B0
47C0D2A8  7060D0B0  7960D0B4  47A0D2B8  E2D7D3D4  F0F0F1F1*
02E3E7E3  400002D8  40400038  40400001  7808D0E4  7000D0C4  7960D0B4
47A0D2C4  7060D0B4  878AD288  1BFF58E0  D00007FE  58A0D004  58E0A00C
58B0A018  5810B010  7820D0B0  70201000  E2D7D3D4  F0F0F1F2*
02E3E7E3  40000310  40400038  40400001  5820B014  7840D0C0  70402000
5830B018  7860D0B4  70603000  5840B01C  7800D0C4  70004000  18DA92FF
A00C982C  A01C07FE  987B1000  78207000  E2D7D3D4  F0F0F1F3*
02E3E7E3  40000348  40400038  40400001  7020D094  78208000  7020D098
78209000  7020D09C  7820A000  7020D0A0  7820B000  7020D0B0  98791014
78207000  7020D0C0  78208000  7020D0B4  E2D7D3D4  F0F0F1F4*
02E3E7E3  40000380  4040000C  40400001  78209000  7020D0C4  47F0D160
40404040  40404040  40404040  40404040  40404040  40404040  40404040
```

| | | | | | | |
|---|---|---|---|---|---|---|
| 40404040 | 40404040 | 40404040 | 40404040 | E2D7D3D4 | F0F0F1F5* | |
| 02E3E7E3 | 40000020 | 4040000C | 40400001 | 00000340 | 00000028 | 000002F8 |
| 40404040 | 40404040 | 40404040 | 40404040 | 40404040 | 40404040 | 40404040 |
| 40404040 | 40404040 | 40404040 | 40404040 | E2D7D3D4 | F0F0F1F6* | |
| 02E3E7E3 | 40000074 | 40400010 | 40400001 | 000000F8 | 00000100 | 00000108 |
| 00000140 | 40404040 | 40404040 | 40404040 | 40404040 | 40404040 | 40404040 |
| 40404040 | 40404040 | 40404040 | 40404040 | E2D7D3D4 | F0F0F1F7* | |
| 02D9D3C4 | 40404040 | 40400038 | 40404040 | 00020001 | 1C000158 | 00010001 |
| 0C000020 | 00010001 | 0C000024 | 00010001 | 0C000028 | 00010001 | 0C000074 |
| 00010001 | 0C000078 | 00010001 | 0C00007C | E2D7D3D4 | F0F0F1F8* | |
| 02E3E7E3 | 40000084 | 40400004 | 40400001 | 800000E0 | 40404040 | 40404040 |
| 40404040 | 40404040 | 40404040 | 40404040 | 40404040 | 40404040 | 40404040 |
| 40404040 | 40404040 | 40404040 | 40404040 | E2D7D3D4 | F0F0F1F9* | |
| 02E3E7E3 | 4000015C | 4040002C | 40400001 | 00000000 | 00000000 | 00000000 |

MEMBER NAME SPLMAX

| | | | | | | |
|---|---|---|---|---|---|---|
| 00000000 | 00000000 | 00000000 | 00000010 | 00000000 | 00000000 | 00000000 |
| 00000000 | 40404040 | 40404040 | 40404040 | E2D7D3D4 | F0F0F2F0** | |
| 02D9D3C4 | 40404040 | 40400010 | 40404040 | 00010001 | 0C000080 | 00010001 |
| 0C000084 | 40404040 | 40404040 | 40404040 | 40404040 | 40404040 | 40404040 |
| 40404040 | 40404040 | 40404040 | 40404040 | E2D7D3D4 | F0F0F2F1* | |
| 02C5D5C4 | 40404040 | 40404040 | 40404040 | 40404040 | 40404040 | 40404040 |
| 0000038C | F1F5F7F3 | F460C6D6 | F34040F0 | F2F0F2F8 | F7F0F9F8 | 40F0F84B |
| F4F44BF1 | F5404040 | E2D7D3D4 | C1E74040 | E2D7D3D4 | F0F0F2F2** | |

MEMBER NAME SPLTXT

| | | | | | | |
|---|---|---|---|---|---|---|
| 02C5E2C4 | 40404040 | 40400010 | 40400001 | E2D7D3E3 | E7E34040 | 00000000 |
| 40000000 | 40404040 | 40404040 | 40404040 | 40404040 | 40404040 | 40404040 |
| 40404040 | 40404040 | 40404040 | 40404040 | E2D7D3E3 | F0F0F0F1* | |
| 02E3E7E3 | 40000000 | 40400038 | 40400001 | 47F0F00C | 07E2D7D3 | E3E7E340 |
| 90ECD00C | 184D98CD | F0205040 | D00450D0 | 400807FC | 40404040 | 40404040 |
| 021A2040 | D9C1D9D9 | E840C6E4 | D3D340C9 | E2D7D3E3 | F0F0F0F2* | |
| 02E3E7E3 | 40000038 | 40400038 | 40400001 | D540E2E4 | C2D9D6E4 | E3C9D5C5 |
| 40E2D7D3 | E3E7E322 | 021A2540 | C5D9D9D6 | D940C9D5 | 40C2C3E2 | D3C9C240 |
| C9D540E2 | D7D3E3E7 | E340E2E4 | C2D9D6E4 | E2D7D3E3 | F0F0F0F3* | |
| 02E3E7E3 | 40000070 | 40400005 | 40400001 | E3C9D5C5 | 22404040 | 40404040 |
| 40404040 | 40404040 | 40404040 | 40404040 | 40404040 | 40404040 | 40404040 |
| 40404040 | 40404040 | 40404040 | 40404040 | E2D7D3E3 | F0F0F0F4* | |
| 02E3E7E3 | 40000078 | 40400020 | 40400001 | 40404040 | 40404040 | F9404040 |
| 40404040 | F0404040 | 40404040 | 60404040 | 40404040 | 40404040 | 40404040 |
| 40404040 | 40404040 | 40404040 | 40404040 | E2D7D3E3 | F0F0F0F5* | |
| 02E3E7E3 | 40000180 | 40400038 | 40400001 | 00000000 | 00000000 | 4E000000 |
| 00000000 | 4F080000 | 00000000 | 4E000000 | 80000000 | 00000000 | 00000000 |
| 00000000 | 00000001 | 00000001 | 00000190 | E2D7D3E3 | F0F0F0F6* | |
| 02C5E2C4 | 40404040 | 40400010 | 40400002 | C6D3E340 | 40404040 | 02000000 |
| 40000000 | 40404040 | 40404040 | 40404040 | 40404040 | 40404040 | 40404040 |
| 40404040 | 40404040 | 40404040 | 40404040 | E2D7D3E3 | F0F0F0F7* | |
| 02E3E7E3 | 400001B8 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E2D7D3E3 | F0F0F0F8* | |
| 02C5E2C4 | 40404040 | 40400010 | 40400003 | C9E2D9C3 | C8404040 | 02000000 |
| 40000000 | 40404040 | 40404040 | 40404040 | 40404040 | 40404040 | 40404040 |
| 40404040 | 40404040 | 40404040 | 40404040 | E2D7D3E3 | F0F0F0F9* | |
| 02E3E7E3 | 40000220 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E2D7D3E3 | F0F0F1F0** | |
| 02C5E2C4 | 40404040 | 40400010 | 40400004 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | E2D7D3E3 | F0F0F1F1* | |

```
02C5E2C4  40404040  40400010  40400005  C9C2C3D6  D47B4040  02000000
40000000  40404040  40404040  40404040  40404040  40404040  40404040
40404040  40404040  40404040  40404040  E2D7D3E3  F0F0F1F2*
02E3E7E3  4000022C  4040000C  40400001  00000000  00000000  00000000
40404040  40404040  40404040  40404040  40404040  40404040  40404040
40404040  40404040  40404040  40404040  E2D7D3E3  F0F0F1F3*
02C5E2C4  40404040  40400010  40400006  D2D6D4D7  D9E54040  02000000
40000000  40404040  40404040  40404040  40404040  40404040  40404040
40404040  40404040  40404040  40404040  E2D7D3E3  F0F0F1F4*
02E3E7E3  4000023C  40400008  40400001  00000000  00000000  40404040
40404040  40404040  40404040  40404040  40404040  40404040  40404040
40404040  40404040  40404040  40404040  E2D7D3E3  F0F0F1F5*
02E3E7E3  40000258  40400038  40400001  5860D118  5850D120  5800D10C
5000D154  7800D110  7000D14C  5060D140  5800D108  5000D170  5840D114
58A0D10C  58B0D18C  5800D140  5900D148  E2D7D3E3  F0F0F1F6*
02E3E7E3  40000290  40400038  40400001  47C0D204  1BFF58E0  D00007FE
58F0D194  4110D06C  05EF41E0  000415FE  4720D21E  58EFD04C  07FE5800
D1301200  4770D230  1BFF58E0  D00007FE  E2D7D3E3  F0F0F1F7*
02E3E7E3  400002C8  40400038  40400001  8645D29E  5800D170  8605D2A2
58F0D194  4110D080  05EF41E0  000415FE  4720D256  58EFD054  07FE5830
D1301B36  5030D138  5930D134  41300001  E2D7D3E3  F0F0F1F8*
02E3E7E3  40000300  40400038  40400001  4760D26E  1B335030  D1B059A0
D1344120  00014780  D2801B22  16235020  D1B48725  D28E5840  D1145800
D1B48605  D2A25800  D1145000  D1705840  E2D7D3E3  F0F0F1F9*
02E3E7E3  40000338  40400038  40400001  D1085820  D1301A26  5020D150

MEMBER NAME  SPLTXT
183A50A0  D144188A  189318A2  410AB000  5000D094  58F0D1A8  4110D094
05EF5090  D14441E0  000415FE  4720D2DE  E2D7D3E3  F0F0F2F0**
02E3E7E3  40000370  40400038  40400001  58EFD05C  07FE410A  B0005000
D0AC58F0  D1A84110  D0AC05EF  5090D144  41E00004  15FE4720  D30458EF
D06407FE  5980D164  41300001  4720D312  E2D7D3E3  F0F0F2F1*
02E3E7E3  400003A8  40400038  40400001  1B335980  D1684120  00014740
D3201B22  16321998  41700001  4780D32E  1B771437  8735D33C  5090D144
47F0D4AE  59A0D148  41300001  4720D34A  E2D7D3E3  F0F0F2F2*
02E3E7E3  400003E0  40400038  40400001  1B331827  14238725  D35A5090
D14447F0  D4AE59A0  D14847C0  D36A5090  D14447F0  D3B85800  D1641200
47A0D37C  5090D144  47F0D3B8  5800D168  E2D7D3E3  F0F0F2F3*
02E3E7E3  40000418  40400038  40400001  120047C0  D38E5090  D14447F0
D3B85A90  D1184109  D1735000  D0C8410A  B0005000  D0CC9280  D0CC58F0
D1984110  D0C405EF  5AA0D118  47F0D2B8  E2D7D3E3  F0F0F2F4*
02E3E7E3  40000450  40400038  40400001  58A0D10C  7800D14C  7000D160
58F0D188  4110D0D0  05EF5800  D1541A06  5000D154  5900D11C  47C0D3E4
47F0D508  5820D154  89200002  7800D14C  E2D7D3E3  F0F0F2F5*
02E3E7E3  40000488  40400038  40400001  58F0D19C  7002F000  8645D4C6
5800D170  8705D4C6  2B007800  D1606A00  D0F86000  D0E85820  D0EC5020
D1BC1A26  5020D158  2B007800  D14C6A00  E2D7D3E3  F0F0F2F6*
02E3E7E3  400004C0  40400038  40400001  D0F86000  D0E85820  D0EC5020
D1B81802  1B065000  D13C7800  D1607900  D14C47C0  D4501A26  5020D158
7800D160  7900D14C  47C0D466  5800D1BC  E2D7D3E3  F0F0F2F7*
02E3E7E3  400004F8  40400038  40400001  1B065000  D13C5870  D11C5890
D15818A6  58B0D13C  5880D19C  5800D154  1A0A5000  D1541907  47C0D48C
47F0D508  18095700  D1045000  D0F46820  E2D7D3E3  F0F0F2F8*
02E3E7E3  40000530  40400038  40400001  D0F06B20  D1005820  D1548920
00027022  8000879A  D47858B0  D18C58A0  D10C5800  D1085000  D1705840
D11447F0  D4CA5840  D1081896  58B0D144  E2D7D3E3  F0F0F2F9*
02E3E7E3  40000568  40400038  40400001  4109D173  5000D0E0  58F0D198
4110D0DC  05EF5A90  D118199B  47C0D4D0  58B0D18C  5800D144  5A00D150
5000D140  47F0D1F0  1BFF58E0  D00007FE  E2D7D3E3  F0F0F3F0**
```

```
02E3E7E3  400005A0  40400038  40400001  58F0D1A4  45E0F004  00000006
00000028  45E0F010  58F0D1A4  45E0F034  05404040  F4F458F0  D1A41800
45E0F004  00000006  0000004C  45E0F010  E2D7D3E3  F0F0F3F1*
02E3E7E3  400005D8  40400038  40400001  58F0D1A4  45E0F034  05404040
F1F558A0  D00458E0  A00C58B0  A0185810  B0045820  D1485020  10005830
B0084340  D1284240  30005850  B0105860  E2D7D3E3  F0F0F3F2*
02E3E7E3  40000610  40400038  40400001  D1545060  500018DA  92FFA00C
982CA01C  07FE987A  10045820  70005020  D1484320  80004220  D1285820
A0005020  D1545820  10004130  20004150  E2D7D3E3  F0F0F3F3*
02E3E7E3  40000648  4040002E  40400001  00011B25  5020D18C  5030D190
5030D06C  5030D080  5820100C  41302000  41500004  1B255020  D19C5030
D1A047F0  D1C04040  40404040  40404040  E2D7D3E3  F0F0F3F4*
02E3E7E3  40000020  40400004  40400001  00000622  40404040  40404040
40404040  40404040  40404040  40404040  40404040  40404040  40404040
40404040  40404040  40404040  40404040  E2D7D3E3  F0F0F3F5*
02D9D3C4  40404040  40400038  40404040  00020001  1C000220  00030001
1C00022C  00040001  1C000230  00050001  1C00023C  00060001  1C000240
00010001  0C0005AC  00010001  0C0005D0  E2D7D3E3  F0F0F3F6*
02E3E7E3  40000024  40400004  40400001  00000098  40404040  40404040
40404040  40404040  40404040  40404040  40404040  40404040  40404040
40404040  40404040  40404040  40404040  E2D7D3E3  F0F0F3F7*
02E3E7E3  40000098  40400004  40400001  000005E6  40404040  40404040
40404040  40404040  40404040  40404040  40404040  40404040  40404040
40404040  40404040  40404040  40404040  E2D7D3E3  F0F0F3F8*
02E3E7E3  400000E4  40400014  40400001  000002B6  00000598  000002EE
00000598  00000376  40404040  40404040  40404040  40404040  40404040

MEMBER NAME  SPLTXT
40404040  40404040  40404040  40404040  E2D7D3E3  F0F0F3F9*
02D9D3C4  40404040  40400038  40404040  00010001  0C000020  00010001
0C000024  00010001  0C000098  00010001  0C0000E4  00010001  0C0000E8
00010001  0C0000EC  00010001  0C0000F0  E2D7D3E3  F0F0F4F0**
02E3E7E3  400000F8  4040000C  40400001  000005C2  0000039C  000005C2
40404040  40404040  40404040  40404040  40404040  40404040  40404040
40404040  40404040  40404040  40404040  E2D7D3E3  F0F0F4F1*
02E3E7E3  40000108  40400010  40400001  000001D8  000001E0  000001C0
800001C8  40404040  40404040  40404040  40404040  40404040  40404040
40404040  40404040  40404040  40404040  E2D7D3E3  F0F0F4F2*
02D9D3C4  40404040  40400038  40404040  00010001  0C0000F4  00010001
0C0000F8  00010001  0C0000FC  00010001  0C000100  00010001  0C000108
00010001  0C00010C  00010001  0C000110  E2D7D3E3  F0F0F4F3*
02E3E7E3  4000011C  40400010  40400001  000001D8  000001E0  00000090
800001CC  40404040  40404040  40404040  40404040  40404040  40404040
40404040  40404040  40404040  40404040  E2D7D3E3  F0F0F4F4*
02E3E7E3  40000130  4040000C  40400001  000001B0  00000088  000001B0
40404040  40404040  40404040  40404040  40404040  40404040  40404040
40404040  40404040  40404040  40404040  E2D7D3E3  F0F0F4F5*
02D9D3C4  40404040  40400038  40404040  00010001  0C000114  00010001
0C00011C  00010001  0C000120  00010001  0C000124  00010001  0C000128
00010001  0C000130  00010001  0C000134  E2D7D3E3  F0F0F4F6*
02E3E7E3  4000013C  40400008  40400001  000001B0  800001FC  40404040
40404040  40404040  40404040  40404040  40404040  40404040  40404040
40404040  40404040  40404040  40404040  E2D7D3E3  F0F0F4F7*
02E3E7E3  40000148  40400014  40400001  000001B0  00000080  000001B0
000001B0  80000200  40404040  40404040  40404040  40404040  40404040
40404040  40404040  40404040  40404040  E2D7D3E3  F0F0F4F8*
02D9D3C4  40404040  40400038  40404040  00010001  0C000138  00010001
0C00013C  00010001  0C000140  00010001  0C000148  00010001  0C00014C
00010001  0C000150  00010001  0C000154  E2D7D3E3  F0F0F4F9*
```

| | | | | | | |
|---|---|---|---|---|---|---|
| 02E3E7E3 | 4000015C | 40400004 | 40400001 | 000001B0 | 40404040 | 40404040 |
| 40404040 | 40404040 | 40404040 | 40404040 | 40404040 | 40404040 | 40404040 |
| 40404040 | 40404040 | 40404040 | 40404040 | E2D7D3E3 | F0F0F5F0** | |
| 02E3E7E3 | 40000164 | 40400014 | 40400001 | 80000000 | 0000020C | 000001DC |
| 800001E4 | 000001B0 | 40404040 | 40404040 | 40404040 | 40404040 | 40404040 |
| 40404040 | 40404040 | 40404040 | 40404040 | E2D7D3E3 | F0F0F5F1* | |
| 02E3E7E3 | 4000017C | 40400004 | 40400001 | 80000078 | 40404040 | 40404040 |
| 40404040 | 40404040 | 40404040 | 40404040 | 40404040 | 40404040 | 40404040 |
| 40404040 | 40404040 | 40404040 | 40404040 | E2D7D3E3 | F0F0F5F2* | |
| 02E3E7E3 | 40000244 | 40400014 | 40400001 | 00000000 | 00000000 | 00000000 |
| 00000000 | 00000000 | 40404040 | 40404040 | 40404040 | 40404040 | 40404040 |
| 40404040 | 40404040 | 40404040 | 40404040 | E2D7D3E3 | F0F0F5F3* | |
| 02D9D3C4 | 40404040 | 40400038 | 40404040 | 00010001 | 0C000158 | 00010001 |
| 0C00015C | 00010001 | 0C000168 | 00010001 | 0C00016C | 00010001 | 0C000170 |
| 00010001 | 0C000174 | 00010001 | 0C00017C | E2D7D3E3 | F0F0F5F4* | |
| 02C5D5C4 | 40404040 | 40404040 | 40404040 | 40404040 | 40404040 | 40404040 |
| 00000676 | F1F5F7F3 | F460C6D6 | F34040F0 | F2F0F2F8 | F7F0F9F8 | 40F0F84B |
| F4F44BF2 | F0404040 | E2D7D3E3 | E7E34040 | E2D7D3E3 | F0F0F5F5** | |

MEMBER NAME SSTICK

| | | | | | | |
|---|---|---|---|---|---|---|
| 02C5E2C4 | 40404040 | 40400010 | 40400001 | E2E2E3C9 | C3D24040 | 00000000 |
| 40000000 | 40404040 | 40404040 | 40404040 | 40404040 | 40404040 | 40404040 |
| 40404040 | 40404040 | 40404040 | 40404040 | E2E2E3C9 | F0F0F0F1* | |
| 02E3E7E3 | 40000000 | 40400028 | 40400001 | 47F0F00C | 07E2E2E3 | C9C3D240 |
| 90ECD00C | 184D98CD | F0205040 | D00450D0 | 400807FC | 40404040 | 40404040 |
| 40404040 | 40404040 | 40404040 | 40404040 | E2E2E3C9 | F0F0F0F2* | |
| 02E3E7E3 | 400000C8 | 40400038 | 40400001 | 00000000 | 00000000 | 4E000000 |
| 00000000 | 4F080000 | 00000000 | 4E000000 | 80000000 | 00000000 | 00000001 |
| 00000002 | 00000003 | 00000004 | 00000006 | E2E2E3C9 | F0F0F0F3* | |
| 02C5E2C4 | 40404040 | 40400010 | 40400002 | C5D3D4E3 | C2D34040 | 05000000 |
| 400D7D28 | 40404040 | 40404040 | 40404040 | 40404040 | 40404040 | 40404040 |
| 40404040 | 40404040 | 40404040 | 40404040 | E2E2E3C9 | F0F0F0F4* | |
| 02E3E7E3 | 40000100 | 40400020 | 40400001 | 0000000C | 00000016 | 00000018 |
| 00000020 | 0000002C | 00000038 | 00000000 | 00000000 | 40404040 | 40404040 |
| 40404040 | 40404040 | 40404040 | 40404040 | E2E2E3C9 | F0F0F0F5* | |
| 02C5E2C4 | 40404040 | 40400010 | 40400003 | C2E2D6D9 | E3404040 | 02000000 |
| 40000000 | 40404040 | 40404040 | 40404040 | 40404040 | 40404040 | 40404040 |
| 40404040 | 40404040 | 40404040 | 40404040 | E2E2E3C9 | F0F0F0F6* | |
| 02E3E7E3 | 40000170 | 40400014 | 40400001 | FFFFFFC8 | 000CD118 | 0000DA70 |
| 00000000 | 00000000 | 40404040 | 40404040 | 40404040 | 40404040 | 40404040 |
| 40404040 | 40404040 | 40404040 | 40404040 | E2E2E3C9 | F0F0F0F7* | |
| 02E3E7E3 | 40000188 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F0F8* | |
| 02E3E7E3 | 40000190 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F0F9* | |
| 02E3E7E3 | 40000198 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F1F0** | |
| 02C5E2C4 | 40404040 | 40400010 | 40400004 | E2E3D2C2 | D3C44040 | 02000000 |
| 40000000 | 40404040 | 40404040 | 40404040 | 40404040 | 40404040 | 40404040 |
| 40404040 | 40404040 | 40404040 | 40404040 | E2E2E3C9 | F0F0F1F1* | |
| 02E3E7E3 | 400001A0 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F1F2* | |
| 02C5E2C4 | 40404040 | 40400010 | 40400005 | E2E3D2D4 | D6C44040 | 02000000 |
| 40000000 | 40404040 | 40404040 | 40404040 | 40404040 | 40404040 | 40404040 |
| 40404040 | 40404040 | 40404040 | 40404040 | E2E2E3C9 | F0F0F1F3* | |

| | | | | | | |
|---|---|---|---|---|---|---|
| 02E3E7E3 | 400001A8 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F1F4* | |
| 02E3E7E3 | 40000150 | 40400020 | 40400001 | 00000015 | 00000004 | C6D34040 |
| C1404040 | 00000011 | 00000004 | C6D34040 | C1404040 | 40404040 | 40404040 |
| 40404040 | 40404040 | 40404040 | 40404040 | E2E2E3C9 | F0F0F1F5* | |
| 02E3E7E3 | 400001E0 | 40400038 | 40400001 | 5870D170 | 5880D178 | 58B0D14C |
| 58A0D0C4 | 5890D0D8 | 5860D1B4 | 50A0D120 | 5800D114 | 12004770 | D1E61BFF |
| 58E0D000 | 07FE58F0 | D1544110 | D04C05EF | E2E2E3C9 | F0F0F1F6* | |
| 02E3E7E3 | 40000218 | 40400038 | 40400001 | 50A0B030 | 183A50A0 | D1042B00 |
| 78067000 | 6A00D0B0 | 6000D0A0 | 5820D0A4 | 50A0B030 | 10425040 | B0381843 |
| 18521869 | 5870D1B4 | 188918BA | 58A0D14C | E2E2E3C9 | F0F0F1F7* | |
| 02E3E7E3 | 40000250 | 40400038 | 40400001 | 2B0058F0 | D1707807 | F0006A00 |
| D0B06000 | D0A05890 | D0A41995 | 4780D266 | 183B5B36 | A0245036 | A0285A40 |
| D0C45A80 | D0D85A60 | D0D850B8 | A0241859 | E2E2E3C9 | F0F0F1F8* | |
| 02E3E7E3 | 40000288 | 40400038 | 40400001 | 10295028 | A02C5AB0 | D0C45A70 |
| D19C59B0 | D11847C0 | D2285040 | D1045870 | D1705880 | D17858B0 | D14C58A0 |
| D0C45890 | D0D85860 | D1B41859 | 5C40D104 | E2E2E3C9 | F0F0F1F9* | |
| 02E3E7E3 | 400002C0 | 40400038 | 40400001 | 5820D118 | 5B25B024 | 1A2A5025 |

MEMBER NAME SSTICK

| | | | | | | |
|---|---|---|---|---|---|---|
| B0285800 | D0D05000 | D1945800 | D19C5000 | D1901825 | 5050D1B0 | 186918A2 |
| 18B91897 | 5880D148 | 5800D1A8 | 5000D1A4 | E2E2E3C9 | F0F0F2F0** | |
| 02E3E7E3 | 400002F8 | 40400038 | 40400001 | 5830D0C4 | 5870D1AC | 58B0D178 |
| 58A0D14C | 5806A02C | 5700D0BC | 5000D0AC | 6820D0A8 | 6B20D0B8 | 58E0D1A4 |
| 792EB000 | 4770D36A | 5800D0C0 | 5000D11C | E2E2E3C9 | F0F0F2F1* | |
| 02E3E7E3 | 40000330 | 40400038 | 40400001 | 5856A024 | 5C40D19C | 18255A20 |
| D0D04102 | 90005000 | D0604106 | A0285000 | D0644107 | B0005000 | D07C58F0 |
| D1804110 | D06005EF | 5800D11C | 12004780 | E2E2E3C9 | F0F0F2F2* | |
| 02E3E7E3 | 40000368 | 40400038 | 40400001 | D36A5856 | A0245C40 | D1901825 |
| 5A20D1A0 | 41029000 | 5000D088 | 4107B000 | 5000D08C | 58F0D184 | 4110D088 |
| 05EF5A30 | D0C45A70 | D0E05800 | D1A45A00 | E2E2E3C9 | F0F0F2F3* | |
| 02E3E7E3 | 400003A0 | 40400038 | 40400001 | D0E05000 | D1A45930 | D11447C0 |
| D2E058B0 | D0D858A0 | D1B01A6B | 196A47C0 | D2C85870 | D1705880 | D17858B0 |
| D14C58A0 | D0C45890 | D0D85860 | D1B41BFF | E2E2E3C9 | F0F0F2F4* | |
| 02E3E7E3 | 400003D8 | 40400038 | 40400001 | 58E0D000 | 07FE58A0 | D00458E0 |
| A00C58B0 | A0185810 | B00C5820 | D1105020 | 10005830 | B0145840 | D10C5040 |
| 30005850 | B0205860 | D1145060 | 500018DA | E2E2E3C9 | F0F0F2F5* | |
| 02E3E7E3 | 40000410 | 40400038 | 40400001 | 92FFA00C | 982CA01C | 07FE987B |
| 10045820 | 70005020 | D1185820 | 90005020 | D110987A | 10145820 | 70005020 |
| D10C5820 | A0005020 | D1145820 | 10004130 | E2E2E3C9 | F0F0F2F6* | |
| 02E3E7E3 | 40000448 | 40400038 | 40400001 | 20004150 | 00041B25 | 5C40D0DC |
| 1B255020 | D1705030 | D1745820 | 10084130 | 20004150 | 00041B25 | 5C40D0C8 |
| 1B255020 | D1585030 | D15C5030 | D0685820 | E2E2E3C9 | F0F0F2F7* | |
| 02E3E7E3 | 40000480 | 40400038 | 40400001 | 10104130 | 20004150 | 00041B25 |
| 5C40D0C8 | 1B255020 | D1605030 | D1645030 | D0705820 | 10184130 | 20004150 |
| 00041B25 | 5C40D0D0 | 1B255020 | D1685030 | E2E2E3C9 | F0F0F2F8* | |
| 02E3E7E3 | 400004B8 | 4040002A | 40400001 | D16C5030 | D0785820 | 101C4130 |
| 20004150 | 00041B25 | 5C40D0D4 | 1B255020 | D1785030 | D17C5030 | D05447F0 |
| D1B84040 | 40404040 | 40404040 | 40404040 | E2E2E3C9 | F0F0F2F9* | |
| 02E3E7E3 | 40000020 | 40400008 | 40400001 | 0000041A | 00000028 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F3F0** | |
| 02D9D3C4 | 40404040 | 40400038 | 40404040 | 00020001 | 0C000170 | 00020001 |
| 0C000174 | 00020001 | 0C000178 | 00030001 | 1C00017C | 00040001 | 1C0001A8 |
| 00050001 | 1C0001AC | 00010001 | 0C000020 | E2E2E3C9 | F0F0F3F1* | |
| 02E3E7E3 | 40000028 | 40400004 | 40400001 | 000003DE | 40404040 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F3F2* | |

| | | | | | | |
|---|---|---|---|---|---|---|
| 02E3E7E3 | 40000074 | 40400008 | 40400001 | 00000150 | 000000F0 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F3F3* | |
| 02E3E7E3 | 40000080 | 40400008 | 40400001 | 00000108 | 8000013C | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F3F4* | |
| 02E3E7E3 | 40000094 | 40400004 | 40400001 | 00000138 | 40404040 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F3F5* | |
| 02E3E7E3 | 4000009C | 40400004 | 40400001 | 00000134 | 40404040 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F3F6* | |
| 02D9D3C4 | 40404040 | 40400038 | 40404040 | 00010001 | 0C000024 | 00010001 |
| 0C000028 | 00010001 | 0C000074 | 00010001 | 0C000078 | 00010001 | 0C000080 |
| 00010001 | 0C000084 | 00010001 | 0C000094 | E2E2E3C9 | F0F0F3F7* | |
| 02E3E7E3 | 400000A8 | 40400008 | 40400001 | 00000004 | 80000144 | 40404040 |
| 40404040 | 40404040 | 40404040 | 40404040 | 40404040 | 40404040 | 40404040 |
| 40404040 | 40404040 | 40404040 | 40404040 | E2E2E3C9 | F0F0F3F8* | |
| 02E3E7E3 | 400000B8 | 40400010 | 40400001 | 00000004 | 00000144 | 0000DA8C |
| 80000148 | 40404040 | 40404040 | 40404040 | 40404040 | 40404040 | 40404040 |

MEMBER NAME SSTICK

| | | | | | | |
|---|---|---|---|---|---|---|
| 40404040 | 40404040 | 40404040 | 40404040 | E2E2E3C9 | F0F0F3F9* | |
| 02E3E7E3 | 400001B0 | 40400030 | 40400001 | 00000000 | 00000000 | 00000000 |
| 00000000 | 00000000 | 00000058 | 00000008 | 00000000 | 00000030 | 0000001C |
| 00000000 | 00000060 | 40404040 | 40404040 | E2E2E3C9 | F0F0F4F0** | |
| 02D9D3C4 | 40404040 | 40400038 | 40404040 | 00010001 | 0C00009C | 00020001 |
| 0C0000A8 | 00010001 | 0C0000AC | 00020001 | 0C0000B8 | 00010001 | 0C0000BC |
| 00020001 | 0C0000C0 | 00010001 | 0C0000C4 | E2E2E3C9 | F0F0F4F1* | |
| 02C5D5C4 | 40404040 | 40404040 | 40404040 | 40404040 | 40404040 | 40404040 |
| 000004E2 | F1F5F7F3 | F460C6D6 | F34040F0 | F2F0F2F8 | F7F0F9F8 | 40F0F84B |
| F4F44BF2 | F4404040 | E2E2E3C9 | C3D24040 | E2E2E3C9 | F0F0F4F2** | |

MEMBER NAME STKBLD

| | | | | | | |
|---|---|---|---|---|---|---|
| 02C5E2C4 | 40404040 | 40400010 | 40400001 | E2E3D2C2 | D3C44040 | 00000000 |
| 40000000 | 40404040 | 40404040 | 40404040 | 40404040 | 40404040 | 40404040 |
| 40404040 | 40404040 | 40404040 | 40404040 | E2E3D2C2 | F0F0F0F1* | |
| 02E3E7E3 | 40000000 | 40400028 | 40400001 | 47F0F00C | 07E2E3D2 | C2D3C440 |
| 90ECD00C | 184D98CD | F0205040 | D00450D0 | 400807FC | 40404040 | 40404040 |
| 40404040 | 40404040 | 40404040 | 40404040 | E2E3D2C2 | F0F0F0F2* | |
| 02E3E7E3 | 40000130 | 40400038 | 40400001 | 00000000 | 00000000 | 4E000000 |
| 00000000 | 4F080000 | 00000000 | 4E000000 | 80000000 | 00000000 | 00000000 |
| 00000001 | 00000002 | 00000003 | 00000004 | E2E3D2C2 | F0F0F0F3* | |
| 02C5E2C4 | 40404040 | 40400010 | 40400002 | C2E2D6D9 | E3404040 | 02000000 |
| 40000000 | 40404040 | 40404040 | 40404040 | 40404040 | 40404040 | 40404040 |
| 40404040 | 40404040 | 40404040 | 40404040 | E2E3D2C2 | F0F0F0F4* | |
| 02E3E7E3 | 40000168 | 4040002C | 40400001 | 00000005 | 00000006 | 00000007 |
| 00000008 | 00000010 | 00000015 | 00000016 | 40400000 | 41200000 | 00000000 |
| 00000000 | 40404040 | 40404040 | 40404040 | E2E3D2C2 | F0F0F0F5* | |
| 02C5E2C4 | 40404040 | 40400010 | 40400003 | C4C5D9D6 | E3404040 | 02000000 |
| 40000000 | 40404040 | 40404040 | 40404040 | 40404040 | 40404040 | 40404040 |
| 40404040 | 40404040 | 40404040 | 40404040 | E2E3D2C2 | F0F0F0F6* | |
| 02C5E2C4 | 40404040 | 40400010 | 40400004 | C4D3D3C9 | D4404040 | 02000000 |
| 40000000 | 40404040 | 40404040 | 40404040 | 40404040 | 40404040 | 40404040 |
| 40404040 | 40404040 | 40404040 | 40404040 | E2E3D2C2 | F0F0F0F7* | |
| 02C5E2C4 | 40404040 | 40400010 | 40400005 | C4E2D8D9 | E3404040 | 02000000 |
| 40000000 | 40404040 | 40404040 | 40404040 | 40404040 | 40404040 | 40404040 |
| 40404040 | 40404040 | 40404040 | 40404040 | E2E3D2C2 | F0F0F0F8* | |
| 02E3E7E3 | 40000BF0 | 40400014 | 40400001 | 00000000 | 00000000 | 00000000 |

```
00000000  00000000  40404040  40404040  40404040  40404040  40404040
40404040  40404040  40404040  40404040  E2E3D2C2  F0F0F0F9*
02E3E7E3  40000C08  40400004  40400001  00000000  40404040  40404040
40404040  40404040  40404040  40404040  40404040  40404040  40404040
40404040  40404040  40404040  40404040  E2E3D2C2  F0F0F1F0**
02C5E2C4  40404040  40400010  40400006  D4E5C3C8  D9404040  02000000
40000000  40404040  40404040  40404040  40404040  40404040  40404040
40404040  40404040  40404040  40404040  E2E3D2C2  F0F0F1F1*
02E3E7E3  40000C10  40400004  40400001  00000000  40404040  40404040
40404040  40404040  40404040  40404040  40404040  40404040  40404040
40404040  40404040  40404040  40404040  E2E3D2C2  F0F0F1F2*
02E3E7E3  40000C18  40400008  40400001  00000000  00000000  40404040
40404040  40404040  40404040  40404040  40404040  40404040  40404040
40404040  40404040  40404040  40404040  E2E3D2C2  F0F0F1F3*
02E3E7E3  40000C24  40400004  40400001  00000000  40404040  40404040
40404040  40404040  40404040  40404040  40404040  40404040  40404040
40404040  40404040  40404040  40404040  E2E3D2C2  F0F0F1F4*
02C5E2C4  40404040  40400010  40400007  C9D5E3C4  D9E54040  02000000
40000000  40404040  40404040  40404040  40404040  40404040  40404040
40404040  40404040  40404040  40404040  E2E3D2C2  F0F0F1F5*
02E3E7E3  40000C2C  40400004  40400001  00000000  40404040  40404040
40404040  40404040  40404040  40404040  40404040  40404040  40404040
40404040  40404040  40404040  40404040  E2E3D2C2  F0F0F1F6*
02C5E2C4  40404040  40400010  40400008  D4E5C3C8  D9D34040  02000000
40000000  40404040  40404040  40404040  40404040  40404040  40404040
40404040  40404040  40404040  40404040  E2E3D2C2  F0F0F1F7*
02C5E2C4  40404040  40400010  40400009  D7D9C3C4  D9E54040  02000000
40000000  40404040  40404040  40404040  40404040  40404040  40404040
40404040  40404040  40404040  40404040  E2E3D2C2  F0F0F1F8*
02E3E7E3  40000C34  4040000C  40400001  00000000  00000000  00000000
40404040  40404040  40404040  40404040  40404040  40404040  40404040
40404040  40404040  40404040  40404040  E2E3D2C2  F0F0F1F9*
02D9D3C4  40404040  40400038  40404040  00020001  1C000BF0  00030001

MEMBER NAME  STKBLD
1C000BF4  00040001  1C000BF8  00050001  1C000BFC  00060001  1C000C18
00070001  1C000C34  00080001  1C000C38  E2E3D2C2  F0F0F2F0**
02E3E7E3  4000021C  40400020  40400001  00000001  00000004  C6D34040
C1404040  00000005  00000004  C6D34040  C1404040  40404040  40404040
40404040  40404040  40404040  40404040  E2E3D2C2  F0F0F2F1*
02E3E7E3  40000580  40400010  40400001  00000001  00000004  C6D34040
C1404040  40404040  40404040  40404040  40404040  40404040  40404040
40404040  40404040  40404040  40404040  E2E3D2C2  F0F0F2F2*
02E3E7E3  40000CCC  40400038  40400001  58A0DBFC  58B0DBF4  5890DC80
7800D12C  7000D19C  7000D1A0  2B007809  A0006A00  D1186000  D1085800
D10C5000  D1BC4100  B0045000  D04C4100  E2E3D2C2  F0F0F2F3*
02E3E7E3  40000D04  40400038  40400001  B0085000  D0504100  B00C5000
D0544100  B0105000  D0584100  D5685000  D05C4100  D56C5000  D0604100
D5705000  D0644100  D5745000  D0689280  E2E3D2C2  F0F0F2F4*
02E3E7E3  40000D3C  40400038  40400001  D06858F0  DBD04110  D04C05EF
5800D130  5000D16C  5800D13C  5000DC58  5800DC30  5000DC54  5090DC6C
5800DC84  5000DC70  5800DC88  5000DC74  E2E3D2C2  F0F0F2F5*
02E3E7E3  40000D74  40400038  40400001  5800DC8C  5000DC78  5800DC90
5000DC7C  58B0DBE0  5890DBD8  5880DBF4  58E0DC6C  2B00780E  A0006A00
D1186000  D1085820  D10C5020  D1B85920  E2E3D2C2  F0F0F2F6*
02E3E7E3  40000DAC  40400038  40400001  D1BC4780  DD967800  D1A07000
D19C5020  D1BC58E0  DC70410E  A0005000  D0749280  D07458F0  DBF04110
D06C05EF  4850D1F0  5050D180  4800D1F2  E2E3D2C2  F0F0F2F7*
02E3E7E3  40000DE4  40400038  40400001  5000D17C  18755C60  D14C1827
```

```
5A20D13C  5020DC5C  5C40D150  18355A30  D13C4102  B0005000  D07C58F0
DBE84103  F0005000  D08058F0  DC0C4110  E2E3D2C2  F0F0F2F8*
02E3E7E3  40000E1C  40400038  40400001  D07805EF  78208004  7020D578
78208008  7020D57C  4102B000  5000D0A8  58F0DC14  4110D09C  05EF5800
D1845900  D1344770  DE485820  D1945A20  E2E3D2C2  F0F0F2F9*
02E3E7E3  40000E54  40400038  40400001  D1305020  D1948920  00034102
D5785000  D0B858F0  DBF04110  D0B405EF  7820800C  7020D578  78208010
7020D57C  58E0DC5C  410EB000  5000D0A8  E2E3D2C2  F0F0F3F0**
02E3E7E3  40000E8C  40400038  40400001  58F0DC14  4110D09C  05EF5800
D1845900  D1344770  DE9C5820  D1945A20  D1305020  D1948920  00034102
D5785000  D0B858F0  DBF04110  D0B405EF  E2E3D2C2  F0F0F3F1*
02E3E7E3  40000EC4  40400038  40400001  5800D194  12004780  C1A058F0
DBC84110  D0C005EF  5800D194  5900D130  4780C1A0  5820D194  8E200020
5D20D134  18035700  D1245000  D1146820  E2E3D2C2  F0F0F3F2*
02E3E7E3  40000EFC  40400038  40400001  D1106B20  D1202B00  38026A00
D1186000  D1085820  D10C8920  00015920  D1944780  DF727820  D5807A20
D5887D20  D1607020  D5787820  D5847A20  E2E3D2C2  F0F0F3F3*
02E3E7E3  40000F34  40400038  40400001  D58C7D20  D1607020  D57C58E0
DC5C410E  B0005000  D0A858F0  DC144110  D09C05EF  5800D184  5900D134
4780DF66  5820D194  5B20D130  89200003  E2E3D2C2  F0F0F3F4*
02E3E7E3  40000F6C  40400038  40400001  5020D1B0  4100D580  5000D0D8
4100D588  5000D0DC  9280D0DC  58F0DC10  4110D0D4  05EF5800  D1945B00
D1305000  D1945800  D1285000  D1A82B00  E2E3D2C2  F0F0F3F5*
02E3E7E3  40000FA4  40400038  40400001  78008004  6000D1D0  2B007800
80086000  D1E05820  D1948920  00035830  D1305860  D13C5870  D14C5880
D1285890  D1A858A0  D14C18B2  1A931A86  E2E3D2C2  F0F0F3F6*
02E3E7E3  40000FDC  40400038  40400001  2B227827  D5782B44  7847D57C
23226A20  D1D02C22  23446A40  D1E02C44  2A246020  DC9858F0  DBD44110
D0E005EF  7008D234  877ADFB0  5090D1A8  E2E3D2C2  F0F0F3F7*
02E3E7E3  40001014  40400038  40400001  5880DBF4  5890DBD8  58A0DBFC
58B0DBE0  58F0DBC8  4110D0E4  05EF58E0  DC74410E  A0005000  D0F858F0
DBCC4110  D0F805EF  5820D1A8  5B20D130  E2E3D2C2  F0F0F3F8*
02E3E7E3  4000104C  40400038  40400001  5020D1A8  5800D130  5000D170
5800DC1C  5000DC18  58E0DC78  780EA000  7000DC34  58E0DC7C  780EA000

MEMBER NAME  STKBLD
7000DC3C  5800D1B8  5700D124  5000D114  E2E3D2C2  F0F0F3F9*
02E3E7E3  40001084  40400038  40400001  6800D110  6B00D120  7000DC44
5800D190  89000002  5000DC4C  5800D13C  5000DC50  5830D130  5860DC1C
5880D14C  189258A0  D13C58B0  D1345820  E2E3D2C2  F0F0F4F0**
02E3E7E3  400010BC  40400038  40400001  D1701A23  58E0DC50  780ED234
7000DC20  89200002  7802D234  7000DC24  187A5880  DC1858B0  DC4C7840
D1A07860  D19C5890  DC045800  D1C41A03  E2E3D2C2  F0F0F4F1*
02E3E7E3  400010F4  40400038  40400001  5000D1C4  18501C46  18251A2A
7800DC20  70029000  18565C40  D1C41825  5A20D14C  7800DC24  70029000
18565C40  D1C41825  5A20DC28  70629000  E2E3D2C2  F0F0F4F2*
02E3E7E3  4000112C  40400038  40400001  7A60D15C  396447C0  C1103846
18585C40  D1C41825  5A20D150  7800DC34  70029000  7827D210  18585C40
D1C41825  5A20DC38  70229000  18585C40  E2E3D2C2  F0F0F4F3*
02E3E7E3  40001164  40400038  40400001  D1C41825  5A20DC2C  7800DC3C
70029000  18585C40  D1C41825  5A20DC40  7800D12C  70029000  18585C40
D1C41825  1A287800  DC447002  9000877A  E2E3D2C2  F0F0F4F4*
02E3E7E3  4000119C  40400038  40400001  C0C67040  D1A058B0  D1345890
D1A85880  D14C5800  DC501A08  5000DC50  5820D170  1A2B5020  D1701929
47C0C092  5880DBF4  5890DBD8  58A0DBFC  E2E3D2C2  F0F0F4F5*
02E3E7E3  400011D4  40400038  40400001  58B0DBE0  5820D16C  5A20D130
5020D16C  5800DC7C  5A00DC30  5000DC7C  5800DC78  5A00DC30  5000DC78
5800DC74  5A00DC30  5000DC74  5800DC70  E2E3D2C2  F0F0F4F6*
02E3E7E3  4000120C  40400038  40400001  5A00DC30  5000DC70  5800DC6C
```

| | | | | | | |
|---|---|---|---|---|---|---|
| 5A00DC30 | 5000DC6C | 5920D1C0 | 47C0DD68 | 58A0DBFC | 58B0DBF4 | 5890DC80 |
| 1BFF58E0 | D00007FE | 58A0D004 | 58E0A00C | E2E3D2C2 | F0F0F4F7* | |
| 02E3E7E3 | 40001244 | 40400038 | 40400001 | 58B0A018 | 5810B00C | 5820D1B4 |
| 50201000 | 5830B024 | 5840D1C4 | 50403000 | 18DA92FF | A00C982C | A01C07FE |
| 58C0D048 | 987B1004 | 58207000 | 5020D1C0 | E2E3D2C2 | F0F0F4F8* | |
| 02E3E7E3 | 4000127C | 40400038 | 40400001 | 58209000 | 5020D1B4 | 987B1014 |
| 58207000 | 5020D1AC | 58701024 | 58207000 | 5020D1C4 | 58201000 | 41302000 |
| 41500004 | 1B255C40 | D1581B25 | 5020DBFC | E2E3D2C2 | F0F0F4F9* | |
| 02E3E7E3 | 400012B4 | 40400038 | 40400001 | 5030DC00 | 58201008 | 41302000 |
| 41500004 | 1B255C40 | D1341B25 | 5020DBD8 | 5030DBDC | 5030D088 | 5030D0A0 |
| 58201010 | 41302000 | 41500004 | 1B255C40 | E2E3D2C2 | F0F0F5F0** | |
| 02E3E7E3 | 400012EC | 40400038 | 40400001 | D1341B25 | 5020DBE0 | 5030DBE4 |
| 58201018 | 41302000 | 41500004 | 1B255C40 | D13C1B25 | 5020DBE8 | 5030DBEC |
| 5820101C | 41302000 | 41500004 | 1B255020 | E2E3D2C2 | F0F0F5F1* | |
| 02E3E7E3 | 40001324 | 4040002A | 40400001 | DBF45030 | DBF85030 | D0785820 |
| 10204130 | 20004150 | 00041B25 | 5C40D14C | 1B255020 | DC045030 | DC0847F0 |
| DCA44040 | 40404040 | 40404040 | 40404040 | E2E3D2C2 | F0F0F5F2* | |
| 02E3E7E3 | 40000020 | 4040000C | 40400001 | 0000126C | 00000028 | 0000123C |
| 40404040 | 40404040 | 40404040 | 40404040 | 40404040 | 40404040 | 40404040 |
| 40404040 | 40404040 | 40404040 | 40404040 | E2E3D2C2 | F0F0F5F3* | |
| 02E3E7E3 | 40000070 | 40400004 | 40400001 | 00001028 | 40404040 | 40404040 |
| 40404040 | 40404040 | 40404040 | 40404040 | 40404040 | 40404040 | 40404040 |
| 40404040 | 40404040 | 40404040 | 40404040 | E2E3D2C2 | F0F0F5F4* | |
| 02E3E7E3 | 40000090 | 40400010 | 40400001 | 80000000 | 00000164 | 00000218 |
| 80000000 | 40404040 | 40404040 | 40404040 | 40404040 | 40404040 | 40404040 |
| 40404040 | 40404040 | 40404040 | 40404040 | E2E3D2C2 | F0F0F5F5* | |
| 02E3E7E3 | 400000AC | 40400004 | 40400001 | 000001A4 | 40404040 | 40404040 |
| 40404040 | 40404040 | 40404040 | 40404040 | 40404040 | 40404040 | 40404040 |
| 40404040 | 40404040 | 40404040 | 40404040 | E2E3D2C2 | F0F0F5F6* | |
| 02D9D3C4 | 40404040 | 40400038 | 40404040 | 00090001 | 1C000C3C | 00010001 |
| 0C000020 | 00010001 | 0C000024 | 00010001 | 0C000028 | 00010001 | 0C000070 |
| 00010001 | 0C000094 | 00010001 | 0C000098 | E2E3D2C2 | F0F0F5F7* | |
| 02E3E7E3 | 400000B4 | 40400014 | 40400001 | 000001DC | 00000590 | 000005A8 |
| 800001BC | 000005A0 | 40404040 | 40404040 | 40404040 | 40404040 | 40404040 |
| 40404040 | 40404040 | 40404040 | 40404040 | E2E3D2C2 | F0F0F5F8* | |

MEMBER NAME STKBLD

| | | | | | | |
|---|---|---|---|---|---|---|
| 02E3E7E3 | 400000CC | 40400004 | 40400001 | 000001DC | 40404040 | 40404040 |
| 40404040 | 40404040 | 40404040 | 40404040 | 40404040 | 40404040 | 40404040 |
| 40404040 | 40404040 | 40404040 | 40404040 | E2E3D2C2 | F0F0F5F9* | |
| 02E3E7E3 | 400000D4 | 40400004 | 40400001 | 000001A4 | 40404040 | 40404040 |
| 40404040 | 40404040 | 40404040 | 40404040 | 40404040 | 40404040 | 40404040 |
| 40404040 | 40404040 | 40404040 | 40404040 | E2E3D2C2 | F0F0F6F0** | |
| 02D9D3C4 | 40404040 | 40400038 | 40404040 | 00010001 | 0C0000AC | 00010001 |
| 0C0000B4 | 00010001 | 0C0000B8 | 00010001 | 0C0000BC | 00010001 | 0C0000C0 |
| 00010001 | 0C0000C4 | 00010001 | 0C0000CC | E2E3D2C2 | F0F0F6F1* | |
| 02E3E7E3 | 400000D8 | 40400008 | 40400001 | 800001AC | 00000174 | 40404040 |
| 40404040 | 40404040 | 40404040 | 40404040 | 40404040 | 40404040 | 40404040 |
| 40404040 | 40404040 | 40404040 | 40404040 | E2E3D2C2 | F0F0F6F2* | |
| 02E3E7E3 | 400000E4 | 40400014 | 40400001 | 800005A0 | 0000021C | 0000015C |
| 000005A8 | 00000174 | 40404040 | 40404040 | 40404040 | 40404040 | 40404040 |
| 40404040 | 40404040 | 40404040 | 40404040 | E2E3D2C2 | F0F0F6F3* | |
| 02D9D3C4 | 40404040 | 40400038 | 40404040 | 00010001 | 0C0000D4 | 00010001 |
| 0C0000D8 | 00010001 | 0C0000DC | 00010001 | 0C0000E4 | 00010001 | 0C0000E8 |
| 00010001 | 0C0000EC | 00010001 | 0C0000F0 | E2E3D2C2 | F0F0F6F4* | |
| 02E3E7E3 | 400000F8 | 40400008 | 40400001 | 800001BC | 000001D8 | 40404040 |
| 40404040 | 40404040 | 40404040 | 40404040 | 40404040 | 40404040 | 40404040 |
| 40404040 | 40404040 | 40404040 | 40404040 | E2E3D2C2 | F0F0F6F5* | |
| 02E3E7E3 | 40000104 | 40400018 | 40400001 | 80000000 | 80000CC0 | 00000580 |

```
00000158  00000260  00000164  40404040  40404040  40404040  40404040
40404040  40404040  40404040  40404040  E2E3D2C2  F0F0F6F6*
02D9D3C4  40404040  40400038  40404040  00010001  0C0000F4  00010001
0C0000F8  00010001  0C0000FC  00010001  0C000108  00010001  0C00010C
00010001  0C000110  00010001  0C000114  E2E3D2C2  F0F0F6F7*
02E3E7E3  4000011C  40400004  40400001  800001D0  40404040  40404040
40404040  40404040  40404040  40404040  40404040  40404040  40404040
40404040  40404040  40404040  40404040  E2E3D2C2  F0F0F6F8*
02E3E7E3  40000124  40400008  40400001  0000023C  800001B8  40404040
40404040  40404040  40404040  40404040  40404040  40404040  40404040
40404040  40404040  40404040  40404040  E2E3D2C2  F0F0F6F9*
02E3E7E3  40000C40  40400038  40400001  00000000  00000020  00000000
00000000  0000000C  00000018  00000058  00000000  00000014  00000000
0000001C  00000000  00000000  00000000  E2E3D2C2  F0F0F7F0**
02E3E7E3  40000C78  40400038  40400001  00000000  0174000E  00000000
0178000F  00000054  00000040  00000000  01580010  015C0010  00000000
00000011  01200011  00000064  000000AC  E2E3D2C2  F0F0F7F1*
02E3E7E3  40000CB0  4040001C  40400001  00000098  00000070  00000068
01380011  01D80011  00000000  029C0012  40404040  40404040  40404040
40404040  40404040  40404040  40404040  E2E3D2C2  F0F0F7F2*
02D9D3C4  40404040  40400020  40404040  00010001  0C000118  00010001
0C00011C  00010001  0C000124  00010001  0C000128  40404040  40404040
40404040  40404040  40404040  40404040  E2E3D2C2  F0F0F7F3*
02C5D5C4  40404040  40404040  40404040  40404040  40404040  40404040
0000134E  F1F5F7F3  F460C6D6  F34040F0  F2F0F2F8  F7F0F9F8  40F0F84B
F4F44BF2  F9404040  E2E3D2C2  D3C44040  E2E3D2C2  F0F0F7F4**

MEMBER NAME  STKCAL
02C5E2C4  40404040  40400010  40400001  E2E3D2C3  C1D34040  00000000
40000000  40404040  40404040  40404040  40404040  40404040  40404040
40404040  40404040  40404040  40404040  E2E3D2C3  F0F0F0F1*
02E3E7E3  40000000  40400028  40400001  47F0F00C  07E2E3D2  C3C1D340
90ECD00C  184D98CD  F0205040  D00450D0  400807FC  40404040  40404040
40404040  40404040  40404040  40404040  E2E3D2C3  F0F0F0F2*
02E3E7E3  400000E0  40400038  40400001  00000000  00000000  4E000000
00000000  4F080000  00000000  4E000000  80000000  00000000  00000000
41100000  00000000  42B40000  00000000  E2E3D2C3  F0F0F0F3*
02E3E7E3  40000118  40400038  40400001  00000000  00000000  00000001
00000002  00000003  00000004  00000005  00000006  00000007  00000008
00000018  00000058  41100000  425A0000  E2E3D2C3  F0F0F0F4*
02C5E2C4  40404040  40400010  40400002  E3D6D3C5  D9404040  05000000
4000000C  40404040  40404040  40404040  40404040  40404040  40404040
40404040  40404040  40404040  40404040  E2E3D2C3  F0F0F0F5*
02E3E7E3  40000150  4040000C  40400001  42B40000  00000000  00000000
40404040  40404040  40404040  40404040  40404040  40404040  40404040
40404040  40404040  40404040  40404040  E2E3D2C3  F0F0F0F6*
02C5E2C4  40404040  40400010  40400003  D7D4C1E3  D3404040  05000000
40001134  40404040  40404040  40404040  40404040  40404040  40404040
40404040  40404040  40404040  40404040  E2E3D2C3  F0F0F0F7*
02C5E2C4  40404040  40400010  40400004  C2E2D6D9  E3404040  02000000
40000000  40404040  40404040  40404040  40404040  40404040  40404040
40404040  40404040  40404040  40404040  E2E3D2C3  F0F0F0F8*
02E3E7E3  40000F20  40400014  40400001  00000000  FFFFFFA0  00001130
00000000  00000000  40404040  40404040  40404040  40404040  40404040
40404040  40404040  40404040  40404040  E2E3D2C3  F0F0F0F9*
02C5E2C4  40404040  40400010  40400005  E4D5C9E3  C4404040  02000000
40000000  40404040  40404040  40404040  40404040  40404040  40404040
40404040  40404040  40404040  40404040  E2E3D2C3  F0F0F1F0**
02E3E7E3  40000F38  40400004  40400001  00000000  40404040  40404040
```

```
40404040  40404040  40404040  40404040  40404040  40404040  40404040
40404040  40404040  40404040  40404040  E2E3D2C3  F0F0F1F1*
02C5E2C4  40404040  40400010  40400006  C3D6D5E2  E3D94040  02000000
40000000  40404040  40404040  40404040  40404040  40404040  40404040
40404040  40404040  40404040  40404040  E2E3D2C3  F0F0F1F2*
02E3E7E3  40000F40  40400008  40400001  00000000  00000000  40404040
40404040  40404040  40404040  40404040  40404040  40404040  40404040
40404040  40404040  40404040  40404040  E2E3D2C3  F0F0F1F3*
02C5E2C4  40404040  40400010  40400007  C4C1D9C3  D6E24040  02000000
40000000  40404040  40404040  40404040  40404040  40404040  40404040
40404040  40404040  40404040  40404040  E2E3D2C3  F0F0F1F4*
02E3E7E3  40000F4C  40400008  40400001  00000000  00000000  40404040
40404040  40404040  40404040  40404040  40404040  40404040  40404040
40404040  40404040  40404040  40404040  E2E3D2C3  F0F0F1F5*
02E3E7E3  400001E8  40400010  40400001  00000001  00000004  C6D34040
C1404040  40404040  40404040  40404040  40404040  40404040  40404040
40404040  40404040  40404040  40404040  E2E3D2C3  F0F0F1F6*
02E3E7E3  40000FF8  40400038  40400001  5890DF1C  58A0DF08  58B0DEF8
5880DF38  7820A00C  7B20A004  2B003802  6000D188  7820A010  7B20A008
2B003802  6000D190  6800D0D8  6000D198  E2E3D2C3  F0F0F1F7*
02E3E7E3  40001030  40400038  40400001  58F0DF18  4110D04C  05EF5800
D0F05000  D1545080  DF445800  DF645000  DF505830  DF645860  D0F81878
5880D0F8  7840B004  58A0DF10  5800D154  E2E3D2C3  F0F0F1F8*
02E3E7E3  40001068  40400038  40400001  12004780  C07A1828  7803A000
7000DF60  5870D118  58A0DF40  18B27820  DF607B2A  90003062  396447A0
C06E47F0  C0AA1AB8  1AA759B0  D15447C0  E2E3D2C3  F0F0F1F9*
02E3E7E3  400010A0  40400038  40400001  C05A58A0  DF1058B0  DEF85870

MEMBER NAME  STKCAL
DF385800  D1541A08  5000D154  58E0DF50  782EA000  5850D154  5C40D118
18255A20  D1047022  900058A0  DF1058B0  E2E3D2C3  F0F0F2F0**
02E3E7E3  400010D8  40400038  40400001  DEF85870  DF381A68  5800DF50
1A075000  DF501A37  5960D150  47C0C03C  58A0DF08  58B0DEF8  5880DF38
5080DF44  5800DF68  5000DF50  5830DF68  E2E3D2C3  F0F0F2F1*
02E3E7E3  40001110  40400038  40400001  5860D0F8  18785880  D0F87840
B00458A0  DF101828  7803A000  7000DF5C  5870D118  58A0DF40  18B27820
DF5C7B2A  90003062  396447A0  C12247F0  E2E3D2C3  F0F0F2F2*
02E3E7E3  40001148  40400038  40400001  C15E1AB8  1AA759B0  D15447C0
C10E58A0  DF1058B0  DEF85870  DF385800  D1541A08  5000D154  58E0DF50
782EA000  5850D154  5C40D118  18255A20  E2E3D2C3  F0F0F2F3*
02E3E7E3  40001180  40400038  40400001  D1047022  900058A0  DF1058B0
DEF85870  DF381A68  5800DF50  1A075000  DF501A37  5960D150  47C0C0FA
58A0DF08  58B0DEF8  5880DF38  58F0DF04  E2E3D2C3  F0F0F2F4*
02E3E7E3  400011B8  40400038  40400001  4110D058  05EF58F0  DF284110
D06C05EF  6000D1A0  6800D190  220047A0  C1B86800  D1A02300  6000D1A0
6800D1A0  6C00D0E8  6000DFB8  6800D0E0  E2E3D2C3  F0F0F2F5*
02E3E7E3  400011F0  40400038  40400001  23006000  DFC058F0  DF284110
D07005EF  6000DFC8  6800DFB8  6D00DFC8  6000D1A0  5820D0F8  5800DF40
5000DF2C  7800D124  33007000  DF305860  E2E3D2C3  F0F0F2F6*
02E3E7E3  40001228  40400038  40400001  D0F81878  5880DFB0  189258A0
DF7058B0  DF102B22  7828B000  6B20D1A0  702AB000  786AB000  7960D124
47C0C236  38267B20  D128702A  B000784A  E2E3D2C3  F0F0F2F7*
02E3E7E3  40001260  40400038  40400001  B0007940  DF304730  C24C3824
7A20D128  702AB000  1A961A87  1AA75990  D15047C0  C2125890  DF1C58A0
DF0858B0  DEF85880  DF385830  D1545B30  E2E3D2C3  F0F0F2F8*
02E3E7E3  40001298  40400038  40400001  D0F85800  D1045000  DF2C5800
D1185000  DF7C1C20  5030DF88  5800D118  5000DF84  5800DF40  5000DF8C
5080DF90  5800DF64  5000DF94  5800DF68  E2E3D2C3  F0F0F2F9*
02E3E7E3  400012D0  40400038  40400001  5000DF98  5800DFB4  5000DF9C
```

| | | | | | | |
|---|---|---|---|---|---|---|
| 5800DF6C | 5000DFA0 | 5080DFA4 | 5850DF78 | 5860DF74 | 5870DF3C | 5890D0F0 |
| 58A0D118 | 58B0DF1C | 5880DEF8 | 5090D158 | E2E3D2C3 | F0F0F3F0** | |
| 02E3E7E3 | 40001308 | 40400038 | 40400001 | 58E0DF8C | 782EB000 | 7A208004 |
| 5090DF44 | 5090DF48 | 5850DF70 | 5860DF6C | 5870DF68 | 5880DF64 | 5890D0F8 |
| 58A0DF38 | 386258B0 | DF107968 | B00047C0 | E2E3D2C3 | F0F0F3F1* | |
| 02E3E7E3 | 40001340 | 40400038 | 40400001 | C3667967 | B00047A0 | C3665800 |
| D1585A00 | D0F85000 | D1585820 | DF485A20 | D1145020 | DF485840 | DF445A40 |
| D1045040 | DF442B00 | 7806B000 | 6A00D0C8 | E2E3D2C3 | F0F0F3F2* | |
| 02E3E7E3 | 40001378 | 40400038 | 40400001 | 6000D0B8 | 5830D0BC | 5034D1CC |
| 2B227825 | B0006022 | D7185A90 | D0F81A5A | 1A6A1A7A | 1A8A5990 | D15047C0 |
| C3125880 | DEF858B0 | DF1C58A0 | D1185890 | E2E3D2C3 | F0F0F3F3* | |
| 02E3E7E3 | 400013B0 | 40400038 | 40400001 | D0F05870 | DF3C5860 | DF745850 |
| DF785800 | D1581200 | 4780C424 | 58F0DF24 | 4110D074 | 05EF6860 | D5D86820 |
| D5F06020 | DFB82D62 | 6820D5E8 | 6840D5D0 | E2E3D2C3 | F0F0F3F4* | |
| 02E3E7E3 | 400013E8 | 40400038 | 40400001 | 28022D04 | 2C602366 | 6A60D0E0 |
| 2C466D40 | D1A86820 | DFB82C26 | 6D20D1A8 | 6860D1A8 | 58E0DF90 | 706EB000 |
| 5800D158 | 5700D0D4 | 5000D0C4 | 6860D0C0 | E2E3D2C3 | F0F0F3F5* | |
| 02E3E7E3 | 40001420 | 40400038 | 40400001 | 6B60D0D0 | 58E0DF94 | 706EB000 |
| 58E0DF98 | 704EB000 | 58E0DF9C | 702EB000 | 58E0DFA0 | 7800D0F4 | 700EB000 |
| 47F0C468 | 58E0DFA4 | 7800D0F4 | 700EB000 | E2E3D2C3 | F0F0F3F6* | |
| 02E3E7E3 | 40001458 | 40400038 | 40400001 | 5820DF84 | 1A267800 | D0F47002 |
| B0005820 | DF841A27 | 7800D0F4 | 7002B000 | 5820DF84 | 1A257800 | D0F47002 |
| B0005820 | DF841A2A | 7800D0F4 | 7002B000 | E2E3D2C3 | F0F0F3F7* | |
| 02E3E7E3 | 40001490 | 40400038 | 40400001 | 5800DFA4 | 1A0A5000 | DFA45800 |
| DFA01A0A | 5000DFA0 | 5800DF9C | 1A0A5000 | DF9C5800 | DF981A0A | 5000DF98 |
| 5800DF94 | 1A0A5000 | DF945800 | DF901A0A | E2E3D2C3 | F0F0F3F8* | |
| 02E3E7E3 | 400014C8 | 40400038 | 40400001 | 5000DF90 | 5800DF8C | 1A0A5000 |
| DF8C5820 | DF841A2A | 5020DF84 | 5920DF88 | 47C0C2DC | 5890DF1C | 58A0DF08 |

MEMBER NAME STKCAL

| | | | | | | |
|---|---|---|---|---|---|---|
| 58B0DEF8 | 5880DF38 | 1BFF58E0 | D00007FE | E2E3D2C3 | F0F0F3F9* | |
| 02E3E7E3 | 40001500 | 40400038 | 40400001 | 58A0D004 | 58E0A00C | 58B0A018 |
| 5810B00C | 5820D154 | 50201000 | 5830B014 | 6820D188 | 60203000 | 5840B018 |
| 6840D190 | 60404000 | 5850B01C | 6860D1A0 | E2E3D2C3 | F0F0F4F0** | |
| 02E3E7E3 | 40001538 | 40400038 | 40400001 | 60605000 | 18DA92FF | A00C982C |
| A01C07FE | 58C0D048 | 987B1004 | 58207000 | 5020D150 | 58209000 | 5020D154 |
| 98791014 | 68207000 | 6020D188 | 68208000 | E2E3D2C3 | F0F0F4F1* | |
| 02E3E7E3 | 40001570 | 40400038 | 40400001 | 6020D190 | 68209000 | 6020D1A0 |
| 58201000 | 41302000 | 41500004 | 1B255C40 | D1141B25 | 5020DF10 | 5030DF14 |
| 58201008 | 41302000 | 41500004 | 1B255C40 | E2E3D2C3 | F0F0F4F2* | |
| 02E3E7E3 | 400015A8 | 4040002A | 40400001 | D10C1B25 | 5020DF1C | 5030DF20 |
| 5030D060 | 58201010 | 41302000 | 41500004 | 1B255020 | DF085030 | DF0C47F0 |
| DFD04040 | 40404040 | 40404040 | 40404040 | E2E3D2C3 | F0F0F4F3* | |
| 02E3E7E3 | 40000020 | 40400004 | 40400001 | 00001548 | 40404040 | 40404040 |
| 40404040 | 40404040 | 40404040 | 40404040 | 40404040 | 40404040 | 40404040 |
| 40404040 | 40404040 | 40404040 | 40404040 | E2E3D2C3 | F0F0F4F4* | |
| 02D9D3C4 | 40404040 | 40400038 | 40404040 | 00020001 | 0C000F20 | 00030001 |
| 0C000F24 | 00030001 | 0C000F28 | 00040001 | 1C000F2C | 00050001 | 1C000F40 |
| 00060001 | 1C000F4C | 00070001 | 1C000F50 | E2E3D2C3 | F0F0F4F5* | |
| 02E3E7E3 | 40000024 | 40400008 | 40400001 | 00000028 | 00001500 | 40404040 |
| 40404040 | 40404040 | 40404040 | 40404040 | 40404040 | 40404040 | 40404040 |
| 40404040 | 40404040 | 40404040 | 40404040 | E2E3D2C3 | F0F0F4F6* | |
| 02E3E7E3 | 40000070 | 40400014 | 40400001 | 00001028 | 000001B0 | 000001B8 |
| 800001C0 | 000001E8 | 40404040 | 40404040 | 40404040 | 40404040 | 40404040 |
| 40404040 | 40404040 | 40404040 | 40404040 | E2E3D2C3 | F0F0F4F7* | |
| 02D9D3C4 | 40404040 | 40400038 | 40404040 | 00010001 | 0C000020 | 00010001 |
| 0C000024 | 00010001 | 0C000028 | 00010001 | 0C000070 | 00010001 | 0C000074 |
| 00010001 | 0C000078 | 00010001 | 0C00007C | E2E3D2C3 | F0F0F4F8* | |
| 02E3E7E3 | 40000084 | 40400004 | 40400001 | 00000120 | 40404040 | 40404040 |

```
40404040  40404040  40404040  40404040  40404040  40404040  40404040
40404040  40404040  40404040  40404040  E2E3D2C3  F0F0F4F9*
02E3E7E3  4000008C  40400018  40400001  00000140  8000017C  800001B0
80000FE8  00000748  000001F8  40404040  40404040  40404040  40404040
40404040  40404040  40404040  40404040  E2E3D2C3  F0F0F5F0**
02D9D3C4  40404040  40400038  40404040  00010001  0C000080  00010001
0C000084  00010001  0C00008C  00010001  0C000090  00010001  0C000094
00010001  0C000098  00010001  0C00009C  E2E3D2C3  F0F0F5F1*
02E3E7E3  400000A4  4040001C  40400001  00000180  000001D8  000005F8
00000658  000006B8  00000700  000005E0  40404040  40404040  40404040
40404040  40404040  40404040  40404040  E2E3D2C3  F0F0F5F2*
02D9D3C4  40404040  40400038  40404040  00010001  0C0000A0  00010001
0C0000A4  00010001  0C0000A8  00010001  0C0000AC  00010001  0C0000B0
00010001  0C0000B4  00010001  0C0000B8  E2E3D2C3  F0F0F5F3*
02E3E7E3  400000C0  4040001C  40400001  00000640  000006A0  00000198
000001D0  00000168  00000164  8000016C  40404040  40404040  40404040
40404040  40404040  40404040  40404040  E2E3D2C3  F0F0F5F4*
02D9D3C4  40404040  40400038  40404040  00010001  0C0000BC  00010001
0C0000C0  00010001  0C0000C4  00010001  0C0000C8  00010001  0C0000CC
00010001  0C0000D0  00010001  0C0000D4  E2E3D2C3  F0F0F5F5*
02E3E7E3  40000F54  40400038  40400001  00000000  00000000  00000000
00000020  00000010  0000001C  00000000  00000000  00000000  00000000
00000000  00000000  00000000  00000000  E2E3D2C3  F0F0F5F6*
02E3E7E3  40000F8C  40400038  40400001  00000024  00000028  00000030
0000003C  0000000C  00000014  00000000  00000000  00000000  03CC0007
00000000  03700008  00000000  03DC0008  E2E3D2C3  F0F0F5F7*
02E3E7E3  40000FC4  40400034  40400001  00000000  03E80008  00000000
03F40008  00000000  00000034  0000002C  00000008  02740008  00000000
03580009  00000000  03A80009  40404040  E2E3D2C3  F0F0F5F8*

MEMBER NAME  STKCAL
02D9D3C4  40404040  40400008  40404040  00010001  0C0000D8  40404040
40404040  40404040  40404040  40404040  40404040  40404040  40404040
40404040  40404040  40404040  40404040  E2E3D2C3  F0F0F5F9*
02C5D5C4  40404040  40404040  40404040  40404040  40404040  40404040
000015D2  F1F5F7F3  F460C6D6  F34040F0  F2F0F2F8  F7F0F9F8  40F0F84B
F4F44BF3  F4404040  E2E3D2C3  C1D34040  E2E3D2C3  F0F0F6F0**

MEMBER NAME  STKEPL
02C5E2C4  40404040  40400010  40400001  E2E3D2C5  D7D34040  00000000
40000000  40404040  40404040  40404040  40404040  40404040  40404040
40404040  40404040  40404040  40404040  E2E3D2C5  F0F0F0F1*
02E3E7E3  40000000  40400038  40400001  47F0F00C  07E2E3D2  C5D7D340
90ECD00C  184D98CD  F0205040  D00450D0  400807FC  40404040  40404040
020A0401  22021404  22020A08  011A015B  E2E3D2C5  F0F0F0F2*
02E3E7E3  40000038  40400038  40400001  0A09031A  015B0A09  03220206
07140422  C4C9E2E3  C1D5C3C5  5BE77E5B  E87E4040  C54DF15D  5CE35BC5
4DF15D5B  C54DF25D  5CE35BC5  4DF25D40  E2E3D2C5  F0F0F0F3*
02E3E7E3  40000070  40400008  40400001  E740F1F0  4AF64040  40404040
40404040  40404040  40404040  40404040  40404040  40404040  40404040
40404040  40404040  40404040  40404040  E2E3D2C5  F0F0F0F4*
02E3E7E3  40000300  40400038  40400001  00000000  00000000  4F080000
00000000  00000000  00000000  00000001  00000002  00000003  00000004
00000005  00000006  00000008  0000000E  E2E3D2C5  F0F0F0F5*
02E3E7E3  40000338  40400038  40400001  00000016  00000017  0000001C
00000058  00000384  000F4240  3E418937  401DF3B6  4029FBE7  402E147B
403EF9DB  406D9168  40BD70A4  41100000  E2E3D2C5  F0F0F0F6*
02E3E7E3  40000370  40400038  40400001  4111999A  4119999A  411D70A4
412570A4  4136147B  41491EB8  41A00000  41E00000  41EF0A3D  41F2E148
```

```
41F70A3D  41FB0A3D  42180000  42184CCD  E2E3D2C5  F0F0F0F7*
02C5E2C4  40404040  40400010  40400002  D7D4C1E3  D3404040  05000000
40001134  40404040  40404040  40404040  40404040  40404040  40404040
40404040  40404040  40404040  40404040  E2E3D2C5  F0F0F0F8*
02E3E7E3  400003A8  4040000C  40400001  45F42400  00000000  00000000
40404040  40404040  40404040  40404040  40404040  40404040  40404040
40404040  40404040  40404040  40404040  E2E3D2C5  F0F0F0F9*
02C5E2C4  40404040  40400010  40400003  C3C1C4D3  E3404040  02000000
40000000  40404040  40404040  40404040  40404040  40404040  40404040
40404040  40404040  40404040  40404040  E2E3D2C5  F0F0F1F0**
02E3E7E3  40000430  40400010  40400001  FFFFFFA0  00001130  00000000
00000000  40404040  40404040  40404040  40404040  40404040  40404040
40404040  40404040  40404040  40404040  E2E3D2C5  F0F0F1F1*
02E3E7E3  40000444  40400004  40400001  00000000  40404040  40404040
40404040  40404040  40404040  40404040  40404040  40404040  40404040
40404040  40404040  40404040  40404040  E2E3D2C5  F0F0F1F2*
02C5E2C4  40404040  40400010  40400004  C3C1C4D3  D5F14040  02000000
40000000  40404040  40404040  40404040  40404040  40404040  40404040
40404040  40404040  40404040  40404040  E2E3D2C5  F0F0F1F3*
02E3E7E3  4000044C  40400004  40400001  00000000  40404040  40404040
40404040  40404040  40404040  40404040  40404040  40404040  40404040
40404040  40404040  40404040  40404040  E2E3D2C5  F0F0F1F4*
02C5E2C4  40404040  40400010  40400005  C3C1C4E2  E4D74040  02000000
40000000  40404040  40404040  40404040  40404040  40404040  40404040
40404040  40404040  40404040  40404040  E2E3D2C5  F0F0F1F5*
02C5E2C4  40404040  40400010  40400006  C3D4D7D9  E2E24040  02000000
40000000  40404040  40404040  40404040  40404040  40404040  40404040
40404040  40404040  40404040  40404040  E2E3D2C5  F0F0F1F6*
02C5E2C4  40404040  40400010  40400007  C9C2C3D6  D47B4040  02000000
40000000  40404040  40404040  40404040  40404040  40404040  40404040
40404040  40404040  40404040  40404040  E2E3D2C5  F0F0F1F7*
02E3E7E3  40000454  40400010  40400001  00000000  00000000  00000000
00000000  40404040  40404040  40404040  40404040  40404040  40404040
40404040  40404040  40404040  40404040  E2E3D2C5  F0F0F1F8*
02E3E7E3  400004C0  40400038  40400001  5870D3D4  58B0D3EC  58A0D2C8
58F0D3C0  4110D07C  05EF7800  D29C7000  D3745820  D3705B20  D2A0183A
5840D3F4  185A186B  5880D2A0  5890D438  E2E3D2C5  F0F0F1F9*
02E3E7E3  400004F8  40400038  40400001  58A0D2A0  18B27829  70007C24

MEMBER NAME  STKEPL
70007D20  D3307020  D3683842  7B40D374  30447940  D2D84750  D4F47020
D3747B20  D3287020  D35C198A  4780D4E4  E2E3D2C5  F0F0F2F0**
02E3E7E3  40000530  40400038  40400001  41057000  5000D088  58F0D3DC
4110D080  05EF4105  70005000  D0904105  70005000  D09858F0  D3DC4110
D09005EF  7800D35C  7000D360  78037000  E2E3D2C5  F0F0F2F1*
02E3E7E3  40000568  40400038  40400001  7000D354  1A361A56  1A461A96
878AD486  58B0D3EC  58A0D2C8  5800D2AC  5000D420  50B0D424  185B5C40
D3705820  D2AC1A25  41027000  5000D088  E2E3D2C5  F0F0F2F2*
02E3E7E3  400005A0  40400038  40400001  58F0D3DC  4110D080  05EF7800
D3083300  7000D428  7800D318  33007000  D4307800  D3003300  7000D42C
58F0D3DC  4110D0A0  05EF58F0  D3C04110  E2E3D2C5  F0F0F2F3*
02E3E7E3  400005D8  40400038  40400001  D0B005EF  7800D29C  7000D374
5820D370  5B20D2A0  184B185A  5860D438  5880D2A0  189A58A0  D2A018B2
78267000  7D20D330  7020D368  38427B40  E2E3D2C5  F0F0F2F4*
02E3E7E3  40000610  40400038  40400001  D3743044  7940D2D8  4750D5F2
7020D374  7B20D328  7020D35C  198A4780  D5E24109  70005000  D08858F0
D3DC4110  D08005EF  41097000  5000D090  E2E3D2C5  F0F0F2F5*
02E3E7E3  40000648  40400038  40400001  41097000  5000D098  58F0D3DC
4110D090  05EF7800  D35C7000  D3607805  70007000  D3541A54  1A941A64
```

```
878AD588  58B0D3EC  58A0D2C8  5850D370  E2E3D2C5  F0F0F2F6*
02E3E7E3  40000680  40400038  40400001  5C40D424  5820D420  1A254102
70005000  D08858F0  D3DC4110  D08005EF  7800D31C  33007000  D44058F0
D3DC4110  D0B405EF  58F0D3C0  4110D0C4  E2E3D2C5  F0F0F2F7*
02E3E7E3  400006B8  40400038  40400001  05EF7800  D29C7000  D3745820
D3705B20  D2A0183A  5840D3F4  185A186B  5880D2A0  5890D43C  58A0D2A0
18B27829  70007C24  70007D20  D3307020  E2E3D2C5  F0F0F2F8*
02E3E7E3  400006F0  40400038  40400001  D3683842  7B40D374  30447940
D2D84750  D6D87020  D3747B20  D3287020  D35C198A  4780D6C8  41057000
5000D088  58F0D3DC  4110D080  05EF4105  E2E3D2C5  F0F0F2F9*
02E3E7E3  40000728  40400038  40400001  70005000  D0904105  70005000
D09858F0  D3DC4110  D09005EF  7800D35C  7000D360  78037000  7000D354
1A361A56  1A461A96  878AD66A  58B0D3EC  E2E3D2C5  F0F0F3F0**
02E3E7E3  40000760  40400038  40400001  58A0D2C8  5850D370  5C40D424
5820D420  1A254102  70005000  D08858F0  D3DC4110  D08005EF  7800D320
33007000  D44058F0  D3DC4110  D0C805EF  E2E3D2C5  F0F0F3F1*
02E3E7E3  40000798  40400038  40400001  58F0D3C0  4110D0D8  05EF7800
D29C7000  D3745820  D3705B20  D2A0184B  185A5860  D43C5880  D2A0189A
58A0D2A0  18B27826  70007D20  D3307020  E2E3D2C5  F0F0F3F2*
02E3E7E3  400007D0  40400038  40400001  D3683842  7B40D374  30447940
D2D84750  D7B87020  D3747B20  D3287020  D35C198A  4780D7A8  41097000
5000D088  58F0D3DC  4110D080  05EF4109  E2E3D2C5  F0F0F3F3*
02E3E7E3  40000808  40400038  40400001  70005000  D0904109  70005000
D09858F0  D3DC4110  D09005EF  7800D35C  7000D360  78057000  7000D354
1A541A94  1A64878A  D74E58B0  D3EC58A0  E2E3D2C5  F0F0F3F4*
02E3E7E3  40000840  40400038  40400001  D2C85850  D3705C40  D4245820
D4201A25  41027000  5000D088  58F0D3DC  4110D080  05EF7800  D3243300
7000D440  58F0D3DC  4110D0DC  05EF7820  E2E3D2C5  F0F0F3F5*
02E3E7E3  40000878  40400038  40400001  D3283322  7020D360  7020D434
7800D29C  7000D368  58F0D3C0  4110D0D8  05EF7800  D2F03300  7000D3F8
7800D2EC  33007000  D3FC186B  58A0D2C0  E2E3D2C5  F0F0F3F6*
02E3E7E3  400008B0  40400034  40400001  58B0D2A0  18565C40  D3701835
5A30D2AC  41037000  5000D0F4  58F0D3DC  4110D0EC  05EF58F0  D3E81800
45E0F004  00000000  00000028  40404040  E2E3D2C5  F0F0F3F7*
02D9D3C4  40404040  40400038  40404040  00020001  0C000430  00020001
0C000434  00030001  1C000438  00040001  1C000454  00050001  1C000458
00060001  1C00045C  00070001  1C000460  E2E3D2C5  F0F0F3F8*
02E3E7E3  400008E4  40400038  40400001  45E0F008  0470D368  45E0F010
58F0D3E8  45E0F000  00000000  0000002D  45E0F00C  00000408  04700007

MEMBER NAME  STKEPL
45E0F010  7800D360  7A00D2E4  7000D440  E2E3D2C5  F0F0F3F9*
02E3E7E3  4000091C  40400038  40400001  58F0D3E0  4110D0FC  05EF41E0
000415FE  4720D8BE  58EFD04C  07FE7800  D3687A00  D2F47000  D3687800
D3607A00  D2F47000  D3605AB0  D2A019BA  E2E3D2C5  F0F0F4F0**
02E3E7E3  40000954  40400038  40400001  47C0D83C  58B0D3EC  58A0D2C8
7800D2F8  33007000  D4407800  D3143300  7000D444  58F0D3E0  4110D144
05EF41E0  000415FE  4720D916  58EFD054  E2E3D2C5  F0F0F4F1*
02E3E7E3  4000098C  40400038  40400001  07FE7800  D30C3300  7000D440
58F0D3E0  4110D18C  05EF41E0  000415FE  4720D93A  58EFD05C  07FE7800
D2FC3300  7000D440  7800D32C  33007000  E2E3D2C5  F0F0F4F2*
02E3E7E3  400009C4  40400038  40400001  D44458F0  D3E04110  D1D405EF
41E00004  15FE4720  D96858EF  D06407FE  5850D370  5C40D424  5820D420
1A257822  70007D20  D3102B00  38026A00  E2E3D2C5  F0F0F4F3*
02E3E7E3  400009FC  40400038  40400001  D2906000  D2885820  D28C5A20
D2A47800  D29C7000  D3547800  D3043300  7000D3F8  7800D434  7000D3FC
7800D32C  33007000  D400186B  189258B0  E2E3D2C5  F0F0F4F4*
02E3E7E3  40000A34  40400038  40400001  D2A058A0  D3C45880  D3CC19B9
4770D9E0  18565C40  D3701825  5A20D2AC  78027000  7000D354  5850D36C
```

```
5C40D3F4  18255A20  D3F07802  80007000  E2E3D2C5  F0F0F4F5*
02E3E7E3  40000A6C  40400038  40400001  D37C59B0  D2A04770  DA067800
D3F87000  D37C58F0  D3DC4110  D21C05EF  2B447840  D3542864  6C60D380
2B227820  A0042A26  7020D358  6C40D388  E2E3D2C5  F0F0F4F6*
02E3E7E3  40000AA4  40400038  40400001  2B227820  A0082A24  7020D364
58F0D3E8  45E0F004  00000000  00000031  45E0F008  0470D354  45E0F008
0470D358  45E0F008  0470D364  45E0F010  E2E3D2C5  F0F0F4F7*
02E3E7E3  40000ADC  40400038  40400001  58F0D3E8  45E0F000  00000000
00000042  45E0F00C  00000408  04700007  45E0F010  58F0D3E4  4110D22C
05EF41E0  000415FE  4720DA9E  58EFD06C  E2E3D2C5  F0F0F4F8*
02E3E7E3  40000B14  40400038  40400001  07FE58F0  D3E04110  D23C05EF
41E00004  15FE4720  DAB858EF  D07407FE  7800D354  7A00D310  7000D354
5AB0D2A0  19B947C0  D9C658B0  D3EC58A0  E2E3D2C5  F0F0F4F9*
02E3E7E3  40000B4C  40400038  40400001  D2C858F0  D3C04110  D07C05EF
1BFF58E0  D00007FE  58A0D004  58E0A00C  58B0A018  5810B00C  5820D370
50201000  18DA92FF  A00C982C  A01C07FE  E2E3D2C5  F0F0F5F0**
02E3E7E3  40000B84  40400038  40400001  987B1004  58207000  5020D36C
58209000  5020D370  98781014  68207000  6020D380  68208000  6020D388
58201000  41302000  41500004  1B255C40  E2E3D2C5  F0F0F5F1*
02E3E7E3  40000BBC  40400038  40400001  D2B81B25  5020D3CC  5030D3D0
58201008  41302000  41500004  1B255C40  D2B41B25  5020D3D4  5030D3D8
58201010  41302000  41500004  1B255020  E2E3D2C5  F0F0F5F2*
02E3E7E3  40000BF4  4040000A  40400001  D3C45030  D3C847F0  D4484040
40404040  40404040  40404040  40404040  40404040  40404040  40404040
40404040  40404040  40404040  40404040  E2E3D2C5  F0F0F5F3*
02E3E7E3  40000020  40400008  40400001  00000B84  00000078  40404040
40404040  40404040  40404040  40404040  40404040  40404040  40404040
40404040  40404040  40404040  40404040  E2E3D2C5  F0F0F5F4*
02D9D3C4  40404040  40400038  40404040  00010001  0C0008E0  00010001
0C0008FC  00010001  0C000904  00010001  0C000ABC  00010001  0C000AE8
00010001  0C000AF0  00010001  0C000020  E2E3D2C5  F0F0F5F5*
02E3E7E3  40000078  40400004  40400001  00000B60  40404040  40404040
40404040  40404040  40404040  40404040  40404040  40404040  40404040
40404040  40404040  40404040  40404040  E2E3D2C5  F0F0F5F6*
02E3E7E3  400000C4  40400018  40400001  00000936  00000936  0000098E
000009E0  000009B2  000009E0  40404040  40404040  40404040  40404040
40404040  40404040  40404040  40404040  E2E3D2C5  F0F0F5F7*
02D9D3C4  40404040  40400038  40404040  00010001  0C000024  00010001
0C000078  00010001  0C0000C4  00010001  0C0000C8  00010001  0C0000CC
00010001  0C0000D0  00010001  0C0000D4  E2E3D2C5  F0F0F5F8*

MEMBER NAME  STKEPL
02E3E7E3  400000DC  4040001C  40400001  000009E0  000009E0  00000B16
00000000  00000B30  00000B30  80000310  40404040  40404040  40404040
40404040  40404040  40404040  40404040  E2E3D2C5  F0F0F5F9*
02D9D3C4  40404040  40400038  40404040  00010001  0C0000D8  00010001
0C0000DC  00010001  0C0000E0  00010001  0C0000E4  00010001  0C0000E8
00010001  0C0000EC  00010001  0C0000F0  E2E3D2C5  F0F0F6F0**
02E3E7E3  400000F8  40400008  40400001  000003CC  000003D8  40404040
40404040  40404040  40404040  40404040  40404040  40404040  40404040
40404040  40404040  40404040  40404040  E2E3D2C5  F0F0F6F1*
02E3E7E3  40000104  40400004  40400001  800003D8  40404040  40404040
40404040  40404040  40404040  40404040  40404040  40404040  40404040
40404040  40404040  40404040  40404040  E2E3D2C5  F0F0F6F2*
02E3E7E3  4000010C  40400004  40400001  000003D8  40404040  40404040
40404040  40404040  40404040  40404040  40404040  40404040  40404040
40404040  40404040  40404040  40404040  E2E3D2C5  F0F0F6F3*
02E3E7E3  40000114  4040000C  40400001  800003D4  000004A0  000004A8
40404040  40404040  40404040  40404040  40404040  40404040  40404040
```

```
40404040  40404040  40404040  40404040  E2E3D2C5  F0F0F6F4*
02D9D3C4  40404040  40400038  40404040  00010001  0C0000F4  00010001
0C0000F8  00010001  0C0000FC  00010001  0C000104  00010001  0C00010C
00010001  0C000114  00010001  0C000118  E2E3D2C5  F0F0F6F5*
02E3E7E3  40000120  4040001C  40400001  000004A4  800004A8  80000320
000004A0  000004B8  000004A4  800004B8  40404040  40404040  40404040
40404040  40404040  40404040  40404040  E2E3D2C5  F0F0F6F6*
02D9D3C4  40404040  40400038  40404040  00010001  0C00011C  00010001
0C000120  00010001  0C000124  00010001  0C000128  00010001  0C00012C
00010001  0C000130  00010001  0C000134  E2E3D2C5  F0F0F6F7*
02E3E7E3  4000013C  4040001C  40400001  80000318  000004A0  000004B8
000004A4  800004B8  80000324  000004A0  40404040  40404040  40404040
40404040  40404040  40404040  40404040  E2E3D2C5  F0F0F6F8*
02D9D3C4  40404040  40400038  40404040  00010001  0C000138  00010001
0C00013C  00010001  0C000140  00010001  0C000144  00010001  0C000148
00010001  0C00014C  00010001  0C000150  E2E3D2C5  F0F0F6F9*
02E3E7E3  40000158  40400014  40400001  000004B8  000004A4  800004B8
00000470  000003D8  40404040  40404040  40404040  40404040  40404040
40404040  40404040  40404040  40404040  E2E3D2C5  F0F0F7F0**
02E3E7E3  40000170  40400008  40400001  800003D8  00000474  40404040
40404040  40404040  40404040  40404040  40404040  40404040  40404040
40404040  40404040  40404040  40404040  E2E3D2C5  F0F0F7F1*
02D9D3C4  40404040  40400038  40404040  00010001  0C000154  00010001
0C000158  00010001  0C00015C  00010001  0C000160  00010001  0C000164
00010001  0C000168  00010001  0C000170  E2E3D2C5  F0F0F7F2*
02E3E7E3  40000178  4040001C  40400001  000004B8  00000310  00000324
00000358  00000354  00000408  00000310  40404040  40404040  40404040
40404040  40404040  40404040  40404040  E2E3D2C5  F0F0F7F3*
02D9D3C4  40404040  40400038  40404040  00010001  0C000174  00010001
0C000178  00010001  0C00017C  00010001  0C000180  00010001  0C000184
00010001  0C000188  00010001  0C00018C  E2E3D2C5  F0F0F7F4*
02E3E7E3  40000194  4040001C  40400001  00000310  00000310  00000318
0000031C  0000031C  00000310  00000310  40404040  40404040  40404040
40404040  40404040  40404040  40404040  E2E3D2C5  F0F0F7F5*
02D9D3C4  40404040  40400038  40404040  00010001  0C000190  00010001
0C000194  00010001  0C000198  00010001  0C00019C  00010001  0C0001A0
00010001  0C0001A4  00010001  0C0001A8  E2E3D2C5  F0F0F7F6*
02E3E7E3  400001B0  4040001C  40400001  00000358  00000360  80000310
000004B8  000004BC  00000348  0000032C  40404040  40404040  40404040
40404040  40404040  40404040  40404040  E2E3D2C5  F0F0F7F7*
02D9D3C4  40404040  40400038  40404040  00010001  0C0001AC  00010001

MEMBER NAME  STKEPL
0C0001B0  00010001  0C0001B4  00010001  0C0001B8  00010001  0C0001BC
00010001  0C0001C0  00010001  0C0001C4  E2E3D2C5  F0F0F7F8*
02E3E7E3  400001CC  4040001C  40400001  00000358  00000354  00000070
00000310  00000310  00000310  00000318  40404040  40404040  40404040
40404040  40404040  40404040  40404040  E2E3D2C5  F0F0F7F9*
02D9D3C4  40404040  40400038  40404040  00010001  0C0001C8  00010001
0C0001CC  00010001  0C0001D0  00010001  0C0001D4  00010001  0C0001D8
00010001  0C0001DC  00010001  0C0001E0  E2E3D2C5  F0F0F8F0**
02E3E7E3  400001E8  4040001C  40400001  0000031C  0000031C  00000310
00000310  00000358  00000360  80000310  40404040  40404040  40404040
40404040  40404040  40404040  40404040  E2E3D2C5  F0F0F8F1*
02D9D3C4  40404040  40400038  40404040  00010001  0C0001E4  00010001
0C0001E8  00010001  0C0001EC  00010001  0C0001F0  00010001  0C0001F4
00010001  0C0001F8  00010001  0C0001FC  E2E3D2C5  F0F0F8F2*
02E3E7E3  40000204  4040001C  40400001  000004B8  000004A8  00000310
0000033C  00000358  00000354  00000058  40404040  40404040  40404040
```

```
40404040  40404040  40404040  40404040  E2E3D2C5  F0F0F8F3*
02D9D3C4  40404040  40400038  40404040  00010001  0C000200  00010001
0C000204  00010001  0C000208  00010001  0C00020C  00010001  0C000210
00010001  0C000214  00010001  0C000218  E2E3D2C5  F0F0F8F4*
02E3E7E3  40000220  4040001C  40400001  00000310  00000310  00000310
00000310  00000318  00000320  00000310  40404040  40404040  40404040
40404040  40404040  40404040  40404040  E2E3D2C5  F0F0F8F5*
02D9D3C4  40404040  40400038  40404040  00010001  0C00021C  00010001
0C000220  00010001  0C000224  00010001  0C000228  00010001  0C00022C
00010001  0C000230  00010001  0C000234  E2E3D2C5  F0F0F8F6*
02E3E7E3  4000023C  4040001C  40400001  00000310  00000358  00000360
80000310  000004B8  000004BC  00000310  40404040  40404040  40404040
40404040  40404040  40404040  40404040  E2E3D2C5  F0F0F8F7*
02D9D3C4  40404040  40400038  40404040  00010001  0C000238  00010001
0C00023C  00010001  0C000240  00010001  0C000244  00010001  0C000248
00010001  0C00024C  00010001  0C000250  E2E3D2C5  F0F0F8F8*
02E3E7E3  40000258  4040001C  40400001  00000334  00000358  00000354
00000048  00000310  00000310  00000310  40404040  40404040  40404040
40404040  40404040  40404040  40404040  E2E3D2C5  F0F0F8F9*
02D9D3C4  40404040  40400038  40404040  00010001  0C000254  00010001
0C000258  00010001  0C00025C  00010001  0C000260  00010001  0C000264
00010001  0C000268  00010001  0C00026C  E2E3D2C5  F0F0F9F0**
02E3E7E3  40000274  4040001C  40400001  00000318  0000031C  00000320
00000310  00000310  00000358  00000360  40404040  40404040  40404040
40404040  40404040  40404040  40404040  E2E3D2C5  F0F0F9F1*
02D9D3C4  40404040  40400038  40404040  00010001  0C000270  00010001
0C000274  00010001  0C000278  00010001  0C00027C  00010001  0C000280
00010001  0C000284  00010001  0C000288  E2E3D2C5  F0F0F9F2*
02E3E7E3  40000290  4040001C  40400001  80000310  000003CC  00000474
000003CC  800003F4  00000408  00000340  40404040  40404040  40404040
40404040  40404040  40404040  40404040  E2E3D2C5  F0F0F9F3*
02D9D3C4  40404040  40400038  40404040  00010001  0C00028C  00010001
0C000290  00010001  0C000294  00010001  0C000298  00010001  0C00029C
00010001  0C0002A0  00010001  0C0002A4  E2E3D2C5  F0F0F9F4*
02E3E7E3  400002AC  4040001C  40400001  00000408  800003C4  000003CC
00000478  00000310  000003C4  00000358  40404040  40404040  40404040
40404040  40404040  40404040  40404040  E2E3D2C5  F0F0F9F5*
02D9D3C4  40404040  40400038  40404040  00010001  0C0002A8  00010001
0C0002AC  00010001  0C0002B0  00010001  0C0002B4  00010001  0C0002B8
00010001  0C0002BC  00010001  0C0002C0  E2E3D2C5  F0F0F9F6*
02E3E7E3  400002C8  4040001C  40400001  00000354  00000408  00000310
00000310  00000310  00000318  0000031C  40404040  40404040  40404040

MEMBER NAME  STKEPL
40404040  40404040  40404040  40404040  E2E3D2C5  F0F0F9F7*
02D9D3C4  40404040  40400038  40404040  00010001  0C0002C4  00010001
0C0002C8  00010001  0C0002CC  00010001  0C0002D0  00010001  0C0002D4
00010001  0C0002D8  00010001  0C0002DC  E2E3D2C5  F0F0F9F8*
02E3E7E3  400002E4  40400018  40400001  00000320  00000310  00000310
00000358  00000360  80000310  40404040  40404040  40404040  40404040
40404040  40404040  40404040  40404040  E2E3D2C5  F0F0F9F9*
02E3E7E3  40000464  40400038  40400001  00000018  0000000C  00000020
00000000  00000000  00000000  00000000  00000014  00000000  00000000
00000000  00000000  00000010  02500030  E2E3D2C5  F0F1F0F0**
02E3E7E3  4000049C  40400024  40400001  02F40030  00000000  027C0031
025C0031  03080031  00000028  0000002C  02640032  02A80032  40404040
40404040  40404040  40404040  40404040  E2E3D2C5  F0F1F0F1*
02D9D3C4  40404040  40400038  40404040  00010001  0C0002E0  00010001
0C0002E4  00010001  0C0002E8  00010001  0C0002EC  00010001  0C0002F0
```

00010001 0C0002F4 00010001 0C0002F8 E2E3D2C5 F0F1F0F2*
02C5D5C4 40404040 40404040 40404040 40404040 40404040 40404040
00000BFE F1F5F7F3 F460C6D6 F34040F0 F2F0F2F8 F7F0F9F8 40F0F84B
F4F44BF3 F9404040 E2E3D2C5 D7D34040 E2E3D2C5 F0F1F0F3**

MEMBER NAME STKGAG
02C5E2C4 40404040 40400010 40400001 E2E3D2C7 C1C74040 00000000
40000000 40404040 40404040 40404040 40404040 40404040 40404040
40404040 40404040 40404040 40404040 E2E3D2C7 F0F0F0F1*
02E3E7E3 40000000 40400038 40400001 47F0F00C 07E2E3D2 C7C1C740
90ECD00C 184D98CD F0205040 D00450D0 400807FC 40404040 40404040
020A0401 22021404 22021004 22020A08 E2E3D2C7 F0F0F0F2*
02E3E7E3 40000038 40400014 40400001 011A015B 0A09031A 015B0A09
03220206 07140422 40404040 40404040 40404040 40404040 40404040
40404040 40404040 40404040 40404040 E2E3D2C7 F0F0F0F3*
02E3E7E3 40000050 40400038 40400001 C4C9E2E3 C1D5C3C5 5BE77E5B
E87E4040 D5E4D4C2 C5D940D6 C640D7D3 C9C5E240 E3C8C9C3 D2D5C5E2
E2406140 F1F04040 E3C8C9C3 D2D5C5E2 E2E3D2C7 F0F0F0F4*
02E3E7E3 40000088 40400008 40400001 E2404040 40404040 40404040
40404040 40404040 40404040 40404040 40404040 40404040 40404040
40404040 40404040 40404040 40404040 E2E3D2C7 F0F0F0F5*
02E3E7E3 400003C8 40400038 40400001 00000000 00000000 4F080000
00000000 00000000 00000000 00000001 00000002 00000003 00000004
00000006 00000008 00000009 0000000A E2E3D2C7 F0F0F0F6*
02E3E7E3 40000400 40400038 40400001 0000000E 0000000F 00000016
0000001C 00000058 00000384 3E418937 4019999A 401DF3B6 4029FBE7
402E147B 403EF9DB 406D9168 40BD70A4 E2E3D2C7 F0F0F0F7*
02E3E7E3 40000438 40400038 40400001 41100000 4111999A 41177CEE
4119999A 411E6666 41233333 412570A4 41291687 41A00000 41AC7AE1
41C5999A 41E00000 41FB3333 42113333 E2E3D2C7 F0F0F0F8*
02C5E2C4 40404040 40400010 40400002 D7D4C1E3 D3404040 05000000
40001134 40404040 40404040 40404040 40404040 40404040 40404040
40404040 40404040 40404040 40404040 E2E3D2C7 F0F0F0F9*
02E3E7E3 40000470 40400014 40400001 42128000 42180000 42184CCD
00000000 00000000 40404040 40404040 40404040 40404040 40404040
40404040 40404040 40404040 40404040 E2E3D2C7 F0F0F1F0**
02C5E2C4 40404040 40400010 40400003 C3C1C4D3 E3404040 02000000
40000000 40404040 40404040 40404040 40404040 40404040 40404040
40404040 40404040 40404040 40404040 E2E3D2C7 F0F0F1F1*
02E3E7E3 40000510 40400010 40400001 FFFFFFA0 00001130 00000000
00000000 40404040 40404040 40404040 40404040 40404040 40404040
40404040 40404040 40404040 40404040 E2E3D2C7 F0F0F1F2*
02E3E7E3 40000524 40400004 40400001 00000000 40404040 40404040
40404040 40404040 40404040 40404040 40404040 40404040 40404040
40404040 40404040 40404040 40404040 E2E3D2C7 F0F0F1F3*
02C5E2C4 40404040 40400010 40400004 C3C1C4D3 D5F14040 02000000
40000000 40404040 40404040 40404040 40404040 40404040 40404040
40404040 40404040 40404040 40404040 E2E3D2C7 F0F0F1F4*
02E3E7E3 4000052C 40400004 40400001 00000000 40404040 40404040
40404040 40404040 40404040 40404040 40404040 40404040 40404040
40404040 40404040 40404040 40404040 E2E3D2C7 F0F0F1F5*
02C5E2C4 40404040 40400010 40400005 C3C1C4E2 E4D74040 02000000
40000000 40404040 40404040 40404040 40404040 40404040 40404040
40404040 40404040 40404040 40404040 E2E3D2C7 F0F0F1F6*
02C5E2C4 40404040 40400010 40400006 C3D4D7D9 E2E24040 02000000
40000000 40404040 40404040 40404040 40404040 40404040 40404040
40404040 40404040 40404040 40404040 E2E3D2C7 F0F0F1F7*
02C5E2C4 40404040 40400010 40400007 C9C2C3D6 D47B4040 02000000
40000000 40404040 40404040 40404040 40404040 40404040 40404040

```
40404040  40404040  40404040  40404040  E2E3D2C7  F0F0F1F8*
02E3E7E3  40000534  40400010  40400001  00000000  00000000  00000000
00000000  40404040  40404040  40404040  40404040  40404040  40404040
40404040  40404040  40404040  40404040  E2E3D2C7  F0F0F1F9*
02E3E7E3  400005A4  40400038  40400001  58B0D49C  58A0D4B8  5890D37C

MEMBER NAME  STKGAG
58F0D488  4110D08C  05EF7800  D34C7000  D4385820  D4345B20  D350184A
18595860  D4CC5870  D3501889  58A0D350  E2E3D2C7  F0F0F2F0**
02E3E7E3  400005DC  40400038  40400001  18B25890  D49C7826  90007020
D42C3842  7B40D438  30447940  D3884750  D5BC7020  D4387C20  D3C87B20
D3E47020  D418197A  4780D5AC  41089000  E2E3D2C7  F0F0F2F1*
02E3E7E3  40000614  40400038  40400001  5000D098  58F0D4A4  4110D090
05EF4108  90005000  D0A04108  90005000  D0A858F0  D4A44110  D0A005EF
7800D418  7000D41C  78059000  7000D410  E2E3D2C7  F0F0F2F2*
02E3E7E3  4000064C  40400038  40400001  1A541A84  1A64877A  D55258B0
D49C58A0  D4B85890  D37C5800  D35C5000  D4F850A0  D4FC185A  5C40D434
5820D35C  1A254102  B0005000  D09858F0  E2E3D2C7  F0F0F2F3*
02E3E7E3  40000684  40400038  40400001  D4A44110  D09005EF  7800D3AC
33007000  D4E87800  D3D03300  7000D500  7800D3CC  33007000  D50458F0
D4A44110  D0B005EF  7820D3E4  33227020  E2E3D2C7  F0F0F2F4*
02E3E7E3  400006BC  40400038  40400001  D41C7020  D4F47800  D34C7000
D42C5800  D3485000  D42458F0  D4884110  D0C005EF  7800D3A4  33007000
D4D47820  D3B03322  7020D4D8  7020D4F0  E2E3D2C7  F0F0F2F5*
02E3E7E3  400006F4  40400038  40400001  7800D3BC  33007000  D4DC7800
D3A03300  7000D4E0  7800D3B8  33007000  D4E4187A  5880D378  58A0D36C
58B0D350  5890D49C  18575C40  D4341835  E2E3D2C7  F0F0F2F6*
02E3E7E3  4000072C  40400030  40400001  5A30D35C  41039000  5000D0CC
58F0D4A4  4110D0C4  05EF58F0  D4A44110  D0D405EF  58F0D4B0  45E0F004
00000000  00000028  40404040  40404040  E2E3D2C7  F0F0F2F7*
02D9D3C4  40404040  40400038  40404040  00020001  0C000510  00020001
0C000514  00030001  1C000518  00040001  1C000534  00050001  1C000538
00060001  1C00053C  00070001  1C000540  E2E3D2C7  F0F0F2F8*
02E3E7E3  4000075C  40400038  40400001  45E0F008  0470D42C  45E0F010
58F0D4B0  45E0F000  00000000  0000002D  45E0F00C  000004E8  04700007
45E0F010  7800D41C  7A00D398  7000D4D0  E2E3D2C7  F0F0F2F9*
02E3E7E3  40000794  40400038  40400001  58F0D4A8  4110D0E4  05EF41E0
000415FE  4720D71E  58EFD04C  07FE7800  D42C7A00  D38C7000  D42C58F0
D4B01800  45E0F004  00000000  00000031  E2E3D2C7  F0F0F3F0**
02E3E7E3  400007CC  40400038  40400001  45E0F008  0450D424  45E0F010
58F0D4B0  45E0F000  00000000  0000002D  45E0F00C  000004E8  04700007
45E0F010  58F0D4A8  4110D12C  05EF41E0  E2E3D2C7  F0F0F3F1*
02E3E7E3  40000804  40400038  40400001  000415FE  4720D782  58EFD054
07FE5800  D4241A0A  5000D424  7800D41C  7A00D3A8  7000D41C  5AB0D350
19B847C0  D69458B0  D49C58A0  D4B85890  E2E3D2C7  F0F0F3F2*
02E3E7E3  4000083C  40400038  40400001  D37C7800  D3D43300  7000D4EC
58F0D4A8  4110D174  05EF41E0  000415FE  4720D7D2  58EFD05C  07FE7800
D3E03300  7000D50C  58F0D4A8  4110D1BC  E2E3D2C7  F0F0F3F3*
02E3E7E3  40000874  40400038  40400001  05EF41E0  000415FE  4720D7F6
58EFD064  07FE7800  D3C43300  7000D50C  58F0D4A8  4110D204  05EF41E0
000415FE  4720D81A  58EFD06C  07FE7800  E2E3D2C7  F0F0F3F4*
02E3E7E3  400008AC  40400038  40400001  D3B43300  7000D50C  7800D3E8
33007000  D51058F0  D4A84110  D24C05EF  41E00004  15FE4720  D84858EF
D07407FE  7800D3C0  33007000  D50C58F0  E2E3D2C7  F0F0F3F5*
02E3E7E3  400008E4  40400038  40400001  D4A44110  D29405EF  5850D434
5C40D4FC  5820D4F8  1A257822  B0007D20  D3C82B00  38026A00  D3406000
D3385820  D33C5A20  D3547800  D34C7000  E2E3D2C7  F0F0F3F6*
02E3E7E3  4000091C  40400038  40400001  D4107800  D50C7000  D4D07800
D4F47000  D4D47800  D3E83300  7000D4D8  186A1892  58B0D350  58A0D48C
```

```
5880D494  5870D49C  19B94770  D8D61856  E2E3D2C7  F0F0F3F7*
02E3E7E3  40000954  40400038  40400001  5C40D434  18255A20  D35C7802
70007000  D4105850  D4305C40  D4CC1825  5A20D4C8  78028000  7000D440
59B0D350  4770D8FC  7800D4D0  7000D440  E2E3D2C7  F0F0F3F8*
02E3E7E3  4000098C  40400038  40400001  58F0D4A4  4110D2A4  05EF2B44
7840D410  28646C60  D4482B22  7820A004  2A267020  D4146C40  D4502B22

MEMBER NAME  STKGAG
7820A008  2A247020  D42058F0  D4B01800  E2E3D2C7  F0F0F3F9*
02E3E7E3  400009C4  40400038  40400001  45E0F004  00000000  00000035
45E0F008  0470D410  45E0F008  0470D414  45E0F008  0470D420  45E0F010
58F0D4B0  45E0F000  00000000  00000046  E2E3D2C7  F0F0F4F0**
02D9D3C4  40404040  40400038  40404040  00010001  0C000758  00010001
0C000774  00010001  0C00077C  00010001  0C0007C8  00010001  0C0007E4
00010001  0C0007EC  00010001  0C0009CC  E2E3D2C7  F0F0F4F1*
02E3E7E3  400009FC  40400038  40400001  45E0F00C  000004E8  04700007
45E0F010  58F0D4AC  4110D2B4  05EF41E0  000415FE  4720D996  58EFD07C
07FE58F0  D4A84110  D2C405EF  41E00004  E2E3D2C7  F0F0F4F2*
02E3E7E3  40000A34  40400038  40400001  15FE4720  D9B058EF  D08407FE
7800D410  7A00D3C8  7000D410  5AB0D350  19B947C0  D8BC58B0  D49C58A0
D4B85890  D37C58F0  D4884110  D30C05EF  E2E3D2C7  F0F0F4F3*
02E3E7E3  40000A6C  40400038  40400001  7800D34C  7000D428  5820D434
5B20D350  184A1859  5860D508  5870D350  188958A0  D35018B2  5890D49C
78269000  7020D408  38427B40  D4283044  E2E3D2C7  F0F0F4F4*
02E3E7E3  40000AA4  40400038  40400001  7940D388  4750DA6E  7020D428
7D20D3C8  7B20D3E4  7020D418  197A4780  DA5E4108  90005000  D09858F0
D4A44110  D09005EF  41089000  5000D0A0  E2E3D2C7  F0F0F4F5*
02E3E7E3  40000ADC  40400038  40400001  41089000  5000D0A8  58F0D4A4
4110D0A0  05EF7800  D4187000  D41C7805  90007000  D4101A54  1A841A64
877ADA04  58B0D49C  58A0D4B8  5890D37C  E2E3D2C7  F0F0F4F6*
02E3E7E3  40000B14  40400038  40400001  5850D434  5C40D4FC  5820D4F8
1A254102  B0005000  D09858F0  D4A44110  D09005EF  7800D3C4  33007000
D50C58F0  D4A44110  D31005EF  58F0D488  E2E3D2C7  F0F0F4F7*
02E3E7E3  40000B4C  40400038  40400001  4110D320  05EF7800  D34C7000
D4385820  D4345B20  D350184A  18595860  D4CC5870  D3501889  58A0D350
18B25890  D49C7826  90007020  D42C3842  E2E3D2C7  F0F0F4F8*
02E3E7E3  40000B84  40400038  40400001  7B40D438  30447940  D3884750
DB507020  D4387B20  D3E47020  D418197A  4780DB40  41089000  5000D098
58F0D4A4  4110D090  05EF4108  90005000  E2E3D2C7  F0F0F4F9*
02E3E7E3  40000BBC  40400038  40400001  D0A04108  90005000  D0A858F0
D4A44110  D0A005EF  7800D418  7000D41C  78059000  7000D410  1A541A84
1A64877A  DAEA58B0  D49C58A0  D4B85890  E2E3D2C7  F0F0F5F0**
02E3E7E3  40000BF4  40400038  40400001  D37C5850  D4345C40  D4FC5820
D4F81A25  4102B000  5000D098  58F0D4A4  4110D090  05EF7800  D3DC3300
7000D50C  7800D3D8  33007000  D51058F0  E2E3D2C7  F0F0F5F1*
02E3E7E3  40000C2C  40400038  40400001  D4A44110  D32405EF  58F0D488
4110D08C  05EF1BFF  58E0D000  07FE58A0  D00458E0  A00C58B0  A0185810
B00C5820  D4345020  100018DA  92FFA00C  E2E3D2C7  F0F0F5F2*
02E3E7E3  40000C64  40400038  40400001  982CA01C  07FE987B  10045820
70005020  D4305820  90005020  D4349878  10146820  70006020  D4486820
80006020  D4505820  10004130  20004150  E2E3D2C7  F0F0F5F3*
02E3E7E3  40000C9C  40400038  40400001  00041B25  5C40D364  1B255020
D4945030  D4985820  10084130  20004150  00041B25  5C40D360  1B255020
D49C5030  D4A05820  10104130  20004150  E2E3D2C7  F0F0F5F4*
02E3E7E3  40000CD4  40400010  40400001  00041B25  5020D48C  5030D490
47F0D514  40404040  40404040  40404040  40404040  40404040  40404040
40404040  40404040  40404040  40404040  E2E3D2C7  F0F0F5F5*
02E3E7E3  40000020  40400008  40400001  00000C6A  00000090  40404040
40404040  40404040  40404040  40404040  40404040  40404040  40404040
```

40404040 40404040 40404040 40404040 E2E3D2C7 F0F0F5F6*
02E3E7E3 40000090 40400004 40400001 00000C46 40404040 40404040
40404040 40404040 40404040 40404040 40404040 40404040 40404040
40404040 40404040 40404040 40404040 E2E3D2C7 F0F0F5F7*
02E3E7E3 400000DC 4040000C 40400001 000007AE 000007AE 00000812
40404040 40404040 40404040 40404040 40404040 40404040 40404040
40404040 40404040 40404040 40404040 E2E3D2C7 F0F0F5F8*

MEMBER NAME  STKGAG
02D9D3C4 40404040 40400038 40404040 00010001 0C0009F8 00010001
0C000A00 00010001 0C000020 00010001 0C000024 00010001 0C000090
00010001 0C0000DC 00010001 0C0000E0 E2E3D2C7 F0F0F5F9*
02E3E7E3 400000E8 4040001C 40400001 00000812 00000862 000008D8
00000886 000008D8 000008AA 000008D8 40404040 40404040 40404040
40404040 40404040 40404040 40404040 E2E3D2C7 F0F0F6F0**
02D9D3C4 40404040 40400038 40404040 00010001 0C0000E4 00010001
0C0000E8 00010001 0C0000EC 00010001 0C0000F0 00010001 0C0000F4
00010001 0C0000F8 00010001 0C0000FC E2E3D2C7 F0F0F6F1*
02E3E7E3 40000104 4040001C 40400001 000008D8 000008D8 00000A26
00000000 00000A40 00000A40 800003D8 40404040 40404040 40404040
40404040 40404040 40404040 40404040 E2E3D2C7 F0F0F6F2*
02D9D3C4 40404040 40400038 40404040 00010001 0C000100 00010001
0C000104 00010001 0C000108 00010001 0C00010C 00010001 0C000110
00010001 0C000114 00010001 0C000118 E2E3D2C7 F0F0F6F3*
02E3E7E3 40000120 40400008 40400001 000004A0 000004AC 40404040
40404040 40404040 40404040 40404040 40404040 40404040 40404040
40404040 40404040 40404040 40404040 E2E3D2C7 F0F0F6F4*
02E3E7E3 4000012C 40400004 40400001 800004AC 40404040 40404040
40404040 40404040 40404040 40404040 40404040 40404040 40404040
40404040 40404040 40404040 40404040 E2E3D2C7 F0F0F6F5*
02E3E7E3 40000134 40400004 40400001 000004AC 40404040 40404040
40404040 40404040 40404040 40404040 40404040 40404040 40404040
40404040 40404040 40404040 40404040 E2E3D2C7 F0F0F6F6*
02E3E7E3 4000013C 4040000C 40400001 800004A8 00000578 00000590
40404040 40404040 40404040 40404040 40404040 40404040 40404040
40404040 40404040 40404040 40404040 E2E3D2C7 F0F0F6F7*
02D9D3C4 40404040 40400038 40404040 00010001 0C00011C 00010001
0C000120 00010001 0C000124 00010001 0C00012C 00010001 0C000134
00010001 0C00013C 00010001 0C000140 E2E3D2C7 F0F0F6F8*
02E3E7E3 40000148 40400014 40400001 00000578 80000594 800003EC
00000564 000004AC 40404040 40404040 40404040 40404040 40404040
40404040 40404040 40404040 40404040 E2E3D2C7 F0F0F6F9*
02E3E7E3 40000160 40400008 40400001 800004AC 00000568 40404040
40404040 40404040 40404040 40404040 40404040 40404040 40404040
40404040 40404040 40404040 40404040 E2E3D2C7 F0F0F7F0**
02D9D3C4 40404040 40400038 40404040 00010001 0C000144 00010001
0C000148 00010001 0C00014C 00010001 0C000150 00010001 0C000154
00010001 0C000158 00010001 0C000160 E2E3D2C7 F0F0F7F1*
02E3E7E3 40000168 4040001C 40400001 000004AC 0000056C 800004AC
00000570 00000560 000003D8 000003EC 40404040 40404040 40404040
40404040 40404040 40404040 40404040 E2E3D2C7 F0F0F7F2*
02D9D3C4 40404040 40400038 40404040 00010001 0C000164 00010001
0C000168 00010001 0C00016C 00010001 0C000170 00010001 0C000174
00010001 0C000178 00010001 0C00017C E2E3D2C7 F0F0F7F3*
02E3E7E3 40000184 4040001C 40400001 00000424 00000420 000004E8
000003D8 000003D8 000003D8 000003E0 40404040 40404040 40404040
40404040 40404040 40404040 40404040 E2E3D2C7 F0F0F7F4*
02D9D3C4 40404040 40400038 40404040 00010001 0C000180 00010001
0C000184 00010001 0C000188 00010001 0C00018C 00010001 0C000190

```
00010001  0C000194  00010001  0C000198  E2E3D2C7  F0F0F7F5*
02E3E7E3  400001A0  4040001C  40400001  000003E4  000003E4  000003D8
000003D8  00000424  0000042C  800003D8  40404040  40404040  40404040
40404040  40404040  40404040  40404040  E2E3D2C7  F0F0F7F6*
02D9D3C4  40404040  40400038  40404040  00010001  0C00019C  00010001
0C0001A0  00010001  0C0001A4  00010001  0C0001A8  00010001  0C0001AC
00010001  0C0001B0  00010001  0C0001B4  E2E3D2C7  F0F0F7F7*
02E3E7E3  400001BC  4040001C  40400001  00000574  00000560  000003D8

MEMBER NAME  STKGAG
000003EC  00000424  00000420  000004E8  40404040  40404040  40404040
40404040  40404040  40404040  40404040  E2E3D2C7  F0F0F7F8*
02D9D3C4  40404040  40400038  40404040  00010001  0C0001B8  00010001
0C0001BC  00010001  0C0001C0  00010001  0C0001C4  00010001  0C0001C8
00010001  0C0001CC  00010001  0C0001D0  E2E3D2C7  F0F0F7F9*
02E3E7E3  400001D8  4040001C  40400001  000003D8  000003D8  000003D8
000003E0  000003E4  000003E4  000003D8  40404040  40404040  40404040
40404040  40404040  40404040  40404040  E2E3D2C7  F0F0F8F0**
02D9D3C4  40404040  40400038  40404040  00010001  0C0001D4  00010001
0C0001D8  00010001  0C0001DC  00010001  0C0001E0  00010001  0C0001E4
00010001  0C0001E8  00010001  0C0001EC  E2E3D2C7  F0F0F8F1*
02E3E7E3  400001F4  4040001C  40400001  000003D8  00000424  0000042C
800003D8  00000578  0000057C  00000414  40404040  40404040  40404040
40404040  40404040  40404040  40404040  E2E3D2C7  F0F0F8F2*
02D9D3C4  40404040  40400038  40404040  00010001  0C0001F0  00010001
0C0001F4  00010001  0C0001F8  00010001  0C0001FC  00010001  0C000200
00010001  0C000204  00010001  0C000208  E2E3D2C7  F0F0F8F3*
02E3E7E3  40000210  4040001C  40400001  000003F8  00000424  00000420
00000080  000003D8  000003D8  000003D8  40404040  40404040  40404040
40404040  40404040  40404040  40404040  E2E3D2C7  F0F0F8F4*
02D9D3C4  40404040  40400038  40404040  00010001  0C00020C  00010001
0C000210  00010001  0C000214  00010001  0C000218  00010001  0C00021C
00010001  0C000220  00010001  0C000224  E2E3D2C7  F0F0F8F5*
02E3E7E3  4000022C  4040001C  40400001  000003E0  000003E4  000003E4
000003D8  000003D8  00000424  0000042C  40404040  40404040  40404040
40404040  40404040  40404040  40404040  E2E3D2C7  F0F0F8F6*
02D9D3C4  40404040  40400038  40404040  00010001  0C000228  00010001
0C00022C  00010001  0C000230  00010001  0C000234  00010001  0C000238
00010001  0C00023C  00010001  0C000240  E2E3D2C7  F0F0F8F7*
02E3E7E3  40000248  4040001C  40400001  800003D8  00000578  0000059C
00000414  00000400  00000424  00000420  40404040  40404040  40404040
40404040  40404040  40404040  40404040  E2E3D2C7  F0F0F8F8*
02D9D3C4  40404040  40400038  40404040  00010001  0C000244  00010001
0C000248  00010001  0C00024C  00010001  0C000250  00010001  0C000254
00010001  0C000258  00010001  0C00025C  E2E3D2C7  F0F0F8F9*
02E3E7E3  40000264  4040001C  40400001  00000070  000003D8  000003D8
000003D8  000003E0  000003E4  000003E4  40404040  40404040  40404040
40404040  40404040  40404040  40404040  E2E3D2C7  F0F0F9F0**
02D9D3C4  40404040  40400038  40404040  00010001  0C000260  00010001
0C000264  00010001  0C000268  00010001  0C00026C  00010001  0C000270
00010001  0C000274  00010001  0C000278  E2E3D2C7  F0F0F9F1*
02E3E7E3  40000280  4040001C  40400001  000003D8  000003D8  00000424
0000042C  800003D8  0000059C  0000057C  40404040  40404040  40404040
40404040  40404040  40404040  40404040  E2E3D2C7  F0F0F9F2*
02D9D3C4  40404040  40400038  40404040  00010001  0C00027C  00010001
0C000280  00010001  0C000284  00010001  0C000288  00010001  0C00028C
00010001  0C000290  00010001  0C000294  E2E3D2C7  F0F0F9F3*
02E3E7E3  4000029C  4040001C  40400001  00000414  00000404  00000424
00000420  00000060  000003D8  000003D8  40404040  40404040  40404040
```

```
40404040  40404040  40404040  40404040  E2E3D2C7  F0F0F9F4*
02D9D3C4  40404040  40400038  40404040  00010001  0C000298  00010001
0C00029C  00010001  0C0002A0  00010001  0C0002A4  00010001  0C0002A8
00010001  0C0002AC  00010001  0C0002B0  E2E3D2C7  F0F0F9F5*
02E3E7E3  400002B8  4040001C  40400001  000003D8  000003E0  000003E4
000003E4  000003D8  000003D8  00000424  40404040  40404040  40404040
40404040  40404040  40404040  40404040  E2E3D2C7  F0F0F9F6*
02D9D3C4  40404040  40400038  40404040  00010001  0C0002B4  00010001
0C0002B8  00010001  0C0002BC  00010001  0C0002C0  00010001  0C0002C4

MEMBER NAME  STKGAG
00010001  0C0002C8  00010001  0C0002CC  E2E3D2C7  F0F0F9F7*
02E3E7E3  400002D4  4040001C  40400001  0000042C  800003D8  0000059C
000005A0  000003D8  00000400  00000424  40404040  40404040  40404040
40404040  40404040  40404040  40404040  E2E3D2C7  F0F0F9F8*
02D9D3C4  40404040  40400038  40404040  00010001  0C0002D0  00010001
0C0002D4  00010001  0C0002D8  00010001  0C0002DC  00010001  0C0002E0
00010001  0C0002E4  00010001  0C0002E8  E2E3D2C7  F0F0F9F9*
02E3E7E3  400002F0  4040001C  40400001  00000420  00000050  000003D8
000003D8  000003D8  000003E0  000003E4  40404040  40404040  40404040
40404040  40404040  40404040  40404040  E2E3D2C7  F0F1F0F0**
02D9D3C4  40404040  40400038  40404040  00010001  0C0002EC  00010001
0C0002F0  00010001  0C0002F4  00010001  0C0002F8  00010001  0C0002FC
00010001  0C000300  00010001  0C000304  E2E3D2C7  F0F1F0F1*
02E3E7E3  4000030C  4040001C  40400001  000003E8  000003D8  000003D8
00000424  0000042C  800003D8  00000580  40404040  40404040  40404040
40404040  40404040  40404040  40404040  E2E3D2C7  F0F1F0F2*
02D9D3C4  40404040  40400038  40404040  00010001  0C000308  00010001
0C00030C  00010001  0C000310  00010001  0C000314  00010001  0C000318
00010001  0C00031C  00010001  0C000320  E2E3D2C7  F0F1F0F3*
02E3E7E3  40000328  4040001C  40400001  00000584  00000580  8000059C
000004A0  00000564  000004A0  800004D0  40404040  40404040  40404040
40404040  40404040  40404040  40404040  E2E3D2C7  F0F1F0F4*
02D9D3C4  40404040  40400038  40404040  00010001  0C000324  00010001
0C000328  00010001  0C00032C  00010001  0C000330  00010001  0C000334
00010001  0C000338  00010001  0C00033C  E2E3D2C7  F0F1F0F5*
02E3E7E3  40000344  4040001C  40400001  000004E8  0000040C  000004E8
80000494  000004A0  00000568  000003D8  40404040  40404040  40404040
40404040  40404040  40404040  40404040  E2E3D2C7  F0F1F0F6*
02D9D3C4  40404040  40400038  40404040  00010001  0C000340  00010001
0C000344  00010001  0C000348  00010001  0C00034C  00010001  0C000350
00010001  0C000354  00010001  0C000358  E2E3D2C7  F0F1F0F7*
02E3E7E3  40000360  4040001C  40400001  00000494  00000424  00000420
000004E8  000003D8  000003D8  000003D8  40404040  40404040  40404040
40404040  40404040  40404040  40404040  E2E3D2C7  F0F1F0F8*
02D9D3C4  40404040  40400038  40404040  00010001  0C00035C  00010001
0C000360  00010001  0C000364  00010001  0C000368  00010001  0C00036C
00010001  0C000370  00010001  0C000374  E2E3D2C7  F0F1F0F9*
02E3E7E3  4000037C  4040001C  40400001  000003E0  000003E4  000003E8
000003D8  000003D8  00000424  0000042C  40404040  40404040  40404040
40404040  40404040  40404040  40404040  E2E3D2C7  F0F1F1F0**
02D9D3C4  40404040  40400038  40404040  00010001  0C000378  00010001
0C00037C  00010001  0C000380  00010001  0C000384  00010001  0C000388
00010001  0C00038C  00010001  0C000390  E2E3D2C7  F0F1F1F1*
02E3E7E3  40000398  4040001C  40400001  800003D8  800003E0  0000059C
00000590  0000059C  80000594  800003E8  40404040  40404040  40404040
40404040  40404040  40404040  40404040  E2E3D2C7  F0F1F1F2*
02D9D3C4  40404040  40400038  40404040  00010001  0C000394  00010001
0C000398  00010001  0C00039C  00010001  0C0003A0  00010001  0C0003A4
```

| | | | | | | |
|---|---|---|---|---|---|---|
| 00010001 | 0C0003A8 | 00010001 | 0C0003AC | E2E3D2C7 | F0F1F1F3* | |
| 02E3E7E3 | 400003B4 | 40400010 | 40400001 | 00000578 | 0000059C | 00000578 |
| 800005A0 | 40404040 | 40404040 | 40404040 | 40404040 | 40404040 | 40404040 |
| 40404040 | 40404040 | 40404040 | 40404040 | E2E3D2C7 | F0F1F1F4* | |
| 02E3E7E3 | 40000544 | 40400038 | 40400001 | 00000000 | 00000018 | 00000000 |
| 00000000 | 00000000 | 0000000C | 00000020 | 00000000 | 00000000 | 00000000 |
| 00000000 | 00000000 | 00000042 | 03140042 | E2E3D2C7 | F0F1F1F5* | |
| 02E3E7E3 | 4000057C | 40400028 | 40400001 | 00000042 | 00000042 | 00000000 |
| 030C0044 | 02FC0044 | 00000000 | 00000046 | 00000024 | 031C0046 | 00000000 |
| 40404040 | 40404040 | 40404040 | 40404040 | E2E3D2C7 | F0F1F1F6* | |

MEMBER NAME STKGAG

| | | | | | | |
|---|---|---|---|---|---|---|
| 02D9D3C4 | 40404040 | 40400028 | 40404040 | 00010001 | 0C0003B0 | 00010001 |
| 0C0003B4 | 00010001 | 0C0003B8 | 00010001 | 0C0003BC | 00010001 | 0C0003C0 |
| 40404040 | 40404040 | 40404040 | 40404040 | E2E3D2C7 | F0F1F1F7* | |
| 02C5D5C4 | 40404040 | 40404040 | 40404040 | 40404040 | 40404040 | 40404040 |
| 00000CE4 | F1F5F7F3 | F460C6D6 | F34040F0 | F2F0F2F8 | F7F0F9F8 | 40F0F84B |
| F4F44BF4 | F4404040 | E2E3D2C7 | C1C74040 | E2E3D2C7 | F0F1F1F8** | |

MEMBER NAME STKMOD

| | | | | | | |
|---|---|---|---|---|---|---|
| 02C5E2C4 | 40404040 | 40400010 | 40400001 | E2E3D2D4 | D6C44040 | 00000000 |
| 40000000 | 40404040 | 40404040 | 40404040 | 40404040 | 40404040 | 40404040 |
| 40404040 | 40404040 | 40404040 | 40404040 | E2E3D2D4 | F0F0F0F1* | |
| 02E3E7E3 | 40000000 | 40400038 | 40400001 | 47F0F00C | 07E2E3D2 | D4D6C440 |
| 90ECD00C | 184D98CD | F0205040 | D00450D0 | 400807FC | 40404040 | 40404040 |
| 021A05C4 | C1E2C840 | 10031A06 | 4040C9C4 | E2E3D2D4 | F0F0F0F2* | |
| 02E3E7E3 | 40000038 | 40400038 | 40400001 | 7E401002 | 22020610 | 14012202 |
| 1A09D3C9 | D5C540E7 | F17E400A | 0A041A05 | 40E8F17E | 400A0A04 | 1A0A5B40 |
| 40404040 | E7F27E40 | 0A0A041A | 0540E8F2 | E2E3D2D4 | F0F0F0F3* | |
| 02E3E7E3 | 40000070 | 40400038 | 40400001 | 7E400A0A | 04180522 | 02064614 |
| 0122021A | 17D3D6C1 | C440C4C9 | D9C5C3E3 | C9D6D540 | C1D5C7D3 | C5407E40 |
| 0A080218 | 3722021A | 0ED9C5C6 | C9D3C540 | E2E3D2D4 | F0F0F0F4* | |
| 02E3E7E3 | 400000A8 | 40400016 | 40400001 | C5D9D9D6 | D97E4010 | 031A0A40 |
| C9D540E2 | E3D2D4D6 | C4224040 | 40404040 | 40404040 | 40404040 | 40404040 |
| 40404040 | 40404040 | 40404040 | 40404040 | E2E3D2D4 | F0F0F0F5* | |
| 02E3E7E3 | 400003F8 | 40400038 | 40400001 | 00000000 | 00000000 | 4F080000 |
| 00000000 | 00000000 | 00000000 | 00000001 | 00000002 | 00000003 | 00000004 |
| 00000005 | 00000006 | 00000007 | 00000008 | E2E3D2D4 | F0F0F0F6* | |
| 02E3E7E3 | 40000430 | 40400038 | 40400001 | 00000010 | 00000046 | 00000049 |
| 00000058 | 0000005D | 00000070 | 00000080 | 00000098 | 401DF3B6 | 4029FBE7 |
| 4029FFD6 | 403EF9DB | 4091EB85 | 41100000 | E2E3D2D4 | F0F0F0F7* | |
| 02C5E2C4 | 40404040 | 40400010 | 40400002 | C7D9E4D7 | 40404040 | 05000000 |
| 4000000C | 40404040 | 40404040 | 40404040 | 40404040 | 40404040 | 40404040 |
| 40404040 | 40404040 | 40404040 | 40404040 | E2E3D2D4 | F0F0F0F8* | |
| 02E3E7E3 | 40000468 | 40400028 | 40400001 | 411CCCCD | 41200000 | 4121EB85 |
| 4126B852 | 41300000 | 41400000 | 41500000 | 421A0000 | 00000000 | 00000000 |
| 40404040 | 40404040 | 40404040 | 40404040 | E2E3D2D4 | F0F0F0F9* | |
| 02C5E2C4 | 40404040 | 40400010 | 40400003 | D7D4C1E3 | D3404040 | 05000000 |
| 40001134 | 40404040 | 40404040 | 40404040 | 40404040 | 40404040 | 40404040 |
| 40404040 | 40404040 | 40404040 | 40404040 | E2E3D2D4 | F0F0F1F0** | |
| 02C5E2C4 | 40404040 | 40400010 | 40400004 | D9D4D6C4 | C5D34040 | 05000000 |
| 40000018 | 40404040 | 40404040 | 40404040 | 40404040 | 40404040 | 40404040 |
| 40404040 | 40404040 | 40404040 | 40404040 | E2E3D2D4 | F0F0F1F1* | |
| 02C5E2C4 | 40404040 | 40400010 | 40400005 | C3C1C4E2 | E3404040 | 02000000 |
| 40000000 | 40404040 | 40404040 | 40404040 | 40404040 | 40404040 | 40404040 |
| 40404040 | 40404040 | 40404040 | 40404040 | E2E3D2D4 | F0F0F1F2* | |
| 02C5E2C4 | 40404040 | 40400010 | 40400006 | D4E5C3C8 | D9404040 | 02000000 |
| 40000000 | 40404040 | 40404040 | 40404040 | 40404040 | 40404040 | 40404040 |
| 40404040 | 40404040 | 40404040 | 40404040 | E2E3D2D4 | F0F0F1F3* | |

```
02E3E7E3  40000618  4040001C  40400001  00000000  FFFFFFA0  00001130
FFFFFFFF  00000000  00000000  00000000  40404040  40404040  40404040
40404040  40404040  40404040  40404040  E2E3D2D4  F0F0F1F4*
02E3E7E3  40000638  40400004  40400001  00000000  40404040  40404040
40404040  40404040  40404040  40404040  40404040  40404040  40404040
40404040  40404040  40404040  40404040  E2E3D2D4  F0F0F1F5*
02C5E2C4  40404040  40400010  40400007  C3C1C4C6  C9D34040  02000000
40000000  40404040  40404040  40404040  40404040  40404040  40404040
40404040  40404040  40404040  40404040  E2E3D2D4  F0F0F1F6*
02E3E7E3  40000640  40400004  40400001  00000000  40404040  40404040
40404040  40404040  40404040  40404040  40404040  40404040  40404040
40404040  40404040  40404040  40404040  E2E3D2D4  F0F0F1F7*
02C5E2C4  40404040  40400010  40400008  C3C1C4D5  D7C44040  02000000
40000000  40404040  40404040  40404040  40404040  40404040  40404040
40404040  40404040  40404040  40404040  E2E3D2D4  F0F0F1F8*
02E3E7E3  40000648  40400008  40400001  00000000  00000000  40404040
40404040  40404040  40404040  40404040  40404040  40404040  40404040
40404040  40404040  40404040  40404040  E2E3D2D4  F0F0F1F9*
02D9D3C4  40404040  40400038  40404040  00020001  0C000618  00030001

MEMBER NAME  STKMOD
0C00061C  00030001  0C000620  00040001  0C000624  00050001  1C000628
00060001  1C00062C  00070001  1C000648  E2E3D2D4  F0F0F2F0**
02C5E2C4  40404040  40400010  40400009  C3C1C4D5  E2C84040  02000000
40000000  40404040  40404040  40404040  40404040  40404040  40404040
40404040  40404040  40404040  40404040  E2E3D2D4  F0F0F2F1*
02C5E2C4  40404040  40400010  4040000A  C3C1C4E2  E4D74040  02000000
40000000  40404040  40404040  40404040  40404040  40404040  40404040
40404040  40404040  40404040  40404040  E2E3D2D4  F0F0F2F2*
02C5E2C4  40404040  40400010  4040000B  C8C7C4C1  E3C54040  02000000
40000000  40404040  40404040  40404040  40404040  40404040  40404040
40404040  40404040  40404040  40404040  E2E3D2D4  F0F0F2F3*
02C5E2C4  40404040  40400010  4040000C  C8C7E3C9  D4C54040  02000000
40000000  40404040  40404040  40404040  40404040  40404040  40404040
40404040  40404040  40404040  40404040  E2E3D2D4  F0F0F2F4*
02C5E2C4  40404040  40400010  4040000D  C9C2C3D6  D47B4040  02000000
40000000  40404040  40404040  40404040  40404040  40404040  40404040
40404040  40404040  40404040  40404040  E2E3D2D4  F0F0F2F5*
02C5E2C4  40404040  40400010  4040000E  C9C3D5E3  C5D94040  02000000
40000000  40404040  40404040  40404040  40404040  40404040  40404040
40404040  40404040  40404040  40404040  E2E3D2D4  F0F0F2F6*
02C5E2C4  40404040  40400010  4040000F  D4D6C4E2  D9E34040  02000000
40000000  40404040  40404040  40404040  40404040  40404040  40404040
40404040  40404040  40404040  40404040  E2E3D2D4  F0F0F2F7*
02E3E7E3  40000650  4040001C  40400001  00000000  00000000  00000000
00000000  00000000  00000000  00000000  40404040  40404040  40404040
40404040  40404040  40404040  40404040  E2E3D2D4  F0F0F2F8*
02D9D3C4  40404040  40400038  40404040  00080001  1C00064C  00090001
1C000650  000A0001  1C000654  000B0001  1C000658  000C0001  1C00065C
000D0001  1C000660  000E0001  1C000664  E2E3D2D4  F0F0F2F9*
02C5E2C4  40404040  40400010  40400010  E2E3D2C3  C1D34040  02000000
40000000  40404040  40404040  40404040  40404040  40404040  40404040
40404040  40404040  40404040  40404040  E2E3D2D4  F0F0F3F0**
02C5E2C4  40404040  40400010  40400011  E2E3D2C5  D7D34040  02000000
40000000  40404040  40404040  40404040  40404040  40404040  40404040
40404040  40404040  40404040  40404040  E2E3D2D4  F0F0F3F1*
02C5E2C4  40404040  40400010  40400012  E2E3D2C7  C1C74040  02000000
40000000  40404040  40404040  40404040  40404040  40404040  40404040
40404040  40404040  40404040  40404040  E2E3D2D4  F0F0F3F2*
```

```
02C5E2C4  40404040  40400010  40400013  E2E3D2E2  E3D24040  02000000
40000000  40404040  40404040  40404040  40404040  40404040  40404040
40404040  40404040  40404040  40404040  E2E3D2D4  F0F0F3F3*
02E3E7E3  4000066C  40400010  40400001  00000000  00000000  00000000
00000000  40404040  40404040  40404040  40404040  40404040  40404040
40404040  40404040  40404040  40404040  E2E3D2D4  F0F0F3F4*
02E3E7E3  40000578  40400038  40400001  C3D6D7E8  D9C9C7C8  E3404DC3
5D40F1F9  F8F640E3  C8C540C2  D6C5C9D5  C740C3D6  D4D7C1D5  E85BC1D3
D340D9C9  C7C8E3E2  40D9C5E2  C5D9E5C5  E2E3D2D4  F0F0F3F5*
02E3E7E3  400005B0  40400038  40400001  C45B5BE2  D3C9C340  E5C5D9E2
C9D6D540  E7E7E7E7  40404040  40404040  4040C4C1  E3C57A40  E7E761E7
E761E7E7  40404040  40E3C9D4  C57A40E7  E2E3D2D4  F0F0F3F6*
02E3E7E3  400005E8  40400028  40400001  E77AE7E7  7AE7E740  5B5BE2E3
C9C3D240  D4D6C4C5  D3404040  40404040  40404040  40404040  40404040
40404040  40404040  40404040  40404040  E2E3D2D4  F0F0F3F7*
02E3E7E3  400006A0  40400038  40400001  5860D564  5870D580  5880D570
5890D558  58A0D578  5800D40C  5900D350  47A0D608  1BFF58E0  D00007FE
7820D3DC  30222B00  38026A00  D3406000  E2E3D2D4  F0F0F3F8*
02E3E7E3  400006D8  40400038  40400001  D3385800  D33C5000  D3EC2B00
78008014  6A00D340  6000D338  5800D33C  5000D3E0  58F0D5A8  4110D094

MEMBER NAME  STKMOD
05EF58F0  D56C4110  D0B405EF  58F0D56C  E2E3D2D4  F0F0F3F9*
02E3E7E3  40000710  40400038  40400001  4110D0C0  05EF58F0  D5684110
D0CC05EF  58F0D590  4110D0D8  05EF41E0  000415FE  4720D67A  58EFD04C
07FE58F0  D59C4110  D0E005EF  58F0D598  E2E3D2D4  F0F0F4F0**
02E3E7E3  40000748  40400038  40400001  4110D0E4  05EF4100  D5145000
D0EC4100  D49C5000  D0F09280  D0F058F0  D56C4110  D0E805EF  4100D527
5000D0EC  4100D4A4  5000D0F0  9280D0F0  E2E3D2D4  F0F0F4F1*
02E3E7E3  40000780  40400038  40400001  58F0D56C  4110D0E8  05EF4100
D5005000  D0F858F0  D56C4110  D0F405EF  58F0D5A0  45E0F004  00000000
00000028  45E0F008  0450D3EC  45E0F008  E2E3D2D4  F0F0F4F2*
02E3E7E3  400007B8  40400038  40400001  0450D3E0  45E0F010  58F0D5A0
45E0F000  00000000  0000003D  45E0F134  00010000  0120D53F  01000010
00000001  45E0F010  58F0D5A4  4110D100  E2E3D2D4  F0F0F4F3*
02E3E7E3  400007F0  40400038  40400001  05EF5000  D3F47800  D3BC3300
7000D5BC  7800D3A0  33007000  D5C058F0  D5944110  D10805EF  41E00004
15FE4720  D76458EF  D05407FE  58F0D5A0  E2E3D2D4  F0F0F4F4*
02E3E7E3  40000828  4040000C  40400001  45E0F004  00000000  00000043
40404040  40404040  40404040  40404040  40404040  40404040  40404040
40404040  40404040  40404040  40404040  E2E3D2D4  F0F0F4F5*
02D9D3C4  40404040  40400038  40404040  000F0001  1C000668  00100001
1C00066C  00110001  1C000670  00120001  1C000674  00130001  1C000678
00010001  0C0007A8  00010001  0C0007CC  E2E3D2D4  F0F0F4F6*
02E3E7E3  40000834  40400038  40400001  45E0F134  00010000  04708004
01000004  00000004  45E0F010  58F0D5A0  45E0F000  00000000  00000078
45E0F134  00010000  0120D438  01000046  E2E3D2D4  F0F0F4F7*
02E3E7E3  4000086C  40400038  40400001  00000001  45E0F010  58F0D5A4
4110D150  05EF5000  D3F87800  D3A83300  7000D5C4  58F0D594  4110D158
05EF41E0  000415FE  4720D7E6  58EFD05C  E2E3D2D4  F0F0F4F8*
02E3E7E3  400008A4  40400038  40400001  07FE58F0  D5AC4110  D1A005EF
58F0D5B8  4110D1C0  05EF58F0  D5B44110  D1CC05EF  5850D410  5C40D5CC
5830D35C  1A357823  70007A20  D3AC7020  E2E3D2D4  F0F0F4F9*
02E3E7E3  400008DC  40400038  40400001  D3D45850  D40C5C40  D5D45830
D5D01A35  7840D3C4  7A43A000  7A40D3B8  7040D400  7A20D3C0  7020D3FC
7800D3C4  33007000  D5C858F0  D58C4110  E2E3D2D4  F0F0F5F0**
02E3E7E3  40000914  40400038  40400001  D1E805EF  41E00004  15FE4720
D86858EF  D06407FE  58B0D35C  58F0D588  4110D208  05EF59B0  D4144780
D86C5800  D4145900  D3504770  D9CE58F0  E2E3D2D4  F0F0F5F1*
```

```
02E3E7E3  4000094C  40400038  40400001  D5A84110  D21405EF  58F0D56C
4110D0B4  05EF58F0  D56C4110  D0C005EF  58F0D568  4110D0CC  05EF58F0
D5904110  D0D805EF  41E00004  15FE4720  E2E3D2D4  F0F0F5F2*
02E3E7E3  40000984  40400038  40400001  D8CC58EF  D06C07FE  58F0D594
4110D234  05EF41E0  000415FE  4720D8E6  58EFD074  07FE58F0  D5944110
D27C05EF  41E00004  15FE4720  D90058EF  E2E3D2D4  F0F0F5F3*
02E3E7E3  400009BC  40400038  40400001  D07C07FE  58F0D5A0  45E0F004
00000000  0000007E  45E0F008  0860D430  45E0F010  58F0D5A0  45E0F000
00000000  00000078  45E0F134  00010000  E2E3D2D4  F0F0F5F4*
02E3E7E3  400009F4  40400038  40400001  0120D438  01000046  00000001
45E0F010  58F0D5A4  4110D150  05EF5000  D3F87800  D3B43300  7000D5D8
58F0D594  4110D2C4  05EF41E0  000415FE  E2E3D2D4  F0F0F5F5*
02E3E7E3  40000A2C  40400038  40400001  4720D976  58EFD084  07FE58F0
D58C4110  D30C05EF  41E00004  15FE4720  D99058EF  D08C07FE  58F0D5B8
4110D32C  05EF58F0  D5B04110  D1CC05EF  E2E3D2D4  F0F0F5F6*
02E3E7E3  40000A64  40400038  40400001  58B0D35C  58F0D588  4110D208
05EF59B0  D4144780  D9A85800  D4145900  D3504770  D9CE1BFF  58E0D000
07FE58F0  D5A01800  45E0F004  00000006  E2E3D2D4  F0F0F5F7*
02E3E7E3  40000A9C  40400038  40400001  0000009E  45E0F008  0450D414
45E0F010  58F0D5A0  45E0F034  05404040  F1F158A0  D00458E0  A00C58B0
A0185810  B0007820  D3DC7020  10005820  E2E3D2D4  F0F0F5F8*

MEMBER NAME  STKMOD
02E3E7E3  40000AD4  40400038  40400001  B00C5830  D40C5030  20005840
B0145850  D4105050  400018DA  92FFA00C  982CA01C  07FE987B  10007820
70007020  D3DC5820  A0005020  D40C5870  E2E3D2D4  F0F0F5F9*
02E3E7E3  40000B0C  40400038  40400001  10145820  70005020  D4105820
10044130  20004150  00041B25  5020D570  5030D574  5030D1B0  5030D1DC
58201008  41302000  41500004  1B255C40  E2E3D2D4  F0F0F6F0**
02E3E7E3  40000B44  40400038  40400001  D36C1B25  5020D578  5030D57C
5030D1A0  5030D1C0  5030D1CC  5030D32C  58201010  41302000  41500004
1B255C40  D3641B25  5020D580  5030D584  E2E3D2D4  F0F0F6F1*
02E3E7E3  40000B7C  4040000C  40400001  5030D1A8  5030D1D4  47F0D5E0
40404040  40404040  40404040  40404040  40404040  40404040  40404040
40404040  40404040  40404040  40404040  E2E3D2D4  F0F0F6F2*
02E3E7E3  40000020  40400008  40400001  00000AF6  000000C0  40404040
40404040  40404040  40404040  40404040  40404040  40404040  40404040
40404040  40404040  40404040  40404040  E2E3D2D4  F0F0F6F3*
02E3E7E3  400000C0  40400004  40400001  00000ABA  40404040  40404040
40404040  40404040  40404040  40404040  40404040  40404040  40404040
40404040  40404040  40404040  40404040  E2E3D2D4  F0F0F6F4*
02D9D3C4  40404040  40400038  40404040  00010001  0C000830  00010001
0C000858  00010001  0C0009CC  00010001  0C0009E8  00010001  0C000A9C
00010001  0C000020  00010001  0C000024  E2E3D2D4  F0F0F6F5*
02E3E7E3  4000010C  4040001C  40400001  0000073A  0000073A  00000824
00000824  000008A6  000008A6  00000928  40404040  40404040  40404040
40404040  40404040  40404040  40404040  E2E3D2D4  F0F0F6F6*
02D9D3C4  40404040  40400038  40404040  00010001  0C0000C0  00010001
0C00010C  00010001  0C000110  00010001  0C000114  00010001  0C000118
00010001  0C00011C  00010001  0C000120  E2E3D2D4  F0F0F6F7*
02E3E7E3  40000128  4040001C  40400001  00000928  0000098C  0000098C
000009A6  000009A6  000009C0  00000A36  40404040  40404040  40404040
40404040  40404040  40404040  40404040  E2E3D2D4  F0F0F6F8*
02D9D3C4  40404040  40400038  40404040  00010001  0C000124  00010001
0C000128  00010001  0C00012C  00010001  0C000130  00010001  0C000134
00010001  0C000138  00010001  0C00013C  E2E3D2D4  F0F0F6F9*
02E3E7E3  40000144  4040001C  40400001  00000A36  00000A36  00000A50
00000A50  00000428  000004A0  000004AC  40404040  40404040  40404040
40404040  40404040  40404040  40404040  E2E3D2D4  F0F0F7F0**
```

```
02D9D3C4  40404040  40400038  40404040  00010001  0C000140  00010001
0C000144  00010001  0C000148  00010001  0C00014C  00010001  0C000150
00010001  0C000154  00010001  0C000158  E2E3D2D4  F0F0F7F1*
02E3E7E3  40000160  4040001C  40400001  000004A4  000004B0  000004C8
00000498  80000548  0000041C  000004A8  40404040  40404040  40404040
40404040  40404040  40404040  40404040  E2E3D2D4  F0F0F7F2*
02D9D3C4  40404040  40400038  40404040  00010001  0C00015C  00010001
0C000160  00010001  0C000164  00010001  0C000168  00010001  0C00016C
00010001  0C000170  00010001  0C000174  E2E3D2D4  F0F0F7F3*
02E3E7E3  4000017C  4040001C  40400001  80000000  0000042C  0000056C
80000004  00000548  0000056C  800004A8  40404040  40404040  40404040
40404040  40404040  40404040  40404040  E2E3D2D4  F0F0F7F4*
02D9D3C4  40404040  40400038  40404040  00010001  0C000178  00020001
0C00017C  00010001  0C000180  00010001  0C000184  00020001  0C000188
00010001  0C00018C  00010001  0C000190  E2E3D2D4  F0F0F7F5*
02E3E7E3  40000198  40400014  40400001  00000448  80000448  80000564
8000055C  0000042C  40404040  40404040  40404040  40404040  40404040
40404040  40404040  40404040  40404040  E2E3D2D4  F0F0F7F6*
02E3E7E3  400001B0  40400008  40400001  80000000  0000041C  40404040
40404040  40404040  40404040  40404040  40404040  40404040  40404040
40404040  40404040  40404040  40404040  E2E3D2D4  F0F0F7F7*
02E3E7E3  400001BC  40400004  40400001  80000014  40404040  40404040

MEMBER NAME  STKMOD
40404040  40404040  40404040  40404040  40404040  40404040  40404040
40404040  40404040  40404040  40404040  E2E3D2D4  F0F0F7F8*
02D9D3C4  40404040  40400038  40404040  00010001  0C000194  00010001
0C000198  00010001  0C00019C  00010001  0C0001A0  00010001  0C0001A4
00010001  0C0001A8  00010001  0C0001B4  E2E3D2D4  F0F0F7F9*
02E3E7E3  400001C0  4040001C  40400001  00000578  8000044C  0000067C
00000680  00000408  000004B4  00000454  40404040  40404040  40404040
40404040  40404040  40404040  40404040  E2E3D2D4  F0F0F8F0**
02D9D3C4  40404040  40400038  40404040  00040001  0C0001BC  00010001
0C0001C0  00010001  0C0001C4  00010001  0C0001C8  00010001  0C0001CC
00010001  0C0001D0  00010001  0C0001D4  E2E3D2D4  F0F0F8F1*
02E3E7E3  400001DC  4040001C  40400001  00000450  00000578  00000408
00000408  00000408  00000408  00000410  40404040  40404040  40404040
40404040  40404040  40404040  40404040  E2E3D2D4  F0F0F8F2*
02D9D3C4  40404040  40400038  40404040  00010001  0C0001D8  00010001
0C0001DC  00010001  0C0001E0  00010001  0C0001E4  00010001  0C0001E8
00010001  0C0001EC  00010001  0C0001F0  E2E3D2D4  F0F0F8F3*
02E3E7E3  400001F8  4040001C  40400001  00000418  00000408  00000408
00000454  0000045C  80000408  000004F8  40404040  40404040  40404040
40404040  40404040  40404040  40404040  E2E3D2D4  F0F0F8F4*
02D9D3C4  40404040  40400038  40404040  00010001  0C0001F4  00010001
0C0001F8  00010001  0C0001FC  00010001  0C000200  00010001  0C000204
00010001  0C000208  00010001  0C00020C  E2E3D2D4  F0F0F8F5*
02E3E7E3  40000214  4040001C  40400001  80000434  00000470  00000684
00000408  000004B8  00000454  00000450  40404040  40404040  40404040
40404040  40404040  40404040  40404040  E2E3D2D4  F0F0F8F6*
02D9D3C4  40404040  40400038  40404040  00010001  0C000210  00010001
0C000214  00010001  0C000218  00010001  0C00021C  00010001  0C000220
00010001  0C000224  00010001  0C000228  E2E3D2D4  F0F0F8F7*
02E3E7E3  40000230  4040001C  40400001  000004F8  00000408  00000408
00000408  00000408  00000410  00000418  40404040  40404040  40404040
40404040  40404040  40404040  40404040  E2E3D2D4  F0F0F8F8*
02D9D3C4  40404040  40400038  40404040  00010001  0C00022C  00010001
0C000230  00010001  0C000234  00010001  0C000238  00010001  0C00023C
00010001  0C000240  00010001  0C000244  E2E3D2D4  F0F0F8F9*
```

```
02E3E7E3  4000024C  40400014  40400001  00000408  00000408  00000454
0000045C  80000408  40404040  40404040  40404040  40404040  40404040
40404040  40404040  40404040  40404040  E2E3D2D4  F0F0F9F0**
02E3E7E3  40000264  40400004  40400001  000004CC  40404040  40404040
40404040  40404040  40404040  40404040  40404040  40404040  40404040
40404040  40404040  40404040  40404040  E2E3D2D4  F0F0F9F1*
02E3E7E3  4000026C  40400004  40400001  000004D0  40404040  40404040
40404040  40404040  40404040  40404040  40404040  40404040  40404040
40404040  40404040  40404040  40404040  E2E3D2D4  F0F0F9F2*
02D9D3C4  40404040  40400038  40404040  00010001  0C000248  00010001
0C00024C  00010001  0C000250  00010001  0C000254  00010001  0C000258
00010001  0C00025C  00010001  0C000264  E2E3D2D4  F0F0F9F3*
02E3E7E3  40000274  4040000C  40400001  000004E0  000004E8  800004F0
40404040  40404040  40404040  40404040  40404040  40404040  40404040
40404040  40404040  40404040  40404040  E2E3D2D4  F0F0F9F4*
02E3E7E3  40000284  40400008  40400001  000004CC  80000420  40404040
40404040  40404040  40404040  40404040  40404040  40404040  40404040
40404040  40404040  40404040  40404040  E2E3D2D4  F0F0F9F5*
02E3E7E3  40000290  40400004  40400001  000004CC  40404040  40404040
40404040  40404040  40404040  40404040  40404040  40404040  40404040
40404040  40404040  40404040  40404040  E2E3D2D4  F0F0F9F6*
02E3E7E3  40000298  40400004  40400001  000004D0  40404040  40404040
40404040  40404040  40404040  40404040  40404040  40404040  40404040

MEMBER NAME  STKMOD
40404040  40404040  40404040  40404040  E2E3D2D4  F0F0F9F7*
02D9D3C4  40404040  40400038  40404040  00010001  0C00026C  00010001
0C000274  00010001  0C000278  00010001  0C00027C  00010001  0C000284
00010001  0C000288  00010001  0C000290  E2E3D2D4  F0F0F9F8*
02E3E7E3  400002A0  4040001C  40400001  000004E0  800004E8  00000494
00000688  0000040C  00000464  00000464  40404040  40404040  40404040
40404040  40404040  40404040  40404040  E2E3D2D4  F0F0F9F9*
02D9D3C4  40404040  40400038  40404040  00010001  0C000298  00010001
0C0002A0  00010001  0C0002A4  00010001  0C0002A8  00010001  0C0002AC
00010001  0C0002B0  00010001  0C0002B4  E2E3D2D4  F0F1F0F0**
02E3E7E3  400002BC  4040001C  40400001  00000458  000004C0  800004BC
00000414  000004D4  800004C4  0000042C  40404040  40404040  40404040
40404040  40404040  40404040  40404040  E2E3D2D4  F0F1F0F1*
02D9D3C4  40404040  40400038  40404040  00010001  0C0002B8  00010001
0C0002BC  00010001  0C0002C0  00010001  0C0002C4  00010001  0C0002C8
00010001  0C0002CC  00010001  0C0002D0  E2E3D2D4  F0F1F0F2*
02E3E7E3  400002D8  4040001C  40400001  000004A0  000004AC  000004A4
000004B0  000004C8  00000498  80000548  40404040  40404040  40404040
40404040  40404040  40404040  40404040  E2E3D2D4  F0F1F0F3*
02D9D3C4  40404040  40400038  40404040  00010001  0C0002D4  00010001
0C0002D8  00010001  0C0002DC  00010001  0C0002E0  00010001  0C0002E4
00010001  0C0002E8  00010001  0C0002EC  E2E3D2D4  F0F1F0F4*
02E3E7E3  400002F4  4040001C  40400001  0000067C  00000680  00000408
000004B4  00000454  00000450  00000578  40404040  40404040  40404040
40404040  40404040  40404040  40404040  E2E3D2D4  F0F1F0F5*
02D9D3C4  40404040  40400038  40404040  00010001  0C0002F0  00010001
0C0002F4  00010001  0C0002F8  00010001  0C0002FC  00010001  0C000300
00010001  0C000304  00010001  0C000308  E2E3D2D4  F0F1F0F6*
02E3E7E3  40000310  4040001C  40400001  00000408  00000408  00000408
00000408  00000410  00000418  00000408  40404040  40404040  40404040
40404040  40404040  40404040  40404040  E2E3D2D4  F0F1F0F7*
02D9D3C4  40404040  40400038  40404040  00010001  0C00030C  00010001
0C000310  00010001  0C000314  00010001  0C000318  00010001  0C00031C
00010001  0C000320  00010001  0C000324  E2E3D2D4  F0F1F0F8*
```

```
02E3E7E3  4000032C  4040001C  40400001  00000408  00000454  0000045C
80000408  00000470  00000684  00000408  40404040  40404040  40404040
40404040  40404040  40404040  40404040  E2E3D2D4  F0F1F0F9*
02D9D3C4  40404040  40400038  40404040  00010001  0C000328  00010001
0C00032C  00010001  0C000330  00010001  0C000334  00010001  0C000338
00010001  0C00033C  00010001  0C000340  E2E3D2D4  F0F1F1F0**
02E3E7E3  40000348  4040001C  40400001  000004B8  00000454  00000450
000004F8  00000408  00000408  00000408  40404040  40404040  40404040
40404040  40404040  40404040  40404040  E2E3D2D4  F0F1F1F1*
02D9D3C4  40404040  40400038  40404040  00010001  0C000344  00010001
0C000348  00010001  0C00034C  00010001  0C000350  00010001  0C000354
00010001  0C000358  00010001  0C00035C  E2E3D2D4  F0F1F1F2*
02E3E7E3  40000364  4040001C  40400001  00000408  00000410  00000418
00000408  00000408  00000454  0000045C  40404040  40404040  40404040
40404040  40404040  40404040  40404040  E2E3D2D4  F0F1F1F3*
02D9D3C4  40404040  40400038  40404040  00010001  0C000360  00010001
0C000364  00010001  0C000368  00010001  0C00036C  00010001  0C000370
00010001  0C000374  00010001  0C000378  E2E3D2D4  F0F1F1F4*
02E3E7E3  40000380  4040001C  40400001  80000408  00000470  00000698
00000408  000004B8  00000454  00000450  40404040  40404040  40404040
40404040  40404040  40404040  40404040  E2E3D2D4  F0F1F1F5*
02D9D3C4  40404040  40400038  40404040  00010001  0C00037C  00010001
0C000380  00010001  0C000384  00010001  0C000388  00010001  0C00038C
00010001  0C000390  00010001  0C000394  E2E3D2D4  F0F1F1F6*

MEMBER NAME  STKMOD
02E3E7E3  4000039C  4040001C  40400001  000004F8  00000408  00000408
00000408  00000408  00000410  00000418  40404040  40404040  40404040
40404040  40404040  40404040  40404040  E2E3D2D4  F0F1F1F7*
02D9D3C4  40404040  40400038  40404040  00010001  0C000398  00010001
0C00039C  00010001  0C0003A0  00010001  0C0003A4  00010001  0C0003A8
00010001  0C0003AC  00010001  0C0003B0  E2E3D2D4  F0F1F1F8*
02E3E7E3  400003B8  4040001C  40400001  00000408  00000408  00000454
0000045C  80000408  00000494  00000688  40404040  40404040  40404040
40404040  40404040  40404040  40404040  E2E3D2D4  F0F1F1F9*
02D9D3C4  40404040  40400038  40404040  00010001  0C0003B4  00010001
0C0003B8  00010001  0C0003BC  00010001  0C0003C0  00010001  0C0003C4
00010001  0C0003C8  00010001  0C0003CC  E2E3D2D4  F0F1F2F0**
02E3E7E3  400003D4  40400018  40400001  0000040C  00000464  00000464
00000458  000004C0  800004BC  40404040  40404040  40404040  40404040
40404040  40404040  40404040  40404040  E2E3D2D4  F0F1F2F1*
02E3E7E3  400003F0  40400004  40400001  000004CC  40404040  40404040
40404040  40404040  40404040  40404040  40404040  40404040  40404040
40404040  40404040  40404040  40404040  E2E3D2D4  F0F1F2F2*
02D9D3C4  40404040  40400038  40404040  00010001  0C0003D0  00010001
0C0003D4  00010001  0C0003D8  00010001  0C0003DC  00010001  0C0003E0
00010001  0C0003E4  00010001  0C0003E8  E2E3D2D4  F0F1F2F3*
02E3E7E3  400003F4  40400004  40400001  80000428  40404040  40404040
40404040  40404040  40404040  40404040  40404040  40404040  40404040
40404040  40404040  40404040  40404040  E2E3D2D4  F0F1F2F4*
02E3E7E3  4000067C  40400024  40400001  00000000  00000000  00000000
00000000  00000018  0000000C  00000020  00000000  00000000  40404040
40404040  40404040  40404040  40404040  E2E3D2D4  F0F1F2F5*
02D9D3C4  40404040  40400010  40404040  00010001  0C0003F0  00010001
0C0003F4  40404040  40404040  40404040  40404040  40404040  40404040
40404040  40404040  40404040  40404040  E2E3D2D4  F0F1F2F6*
02C5D5C4  40404040  40404040  40404040  40404040  40404040  40404040
00000B88  F1F5F7F3  F460C6D6  F34040F0  F2F0F2F8  F7F0F9F8  40F0F84B
F4F44BF4  F9404040  E2E3D2D4  D6C44040  E2E3D2D4  F0F1F2F7**
```

MEMBER NAME STKSTK

| | | | | | | |
|---|---|---|---|---|---|---|
| 02C5E2C4 | 40404040 | 40400010 | 40400001 | E2E3D2E2 | E3D24040 | 00000000 |
| 40000000 | 40404040 | 40404040 | 40404040 | 40404040 | 40404040 | 40404040 |
| 40404040 | 40404040 | 40404040 | 40404040 | E2E3D2E2 | F0F0F0F1* | |
| 02E3E7E3 | 40000000 | 40400038 | 40400001 | 47F0F00C | 07E2E3D2 | E2E3D240 |
| 90ECD00C | 184D98CD | F0205040 | D00450D0 | 400807FC | 40404040 | 40404040 |
| 020A0602 | 1A016B10 | 041A026B | D310041A | E2E3D2E2 | F0F0F0F2* | |
| 02E3E7E3 | 40000038 | 40400029 | 40400001 | 026BE210 | 04220206 | 17140122 |
| 021A1940 | 40C5D9D9 | D6D940C9 | D540C3C1 | D3D340C9 | D540E2E3 | D2E2E3D2 |
| 22404040 | 40404040 | 40404040 | 40404040 | E2E3D2E2 | F0F0F0F3* | |
| 02E3E7E3 | 400000F0 | 40400038 | 40400001 | 00000000 | 00000000 | 4F080000 |
| 00000000 | 00000001 | 00000002 | 00000003 | 00000004 | 00000006 | 00000008 |
| 0000000A | 00000017 | 00000058 | 40400000 | E2E3D2E2 | F0F0F0F4* | |
| 02C5E2C4 | 40404040 | 40400010 | 40400002 | D7D4C1E3 | D3404040 | 05000000 |
| 40001134 | 40404040 | 40404040 | 40404040 | 40404040 | 40404040 | 40404040 |
| 40404040 | 40404040 | 40404040 | 40404040 | E2E3D2E2 | F0F0F0F5* | |
| 02E3E7E3 | 40000128 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E2E3D2E2 | F0F0F0F6* | |
| 02C5E2C4 | 40404040 | 40400010 | 40400003 | E2D8D9E3 | 40404040 | 02000000 |
| 40000000 | 40404040 | 40404040 | 40404040 | 40404040 | 40404040 | 40404040 |
| 40404040 | 40404040 | 40404040 | 40404040 | E2E3D2E2 | F0F0F0F7* | |
| 02C5E2C4 | 40404040 | 40400010 | 40400004 | C3C1C4E3 | E7D34040 | 02000000 |
| 40000000 | 40404040 | 40404040 | 40404040 | 40404040 | 40404040 | 40404040 |
| 40404040 | 40404040 | 40404040 | 40404040 | E2E3D2E2 | F0F0F0F8* | |
| 02E3E7E3 | 400001C8 | 40400010 | 40400001 | FFFFFFA0 | 00001130 | 00000000 |
| 00000000 | 40404040 | 40404040 | 40404040 | 40404040 | 40404040 | 40404040 |
| 40404040 | 40404040 | 40404040 | 40404040 | E2E3D2E2 | F0F0F0F9* | |
| 02C5E2C4 | 40404040 | 40400010 | 40400005 | C3D4D7D9 | E2E24040 | 02000000 |
| 40000000 | 40404040 | 40404040 | 40404040 | 40404040 | 40404040 | 40404040 |
| 40404040 | 40404040 | 40404040 | 40404040 | E2E3D2E2 | F0F0F1F0** | |
| 02C5E2C4 | 40404040 | 40400010 | 40400006 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | E2E3D2E2 | F0F0F1F1* | |
| 02E3E7E3 | 400001DC | 4040000C | 40400001 | 00000000 | 00000000 | 00000000 |
| 40404040 | 40404040 | 40404040 | 40404040 | 40404040 | 40404040 | 40404040 |
| 40404040 | 40404040 | 40404040 | 40404040 | E2E3D2E2 | F0F0F1F2* | |
| 02E3E7E3 | 40000238 | 40400038 | 40400001 | 58B0D16C | 58A0D184 | 50A0D194 |
| 5800D1BC | 5000D1A4 | 5800D1C0 | 5000D1A8 | 5800D1C4 | 5000D1AC | 5860D1B8 |
| 5870D1B4 | 5880D1B0 | 5890D098 | 7828B000 | E2E3D2E2 | F0F0F1F3* | |
| 02E3E7E3 | 40000270 | 40400038 | 40400001 | 7020D14C | 7827B000 | 7020D150 |
| 7846B000 | 7040D154 | 7020D158 | 7840D14C | 7040D180 | 7A40D0BC | 7040D144 |
| 7020D148 | 58E0D1A4 | 2B00780E | B0006A00 | E2E3D2E2 | F0F0F1F4* | |
| 02E3E7E3 | 400002A8 | 40400038 | 40400001 | D0906000 | D0885850 | D08C5C40 |
| D0B85820 | D1606825 | 20502B00 | 38026A00 | D0906000 | D0885800 | D08C5000 |
| D0DC58E0 | D1A82B00 | 780EB000 | 6A00D090 | E2E3D2E2 | F0F0F1F5* | |
| 02E3E7E3 | 400002E0 | 40400038 | 40400001 | 6000D088 | 5800D08C | 5000D0EC |
| 58E0D1AC | 2B00780E | B0006A00 | D0906000 | D0885800 | D08C5000 | D0E458F0 |
| D17C1800 | 45E0F004 | 00000000 | 00000028 | E2E3D2E2 | F0F0F1F6* | |
| 02E3E7E3 | 40000318 | 40400038 | 40400001 | 5830D0E0 | 89300002 | 5A30D194 |
| 45E0F008 | 0473B000 | 45E0F008 | 0450D0DC | 45E0F008 | 0450D0EC | 45E0F008 |
| 0450D0E4 | 45E0F010 | 58F0D17C | 45E0F000 | E2E3D2E2 | F0F0F1F7* | |
| 02E3E7E3 | 40000350 | 40400008 | 40400001 | 00000000 | 0000003E | 40404040 |
| 40404040 | 40404040 | 40404040 | 40404040 | 40404040 | 40404040 | 40404040 |
| 40404040 | 40404040 | 40404040 | 40404040 | E2E3D2E2 | F0F0F1F8* | |
| 02D9D3C4 | 40404040 | 40400038 | 40404040 | 00020001 | 0C0001C8 | 00020001 |
| 0C0001CC | 00030001 | 1C0001D0 | 00040001 | 1C0001DC | 00050001 | 1C0001E0 |
| 00060001 | 1C0001E4 | 00010001 | 0C000314 | E2E3D2E2 | F0F0F1F9* | |

02E3E7E3 40000358 40400038 40400001 45E0F134 00010000 0120D0FC

MEMBER NAME STKSTK
01000017 00000001 45E0F010 58F0D178 4110D05C 05EF41E0 000415FE
4720D322 58EFD04C 07FE7820 D1807B20 E2E3D2E2 F0F0F2F0**
02E3E7E3 40000390 40400038 40400001 D1547840 D1507B40 D1583C22
3C443A24 7020D1C8 58F0D168 4110D06C 05EF7900 D0BC4750 D38058F0
D1744110 D07005EF 41E00004 15FE4720 E2E3D2E2 F0F0F2F1*
02E3E7E3 400003C8 40400038 40400001 D36858EF D05407FE 47F0D380
58F0D17C 45E0F004 00000006 00000044 45E0F010 5A90D098 5800D194
1A0A5000 D1945800 D1AC1A0A 5000D1AC E2E3D2E2 F0F0F2F2*
02E3E7E3 40000400 40400038 40400001 5800D1A8 1A0A5000 D1A85800
D1A41A0A 5000D1A4 1A6A1A7A 1A8A5990 D0F447C0 D2041BFF 58E0D000
07FE58D0 D00458E0 D00C92FF D00C982C E2E3D2E2 F0F0F2F3*
02E3E7E3 40000438 40400038 40400001 D01C07FE 98781004 58207000
5020D0F4 58208000 5020D0E0 58201000 41302000 41500004 1B255C40
D0AC1B25 5020D16C 5030D170 47F0D1D0 E2E3D2E2 F0F0F2F4*
02E3E7E3 40000020 40400008 40400001 0000043C 00000068 40404040
40404040 40404040 40404040 40404040 40404040 40404040 40404040
40404040 40404040 40404040 40404040 E2E3D2E2 F0F0F2F5*
02E3E7E3 40000068 40400004 40400001 0000042A 40404040 40404040
40404040 40404040 40404040 40404040 40404040 40404040 40404040
40404040 40404040 40404040 40404040 E2E3D2E2 F0F0F2F6*
02E3E7E3 400000B4 4040000C 40400001 0000038A 000003D4 000003D0
40404040 40404040 40404040 40404040 40404040 40404040 40404040
40404040 40404040 40404040 40404040 E2E3D2E2 F0F0F2F7*
02D9D3C4 40404040 40400038 40404040 00010001 0C000354 00010001
0C0003E0 00010001 0C000020 00010001 0C000024 00010001 0C000068
00010001 0C0000B4 00010001 0C0000B8 E2E3D2E2 F0F0F2F8*
02E3E7E3 400000C0 4040001C 40400001 000003D4 00000164 0000011C
00000164 80000150 80000230 000001B4 40404040 40404040 40404040
40404040 40404040 40404040 40404040 E2E3D2E2 F0F0F2F9*
02D9D3C4 40404040 40400038 40404040 00010001 0C0000BC 00010001
0C0000C0 00010001 0C0000C4 00010001 0C0000C8 00010001 0C0000CC
00010001 0C0000D0 00010001 0C0000D4 E2E3D2E2 F0F0F3F0**
02E3E7E3 400000DC 40400010 40400001 000001AC 000001BC 00000150
80000164 40404040 40404040 40404040 40404040 40404040 40404040
40404040 40404040 40404040 40404040 E2E3D2E2 F0F0F3F1*
02E3E7E3 400001E8 40400038 40400001 00000000 00000020 0000000C
00000010 00000018 00000000 00000000 00000000 00000000 00000000
00000000 00000000 00000024 0000002C E2E3D2E2 F0F0F3F2*
02E3E7E3 40000220 40400018 40400001 00000028 00000030 00000038
00000040 00000000 00800009 40404040 40404040 40404040 40404040
40404040 40404040 40404040 40404040 E2E3D2E2 F0F0F3F3*
02D9D3C4 40404040 40400028 40404040 00010001 0C0000D8 00010001
0C0000DC 00010001 0C0000E0 00010001 0C0000E4 00010001 0C0000E8
40404040 40404040 40404040 40404040 E2E3D2E2 F0F0F3F4*
02C5D5C4 40404040 40404040 40404040 40404040 40404040 40404040
00000470 F1F5F7F3 F460C6D6 F34040F0 F2F0F2F8 F7F0F9F8 40F0F84B
F4F44BF5 F4404040 E2E3D2E2 E3D24040 E2E3D2E2 F0F0F3F5**

MEMBER NAME STMODL
02C5E2C4 40404040 40400010 40400001 E2E3D4D6 C4D34040 00000000
40000000 40404040 40404040 40404040 40404040 40404040 40404040
40404040 40404040 40404040 40404040 E2E3D4D6 F0F0F0F1*
02E3E7E3 40000000 40400038 40400001 47F0F00C 07E2E3D4 D6C4D340
90ECD00C 184D98CD F0205040 D00450D0 400807FC 40404040 40404040
021A1C40 4040C9D5 E5C1D3C9 C440C9D6 E2E3D4D6 F0F0F0F2*
02E3E7E3 40000038 40400038 40400001 D7E340C9 D540E2E3 D4D6C4D3

```
407E4010  0422021A  2CD9C5C6  C9D3C540  C5D9D9D6  D940C9D5  40C3D9C5
C1E3C9D5  C740E2C5  D8E4C5D5  C3C5E26B  E2E3D4D6  F0F0F0F3*
02E3E7E3  40000070  40400027  40400001  40C5D9D9  D6D9407E  40100322
021A0FC4  D9C1E6C9  D5C740C9  C440C9E2  404D0614  14011A01  5D1E2240
40404040  40404040  40404040  40404040  E2E3D4D6  F0F0F0F4*
02E3E7E3  40000148  40400038  40400001  00000000  00000000  4F080000
00000000  00000000  00000000  00000001  00000002  00000004  00000014
000000B4  41100000  41A00000  42B40000  E2E3D4D6  F0F0F0F5*
02C5E2C4  40404040  40400010  40400002  E5F9F940  40404040  05000000
4000003C  40404040  40404040  40404040  40404040  40404040  40404040
40404040  40404040  40404040  40404040  E2E3D4D6  F0F0F0F6*
02E3E7E3  40000180  4040000C  40400001  00000000  00000000  00000000
40404040  40404040  40404040  40404040  40404040  40404040  40404040
40404040  40404040  40404040  40404040  E2E3D4D6  F0F0F0F7*
02C5E2C4  40404040  40400010  40400003  40404040  40404040  05000000
400007D0  40404040  40404040  40404040  40404040  40404040  40404040
40404040  40404040  40404040  40404040  E2E3D4D6  F0F0F0F8*
02C5E2C4  40404040  40400010  40400004  C1D9C3D6  E2404040  02000000
40000000  40404040  40404040  40404040  40404040  40404040  40404040
40404040  40404040  40404040  40404040  E2E3D4D6  F0F0F0F9*
02C5E2C4  40404040  40400010  40400005  C3C1C4C6  C9D34040  02000000
40000000  40404040  40404040  40404040  40404040  40404040  40404040
40404040  40404040  40404040  40404040  E2E3D4D6  F0F0F1F0**
02C5E2C4  40404040  40400010  40400006  C9C2C3D6  D47B4040  02000000
40000000  40404040  40404040  40404040  40404040  40404040  40404040
40404040  40404040  40404040  40404040  E2E3D4D6  F0F0F1F1*
02C5E2C4  40404040  40400010  40400007  D7E2D5D6  E3C54040  02000000
40000000  40404040  40404040  40404040  40404040  40404040  40404040
40404040  40404040  40404040  40404040  E2E3D4D6  F0F0F1F2*
02C5E2C4  40404040  40400010  40400008  D9C5E3C6  D4E34040  02000000
40000000  40404040  40404040  40404040  40404040  40404040  40404040
40404040  40404040  40404040  40404040  E2E3D4D6  F0F0F1F3*
02E3E7E3  400001C8  4040001C  40400001  FFFFFFFC  FFFFFFFC  00000000
00000000  00000000  00000000  00000000  40404040  40404040  40404040
40404040  40404040  40404040  40404040  E2E3D4D6  F0F0F1F4*
02E3E7E3  400001EC  40400038  40400001  5890D134  58B0D130  58A0D0C8
5880D0D0  5870D0EC  5860D0C0  7800D0DC  33007000  D14C58F0  D1384110
D07805EF  7000D0F8  58F0D104  41E00004  E2E3D4D6  F0F0F1F5*
02E3E7E3  40000224  40400020  40400001  15FE4720  D19C89F0  000258EF
D04C07FE  58F0D140  45E0F004  00000006  00000028  40404040  40404040
40404040  40404040  40404040  40404040  E2E3D4D6  F0F0F1F6*
02D9D3C4  40404040  40400038  40404040  00020001  0C0001C8  00030001
0C0001CC  00040001  1C0001D0  00050001  1C0001D4  00060001  1C0001D8
00070001  1C0001DC  00080001  1C0001E0  E2E3D4D6  F0F0F1F7*
02E3E7E3  40000244  40400038  40400001  45E0F008  0450D104  45E0F010
58F0D140  45E0F034  05404040  F1F550A0  D0FC58F0  D1484110  D07C05EF
41E00004  15FE4720  D1E458EF  D06007FE  E2E3D4D6  F0F0F1F8*
02E3E7E3  4000027C  40400038  40400001  4100B02C  5000D08C  9280D08C
58F0D138  4110D08C  05EF3820  7D20D0F8  7C20D0E4  7020D110  7800B030
320047A0  D2183322  7020D110  7820D110  E2E3D4D6  F0F0F1F9*
02E3E7E3  400002B4  40400038  40400001  7C20D0E0  2B003802  6A00D0B8

MEMBER NAME  STMODL
6000D0B0  5800D0B4  5000D114  58F0D144  4110D090  05EF1BFF  58E0D000
07FE1BFF  58E0D000  07FE58F0  D13C4110  E2E3D4D6  F0F0F2F0**
02E3E7E3  400002EC  40400038  40400001  D0A405EF  5980D11C  4780D24E
59A0D11C  4770D3E8  58F0D140  45E0F004  0000000D  0000007C  45E0F134
00010000  01209488  01000014  00000001  E2E3D4D6  F0F0F2F1*
02E3E7E3  40000324  40400038  40400001  45E0F010  5800D0CC  5000D0FC
```

| | | | | | | |
|---|---|---|---|---|---|---|
| 58F0D148 | 4110D07C | 05EF41E0 | 000415FE | 4720D2B2 | 58EFD068 | 07FE58F0 |
| D1444110 | D09005EF | 1BFF58E0 | D00007FE | E2E3D4D6 | F0F0F2F2* | |
| 02E3E7E3 | 4000035C | 40400038 | 40400001 | 5800D10C | 8607D310 | 58F0D13C |
| 4110D0A4 | 05EF5980 | D11C4780 | D2C459A0 | D11C4770 | D3E858F0 | D1401800 |
| 45E0F004 | 0000000D | 0000007C | 45E0F134 | E2E3D4D6 | F0F0F2F3* | |
| 02E3E7E3 | 40000394 | 40400038 | 40400001 | 00010000 | 01209488 | 01000014 |
| 00000001 | 45E0F010 | 50A0D0FC | 5060D10C | 58F0D148 | 4110D07C | 05EF41E0 |
| 000415FE | 4720D332 | 58EFD070 | 07FE4100 | E2E3D4D6 | F0F0F2F4* | |
| 02E3E7E3 | 400003CC | 40400038 | 40400001 | B02C5000 | D08C9280 | D08C58F0 |
| D1384110 | D08C05EF | 38207D20 | D0F87C20 | D0E47020 | D1107800 | B0303200 |
| 47A0D366 | 33227020 | D1107820 | D1107C20 | E2E3D4D6 | F0F0F2F5* | |
| 02E3E7E3 | 40000404 | 40400038 | 40400001 | D0E02B00 | 38026A00 | D0B86000 |
| D0B05800 | D0B45000 | D11458F0 | D1444110 | D09005EF | 1BFF58E0 | D00007FE |
| 1BFF58E0 | D00007FE | 58F0D13C | 4110D0A4 | E2E3D4D6 | F0F0F2F6* | |
| 02E3E7E3 | 4000043C | 40400038 | 40400001 | 05EF5980 | D11C4780 | D39C59A0 |
| D11C4770 | D3E858F0 | D1401800 | 45E0F004 | 0000000D | 0000007C | 45E0F134 |
| 00010000 | 01209488 | 01000014 | 00000001 | E2E3D4D6 | F0F0F2F7* | |
| 02E3E7E3 | 40000474 | 40400038 | 40400001 | 45E0F010 | 1BFF58E0 | D00007FE |
| 58F0D140 | 45E0F004 | 00000006 | 0000004A | 45E0F008 | 0450D11C | 45E0F010 |
| 58F0D140 | 45E0F034 | 05404040 | F2F158A0 | E2E3D4D6 | F0F0F2F8* | |
| 02E3E7E3 | 400004AC | 40400038 | 40400001 | D00458E0 | A00C58B0 | A0185810 |
| B0005820 | D1085020 | 10005830 | B0045840 | D1005040 | 30005850 | B00C5860 |
| D10C5060 | 500018DA | 92FFA00C | 982CA01C | E2E3D4D6 | F0F0F2F9* | |
| 02E3E7E3 | 400004E4 | 4040002A | 40400001 | 07FE987A | 10005820 | 70005020 |
| D1085820 | 80005020 | D1005820 | 90005020 | D1045820 | A0005020 | D10C47F0 |
| D1544040 | 40404040 | 40404040 | 40404040 | E2E3D4D6 | F0F0F3F0** | |
| 02E3E7E3 | 40000020 | 40400008 | 40400001 | 000004E6 | 00000098 | 40404040 |
| 40404040 | 40404040 | 40404040 | 40404040 | 40404040 | 40404040 | 40404040 |
| 40404040 | 40404040 | 40404040 | 40404040 | E2E3D4D6 | F0F0F3F1* | |
| 02E3E7E3 | 40000098 | 40400004 | 40400001 | 000004AA | 40404040 | 40404040 |
| 40404040 | 40404040 | 40404040 | 40404040 | 40404040 | 40404040 | 40404040 |
| 40404040 | 40404040 | 40404040 | 40404040 | E2E3D4D6 | F0F0F3F2* | |
| 02D9D3C4 | 40404040 | 40400038 | 40404040 | 00010001 | 0C000240 | 00010001 |
| 0C00030C | 00010001 | 0C00038C | 00010001 | 0C00045C | 00010001 | 0C00048C |
| 00010001 | 0C000020 | 00010001 | 0C000024 | E2E3D4D6 | F0F0F3F3* | |
| 02E3E7E3 | 400000E4 | 4040001C | 40400001 | 00000234 | 0000025E | 000002E6 |
| 0000035C | 00000434 | 0000027C | 000002DE | 40404040 | 40404040 | 40404040 |
| 40404040 | 40404040 | 40404040 | 40404040 | E2E3D4D6 | F0F0F3F4* | |
| 02D9D3C4 | 40404040 | 40400038 | 40404040 | 00010001 | 0C000098 | 00010001 |
| 0C0000E4 | 00010001 | 0C0000E8 | 00010001 | 0C0000EC | 00010001 | 0C0000F0 |
| 00010001 | 0C0000F4 | 00010001 | 0C0000F8 | E2E3D4D6 | F0F0F3F5* | |
| 02E3E7E3 | 40000100 | 4040001C | 40400001 | 0000034A | 00000354 | 000003CA |
| 0000042C | 800001E4 | 00000198 | 000001A0 | 40404040 | 40404040 | 40404040 |
| 40404040 | 40404040 | 40404040 | 40404040 | E2E3D4D6 | F0F0F3F6* | |
| 02D9D3C4 | 40404040 | 40400038 | 40404040 | 00010001 | 0C0000FC | 00010001 |
| 0C000100 | 00010001 | 0C000104 | 00010001 | 0C000108 | 00010001 | 0C00010C |
| 00010001 | 0C000110 | 00010001 | 0C000114 | E2E3D4D6 | F0F0F3F7* | |
| 02E3E7E3 | 4000011C | 40400020 | 40400001 | 00000194 | 800001A4 | 80000000 |
| 00000000 | 00000034 | 00000008 | 000001A0 | 800001AC | 40404040 | 40404040 |
| 40404040 | 40404040 | 40404040 | 40404040 | E2E3D4D6 | F0F0F3F8* | |
| 02D9D3C4 | 40404040 | 40400038 | 40404040 | 00010001 | 0C000118 | 00010001 |
| 0C00011C | 00010001 | 0C000120 | 00020001 | 0C000128 | 00020001 | 0C00012C |

MEMBER NAME STMODL

| | | | | | | |
|---|---|---|---|---|---|---|
| 00020001 | 0C000130 | 00010001 | 0C000134 | E2E3D4D6 | F0F0F3F9* | |
| 02E3E7E3 | 4000013C | 4040000C | 40400001 | 00000164 | 000001B4 | 800001B0 |
| 40404040 | 40404040 | 40404040 | 40404040 | 40404040 | 40404040 | 40404040 |
| 40404040 | 40404040 | 40404040 | 40404040 | E2E3D4D6 | F0F0F4F0** | |
| 02E3E7E3 | 400001E4 | 40400008 | 40400001 | 00000000 | 00000000 | 40404040 |

```
40404040  40404040  40404040  40404040  40404040  40404040  40404040
40404040  40404040  40404040  40404040  E2E3D4D6  F0F0F4F1*
02D9D3C4  40404040  40400020  40404040  00010001  0C000138  00010001
0C00013C  00010001  0C000140  00010001  0C000144  40404040  40404040
40404040  40404040  40404040  40404040  E2E3D4D6  F0F0F4F2*
02C5D5C4  40404040  40404040  40404040  40404040  40404040  40404040
0000050E  F1F5F7F3  F460C6D6  F34040F0  F2F0F2F8  F7F0F9F8  40F0F84B
F4F44BF5  F9404040  E2E3D4D6  C4D34040  E2E3D4D6  F0F0F4F3**

MEMBER NAME  SWITCH
02C5E2C4  40404040  40400010  40400001  E2E6C9E3  C3C84040  00000000
40000000  40404040  40404040  40404040  40404040  40404040  40404040
40404040  40404040  40404040  40404040  E2E6C9E3  F0F0F0F1*
02E3E7E3  40000000  40400028  40400001  47F0F00C  07E2E6C9  E3C3C840
90ECD00C  184D98CD  F0205040  D00450D0  400807FC  40404040  40404040
40404040  40404040  40404040  40404040  E2E6C9E3  F0F0F0F2*
02E3E7E3  400000C8  4040002C  40400001  41300000  00000000  41200000
00000000  00000000  00000001  00000002  00000003  00000004  00000000
00000000  40404040  40404040  40404040  E2E6C9E3  F0F0F0F3*
02E3E7E3  400001D0  40400004  40400001  00000000  40404040  40404040
40404040  40404040  40404040  40404040  40404040  40404040  40404040
40404040  40404040  40404040  40404040  E2E6C9E3  F0F0F0F4*
02E3E7E3  400001D8  40400004  40400001  00000000  40404040  40404040
40404040  40404040  40404040  40404040  40404040  40404040  40404040
40404040  40404040  40404040  40404040  E2E6C9E3  F0F0F0F5*
02E3E7E3  400001E0  40400004  40400001  00000000  40404040  40404040
40404040  40404040  40404040  40404040  40404040  40404040  40404040
40404040  40404040  40404040  40404040  E2E6C9E3  F0F0F0F6*
02E3E7E3  400001E8  40400004  40400001  00000000  40404040  40404040
40404040  40404040  40404040  40404040  40404040  40404040  40404040
40404040  40404040  40404040  40404040  E2E6C9E3  F0F0F0F7*
02C5E2C4  40404040  40400010  40400002  E4D5C9E3  C4404040  02000000
40000000  40404040  40404040  40404040  40404040  40404040  40404040
40404040  40404040  40404040  40404040  E2E6C9E3  F0F0F0F8*
02E3E7E3  400001F0  40400004  40400001  00000000  40404040  40404040
40404040  40404040  40404040  40404040  40404040  40404040  40404040
40404040  40404040  40404040  40404040  E2E6C9E3  F0F0F0F9*
02E3E7E3  400001F8  40400008  40400001  00000000  00000000  40404040
40404040  40404040  40404040  40404040  40404040  40404040  40404040
40404040  40404040  40404040  40404040  E2E6C9E3  F0F0F1F0**
02E3E7E3  40000204  40400004  40400001  00000000  40404040  40404040
40404040  40404040  40404040  40404040  40404040  40404040  40404040
40404040  40404040  40404040  40404040  E2E6C9E3  F0F0F1F1*
02C5E2C4  40404040  40400010  40400003  E2D7C3D6  C5C44040  02000000
40000000  40404040  40404040  40404040  40404040  40404040  40404040
40404040  40404040  40404040  40404040  E2E6C9E3  F0F0F1F2*
02E3E7E3  4000020C  40400004  40400001  00000000  40404040  40404040
40404040  40404040  40404040  40404040  40404040  40404040  40404040
40404040  40404040  40404040  40404040  E2E6C9E3  F0F0F1F3*
02E3E7E3  40000214  40400038  40400001  00000000  5840D1C8  5850D1DC
5860D1D4  5870D1C0  5880D1B8  5890D1B0  58A0D1A8  58B0D1E4  5830D0D0
5930D0B4  4780D2BC  5800D0B4  5000D0D0  E2E6C9E3  F0F0F1F4*
02E3E7E3  4000024C  40400038  40400001  68208008  6020D180  68207008
6020D190  68208010  60208008  6820D180  60208010  68207010  60207008
6820D190  60207010  6820B008  6020D160  E2E6C9E3  F0F0F1F5*
02E3E7E3  40000284  40400038  40400001  6820B018  6020D170  6820B010
6020B008  6820D160  6020B010  6820B020  6020B018  6820D170  6020B020
6820A008  6020D140  68209008  6020D150  E2E6C9E3  F0F0F1F6*
02E3E7E3  400002BC  40400038  40400001  6820A010  23026000  A0086820
```

```
D1406020  A0106820  90102302  60009008  6820D150  60209010  47F0D358
5800D0B0  5000D0D0  68208008  6020D180  E2E6C9E3  F0F0F1F7*
02E3E7E3  400002F4  40400038  40400001  68207008  6020D190  68208010
60208008  6820D180  60208010  68207010  60207008  6820D190  60207010
6820B008  6020D160  6820B018  6020D170  E2E6C9E3  F0F0F1F8*
02E3E7E3  4000032C  40400038  40400001  6820B010  6020B008  6820D160
6020B010  6820B020  6020B018  6820D170  6020B020  6820A008  6020D140
68209008  6020D150  6820A010  6020A008  E2E6C9E3  F0F0F1F9*
02E3E7E3  40000364  40400038  40400001  6820D140  23026000  A0106820

MEMBER NAME  SWITCH
90106020  90086820  D1502302  60009010  41008008  5000D04C  41007008
5000D050  4100A008  5000D054  41009008  E2E6C9E3  F0F0F2F0**
02E3E7E3  4000039C  40400038  40400001  5000D058  58F0D1EC  4110D04C
05EF4100  80105000  D0704100  70105000  D0744100  A0105000  D0784100
90105000  D07C58F0  D1EC4110  D07005EF  E2E6C9E3  F0F0F2F1*
02E3E7E3  400003D4  40400038  40400001  6800D130  23006000  D1306820
D0A06C20  D0D86840  D1202C44  2C246840  D0A86C40  D0E86C40  D1202A24
6A20D0F8  60206008  6820D0A0  6C20D0E0  E2E6C9E3  F0F0F2F2*
02E3E7E3  4000040C  40400038  40400001  6840D120  2C442C24  6840D0A8
6C40D0F0  6C40D120  2A246A20  D1006020  60106820  D0A06C20  D0D86840
D1282C44  2C246840  D0A86C40  D0E86C40  E2E6C9E3  F0F0F2F3*
02E3E7E3  40000444  40400038  40400001  D1282A24  6A20D0F8  60205008
6820D0A0  6C20D0E0  6840D128  2C442C24  6840D0A8  6C40D0F0  6C40D128
2A246A20  D1006020  50104100  60085000  E2E6C9E3  F0F0F2F4*
02E3E7E3  4000047C  40400038  40400001  D0944100  60105000  D09858F0
D1D04110  D09405EF  41005008  5000D094  41005010  5000D098  58F0D1D0
4110D094  05EF6820  D1306C20  60102322  E2E6C9E3  F0F0F2F5*
02E3E7E3  400004B4  40400038  40400001  6A20B008  60204008  6820D130
6C206008  6A20B010  60204010  6820D130  6C205010  23226A20  B0186020
40186820  D1306C20  50086A20  B0206020  E2E6C9E3  F0F0F2F6*
02E3E7E3  400004EC  40400038  40400001  40201BFF  58E0D000  07FE58A0
D00458E0  A00C58B0  A0185810  B0006820  D0D86020  10005820  B0046840
D0E86040  20005830  B0086860  D0F86060  E2E6C9E3  F0F0F2F7*
02E3E7E3  40000524  40400038  40400001  30005840  B00C6800  D1086000
40005850  B0106820  D0E06020  50005860  B0146840  D0F06040  60005870
B0186860  D1006060  70005880  B01C6800  E2E6C9E3  F0F0F2F8*
02E3E7E3  4000055C  40400038  40400001  D1106000  80005890  B0386820
D1306020  90005810  B03C5820  D0D05020  10005830  B0486840  D1386040
300018DA  92FFA00C  982CA01C  07FE987B  E2E6C9E3  F0F0F2F9*
02E3E7E3  40000594  40400038  40400001  10006820  70006020  D0D86820
80006020  D0E86820  90006020  D0F86820  A0006020  D1086820  B0006020
D0E0987B  10146820  70006020  D0F06820  E2E6C9E3  F0F0F3F0**
02E3E7E3  400005CC  40400038  40400001  80006020  D1006820  90006020
D110987B  10386820  70006020  D1305820  80005020  D0D06820  90006020
D1286820  A0006020  D1206820  B0006020  E2E6C9E3  F0F0F3F1*
02E3E7E3  40000604  40400038  40400001  D1385820  10204130  20004150
00081B25  5020D1E4  5030D1E8  58201024  41302000  41500008  1B255020
D1A85030  D1AC5820  10284130  20004150  E2E6C9E3  F0F0F3F2*
02E3E7E3  4000063C  40400038  40400001  00081B25  5020D1B0  5030D1B4
5820102C  41302000  41500008  1B255020  D1D45030  D1D85820  10304130
20004150  00081B25  5020D1DC  5030D1E0  E2E6C9E3  F0F0F3F3*
02E3E7E3  40000674  40400038  40400001  58201034  41302000  41500008
1B255020  D1C85030  D1CC5820  104C4130  20004150  00081B25  5020D1B8
5030D1BC  58201050  41302000  41500008  E2E6C9E3  F0F0F3F4*
02E3E7E3  400006AC  4040000E  40400001  1B255020  D1C05030  D1C447F0
D1F04040  40404040  40404040  40404040  40404040  40404040  40404040
40404040  40404040  40404040  40404040  E2E6C9E3  F0F0F3F5*
02E3E7E3  40000020  4040000C  40400001  00000592  00000028  000004F6
```

```
40404040  40404040  40404040  40404040  40404040  40404040  40404040
40404040  40404040  40404040  40404040  E2E6C9E3  F0F0F3F6*
02E3E7E3  40000084  4040000C  40400001  00000160  00000100  00000110
40404040  40404040  40404040  40404040  40404040  40404040  40404040
40404040  40404040  40404040  40404040  E2E6C9E3  F0F0F3F7*
02D9D3C4  40404040  40400038  40404040  00020001  1C0001F8  00030001
1C000214  00010001  0C000020  00010001  0C000024  00010001  0C000028
00010001  0C000084  00010001  0C000088  E2E6C9E3  F0F0F3F8*
02E3E7E3  40000090  40400008  40400001  00000120  80000130  40404040
40404040  40404040  40404040  40404040  40404040  40404040  40404040

MEMBER NAME  SWITCH
40404040  40404040  40404040  40404040  E2E6C9E3  F0F0F3F9*
02E3E7E3  400000A8  40400014  40400001  00000160  00000108  00000118
00000128  80000138  40404040  40404040  40404040  40404040  40404040
40404040  40404040  40404040  40404040  E2E6C9E3  F0F0F4F0**
02D9D3C4  40404040  40400038  40404040  00010001  0C00008C  00010001
0C000090  00010001  0C000094  00010001  0C0000A8  00010001  0C0000AC
00010001  0C0000B0  00010001  0C0000B4  E2E6C9E3  F0F0F4F1*
02E3E7E3  400000C4  40400004  40400001  80000140  40404040  40404040
40404040  40404040  40404040  40404040  40404040  40404040  40404040
40404040  40404040  40404040  40404040  E2E6C9E3  F0F0F4F2*
02D9D3C4  40404040  40400010  40404040  00010001  0C0000B8  00010001
0C0000C4  40404040  40404040  40404040  40404040  40404040  40404040
40404040  40404040  40404040  40404040  E2E6C9E3  F0F0F4F3*
02C5D5C4  40404040  40404040  40404040  40404040  40404040  40404040
000006BA  F1F5F7F3  F460C6D6  F34040F0  F2F0F2F8  F7F0F9F8  40F0F84B
F4F54BF0  F3404040  E2E6C9E3  C3C84040  E2E6C9E3  F0F0F4F4**

MEMBER NAME  TXTNFO
02C5E2C4  40404040  40400010  40400001  E3E7E3D5  C6D64040  00000000
40000000  40404040  40404040  40404040  40404040  40404040  40404040
40404040  40404040  40404040  40404040  E3E7E3D5  F0F0F0F1*
02E3E7E3  40000000  40400038  40400001  47F0F00C  07E3E7E3  D5C6D640
90ECD00C  184D98CD  F0205040  D00450D0  400807FC  40404040  40404040
021A2E40  C5D9D9D6  D97A40C9  D540C2C3  E3E7E3D5  F0F0F0F2*
02E3E7E3  40000038  40400022  40400001  E2D3C9C2  40D9D6E4  E3C9D5C5
40C9D540  E3E7E3D5  C6D640E2  E4C2D9D6  E4E3C9D5  C5224040  40404040
40404040  40404040  40404040  40404040  E3E7E3D5  F0F0F0F3*
02E3E7E3  40000060  40400008  40400001  6B404040  40404040  40404040
40404040  40404040  40404040  40404040  40404040  40404040  40404040
40404040  40404040  40404040  40404040  E3E7E3D5  F0F0F0F4*
02C5E2C4  40404040  40400010  40400002  C6D3E340  40404040  02000000
40000000  40404040  40404040  40404040  40404040  40404040  40404040
40404040  40404040  40404040  40404040  E3E7E3D5  F0F0F0F5*
02E3E7E3  40000100  40400018  40400001  00000000  00000000  00000001
00000002  00000000  00000000  40404040  40404040  40404040  40404040
40404040  40404040  40404040  40404040  E3E7E3D5  F0F0F0F6*
02C5E2C4  40404040  40400010  40400003  C9E2D9C3  C8404040  02000000
40000000  40404040  40404040  40404040  40404040  40404040  40404040
40404040  40404040  40404040  40404040  E3E7E3D5  F0F0F0F7*
02E3E7E3  40000180  40400008  40400001  00000000  00000000  40404040
40404040  40404040  40404040  40404040  40404040  40404040  40404040
40404040  40404040  40404040  40404040  E3E7E3D5  F0F0F0F8*
02C5E2C4  40404040  40400010  40400004  C3D4D7D9  E2E24040  02000000
40000000  40404040  40404040  40404040  40404040  40404040  40404040
40404040  40404040  40404040  40404040  E3E7E3D5  F0F0F0F9*
02E3E7E3  4000018C  40400008  40400001  00000000  00000000  40404040
40404040  40404040  40404040  40404040  40404040  40404040  40404040
```

```
40404040  40404040  40404040  40404040  E3E7E3D5  F0F0F1F0**
02C5E2C4  40404040  40400010  40400005  C9C2C3D6  D47B4040  02000000
40000000  40404040  40404040  40404040  40404040  40404040  40404040
40404040  40404040  40404040  40404040  E3E7E3D5  F0F0F1F1*
02E3E7E3  40000198  40400038  40400001  00000000  00000000  58A0D128
58B0D11C  58F0D130  4110D05C  05EF41E0  000415FE  4720D15A  58EFD04C
07FE47F0  D16841F0  000458E0  D00007FE  E3E7E3D5  F0F0F1F2*
02E3E7E3  400001D0  40400038  40400001  58F0D124  4110D06C  05EF41E0
000415FE  4720D182  58EFD054  07FE5800  D0B01200  4770D196  41F00004
58E0D000  07FE5800  D0B05B00  D0A05000  E3E7E3D5  F0F0F1F3*
02E3E7E3  40000208  40400038  40400001  D0B858F0  D1184110  D08005EF
7800D0C0  32004770  D1C041F0  000458E0  D00007FE  7800D0C0  7000A004
5820D0BC  5B20D0B0  5020D0B4  4770D1E2  E3E7E3D5  F0F0F1F4*
02E3E7E3  40000240  40400038  40400001  41F00004  58E0D000  07FE58E0
D0B0410E  D0CC5000  D08C58F0  D1184110  D08C05EF  7800D0C0  32004770
D20C41F0  000458E0  D00007FE  7820D0C0  E3E7E3D5  F0F0F1F5*
02E3E7E3  40000278  40400038  40400001  30227020  A0081BFF  58E0D000
07FE58F0  D1341800  45E0F004  00000006  00000028  45E0F010  41F00004
58E0D000  07FE58A0  D00458E0  A00C58B0  E3E7E3D5  F0F0F1F6*
02E3E7E3  400002B0  40400038  40400001  A0185810  B0045820  D0C45020
100018DA  92FFA00C  982CA01C  07FE9878  10045820  70005020  D0C45820
10004130  20004150  00011B25  5020D11C  E3E7E3D5  F0F0F1F7*
02E3E7E3  400002E8  40400022  40400001  5030D120  5030D05C  58201008
41302000  41500004  1B255020  D1285030  D12C47F0  D1384040  40404040
40404040  40404040  40404040  40404040  E3E7E3D5  F0F0F1F8*
02E3E7E3  40000020  40400008  40400001  000002CA  00000068  40404040
40404040  40404040  40404040  40404040  40404040  40404040  40404040
40404040  40404040  40404040  40404040  E3E7E3D5  F0F0F1F9*
02E3E7E3  40000068  40400004  40400001  000002A6  40404040  40404040

MEMBER NAME  TXTNFO
40404040  40404040  40404040  40404040  40404040  40404040  40404040
40404040  40404040  40404040  40404040  E3E7E3D5  F0F0F2F0**
02D9D3C4  40404040  40400038  40404040  00020001  1C000180  00030001
1C00018C  00040001  1C000198  00050001  1C00019C  00010001  0C000294
00010001  0C000020  00010001  0C000024  E3E7E3D5  F0F0F2F1*
02E3E7E3  400000B4  40400010  40400001  000001C2  000001C6  000001EA
00000286  40404040  40404040  40404040  40404040  40404040  40404040
40404040  40404040  40404040  40404040  E3E7E3D5  F0F0F2F2*
02E3E7E3  400000C8  4040000C  40400001  0000012C  00000134  80000124
40404040  40404040  40404040  40404040  40404040  40404040  40404040
40404040  40404040  40404040  40404040  E3E7E3D5  F0F0F2F3*
02D9D3C4  40404040  40400038  40404040  00010001  0C000068  00010001
0C0000B4  00010001  0C0000B8  00010001  0C0000BC  00010001  0C0000C0
00010001  0C0000C8  00010001  0C0000CC  E3E7E3D5  F0F0F2F4*
02E3E7E3  400000D4  4040001C  40400001  00000134  00000108  00000124
00000060  80000118  00000134  00000120  40404040  40404040  40404040
40404040  40404040  40404040  40404040  E3E7E3D5  F0F0F2F5*
02D9D3C4  40404040  40400038  40404040  00010001  0C0000D0  00010001
0C0000D4  00010001  0C0000D8  00010001  0C0000DC  00010001  0C0000E0
00010001  0C0000E4  00010001  0C0000E8  E3E7E3D5  F0F0F2F6*
02E3E7E3  400000F0  40400004  40400001  80000128  40404040  40404040
40404040  40404040  40404040  40404040  40404040  40404040  40404040
40404040  40404040  40404040  40404040  E3E7E3D5  F0F0F2F7*
02E3E7E3  400000F8  40400008  40400001  0000011C  80000128  40404040
40404040  40404040  40404040  40404040  40404040  40404040  40404040
40404040  40404040  40404040  40404040  E3E7E3D5  F0F0F2F8*
02D9D3C4  40404040  40400020  40404040  00010001  0C0000EC  00010001
0C0000F0  00010001  0C0000F8  00010001  0C0000FC  40404040  40404040
```

```
40404040  40404040  40404040  40404040  E3E7E3D5  F0F0F2F9*
02C5D5C4  40404040  40404040  40404040  40404040  40404040  40404040
0000030A  F1F5F7F3  F460C6D6  F34040F0  F2F0F2F8  F7F0F9F8  40F0F84B
F4F54BF0  F8404040  E3E7E3D5  C6D64040  E3E7E3D5  F0F0F3F0**

MEMBER NAME  UNIT
02C5E2C4  40404040  40400010  40400001  E4D5C9E3  40404040  00000000
40000000  40404040  40404040  40404040  40404040  40404040  40404040
40404040  40404040  40404040  40404040  E4D5C9E3  F0F0F0F1*
02E3E7E3  40000000  40400028  40400001  47F0F00C  07E4D5C9  E3404040
90ECD00C  184D98CD  F0205040  D00450D0  400807FC  40404040  40404040
40404040  40404040  40404040  40404040  E4D5C9E3  F0F0F0F2*
02C5E2C4  40404040  40400010  40400002  E2D8D9E3  40404040  02000000
40000000  40404040  40404040  40404040  40404040  40404040  40404040
40404040  40404040  40404040  40404040  E4D5C9E3  F0F0F0F3*
02E3E7E3  40000078  4040000C  40400001  00000002  00000000  00000000
40404040  40404040  40404040  40404040  40404040  40404040  40404040
40404040  40404040  40404040  40404040  E4D5C9E3  F0F0F0F4*
02E3E7E3  400000A0  40400004  40400001  00000000  40404040  40404040
40404040  40404040  40404040  40404040  40404040  40404040  40404040
40404040  40404040  40404040  40404040  E4D5C9E3  F0F0F0F5*
02E3E7E3  400000AC  40400038  40400001  7820D05C  3C227840  D0603C44
3A247840  D0643C44  3A247020  D07C58F0  D0784110  D04C05EF  7000D080
7800D05C  7D00D080  7000D05C  7800D060  E4D5C9E3  F0F0F0F6*
02E3E7E3  400000E4  40400038  40400001  7D00D080  7000D060  7800D064
7D00D080  7000D064  1BFF58E0  D00007FE  58A0D004  58E0A00C  58B0A018
5810B000  7820D05C  70201000  5820B004  E4D5C9E3  F0F0F0F7*
02E3E7E3  4000011C  40400038  40400001  7840D060  70402000  5830B008
7860D064  70603000  18DA92FF  A00C982C  A01C07FE  98791000  78207000
7020D05C  78208000  7020D060  78209000  E4D5C9E3  F0F0F0F8*
02E3E7E3  40000154  40400008  40400001  7020D064  47F0D084  40404040
40404040  40404040  40404040  40404040  40404040  40404040  40404040
40404040  40404040  40404040  40404040  E4D5C9E3  F0F0F0F9*
02E3E7E3  40000020  4040000C  40400001  0000013C  00000028  00000100
40404040  40404040  40404040  40404040  40404040  40404040  40404040
40404040  40404040  40404040  40404040  E4D5C9E3  F0F0F1F0**
02E3E7E3  40000074  40400004  40400001  800000A4  40404040  40404040
40404040  40404040  40404040  40404040  40404040  40404040  40404040
40404040  40404040  40404040  40404040  E4D5C9E3  F0F0F1F1*
02E3E7E3  400000A4  40400008  40400001  00000000  00000000  40404040
40404040  40404040  40404040  40404040  40404040  40404040  40404040
40404040  40404040  40404040  40404040  E4D5C9E3  F0F0F1F2*
02D9D3C4  40404040  40400028  40404040  00020001  1C0000A0  00010001
0C000020  00010001  0C000024  00010001  0C000028  00010001  0C000074
40404040  40404040  40404040  40404040  E4D5C9E3  F0F0F1F3*
02C5D5C4  40404040  40404040  40404040  40404040  40404040  40404040
0000015C  F1F5F7F3  F460C6D6  F34040F0  F2F0F2F8  F7F0F9F8  40F0F84B
F4F54BF1  F2404040  E4D5C9E3  40404040  E4D5C9E3  F0F0F1F4**

MEMBER NAME  UNITD
02C5E2C4  40404040  40400010  40400001  E4D5C9E3  C4404040  00000000
40000000  40404040  40404040  40404040  40404040  40404040  40404040
40404040  40404040  40404040  40404040  E4D5C9E3  F0F0F0F1*
02E3E7E3  40000000  40400028  40400001  47F0F00C  07E4D5C9  E3C44040
90ECD00C  184D98CD  F0205040  D00450D0  400807FC  40404040  40404040
40404040  40404040  40404040  40404040  E4D5C9E3  F0F0F0F2*
02C5E2C4  40404040  40400010  40400002  C4E2D8D9  E3404040  02000000
40000000  40404040  40404040  40404040  40404040  40404040  40404040
40404040  40404040  40404040  40404040  E4D5C9E3  F0F0F0F3*
```

```
02E3E7E3  40000078  40400014  40400001  00000000  00000000  00000002
00000000  00000000  40404040  40404040  40404040  40404040  40404040
40404040  40404040  40404040  40404040  E4D5C9E3  F0F0F0F4*
02E3E7E3  400000B8  40400004  40400001  00000000  40404040  40404040
40404040  40404040  40404040  40404040  40404040  40404040  40404040
40404040  40404040  40404040  40404040  E4D5C9E3  F0F0F0F5*
02E3E7E3  400000D4  40400038  40400001  6800D050  6000D078  6820D068
2C226840  D0702C44  2A246840  D0782C44  2A246020  D09858F0  D0904110
D04C05EF  6000D0A0  6800D068  6D00D0A0  E4D5C9E3  F0F0F0F6*
02E3E7E3  4000010C  40400038  40400001  6000D068  6800D070  6D00D0A0
6000D070  6800D078  6D00D0A0  6000D078  1BFF58E0  D00007FE  58A0D004
58E0A00C  58B0A018  5810B000  6820D068  E4D5C9E3  F0F0F0F7*
02E3E7E3  40000144  40400038  40400001  60201000  5820B004  6840D070
60402000  5830B008  6860D078  60603000  18DA92FF  A00C982C  A01C07FE
98791000  68207000  6020D068  68208000  E4D5C9E3  F0F0F0F8*
02E3E7E3  4000017C  40400010  40400001  6020D070  68209000  6020D078
47F0D0AC  40404040  40404040  40404040  40404040  40404040  40404040
40404040  40404040  40404040  40404040  E4D5C9E3  F0F0F0F9*
02E3E7E3  40000020  4040000C  40400001  0000016C  00000028  00000130
40404040  40404040  40404040  40404040  40404040  40404040  40404040
40404040  40404040  40404040  40404040  E4D5C9E3  F0F0F1F0**
02E3E7E3  40000074  40400004  40400001  800000C0  40404040  40404040
40404040  40404040  40404040  40404040  40404040  40404040  40404040
40404040  40404040  40404040  40404040  E4D5C9E3  F0F0F1F1*
02E3E7E3  400000BC  40400018  40400001  00000000  00000000  00000000
00000000  00000000  00000000  40404040  40404040  40404040  40404040
40404040  40404040  40404040  40404040  E4D5C9E3  F0F0F1F2*
02D9D3C4  40404040  40400028  40404040  00020001  1C0000B8  00010001
0C000020  00010001  0C000024  00010001  0C000028  00010001  0C000074
40404040  40404040  40404040  40404040  E4D5C9E3  F0F0F1F3*
02C5D5C4  40404040  40404040  40404040  40404040  40404040  40404040
0000018C  F1F5F7F3  F460C6D6  F34040F0  F2F0F2F8  F7F0F9F8  40F0F84B
F4F54BF1  F5404040  E4D5C9E3  C4404040  E4D5C9E3  F0F0F1F4**

MEMBER NAME  UPDTE1
02C5E2C4  40404040  40400010  40400001  E4D7C4E3  C5F14040  00000000
40000000  40404040  40404040  40404040  40404040  40404040  40404040
40404040  40404040  40404040  40404040  E4D7C4E3  F0F0F0F1*
02E3E7E3  40000000  40400038  40400001  47F0F00C  07E4D7C4  E3C5F140
90ECD00C  184D98CD  F0205040  D00450D0  400807FC  40404040  40404040
021A2240  E4D7C4E3  C5F16B40  E2C5C3E3  E4D7C4E3  F0F0F0F2*
02E3E7E3  40000038  40400016  40400001  C9D6D540  C5D3C5D4  C5D5E340
D5D6E340  C6D6E4D5  C4224040  40404040  40404040  40404040  40404040
40404040  40404040  40404040  40404040  E4D7C4E3  F0F0F0F3*
02E3E7E3  400000B0  4040001C  40400001  00000000  00000001  00000002
00000005  0000000E  00000000  00000000  40404040  40404040  40404040
40404040  40404040  40404040  40404040  E4D7C4E3  F0F0F0F4*
02E3E7E3  40000108  40400004  40400001  00000000  40404040  40404040
40404040  40404040  40404040  40404040  40404040  40404040  40404040
40404040  40404040  40404040  40404040  E4D7C4E3  F0F0F0F5*
02C5E2C4  40404040  40400010  40400002  C9C2C3D6  D47B4040  02000000
40000000  40404040  40404040  40404040  40404040  40404040  40404040
40404040  40404040  40404040  40404040  E4D7C4E3  F0F0F0F6*
02E3E7E3  40000110  40400004  40400001  00000000  40404040  40404040
40404040  40404040  40404040  40404040  40404040  40404040  40404040
40404040  40404040  40404040  40404040  E4D7C4E3  F0F0F0F7*
02C5E2C4  40404040  40400010  40400003  E4D7C4E3  C5F24040  02000000
40000000  40404040  40404040  40404040  40404040  40404040  40404040
40404040  40404040  40404040  40404040  E4D7C4E3  F0F0F0F8*
```

```
02E3E7E3  40000118  40400008  40400001  00000000  00000000  40404040
40404040  40404040  40404040  40404040  40404040  40404040  40404040
40404040  40404040  40404040  40404040  E4D7C4E3  F0F0F0F9*
02E3E7E3  40000124  40400004  40400001  00000000  40404040  40404040
40404040  40404040  40404040  40404040  40404040  40404040  40404040
40404040  40404040  40404040  40404040  E4D7C4E3  F0F0F1F0**
02E3E7E3  4000015C  40400038  40400001  5880D0CC  58A0D0B8  58B0D0C0
5890D064  18295090  D07C1849  5850D0DC  5890D104  58A0D100  18B2587A
80005869  80005970  D0804730  D1525960  E4D7C4E3  F0F0F1F1*
02E3E7E3  40000194  40400038  40400001  D0804750  D15250B0  D07C47F0
D1921AB4  1A951AA5  59B0D084  47C0D132  50B0D07C  58A0D0B8  58B0D0C0
5890D064  58F0D0C8  45E0F004  00000006  E4D7C4E3  F0F0F1F2*
02E3E7E3  400001CC  40400038  40400001  00000028  45E0F010  58F0D0C8
45E0F034  05404040  F1F558A0  D0B858B0  D0C05890  D0645800  D07C5000
D0A45800  D0D85000  D0F05870  D07C5C60  E4D7C4E3  F0F0F1F3*
02E3E7E3  40000204  40400038  40400001  D0DC5830  D0D81A37  58238000
5020D0F4  5800D0E0  5000D0F8  18401A47  58348000  5030D0FC  1B234770
D1E61BFF  58E0D000  07FE5820  D0805B20  E4D7C4E3  F0F0F1F4*
02E3E7E3  4000023C  40400038  40400001  D0F41A29  5020D098  5820D0FC
5B20D0F4  1A295020  D0945850  D0F45C40  D1085820  D0F01A25  4102B000
5000D050  58F0D0D4  4110D04C  05EF1BFF  E4D7C4E3  F0F0F1F5*
02E3E7E3  40000274  40400038  40400001  58E0D000  07FE58A0  D00458E0
A00C58B0  A0185810  B0185820  D0A05020  100018DA  92FFA00C  982CA01C
07FE987B  10085820  70005020  D08C5820  E4D7C4E3  F0F0F1F6*
02E3E7E3  400002AC  40400038  40400001  80005020  D0805820  A0005020
D0845820  B0005020  D0A05820  10004130  20004150  00041B25  5020D0B8
5030D0BC  5030D04C  58201004  41302000  E4D7C4E3  F0F0F1F7*
02E3E7E3  400002E4  40400034  40400001  41500004  1B255C40  D0701B25
5020D0C0  5030D0C4  58201010  41302000  41500004  1B255C40  D06C1B25
5020D0CC  5030D0D0  47F0D10C  40404040  E4D7C4E3  F0F0F1F8*
02E3E7E3  40000020  40400008  40400001  0000029E  00000050  40404040
40404040  40404040  40404040  40404040  40404040  40404040  40404040
40404040  40404040  40404040  40404040  E4D7C4E3  F0F0F1F9*
02E3E7E3  40000050  40400004  40400001  0000027A  40404040  40404040

MEMBER NAME  UPDTE1
40404040  40404040  40404040  40404040  40404040  40404040  40404040
40404040  40404040  40404040  40404040  E4D7C4E3  F0F0F2F0**
02E3E7E3  400000A4  40400008  40400001  000000E4  000000E8  40404040
40404040  40404040  40404040  40404040  40404040  40404040  40404040
40404040  40404040  40404040  40404040  E4D7C4E3  F0F0F2F1*
02D9D3C4  40404040  40400038  40404040  00020001  1C000118  00030001
1C000124  00010001  0C0001CC  00010001  0C000020  00010001  0C000024
00010001  0C000050  00010001  0C0000A4  E4D7C4E3  F0F0F2F2*
02E3E7E3  400000AC  40400004  40400001  800000F0  40404040  40404040
40404040  40404040  40404040  40404040  40404040  40404040  40404040
40404040  40404040  40404040  40404040  E4D7C4E3  F0F0F2F3*
02E3E7E3  40000128  40400034  40400001  00000004  00000014  00000008
00000000  00000000  00000000  00000000  00000000  00000000  00000000
00000018  0000001C  00000038  40404040  E4D7C4E3  F0F0F2F4*
02D9D3C4  40404040  40400010  40404040  00010001  0C0000A8  00010001
0C0000AC  40404040  40404040  40404040  40404040  40404040  40404040
40404040  40404040  40404040  40404040  E4D7C4E3  F0F0F2F5*
02C5D5C4  40404040  40404040  40404040  40404040  40404040  40404040
00000318  F1F5F7F3  F460C6D6  F34040F0  F2F0F2F8  F7F0F9F8  40F0F84B
F4F54BF1  F9404040  E4D7C4E3  C5F14040  E4D7C4E3  F0F0F2F6**

MEMBER NAME  UPDTE2
02C5E2C4  40404040  40400010  40400001  E4D7C4E3  C5F24040  00000000
```

| | | | | | | |
|---|---|---|---|---|---|---|
| 40000000 | 40404040 | 40404040 | 40404040 | 40404040 | 40404040 | 40404040 |
| 40404040 | 40404040 | 40404040 | 40404040 | E4D7C4E3 | F0F0F0F1* | |
| 02E3E7E3 | 40000000 | 40400028 | 40400001 | 47F0F00C | 07E4D7C4 | E3C5F240 |
| 90ECD00C | 184D98CD | F0205040 | D00450D0 | 400807FC | 40404040 | 40404040 |
| 40404040 | 40404040 | 40404040 | 40404040 | E4D7C4E3 | F0F0F0F2* | |
| 02E3E7E3 | 40000078 | 40400038 | 40400001 | 4E000000 | 00000000 | 4E000000 |
| 80000000 | 00000000 | 00000000 | 00000001 | 00000001 | 00000002 | 00000003 |
| 00000004 | 00000005 | 00000006 | 0000000D | E4D7C4E3 | F0F0F0F3* | |
| 02C5E2C4 | 40404040 | 40400010 | 40400002 | E3D6D3C5 | D9404040 | 05000000 |
| 4000000C | 40404040 | 40404040 | 40404040 | 40404040 | 40404040 | 40404040 |
| 40404040 | 40404040 | 40404040 | 40404040 | E4D7C4E3 | F0F0F0F4* | |
| 02E3E7E3 | 400000B0 | 4040000C | 40400001 | 0000000E | 00000000 | 00000000 |
| 40404040 | 40404040 | 40404040 | 40404040 | 40404040 | 40404040 | 40404040 |
| 40404040 | 40404040 | 40404040 | 40404040 | E4D7C4E3 | F0F0F0F5* | |
| 02E3E7E3 | 400000F0 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E4D7C4E3 | F0F0F0F6* | |
| 02E3E7E3 | 400000FC | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E4D7C4E3 | F0F0F0F7* | |
| 02E3E7E3 | 400001A8 | 40400038 | 40400001 | 58A0D0D4 | 58B0D0C8 | 7860B004 |
| 5890D0F0 | 5880D06C | 5800D060 | 5000D0A8 | 5000D098 | 5980D0A0 | 4770D1B0 |
| 5800D068 | 5000D0A8 | 5800D0A0 | 5900D0AC | E4D7C4E3 | F0F0F0F8* | |
| 02E3E7E3 | 400001E0 | 40400038 | 40400001 | 4770D1C4 | 5800D068 | 5000D098 |
| 5800D098 | 1BFF860F | D2F85850 | D0A01A58 | 5050D094 | 5800D170 | 5000D104 |
| 5090D108 | 1C495050 | D0F858F0 | D0CC7840 | E4D7C4E3 | F0F0F0F9* | |
| 02E3E7E3 | 40000218 | 40400038 | 40400001 | F0047040 | D0FC5820 | D1701A25 |
| 33447A42 | A0003044 | 5800D174 | 5000D10C | 7820F008 | 7020D100 | 5820D174 |
| 1A253322 | 7A22A000 | 30227020 | D0B43946 | E4D7C4E3 | F0F0F1F0** | |
| 02E3E7E3 | 40000250 | 40400038 | 40400001 | 47A0D232 | 39264750 | D4285800 |
| D1785000 | D1101820 | 5A20D0F8 | 7842A000 | 7B40D0FC | 30445800 | D17C5000 |
| D1181820 | 5A20D0F8 | 7822A000 | 7B20D100 | E4D7C4E3 | F0F0F1F1* | |
| 02E3E7E3 | 40000288 | 40400038 | 40400001 | 30227020 | D0B43946 | 47A0D272 |
| 39264750 | D4285800 | D0A81BFF | 870FD2F8 | 5850D0AC | 5050D094 | 5C40D108 |
| 5050D114 | 5820D104 | 1A257842 | A0007B40 | E4D7C4E3 | F0F0F1F2* | |
| 02E3E7E3 | 400002C0 | 40400038 | 40400001 | D0FC3044 | 5820D10C | 1A257822 |
| A0007B20 | D1003022 | 7020D0B4 | 394647A0 | D2BC3926 | 4750D606 | 5820D110 |
| 5A20D114 | 7842A000 | 7B40D0FC | 30445820 | E4D7C4E3 | F0F0F1F3* | |
| 02E3E7E3 | 400002F8 | 40400038 | 40400001 | D1185A20 | D1147822 | A0007B20 |
| D1003022 | 7020D0B4 | 394647A0 | D2F03926 | 4750D606 | 1BFF58E0 | D00007FE |
| 5850D0A0 | 1B585050 | D0945800 | D1705000 | E4D7C4E3 | F0F0F1F4* | |
| 02E3E7E3 | 40000330 | 40400038 | 40400001 | D1285090 | D12C1C49 | 5050D11C |
| 58F0D0CC | 7840F004 | 7040D120 | 5820D170 | 1A253344 | 7A42A000 | 30445800 |
| D1745000 | D1307820 | F0087020 | D1245820 | E4D7C4E3 | F0F0F1F5* | |
| 02E3E7E3 | 40000368 | 40400038 | 40400001 | D1741A25 | 33227A22 | A0003022 |
| 7020D0B4 | 394647A0 | D35C3926 | 4750D606 | 5800D178 | 5000D134 | 18205A20 |
| D11C7842 | A0007B40 | D1203044 | 5800D17C | E4D7C4E3 | F0F0F1F6* | |
| 02E3E7E3 | 400003A0 | 40400038 | 40400001 | 5000D13C | 18205A20 | D11C7822 |
| A0007B20 | D1243022 | 7020D0B4 | 394647A0 | D39C3926 | 4750D606 | 5800D098 |
| 1BFF860F | D3AE1BFF | 58E0D000 | 07FE5080 | E4D7C4E3 | F0F0F1F7* | |
| 02E3E7E3 | 400003D8 | 40400038 | 40400001 | D0941858 | 5C40D12C | 5050D138 |
| 5820D128 | 1A257842 | A0007B40 | D1203044 | 5820D130 | 1A257822 | A0007B20 |
| D1243022 | 7020D0B4 | 394647A0 | D3EC3926 | E4D7C4E3 | F0F0F1F8* | |
| 02E3E7E3 | 40000410 | 40400038 | 40400001 | 4750D428 | 5820D134 | 5A20D138 |
| 7842A000 | 7B40D120 | 30445820 | D13C5A20 | D1387822 | A0007B20 | D1243022 |
| 7020D0B4 | 394647A0 | D4203926 | 4750D428 | E4D7C4E3 | F0F0F1F9* | |
| 02E3E7E3 | 40000448 | 40400038 | 40400001 | 1BFF58E0 | D00007FE | 5850D094 |

MEMBER NAME UPDTE2

| | | | | | | |
|---|---|---|---|---|---|---|
| 5050D0A4 | 5820D0EC | 5020D140 | 18395090 | D1441879 | 5C60D0A0 | 5840D0EC |
| 1A477804 | A0003200 | 4780D466 | 1C431A25 | E4D7C4E3 | F0F0F2F0** | |
| 02E3E7E3 | 40000480 | 40400038 | 40400001 | 7822A000 | 7020D154 | 32224770 |
| D55C5850 | D0A05C40 | D1445820 | D1401A25 | 7802A000 | 32004770 | D49A5850 |
| D0A45C40 | D1445820 | D1401A25 | 5020D14C | E4D7C4E3 | F0F0F2F1* | |
| 02E3E7E3 | 400004B8 | 40400038 | 40400001 | 7802A000 | 32004780 | D4F45850 |
| D0A45C40 | D1445820 | D1401A25 | 5020D148 | 7822A000 | 7020D150 | 32224780 |
| D4D25850 | D0A05C40 | D1445820 | D1401A25 | E4D7C4E3 | F0F0F2F2* | |
| 02E3E7E3 | 400004F0 | 40400038 | 40400001 | 7802A000 | 32004780 | D53E5850 |
| D0A05C40 | D1445820 | D1401A25 | 7822A000 | 58E0D148 | 702EA000 | 1BFF58E0 |
| D00007FE | 5800D0B8 | 5700D05C | 5000D054 | E4D7C4E3 | F0F0F2F3* | |
| 02E3E7E3 | 40000528 | 40400038 | 40400001 | 6820D050 | 6B20D058 | 5850D0A0 |
| 5C40D144 | 5820D140 | 1A257022 | A0005800 | D0B85700 | D05C5000 | D0546820 |
| D0506B20 | D05858E0 | D14C702E | A0001BFF | E4D7C4E3 | F0F0F2F4* | |
| 02E3E7E3 | 40000560 | 40400038 | 40400001 | 58E0D000 | 07FE5850 | D0A05C40 |
| D1445820 | D1401A25 | 7800D150 | 7002A000 | 1BFF58E0 | D00007FE | 18295830 |
| D0EC1869 | 18781882 | 58B0D0A4 | 7840D154 | E4D7C4E3 | F0F0F2F5* | |
| 02E3E7E3 | 40000598 | 40400038 | 40400001 | 185B1C46 | 18955A90 | D0EC7869 |
| A0003266 | 4770D59C | 58B0D0C8 | 7860B004 | 5890D0F0 | 5880D06C | 1BFF58E0 |
| D00007FE | 39644780 | D5BA58B0 | D0C87860 | E4D7C4E3 | F0F0F2F6* | |
| 02E3E7E3 | 400005D0 | 40400038 | 40400001 | B0045890 | D0F05880 | D06C1BFF |
| 58E0D000 | 07FE1858 | 5C40D0A0 | 18251A23 | 7962A000 | 4770D5E4 | 58B0D0C8 |
| 7860B004 | 5890D0F0 | 5880D06C | 1BFF58E0 | E4D7C4E3 | F0F0F2F7* | |
| 02E3E7E3 | 40000608 | 40400038 | 40400001 | D00007FE | 18585C40 | D0A01825 |
| 1A237822 | A0007029 | A0001AB7 | 59B0D0AC | 47C0D602 | 18B747F0 | D5705850 |
| D0945050 | D0A45820 | D0EC5020 | D1581839 | E4D7C4E3 | F0F0F2F8* | |
| 02E3E7E3 | 40000640 | 40400038 | 40400001 | 5090D15C | 18795C60 | D0A05840 |
| D0EC1A47 | 7804A000 | 32004780 | D6441C43 | 1A257822 | A0007020 | D16C3222 |
| 4770D73A | 5850D0A0 | 5C40D15C | 5820D158 | E4D7C4E3 | F0F0F2F9* | |
| 02E3E7E3 | 40000678 | 40400038 | 40400001 | 1A257802 | A0003200 | 4770D678 |
| 5850D0A4 | 5C40D15C | 5820D158 | 1A255020 | D1647802 | A0003200 | 4780D6D2 |
| 5850D0A4 | 5C40D15C | 5820D158 | 1A255020 | E4D7C4E3 | F0F0F3F0** | |
| 02E3E7E3 | 400006B0 | 40400038 | 40400001 | D1607822 | A0007020 | D1683222 |
| 4780D6B0 | 5850D0A0 | 5C40D15C | 5820D158 | 1A257802 | A0003200 | 4780D71C |
| 5850D0A0 | 5C40D15C | 5820D158 | 1A257822 | E4D7C4E3 | F0F0F3F1* | |
| 02E3E7E3 | 400006E8 | 40400038 | 40400001 | A00058E0 | D160702E | A0001BFF |
| 58E0D000 | 07FE5800 | D0B85700 | D05C5000 | D0546820 | D0506B20 | D0585850 |
| D0A05C40 | D15C5820 | D1581A25 | 7022A000 | E4D7C4E3 | F0F0F3F2* | |
| 02E3E7E3 | 40000720 | 40400038 | 40400001 | 5800D0B8 | 5700D05C | 5000D054 |
| 6820D050 | 6B20D058 | 58E0D164 | 702EA000 | 1BFF58E0 | D00007FE | 5850D0A0 |
| 5C40D15C | 5820D158 | 1A257800 | D1687002 | E4D7C4E3 | F0F0F3F3* | |
| 02E3E7E3 | 40000758 | 40400038 | 40400001 | A0001BFF | 58E0D000 | 07FE1829 |
| 5830D0EC | 18691878 | 188258B0 | D0A47840 | D16C185B | 1C461895 | 5A90D0EC |
| 7869A000 | 32664770 | D77A58B0 | D0C87860 | E4D7C4E3 | F0F0F3F4* | |
| 02E3E7E3 | 40000790 | 40400038 | 40400001 | B0045890 | D0F05880 | D06C1BFF |
| 58E0D000 | 07FE3964 | 4780D798 | 58B0D0C8 | 7860B004 | 5890D0F0 | 5880D06C |
| 1BFF58E0 | D00007FE | 18585C40 | D0A01825 | E4D7C4E3 | F0F0F3F5* | |
| 02E3E7E3 | 400007C8 | 40400038 | 40400001 | 1A237962 | A0004770 | D7C258B0 |
| D0C87860 | B0045890 | D0F05880 | D06C1BFF | 58E0D000 | 07FE1858 | 5C40D0A0 |
| 18251A23 | 7822A000 | 7029A000 | 1BB7180B | E4D7C4E3 | F0F0F3F6* | |
| 02E3E7E3 | 40000800 | 40400038 | 40400001 | 5700D05C | 5000D054 | 6820D050 |
| 6B20D058 | 32224770 | D7F258B0 | D0AC47F0 | D74E58A0 | D00458E0 | A00C58B0 |
| A0185810 | B0105820 | D0B85020 | 100018DA | E4D7C4E3 | F0F0F3F7* | |
| 02E3E7E3 | 40000838 | 40400038 | 40400001 | 92FFA00C | 982CA01C | 07FE9879 |
| 10085820 | 70005020 | D0AC5820 | 80005020 | D0A05820 | 90005020 | D0B85820 |
| 10004130 | 20004150 | 00041B25 | 5020D0CC | E4D7C4E3 | F0F0F3F8* | |
| 02E3E7E3 | 40000870 | 40400024 | 40400001 | 5030D0D0 | 58201004 | 41302000 |
| 41500004 | 1B255C40 | D0881B25 | 5020D0D4 | 5030D0D8 | 47F0D180 | 40404040 |

MEMBER NAME UPDTE2

| | | | | | | |
|---|---|---|---|---|---|---|
| 40404040 | 40404040 | 40404040 | 40404040 | E4D7C4E3 | F0F0F3F9* | |
| 02E3E7E3 | 40000020 | 4040000C | 40400001 | 00000842 | 00000028 | 0000081E |
| 40404040 | 40404040 | 40404040 | 40404040 | 40404040 | 40404040 | 40404040 |
| 40404040 | 40404040 | 40404040 | 40404040 | E4D7C4E3 | F0F0F4F0** | |
| 02E3E7E3 | 40000104 | 40400038 | 40400001 | 00000000 | 00000000 | 00000000 |
| 00000000 | 00000034 | 00000038 | 00000000 | 00000000 | 00000000 | 00000000 |
| 00000000 | 00000000 | 00000000 | 00000000 | E4D7C4E3 | F0F0F4F1* | |
| 02E3E7E3 | 4000013C | 40400038 | 40400001 | 00000000 | 00000000 | 00000000 |
| 00000000 | 00000000 | 00000000 | 00000000 | 00000000 | 00000000 | 00000000 |
| 00680005 | 00700006 | 007C0007 | 00740008 | E4D7C4E3 | F0F0F4F2* | |
| 02E3E7E3 | 40000174 | 40400034 | 40400001 | 01200008 | 0094000A | 012C000A |
| 0080000A | 022C000C | 00000000 | 0124000C | 00000000 | 00AC000E | 0000000C |
| 00000010 | 00000014 | 00000018 | 40404040 | E4D7C4E3 | F0F0F4F3* | |
| 02D9D3C4 | 40404040 | 40400020 | 40404040 | 00020001 | 0C0000F0 | 00010001 |
| 0C000020 | 00010001 | 0C000024 | 00010001 | 0C000028 | 40404040 | 40404040 |
| 40404040 | 40404040 | 40404040 | 40404040 | E4D7C4E3 | F0F0F4F4* | |
| 02C5D5C4 | 40404040 | 40404040 | 40404040 | 40404040 | 40404040 | 40404040 |
| 00000894 | F1F5F7F3 | F460C6D6 | F34040F0 | F2F0F2F8 | F7F0F9F8 | 40F0F84B |
| F5F04BF1 | F8404040 | E4D7C4E3 | C5F24040 | E4D7C4E3 | F0F0F4F5** | |

MEMBER NAME VALUE

| | | | | | | |
|---|---|---|---|---|---|---|
| 02C5E2C4 | 40404040 | 40400010 | 40400001 | E5C1D3E4 | C5404040 | 00000000 |
| 40000000 | 40404040 | 40404040 | 40404040 | 40404040 | 40404040 | 40404040 |
| 40404040 | 40404040 | 40404040 | 40404040 | E5C1D3E4 | F0F0F0F1* | |
| 02E3E7E3 | 40000000 | 40400028 | 40400001 | 47F0F00C | 07E5C1D3 | E4C54040 |
| 90ECD00C | 184D98CD | F0205040 | D00450D0 | 400807FC | 40404040 | 40404040 |
| 40404040 | 40404040 | 40404040 | 40404040 | E5C1D3E4 | F0F0F0F2* | |
| 02C5E2C4 | 40404040 | 40400010 | 40400002 | C4C9E2E3 | 40404040 | 02000000 |
| 40000000 | 40404040 | 40404040 | 40404040 | 40404040 | 40404040 | 40404040 |
| 40404040 | 40404040 | 40404040 | 40404040 | E5C1D3E4 | F0F0F0F3* | |
| 02E3E7E3 | 400000A8 | 40400020 | 40400001 | 00000000 | 00000000 | 00000000 |
| 00000001 | 00000002 | 00000003 | 00000000 | 00000000 | 40404040 | 40404040 |
| 40404040 | 40404040 | 40404040 | 40404040 | E5C1D3E4 | F0F0F0F4* | |
| 02C5E2C4 | 40404040 | 40400010 | 40400003 | D6C6C6E2 | E3404040 | 02000000 |
| 40000000 | 40404040 | 40404040 | 40404040 | 40404040 | 40404040 | 40404040 |
| 40404040 | 40404040 | 40404040 | 40404040 | E5C1D3E4 | F0F0F0F5* | |
| 02E3E7E3 | 40000150 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E5C1D3E4 | F0F0F0F6* | |
| 02E3E7E3 | 4000015C | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E5C1D3E4 | F0F0F0F7* | |
| 02E3E7E3 | 40000168 | 40400038 | 40400001 | 58A0D12C | 58B0D138 | 6800D080 |
| 6000D100 | 6000D108 | 6800D110 | 22004780 | D16858F0 | D1344110 | D04C05EF |
| 6820D0F8 | 2C226C20 | D0F86C20 | D0B06840 | E5C1D3E4 | F0F0F0F8* | |
| 02E3E7E3 | 400001A0 | 40400038 | 40400001 | D0F82C44 | 6C40D0C0 | 2A246840 |
| D0D06C40 | D0F82A24 | 6A20D0E0 | 6020B008 | 6820D0F8 | 2C226C20 | D0F86C20 |
| D0B86840 | D0F82C44 | 6C40D0C8 | 2A246840 | E5C1D3E4 | F0F0F0F9* | |
| 02E3E7E3 | 400001D8 | 40400038 | 40400001 | D0D86C40 | D0F82A24 | 6A20D0E8 |
| 6020B010 | 6820D100 | 6C20D110 | 6A20B008 | 6020D118 | 6820D108 | 6C20D110 |
| 6A20B010 | 6020D120 | 58F0D128 | 4110D070 | E5C1D3E4 | F0F0F1F0** | |
| 02E3E7E3 | 40000210 | 40400038 | 40400001 | 05EF1BFF | 58E0D000 | 07FE58A0 |
| D00458E0 | A00C58B0 | A0185810 | B0006820 | D0B06020 | 10005820 | B0046840 |
| D0C06040 | 20005830 | B0086860 | D0D06060 | E5C1D3E4 | F0F0F1F1* | |
| 02E3E7E3 | 40000248 | 40400038 | 40400001 | 30005840 | B0106800 | D0B86000 |
| 40005850 | B0146820 | D0C86020 | 50005860 | B0186840 | D0D86040 | 60005870 |
| B0206860 | D0F86060 | 70005880 | B0306800 | E5C1D3E4 | F0F0F1F2* | |
| 02E3E7E3 | 40000280 | 40400038 | 40400001 | D0F06000 | 80005890 | B0345800 |

```
D0A05000  900018DA  92FFA00C  982CA01C  07FE987B  10006820  70006020
D0B06820  80006020  D0C06820  90006020  E5C1D3E4  F0F0F1F3*
02E3E7E3  400002B8  40400038  40400001  D0D06820  A0006020  D0E06820
B0006020  D0B8987B  10146820  70006020  D0C86820  80006020  D0D86820
90006020  D0E86820  A0006020  D0F8987A  E5C1D3E4  F0F0F1F4*
02E3E7E3  400002F0  40400038  40400001  102C6820  70006020  D1106820
80006020  D0F05820  90005020  D0A05820  A0005020  D0A85820  10244130
20004150  00081B25  5020D138  5030D13C  E5C1D3E4  F0F0F1F5*
02E3E7E3  40000328  4040001E  40400001  58201028  41302000  41500008
1B255020  D12C5030  D1305030  D07447F0  D1404040  40404040  40404040
40404040  40404040  40404040  40404040  E5C1D3E4  F0F0F1F6*
02E3E7E3  40000020  4040000C  40400001  0000029E  00000028  0000021A
40404040  40404040  40404040  40404040  40404040  40404040  40404040
40404040  40404040  40404040  40404040  E5C1D3E4  F0F0F1F7*
02E3E7E3  40000074  4040000C  40400001  00000128  00000130  00000120
40404040  40404040  40404040  40404040  40404040  40404040  40404040
40404040  40404040  40404040  40404040  E5C1D3E4  F0F0F1F8*
02D9D3C4  40404040  40400038  40404040  00020001  1C000150  00030001
1C00015C  00010001  0C000020  00010001  0C000024  00010001  0C000028
00010001  0C000074  00010001  0C000078  E5C1D3E4  F0F0F1F9*
02E3E7E3  40000080  4040001C  40400001  000000D8  000000E8  000000F8

MEMBER NAME  VALUE
000000E0  000000F0  80000100  00000140  40404040  40404040  40404040
40404040  40404040  40404040  40404040  E5C1D3E4  F0F0F2F0**
02D9D3C4  40404040  40400038  40404040  00010001  0C00007C  00010001
0C000080  00010001  0C000084  00010001  0C000088  00010001  0C00008C
00010001  0C000090  00010001  0C000094  E5C1D3E4  F0F0F2F1*
02E3E7E3  400000A0  40400008  40400001  00000118  800000C8  40404040
40404040  40404040  40404040  40404040  40404040  40404040  40404040
40404040  40404040  40404040  40404040  E5C1D3E4  F0F0F2F2*
02D9D3C4  40404040  40400018  40404040  00010001  0C000098  00010001
0C0000A0  00010001  0C0000A4  40404040  40404040  40404040  40404040
40404040  40404040  40404040  40404040  E5C1D3E4  F0F0F2F3*
02C5D5C4  40404040  40404040  40404040  40404040  40404040  40404040
00000346  F1F5F7F3  F460C6D6  F34040F0  F2F0F2F8  F7F0F9F8  40F0F84B
F5F04BF2  F4404040  E5C1D3E4  C5404040  E5C1D3E4  F0F0F2F4**

MEMBER NAME  VDASH
02C5E2C4  40404040  40400010  40400001  E5C4C1E2  C8404040  00000000
40000000  40404040  40404040  40404040  40404040  40404040  40404040
40404040  40404040  40404040  40404040  E5C4C1E2  F0F0F0F1*
02E3E7E3  40000000  40400038  40400001  47F0F00C  07E5C4C1  E2C84040
90ECD00C  184D98CD  F0205040  D00450D0  400807FC  40404040  40404040
020A0803  18010A08  0318011A  05C4C1E2  E5C4C1E2  F0F0F0F2*
02E3E7E3  40000038  40400038  40400001  C8401003  1A1340C8  C1E240D5
D640D7C1  C7C540D5  E4D4C2C5  D9181422  02064814  0122020A  08031801
0A080318  011A05C4  C1E2C840  10031A06  E5C4C1E2  F0F0F0F3*
02E3E7E3  40000070  40400038  40400001  40D7C1C7  C5401002  1A1040C1
D3D9C5C1  C6E840C4  C5C6C9D5  C5C41814  22020648  14012202  0A080318
010A0803  18011A05  C4C1E2C8  4010031A  E5C4C1E2  F0F0F0F4*
02E3E7E3  400000A8  4040002A  40400001  2640C4C5  C6C9D5C5  C440C1E2
40C140D3  C5C6E340  C1D5C440  D9C9C7C8  E340C8C1  D5C440D7  C1D9E318
14224040  40404040  40404040  40404040  E5C4C1E2  F0F0F0F5*
02E3E7E3  40000130  40400034  40400001  00000000  00000000  4F080000
00000000  00000000  00000001  00000002  00000003  00000004  00000005
00000048  00000000  00000000  40404040  E5C4C1E2  F0F0F0F6*
02C5E2C4  40404040  40400010  40400002  D4E5C3C8  D9404040  02000000
40000000  40404040  40404040  40404040  40404040  40404040  40404040
```

```
40404040  40404040  40404040  40404040  E5C4C1E2  F0F0F0F7*
02E3E7E3  400001E0  40400004  40400001  00000000  40404040  40404040
40404040  40404040  40404040  40404040  40404040  40404040  40404040
40404040  40404040  40404040  40404040  E5C4C1E2  F0F0F0F8*
02C5E2C4  40404040  40400010  40400003  C9C2C3D6  D47B4040  02000000
40000000  40404040  40404040  40404040  40404040  40404040  40404040
40404040  40404040  40404040  40404040  E5C4C1E2  F0F0F0F9*
02E3E7E3  400001E8  40400008  40400001  00000000  00000000  40404040
40404040  40404040  40404040  40404040  40404040  40404040  40404040
40404040  40404040  40404040  40404040  E5C4C1E2  F0F0F1F0**
02E3E7E3  400001F4  40400004  40400001  00000000  40404040  40404040
40404040  40404040  40404040  40404040  40404040  40404040  40404040
40404040  40404040  40404040  40404040  E5C4C1E2  F0F0F1F1*
02E3E7E3  40000184  40400004  40400001  000000C8  40404040  40404040
40404040  40404040  40404040  40404040  40404040  40404040  40404040
40404040  40404040  40404040  40404040  E5C4C1E2  F0F0F1F2*
02E3E7E3  40000190  40400038  40400001  40404040  40404040  40404040
40404040  40404040  40404040  40404040  40404040  40404040  40404040
40404040  40404040  40404040  40404040  E5C4C1E2  F0F0F1F3*
02E3E7E3  400001C8  40400010  40400001  40404040  40404040  40404040
40404040  40404040  40404040  40404040  40404040  40404040  40404040
40404040  40404040  40404040  40404040  E5C4C1E2  F0F0F1F4*
02E3E7E3  40000268  40400038  40400001  5880D114  58B0D06C  50B0D08C
5800D14C  5000D12C  189B58B0  D15058A0  D1085800  D08C1A09  5000D0A0
185B5C40  D08C5050  D18C1835  1A3B7803  E5C4C1E2  F0F0F1F5*
02E3E7E3  400002A0  40400038  40400001  A0003200  4770D29C  5800D0B4
5900D0AC  4750D1E0  47F0D6AE  5800D0B4  1A095000  D0B41870  5C60D080
18371A39  41038000  5000D050  58F0D110  E5C4C1E2  F0F0F1F6*
02E3E7E3  400002D8  40400038  40400001  4110D04C  05EF1865  5A60D14C
2B007806  A0006A00  D0606000  D0585830  D05C1033  5030D098  58F0D11C
45E0F004  00000000  00000028  18355A30  E5C4C1E2  F0F0F1F7*
02E3E7E3  40000310  40400038  40400001  D15C45E0  F0080473  A0001835
5A30D160  45E0F008  0473A000  45E0F008  0450D098  45E0F010  58F0D11C
45E0F000  00000000  00000054  18A958B0  E5C4C1E2  F0F0F1F8*
02E3E7E3  40000348  40400038  40400001  D080185B  5C40D0B4  18391A35
45E0F008  01238000  879AD272  58A0D108  58B0D150  5890D06C  45E0F010
47F0D692  5800D0A0  5900D0A4  4730D692  E5C4C1E2  F0F0F1F9*
02E3E7E3  40000380  40400038  40400001  5800D0A0  5000D090  183B5C20

MEMBER NAME  VDASH
D08C1803  5A00D14C  5000D154  18031A0B  5000D158  18035A00  D15C5000
D1641803  5A00D160  5000D168  18035A00  E5C4C1E2  F0F0F2F0**
02E3E7E3  400003B8  40400038  40400001  D15C5000  D16C5A30  D1605030
D170185B  5C40D0A0  18055A00  D14C5000  D1741805  1A0B5000  D1781835
5A30D15C  5030D17C  18255A20  D1605020  E5C4C1E2  F0F0F2F1*
02E3E7E3  400003F0  40400038  40400001  D1805030  D1845020  D188186B
18A958B0  D0AC5870  D10858E0  D154782E  70007020  D14058E0  D174784E
70007040  D1303924  4770D4DC  58E0D178  E5C4C1E2  F0F0F2F2*
02E3E7E3  40000428  40400038  40400001  782E7000  7020D134  58E0D158
792E7000  4770D644  59B0D0B4  4730D370  47F0D6AE  5800D0B4  1A0A5000
D0B41850  5C40D080  18351A3A  41038000  E5C4C1E2  F0F0F2F3*
02E3E7E3  40000460  40400038  40400001  5000D050  58F0D110  4110D04C
05EF2B00  7800D130  6A00D060  6000D058  5830D05C  10335030  D0982B00
7800D134  6A00D060  6000D058  5800D05C  E5C4C1E2  F0F0F2F4*
02E3E7E3  40000498  40400038  40400001  5000D09C  58F0D11C  45E0F004
00000000  0000005A  5810D17C  45E0F008  04717000  5810D180  45E0F008
04717000  45E0F008  0450D098  45E0F008  E5C4C1E2  F0F0F2F5*
02E3E7E3  400004D0  40400038  40400001  0450D09C  45E0F010  58F0D11C
45E0F000  00000000  0000008D  189A58B0  D080185B  5C40D0B4  18391A35
```

| | | | | | | |
|---|---|---|---|---|---|---|
| 45E0F008 | 01238000 | 879AD416 | 58B0D0AC | E5C4C1E2 | F0F0F2F6* | |
| 02E3E7E3 | 40000508 | 40400038 | 40400001 | 45E0F010 | 59B0D0B4 | 4730D440 |
| 47F0D6AE | 5800D0B4 | 1A0A5000 | D0B41850 | 5C40D080 | 18351A3A | 41038000 |
| 5000D050 | 58F0D110 | 4110D04C | 05EF58F0 | E5C4C1E2 | F0F0F2F7* | |
| 02E3E7E3 | 40000540 | 40400038 | 40400001 | D11C1800 | 45E0F004 | 00000000 |
| 0000005A | 5810D164 | 45E0F008 | 04717000 | 5810D168 | 45E0F008 | 04717000 |
| 45E0F008 | 0450D098 | 45E0F008 | 0450D09C | E5C4C1E2 | F0F0F2F8* | |
| 02E3E7E3 | 40000578 | 40400014 | 40400001 | 45E0F010 | 58F0D11C | 45E0F000 |
| 00000000 | 0000008D | 40404040 | 40404040 | 40404040 | 40404040 | 40404040 |
| 40404040 | 40404040 | 40404040 | 40404040 | E5C4C1E2 | F0F0F2F9* | |
| 02D9D3C4 | 40404040 | 40400038 | 40404040 | 00020001 | 1C0001E8 | 00030001 |
| 1C0001F4 | 00010001 | 0C000308 | 00010001 | 0C000340 | 00010001 | 0C0004A8 |
| 00010001 | 0C0004E4 | 00010001 | 0C00054C | E5C4C1E2 | F0F0F3F0** | |
| 02E3E7E3 | 4000058C | 40400038 | 40400001 | 189A58B0 | D080185B | 5C40D0B4 |
| 18391A35 | 45E0F008 | 01238000 | 879AD4BA | 58B0D0AC | 45E0F010 | 47F0D644 |
| 2B007800 | D1306A00 | D0606000 | D0585830 | E5C4C1E2 | F0F0F3F1* | |
| 02E3E7E3 | 400005C4 | 40400038 | 40400001 | D05C1033 | 5030D098 | 2B007800 |
| D1406A00 | D0606000 | D0585840 | D05C1044 | 19344770 | D64459B0 | D0B44730 |
| D51A47F0 | D6AE5800 | D0B41A0A | 5000D0B4 | E5C4C1E2 | F0F0F3F2* | |
| 02E3E7E3 | 400005FC | 40400038 | 40400001 | 18505C40 | D0801835 | 1A3A4103 |
| 80005000 | D05058F0 | D1104110 | D04C05EF | 58F0D11C | 45E0F004 | 00000000 |
| 00000093 | 5810D184 | 45E0F008 | 04717000 | E5C4C1E2 | F0F0F3F3* | |
| 02E3E7E3 | 40000634 | 40400038 | 40400001 | 5810D188 | 45E0F008 | 04717000 |
| 45E0F008 | 0450D098 | 45E0F010 | 58F0D11C | 45E0F000 | 00000000 | 0000008D |
| 189A58B0 | D080185B | 5C40D0B4 | 18391A35 | E5C4C1E2 | F0F0F3F4* | |
| 02E3E7E3 | 4000066C | 40400038 | 40400001 | 45E0F008 | 01238000 | 879AD58A |
| 58B0D0AC | 45E0F010 | 59B0D0B4 | 4730D5B4 | 47F0D6AE | 5800D0B4 | 1A0A5000 |
| D0B41850 | 5C40D080 | 18351A3A | 41038000 | E5C4C1E2 | F0F0F3F5* | |
| 02E3E7E3 | 400006A4 | 40400038 | 40400001 | 5000D050 | 58F0D110 | 4110D04C |
| 05EF58F0 | D11C1800 | 45E0F004 | 00000000 | 00000093 | 5810D16C | 45E0F008 |
| 04717000 | 5810D170 | 45E0F008 | 04717000 | E5C4C1E2 | F0F0F3F6* | |
| 02E3E7E3 | 400006DC | 40400038 | 40400001 | 45E0F008 | 0450D098 | 45E0F010 |
| 58F0D11C | 45E0F000 | 00000000 | 0000008D | 189A58B0 | D080185B | 5C40D0B4 |
| 18391A35 | 45E0F008 | 01238000 | 879AD626 | E5C4C1E2 | F0F0F3F7* | |
| 02E3E7E3 | 40000714 | 40400038 | 40400001 | 58B0D0AC | 45E0F010 | 5820D090 |
| 1A2A5020 | D0905800 | D1881A06 | 5000D188 | 5800D184 | 1A065000 | D1845800 |
| D1801A06 | 5000D180 | 5800D17C | 1A065000 | E5C4C1E2 | F0F0F3F8* | |
| 02E3E7E3 | 4000074C | 40400038 | 40400001 | D17C5800 | D1781A06 | 5000D178 |
| 5800D174 | 1A065000 | D1745920 | D0A447C0 | D32E58A0 | D10858B0 | D1505890 |

MEMBER NAME VDASH

| | | | | | | |
|---|---|---|---|---|---|---|
| D06C5800 | D0A05000 | D08C5900 | D0A447C0 | E5C4C1E2 | F0F0F3F9* | |
| 02E3E7E3 | 40000784 | 40400038 | 40400001 | D1AE58B0 | D06C1BFF | 58E0D000 |
| 07FE58A0 | D00458E0 | A00C58B0 | A0185810 | B00C5820 | D0B45020 | 100018DA |
| 92FFA00C | 982CA01C | 07FE9879 | 10045820 | E5C4C1E2 | F0F0F4F0** | |
| 02E3E7E3 | 400007BC | 40400038 | 40400001 | 70005020 | D0A45820 | 90005020 |
| D0B45820 | 10004130 | 20004150 | 00041B25 | 5C40D07C | 1B255020 | D1085030 |
| D10C5820 | 10084130 | 20004150 | 00011B25 | E5C4C1E2 | F0F0F4F1* | |
| 02E3E7E3 | 400007F4 | 40400012 | 40400001 | 5C40D080 | 1B255020 | D1145030 |
| D11847F0 | D1904040 | 40404040 | 40404040 | 40404040 | 40404040 | 40404040 |
| 40404040 | 40404040 | 40404040 | 40404040 | E5C4C1E2 | F0F0F4F2* | |
| 02E3E7E3 | 40000020 | 40400008 | 40400001 | 000007B6 | 000000D8 | 40404040 |
| 40404040 | 40404040 | 40404040 | 40404040 | 40404040 | 40404040 | 40404040 |
| 40404040 | 40404040 | 40404040 | 40404040 | E5C4C1E2 | F0F0F4F3* | |
| 02E3E7E3 | 400000D8 | 40400004 | 40400001 | 00000792 | 40404040 | 40404040 |
| 40404040 | 40404040 | 40404040 | 40404040 | 40404040 | 40404040 | 40404040 |
| 40404040 | 40404040 | 40404040 | 40404040 | E5C4C1E2 | F0F0F4F4* | |
| 02D9D3C4 | 40404040 | 40400038 | 40404040 | 00010001 | 0C000588 | 00010001 |
| 0C000624 | 00010001 | 0C000658 | 00010001 | 0C0006C0 | 00010001 | 0C0006F4 |

```
00010001  0C000020  00010001  0C000024  E5C4C1E2  F0F0F4F5*
02E3E7E3  40000124  40400004  40400001  00000158  40404040  40404040
40404040  40404040  40404040  40404040  40404040  40404040  40404040
40404040  40404040  40404040  40404040  E5C4C1E2  F0F0F4F6*
02E3E7E3  4000012C  40400004  40400001  80000190  40404040  40404040
40404040  40404040  40404040  40404040  40404040  40404040  40404040
40404040  40404040  40404040  40404040  E5C4C1E2  F0F0F4F7*
02E3E7E3  400001F8  40400038  40400001  00000000  00000000  00000000
00000000  00000000  00000000  00000000  00000000  00000000  00000000
00000000  00000008  00000014  00000000  E5C4C1E2  F0F0F4F8*
02E3E7E3  40000230  40400038  40400001  00000000  0000000C  00000010
00000000  00000000  00000000  006C0007  01100007  00000000  010C0008
00740008  00C40009  00C80009  00000000  E5C4C1E2  F0F0F4F9*
02D9D3C4  40404040  40400018  40404040  00010001  0C0000D8  00010001
0C000124  00010001  0C00012C  40404040  40404040  40404040  40404040
40404040  40404040  40404040  40404040  E5C4C1E2  F0F0F5F0**
02C5D5C4  40404040  40404040  40404040  40404040  40404040  40404040
00000806  F1F5F7F3  F460C6D6  F34040F0  F2F0F2F8  F7F0F9F8  40F0F84B
F5F04BF2  F9404040  E5C4C1E2  C8404040  E5C4C1E2  F0F0F5F1**

MEMBER NAME  VERIFY
02C5E2C4  40404040  40400010  40400001  E5C5D9C9  C6E84040  00000000
40000000  40404040  40404040  40404040  40404040  40404040  40404040
40404040  40404040  40404040  40404040  E5C5D9C9  F0F0F0F1*
02E3E7E3  40000000  40400038  40400001  47F0F00C  07E5C5D9  C9C6E840
90ECD00C  184D98CD  F0205040  D00450D0  400807FC  40404040  40404040
02100418  050A0903  18020A09  03220206  E5C5D9C9  F0F0F0F2*
02E3E7E3  40000038  40400038  40400001  1D140122  021A2F40  E3C8C540
C5D5C440  D6C640E3  C8C540C1  D9D9D6E6  40C8C5C1  C440C9E2  40D5D6E3
40D6D540  C1D540C5  D3C5D4C5  D5E31A06  E5C5D9C9  F0F0F0F3*
02E3E7E3  40000070  4040000C  40400001  40E7E840  7E400602  0A0C0522
40404040  40404040  40404040  40404040  40404040  40404040  40404040
40404040  40404040  40404040  40404040  E5C5D9C9  F0F0F0F4*
02E3E7E3  40000080  40400038  40400001  C1D9D9D6  E640C8C5  C1C440C5
D9D9D6D9  E2404040  40404040  D3C1E8E4  D7407B40  40404040  4040E740
40404040  40404040  40E84040  40404040  E5C5D9C9  F0F0F0F5*
02E3E7E3  400003B0  40400038  40400001  00000000  00000000  4E000000
00000000  4F080000  00000000  4E000000  80000000  00000000  00000001
00000002  00000003  00000004  00000005  E5C5D9C9  F0F0F0F6*
02E3E7E3  400003E8  40400038  40400001  00000006  00000007  00000008
00000009  0000000A  0000000B  0000000C  0000000D  0000000E  00000011
00000014  00000018  0000001A  0000001D  E5C5D9C9  F0F0F0F7*
02E3E7E3  40000420  40400038  40400001  0000002C  00000038  0000003A
00000049  00000078  401DF3B6  4029FBE7  403EF9DB  40800000  40E04189
4123CED9  4124CCCD  4125DF3B  41266666  E5C5D9C9  F0F0F0F8*
02C5E2C4  40404040  40400010  40400002  C6D8E3C5  D57B4040  02000000
40000000  40404040  40404040  40404040  40404040  40404040  40404040
40404040  40404040  40404040  40404040  E5C5D9C9  F0F0F0F9*
02C5E2C4  40404040  40400010  40400003  C5D3D4E3  C2D34040  05000000
400D7D28  40404040  40404040  40404040  40404040  40404040  40404040
40404040  40404040  40404040  40404040  E5C5D9C9  F0F0F1F0**
02E3E7E3  40000458  40400028  40400001  4128CCCD  412A0C4A  412C0000
412F525F  41326666  41480000  415C353F  42110000  00000000  00000000
40404040  40404040  40404040  40404040  E5C5D9C9  F0F0F1F1*
02C5E2C4  40404040  40400010  40400004  E2D7D3D7  E3E24040  05000000
40030D44  40404040  40404040  40404040  40404040  40404040  40404040
40404040  40404040  40404040  40404040  E5C5D9C9  F0F0F1F2*
02C5E2C4  40404040  40400010  40400005  D7E3C1C2  D3C54040  05000000
40125768  40404040  40404040  40404040  40404040  40404040  40404040
```

```
40404040  40404040  40404040  40404040  E5C5D9C9  F0F0F1F3*
02C5E2C4  40404040  40400010  40400006  E3D6D3C5  D9404040  05000000
4000000C  40404040  40404040  40404040  40404040  40404040  40404040
40404040  40404040  40404040  40404040  E5C5D9C9  F0F0F1F4*
02E3E7E3  40000630  40400020  40400001  FFFFFFC8  000CD118  FFFFFFEC
FFFFFFEC  00058600  000B0444  00108298  00000000  40404040  40404040
40404040  40404040  40404040  40404040  E5C5D9C9  F0F0F1F5*
02D9D3C4  40404040  40400038  40404040  00030001  0C000630  00030001
0C000634  00040001  0C000638  00050001  0C00063C  00050001  0C000640
00050001  0C000644  00050001  0C000648  E5C5D9C9  F0F0F1F6*
02C5E2C4  40404040  40400010  40400007  D9D4D6C4  C5D34040  05000000
40000018  40404040  40404040  40404040  40404040  40404040  40404040
40404040  40404040  40404040  40404040  E5C5D9C9  F0F0F1F7*
02C5E2C4  40404040  40400010  40400008  C2E2D6D9  E3404040  02000000
40000000  40404040  40404040  40404040  40404040  40404040  40404040
40404040  40404040  40404040  40404040  E5C5D9C9  F0F0F1F8*
02C5E2C4  40404040  40400010  40400009  D4E5C3C8  D9404040  02000000
40000000  40404040  40404040  40404040  40404040  40404040  40404040
40404040  40404040  40404040  40404040  E5C5D9C9  F0F0F1F9*
02E3E7E3  40000650  4040000C  40400001  FFFFFFFF  00000000  00000000

MEMBER NAME  VERIFY
40404040  40404040  40404040  40404040  40404040  40404040  40404040
40404040  40404040  40404040  40404040  E5C5D9C9  F0F0F2F0**
02C5E2C4  40404040  40400010  4040000A  C3C1C4D3  D5F14040  02000000
40000000  40404040  40404040  40404040  40404040  40404040  40404040
40404040  40404040  40404040  40404040  E5C5D9C9  F0F0F2F1*
02C5E2C4  40404040  40400010  4040000B  C3C1C4E2  E4D74040  02000000
40000000  40404040  40404040  40404040  40404040  40404040  40404040
40404040  40404040  40404040  40404040  E5C5D9C9  F0F0F2F2*
02C5E2C4  40404040  40400010  4040000C  C8C7C4C1  E3C54040  02000000
40000000  40404040  40404040  40404040  40404040  40404040  40404040
40404040  40404040  40404040  40404040  E5C5D9C9  F0F0F2F3*
02C5E2C4  40404040  40400010  4040000D  C8C7E3C9  D4C54040  02000000
40000000  40404040  40404040  40404040  40404040  40404040  40404040
40404040  40404040  40404040  40404040  E5C5D9C9  F0F0F2F4*
02E3E7E3  40000660  40400014  40400001  00000000  00000000  00000000
00000000  00000000  40404040  40404040  40404040  40404040  40404040
40404040  40404040  40404040  40404040  E5C5D9C9  F0F0F2F5*
02D9D3C4  40404040  40400038  40404040  00060001  0C00064C  00070001
0C000650  00080001  1C000654  00090001  1C000660  000A0001  1C000664
000B0001  1C000668  000C0001  1C00066C  E5C5D9C9  F0F0F2F6*
02C5E2C4  40404040  40400010  4040000E  C9C2C3D6  D47B4040  02000000
40000000  40404040  40404040  40404040  40404040  40404040  40404040
40404040  40404040  40404040  40404040  E5C5D9C9  F0F0F2F7*
02C5E2C4  40404040  40400010  4040000F  D7D9D6D1  C1D94040  02000000
40000000  40404040  40404040  40404040  40404040  40404040  40404040
40404040  40404040  40404040  40404040  E5C5D9C9  F0F0F2F8*
02C5E2C4  40404040  40400010  40400010  D7D9D6D1  D3D54040  02000000
40000000  40404040  40404040  40404040  40404040  40404040  40404040
40404040  40404040  40404040  40404040  E5C5D9C9  F0F0F2F9*
02C5E2C4  40404040  40400010  40400011  D7D9D6D1  E2D74040  02000000
40000000  40404040  40404040  40404040  40404040  40404040  40404040
40404040  40404040  40404040  40404040  E5C5D9C9  F0F0F3F0**
02E3E7E3  40000674  40400010  40400001  00000000  00000000  00000000
00000000  40404040  40404040  40404040  40404040  40404040  40404040
40404040  40404040  40404040  40404040  E5C5D9C9  F0F0F3F1*
02E3E7E3  40000528  40400030  40400001  00000003  00000002  C9C94040
C1404040  00000005  00000004  C6D34040  C1404040  00000009  00000004
```

C6D34040 C1404040 40404040 40404040 E5C5D9C9 F0F0F3F2*
02E3E7E3 40000568 40400038 40400001 D3C1E8E4 D740C1D9 D9D6E6E2
40D5D6E3 40D6D540 C5D3C5D4 C5D5E3E2 5BE740E8 40C7C9E5 C5D540C9
D540E5C9 C5E640C3 D6D6D9C4 C9D5C1E3 E5C5D9C9 F0F0F3F3*
02E3E7E3 400005A0 40400008 40400001 C5E24040 40404040 40404040
40404040 40404040 40404040 40404040 40404040 40404040 40404040
40404040 40404040 40404040 40404040 E5C5D9C9 F0F0F3F4*
02E3E7E3 400005B0 40400038 40400001 C3D6D7E8 D9C9C7C8 E3404DC3
5D40F1F9 F8F640E3 C8C540C2 D6C5C9D5 C740C3D6 D4D7C1D5 E85BC1D3
D340D9C9 C7C8E3E2 40D9C5E2 C5D9E5C5 E5C5D9C9 F0F0F3F5*
02E3E7E3 400005E8 40400038 40400001 C45B5BE2 D3C9C340 E5C5D9E2
C9D6D540 E7E74BE7 40404040 40404040 4040C4C1 E3C57A40 E7E761E7
E761E7E7 40404040 4040E3C9 D4C57A40 E5C5D9C9 F0F0F3F6*
02E3E7E3 40000620 40400008 40400001 E7E77AE7 E77AE7E7 40404040
40404040 40404040 40404040 40404040 40404040 40404040 40404040
40404040 40404040 40404040 40404040 E5C5D9C9 F0F0F3F7*
02E3E7E3 400006B4 40400038 40400001 58A0D598 58B0D590 58F0D59C
4110D090 05EF4100 D5405000 D0A858F0 D5A84110 D0A405EF 5800D318
5000D430 7800D390 33007000 D4A87800 E5C5D9C9 F0F0F3F8*
02E3E7E3 400006EC 40400038 40400001 D3947000 D4AC5800 D31C5000
D3C85880 D34858A0 D57C5890 D5785800 D3C85900 B00C47C0 D65E47F0

MEMBER NAME  VERIFY
DD901838 5C20D3C8 5030D5E8 4103B004 E5C5D9C9 F0F0F3F9*
02E3E7E3 40000724 40400038 40400001 5000D0B8 9280D0B8 58F0D5A8
4110D0B0 05EF7823 B0087020 D4A07823 B00C7020 D4A45800 D31C5000
D3D04800 D4684000 D5D85800 D5EC5000 E5C5D9C9 F0F0F4F0**
02E3E7E3 4000075C 40400038 40400001 D5E05800 D3585000 D5E458A0
D36C58B0 D5A058E0 D5E0585E B0005050 D42C58E0 D5E4580E B0005000
D4081875 1C6A2B00 78079008 6A00D308 E5C5D9C9 F0F0F4F1*
02E3E7E3 40000794 40400038 40400001 6000D2F8 5820D2FC 4920D5D8
4770D826 18255050 D3CC1C4A 188518A2 58B0D580 5860D57C 2B007808
90046A00 D3086000 D2F85870 D2FC7808 E5C5D9C9 F0F0F4F2*
02E3E7E3 400007CC 40400038 40400001 900C7000 D3D47808 90107000
D3DC7808 90147000 D3D87808 90187000 D3E05970 D31C4770 D75858F0
D5C44110 D0BC05EF 50A0D3CC 41E00008 E5C5D9C9 F0F0F4F3*
02E3E7E3 40000804 40400038 40400001 15FE4720 D75858EF D04C07FE
5970D324 4770D78A 41089004 5000D0D4 9280D0D4 58F0D5C0 4110D0D0
05EF50A0 D3CC41E0 000415FE 4720D78A E5C5D9C9 F0F0F4F4*
02E3E7E3 4000083C 40400038 40400001 58EFD058 07FE2B00 7808901C
6A00D308 6000D2F8 5850D2FC 5050D3E8 2B007808 90206A00 D3086000
D2F85800 D2FC5000 D4142B00 78089024 E5C5D9C9 F0F0F4F5*
02E3E7E3 40000874 40400038 40400001 6A00D308 6000D2F8 5830D2FC
5030D3EC 5970D328 4770D812 5C40D358 5C20D368 41089004 5000D0DC
4105B004 5000D0E0 41036004 5000D0E8 E5C5D9C9 F0F0F4F6*
02E3E7E3 400008AC 40400038 40400001 58F0D5C8 4110D0D8 05EF50A0
D3CC41E0 000415FE 4720D812 58EFD060 07FE5A80 D36C5AA0 D31C59A0
D40847C0 D70050A0 D3CC58B0 D5A058A0 E5C5D9C9 F0F0F4F7*
02E3E7E3 400008E4 40400038 40400001 D36C5880 D3485820 D3D05A20
D31C5020 D3D05800 D5E41A08 5000D5E4 5800D5E0 1A085000 D5E05920
D44047C0 D6B658A0 D57C58B0 D5905880 E5C5D9C9 F0F0F4F8*
02E3E7E3 4000091C 40400038 40400001 D34858F0 D5BC1800 45E0F004
00000006 0000003C 45E0F00C 00000558 04700002 45E0F010 5800D430
5A00D31C 5000D430 4800D466 5000D434 E5C5D9C9 F0F0F4F9*
02E3E7E3 40000954 40400010 40400001 58F0D5BC 45E0F004 00000000
00000028 40404040 40404040 40404040 40404040 40404040 40404040
40404040 40404040 40404040 40404040 E5C5D9C9 F0F0F5F0**
02D9D3C4 40404040 40400038 40404040 000D0001 1C000670 000E0001
1C000674 000F0001 1C000678 00100001 1C00067C 00110001 1C000680

```
00010001  0C00092C  00010001  0C000934  E5C5D9C9  F0F0F5F1*
02E3E7E3  40000964  40400038  40400001  45E0F008  0450D434  5810D5E8
45E0F008  0471B008  5810D5E8  45E0F008  0471B00C  45E0F010  58F0D5BC
45E0F000  00000000  00000036  45E0F00C  E5C5D9C9  F0F0F5F2*
02E3E7E3  4000099C  40400038  40400001  00000500  0120001E  45E0F010
7820D4AC  7B20D388  7020D4AC  4100D4A8  5000D0F4  4100D4AC  5000D0F8
58F0D5B0  4110D0F4  05EF41E0  000415FE  E5C5D9C9  F0F0F5F3*
02E3E7E3  400009D4  40400038  40400001  4720D926  58EFD068  07FE5830
D3C85A30  D31C5030  D3C85930  B00C47C0  D93E47F0  DD901C28  4103B004
5000D144  9280D144  58F0D5A8  4110D13C  E5C5D9C9  F0F0F5F4*
02E3E7E3  40000A0C  40400038  40400001  05EF7843  B0087B40  D4A03044
7823B00C  7B20D4A4  30227020  D41C58F0  D5947940  F0044730  D99258F0
D5947920  F0044730  D9924820  D4684920  E5C5D9C9  F0F0F5F5*
02E3E7E3  40000A44  40400038  40400001  D46C4780  D92647F0  DD8C58A0
D57C58B0  D5905880  D3485830  90385A30  D31C5030  90381858  5C40D3D0
18251A28  5800D31C  58F0D5A0  5002F000  E5C5D9C9  F0F0F5F6*
02E3E7E3  40000A7C  40400038  40400001  5C20D36C  5870D3CC  5C60D36C
41039004  5000D14C  41079004  5000D150  9280D150  58F0D5A8  4110D148
05EF5830  90385C20  D36C4103  902C5000  E5C5D9C9  F0F0F5F7*
02E3E7E3  40000AB4  40400038  40400001  D15858E0  D5E8410E  B0085000
D15C9280  D15C58F0  D5A84110  D15405EF  4820D466  18025700  D3145000
D3046820  D3006B20  D3105830  90385C20  E5C5D9C9  F0F0F5F8*

MEMBER NAME  VERIFY
02E3E7E3  40000AEC  40400038  40400001  D36C7023  90285800  D3D05700
D3145000  D3046820  D3006B20  D3107023  90345A50  D3285840  D3CC58F0
D5A05B45  F0005A40  D31C1804  5700D314  E5C5D9C9  F0F0F5F9*
02E3E7E3  40000B24  40400038  40400001  5000D304  6820D300  6B20D310
70239038  5850A02C  5A50D31C  5050A02C  2B007807  90246A00  D3086000
D2F85830  D2FC5C40  D3685C20  D3684105  E5C5D9C9  F0F0F6F0**
02E3E7E3  40000B5C  40400038  40400001  A0045000  D1644103  A0045000
D1689280  D16858F0  D5A84110  D16005EF  5800A02C  5700D314  5000D304
6820D300  6B20D310  58309038  5C20D36C  E5C5D9C9  F0F0F6F1*
02E3E7E3  40000B94  40400038  40400001  70239024  5800D404  5700D314
5000D304  6820D300  6B20D310  5830A02C  5C20D368  7023A028  7800D420
7003A02C  7800D4A0  7000D5D0  7800D4A4  E5C5D9C9  F0F0F6F2*
02E3E7E3  40000BCC  40400038  40400001  7000D5D4  5870D31C  5880D5E8
58A0D3C8  5860D594  47F0DBA8  58309038  1A375030  90381853  5C40D36C
1B375C20  D36C4105  90045000  D14C4103  E5C5D9C9  F0F0F6F3*
02E3E7E3  40000C04  40400038  40400001  90045000  D1509280  D15058F0
D5A84110  D14805EF  58309038  5C20D36C  4103902C  5000D158  4108B008
5000D15C  9280D15C  58F0D5A8  4110D154  E5C5D9C9  F0F0F6F4*
02E3E7E3  40000C3C  40400038  40400001  05EF4820  D4661802  5700D314
5000D304  6820D300  6B20D310  58309038  5C20D36C  70239028  1AA75A80
D34859A0  B00C47C0  DBBE50A0  D3C847F0  E5C5D9C9  F0F0F6F5*
02E3E7E3  40000C74  40400038  40400001  DD904108  B0045000  D1449280
D14458F0  D5A84110  D13C05EF  7848B008  7840D5D0  30447828  B00C7B20
D5D43022  7020D41C  4820D46A  4020D466  E5C5D9C9  F0F0F6F6*
02E3E7E3  40000CAC  40400038  40400001  79406004  47C0DC04  50A0D3C8
47F0DC24  79206004  47C0DC14  50A0D3C8  47F0DC24  4820D468  4920D46C
4780DB2C  50A0D3C8  58A0D57C  5880D348  E5C5D9C9  F0F0F6F7*
02E3E7E3  40000CE4  40400038  40400001  47F0D64E  58A0D57C  58B0D590
5880D348  58709038  5A70D31C  50709038  18585C40  D3D01825  1A285800
D31C58F0  D5A05002  F0005C60  D36C5830  E5C5D9C9  F0F0F6F8*
02E3E7E3  40000D1C  40400038  40400001  D3CC5C20  D36C4107  90045000
D14C4103  90045000  D1509280  D15058F0  D5A84110  D14805EF  58709038
5C60D36C  18385C20  D3C84107  902C5000  E5C5D9C9  F0F0F6F9*
02E3E7E3  40000D54  40400038  40400001  D1584103  B0085000  D15C9280
D15C58F0  D5A84110  D15405EF  4820D466  18025700  D3145000  D3046820
```

```
D3006B20  D3105830  90385C20  D36C7023  E5C5D9C9  F0F0F7F0**
02E3E7E3  40000D8C  40400038  40400001  90285800  D3D05700  D3145000
D3046820  D3006B20  D3107023  90345A50  D3285840  D3CC58F0  D5A05B45
F0005A40  D31C1804  5700D314  5000D304  E5C5D9C9  F0F0F7F1*
02E3E7E3  40000DC4  40400038  40400001  6820D300  6B20D310  70239038
5830D3C8  5A30D31C  5030D3C8  5930B00C  47C0DD30  47F0DD90  1C284103
B0045000  D1449280  D14458F0  D5A84110  E5C5D9C9  F0F0F7F2*
02E3E7E3  40000DFC  40400038  40400001  D13C05EF  7843B008  7B40D4A0
30447823  B00C7B20  D4A43022  7020D41C  4820D46A  4020D466  58F0D594
7940F004  4730DD8C  58F0D594  7920F004  E5C5D9C9  F0F0F7F3*
02E3E7E3  40000E34  40400038  40400001  4730DD8C  4820D468  4920D46C
4780DC30  47F0D64E  58A0D598  58B0D590  5820D430  5A20D320  7800D3A4
33007000  D3F07800  D3A47000  D3F47800  E5C5D9C9  F0F0F7F4*
02E3E7E3  40000E6C  40400038  40400001  D38C3300  7000D3F8  7800D38C
7000D3FC  7800D3A0  7000D424  7800D5F0  7000D428  7800D3B0  7000D400
58F0D5AC  4110D16C  05EF5890  D31C58A0  E5C5D9C9  F0F0F7F5*
02E3E7E3  40000EA4  40400038  40400001  D31C18B2  7800D428  7B00D388
7000D428  58F0D5AC  4110D17C  05EF879A  DDF058A0  D59858B0  D59058F0
D5AC4110  D18C05EF  58F0D5AC  4110D19C  E5C5D9C9  F0F0F7F6*
02E3E7E3  40000EDC  40400038  40400001  05EF58F0  D5AC4110  D1AC05EF
58F0D5AC  4110D1BC  05EF58F0  D5B84110  D1CC05EF  58F0D5B4  4110D1D0
05EF7800  D3B83300  7000D4A0  7800D3B4  E5C5D9C9  F0F0F7F7*
02E3E7E3  40000F14  40400038  40400001  7000D4A4  4100D4A0  5000D1D4

MEMBER NAME  VERIFY
4100D4A4  5000D1D8  58F0D5B0  4110D1D4  05EF41E0  000415FE  4720DE8A
58EFD070  07FE7800  D3983300  7000D4A0  E5C5D9C9  F0F0F7F8*
02E3E7E3  40000F4C  40400038  40400001  7800D3AC  7000D4A4  4100D4A0
5000D21C  4100D4A4  5000D220  58F0D5B0  4110D21C  05EF41E0  000415FE
4720DEC6  58EFD078  07FE7800  D39C3300  E5C5D9C9  F0F0F7F9*
02E3E7E3  40000F84  40400038  40400001  7000D4A0  7800D394  7000D4A4
4100D4A0  5000D264  4100D4A4  5000D268  58F0D5B0  4110D264  05EF41E0
000415FE  4720DF02  58EFD080  07FE58A0  E5C5D9C9  F0F0F8F0**
02E3E7E3  40000FBC  40400038  40400001  D59858B0  D5907800  D3BC3300
7000D5F4  58F0D5B0  4110D2AC  05EF41E0  000415FE  4720DF2E  58EFD088
07FE1BFF  58E0D000  07FE58A0  D00458E0  E5C5D9C9  F0F0F8F1*
02E3E7E3  40000FF4  40400038  40400001  A00C58B0  A0185810  B0085820
D4305020  100018DA  92FFA00C  982CA01C  07FE9878  10045820  70005020
D4405820  80005020  D4305820  10004130  E5C5D9C9  F0F0F8F2*
02E3E7E3  4000102C  4040001A  40400001  20004150  00041B25  5C40D324
1B255020  D5A05030  D5A447F0  D5FC4040  40404040  40404040  40404040
40404040  40404040  40404040  40404040  E5C5D9C9  F0F0F8F3*
02E3E7E3  40000020  40400008  40400001  00001012  000000B8  40404040
40404040  40404040  40404040  40404040  40404040  40404040  40404040
40404040  40404040  40404040  40404040  E5C5D9C9  F0F0F8F4*
02E3E7E3  400000B8  40400004  40400001  00000FEE  40404040  40404040
40404040  40404040  40404040  40404040  40404040  40404040  40404040
40404040  40404040  40404040  40404040  E5C5D9C9  F0F0F8F5*
02E3E7E3  40000104  40400008  40400001  00000810  00000CE8  40404040
40404040  40404040  40404040  40404040  40404040  40404040  40404040
40404040  40404040  40404040  40404040  E5C5D9C9  F0F0F8F6*
02D9D3C4  40404040  40400038  40404040  00010001  0C000960  00010001
0C000994  00010001  0C00099C  00010001  0C000020  00010001  0C000024
00010001  0C0000B8  00010001  0C000104  E5C5D9C9  F0F0F8F7*
02E3E7E3  4000010C  4040001C  40400001  00000810  00000842  00000CE8
000008CA  00000A4E  000009DE  00000FBA  40404040  40404040  40404040
40404040  40404040  40404040  40404040  E5C5D9C9  F0F0F8F8*
02D9D3C4  40404040  40400038  40404040  00010001  0C000108  00010001
0C00010C  00010001  0C000110  00010001  0C000114  00010001  0C000118
```

```
00010001  0C00011C  00010001  0C000120  E5C5D9C9  F0F0F8F9*
02E3E7E3  40000128  4040001C  40400001  00000F42  00000FBA  00000F7E
00000FBA  00000FBA  00000FBA  00000FE6  40404040  40404040  40404040
40404040  40404040  40404040  40404040  E5C5D9C9  F0F0F9F0**
02D9D3C4  40404040  40400038  40404040  00010001  0C000124  00010001
0C000128  00010001  0C00012C  00010001  0C000130  00010001  0C000134
00010001  0C000138  00010001  0C00013C  E5C5D9C9  F0F0F9F1*
02E3E7E3  40000144  4040001C  40400001  00000FE6  00000528  000003DC
001082A8  00000400  801082A4  000003E0  40404040  40404040  40404040
40404040  40404040  40404040  40404040  E5C5D9C9  F0F0F9F2*
02D9D3C4  40404040  40400038  40404040  00010001  0C000140  00010001
0C000144  00010001  0C000148  00010001  0C00014C  00050001  0C000150
00010001  0C000154  00050001  0C000158  E5C5D9C9  F0F0F9F3*
02E3E7E3  40000164  40400020  40400001  80000014  000003E0  0000051E
80000000  00000558  0000048C  00000494  00000490  40404040  40404040
40404040  40404040  40404040  40404040  E5C5D9C9  F0F0F9F4*
02D9D3C4  40404040  40400038  40404040  00010001  0C00015C  00070001
0C000164  00010001  0C000168  00010001  0C00016C  00010001  0C000174
00010001  0C000178  00010001  0C00017C  E5C5D9C9  F0F0F9F5*
02E3E7E3  40000184  40400010  40400001  80000498  00000558  80000000
00000558  40404040  40404040  40404040  40404040  40404040  40404040
40404040  40404040  40404040  40404040  E5C5D9C9  F0F0F9F6*
02E3E7E3  4000019C  40400004  40400001  000004CC  40404040  40404040
40404040  40404040  40404040  40404040  40404040  40404040  40404040

MEMBER NAME  VERIFY
40404040  40404040  40404040  40404040  E5C5D9C9  F0F0F9F7*
02E3E7E3  400001A4  40400008  40400001  000004BC  800004D8  40404040
40404040  40404040  40404040  40404040  40404040  40404040  40404040
40404040  40404040  40404040  40404040  E5C5D9C9  F0F0F9F8*
02E3E7E3  400001B4  40400004  40400001  000003D0  40404040  40404040
40404040  40404040  40404040  40404040  40404040  40404040  40404040
40404040  40404040  40404040  40404040  E5C5D9C9  F0F0F9F9*
02D9D3C4  40404040  40400038  40404040  00010001  0C000180  00010001
0C000184  00010001  0C000188  00010001  0C000190  00010001  0C00019C
00010001  0C0001A4  00010001  0C0001A8  E5C5D9C9  F0F1F0F0**
02E3E7E3  400001B8  4040001C  40400001  0000041C  00000438  00000434
00000500  000003D0  000003D0  000003D0  40404040  40404040  40404040
40404040  40404040  40404040  40404040  E5C5D9C9  F0F1F0F1*
02D9D3C4  40404040  40400038  40404040  00010001  0C0001B4  00010001
0C0001B8  00010001  0C0001BC  00010001  0C0001C0  00010001  0C0001C4
00010001  0C0001C8  00010001  0C0001CC  E5C5D9C9  F0F1F0F2*
02E3E7E3  400001D4  4040001C  40400001  000003D0  000003D4  000003DC
000003D0  000003D0  00000438  0000043C  40404040  40404040  40404040
40404040  40404040  40404040  40404040  E5C5D9C9  F0F1F0F3*
02D9D3C4  40404040  40400038  40404040  00010001  0C0001D0  00010001
0C0001D4  00010001  0C0001D8  00010001  0C0001DC  00010001  0C0001E0
00010001  0C0001E4  00010001  0C0001E8  E5C5D9C9  F0F1F0F4*
02E3E7E3  400001F0  40400014  40400001  800003D0  000003E0  00000522
80000000  00000424  40404040  40404040  40404040  40404040  40404040
40404040  40404040  40404040  40404040  E5C5D9C9  F0F1F0F5*
02E3E7E3  40000208  40400008  40400001  80000000  000003F0  40404040
40404040  40404040  40404040  40404040  40404040  40404040  40404040
40404040  40404040  40404040  40404040  E5C5D9C9  F0F1F0F6*
02E3E7E3  40000214  40400008  40400001  80000000  00000420  40404040
40404040  40404040  40404040  40404040  40404040  40404040  40404040
40404040  40404040  40404040  40404040  E5C5D9C9  F0F1F0F7*
02E3E7E3  40000220  40400008  40400001  80000000  000004A8  40404040
40404040  40404040  40404040  40404040  40404040  40404040  40404040
```

```
40404040  40404040  40404040  40404040  E5C5D9C9  F0F1F0F8*
02D9D3C4  40404040  40400038  40404040  00010001  0C0001EC  00010001
0C0001F0  00010001  0C0001F4  00010001  0C0001F8  00010001  0C000200
00010001  0C00020C  00010001  0C000218  E5C5D9C9  F0F1F0F9*
02E3E7E3  40000228  4040001C  40400001  000004B8  000004AC  800004B8
000004A8  000004E0  000004AC  800004E0  40404040  40404040  40404040
40404040  40404040  40404040  40404040  E5C5D9C9  F0F1F1F0**
02D9D3C4  40404040  40400038  40404040  00010001  0C000224  00010001
0C000228  00010001  0C00022C  00010001  0C000230  00010001  0C000234
00010001  0C000238  00010001  0C00023C  E5C5D9C9  F0F1F1F1*
02E3E7E3  40000244  4040001C  40400001  000004A8  000004B8  000004A8
800004E0  000004AC  000004B8  000004AC  40404040  40404040  40404040
40404040  40404040  40404040  40404040  E5C5D9C9  F0F1F1F2*
02D9D3C4  40404040  40400038  40404040  00010001  0C000240  00010001
0C000244  00010001  0C000248  00010001  0C00024C  00010001  0C000250
00010001  0C000254  00010001  0C000258  E5C5D9C9  F0F1F1F3*
02E3E7E3  40000260  4040001C  40400001  800004E0  000004B0  000004DC
000004B0  800004E0  000004B4  000004DC  40404040  40404040  40404040
40404040  40404040  40404040  40404040  E5C5D9C9  F0F1F1F4*
02D9D3C4  40404040  40400038  40404040  00010001  0C00025C  00010001
0C000260  00010001  0C000264  00010001  0C000268  00010001  0C00026C
00010001  0C000270  00010001  0C000274  E5C5D9C9  F0F1F1F5*
02E3E7E3  4000027C  40400010  40400001  000004B4  800004E0  80000620
8000060C  40404040  40404040  40404040  40404040  40404040  40404040
40404040  40404040  40404040  40404040  E5C5D9C9  F0F1F1F6*

MEMBER NAME  VERIFY
02E3E7E3  40000294  4040000C  40400001  000003D0  00000430  00000438
40404040  40404040  40404040  40404040  40404040  40404040  40404040
40404040  40404040  40404040  40404040  E5C5D9C9  F0F1F1F7*
02D9D3C4  40404040  40400038  40404040  00010001  0C000278  00010001
0C00027C  00010001  0C000280  00010001  0C000284  00010001  0C000288
00010001  0C000294  00010001  0C000298  E5C5D9C9  F0F1F1F8*
02E3E7E3  400002A0  4040001C  40400001  00000434  000005B0  000003D0
000003D0  000003D0  000003D0  000003D4  40404040  40404040  40404040
40404040  40404040  40404040  40404040  E5C5D9C9  F0F1F1F9*
02D9D3C4  40404040  40400038  40404040  00010001  0C00029C  00010001
0C0002A0  00010001  0C0002A4  00010001  0C0002A8  00010001  0C0002AC
00010001  0C0002B0  00010001  0C0002B4  E5C5D9C9  F0F1F2F0**
02E3E7E3  400002BC  40400018  40400001  000003DC  000003D0  000003D0
00000438  0000043C  800003D0  40404040  40404040  40404040  40404040
40404040  40404040  40404040  40404040  E5C5D9C9  F0F1F2F1*
02E3E7E3  400002DC  40400004  40400001  000003D0  40404040  40404040
40404040  40404040  40404040  40404040  40404040  40404040  40404040
40404040  40404040  40404040  40404040  E5C5D9C9  F0F1F2F2*
02D9D3C4  40404040  40400038  40404040  00010001  0C0002B8  00010001
0C0002BC  00010001  0C0002C0  00010001  0C0002C4  00010001  0C0002C8
00010001  0C0002CC  00010001  0C0002D0  E5C5D9C9  F0F1F2F3*
02E3E7E3  400002E0  4040001C  40400001  00000428  00000438  00000434
00000568  000003D0  000003D0  000003D0  40404040  40404040  40404040
40404040  40404040  40404040  40404040  E5C5D9C9  F0F1F2F4*
02D9D3C4  40404040  40400038  40404040  00010001  0C0002DC  00010001
0C0002E0  00010001  0C0002E4  00010001  0C0002E8  00010001  0C0002EC
00010001  0C0002F0  00010001  0C0002F4  E5C5D9C9  F0F1F2F5*
02E3E7E3  400002FC  4040001C  40400001  000003D0  000003D4  000003DC
000003D0  000003D0  00000438  0000043C  40404040  40404040  40404040
40404040  40404040  40404040  40404040  E5C5D9C9  F0F1F2F6*
02D9D3C4  40404040  40400038  40404040  00010001  0C0002F8  00010001
0C0002FC  00010001  0C000300  00010001  0C000304  00010001  0C000308
```

```
00010001  0C00030C  00010001  0C000310  E5C5D9C9  F0F1F2F7*
02E3E7E3  40000318  40400004  40400001  800003D0  40404040  40404040
40404040  40404040  40404040  40404040  40404040  40404040  40404040
40404040  40404040  40404040  40404040  E5C5D9C9  F0F1F2F8*
02E3E7E3  40000324  40400018  40400001  000003D0  00000418  00000438
00000434  00000098  000003D0  40404040  40404040  40404040  40404040
40404040  40404040  40404040  40404040  E5C5D9C9  F0F1F2F9*
02D9D3C4  40404040  40400038  40404040  00010001  0C000314  00010001
0C000318  00010001  0C000324  00010001  0C000328  00010001  0C00032C
00010001  0C000330  00010001  0C000334  E5C5D9C9  F0F1F3F0**
02E3E7E3  4000033C  4040001C  40400001  000003D0  000003D0  000003D0
000003D4  000003DC  000003D0  000003D0  40404040  40404040  40404040
40404040  40404040  40404040  40404040  E5C5D9C9  F0F1F3F1*
02D9D3C4  40404040  40400038  40404040  00010001  0C000338  00010001
0C00033C  00010001  0C000340  00010001  0C000344  00010001  0C000348
00010001  0C00034C  00010001  0C000350  E5C5D9C9  F0F1F3F2*
02E3E7E3  40000358  4040001C  40400001  00000438  0000043C  800003D0
000006AC  00000460  000003D0  0000040C  40404040  40404040  40404040
40404040  40404040  40404040  40404040  E5C5D9C9  F0F1F3F3*
02D9D3C4  40404040  40400038  40404040  00010001  0C000354  00010001
0C000358  00010001  0C00035C  00010001  0C000360  00010001  0C000364
00010001  0C000368  00010001  0C00036C  E5C5D9C9  F0F1F3F4*
02E3E7E3  40000374  4040001C  40400001  00000438  00000434  00000080
000003D0  000003D0  000003D0  000003D0  40404040  40404040  40404040
40404040  40404040  40404040  40404040  E5C5D9C9  F0F1F3F5*
02D9D3C4  40404040  40400038  40404040  00010001  0C000370  00010001

MEMBER NAME  VERIFY
0C000374  00010001  0C000378  00010001  0C00037C  00010001  0C000380
00010001  0C000384  00010001  0C000388  E5C5D9C9  F0F1F3F6*
02E3E7E3  40000390  4040001C  40400001  000003D4  000003DC  000003D0
000003D0  00000438  0000043C  800003D0  40404040  40404040  40404040
40404040  40404040  40404040  40404040  E5C5D9C9  F0F1F3F7*
02D9D3C4  40404040  40400038  40404040  00010001  0C00038C  00010001
0C000390  00010001  0C000394  00010001  0C000398  00010001  0C00039C
00010001  0C0003A0  00010001  0C0003A4  E5C5D9C9  F0F1F3F8*
02E3E7E3  40000684  40400030  40400001  00000000  00000000  00000000
00000000  00000000  00000000  00000000  00000000  00000010  4130CCCD
00000000  00000000  40404040  40404040  E5C5D9C9  F0F1F3F9*
02D9D3C4  40404040  40400008  40404040  00010001  0C0003A8  40404040
40404040  40404040  40404040  40404040  40404040  40404040  40404040
40404040  40404040  40404040  40404040  E5C5D9C9  F0F1F4F0**
02C5D5C4  40404040  40404040  40404040  40404040  40404040  40404040
00001046  F1F5F7F3  F460C6D6  F34040F0  F2F0F2F8  F7F0F9F8  40F0F84B
F5F04BF3  F3404040  E5C5D9C9  C6E84040  E5C5D9C9  F0F1F4F1**

MEMBER NAME  VLAYUP
02C5E2C4  40404040  40400010  40400001  E5D3C1E8  E4D74040  00000000
40000000  40404040  40404040  40404040  40404040  40404040  40404040
40404040  40404040  40404040  40404040  E5D3C1E8  F0F0F0F1*
02E3E7E3  40000000  40400038  40400001  47F0F00C  07E5D3C1  E8E4D740
90ECD00C  184D98CD  F0205040  D00450D0  400807FC  40404040  40404040
020A0803  18010A08  0318011A  05C4C1E2  E5D3C1E8  F0F0F0F2*
02E3E7E3  40000038  40400038  40400001  C8401003  1A0740D3  C1E8E4D7
4010041A  1040C1D3  D9C5C1C4  E840C4C5  C6C9D5C5  C4183222  02064814
0122020A  08031801  0A080318  011A05C4  E5D3C1E8  F0F0F0F3*
02E3E7E3  40000070  40400038  40400001  C1E2C840  10031A07  40D3C1E8
E4D74010  041A1340  E4D5D4C1  E3C3C8C5  C440D4C1  E3C5D9C9  C1D31832
22020A08  0318010A  08031801  1A05C4C1  E5D3C1E8  F0F0F0F4*
```

| | | | | | | |
|---|---|---|---|---|---|---|
| 02E3E7E3 | 400000A8 | 40400038 | 40400001 | E2C84010 | 031A0740 | D3C1E8E4 |
| D7401004 | 1A1740E4 | D5D4C1E3 | C3C8C5C4 | 40D6D9C9 | C5D5E3C1 | E3C9D6D5 |
| E2183222 | 020A0803 | 18010A08 | 0318011A | E5D3C1E8 | F0F0F0F5* | |
| 02E3E7E3 | 400000E0 | 40400037 | 40400001 | 05C4C1E2 | C8401003 | 1A0740D3 |
| C1E8E4D7 | 4010041A | 1F40C1D3 | D9C5C1C4 | E840C4C5 | C6C9D5C5 | C46B40E2 |
| C1D4C540 | E2C5D8E4 | C5D5C3C5 | 18322240 | E5D3C1E8 | F0F0F0F6* | |
| 02E3E7E3 | 40000198 | 40400038 | 40400001 | 00000000 | 00000000 | 4F080000 |
| 00000000 | 00000000 | 00000001 | 00000002 | 00000003 | 00000004 | 00000006 |
| 00000008 | 00000009 | 00000010 | 00000016 | E5D3C1E8 | F0F0F0F7* | |
| 02C5E2C4 | 40404040 | 40400010 | 40400002 | D7C3C5D9 | D9404040 | 05000000 |
| 40003844 | 40404040 | 40404040 | 40404040 | 40404040 | 40404040 | 40404040 |
| 40404040 | 40404040 | 40404040 | 40404040 | E5D3C1E8 | F0F0F0F8* | |
| 02E3E7E3 | 400001D0 | 40400010 | 40400001 | 00000048 | 00000058 | 00000000 |
| 00000000 | 40404040 | 40404040 | 40404040 | 40404040 | 40404040 | 40404040 |
| 40404040 | 40404040 | 40404040 | 40404040 | E5D3C1E8 | F0F0F0F9* | |
| 02C5E2C4 | 40404040 | 40400010 | 40400003 | C2E2D6D9 | E3404040 | 02000000 |
| 40000000 | 40404040 | 40404040 | 40404040 | 40404040 | 40404040 | 40404040 |
| 40404040 | 40404040 | 40404040 | 40404040 | E5D3C1E8 | F0F0F1F0** | |
| 02E3E7E3 | 40000228 | 4040000C | 40400001 | FFFFFFBB | 00000000 | 00000000 |
| 40404040 | 40404040 | 40404040 | 40404040 | 40404040 | 40404040 | 40404040 |
| 40404040 | 40404040 | 40404040 | 40404040 | E5D3C1E8 | F0F0F1F1* | |
| 02C5E2C4 | 40404040 | 40400010 | 40400004 | C9C2C3D6 | D47B4040 | 02000000 |
| 40000000 | 40404040 | 40404040 | 40404040 | 40404040 | 40404040 | 40404040 |
| 40404040 | 40404040 | 40404040 | 40404040 | E5D3C1E8 | F0F0F1F2* | |
| 02E3E7E3 | 40000238 | 40400004 | 40400001 | 00000000 | 40404040 | 40404040 |
| 40404040 | 40404040 | 40404040 | 40404040 | 40404040 | 40404040 | 40404040 |
| 40404040 | 40404040 | 40404040 | 40404040 | E5D3C1E8 | F0F0F1F3* | |
| 02C5E2C4 | 40404040 | 40400010 | 40400005 | C9E2D9C3 | C8E54040 | 02000000 |
| 40000000 | 40404040 | 40404040 | 40404040 | 40404040 | 40404040 | 40404040 |
| 40404040 | 40404040 | 40404040 | 40404040 | E5D3C1E8 | F0F0F1F4* | |
| 02E3E7E3 | 40000240 | 40400008 | 40400001 | 00000000 | 00000000 | 40404040 |
| 40404040 | 40404040 | 40404040 | 40404040 | 40404040 | 40404040 | 40404040 |
| 40404040 | 40404040 | 40404040 | 40404040 | E5D3C1E8 | F0F0F1F5* | |
| 02E3E7E3 | 400001F4 | 40400004 | 40400001 | 000000C8 | 40404040 | 40404040 |
| 40404040 | 40404040 | 40404040 | 40404040 | 40404040 | 40404040 | 40404040 |
| 40404040 | 40404040 | 40404040 | 40404040 | E5D3C1E8 | F0F0F1F6* | |
| 02E3E7E3 | 40000208 | 40400020 | 40400001 | 00000005 | 00000004 | C6D34040 |
| C1404040 | 0000000D | 00000004 | C6D34040 | C1404040 | 40404040 | 40404040 |
| 40404040 | 40404040 | 40404040 | 40404040 | E5D3C1E8 | F0F0F1F7* | |
| 02E3E7E3 | 4000029C | 40400038 | 40400001 | 58B0D120 | 58A0D174 | 5890D178 |
| 58F0D114 | 4110D054 | 05EF5800 | D0945000 | D0C85800 | D0A85000 | D1385800 |
| D0BC5000 | D14C5800 | D0B05000 | D14050A0 | E5D3C1E8 | F0F0F1F8* | |
| 02E3E7E3 | 400002D4 | 40400038 | 40400001 | D1505090 | D15450A0 | D1685090 |
| D16C5880 | D0B85890 | D0DC58A0 | D1105850 | D0C85A50 | D0945050 | D0CC5950 |
| D0E84730 | D80E5870 | D0C85C60 | D0BC5070 | E5D3C1E8 | F0F0F1F9* | |
| 02E3E7E3 | 4000030C | 40400038 | 40400001 | D1305C40 | D0BC5050 | D1341835 |

MEMBER NAME VLAYUP

| | | | | | | |
|---|---|---|---|---|---|---|
| 5A30D0A8 | 5030D158 | 7843B000 | 7040D13C | 18375A30 | D0A87943 | B0004770 |
| D80E1837 | 5A30D0B0 | 5030D148 | 18155A10 | E5D3C1E8 | F0F0F2F0** | |
| 02E3E7E3 | 40000344 | 40400038 | 40400001 | D0B05010 | D15C7821 | B0007020 |
| D1447923 | B0004770 | D80E1837 | 5A30D170 | 7863B000 | 18355A30 | D1707963 |
| B0004780 | D6D65990 | D0E44730 | D26647F0 | E5D3C1E8 | F0F0F2F1* | |
| 02E3E7E3 | 4000037C | 40400038 | 40400001 | D81E5800 | D0E45A00 | D0945000 |
| D0E42B00 | 38046A00 | D0886000 | D0805830 | D0841033 | 5030D0D8 | 2B003802 |
| 6A00D088 | 6000D080 | 5800D084 | 5000D0E0 | E5D3C1E8 | F0F0F2F2* | |
| 02E3E7E3 | 400003B4 | 40400038 | 40400001 | 58F0D128 | 45E0F004 | 00000000 |
| 00000028 | 18355A30 | D1745030 | D16045E0 | F0080473 | B0001835 | 5A30D178 |
| 5030D164 | 45E0F008 | 0473B000 | 45E0F008 | E5D3C1E8 | F0F0F2F3* | |

| | | | | | | |
|---|---|---|---|---|---|---|
| 02E3E7E3 | 400003EC | 40400038 | 40400001 | 0450D0D8 | 45E0F008 | 0450D0E0 |
| 45E0F010 | 58F0D128 | 45E0F000 | 00000000 | 0000005C | 5890D094 | 58A0D094 |
| 18B85880 | D118185B | 5C40D0E4 | 18391A35 | E5D3C1E8 | F0F0F2F4* | |
| 02E3E7E3 | 40000424 | 40400038 | 40400001 | 45E0F008 | 01238000 | 879AD302 |
| 58A0D110 | 58B0D120 | 5890D0DC | 5880D0B8 | 45E0F010 | 5800D0C8 | 5900D094 |
| 4780D35A | 58E0D148 | 782EB000 | 5850D0C8 | E5D3C1E8 | F0F0F2F5* | |
| 02E3E7E3 | 4000045C | 40400038 | 40400001 | 5B50D094 | 5C40D14C | 18355A30 |
| D1407923 | B0004780 | D4005990 | D0E44730 | D36647F0 | D81E5800 | D0E45A00 |
| D0945000 | D0E458F0 | D1281800 | 45E0F004 | E5D3C1E8 | F0F0F2F6* | |
| 02E3E7E3 | 40000494 | 40400038 | 40400001 | 00000000 | 00000028 | 5830D130 |
| 5A30D150 | 45E0F008 | 0473B000 | 5830D130 | 5A30D154 | 45E0F008 | 0473B000 |
| 45E0F008 | 0450D0D8 | 45E0F008 | 0450D0E0 | E5D3C1E8 | F0F0F2F7* | |
| 02E3E7E3 | 400004CC | 40400014 | 40400001 | 45E0F010 | 58F0D128 | 45E0F000 |
| 00000000 | 0000005C | 40404040 | 40404040 | 40404040 | 40404040 | 40404040 |
| 40404040 | 40404040 | 40404040 | 40404040 | E5D3C1E8 | F0F0F2F8* | |
| 02D9D3C4 | 40404040 | 40400038 | 40404040 | 00020001 | 0C000228 | 00030001 |
| 1C00022C | 00040001 | 1C000240 | 00050001 | 1C000244 | 00010001 | 0C0003C0 |
| 00010001 | 0C000408 | 00010001 | 0C000498 | E5D3C1E8 | F0F0F2F9* | |
| 02E3E7E3 | 400004E0 | 40400038 | 40400001 | 5890D094 | 58A0D094 | 18B85880 |
| D118185B | 5C40D0E4 | 18391A35 | 45E0F008 | 01238000 | 879AD3D6 | 58A0D110 |
| 58B0D120 | 5890D0DC | 5880D0B8 | 45E0F010 | E5D3C1E8 | F0F0F3F0** | |
| 02E3E7E3 | 40000518 | 40400038 | 40400001 | 5830D134 | 5A30D17C | 7823B000 |
| 5830D130 | 5A30D17C | 7923B000 | 4780D556 | 5990A045 | 4730D428 | 47F0D81E |
| 5850A045 | 5A50D094 | 5050A045 | 58E0D158 | E5D3C1E8 | F0F0F3F1* | |
| 02E3E7E3 | 40000550 | 40400038 | 40400001 | 2B00780E | B0006A00 | D0886000 |
| D0805830 | D0841033 | 5030D0D8 | 58E0D15C | 2B00780E | B0006A00 | D0886000 |
| D0805800 | D0845000 | D0E058F0 | D1281800 | E5D3C1E8 | F0F0F3F2* | |
| 02E3E7E3 | 40000588 | 40400038 | 40400001 | 45E0F004 | 00000000 | 00000062 |
| 5810D160 | 45E0F008 | 0471B000 | 5810D164 | 45E0F008 | 0471B000 | 45E0F008 |
| 0450D0D8 | 45E0F008 | 0450D0E0 | 45E0F010 | E5D3C1E8 | F0F0F3F3* | |
| 02E3E7E3 | 400005C0 | 40400038 | 40400001 | 58F0D128 | 45E0F000 | 00000000 |
| 0000005C | 18751C68 | 45E0F134 | 00010000 | 0127A001 | 01000048 | 00000001 |
| 45E0F010 | 19594750 | D4DE47F0 | D81E5A50 | E5D3C1E8 | F0F0F3F4* | |
| 02E3E7E3 | 400005F8 | 40400038 | 40400001 | D0945050 | A04558F0 | D1281800 |
| 45E0F004 | 00000000 | 00000062 | 5830D130 | 5A30D150 | 45E0F008 | 0473B000 |
| 5830D130 | 5A30D154 | 45E0F008 | 0473B000 | E5D3C1E8 | F0F0F3F5* | |
| 02E3E7E3 | 40000630 | 40400038 | 40400001 | 45E0F008 | 0450D0D8 | 45E0F008 |
| 0450D0E0 | 45E0F010 | 58F0D128 | 45E0F000 | 00000000 | 0000005C | 1C4845E0 |
| F1340001 | 00000125 | A0010100 | 00480000 | E5D3C1E8 | F0F0F3F6* | |
| 02E3E7E3 | 40000668 | 40400038 | 40400001 | 000145E0 | F0105840 | D1305A40 |
| D1805830 | D1345A30 | D1804104 | B0005000 | D0684103 | B0005000 | D07058F0 |
| D12C4110 | D06805EF | 41E00004 | 15FE4720 | E5D3C1E8 | F0F0F3F7* | |
| 02E3E7E3 | 400006A0 | 40400038 | 40400001 | D59058EF | D04C07FE | 5800D0D4 |
| 12004770 | D80E5990 | A0454730 | D5A647F0 | D81E5850 | A0455A50 | D0945050 |
| A04558E0 | D1582B00 | 780EB000 | 6A00D088 | E5D3C1E8 | F0F0F3F8* | |
| 02E3E7E3 | 400006D8 | 40400038 | 40400001 | 6000D080 | 5830D084 | 10335030 |
| D0D858E0 | D15C2B00 | 780EB000 | 6A00D088 | 6000D080 | 5800D084 | 5000D0E0 |

MEMBER NAME VLAYUP

| | | | | | | |
|---|---|---|---|---|---|---|
| 58F0D128 | 45E0F004 | 00000000 | 00000099 | E5D3C1E8 | F0F0F3F9* | |
| 02E3E7E3 | 40000710 | 40400038 | 40400001 | 5810D160 | 45E0F008 | 0471B000 |
| 5810D164 | 45E0F008 | 0471B000 | 45E0F008 | 0450D0D8 | 45E0F008 | 0450D0E0 |
| 45E0F010 | 58F0D128 | 45E0F000 | 00000000 | E5D3C1E8 | F0F0F4F0** | |
| 02E3E7E3 | 40000748 | 40400038 | 40400001 | 0000005C | 18751C68 | 45E0F134 |
| 00010000 | 0127A001 | 01000048 | 00000001 | 45E0F010 | 19594750 | D65A47F0 |
| D81E5A50 | D0945050 | A04558F0 | D1281800 | E5D3C1E8 | F0F0F4F1* | |
| 02E3E7E3 | 40000780 | 4040000C | 40400001 | 45E0F004 | 00000000 | 00000099 |
| 40404040 | 40404040 | 40404040 | 40404040 | 40404040 | 40404040 | 40404040 |
| 40404040 | 40404040 | 40404040 | 40404040 | E5D3C1E8 | F0F0F4F2* | |

| | | | | | | |
|---|---|---|---|---|---|---|
| 02D9D3C4 | 40404040 | 40400038 | 40404040 | 00010001 | 0C0004DC | 00010001 |
| 0C000590 | 00010001 | 0C0005CC | 00010001 | 0C00060C | 00010001 | 0C000650 |
| 00010001 | 0C00070C | 00010001 | 0C000748 | E5D3C1E8 | F0F0F4F3* | |
| 02E3E7E3 | 4000078C | 40400038 | 40400001 | 5830D130 | 5A30D150 | 45E0F008 |
| 0473B000 | 5830D130 | 5A30D154 | 45E0F008 | 0473B000 | 45E0F008 | 0450D0D8 |
| 45E0F008 | 0450D0E0 | 45E0F010 | 58F0D128 | E5D3C1E8 | F0F0F4F4* | |
| 02E3E7E3 | 400007C4 | 40400038 | 40400001 | 45E0F000 | 00000000 | 0000005C |
| 1C4845E0 | F1340001 | 00000125 | A0010100 | 00480000 | 000145E0 | F01047F0 |
| D80E5990 | A0454730 | D6E247F0 | D81E5850 | E5D3C1E8 | F0F0F4F5* | |
| 02E3E7E3 | 400007FC | 40400038 | 40400001 | A0455A50 | D0945050 | A0452B00 |
| 7800D13C | 6A00D088 | 6000D080 | 5830D084 | 10335030 | D0D82B00 | 7800D144 |
| 6A00D088 | 6000D080 | 5800D084 | 5000D0E0 | E5D3C1E8 | F0F0F4F6* | |
| 02E3E7E3 | 40000834 | 40400038 | 40400001 | 58F0D128 | 45E0F004 | 00000000 |
| 000000D4 | 5830D134 | 5A30D174 | 45E0F008 | 0473B000 | 5830D134 | 5A30D178 |
| 45E0F008 | 0473B000 | 45E0F008 | 0450D0D8 | E5D3C1E8 | F0F0F4F7* | |
| 02E3E7E3 | 4000086C | 40400038 | 40400001 | 45E0F008 | 0450D0E0 | 45E0F010 |
| 58F0D128 | 45E0F000 | 00000000 | 0000005C | 18751C68 | 45E0F134 | 00010000 |
| 0127A001 | 01000048 | 00000001 | 45E0F010 | E5D3C1E8 | F0F0F4F8* | |
| 02E3E7E3 | 400008A4 | 40400038 | 40400001 | 19594750 | D79647F0 | D81E5A50 |
| D0945050 | A04558F0 | D1281800 | 45E0F004 | 00000000 | 000000D4 | 5830D130 |
| 5A30D168 | 45E0F008 | 0473B000 | 5830D130 | E5D3C1E8 | F0F0F4F9* | |
| 02E3E7E3 | 400008DC | 40400038 | 40400001 | 5A30D16C | 45E0F008 | 0473B000 |
| 45E0F008 | 0450D0D8 | 45E0F008 | 0450D0E0 | 45E0F010 | 58F0D128 | 45E0F000 |
| 00000000 | 0000005C | 1C4845E0 | F1340001 | E5D3C1E8 | F0F0F5F0** | |
| 02E3E7E3 | 40000914 | 40400038 | 40400001 | 00000125 | A0010100 | 00480000 |
| 000145E0 | F0105800 | D0CC5000 | D0C85900 | D0E847C0 | D1D658B0 | D12058A0 |
| D1745890 | D1781BFF | 58E0D000 | 07FE58A0 | E5D3C1E8 | F0F0F5F1* | |
| 02E3E7E3 | 4000094C | 40400038 | 40400001 | D00458E0 | A00C58B0 | A0185810 |
| B0045820 | D0E85020 | 10005830 | B00C5840 | D0E45040 | 300018DA | 92FFA00C |
| 982CA01C | 07FE9879 | 10045820 | 70005020 | E5D3C1E8 | F0F0F5F2* | |
| 02E3E7E3 | 40000984 | 40400038 | 40400001 | D0E85820 | 90005020 | D0E45820 |
| 10004130 | 20004150 | 00041B25 | 5C40D0B4 | 1B255020 | D1205030 | D1245030 |
| D05C5820 | 10084130 | 20004150 | 00011B25 | E5D3C1E8 | F0F0F5F3* | |
| 02E3E7E3 | 400009BC | 40400012 | 40400001 | 5C40D0B8 | 1B255020 | D1185030 |
| D11C47F0 | D1844040 | 40404040 | 40404040 | 40404040 | 40404040 | 40404040 |
| 40404040 | 40404040 | 40404040 | 40404040 | E5D3C1E8 | F0F0F5F4* | |
| 02E3E7E3 | 40000020 | 40400008 | 40400001 | 0000097A | 00000118 | 40404040 |
| 40404040 | 40404040 | 40404040 | 40404040 | 40404040 | 40404040 | 40404040 |
| 40404040 | 40404040 | 40404040 | 40404040 | E5D3C1E8 | F0F0F5F5* | |
| 02D9D3C4 | 40404040 | 40400038 | 40404040 | 00010001 | 0C000788 | 00010001 |
| 0C0007CC | 00010001 | 0C000840 | 00010001 | 0C000884 | 00010001 | 0C0008C4 |
| 00010001 | 0C000908 | 00010001 | 0C000020 | E5D3C1E8 | F0F0F5F6* | |
| 02E3E7E3 | 40000118 | 40400004 | 40400001 | 0000094A | 40404040 | 40404040 |
| 40404040 | 40404040 | 40404040 | 40404040 | 40404040 | 40404040 | 40404040 |
| 40404040 | 40404040 | 40404040 | 40404040 | E5D3C1E8 | F0F0F5F7* | |
| 02E3E7E3 | 40000164 | 40400010 | 40400001 | 000006A8 | 00000926 | 00000208 |
| 000001B0 | 40404040 | 40404040 | 40404040 | 40404040 | 40404040 | 40404040 |
| 40404040 | 40404040 | 40404040 | 40404040 | E5D3C1E8 | F0F0F5F8* | |

MEMBER NAME VLAYUP

| | | | | | | |
|---|---|---|---|---|---|---|
| 02E3E7E3 | 40000178 | 40400008 | 40400001 | 000001D4 | 80000200 | 40404040 |
| 40404040 | 40404040 | 40404040 | 40404040 | 40404040 | 40404040 | 40404040 |
| 40404040 | 40404040 | 40404040 | 40404040 | E5D3C1E8 | F0F0F5F9* | |
| 02D9D3C4 | 40404040 | 40400038 | 40404040 | 00010001 | 0C000024 | 00010001 |
| 0C000118 | 00010001 | 0C000164 | 00010001 | 0C000168 | 00010001 | 0C00016C |
| 00010001 | 0C000170 | 00010001 | 0C000178 | E5D3C1E8 | F0F0F6F0** | |
| 02E3E7E3 | 40000184 | 40400004 | 40400001 | 000001AC | 40404040 | 40404040 |
| 40404040 | 40404040 | 40404040 | 40404040 | 40404040 | 40404040 | 40404040 |
| 40404040 | 40404040 | 40404040 | 40404040 | E5D3C1E8 | F0F0F6F1* | |

```
02E3E7E3  4000018C  4040000C  40400001  000001C8  000001C8  800001EC
40404040  40404040  40404040  40404040  40404040  40404040  40404040
40404040  40404040  40404040  40404040  E5D3C1E8  F0F0F6F2*
02E3E7E3  40000248  40400038  40400001  00000000  00000000  00000000
00000000  00000000  00000000  00000000  00000000  00000000  00000000
00000000  00000000  00000000  00000000  E5D3C1E8  F0F0F6F3*
02E3E7E3  40000280  4040001C  40400001  00000000  0000000A  0000000C
00000020  00000024  00000018  00000040  40404040  40404040  40404040
40404040  40404040  40404040  40404040  E5D3C1E8  F0F0F6F4*
02D9D3C4  40404040  40400028  40404040  00010001  0C00017C  00010001
0C000184  00010001  0C00018C  00010001  0C000190  00010001  0C000194
40404040  40404040  40404040  40404040  E5D3C1E8  F0F0F6F5*
02C5D5C4  40404040  40404040  40404040  40404040  40404040  40404040
000009CE  F1F5F7F3  F460C6D6  F34040F0  F2F0F2F8  F7F0F9F8  40F0F84B
F5F04BF4  F1404040  E5D3C1E8  E4D74040  E5D3C1E8  F0F0F6F6**

MEMBER NAME  VSEQU
02C5E2C4  40404040  40400010  40400001  E5E2C5D8  E4404040  00000000
40000000  40404040  40404040  40404040  40404040  40404040  40404040
40404040  40404040  40404040  40404040  E5E2C5D8  F0F0F0F1*
02E3E7E3  40000000  40400038  40400001  47F0F00C  07E5E2C5  D8E44040
90ECD00C  184D98CD  F0205040  D00450D0  400807FC  40404040  40404040
020A0803  18010A08  0318011A  05C4C1E2  E5E2C5D8  F0F0F0F2*
02E3E7E3  40000038  4040002D  40400001  C8401003  1A0A40E2  C5D8E4C5
D5C3C540  10041A10  40C1D3D9  C5C1C4E8  40C4C5C6  C9D5C5C4  18322202
06481401  22404040  40404040  40404040  E5E2C5D8  F0F0F0F3*
02E3E7E3  400000C8  40400038  40400001  00000000  00000000  4F080000
00000000  00000001  00000002  00000003  00000004  00000005  00000006
00000018  00000048  00000000  00000000  E5E2C5D8  F0F0F0F4*
02C5E2C4  40404040  40400010  40400002  C2E2D6D9  E3404040  02000000
40000000  40404040  40404040  40404040  40404040  40404040  40404040
40404040  40404040  40404040  40404040  E5E2C5D8  F0F0F0F5*
02E3E7E3  40000148  40400004  40400001  00000000  40404040  40404040
40404040  40404040  40404040  40404040  40404040  40404040  40404040
40404040  40404040  40404040  40404040  E5E2C5D8  F0F0F0F6*
02C5E2C4  40404040  40400010  40400003  C9C2C3D6  D47B4040  02000000
40000000  40404040  40404040  40404040  40404040  40404040  40404040
40404040  40404040  40404040  40404040  E5E2C5D8  F0F0F0F7*
02E3E7E3  40000150  40400008  40400001  00000000  00000000  40404040
40404040  40404040  40404040  40404040  40404040  40404040  40404040
40404040  40404040  40404040  40404040  E5E2C5D8  F0F0F0F8*
02E3E7E3  4000015C  40400004  40400001  00000000  40404040  40404040
40404040  40404040  40404040  40404040  40404040  40404040  40404040
40404040  40404040  40404040  40404040  E5E2C5D8  F0F0F0F9*
02E3E7E3  40000118  40400004  40400001  000000C8  40404040  40404040
40404040  40404040  40404040  40404040  40404040  40404040  40404040
40404040  40404040  40404040  40404040  E5E2C5D8  F0F0F1F0**
02E3E7E3  40000124  40400020  40400001  00000011  00000004  C6D34040
C1404040  00000005  00000004  C6D34040  C1404040  40404040  40404040
40404040  40404040  40404040  40404040  E5E2C5D8  F0F0F1F1*
02E3E7E3  40000190  40400038  40400001  58B0D0E0  58A0D070  58F0D0E8
4110D04C  05EF50A0  D0985800  D1185000  D1005800  D11C5000  D1085800
D1205000  D1105800  D1245000  D1145880  E5E2C5D8  F0F0F1F2*
02E3E7E3  400001C8  40400038  40400001  D0885890  D0B05850  D0981A5A
5050D09C  5950D0AC  4730D318  18785C60  D0985070  D0F81C48  5050D0FC
18355A30  D1187863  B0001837  5A30D118  E5E2C5D8  F0F0F1F3*
02E3E7E3  40000200  40400038  40400001  7963B000  4770D318  18355A30
D11C7823  B0007020  D10C1837  5A30D11C  7923B000  4770D318  5990D0B8
4730D1C8  47F0D328  5800D0B8  1A0A5000  E5E2C5D8  F0F0F1F4*
```

```
02E3E7E3  40000238  40400038  40400001  D0B82B00  38066A00  D0686000
D0605830  D0641033  5030D0A8  2B003802  6A00D068  6000D060  5800D064
5000D0A4  58F0D0F4  45E0F004  00000000  E5E2C5D8  F0F0F1F5*
02E3E7E3  40000270  40400038  40400001  00000028  18355A30  D12045E0
F0080473  B0001835  5A30D124  45E0F008  0473B000  45E0F008  0450D0A8
45E0F008  0450D0A4  45E0F010  58F0D0F4  E5E2C5D8  F0F0F1F6*
02E3E7E3  400002A8  40400038  40400001  45E0F000  00000000  0000005F
189A58B0  D08C5880  D0EC185B  5C40D0B8  18391A35  45E0F008  01238000
879AD256  58B0D0E0  5890D0B0  5880D088  E5E2C5D8  F0F0F1F7*
02E3E7E3  400002E0  40400038  40400001  45E0F010  5990D0B8  4730D288
47F0D328  5800D0B8  1A0A5000  D0B858F0  D0F41800  45E0F004  00000000
00000028  5830D0F8  5A30D110  45E0F008  E5E2C5D8  F0F0F1F8*
02E3E7E3  40000318  40400038  40400001  0473B000  5830D0F8  5A30D114
45E0F008  0473B000  45E0F008  0450D0A8  45E0F008  0450D0A4  45E0F010
58F0D0F4  45E0F000  00000000  0000005F  E5E2C5D8  F0F0F1F9*
02E3E7E3  40000350  40400038  40400001  189A58B0  D08C5880  D0EC185B

MEMBER NAME  VSEQU
5C40D0B8  18391A35  45E0F008  01238000  879AD2F2  58B0D0E0  5890D0B0
5880D088  45E0F010  5800D09C  5000D098  E5E2C5D8  F0F0F2F0**
02E3E7E3  40000388  40400038  40400001  5900D0AC  47C0D166  58B0D0E0
1BFF58E0  D00007FE  58A0D004  58E0A00C  58B0A018  5810B004  5820D0AC
50201000  5830B00C  5840D0B8  50403000  E5E2C5D8  F0F0F2F1*
02E3E7E3  400003C0  40400038  40400001  18DA92FF  A00C982C  A01C07FE
98791004  58207000  5020D0AC  58209000  5020D0B8  58201000  41302000
41500004  1B255C40  D0841B25  5020D0E0  E5E2C5D8  F0F0F2F2*
02E3E7E3  400003F8  40400028  40400001  5030D0E4  5030D054  58201008
41302000  41500001  1B255C40  D08C1B25  5020D0EC  5030D0F0  47F0D128
40404040  40404040  40404040  40404040  E5E2C5D8  F0F0F2F3*
02E3E7E3  40000020  40400008  40400001  000003CC  00000068  40404040
40404040  40404040  40404040  40404040  40404040  40404040  40404040
40404040  40404040  40404040  40404040  E5E2C5D8  F0F0F2F4*
02D9D3C4  40404040  40400038  40404040  00020001  1C000150  00030001
1C00015C  00010001  0C000270  00010001  0C0002B0  00010001  0C000308
00010001  0C00034C  00010001  0C000020  E5E2C5D8  F0F0F2F5*
02E3E7E3  40000068  40400004  40400001  0000039C  40404040  40404040
40404040  40404040  40404040  40404040  40404040  40404040  40404040
40404040  40404040  40404040  40404040  E5E2C5D8  F0F0F2F6*
02E3E7E3  400000B4  40400008  40400001  00000124  000000DC  40404040
40404040  40404040  40404040  40404040  40404040  40404040  40404040
40404040  40404040  40404040  40404040  E5E2C5D8  F0F0F2F7*
02E3E7E3  400000C0  40400008  40400001  000000F0  80000114  40404040
40404040  40404040  40404040  40404040  40404040  40404040  40404040
40404040  40404040  40404040  40404040  E5E2C5D8  F0F0F2F8*
02E3E7E3  40000160  40400030  40400001  00000000  00000000  00000000
00000000  00000000  00000000  00000000  00000000  00000014  00000008
0000000C  00000010  40404040  40404040  E5E2C5D8  F0F0F2F9*
02D9D3C4  40404040  40400030  40404040  00010001  0C000024  00010001
0C000068  00010001  0C0000B4  00010001  0C0000B8  00010001  0C0000C0
00010001  0C0000C4  40404040  40404040  E5E2C5D8  F0F0F3F0**
02C5D5C4  40404040  40404040  40404040  40404040  40404040  40404040
00000420  F1F5F7F3  F460C6D6  F34040F0  F2F0F2F8  F7F0F9F8  40F0F84B
F5F04BF4  F6404040  E5E2C5D8  E4404040  E5E2C5D8  F0F0F3F1**

MEMBER NAME  WARRAY
02C5E2C4  40404040  40400010  40400001  E6C1D9D9  C1E84040  00000000
40000000  40404040  40404040  40404040  40404040  40404040  40404040
40404040  40404040  40404040  40404040  E6C1D9D9  F0F0F0F1*
02E3E7E3  40000000  40400038  40400001  47F0F00C  07E6C1D9  D9C1E840
```

```
90ECD00C  184D98CD  F0205040  D00450D0  400807FC  40404040  40404040
021A2040  5C5C5C5C  5C5C5C5C  5C40C4C1  E6C1D9D9  F0F0F0F2*
02E3E7E3  40000038  40400038  40400001  E2C840E3  C1C2D3C5  405C5C5C
5C5C5C5C  5C5C5C22  021A0640  4040C940  7E10041A  0340D47E  0A04011A
0340C47E  0A06011A  0440E77E  400A0703  E6C1D9D9  F0F0F0F3*
02E3E7E3  40000070  40400038  40400001  1A0440E8  7E400A07  031A0440
D77E400A  04012202  1A24405C  5C5C5C5C  5C5C5C5C  40E2C5D8  E4C5D5C3
C540E3C1  C2D3C540  5C5C5C5C  5C5C5C5C  E6C1D9D9  F0F0F0F4*
02E3E7E3  400000A8  40400038  40400001  5C5C2202  1A064040  40C97E40
10041A04  40D47E40  0A04011A  0440E27E  400A0601  1A0440E7  7E400A07
031A0440  E87E400A  07031A04  40C47E40  E6C1D9D9  F0F0F0F5*
02E3E7E3  400000E0  40400038  40400001  0A06011A  0440D77E  400A0401
22021A21  405C5C5C  5C5C5C5C  5C5C40C7  D9C1C9D5  40E3C1C2  D3C5405C
5C5C5C5C  5C5C5C5C  5C22021A  06404040  E6C1D9D9  F0F0F0F6*
02E3E7E3  40000118  40400038  40400001  C97E4010  041A0440  D47E400A
04011A04  40C77E40  0A06011A  0440E77E  400A0703  1A0440E8  7E400A07
031A0440  C47E400A  06011A04  40D77E40  E6C1D9D9  F0F0F0F7*
02E3E7E3  40000150  40400038  40400001  0A040122  021A2440  5C5C5C5C
5C5C5C5C  5C40D4C1  E3C5D9C9  C1D340E3  C1C2D3C5  405C5C5C  5C5C5C5C
5C5C5C22  021A0640  4040C97E  4010041A  E6C1D9D9  F0F0F0F8*
02E3E7E3  40000188  40400038  40400001  0440D47E  400A0401  1A0440D4
7E400A06  011A0440  E77E400A  07031A04  40E87E40  0A07031A  0440C47E
400A0601  1A0440D7  7E400A04  0122021A  E6C1D9D9  F0F0F0F9*
02E3E7E3  400001C0  40400038  40400001  20405C5C  5C5C5C5C  5C5C5C40
D7D3E840  E3C1C2D3  C540405C  5C5C5C5C  5C5C5C5C  5C220210  051A08D3
C1E8E4D7  407B4010  041A05E7  40E8407E  E6C1D9D9  F0F0F1F0**
02E3E7E3  400001F8  40400006  40400001  06020A0A  04224040  40404040
40404040  40404040  40404040  40404040  40404040  40404040  40404040
40404040  40404040  40404040  40404040  E6C1D9D9  F0F0F1F1*
02C5E2C4  40404040  40400010  40400002  D7E3C1C2  D3C54040  05000000
40125768  40404040  40404040  40404040  40404040  40404040  40404040
40404040  40404040  40404040  40404040  E6C1D9D9  F0F0F1F2*
02E3E7E3  40000258  4040002C  40400001  00000001  00000002  00000003
00000004  00000005  00000006  0000000C  00000014  00000018  00000000
00000000  40404040  40404040  40404040  E6C1D9D9  F0F0F1F3*
02C5E2C4  40404040  40400010  40400003  D4E5C3C8  D9404040  02000000
40000000  40404040  40404040  40404040  40404040  40404040  40404040
40404040  40404040  40404040  40404040  E6C1D9D9  F0F0F1F4*
02C5E2C4  40404040  40400010  40400004  C9C2C3D6  D47B4040  02000000
40000000  40404040  40404040  40404040  40404040  40404040  40404040
40404040  40404040  40404040  40404040  E6C1D9D9  F0F0F1F5*
02E3E7E3  400002A0  40400038  40400001  FFFFFFEC  00058600  000B0444
00108298  00000000  00000000  5860D0A4  5870D0A0  58A0D058  58F0D0B4
45E0F004  00000006  00000028  45E0F010  E6C1D9D9  F0F0F1F6*
02E3E7E3  400002D8  40400020  40400001  50A0D088  5880D074  58907014
18B758F0  D0B41800  45E0F004  00000006  0000004C  40404040  40404040
40404040  40404040  40404040  40404040  E6C1D9D9  F0F0F1F7*
02D9D3C4  40404040  40400038  40404040  00020001  0C0002A0  00020001
0C0002A4  00020001  0C0002A8  00020001  0C0002AC  00030001  1C0002B0
00040001  1C0002B4  00010001  0C0002D0  E6C1D9D9  F0F0F1F8*
02E3E7E3  400002F8  40400038  40400001  45E0F008  0450D088  18585C40
D08845E0  F1340001  00000475  B0040100  00050000  000445E0  F0105830
D0881A3A  5030D088  193947C0  D0E658F0  E6C1D9D9  F0F0F1F9*
02E3E7E3  40000330  40400038  40400001  D0B41800  45E0F004  00000006

MEMBER NAME  WARRAY
00000083  45E0F010  50A0D088  5880D078  589077E8  18B758F0  D0B41800
45E0F004  00000006  000000AB  45E0F008  E6C1D9D9  F0F0F2F0**
02E3E7E3  40000368  40400038  40400001  0450D088  18585C40  D08845E0
```

F1340001 00000475 B7D40100 00060000 000445E0 F0105830 D0881A3A
5030D088 193947C0 D15258F0 D0B41800 E6C1D9D9 F0F0F2F1*
02E3E7E3 400003A0 40400038 40400001 45E0F004 00000006 000000ED
45E0F010 50A0D088 5880D078 58906018 18B658F0 D0B41800 45E0F004
00000006 00000112 45E0F008 0450D088 E6C1D9D9 F0F0F2F2*
02E3E7E3 400003D8 40400038 40400001 18585C40 D08845E0 F1340001
00000475 B0040100 00060000 000445E0 F0105830 D0881A3A 5030D088
193947C0 D1BE58F0 D0B41800 45E0F004 E6C1D9D9 F0F0F2F3*
02E3E7E3 40000410 40400038 40400001 00000006 00000154 45E0F010
50A0D088 5880D078 58F0D0A8 5890F018 58B0D0A8 58F0D0B4 45E0F004
00000006 0000017C 45E0F008 0450D088 E6C1D9D9 F0F0F2F4*
02E3E7E3 40000448 40400038 40400001 18585C40 D08845E0 F1340001
00000475 B0040100 00060000 000445E0 F0105830 D0881A3A 5030D088
193947C0 D23058F0 D0B41800 45E0F004 E6C1D9D9 F0F0F2F5*
02E3E7E3 40000480 40400008 40400001 00000006 000001BE 40404040
40404040 40404040 40404040 40404040 40404040 40404040 40404040
40404040 40404040 40404040 40404040 E6C1D9D9 F0F0F2F6*
02D9D3C4 40404040 40400038 40404040 00010001 0C0002F4 00010001
0C00033C 00010001 0C000360 00010001 0C0003A8 00010001 0C0003CC
00010001 0C000414 00010001 0C00043C E6C1D9D9 F0F0F2F7*
02E3E7E3 40000488 40400038 40400001 45E0F010 50A0D088 5890D070
58B0D0AC 18595C40 D0884105 B0045000 D0549280 D05458F0 D0B04110
D04C05EF 58F0D0B4 45E0F004 00000006 E6C1D9D9 F0F0F2F8*
02E3E7E3 400004C0 40400038 40400001 000001E2 45E0F008 0450D088
45E0F008 0240D090 45E0F008 0475B008 45E0F008 0475B00C 45E0F010
5830D088 1A3A5030 D0885930 B00C47C0 E6C1D9D9 F0F0F2F9*
02E3E7E3 400004F8 40400020 40400001 D2981BFF 58E0D000 07FE58D0
D00458E0 D00C92FF D00C982C D01C07FE 47F0D0B8 40404040 40404040
40404040 40404040 40404040 40404040 E6C1D9D9 F0F0F3F0**
02E3E7E3 40000020 40400008 40400001 00000514 00000200 40404040
40404040 40404040 40404040 40404040 40404040 40404040 40404040
40404040 40404040 40404040 40404040 E6C1D9D9 F0F0F3F1*
02E3E7E3 40000200 40400004 40400001 00000502 40404040 40404040
40404040 40404040 40404040 40404040 40404040 40404040 40404040
40404040 40404040 40404040 40404040 E6C1D9D9 F0F0F3F2*
02E3E7E3 4000024C 4040000C 40400001 00000264 00000290 80000000
40404040 40404040 40404040 40404040 40404040 40404040 40404040
40404040 40404040 40404040 40404040 E6C1D9D9 F0F0F3F3*
02D9D3C4 40404040 40400038 40404040 00010001 0C000484 00010001
0C0004C0 00010001 0C000020 00010001 0C000024 00010001 0C000200
00010001 0C00024C 00010001 0C000250 E6C1D9D9 F0F0F3F4*
02C5D5C4 40404040 40404040 40404040 40404040 40404040 40404040
00000518 F1F5F7F3 F460C6D6 F34040F0 F2F0F2F8 F7F0F9F8 40F0F84B
F5F04BF5 F1404040 E6C1D9D9 C1E84040 E6C1D9D9 F0F0F3F5**

MEMBER NAME WITHIN

02C5E2C4 40404040 40400010 40400001 E6C9E3C8 C9D54040 00000000
40000000 40404040 40404040 40404040 40404040 40404040 40404040
40404040 40404040 40404040 40404040 E6C9E3C8 F0F0F0F1*
02E3E7E3 40000000 40400028 40400001 47F0F00C 07E6C9E3 C8C9D540
90ECD00C 184D98CD F0205040 D00450D0 400807FC 40404040 40404040
40404040 40404040 40404040 40404040 E6C9E3C8 F0F0F0F2*
02E3E7E3 400000C8 4040001C 40400001 00000000 00000001 00000002
00000003 00000004 00000000 00000000 40404040 40404040 40404040
40404040 40404040 40404040 40404040 E6C9E3C8 F0F0F0F3*
02E3E7E3 40000170 40400004 40400001 00000000 40404040 40404040
40404040 40404040 40404040 40404040 40404040 40404040 40404040
40404040 40404040 40404040 40404040 E6C9E3C8 F0F0F0F4*
02E3E7E3 40000178 40400004 40400001 00000000 40404040 40404040

```
40404040  40404040  40404040  40404040  40404040  40404040  40404040
40404040  40404040  40404040  40404040  E6C9E3C8  F0F0F0F5*
02E3E7E3  40000180  40400004  40400001  00000000  40404040  40404040
40404040  40404040  40404040  40404040  40404040  40404040  40404040
40404040  40404040  40404040  40404040  E6C9E3C8  F0F0F0F6*
02E3E7E3  40000188  40400004  40400001  00000000  40404040  40404040
40404040  40404040  40404040  40404040  40404040  40404040  40404040
40404040  40404040  40404040  40404040  E6C9E3C8  F0F0F0F7*
02E3E7E3  40000190  40400004  40400001  00000000  40404040  40404040
40404040  40404040  40404040  40404040  40404040  40404040  40404040
40404040  40404040  40404040  40404040  E6C9E3C8  F0F0F0F8*
02E3E7E3  40000198  40400004  40400001  00000000  40404040  40404040
40404040  40404040  40404040  40404040  40404040  40404040  40404040
40404040  40404040  40404040  40404040  E6C9E3C8  F0F0F0F9*
02E3E7E3  400001A0  40400004  40400001  00000000  40404040  40404040
40404040  40404040  40404040  40404040  40404040  40404040  40404040
40404040  40404040  40404040  40404040  E6C9E3C8  F0F0F1F0**
02E3E7E3  400001A8  40400004  40400001  00000000  40404040  40404040
40404040  40404040  40404040  40404040  40404040  40404040  40404040
40404040  40404040  40404040  40404040  E6C9E3C8  F0F0F1F1*
02C5E2C4  40404040  40400010  40400002  E2E6C9E3  C3C84040  02000000
40000000  40404040  40404040  40404040  40404040  40404040  40404040
40404040  40404040  40404040  40404040  E6C9E3C8  F0F0F1F2*
02E3E7E3  400001B0  40400004  40400001  00000000  40404040  40404040
40404040  40404040  40404040  40404040  40404040  40404040  40404040
40404040  40404040  40404040  40404040  E6C9E3C8  F0F0F1F3*
02E3E7E3  400001B8  40400004  40400001  00000000  40404040  40404040
40404040  40404040  40404040  40404040  40404040  40404040  40404040
40404040  40404040  40404040  40404040  E6C9E3C8  F0F0F1F4*
02E3E7E3  400001C0  40400038  40400001  5830D148  5880D168  5890D160
58A0D170  58B0D188  5870D194  5860D0A4  5960D0C8  4770D1C6  58F0D190
4110D04C  05EF5800  D0BC5900  D0A84780  E6C9E3C8  F0F0F1F5*
02E3E7E3  400001F8  40400038  40400001  D28E6800  D1206900  D1284780
D24E6820  A0181857  5C40D0C0  5820D0B0  1A257022  80006820  A0201857
5C40D0C0  18271A25  70228000  5800D0C0  E6C9E3C8  F0F0F1F6*
02E3E7E3  40000230  40400038  40400001  1A065000  D0C06820  B0186020
B0086820  B0206020  B0106820  90086020  B0186820  90106020  B0206800
D1206000  D1186800  D1286000  D1205800  E6C9E3C8  F0F0F1F7*
02E3E7E3  40000268  40400038  40400001  D0A05000  D0C41BFF  58E0D000
07FE6820  A0181857  5C40D0C0  5820D0B0  1A257022  80006820  A0201857
5C40D0C0  18271A25  70228000  5800D0C0  E6C9E3C8  F0F0F1F8*
02E3E7E3  400002A0  40400038  40400001  1A065000  D0C05800  D0A85000
D0C41BFF  58E0D000  07FE5060  D0C41BFF  58E0D000  07FE58A0  D00458E0
A00C58B0  A0185810  B0105820  D0C05020  E6C9E3C8  F0F0F1F9*
02E3E7E3  400002D8  40400038  40400001  10005830  B0186820  D1186020

MEMBER NAME  WITHIN
30005840  B01C6840  D1206040  40005850  B02C5860  D0C45060  50005870
B0306860  D0D06060  70005880  B0346800  E6C9E3C8  F0F0F2F0**
02E3E7E3  40000310  40400038  40400001  D0E06000  80005890  B0386820
D0F06020  90005810  B03C6840  D1006040  10005820  B0406860  D0D86060
20005830  B0446800  D0E86000  30005840  E6C9E3C8  F0F0F2F1*
02E3E7E3  40000348  40400038  40400001  B0486820  D0F86020  40005850
B04C6840  D1086040  50005860  B0586860  D1306060  60005870  B05C5880
D0C85080  70005890  B0686800  D1386000  E6C9E3C8  F0F0F2F2*
02E3E7E3  40000380  40400038  40400001  900018DA  92FFA00C  982CA01C
07FE987B  10105820  70005020  D0C06820  90006020  D1186820  A0006020
D1206820  B0006020  D128987B  10246820  E6C9E3C8  F0F0F2F3*
02E3E7E3  400003B8  40400038  40400001  70006020  D1105820  80005020
```

```
D0BC5820  90005020  D0C46820  A0006020  D0D06820  B0006020  D0E0987B
10386820  70006020  D0F06820  80006020  E6C9E3C8  F0F0F2F4*
02E3E7E3  400003F0  40400038  40400001  D1006820  90006020  D0D86820
A0006020  D0E86820  B0006020  D0F8987B  104C6820  70006020  D1086820
A0006020  D1305820  B0005020  D0C85870  E6C9E3C8  F0F0F2F5*
02E3E7E3  40000428  40400038  40400001  10686820  70006020  D1385820
10004130  20004150  00081B25  5020D188  5030D18C  5030D06C  58201004
41302000  41500008  1B255020  D1705030  E6C9E3C8  F0F0F2F6*
02E3E7E3  40000460  40400038  40400001  D1745030  D0805820  10084130
20004150  00081B25  5020D158  5030D15C  5030D098  5820100C  41302000
41500008  1B255020  D1605030  D1645030  E6C9E3C8  F0F0F2F7*
02E3E7E3  40000498  40400038  40400001  D09C9280  D09C5820  10144130
20004150  00041B25  5C40D0A8  1B255020  D1685030  D16C5820  10504130
20004150  00081B25  5020D148  5030D14C  E6C9E3C8  F0F0F2F8*
02E3E7E3  400004D0  40400038  40400001  5030D070  58201054  41302000
41500008  1B255020  D1505030  D1545030  D0745820  10604130  20004150
00081B25  5020D178  5030D17C  5030D078  E6C9E3C8  F0F0F2F9*
02E3E7E3  40000508  4040001E  40400001  58201064  41302000  41500008
1B255020  D1805030  D1845030  D07C47F0  D1984040  40404040  40404040
40404040  40404040  40404040  40404040  E6C9E3C8  F0F0F3F0**
02E3E7E3  40000020  4040000C  40400001  0000038E  00000028  000002C2
40404040  40404040  40404040  40404040  40404040  40404040  40404040
40404040  40404040  40404040  40404040  E6C9E3C8  F0F0F3F1*
02E3E7E3  40000074  40400010  40400001  000000F8  00000108  00000118
00000128  40404040  40404040  40404040  40404040  40404040  40404040
40404040  40404040  40404040  40404040  E6C9E3C8  F0F0F3F2*
02D9D3C4  40404040  40400038  40404040  00020001  1C0001B8  00010001
0C000020  00010001  0C000024  00010001  0C000028  00010001  0C000074
00010001  0C000078  00010001  0C00007C  E6C9E3C8  F0F0F3F3*
02E3E7E3  40000084  40400010  40400001  00000100  00000110  00000120
00000130  40404040  40404040  40404040  40404040  40404040  40404040
40404040  40404040  40404040  40404040  E6C9E3C8  F0F0F3F4*
02E3E7E3  400000AC  4040000C  40400001  00000158  000000F0  00000148
40404040  40404040  40404040  40404040  40404040  40404040  40404040
40404040  40404040  40404040  40404040  E6C9E3C8  F0F0F3F5*
02D9D3C4  40404040  40400038  40404040  00010001  0C000080  00010001
0C000084  00010001  0C000088  00010001  0C00008C  00010001  0C000090
00010001  0C0000AC  00010001  0C0000B0  E6C9E3C8  F0F0F3F6*
02E3E7E3  400000B8  40400008  40400001  00000140  00000160  40404040
40404040  40404040  40404040  40404040  40404040  40404040  40404040
40404040  40404040  40404040  40404040  E6C9E3C8  F0F0F3F7*
02E3E7E3  400001BC  40400004  40400001  00000008  40404040  40404040
40404040  40404040  40404040  40404040  40404040  40404040  40404040
40404040  40404040  40404040  40404040  E6C9E3C8  F0F0F3F8*
02D9D3C4  40404040  40400018  40404040  00010001  0C0000B4  00010001
0C0000B8  00010001  0C0000BC  40404040  40404040  40404040  40404040

MEMBER NAME  WITHIN
40404040  40404040  40404040  40404040  E6C9E3C8  F0F0F3F9*
02C5D5C4  40404040  40404040  40404040  40404040  40404040  40404040
00000526  F1F5F7F3  F460C6D6  F34040F0  F2F0F2F8  F7F0F9F8  40F0F84B
F5F04BF5  F5404040  E6C9E3C8  C9D54040  E6C9E3C8  F0F0F4F0**

MEMBER NAME  WITOUT
02C5E2C4  40404040  40400010  40400001  E6C9E3D6  E4E34040  00000000
40000000  40404040  40404040  40404040  40404040  40404040  40404040
40404040  40404040  40404040  40404040  E6C9E3D6  F0F0F0F1*
02E3E7E3  40000000  40400028  40400001  47F0F00C  07E6C9E3  D6E4E340
90ECD00C  184D98CD  F0205040  D00450D0  400807FC  40404040  40404040
```

```
40404040  40404040  40404040  40404040  E6C9E3D6  F0F0F0F2*
02E3E7E3  400000C8  4040001C  40400001  00000000  00000001  00000002
00000003  00000004  00000000  00000000  40404040  40404040  40404040
40404040  40404040  40404040  40404040  E6C9E3D6  F0F0F0F3*
02E3E7E3  40000168  40400004  40400001  00000000  40404040  40404040
40404040  40404040  40404040  40404040  40404040  40404040  40404040
40404040  40404040  40404040  40404040  E6C9E3D6  F0F0F0F4*
02E3E7E3  40000170  40400004  40400001  00000000  40404040  40404040
40404040  40404040  40404040  40404040  40404040  40404040  40404040
40404040  40404040  40404040  40404040  E6C9E3D6  F0F0F0F5*
02E3E7E3  40000178  40400004  40400001  00000000  40404040  40404040
40404040  40404040  40404040  40404040  40404040  40404040  40404040
40404040  40404040  40404040  40404040  E6C9E3D6  F0F0F0F6*
02E3E7E3  40000180  40400004  40400001  00000000  40404040  40404040
40404040  40404040  40404040  40404040  40404040  40404040  40404040
40404040  40404040  40404040  40404040  E6C9E3D6  F0F0F0F7*
02E3E7E3  40000188  40400004  40400001  00000000  40404040  40404040
40404040  40404040  40404040  40404040  40404040  40404040  40404040
40404040  40404040  40404040  40404040  E6C9E3D6  F0F0F0F8*
02E3E7E3  40000190  40400004  40400001  00000000  40404040  40404040
40404040  40404040  40404040  40404040  40404040  40404040  40404040
40404040  40404040  40404040  40404040  E6C9E3D6  F0F0F0F9*
02E3E7E3  40000198  40400004  40400001  00000000  40404040  40404040
40404040  40404040  40404040  40404040  40404040  40404040  40404040
40404040  40404040  40404040  40404040  E6C9E3D6  F0F0F1F0**
02C5E2C4  40404040  40400010  40400002  E2E6C9E3  C3C84040  02000000
40000000  40404040  40404040  40404040  40404040  40404040  40404040
40404040  40404040  40404040  40404040  E6C9E3D6  F0F0F1F1*
02E3E7E3  400001A0  40400004  40400001  00000000  40404040  40404040
40404040  40404040  40404040  40404040  40404040  40404040  40404040
40404040  40404040  40404040  40404040  E6C9E3D6  F0F0F1F2*
02E3E7E3  400001A8  40400038  40400001  00000000  5840D170  5850D168
5860D158  5870D150  5880D148  5890D140  58A0D178  58B0D160  5830D0A4
5820D0A0  5930D0C8  4770D216  58F0D180  E6C9E3D6  F0F0F1F3*
02E3E7E3  400001E0  40400038  40400001  4110D04C  05EF6820  D1102C22
6C20D110  6C20D0D0  6840D110  2C446C40  D0E02A24  6840D0F0  6C40D110
2A246A20  D1006020  B0086820  D1102C22  E6C9E3D6  F0F0F1F4*
02E3E7E3  40000218  40400038  40400001  6C20D110  6C20D0D8  6840D110
2C446C40  D0E82A24  6840D0F8  6C40D110  2A246A20  D1086020  B0106820
B0086020  A0186820  B0106020  A0206800  E6C9E3D6  F0F0F1F5*
02E3E7E3  40000250  40400038  40400001  D1106000  D1205020  D0BC1BFF
58E0D000  07FE58A0  D00458E0  A00C58B0  A0185810  B00C6820  D1206020
10005820  B0105830  D0BC5030  20005840  E6C9E3D6  F0F0F1F6*
02E3E7E3  40000288  40400038  40400001  B0146840  D1186040  40005850
B0186860  D0D06060  50005860  B01C6800  D0E06000  60005870  B0206820
D0F06020  70005880  B0246840  D1006040  E6C9E3D6  F0F0F1F7*
02E3E7E3  400002C0  40400038  40400001  80005890  B0286860  D0D86060
90005810  B02C6800  D0E86000  10005820  B0306820  D0F86020  20005830
B0346840  D1086040  30005840  B0406860  E6C9E3D6  F0F0F1F8*
02E3E7E3  400002F8  40400038  40400001  D1306060  40005850  B04C6800
D1286000  50005860  B0505870  D0C85070  600018DA  92FFA00C  982CA01C
07FE987B  10046820  70006020  D1106820  E6C9E3D6  F0F0F1F9*
02E3E7E3  40000330  40400038  40400001  90006020  D1205820  A0005020

MEMBER NAME  WITOUT
D0BC6820  B0006020  D118987B  10186820  70006020  D0D06820  80006020
D0E06820  90006020  D0F06820  A0006020  E6C9E3D6  F0F0F2F0**
02E3E7E3  40000368  40400038  40400001  D1006820  B0006020  D0D8987B
102C6820  70006020  D0E86820  80006020  D0F86820  90006020  D108987B
```

```
103C7820  70007020  D0C46820  80006020  E6C9E3D6  F0F0F2F1*
02E3E7E3  400003A0  40400038  40400001  D130987B  104C6820  70006020
D1285820  80005020  D0C85820  10004130  20004150  00081B25  5020D178
5030D17C  5030D06C  58201008  41302000  E6C9E3D6  F0F0F2F2*
02E3E7E3  400003D8  40400038  40400001  41500008  1B255020  D1605030
D1645820  10384130  20004150  00081B25  5020D158  5030D15C  5030D09C
9280D09C  58201044  41302000  41500008  E6C9E3D6  F0F0F2F3*
02E3E7E3  40000410  40400038  40400001  1B255020  D1405030  D1445030
D0705820  10484130  20004150  00081B25  5020D148  5030D14C  5030D074
58201054  41302000  41500008  1B255020  E6C9E3D6  F0F0F2F4*
02E3E7E3  40000448  40400038  40400001  D1685030  D16C5030  D0785820
10584130  20004150  00081B25  5020D170  5030D174  5030D07C  5820105C
41302000  41500008  1B255020  D1505030  E6C9E3D6  F0F0F2F5*
02E3E7E3  40000480  4040000A  40400001  D1545030  D09847F0  D1844040
40404040  40404040  40404040  40404040  40404040  40404040  40404040
40404040  40404040  40404040  40404040  E6C9E3D6  F0F0F2F6*
02E3E7E3  40000020  4040000C  40400001  00000322  00000028  00000262
40404040  40404040  40404040  40404040  40404040  40404040  40404040
40404040  40404040  40404040  40404040  E6C9E3D6  F0F0F2F7*
02E3E7E3  40000074  40400010  40400001  000000F8  00000108  00000118
00000128  40404040  40404040  40404040  40404040  40404040  40404040
40404040  40404040  40404040  40404040  E6C9E3D6  F0F0F2F8*
02D9D3C4  40404040  40400038  40404040  00020001  1C0001A8  00010001
0C000020  00010001  0C000024  00010001  0C000028  00010001  0C000074
00010001  0C000078  00010001  0C00007C  E6C9E3D6  F0F0F2F9*
02E3E7E3  40000084  40400010  40400001  00000100  00000110  00000120
00000130  40404040  40404040  40404040  40404040  40404040  40404040
40404040  40404040  40404040  40404040  E6C9E3D6  F0F0F3F0**
02E3E7E3  400000A8  4040000C  40400001  000000E8  00000150  000000F0
40404040  40404040  40404040  40404040  40404040  40404040  40404040
40404040  40404040  40404040  40404040  E6C9E3D6  F0F0F3F1*
02D9D3C4  40404040  40400038  40404040  00010001  0C000080  00010001
0C000084  00010001  0C000088  00010001  0C00008C  00010001  0C000090
00010001  0C0000A8  00010001  0C0000AC  E6C9E3D6  F0F0F3F2*
02E3E7E3  400000B4  4040000C  40400001  00000148  00000140  00000158
40404040  40404040  40404040  40404040  40404040  40404040  40404040
40404040  40404040  40404040  40404040  E6C9E3D6  F0F0F3F3*
02D9D3C4  40404040  40400020  40404040  00010001  0C0000B0  00010001
0C0000B4  00010001  0C0000B8  00010001  0C0000BC  40404040  40404040
40404040  40404040  40404040  40404040  E6C9E3D6  F0F0F3F4*
02C5D5C4  40404040  40404040  40404040  40404040  40404040  40404040
0000048A  F1F5F7F3  F460C6D6  F34040F0  F2F0F2F8  F7F0F9F8  40F0F84B
F5F14BF0  F1404040  E6C9E3D6  E4E34040  E6C9E3D6  F0F0F3F5**

MEMBER NAME  WPIERC
02C5E2C4  40404040  40400010  40400001  E6D7C9C5  D9C34040  00000000
40000000  40404040  40404040  40404040  40404040  40404040  40404040
40404040  40404040  40404040  40404040  E6D7C9C5  F0F0F0F1*
02E3E7E3  40000000  40400038  40400001  47F0F00C  07E6D7C9  C5D9C340
90ECD00C  184D98CD  F0205040  D00450D0  400807FC  40404040  40404040
021A2140  5C5C5C5C  5C5C5C5C  5C40D7C5  E6D7C9C5  F0F0F0F2*
02E3E7E3  40000038  40400038  40400001  D9C3C540  E3C1C2D3  C5405C5C
5C5C5C5C  5C5C5C5C  22021A05  4040C97E  4010041A  0440C47E  400A0601
1A0440D7  7E400A06  011A0440  E27E400A  E6D7C9C5  F0F0F0F3*
02E3E7E3  40000070  40400038  40400001  06011A04  40D37E40  0A06011A
0440D47E  400A0603  1E18051A  0540E740  7E400A07  031A0540  E8407E40
0A07031A  0640D3C3  407E4006  04240822  E6D7C9C5  F0F0F0F4*
02E3E7E3  400000F8  40400010  40400001  00000001  0000000B  00000000
00000000  40404040  40404040  40404040  40404040  40404040  40404040
```

```
40404040  40404040  40404040  40404040  E6D7C9C5  F0F0F0F5*
02C5E2C4  40404040  40400010  40400002  C9C2C3D6  D47B4040  02000000
40000000  40404040  40404040  40404040  40404040  40404040  40404040
40404040  40404040  40404040  40404040  E6D7C9C5  F0F0F0F6*
02E3E7E3  40000118  40400004  40400001  00000000  40404040  40404040
40404040  40404040  40404040  40404040  40404040  40404040  40404040
40404040  40404040  40404040  40404040  E6D7C9C5  F0F0F0F7*
02E3E7E3  40000120  40400004  40400001  00000000  40404040  40404040
40404040  40404040  40404040  40404040  40404040  40404040  40404040
40404040  40404040  40404040  40404040  E6D7C9C5  F0F0F0F8*
02E3E7E3  4000013C  40400038  40400001  5880D070  58B0D050  58A0D084
5850D07C  58F0D078  45E0F004  00000006  00000028  45E0F010  50B0D064
189B58F0  D0781800  45E0F004  00000006  E6D7C9C5  F0F0F0F9*
02E3E7E3  40000174  40400038  40400001  0000004D  45E0F008  0450D064
18755C60  D06418B7  1AB5184A  1A471894  45E0F008  04798000  879AD0E8
5890D050  45E0F010  5830D064  1A395030  E6D7C9C5  F0F0F1F0**
02E3E7E3  400001AC  40400038  40400001  D0645930  D06847C0  D0BE58B0
D0501BFF  58E0D000  07FE58D0  D00458E0  D00C92FF  D00C982C  D01C07FE
58701004  58207000  5020D068  58201000  E6D7C9C5  F0F0F1F1*
02E3E7E3  400001E4  4040001C  40400001  41302000  41500004  1B255C40
D0541B25  5020D070  5030D074  47F0D094  40404040  40404040  40404040
40404040  40404040  40404040  40404040  E6D7C9C5  F0F0F1F2*
02E3E7E3  40000020  40400008  40400001  000001D4  000000A8  40404040
40404040  40404040  40404040  40404040  40404040  40404040  40404040
40404040  40404040  40404040  40404040  E6D7C9C5  F0F0F1F3*
02E3E7E3  400000A8  40400004  40400001  000001C2  40404040  40404040
40404040  40404040  40404040  40404040  40404040  40404040  40404040
40404040  40404040  40404040  40404040  E6D7C9C5  F0F0F1F4*
02E3E7E3  40000124  40400018  40400001  0000002C  00000000  00000004
00000000  00000000  00000000  40404040  40404040  40404040  40404040
40404040  40404040  40404040  40404040  E6D7C9C5  F0F0F1F5*
02D9D3C4  40404040  40400030  40404040  00020001  1C000120  00010001
0C000158  00010001  0C000174  00010001  0C000020  00010001  0C000024
00010001  0C0000A8  40404040  40404040  E6D7C9C5  F0F0F1F6*
02C5D5C4  40404040  40404040  40404040  40404040  40404040  40404040
00000200  F1F5F7F3  F460C6D6  F34040F0  F2F0F2F8  F7F0F9F8  40F0F84B
F5F14BF0  F6404040  E6D7C9C5  D9C34040  E6D7C9C5  F0F0F1F7**

MEMBER NAME  WRTMAT
02C5E2C4  40404040  40400010  40400001  E6D9E3D4  C1E34040  00000000
40000000  40404040  40404040  40404040  40404040  40404040  40404040
40404040  40404040  40404040  40404040  E6D9E3D4  F0F0F0F1*
02E3E7E3  40000000  40400038  40400001  47F0F00C  07E6D9E3  D4C1E340
90ECD00C  184D98CD  F0205040  D00450D0  400807FC  40404040  40404040
021A3640  5C5C5C5C  5C5C5C5C  5C5C5C5C  E6D9E3D4  F0F0F0F2*
02E3E7E3  40000038  40400038  40400001  5C5C5C5C  5C5C5C5C  5C5C5C5C
5C5C5C5C  5C5C5C5C  5C5C5C5C  5C5C5C5C  5C5C5C5C  5C5C5C5C  5C5C5C5C
5C22021A  0740D7D6  C9D5E340  10061A01  E6D9E3D4  F0F0F0F3*
02E3E7E3  40000070  40400038  40400001  4006020A  0A021A06  40C4C1E2
C8401005  1A034040  4D061414  011A015D  22021A25  404040E3  C8C9E240
D7C9C5D9  C3C540D7  D6C9D5E3  40D7C9C5  E6D9E3D4  F0F0F0F4*
02E3E7E3  400000A8  40400038  40400001  D9C3C5E2  40D5D640  D7D3C9C5
E222021A  01401003  22021A01  400C0702  1A01400C  08031A01  4004040C
07021A01  401C0C09  041A0140  04020C07  E6D9E3D4  F0F0F0F5*
02E3E7E3  400000E0  40400038  40400001  021A0140  1C22021A  01401003
22021A01  400A0C04  0A0A0210  0322021A  034040F1  1E1A0740  D7D6C9D5
E3401006  1A014006  020A0A02  1A0640C4  E6D9E3D4  F0F0F0F6*
02E3E7E3  40000118  40400038  40400001  C1E2C840  10051A03  40404D06
1414011A  015D2202  1A2740C1  E5C5D9C1  C7C540D3  C1D4C9D5  C1E3C540
```

```
D7D9D6D7  C5D9E3C9  C5E240C6  D6D940D7  E6D9E3D4  F0F0F0F7*
02E3E7E3  40000150  40400038  40400001  D6C9D5E3  4022021A  20E3D6E3
C1D340E3  C8C9C3D2  D5C5E2E2  40404040  40404040  40404040  4040407E
400A0603  18011A02  C9D51814  22021A20  E6D9E3D4  F0F0F0F8*
02E3E7E3  40000188  40400038  40400001  D3D6D5C7  C9E3E4C4  C9D5C1D3
40D4D6C4  E4D3E4E2  404DC5F1  5D40C5E7  40407E40  0C0B041A  0440D7E2
C9181422  021A20E3  D9C1D5E2  E5C5D9E2  E6D9E3D4  F0F0F0F9*
02E3E7E3  400001C0  40400038  40400001  C540D4D6  C4E4D3E4  E2404040
4DC5F25D  40C5E840  407E400C  0B041A04  40D7E2C9  18142202  1A20E2C8
C5C1D940  D4D6C4E4  D3E4E240  40404040  E6D9E3D4  F0F0F1F0**
02E3E7E3  400001F8  40400038  40400001  404DC7F1  F25D40C7  E7E84040
7E400C0B  041A0440  D7E2C918  1422021A  20D7D6C9  E2E2D6D5  7DE240D9
C1E3C9D6  4040404D  D5E4F1F2  5D40E5E7  E6D9E3D4  F0F0F1F1*
02E3E7E3  40000230  40400038  40400001  E840407E  400A0504  18142202
1A20D7D6  C9E2E2D6  D57DE240  D9C1E3C9  D6404040  4DD5E4F2  F15D40E5
E8E74040  7E400A05  04181422  021A20D3  E6D9E3D4  F0F0F1F2*
02E3E7E3  40000268  40400038  40400001  D6D5C7C9  E3E4C4C9  D5C1D340
C34BE34B  C54B40C1  D3D7C8C1  4040E740  407E400C  0B041A0C  40C9D561
C9D561C4  C5C740C6  22021A20  E3D9C1D5  E6D9E3D4  F0F0F1F3*
02E3E7E3  400002A0  40400038  40400001  E2E5C5D9  E2C540C3  4BE34BC5
4B404040  C1D3D7C8  C14040E8  40407E40  0C0B041A  0C40C9D5  61C9D561
C4C5C740  C622021A  20C1D7D7  C1D9C5D5  E6D9E3D4  F0F0F1F4*
02E3E7E3  400002D8  40400038  40400001  E340E2C8  D940C34B  E34BC54B
40C1D3D7  C8C140E7  E840407E  400C0B04  1A0C40C9  D561C9D5  61C4C5C7
40C62202  1A01F01A  27606060  60606060  E6D9E3D4  F0F0F1F5*
02E3E7E3  40000310  40400038  40400001  60606060  6040C160  D4C1E3D9
C9E74060  60606060  60606060  60606060  60606060  22021A01  40080106
030C0D04  22021A01  F01A2760  60606060  E6D9E3D4  F0F0F1F6*
02E3E7E3  40000348  40400038  40400001  60606060  60606040  C260D4C1
E3D9C9E7  40606060  60606060  60606060  60606060  60602202  1A01F01A
27606060  60606060  60606060  6040C460  E6D9E3D4  F0F0F1F7*
02E3E7E3  40000380  40400038  40400001  D4C1E3D9  C9E74060  60606060
60606060  60606060  60606060  22021A01  F01A2760  60606060  60606060
60606040  E260D4C1  E3D9C9E7  40606060  E6D9E3D4  F0F0F1F8*
02E3E7E3  400003B8  40400038  40400001  60606060  60606060  60606060
60602202  1A1E40E3  D6E3C1D3  40D7D3C9  C5E240C2  E840D6D9  C9C5D5E3
C1E3C9D6  D5407E40  10052202  1A024040  E6D9E3D4  F0F0F1F9*
02E3E7E3  400003F0  40400013  40400001  0A06011A  03407E40  10041801

MEMBER NAME  WRTMAT
0A05011A  016C2240  40404040  40404040  40404040  40404040  40404040
40404040  40404040  40404040  40404040  E6D9E3D4  F0F0F2F0**
02E3E7E3  40000458  40400038  40400001  00000000  00000000  4E000000
00000000  4F080000  00000000  4E000000  80000000  00000001  00000002
00000003  00000009  0000000B  00000014  E6D9E3D4  F0F0F2F1*
02C5E2C4  40404040  40400010  40400002  D9D4D6C4  C5D34040  05000000
40000018  40404040  40404040  40404040  40404040  40404040  40404040
40404040  40404040  40404040  40404040  E6D9E3D4  F0F0F2F2*
02E3E7E3  40000490  40400018  40400001  00000018  00000058  00000064
42640000  00000000  00000000  40404040  40404040  40404040  40404040
40404040  40404040  40404040  40404040  E6D9E3D4  F0F0F2F3*
02C5E2C4  40404040  40400010  40400003  D7D4C1E3  D3404040  05000000
40001134  40404040  40404040  40404040  40404040  40404040  40404040
40404040  40404040  40404040  40404040  E6D9E3D4  F0F0F2F4*
02E3E7E3  40000510  40400010  40400001  FFFFFFFF  FFFFFFA0  00001130
00000000  40404040  40404040  40404040  40404040  40404040  40404040
40404040  40404040  40404040  40404040  E6D9E3D4  F0F0F2F5*
02E3E7E3  40000524  40400004  40400001  00000000  40404040  40404040
40404040  40404040  40404040  40404040  40404040  40404040  40404040
```

```
40404040  40404040  40404040  40404040  E6D9E3D4  F0F0F2F6*
02E3E7E3  4000052C  40400004  40400001  00000000  40404040  40404040
40404040  40404040  40404040  40404040  40404040  40404040  40404040
40404040  40404040  40404040  40404040  E6D9E3D4  F0F0F2F7*
02E3E7E3  40000534  40400004  40400001  00000000  40404040  40404040
40404040  40404040  40404040  40404040  40404040  40404040  40404040
40404040  40404040  40404040  40404040  E6D9E3D4  F0F0F2F8*
02E3E7E3  4000053C  40400004  40400001  00000000  40404040  40404040
40404040  40404040  40404040  40404040  40404040  40404040  40404040
40404040  40404040  40404040  40404040  E6D9E3D4  F0F0F2F9*
02E3E7E3  40000544  40400004  40400001  00000000  40404040  40404040
40404040  40404040  40404040  40404040  40404040  40404040  40404040
40404040  40404040  40404040  40404040  E6D9E3D4  F0F0F3F0**
02E3E7E3  4000054C  40400004  40400001  00000000  40404040  40404040
40404040  40404040  40404040  40404040  40404040  40404040  40404040
40404040  40404040  40404040  40404040  E6D9E3D4  F0F0F3F1*
02C5E2C4  40404040  40400010  40400004  C9C2C3D6  D47B4040  02000000
40000000  40404040  40404040  40404040  40404040  40404040  40404040
40404040  40404040  40404040  40404040  E6D9E3D4  F0F0F3F2*
02E3E7E3  40000554  40400004  40400001  00000000  40404040  40404040
40404040  40404040  40404040  40404040  40404040  40404040  40404040
40404040  40404040  40404040  40404040  E6D9E3D4  F0F0F3F3*
02E3E7E3  4000055C  40400004  40400001  00000000  40404040  40404040
40404040  40404040  40404040  40404040  40404040  40404040  40404040
40404040  40404040  40404040  40404040  E6D9E3D4  F0F0F3F4*
02E3E7E3  4000057C  40400038  40400001  7840D094  58B0D158  58F0D154
45E0F004  00000009  00000028  45E0F010  58F0D154  45E0F004  00000009
00000062  45E0F008  0450D0B4  45E0F008  E6D9E3D4  F0F0F3F5*
02E3E7E3  400005B4  40400038  40400001  0470D0A8  45E0F008  0470D0AC
45E0F008  0450D0C4  5820D108  45E0F134  00010000  01202001  01000014
00000001  45E0F010  5800D0C8  5900D070  E6D9E3D4  F0F0F3F6*
02E3E7E3  400005EC  40400028  40400001  47A0D1FC  58F0D154  45E0F004
00000009  0000008D  45E0F010  58F0D154  45E0F004  00000009  000000B6
40404040  40404040  40404040  40404040  E6D9E3D4  F0F0F3F7*
02D9D3C4  40404040  40400038  40404040  00020001  0C000510  00030001
0C000514  00030001  0C000518  00040001  1C00055C  00010001  0C000590
00010001  0C0005A4  00010001  0C0005FC  E6D9E3D4  F0F0F3F8*
02E3E7E3  40000614  40400038  40400001  5820D110  45E0F008  04502000
45E0F010  58F0D110  5850F000  5C40D08C  5890D08C  58A0D08C  18B55870

MEMBER NAME  WRTMAT
D10C58F0  D1541800  45E0F004  00000009  E6D9E3D4  F0F0F3F9*
02E3E7E3  4000064C  40400038  40400001  000000BD  45E0F134  00010000
08697008  01000009  00000008  45E0F010  879AD236  58B0D158  58F0D154
45E0F004  00000009  000000E6  45E0F008  E6D9E3D4  F0F0F4F0**
02E3E7E3  40000684  40400038  40400001  0450D0C8  45E0F010  5890D15C
18AB58B0  D0705880  D13C5870  D10C5860  D14C58F0  D1541800  45E0F004
00000009  000000ED  58598000  5C40D08C  E6D9E3D4  F0F0F4F1*
02E3E7E3  400006BC  40400038  40400001  45E0F008  08657058  45E0F008
086A6000  45E0F008  04598000  45E0F010  5AB0D070  5AA0D158  5A90D15C
59B0D0C8  47C0D29A  58B0D158  58F0D154  E6D9E3D4  F0F0F4F2*
02E3E7E3  400006F4  40400038  40400001  45E0F004  00000009  000000FA
45E0F008  0450D0B4  45E0F008  0470D0A8  45E0F008  0470D0AC  45E0F008
0450D0C4  5820D108  45E0F134  00010000  E6D9E3D4  F0F0F4F3*
02E3E7E3  4000072C  40400038  40400001  01202001  01000014  00000001
45E0F010  58F0D154  45E0F004  00000009  0000012B  45E0F010  58F0D154
45E0F004  00000009  00000156  45E0F008  E6D9E3D4  F0F0F4F4*
02E3E7E3  40000764  40400018  40400001  0860D100  45E0F010  58F0D154
45E0F004  00000009  00000185  40404040  40404040  40404040  40404040
```

```
40404040  40404040  40404040  40404040  E6D9E3D4  F0F0F4F5*
02D9D3C4  40404040  40400038  40404040  00010001  0C000610  00010001
0C00064C  00010001  0C00067C  00010001  0C0006B0  00010001  0C0006FC
00010001  0C000748  00010001  0C00075C  E6D9E3D4  F0F0F4F6*
02E3E7E3  4000077C  40400038  40400001  45E0F008  0860D0D8  45E0F010
58F0D154  45E0F004  00000009  000001B4  45E0F008  0860D0E0  45E0F010
58F0D154  45E0F004  00000009  000001E3  E6D9E3D4  F0F0F4F7*
02E3E7E3  400007B4  40400038  40400001  45E0F008  0860D0E8  45E0F010
58F0D154  45E0F004  00000009  00000212  45E0F008  0860D0F0  45E0F010
58F0D154  45E0F004  00000009  0000023B  E6D9E3D4  F0F0F4F8*
02E3E7E3  400007EC  40400038  40400001  45E0F008  0860D0F8  45E0F010
58F0D154  45E0F004  00000009  00000264  5820D114  45E0F008  08602008
45E0F010  58F0D154  45E0F004  00000009  E6D9E3D4  F0F0F4F9*
02E3E7E3  40000824  40400024  40400001  00000299  5820D114  45E0F008
08602010  45E0F010  58F0D154  45E0F004  00000009  000002CE  40404040
40404040  40404040  40404040  40404040  E6D9E3D4  F0F0F5F0**
02D9D3C4  40404040  40400038  40404040  00010001  0C000778  00010001
0C000794  00010001  0C0007B0  00010001  0C0007CC  00010001  0C0007E8
00010001  0C000804  00010001  0C000824  E6D9E3D4  F0F0F5F1*
02E3E7E3  40000848  40400038  40400001  5820D114  45E0F008  08602018
45E0F010  58F0D154  45E0F004  00000009  00000303  45E0F010  189B18AB
58B0D088  5880D11C  58F0D154  45E0F004  E6D9E3D4  F0F0F5F2*
02E3E7E3  40000880  40400038  40400001  00000009  00000331  45E0F134
00010000  08698018  01000003  00000018  45E0F010  879AD470  58B0D158
58F0D154  45E0F004  00000009  0000033D  E6D9E3D4  F0F0F5F3*
02E3E7E3  400008B8  40400038  40400001  45E0F010  189B18AB  58B0D088
5880D124  58F0D154  45E0F004  00000009  00000331  45E0F134  00010000
08698018  01000003  00000018  45E0F010  E6D9E3D4  F0F0F5F4*
02E3E7E3  400008F0  40400038  40400001  879AD4C0  58B0D158  58F0D154
45E0F004  00000009  0000036B  45E0F010  189B18AB  58B0D088  5880D12C
58F0D154  45E0F004  00000009  00000331  E6D9E3D4  F0F0F5F5*
02E3E7E3  40000928  40400030  40400001  45E0F134  00010000  08698018
01000003  00000018  45E0F010  879AD510  58B0D158  58F0D154  45E0F004
00000009  00000399  40404040  40404040  E6D9E3D4  F0F0F5F6*
02D9D3C4  40404040  40400038  40404040  00010001  0C000844  00010001
0C000864  00010001  0C000884  00010001  0C0008B4  00010001  0C0008D4
00010001  0C000904  00010001  0C000924  E6D9E3D4  F0F0F5F7*
02E3E7E3  40000958  40400038  40400001  45E0F010  189B18AB  58B0D16C
5880D134  58F0D154  45E0F004  00000009  00000331  45E0F134  00010000
08698018  01000002  00000018  45E0F010  E6D9E3D4  F0F0F5F8*

MEMBER NAME  WRTMAT
02E3E7E3  40000990  40400038  40400001  879AD560  58B0D158  5800D0C8
5700D06C  5000D05C  6860D058  6B60D068  58F0D154  45E0F004  00000009
000003C7  45E0F008  0450D0C8  45E0F010  E6D9E3D4  F0F0F5F9*
02E3E7E3  400009C8  40400038  40400001  5830D070  5860D070  187B5890
D17058A0  D16C18B3  5880D144  2B00780A  80006A00  D0606000  D0505830
D0545030  D0BC1803  5700D06C  5000D05C  E6D9E3D4  F0F0F6F0**
02E3E7E3  40000A00  40400038  40400001  6820D058  6B20D068  3D263C24
7020D0C0  58F0D154  45E0F004  00000009  000003EB  45E0F008  04798000
45E0F008  0450D0BC  45E0F008  0470D0C0  E6D9E3D4  F0F0F6F1*
02E3E7E3  40000A38  40400038  40400001  45E0F010  1AB61A97  1AA759B0
D0B047C0  D5D858B0  D1581BFF  58E0D000  07FE58A0  D00458E0  A00C58B0
A0185810  B0085820  D0C85020  100018DA  E6D9E3D4  F0F0F6F2*
02E3E7E3  40000A70  40400038  40400001  92FFA00C  982CA01C  07FE987B
10085820  70005020  D0C85820  80005020  D0B47820  90007020  D0A87820
A0007020  D0AC5820  B0005020  D0C4987B  E6D9E3D4  F0F0F6F3*
02E3E7E3  40000AA8  40400038  40400001  10205820  70005020  D0B06820
80006020  D1006820  90006020  D0D86820  A0006020  D0E06820  B0006020
```

```
D0E8987B 10346820 70006020 D0F06820 E6D9E3D4 F0F0F6F4*
02E3E7E3 40000AE0 40400038 40400001 80006020 D0F85820 10004130
20004150 00081B25 5020D14C 5030D150 58201004 41302000 41500004
1B255020 D13C5030 D1405820 101C4130 E6D9E3D4 F0F0F6F5*
02E3E7E3 40000B18 40400038 40400001 20004150 00041B25 5C40D074
1B255020 D1445030 D1485820 103C4130 20004150 00081B25 5020D114
5030D118 58201040 41302000 41500008 E6D9E3D4 F0F0F6F6*
02E3E7E3 40000B50 40400038 40400001 1B255B20 D0885020 D11C5030
D1205820 10444130 20004150 00081B25 5B20D088 5020D124 5030D128
58201048 41302000 41500008 1B255B20 E6D9E3D4 F0F0F6F7*
02E3E7E3 40000B88 40400028 40400001 D0885020 D12C5030 D1305820
104C4130 20004150 00081B25 5B20D088 5020D134 5030D138 47F0D174
40404040 40404040 40404040 40404040 E6D9E3D4 F0F0F6F8*
02E3E7E3 40000020 40400008 40400001 00000A7A 00000408 40404040
40404040 40404040 40404040 40404040 40404040 40404040 40404040
40404040 40404040 40404040 40404040 E6D9E3D4 F0F0F6F9*
02E3E7E3 40000408 40400004 40400001 00000A56 40404040 40404040
40404040 40404040 40404040 40404040 40404040 40404040 40404040
40404040 40404040 40404040 40404040 E6D9E3D4 F0F0F7F0**
02E3E7E3 40000560 4040001C 40400001 00000008 00000004 00000000
00000000 00000000 00000010 0000000C 40404040 40404040 40404040
40404040 40404040 40404040 40404040 E6D9E3D4 F0F0F7F1*
02D9D3C4 40404040 40400038 40404040 00010001 0C000954 00010001
0C000974 00010001 0C0009B8 00010001 0C000A1C 00010001 0C000020
00010001 0C000024 00010001 0C000408 E6D9E3D4 F0F0F7F2*
02C5D5C4 40404040 40404040 40404040 40404040 40404040 40404040
00000BB0 F1F5F7F3 F460C6D6 F34040F0 F2F0F2F8 F7F0F9F8 40F0F84B
F5F14BF1 F1404040 E6D9E3D4 C1E34040 E6D9E3D4 F0F0F7F3**

MEMBER NAME  WSARY
02C5E2C4 40404040 40400010 40400001 E6E2C1D9 E8404040 00000000
40000000 40404040 40404040 40404040 40404040 40404040 40404040
40404040 40404040 40404040 40404040 E6E2C1D9 F0F0F0F1*
02E3E7E3 40000000 40400038 40400001 47F0F00C 07E6E2C1 D9E84040
90ECD00C 184D98CD F0205040 D00450D0 400807FC 40404040 40404040
021A2140 5C5C5C5C 5C5C5C5C 5C40E2E3 E6E2C1D9 F0F0F0F2*
02E3E7E3 40000038 40400038 40400001 C1C3D240 E3C1C2D3 C5405C5C
5C5C5C5C 5C5C5C5C 22021A05 4040C97E 4010041A 0440D47E 400A0401
1A0440C4 7E400A06 011A0440 E27E400A E6E2C1D9 F0F0F0F3*
02E3E7E3 40000070 40400038 40400001 06011A04 40D37E40 0A05011A
0440C17E 400A0703 1A0440D4 7E400A06 011A0440 D77E400A 04011A05
40E7407E 400A0703 1A0540E8 407E400A E6E2C1D9 F0F0F0F4*
02E3E7E3 400000A8 40400038 40400001 07031A04 40E77E40 0A07031A
0440E87E 400A0703 1E180A1A 03E67E40 0A07031A 0440E57E 400A0703
1A0440C4 7E400A04 011A0440 C57E400A E6E2C1D9 F0F0F0F5*
02E3E7E3 400000E0 40400021 40400001 04011A05 40D3C37E 40060524
081A0740 D7D5E340 7E400A05 011A0240 7B0A0501 22404040 40404040
40404040 40404040 40404040 40404040 E6E2C1D9 F0F0F0F6*
02C5E2C4 40404040 40400010 40400002 E2E3C1C3 D2404040 05000000
40040744 40404040 40404040 40404040 40404040 40404040 40404040
40404040 40404040 40404040 40404040 E6E2C1D9 F0F0F0F7*
02E3E7E3 40000158 40400014 40400001 00000001 00000016 00000058
00000000 00000000 40404040 40404040 40404040 40404040 40404040
40404040 40404040 40404040 40404040 E6E2C1D9 F0F0F0F8*
02C5E2C4 40404040 40400010 40400003 C9C2C3D6 D47B4040 02000000
40000000 40404040 40404040 40404040 40404040 40404040 40404040
40404040 40404040 40404040 40404040 E6E2C1D9 F0F0F0F9*
02E3E7E3 40000180 40400038 40400001 FFFFFFA8 00000000 58B0D078
58A0D050 5890B058 5880D058 58F0D07C 45E0F004 00000006 00000028
```

```
00000EA0  00000E8C  00000E8C  00000F24  40404040  40404040  40404040
40404040  40404040  40404040  40404040  D7E2E3D9  F0F2F8F0**
02D9D3C4  40404040  40400038  40404040  00010001  0C000AC4  00010001
0C000AC8  00010001  0C000ACC  00010001  0C000AD0  00010001  0C000AD4
00010001  0C000AD8  00010001  0C000ADC  D7E2E3D9  F0F2F8F1*
02E3E7E3  40000AE4  40400010  40400001  00000F30  80000E8C  000011A6
80000EE8  40404040  40404040  40404040  40404040  40404040  40404040
40404040  40404040  40404040  40404040  D7E2E3D9  F0F2F8F2*
02E3E7E3  40000AFC  4040000C  40400001  00000E8C  00001044  00000F24
40404040  40404040  40404040  40404040  40404040  40404040  40404040
40404040  40404040  40404040  40404040  D7E2E3D9  F0F2F8F3*
02D9D3C4  40404040  40400038  40404040  00010001  0C000AE0  00010001
0C000AE4  00010001  0C000AE8  00010001  0C000AEC  00010001  0C000AF0
00010001  0C000AFC  00010001  0C000B00  D7E2E3D9  F0F2F8F4*
02E3E7E3  40000B08  4040001C  40400001  00000F20  000011A6  00000E8C
00000E8C  00000E8C  00000E8C  00000E98  40404040  40404040  40404040
40404040  40404040  40404040  40404040  D7E2E3D9  F0F2F8F5*
02D9D3C4  40404040  40400038  40404040  00010001  0C000B04  00010001
0C000B08  00010001  0C000B0C  00010001  0C000B10  00010001  0C000B14
00010001  0C000B18  00010001  0C000B1C  D7E2E3D9  F0F2F8F6*
02E3E7E3  40000B24  4040001C  40400001  00000EA0  00000E8C  00000E8C
00000F24  00000F30  80000E8C  000011A6  40404040  40404040  40404040
40404040  40404040  40404040  40404040  D7E2E3D9  F0F2F8F7*
02D9D3C4  40404040  40400038  40404040  00010001  0C000B20  00010001
0C000B24  00010001  0C000B28  00010001  0C000B2C  00010001  0C000B30
00010001  0C000B34  00010001  0C000B38  D7E2E3D9  F0F2F8F8*
02E3E7E3  40000B40  40400004  40400001  80000EE8  40404040  40404040
40404040  40404040  40404040  40404040  40404040  40404040  40404040
40404040  40404040  40404040  40404040  D7E2E3D9  F0F2F8F9*
02E3E7E3  40000B4C  40400018  40400001  00000E8C  00001044  00000F24
00000F20  000011A6  00000E8C  40404040  40404040  40404040  40404040
40404040  40404040  40404040  40404040  D7E2E3D9  F0F2F9F0**

MEMBER NAME  PSTRES
02D9D3C4  40404040  40400038  40404040  00010001  0C000B3C  00010001
0C000B40  00010001  0C000B4C  00010001  0C000B50  00010001  0C000B54
00010001  0C000B58  00010001  0C000B5C  D7E2E3D9  F0F2F9F1*
02E3E7E3  40000B64  4040001C  40400001  00000E8C  00000E8C  00000E8C
00000E98  00000EA0  00000E8C  00000E8C  40404040  40404040  40404040
40404040  40404040  40404040  40404040  D7E2E3D9  F0F2F9F2*
02D9D3C4  40404040  40400038  40404040  00010001  0C000B60  00010001
0C000B64  00010001  0C000B68  00010001  0C000B6C  00010001  0C000B70
00010001  0C000B74  00010001  0C000B78  D7E2E3D9  F0F2F9F3*
02E3E7E3  40000B80  40400014  40400001  00000F24  00000F30  80000E8C
000011A6  80000EE8  40404040  40404040  40404040  40404040  40404040
40404040  40404040  40404040  40404040  D7E2E3D9  F0F2F9F4*
02E3E7E3  40000B9C  40400008  40400001  00000E8C  00001044  40404040
40404040  40404040  40404040  40404040  40404040  40404040  40404040
40404040  40404040  40404040  40404040  D7E2E3D9  F0F2F9F5*
02D9D3C4  40404040  40400038  40404040  00010001  0C000B7C  00010001
0C000B80  00010001  0C000B84  00010001  0C000B88  00010001  0C000B8C
00010001  0C000B90  00010001  0C000B9C  D7E2E3D9  F0F2F9F6*
02E3E7E3  40000BA4  4040001C  40400001  00000F24  00000F20  000011A6
00000E8C  00000E8C  00000E8C  00000E8C  40404040  40404040  40404040
40404040  40404040  40404040  40404040  D7E2E3D9  F0F2F9F7*
02D9D3C4  40404040  40400038  40404040  00010001  0C000BA0  00010001
0C000BA4  00010001  0C000BA8  00010001  0C000BAC  00010001  0C000BB0
00010001  0C000BB4  00010001  0C000BB8  D7E2E3D9  F0F2F9F8*
02E3E7E3  40000BC0  4040001C  40400001  00000E98  00000EA0  00000E8C
```

```
00000E8C  00000F24  00000F30  80000E8C  40404040  40404040  40404040
40404040  40404040  40404040  40404040  D7E2E3D9  F0F2F9F9*
02D9D3C4  40404040  40400038  40404040  00010001  0C000BBC  00010001
0C000BC0  00010001  0C000BC4  00010001  0C000BC8  00010001  0C000BCC
00010001  0C000BD0  00010001  0C000BD4  D7E2E3D9  F0F3F0F0**
02E3E7E3  40000BDC  40400008  40400001  000011A6  80000EE8  40404040
40404040  40404040  40404040  40404040  40404040  40404040  40404040
40404040  40404040  40404040  40404040  D7E2E3D9  F0F3F0F1*
02E3E7E3  40000BEC  40400014  40400001  00000E8C  00001044  00000F24
00000F20  000011A6  40404040  40404040  40404040  40404040  40404040
40404040  40404040  40404040  40404040  D7E2E3D9  F0F3F0F2*
02D9D3C4  40404040  40400038  40404040  00010001  0C000BD8  00010001
0C000BDC  00010001  0C000BE0  00010001  0C000BEC  00010001  0C000BF0
00010001  0C000BF4  00010001  0C000BF8  D7E2E3D9  F0F3F0F3*
02E3E7E3  40000C00  4040001C  40400001  00000E8C  00000E8C  00000E8C
00000E8C  00000E98  00000EA0  00000E8C  40404040  40404040  40404040
40404040  40404040  40404040  40404040  D7E2E3D9  F0F3F0F4*
02D9D3C4  40404040  40400038  40404040  00010001  0C000BFC  00010001
0C000C00  00010001  0C000C04  00010001  0C000C08  00010001  0C000C0C
00010001  0C000C10  00010001  0C000C14  D7E2E3D9  F0F3F0F5*
02E3E7E3  40000C1C  40400018  40400001  00000E8C  00000F24  00000F30
80000E8C  000011A6  80000EE8  40404040  40404040  40404040  40404040
40404040  40404040  40404040  40404040  D7E2E3D9  F0F3F0F6*
02E3E7E3  40000C3C  40400004  40400001  00000E8C  40404040  40404040
40404040  40404040  40404040  40404040  40404040  40404040  40404040
40404040  40404040  40404040  40404040  D7E2E3D9  F0F3F0F7*
02D9D3C4  40404040  40400038  40404040  00010001  0C000C18  00010001
0C000C1C  00010001  0C000C20  00010001  0C000C24  00010001  0C000C28
00010001  0C000C2C  00010001  0C000C30  D7E2E3D9  F0F3F0F8*
02E3E7E3  40000C40  4040001C  40400001  00001044  00000F24  00000F20
000011A6  00000E8C  00000E8C  00000E8C  40404040  40404040  40404040
40404040  40404040  40404040  40404040  D7E2E3D9  F0F3F0F9*
02D9D3C4  40404040  40400038  40404040  00010001  0C000C3C  00010001

MEMBER NAME  PSTRES
0C000C40  00010001  0C000C44  00010001  0C000C48  00010001  0C000C4C
00010001  0C000C50  00010001  0C000C54  D7E2E3D9  F0F3F1F0**
02E3E7E3  40000C5C  4040001C  40400001  00000E8C  00000E98  00000EA0
00000E8C  00000E8C  00000F24  00000F30  40404040  40404040  40404040
40404040  40404040  40404040  40404040  D7E2E3D9  F0F3F1F1*
02D9D3C4  40404040  40400038  40404040  00010001  0C000C58  00010001
0C000C5C  00010001  0C000C60  00010001  0C000C64  00010001  0C000C68
00010001  0C000C6C  00010001  0C000C70  D7E2E3D9  F0F3F1F2*
02E3E7E3  40000C78  4040000C  40400001  80000E8C  000011A6  80000EE8
40404040  40404040  40404040  40404040  40404040  40404040  40404040
40404040  40404040  40404040  40404040  D7E2E3D9  F0F3F1F3*
02E3E7E3  40000C8C  40400010  40400001  00000E8C  00001044  00000F24
00000F20  40404040  40404040  40404040  40404040  40404040  40404040
40404040  40404040  40404040  40404040  D7E2E3D9  F0F3F1F4*
02D9D3C4  40404040  40400038  40404040  00010001  0C000C74  00010001
0C000C78  00010001  0C000C7C  00010001  0C000C80  00010001  0C000C8C
00010001  0C000C90  00010001  0C000C94  D7E2E3D9  F0F3F1F5*
02E3E7E3  40000C9C  4040001C  40400001  000011A6  00000E8C  00000E8C
00000E8C  00000E8C  00000E98  00000EA0  40404040  40404040  40404040
40404040  40404040  40404040  40404040  D7E2E3D9  F0F3F1F6*
02D9D3C4  40404040  40400038  40404040  00010001  0C000C98  00010001
0C000C9C  00010001  0C000CA0  00010001  0C000CA4  00010001  0C000CA8
00010001  0C000CAC  00010001  0C000CB0  D7E2E3D9  F0F3F1F7*
02E3E7E3  40000CB8  4040001C  40400001  00000E8C  00000E8C  00000F24
```

| | | | | | | |
|---|---|---|---|---|---|---|
| 45E0F010 | 50A0D068 | 58F0D07C | 45E0F004 | E6E2C1D9 | F0F0F1F0** | |
| 02E3E7E3 | 400001B8 | 40400038 | 40400001 | 00000006 | 0000004D | 45E0F008 |
| 0450D068 | 18585C40 | D06845E0 | F1340001 | 00000475 | B0040100 | 00160000 |
| 000445E0 | F0105830 | D0681A3A | 5030D068 | E6E2C1D9 | F0F0F1F1* | |
| 02E3E7E3 | 400001F0 | 40400024 | 40400001 | 193947C0 | D0A81BFF | 58E0D000 |
| 07FE58D0 | D00458E0 | D00C92FF | D00C982C | D01C07FE | 47F0D080 | 40404040 |
| 40404040 | 40404040 | 40404040 | 40404040 | E6E2C1D9 | F0F0F1F2* | |
| 02E3E7E3 | 40000020 | 40400008 | 40400001 | 00000210 | 00000108 | 40404040 |
| 40404040 | 40404040 | 40404040 | 40404040 | 40404040 | 40404040 | 40404040 |
| 40404040 | 40404040 | 40404040 | 40404040 | E6E2C1D9 | F0F0F1F3* | |
| 02E3E7E3 | 40000108 | 40400004 | 40400001 | 000001FE | 40404040 | 40404040 |
| 40404040 | 40404040 | 40404040 | 40404040 | 40404040 | 40404040 | 40404040 |
| 40404040 | 40404040 | 40404040 | 40404040 | E6E2C1D9 | F0F0F1F4* | |
| 02D9D3C4 | 40404040 | 40400038 | 40404040 | 00020001 | 0C000180 | 00030001 |
| 1C000184 | 00010001 | 0C0001A4 | 00010001 | 0C0001BC | 00010001 | 0C000020 |
| 00010001 | 0C000024 | 00010001 | 0C000108 | E6E2C1D9 | F0F0F1F5* | |
| 02C5D5C4 | 40404040 | 40404040 | 40404040 | 40404040 | 40404040 | 40404040 |
| 00000214 | F1F5F7F3 | F460C6D6 | F34040F0 | F2F0F2F8 | F7F0F9F8 | 40F0F84B |
| F5F14BF1 | F7404040 | E6E2C1D9 | E8404040 | E6E2C1D9 | F0F0F1F6** | |

We claim:

1. A system to aid in the design and manufacture of composite parts, the composite parts fabricated from a plurality of plies of material assembled and cured in a desired orientation and arrangement to form the part, the system comprising:

a central processing unit;

input means communicating with the central processing unit;

storage means communicating with the central processing unit;

means for inputting and storing information regarding the shape, orientation and location of the plies within the composite part;

means for isolating and defining individual plies within the part; and means automatically communicating with the isolation and definition means for generating tool path data for a numerically controlled cutting machine or the like for cutting a plurality of individual plies of nonuniform shape from a sheet of ply material, the generating means taking into account the shape of each ply and its desired orientation with respect to the composite material.

2. The system of claim 1 further comprising:

means for automatically communicating with a nesting system to enable ply data to be automatically used to calculate preferred nesting arrangements to efficiently lay out individual plies shapes for cutting in the desired orientation from a sheet of ply material.

3. A method of designing and manufacturing composite parts, the composite parts fabricated from a plurality of plies of material assembled and cured in a desired orientation and arrangement to form the part, the method comprising the steps of:

inputting into and storing in a computer system information regarding the shape, orientation and location of a plurality of nonuniformly shaped plies within the composite part;

isolating and defining individual plies within the part;

automatically communicating data from the isolation and definition means and generating tool path data for a numerically controlled cutting machine or the like taking into account the shape of each ply and its desired orientation with respect to the composite material; and cutting the individual plies in their desired orientation from a sheet of ply material using the tool path data.

4. A method of designing and manufacturing composite parts, the composite parts fabricated from a plurality of plies of material assembled and cured in a desired orientation and arrangement to form the part, the method comprising the steps of:

inputting into and storing in a computer system information regarding the shape, orientation and location of a plurality of nonuniformly shaped plies within the composite part;

isolating and defining individual plies within the part;

automatically communicating ply definition data to a nesting system to enable ply data to be automatically used to calculate preferred nesting arrangements including data defining shape and desired orientation of each ply; and laying out individual ply shapes for cutting in the desired orientation from a sheet of ply material using the ply definition data.

* * * * *